US006126327A

United States Patent [19]

Bi et al.

[11] Patent Number: 6,126,327

[45] Date of Patent: Oct. 3, 2000

[54] RADIO FLASH UPDATE

[75] Inventors: Depeng Bi, Wheeling, Ill.; Harry Hsiung, Hillsboro, Oreg.; James Y. Wilson, Crystal Lake, Ill.

[73] Assignee: Packard Bell NEC, Sacramento, Calif.

[21] Appl. No.: 08/543,463

[22] Filed: Oct. 16, 1995

[51] Int. Cl.[7] ...................................................... G06F 13/00

[52] U.S. Cl. ...................................... 395/200.51; 395/653

[58] Field of Search ........................... 395/200.01, 200.1, 395/651, 652, 653, 830, 712, 200.5, 200.51, 200.52, 185.01; 364/514 C, 949.4; 340/825.27, 825.44

[56] References Cited

U.S. PATENT DOCUMENTS

| | | | |
|---|---|---|---|
| 4,005,388 | 1/1977 | Morley et al. | 340/172.5 |
| 4,310,720 | 1/1982 | Check, Jr. | 178/22.08 |
| 4,876,742 | 10/1989 | Vacon et al. | 455/66 |
| 4,878,051 | 10/1989 | Andros et al. | 340/825.44 |
| 4,916,441 | 4/1990 | Gombrich | 340/712 |
| 4,942,534 | 7/1990 | Yokoyama et al. | 364/468 |
| 4,974,173 | 11/1990 | Stefik et al. | 364/521 |
| 5,047,958 | 9/1991 | Comins et al. | 364/521 |
| 5,049,862 | 9/1991 | Dao et al. | 340/706 |
| 5,148,155 | 9/1992 | Martin et al. | 340/712 |
| 5,155,837 | 10/1992 | Liu et al. | 395/200.1 |
| 5,157,384 | 10/1992 | Greanias et al. | 340/706 |
| 5,194,852 | 3/1993 | More et al. | 340/712 |
| 5,204,768 | 4/1993 | Tsakiris et al. | 359/148 |
| 5,210,854 | 5/1993 | Beaverton et al. . | |
| 5,239,652 | 8/1993 | Seibert et al. | 395/750 |
| 5,241,303 | 8/1993 | Register et al. | 340/706 |
| 5,260,697 | 11/1993 | Barrett et al. | 345/173 |
| 5,261,055 | 11/1993 | Moran et al. . | |
| 5,276,839 | 1/1994 | Robb et al. . | |
| 5,305,384 | 4/1994 | Ashby et al. | 380/29 |
| 5,307,297 | 4/1994 | Iguchi et al. | 364/708.1 |
| 5,309,351 | 5/1994 | McCain et al. | 364/132 |
| 5,313,051 | 5/1994 | Brigida et al. | 235/375 |
| 5,315,711 | 5/1994 | Barone et al. | 395/275 |
| 5,321,840 | 6/1994 | Ahlin et al. | 395/700 |
| 5,327,531 | 7/1994 | Bealkowski et al. | 395/164 |
| 5,329,625 | 7/1994 | Kannan et al. | 395/275 |
| 5,341,503 | 8/1994 | Gladstein et al. | 395/750 |
| 5,347,295 | 9/1994 | Aguinick et al. | 345/156 |
| 5,355,414 | 10/1994 | Hale et al. | 380/25 |
| 5,355,503 | 10/1994 | Soffel et al. | 395/750 |
| 5,371,738 | 12/1994 | Moelard et al. | 370/85.1 |
| 5,372,161 | 12/1994 | Logan et al. | 345/157 |
| 5,375,230 | 12/1994 | Fujimori | 395/575 |
| 5,396,443 | 3/1995 | Mese et al. | 364/707 |
| 5,404,458 | 4/1995 | Zetts | 395/275 |
| 5,421,009 | 5/1995 | Platt | 395/200.1 |
| 5,423,045 | 6/1995 | Kannan et al. | 395/750 |
| 5,430,877 | 7/1995 | Naylor | 395/712 |
| 5,434,972 | 7/1995 | Hamlin | 395/200 |
| 5,440,502 | 8/1995 | Register | 364/708.1 |
| 5,440,632 | 8/1995 | Bacon et al. | 3995/200.51 |
| 5,455,822 | 10/1995 | Dixon et al. | 370/18 |

(List continued on next page.)

FOREIGN PATENT DOCUMENTS 0 279 558 8/1988 European Pat. Off. .

OTHER PUBLICATIONS

"Real–Time Extension to X–Windows Provide Deterministic Graphics," by Computer Technology Review, May, 1993, vol. 13, No. 6, pp. 27–31.

"Flash Memory BIOS for PC and Notebook Computers," Jerry Jex, IEEE, pp. 692–695, (1991).

"Embedded Processor Applications for SONET Telecommunication Systems," Doug Bush, WESCON/95 Conference, IEEE, pp. 377–381, (1995).

"A Wireless Network in MosquitoNet", IEEE/Micro, Stuart Cheshire pp. 44–52, (1996).

"Mobile IP, Ad–Hoc Networking and Nomadicity," COMP–SAC, 1996, IEEE, pp. 472–476.

*Primary Examiner*—Mark H. Rinehart

*Attorney, Agent, or Firm*—Fitch, Even, Tabin & Flannery

[57] ABSTRACT

A wireless interface device is adapted to be interfaced with a host computer by way of a radio link. A wireless interface device includes one or more flash memory devices that are adapted to be updated by the host computer over the radio link.

18 Claims, 75 Drawing Sheets

U.S. PATENT DOCUMENTS

| | | | |
|---|---|---|---|
| 5,457,478 | 10/1995 | Frank | 345/158 |
| 5,461,667 | 10/1995 | Remillard | 379/96 |
| 5,467,102 | 11/1995 | Kuno et al. | 345/1 |
| 5,485,171 | 1/1996 | Copper et al. | 345/160 |
| 5,491,495 | 2/1996 | Ward et al. | 345/173 |
| 5,495,593 | 2/1996 | Elmer et al. | 395/712 |
| 5,504,746 | 4/1996 | Meier | 370/85.13 |
| 5,508,713 | 4/1996 | Okouchi | 345/1 |
| 5,515,509 | 5/1996 | Rom | 395/200.1 |
| 5,519,843 | 5/1996 | Moran et al. | 395/430 |
| 5,519,878 | 5/1996 | Dolin, Jr. | 395/800 |
| 5,526,023 | 6/1996 | Sugimoto et al. | 345/173 |
| 5,526,287 | 6/1996 | French | 364/550 |
| 5,528,231 | 6/1996 | Patarin | 340/825.34 |
| 5,528,660 | 6/1996 | Heins et al. | 379/21 |
| 5,528,743 | 6/1996 | Tou et al. | 395/148 |
| 5,533,147 | 7/1996 | Ari et al. | 382/179 |
| 5,534,893 | 7/1996 | Hansen, Jr. et al. | 345/179 |
| 5,535,357 | 7/1996 | Moran et al. | 395/430 |
| 5,543,588 | 8/1996 | Bisset et al. | 178/18 |
| 5,553,296 | 9/1996 | Forrest et al. | 395/750 |
| 5,555,157 | 9/1996 | Moller et al. | 361/683 |
| 5,561,446 | 10/1996 | Montlick | 345/173 |
| 5,564,020 | 10/1996 | Rossi | 395/200.15 |
| 5,568,645 | 10/1996 | Morris et al. | 395/800 |
| 5,583,542 | 12/1996 | Capps et al. | 345/173 |
| 5,590,373 | 12/1996 | Whitley et al. | 395/830 |
| 5,594,462 | 1/1997 | Fishman et al. | 345/2 |
| 5,594,731 | 1/1997 | Reissner | 370/338 |
| 5,597,307 | 1/1997 | Redford et al. | 434/118 |
| 5,600,801 | 2/1997 | Parks et al. | 395/282 |
| 5,602,854 | 2/1997 | Luse et al. | 370/313 |
| 5,623,677 | 4/1997 | Townsley et al. | 395/750 |
| 5,628,055 | 5/1997 | Stein | 455/89 |
| 5,636,371 | 6/1997 | Yu | 395/500 |
| 5,642,185 | 6/1997 | Altreith, III et al. | 399/81 |
| 5,699,275 | 12/1997 | Beasley et al. | 395/200.51 |

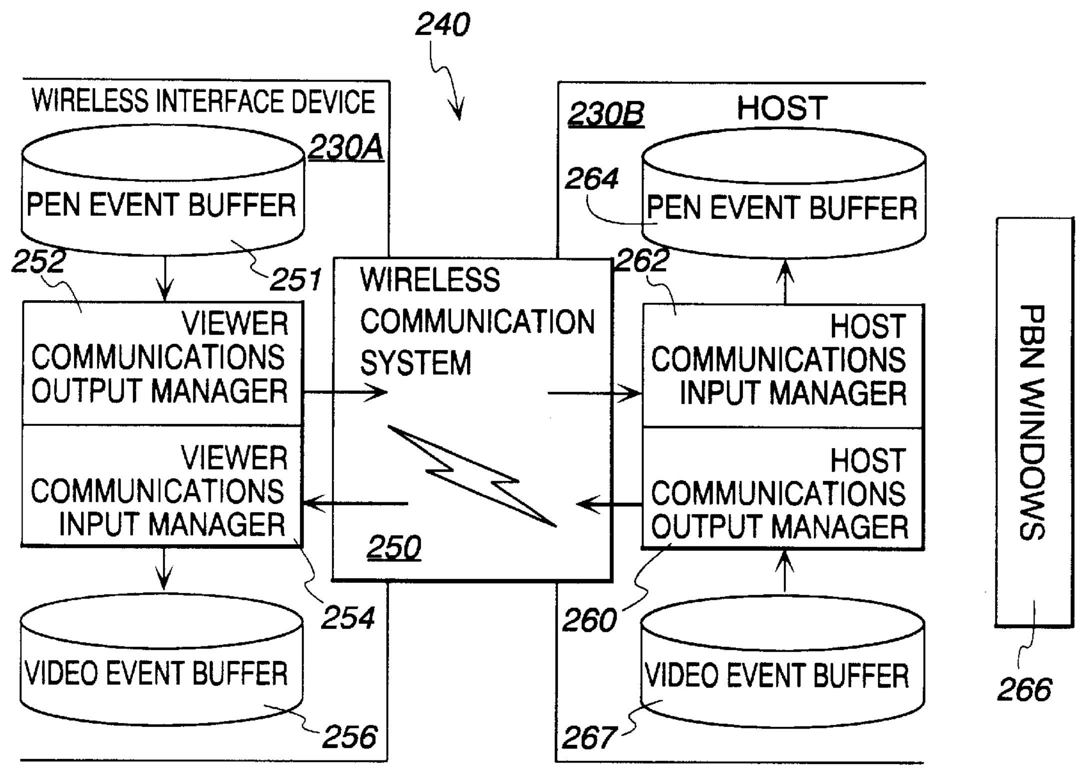
Fig. 7
Fig. 8
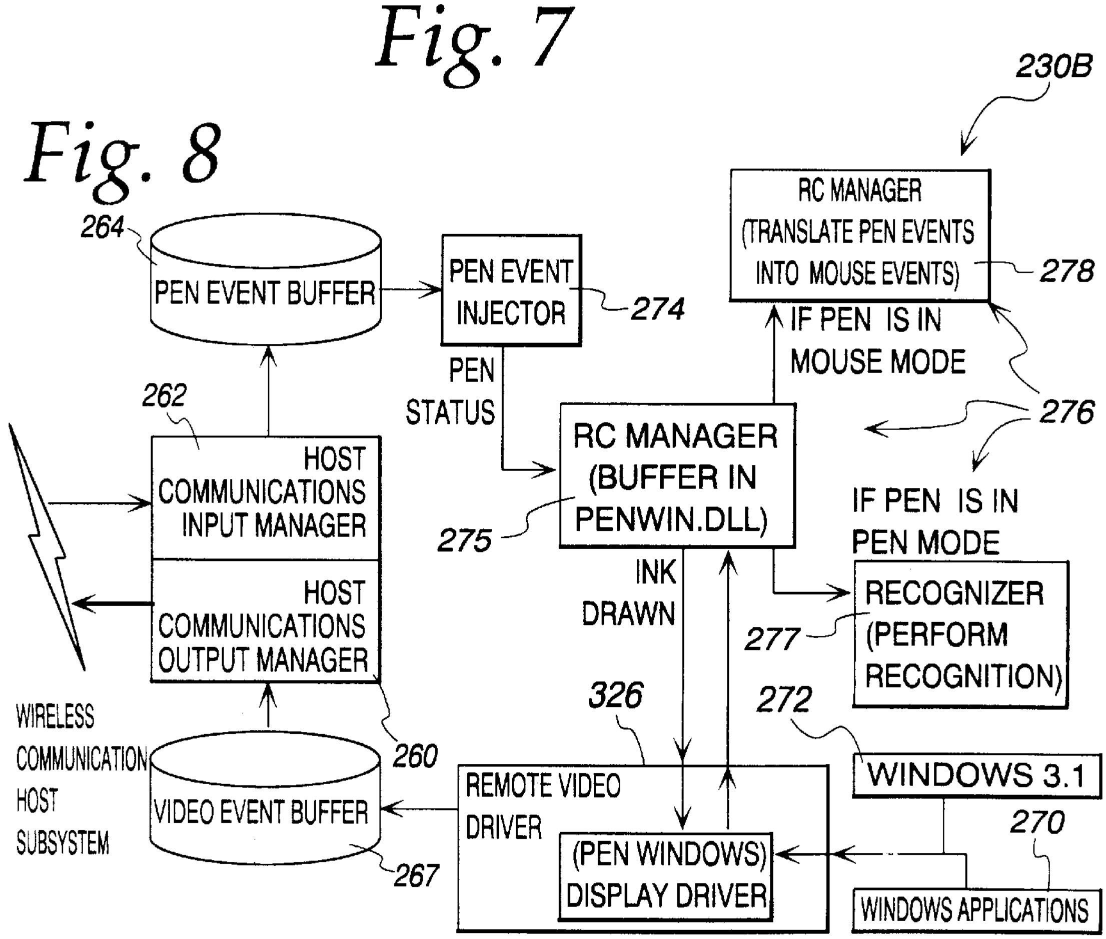

CLOCK CONFIGURATION:

| R48 | R47 | R46 | CLKB | CLKC (IN MHZ) |
|---|---|---|---|---|
| OUT | OUT | OUT | 5 | 24 |
| OUT | OUT | IN | 6 | 24 |
| OUT | IN | OUT | 15 | 24 |
| OUT | IN | IN | 10 | 24 |
| IN | OUT | OUT | 12.5 | 24 |
| IN | OUT | IN | 16.6 | 24 |
| IN | IN | OUT | 20 | 24 |
| IN | IN | IN | 25 | 24 |

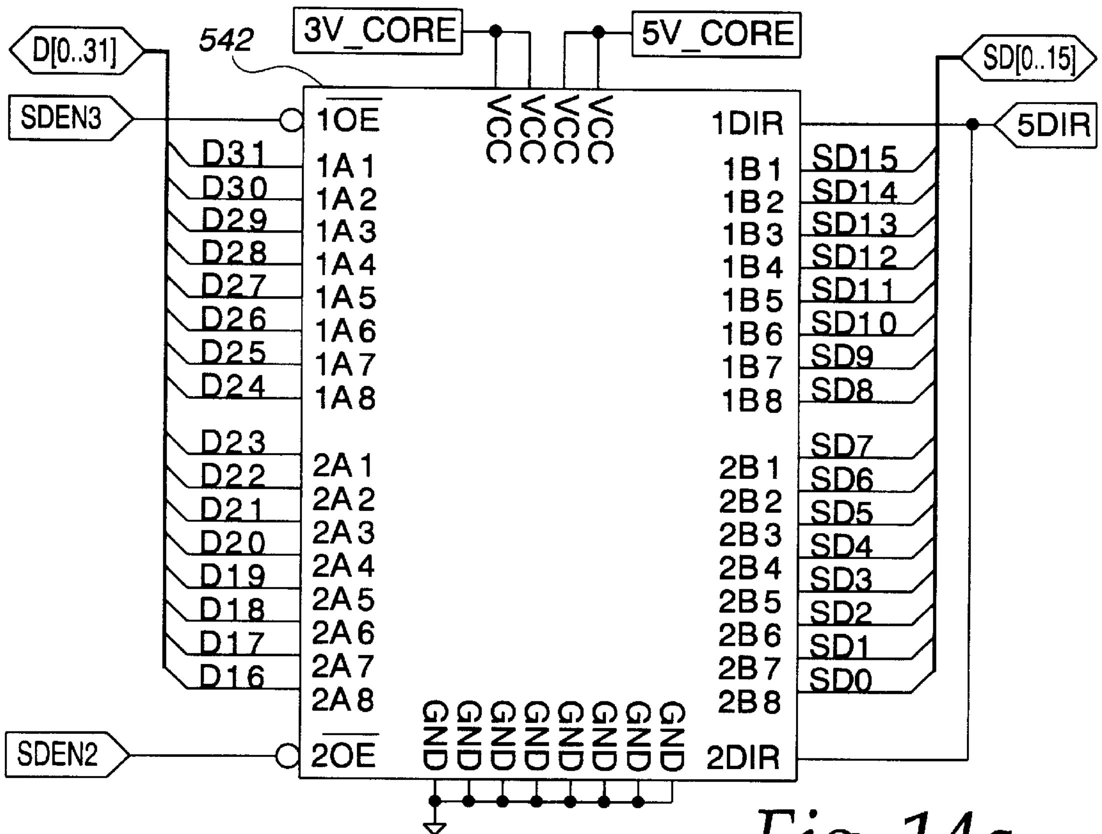
Fig. 14a
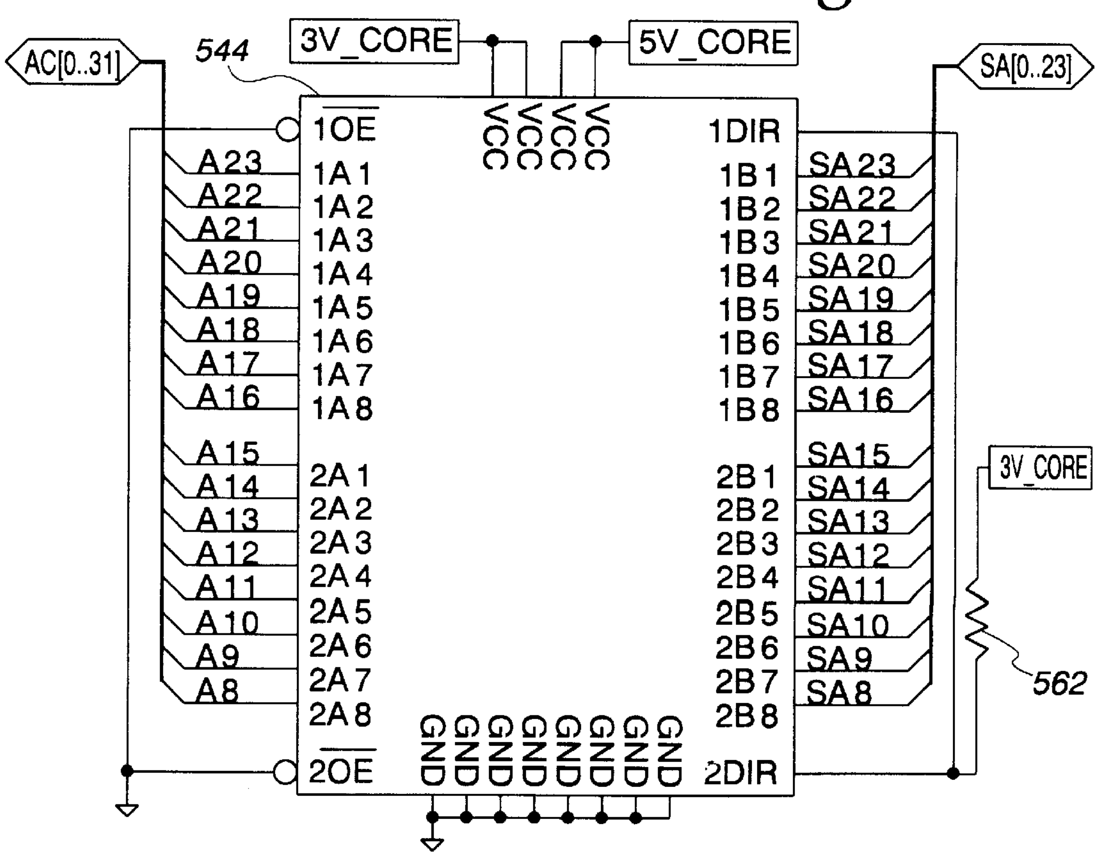

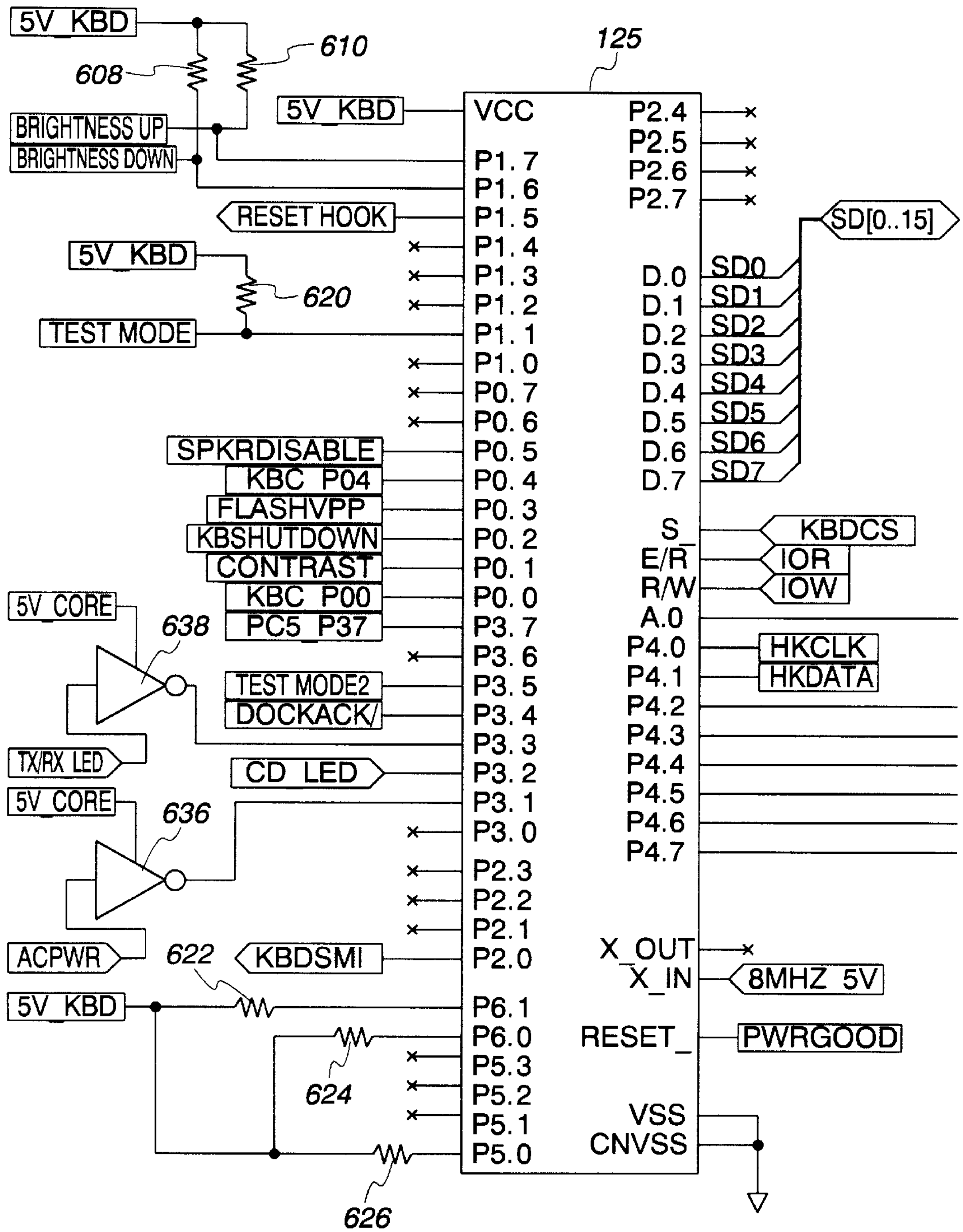
Fig. 15a
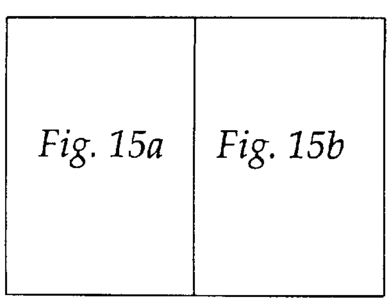

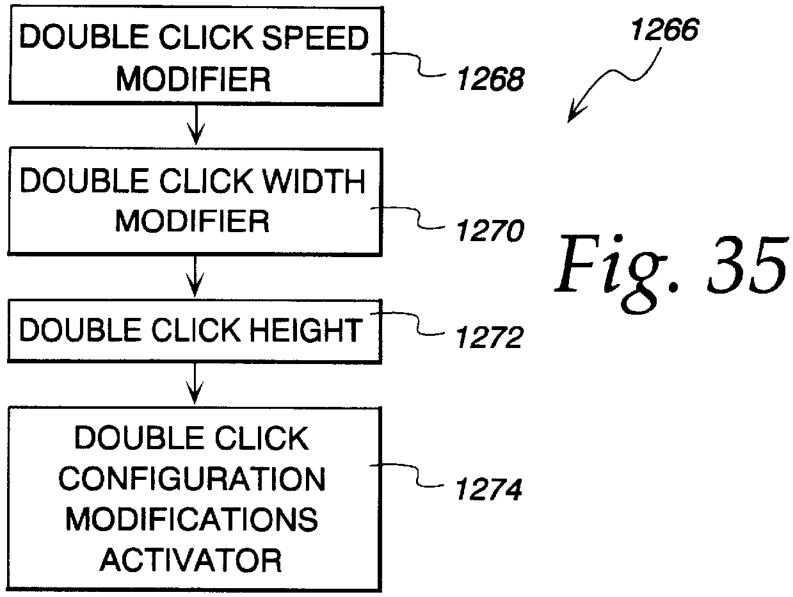
Fig. 35
Fig. 36
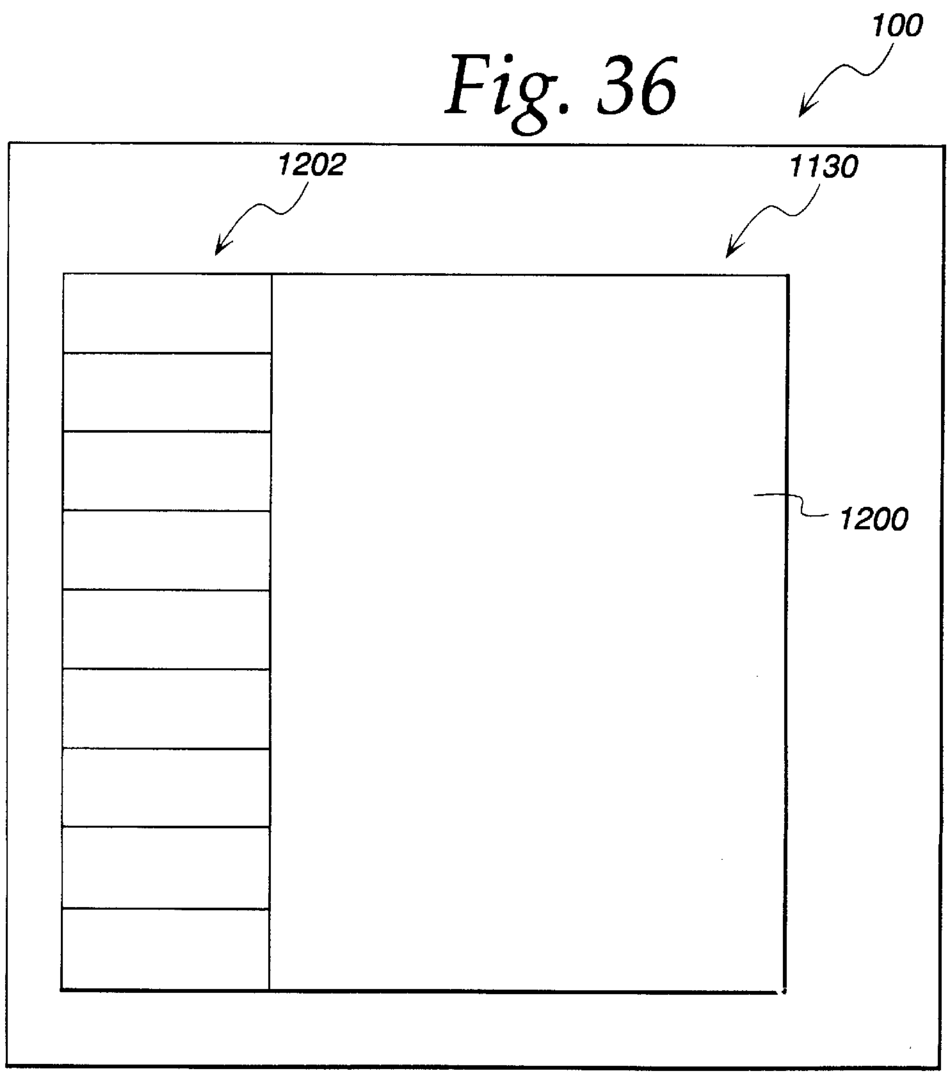

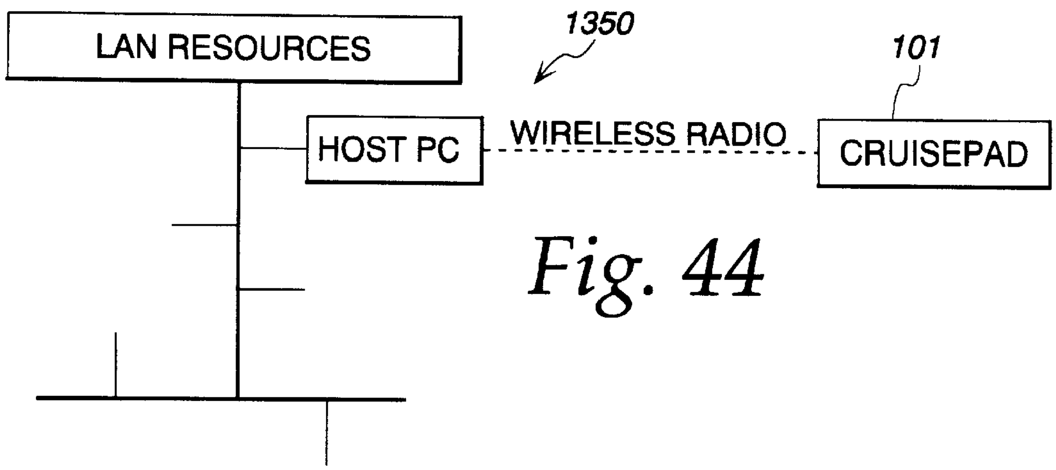
Fig. 44
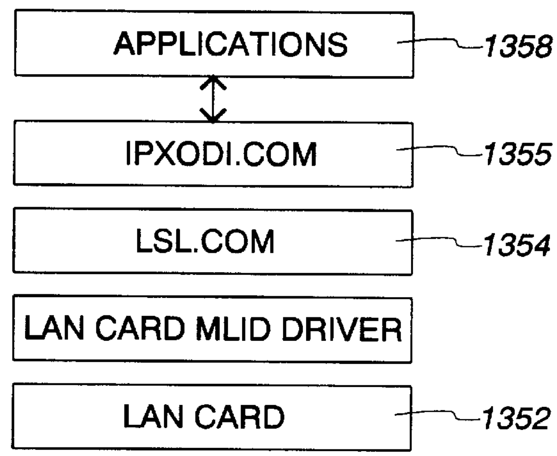
Fig. 45
PRIOR ART
Fig. 46
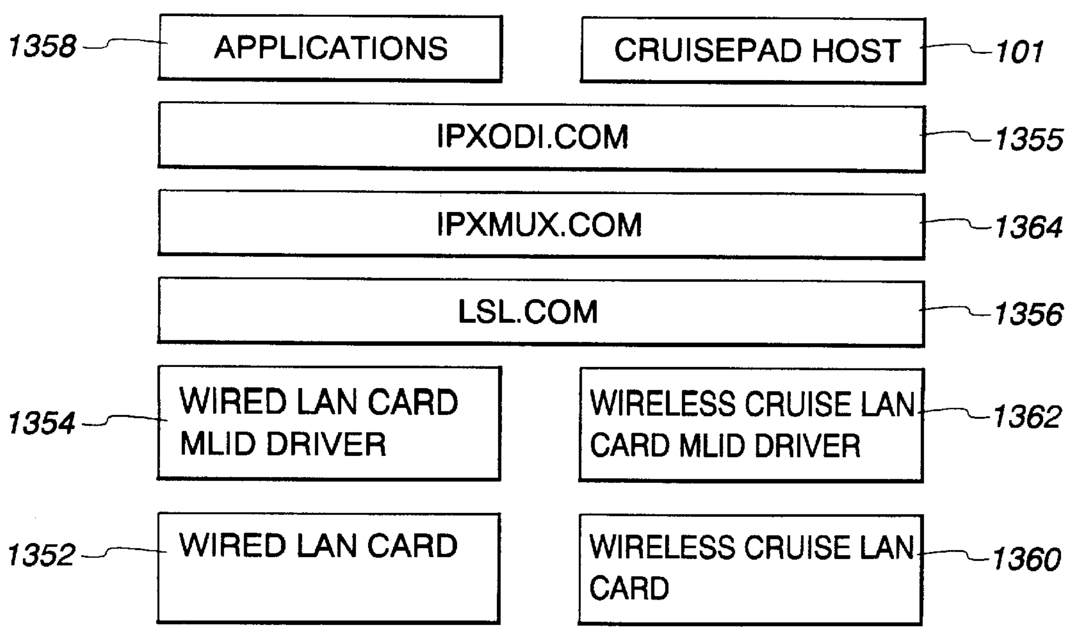

RADIO FLASH UPDATE

CROSS-REFERENCE TO RELATED CASES

This case is related to the following copending application: STRUCTURE AND METHOD FOR CONTROLLING A HOST COMPUTER USING A REMOTE HAND-HELD INTERFACE DEVICE, by B. R. Banerjee, S. C. Gladwin, A. Maskatia and A. Soucy, filed Sep. 2, 1994, Ser. No. 08/300,500. This case is also related to the following copending applications, all filed on even date: REMOTE CONTROL INTERFACE, by B. R. Banerjee, S. C. Gladwin, A. Maskatia and A. Soucy Ser. No. 08/543,700; MOUSE EMULATION WITH PASSIVE PEN, by D. Bi, G. Cohen, M. Cortopassi, J. George, S. C. Gladwin, H. Hsiung, P. Lim, J. Parham, A. Soucy, D. Voegeli and J. Wilson, Ser. No. 08/543,786; RESUME ON PEN CONTACT, by M. Cortopassi, S. C. Gladwin and D. Voegeli, Ser. No. 08/543,510; SCREEN SAVER DISABLER, by D. Bi, S. C. Gladwin and J. Wilson, Ser. No. 08/543,698; IPX DRIVER FOR MULTIPLE LAN ADAPTERS, by D. Bi, Ser. No. 08/553,808; DISASTER RECOVERY JUMPER, by M. Cortopassi, J. George, J. Parham and D. Voegeli, Ser. No. 08/543,423; RC TIME CONSTANT, by M. Cortopassi, Ser. No. 08/543,697; DOUBLE PEN UP EVENT, by D. Bi and J. George, Ser. No. 08/543,787; REMOTE OCCLUSION REGION, by J. Wilson, Ser. No. 08/543,701; BROADCAST SEARCH FOR AVAILABLE HOST, by D. Bi, S. C. Gladwin and J. Wilson, Ser. No. 08/543,599; REMOTE KEYBOARD MACROS ACTIVATED BY HOT ICONS, by S. C. Gladwin and J. Wilson, Ser. No. 08/543,788; HOST/REMOTE CONTROL MODE, by M. Cortopassi, J. George, S. C. Gladwin, H. Hsiung, P. Lim, J. Parham, D. Voegeli and J. Wilson, Ser. No. 08/551,936; PASSWORD SWITCH TO OVERRIDE REMOTE CONTROL, by D. Bi, S. C. Gladwin and J. Wilson, Ser. No 08/543,785; AUTOMATIC RECONNECT ON REQUIRED SIGNALS by S. C. Gladwin and J. Wilson, Ser. No. 08/543,425; and PORTABLE TABLET, by G. Cohen, S. C. Gladwin, P. Lim, S. Smith, A. Soucy, K. Swen, G, Wong, Wood and G. Wu, Ser. No. 29/045,319.

BACKGROUND OF THE INVENTION

1. Field of the Invention

The present invention relates to a computer system which includes one or more flash memory devices which can be programmed by way of a radio link.

2. Description of the Prior Art

Flash memory devices are known in the art and are typically used in computer systems for storing certain program instructions, such as the basic input/output system (BIOS). The flash memory devices normally include a protected area which includes sufficient software to enable the system to be rebooted in the event that the data in the flash memory device becomes corrupt. U.S. patent application Ser. No. 07/885,805, filed on May 15, 1992 and assigned to the same assignee as the assignee of the present invention, discloses a computer system which includes a flash memory device for storing the BIOS. In order to enable the system to be rebooted in the event of a flash disaster, a special-purpose parallel port is provided. The special-purpose parallel port switches from a standard peripheral interface mode to a special-purpose interface when the flash memory device becomes corrupt. In the special-purpose interface mode, the parallel port enables the BIOS to be executed from an external ROM or another personal computer. U.S. patent application Ser. No. 08/469,206, filed on Jun. 6, 1995, also assigned to the same assignee as the assignee for the present invention, also relates to a computer system which utilizes flash ROM for BIOS. In this system the BIOS initialization functions are stored in the boot lock or protected area of the flash memory device in order to enable the flash memory device to be reprogrammed when the data becomes corrupt.

Such flash memory devices may be updated by various means, for example by way of a serial port, a parallel port or even a floppy disk. The '206 patent application discloses a flash programming utility to enable multiple types of flash memory devices to be programmed with a single utility. As such, updating of the flash memory devices with such a utility is relatively quicker than other flash memory device programming utilities which are generally hardware-specific and thus only allow for programming of a single specific type of a flash memory device.

As mentioned above, the flash memory devices are heretofore known to be programmed by way of a parallel port, serial port or by way of a floppy disk. In all such cases, the programming of the flash memory device must be done at the computer system in which the flash memory device is used.

SUMMARY OF THE INVENTION

It is an object of the present invention to solve various problems of the prior art.

It is yet another object of the present invention to enable programming of a flash memory device by way of a radio link.

Briefly, the present invention relates to a wireless interface device that is adapted to be interfaced with a host computer by way of a radio link. A wireless interface device includes one or more flash memory devices that are adapted to be updated by the host computer over the radio link.

BRIEF DESCRIPTION OF THE DRAWING

These and other objects of the present invention will be readily understood upon consideration of the following detailed description and attached drawing, wherein:

FIG. 7 is a block diagram of the software environment under which the wireless interface device and the host computer operate to provide remote control of the host computer;

FIG. 8 is a block diagram which shows in further detail the software environment in the host computer, running an application program under a Windows environment;

FIGS. 31–35 are flow charts relating to mouse emulation with a passive pen;

FIG. 36 is a plan view of the wireless interface device illustrating the hot icon area and viewing area of the display;

FIG. 44 is a configuration diagram illustrating the wireless interface device interfacing with a wired LAN system;

FIG. 45 is a diagram of the software structure of a known network system;

FIG. 46 is a diagram of the software structure of network system which enables the wireless interface device to interface with the wired LAN system, illustrated in FIG. 44;

DETAILED DESCRIPTION OF THE INVENTION

1. General

The present invention relates to a system which allows wireless access and control of a remote host computer, which may be either a desktop, tower or portable computer to enable remote access of the various files and programs on the host computer. The system not only allows access to remote host computers that are configured as stand-alone units but also provides access to both wired and wireless local area networks (LAN).

The system includes a wireless interface device which includes a graphical user interface (GUI) which allows various types of input. In particular, input to the wireless interface device is primarily by way of a passive stylus, which can be used in a pen mode or a mouse mode. In a pen mode, a trail of ink tracking the path of the stylus (pen paradigm) provides visual feedback to the user by way of a pen digitizer. In a mouse mode, however, a cursor may be generated which follows the "tip" of the pen, but the path of cursor motion is not inked.

A virtual keyboard is also provided as part of the GUI. Activation of the keys on the virtual keyboard is by way of the stylus or by finger input. In addition, the system also supports a full-size external keyboard.

Figure 1:
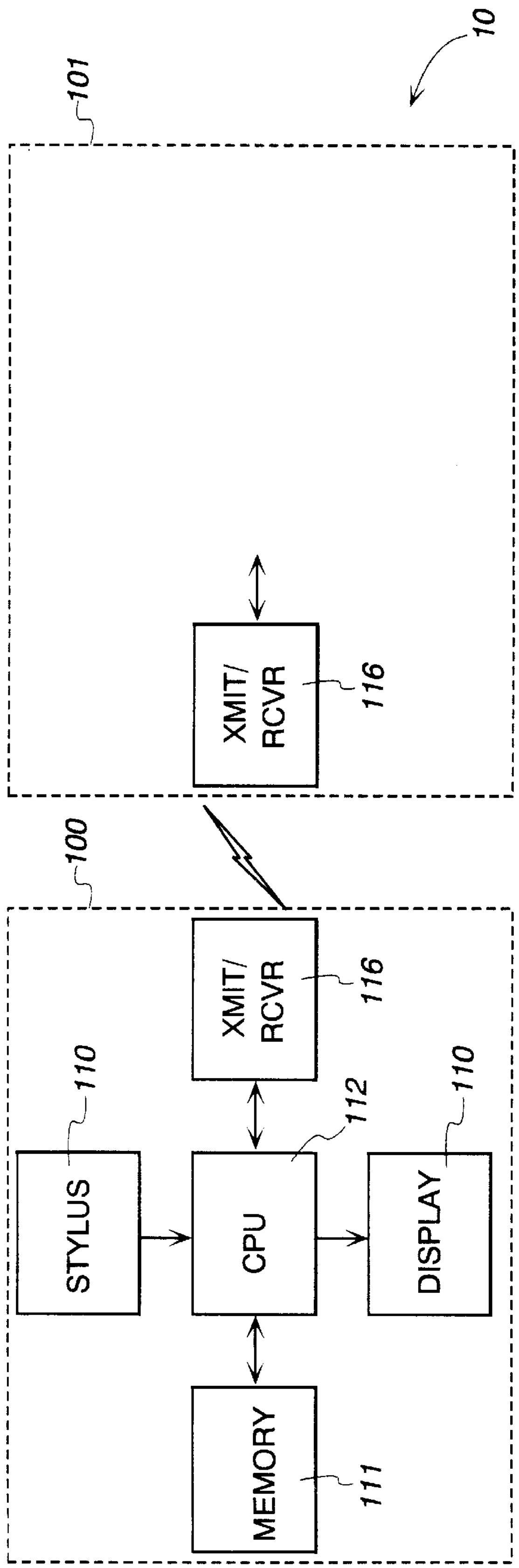
FIG. 1 is a block diagram of the hardware configuration of a wireless interface device in accordance with the present invention and a host computer.

FIG. 1 illustrates a block diagram of the system in accordance with the present invention. In particular, a wireless interface device 100, in accordance with the present invention, enables wireless access of a remote host computer 101, configured as either a stand-alone unit or as a part of a wired or wireless local area network (LAN). When the remote host computer 101 is in a stand-alone configuration, as illustrated in FIG. 1, communication between the remote host computer 101 and the wireless interface device 100 is by way of a wireless communication link, provided by a communication subsystem 118 in which the remote host computer 101 is provided with a transceiver 115 for radio communication with a transceiver 116 in the wireless interface device 100. For example, the desktop or remote host computer 101 can be provided with a PCMCIA interface which can be used with a wireless transceiver card to communicate with the transceiver 116 in the wireless interface device 100. Alternatively, an Industry Standard Architecture (ISA) card transceiver can be installed in the host computer 101 in a spare ISA expansion slot. In particular, the transceivers 115 and 116 may be implemented as 2.4 GHz radio frequency (RF) transceiver modules with a Wireless Media Access Control function, available from Proxim Inc., Mountain View, Calif., configured with either an ISA or PCMCIA interface.

Figure 2:
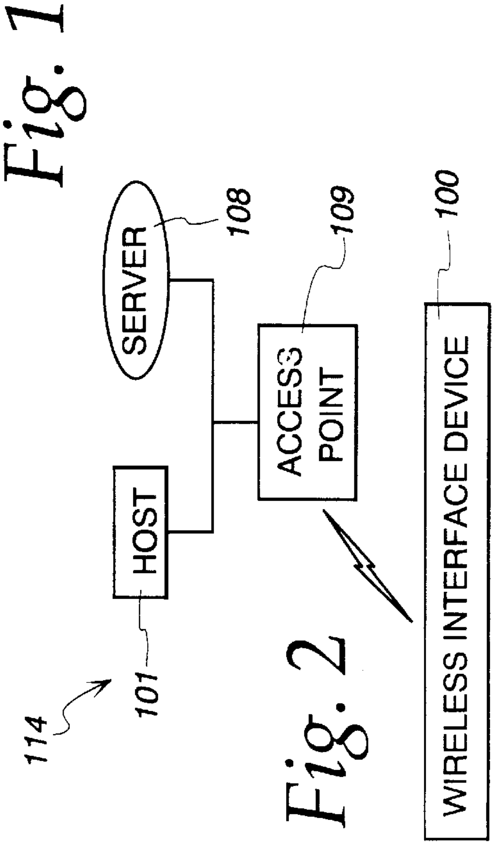
FIG. 2 is a block diagram illustrating the access of the wireless interface device in accordance with the present invention and a wired local area network.

As mentioned above, the wireless interface device 100 can also be used with a wireless LAN in a peer-to-peer network or a wired LAN. FIG. 2 illustrates the communication between the wireless interface device 100 and a wired LAN 114, which includes a server 108 in a, for example, Novell Netware or Microsoft LAN Manager environment. In this mode, the transceiver 116 in the wireless interface device 100 communicates with an access point 109 by way of a transceiver (not shown), which interfaces the wireless interface device 100 with a wired LAN 114 which includes a server 108. Alternatively, the wireless interface device 100 can be used in a wireless network in a Windows for Workgroups or Personal Netware environment, for example.

Figure 3:
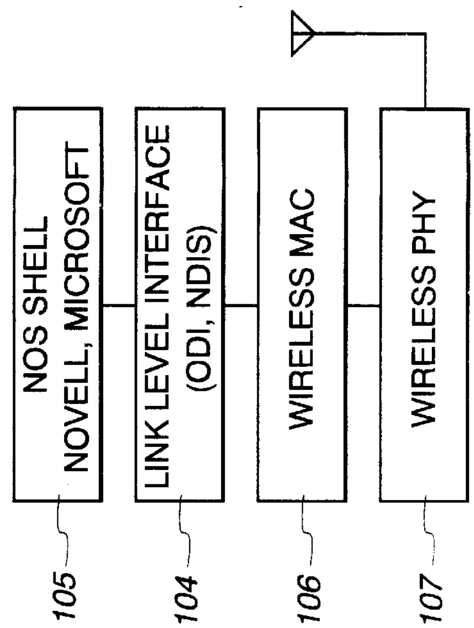
FIG. 3 is a diagram illustrating the software structure for the wireless interface device in accordance with the present invention.

The configuration of the radio communication subsystem between the wireless interface device 100 and the remote host computer 101 or access point 109 conforms to the Open System Interconnection (OSI) reference model for data communications and implements the lower two layers of the seven-layer OSI model. In particular, with reference to FIG. 3, the physical layer 107 (WIRELESS PHY) may be a 2.4 GHz spread spectrum frequency hopping radio which replaces the LAN cable normally connected between workstations. The radio operates within the 2.4000–2.4835 GHz band, the unlicensed Industrial Scientific and Medial (ISM) band, and is divided into eighty-two 1 MHz channels. In a spread-spectrum, frequency-hopping radio, data is broadcast on one particular channel for a predetermined time (i.e. 400 msec); and then the system hops to another channel in a predetermined pattern to avoid interference.

The wireless media access control (WIRELESS MAC) 106 is used to interface to higher level software 105 (i.e. NOS SHELL, NOVELL, MICROSOFT) through network drivers 104 (i.e. LINK LEVEL INTERFACE (ODI, NDIS)).

The MAC conforms to the industry standard protocol is in accordance with IEEE 802.11.

As shown in FIG. 1, the wireless interface device 100 includes a central processing unit (CPU) 112, a local memory system 111, a pen-based input subsystem (STYLUS) 110, a display subsystem 113 and a transceiver 116. As will be discussed in more detail below, the wireless interface device 100 includes a Viewer Manager software 200 (FIG. 6) which performs three (3) basic functions: (i) collecting and transmitting input positional information from a stylus input subsystem 110 to the host computer 101, (ii) receiving from the host computer 101 a video image to be displayed on the display subsystem 113, and (iii) managing the communications link between the wireless interface device 100 and the host computer 101.

The wireless interface device 100 is thus able to control and access various programs such as Windows and Windows application programs and files residing at the host computer 101 and display the results in its display 113.

2. Description of the Block Diagram

Figure 4:
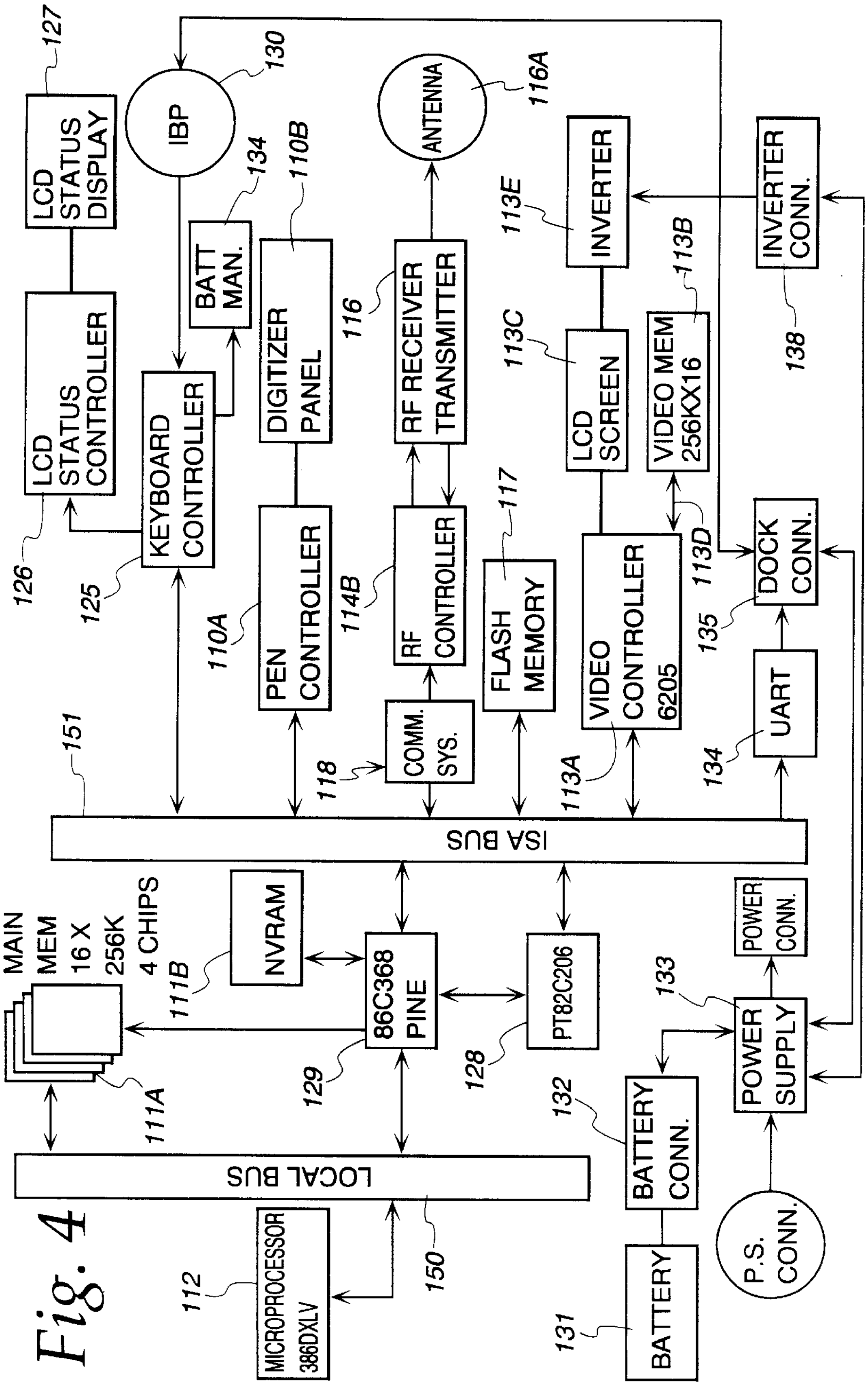
FIG. 4 is a block diagram showing one implementation of the wireless interface device of FIG. 1.

FIG. 4 is a block diagram of the wireless interface device 100. As shown in FIG. 4, the wireless interface device 100 has both a processor or "local bus" 150 and an ISA bus 151. The local bus 150 operates at the clock rate of the CPU 112, while the ISA bus 151 operates at the industry standard 8 MHz clock rate. The CPU 112 may be implemented by a microprocessor, which allows suspension and resumption of operation by halting and restarting the system clock to reduce battery consumption. Because power management in a portable device is important, the CPU 112 should preferably support power management functions, such as System Management Mode (SMM) and System Management interrupt (SMI) techniques known in the industry. One example of a suitable microprocessor is the AMD386DXLV, available from Advanced Micro Devices, Inc., Sunnyvale, Calif., which operates at up to 25 MHz at a 3.0 V supply voltage.

The CPU 112 interfaces over local bus 150 with a system controller 129. The system controller 129 manages (i) system operation, including the local and ISA buses 150 and 151, (ii) memory, and (iii) power to the system. The system controller 129 may be, for example, a Model No. 86C368 integrated circuit, available from PicoPower Technology, Inc., San Jose, Calif.

The present implementation takes advantage of the several levels of power management supported by the system controller 129. Power management in the present implementation is described in further detail below.

The system controller 129 provides a dynamic random access memory (DRAM) controller and a non-volatile random access memory (NVRAM) controller to control the DRAM 111A and a non-volatile RAM, NVRAM 111B, which form a portion of the memory subsystem 111 (FIG. 1) in the wireless interface device 100. As shown in FIG. 4, the DRAM 111A in the wireless interface device 100 may be provided by four 16-bit by 256K DRAM memory chips, to provide a total of 2 megabytes of memory, while the NVRAM 111B, used to store configuration data and passwords, for example, may be implemented using $E^2$PROM technology to provide permanent storage All devices on the ISA bus 151 are managed by an integrated peripheral controller (IPC) 128. The IPC 128 provides various functions including direct memory access (DMA) control, interrupt control, a timer, a real time clock (RTC) controller, and a memory mapper for mapping peripheral devices to the system memory space as illustrated in Table 4 below. The IPC 128 may be implemented by a Model No. PT82C206 integrated circuit, also available from the aforementioned PicoPower Technology, Inc.

The stylus input subsystem 110 is implemented by a stylus, a pen controller 110A and a digitizer panel 110B. The pen controller 110A controls the digitizer panel 110B and provides positional information of pen or stylus contact. The pen controller 110A can be implemented, for example by a Model No. MC68HC705J2 microcontroller, available from Motorola, Inc. In this implementation, the digitizer panel 110B can be, for example, an analog-resistive touch screen, so that the stylus is sensed by mechanical pressure. Using a digitizer panel which senses mechanical pressure allows a "dumb" stylus, or even the human finger, to be used as an input device. When using a dumb stylus, switching between mouse and pen modes is accomplished by selecting an icon as discussed below. Alternately, other styli, such as a "light pen" or an electronic stylus with various operating modes, can also be used. In some electronic stylus', switching between pen and mouse modes can be achieved by pushing a "barrel button" (i.e. a switch located on the barrel of the stylus).

As mentioned above, the wireless interface device 100 includes a display subsystem 113 which, in turn, includes a liquid crystal display (LCD) 113C. The LCD 113C is controlled by a video controller 113A, and supported by video memory 113B. The video controller 113A can be implemented by a Model No. CL-GD6205 video controller, available from Cirrus Logic Corporation, Milpitas, Calif. The LCD 113C can be, for example, a monochrome display, such as the Epson EG9015D-NZ (from Epson Corporation) or an active matrix color display. The video memory 113B may be implemented as DRAMs, organized as 256K by 16 bits.

The video controller 113A communicates with video memory 113B over a separate 16-bit video bus 113D. In this implementation, the video controller 113A provides "backlighting" support through a backlight control pin BACKLITEON that is de-asserted to conserve power under certain power management conditions as discussed below.

As discussed above, the communication subsystem 118 allows Communication with a remote host computer 101 in either a stand-alone configuration or connected to either a wired or wireless LAN. The communication system 118 includes the transceiver 116, an antenna 116A, and an RF controller 114A for interfacing with the local ISA bus 151.

The wireless interface device 100 also includes a keyboard controller 125 which performs, in addition to controlling an optional keyboard by way of a connector, various other functions including battery monitoring and LCD status control. The keyboard controller 125 can be implemented by a Model No. M38802M2 integrated circuit from Mitsubishi Corporation, Tokyo, Japan. Battery power to the wireless interface device 100 may be provided by an intelligent battery pack (IBP) 131, for example, as described in U.S. patent application Ser. No. 07/975,879, filed on Nov. 13, 1992, hereby incorporated by reference, connected to a system power supply module 133 by way of a battery connector 132. The IBP 131 maintains and provides information about the remaining useful battery life of IBP 131, monitored by keyboard controller 125. Upon the occurrence of a significant event relative to the IBP 130, e.g. battery remaining life falling below a preset value, the keyboard controller 125 generates an interrupt signal.

A serial port is provided and implemented by way of a universal asynchronous receiver transmitter (UART) 134, which can be accessed externally via a serial port connector 135. As will be discussed in more detail below, the serial port connector 135 allows for disaster recovery for the flash memory 117, which may be used to store the basic input/output (BIOS) for the CPU 112.

3. Power Management

Figure 5:
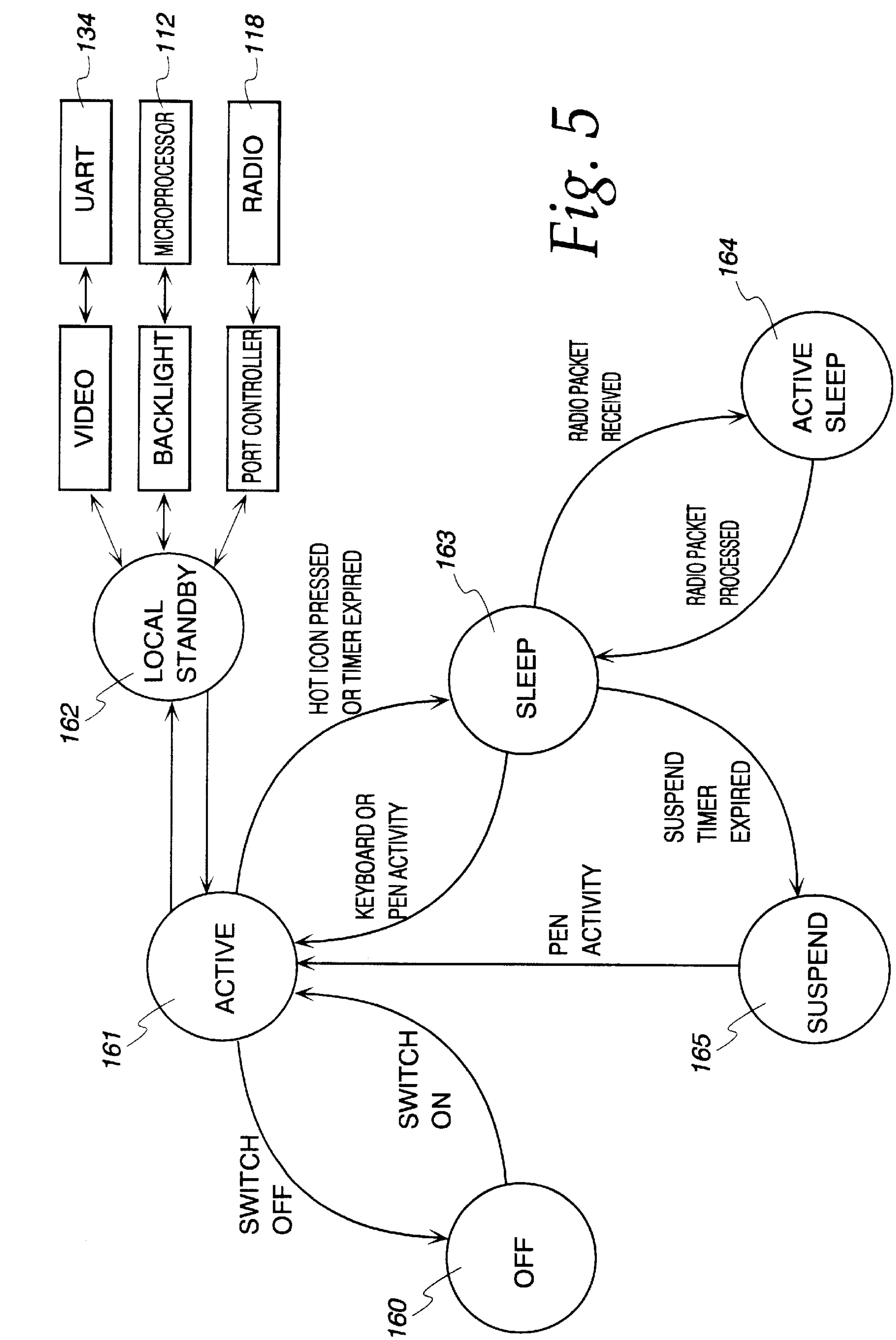
FIG. 5 is a state diagram illustrating the six internal power management states of the wireless interface device.

In order to conserve battery power, the wireless interface device 100 incorporates power management. While a user of the wireless interface device 100 would normally only be aware of four power management states: "off" ; "active"; "suspend"; and "sleep" modes, internally six power management states are implemented as shown in FIG. 5. More particularly, with reference to FIG. 5, before the wireless interface device 100 is powered up, the wireless interface device 100 is in an "off" state, indicated by the reference numeral 160. In an "off" state 160, no power is supplied to the system. A state 161 (the "active" state) is entered when the power switch (FIG. 28) to the wireless interface device 100 is turned to the "on" position. In the active state 161, all components of wireless interface device 100 are active From active state 161, the wireless interface device 100 enters a "local standby" state 162. The local standby state 162 is transparent to the user of the wireless interface device 100. From the user's point of view, in the local standby state 162, the wireless interface device 100 is in active mode. In this state 162, specific inactive devices are each put into a static state after a predetermined time-out period of inactivity for that device. In a static state, each device consumes minimal power. in the local standby state 162, devices that can be put into static states include the CPU 112, the video controller 113A, the pen controller 110A, the UART 134, and the transceiver 116. Backlighting of the LCD video display is also disabled in local standby state 162. If not, input activities are detected by the keyboard controller 125 or pen controller 110A. After the later of their respective present time-out periods, these devices are placed in a static state. These devices emerge from the static state once an activity relevant to its operation is detected, e.g. a pen event is detected.

The user of the wireless interface device 100 can place the wireless interface device 100 in a "sleep" mode 163 by selecting an icon (FIG. 37) labelled "sleep" from the GUI as will be discussed below. Alternatively, the "sleep" mode may be entered from the active state 161 after a preset period of inactivity. In a "sleep" mode, corresponding to either "sleep" state 163 or "active sleep" state 164, the display subsystem 113 is switched off; and most devices are placed in static states. When a keyboard or pen event is detected, the sleep state 163 and active sleep state 164 are exited, and the wireless interface device 100 enters the active state 161. From the sleep state 163, an active sleep state 164 is entered when a communication packet is received from the host computer 101. Although the display subsystem 113 is turned off, the received communication packet can result in an update to an image stored in the video memory 113B. The CPU 112 handles the communication packet from the host computer 101 and activates the video controller 113A to update such an image. The active sleep state 164 is transparent to the user of the wireless interface device 100, since the updated image is not displayed on the LCD screen 113C. When the communication packet is handled, the wireless interface 100 returns to a sleep state 163. The device activities in wireless interface device 100 in "sleep" mode 163 are illustrated in Table 1 below.

TABLE 1

| DEVICE | STATE | CLOCKS DISABLED | COMMENTS | WAKEUP SOURCE |
|---|---|---|---|---|
| Micro-processor | Static Suspend | Clock Stop Control by the system controller | Static Mode entered when clock stopped | Clock Restarted and Controlled by the system controller |
| System Controller | Static Suspend | Clock Stopped/32 KHz Left on | | Activity on EXACT, SWITCH, or RING pins |
| Peripheral Controller | Static | 32 KHz Source | | Any Interrupts |
| Main Memory | Slow Refresh | System controller 38KHz | Memory Refreshed at 128 mS | |
| Video | Static | 14 MHz disconnected | Controlled through use of system controller power management pins | When system is resumed |
| Video Memory | Slow Refresh | 32 KHz | Memory Refreshed at 128 mS | Video Controller automatically adjusts refresh rate depending on mode |
| LCD Module | OFF | NA | Power to Module will never be applied in Sleep | Controlled by Video controller power up sequencing |
| LCD Backlight | OFF | NA | Backlight will never be on in Sleep | Controlled by Video controller power up sequencing |
| UART | Static | 1.84 MHz | Part has no direct power management | |
| UART Trans. | Off | NA | Part turned off, until access to UART. Inactivity timer will start, and look for a time-out of two minutes before turning off transceiver | Access to serial port |
| ROM | Static | NA | After ROM is shadowed, the CS and OE line will be driven high to keep these parts in a static mode | |
| NVRAM | Static | NA | After NVRAM is read, the CS line will be high which forces part into a static mode | |
| Pen Controller | Sleep | Own 4.0 MHz | Sleeps after each point is processed as long as the pen is not pressing the screen | Pen Down wakes up Pen controller. Pen controller asserts the PEN_ACTIVITY signal which will wake up the entire system. |

TABLE 1-continued

| DEVICE | STATE | CLOCKS DISABLED | COMMENTS | WAKEUP SOURCE |
|---|---|---|---|---|
| Hook | Active | Own 32 KHz | Keeps the last display as told by the keyboard controller | NA |
| Clock Generator | Active | All Clocks Running | Clocks needed in order to wake system back up | |
| Radio | Sleep | Internal | Radio Handles its own power management | Wakes up on periodic basis in order to keep SYNC. When a packet is ready, the Radio will assert the activity pin to the EXPACT input of the system controller which will wake up the system |

Upon expiration of a timer, the wireless interface device 100 enters into an internal state "suspend" mode 165. In a suspend mode, the wireless interface device 100 is essentially turned off and communication packets from the host computer 101 are not handled. The wireless interface device 100 emerges from suspend state 165 into active state 161 when a pen event is detected.

As mentioned above, the video controller 113A supports various power management modes internal to the display subsystem 113. Power is conserved in display subsystem 113 by entering "standby" and "suspend" modes. In the video controller 113A's "standby" mode, which can be entered by (i) expiration of a timer internal to the video controller 113A, (ii) firmware in the video controller 113A, or (iii) a signal received from system controller 129 on the video controller 113A's "STANDBY" pin. In the video controller 113A's standby mode, the LCD 113C is powered down and the video clock is suspended. The video controller 113A exits the standby mode either under firmware control, or upon system controller 129's de-asserting video controller 113A's STANDBY pin. Upon exiting standby mode, the LCD 113C is powered and the video clock becomes active. In this implementation, the LCD 113C includes multiple power planes ("panels"). For reliability reasons, in a powering up or powering down operation, these panels in the LCD display are preferably powered in a predetermined sequence specified by the manufacturer.

Maximum power is conserved in the display subsystem 113 when video controller 113A enters the "suspend" mode. The suspend mode can be entered either by asserting a signal from the system controller 129 on the SUSPEND pin of video controller 113A, or under firmware control. In this implementation, if the suspend mode is entered from the SUSPEND pin, the CPU 112 is prevented from accessing the video RAM 113B and video bus 113D. In that state, the contents of configuration registers in the video controller 113A are saved, to be restored when suspend mode is exited. In the suspend mode, the video RAM 113B is refreshed using the lowest possible refresh clock rate.

4. General Description of Operation

Figure 6:
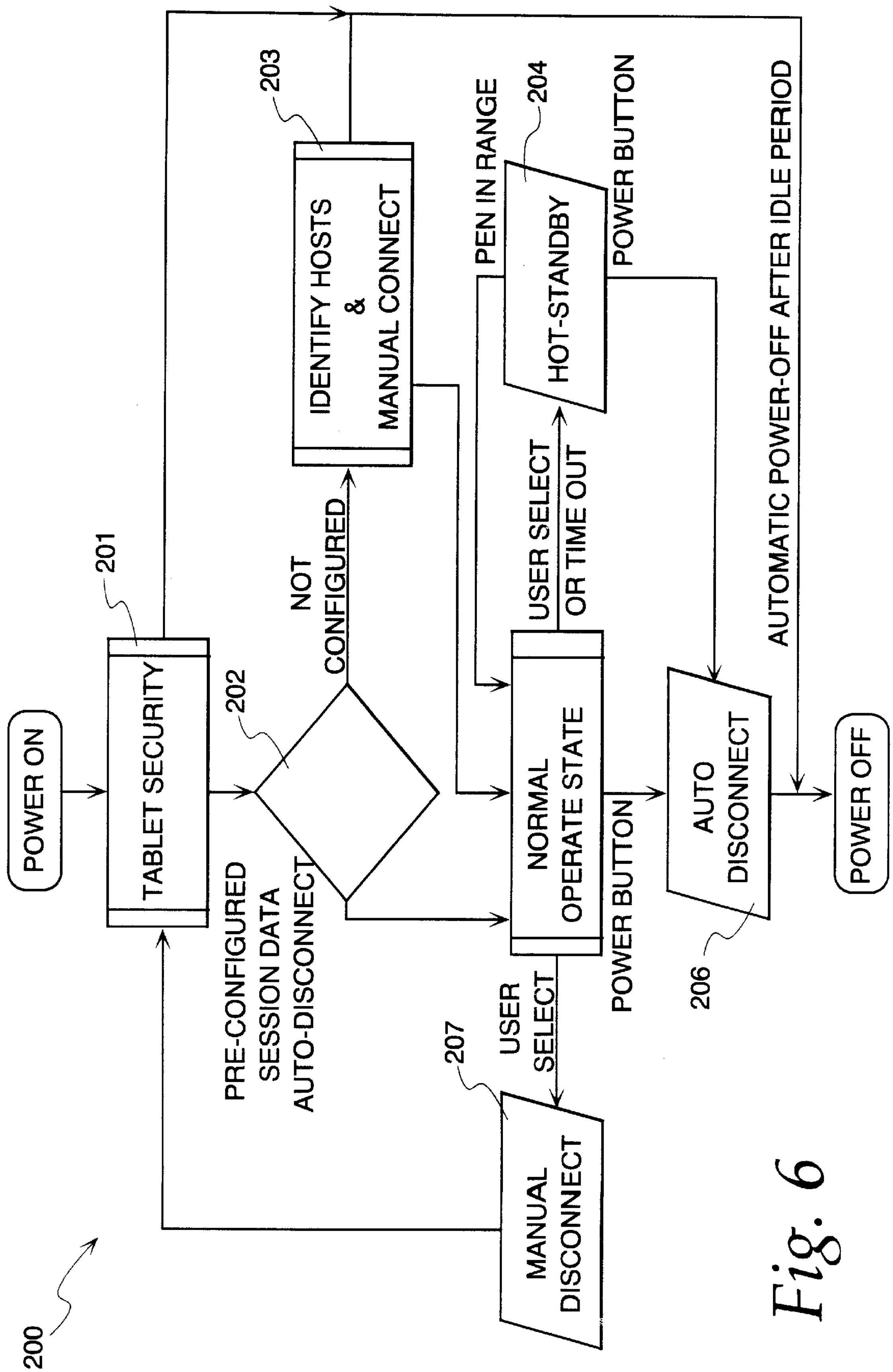
FIG. 6 is a block diagram illustrating the operational states of the wireless interface device under the control of dedicated Viewer Manager software in accordance with the present invention.

FIG. 6 is a block diagram illustrating the operational states of wireless interface device 100 under the control of the Viewer Manager software 200. As shown in FIG. 6, on power up, the wireless interface device 100 enters into a "TABLET SECURITY" state 201, in which an optional security step is performed. In the state 201, either the device 100 automatically shuts off after an idle period or the user performs a "log on" procedure which, as a security measure, identifies and validates the user. Then, at decision point 202, the Viewer Manager software 200 then determines if a procedure to set up a communication link is preconfigured. If so, a communication link is established automatically with the host computer 101 and the Viewer Manager software 200 goes into the normal operation state 205, which is described in further detail below. If a communication link is not preconfigured, a manual procedure is performed in state 203, in which the desired host computer 101 is identified and connected. From state 203, either the device 100 automatically shuts off after an idle period or the user continues on and enters normal operation state 205.

In normal operation state 205, the wireless interface device 100 controls the program running in the host computer 101, in accordance with the input data received from stylus input subsystem 110. The positions of the stylus in stylus input subsystem 110 are delivered to the host computer 101, which generates display commands to the wireless interface device 100. The CPU 112 executes the display commands received, which may result in an update of the LCD 113C. In this embodiment, either a direct user command or inactivity over a predetermined time period causes the wireless interface device 100 to enter a "HOT-STANDBY" minimum power state ("sleep" mode), represented in FIG. 6 by block 204. In the minimum power state 204, to preserve battery power, the various operations of the wireless interface device 100's functional units are placed on standby status. If the status is put in contact with the digitizer panel, the wireless interface device 100 is reactivated, and control of the host computer 101 is resumed by re-entering state 205. Thereupon, wireless interface device 100 enters into a state 206, in which an auto-disconnect procedure is executed, which releases control of the host computer 101 and powers down the wireless interface device 100.

The user may also relinquish control of the host computer 101 from state 205 by selecting a manual disconnect function. When the manual disconnect function is selected, the wireless interface device 100 enters manual disconnect state 207, in which the connection to the host computer 101 is terminated. The wireless interface device 100 is then returned to state 201 to accept the next user validation.

FIG. 7 is a block diagram of the software environment 240 in which the wireless interface device 100 and the host computer 101 operate to provide the wireless interface device 100 remote control of the host computer 101. As shown in FIG. 7, a wireless communication system 250 is provided for communication between the host computer 101 and the wireless interface device 100. On the side of the wireless interface device 100, i.e. software environment 230A, a communication output manager software routine 252 controls transmissions of pen events over the wireless communication link 250 to a host communication input manager 262 in the host computer 101 (i.e. software environment 230B). The pen events include the position information of the stylus and tip-up and tip-down information. A pen event buffer 251 queues the pen events for transmission through a communications manager 252. In the software environment 230A, the communications input manager 254 receives from the wireless communication system 250 video events transmitted by host communication output manager 260 in the software environment 230B. These video events include graphical commands for controlling the LCD 113C. In the software environment 230A, the received video commands are queued in the video event buffer 256 to be processed by the CPU 112 as graphical instructions to the LCD 113C.

In the software environment 230B, i.e. in host computer 101, pen events are queued in pen event buffer 264, which may then be provided to the Pen Windows module 266. The Pen Windows module 266 processes the pen events and creates video events in a video event buffer 267, which is then transmitted to the wireless interface device 100 over wireless communication system 250.

FIG. 8 is a block diagram which shows in further detail the software environment 230B (FIG. 7) in the host computer 101; running an application program 270 under a Windows operating system 272. As shown in FIG. 8, the pen events queued in the pen event buffer 264 are provided to a pen event injector 274, which provides the pen events from the pen event buffer 264, one pen event at a time, to a buffer ("RC buffer") 275 of the Recognition Context Manager module (the "RC manager") 276 in Pen Windows The RC buffer 275 holds a maximum of four pen events. The RC Manager 276 assumes that pen events are received at RC buffer 275 as they occur. Thus, if the Pen Windows system is presented with pen events faster than they are retrieved from RC buffer 275 without pen event injector 274, the pen events that arrive at RC buffer 275 when it is full are lost. The pen event injector 274 prevents such data loss. To provide this capability, the pen event injector 274 includes both Windows virtual device (V×D) and device driver (DRV) codes (not shown). The DRV portion removes a single pen event from pen event buffer 264 and delivers it to the RC buffer 275 using the normal Pen Windows add and process pen event mechanisms. Then the V×D portion reactivates the DRV code after a minimum time delay using a virtual machine manager service to retrieve the next pen event from pen event buffer 264. Those of ordinary skill in the art would appreciate that, under the terminology used in Windows, DRV code refers to a dynamically linked library in Windows which interacts with a hardware device (in this case, pen device buffer 264), and V×D code refers to a dynamically lined library which manages a sharable resource (in this case, the DRV code).

The RC Manager 276 examines each pen event in the RC buffer 275, and according to the context of the pen event in its possession, the RC Manager 276 determines whether the stylus is in the pen mode or in the mouse mode. In this embodiment, as will be discussed in more detail below, an icon allows the user to use the stylus as a "mouse" device. The icon, called "mouse button toggle", allows the user to switch between a "left" button and a "right" button as used in an industry standard mouse device. The selected button is deemed depressed when the stylus makes contact with the pressure-sensitive digitizer panel. A rapid succession of two contacts with the display is read by the RC Manager 276 as a "double click", and dragging the stylus along the surface of the display is read by the RC Manager 276 as the familiar operation of dragging the mouse device with the selected button depressed.

If the stylus is in the pen mode, the RC Manager 276 provides the pen event to a recognizer 277 to interpret the "gesture". Alternatively, if the pen event is a mouse event, the RC Manager 276 provides the pen event as a mouse event for further processing in a module 278. The interpreted gestures or mouse events are further processed as input data to the Windows operating system 272 or the application program 270.

The output data from an application program, such as Windows 272 or application program 270, is provided to the video event buffer 267. These video events are transmitted to the host communications output manager 260 for transmission to the wireless interface device 100.

Figure 9:
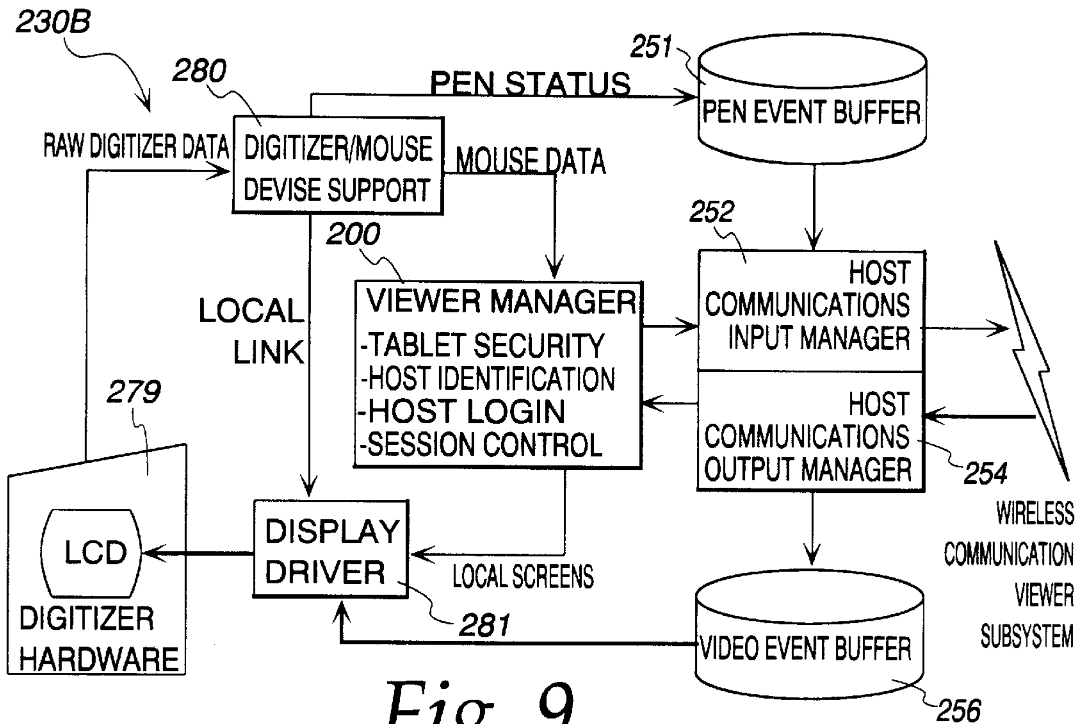
FIG. 9 is a block diagram which shows in further detail the software environment in the wireless interface device, running in a normal operation state.

FIG. 9 is a block diagram which shows in further detail the software environment 230A in the wireless interface device 100 in the normal operation state 205 of the Viewer Manager 200. In FIG. 9, the stylus in the stylus input subsystem 110 and LCD video display 113C in the video display subsystem 113 are shown collectively as a digitizer-display device 279. In a normal operation state 205, the Viewer Manager 200 interacts with the application program 270 in the wireless interface device 100 by way of the Communications Output Manager 252 and the Communications Input Manager software 254. In addition, the Viewer Manager software 200 also receives digitized data from a digitizer 280, which, in turn, receives digitized data from stylus input subsystem 110. The Viewer Manager software 200 uses the digitized data to provide visual feedback to the users which is discussed in further detail below. The Viewer Manager software 200 generates local video commands to a display driver 281. The display driver 281 also receives from video event buffer 256 video display commands from the host computer system 101.

At the core of the wireless interface device 100's user interface is the stylus's behavior under Pen Windows. Of significance in wireless interface device 100's design is the emulation of the natural "pen-and-shaper" interaction with the user. That is, in a pen mode, the stylus must leave ink as it moves across the surface of the screen in the same way that a pen leaves ink on paper. However, using Pen Windows software, the RC Manager 276, residing in the host computer 101, determines for each pen event whether the mouse or the pen mode is used.

If the wireless interface device 100 simplistically accesses the host computer 101 as a local device access, the wireless link between the host computer 101 and the wireless interface device 100 would be required to carry a minimum of 200 inking messages per second (100 stylus tip locations plus 100 line drawing commands). To maintain the pen-and-paper emulation, the wireless interface device 100 is further required to have a total processing delay (hence response time) including the overhead of the communication protocols, which is near or below the human perception level. In addition, noise in the transmission medium often leads to momentarily interruption of data transmission, or results in data corruption that requires re-transmission, thereby further reducing the throughput of the wireless link. To provide an acceptable level of performance, i.e., a high message-per-second communication rate and an acceptable propagation delay, a technique referred to as "local inking" is developed and applied to the wireless interface device 100's design, in accordance with the present invention. Without local inking, a high bandwidth communication link is required to meet the propagation delay requirement. Such a high bandwidth communication link is impractical, both in terms of cost and its impact on the portability of the resulting wireless access device.

With local inking, the Viewer Manager software 200 provides inking on the LCD 113C locally before the corresponding inking video events are received from the host computer 101. In this manner, visual feedback is provided virtually immediately without requiring either highly complex networking equipment, or very high performance and costly components in both the wireless interface device 100 and the host computer 101. Local inking provides both a real time response and an orderly handling of the styluses data stream. Since local inking reduces the need for processing at the peak pen event rate of the stylus's data stream, the host computer 101 can thus apply normal buffering techniques, thereby reducing the bandwidth requirement on the communication network.

In one proposed industry standard for a stylus or pen-based system, namely the Microsoft Windows for Pen Computing system ("Pen Windows"), the pen mode requires (i) a pen driver that can deliver stylus tip locations every five to ten milliseconds (100 to 200 times per second), so as to achieve a resolution of two hundred dots per inch (200 dpi) and (ii) a display driver than can connect these dots in a timely manner. By these requirements, Pen Windows attempts to provide a real time response to maintain the pen paradigm. The Windows for Pen Computing system is promoted by Microsoft Corporation, Redmond, Wash. Details of the Pen Windows system are also provided in Windows version 3.1 Software Developer Kit obtainable from Microsoft Corporation. Under one implementation of the Pen Windows, a maximum of four stylus locations can be stored in a buffer of a module called "PENWIN.DLL" (for "Pen Window Dynamically Linked Library"). Consequently, in that implementation, the maximum latency allowed is twenty to forty milliseconds before any queue tip location is written. Each time the system fails to process a pen event within twenty to forty milliseconds of queuing, a stylus tip location is lost and there is a corresponding impact on the accuracy of the line being traced.

As mentioned above, the stylus is used in both pen mode and mouse mode. Since the RC Manager 276, running on the host computer 101, rather than a software module on the wireless interface device 100, determines whether a given pen event is a mouse mode event or a pen mode event, the Viewer Manager software 200 must anticipate which of these modes is applicable for that pen event. Further, should the anticipated mode prove to be incorrect, the Viewer Manager software 200 is required to correct the incorrectly inked image in video display subsystem 113.

Figure 10:
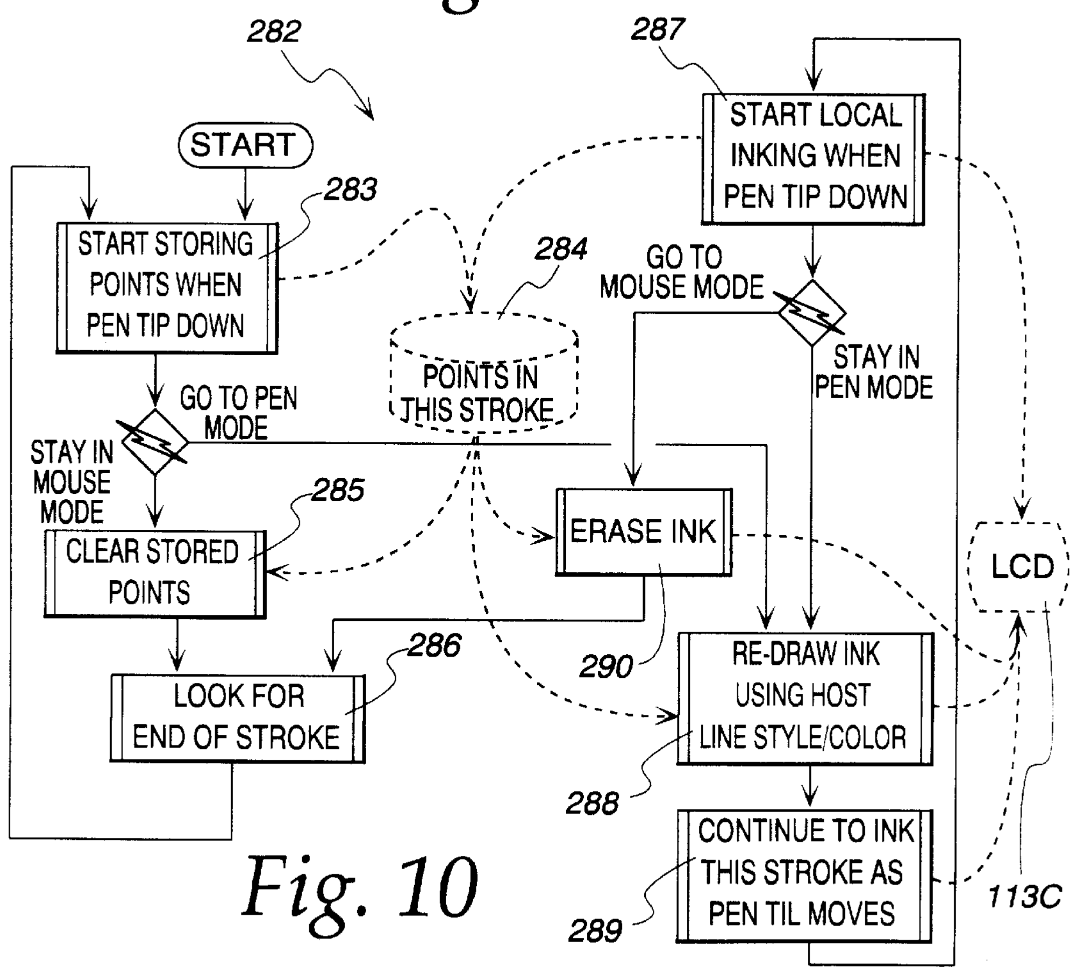
FIG. 10 is a block diagram illustrating the method used in the wireless interface device to anticipate a pen/mouse mode decision.

FIG. 10 illustrates the method used in the wireless interface device 100 to anticipate the RC Manager 276's mode decision and to correct the image in the video display subsystem 113 when a local inking error occurs. As shown in FIG. 10, when the normal operational state 205 is entered, a pen control program (represented by the state diagram 282) in the Viewer Manager software 200 is initially in the mouse mode in state 283 However, even in the mouse mode, the trajectory of the stylus in contact with the pen digitizer is stored in the pen event buffer 284 until a mode message is received from the host computer 101. The pen event buffer 284 is separate from pen event buffer 251, which is used to transmit the pen events to the host computer 101. If the RC Manager 276 confirms that the stylus 110 is in a mouse mode, the accumulated pen events are discarded and the pen control program 282 waits for the last point on which the pen tip is in contact with the pen digitizer. Then the pen control program 282 returns to a state 283, in which the trajectory of the pen is again accumulated in the pen event buffer 284 until receipt of a mode message from the host computer 101. In state 283, the control program 282 assumes that the stylus will continue to be in the mouse mode.

Alternatively, while in state 283, if a mode message is received indicating the stylus is in the pen mode, the control program 282 enters state 288, in which the accumulated pen events are drawn locally onto the LCD screen of the video display subsystem 113 in accordance with the line style and color specified in the mode message. After all accumulated pen events in the pen event buffer 284 are drawn, the control program 282 enters a state 289, in which control program 282 continues to ink the trajectory of the tip of the stylus for as long as contact with the pen digitizer is maintained. Once the tip of the stylus breaks contact with the pen digitizer, the control program 282 enters state 287.

In state 287 the control program 282 assumes that the stylus will continue to be in the pen mode. Thus, local ink will follow the trajectory of the stylus while the top of the stylus remains in contact with the pen digitizer, or until a mode message is received from the host computer 101, whichever arrives earlier. Since the initial policy decision is a guess, the local inking is drawn using a single pixel-wide style and an XOR ("exclusive OR") operation, in which the pixels along the trajectory of the stylus are inverted. While in state 287, the pen events associated with the trajectory of the stylus are accumulated in the pen event buffer 284.

If the mode message received in state 287 indicates that the stylus is in mouse mode, i.e. the policy decision was wrong, the control program 282 then enters a state 290, in which the accumulated pen events in pen event buffer 284 are used to erase the stylus stroke. Since the initial draw is accomplished by a bit XOR ("exclusive OR") operation at the appropriate positions of the frame buffer, erasure is simply provided by the same XOR operation at the same positions of the frame buffer. The control program 282 then enters state 286. However, if the mode message received in state 287 confirms that the stylus is in pen mode, the accumulated pen events of pen event buffer 284 are used to redraw on the LCD 113C, using the line style and color specified on the mode message.

Under a convention of the Pen Windows software, starting a stroke of the stylus with the barrel button depressed (for active stylus systems) indicates an erase ink operation in pen mode. The control program 282 recognizes this convention and refrains from inking during this stroke without waiting for confirmation from the host computer 101. In addition, the control program 282 does not change modes across an erasing stroke: i.e., if the stylus is in the pen mode prior to the erase stroke, the stylus remains in the pen mode after the erase stroke; conversely, if the stylus is in the mouse mode prior to the erase stroke, the stylus remains in the mouse mode after the erase stroke.

Since all the pen events used in local inking on the wireless interface device 100 are also processed in the host computer 101, the trajectory of local inking must coincide identically with the line drawn at the host computer 101. Because of local inking, processing by the host computer 101 within the human perceptual response time is rendered unnecessary Thus, in the host computer 101, the pen events can be queued at pen event buffer 264, to be retrieved one at a time by pen event injector 274. Hence, when pen event buffer 264 is suitably sized, data loss due to overflow by RC buffer 275 is prevented.

Alternatively, the control program 282 can also be implemented to follow a "retractable ball-point pen" paradigm. Under this paradigm, the user controls a local stylus mode of the stylus, such that inking occurs when the stylus is set to be in the local pen mode, and no inking occurs when the stylus is in the local mouse mode. If the local stylus mode conforms with the mode expected by Pen Windows, the image seen on the LCD display of the video display subsystem 113 is the same as described above with respect to state 287 of the control program 282. If the local stylus mode is the mouse mode, and Pen Windows software expects stylus 110 to be in the pen mode, the subsequent video events from host computer 101 would provide the required inking. Finally, if the local stylus mode is the pen mode and Pen Windows software expects the stylus to be in the mouse mode, inking would be left on the screen of video display subsystem 113. Under this paradigm, the user would eliminate the erroneous inking by issuing a redraw command to Pen Windows.

5. Detailed Description of the Schematic Diagrams

Figure 11A:
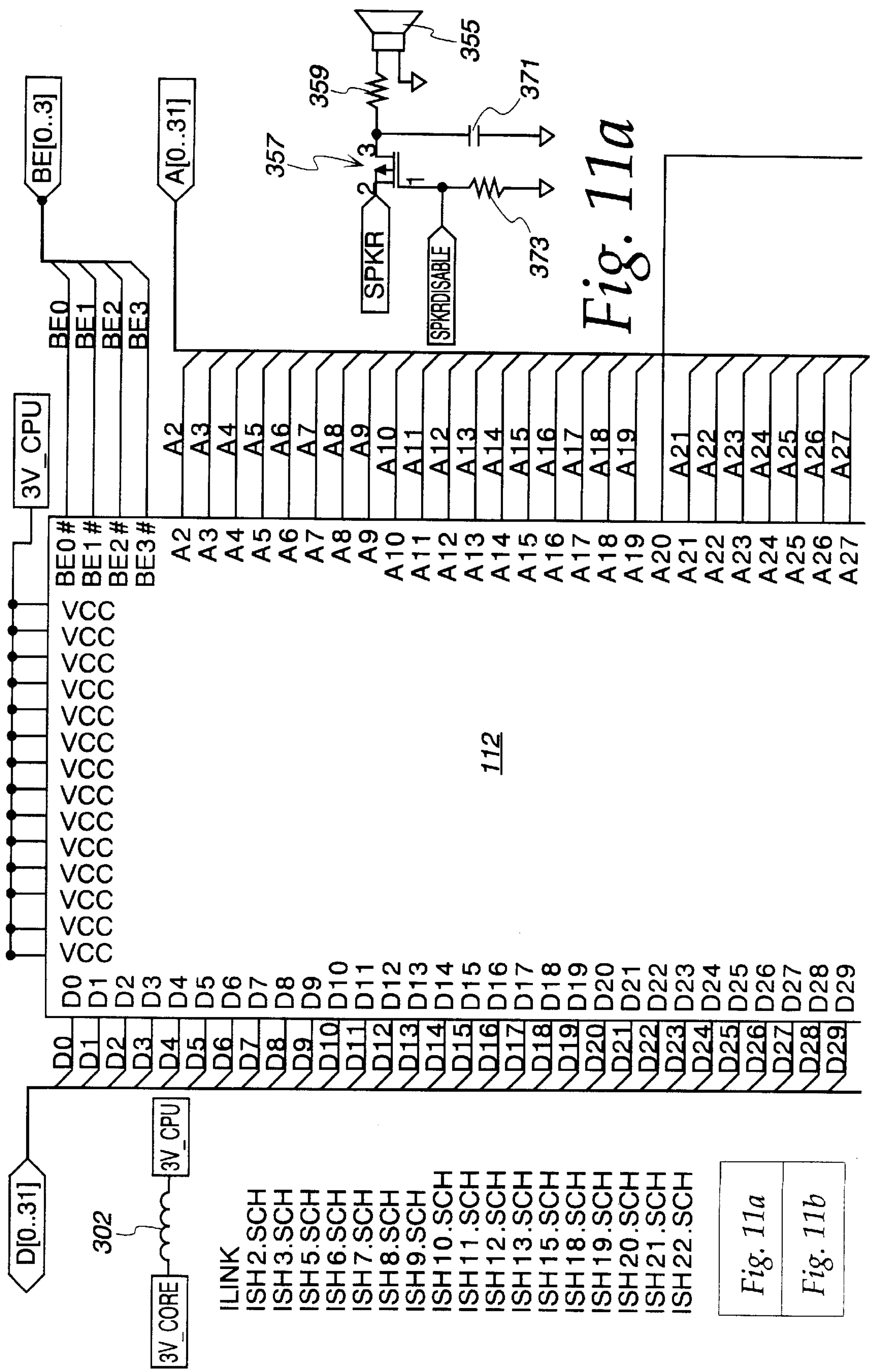
FIGS. 11–30 are schematic diagrams of the wireless interface device in accordance with the present invention.
Figure 11B:
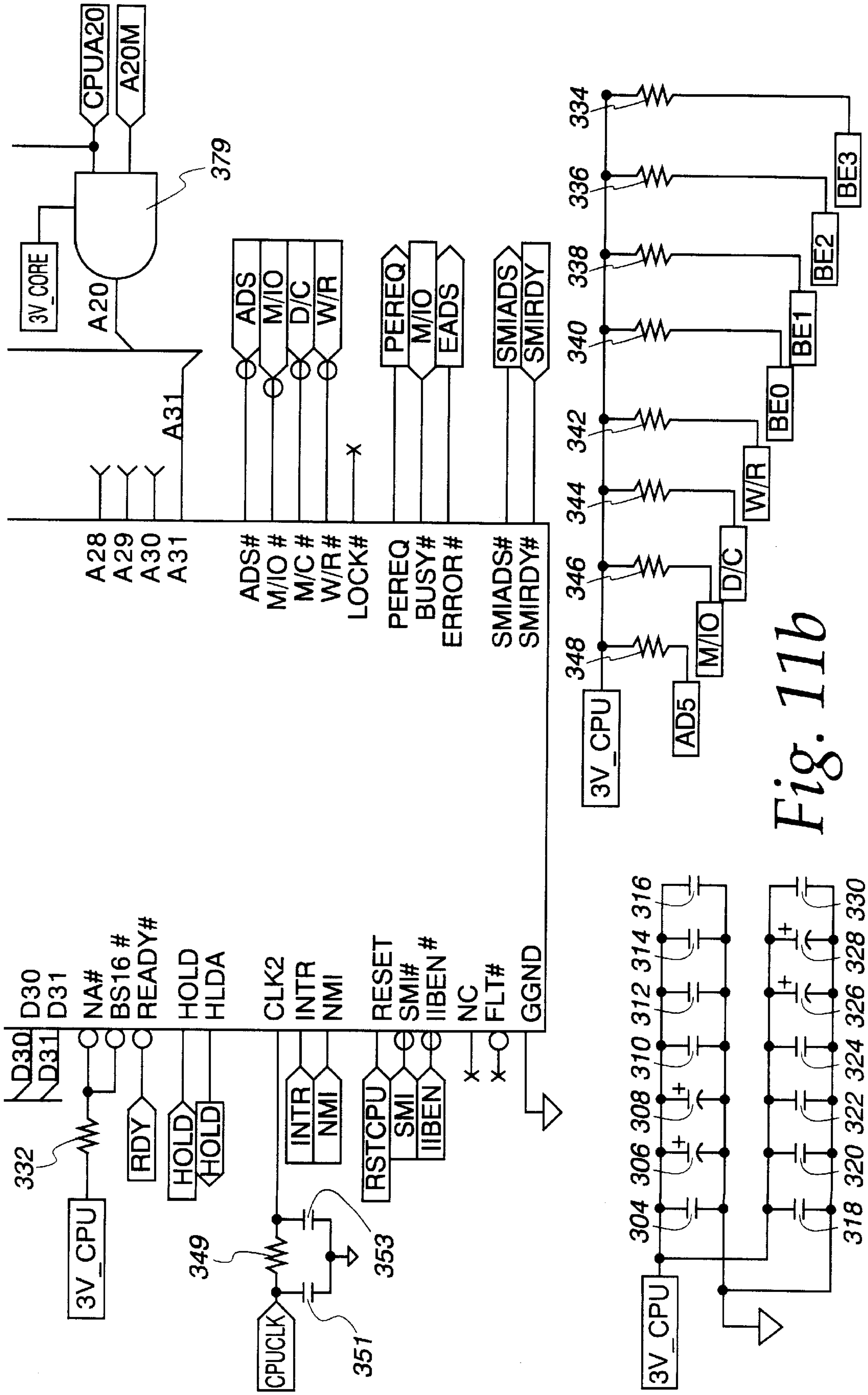
Figure 12A:
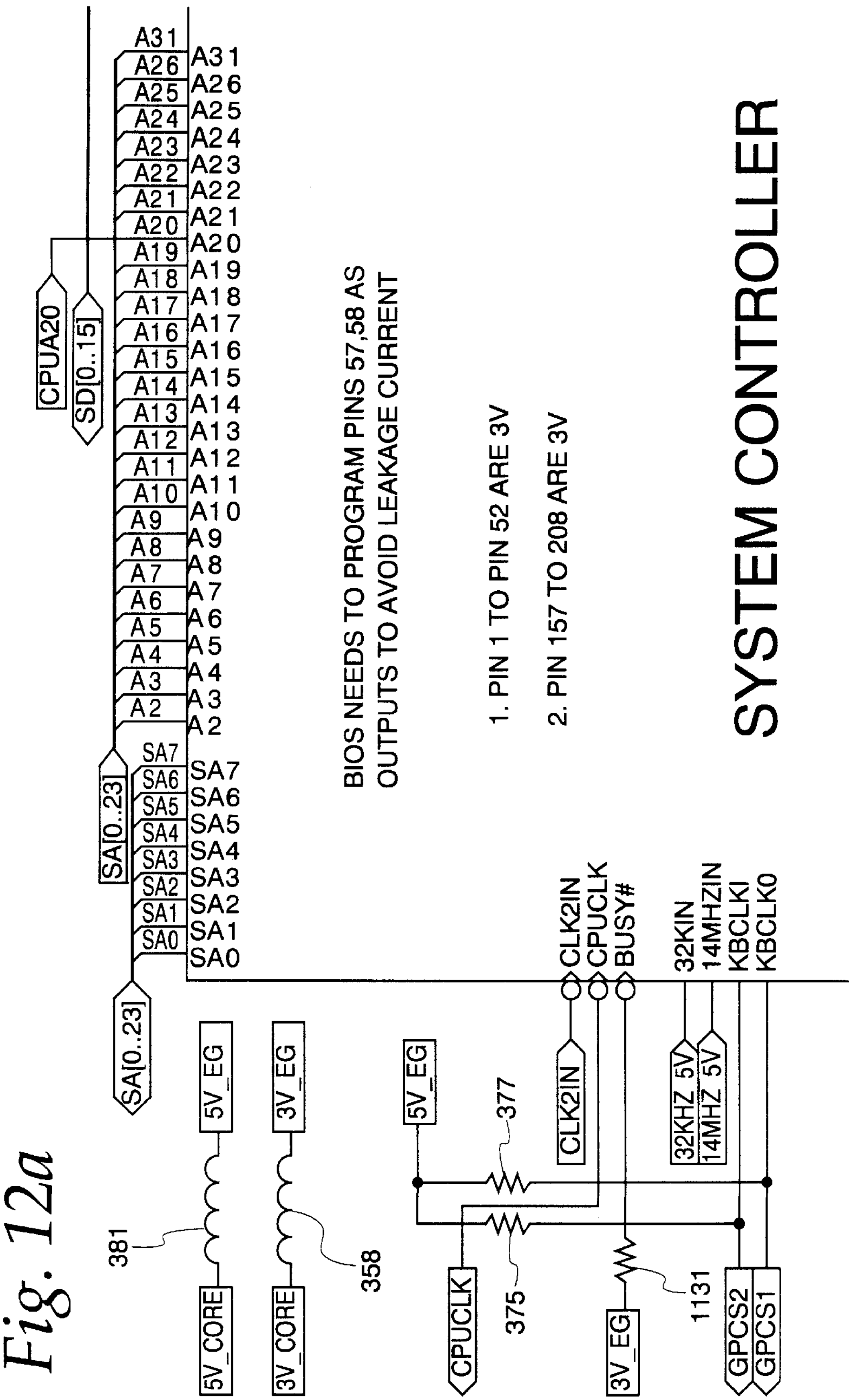
Figure 12B:
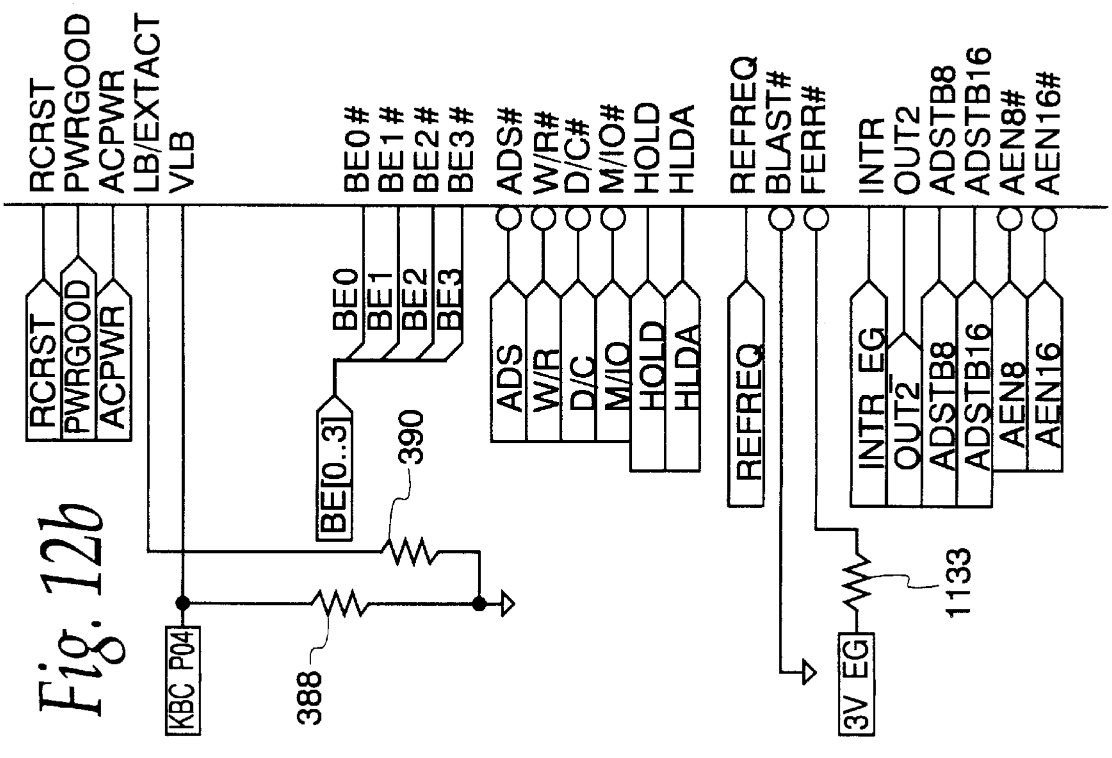
Figure 12C:
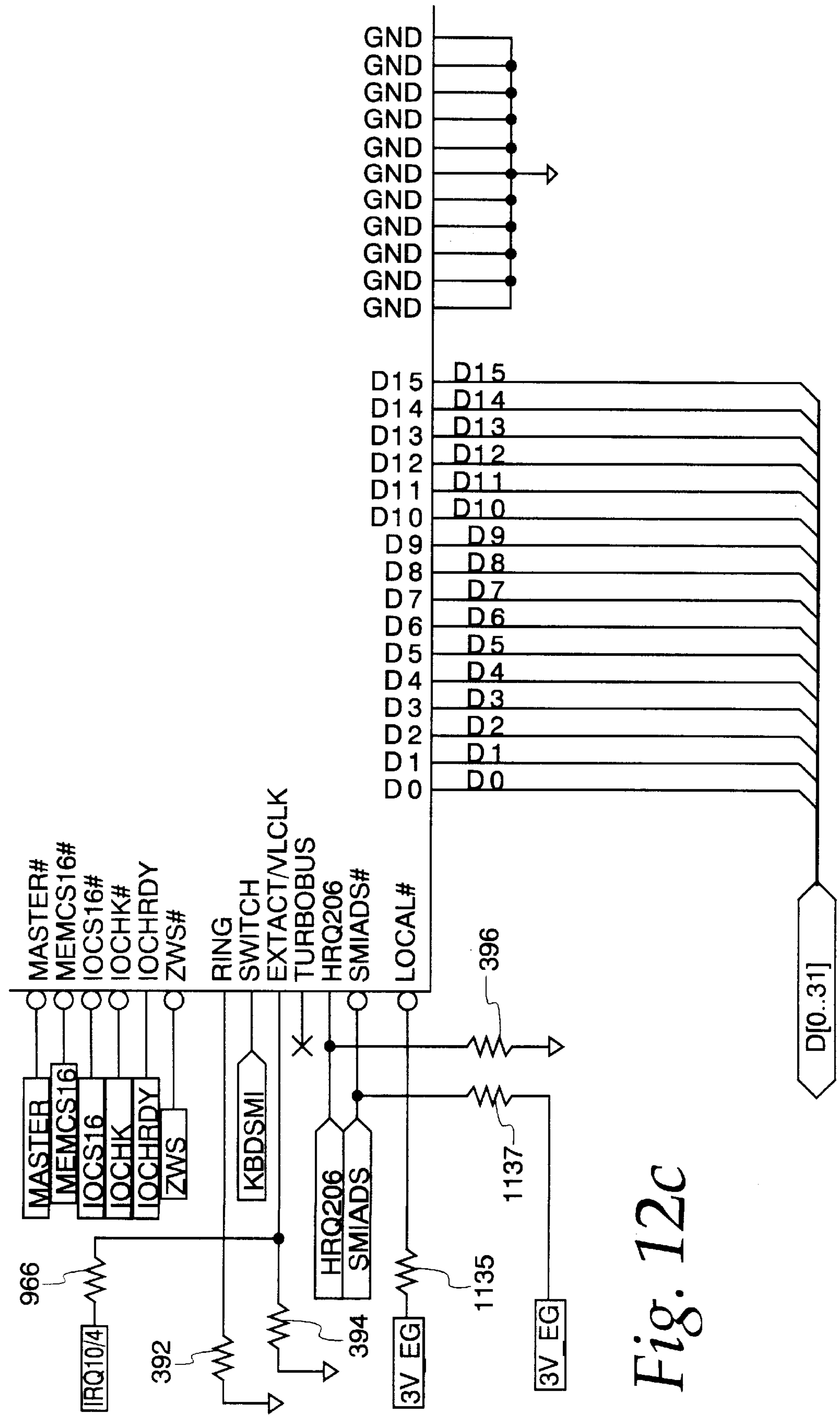
Figure 12D:
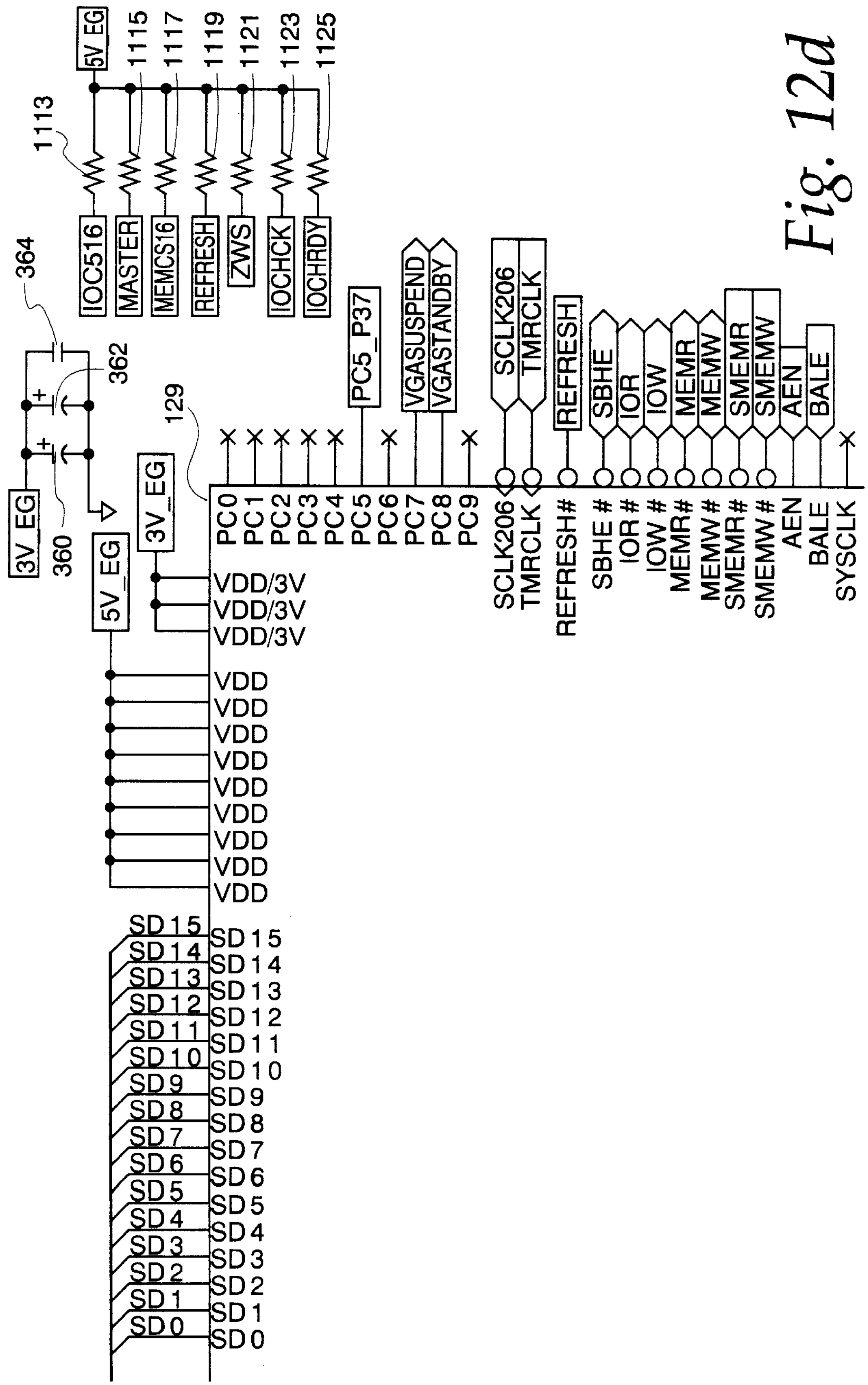
Figure 12E:
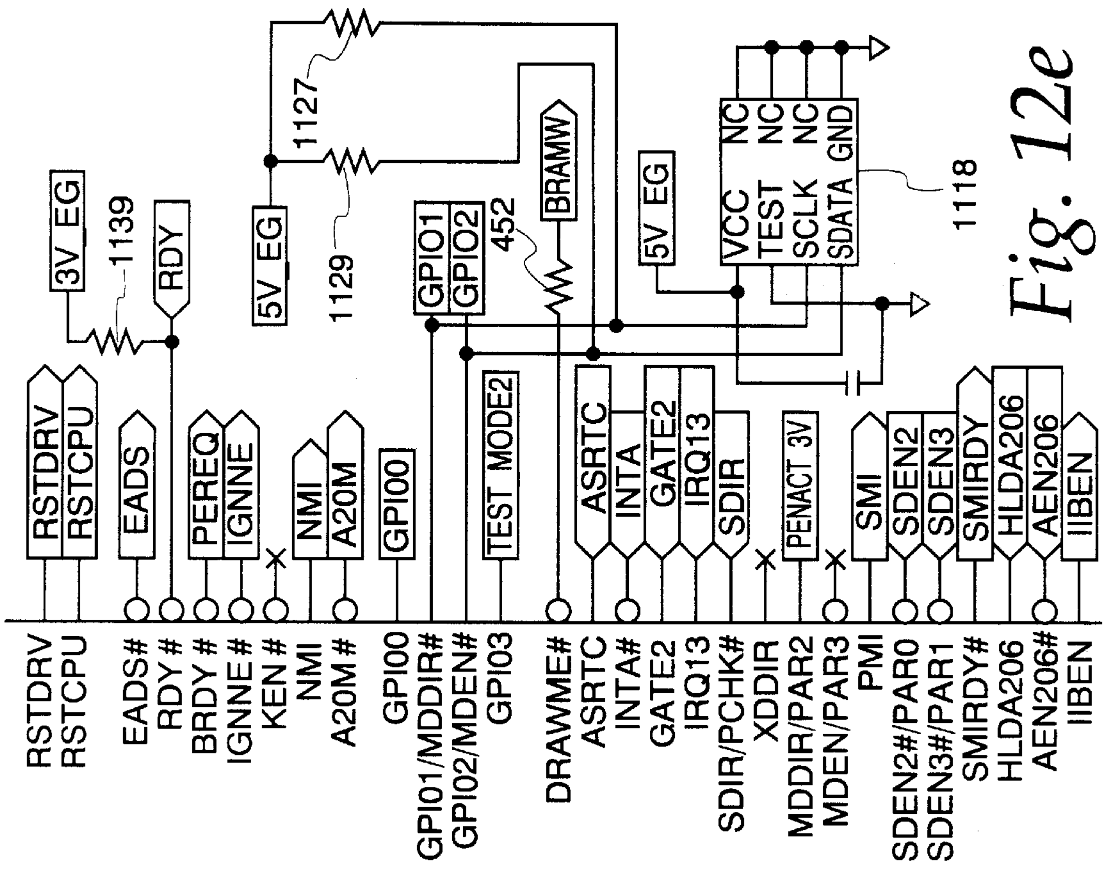
Figure 12F:
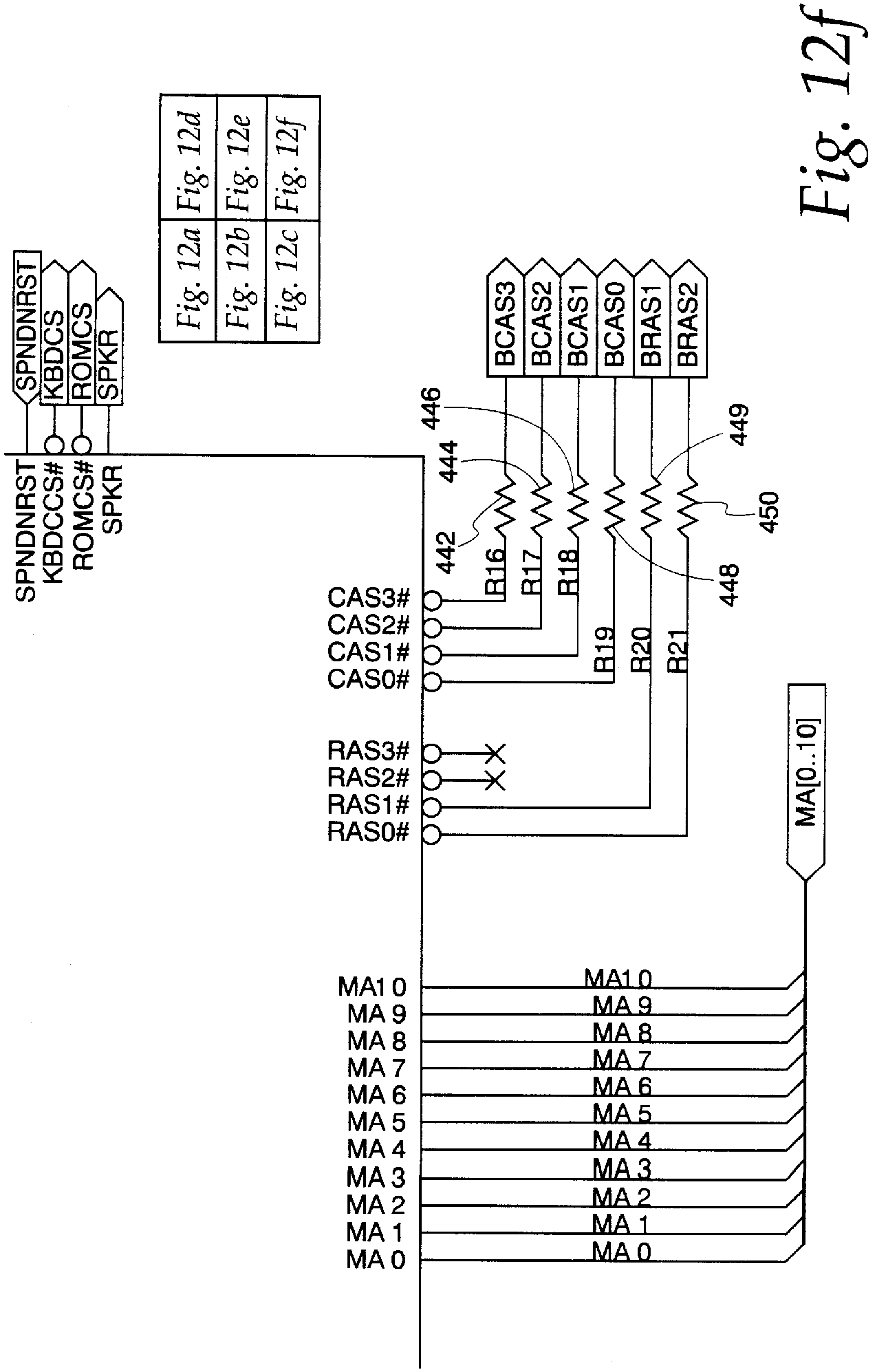

One embodiment of the invention is illustrated in the schematic drawings, FIGS. 11–30. Referring to FIG. 11, the system may include a CPU 112, such as an AMD Model No. Am386DXLV microprocessor. The CPU 112 includes a 32-bit data bus D[0 . . . 31] as well as a 32-bit address bus A[2 . . . 31]. Both the data bus D[0 . . . 31] as well as the address bus A[2 . . . 31] are connected to the processor bus 150 (FIG. 4), for example, an AT bus. As will be discussed in more detail below, the system controller 129 (FIG. 4) performs various functions including management of the processor bus 150. In order to conserve power, a 3-volt microprocessor may be used for the CPU 112. As such, a 3-volt supply 3 V CPU is applied to the power supply VCC pins on the CPU 112. The 3-volt supply 3V_CPU is available from a DC-to-DC converter 300 (FIG. 26) by way of a ferrite bead inductor 302. In particular, the DC-to-DC converter 300 includes a 3-volt output, 3V_CORE. This outputs 3V_CORE, is applied to the ferrite bead inductor 302 and, in turn, to the power supply pins VCC of the CPU 112. In order to prevent noise and fluctuations in the power supply voltage from affecting the operation of the CPU 112, the power supply voltage 3 V CPU is filtered by a plurality of bypass capacitors 304 through 330.

The 3-volt supply 3V_CPU is also used to disable unused inputs as well as to pull various control pins high for proper operation. For example, the 3-volt power supply 3V_CPU is applied to the active low N/A and BS16 pins of the CPU 112 by way of a pull-up resistor 332. In addition, the signals BE[0 . . . 3], W/R, D/C, M/IO and ADS are pulled up by a plurality of pull-up resistors 334 through 348.

The CPU 112 is adapted to operate at 25 megahertz (MHz) at 3.0 volts. A 25 MHz clock signal, identified as CPU CLK, available from a clock generator 398 (FIG. 13), is applied to a clock input CLK2 on the CPU 112 by way of a resistor 349 and a pair of capacitors 351 and 353. The AMD Model No. AMD386DXLV microprocessor supports a static state, which enables the clock to be halted and restarted at any time.

Figure 15B:
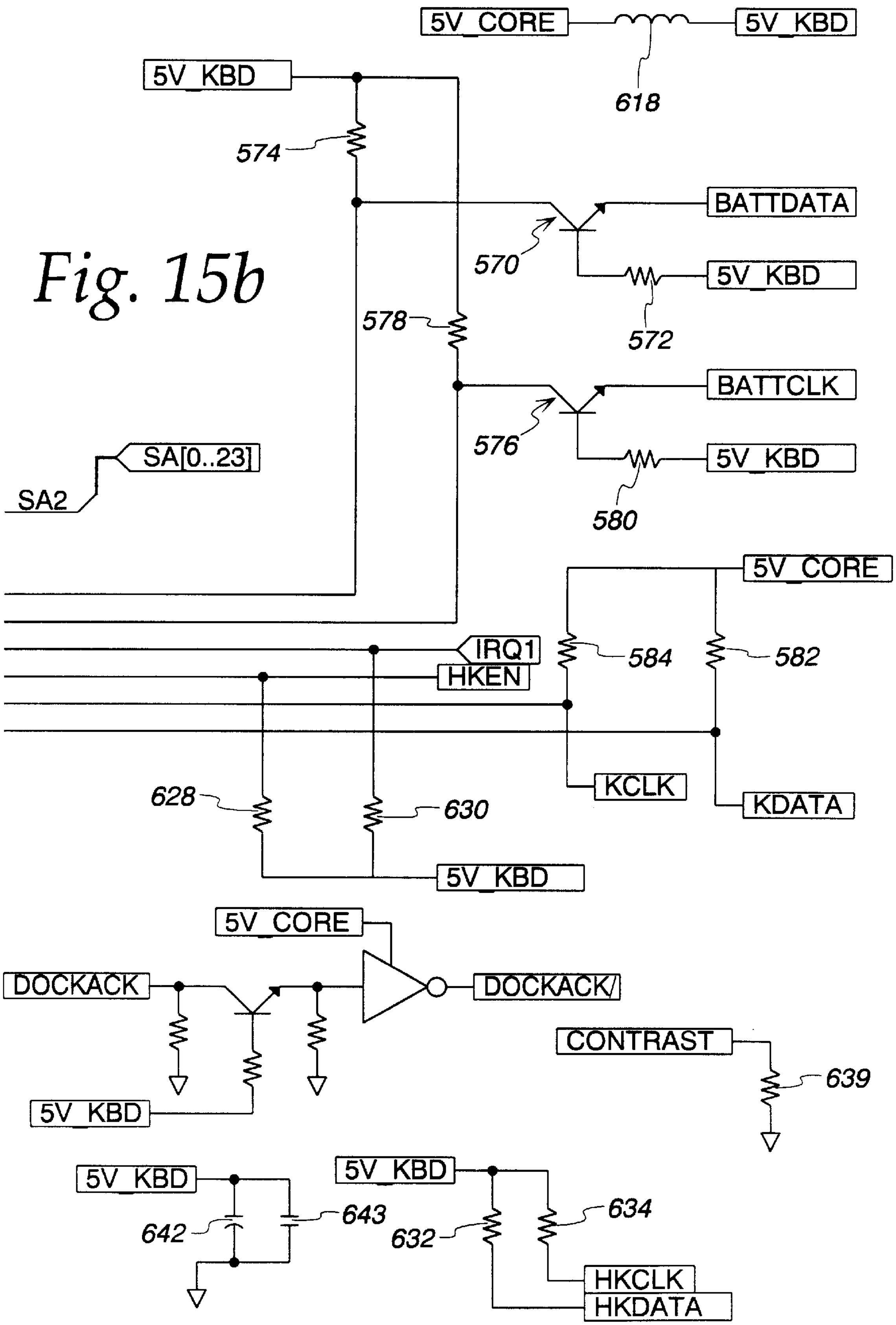

The wireless interface device 100 includes a speaker 355. The speaker 355 is under the control of the system controller 129 (FIG. 12). In particular, a speaker control signal SPKR from the system controller 129 is applied to a source terminal of a field-effect transistor (FET) 357 for direct control of the speaker 355. The drain terminal is connected to the speaker 355 by way of a current-limiting resistor 359 and a bypass capacitor 371. Normally, the speaker 355 is active all the time. In particular, the gate terminal of the FET 357 is connected to the system ground by way of a resistor 373. The gate terminal of the FET 357 is also under the control of a speaker disable signal SPKRDISABLE, available from the keyboard controller 125 (FIG. 15). The speaker disable signal SPKRDISABLE is active high. Thus, when the speaker disable signal SPKRDISABLE signal is low, the FET 357 is turned on to enable the speaker signal SPKR from the system controller 129 to control the speaker 355. When the speaker disable signal SPKRDISABLE is high, the FET 357 is turned off to disable the speaker 355.

Referring to FIG. 12, the system controller 129 is connected between the local processor or AT bus 150 and the system ISA bus 151. The system controller 129 performs a variety of functions including that of system controller, DRAM controller, power management, battery management and management of the local AT bus 150. The system controller 129, preferably a PicoPower Pine Evergreen 3, Model No. 86C368 system controller, is a 208-pin device that operates at 33 MHz with a full 5-volt input or a hybrid 5-volt/3.3-volt input. At 3.3 volts the system controller 129 is adapted to reliably operate at 20 Mhz and perhaps up to 25 Mhz.

The system controller 129 includes several system features including support of several clock speeds from 16 to 33 MHz. In addition, the system controller 129 includes two programmable non-cacheable regions and two programmable chip selects, used for universal asynchronous receiver transmitter (UART) interface 134 and the radio interface 114B as discussed below.

The system controller 129 supports both fast GATE A20 and a fast reset control of the CPU 112. In particular, the system controller 129 includes a 32-bit address bus A[0 . . . 31] that is connected to the local AT bus 150. The address line A[20] is used to develop a signal CPUA20, which is applied to the A20 pin on the CPU 112 and also applied to an AND gate 379 (FIG. 11) to support a port 92H for a fast GATE A20 signal A fast reset signal RSTCPU is also generated by the system controller 129. The fast reset signal RSTCPU is applied to the reset pin RESET of the CPU 112 for fast reset control.

The system controller 129 also provides various other system level functions For example, the system controller 129 includes a register at address 300H. By setting bit 12 of this register, a ROM chip select signal ROMCS is generated, which enables writes to the flash memory system 117 (FIG. 25) which will be discussed below. A keyboard controller chip select signal KBDCS for the keyboard controller 125 (FIG. 15), as well as general purpose chip select signals GPCS1 and GPCS2 for selecting between the RF controller 114A, the UART 134 (FIG. 16) or the pen controller 110A (FIG. 21), are generated by the system controller 129.

The system controller 129 is connected to the system ISA bus 151 by way of a 16-bit system data bus SD[0 . . . 15] and a 24-bit system address bus SA[0 . . . 23] of which only 8-bits SA[0 . . . 7] are used. The system controller 129 is also connected to the 32-bit local processor data bus D[0 . . . 31], as well as the local processor address bus A[0 . . . 31].

All of the ground pins GND on the system controller 129 are tied to the system ground. Both 3-volt and 5-volt power supplies are applied to the system controller 129. In particular, a 5-volt supply 5V_EG is applied to the power supply pins VDD of the system controller 129. The 5-volt supply 5V_EG is available from DC-to-DC converter 300 (FIG. 26) by way of a ferrite bead inductor 381 (FIG. 12). More particularly, a 5-volt supply signal 5V_CORE from the DC-to-DC converter is applied to the ferrite bead inductor 381, which, in turn, is used to generate the 5-volt supply signal 5V_EG. In order to stabilize the 5-volt supply signal 5V_EG, a plurality of bypass capacitors 1101–1111 (FIG. 13) are connected between the 5-volt supply 5V_EG and system ground.

A 3-volt power supply 3V_EG is also applied to the system controller 129 and, in particular, to the power supply pins VDD/3 V. This 3-volt supply 3V_EG is also obtained from the DC-to-DC converter 300 (FIG. 26) by way of a ferrite bead inductor 358. More particularly, 3-volt supply 3V_CORE, available at the DC-to-DC converter 300, is applied to the ferrite bead inductor 358, which, in turn, is used to generate the 3-volt power supply signal 3V-EG. A plurality of bypass capacitors 360, 362 and 364 are connected between the 3-volt supply 3V_EG and system ground for stabilizing.

The system controller 129 is reset by a reset signal RCRST (FIG. 20) on power up. The reset signal RCRST is developed by the 3-volt power supply 3V_EG, available from the DC-to-DC converter 300 (FIG. 26) and circuitry which includes a resistor 359, a capacitor 361 and a diode 363. Initially on power up, the capacitor 361 begins charging up from the 3-volt supply 3V_EG through the resistor 359. During this state, the diode 363 is non-conducting. As the capacitor charges, the level of the reset signal RCRST rises to reset the system controller 129. Should the system be turned off or the 3-volt supply 3V_EG be lost, the diode 363 provides a discharge path for the capacitor 361.

In order to assure proper operation of the system controller 129, a number of signals are pulled up to either five volts or three volts or pulled down by way of various pull-down resistors More specifically, the signals IOCS16, MASTER, MEMCS16, REFRESH, ZWS, IOCHCK, GPI01/MDDIR and GPI02/MDEN are pulled up to the 5-volt supply 5V_EG by way of a plurality of pull-up resistors 1113–1129, respectively. Similarly, the signals BUSY, FERR, LOCAL, SMIADS and RDY are pulled up by a plurality of pull-up resistors 1131 through 1139. In addition, the general purpose chip select signals GPCS1 and GPCS2 are pulled up to the 5-volt power supply signal 5V_EG by way of a pair of pull-up resistors 375 and 377. Certain signals are pulled low by way of pull-down resistors in order to assure their operating state. In particular, the signals KBC-PO4, LB/EXTACT, RING, EXTACT/VLCLK and HRQ206 are pulled down by the pull-down resistors 388 to 396. The signal BLAST is tied directly to the system ground.

As mentioned above, the system controller 129 is capable of running at different clock frequencies, depending upon the voltage applied, while supplying a clock signal to the CPU 112. Even though the system controller 129 can supply either a 1× or a 2×clock signal to the CPU 112, the system controller 129 requires a 2×clock for proper operation. Thus, a 2×clock signal CLK2IN, available from a clock generator circuit 398 (FIG. 13), is applied to the clock 2×pin CLK2IN of the system controller 129. In addition, 32 kilohertz (KHz) and 14 megahertz (MHz) clock signals are also applied to the system controller 129, available from the clock generator circuit 398, for proper operation. The system controller 129, in turn, provides a CPU clock signal CPUCLK to the CPU 112 and in particular to its clock 2-pin CLK2 by way of a resistor 1141 and the capacitors 1143 and 1145.

Figure 17:
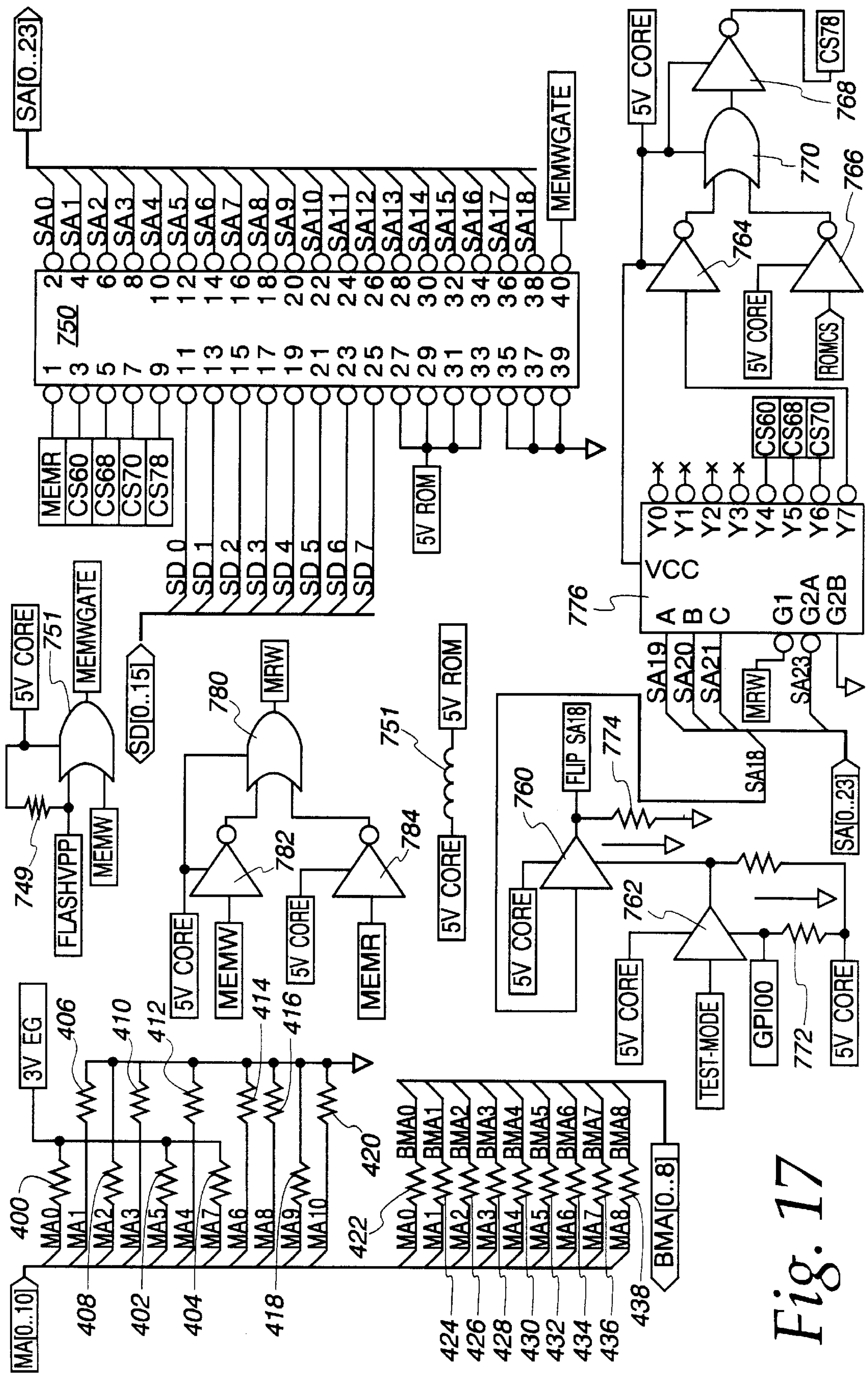

The system controller 129 is adapted to be configured during an RC-RESET mode. In particular, the DRAM memory address lines MA[0 . . . 10], normally used for addressing the DRAM 111A (FIGS. 18 and 24), are pulled high or low in order to configure the system controller 129. More particularly, the DRAM memory address lines MA[0 . . . 10] are applied to either pull-up or pull-down resistors for configuration as illustrated in FIG. 17. Table 2 below illustrates the configuration shown.

TABLE 2

System Controller Configuration Table

| NAME | FUNCTION | DEFAULT STATE |
|---|---|---|
| MA0 | 386 Select (Low = 46) | High |
| MA1 | Low Power Select (High Selects Intel LP CPU, Low For Other) | Low |

TABLE 2-continued

System Controller Configuration Table

| NAME | FUNCTION | DEFAULT STATE |
|---|---|---|
| MA2 | 1X CPU Clock Select Low = 2X CPU CLK | Low |
| MA3 | Not Used | Low |
| MA4 | Not Used | Low |
| MA5 | 368 Pin Select (Low = pin compatible with 268) | High |
| MA6 | Miscellaneous Configuration-0 | Low |
| MA7 | Not Used | High |
| MA8 | Not Used | Low |
| MA9 | Not Used | Low |
| MA10 | Not Used | Low |

As shown, the DRAM memory address lines MA[0 . . . 10] are shown with bits MA0, MA5 and MA7 pulled high to the 3-volt power supply voltage 3V_EG by way of a plurality of pull-up resistors 400, 402 and 404. The remaining DRAM address line bits MA1, MA2, MA3, MA4, MA6, MA8, MA9 and MA10 are pulled low by a plurality of pull-down resistors 406 through 420, respectively. The DRAM memory address lines MA[0 . . . 8] are also coupled to a plurality of coupling resistors 422 to 438 form a 9-bit DRAM address bus BMA[0 . . . 8].

Figure 18A:
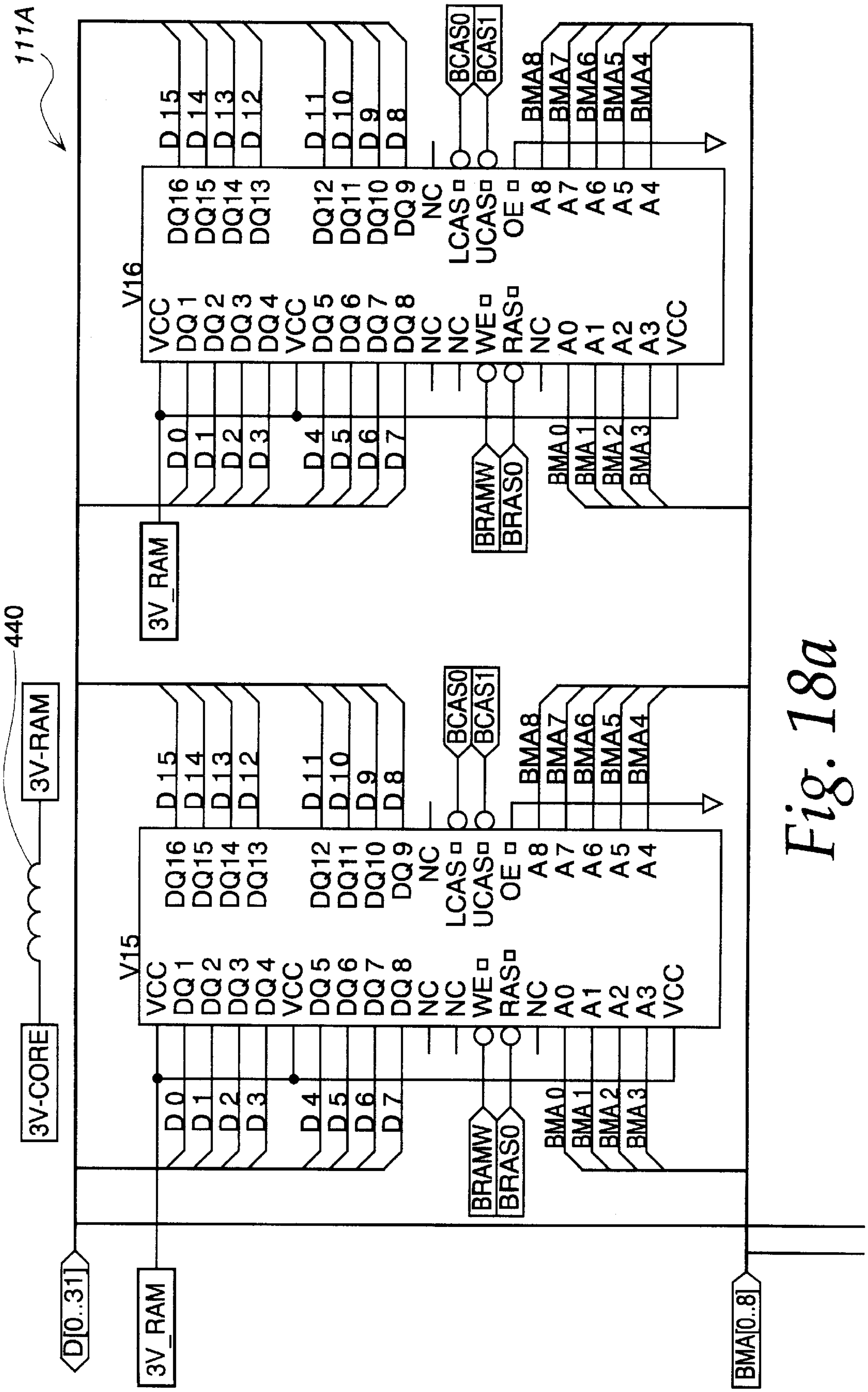
Figure 18B:
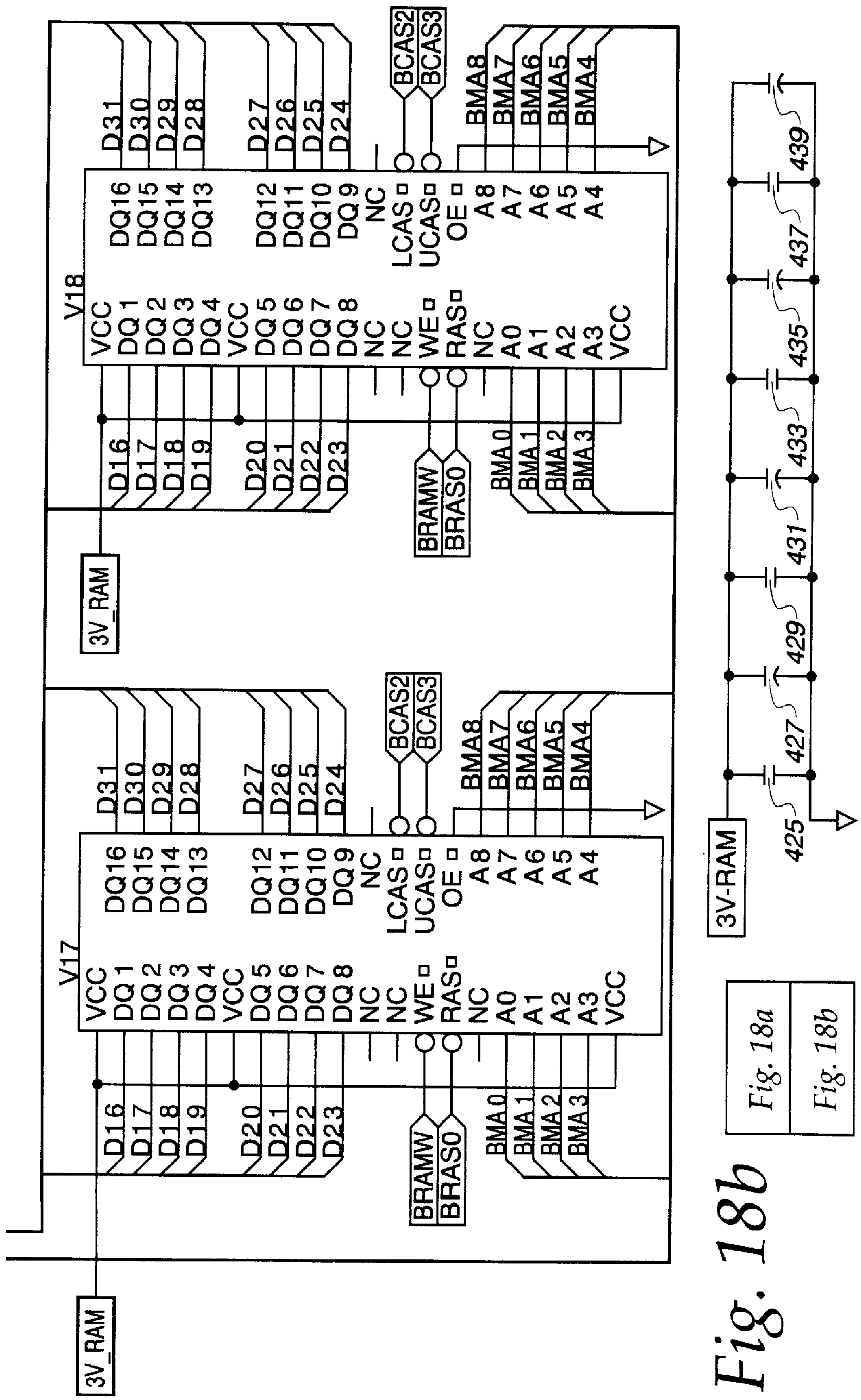
Figure 19A:
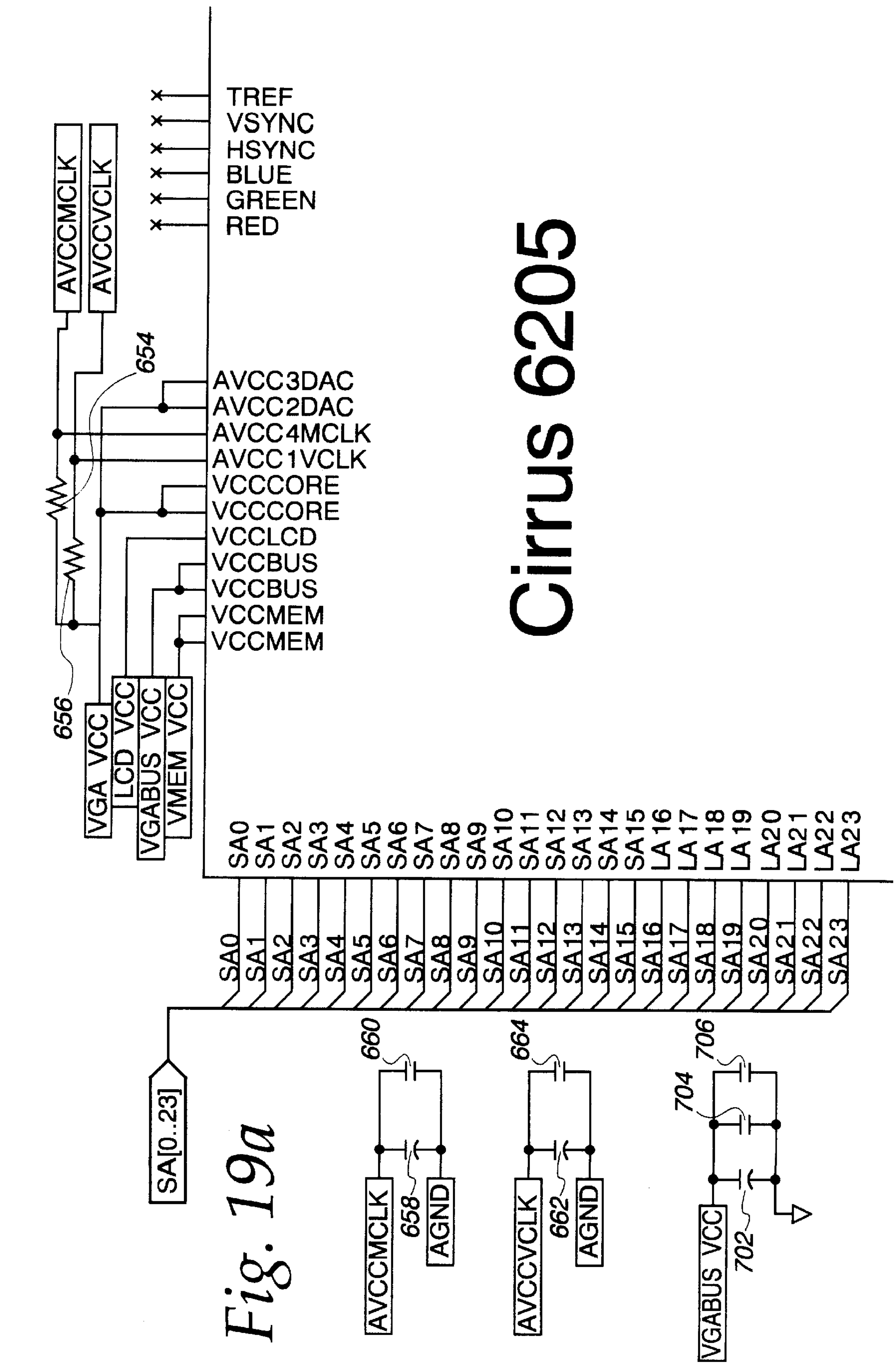
Figure 19B:
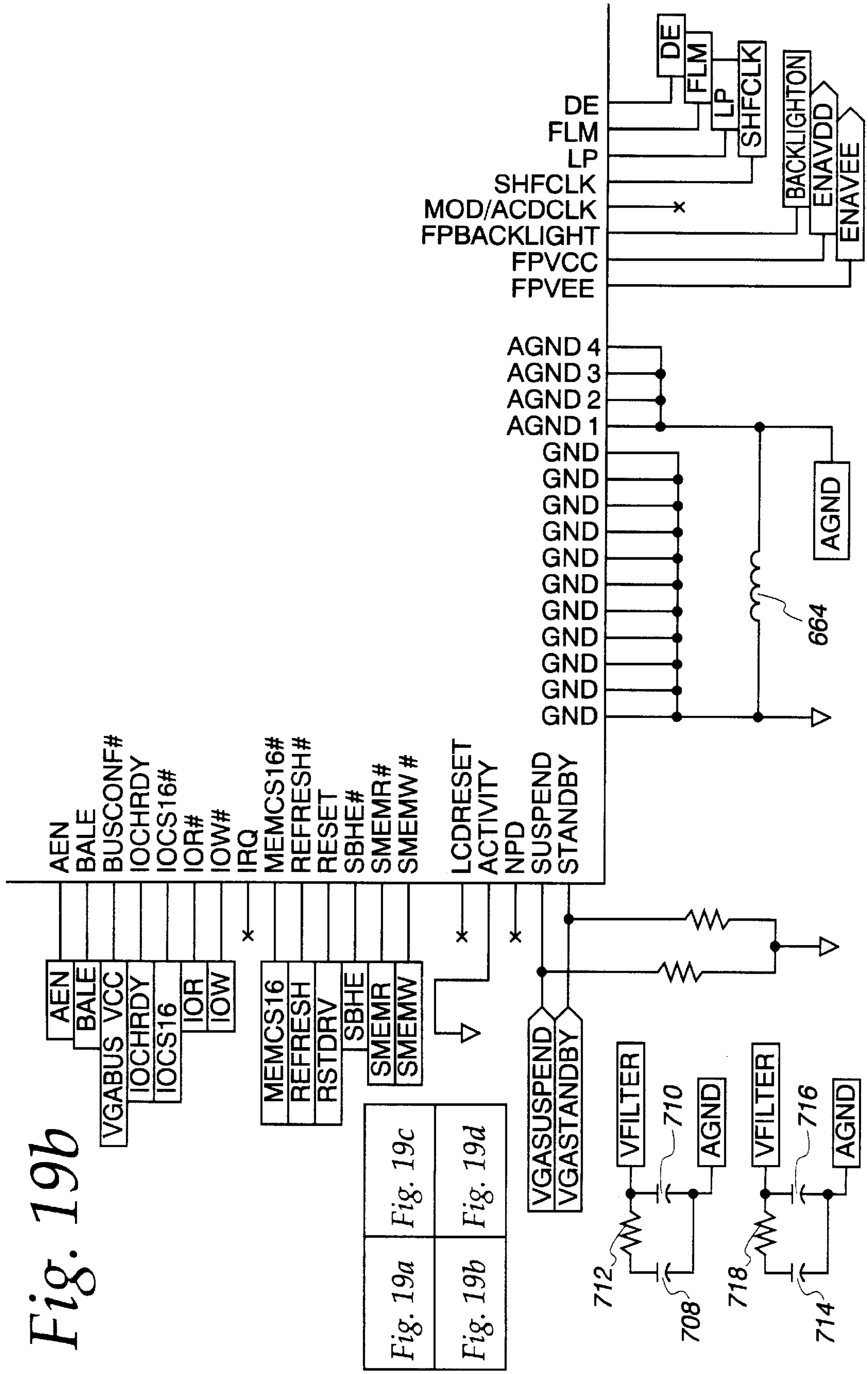
Figure 19C:
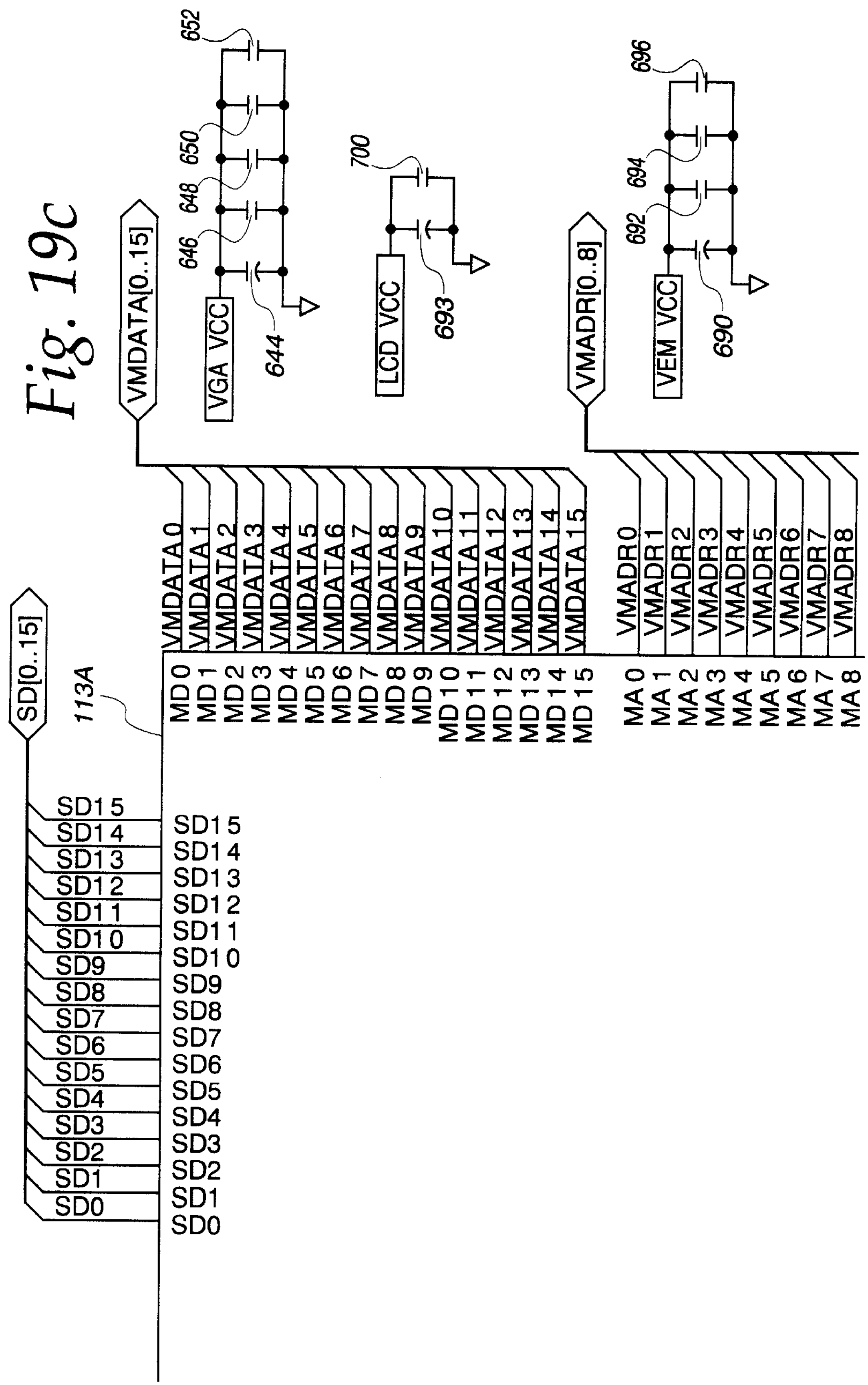
Figure 19D:
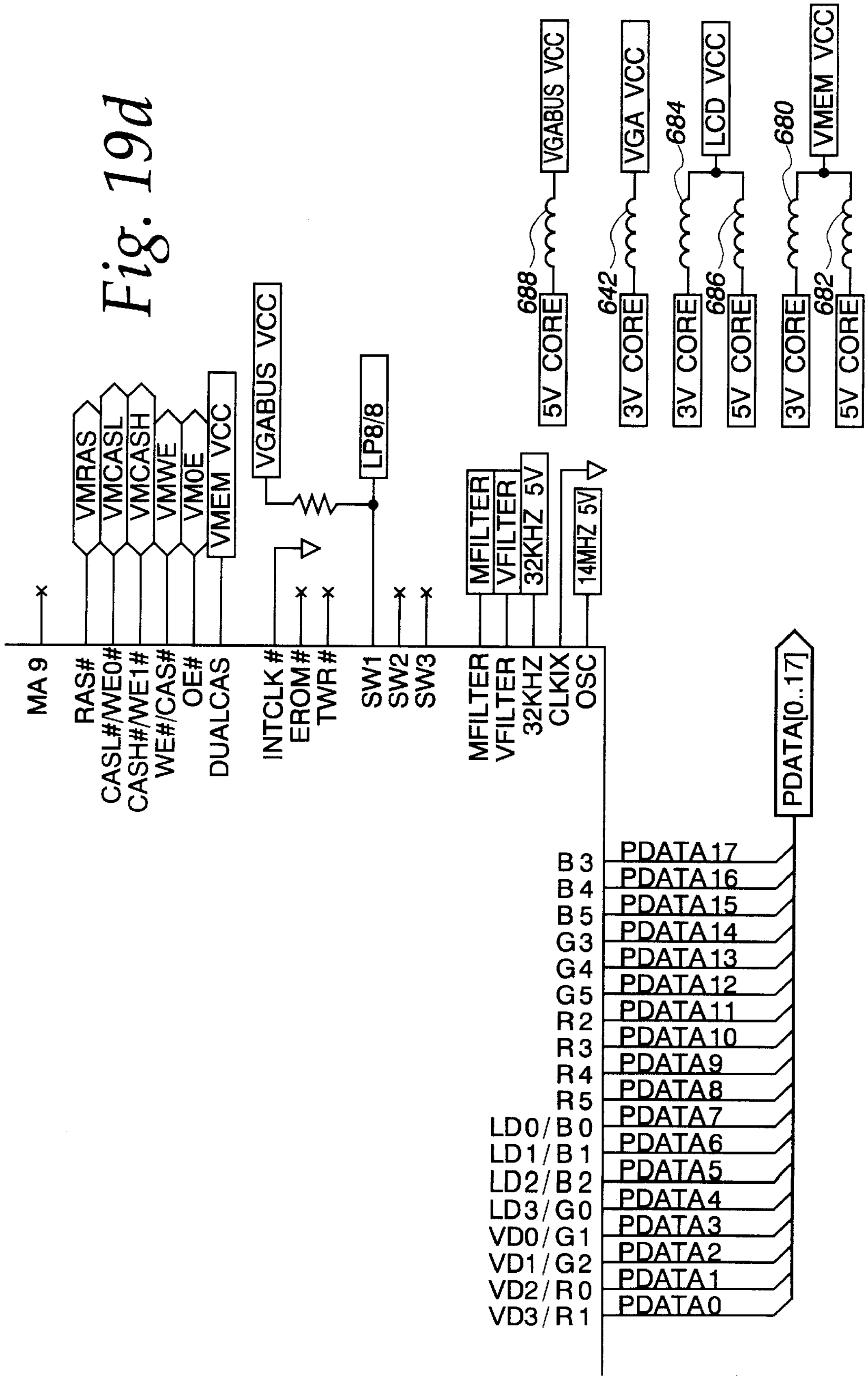
Figure 24A:
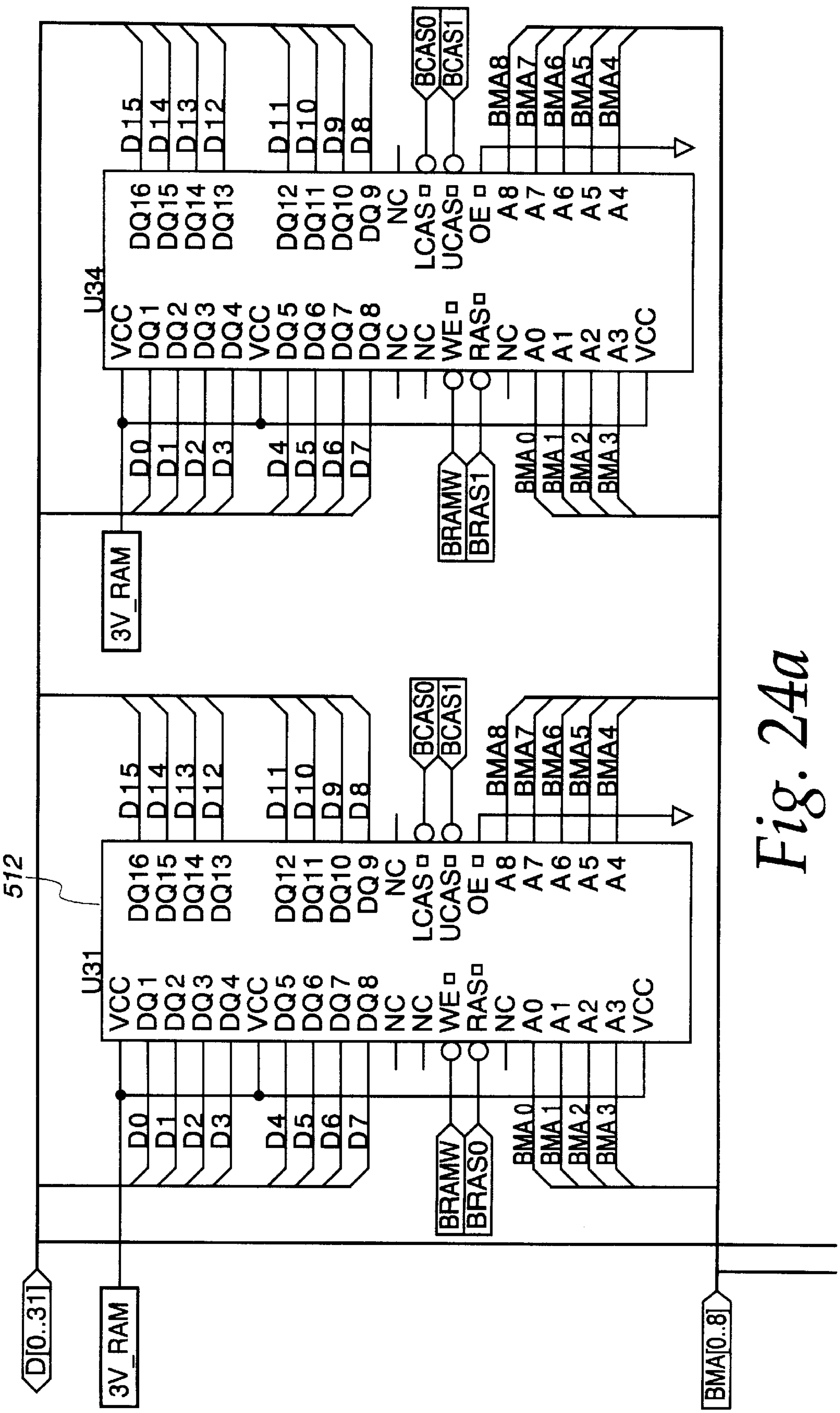
Figures 24A, 24B:
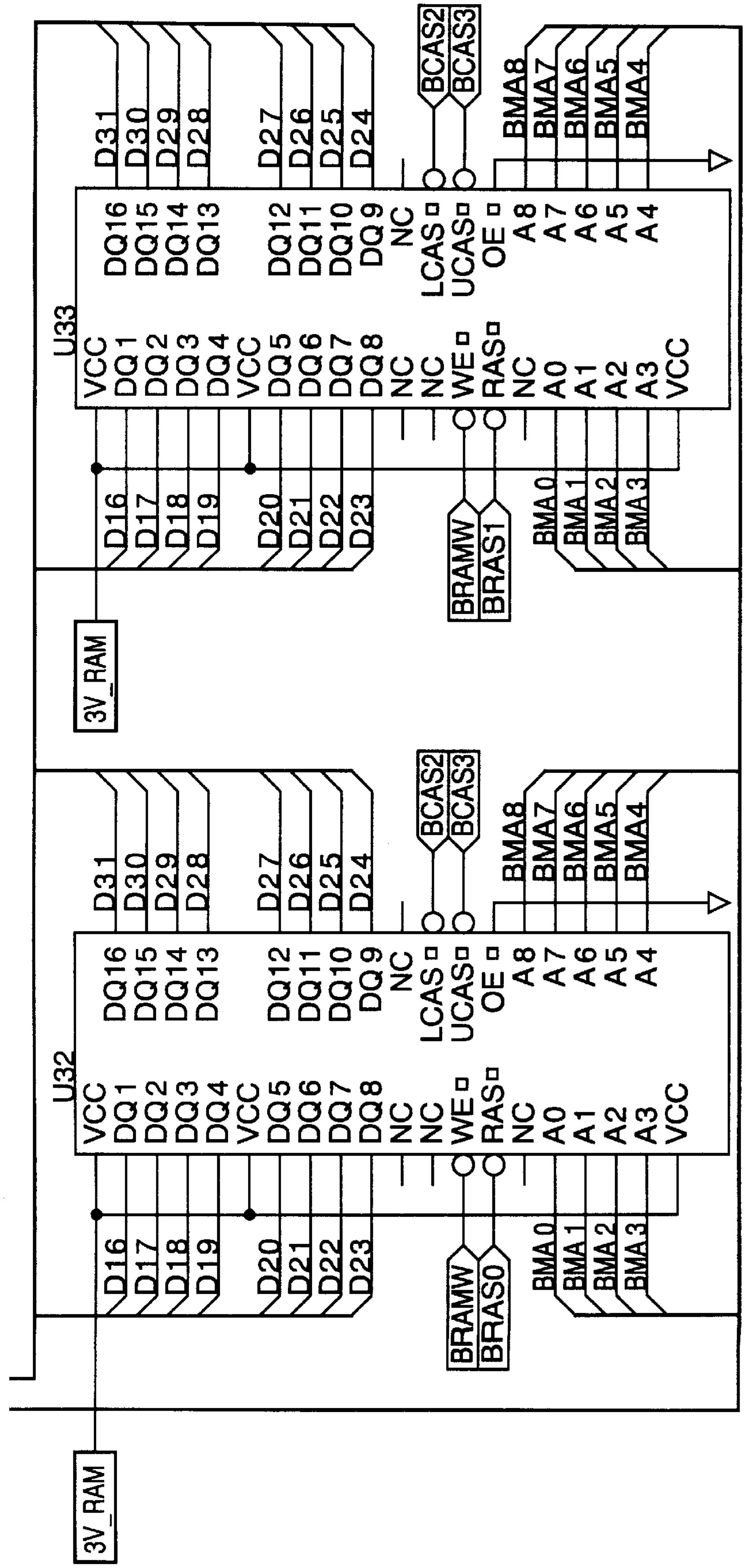

The system controller 129 functions as a DRAM controller and is capable of supporting up to 64 megabytes of memory, divided among one of four banks and can support 256K, 512K, 1M, 2M and 4M of memory in any width. The system controller 129 includes a pair of registers associated with each bank of DRAM. The first register stores the total amount of DRAM connected to the system while the second identifies the starting address for each bank. Referring to FIGS. 18 and 24, two 1 Mbyte banks are connected to the DRAM memory address bus BMA[0 . . . 8] and to the processor data bus 150, D[0 . . . 31].

In order to conserve power, 3-volt DRAM 111A is used. The 3-volt power supply 3V_RAM is applied to the VCC terminals of each of the DRAMS 111A. The 3-volt power supply 3V_RAM is available from the DC-to-DC converter 300 (FIG. 26) by way of a ferrite bead inductor 440 (FIG. 18). In particular, a 3-volt supply 3V_CORE available at the DC-to-DC converter 300 is applied to the ferrite bead inductor 440 to generate the 3-volt DRAM supply 3V_RAM. A plurality of bypass capacitors 425–439 (FIG. 18) are connected between the DRAM supply voltage 3V_RAM and system ground.

The system controller 129 generates the appropriate row address strobes (RAS) and column address strobes for the DRAM 111A. In particular, the column address strobe lines CAS0[0 . . . 3] are applied to the upper and lower column address strobe pins (UCAS and LCAS) on the DRAM 111A by way of a plurality of coupling resistors 442 to 450 (FIG. 12). Similarly, the row address signals RAS0 and RAS1 are applied to the row address strobe pins on the DRAM 111A by way of a plurality of coupling resistors 448 and 450. Writing to the DRAMS 111A is under the control of a DRAM write enable signal BRAMW, applied to the write enable pin WE on the DRAM 111A. The DRAM write enable signal BRAMW is generated by the system controller 129 by way of a coupling resistor 452.

An EEPROM or NVRAM 111B (FIG. 12) may be used to maintain system configuration parameters when the system is powered off. All user changeable parameters are stored in the EEPROM 111B. For example, pen calibration data and passwords, used during boot up, may be used in the EEPROM 452. The contents of the EEPROM 111B may be shadowed into a CMOS memory when the system is active. Communication with the EEPROM 111B is under the control of the system controller 129 and in particular, a pair of programmable input/output pins GPI01 and GPI02. The GPI01 provides a clock signal to the EEPROM 111B while the pin GPI02 is used for data transfer.

As discussed above, the wireless interface device 100 also includes the flash memory 117 (FIG. 25), which is used for storing the BIOS. The system controller 129 allows for direct shadowing of the BIOS by enabling the appropriate address space to read the FLASH/DRAM write mode which allows all reads to come from the flash device with writes to the DRAM 111A memory devices.

A main memory map as well as an I/O memory map are provided in Tables 3 and 4.

TABLE 3

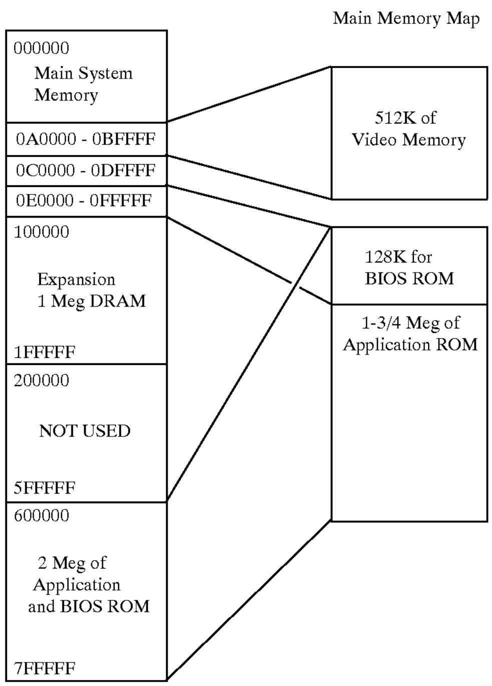

TABLE 4

I/O MEMORY MAP

| Memory Space Description | Memory Locations (HEX) |
|---|---|
| DMA Controller #1 | 00–0F |
| Not Used | 10–1F |
| Interrupt Controller #1 | 20–21 |
| Not Used | 22–23 |
| Evergreen Configuration Address | 24 |
| Not Used | 25 |
| Evergreen Configuration Data | 26 |
| Not Used | 27–3F |
| Counter/Timer | 40–43 |
| Not Used | 44–5F |
| Keyboard Controller | 60 |
| Port B | 61 |
| Not Used | 62–63 |
| Keyboard Controller | 64 |
| Not Used | 65–6F |

TABLE 4-continued

I/O MEMORY MAP

| Memory Space Description | Memory Locations (HEX) |
|---|---|
| NMI Enable, Real-Time Clock | 70, 71 |
| Not Used | 72–7F |
| DMA Page Registers | 80–8F |
| Not Used | 90–91 |
| Port A | 92 |
| Not Used | 93–9F |
| Interrupt Controller #2 | A0–A1 |
| Not Used | A2–CF |
| DMA Controller #2 | D0–DE |
| Not Used | DF–2FF |
| Pen Controller | 300 |
| Not Used | 301–3AF |
| Graphics Controller | 3B0–3DF |
| RF Controller | 3E0–3E7 |
| UART COM1 | 3E8–3EF |
| Not Used | 3F0–3FF |

In addition to system control features and DRAM control, the system controller 129 provides various other functions The power management function and NVRAM 10 controller have been discussed above. The system controller 129 also controls all operations on the local AT bus 150. The AT bus clock is derived from the clock CLK2IN pin that is divided to achieve an 8 MHz bus rate.

The system controller 129 also includes a number of programmable pins which enhance its flexibility. For example, four general purpose input/output pins GPIO[0 . . . 3] are provided; each of which may be independently set for input or output. The GPIO1 and GPIO2 pins are used for the EEPROM 111B as discussed above. The GPIO0 pin and GPIO3 pin may be used for various purposes. In addition to the programmable input/output pins, the system controller 129 includes two general purpose chip select pins GPCS1 and GPCS2 as well as a plurality of programmable output pins PC[0 . . . 9]. The programmable chip selects GPCS1 and GPCS2 are used for the pen controller 110A, UART 134 and the radio interface 114B.

Peripheral devices connected to the system ISA bus 151 are controlled by an integrated peripheral controller 128 as discussed above. The integrated peripheral controller 128 may be a PicoPower Model No. PT82C206F which can be operated at either 3.3 or 5 volts. As will be discussed in more detail below, the integrated peripheral controller 128 includes several subsystems such as: DMA Control; Interrupt Control; Timer Counter; RTC Controller; CMOS RAM and Memory Mapper.

The IPC 128 includes two type 8259A compatible interrupt controllers which provide 16 channels of interrupt levels, one of which is used for cascading. The interrupt controller processes all incoming interrupts in order as set forth in Table 5.

TABLE 5

INTERRUPT TABLE

| INTERRUPT | DESCRIPTION |
|---|---|
| Level 0 | Timer Channel 0 |
| Level 1 | Keyboard Controller 2 Cascade |
| Level 2 | Second Interrupt Controller |
| Level 3 | Not Used |
| Level 4 | COM1 |
| Level 5 | Pen Controller |
| Level 6 | Not Used |

TABLE 5-continued

INTERRUPT TABLE

| INTERRUPT | DESCRIPTION |
|---|---|
| Level 7 | Not Used |
| Level 8 | RTC Controller |
| Level 9 | Not Used |
| Level 10 | Radio Controller |
| Level 11 | Not Used |
| Level 12 | Not Used |
| Level 13 | Not Used |
| Level 14 | Not Used |
| Level 15 | Not Used |

The integrated peripheral controller (IPC) 128 (FIG. 14) is connected to the system data bus SD[0 . . . 15]. Addressing of the IPC 128 is accomplished by two bits SA0 and SA1 from the system address bus SA[0 . . . 23] and eight bits A[2 . . . 9] from the local address bus A[0.31]. The address bits from the local address bus A[2 . . . 8] are converted to 5 volts by way of a 3- to 5-volt signal converter 453 (FIG. 14) to develop the 5-volt address signals XA[2 . . . 8]. A 32-kilohertz clock signal 32-KHz from the clock generator 398 (FIG. 13) is applied to the clock input OSC1 of the IPC 128.

Figure 20:
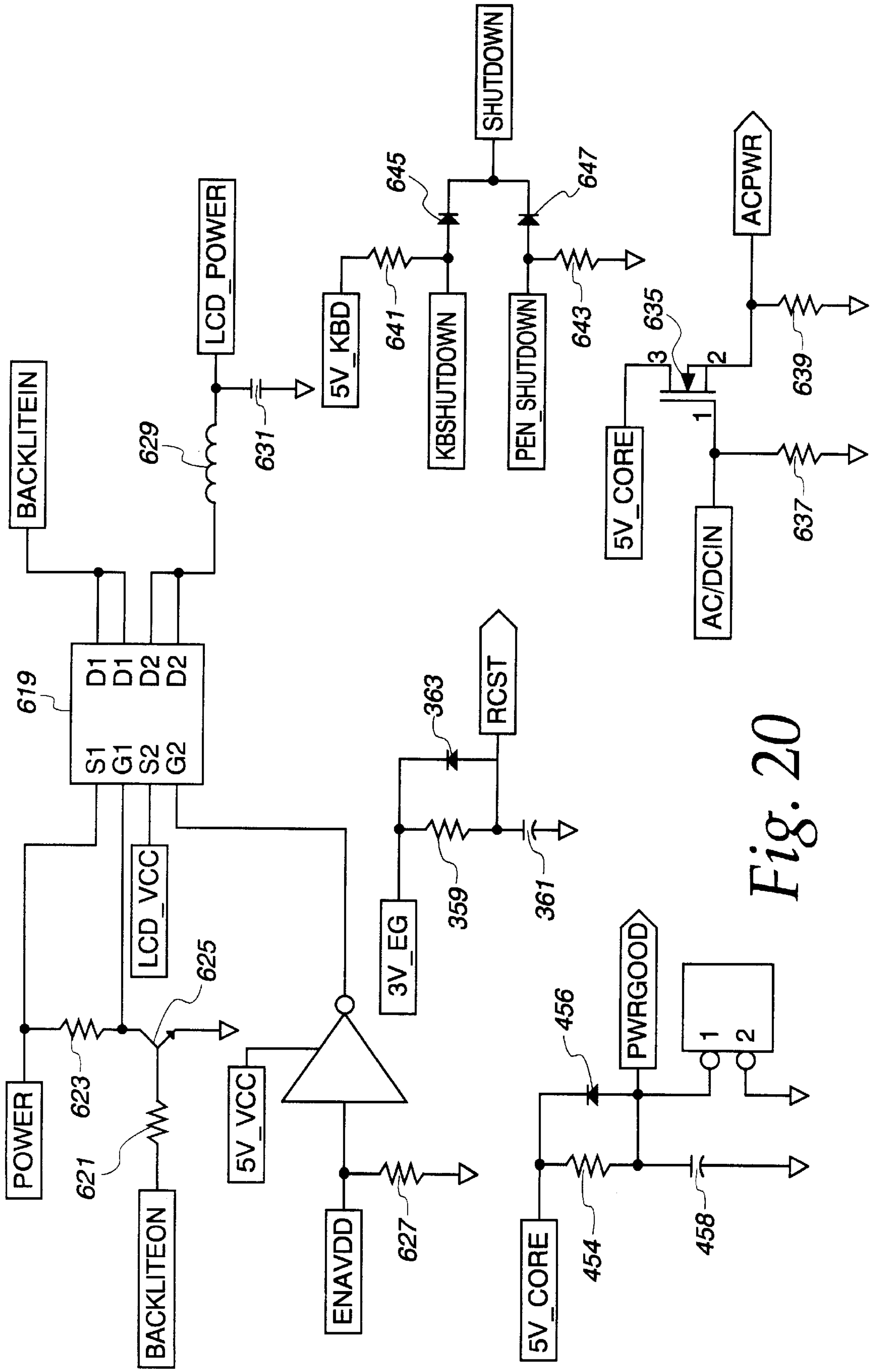

Referring to FIG. 20, in order to prevent spurious operation of the IPC 128 before the system power supply is stabilized, a power good signal PWRGOOD is applied to a power good pin PWRGD. The power good signal PWRGOOD is a delayed signal which assures that the 5-volt power supply has stabilized before the IPC 128 is activated. In particular, a 5-volt power supply 5V_CORE is applied to a delay circuit which includes a resistor 454, a diode 456 and a capacitor 458. Initially, the 5-volt power supply signal 5V_CORE is dropped across the resistor 454. While the capacitor 458 is charging, the diode 456 is in a non-conducting state. As the capacitor 458 begins to charge, the voltage at the anode of the diode 456 increases as a function of the RC time constant. When the capacitor 458 is fully charged, it approaches the value of the power supply voltage 5V_CORE. When the capacitor 458 becomes fully charged, the power good signal PWRGOOD is applied to a power good pin PWRGD at the IPC 128 for enabling the IPC 128 after the power supply has stabilized. The diode 456 provides a discharge path for the capacitor 458 when the power supply is shut off. The power good signal PWRGOOD is also used to reset the keyboard controller 125.

A 5-volt power supply 5V_CORE from the DC-to-DC converter 300 (FIG. 26) is applied to a ferrite bead inductor 460 (FIG. 13) to develop a 5-volt power supply 5V_206, which, in turn, is applied to the power supply pins VCC of the IPC 128. In order to delay application of the 5-volt power supply 5V_206 as discussed below, a charging circuit which includes a serially coupled resistor 462 and a capacitor 464 are connected between the power supply voltage 5V_206 and the system ground. A power supply reset signal PSRSTB, an active low signal, is applied to the junction between the resistor 462 and the capacitor 464 to discharge the capacitor 464 when the power supply is reset. Moreover, in order to stabilize the voltage of the power supply 5V_206, a plurality of bypass capacitors 466 and 468 are connected between the power supply 5V_206 and system ground.

In order to assure proper operation of the circuit, various pins of the IPC 128 are pulled low while various other pins are pulled high. In particular, the input/output read and write signals IOR and IOW are pulled up to the power supply voltage 5V_206 by a pair of pull-up resistors 470 and 472. In addition, the interrupt request pin IRQ10 is pulled up to the power supply voltage 5V_CORE by a pull-up resistor 474. The signals OUT2, REFREQ, AEN16 and AEN8 are pulled low by pull-down resistors 455–461 while the signal TEST_MODE2 is pulled up to the supply voltage 5V_CORE by a pull-up resistor 463.

Even though the IPC 128 includes a direct memory access (DMA) controller, this function is not required by the system. As such, the direct memory access request pins DREQ[0 . . . 7] are pulled low by a pull-down resistor 476 to system ground. In addition, as set forth in Table 5 above, various interrupt levels are unused. For example, as shown in Table 5, interrupt levels IRQ3, IRQ6, IRQ7, IRQ9, IRQ11, IRQ12, IRQ14, and IRQ15 are not used. Thus, these interrupt levels are pulled low by a pull-down resistor 478.

As illustrated in Table 5, interrupt levels IRQ4 and IRQ5 are used for the COM1 and pen controller interrupt levels, IRQ4 and IRQ5. To assure that these levels are proper, the IRQ4 and IRQ5, which are active high, are pulled low by pull-down resistors 480 and 482.

Figure 14B:
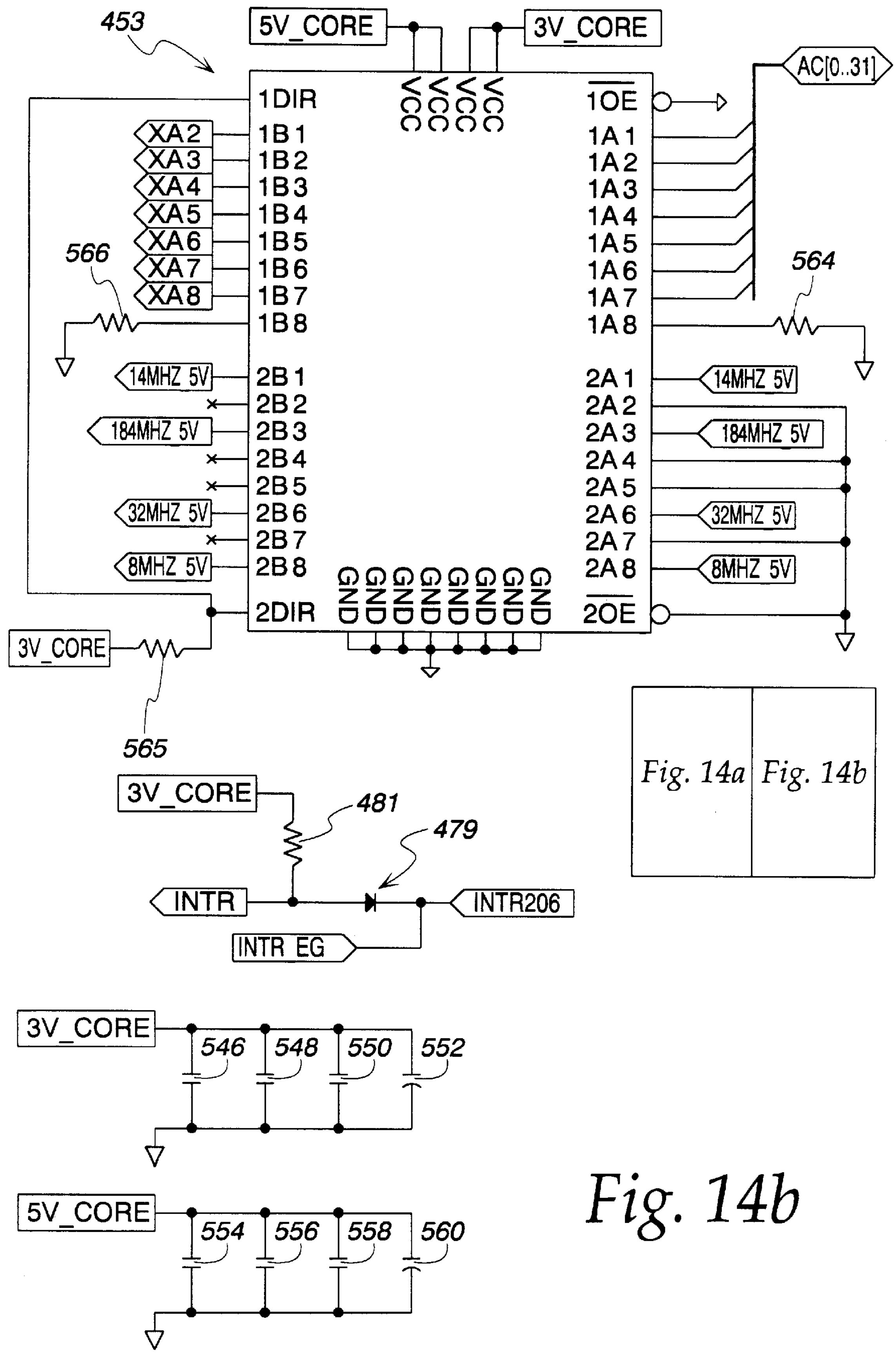

Interrupts by the system controller 129 and IPC 128 INTR_EG and INTR206 are applied to the CPU 112 by way of a diode 479 and pull-up resistor 481 (FIG. 14). In particular, the interrupt signals INTR_EG and INTR206 from the system controller 129 and IPC 128, respectively, are applied to the cathode of the diode 479 while the anode is lo pulled up to the power supply voltage 3V_CORE by the pull-up resistor 481. The logic level of the anode is set by the interrupt signal INTR, which is applied to the CPU 112. When the interrupt signals INTR206 and INTR_EG are high, the diode 479 does not conduct and the CPU 112 interrupt signal INTR will be high When either of the interrupt signals INTR_EG or INTR206 are low, the diode 479 conducts, forcing the CPU 112 interrupt signal INTR low.

The IPC 128 also includes a type 8254 compatible counter/timer which, in turn, contains three 16-bit counters that can be programmed to count in either binary or binary-coded decimal. The zero counter output is tied internally to the highest interrupt request level IRQ0 so that the CPU 112 is interrupted at regular intervals. The outputs of the timers 1 and 2 are available for external connection. In particular, internal timer 1 generates one signal, OUT1, which is used to generate a DRAM refresh request signal REFREQ to the CPU 112. The internal timer 2 generates an output signal OUT2 that is used to generate speaker timing. All three internal timers are clocked from a timer clock input TMR-CLK at 1.2 megahertz from the system controller 129.

As mentioned above, the IPC 128 includes a real time clock (RTC) controller which maintains the real time. The real operational time is maintained in a CMOS RAM that can be accessed through registers 70H and 71H. The memory map for the CMOS memory is provided in Table 6 as shown below:

TABLE 6

CMOS MEMORY MAP

| INDEX | FUNCTION |
|---|---|
| 00H | Seconds |
| 01H | Seconds Alarm |
| 02H | Minutes |
| 03H | Minutes Alarm |
| 04H | Hours |
| 05H | Hours Alarm |

TABLE 6-continued

| CMOS MEMORY MAP | |
|---|---|
| INDEX | FUNCTION |
| 06H | Day of Week |
| 07H | Day of Month |
| 08H | Month |
| 09H | Year |
| 0AH | Registry |
| 0BH | Register B |
| 0CH | Register C |
| 0DH | Register D |
| OEH–7EH | User RAM |

The area designated as User RAM is us ed by the system BIOS to save the status of the system configuration registers. The alarm bytes may be used to set and generate an interrupt at a specific time. When periodic interrupt is required, the two most significant bits in the alarm register can be set high.

Figure 13A:
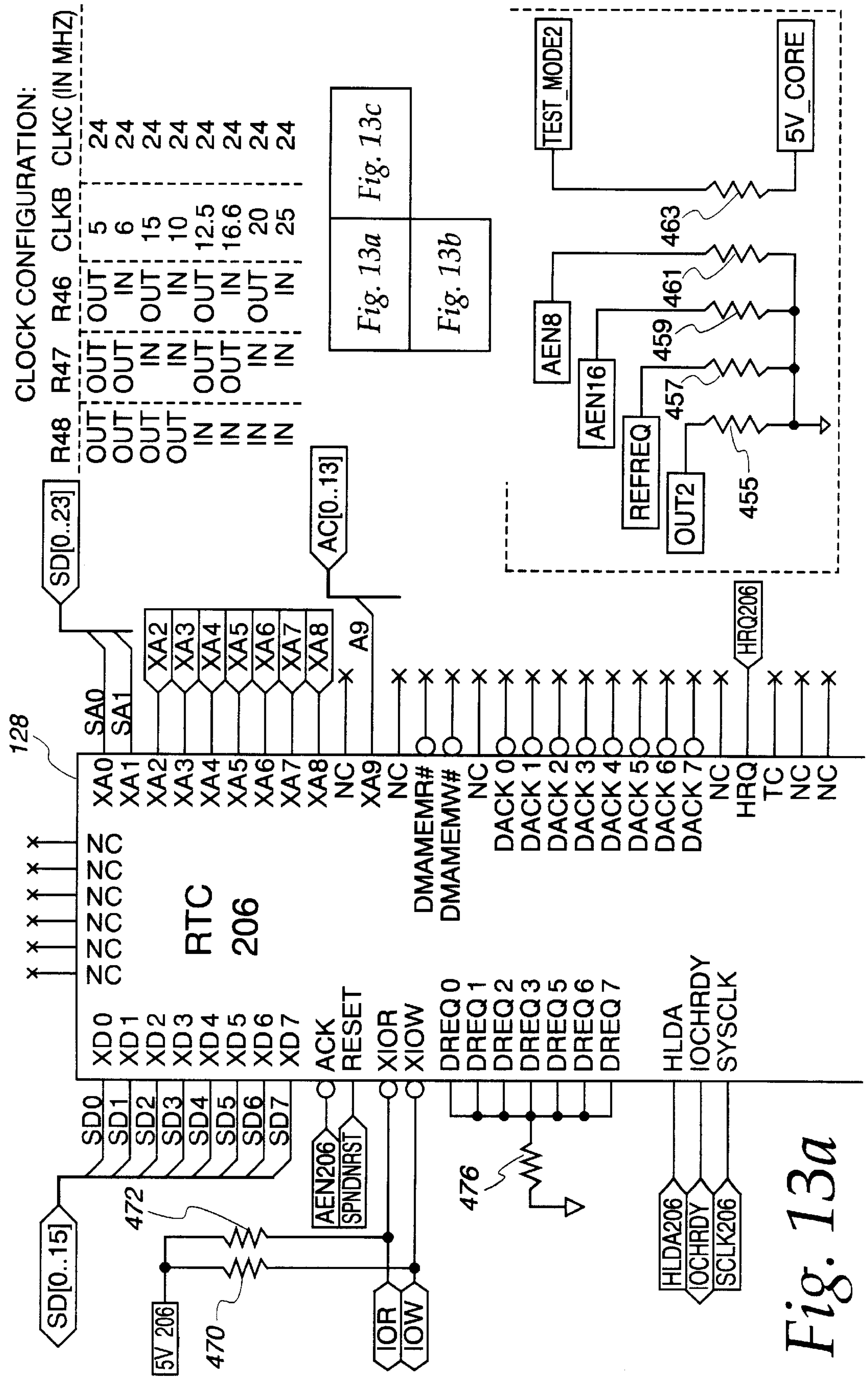
Figure 13B:
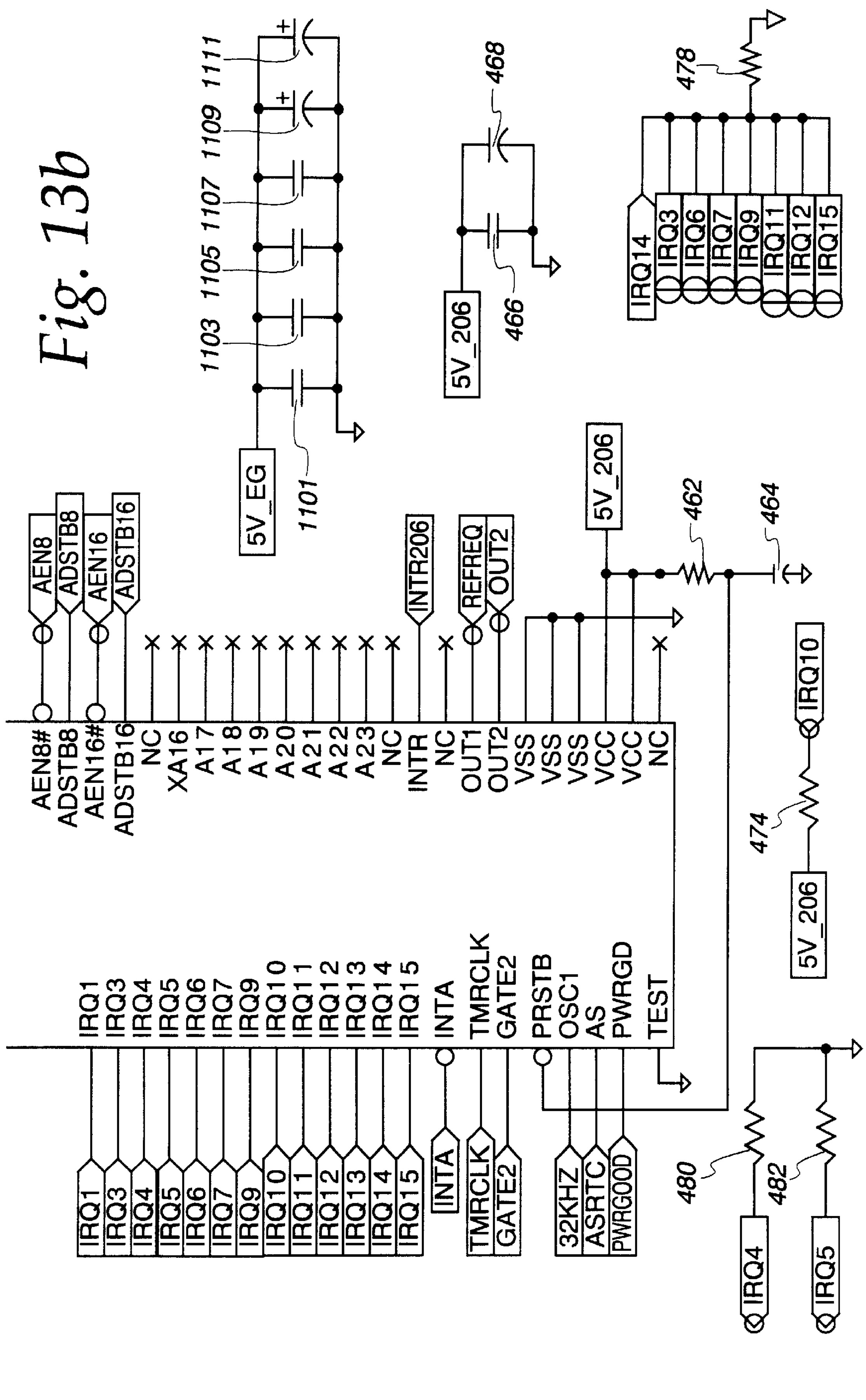
Figure 13C:
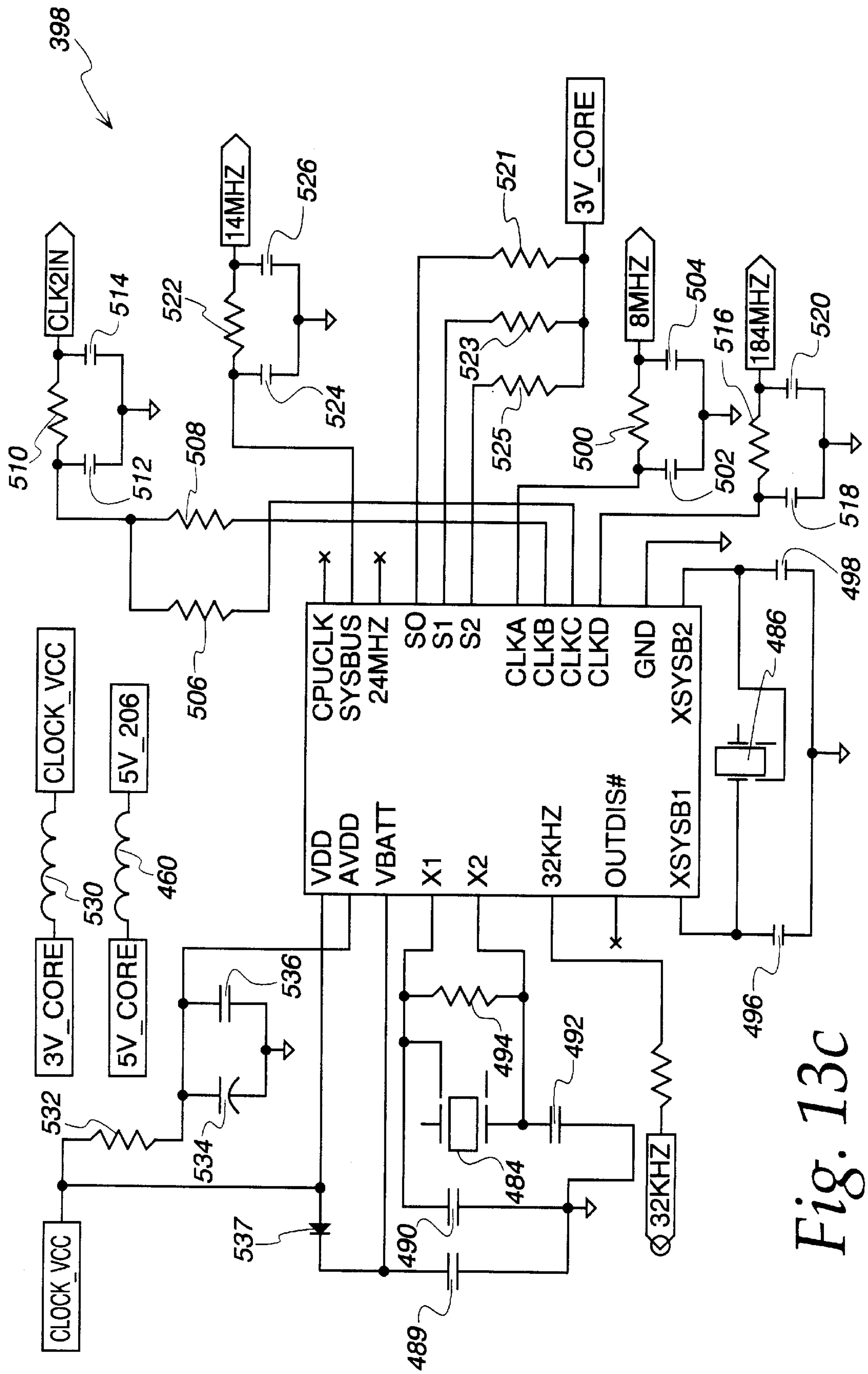

The various clock signals used for the system are provided by the clock generator circuit 398 (FIG. 13). The clock circuit 398 includes a clock generator, for example, an Integrated Circuit Designs Model No. ICD2028. A 14.318 MHz crystal 484 and a 32.768 KHz crystal 486 are applied to the clock generator 488. In particular, the crystal 484 is applied to a pair of X1 and X2 input pins along with a plurality of capacitors 489, 490, 492 and an input resistor 494. Similarly, the crystal 486 is applied to input pins XSYSB1 and XSYSB2. A pair of capacitors 496 and 498 are connected across the crystal 486.

The clock generator IC 488 provides three clock outputs CLKA, CLKB and CLKD. The clock A output CLKA is used to develop an 8-MHz clock signal for the keyboard controller 125 by way of a resistor 500 and capacitors 502 and 504. The clock B output CLKB is used to develop a clock 2X output signal CLK2IN for the system controller 129 by way the resistors 506, 508 and 510 and a pair of capacitors 512 and 514. The clock D output signal CLKD is used to generate a 1.84 MHz signal for use by the Universal Asynchronous Receiver Transmitter (UART) 134 by way of a resistor 516 and capacitors 518 and 520. As mentioned above, the system controller 129 also requires a 14 MHz clock signal This clock signal is developed by way of a system bus output pin SYSBUS, a resistor 522 and a pair of capacitors 524 and 526.

Figure 26A:
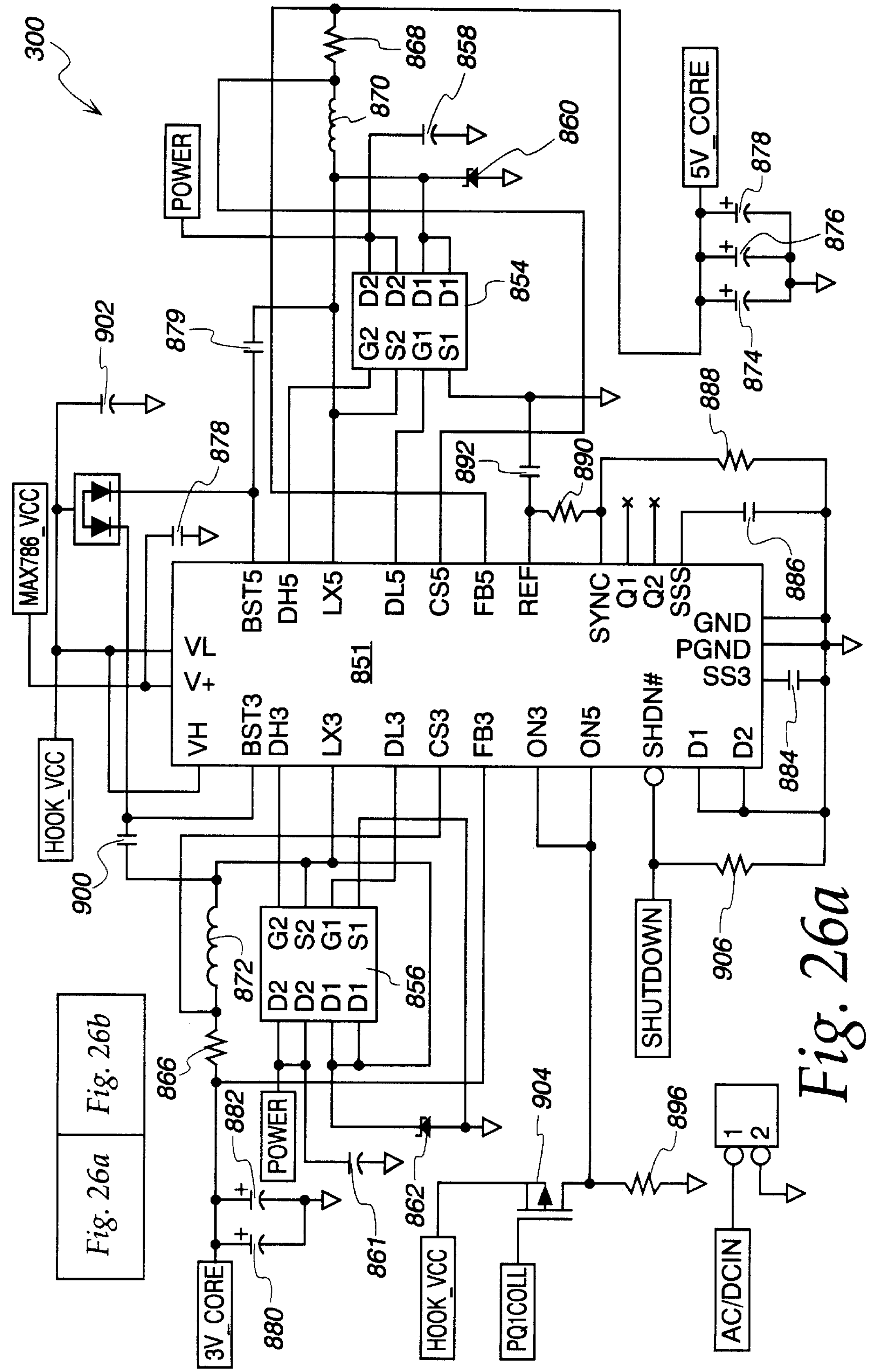
Figure 26B:
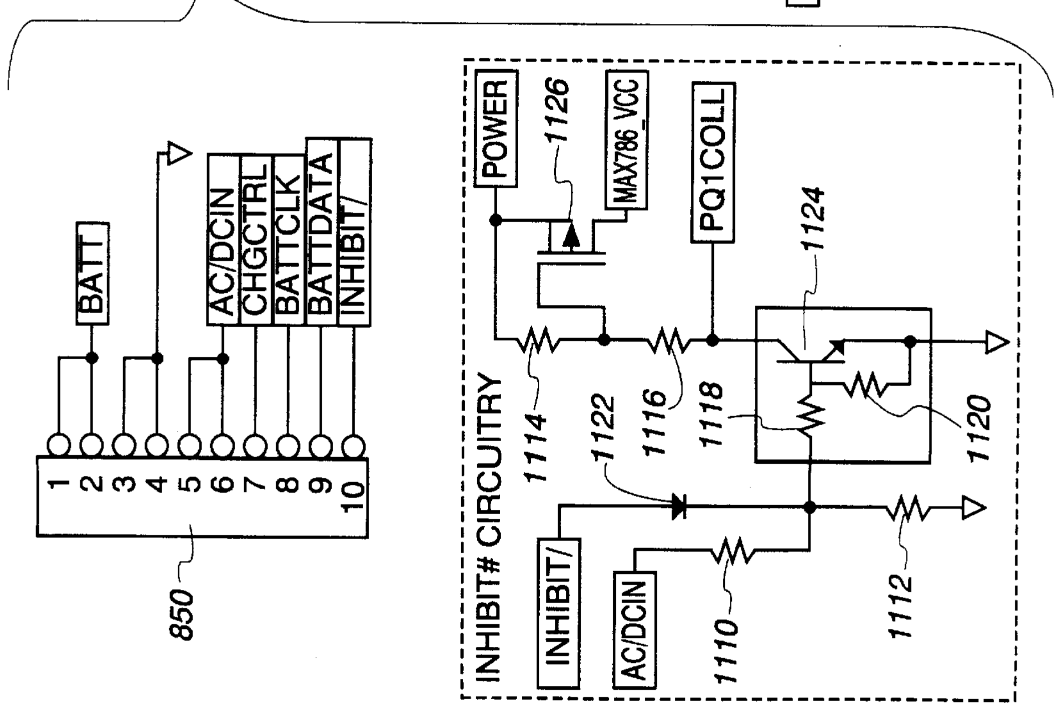

Selection of the various clock output signals is available by way of the select pins S0, S1 and S2. These pins S0, S1 and S2 are pulled up to the 3-volt power supply 3V_CORE by way of pull-up resistors 521, 523 and 525. The 3-volt power supply signal 3V_CORE is available from the DC-DC converter 300 (FIG. 26).

The clock generator 488 utilizes a 3-volt power supply CLOCK_VCC (FIG. 13). The 3-volt power supply CLOCK_VCC is available from the DC-to-DC converter 300 (FIG. 26) by way of an in-line ferrite bead inductor 530. In particular, the 3-volt power supply 3V_CORE is applied to the ferrite bead inductor 530 to generate the power supply for the CLOCK_VCC for the clock generator 488. This power supply CLOCK_VCC is applied to the power supply pin VDD. The power supply signal CLOCK_VCC is also used as analog supply AVDD to the clock generator IC 488 and is applied to the analog supply AVDD by way of the resistor 532 and a pair of capacitors 534 and 536. The power supply signal CLOCK_VCC is also applied to the battery pin VBATT of the clock generator IC 488 by way of a diode 537 to prevent any back feeding.

A number of the circuits in the system operate at either 3.3 volts or 5 volts. Thus, a plurality of bi-directional signal level translators 542 and 544 (FIG. 14) are provided, as well as the translator 453 previously discussed. The signal level translators 453, 542 and 544 may be as supplied by Integrated Circuit Technology, Model No. FCT164245T. Each of the signal level translators 453, 542 and 544 includes a 3-volt supply 3V_CORE and a 5-volt supply 5V_CORE, available from the DC-to-DC converter 300 (FIG. 26). In order to stabilize the voltage of the 3- and 5-volt power supplies, 3V_CORE and 5V_CORE, a plurality of bypass capacitors are utilized In particular, the bypass capacitors 546 through 552 are connected between the 3-volt supply 3V_CORE and system ground. Similarly, the bypass capacitors 554 through 560 are connected between the 5-volt supply 5V_CORE and system ground. The ground terminals of each of the signal level translators 542, 544 and 453 are also tied to system ground.

Each of the signal level translators 542, 544 and 453 includes two 8-bit programmable input/output pins. More particularly, the first 8-bit group 1A/1B[1 . . . 8] is under the control of an operate/enable pin 1OE, which is active low, while the second bank 2A/2B[1 . . . 8] is under the control of an output/enable pin 2OE, also active low. The direction of the input pins and output pins (i.e., A relative to B) is under the control of direction pins 1DIR and 2DIR. The direction pin 1DIR controls the direction of the pins 1A/1B[1 . . . 8], while the pin 2DIR controls the direction of the pins 2A/2B[1 . . . 8].

The signal level translator 453 is used to convert the local data bus bits D[16 . . . 31] and the system data bus bits SD[0 . . . 15]. Both the local data bus D[16 . . . 31] as well as the system data bus SD[0 . . . 15] are bi-directional. In this application the processor bus 150 data bits D[31 . . . 16] are being mapped to the system data bus bits SD[15 . . . 0].

The direction of the signal level translator 542 is under the control of a signal direction signal SDIR, available at the system controller 129. The signal direction signal SDIR is applied to both the direction control pins 1DIR and 2DIR of the signal level translator 542. The operate/enable inputs 1OE and 2OE are under the control of system data enable inputs signals, SDEN3 and SDEN2, respectively; also under the control of the system controller 129.

The signal level translator 544 is used to map the signal levels of the local address bus bits A[23 . . . 8] to the system address bus bits SA[23 . . . 8]. More particularly, the local address bits A[23 . . . 16] are applied to pins 1A[1 . . . 8] while the local address bits A[15 . . . 8] are applied to the pins 2A[1 . . . 8]. Similarly, the system address bits SA[23 . . . 16] are connected to the pins 1B[1 . . . ], while the system address bits SA[15 . . . 8] are applied to the pins 2BL[1 . . . 8]. In this case, the operate/enable pins 1OE and 2OE, both active low, are connected to system ground in order to permanently enable the signal level translator 544 The direction control pins 1DIR and 2DIR are permanently set such that the data always flows from A to B. In particular, the directional pins 1DIR and 2DIR are connected to the 3-volt power supply 3V_CORE by way of a pull-up resistor 562.

The signal level translator 542 is used to convert the signal levels of the 3-volt clock output signals 14 Mhz, 1.84 Mhz, 32 Khz and 8 Mhz to 5-volt levels, as well as to convert the 3-volt local address bits A[2 . . . 8] to 5-volt address bits XA[2 . . . 8] for use by the IPC 128, as discussed above. More particularly, the system address bits, A[2 . . . 8] are applied to the pins 1A[1 . . . 8]. The clock signals 14 MHz, 1.84 MHz, 32 KHz and 8 MHz are applied to the pins 2A1, 2A3, 2A6 and 2A8, respectively, to produce corresponding 5-volt level signals 14 MHz_5V, 1.84 MHz_5V, 32 KHz_5V and 8 MHz_5V signals at pins 2B1, 2B3, 2B6 and 2B8, respectively. The unused pins 1A8 and 2B8 are pulled low by way of pull-down resistors 564 and 565, respectively The operate/enable pins 1OE and 2OE are tied to system ground to permanently enable the signal level translator 542. The directional pins 1DIR and 2DIR are pulled up to the 3-volt power supply voltage 3V_CORE by way of a pull-up resistor 566 to permanently force the direction from A to B.

Referring to FIG. 15, the system includes a keyboard controller 125, which performs several functions, including battery monitoring, LCD status control, brightness and contrast control, as well as keyboard control. In addition, the system also maintains the status of the remaining battery life, and also provides information to the system controller 129 when the battery voltage is low or other critical battery condition has occurred. In operation, the keyboard controller 125 will maintain the current status of the battery level until data is requested. When a critical battery condition event occurs, the keyboard controller 125 generates an SMI interrupt. As discussed above, the intelligent battery pack (IBP) 130 provides an indication of the percentage of remaining battery capacity. Communication between the IBP 130 and the keyboard controller 125 is by way of a bi-directional serial data bus, which includes a clock line BATCLK and a data line BATDATA. The data line BATDATA is a bi-directional line, which allows for bi-directional communication with the IBP 130. The clock line BATCLK is driven by the IBP 130, but may be pulled low by the keyboard controller 125.

The bi-directional serial data bus is connected to the port pins P4.2 and P4.3 on the keyboard controller 125. In particular, the port pin P4.2 is used for the serial battery data BATTDATA. An NPN transistor 570 is connected to the port pin P4.2 to disconnect the keyboard controller 125 from the IBP 130 during power down. In particular, the collector terminal of the NPN transistor 570 is connected to the port pin P4.2 while the emitter terminal forms a battery data signal BATTDATA. The base of the NPN transistor 570 is biased on by way of a biasing resistor 572 that is connected to a 5-volt power supply 5V_KBD. The collector is pulled high by way of a pull-up resistor 574 connected to the 5-volt power supply 5V_KBD.

Similarly, the battery clock signal BATTCLK is connected to the port 4.3 on the keyboard controller 125 by way of an NPN transistor 576. The collector terminal of the NPN transistor 576 is connected to the port 4.3 as well as to a pull-up resistor 578 and the 5-volt power supply 5V_KBD. The NPN transistor 576 is turned on anytime the power supply to the keyboard 5V_KBD is powered up by way of a biasing resistor 580. The emitter of the NPN transistor 576 forms the battery clock signal BATTCLK.

Figure 29A:
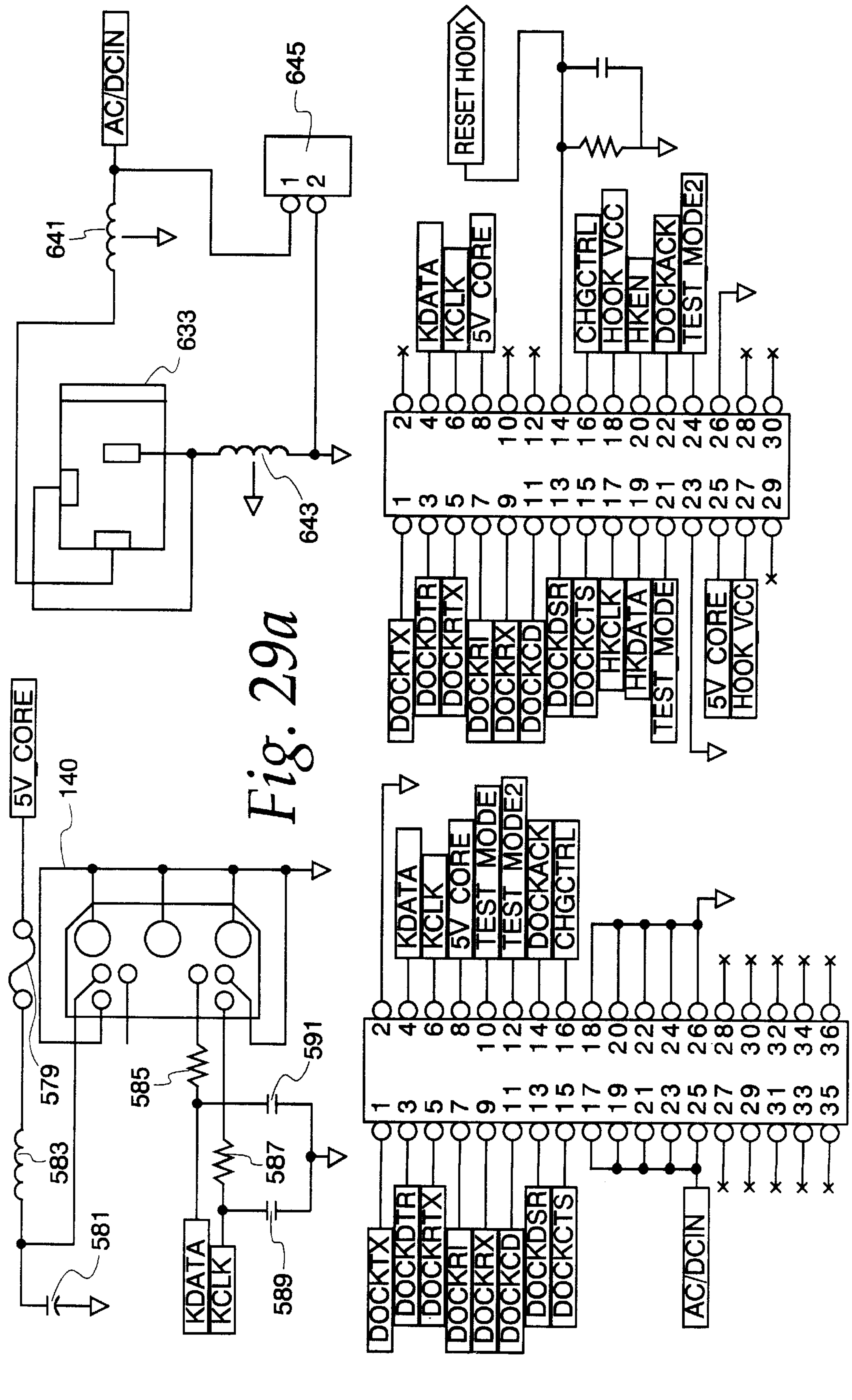
Figure 29B:
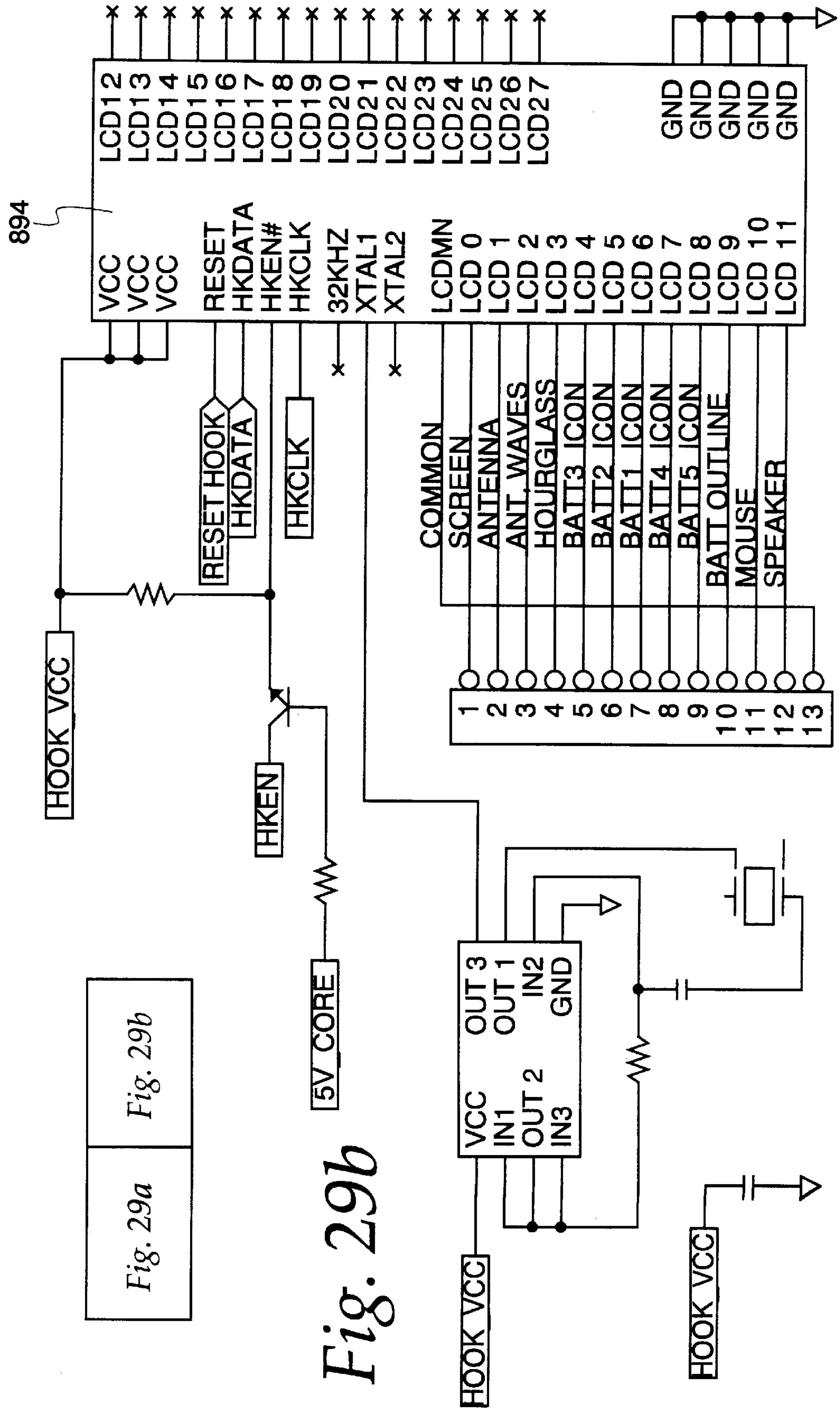

In addition to battery management, the keyboard controller 125 also supports an external PS/2-type keyboard, as well as a PS/2-type bar code reader, connected to a keyboard connector 140 (FIG. 29). Communication between the keyboard or bar code reader (not shown) is by way of a standard type PS-2 two-wire bus connected to serial ports P4.6 and P4.7. In particular, the keyboard data KDATA is pulled up to the 5-volt voltage supply 5V_CORE by way of a pull-up resistor 582 while the keyboard clock signal KCLK is pulled up the 5-volt supply 5V_CORE by way of a pull-up resistor 584.

Referring to FIG. 29, the keyboard connector 140 may be a 6-pin MINI-DIN connector or a DB-8 connector as shown. Pins 6–9 are connected to system ground. Pin 4 of the connector 140 is pulled up to the power supply voltage 5V_CORE by way of a fuse 579 and is filtered by a capacitor 581 and an inductor 583. The data signal KDATA is applied to pin 1 by way of a current-limiting resistor 585, while the clock signal KCLK is applied to pin 5 by way of a current-limiting resistor 587 and a pair of capacitors 589 and 591. These clock and data signals KCLK and KDATA are connected to the ports P4.6 and P4.7, respectively, for serial communication with an external keyboard or bar code reader.

Additionally, the keyboard controller 125 may be used to control the brightness level as well as the contrast level of the LCD display. More particularly, referring to FIG. 27, a contrast signal CONTRAST, available at port 0, pin 1 of the keyboard controller 125 (FIG. 15) is used to adjust the contrast level of the LCD display. The contrast signal CONTRAST is applied to an adjustment terminal ADJ of a negative 24-volt DC voltage supply, which can be incrementally adjusted in steps by a 24-volt DC supply 586 (FIG. 27), for example, a Maxim Model No. 749, which provides for 64-step adjustment. Thus, each high pulse will increment the contrast of the LCD display by one step. With a 64-step device, sixty-three pulses rolls the counter over and decreases the contrast by 1. The 24-volt DC supply 586 is under the control of an enable signal ENAVEE, available from the video controller 113A (FIG. 19).

Figure 27:
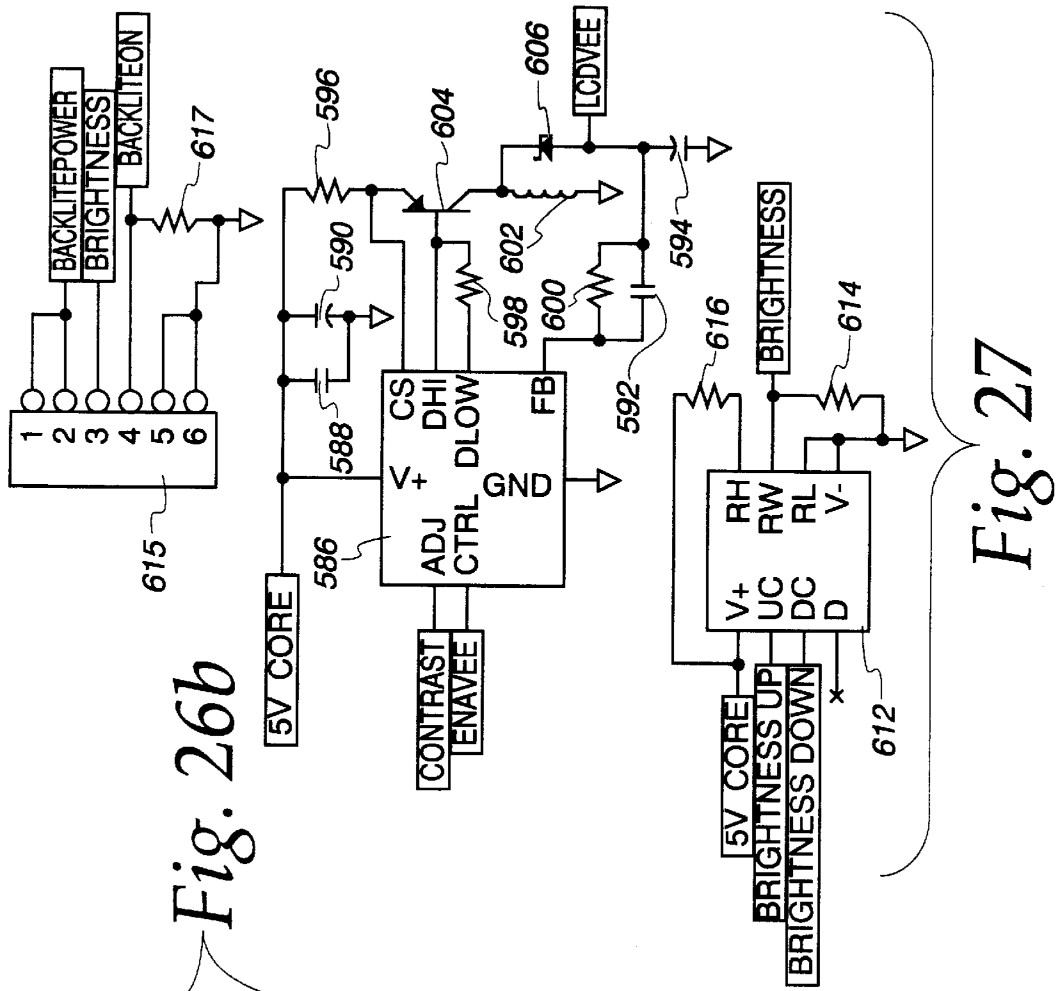

In order to assure proper operation, the 24-volt supply 586 is connected in a circuit as shown in FIG. 27, which includes a plurality of capacitors 588, 590, 592, 594; a plurality of resistors 596, 598, 600 an inductor 602; a PNP transistor 604; and a zener diode 606. The output of the circuitry is a nominal negative 24-volt signal LCDVEE, which is adjustable in 64 increments by way of the CONTRAST signal, as discussed above, to vary the contrast level of the LCD display.

The keyboard controller 125 also controls the brightness of the LCD display. In particular, brightness adjustment signals BRIGHTNESS_UP, BRIGHTNESS_DOWN (FIG. 15) are available at port 1, pins 6 and 7. These signals BRIGHTNESS_UP and BRIGHTNESS_DOWN are normally pulled up to the 5-volt supply 5V_KBD by way of a pair of pull-up resistors 608 and 610. These signals BRIGHTNESS_UP and BRIGHTNESS_DOWN are applied to a digital output potentiometer 612 (FIG. 27), for example a Dallas Semiconductor Model No. DS1669-50. The digital output potentiometer 612 is powered by a 5-volt power supply 5V_CORE, which is also used to pull up an unused output terminal, RH.

The brightness control signals BRIGHTNESS_UP and BRIGHTNESS_DOWN are applied to the increment and decrement terminals, UC and DC of the digital output potentiometer 612. The output of the digital output potentiometer 612 is a variable resistance signal, which forms the brightness control signal BRIGHTNESS. This brightness control signal BRIGHTNESS is pulled down by a pull-down resistor 614.

The brightness control signal BRIGHTNESS from the digital output potentiometer 612, as well as a backlight control signal BACKLITEON and a backlight power signal BACKLITEPOWER are connected to the system by way of a 6-pin connector 615 (FIG. 27). The backlight control signal BACKLITEON is connected to pin 4 of the connector 615 and pulled low by way of a pull-down resistor 617. The power control signal BACKLITEPOWER is applied to pins 1 and 2 while the backlight brightness control signal BRIGHTNESS is applied to pin 3. The backlight control signal BACKLITEON is available from the video controller 113A (FIG. 19) and is used to power the backlight on the LCD. The backlight power signal BACKLITEPOWER, available from an FET 619 (FIG. 20), is under the control of the backlight power control signal BACKLITEON, available from the video controller 113A (FIG. 19).

The FET 619 (FIG. 20) is used to control power to both the LCD as well as the backlight. In particular, referring to FIG. 20, the backlight power control BACKLITEON, is used to control an NPN transistor 617 by way of a current-limiting resistor 621. The NPN transistor 621, in turn, is used to control the FET 619 to generate the backlight power signal BACKLITEPOWER at the drain terminal D1. The main power signal POWER (FIG. 28) is connected to the collector of the NPN transistor 617 by way of a resistor 623. The main power signal POWER is also applied to a source terminal 51 of the FET 615. A gate terminal G1 of the FET 615 is connected between the resistor 623 and the collector of the NPN transistor 625. The backlight power control signal BACKLITEON is used to conserve power under certain power management conditions discussed above. This signal BACKLITEON controls the NPN transistor 625. In particular, in a normal state, the backlight power control signal BACKLITEON is high, which turns ON the NPN transistor 625. When the NPN transistor 625 is ON, the gate terminal G1 of the FET 619 is connected to system ground, which turns the FET 619 ON, thereby connecting the main power signal POWER to the drain terminal D1 of the FET 619 to provide a power signal BACKLITEIN, which is filtered by a ferrite bead inductor 625 (FIG. 28) to provide the backlight power signal BACKLITEPOWER, that is applied to the LCD by way of the connector 615 (FIG. 27). When the backlight power control signal is low, for example, during a power management mode, the NPN transistor 625 turns OFF, thereby connecting the gate G1 of the FET 619 to the main power signal POWER by way of the resistor 623, thereby turning the FET 619 OFF, disconnecting power to the LCD.

The FET 619 may be supplied as a dual element with two FETs in a single package. As shown in FIG. 20, the gate G2, source S2 and drain D2 terminals of the FET 619 are used to control power to the LCD, under the control of an LCD enable signal ENAVDD, available from the video controller 113A (FIG. 19). In particular, the LCD enable signal ENAVDD is normally high and is de-asserted to disable the LCD power supply LCD_POWER This LCD enable signal ENAVDD is pulled low by a pull-down resistor 627 and applied to an inverter 629, whose output is connected to the gate terminal G2 of the FET 619. The LCD power supply signal LCD_VCC (FIG. 19) is applied to the source terminal S2 of the FET 619, while the drain terminal D2 represents the LCD power signal LCD_POWER, filtered by an inductor 629 and a capacitor 631. The LCD power signal LCD_POWER is connected to the LCD by way of the connectors 732 or 734 (FIG. 22) In operation, the LCD power enable signal ENAVDD is high, which turns on the FET 619 to enable the LCD power supply LCD_POWER. When the LCD power enable signal ENAVDD is de-asserted, the FET 619 is turned OFF.

The keyboard controller 125 (FIG. 15) is connected to the system data bus SD[0 . . . 7]. The system address bit SA2 is used for addressing the keyboard controller 125. In particular, the address terminal of the keyboard controller 125 is connected to bit SA2 of the system address bus SA[0 . . . 23].

Power to the keyboard controller 125 is provided by way of a 5-volt supply 5V_KBD, supplied to the power supply terminal VCC. The 5-volt supply 5V_KBD, provided by the DC-to-DC converter 300 (FIG. 26) by way of an in-line ferrite bead inductor 618. In addition to supplying power to the keyboard controller 125, the 5-volt supply 5V_KBD is used to pull-up various pins by way of pull-up resistors 620, 622, 624, 626, 628, 630, 632 and 634. In order to stabilize the 5-volt power supply 5V_KBD, a plurality of bypass capacitors 636 and 638 are connected between the power supply 5V_KBD and system ground.

As mentioned above, the keyboard controller 125 has various functions. One of those functions is to monitor when AC power is plugged into the machine from an AC adapter plug 633 (FIG. 29), connected to the external power supply signal AC/DCIN by way of a pair of EM1 filters 641 and 643, and a connector 645. In particular, an AC power signal ACPWR, available from an FET 635 (FIG. 20), is applied to port 3, pin 1 (FIG. 15) by way of an inverter 636. The external power supply signal AC/DCIN, available from the AC plug 633, is used to control the gate terminal of the FET 635, normally pulled down a pull-down resistor 637. A 5-volt supply 5V_CORE is connected to the drain terminal while the source terminal is used for the AC power signal ACPWR, pulled down by a pull-down resistor 639. When an external power source is not connected to the FET 635, the signal ACPWR will be low. Once external power is connected to the connector 633, the signal AC/DCIN from the IBP 130 goes low, which, in turn, turns on the FET 635 to cause the signal ACPWR to go high.

The keyboard controller 125 also monitors the status of the radio. As such, an output from the radio TX/RX_LED pin is applied to pin 2 of port 3 of the keyboard controller 125 by way of an inverter 638. When pin 1 of port 3 is high, the keyboard controller 125 interprets that the radio is in a transmit mode. Another signal from the radio CD_LED is used to provide an indication to the keyboard controller 125 that that radio is in a receive mode. This signal CD_LED is applied to pin 2 of port 3.

An 8 MHz clock signal 8 MHz_5V is used to drive the keyboard controller 125. The clock signal 8 MHz_5V is developed by the clock generator 398 and converted to a 5-volt level by way of the translator signal level translator 452.

The video controller 113A (FIG. 19) controls the video functions. The video controller 113A, for example, a model number CL-GD 6205 from Cirrus Logic, can support various video modes including a mono STN and a color TFT panel with up to 640×480 with 64 shades of gray. In addition, the video controller 113A will support 1024 by 768 resolution with 16 colors on a CRT through the aid of its on-board digital to analog converter.

The video controller 113A utilizes two clock sources for timing, generated by an internal clock generator to produce the required frequencies for the display and memory timing. Two separate analog power supply sources AVCCMCLK and AVCCVCLK are provided to the analog power supply inputs AVCC1VCLK and AVCC4MCOK on the video controller 113A. These analog power supply sources AVCCMCLK and AVCCVCLK are derived from the 3-volt power supply 3V_CORE, available at the DC-to-DC converter 300 (FIG. 26). In particular, the 3-volt power supply 3V_CORE is used to develop a 3-volt power supply VGA_VCC by way of an in-line ferrite bead inductor 642. The power supply VGA_VCC, in turn, is filtered by a plurality of bypass capacitors 644–642, connected between the power supply VGA_VCC and system ground. The 3-volt power supply VGA_VCC is used to develop the analog power supplies AVCCMCLK and AVCCVCLK by way of a plurality of resistors 654 and 656 as well as a plurality of by pass capacitors 658 to 664, connected to an analog ground AGND. The analog ground AGND is tied to the digital ground GND by way of a ferrite bead conductor 664.

The keyboard controller 125 also provides various miscellaneous system functions by way of its I/O ports 0, 1, and 3. Five port bits P0.0–P0.5 of port 0 are used for system control. Bit 0 is used to generate a signal KBC-P00, an active high signal, which disables the general purpose chip select signals GPCS1 and GPCS2, available at the system controller 129 (FIG. 12) during boot-up, until the signals GPCS1 and GPCS2 are properly configured. As discussed above, the general purpose chip select signals GPCS1 and GPCS2 are used for selecting the pen controller 110A (FIG. 21), the radio interface 114B (FIG. 16) and the UART (134) Bit P0.1 is used to generate a contrast signal CONTRAST, normally pulled low down by a pull-down resistor 639 (FIG. 5) for contrast control of the LCD as discussed above. Briefly, the contrast signal CONTRAST is used to step the 24-volt supply 586 (FIG. 27). Bit P0.2 is used to generate a keyboard shutdown signal KBSHUTDOWN. This signal KBSHUTDOWN, discussed below, is active low, and in conjunction a pen shutdown signal PEN__SHUTDOWN, available at the pen controller 110A (FIG. 21), is used to generate a shutdown signal SHUTDOWN to shutdown the AC-to-DC converter 300 (FIG. 26) during low power conditions. More particularly, the keyboard shutdown signal KBSHUTDOWN, pulled up by a pull-up resistor 641, and the pen shutdown signal PEN__SHUTDOWN, pulled low by a pull-down resistor 643, are diode ORed by a pair of diodes 645 and 647. The cathodes of the diodes 645 and 647 are joined to form the active low shutdown signal SHUTDOWN. If the keyboard shutdown signal KBSHUTDOWN is asserted, the shutdown signal SHUTDOWN will be forced low, which, in turn, is used to disable the DC-to-DC converter 300 (FIG. 26). Bit P0.3 is used to generate a signal FLASHVPP to enable the flash memory devices 742–748 (FIG. 25) to be programmed. In particular, when the signal FLASHVPP is low, the flash memory devices 742–748 can be programmed. Bit P0.4 is used to generate a signal KBC__P04. The signal KBC__P04 is an active high signal and is used to indicate to the system controller 129 (FIG. 12) that a low battery condition has occurred. Bit P0.5 is used for speaker control as discussed above. The pen P0.5 is used to generate the speaker disable signal SPKRDISABLE, an active high signal.

Port 1, bits P1.1, P1.5, P1.6, and P1.7 of the keyboard controller 125 are used for system functions. Bit P1.1 is configured as an input and is used to indicate to the keyboard controller 125 that the system is in a test mode. As discussed above, the test mode signal TEST__MODE is used to enable the flash memory device 742 (FIG. 25) to be programmed. In particular, as discussed above, the test mode signal TEST__MODE is used to generate a decode signal FLIP__SA18 (FIG. 17) for decoding of the flash memory device 742. Port 1, bits P1.5, P1.6, and P1.7 are used for LCD control. In particular, the pen P1.5 may be used for LCD status control. the pens P1.6 and P1.7 are used for brightness control of the LCD as discussed above.

Port 3, bits P3.1, P3.2, P3.3, P3.4, P3.5, and P3.7 are configured as inputs. As discussed above, a signal ACPWR, available from the source of the FET 635 (FIG. 20), is applied to the pin P3.1. This signal ACPWR notifies the keyboard controller 125 that an external power source is connected to the system. The signal CD__LED is applied to the pin P3.2. This signal, CD__LED, available from the radio interface (FIG. 16), indicates that the radio is receiving a signal. A signal TX/RX__LED, also available from the radio interface, is applied to the pin P3.3. This signal TX/RX__LED indicates that the radio is in a transmit mode. A signal DOCKACK/: may be applied to the pin P3.4. This signal may be used to indicate to the keyboard controller 125 that a device is docked to the UART 134. The development of the signal DOCKACK/: does not form a part of the present invention. A second test mode signal TEST MODE__2 may be applied to the pin P3.5 for added functions. A signal PC5__P37 is applied to the pen P3.7. This signal PC5__P37 is available from the system controller 129 (FIG. 12) and indicates that the system is in a sleep state as discussed above.

The video controller 113A is connected to the system database SD[0 . . . 15] as well as the system address bus SA[0 . . . 23] and is adapted to support the video memory 113B of either 256K by 16-bit or 256K by 4-bit video memory chips 666 or 668. These video memory chips 666 and 668, for example 256K by 16 dram memory chips, as manufactured by Toshiba Model No. NE4244170-70, are connected to a 16-bit video memory databus VMDATA[0 . . . 15] and the 9-bit video memory address bus VMADR[0 . . . 8] . The video memory chips 666 and 668 are accessed in the range from A000H-BFFFFH and are switched to allow access to a full 512 kilobyte range. The video memory chips 666 and 668 are provided with dual column address strobe (CAS) pins to allow byte selection. The video memory column address strobes LCAS and UCAS are under the control of the high and low video memory column address strobe low and high signals, VMCASL and VMCASH, which are applied to the LCAS and UCAS pins by way of a pair of current-limiting resistors 670 and 672 to generate the buffered CAS the lower and high CAS signals VMCISLBUF and VMCASHBUF. The row address strobe signal VMRAS from the video controller 113A, as well as the write/enable signal VMWE, are also applied to the video memory 666 and 668 by way of current limiting resistors 674 and 676 respectively. The output/enable pin on the video memory chips 666 and 668 is under the control of a video memory operate/enable signal VMOE. This video memory operate enable signal VMOE is generated by the video controller 113 and is applied directly to the video memory chip 666 and 668.

Various power supply signals VGA__VCC, LCD__VCC, VGABUS__VCC and VMEM__VCC are applied to the video controller 113A. The power supply VMEM__VCC is applied to the VMEM__VCC pins on the video controller 113A and is also used as the power supply for the video memory chips 666 and 668. The video memory power supply VMEM__VCC may be supplied as either a 3-volt or 5-volt power supply. More particularly, both a 3-volt and 5-volt power supply 3V__CORE and 5V__CORE. Depending on whether 3-volt or 5-volt operation is selected, only one of the component positions illustrated as ferrite bead inductors 680 or 682 will be populated to produce the power supply VMEM__VCC.

As will be discussed in more detail below, the system also includes an LCD controller to control the LCD screen 113C. The power supply for the LCD controller LCD__VCC can likewise be supplied as either three volt or five volt by way of the 3- and 5-volt power supply voltages 3V__CORE and 5V__CORE, available at the DC-to-DC converter 320 (FIG. 26). Depending on the voltage selected, only one of the component locations 684 and 686 will be populated to provide the LCD power supply voltage LCD__VCC. In addition, a power supply voltage VGABUS__VCC is used for the VGA bus. This power supply voltage VGABUS__VCC is generated by the DC-to-DC converter 320 by way of a ferrite bead inductor 688.

In order to filter noise out of the power supply signals, various bypass capacitors are connected between the power supply signals and system ground. For example, a plurality bypass capacitors 690–696 are coupled between the power supply signal VMEM_VCC and the system ground Similarly, a pair of bypass capacitors 698 and 700 are connected between the power supply signal LCD_VCC and the system ground. Lastly, a plurality of bypass capacitors 702 to 706 is connected between the power supply signal VGABUS_VCC and the system ground.

Additional filtering is provided for the analog subsystem. In particular, a filter consisting of a pair of capacitors 708 and 710 and a resistor 712 is connected to a filter terminal VFILTER and analog ground AGND. Similarly; another pair of capacitors 714 and 716 and a resistor 718 are connected between a signal MFILTER and analog ground AGND.

The video controller 113A requires two separate clock signals: 14 MHz; and 32 KHz. The 14 MHz clock signal is used for most timing including the LCD panel memory and the bus cycle while the 32 KHz clock signal is used for video memory refreshing when the system is suspended. These clock signals are supplied by the clock generator 398 (FIG. 13) by way of the signal level translator 452 (FIG. 14). More particularly, 32 KHz and 14 MHz clock signals 32 KHz and 14 MHz from the clock generator 398, respectively, are applied to the signal level translator 452 to transform these respective signals into 5-volt signals 32 KHz_5V an 14 MHz_5V to provide a suitable clock signal voltage for the video controller 113A.

RGB data from the video controller 113A (FIG. 19) is supplied to the LCD screen 113C by way of a data bus PDATA[0 . . . 17]. This data bus PDATA[0 . . . 17] is applied to a plurality of current limiting resistors 708–742, respectively, to generate the buffer signals PDBUF[0 . . . 17]. These buffer signals PDBUF[0 . . . 17] are connected to the LCD panel 113 along with various control signals by way of a pair of connectors 732 and 734.

The BIOS as well as other data is stored in flash memory, for example, 512K by 8-bit memory devices 742–748 (FIG. 25) These flash memory devices 742–748 are connected to the local ISA bus 150 by way of the system address bus SA[0 . . . 23] and the system data bus SD[0 . . . 15]. The chip enable pins CE of the flash memory devices 742–748 are selected by a decoder circuit (FIG. 17), as will be discussed in more detail below. The output enable pins OE on the flash memory devices 742–748 are under the control of a memory read signal MEMR. The memory read signal MEMR is under the control of the system controller 129. The write/enable pins WE, which are active low, are under the control of a memory right gate signal MEMWGATE. This signal MEMWGATE is only enabled when the flash memory devices 742–748 are being programmed. As discussed above, programming of the flash memory devices 742–748 is under the control of a flash program signal FLASHVPP, available at port 0.3 of the keyboard controller 125 (FIG. 15). This programming signal FLASHVPP, normally pulled high by a pull-up resistor 749 (FIG. 17), is ORed with a memory write signal MEMW by way of an OR gate 751 to generate a signal MEMGATE, an active low signal.

The power supply for the flash memory devices 742–748 is developed by a 5-volt power supply signal 5V_ROM. The 5-volt power supply signal 5V_ROM is available from the DC converter 300 (FIG. 20) by way of a ferrite bead inductor 751. This power supply signal 5V_ROM is also connected to a plurality of by-pass capacitors 752–758, for stabilization.

Decoding of the flash memory devices 742–748 is provided by the circuitry that includes the buffers 760, 762, the inverters, 764, 766, and 768 and OR 770 and a 3- to 8-bit multiplexer, Model No. 74HCT138, for example, as manufactured by Motorola and a pair of resistors 772 and 774 (FIG. 17). In particular, the system address bits SA[19 . . . 21] are applied to a 3- to 8-bit multiplexer 776. The system address bit SA18 is applied to the inverter 760 to develop a FLIP_SA18 signal that is pulled down by the pull-down resistor 774. During a normal boot-up, the FLIP_SA18 signal will be same as the system address bit SA18. However, during a test mode boot-up, the FLIP_SA18 signal will be low until a control signal available at the control signal GPI00, available at the system controller 129, goes low in order to enable the system to boot from the BIOS in the flash memory device 742 as will be discussed in more detail below. Once the GPI00 signal goes low, the FLIP_SA18 signal will be the same as the system address bit SA18.

The multiplexer 776 is under the control of a flash memory rewrite signal MRW. This signal MRW and the system address bit SA[23]. The flash memory read write signal MRW is under the control of an OR gate 780. The OR gate 780, in turn, is under the control of memory read and write signals MEMW and MER, which are applied to a pair of inverters 782 and 784, respectively, and, in turn, to the OR gate 780. The memory read MEMR and memory write MEMW signals are available from the system controller 129.

The output of the multiplexer 776 is used to generate the chip select signals CS60, CS68 and CS70. In order to provide the ability of the flash memory device 742 to be addressed during a test mode, the chip select signal CS78 is under the control of an OR gate 770 and a plurality of inverters 764–768. During a normal mode of operation, the chip select signal CS78 will be under the control of the multiplexer 776. During a normal boot up, the chip select signal CS78 for the flash memory device 742 will be under the control of a ROM chip select signal ROMCS, available at the system controller 129 in order to enable the system BIOS to be shadowed into the DRAM 111A.

In order to provide the ability of the system to update the BIOS in the flash memory device 742 and to recover from a corruption of the BIOS data in the flash memory device 742, a uniform asynchronous receiver transmitter (UART) 788 (FIG. 23) is provided. The UART 788 is connected to the system data bus SD[0 . . . 15] and the system address bus bits SA[0 . . . 2]. The UART 788 is powered by the 5-volt power signal 5V_CORE, available at the DC-to-DC converter 320 (FIG. 26). A 1.84 MHz clock signal, 1.84 MHz_5V, available at the signal level translator 452, is used to drive the UART 788.

A serial interface 790 (FIG. 30), consisting of a standard DB-9 connector, enables external serial data to be received by the UART 788 (FIG. 23) The UART signals are filtered by way of a plurality of resistors 792–806 and bypass capacitors 802–822 and applied to an optional disaster recovery adapter 824, an RS-232 interface, connected to the rear of the DB-9 connector 790 and permits the flash memory devices 742–748 (FIG. 25) to be updated by an external source in the event of a flash disaster. The flash recovery adapter 824 may be implemented as a DB-9 connector and is connected to the 5-volt power supply 5V_CORE, which, in turn, is connected to a plurality of bypass capacitors 826 and 828. An additional four capacitors 830–836 are connected to the module 824 as shown.

The power supply for the system includes the DC-to-DC converter 300 which has the ability to provide both 3-volt and 5-volt power supplies signals to the various subsystems as discussed. The DC-to-DC converter includes a switching power supply 850, for example, a Maxim type 786. One source of power to the DC-to-DC converter 300 is the IBP 130, for example, 7.2 volts nominal, as well as from an external source of AC power connected to the plug 633 (FIG. 29).

Figure 28:
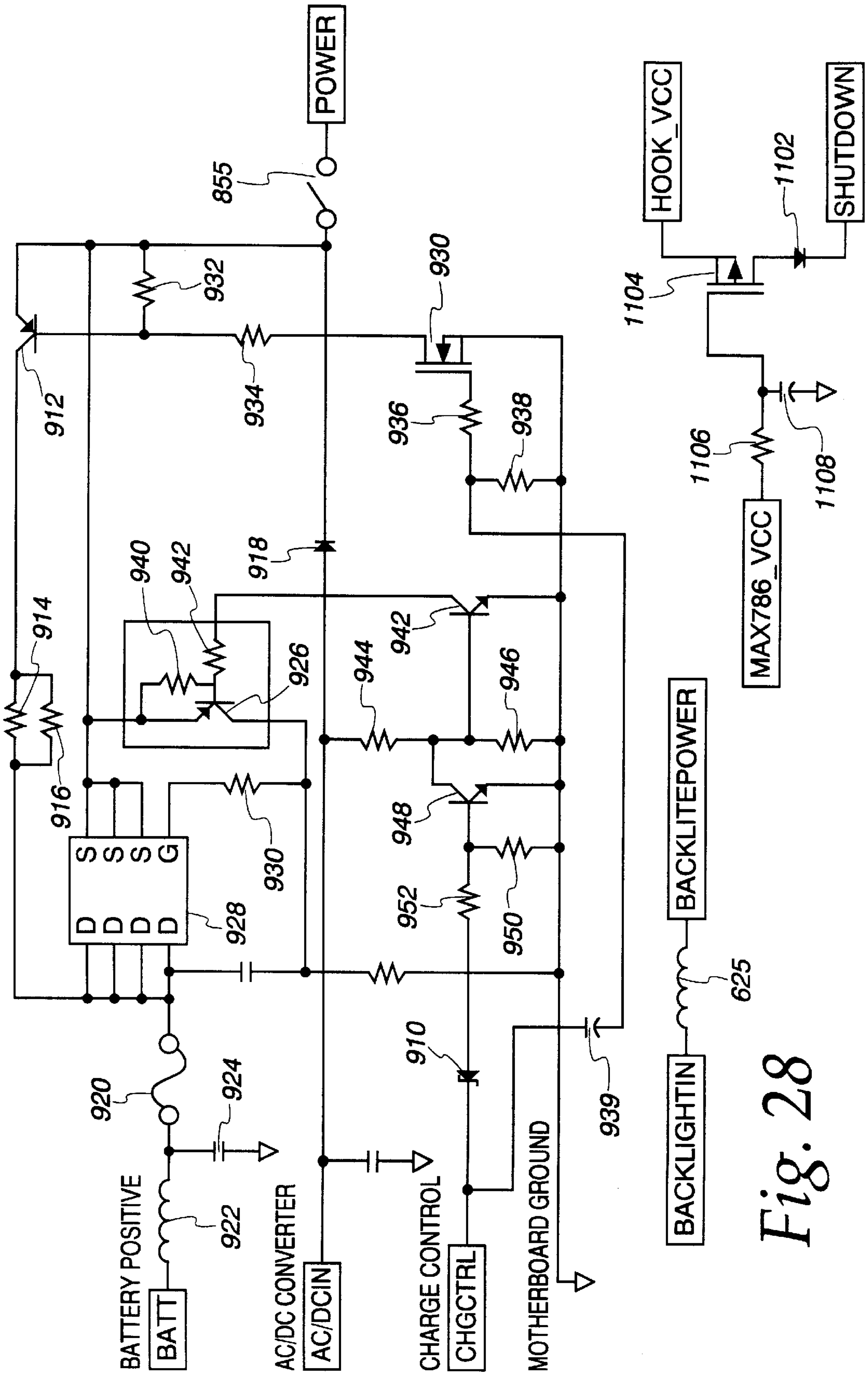

Input power to the DC-to-DC converter 300 may be from an AC/DC converter (not shown) connected to the plug 633, which has a DC output voltage between 5.5–15 volts DC, applied to a power supply terminal AC/DCIN (FIG. 28) as well as internal batteries, for example, the IBP 130, connected to the system by way of a connector 850 (FIG. 26). The battery supply voltage from the IBP 130 is connected to the battery positive terminal BATT (FIG. 28). The two supplies BATT and AC/DCIN are alternatively used to develop a main power signal POWER (FIG. 28), that is applied to a switching power supply 851, for example, a Maxim type 786 by way of a pair of FETS 854 and 856 (IL. 26), under the control of a main power switch 855 (FIG. 28). The main power signal POWER is applied to a drain input D2 on each of the FETS 854 and 856. A bypass capacitor 860 is connected to the drain terminal D2 of the FET 856 and system ground. The source terminals S2 of each of the FETS 854 and 856 is connected to the switching power supply 851 to provide 5- and 3-volt references by way of the zener diodes 860 and 862, respectively. The gate terminals G1 and G2 of the FETS 854 and 856 are under the control of the switching power supply 851.

The switching power supply 851 provides both a 3-volt and 5-volt output voltages 3V-CORE and 5V-CORE by way of filters which include a plurality of resistors 866 and 868, a plurality of inductors 870 and 872, and a plurality of capacitors 874–882 as well as a capacitor 879. For proper operation, the D1 and D2 terminals on the switching power supply 851 are connected to the system ground along with the ground pins PGND and GND. The SS3 and SS5 pins are connected to system ground by way of a pair of capacitors 884 and 886.

The frequency of the switching power supply 851 is under the control of a pair resistors 888 and 890 and a capacitor 892, connected to the SYNC and reference terminals on the switching power supply 851. A HOOK-VCC signal is applied to the VH and VL pins of the switching power supply 851. This signal HOOK-VCC is available from the module 894 (FIG. 29), discussed above. The signal HOOK-VCC signal is connected to the switching power supply 851 by way of a resistor 896 (FIG. 26); a plurality of capacitors 898, 900 and 902; and an FET 904.

As mentioned above, both the pen controller 110A (FIG. 21) and keyboard controller 125 (FIG. 15) are used to develop a shutdown signal SHUTDOWN. The shutdown signal SHUTDOWN is pulled low by a pull-down resistor 906 and applied to an active low shutdown pen SHDN* on the switching power supply 851 The shutdown signal SHUTDOWN (FIG. 20) is indicative of a shutdown by the keyboard controller 125 (FIG. 15).

As mentioned above, one source of power for the system is the IBP 130 which accounts for temperature and discharge rates and sends it to the keyboard controller 125 (FIG. 15) Two predefined levels are set in the IBP 130 to indicate low battery and critical battery. The IBP 130 will inform the keyboard controller 125 of a low battery when there is approximately five minutes left. When the battery charge is between 5 minutes to 2 minutes, the IBP 130 will report a battery critical condition. Within the final thirty seconds the IBP 130 will force an immediate shutdown. The IBP 130 will report the battery status approximately once every 2.5 seconds. If the system is changing to a power savings mode, a command will be sent to the IBP 130 to put the IBP 130 into a power-saving state. The IBP 130 will tri-state its communication lines and discontinue reporting battery status to the system.

A charge control signal CHGCTRL from the IBP 130 is used to control charging. Referring to FIG. 28, the charge control signal CHGCTRL is applied to a zener diode 910, for example, a 5.1 V zener diode. The zener diode 910 controls whether the IBP 130 is fast charged or trickle charged as a function of the magnitude of the charge control signal CHGCTRL.

In particular, if the magnitude of the charge control signal CHGCRL is less than the zener breakdown voltage (i.e., less than 5.1 volts), the IBP 130 is trickle-charged by way of series pass transistor 912, a pair of resistors 914 and 916 from the external power signal POWER by way of a diode 918, a fuse 920 and a filter consisting of an inductor 922 and a capacitor 924.

Should the charge control signal CHGCTRL be greater than the zener breakdown voltage of the zener diode 910, the IBP 130 will be fast charged by way of an FET 928 whose source terminal is connected to the AC/DC converter by way of the diode 918 and drain terminal, connected to the battery positive terminal BATT by way of the fuse 920 and the inductor 922.

The series pass transistor 912 that controls trickle charging is under the control of an FET 930. The drain terminal of the FET 930 is connected to the system ground while the source terminal is connected to the base terminal of the PNP series pass transistor 912. Normally, the series pass transistor 912 is turned off with its base terminal being high by way of its connection to a pair of biasing resistors 932 and 934, which, in turn, are connected to the main power signal POWER by way of the diode 918. When the charge control signal CHGCTRL is less than the breakdown voltage of the zener diode 910, the charge control signal CHGCTRL turns on the FET 930 by way of the biasing resistors 936 and 938 a coupling capacitor, connected to its gate terminal. Once the FET 930 is turned on, it, turns on the series pass transistor 912 to provide a charging path between the main power signal POWER and the battery positive terminal BATT.

As mentioned above, fast charging of the battery is under the control of the FET 928. The FET 928, in turn, is under the control of a PNP transistor 926. The PNP transistor 926, which includes a pair of biasing resistors 940 and 942, is connected to the collector terminal of an NPN transistor 942. The base of the NPN transistor 942 is connected to a pair of biasing resistors 944 and 946 and, in turn, to a collector terminal of another NPN transistor 948 and the main power signal POWER. The NPN transistor 948 is biased by way of a pair of biasing resistors 950 and 952 and, in turn, to the anode of the zener diode 910.

In operation, when the charge control signal CHGCTRL exceeds the breakdown voltage of the zener diode 910, the zener diode 910 conducts thereby biasing the NPN transistors 942 and 948, turning them ON. Once the NPN transistor 942 is turned ON, the base terminal of the PNP transistor 926 is connected to ground, thereby turning the PNP transistor 926 ON. The PNP transistor 926, in turn, connects the main power signals POWER to the gate terminal of the FET 928 by way of the diode 918, thereby turning the FET 928 ON to enable the battery positive terminal BATT to be fast charged from the AC-to-DC converter.

As mentioned above, the wireless interface device 100 includes a radio system which allows for wireless interfacing with a host computer and also wireless interfacing to both a wired local area network (LAN) and a wireless LAN.

The radio subsystem has been discussed above. It is implemented by way of an interface 960 (FIG. 16), implemented by way of a 25×2 header, which connects the radio subsystem to the balance of the circuitry in the wireless interface device 100. In particular, the system data bus SD[0 . . . 15], as well as the system address bus bits SA[0 . . . 2] are connected to the interface 960. The radio interface 960 is under the control of the system controller 129 (FIG. 12), such as I/O write (IOW) I/O read (IOR) and an address enable signal (AEN).

Output signals from the radio interface 960 include the signals CD_LED, TX/RX_LED, IRQ10 and IOCS16. As discussed above, the signal CD_LED indicates a connection has been made with a host computer 101. The signal TX/RX_LED indicates that a signal is either being sent or received through the radio interface 960. As mentioned above, the peripheral controller 128 (FIG. 13) is responsible for interrupt control. Thus, the radio subsystem interrupt IRQ10 is applied to the peripheral controller 128. Power supply for the radio interface 960 is by way of a 5-volt power supply signal 5V_CORE, available at the DC-to-DC converter 300 (FIG. 26), which is filtered by a pair of bypass capacitors 962 and 964.

The interrupts for both the radio interface 960 IRQ10, as well as the UART 788 (FIG. 23) IRQ4, are formed into a common signal IRQ10/4 and applied to the system controller 129 by way of a resistor 966. In particular, the radio interface interrupt signal IRQ10 is applied to an inverter 962, whose output is ORed by way of the OR gate 964 with the UART 788 interrupt signal IRQ4. The output of the OR gate 964 forms the combined interrupt signal IRQ10/4.

The radio interface 960, as well as the UART 788 (FIG. 23), are selected by the chip select signals RADIOCS and URTCS. These signals are available at the output of a pair of the OR gates 968 and 970, respectively. The system address bit SA3 is inverted by way of an inverter 972 and ORed with a general purpose chip select gate signal GPCS1GATE by way of the OR gate 970 to generate the UART chip select signal UARTCS. The system address bit SA3 is applied directly to the OR gate 968 and ORed with the general purpose chip select gate signal GPCS1GATE to generate the radio chip select signal RADIOCS. The general purpose chip select signal gate signal GPCS1GATE is available at the output of an OR gate 974. In particular, a general purpose chip select signal GPCS1, available from the system controller 129 (FIG. 12) is ORed with an output from pin 0 of port 0 of the keyboard controller 125 (FIG. 15) to cause the radio interface 960 to be addressed at addressed 3EO–3E7 and the UART 788 to be addressed at address 3EA–3EF. The signal KBC_P00 is normally pulled up to the 5-volt power supply voltage 5V_CORE by way of a pull-up resistor 976.

Figure 21A:
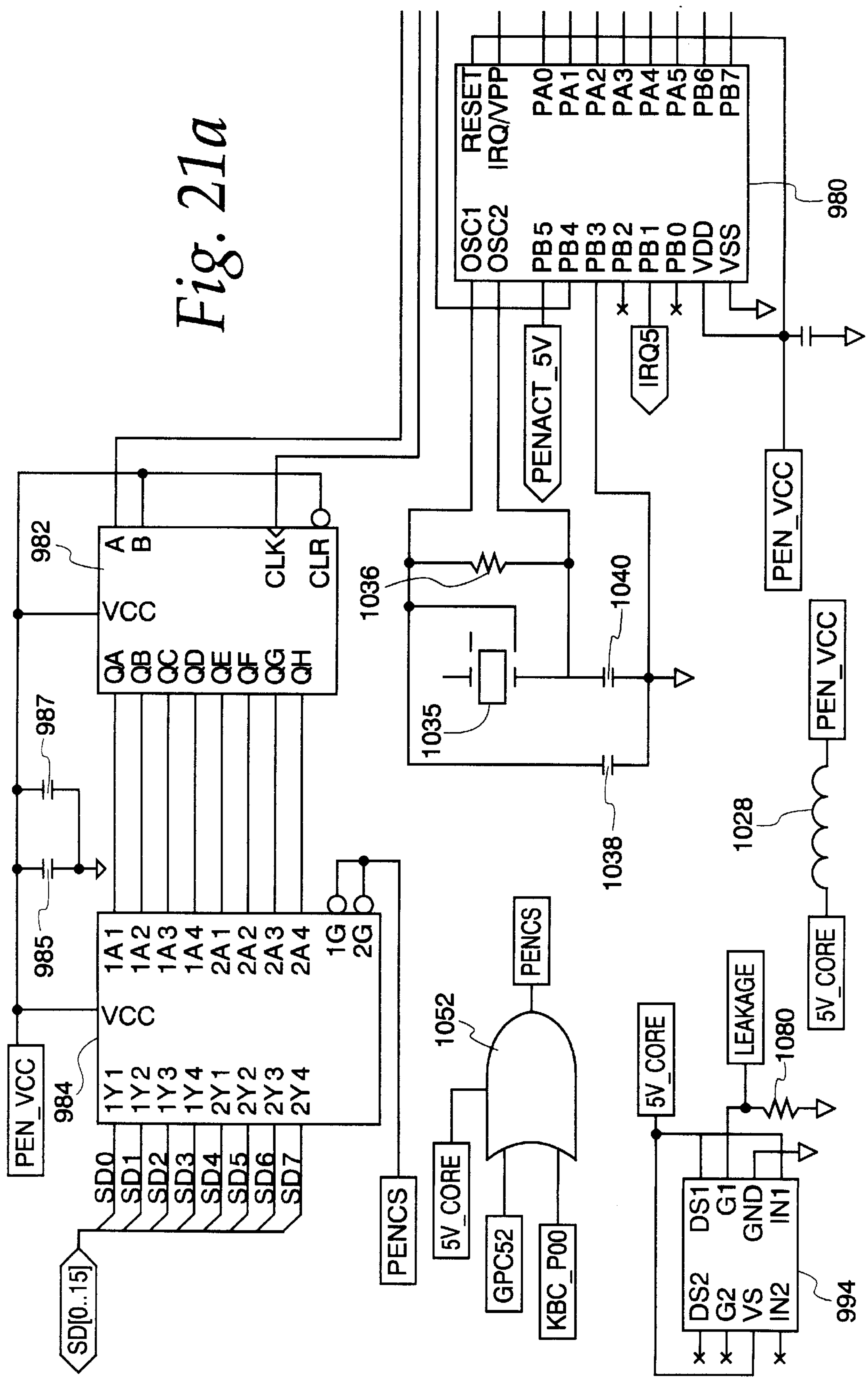
Figure 21B:
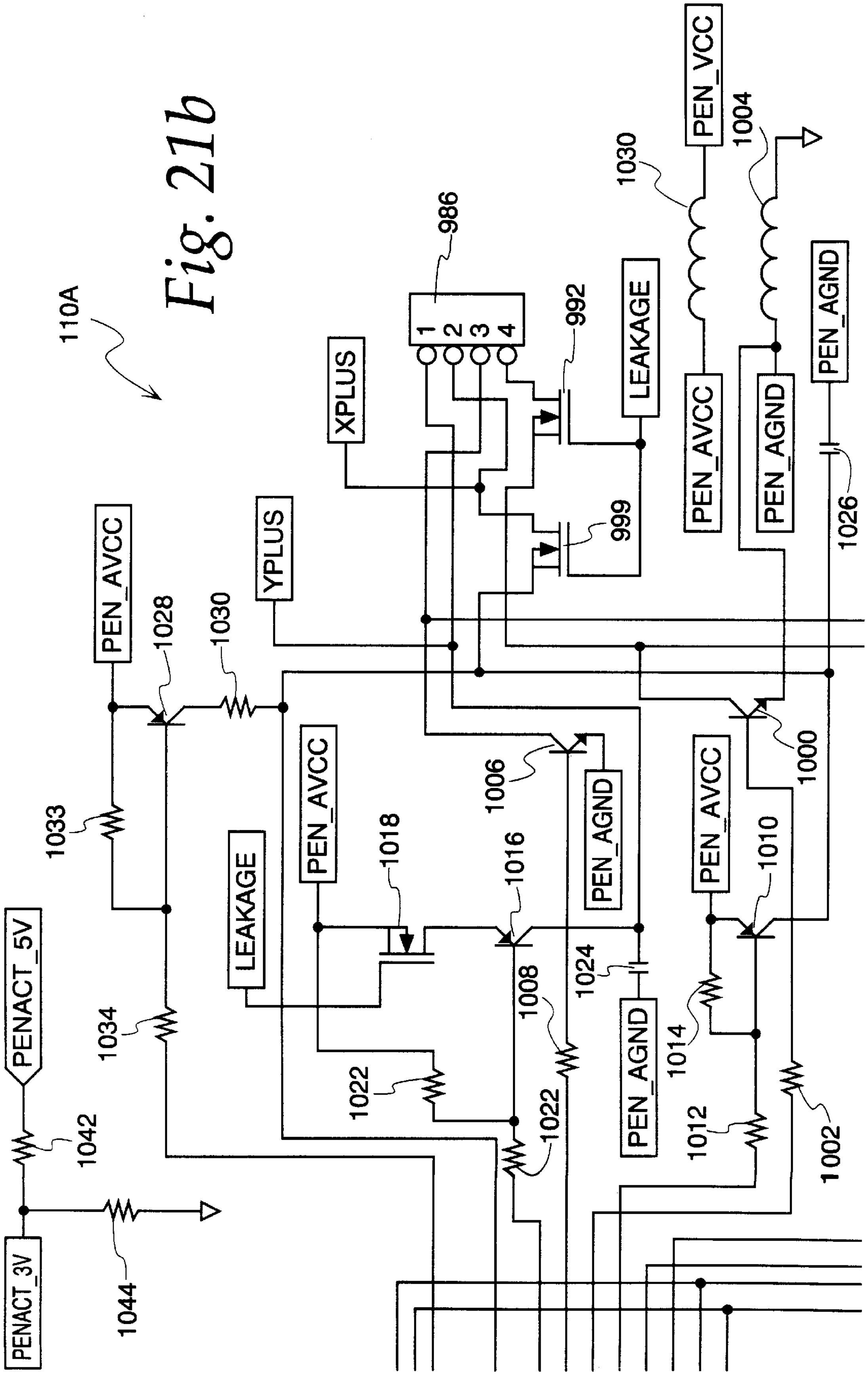
Figure 21C:
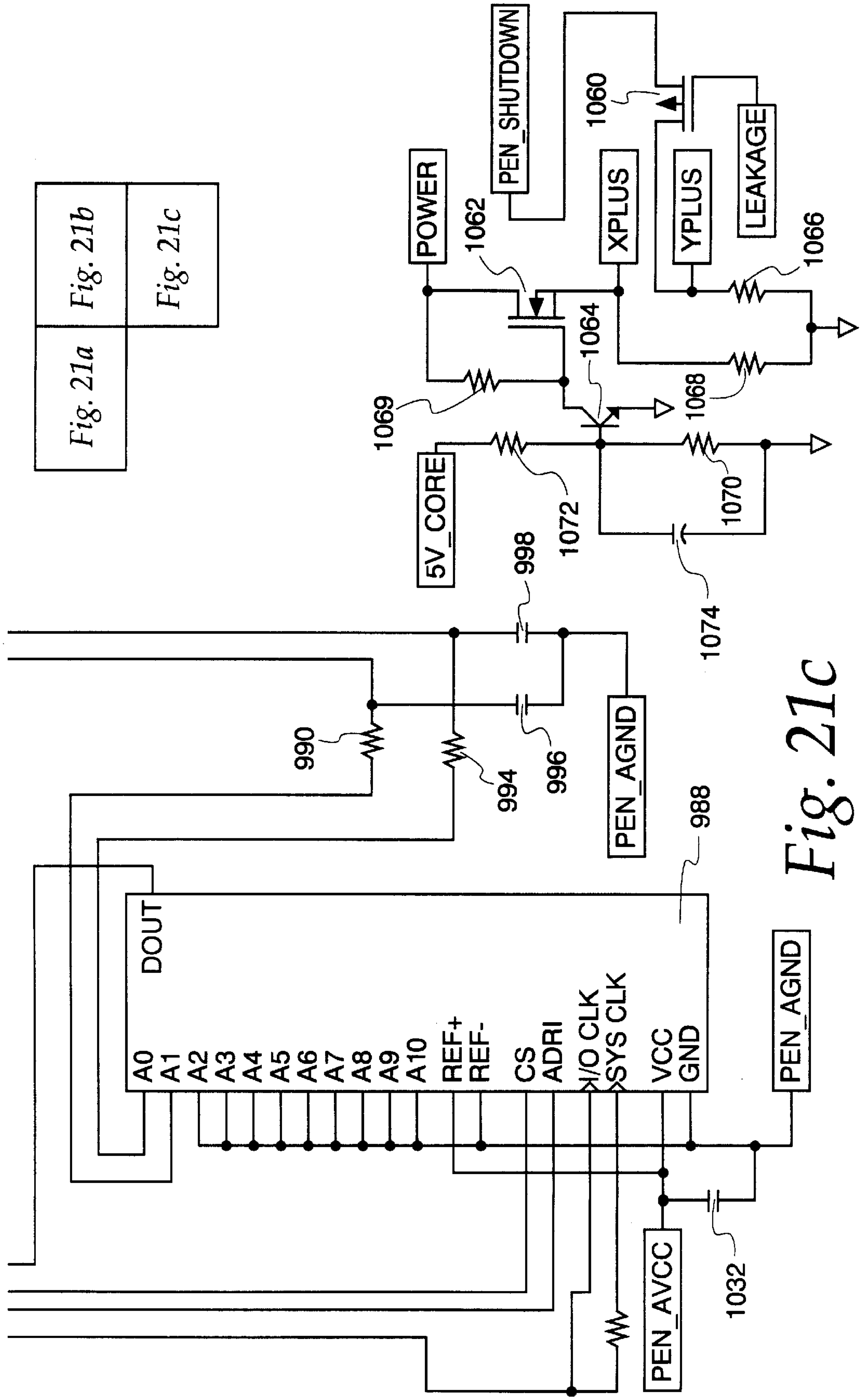
Figure 22:
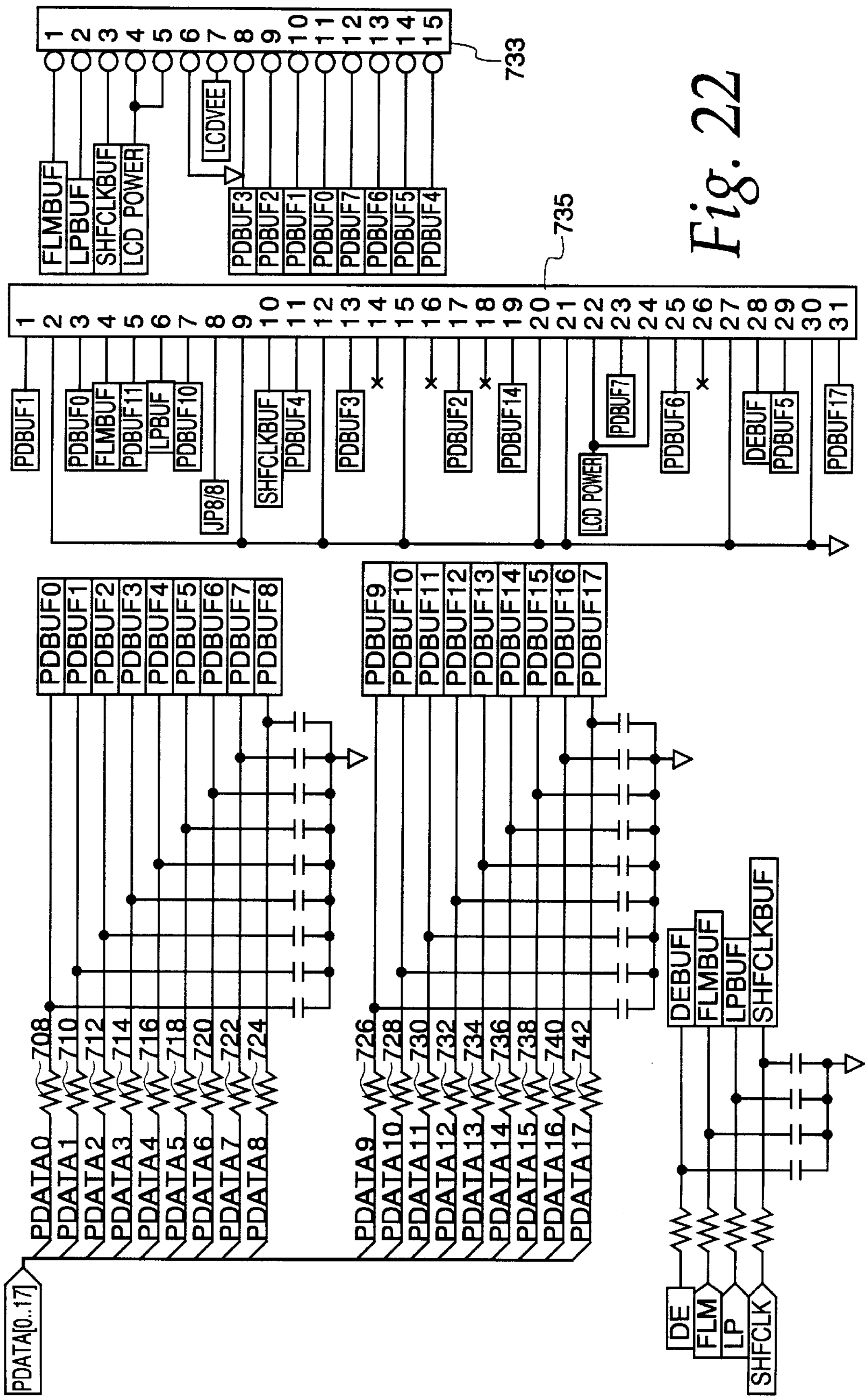
Figure 23A:
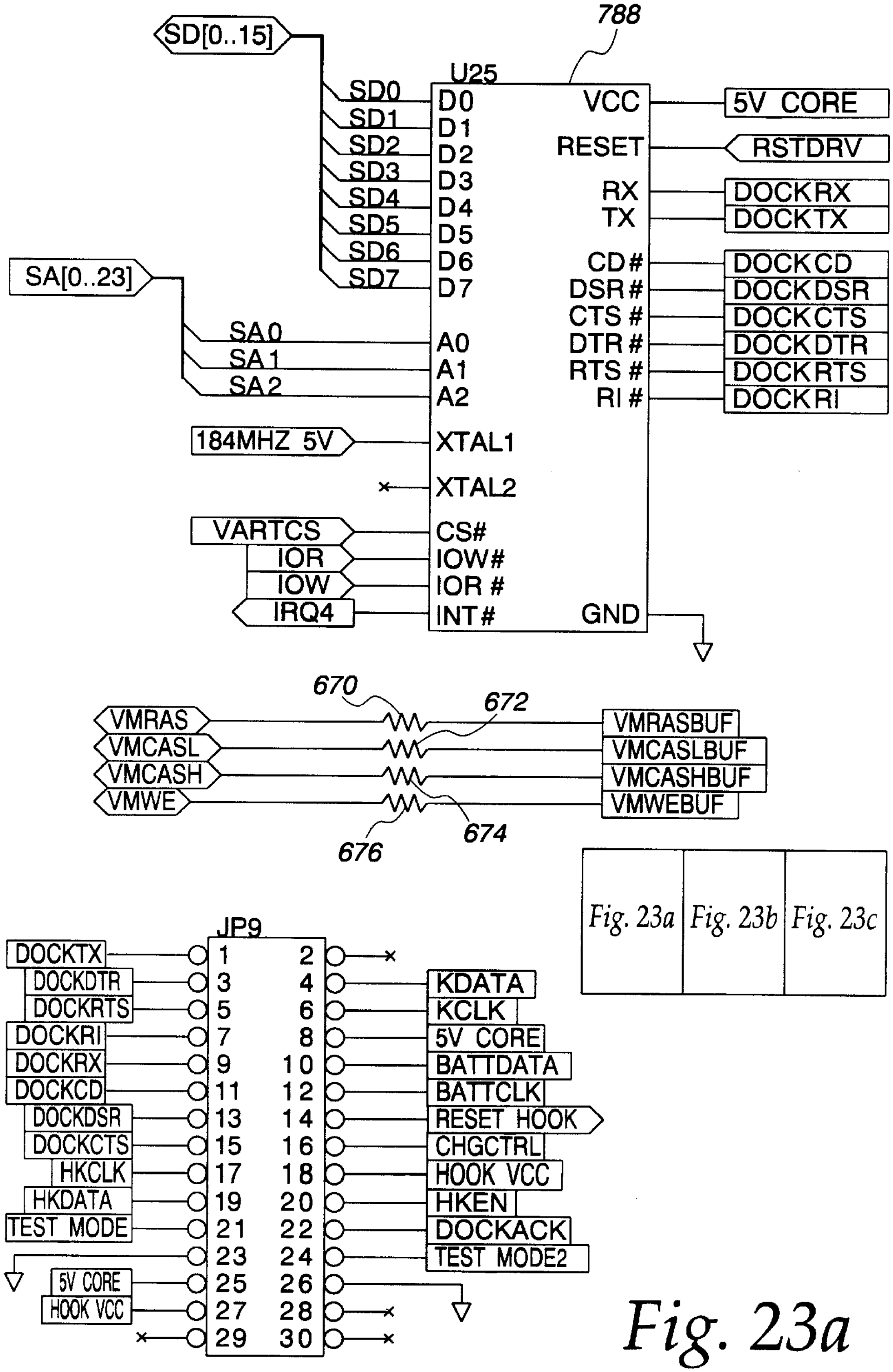
Figure 23B:
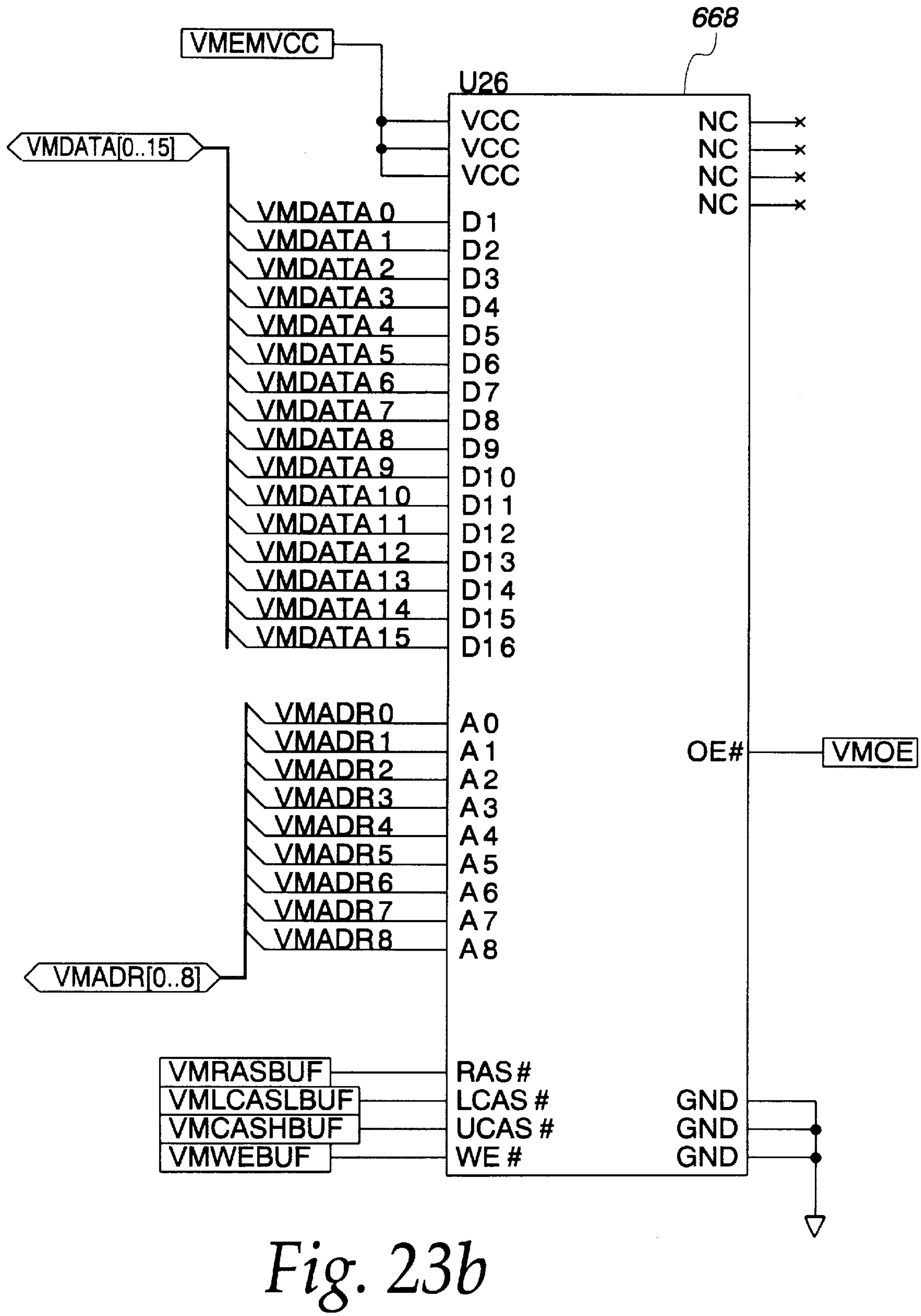
Figure 23C:
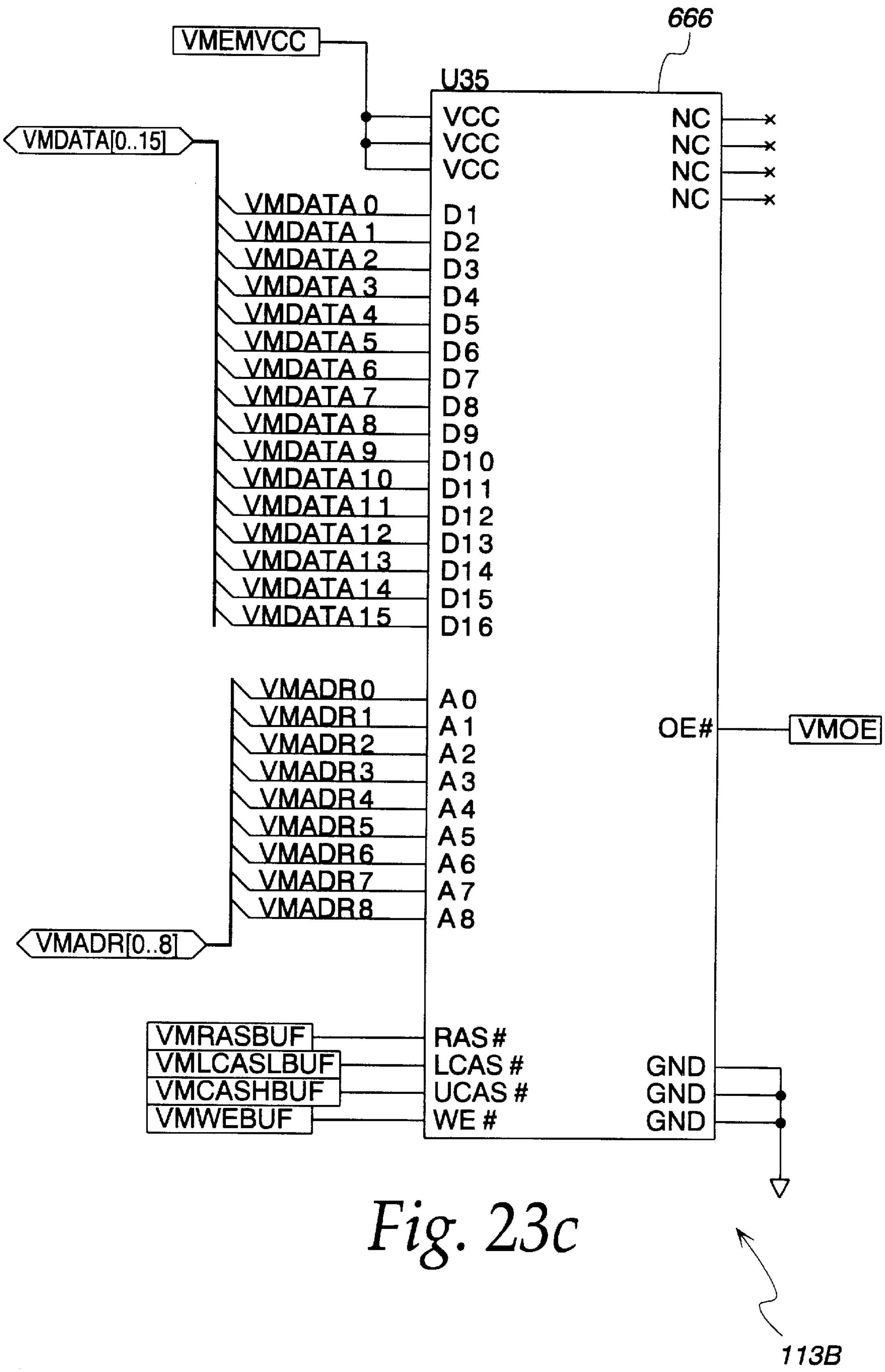

The pen controller 110A is illustrated in FIG. 21 and is adapted to cooperate with an analog-resistive type digitizer 106, The pen controller 110A includes a controller 980, for example a Motorola type MC68HC705J2 microcontroller, with the firmware being programmed within the part. The controller 980 communicates with the system by way of the system data bus SD[0 . . . 15]. In particular, serial data from a port PB6 on the controller 980 is applied to a shift register 982, which, in turn, is connected to an 8-bit parallel buffer 984, which, in turn, is connected to the serial data bus SD[0 . . . 15]. The controller 980 is adapted to be used with an analog-resistive touch screen digitizer, for example a drawing No. 8313-34 Rev. C4, as manufactured by Dynapro. XY information from the digitizer 106 is received by the controller 980 by way of a connector 986. The X and Y information from the digitizer is connected to a 12-bit analog-to-digital (A/D) converter and also applied to port PA5 of the microcontroller 980. In particular, the X− data from the digitizer is applied to the A1 terminal of the A/D converter 988 by way of a pull-up resistor 990 and an FET 992. The FET 992 is under the control of a charge pump 994, for example a Linear Technology Model No. LTC1157C58. The Y− data from the digitizer is applied to the terminal Al of the A/D converter 988 by way of a current-limiting resistor 994. A pair of bypass capacitors 996 and 998 are tied between the terminals A0 and A1 of the A/D converter 988 and an analog ground PEN AGND. The X+, Y+, X−, Y− inputs from the digitizer are also applied to the controller ports PA[0 . . . 4] by way of a plurality of transistors 1000, 1006, 1010, 1016 and 1018; a plurality of resistors 1002, 1008, 1012, 1014, 1020, 1022, 1028, 1032 and 1034; an inductor 1004; and a plurality of capacitors 1024 and 1026. The transistor 1018, as well as the transistors 992 and 998, are used to prevent leakage in a suspend state.

Power from both analog and digital power supply and grounds are supplied to the system. In particular, a 5-volt digital power supply PEN_VCC, developed from the 5-volt supply 5V_CORE, is available from the DC-to-DC converter 300 (FIG. 26) by way of an in-line ferrite bead inductor 1028. An analog power supply PEN_AVCC is developed from the digital supply PEN_VCC by way of an in-line ferrite bead inductor 1030. The digital power supply PEN_VCC is applied to the microcontroller 980 and filtered by a bypass capacitor 1030. The analog supply PEN_AVC is utilized by the 12-bit analog-to-digital converter 988 and filtered by way of a bypass capacitor 1032.

A separate clock supply is used for the microcontroller 980. This clock supply includes a 4.0 MHz crystal 1034, a resistor 1036 and a pair of parallel coupled capacitors 1038 and 1040. The clock supply is applied to the oscillator terminals OSC1 and OSC2 of the microcontroller 980.

A 5-volt signal PENACT_5V, available at the port P5V pin of the microcontroller is converted to a 3-volt signal PENACT_3V by way of a pair of voltage dividing resistors 1042 and 1044. This signal PENACT_3V is applied to a 3-volt terminal of the system controller 129 (FIG. 12). As discussed above, the power supply for the FETs 992 and 1018 is provided by the charge pump 994. The power supply for the charge pump 994 is a 5-volt power supply signal 5V_CORE, available at the DC-to-DC converter 300 (FIG. 26). A ground terminal of the charge pump 994 is connected to system ground by way of a pull-down resistor 1050. The 5-volt power supply PEN_VCC is also utilized by the shift register 982 and the data buffer 984 and buffered by way of a pair of bypass capacitors 985 and 987.

The chip select signal PENCS for the data buffer 984 is generated by an OR gate 1052. The general purpose chip select signal GPCS2 is available from the system controller 129 (FIG. 12), as well as a signal KBC_P00, available from the keyboard controller 125 (FIG. 15) are applied to the inputs of the OR gate 1052.

A pen shut-down signal PEN_SHUTDOWN is used to develop a shut-down signal SHUTDOWN as discussed above for turning on the switching power supply 851 (FIG. 26). The pen shutdown signal PEN_SHUTDOWN is developed by the circuit that includes the transistors 1060, 1062 and 1064; a plurality of resistors 1066, 1068, 1069, 1070 and 1072; and a capacitor 1074. In particular, a 5-volt power supply signal 5V_CORE is applied to a pair of voltage-dividing resistors 1070 and 1072, which, in turn, is used to bias the transistor 1064 on. The base-emitter voltage is held fairly constant by the capacitor 1074. Once the transistor 1064 is turned on, it is used to control the FET 1062. A main power supply signal POWER is applied to the gate of the FET 1062 by way of the resistor 1069. Wake up of the system by way of the pen subsystem is discussed below.

6. Flash Disaster Recovery

Figure 16:
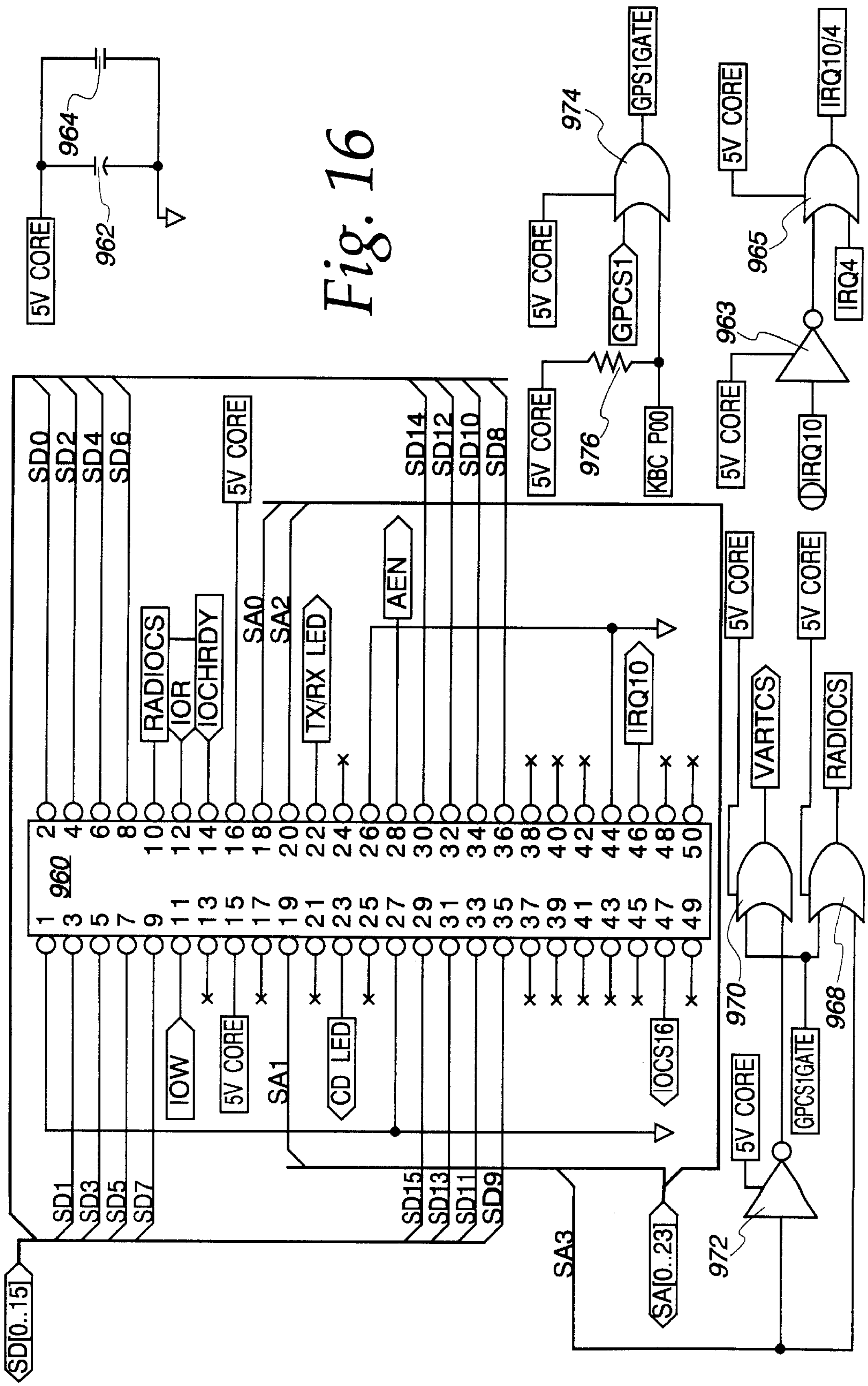
Figure 25A:
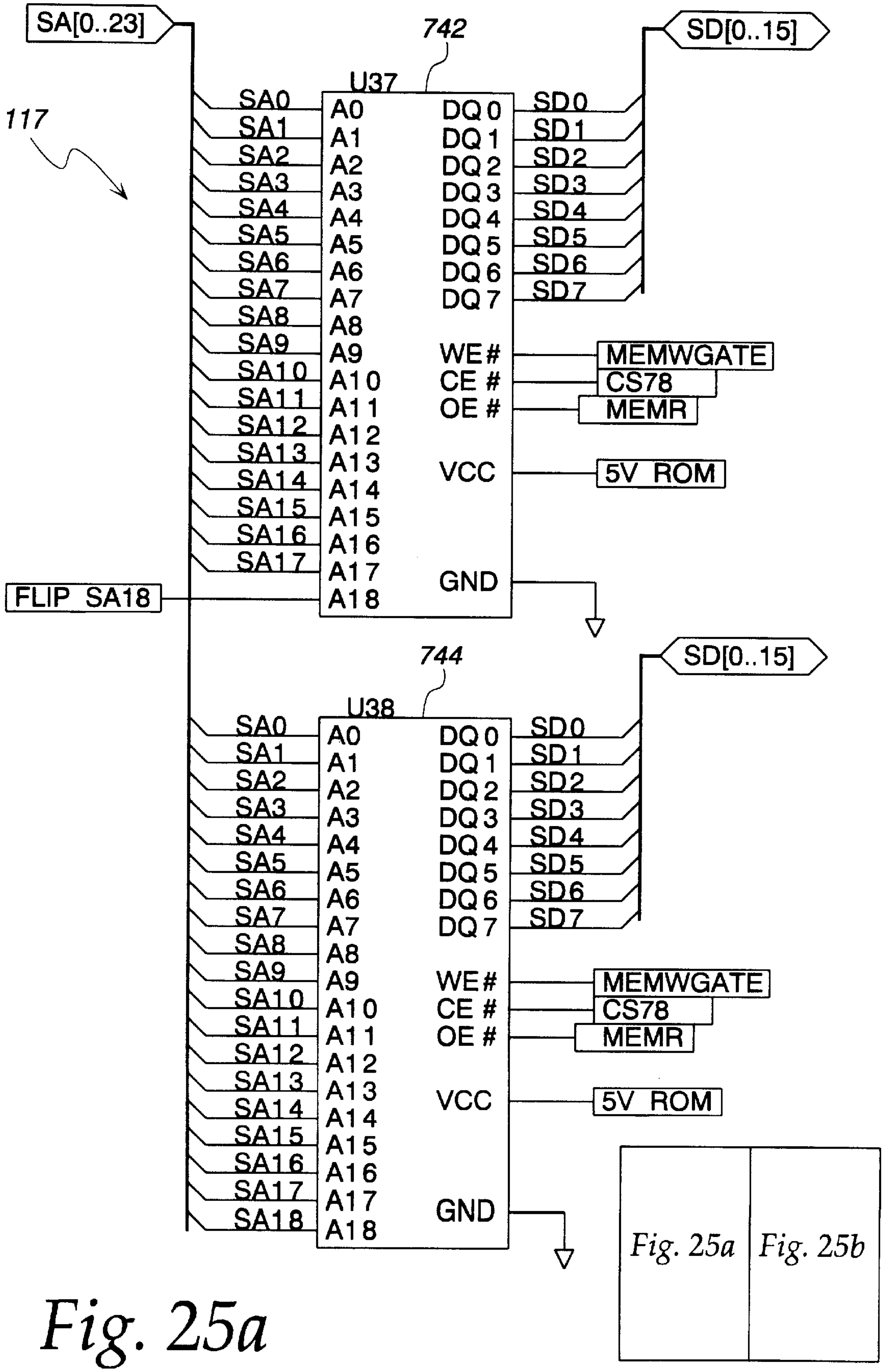
Figure 25B:
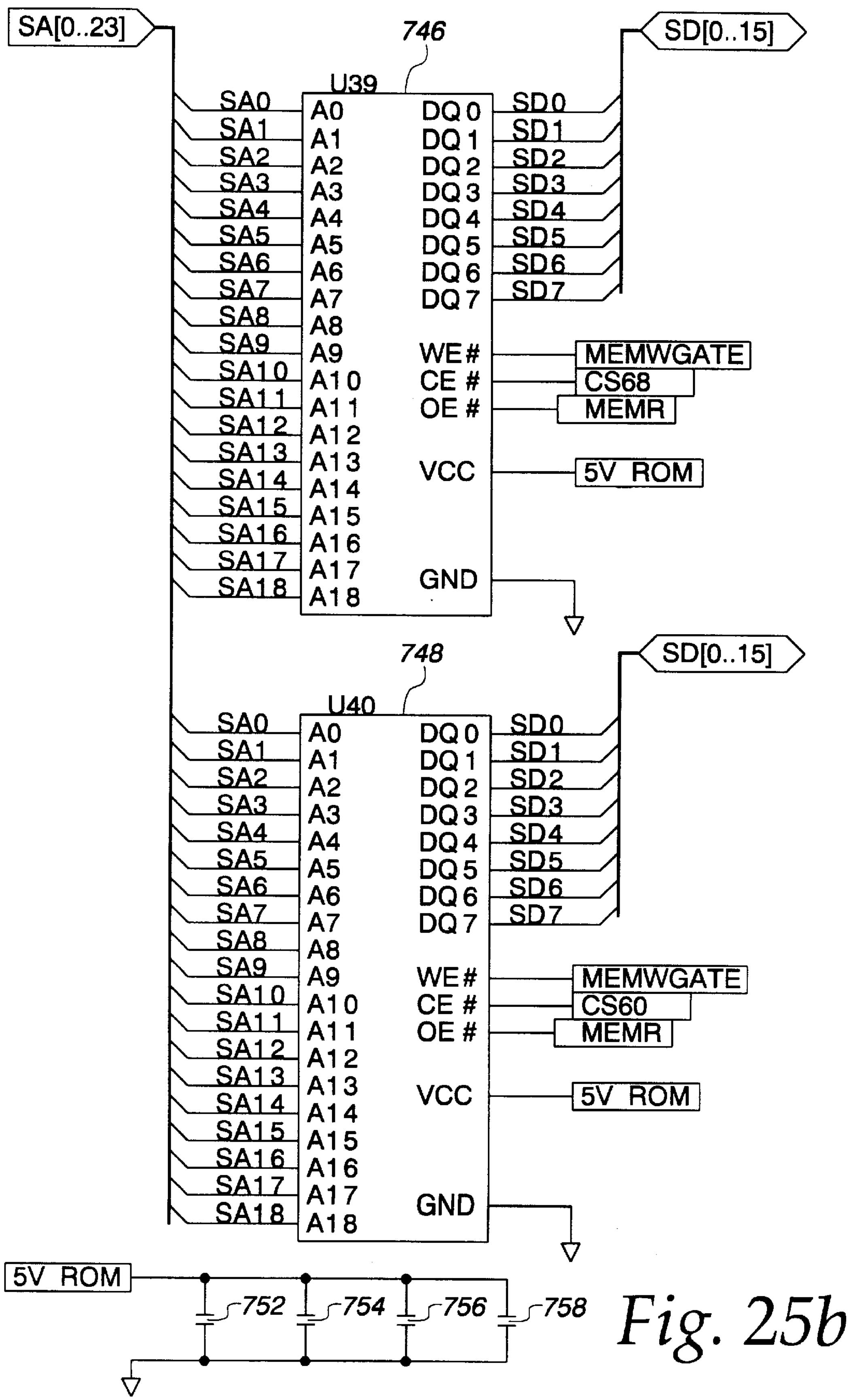

As mentioned above, the wireless interface device 100 includes the flash memory devices 742–748 (FIG. 25). As will be discussed in more detail below, the flash memory devices enable user software upgrades by way of the radio interface 960 (FIG. 16). Should power be lost during the programming, the data within the flash memory devices 742–748 will be corrupted, which could result in the system failing to boot.

In order to enable recovery from such a condition, recovery BIOS is stored in a protected sector of the flash memory device 742, which will be unaffected during reprogramming. In addition, a serial port interface 790 (FIG. 30) is provided to enable the flash memory devices 742–748 to be programmed in such a condition by an alternative wired source following a normal boot-up Unfortunately, the configuration of the flash memory device 742 may result in the system failing to boot. More particularly, disaster recovery BIOS is not stored at the uppermost address of the flash memory device 742. Each flash memory device 742–748 are 512K× 8-bit devices. With reference to Table 5 above, the flash memory device 742 is mapped to the address range $0C0000$0FFFFF. The recovery BIOS is contained in the lower half of that range (i.e. $0E0000$0FFFF).

On a normal boot-up, the system begins executing code at the top of the address range (i.e. $0C0000-0DFFFF) flash memory device 742 by way of the system address bit SA18. More particularly, on a normal boot-up a test mode signal TEST_MODE, available at port 1.1 of the keyboard controller 125 (FIG. 15) is pulled high by the keyboard controller 125 during boot-up, which enables the buffer 762 (FIG. 17) which, in turn, enables another buffer 760 to enable the system address bit SA18 during boot-up. When the system address bit SA18 is enabled, the system begins executing code at the top of the address range ($0C0000) of the flash memory device 742. However, during a condition when the data in the top half of the address range ($0C00000-0DFFFFF) becomes corrupt as a result of a problem occurring during reprogramming, the system may not boot during such a condition.

In order to solve this problem, the system address bit SA18 is forced low. By forcing the system address bit SA18 low, the system will begin executing code from the protected area of the flash device 742 in the address range ($0E0000-$0FFFF) during such a condition where the disaster recovery BIOS resides in a protected sector. In particular, the system address bit SA18 is applied to the buffer 760 (FIG. 17), which is under the control of the test mode signal TEST_MODE by way of the buffer 762. The output of the buffer 760 is a signal FLIP_SA18, which is applied to the address pin A18 (FIG. 25) on the flash memory device 742.

Figure 30A:
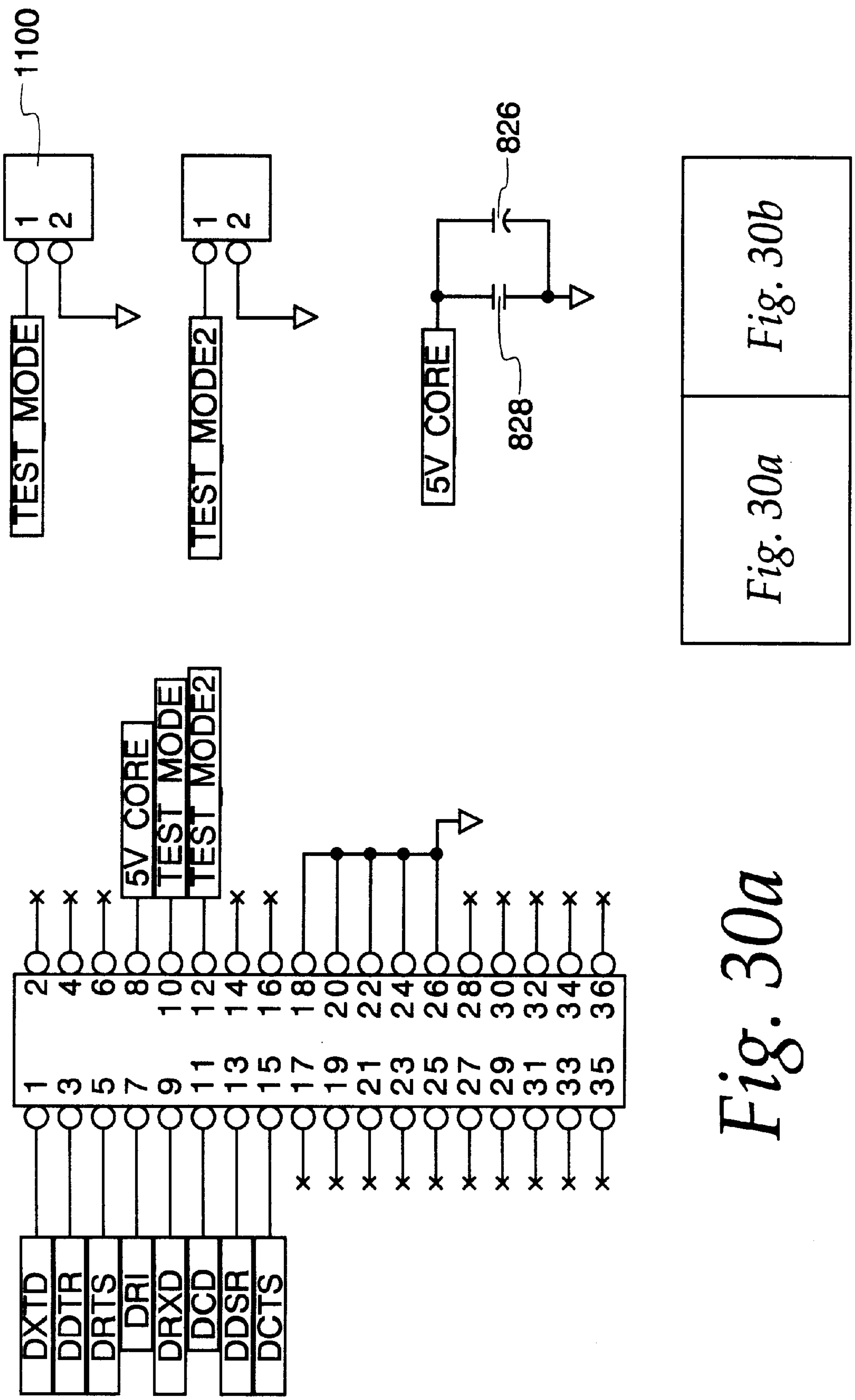
Figure 30B:
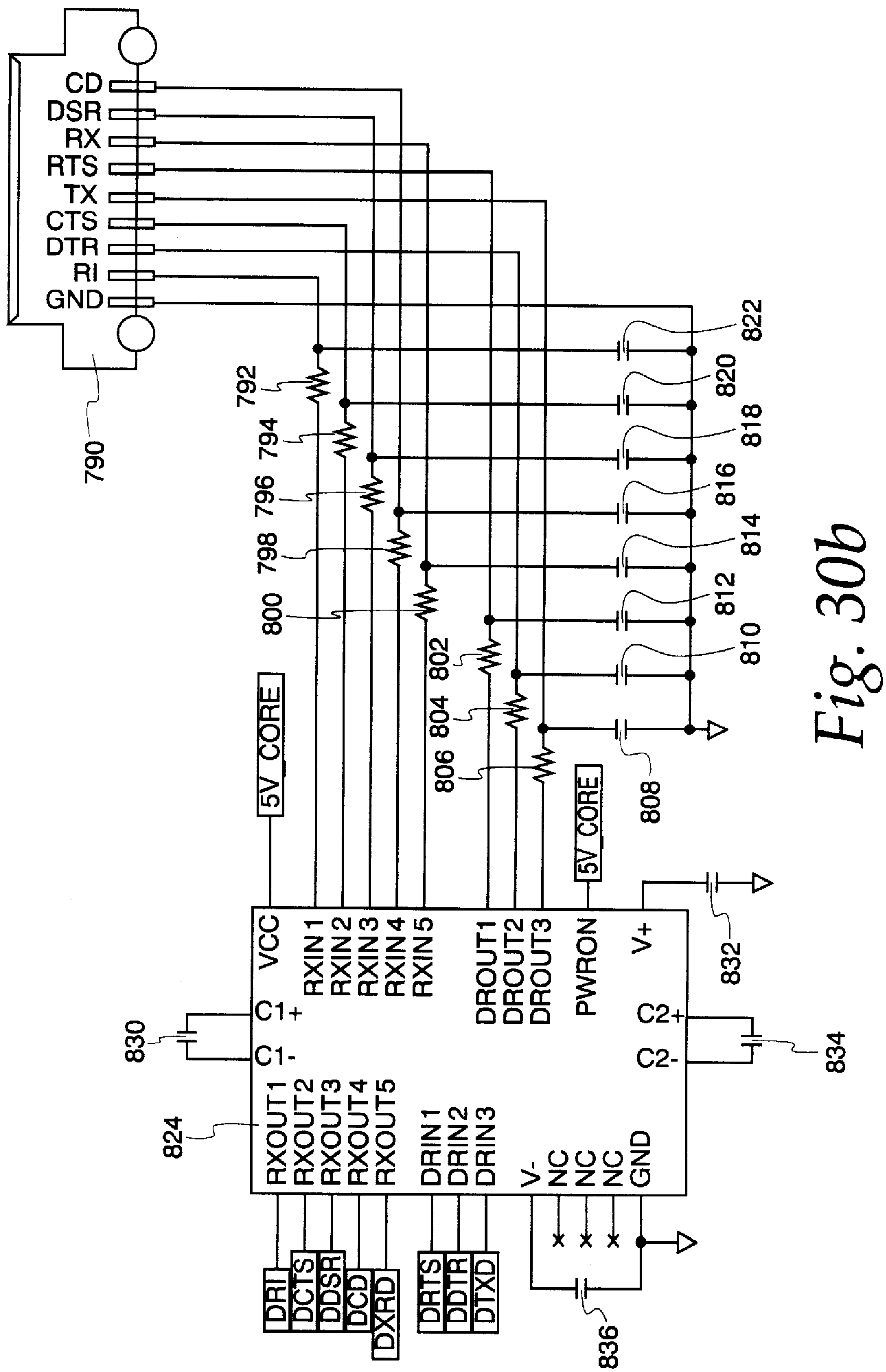

During a normal boot-up, the test mode signal TEST_MODE will enable the buffer 762 (FIG. 17) and, in turn, the buffer 760 to cause the system address bit SA18 to drive the signal FLIP_SA18. During a condition when the code in the flash memory device 742 becomes corrupt, the test mode signal TEST_MODE is forced low, which, in turn, forces the signal FLIP_SA18 low, resulting in the system executing code from the protected area (i.e. $0E0000-0FFFF) of the flash memory device 742 during such a condition to enable the flash memory device 742 (FIG. 25) to be reprogrammed by way of the serial interface 790 (FIG. 30).

There are various ways in which to force the test mode signal TEST_MODE low during reprogramming of the flash memory device 742 by way of the serial interface 790. One way is to externally ground the test mode signal TEST_MODE during such a condition. In particular, the test mode signal TEST_MODE may be connected to one pin of a two-pin header 1100 (FIG. 30). The other pin of the header 1100 is connected to system ground. During reprogramming of the flash memory device 742, an external jumper (not shown) is inserted into the header 1100 to shunt the test mode signal TEST_MODE to system ground to enable the system to execute code from the protected or boot block area of the flash memory device 742 in order to enable the system to be booted. Once the system is booted, the flash memory device 742 is reprogrammed by way of the serial interface 894 (FIG. 29). Once reprogramming is complete, the shunt is removed from the header 1100 (FIG. 30) and the adapter plug 790 is removed, restoring the system to normal operation.

7. Resume on Pen Contact

In order to conserve battery power, the wireless interface device 100 goes into a suspend mode when the system is not in use. As discussed above, a shut down signal SHUTDOWN (FIGS. 20 and 26) is used to shut down the power supply 851 (FIG. 26) during such a condition, which essentially disables the power to all but the circuitry required to detect a pen down event by way of the main power signal POWER (FIG. 28).

Three sources control the shut down signal SHUTDOWN: the keyboard controller 125 (FIG. 15); the pen controller 110A (FIG. 21) and a signal HOOK_VCC, connected to the switching power supply 851 (FIG. 26) by way of the FET 904. These sources are diode ORed to the shut down signal SHUTDOWN by way of the diodes 645 and 647 (FIG. 20) and a diode 1102 (FIG. 28). During a normal state, the shut down signal SHUTDOWN is high, which enables the power supply 851 (FIG. 26). When the shut down signal SHUTDOWN goes low, the power supply 851 goes into an inactive state. During the inactive state, minimum power is supplied to the pen detection circuitry as discussed above.

As will be discussed in more detail below, once the system is turned on by the main power switch 855 (FIG. 28), the shut down signal SHUTDOWN will be under the control of the pen shutdown signal PEN_SHUTDOWN, available from the pen controller 110A (FIG. 21) and the keyboard controller shut down signal KBSHUTDOWN (FIG. 20).

The keyboard controller 125 (FIG. 15) can place the system in a suspend state by way of a command, which, in turn, causes the keyboard controller shut down signal KBSHUTDOWN, available at port P0.2, to go low. More particularly, during normal operation, only the keyboard shutdown signal KBSHUTDOWN is high, placing control of the suspend state solely in the keyboard controller 125. The keyboard controller 125 can then force the system into a suspend state by forcing port P0.2 low, which, in turn, places the power supply 851 (FIG. 26) in an inactive state.

The pen shut down control signal PEN_SHUTDOWN is used to wake the system from a suspend state. More particularly, as mentioned above, during a suspend state, power from the main power supply POWER (FIG. 28) is applied to the collector of the transistor 1064 (FIG. 21) and to the drain of the FET 1062. Since the 5-volt power supply 5V_CORE is unavailable during a suspend state, the transistor 1064 will be OFF, allowing power to appear at the gate of the FET 1062, thus turning the FET 1062 ON. Once the FET 1062 is turned ON, the main power signal POWER is applied to the XPLUS terminal of the digitizer panel. Thus, a pen (or finger) down event will result in the YPLUS terminal being connected to the XPLUS terminal by way of a finite resistance (i.e. 500–1500 Ohms) to apply power to the YPLUS terminal, which, in turn, is connected to the drain of the P-channel FET 1060 while its source is used as the pen shutdown signal PEN_SHUTDOWN. The FET 1060 is under the control of a leakage signal LEAKAGE, available at the output of the charge pump 994. Since the leakage signal LEAKAGE will be low during a suspend state, the FET 1060 will turn on in response to the pen down event, thereby connecting the YPLUS terminal to the pen shut down signal PEN_SHUTDOWN. As mentioned above, the YPLUS terminal will be high in response to a pen down event following a suspend state. As such, the pen shut down signal PEN_SHUTDOWN will go high. Since the pen shut down signal PEN_SHUTDOWN is diode ORed with the shut down signal SHUTDOWN, the shut down signal SHUTDOWN will thus be forced high in response to a pen down event following a suspend state, which, in turn, will wake up the power supply 851 (FIG. 26). Once the system is wakened, the keyboard controller shutdown line KB_SHUTDOWN goes high, latching the system ON. The resistors 1070, 1072 and the capacitor 1074 are used to delay turning ON the transistor 1064 and the turning OFF of the FET 1062 before the keyboard shutdown signal KB_SHUTDOWN is pulled high which would cause the pen shut down signal PEN_SHUTDOWN to go low before the keyboard shutdown signal KB_SHUTDOWN goes high.

The FETs 992, 998 and 1018 are used to prevent current leakage in a suspend state. In particular, these FETs 992, 998 and 1018 are under the control of the leakage control signal LEAKAGE, available at the charge pump 994, which turns the FETs 992, 998 and 1018 ON in normal operate and OFF in a suspend state.

The sensing of suspend state is done by the charge pump 994, which monitors the 5-volt power supply signal 5V_CORE. When the 5-volt power supply signal 5V_CORE goes low, indicating a suspend state, the leakage control signal LEAKAGE goes high, turning off the FETs 992, 998 and 1018, blocking leakage into the pen circuitry from the XPLUS terminal.

8. RC Time Constant

The system ON/OFF switch 855 (FIG. 28) enables the system to be completely shut off. When the switch 855 is closed, power from either the IBP 130 or the external AC-to-DC converter supplies power to the system. In order to wake up the system from an OFF state, a shutdown line SHUTDOWN must be held high until the keyboard controller 125 pulls its shutdown pin KB_SHUTDOWN high. As discussed above, the keyboard shutdown signal KB_SHUTDOWN is diode ORed relative to the shutdown signal SHUTDOWN, which controls the power supply 851 (FIG. 26). Until the time when the keyboard shutdown signal KB_SHUTDOWN is pulled high, a signal HOOK_VCC is used to force the shut down signal SHUTDOWN high. As mentioned above, the HOOK_VCC signal is also diode ORed relative to the shutdown signal SHUTDOWN by way of the diode 1102 (FIG. 28). However, for proper operation of the system, the shutdown signal SHUTDOWN will be under the control of the keyboard controller 125 (FIG. 15) after the system is turned on. Thus, a 5-volt power supply signal HOOK_VCC, available at the power supply 851 (FIG. 26), forces the shut down signal SHUTDOWN high until the keyboard controller 125 (FIG. 15) has time to pull its keyboard shutdown signal KB_SHUTDOWN high The 5-volt power supply signal HOOK_VCC is always high when the main power switch 855 is turned on. On power-up, the 5-volt power supply signal HOOK_VCC forces the shutdown signal SHUTDOWN (FIG. 28) high by way of an FET 1104 and the diode 1102, which, in turn, wakes up the power supply 851 (FIG. 26). Once the power supply 851 is enabled, a power supply signal MAX 786_VCC is used to turn off the FET 1104 to place the control of the shut down signal SHUTDOWN under the control of the keyboard controller 125 as discussed above. In order to provide sufficient time for the keyboard controller 125 to pull its keyboard shutdown signal KB_SHUTDOWN high, the turn OFF of the FET 1104 is delayed by way of a resistor 1106 and a capacitor 1108. In particular, once the main power switch 855 is closed, the power supply signal MAX786_VCC will be low, thereby causing the FET 1104 to be turned ON, which connects the power supply signal HOOK_VCC to the shutdown signal SHUTDOWN by way of the diode 1107. Once the power supply 851 is enabled, the signal MAX786_VCC, applied to the gate of the FET 1104, turns off the FET 1104, placing the shutdown signal SHUTDOWN under the control of the keyboard controller shutdown signal KB_SHUTDOWN as discussed above. The resistor 1106 and capacitor 1108 delay the turning off of the FET 1104 after the signal MAX786_VCC goes high for a sufficient time to allow the keyboard controller 125 to pull its keyboard shut down signal KB_SHUTDOWN high.

An inhibit circuit (FIG. 26), which includes a plurality of resistors 1110–1120, a diode 1122, a transistor 1124 and an FET 1126, is used to prevent the system from being turned ON during low battery conditions when the system is being supplied solely by the IBP 130. During a normal condition (i.e, when the system is being supplied power by the AC/DC converter or by the battery, the signal MAX786_VCC is connected to the main power signal POWER by way of the FET 1126. The FET 1126 is under the control of the transistor 1124. During conditions when the AC/DC converter is supplying power to the system, a signal AC/DCIN will be high, thereby turning ON the transistor 1124, which, in turn, turns ON the FET 1126, connecting the main power signal POWER to the signal MAX786_VCC. The collector of the transistor 1124, in turn, controls the FET 904, which connects the power supply signal HOOK_VCC to the enable terminals ON3 and ON5 on the power supply 851. When AC power is not available, the AC/DCIN goes low, leaving the control of the transistor 1124 under the control of an inhibit signal INHIBIT, available from the IBP 130 by way of the connector 850. During a normal battery condition, the inhibit signal is high, keeping the transistor 1124 turned ON, thereby enabling the power supply 851 by way of the FET 904 Should a low battery condition occur, the inhibit signal goes low, turning OFF the transistors 904 1124, as well as the FET 1126, to prevent the system from being turned ON.

9. Mouse Emulation with Passive Pen

As mentioned above, the wireless interface device 100 includes a digitizer 110B and utilizes a passive pen as an input device. FIGS. 31–35 illustrate a method for emulating the functions of a mouse, for example a two-button mouse, to provide standard mouse functions with the passive pen.

There are three aspects of the mouse emulation. One aspect relates to emulation of a double click of a mouse button, required by some application programs. Another aspect relates to emulating both the left and right buttons of a two-button mouse. The third aspect relates to emulating both the movement of the mouse (MOVE MODE) and the clicking of a mouse button (TOUCH MODE) with a passive pen as an input device.

Figure 31:
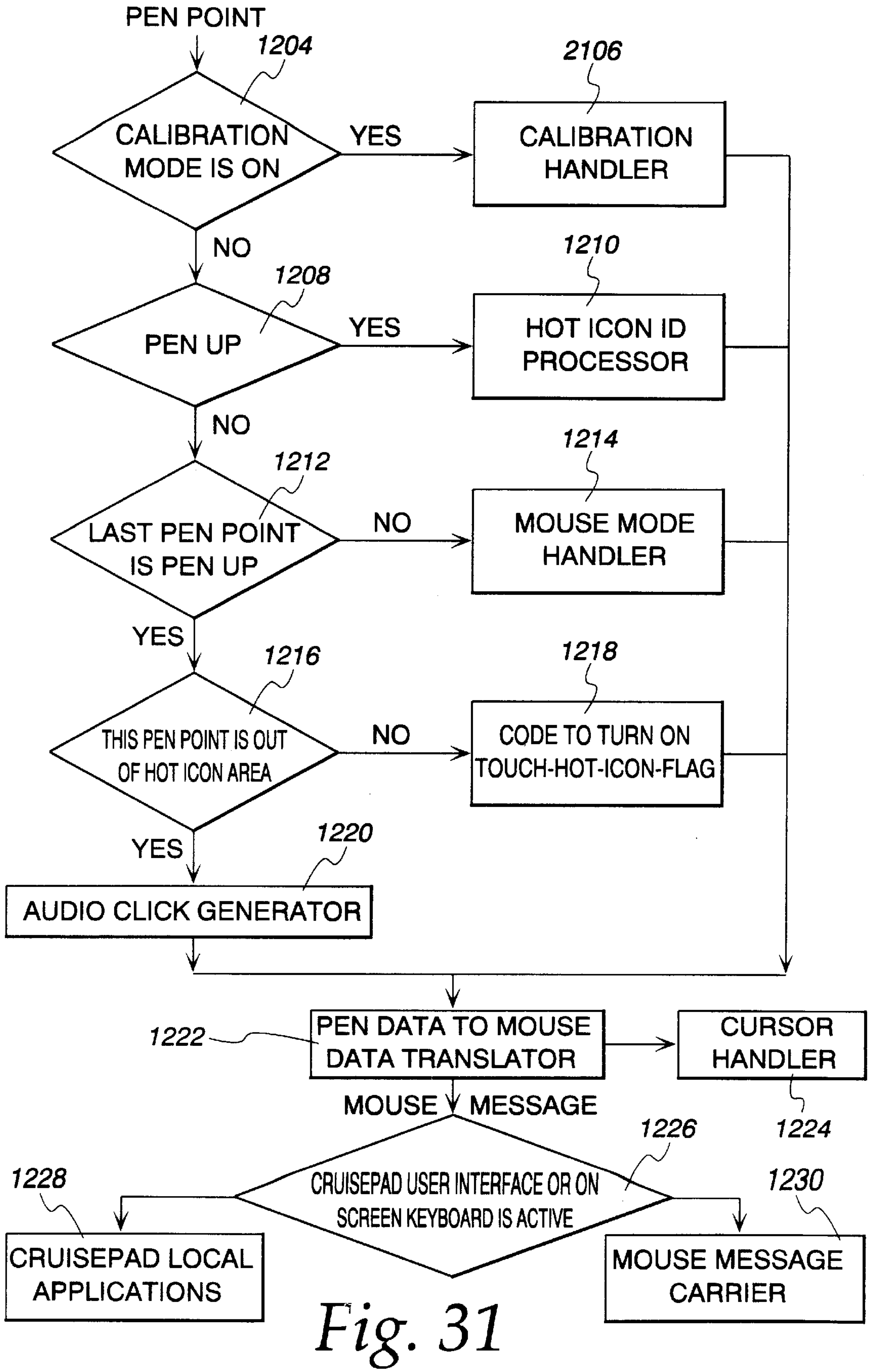

Referring first to FIG. 31, the mouse emulation system is event-driven by the passive pen. Initially the system checks to see if the passive pen has touched anywhere on the LCD 113C (FIG. 36), which includes a display area 1200 and a hot icon area 1202. If a pen-down event has been detected, the system checks in step 1204 if the wireless interface device 100 has been placed in a calibration mode. If so, a calibration handler is called in step 1206. The calibration handler does not form part of the present invention. If the wireless interface device 100 is not in the calibration mode, the system then checks to determine if the pen has been lifted from the LCD 113C in step 1208. If a pen-up event occurs subsequent to a pen-down event, control is passed to a hot icon identification (ID) processor (FIG. 32) in step 1210, which, as will be discussed below, processes the pen position to determine which of the hot icons in the hot icon area 1202 of the LCD screen 113C was selected. If the pen was not lifted from the LCD 113C, the system checks in step 1212 if the previous event in a previous cycle was a pen-up event. If the previous pen event in the previous cycle was a pen-down event, the current pen event is processed by a mouse mode handler (FIG. 33) in step 1214, which, as will be discussed in more detail below, determines if the pen is being used in a mouse MOVE or mouse TOUCH MODE. In step 1216, the coordinates of the current pen-down event are processed to determine if the current pen-down event occurred in the hot icon area 1202 of the LCD 113C. If the pen-down event occurred in the hot icon area 1202 (FIG. 36), a flag is turned on indicating the hot icon area 1202 was selected in step 1218. If the system determines the current pen-down event occurred in the display area 1200 (FIG. 36) of the LCD screen 113C, an audio click is generated in step 1220; different from the hot icon audio click.

Steps 1204–1220 are driven by each pen event in order to determine the location of the pen-down event (i.e. hot icon area 1202 or display area 1200). Once the system determines where the pen event occurred, the pen data is converted to mouse data in step 1222 and a cursor is displayed in the viewing area 1200, corresponding to the location of the pen touch in step 1224. After the cursor is displayed, the system determines in step 1226 whether the mouse data is to be used locally by the wireless interface device 100 for local applications or the application running on the host computer 101. As mentioned above, the wireless interface device 100, through its graphical user interface, provides a virtual or on-screen keyboard (OSK) Thus, if the OSK has been activated and the pen event occurs in the OSK area, the mouse data is used locally by the wireless interface device 100 in step 1228. If the wireless interface device 100 is running a host application, the mouse data is sent to the host computer 101 application over the wireless interface as discussed above in step 1230.

Figure 37:
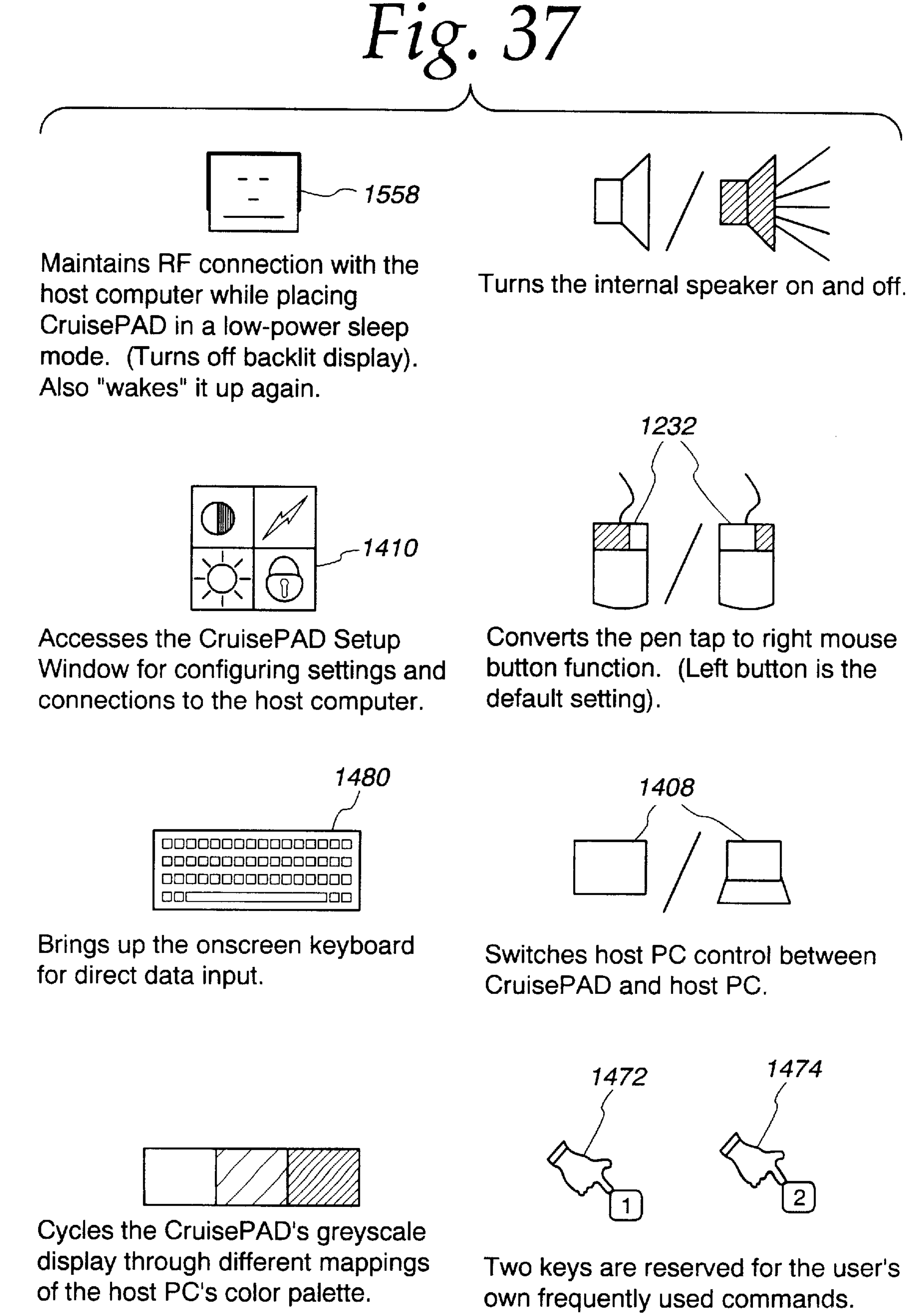
FIG. 37 illustrates the hot icons in the hot icon area of the display.

As mentioned above, the system is able to emulate both left and right mouse buttons. This emulation is accomplished by way of left/right mouse button hot icon 1232 (FIG. 37). A left mouse button is configured to be the default setting. This hot icon 1232 is set up as a toggle. Thus, when the system is first turned on, the pen events from the mouse mode handler are translated to be left mouse button events. Anytime the left/right mouse button hot icon 1232 is selected, the system will toggle and translate subsequent pen events to be right mouse button events. A subsequent pen-down event on the hot icon 1232 causes subsequent pen events from the mouse mode handler to be translated as left mouse button events and so on.

The hot icons in the hot icon area 1202 (FIG. 36) are triggered by a pen-down event followed by a pen-up event. As discussed above, such a sequence of pen events is processed by hot icon ID processor 1210, illustrated in FIG. 32. The hot icon ID processor 1210 first determines if the pen event occurred in the viewing area 1200 (FIG. 36) of the LCD 113C by determining from the mouse mode handler 1214 (FIG. 33) whether the system is in the TOUCH in step 1234, since this mode only occurs for pen events in the viewing area 1200 of the LCD display 113C. If the system is not in a TOUCH mode, the system checks in step 1236 whether the system is in the MOVE mode. If the pen event (i.e. pen-down followed by a pen-up event) did not occur in the viewing area 1200 of the LCD display 113C, the system compares the coordinates of the pen-down event with the locations of the various hot icons displayed in FIG. 37 in step 1238. In step 1240 (FIG. 32), the system determines if the left/right mouse button hot icon 1232 was selected. If not, the system proceeds directly to step 1242 to uplevel software for processing. If the system determines that the left/right mouse hot icon 1232 was selected, the system emulates a left or right mouse button in step 1244, depending on the last status of the left/right mouse button emulation and utilizes the emulated left or right mouse button status in the uplevel software in step 1242.

Figure 32:
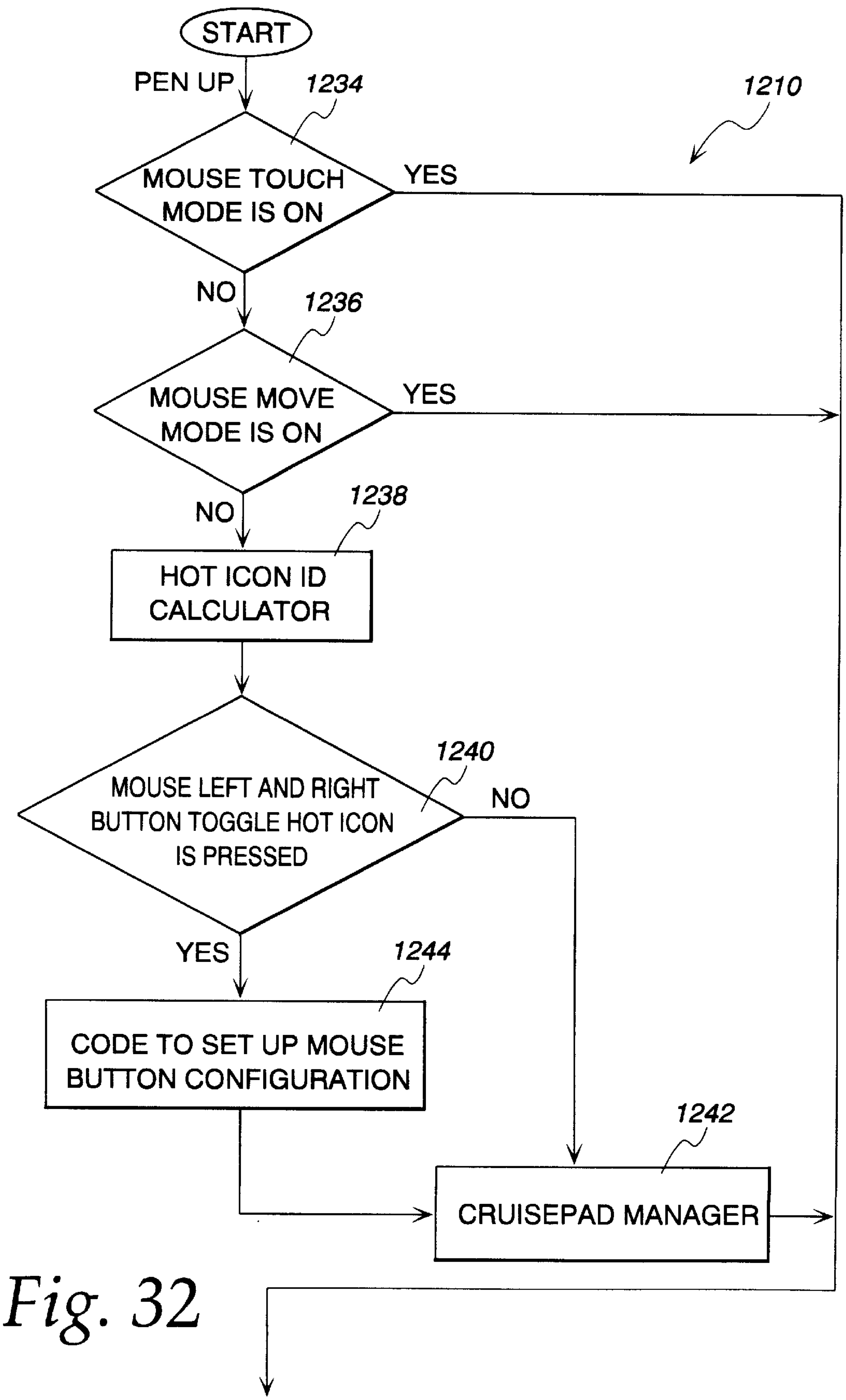
Figure 33:
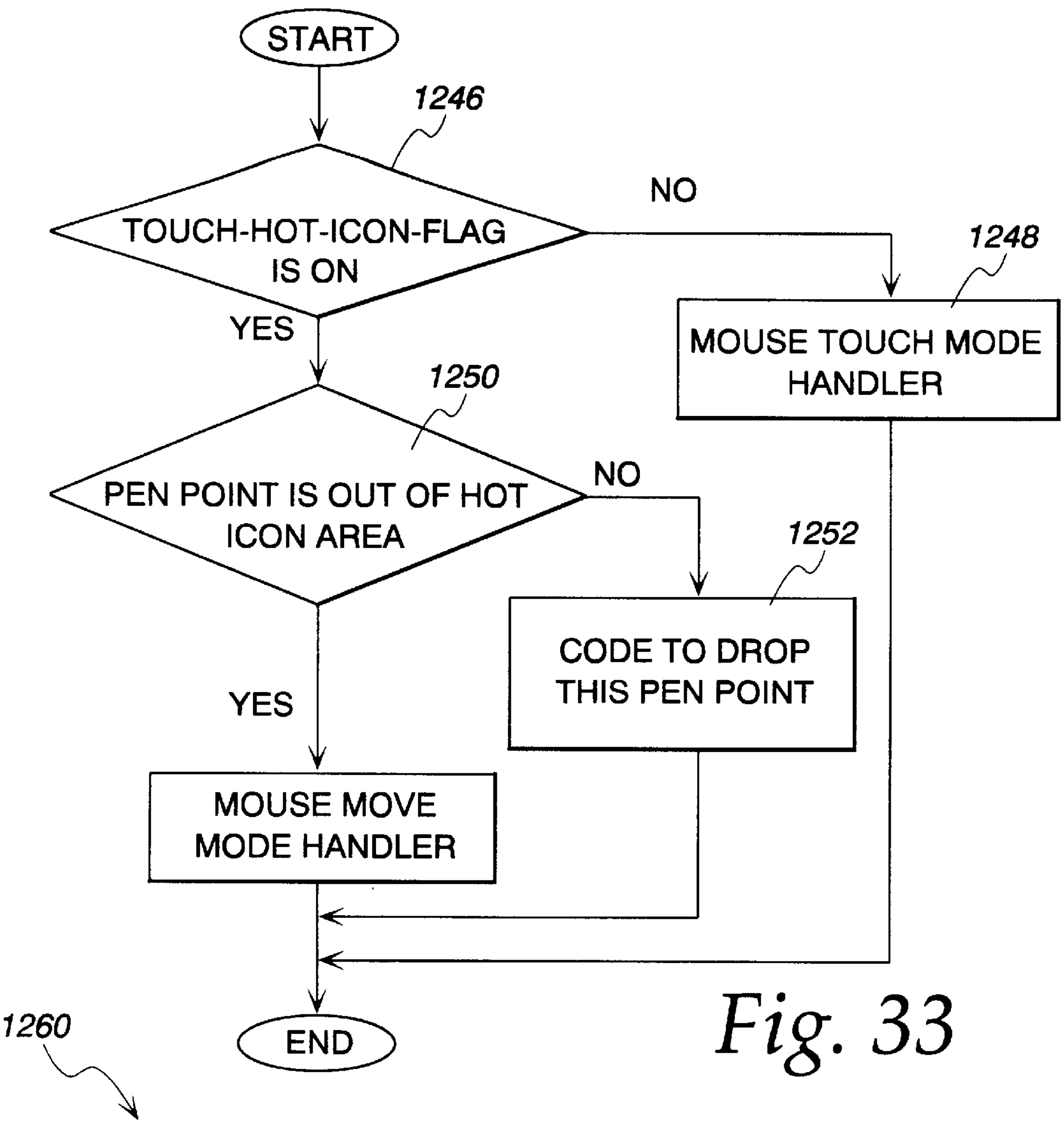
Figure 34:
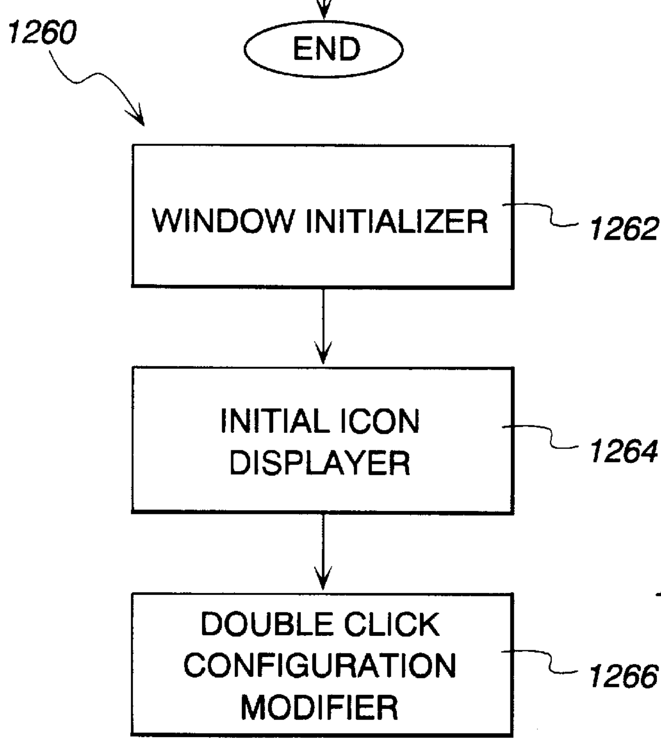

Pen events in the hot icon area 1202 of the LCD display 113C are handled by the hot icon ID processor 1210 (FIG. 32), while pen events in the viewing area 1200 are handled by the mouse mode handler 1214 (FIG. 33). The mouse mode handler 1214 emulates two mouse actions: moving without either button being depressed and released (MOVE); and button depression and release events (TOUCH). As discussed above, both left and right mouse button events can be emulated in the TOUCH.

As discussed above, a current pen-down event preceded by a pen-down event activates the mouse mode handler 1214 (FIG. 33). In step 1246, the system first determines if the hot icon flag is on. As discussed above, the hot icon flag is turned on anytime a pen-down event occurs in the hot icon area 1202 (FIG. 36) of the LCD display 113C. If the hot icon flag is not on, the pen-down event is translated to a mouse button down event by a mouse TOUCH handler in step 1248. If the hot icon flag is on, the system determines in step 1250 whether the coordinates of the current pen-down event to determine if the current pen-down event occurred in the hot icon area 1202. If so, the pen coordinate data is dropped in step 1252 since such data will be processed by the hot icon ID processor 1210 (FIG. 32) discussed above. If the current pen event occurred in the viewing area 1200, the pen coordinate data is translated to mouse move data.

A mouse button double click is emulated by two pen-down events separated by a pen-up event in the viewing area 1200 of the LCD 113C. In particulars when the host computer 101 is running a Windows application, a pen driver translates the two pen-down events separated by a pen-up event and passes four mouse messages: mouse button down; mouse button release, mouse button down and mouse button release to the host Windows application.

As will be discussed in more detail below, the host manager Windows module 1260 modifies a Windows configuration file. (WIN.INI) and, in particular, the distance and time limitations for a mouse button double click. In particular, the Windows system checks the Windows configuration file WIN.INI in order to compare the distance between the mouse locations for each of the clicks as well as the time between clicks. More particularly, the Windows systems will only pass double click data to a Windows application program if the distance (i.e. height and width) between mouse locations for the two clicks is less than 16 for both height and width and the time between the clicks is less than 1.0 seconds.

With a pen-based system two pen-down events separated by a pen-up event normally take longer and occur at greater distances between pen-down events than allowed by the Windows system to generate a double click. Thus, the host manager Windows module 1260 modifies the time and distance parameters to enable two pen-down events separated by a pen-up event to enable Windows to emulate a mouse double click that can be passed on to the Windows application program running in the host computer 101. In particular, the host manager Windows module 1260 includes an initializer 1262 which loads the host manager Windows module 1260, and an initial icon displayer 1264, which displays that the host manager Windows module 1264 has been loaded. The host manager Windows module 1260 also includes a double click configuration modifier 1266. The double click configuration modifier 1266 modifies the configuration of the Windows systems file WIN.INI by modifying the time or speed in step 1268. The distance, broken down into width and length, between the successive pen-down events, is modified by a double click width modifier and a double click height modifier in steps 1270 and 1272. The modified speed, width and height parameters are set in the Windows system file WIN.INI running in the host computer 101 in step 1274 to enable a mouse button double click to be emulated by two successive pen-down events.

Normally, the Window system file WIN.INI is in cache. The host manager Windows manager disables the in cache copy of the Windows system file WIN.INI, which allows the Windows system to go to the modified configuration file with the modified parameters.

10. Disable Screen Saver to Reduce LAN Traffic

As mentioned above, the wireless interface device 100 connects to a host computer 101 and displays whatever is being displayed on the host computer 101. In particular, after a connection is made, all of the screen images on the host computer 101 are passed on to the LCD display 113C on the wireless interface device 100. Whenever the host computer 101 is running a screen saver, the host display will continually change, passing on all of the images to the LCD 113C on the wireless interface 100, which creates a lot of unnecessary traffic on the LAN. In order to reduce this unnecessary LAN traffic, a host manager Windows module 1278 (FIG. 39) disables the screen saver on the host computer 101 anytime a connection is made between the host computer 101 and the wireless interface device 100. Anytime the connection between the host computer 101 and the wireless interface device 100 is broken, the host manager Windows module re-enables the screen saver on the host computer 101.

Figure 38:
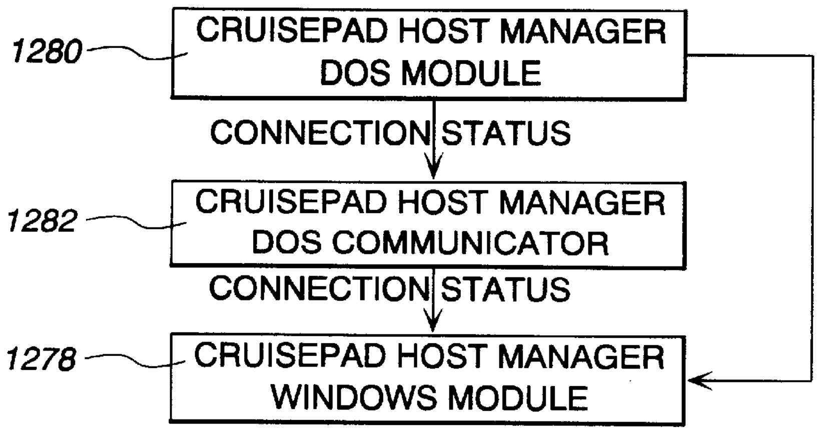
FIGS. 38, 39 and 40 are flow charts relating to a system for disabling the screen saver to reduce LAN traffic.

The connection status between the host computer 101 and the wireless interface device 100 is under the control of a host manager DOS module 1280 (FIG. 38), a terminate and stay resident program. The host manager DOS module 1280 is driven by a timer tick interrupt and checks the connection status at each timer tick interrupt. If the connection status has changed, the host manager DOS module 1280 calls a host manager communicator 1282, which passes the new status to the host manager Windows module 1278.

Figure 39:
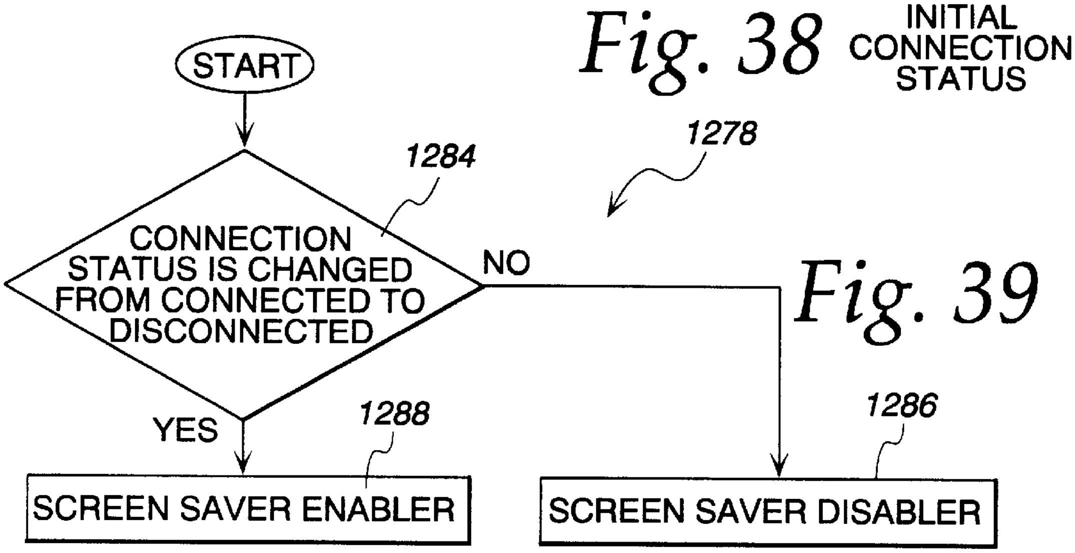

Referring to FIG. 39, anytime the connection status between the host computer 101 and the wireless interface device 100 changes, the host manager Windows module 1278 checks the new status in step 1284. If the connection has been lost, a screen saver disable module 1286 is called, which, in turn, calls several Windows modules: Windows Software Development kit functions; SystemParametersInfo; and WritePrivateProfileString to disable the screen saver. Should the current status indicate that the wireless interface device 100 is connected to the host computer 101, the system proceeds to step 1288, which calls the various Windows module.

Figure 40:
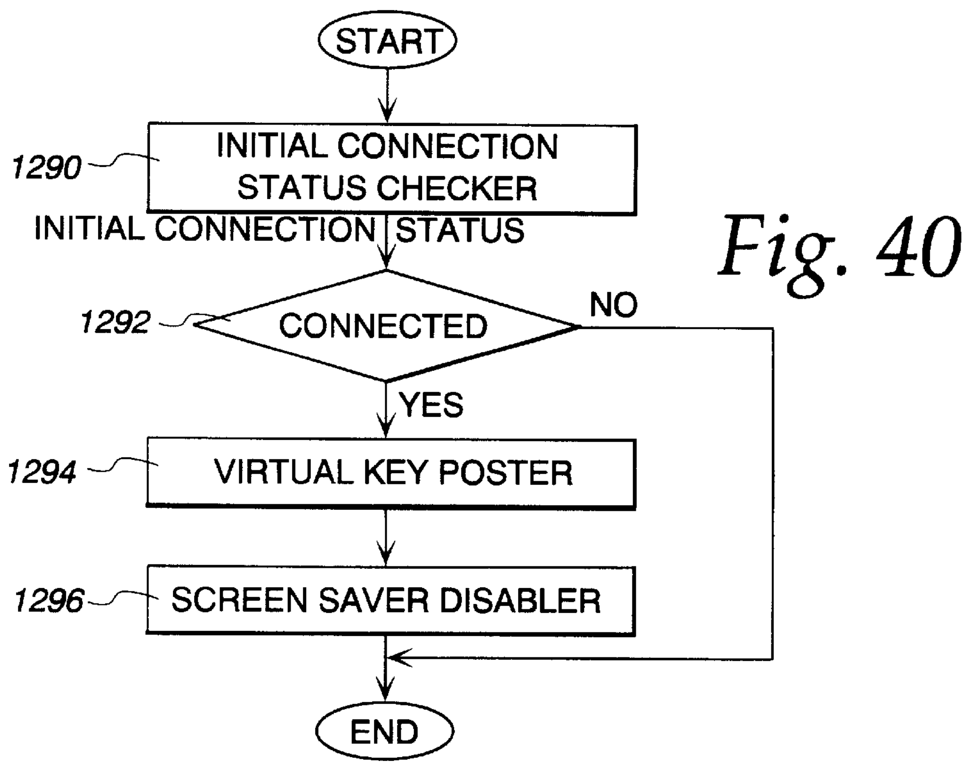

Referring to FIG. 40, anytime the host manager DOS module 1280 is loaded, an initial connection status checker 1290 calls the host manager DOS module 1280 to obtain the current connection status between the wireless interface device 100 and the host computer 101. Next, the system checks in step 1292 whether a connection exists between the host computer 101 and the wireless interface device 100. If not, the system returns. If there is a connection, a virtual key poster 1294 posts a virtual key V_TAB into the Windows Systems queue to force the Windows program to disable the current active screen saver automatically, which, in essence, simulates the press of a key on a keyboard. Once the current active screen saver is disabled, the screen saver on/off flag in a Windows configuration file is turned off in step 1296 to disable the screen saver until there is a change in the connection status.

11. Host Access Protection Password

Whenever a connection is made between wireless interface device 100 and the host computer 101, the user can optionally blank the screen on the host computer 101 and disable the keyboard and mouse inputs connected to the host computer 101. These features prevent the host computer 101 from being accessed while the host computer 101 is under the control of the wireless interface device 100 at a remote location. Once the connection between the host computer 101 and the wireless interface device 100 is lost, the keyboard and mouse inputs on the host computer 101 are re-enabled under the control of the host manager program residing in the host computer 101.

Figure 40A:
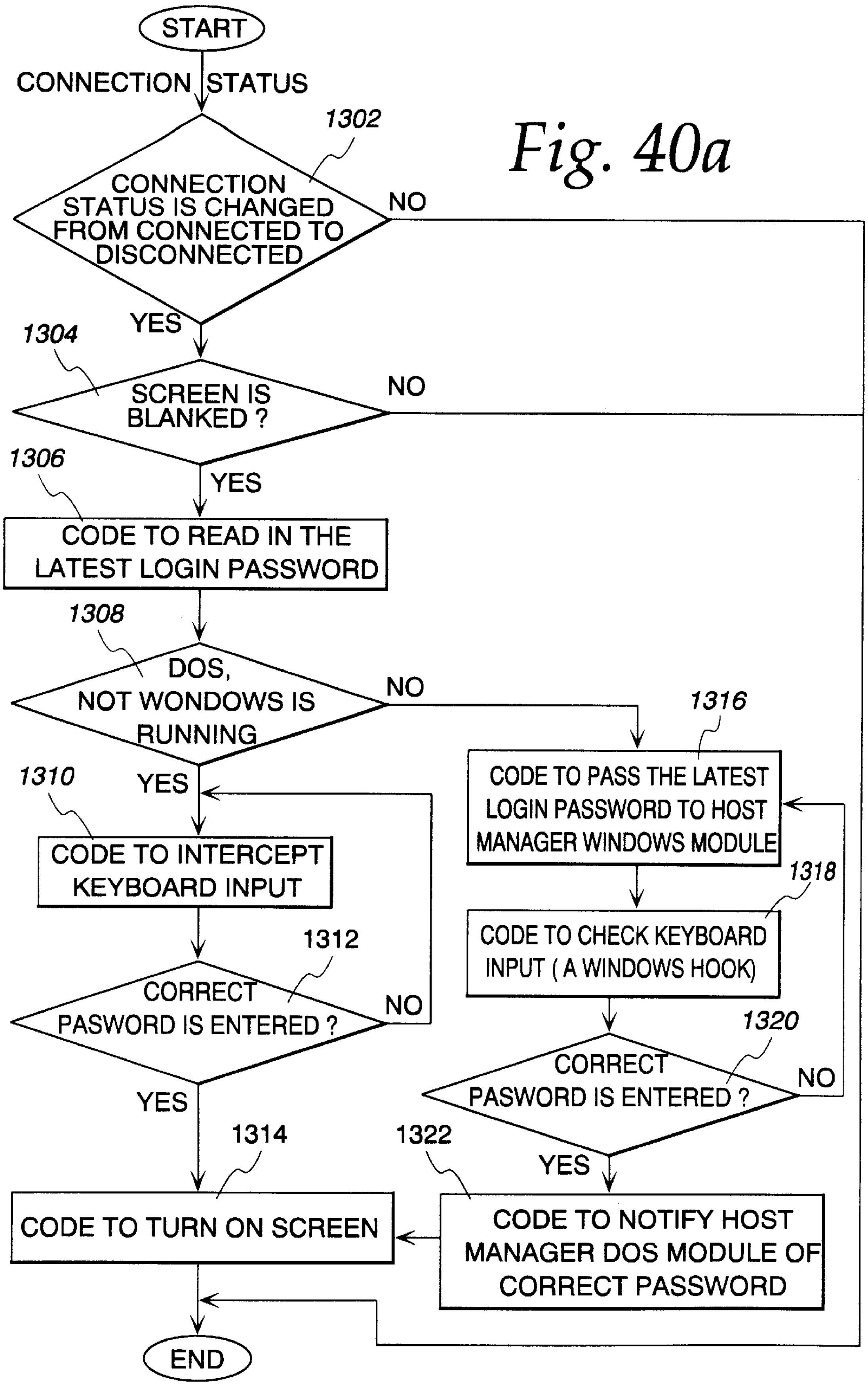
FIG. 40A is a flow chart relating to a host access protection password system.

There are certain situations where the screen to the host computer 101 may not be enabled on disconnection, for example, when the disconnection occurs because the wireless interface device 100 is either out of power or out of range. In order to enable the user to access the host computer 101 in such a situation, a host manager 1300 (FIG. 40A) first checks whether the connection status has changed in step 1302 in the manner as discussed above. If the system is connected, no action is required. However, if the connection has been broken, the system checks in step 1304 whether the screen is enabled. If not, the user will have normal access to the host computer 101. If so, the latest log-in password by the user is stored in by the system in step 1306. Since the host manager DOS module controls the screen, the system checks in step 1308 to determine whether Windows is running in the host computer 101. If DOS is running, the system compares the password entered on the keyboard with the latest log-in password in steps 1310 and 1312. If the password entered does not match the correct password, the system returns to step 1310 and awaits another keyboard input. If the correct password is entered, the screen is turned on in step 1314.

Should the host computer 101 be running Windows, as determined in step 1308, the latest log-in password is passed to a host manager Windows module in step 1316. The system next checks in steps 1318 and 1320 whether the correct password was entered in a similar manner as discussed above. If so, since DOS handles the enabling of the screen on the host computer 101, the host manager DOS module is notified that the correct password was entered in step 1322, which, in turn, enables the screen in step 1314.

12. Double Pen-Up Events

The pen controller 110A (FIG. 21) normally generates a series of interrupts and, in turn, a series of pen packets whenever the pen touches the LCD 113C (a pen-down event) and is lifted from the LCD 113C (a pen-up event) and generates an interrupt. For each interrupt, a single packet is generated. The format of the possible packets is illustrated in Table 7 below, where x0 is bit 0 of the x coordinate of the pen location and y0 is bit 0 of the y coordinate of the pen location, etc.

TABLE 7

| PACKET NAME | BIT 7 | BIT 6 | BIT 5 | BIT 4 | BIT 3 | BIT 2 | BIT 1 | BIT 0 |
|---|---|---|---|---|---|---|---|---|
| P1 | 1 | 1 | 0 | x11 | x10 | x9 | x8 | x7 |
| P2 | 0 | x6 | x5 | x4 | x3 | x2 | x1 | x0 |
| P3 | 0 | 0 | 0 | y11 | y10 | y9 | y8 | y7 |
| P4 | 0 | y6 | y5 | y4 | y3 | y2 | y1 | y0 |
| P5 | 1 | 0 | 0 | 0 | 0 | 0 | 0 | 0 |

The packets are generated in the following sequence (p1, p2, p3, p4), (p1, p2, p3, p4) . . . (p1, p2, p3, p4), (p5). The packets p1, p2, p3, p4 relate to pen-down events (a pen point); each group of packets (p1, p3, p3, p4) relating to one x-y coordinate of the pen. The packet p5 relates to a pen-up event. Thus, anytime the pen is lifted from the digitizer, one packet p5 is generated. Thus, when the pen first touches the digitizer panel and is moved across the digitizer, a plurality of pen points (p1, p2, p3, p4) are generated which correspond to the x, y locations of the points touched by the pen. Normally 110 pen points per second are generated by the pen controller 110A.

Whenever a 12-bit serial pen packet is generated by the pen controller 110A and read by a firmware module in step 1330 (FIG. 41), an interrupt is generated in step 1332. A pen packet assembler assembles the packets into pen points (p1, p2, p3, p4). These pen points (p1, p2, p3, p4) are processed and passed to the applications program. In order to process each pen point (p1, p2, p3, p4), the interrupts must be disabled. During the time when the interrupts are disabled, the pen point packets (p1, p2, p3, p4) and the pen-up packets p5 are generated by the pen controller 110A but not processed and thus are garbled or lost. Lost or garbled pen point packets (p1, p2, p3, p4) do not affect mouse emulation. However, since mouse emulation is based on both pen-down and pen-up events, lost pen-up packets p5 can result in the mouse emulation being hampered, possibly resulting in the system being stuck in the state preceding the pen-up event.

Figure 41:
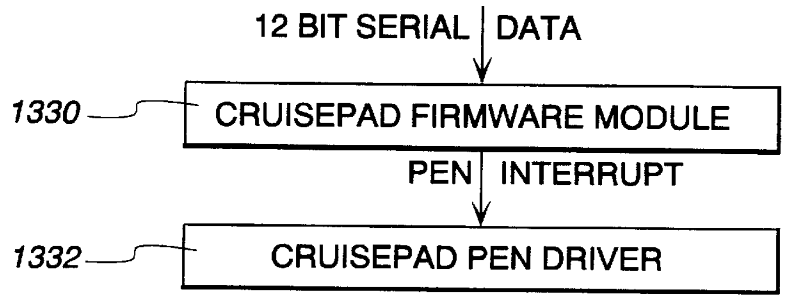
FIGS. 41–43 are flow charts relating to a system for handling pen-up events.
Figure 42:
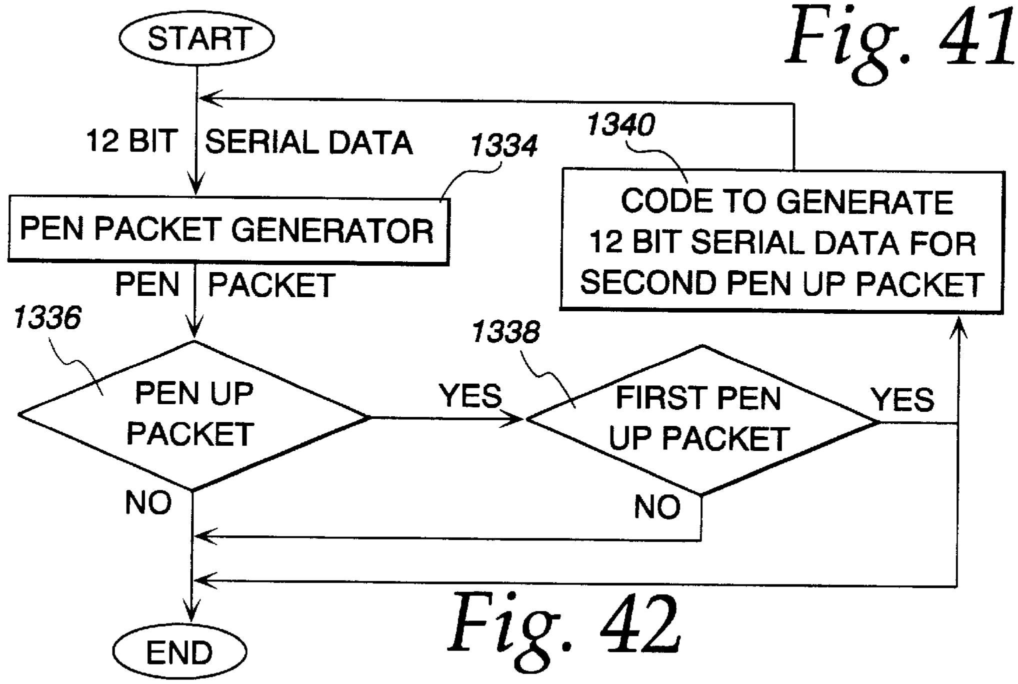

In order to solve this problem, a firmware module 1330 generates two pen-up packets p5. More particularly, with reference to FIG. 42, the firmware module 1330 reads in the 12-bit serial data from the pen controller 110A into packets in step 1334. Next, the system checks in step 1336 whether the packet was a pen-up packet p5. If not, the system proceeds to the pen driver in step 1332 (FIG. 41). If the packet is a pen-up packet p5, the system checks to determine if the pen-up packet p5 is the first pen-up packet in step 1338. If not, the system passes the packet to the pen driver in step 1332 as discussed above. If the system determines in step 1338 that the pen-up packet p5 is the first pen-up packet p5, the serial data for second pen-up packet p5 is generated in step 1340 and assembled in step 1334. In addition, the first pen-up packet p5 is passed to the pen driver.

Figure 43:
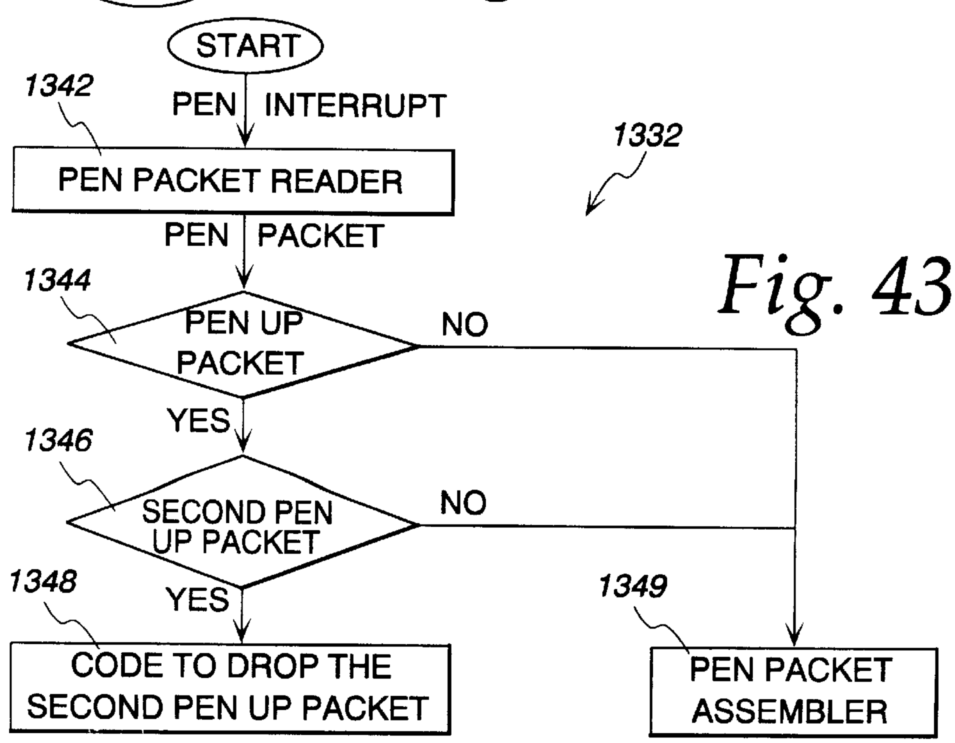

The pen driver 1332 (FIG. 43) is responsive to an interrupt that is generated each time a packet is assembled. In response to an interrupt, the pen driver reads the packet in step 1342. In step 1344, the pen driver determines whether the packet is a pen-up packet p5. If not, the pen packet assembler processes the packet in step 1346. If the system determines in step 1344 that the packet is a pen-up packet, it next checks in step 1346 whether the packet is the second pen-up packet. If so, indicating chat the first pen-up packet was processed, the second pen-up packet is dropped in step 1348. If not, the packet is determined to be a first pen packet, which is processed by the pen packet assembler in step 1346.

13. Seamless Integration of Wired and Wireless LANS

The wireless interface device 100 may be connected to host computer 101 by way of a wireless LAN. The wireless LAN protocol is Novell open data link interface IPXODI protocol. Since the IPXODI protocol is also used for wired LAN's, it would be desirable to connect the wireless interface device 100 to a wired LAN system and utilize the Novell IPXODI protocol. Unfortunately, the IPXODI protocol can only communicate with a single LAN card at a time, either a wired LAN card or a wireless LAN card at one time.

The standard Novell LAN stack configuration is illustrated in FIG. 45. The LAN card is identified with the reference numeral 1352. Communication between the LAN card 1352 and the IPXODI protocol is by way of a driver 1354. The driver 1354 communicates with the IPXODI protocol (IPXODI.COM) 1355 by way of a link support layer LSL.COM 1356. The Novell IPXODI protocol passes data between the applications programs 1358 and the link support layer LSL.COM 1356. Even though the link support layer LSL.COM can support multiple LAN cards, the IPXODI protocol only supports a single LAN card.

In order to enable the Novell IPXODI protocol to support a configuration as illustrated in FIG. 44 to enable the wireless interface device 100 to connect to both a wired LAN card 1352 and a wireless LAN card 1360, an additional layer IPXMUX.COM (FIG. 46) is provided for multiplexing incoming and outgoing packets to and from the wired LAN card 1352 and the wireless LAN card 1360. The multiplexer IPXMUX.COM manipulates the data packet source and destination addresses to simulate a single LAN card so as to be compatible with the IPXODI protocol. By providing the additional layer IPXMUX.COM, the host computer 101, as well as the wireless interface device 100, will be able to access all of the LAN resources 1350 (FIG. 44).

Referring to FIG. 46, the additional layer IPXMUX.COM is stacked between the Novell IPXODI protocol IPXODI.COM 1355 and the link support layer LSL.COM 1356. As mentioned above, the link support layer LSL.COM 1356 can support two LAN cards Thus, a wireless LAN card 1360 and a corresponding wireless LAN card driver 1362, which communicates with the link support layer LSL.COM 1356 along with the wired LAN card 1352 and its corresponding driver 1354, can communicate with IPXODI.COM by way of the driver.

The multiplexer IPXMUX.COM 1364 multiplexes or interleaves the data from both the wireless LAN card driver 1354 and tie wired LAN card driver 1362 to the IPXODI protocol by manipulating the source and destination addresses of incoming and outgoing packets, so that as far as the Novell IPXODI protocol is concerned, it is only communicating with a single LAN card. Similarly, communication from the host computer 101, as well as applications 1358, which may be running on the wireless interface device 100, to both the wired LAN card 1352 and the wireless LAN card is formatted by the IPXODI.COM and multiplexed to either the wireless LAN card 1360 or wired LAN card 1352 by the multiplexer IPXMUX.COM by way of the link support layer. The multiplexer IPYMUX.COM 1364 is loaded after the wired LAN card driver 1354 and the wireless LAN card driver 1362 are loaded and before IPXODI.COM 1355.

Figure 47:
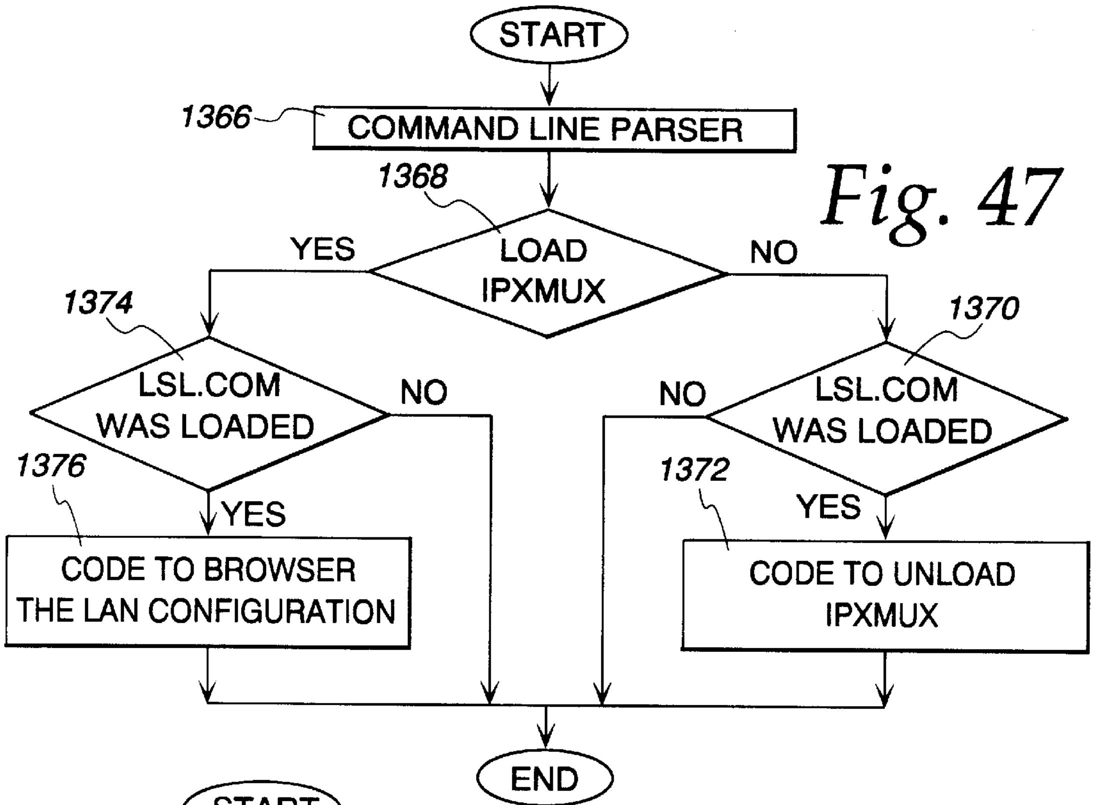
FIGS. 47–52 are flow charts relating to the seamless integration of wired and wireless LANS.
Figure 48:
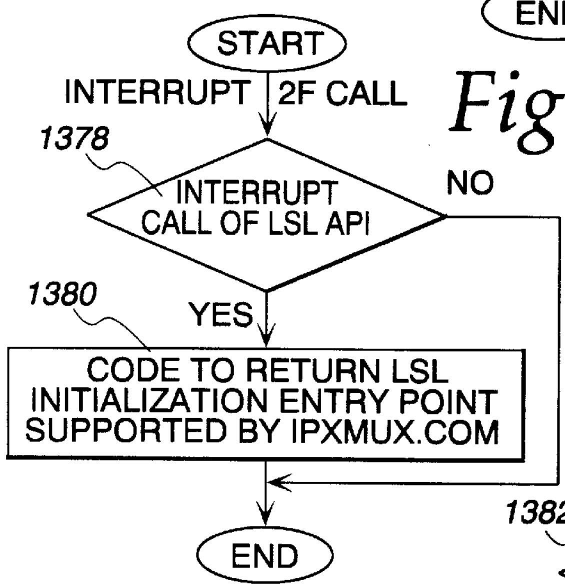

The Novell LAN software includes a configuration file which checks the particular LAN cards 1352 being run by the LAN card driver 1354. The system is initialized by the routine illustrated in FIG. 47, which is run each time the multiplexer IPXMUX.COM 1364 is loaded. Initially, a command line parser 1366 is used to determine whether the user has issued commands to either load or unload IPXMUX.COM command in step 1368. If the command is an unload command, the system checks whether IPXMUX. COM 1364 has already been loaded in step 1370. If so, the system unloads IPXMUX.COM 1364 in step 1372. If IPXMUX.COM 1364 has not been loaded, the system exits the initialization routine.

If the command was to load IPXMUX, the system checks in step 1374 to determine if the link support layer LSL.COM 1356 has been loaded. If not, the system exits the initialization routine since IPXMUX.COM cannot be loaded until the link support layer LSL.COM has been loaded. If the link support layer LSL.COM 1356 was loaded, control is passed to a LAN configuration browser in step 1376 to browse the LAN configuration for the number of LAN cards and the frame types of the cards and the number of frame types (i.e. IEEE 802.2, 802.3, etc.) to find out which LAN card drivers are running. In addition, the browser finds and saves all relevant application program interface entry points to the link support layer LSL.COM and sets to those supported by IPXMUX.COM. The browser also sets the LSL interrupt vector to the interrupt vector supported by IPXMUX.COM, as well as finds and saves all logical board numbers.

In order to interleave the data from the wired LAN card 1352 (FIG. 46) and the wireless LAN card 1360 to IPXODI.COM to emulate a single LAN card, 2F interrupt calls from the application program by way of IPXODI.COM are trapped and handled by a separate routine. In particular, 2F interrupt calls are checked in step 1378 to determine if such calls are interrupt calls to LSL.COM. If not, the system exits. If so, the address of the LSL protocol support API handler supported by IPXMUX.COM is returned. Interrupt calls to LSL.COM from an application program are handled by a special interrupt handler. If the interrupt call is to LSL.COM, a LSL initialization entry point, supported by IPXMUX. COM is returned in step 1380. The LSL initialization entry point represents an address of the protocol initialization routine into LSL.COM.

Figure 49:
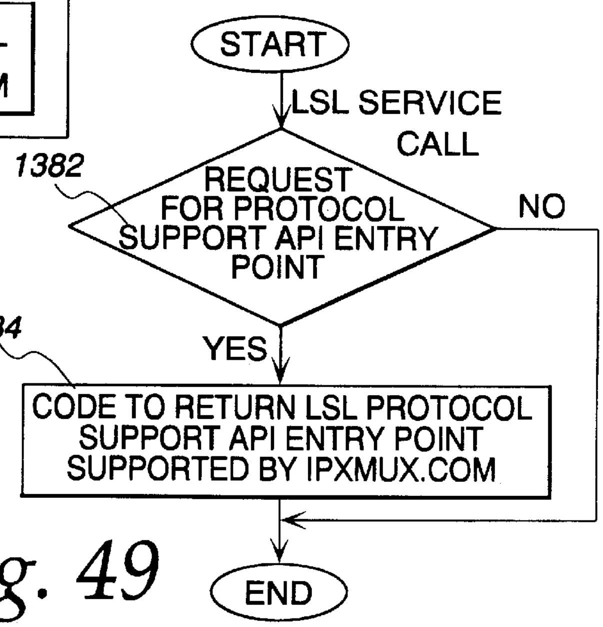

Once the address of the LSL initialization entry point is known by the IPXODI protocol, the IPXODI protocol will call that address for service. Thus, all LSL service calls are checked in step 1382 (FIG. 49) to determine if the call is a request for protocol support API entry point. If not, the multiplexer IPXMUX.COM will direct that call into LSL.COM. If so, an address of a special 2F interrupt handler (LSL Protocol Support API Handler) supported by IPXMUX.COM is returned to IPXODI.COM in step 1384.

Figure 50:
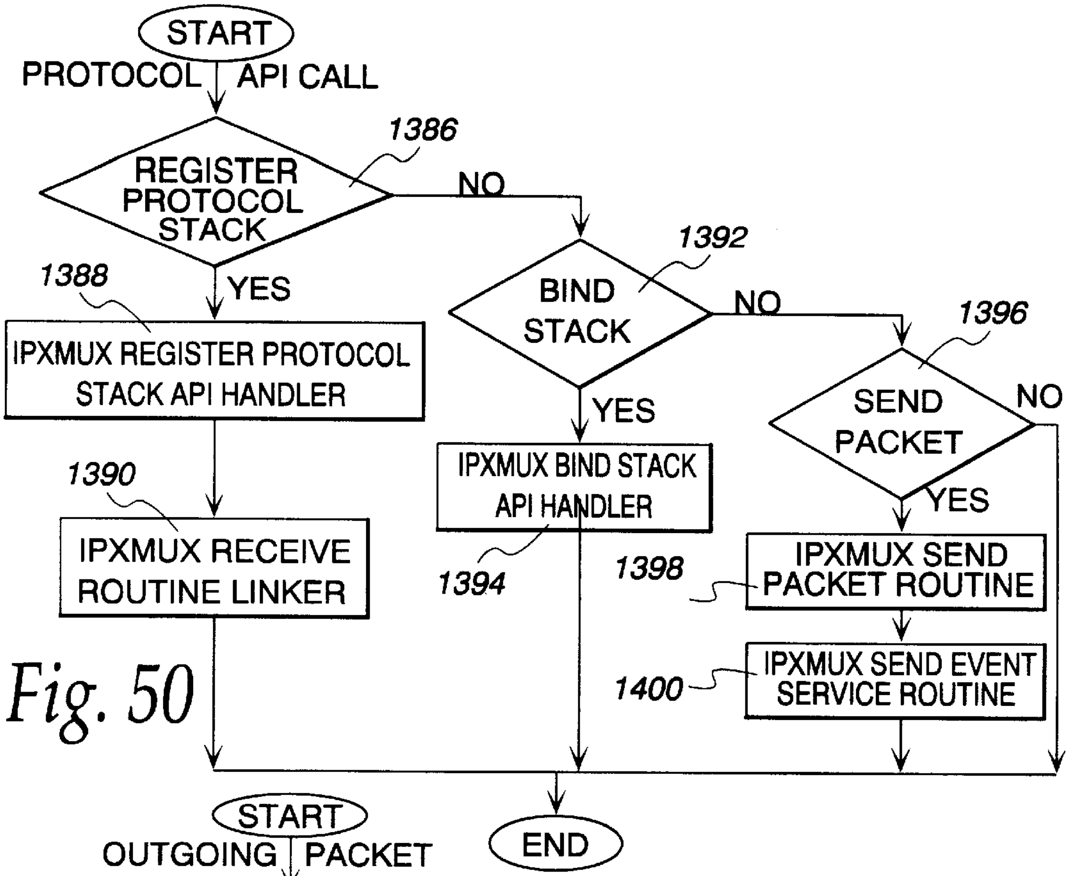

The special interrupt handler, LSL Protocol Support API Handler, which forms a part of IPXMUX.COM, is illustrated in FIG. 50. Three services are handled by the LSL Protocol Support Handler, which is supported by the multiplexer IPXMUX.COM to set up an address for communication with a host on the network. These services are register protocol stack, bind stack and send a packet. The balance of the services are handled by LSL.COM.

The entry point of the LSL Protocol Support API Handler in IPMMUX.COM from the standpoint of IPXODI.COM is the protocol support API within the link support layer LSL. Since the link support layer LSL.COM supports various protocols, such as IPXODI and TCPIP, registration of the IPXODI.COM protocol is checked in step 1386. If the call to the link support layer LSL is to register a protocol stack, an IPXMUX register protocol stack application program interface (API) handler in step 1388 checks whether the protocol stack is IPXODI. If the protocol stack is IPXODI, the protocol stack handler sets a packet receive handler, supported by IPXMUX.COM and calls LSL.COM's protocol stack API to register the protocol. The protocol stack handler also saves the stack ID. Subsequently, in step 1390, an IPXMUX Receive Routine Linker sets the protocol stack IPXODI's receive routine address to the packet receive address supported by IPXMUX.COM.

If the protocol API call is not to register the protocol stack, the system then checks in step 1392 whether a special registration service, a bind stack service, is requested. A bind stack service, normally done before registration, is used to set up a protocol for communication, i.e. packet length, etc. If bind stack service is requested, an IPXMUX Bind Stack API handler in step 1394 is called, which forces IPXODI to bind to the wired LAN card 1352 to which IPXODI is bound before the wireless LAN card 1360 was installed in order to be compatible with the IPXODI protocol. The IPXMUX bind stack handler also saves the process ID of the binding for sending and receiving packets.

Figure 51:
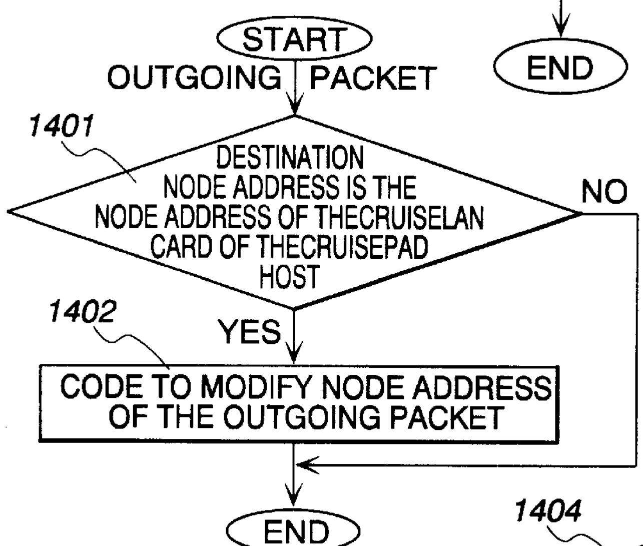
Figure 52:
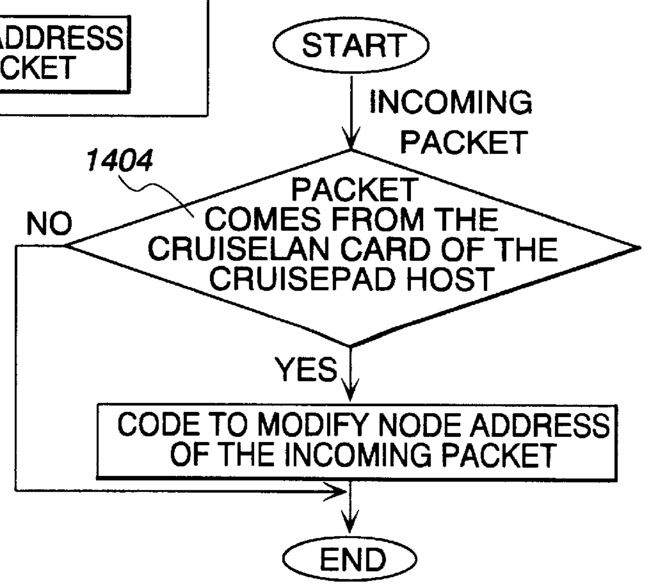

If the protocol API call is not a register protocol stack or a bind stack service, the system checks in step 1396 whether send packet service is requested. If not, the system exits and the service call is handled by LSL.COM. If so, an IPXMUX send packet routine is called in step 1398 and 1400 (FIG. 51) which sets the address of the wireless LAN card 1360 as the source node address in step 1402. The packet modifier also sets the node address of the wireless interface device 100 as the packet's destination mode address in step 1400 (FIG. 51) The send event service routine address is set to the address of the send event service routine in IPXMUX.COM before it returns.

Incoming packets are handled by an incoming packet handler illustrated in FIG. 32. In particular, incoming packets are checked in step 1404 whether the source address of the packet is from the wireless LAN card 1360. If not, the system returns. If so, the packet's source mode address is saved and set to the mode address of the wireless LAN card 1360 while the pocket destination address is set to the address of the wired LAN card 1352 to which IPOXDI is bound.

14. Host Control Mode

Figure 53:
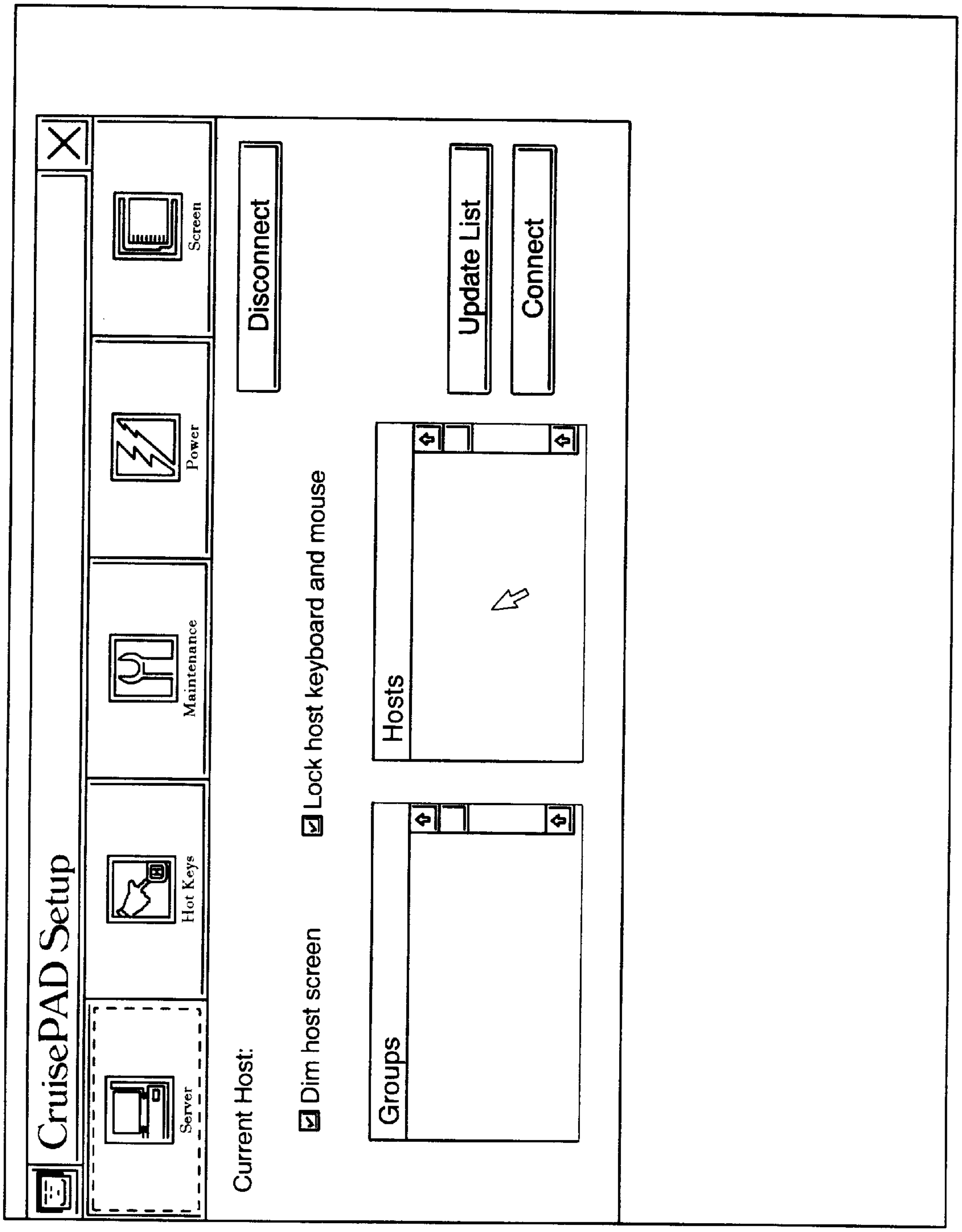
FIGS. 53–57 are illustrations of various set-up dialog boxes available on the wireless interface device.
Figure 54:
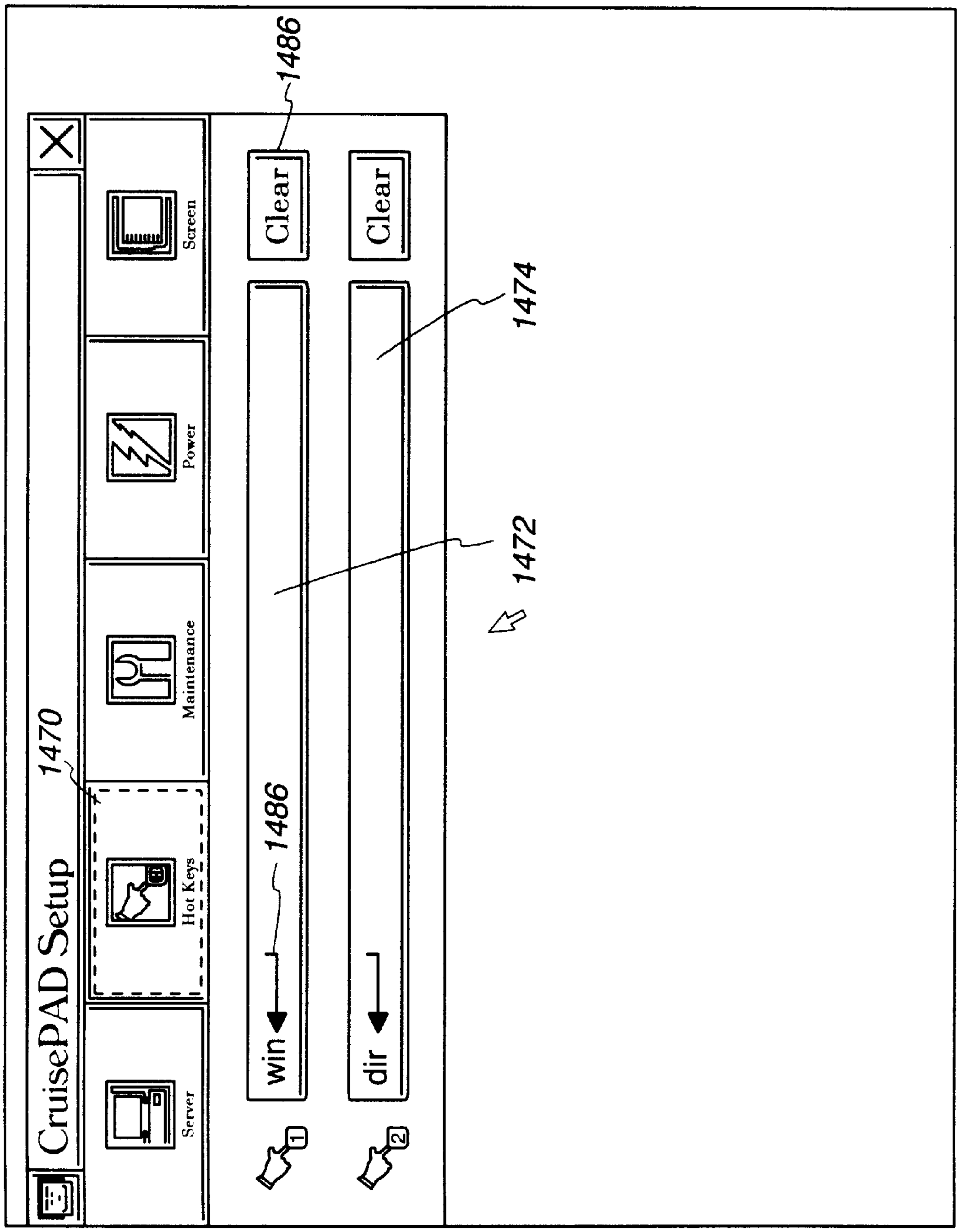
Figure 55:
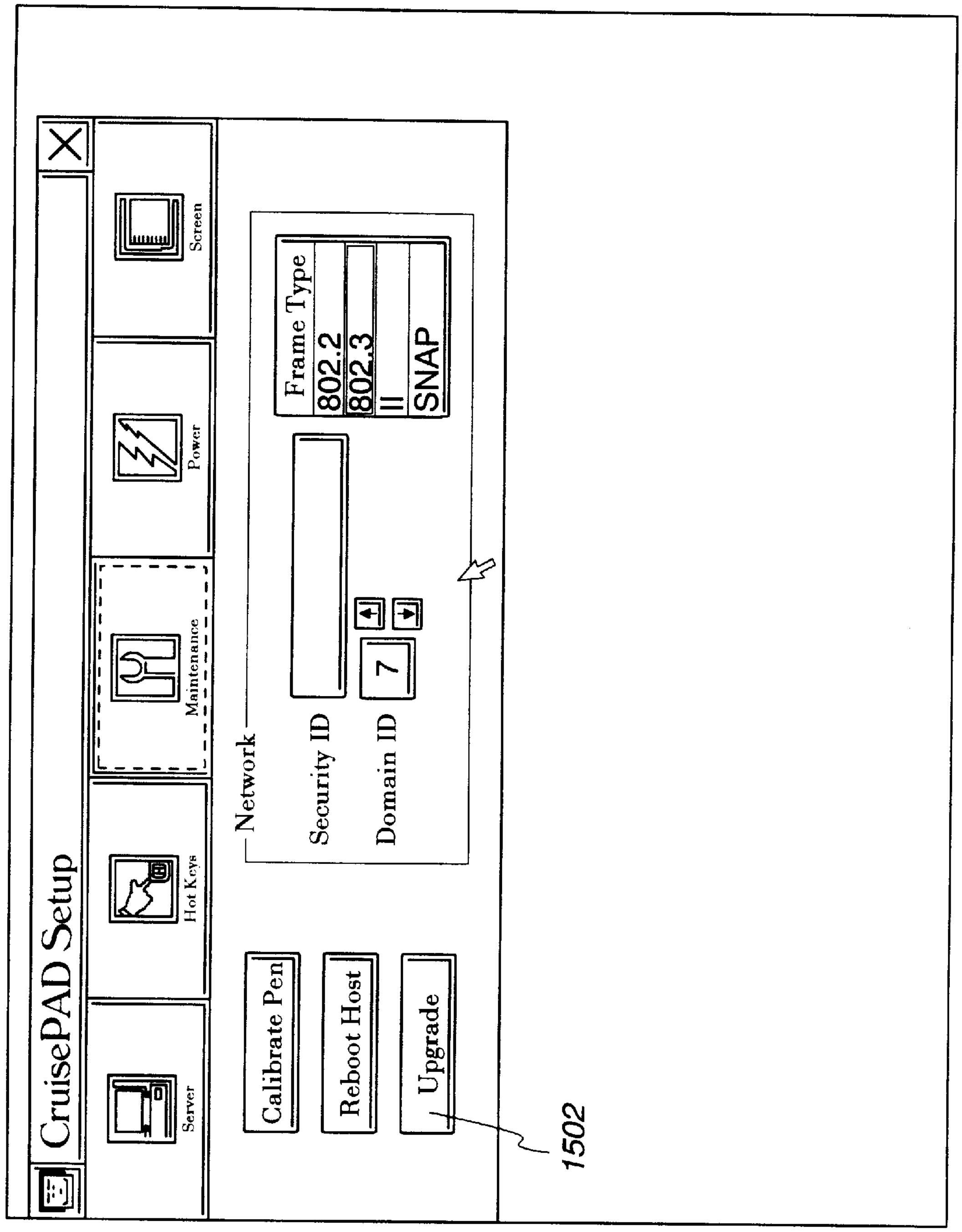
Figure 56:
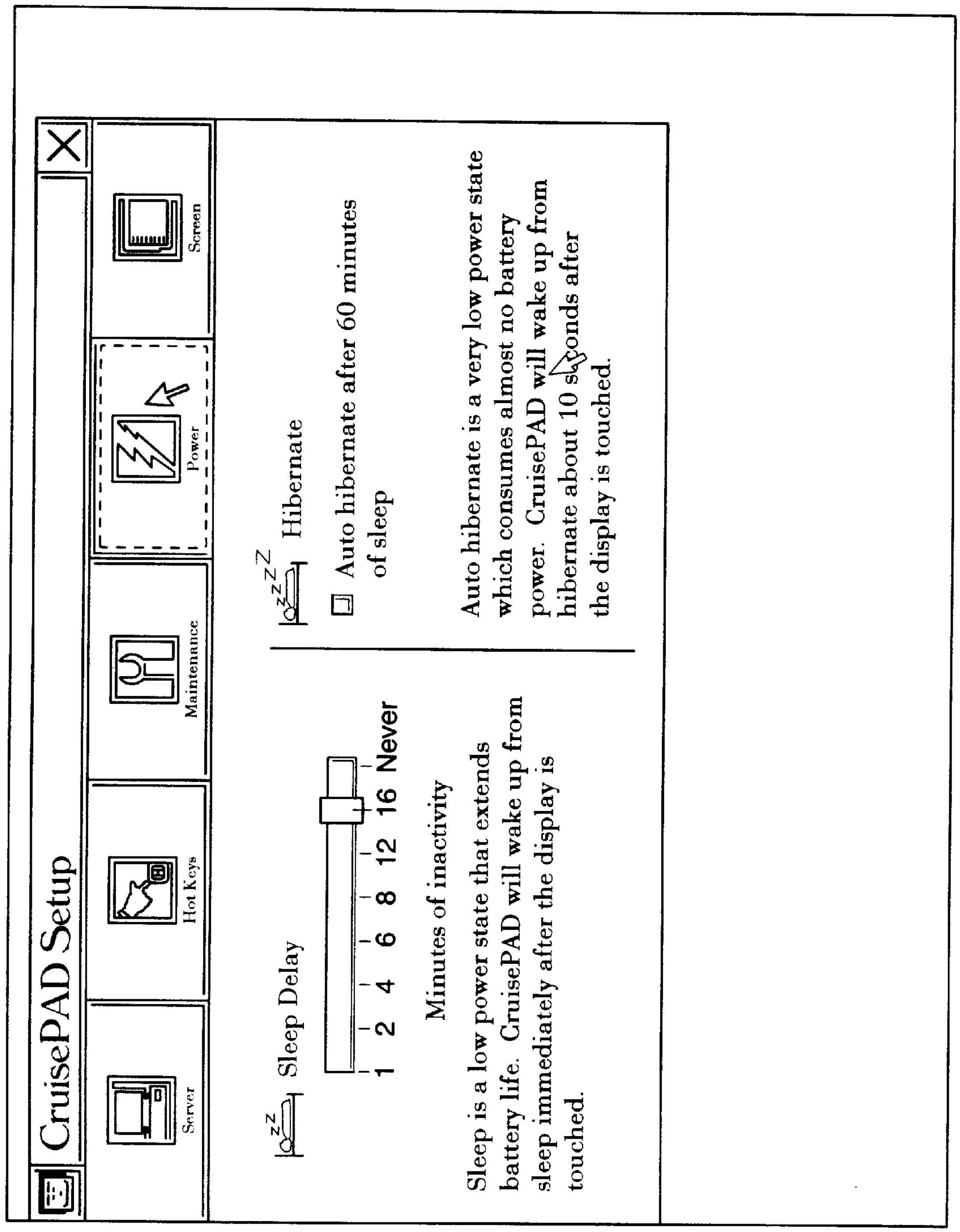
Figure 57:
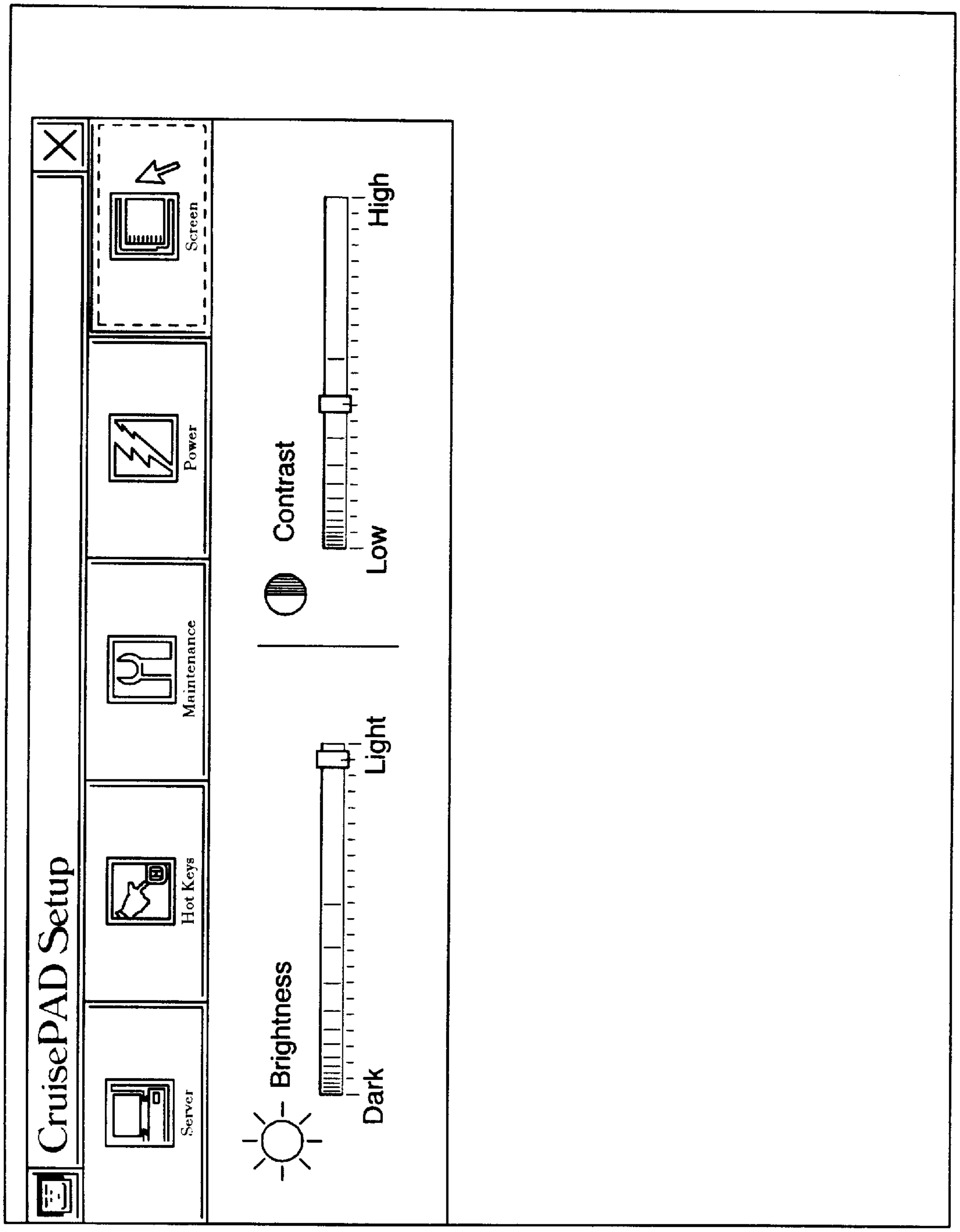

The wireless interface device 100 includes a hot icon 1408 (FIG. 37) in the hot icon area 1202 (FIG. 36) of the LCD 113C for switching control of the host computer 101 from the wireless interface device 100 and the host computer 101. While the wireless interface device 100 has control of the host computer 101, the user has the option to dim the screen of the host computer 101, as well as lock out the keyboard and mouse inputs. In particular, with reference to FIG. 37, a set-up window hot icon 1410 may be selected Activation of the set-up window icon causes one of five selectable set-up dialog boxes to be displayed in the viewing area 1200 (FIG. 36) of the LCD 113C on the wireless interface device 100. These dialog boxes are illustrated in FIGS. 53–57, which can be selected by a graphical button bar 1412 (FIG. 53). When the "host" button is selected, a list of host computer groups that are accessible by the wireless interface device 100 as well as the specific host to which the wireless interface device 100 is connected are displayed. When the wireless interface device 100 has control of the host computer 101, the host computer screen can be dimmed and the host keyboard and mouse can be locked out by placing the pen down in the box next to those functions in the dialog box illustrated in FIG. 53. FIG. 54 relates to setting up remote keyboard macros. FIG. 55 is a maintenance dialog box which enables various maintenance functions, such as calibration of the pen, rebooting of the host, and the like. FIG. 56 relates to power settings, and in particular includes an inactivity timer for timing periods of inactivity in order to place the wireless interface device 100 in a low-power state. FIG. 57 is selectable by the screen button and enables the brightness and contrast of the LCD 113C on the wireless interface device 100 to be adjusted.

Figure 58:
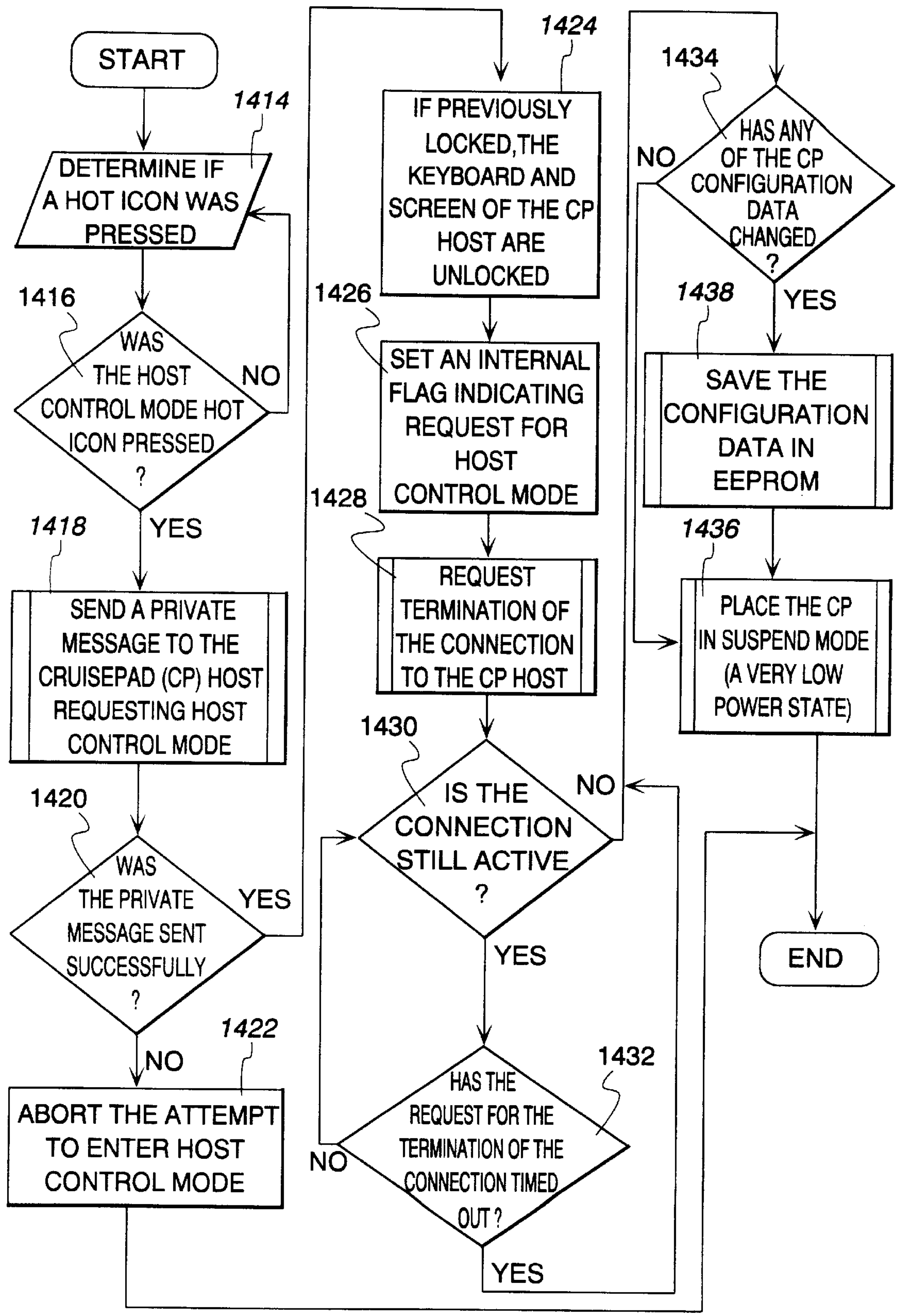
FIG. 58 is a flow chart relating to the host control mode.

FIG. 58 illustrates a method for disconnecting the host computer 101 from the wireless interface device 100 and automatically returning control of host screen, keyboard and mouse to the host computer 101. In addition, any configuration settings of the wireless interface device, such as contrast and brightness adjustment, are also saved in order to obviate the need to readjust the wireless interface device 100, the next time it is connected.

Initially in step 1414 (FIG. 58), the system determines if the hot icon area 1202 of the LCD 113C on the wireless interface device 100 was pressed. As illustrated in FIG. 37, the hot icon area 1202 includes several hot icons. Thus, the system checks in step 1416 whether the host control mode hot icon 1408 (FIG. 37) was selected. If not, the system loops back to step 1414 and waits for the hot icon area to be pressed If the host control mode hot icon 1408 was selected, the wireless interface device 100 sends a private message (i.e. pocket) to the host computer 101 in step 1418, requesting host control mode.

The system then checks in step 1420 whether the host computer 101 returned an acknowledgement that the private message was received. If an acknowledgement of the private message is not received by the wireless interface device 100, the attempt to enter the host control mode is aborted in step 1422. If an acknowledgement is received, the system checks in step 1424 if the mouse keyboard and mouse had been previously locked out by the wireless interface device 100 as discussed above. If so, the host keyboard and mouse are unlocked. Subsequently in step 1426, an internal flag is set indicating a request for termination of the connection with the host computer 101 in step 1428. The request for termination initiates a timer, which, when timed out, disconnects the wireless interface device 100 from the host computer 101. Thus, the system checks to determine if the host computer 101 is still connected to the wireless interface device 100 in step 1430. If so, the system determines if the request for termination has timed out in step 1432. If not, the system waits for the timer to time out and disconnects the wireless interface device 100 from the host computer 100. Once the wireless interface device 100 is disconnected, control of the host computer 101 is returned to the host computer 101.

In order to obviate the need to reconfigure the wireless interface device 100 the next time the wireless interface device 100 is connected to the host computer 101, the system checks in step 1434 whether any of the configuration data (i.e. contrast, brightness (FIG. 57) was changed. If not, the wireless interface device 100 is placed in a suspend mode in step 1436. If the configuration data did change, the new configuration data is saved in the EEPROM 111B (FIG. 12) in step 1438.

15. Broadcast for Available Hosts

The wireless interface device 100 can determine the available hosts within range for wireless connection. The user can then select a host by way of a dialog box (FIG. 53), which will be discussed in more detail below An important aspect of the wireless interface device 100 is that it can be connected to virtually any available hosts without any physical connections and without knowing the host address or node address beforehand, unlike known wireless and wired LAN systems where the node addresses of each of the personal computers in the network have a preassigned node address and are therefore known prior to any communications being established.

Figure 59:
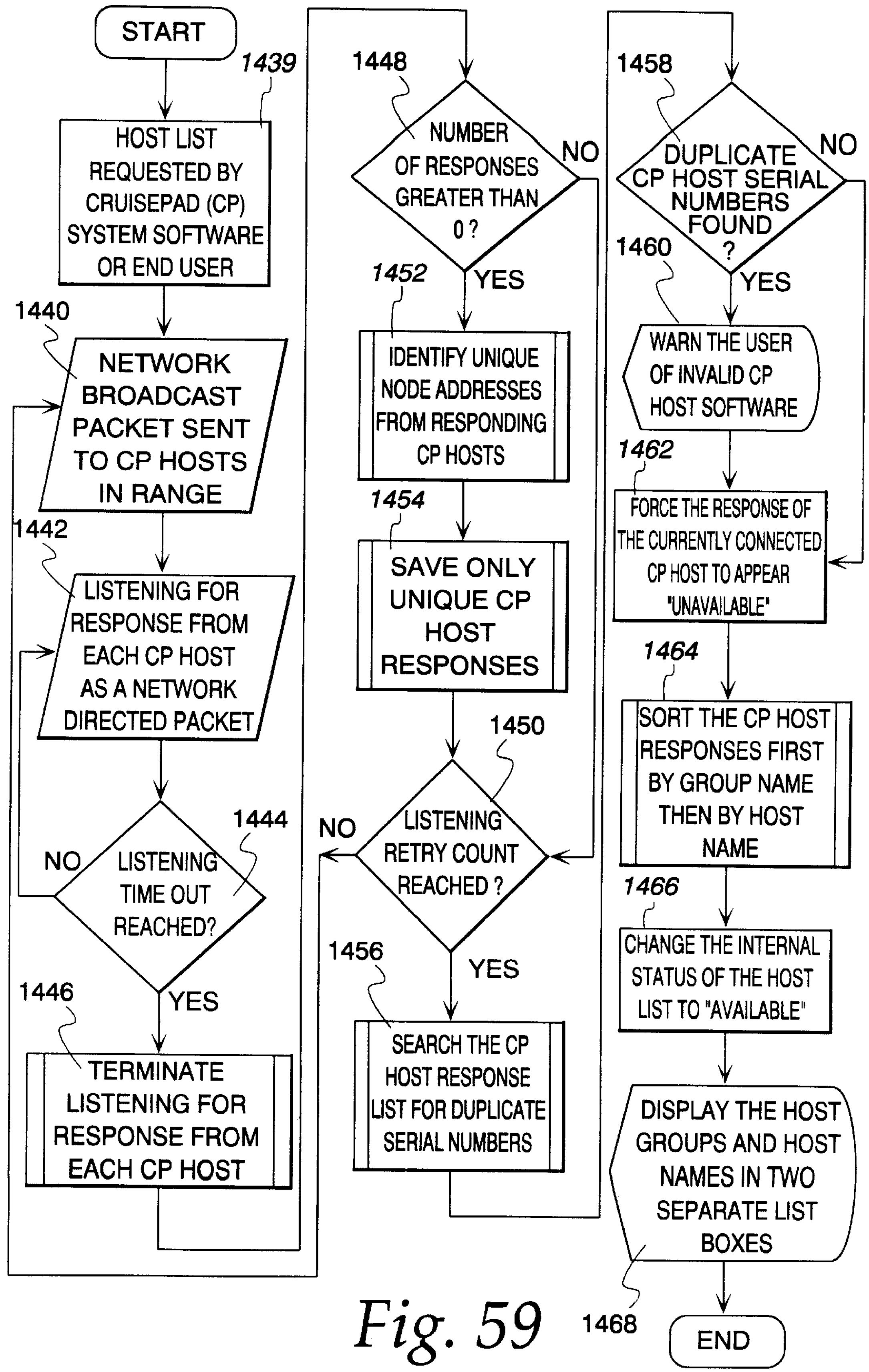
FIG. 59 is a flow chart relating to a system for broadcasting for available hosts.

In order to initiate connection of the wireless interface device 100 to an available host 101, the set-up hot icon 1410 (FIG. 37) is selected in step 1439 (FIG. 59) which causes a set-up dialog box, as illustrated in FIG. 53 to be displayed in the viewing area 1202 (FIG. 36) of the LCD 113C. Subsequently, in step 1440, the wireless interface device 100 broadcasts network packets to be received by all available hosts 101 in range that are on the same channel and domain as the wireless interface device 100. After the network packets are broadcast, the wireless interface device 100 listens for a predetermined time period in steps 1442 and 1444 for return acknowledgement packets from the available hosts 101, which contain, among other things, the node addresses of the available hosts 101. After the time-out period the wireless interface device 100 terminates listening for responses from the available hosts 101 in step 1446. After listening is terminated, the system checks the number of responses received in step 1448. If no responses are received, the wireless interface device 100 repeats the cycle (i.e. returns to step 1440) for a predetermined number of retries as determined in step 1450.

If a response is received, the system identifies the unique node address from the responding hosts 101 in step 1452 and saves the unique host node addresses in step 1454. The list of available hosts 101 is searched in step 1456 for duplicate serial numbers. Should duplicate serial numbers be found in step 1458, a warning is generated in step 1460, warning the user that a duplicate copy of software is running on one of the responding hosts 101. In step 1462, the currently connected host is forced to appear as unavailable on the dialog box illustrated in FIG. 53.

The responding hosts 101 are sorted first by group name and then by host name in step 1464. After the sorting, an internal status list of the available hosts 101 in designated as available in step 1466. Subsequently, the available hosts and groups are displayed in the dialog box illustrated in FIG. 53 in step 1468. Movement of the cursor (by a pen-down event) to the desired host 101 selects that host 101. A "connect" button on the dialog box is then selected to connect the wireless interface device 100 to the selected host 101.

16. Remote Keyboard Macros

Figure 60:
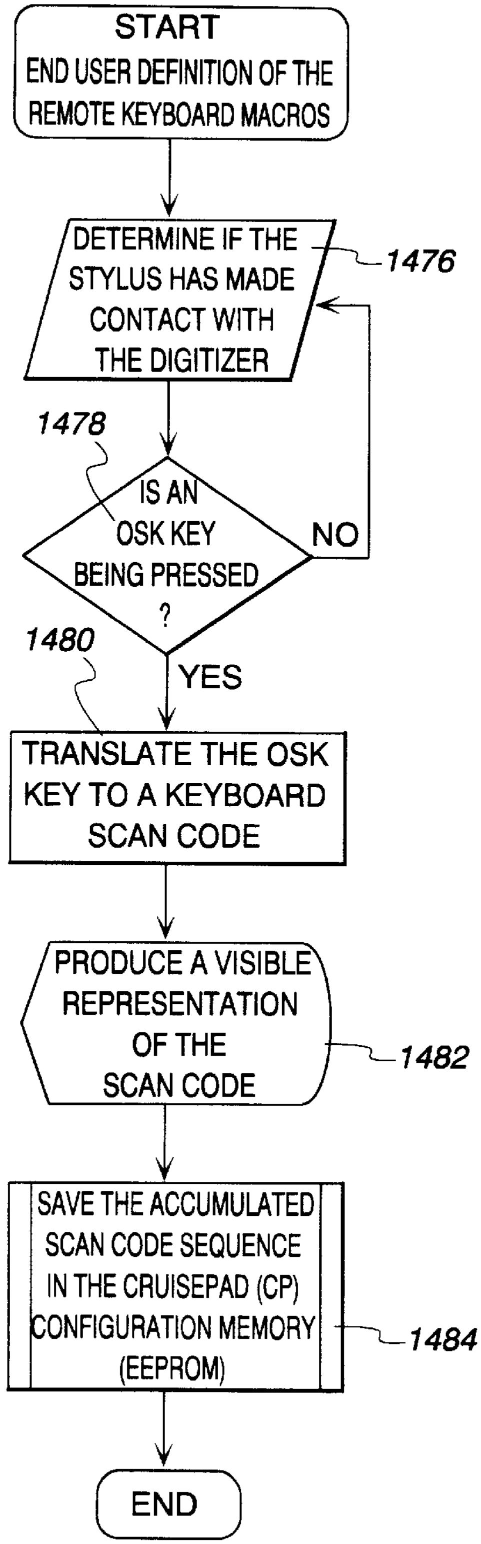
FIGS. 60 and 61 are flow charts relating to a system for providing remote keyboard macros on the wireless interface device.
Figure 61:
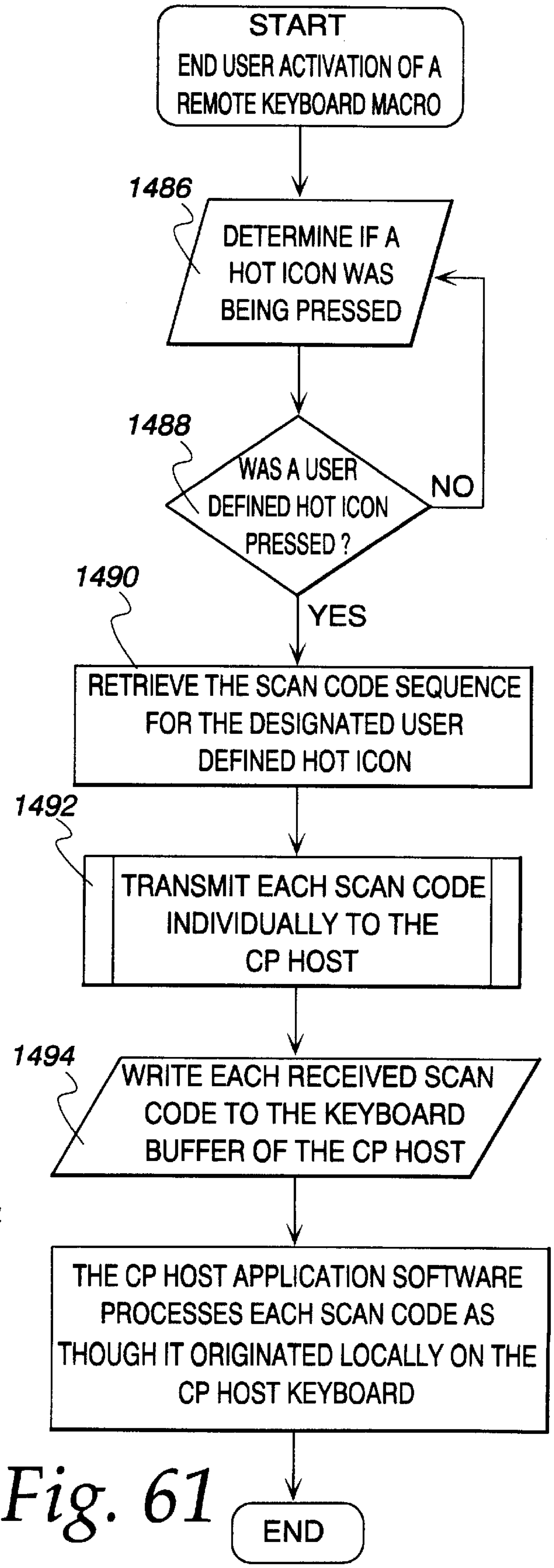

FIGS. 60 and 61 relate to remote keyboard macros on the wireless interface device 100. An important aspect of the wireless interface device 100 is that the remote keyboard macros are provided by way of a wireless connection. FIG. 60 relates to developing the macros while FIG. 61 is directed to using the macro.

Referring to FIG. 37, the wireless interface device 100 includes two user-defined hot icons 1472 and 1474, located in the hot icon area 1202 (FIG. 36) of the LCD 113C, that can be used for the macros. These hot icons 1472 and 1474 are configurable in a set-up mode, which, as discussed above, is under the control of the set-up hot icon 1410 (FIG. 37). Once the set-up hot icon 1410 is selected, a hot key button 1470 on the dialog box illustrated in FIG. 54 is selected. As noted in FIG. 54, the dialog box includes two configurable macros. These macros are configured by way of the two edit fields 1472 and 1474 (FIG. 54). In order to configure the macros, the icon for the desired edit field 1472 or 1474 is selected. These edit fields 1472 and 1474 are configurable by way of a virtual on-screen keyboard (OSK), selectable by way of a hot icon 1480 (FIG. 37).

Referring to FIG. 60, the system checks in step 1476 whether there has been a pen-down event in the viewing area 1202 (FIG. 36) of the LCD 113C and, in step 1478, whether the OSK hot icon 1480 (FIG. 37) was selected. If not, the system loops back to step 1476. If so, the selected key on the OSK is translated into a keyboard scan code in step 1480 and a visual indication of the key selected in the edit field 1472 or 1474 in step 1482. The process is repeated until the macro (i.e. WIN, DIR), followed by a carriage return 1486, is complete and the macro is saved in the EEPROM 111B (FIG. 12) in step 1484. A clear button 1486 is provided in the dialog box illustrated in FIG. 54 for each edit field 1472 and 1474. These clear buttons 1486 enable the edit fields to be cleared in the EEPROM 111B (FIG. 12).

Activation of the remote keyboard macros is accomplished by pressing down on the user-defined hot icons 1472 or 1474, located in the hot icon area 1202 (FIG. 36) of the LCD 113C. The system checks in steps 1486 and 1488, whether the user defined hot icons 1472 or 1474 are selected. If the user-defined hot icons 1472 or 1474 are not selected, the system returns to step 1486. Once one of the user-defined hot icons 1472 or 1474 is selected, the keyboard scan code sequence, stored in the EEPROM 111B (FIG. 12), is retrieved for the selected hot icon 1472 or 1474 in step 1490, which are then individually transmitted to the host 101 in step 1492. These scan codes are then written to the keyboard buffer on the host 101 in step 1494. Subsequently, in step 1496, the host 101 processes the scan codes as though they originated from the host keyboard.

17. Wireless Flash Programmer

As mentioned above, the wireless interface device 100 includes several flash memory devices 742–748 (FIG. 25). The flash memory device 742 includes a protected area which contains the system BIOS, and a sufficient amount of functionality to enable the wireless interface device 100 to be rebooted to enable reprogramming of the flash memory devices 742–748 by way of the serial port 788 (FIG. 23) in the event of a flash disaster.

Figure 62:
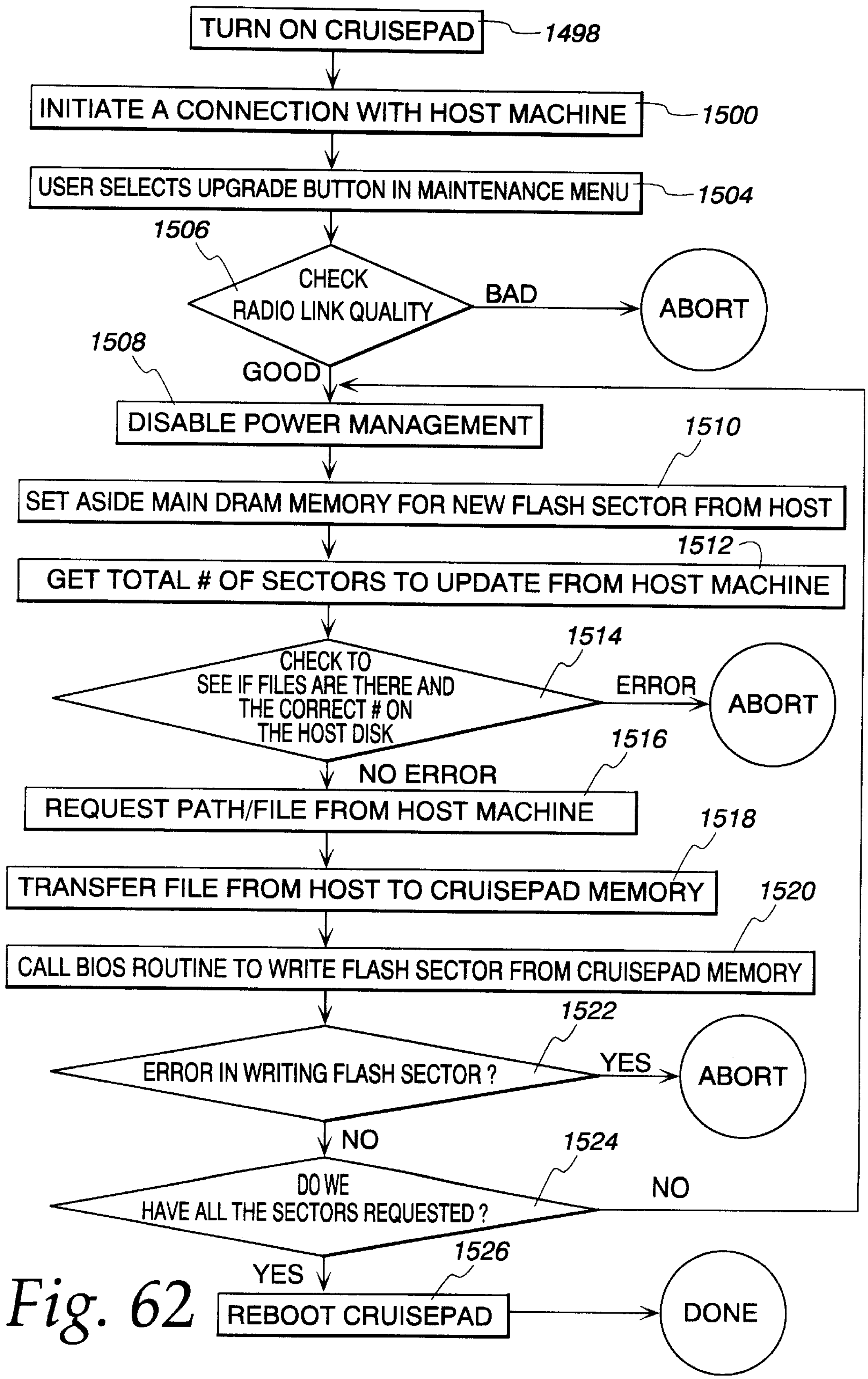
FIGS. 62 and 63 are flow charts relating to a wireless flash ROM programmer.

In order to upgrade the flash memory devices 742–748, the upgrade disks are installed in an available host computer 101. In particular, the flash upgrade software is written to a predetermined directory on the host's 101 hard disk. After the flash upgrade disks are installed, the wireless interface device 100 is turned on in step 1498 (FIG. 62A) by way of the main power switch 855 (FIG. 28). Subsequently, in step 1500, a connection between the host computer 101 and wireless interface device 100 is initiated in step 1500 by first selecting the configuration hot icon 1410 (FIG. 37).

Subsequently, the maintenance button on the dialog box is selected to get to the dialog box illustrated in FIG. 55. An upgrade button 1502 on the dialog box illustrated in FIG. 55 is selected in step 1504 In order to prevent programming errors, the radio quality is checked in step 1506 before proceeding. If the radio quality is poor the upgrade is aborted If the radio quality is adequate, power management is disabled in step 1508 to prevent the wireless interface device 100 from going into a reduced power state as discussed above during programming of the flash memory devices 742–748. After the power management is disabled, a portion of the DRAM memory 111A (FIGS. 18 and 24) in the wireless interface device 100 is set aside to receive a flash sector from the host computer 101 in step 1510. Subsequently, the wireless interface device 100 polls the host computer 101 to determine the correct numbers of sectors in the flash update and whether the sectors are available on the hard disk of the host computer 101 in steps 1512 and 1514. If the flash update files are not on the host hard drive or an incorrect number of sectors are available on the host hard disk, the update is aborted. Otherwise, the system requests the path/file data from the host computer 101 in step 1516. Subsequently, each sector (file) in the flash update is read by the host computer 101 and uploaded over the radio to the DRAM 111A in the wireless interface device 100 in step 1518. After the sectors are written to the DRAM 111A in the wireless interface device 100, a BIOS call is made to write the sectors in the DRAM 111A to the flash memory devices 742–748 in step 1520.

In step 1522 the system checks for errors in writing to the flash memory devices 742–748. Should any errors be detected, the update is aborted. If no errors are detected, the system checks in step 1524 whether all of the sectors from the DRAM 111A have been written to the flash memory devices 742–748 in the wireless interface device 100. If not, the system loops back to step 1516. Once all of the files have been transferred to the flash memory devices 742–748, the wireless interface device 100 is rebooted in step 1526. Once the wireless interface device is rebooted, the system will be able to utilize the updated software in the flash memory devices 742–748.

Figure 63:
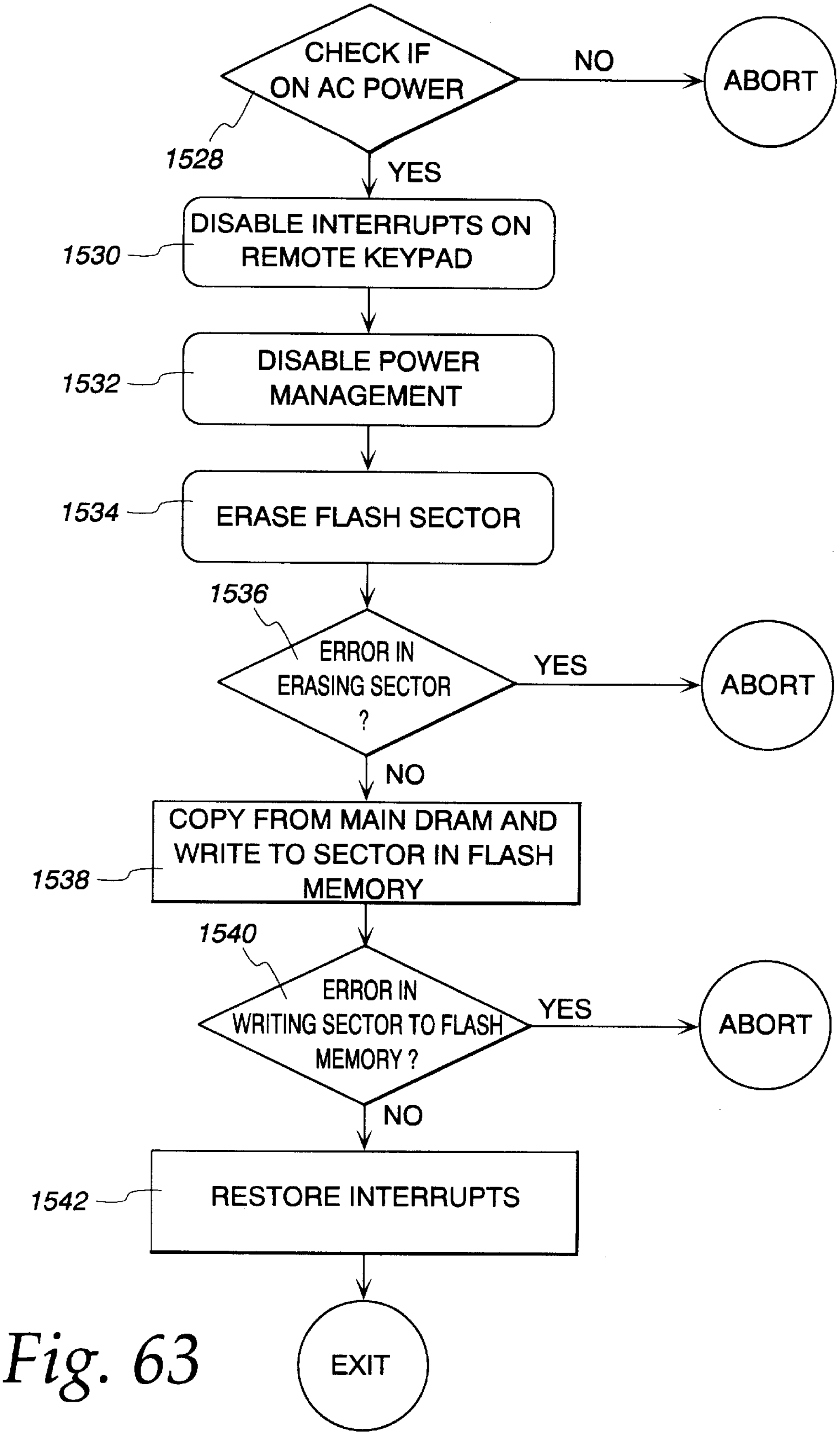

FIGS. 63A and 63B illustrate the routine for writing the flash update sectors from the DRAM 111A to the flash memory devices 742–748. Since the flash updates are stored in the DRAM memory 11A, the programming is aborted if the AC power is turned off as determined in step 1528 since the flash update data in the DRAM 111A will be lost when the battery is exhausted In order to prevent errors during programming, interrupts, as well as the power management, are disabled on the wireless interface device 100 in steps 1530 and 1532. After the interrupts and the power management are disabled, the flash memory device is erased in step 1534. If errors occur during erasure, as determined in step 1536, updating of the particular flash memory device 742–748 is aborted. If not, a sector from the DRAM 111A is written to the flash memory devices 742–748 in step 1538. After the sector is written to the flash memory devices 742–748, the system checks in step 1540 whether any errors occurred. If so, the update is aborted. If not, the interrupts, as well as the power management, are enabled in step 1542 when all sectors have been reflashed.

18. Automatic Reconnect

Figure 64A:
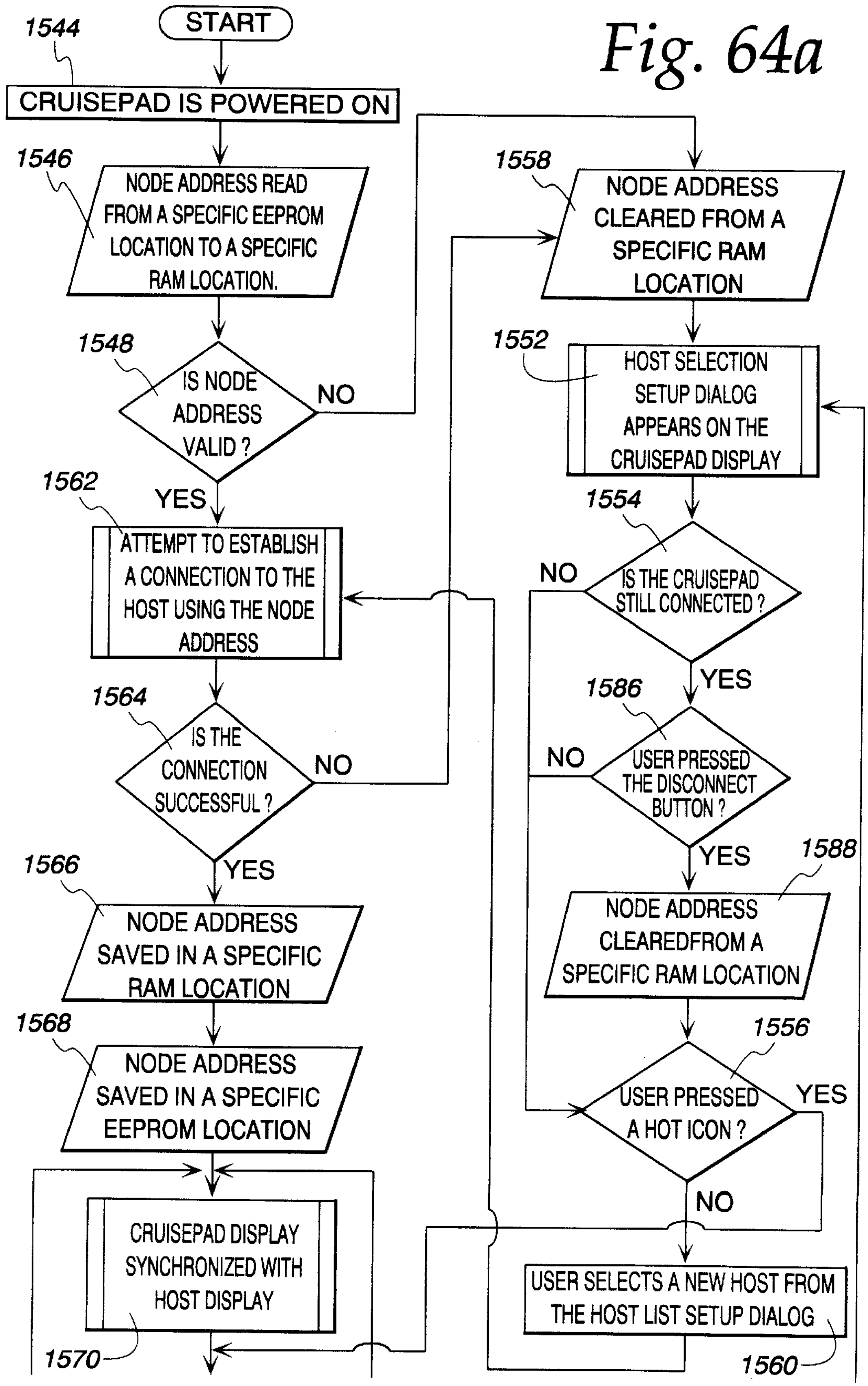
FIGS. 64A and 64B are flow charts relating to a system for providing automatic reconnection of the host.
Figure 64B:
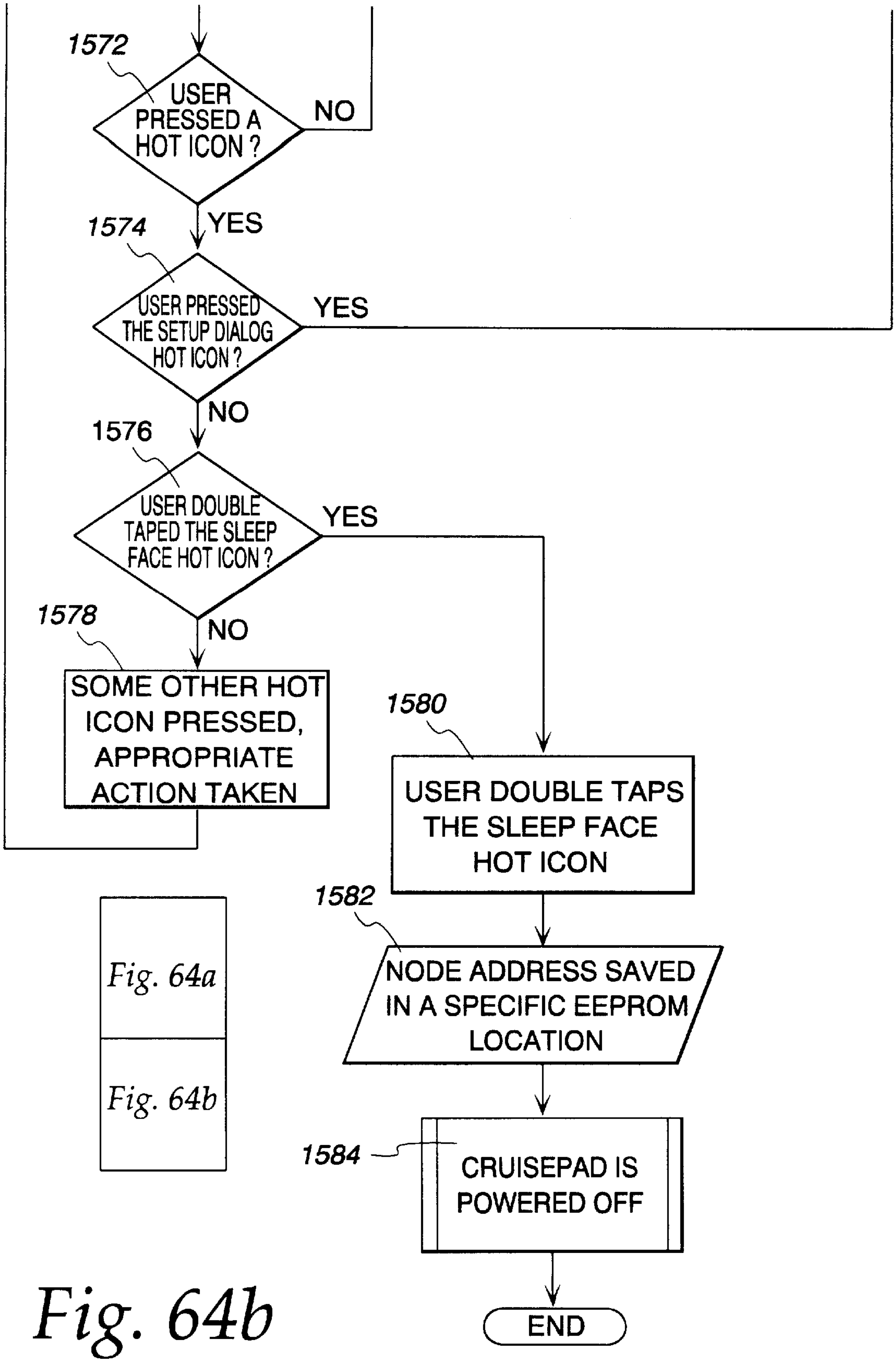

As mentioned above, the wireless interface device 100 can be connected to any of the available hosts 101 that appear in the dialog box illustrated in FIG. 53 in the manner described above. The system illustrated in FIGS. 64A and 64B obviates the need for the user to select a host 101 for connection each time the wireless interface device 100 is powered up, by automatically connecting the wireless interface device 100 to the last host 101 to which it was successfully connected. As will be discussed in more detail below, when a host 101 is selected from the dialog box illustrated in FIG. 53 for connection to the wireless interface device 100 and a connection is successfully achieved, the node address of that host 101 is stored in the EEPROM 111B (FIG. 12). Subsequently, once the wireless interface device 100 is powered up in step 1544, the system reads the node address from the EEPROM 111B, and reads it to a specific location in DRAM 111A (FIGS. 18 and 24) in step 1546 After the node address is written to the DRAM 111A, the system checks the node address to determine whether it is valid in step 1548. Invalid node addresses occur anytime the wireless interface device 100 makes an attempt to connect to a host 101, which fails during automatic reconnecting or is later disconnected by the end user. Thus, if a successful connection is not made or if there is a manual disconnection, the node address is cleared from the DRAM 111A in step 1550 and thus will be invalid. Subsequently, if the automatic reconnect fails in order to facilitate connection of the wireless interface device 100 to another available host 101, the set-up dialog box illustrated in FIG. 53 is displayed on the display 113C of the wireless interface device 100 in step 1552. After the host selection set-up dialog box is displayed on the wireless interface device 100, the system checks in step 1554 whether the wireless interface device 100 is connected to an available host 101. Normally, if an invalid address is found in step 1548 and the host selection set-up dialog box appears on the display 113C of the wireless interface device 100, there will be no connection to an available host 101 and the system will jump to step 1556, where it checks if the hot icon area 1202 (FIG. 37) has been depressed. Normally in this situation, since the host selection dialog box is already being displayed on the screen 113C of the wireless interface device 100, the only hot icon that can affect the situation is a sleep-face hot icon 1558 (FIG. 37), which places the wireless interface device 100 in a low-power sleep mode. In a normal situation when the wireless interface device 100 is first powered up, the sleep-faced hot icon 1558 is not depressed and the system waits for the user to select an available host 101 from the host set-up dialog box illustrated in FIG. 53 as discussed above in step 1560. Once an available host 101 is selected, the system loops back to step 1562 and attempts to establish connection with the selected host 101.

In step 1564 the system checks whether or not the connection was successful. If not, the system goes to step 1550 and clears the node address for the selected host 101 from the DRAM 111A and displays the host selection set-up dialog box in step 1552. If the connection between the wireless interface device 100 and the host 101 is successful, the node address of the host 101 is saved in a specific DRAM location in step 1566, and in turn, written to the EEPROM 111B (FIG. 12) in step 1568. After the node address of the selected host 101 is stored in EEPROM 111B, the wireless interface device 100 will display whatever is being displayed on the host 101 in step 1570.

After a connection is established between the host 101 and the wireless interface device 100, the system continuously checks for hot icons being selected in step 1572. If no hot icons are selected, the system will loop back and continue to check for the selection of a hot icon. If the system determines that a hot icon is selected, the system checks in step 1574 whether the set-up dialog hot icon 1410 (FIG. 37) was selected. If so, the system loops back to step 1552 and displays the host selection set-up dialog box illustrated in FIG. 53 on the display 113C of the wireless interface device 100. If the set-up dialog hot icon 1410 is not selected, the system checks in step 1576 whether the sleep-face hot icon 1558 is selected in step 1576. If not, the system checks in step 1578 whether other hot icons in the hot icon area 1202 (FIG. 36) were selected and the appropriate action is taken. The system then goes to step 1570 and, in turn, and continually checks for the selection of other hot icons in step 1572.

If it is determined in step 1576 that the sleep-face hot icon 1410 is selected, the system checks in step 1580 whether a double pen-down event occurred at the location of the sleep-face hot icon 1410. As mentioned above, the sleep-face hot icon 1410 causes the wireless interface device 100 to go into a low-power mode. However, before placing the wireless interface device 100 in a low-power mode, the node address of the host 101 to which the wireless interface device 100 is connected is saved in a specific location of the DRAM 111A and, in turn, written to the EEPROM 111B in step 1582. After the node address is saved, the wireless interface device 100 is powered down in step 1584.

The system discussed above is thus able to automatically connect the wireless interface device 100 to the last host 101 to which it was connected. After the automatic reconnect, should the set-up window hot icon 1410 (FIG. 37) be selected, the host selection set-up dialog box illustrated in FIG. 53 will be displayed on the screen 113C of the wireless interface device 100. Subsequently, the system will go to step 1554 and check whether the wireless interface device 100 is connected to a host 101. In this case, since the wireless interface device 100 will still be connected to the available host, the system then checks in step 1586 whether a disconnect button on the host selection dialog box illustrated in FIG. 53 has been depressed. If not, the system goes to step 1556 and continuously waits for a hot icon in the hot icon area 1202 (FIG. 36) of the LCD 113C to be depressed. If the disconnect button in the host selection set-up dialog box illustrated in FIG. 53 is depressed, the node address for the host 101 to which the wireless interface device 100 is connected is erased from the specific location in the DRAM 111B in step 1588. Subsequently, the system goes to step 1556 and waits for a hot icon in the hot icon area 1202 (FIG. 37) to be depressed.

19. Remote Occlusion Region

As mentioned above, the wireless interface device 100 includes a virtual on-screen keyboard (OSK), as illustrated in FIG. 66. More particularly, the OSK is configurable by the buttons 1590, 1592, 1594 and 1596 in a control box located at the top of the OSK. These buttons 1590, 1592, 1594 and 1596 enable the OSK to be configured. For example, a button 1590 displays the OSK as illustrated in FIG. 66A with a full keyboard and numeric keypad. The button 1592 is a toggle which displays the keyboard without the numeric keyboard as illustrated in FIG. 66B. The button 1594 displays the numeric keypad with the NUM LOCK off as illustrated in FIG. 66C, or alternatively displays the OSK as a numeric keyboard NUM LOCK on as illustrated in FIG. 66D. The button 1596 allows the size of the OSK to be varied. The "X" button closes the window displaying the OSK.

As mentioned above, the display 113C on the wireless interface device 100 displays whatever is being displayed on the host 101 when a connection is made. Since the graphics for the OSK is generated locally at the wireless interface device 100, a remote occlusion region is generated at the host 101 to prevent the host 101 from painting over the OSK on the display 113C of the wireless interface device 100. The remote occlusion region is analogous to a window in the display of the host 101 in which the host 101 is prevented from using.

Figure 65A:
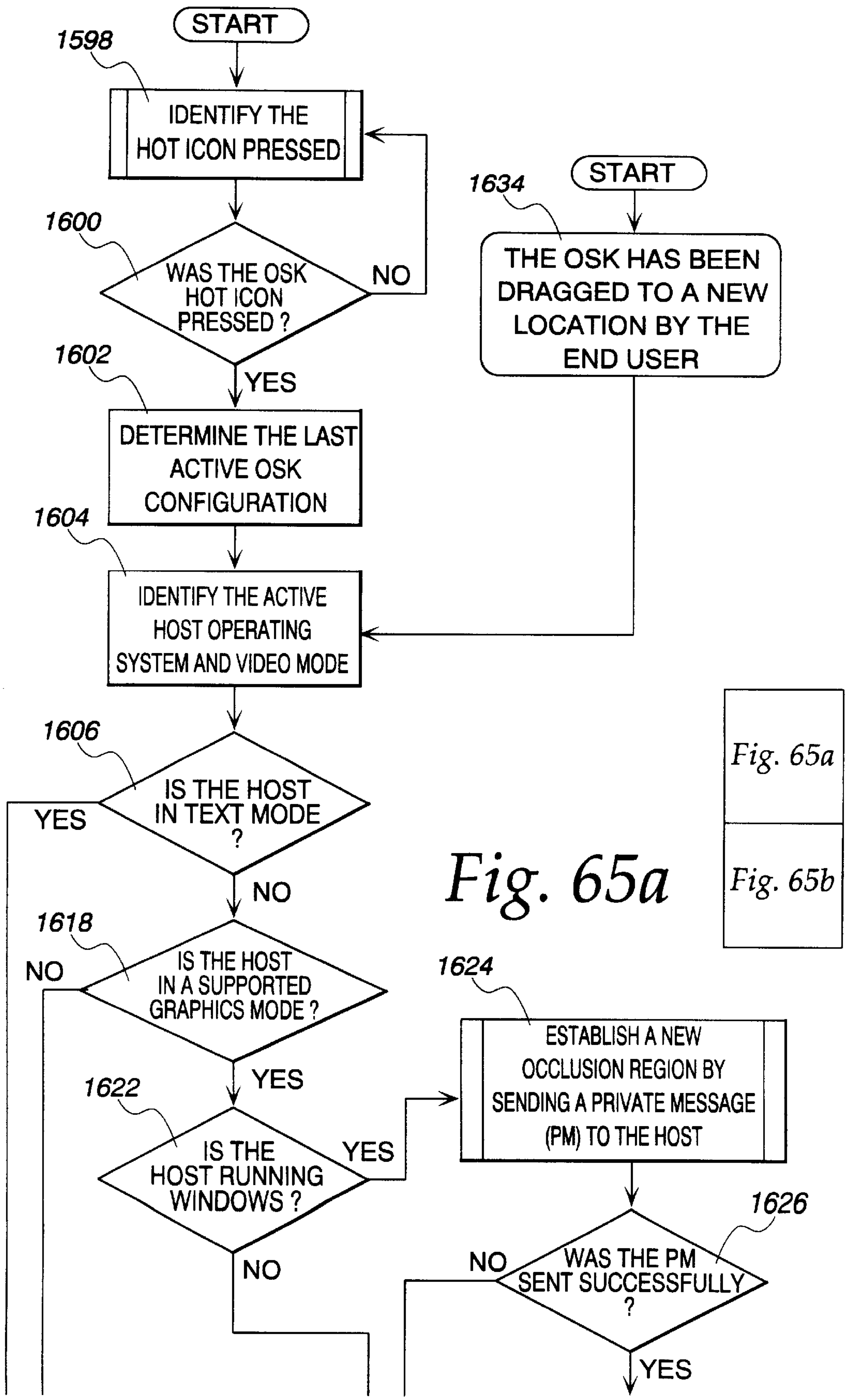
FIGS. 65A and 65B are flow charts relating to providing a remote occlusion region on the wireless interface device.
Figure 65B:
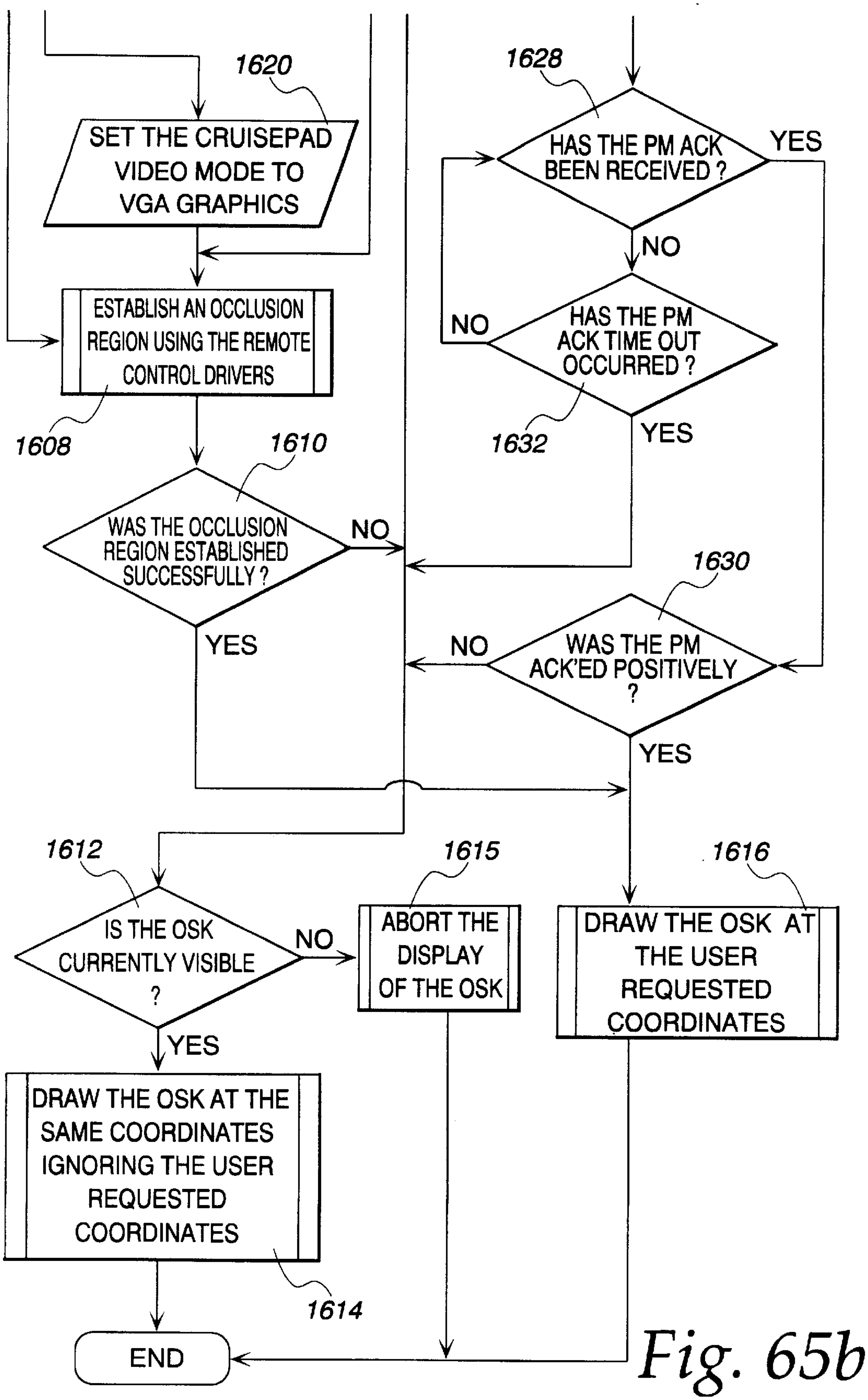

Referring to FIG. 65A, the system monitors the hot icon area 1202 (FIG. 36) to determine if any of the hot icons have been pressed. As discussed above, the system includes an OSK hot icon 1480 (FIG. 37), which displays the OSK on the LCD 113C of the wireless interface device 100 when depressed. If the system determines in step 1598 that a hot icon has been depressed, it checks in step 1600 whether the OSK hot icon 1480 was pressed. If not, the system loops back to 1598 and continually checks for hot icons being pressed. If the OSK hot icon 1480 has been depressed; the system determines the last configuration for the OSK in step 1602 (i.e. FIGS. 66A–66D) Once the configuration of the last OSK is determined in step 1602, the system then checks the operating system and video mode of the host 101 in step 1604. Depending on whether the host 101 is in text or graphics mode will determine whether the OSK image on the wireless interface device 100 is merely shadowed onto the display of the host 101 by way of a private message, as will be discussed in more detail below, or whether the remote occlusion region at the host 101 is established by drivers in the host software, which create the remote occlusion region by way of ASCII characters. Thus, in step 1606, if the system determines that the host 101 is in the text mode, an occlusion region on the display of the host 101 is created using the host control drivers in step 1608 In step 1610, the system checks whether the occlusion region was successfully established. If not, the system then checks in step 1612 whether the OSK is currently visible on the display 113C of the wireless interface device 100. If not, the display of the OSK is aborted in step 1614. If it is determined in step 1612 that the OSK is currently visible on the LCD 113C of the wireless interface device 100, any reconfiguration of the OSK is ignored and the configuration of the last OSK is continuously displayed in step 1614. If it is determined in step 1610 that the remote occlusion region is successfully established, the system goes to step 1616, which enables the OSK to be used.

If it is determined in step 1606 that the host 101 is not in a text mode, the system checks in step 1618 whether the host 101 is in a graphics mode. If not, the system goes to step 1620 and sets the video mode to VGA graphics in the wireless interface device 100 and subsequently proceeds to step 1608 to establish the occlusion region in the host 101 by host control drivers. If the host is in a graphics mode, the system next checks in step 1622 whether the host 101 is running a Windows application. If not, the system returns to step 1608 and establishes the occlusion region on the display of the host 101 using the host control drivers.

If it is determined in step 1622 that the host 101 is running a Windows application, the occlusion region on the host 101 is established by way of a private message sent by the wireless interface device 100 to the host 101 in step 1624. After the private message is sent, the system checks in step 1626 to determine if it was successfully sent. If not, the system proceeds to step 1612 and checks to determine if an OSK is currently visible If the private message is successfully sent, the system checks in step 1628 whether the private message was successfully received by the host 101. If so, the system goes to step 1630 and checks whether the private message was acknowledged by the host 101. If so, the system goes to step 1616 and draws the OSK at the user-requested coordinates. If not, the system goes to 1612. If it is determined in step 1628 that the private message has not been received, the system continually checks for receipt of the private message for a predetermined time-out period in step 1632. Should a time-out occur before the private message is acknowledged by the host 101, the system again will go to step 1612.

Figure 66A:
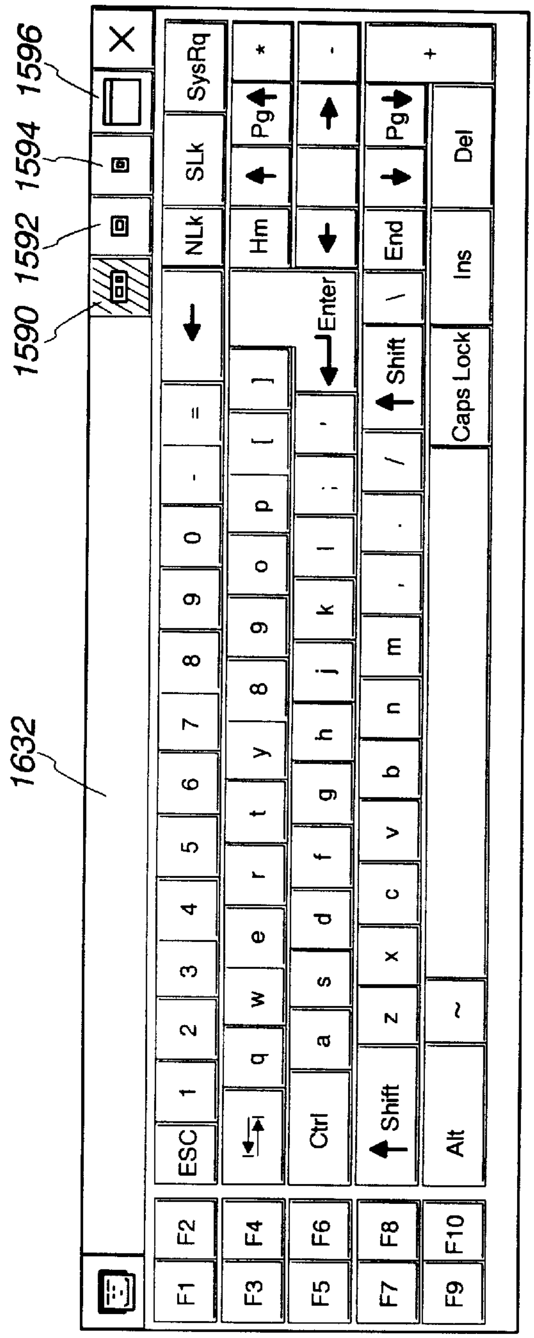
FIGS. 66A–66D illustrate the various configurations of an on-screen keyboard available on the wireless interface device.
Figure 66B:
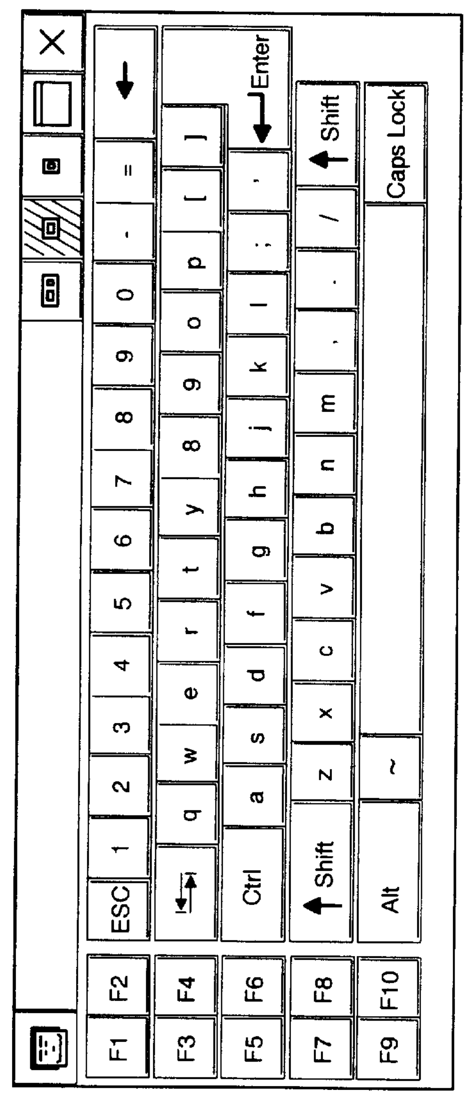
Figure 66C:
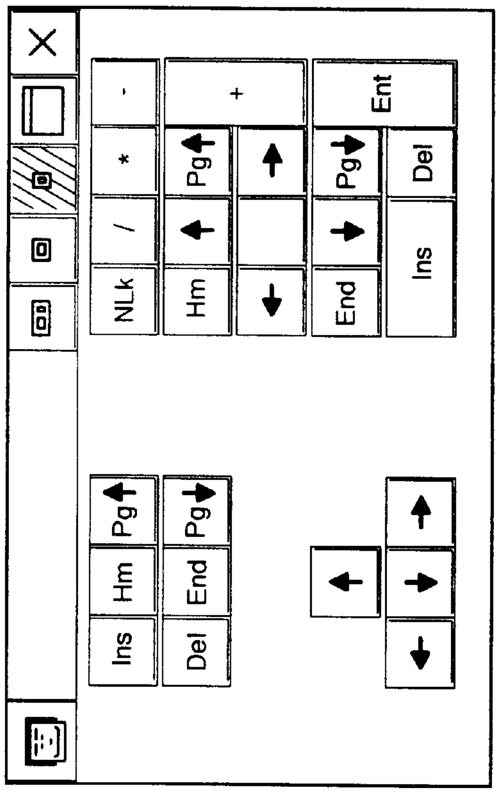
Figure 66D:
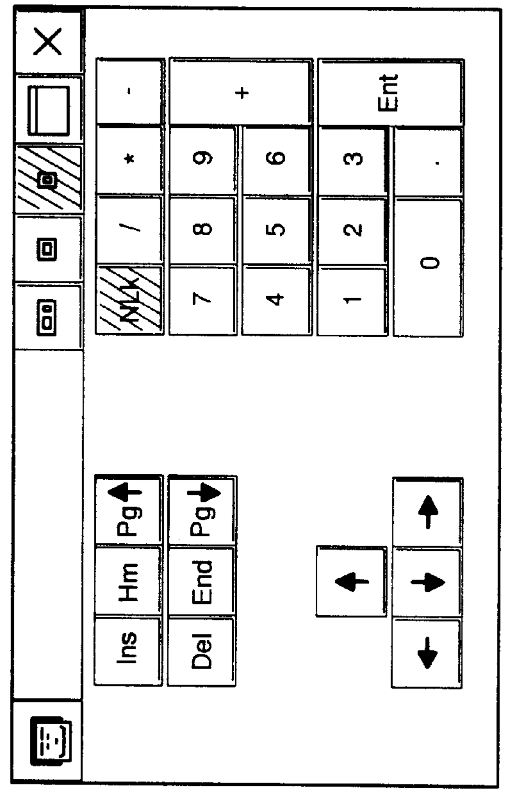

The OSK includes a control bar 1632 (FIG. 66A). The control bar 1632 enables the location of the OSK on the LCD 113C of the wireless interface device 100 to be changed by touching the control bar 1632 with the pen and dragging it to the desired location on the LCD 113C of the wireless interface device 100. Anytime the user changes the location of the OSK on the LCD 113C of the wireless interface device 100 as acknowledged by the system in step 1634, the system then returns to step 1604 to determine the video mode of the host computer 101. As discussed above, the video mode determines whether the remote occlusion region on the display of the host 100 is created by shadowing the OSK on the display of the host by way of the private message or whether the occlusion region on the display of the host is created by local drivers using ASCII characters. The system then goes to step 1606.

Obviously, many modifications and variations of the present invention are possible in light of the above teachings. Thus, it is to be understood that, within the scope of the appended claims, the invention may be practiced otherwise than as specifically described above.

APPENDIX

```
Copr 1995 Zenith Data Systems Corp
#include "cr.h"
#include "sio.h"
#include "spawn.h"
#include "frame.h"
#include "sm.h"
#include "sl.h"

#if defined( _MSC_VER )
#pragma warning( disable   4704 )
#endif

static char szPrompt[] = STR_PROMPT;
static char szLSLProg[] = STR_LSL,
static char szLSLProgParm[
SL_LSL_CMD_LENGTH ]
static char szIPXODIProg[] = STR_IPXODI;
static char szProximProg[] = STR_PROXIM,
static char szSMANProg[] =
STR_SMANPROGNAME,
static char szSViewProg[] =
STR_SVIEWPROGNAME;
static char szSViewParm[] =
STR_WELCOMESCREEN,
static char szPenDrvProg[] =
STR_PDRVPROGNAME,
static char szSDrvNetProg[] =
STR_SDRVNETPROGNAME;
static char szRWinProg[] = STR_RWINPROGNAME;
static char szCommandProg[] =
STR_COMMANDPROGNAME
static char szCommandParm[] =
STR_COMMANDPARM.
static char szCommandDir[] = STR_COMMANDDIR
static char szFormatPrompt[ 10 ],
static char szCommandLine[ 80 ];
static char szNullStr[] = "\0";
static char szOutStr[ 80 ];
static char szProgParmsStr[ 80 ];

static BOOL fExit, fNextCommand, fAutoStart =
FALSE, fError =
FALSE
static BYTE fVIDRedir = FALSE, fTitleScreen =
FALSE, fLoadSMLow =
FALSE,
        fAllowAbort = FALSE
static char *cToken, *szProgName, *szProgParms;

static int iErrorCode = ERR_SUCCESS;
static int iCol;
static WORD wParms;
static word aisrStack[ MAX_STACKSIZE + 1 ];

static GENERALSTATEIDXS iGeneralState;
static COMMANDSTATEIDXS iCommandState;
static TRAPREC VIDTrapRec;
static TRAPREC SMTrapRec;

void main()
{
  int iCmdLineIdx;
  BYTE nLenCmdLine;

  sprintf( szFormatPrompt, "\n%s", szPrompt );

  chk_video().
  get_crs().
  crs_x = bcrs_x,
  crs_y = bcrs_y;
  mv_crs();

  fExit = FALSE;

  iCmdLineIdx = str_pos( '-', cmd_line );
  nLenCmdLine = str_len( cmd_line );

  while ( iCmdLineIdx > 0 && iCmdLineIdx <
nLenCmdLine )
  {
    switch ( cmd_line[ iCmdLineIdx ] | 0x20 )
    {
      case 'g'.
        fAutoStart = TRUE;

        if ( ( ( cmd_line[ iCmdLineIdx + 1 ] | 0x20 ) ==
't' ) )
        {
          fTitleScreen = TRUE,
          fVIDRedir = TRUE;
        }
        break;

      case 'l':
        fLoadSMLow = TRUE;
        break;

      case 'a':
        fAllowAbort = TRUE;
        break;

      default:
        printf( "\nERROR: invalid parameter\n" );
        break;
    }

    *( cmd_line + iCmdLineIdx - 1 ) = ' ';

    iCmdLineIdx = str_pos( '-', cmd_line );
  }

  if ( !fVIDRedir )
  {
    printf( "Saratoga Loader, Copyright (c) 1994-1995
Zenith Data
Systems\n" );
    printf( "Mobile Systems Engineering, Version
1.1\n" );
  }

  if ( fAutoStart )
  {
    clr_scr();

    crs_x = 0;
    crs_y = 0;
    mv_crs();

    if ( fTitleScreen )
    {
      RunProgram( szSViewProg, szSViewParm );
    }

    if ( KeyPressedIn( 2 ) )
    {
      switch( GetActionKey() )
      {
        case KBD_DIAG:
          change_dir( szCommandDir );
          RunProgram( szCommandProg,
szCommandParm );
          DoExit( 1 );
          break;

        case KBD_ABORTLOAD:
          if ( fAllowAbort )
            DoExit( 1 );
          break;
      }
    }
  }

  do
  {
    iCol = 0;

    if ( !fError )
      fil_chr( szCommandLine, 0, sizeof (
szCommandLine ) );
    else
      fError = FALSE;

    if ( !fAutoStart )
    {
      printf( szFormatPrompt );
      edit_str( szCommandLine,
MAX_WIDTHOFSCREEN - sizeof (
szPrompt ), &iCol, pckey );
      up_case( szCommandLine );
    }
    else
    {
      szCommandLine[0] = 'C';
      szCommandLine[1] = 'W';
      fAutoStart = FALSE;
    }

    cToken = szCommandLine;
    iGeneralState = STM_COMMAND;
    iCommandState = COM_UNKNOWN;
    fNextCommand = FALSE;

    while ( *cToken != NULL && !fNextCommand &&
!fExit )
    {
      if ( iGeneralState > STM_UNKNOWN )
        iGeneralState = STM_UNKNOWN;

      if ( ( iErrorCode = ( *fnStateTableProcs[
iGeneralState ]
)() ) == ERR_INTERNAL )
        fExit = TRUE;
    }
  } while ( !fExit );

  DoExit( 0 );
}

void DoExit( int iStatus )
{
  RemoveVidTrap();
  SetVideoMode( SUI_TEXTVIDMODE | 0x80 );

  exit( iStatus );
}

int ProcessIdle( void )
{
  return ( ERR_SUCCESS );
}

int ParseCommand( void )
{
  switch ( *cToken )
  {
    case 'R':
      if ( *( cToken + 1 ) == VAL_SPACE )
      {
        iGeneralState = STM_PARM;
        iCommandState = COM_RUNPROG,
        cToken += 2;
      }
      else if ( *( cToken + 1 ) == NULL )
      {
        iGeneralState = STM_EXECUTE;
        iCommandState = COM_RUNSM
      }
      else
        goto com_unknown;
      break;

    case 'C':
      if ( *( cToken + 2 ) == NULL )
      {
        iGeneralState = STM_EXECUTE;

        if ( *( cToken + 1 ) == 'D' )
          iCommandState = COM_RUNDOSCOS;
        else if ( *( cToken + 1 ) == 'W' )
          iCommandState = COM_RUNWINCOS;
        else
          goto com_unknown;
      }
      else
        goto com_unknown;
      break;

    case 'X':
      if ( *( cToken + 1 ) == 'X' )
        iGeneralState = STM_EXIT;
      else
        goto com_unknown;
      break;

    default:
com_unknown:
      printf( "\nERROR: command unknown" ),
      fError = fNextCommand = TRUE;
  }

  return ( ERR_SUCCESS );
}

int ParseParameters( void )
{
  switch ( iCommandState )
  {
    case COM_RUNPROG:
      if ( ( wParms = str_pos( VAL_SPACE, cToken )
) > 0 )
      {
        *( cToken + ( wParms - 1 ) ) = NULL;
        szProgName = cToken;
        cToken += wParms;
        sprintf( szProgParmsStr, " %s\r", cToken );
        szProgParms = szProgParmsStr;
      }
      else
      {
        szProgName = cToken;
        szProgParms = szNullStr;
      }

      iGeneralState = STM_EXECUTE;
      break;

    default:
      fError = TRUE
      printf( "\nERROR: unknown command in the
parse parameter
state" );
      break:
  }

  return ( ERR_SUCCESS );
}

int ExecuteCommand( void )
{
  if ( !fVIDRedir )
    printf( "\n" );

  switch ( iCommandState )
  {
    case COM_RUNSM:
      fNextCommand = TRUE;
      RunProgram( szSMANProg, szNullStr );
      break;

    case COM_RUNDOSCOS.
    case COM_RUNWINCOS:
      fNextCommand = TRUE;

      if ( fVIDRedir )
        InitTraps( ITR_SETVIDTRAP );
      else
        InitTraps( ITR_NOSETVIDTRAP );

      if ( LoadSM( fLoadSMLow ?
SMD_ALLOCFIRSTFIT :
SMD_ALLOCBESTFIT ) != ERR_SUCCESS )
        break;

      strcpy( szLSLProgParm, " " );

      switch ( GetFrameType() )
      {
        case SL_FT_E802_2
          strcat( szLSLProgParm,
SL_LSL_CMD_E802_2 );
          break;

        case SL_FT_EII:
          strcat( szLSLProgParm, SL_LSL_CMD_EII );
          break.

        case SL_FT_ESNAP
          strcat( szLSLProgParm,
SL_LSL_CMD_ESNAP );
          break,

        case SL_FT_E802_3:
          strcat( szLSLProgParm,
SL_LSL_CMD_E802_3 );
          break:

        default
          if ( !fVIDRedir )
            printf( "ERROR: Invalid Frame Type
detected. The
default Frame Type 802.3 will be used.\n" );
          strcat( szLSLProgParm,
SL_LSL_CMD_E802_3 );
          break;
      }

      if (
#if defined( MOUSE )
          RunProgram( "mouse.com",  szNullStr ) !=
ERR_SUCCESS
||
#else
          RunProgram( szPenDrvProg,  szNullStr ) !=
ERR_SUCCESS
||
#endif
          LoadNetwork() != ERR_SUCCESS ||
          RunProgram( szSDrvNetProg, " -N1
-O2048 -WT20\r" ) !=
ERR_SUCCESS )
        break;

      if ( iCommandState == COM_RUNWINCOS )
        RunProgram( szRWinProg, szNullStr );

      KickSUI();
      break;

    case COM_RUNPROG:
      fNextCommand = TRUE;
      RunProgram( szProgName, szProgParms );
      break.

    default:
      fError = TRUE.
```

```
    printf( "\nERROR: unknown command in the
execution state"
);
    break;
  }

  return ( ERR_SUCCESS );
}

int ProcessSLExit( void )
{
  fExit = TRUE;

  return ( ERR_SUCCESS );
}

int ProcessStateUnknown( void )
{
  printf( "\nERROR: unknown state" );

  return ( ERR_INTERNAL );
}

int RunProgram( char *szProgName, char
*szProgParms )
{
  int iSpawnReturn;

  if ( ( iSpawnReturn = spawn_nr( szProgName,
szProgParms ) ) >=
0 )
    iSpawnReturn = ERR_SUCCESS;
  else
  {
    if ( !fVIDRedir )
      printf( "\nERROR: %s, spawn error %d",
szProgName,
            iSpawnReturn );
    fError = TRUE;
  }

  return ( iSpawnReturn );
}

int LoadMLID( char *szProgName )
{
  int iLoadIdx;

  for ( iLoadIdx = 0; iLoadIdx <
MAX_MLIDLOADRETRY; ++iLoadIdx )
  {
    if ( RunProgram( szProgName, szNullStr ) !=
ERR_SUCCESS )
      return ( ERR_INTERNAL );

    if ( GetMLIDStatus() == TRUE )
      return ( ERR_SUCCESS );
  }

  sprintf( szOutStr
        "\nERROR: The load sequence was aborted
due to a
failure in the loading of:\n%s.\n",
        szProximProg );

  DisplayError( szOutStr ).

  return ( ERR_INTERNAL );
}

int EnableKbd( void )
{
  REG_W InArgs, OutArgs;

  fil_chr( &InArgs, 0, sizeof ( InArgs ) );

  InArgs.ax = SMI_SLENABLEKBD;

  intn( &InArgs, &OutArgs, SMI_SCSINTNUM );

  return ( 0 );
}

int GetFrameType( void )
{
  REG_W InArgs, OutArgs;

  fil_chr( &InArgs, 0, sizeof ( InArgs ) );

  InArgs.ax = SMI_SLGETFRAMETYPE;

  intn( &InArgs, &OutArgs, SMI_SCSINTNUM );

  return ( OutArgs.ax );
}

int GetMLIDStatus( void )
{
  REG_W InArgs, OutArgs;

  fil_chr( &InArgs, 0, sizeof ( InArgs ) );

  InArgs.ax = SMI_SLGETMLIDSTATUS;

  intn( &InArgs, &OutArgs, SMI_SCSINTNUM );

  return ( OutArgs.ax );
}

void SetOldVidVector( LONG lOldVidVector )
{
  REG_W InArgs, OutArgs;

  fil_chr( &InArgs, 0, sizeof ( InArgs ) );

  InArgs.ax = SMI_SLDEFINEOLDVIDVECTOR;
  InArgs.bx = OFF( lOldVidVector );
  InArgs.dx = SEG( lOldVidVector );
  intn( &InArgs, &OutArgs, SMI_SCSINTNUM );
}

int KickSUI( void )
{
  REG_W InArgs, OutArgs;

  RemoveVidTrap();

  fil_chr( &InArgs, 0, sizeof ( InArgs ) ).

  InArgs.ax = SMI_SLLOADSUI;

  intn( &InArgs, &OutArgs, SMI_SCSINTNUM );

  EnableKbd();

  return ( 0 );
}

int LoadSM( int iMemStrategy )
{
  int iRunStatus;

  if ( iMemStrategy != SMD_ALLOCFIRSTFIT )
  {
    PatchMCB();
    SetMemStrategy( iMemStrategy ).
  }

  iRunStatus = RunProgram( szSMANProg.
szNullStr );

  SetMemStrategy( SMD_ALLOCFIRSTFIT );

  return ( iRunStatus );
}

int LoadNetwork( void )
{
  if ( RunProgram( szLSLProg, szLSLProgParm ) !=
ERR_SUCCESS ||
      LoadMLID( szProximProg )              !=
ERR_SUCCESS ||
      RunProgram( szIPXODIProg, szNullStr ) !=
ERR_SUCCESS )
    return ( ERR_INTERNAL );

  return ( ERR_SUCCESS );
}

int KeyPressedin( int iDelay )
{
  int iTickCount;
  long iSyncCount;

  kbflag = 0;

  if ( !fVIDRedir )
  {
    if ( fAllowAbort )
      printf( "\n[CTRL]+[ALT]+A to abort load
sequence or
[CTRL]+[ALT]+D to load diagnostic...\n" );
    else
      printf( "\n[CTRL]+[ALT]+D to load
diagnostic...\n" );
  }

  for ( iTickCount = 0; iTickCount < iDelay;
++iTickCount )
  {
    iSyncCount = sync_ticks();

    while ( TRUE )
    {
      if ( sync_ticks() - iSyncCount >= 20 )
        break;

      if ( anykey() )
        return ( TRUE );
    }
  }

  return ( FALSE );
}

ACTIONKEYS GetActionKey( void )
{
  WORD wKey;

  if ( anykey() )
  {
    wKey = pckey();

    if ( kbflag & KBD_CTRLMASK &&
        kbflag & KBD_ALTMASK )
    {
      switch( wKey )
      {
        case KBD_DSCAN:
          return ( KBD_DIAG );

        case KBD_ASCAN:
          return ( KBD_ABORTLOAD );
      }
    }
  }

  return ( KBD_NOACTIONKEY );
}

void InitTraps( BYTE nVidTrapStatus )
{
  install_trap( ( fp )TrapService, MAX_STACKSIZE *
sizeof ( int
), SMD_FULLREENTER );
  enable_tsr( aIsrStack, MAX_STACKSIZE * sizeof (
int ) );

  if ( nVidTrapStatus == ITR_SETVIDTRAP )
  {
    VIDTrapRec.tr_int = SBS_VIDINTNUM,
    VIDTrapRec.tr_asm_srv =
CRU_ONBUSYOLDINT;

    add_trap( &VIDTrapRec );

    fVIDRedir = TRUE;
  }

  SMTrapRec.tr_int = SBS_SLINTNUM;
  SMTrapRec.tr_asm_srv = CRU_ONBUSYOLDINT;

  add_trap( &SMTrapRec );
}

BOOL RemoveVidTrap( void )
{
  BOOL fReturn = FALSE,
  DWORD dwCurrVidTrap;
  DWORD dwOldVidTrap = VIDTrapRec.tr_old_int;

  PCB_BEGINCRITICAL;

  if ( VIDTrapRec.tr_int > 0 )
  {
    SetOldVidVector( dwOldVidTrap );
    if ( ( dwCurrVidTrap = clr_trap( &VIDTrapRec ) )
!=
dwOldVidTrap )
      set_int_vec( SBS_VIDINTNUM, dwCurrVidTrap
);


    VIDTrapRec.tr_int = 0;

    fReturn = TRUE;
    fVIDRedir = FALSE;
  }

  PCB_ENDCRITICAL;

  return ( fReturn );
}

void DisplayError( char *szErrStr )
{
  RemoveVidTrap();
  SetVideoMode( SUI_TEXTVIDMODE | 0x80 );

  printf( szErrStr );
}

WORD TrapService( struct trap_rec *CurrTrapRec )
{
  struct REGW InRegs, OutRegs;
  WORD wFlags;

  GetForegroundRegs( &InRegs );

  switch ( CurrTrapRec->tr_int )
  {
    case SBS_VIDINTNUM:
      switch ( HIBYTE( InRegs.ax ) )
      {
        case SBS_TELETYPE:
          break;

        case SBS_RELOCATEDSCRADD:

          wFlags = intn( &InRegs, &OutRegs,
SBS_VIDINTNUM );
          SetForegroundRegsFlags( &OutRegs,
SFR_SETFLAGS, wFlags
);
          SetVideoMode( SUI_INITIALVIDMODE );

          break;

        default:
          return ( ( WORD )CurrTrapRec );
      }
      break;

    case SBS_SLINTNUM:
      wFlags = intn( &InRegs, &OutRegs,
SBS_INTNUM );
      SetForegroundRegsFlags( &OutRegs,
SFR_SETFLAGS, wFlags );
      break;

    default:
      return ( ( WORD )CurrTrapRec );
  }

  return ( 0 );
}

void GetForegroundRegs( struct REGW *InRegs )
{
  register struct sreg *s;
  register struct REGW *r,
  struct glob_stk far *p;

  r = InRegs;
  s = _int_frame;

  r->es = s->es;
  r->bp = s->bp;
  r->di = s->di;
  r->si = s->si;
  r->cx = s->cx;

  *(word*)&p = s->saved_sp;
  *(((word*)&p)+1) = s->saved_ss;

  r->ds = p->ds,
  r->dx = p->dx;
  r->bx = p->bx;
  r->ax = p->ax;
}

void SetForegroundRegsFlags( struct REGW
*OutRegs, BYTE
fSetFlags, WORD wFlags )
{
  struct sreg *s;
  struct REGW *r;
  struct glob_stk far *p;

  r = OutRegs;
  s = _int_frame;

  s->es = r->es;
  s->bp = r->bp;
  s->di = r->di;
  s->si = r->si;
  s->cx = r->cx;

  p = ( struct glob_stk far * )MK_FP( s->saved_ss,
s->saved_sp );


  p->ds = r->ds;
  p->dx = r->dx;
  p->bx = r->bx;
  p->ax = r->ax;

  if ( fSetFlags == SFR_SETFLAGS )
    p->Flags = wFlags;
}

WORD SetVideoMode( BYTE nRequestedMode )
{
  int AX;

  AX = MAKEWORD( nRequestedMode, 0 );
```

```
 int10( AX );

 return ( 0 ).
}

#if defined( _MSC_VER  )
#pragma warning( default : 4704 )
#endif
Copr 1995 Zenith Data Systems Corp.

#include "cr.h"
#include "sio.h"
#include "spawn.h"
#include "frame.h"
#include "sm.h"

#define MCB_TARGETSEGMENT 0xC000
#define MCB_TARGETSEGSIZE 0x1000
#define MCB_OWNERDOS 0x0008

MCB far *GetFirstMCB( void );
MCB far *GetNextMCB( MCB far *lpCurrMCB );
MCB far *GetLastMCB( void );

int PatchMCB( void )
{
  MCB far *lpLastMCB;
  MCB far *lpBeyondLastMCB;
  MCB far *lpTargetMCB;

  PCB_BEGINCRITICAL

  if ( ( lpLastMCB = GetLastMCB() ) == NULL )
    return ( ERR_INTERNAL );

  lpLastMCB->cType = 'M',
  lpLastMCB->wSize -= 1;

  if ( ( lpBeyondLastMCB = GetNextMCB(
lpLastMCB ) ) == NULL )
    return ( ERR_INTERNAL );

  lpBeyondLastMCB->cType  = 'M';
  lpBeyondLastMCB->wSize  =
MCB_TARGETSEGMENT - SEG(
lpBeyondLastMCB ) - 1;
  lpBeyondLastMCB->wOwner =
MCB_OWNERDOS,

  lpTargetMCB = ( MCB far * )MK_FP(
MCB_TARGETSEGMENT, 0 );
  lpTargetMCB->cType = 'Z',
  lpTargetMCB->wOwner = 0;
  lpTargetMCB->wSize = ( WORD
)MCB_TARGETSEGSIZE - 1;

  return ( ERR_SUCCESS ),
}

int SetMemStrategy( int iStatCode )
{
  REG_W InRegs, OutRegs,
  WORD wFlags;

  fil_chr( ( NPSTR )&InRegs, 0, sizeof( REG_W ) );

  InRegs.ax = SMD_GETSETALLOCSTRAT |
SMD_SETALLOCSTRAT
  InRegs.bx = iStatCode.

  wFlags = intn( &InRegs, &OutRegs, SMD_DOSINT
).

  if ( !( wFlags & GEN_CARRYFLAG ) )
    return ( ERR_SUCCESS );
  else
    return ( ERR_INTERNAL );
}

MCB far *GetFirstMCB( void )
{
  REG_W InRegs, OutRegs;
  WORD wFlags.
  unsigned far *lpListOfLists;

  fil_chr( ( NPSTR )&InRegs, 0, sizeof( REG_W ) );

  InRegs.ax = SMD_GETLISTOFLISTS;

  wFlags = intn( &InRegs, &OutRegs, SMD_DOSINT
);

  if ( !( wFlags & GEN_CARRYFLAG ) )
  {
    lpListOfLists = ( unsigned far * ) MK_FP(
OutRegs es,
OutRegs.bx - 2 );
    return ( ( MCB far * ) MK_FP( *lpListOfLists, 0 ) );
  }
  else
    return ( NULL );
}

MCB far *GetNextMCB( MCB far *lpCurrMCB )
{
  return ( MK_FP( SEG( lpCurrMCB ) +
lpCurrMCB->wSize + 1, 0 ) );

}

MCB far *GetLastMCB( void )
{
  MCB far *lpLastMCB = GetFirstMCB();

  while ( TRUE )
  {
    if ( lpLastMCB == NULL )
      return ( NULL );

    lpLastMCB = GetNextMCB( lpLastMCB );

    if ( lpLastMCB->cType == 'Z' )
      return ( lpLastMCB ).
  }
}


Copr. 1995 Zenith Data Systems Corp.

#include "cr.h"
#include "spawn.h"
#include "sm.h"
#include "lm.h"

BOOL f2MegFlash = FALSE;
static BYTE nCurrVidPallette = 0;
static BYTE nCurrSpeakerState = FON;
static BYTE nCurrRightMouseButton = FOFF
static BYTE fSuspendInProgress = FOFF;

BYTE aBrightValues[] =
{
0.
3,
6,
9.
18,
21,
25,
27,
29,
31,
33
35,
37.
39,
41,
43,
45,
47,
49,
51,
53.
55,
57.
59.
};

BYTE aContrastValues[] =
{
26,
27,
28,
29,
30,
31,
32,
34,
36,
38,
39,
40,
41.
42,
43,
44,
45.
46.
47,
48,
49,
50.
51,
52
};

int SetContrast( BYTE nContrastIdx )
{
  REG_W InRegs, OutRegs;
  WORD wFlags;

  fil_chr( ( NPSTR )&InRegs, 0, sizeof( REG_W ) );

  InRegs.ax = SBS_SARATOGAFUNC;
  InRegs.bx = SBS_ADJUSTCONTRAST;
  InRegs.ax |= aContrastValues[ nContrastIdx ];

#if !defined( NOINT15 )
  wFlags = intn( &InRegs, &OutRegs,
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL );
}

int SetBrightness( BYTE nBrightnessIdx )
{
  REG_W InRegs, OutRegs;
  WORD wFlags;

  fil_chr( ( NPSTR )&InRegs, 0, sizeof( REG_W ) );

  InRegs.ax = SBS_SARATOGAFUNC;
  InRegs.bx = SBS_ADJUSTBRIGHTNESS,
  InRegs.ax |= aBrightValues[ nBrightnessIdx ];

#if !defined( NOINT15 )
  wFlags = intn( &InRegs, &OutRegs,
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL ):
}

int SetPowerEnable( BYTE nPowerManIdx )
{
  REG_W InRegs, OutRegs;
  WORD wFlags;

  fil_chr( ( NPSTR )&InRegs, 0, sizeof( REG_W ) );

  InRegs.ax = SBS_SARATOGAFUNC;
  InRegs.bx = SBS_SETPOWERENABLE,
  InRegs.ax |= ( WORD )nPowerManIdx;


#if !defined( NOINT15 )
  wFlags = intn( &InRegs, &OutRegs,
SBS_SLINTNUM ):
#else
  wFlags = 0:
#endif

  if ( !( wFlags & GEN_CARRYFLAG ) )
    return ( ERR_SUCCESS ):
  else
    return ( ERR_INTERNAL );
}

int SetDozeTimeout( BYTE nDozeIdx )
{
  REG_W InRegs, OutRegs;
  WORD wFlags;

  fil_chr( ( NPSTR )&InRegs, 0, sizeof( REG_W ) );

  InRegs.ax = SBS_SARATOGAFUNC;
  InRegs.bx = SBS_SETDOZETIMEOUT;
  InRegs.ax |= ( WORD )nDozeIdx;

#if !defined( NOINT15 )
  wFlags = intn( &InRegs, &OutRegs,
SBS_SLINTNUM );
#else
  wFlags = 0;
#endif

  if ( !( wFlags & GEN_CARRYFLAG ) )
    return ( ERR_SUCCESS ):
  else
    return ( ERR_INTERNAL );
}

int SetSleepTimeout( BYTE nSleepIdx )
{
  REG_W InRegs, OutRegs;
  WORD wFlags,

  fil_chr( ( NPSTR )&InRegs, 0, sizeof( REG_W ) );

  InRegs.ax = SBS_SARATOGAFUNC;
  InRegs.bx = SBS_SETSLEEPTIMEOUT;
  InRegs.ax |= nSleepIdx;

#if !defined( NOINT15 )
  wFlags = intn( &InRegs, &OutRegs,
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL );
}

int SetSuspendTimeout( BYTE nSuspendIdx )
{
  REG_W InRegs, OutRegs:
  WORD wFlags,

  fil_chr( ( NPSTR )&InRegs, 0, sizeof( REG_W ) );

  InRegs.ax = SBS_SARATOGAFUNC:
  InRegs.bx = SBS_SETSUSPENDTIMEOUT;
  InRegs.ax |= nSuspendIdx;

#if !defined( NOINT15 )
  wFlags = intn( &InRegs, &OutRegs,
SBS_SLINTNUM ),
#else
  wFlags = 0;
#endif

  if ( !( wFlags & GEN_CARRYFLAG ) )
    return ( ERR_SUCCESS );
  else
    return ( ERR_INTERNAL );
}

void Set2MegFlash( BOOL fNew2MegFlash )
{
  f2MegFlash = fNew2MegFlash;
}

BOOL IsFlashSupported( void )
{
  REG_W InRegs, OutRegs:

  fil_chr( ( NPSTR )&InRegs, 0, sizeof ( InRegs ) );

  InRegs.ax  = SBS_SARATOGAFLASH;
  InRegs.ax |= SBS_FLASHAVAILABLE;

#if !defined( FLASHTEST )
  intn( &InRegs, &OutRegs, SBS_SLINTNUM );
#else
  return ( TRUE );
#endif

  return ( OutRegs.ax ==
SBS_FLASHAVAILRETCODE );
}

int FlashSector( LPSTR sFlashImageBuff, int
iCurrFlashFile )
{
  REG_W InRegs, OutRegs;
  Int iFlashSector, iReturn;
  WORD wFlags;
  LONG l20BitEffAdd;

  if ( iCurrFlashFile <= 0 || sFlashImageBuff ==
NULL )
    return ( ERR_INVALIDPARM );

  if ( EnableFlashWrite( TRUE ) != ERR_SUCCESS
)
    return ( ERR_INTERNAL );

  fil_chr( &InRegs, 0, sizeof ( InRegs ) );

  if ( f2MegFlash )
    iFlashSector = SBS_2MEGBASESECTOR + (
iCurrFlashFile - 1 );
  else
    iFlashSector = SBS_1MEGBASESECTOR + (
iCurrFlashFile - 1 );

  l20BitEffAdd = ( ( LONG )SEG( sFlashImageBuff )
* 16 ) + OFF(
sFlashImageBuff );
```

```
 InRegs.ax = MAKEWORD( SBS_FLASHNOTEXT,
HIBYTE(
SBS_SARATOGAFLASH ) );
 InRegs.bx = MAKEWORD( LOBYTE( HIWORD(
l20BitEffAdd ) ),
                LOBYTE( iFlashSector ) );
 InRegs.di = LOWORD( l20BitEffAdd );

#if !defined( FLASHTEST )
 wFlags = intn( &InRegs, &OutRegs,
SBS_SLINTNUM );
#else
 wFlags = 0;
#endif

 if ( !( wFlags & GEN_CARRYFLAG ) )
  iReturn = SBS_FLASHSUCCESS;
 else
  iReturn = HIBYTE( OutRegs.ax );

 EnableFlashWrite( FALSE );

 return ( iReturn );
}

int EnableFlashWrite( BOOL fEnable )
{
 REG_W InRegs, OutRegs;
 WORD wFlags;

 fil_chr( &InRegs, 0, sizeof ( InRegs ) );

 InRegs.ax = MAKEWORD( LOBYTE( ( fEnable ?
SBS_ENABLEWRITE :
SBS_DISABLEWRITE ) ),
              HIBYTE( SBS_SARATOGAFUNC
) );
 InRegs.bx = SBS_ENABLEDISABLEWRITE;

#if !defined( FLASHTEST )
 wFlags = intn( &InRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int RotatePallette( void )
{
 REG_W InRegs, OutRegs;
 int iCurrVideoMode = GetCurrVidMode();
 BYTE nNewVidPallette;

 fil_chr( ( NPSTR )&InRegs, 0, sizeof( REG_W ) );

 if ( iCurrVideoMode == SUI_INITIALVIDMODE )
 {
  if ( nCurrVidPallette != SBS_INVVIDPALLETTE )
   nNewVidPallette = SBS_INVVIDPALLETTE;
  else
   nNewVidPallette = SBS_DEFVIDPALLETTE;
 }
 else
 {
  if ( ( nNewVidPallette = nCurrVidPallette + 1 ) >
     SBS_MAXNUMVIDPAL )
   nNewVidPallette = SBS_DEFVIDPALLETTE;
 }

 InRegs.ax = ( WORD )( SBS_VIDEO |
nNewVidPallette );
 InRegs.bx = ( WORD )( SBS_VIDEOPALLETTE );

#if !defined( NOINT15 )
 intn( &InRegs, &OutRegs, SBS_VIDINTNUM );
#else
#endif

 nCurrVidPallette = nNewVidPallette;

 return ( ERR_SUCCESS );
}

int ToggleSpeaker( void )
{
 REG_W InRegs, OutRegs;
 WORD wFlags;
 BYTE nNewSpeakerState;

 fil_chr( ( NPSTR )&InRegs, 0, sizeof( REG_W ) );

 if ( nCurrSpeakerState == FON )
  nNewSpeakerState = FOFF;
 else
  nNewSpeakerState = FON;

 InRegs.ax = SBS_SARATOGAFUNC |
nNewSpeakerState;
 InRegs.bx = SBS_ENADISSPEAKER;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
 {
  nCurrSpeakerState = nNewSpeakerState;
  return ( ERR_SUCCESS );
 }
 else
  return ( ERR_INTERNAL );
}

BYTE GetRightMouseStatus( void )
{
 return ( nCurrRightMouseButton );
}

int EnableRightMouseButton( BYTE
nNewRightMouseButton )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC |
nNewRightMouseButton;
 InRegs.bx = SBS_ENADISRIGHTMOUSE;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
 {
  nCurrRightMouseButton =
nNewRightMouseButton;
  return ( ERR_SUCCESS );
 }
 else
  return ( ERR_INTERNAL );
}

int SetTowerIcon( BYTE nTowerStatus, BYTE
nWavesStatus )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC |
nTowerStatus;
 InRegs.bx = SBS_TOWERWAVESICON;
 InRegs.cx = ( WORD )nWavesStatus;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int DoSleep( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_GOTOSLEEP;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int DoSuspend( BOOL fSaveEEROMData )
{
 REG_W InRegs, OutRegs;

 fil_chr( ( NPSTR )&InRegs, 0, sizeof( REG_W ) );


 if ( fSaveEEROMData )
  SetEEUIData();

 InRegs.ax = SBS_SARATOGAFUNC;
 InRegs.bx = SBS_GOTOSUSPEND;

#if !defined( NOINT15 )
 intn( &InRegs, &OutRegs, SBS_SLINTNUM );
#else
#endif

 return ( ERR_INTERNAL );
}

int SetSuspendFlagPointer( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_SUSPENDFLAGPTR;
 InRegs.es = SEG( &fSuspendInProgress );
 InRegs.dx = OFF( &fSuspendInProgress );

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
 {
  SetSuspendFlag( FOFF );
  return ( ERR_SUCCESS );
 }
 else
  return ( ERR_INTERNAL );
}

void SetSuspendFlag( BOOL fStatus )
{
 PCB_BEGINCRITICAL;
 fSuspendInProgress = LOBYTE( fStatus );
 PCB_ENDCRITICAL;
}

BOOL GetSuspendFlag( void )
{
 BOOL fReturn;

 PCB_BEGINCRITICAL;
 fReturn = fSuspendInProgress;
 PCB_ENDCRITICAL;

 return ( fReturn );
}

int GetSystemResumeBit( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_GETSYSRESUMEBIT;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
  return ( OutRegs.ax & 0x00FF );
 else
  return ( ERR_INTERNAL );
}

int ClearSystemResumeBit( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_CLEARSYSRESUMEBIT;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int SetWaitingIcon( BYTE nWaitingIconStatus, BYTE
fBusyCursor )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_WAITINGICON;
 InRegs.ax |= nWaitingIconStatus,

#if !defined( NOINT15 )
 wFlags = intn( &InRegs, &OutRegs,
SBS_SLINTNUM );
#else
 wFlags = 0;
#endif

 if ( nWaitingIconStatus ==
SBS_WAITINGICONOFF )
 {
  if ( fBusyCursor )
   EnableBusyCursor( SUI_BUSYCURSOROFF );

  GetHotIcon();
 }
 else
 {
  if ( fBusyCursor )
   EnableBusyCursor( SUI_BUSYCURSORON );

 }

 if ( !( wFlags & GEN_CARRYFLAG ) )
  return ( ERR_SUCCESS );
 else
  return ( ERR_INTERNAL );
}

int EnableKbdAfterBoot( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_ENABLEKBD;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

LONG GetBatteryInfo( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_GETBATTERYINFO;

#if !defined( NOINT15 )
 wFlags = intn( &InRegs, &OutRegs,
SBS_SLINTNUM );
#else
 wFlags = 0;
#endif
```

```
  if ( !( wFlags & GEN_CARRYFLAG ) )
#if !defined( NOINT15 )
    return ( MAKELONG( OutRegs.ax, OutRegs.bx )
);
#else
    return ( SBS_NOINT15BATTERYINFO );
#endif
  else
    return ( SBS_GETBATTERYINFOERROR );

}

WORD GetSizeOfExtendedMem( void )
{
  BYTE nExtMemHigh, nExtMemLow;

  PCB_BEGINCRITICAL

  outb( SBS_CMOSPORT,
SBS_CMOSREADHIGHBYTE );
  nExtMemHigh = inputb(
SBS_CMOSEXTENDEDMEM );
  outb( SBS_CMOSPORT,
SBS_CMOSREADLOWBYTE );
  nExtMemLow = inputb(
SBS_CMOSEXTENDEDMEM );

  PCB_ENDCRITICAL

  return ( MAKEWORD( nExtMemLow,
nExtMemHigh ) );
}

int GetBIOSVersion( void )
{
  REG_W InRegs, OutRegs;
  WORD wFlags;

  fil_chr( ( NPSTR )&InRegs, 0, sizeof( REG_W ) );

  InRegs.ax = SBS_SARATOGAFUNC;
  InRegs.bx = SBS_GETBIOSVERSION;

#if !defined( NOINT15 )
  wFlags = intn( &InRegs, &OutRegs,
SBS_SLINTNUM );
#else
  wFlags = 0;
#endif

  if ( !( wFlags & GEN_CARRYFLAG ) )
#if !defined( NOINT15 )
    return ( OutRegs.ax );
#else
    return ( 0 );
#endif
  else
    return ( 0 );
}
Copr. 1995 Zenith Data Systems Corp.

#include "cr.h"
#include "slo.h"
#include "spawn.h"
#include "sm.h"

#define SMD_MAXGEARIMAGES 8

#if defined( _MSC_VER )
#pragma warning( disable : 4704 )
#endif

static char aGearImages[] = { "|/-\\|/-\\" };

static BYTE nClockReenterCount = 0;
static WORD wLastKey;
static BOOL fDispatchActive = FALSE;
static BOOL fRecsInstalled = FALSE;
static int  aEventStack[ SMD_EVENTSTACKLIMIT ];
static int  iEventStackPtr =
SMD_EVENTSTACKLIMIT - 1;
static int  iTempThreadIdx = -1;

EVENT EventQueue[ SMD_MAXTHREADS ];

int AddThread( int iIdx, NEARPROC fpThread,
APIFUNC
aAPIFuncTable[],
        THREADTYPEID ThreadTypeId, BOOL
fReentrant, LONG
lTimeLimit,
        int iRetryLimit )
{
  if ( iIdx >= SMD_MAXTHREADS )
    return ( ERR_INTERNAL );

  PCB_BEGINCRITICAL
  EventQueue[ iIdx ].fpThread = fpThread;
  EventQueue[ iIdx ].aAPIFuncTable =
aAPIFuncTable;
  EventQueue[ iIdx ].ThreadTypeId = ThreadTypeId;
  EventQueue[ iIdx ].lTimeLimit = lTimeLimit;
  EventQueue[ iIdx ].lTimeCurrent = 0L;
  EventQueue[ iIdx ].iRetryLimit = iRetryLimit;
  EventQueue[ iIdx ].iInitRetryLimit = iRetryLimit;
  EventQueue[ iIdx ].nReenterCount = 0;
  EventQueue[ iIdx ].bReentrant = fReentrant;
  PCB_ENDCRITICAL

  return ( ERR_SUCCESS );
}

BYTE IsThreadActive( int iIdx )
{
  BYTE fThreadStatus;
  NEARPROC fpThread;

  if ( iIdx >= SMD_MAXTHREADS )
    return ( FALSE );

  fpThread = EventQueue[ iIdx ].fpThread;

  PCB_BEGINCRITICAL

  fThreadStatus = ( fpThread != NULL && fpThread
!= ( NEARPROC
)SMD_THREADACTIVE );

  PCB_ENDCRITICAL

  return ( fThreadStatus );
}

void ResetTime( int iIdx )
{
  if ( iIdx >= SMD_MAXTHREADS )
    return;

  EventQueue[ iIdx ].lTimeCurrent = 0;
}

int SetRetryLimit( int iIdx, int iNewRetryLimit )
{
  if ( iIdx >= SMD_MAXTHREADS )
    return ( ERR_INTERNAL );

  PCB_BEGINCRITICAL
  EventQueue[ iIdx ].iRetryLimit = iNewRetryLimit;
  EventQueue[ iIdx ].lTimeCurrent = 0;
  PCB_ENDCRITICAL

  return ( ERR_SUCCESS );
}

BYTE GetRetryLimit( int iIdx )
{
  int iReturn;

  if ( iIdx >= SMD_MAXTHREADS )
    return ( 0 );

  if ( ( iReturn = EventQueue[ iIdx ].iRetryLimit ) < 0
)
    iReturn = 0;

  return ( iReturn );
}

BYTE GetInitRetryLimit( int iIdx )
{
  int iReturn;

  if ( iIdx >= SMD_MAXTHREADS )
    return ( 0 );

  if ( ( iReturn = EventQueue[ iIdx ].iInitRetryLimit ) <
0 )
    iReturn = 0;

  return ( iReturn );
}

int ResetRetryLimit( int iIdx )
{
  if ( iIdx >= SMD_MAXTHREADS )
    return ( ERR_INTERNAL );

  PCB_BEGINCRITICAL
  EventQueue[ iIdx ].iRetryLimit = EventQueue[ iIdx
].iInitRetryLimit;
  EventQueue[ iIdx ].lTimeCurrent = 0;
  PCB_ENDCRITICAL

  return ( ERR_SUCCESS );
}

int SetTimeLimit( int iIdx, LONG lNewTimeLimit )
{
  if ( iIdx >= SMD_MAXTHREADS )
    return ( ERR_INTERNAL );


  PCB_BEGINCRITICAL
  EventQueue[ iIdx ].lTimeLimit = lNewTimeLimit;
  PCB_ENDCRITICAL

  return ( ERR_SUCCESS );
}

THREADTYPEID GetThreadType( int iIdx )
{
  if ( iIdx >= SMD_MAXTHREADS )
    return ( ERR_INTERNAL );


  return ( EventQueue[ iIdx ].ThreadTypeId );
}

NEARPROC GetThreadAddress( int iIdx )
{
  if ( iIdx >= SMD_MAXTHREADS )
    return ( ( NEARPROC )NULL );


  return ( EventQueue[ iIdx ].fpThread );
}

int DelThread( int iIdx )
{
  int iReturn = 0;

  if ( iIdx >= SMD_MAXTHREADS || iIdx < 0 )
  {
    TRACE( "ERROR: Invalid thread ID passed to
DelThread()\r" );
    return ( ERR_INTERNAL );
  }

  PCB_BEGINCRITICAL
  EventQueue[ iIdx ].fpThread = NULL;
  PCB_ENDCRITICAL

#if !defined( PROD )
  sprintf( szTempStr, "NOTICE: Temp thread
deallocated - %d\r",
iIdx );
  TRACE( szTempStr );
#endif

  return ( iReturn );
}

int InitDispatcher( void )
{
  iTempThreadIdx = GetTempEventNum();

  if ( iTempThreadIdx < 0 )
    return ( ERR_INTERNAL );

  fil_chr( ( NPSTR )EventQueue, 0, sizeof(
EventQueue ) );

  AddThread( iTempThreadIdx, InstallRecs, NULL,
SMD_ONETIME,
FALSE, INI_POLLFREQ,
          0 );

  InitVIDTrapRec();
  add_trap( GetVIDTrapRec() );

  InitPNDTrapRec();
  add_trap( GetPNDTrapRec() );

  InitSCSTrapRec();
  add_trap( GetSCSTrapRec() );

  InitPRXTrapRec();
  add_trap( GetPRXTrapRec() );

  AddThread( SMI_PNDEVENTNUM, NULL,
GetPNDFuncTable(),
SMD_ONDEMAND, FALSE,
          SMI_PNDPOLLFREQ, 0 );
  AddThread( SMI_SUIEVENTNUM, NULL,
GetSUIFuncTable(),
SMD_ONDEMAND, FALSE,
          SMI_SUIPOLLFREQ, 0 );
  AddThread( SMI_SCSEVENTNUM, NULL,
GetSCSFuncTable(),
SMD_ONDEMAND, TRUE,
          SMI_SCSPOLLFREQ, 0 );
  AddThread( SMI_PRXEVENTNUM, NULL,
GetPRXFuncTable(),
SMD_ONDEMAND, FALSE,
          SMI_PRXPOLLFREQ, 0 );
}

int ShutDownDispatcher( void )
{
  RestoreOldSUIIntVec();
  return ( 0 );
}

void InstallRecs( void )
{
  DelThread( iTempThreadIdx );

  AddThread( PND_EVENTNUM, CheckPenDriver,
NULL, SMD_POLLED,
FALSE,
          PND_POLLFREQ, 0 );
  AddThread( PRX_EVENTNUM, CheckSystem,
NULL, SMD_POLLED,
          FALSE, PRX_POLLFREQ, 0 );

  InitSUICallRec();
  InitSCSCallRec();

  SetSuspendFlagPointer();
  add_trap( GetSUIMouseTrapRec() );

  fRecsInstalled = TRUE;
}


void Dispatch( THREADTYPEID ActiveThreadId, int
iEventThreadIdx )
{
  int iThreadIdx,
  BOOL fNextEntry = FALSE;
  EVENT *ev,
  NEARPROC fpOriginalThread = NULL;

  struct REGW Regs;

  if ( iEventThreadIdx >= SMD_MAXTHREADS )
    goto Exit;

  SetDispatchActive( TRUE );

  ev = &EventQueue[ iEventThreadIdx ];

  if ( ActiveThreadId == SMD_ONDEMAND )
  {
   if ( ev->bReentrant || ev->nReenterCount == 0 )
   {
     PCB_BEGINCRITICAL
     ++ev->nReenterCount;
     PCB_ENDCRITICAL

     if ( ev->aAPIFuncTable != NULL )
       CallAPIFunction( ev->aAPIFuncTable );
     else
       TRACE( "ERROR: Function table is NULL in
dispatcher" );

     PCB_BEGINCRITICAL
     --ev->nReenterCount;
     PCB_ENDCRITICAL
   }
   else
   {
     GetForegroundRegs( &Regs );
     Regs.ax = ( WORD )ERR_INTERNAL;
     SetForegroundRegs( &Regs );
   }

   goto Exit;
  }


  for ( iThreadIdx = 0; iThreadIdx <
SMD_MAXTHREADS; ++iThreadIdx
)
  {
    ev = &EventQueue[ iThreadIdx ];

    if ( ev->fpThread != NULL )
    {
     if ( ev->ThreadTypeId == ActiveThreadId ||
          ActiveThreadId ==
SMD_ALLTHREADTYPES )
      {
```

```
      if ( ev->bReentrant || ev->nReenterCount == 0
)
      {
        PCB_BEGINCRITICAL
        ++ev->nReenterCount;
        PCB_ENDCRITICAL
      }
      else
      {
#if !defined( PROD )
        sprintf( szTempStr, "NOTICE: Thread #%d
reentered, but
returned\r", iThreadIdx );
        TRACE( szTempStr );
#endif
        goto Exit;
      }

      switch ( ev->ThreadTypeId )
      {
        case SMD_ONETIME:
          if ( ev->lTimeCurrent >= 0 )
          {
            if ( ++ev->lTimeCurrent >= ev->lTimeLimit
)
            {
              ev->lTimeCurrent = -1;
              TRACE( "NOTICE: ONETIME thread
expired\r" );
            }
            else
              fNextEntry = TRUE
          }
          else
            fNextEntry = TRUE;
          break;

        case SMD_MANYTIMES:
          if ( ev->lTimeCurrent >= 0 )
          {
            if ( ++ev->lTimeCurrent >= ev->lTimeLimit
)
            {
              if ( --ev->iRetryLimit <= 0 )
              {
                ev->lTimeCurrent = -1;
                TRACE( "NOTICE: MANYTIMES
thread expired\r" );
              }
              else
                ev->lTimeCurrent = 0,
            }
            else
              fNextEntry = TRUE,
          }
          else
            fNextEntry = TRUE.
          break.

        case SMD_POLLED:
          if ( ++ev->lTimeCurrent >= ev->lTimeLimit )
            ev->lTimeCurrent = 0;
          else
            fNextEntry = TRUE,
          break;

        default:
          fNextEntry = TRUE;
          break,
      }
    }
    else
      fNextEntry = TRUE;

    if ( fNextEntry )
    {
      fNextEntry = FALSE.
      PCB_BEGINCRITICAL
      --ev->nReenterCount;
      PCB_ENDCRITICAL
    }
    else
    {
      if ( ev->fpThread != NULL && ev->fpThread !=
( NEARPROC
)SMD_THREADACTIVE )
      {
        fpOriginalThread = ev->fpThread;
        ( *ev->fpThread )();

        PCB_BEGINCRITICAL
        if ( fpOriginalThread == ev->fpThread &&
            ( WORD )( ev->nReenterCount - 1 ) <
            ( WORD )ev->nReenterCount )
          --ev->nReenterCount;
        PCB_ENDCRITICAL
      }
    }
  }
  }

Exit:
  SetDispatchActive( FALSE );
}

WORD TrapService( struct trap_rec *CurrTrapRec )
{
  REG_W Regs;
  MREG MinArgs;
  WORD wReturn = 0;

  switch ( CurrTrapRec->tr_int )
  {
    case SMI_SUIINTNUM:
      Dispatch( SMD_ONDEMAND,
SMI_SUIEVENTNUM );
      break;

    case SMI_SCSINTNUM:
      Dispatch( SMD_ONDEMAND,
SMI_SCSEVENTNUM );
      break;

    case SMI_PNDINTNUM:
      Dispatch( SMD_ONDEMAND,
SMI_PNDEVENTNUM );
      break;

    case SMI_PRXINTNUM:
      Dispatch( SMD_ONDEMAND,
SMI_PRXEVENTNUM );
      break;

    case SBS_VIDINTNUM:
      VIDTrapService();
      return ( ( WORD )CurrTrapRec );
      break;

    case PND_INTNUM:
      GetForegroundRegs( &Regs );

      if ( Regs.ax == PND_SETEVENTHANDLER &&
!GetPNDActiveStatus() )
      {
        MinArgs.ax = 0x000C.
        MinArgs.es = Regs.es;
        MinArgs.dx = Regs.dx;
        MinArgs.cx = Regs.cx;

        mouse( &MinArgs, &MEventOutArgs ),
      }
      else
        return ( ( WORD )CurrTrapRec );

    default:
      return ( ( WORD )CurrTrapRec );
  }
  return ( wReturn );
}

void FCallService( WORD wAX )
{
  switch ( PopEventNum() )
  {
    case SMI_SUIEVENTNUM:
      Dispatch( SMD_ONDEMAND,
SMI_SUIEVENTNUM );
      break;

    case SMI_SCSEVENTNUM:
      Dispatch( SMD_ONDEMAND,
SMI_SCSEVENTNUM );
      break;



  }
}

void ClockTick( void )
{


  add_tsc_event( SMD_DISPATFREQ );



    Dispatch( SMD_ALLTHREADTYPES, 0 );

}

void DecClockReCount( void )
{
  PCB_BEGINCRITICAL;
  --nClockReenterCount;
  PCB_ENDCRITICAL;
}

#if !defined( NDEBUG )
void KbdService( WORD wHotKey )
{

  wLastKey = wHotKey;

}

WORD GetLastKey( void )
{
  WORD wTempLastKey = wLastKey;
  wLastKey = 0;

  return ( wTempLastKey );
}
#endif

void SetDispatchActive( BOOL bNewDispatchActive
)
{
  PCB_BEGINCRITICAL
  fDispatchActive = bNewDispatchActive;
  PCB_ENDCRITICAL
}

BOOL GetDispatchActive( void )
{
  BOOL fCurrentDisActive;

  PCB_BEGINCRITICAL
  fCurrentDisActive = fDispatchActive.
  PCB_ENDCRITICAL

  return ( fCurrentDisActive );
}

void CrankGear( BYTE *bGearIdx, char *szLabel )
{
  BYTE bNewGearIdx = *bGearIdx;
  if ( ++bNewGearIdx >= SMD_MAXGEARIMAGES )
    bNewGearIdx = 0;

  ++crs_x;

  *bGearIdx = bNewGearIdx;
}

void PushEventNum( int iEventNum )
{
  aEventStack[ iEventStackPtr ] = iEventNum;
  iEventStackPtr = iEventStackPtr > 0 ?
iEventStackPtr - 1 :
iEventStackPtr;
}

int PopEventNum( void )
{
  int iReturn;

  PCB_BEGINCRITICAL
  iEventStackPtr = iEventStackPtr <
SMD_EVENTSTACKLIMIT - 1 ?
iEventStackPtr + 1 : iEventStackPtr;
  iReturn = aEventStack[ iEventStackPtr ];
  PCB_ENDCRITICAL

  return ( iReturn );
}

int GetTempEventNum( void )
{
  register int iThreadIdx;
  int iReturn = ERR_INTERNAL;

  PCB_BEGINCRITICAL

  for ( iThreadIdx = SMD_REUSETHREADS - 1;
iThreadIdx <
SMD_MAXTHREADS;
      ++iThreadIdx )
  {
    if ( EventQueue[ iThreadIdx ].fpThread == NULL )

    {
#if !defined( PROD )
      sprintf( szTempStr, "NOTICE: Temp thread
allocated - %d\r",
iThreadIdx );
      TRACE( szTempStr );
#endif
      iReturn = iThreadIdx.
      EventQueue[ iThreadIdx ].fpThread = (
NEARPROC
)SMD_THREADACTIVE;
      break;
    }
  }

  PCB_ENDCRITICAL

#if !defined( PROD )
  if ( iReturn == ERR_INTERNAL )
    TRACE( "ERROR: Out of temporary threads" );
#endif

  return ( iReturn ),
}

#if defined( _MSC_VER )
#pragma warning( default : 4704 )
#endif
Copr. 1995 Zenith Data Systems Corp.

#include "cr.h"
#include "sio.h"
#include "spawn.h"
#include "k2.h"
#include "frame.h"
#include "sm.h"

#if defined( _MSC_VER )
#pragma warning( disable : 4704 )
#endif

THREADTYPEID  ActiveThreadType =
SMD_NOTHREAD:

char         szSMSignature[] =
SIG_SMSIGNATURE,
char         szSMVersionName[] =
STR_SMVERSIONNAME,
char         szSMVersionNum[] =
STR_SMVERSIONNUM;
char         szSMModuleName[] =
STR_SMMODULENAME;
char         szSUIExecName[] = SUI_EXECNAME;
char         szSCSAbortConn[] =
SMI_SCSABORTCONN;
char         szTempStr[ GEN_MAXLENTEMPSTR ];
char         szTempMsgStr[
GEN_MAXLENTEMPSTR * 2 ];
char         szNullStr[] = "\0";
SCANCODE     aUDHotIcon1Def[] =
SUI_UDHOTICON1DEF;
char         szPassword[ SUI_MAXLENPASSWORD
+ 1 ];
char         nRLNIntNum = 0;
char         fEEPROMInited = FALSE;
WORD           wScreenCode = SUI_NOSCREEN;
WORD           wOldScreenCode =
SUI_NOSCREEN,
MREG         MEventOutArgs;
FARCALLENTRY lpfnFarCallEntry = NULL;
SUICB        lpfnSUICallBack = NULL;
UICONFIGDATA UIConfigData;
LISTBOXENTRY ListBoxEntry;
MSGBOXBUFF   MsgBoxBuff[
SMI_SUIMAXMSGBOXLINES ];
BUFFHEADER   BuffHead;

BOOL fConnectRequested = FALSE;

char GetEEPROMInited( void )
{
  return ( fEEPROMInited );
}

void InitUIConfigData( void )
{
  if ( GetEEUIData( &UIConfigData ) ==
ERR_SUCCESS )
  {
    if ( UIConfigData.nMajorVersionNum ==
GEN_SMMAJORVERSIONNUM
&&
        UIConfigData.nMinorVersionNum ==
GEN_SMMINORVERSIONNUM )
    {
      if ( ( ( int )UIConfigData.wXLowerPenCalib -
           ( int )UIConfigData.wXUpperPenCalib ) >=
200 )
      {
        if ( UIConfigData.wXUpperPenCalib ==
PND_XUPPERPENCALIB
&&
            UIConfigData.wYUpperPenCalib ==
PND_YUPPERPENCALIB
&&
            UIConfigData.wXLowerPenCalib ==
PND_XLOWERPENCALIB
&&
            UIConfigData.wYLowerPenCalib ==
PND_YLOWERPENCALIB )
          InitEEPROM();
      }
      else
```

```
      InitEEPROM();

    }
    else
      InitEEPROM();
  }
  else
    InitEEPROM();

  fil_chr( &MEventOutArgs, 0, sizeof ( MREG ) );
  lpfnFarCallEntry = MK_FP( _ccode, _fcall_entry );
}

void InitEEPROM( void )
{
  TRACE( "ERROR: Invalid values or unable to read
from EEPROM\r"
);

  fil_chr( &UIConfigData, 0, sizeof ( UICONFIGDATA
) );

  UIConfigData.wBuffLen         = sizeof (
UICONFIGDATA );
  UIConfigData.nMajorVersionNum =
GEN_SMMAJORVERSIONNUM;
  UIConfigData.nMinorVersionNum =
GEN_SMMINORVERSIONNUM;
  UIConfigData.bConnectType     =
SMI_NETWORKCONNECT;
  UIConfigData.nDomainID        = PRX_DOMAIN0;

  UIConfigData.nContrastIdx     =
SHC_DEFCONTRASTIDX;
  UIConfigData.nBrightnessIdx   =
SHC_DEFBRIGHTNESSIDX;

  UIConfigData.nSleepTimeIdx    =
SBS_SLEEPDISABLED;
  UIConfigData.bAutoShutoff     = FALSE;

  UIConfigData.wUILanguage      =
SMI_UIUSENGLISH;
  UIConfigData.nFrameType       =
PRX_FRAME8023;

  UIConfigData.nLastOSKScreen      =
SUI_BIGALPHA;
  UIConfigData.nLastOSKDlgScreen   =
SUI_BIGALPHA;
  UIConfigData.nLastSetupDlgScreen =
SUI_HOSTSELECTION;

  UIConfigData.xPosLastOSKScreen   =
SUI_XULBIGALPHA;
  UIConfigData.yPosLastOSKScreen   =
SUI_YULBIGALPHA;

  mem_cp( aUDHotIcon1Def,
UIConfigData.aUDHotIcon1,
SUI_MAXLENDEFHOTICON );

  TRACE( "NOTICE: Using pen calibration values
set to zero.\r" );

  UIConfigData.wXUpperPenCalib =
PND_XUPPERPENCALIB;
  UIConfigData.wYUpperPenCalib =
PND_YUPPERPENCALIB;
  UIConfigData.wXLowerPenCalib =
PND_XLOWERPENCALIB;
  UIConfigData.wYLowerPenCalib =
PND_YLOWERPENCALIB;

  fEEPROMInited = TRUE;

  SetEEUIData();

  SetContrast( UIConfigData.nContrastIdx );
  SetBrightness( UIConfigData.nBrightnessIdx );
}

void InitSUI( void )
{
  SetDomainWarning( FALSE );
  SetSecurityWarning( FALSE );
}

void InitSaratoga( BYTE nInitType )
{
  if ( nInitType == SBS_DRIVERSLOADING )
  {
    TRACE( "NOTICE: Power management disabled
for driver load
sequence.\r" );
    SetPowerEnable( SBS_POWERMANDISABLED
);
  }
  else if ( nInitType == SBS_SUILOADING )
  {
    if ( SetSleepTimeout(
UIConfigData.nSleepTimeIdx ) ==
ERR_SUCCESS )
    {
      if ( UIConfigData.nSleepTimeIdx ==
SBS_SLEEPDISABLED )
      {
        TRACE( "NOTICE: Power management now
disabled, DOZE
disabled\r" );
        SetPowerEnable(
SBS_POWERMANDISABLED );
        SetDozeTimeout( SBS_DOZEDISABLED );
      }
      else
      {
        TRACE( "NOTICE: Power management now
enabled, DOZE
disabled\r" );
        SetPowerEnable(
SBS_POWERMANENABLED );
        SetDozeTimeout( SBS_DOZEDISABLED );

      }

      if ( UIConfigData.bAutoShutoff )
      {
        TRACE( "NOTICE: Suspend after 60 minutes
enabled\r" );
        SetSuspendTimeout( SBS_SUSPENDIN60MIN
);
      }
      else
      {
        TRACE( "NOTICE: Suspend disabled\r" );
        SetSuspendTimeout(
SBS_SUSPENDDISABLED );
      }
    }
  }

}

int GetEEMouseConfig( void )
{
  REG_W InRegs, OutRegs;
  PENCALIB pc;
  WORD wFlags;

  fil_chr( &InRegs, 0, sizeof ( REG_W ) );
  fil_chr( &pc, 0, sizeof ( PENCALIB ) );

  InRegs.ax = SBS_SARATOGAFUNC;
  InRegs.bx = SBS_EEPROMTOMEMORY;
  InRegs.cx = SBS_LENMOUSECFGDATA;
  InRegs.dx = PND_OFFCALIB;

  InRegs.es = SEG( &pc );
  InRegs.di = OFF( &pc );

#if !defined( NOINT15 )
  wFlags = intn( &InRegs, &OutRegs,
SBS_SLINTNUM );
#else
  wFlags = 0;
#endif

  if ( !( wFlags & GEN_CARRYFLAG ) )
  {
    UIConfigData.wXUpperPenCalib =
pc.wXUpperPenCalib;
    UIConfigData.wYUpperPenCalib =
pc.wYUpperPenCalib;
    UIConfigData.wXLowerPenCalib =
pc.wXLowerPenCalib;
    UIConfigData.wYLowerPenCalib =
pc.wYLowerPenCalib;

    return ( ERR_SUCCESS );
  }
  else
    return ( ERR_INTERNAL );
}

int SetEEMouseConfig( PENCALIB *pc )
{
  UIConfigData.wXUpperPenCalib =
pc->wXUpperPenCalib;
  UIConfigData.wYUpperPenCalib =
pc->wYUpperPenCalib;
  UIConfigData.wXLowerPenCalib =
pc->wXLowerPenCalib;
  UIConfigData.wYLowerPenCalib =
pc->wYLowerPenCalib;

  return ( SetEEUIData() );
}

int SetEEUIData( void )
{
  REG_W InRegs, OutRegs;
  WORD wFlags;
  UICONFIGDATA OldUIConfigData;
  int iReturn = ERR_SUCCESS;

  fil_chr( &OldUIConfigData, 0, sizeof (
UICONFIGDATA ) );

  if ( GetEEUIData( &OldUIConfigData ) ==
ERR_SUCCESS )
  {
    if ( mem_cmp( ( NPSTR )&OldUIConfigData, (
NPSTR
)&UIConfigData,
        sizeof( UICONFIGDATA ) ) != sizeof(
UICONFIGDATA ) )

    {
      fil_chr( &InRegs, 0, sizeof ( REG_W ) );

      InRegs.ax = SBS_SARATOGAFUNC;
      InRegs.bx = SBS_MEMORYTOEEPROM;
      InRegs.cx = sizeof ( UICONFIGDATA );
      InRegs.dx = SBS_OFFUICFGDATA;
      InRegs.es = SEG( &UIConfigData );
      InRegs.di = OFF( &UIConfigData );

#if !defined( NOINT15 )
      PCB_BEGINCRITICAL
      wFlags = intn( &InRegs, &OutRegs,
SBS_SLINTNUM );
      PCB_ENDCRITICAL
#else
      wFlags = 0;
#endif
      if ( !( wFlags & GEN_CARRYFLAG ) )
        iReturn = ERR_SUCCESS;
      else
        iReturn = ERR_INTERNAL;
    }
  }
  else
    iReturn = ERR_INTERNAL;

#if !defined( PROD )
  if ( iReturn == ERR_INTERNAL )
    TRACE( "ERROR: SetEEUIData() error returned
from extended
BIOS call to save EEPROM data\r" );
#endif

  return ( iReturn );
}

int GetEEUIData( UICONFIGDATA
*CurrUIConfigData )
{
  REG_W InRegs, OutRegs;
  WORD wFlags;
  UICONFIGDATA TempUIConfigData;

  fil_chr( &InRegs, 0, sizeof ( REG_W ) );

  InRegs.ax = SBS_SARATOGAFUNC;
  InRegs.bx = SBS_EEPROMTOMEMORY;
  InRegs.cx = sizeof ( UICONFIGDATA );
  InRegs.dx = SBS_OFFUICFGDATA;
  InRegs.es = SEG( &TempUIConfigData );
  InRegs.di = OFF( &TempUIConfigData );

#if !defined( NOINT15 )
  PCB_BEGINCRITICAL
  wFlags = intn( &InRegs, &OutRegs,
SBS_SLINTNUM );
  PCB_ENDCRITICAL
#else
  wFlags = 0;
#endif

  if ( !( wFlags & GEN_CARRYFLAG ) )
  {
    *CurrUIConfigData = TempUIConfigData;

    return ( ERR_SUCCESS );
  }
  else
    return ( ERR_INTERNAL );
}

int ClearEEPROM( void )
{
  REG_W InRegs, OutRegs;
  WORD wFlags;
  UICONFIGDATA UINullData;

  fil_chr( &InRegs, 0, sizeof ( InRegs ) );
  fil_chr( &UINullData, 0, sizeof ( UINullData ) );

  InRegs.ax = SBS_SARATOGAFUNC;
  InRegs.bx = SBS_MEMORYTOEEPROM;
  InRegs.cx = sizeof ( UICONFIGDATA );
  InRegs.dx = SBS_OFFUICFGDATA;
  InRegs.es = SEG( &UINullData );
  InRegs.di = OFF( &UINullData );

#if !defined( FLASHTEST )
  wFlags = intn( &InRegs, &OutRegs,
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL );
}

#if defined( _MSC_VER   )
#pragma warning( default : 4704 )
#endif
Copr. 1995 Zenith Data Systems Corp.

#include "cr.h"
#include "spawn.h"
#include "k2.h"
#include "sio.h"
#include "sm.h"

#if defined( _MSC_VER   )
#pragma warning( disable : 4704 )
#endif

HOSTLISTENTRIES HostListEntries = { 0, 0 };
static HOSTLISTENTRIES BroadcastHLEntries = {
0, 0 };
static int          iHLStatus = SMI_BLANK;
static int          iHLThreadId = -1;
static int          iWaitForHLThreadIdx;
static int          iLBCurrHost = 0;
static int          iLBCurrGroup = 0;
static int          iCurrGroupIdx = 0;
static int          iNumGroups = 0;
static char          szWorkAroundNodeAdd[
SCS_MAXLENNODEADD ];
static char         szSerialDup[
SCS_MAXLENSERIALNUM ];
static char         szCurrHostName[
SCS_MAXLENHOSTNAME + 1 ];

static char          fRequestHostList = FALSE;

void SetCurrHostName( char *szNewCurrHostName
)
{
  strcpy( szCurrHostName, szNewCurrHostName );
}

char *GetCurrHostName( void )
{
  return ( szCurrHostName );
}

int GetLBCurrHost( void )
{
  return ( iLBCurrHost );
}

void SetLBCurrHost( int iNewLBCurrHost )
{
  iLBCurrHost = iNewLBCurrHost;
}

char GetRequestHostList( void )
{
  return ( fRequestHostList );
}

void SetRequestHostList( int iNewRequestHostList )
{
  PCB_BEGINCRITICAL;
  fRequestHostList = LOBYTE( iNewRequestHostList
);
  PCB_ENDCRITICAL;
}

int GetLBCurrGroup( void )
{
  return ( iLBCurrGroup );
}

void SetLBCurrGroup( int iNewLBCurrGroup )
{
  if ( iLBCurrGroup != iNewLBCurrGroup )
    iCurrGroupIdx = GetGroupIdx( iNewLBCurrGroup
);
```

```
 iLBCurrGroup = iNewLBCurrGroup;
}

char *GetLBGroup( int iGroupNum )
{
 int iUseGroup,
 char *szReturn,
 int iLBGroupIdx;

 if ( iHLStatus != SMI_AVAILABLE ||
HostListEntries.iNumEntries
== 0 )
   return ( szNullStr );

 iUseGroup = ( iGroupNum ==
SUI_LBCURRENTRY ? iLBCurrGroup .
iGroupNum );

 iLBGroupIdx = GetGroupIdx( iUseGroup );

 szReturn = HostListEntries.aHostListBuff[
iLBGroupIdx
].HostDataBuff.szGroupName;

 return ( szReturn == NULL ? szNullStr : szReturn
).
}

char *GetLBHost( int iHostNum )
{
 char *szReturn,

 if ( GetCurrActionCode() ==
SUI_LASTCONNECTION )
   return ( UIConfigData szLastHostName );

 if ( iHLStatus != SMI_AVAILABLE ||
HostListEntries.iNumEntries
== 0 )
   return ( szNullStr ),

 szReturn = HostListEntries.aHostListBuff[
GetHostIdx( lHostNum
) ].HostDataBuff.szHostName,

 return ( szReturn == NULL ? szNullStr   szReturn
);
}

int GetLBHostStatus( int iHostNum )
{
 int iReturn;

 if ( iHLStatus != SMI_AVAILABLE ||
HostListEntries.iNumEntries
== 0 )
   return ( SUI_LBENTRYENABLED );

 iReturn = HostListEntries.aHostListBuff[
GetHostIdx( iHostNum )
].HostDataBuff.nHostStatus;

 if ( iReturn == SCS_HOSTAVAILABLE )
   iReturn = SUI_LBENTRYENABLED;
 else
   iReturn = SUI_LBENTRYDISABLED;

 return ( iReturn );
}

int SetLBHostStatus( int iHostNum, BYTE
nNewHostStatus )
{
 if ( iHLStatus != SMI_AVAILABLE ||
HostListEntries.iNumEntries
== 0 )
   return ( ERR_INTERNAL );

 HostListEntries.aHostListBuff[ GetHostIdx(
iHostNum )
].HostDataBuff.nHostStatus = nNewHostStatus;

 return ( ERR_SUCCESS );
}

char *GetCurrNodeAddress( void )
{
 int iHostIdx;
 char *szReturn = NULL,

 if ( GetCurrActionCode() ==
SUI_LASTCONNECTION )
   return ( UIConfigData.szLastNodeAddress );

 if ( iHLStatus != SMI_AVAILABLE ||
HostListEntries.iNumEntries
== 0 )
   return ( szNullStr );

 if ( iLBCurrHost > 0 )
 {
   iHostIdx = GetGroupIdx( iLBCurrGroup ) + (
iLBCurrHost - 1 );
   szReturn = HostListEntries.aHostListBuff[
iHostIdx
].szNodeAddress;
  }

 return ( szReturn == NULL ? szNullStr : szReturn
);
}

WORD GetCurrHostVersionNum( void )
{
 int iHostIdx;
 BYTE nMinorVersion,
 BYTE nMajorVersion;

 if ( iHLStatus != SMI_AVAILABLE ||
HostListEntries.iNumEntries
== 0 )
   return ( 0 );

 if ( iLBCurrHost > 0 )
   iHostIdx = GetHostIdx( SUI_LBCURRENTRY );
 else
   return ( 0 );

 nMinorVersion = HostListEntries.aHostListBuff[
iHostIdx
].HostDataBuff.nMinorVersion;
 nMajorVersion = HostListEntries.aHostListBuff[
iHostIdx
].HostDataBuff.nMajorVersion;

 return ( MAKEWORD( nMinorVersion,
nMajorVersion ) );
}

BOOL IsPWRequired( void )
{
 BOOL fReturn = FALSE;

 if ( GetCurrActionCode() ==
SUI_LASTCONNECTION )
   return ( UIConfigData.bLastConnPassword );

 if ( iHLStatus != SMI_AVAILABLE ||
HostListEntries.iNumEntries
== 0 )
   return ( FALSE );

 if ( iLBCurrHost > 0 )
   fReturn = HostListEntries.aHostListBuff[
GetHostIdx(
SUI_LBCURRENTRY ) ].HostDataBuff.
          bPasswordProtect;

 return ( fReturn );
}

int GetNumHostEntries( void )
{
 int iNextGroupIdx;

 if ( iHLStatus != SMI_AVAILABLE )
   return ( ERR_INTERNAL );

 if ( ( iNextGroupIdx = GetGroupIdx( iLBCurrGroup
+ 1 ) ) >= 0 )
   return ( iNextGroupIdx - iCurrGroupIdx );
 else
   return ( HostListEntries.iNumEntries -
iCurrGroupIdx );
}

int GetNumGroupEntries( void )
{
 if ( iHLStatus != SMI_AVAILABLE )
   return ( ERR_INTERNAL );

 return ( iNumGroups );
}

int GetGroupIdx( int iGroupNum )
{
 LONG lGroupIdx;

 lGroupIdx = GetEntryOffset(
HostListEntries.iNumEntries,
          sizeof ( HOSTLISTBUFF ),
SCS_MAXLENNODEADD,
          iGroupNum, ( NPSTR
)HostListEntries.aHostListBuff );

 if ( lGroupIdx >= 0 )
   return ( ( int )lGroupIdx / sizeof (
HOSTLISTBUFF ) ),
 else
   return ( ERR_INTERNAL );
}

int GetGroupNum( int iHostIdx )
{
 LONG lLowGroupIdx = 0L;
 LONG lHighGroupIdx = 0L;
 int iGroupNum;

 for ( iGroupNum = 1; lHighGroupIdx >= 0;
++iGroupNum )
 {
   lLowGroupIdx = lHighGroupIdx;
   lHighGroupIdx = GetEntryOffset(
HostListEntries.iNumEntries,
                    sizeof ( HOSTLISTBUFF
),
SCS_MAXLENNODEADD,
                    iGroupNum, ( NPSTR
)HostListEntries.aHostListBuff );
   lHighGroupIdx /= sizeof ( HOSTLISTBUFF );



   if ( ( LONG )iHostIdx >= lLowGroupIdx && (
LONG )iHostIdx <=
lHighGroupIdx )
     return ( iGroupNum );
 }

 return ( HLD_NOTINGROUP );
}

int GetHostIdx( int iHostNum )
{
 int iUseHost;
 int iHostIdx;

 iUseHost = ( iHostNum == SUI_LBCURRENTRY ?
iLBCurrHost
lHostNum );
 iHostIdx = iCurrGroupIdx + ( iUseHost - 1 );

 return ( iHostIdx );
}

int SortGroupHost( void )
{
 int iGroupNum;
 int iSortStatus:

 iSortStatus =
   SortList( HostListEntries.iNumEntries, sizeof (
HOSTLISTBUFF
),
          SCS_OFFGROUPKEY,
SCS_OFFHOSTKEY,
          ( NPSTR )HostListEntries.aHostListBuff );

 if ( iSortStatus == ERR_SUCCESS )
 {
   for ( iNumGroups = 0, iGroupNum = 1;
iGroupNum <=
HostListEntries.iNumEntries;
       ++iGroupNum )
   {
     if ( GetGroupIdx( iGroupNum ) >= 0 )
       iNumGroups++;
   }
 }

 return ( iSortStatus );
}

int SortSerialNums( void )
{
 int iEntryIdx:

 if ( HostListEntries.aHostListBuff == NULL ||
HostListEntries.iNumEntries <= 0 )
   return ( ERR_INTERNAL );

 for ( iEntryIdx = 0; iEntryIdx <
HostListEntries.iNumEntries;
++iEntryIdx )
   HostListEntries.aHostListBuff[ iEntryIdx ].
     HostDataBuff.sHostSerial[
SCS_MAXLENSERIALNUM - 1 ] = 0;

 return ( SortList( HostListEntries.iNumEntries,
sizeof (
HOSTLISTBUFF ),
        SCS_OFFSERIALNUM, NULL, ( NPSTR
)HostListEntries.aHostListBuff ) );
}

int ValidateSerialNums( void )
{
 int iEntryIdx, iNextEntryIdx,
 int iSerialStatus = HLD_VALIDSERIALS;

 szSerialDup[0] = '\0';

 if ( SortSerialNums() != ERR_SUCCESS )
   return ( FALSE );

 for ( iEntryIdx = 0; iEntryIdx <
HostListEntries.iNumEntries;
++iEntryIdx )
 {
   if ( IsZeroString( HostListEntries.aHostListBuff[
iEntryIdx
].
                HostDataBuff.sHostSerial ) )
     iSerialStatus = HLD_INVALIDSERIALS;
   else
   {
     if ( ( iNextEntryIdx = iEntryIdx + 1 ) <
HostListEntries.iNumEntries )
     {
       if ( !strcmp( HostListEntries.aHostListBuff[
iEntryIdx
].HostDataBuff.sHostSerial,
                HostListEntries.aHostListBuff[
iNextEntryIdx ].
                HostDataBuff.sHostSerial ) )
         iSerialStatus = HLD_DUPLICATESERIALS;
     }
   }

   if ( iSerialStatus != HLD_VALIDSERIALS )

   {
     strcpy( szSerialDup,
HostListEntries.aHostListBuff[
iEntryIdx ].
                HostDataBuff.sHostSerial );
     break;
   }
 }

 return ( iSerialStatus );
}

int RequestHostList( void )
{
 SetRequestHostList( TRUE );

 if ( !GetSCSActiveStatus() )
   return ( ERR_INTERNAL );

 if ( ( AllocHLMem( &HostListEntries,
HLD_MAXNUMHOSTENTRIES ) )
!= ERR_SUCCESS )
   return ( ERR_OUTOFMEM );

 if ( ( AllocHLMem( &BroadcastHLEntries,
HLD_MAXNUMHOSTENTRIES )
) != ERR_SUCCESS )
   return ( ERR_OUTOFMEM );

 HostListEntries.iNumEntries = 0;
 iLBCurrHost = iLBCurrGroup  = 0;

 if ( ( SendRequestHostList() == ERR_SUCCESS )
&&
     ( ( iWaitForHLThreadIdx =
GetTempEventNum() ) >= 0 ) )
 {
   AddThread( iWaitForHLThreadIdx, WaitForHLD.
NULL,
SMD_MANYTIMES, FALSE,
          HLD_POLLFREQ, HLD_MAXRETRIES );

   SetStatusHLInMem( SMI_INPROGRESS );
 }
 else
 {
   FreeHLMem( &HostListEntries );
   FreeHLMem( &BroadcastHLEntries );
   SetStatusHLInMem( SMI_AVAILABLE );
   return ( ERR_INTERNAL );
 }

 return ( ERR_SUCCESS );
}

void WaitForHLD( void )
{
 int iNumEntries;
 int iSerialStatus;
 LONG lGroupHostNums;
 int iHostConnectIdx;

 CancelRequestHostList(),
```

```
  if ( ( iNumEntries = *( int *
)BroadcastHLEntries.aHostListBuff
) > 0 )
 {
   BroadcastHLEntries.iNumEntries = iNumEntries;

   mem_mv( ( PVOID )( ( BYTE * )(
BroadcastHLEntries.aHostListBuff ) +
SCS_HOSTLISTNUMOFFSET ),
        ( PVOID )(
BroadcastHLEntries.aHostListBuff ),
iNumEntries *
        sizeof ( HOSTLISTBUFF ) + sizeof ( int ) );

   SaveNewHosts();
 }

 if ( GetRetryLimit( iWaitForHLThreadidx ) > 0 &&
SendRequestHostList() == ERR_SUCCESS )
 {
   SetStatusHLInMem( SMI_INPROGRESS );
 }
 else
 {
   DelThread( iWaitForHLThreadIdx );

   if ( HostListEntries.iNumEntries > 0 )
   {
    AllocHLMem( &HostListEntries,
HostListEntries.iNumEntries
);

    if ( ( iSerialStatus = ValidateSerialNums() ) !=
HLD_VALIDSERIALS )
    {
     if ( iSerialStatus == HLD_INVALIDSERIALS )
      OpenMessageBox(
STR_HLDINVSERIALNUMS, 0,
SUI_LEFTJUSTIFIED, SUI_OK );
     else
      OpenMessageBox(
STR_HLDDUPSERIALNUMS, 0,
SUI_LEFTJUSTIFIED, SUI_OK );
    }

    SortGroupHost()

    If ( GetSCSCallProgress() !=
SMI_SCSDISCONNECTED )
    {
     if ( ( iHostConnectIdx = FindNodeAddress(
&HostListEntries.

UIConfigData.szLastNodeAddress )
) != FNA_NOTFOUND )
      HostListEntries.aHostListBuff[
iHostConnectIdx ].
                HostDataBuff.nHostStatus =
SCS_HOSTAVAILABLE;
    }

    if ( ( lGroupHostNums = FindFirstAvailHost(
&HostListEntries ) ) != HLD_NOHOSTAVAIL )
    {
     iLBCurrGroup = HIWORD( lGroupHostNums );
     iLBCurrHost = LOWORD( lGroupHostNums );
    }
    else
    {
     iLBCurrGroup = iNumGroups > 0 ? 1 : 0;
     iLBCurrHost = 0;
    }
   }
   else
   {
    FreeHLMem( &HostListEntries );
    iLBCurrGroup = 0;
    iLBCurrHost = 0;
   }

   FreeHLMem( &BroadcastHLEntries );

   SetStatusHLInMem( SMI_AVAILABLE );
   SetRequestHostList( FALSE );
 }
}

int SendRequestHostList( void )
{
 WORD wSeg, wOff, wReturn;

 wSeg = SEG( BroadcastHLEntries.aHostListBuff );
 wOff = OFF( BroadcastHLEntries.aHostListBuff );

 _asm
 {
  push dx
  push di
  push bx
  mov ax, SCS_REQUESTHOSTLIST
  mov dx, wSeg
  mov di, wOff
  mov bx, HLD_MAXNUMHOSTENTRIES

  int SCS_INTNUM

  pop bx
  pop di
  pop dx

  mov wReturn, ax
 }

 if ( wReturn == SCS_ACCEPTED )
  return ( ERR_SUCCESS );
 else
  return ( ERR_INTERNAL );
}

int CancelRequestHostList( void )
{
 _asm
 {
  mov ax, SCS_CANCELREQHOSTLIST
  int SCS_INTNUM
 }

 return ( ERR_SUCCESS );
}

int SaveNewHosts( void )
{
 int iBCHostIdx.

 for ( iBCHostIdx = 0; iBCHostIdx <
BroadcastHLEntries.iNumEntries; ++iBCHostIdx )
 {
  if ( FindNodeAddress( &HostListEntries,
      BroadcastHLEntries.aHostListBuff[
iBCHostIdx
].szNodeAddress ) == FNA_NOTFOUND )
   {
    HostListEntries.aHostListBuff[
HostListEntries.iNumEntries++ ] =
      BroadcastHLEntries.aHostListBuff[ iBCHostIdx
];
   }
 }

 return ( ERR_SUCCESS );
}

int FindNodeAddress( HOSTLISTENTRIES
*pHostListEntries, char
*szKeyNodeAddress )
{
 int iHostIdx;
 int iMaxHostIdx = pHostListEntries->iNumEntries;

 for ( iHostIdx = 0; iHostIdx < iMaxHostIdx;
++iHostIdx )
 {
  if ( strcmp( pHostListEntries->aHostListBuff[
iHostIdx
].szNodeAddress,
          szKeyNodeAddress ) == 0 )
    return ( iHostIdx );
 }

 return ( FNA_NOTFOUND );
}

LONG FindFirstAvailHost( HOSTLISTENTRIES
*pHostListEntries )
{
 int iHostIdx;
 int iGroupNum, iHostNum;
 int iMaxHostIdx = pHostListEntries->iNumEntries;

 for ( iHostIdx = 0; iHostIdx < iMaxHostIdx;
++iHostIdx )
 {
  if ( pHostListEntries->aHostListBuff[ iHostIdx
].HostDataBuff.nHostStatus ==
      SCS_HOSTAVAILABLE )
   {
    iGroupNum = GetGroupNum( iHostIdx );
    iHostNum = ( iHostIdx - GetGroupIdx(
iGroupNum ) ) + 1;
    return ( MAKELONG( iHostNum, iGroupNum ) );

   }
 }

 return ( ( LONG )HLD_NOHOSTAVAIL );
}

int AllocHLMem( HOSTLISTENTRIES
*pHostListEntries, int
iNumEntries )
{

 if ( pHostListEntries->aHostListBuff == NULL )
 {
  if ( ( pHostListEntries->aHostListBuff = (
HOSTLISTBUFF *
)malloc(
       iNumEntries * sizeof ( HOSTLISTBUFF ) +
sizeof ( int )
) ) == NULL )
   {
    TRACE( "ERROR: malloc failed in
AllocHLMem()\r" );
    return ( ERR_INTERNAL );
   }
   else
    fil_chr( ( PVOID
)pHostListEntries->aHostListBuff, 0,
iNumEntries *
         sizeof ( HOSTDATABUFF ) + sizeof ( int
) );
 }
 else
 {
 }

 pHostListEntries->iNumEntries = iNumEntries;

 return ( ERR_SUCCESS );
}

int GetStatusHLInMem( void )
{
 if ( GetCurrActionCode() ==
SUI_LASTCONNECTION )
  return ( SMI_AVAILABLE );
 else
  return ( iHLStatus );
}

void SetStatusHLInMem( int iNewHostListStatus )
{
 if ( ( iHLStatus = iNewHostListStatus ) ==
SMI_INPROGRESS )
  SetWaitingIcon( SBS_WAITINGICONON, TRUE
);
 else
  SetWaitingIcon( SBS_WAITINGICONOFF, TRUE
),
}

void FreeHLMem( HOSTLISTENTRIES
*pHostListEntries )
{
 if ( pHostListEntries->aHostListBuff != NULL )
 {
  free( pHostListEntries->aHostListBuff );
  pHostListEntries->aHostListBuff = NULL;
 }
}

void FreeAllHLMem( void )
{
 FreeHLMem( &HostListEntries );
 FreeHLMem( &BroadcastHLEntries );
}

BOOL IsZeroString( char szString[] )
{
 int iStrIdx;
 int iStrLen;

 for ( iStrIdx = 0, iStrLen = strlen( szString );
    iStrIdx < iStrLen; ++iStrIdx )
  if ( szString[ iStrIdx ] != '0' )
   return ( FALSE );

 return ( TRUE );
}

#if defined( _MSC_VER  )
#pragma warning( default : 4704 )
#endif
```

Copr. 1995 Zenith Data Systems Corp.

```
#include "cr.h"
#include "spawn.h"
#include "k2.h"
#include "sio.h"
#include "sm.h"

#if defined( _MSC_VER  )
#pragma warning( disable : 4704 )
#endif

#define STK_SZ (5000)

word isr_stk[STK_SZ+1];


extern char sms[];
extern char attrc[],attrm[];
extern char already[];
extern char unloaddone[];
extern char unloadnot[];
extern word init_data_end;

extern BOOL fNetware;



main()
{
 int i;

 chk_video();
 get_crs();
 crs_x = bcrs_x;
 crs_y = bcrs_y;
 mv_crs();

 if ( second_load() )
 {
  i = str_pos( '-', cmd_line );
  if ( i && ( ( cmd_line[i] | 0x20 ) == 'u' ) )
  {
   if( remove_tsr() )
   {
    ShutDownDispatcher();
    dspf( unloaddone );
   }
   else
    dspf( unloadnot ),
  }
  else
   dspf( already );

  mv_crs();

  return( 1 );
 }


 sprintf( szTempStr, sms, szSMVersionName );
 dspf( szTempStr );

 get_crs(),
 crs_x = bcrs_x;
 crs_y = bcrs_y + 3;
 mv_crs();



 DEBUG_BREAK;

 InitUIConfigData();
 InitSaratoga( SBS_DRIVERSLOADING );
 InitDispatcher();

 malloc_on( SHC_MAXLENHEAP );
 idata_end=&init_data_end;
 icode_beg=main;
 stay_resident(isr_stk,STK_SZ*2);



 install_tsc( ( fp )ClockTick, 3500,
       SMD_SCHEDULERS | SMD_HOTKEYS |

       SMD_FARCALLS |
SMD_GENERALTRAPS | SMD_COMMSVCS |
SMD_INTSSVCS | SMD_MOUSEKWATCH );

 install_trap( ( fp )TrapService, 2500,
SMD_FULLREENTER );
 install_fcall( ( fp )FCallService, 4000,
SMD_FULLREENTER, 0,
szNullStr, 0 );

 add_tsc_event( SMD_DISPATFREQ );

 return ( 0 );
}

#if defined( _MSC_VER  )
#pragma warning( default : 4704 )
#endif
```

Copr. 1995 Zenith Data Systems Corp.

```
#include "cr.h"
#include "spawn.h"
#include "k2.h"
#include "sm.h"

#if !defined( NDEBUG )
WORD aHotKeys[] = { SMI_SF1, SMI_SF2,
SMI_SF3, SMI_SF4, SMI_SF5,
SMI_SF6
                    SMI_SF7, SMI_SF8, SMI_SF9,
SMI_SF10,
SMI_SALTQ, 0 };
#endif


char attrc[]={0x17,0x1E,0x13,0x1F,0x1B,0xA};
char attrm[]={0x07,0x0F,0x07,0x07,0x07,0xF};


char sms[] =
  "\mSaratoga Manager, (C) Copyright 1994,1995,
Zenith Data
Systems\m"
  "Mobile Systems Engineering, Version %s\m";

char already[] =
  "ERROR: SM already present.\m"
  "Enter SM -U to unload.\m";

char unloaddone[]="SM has been removed from
memory.";
char unloadnot[]="ERROR: SM could not be
removed from memory.";

char _tsr_name[]="Saratoga Manager (C) 1994-1995
ZDS";


struct cfg_rec config_block = {
    sizeof(config_block),
    'S','M','A','N',
    MAKEWORD( GEN_SMMINORVERSIONNUM,
GEN_SMMAJORVERSIONNUM ),
    };



#if !defined( NDEBUG )


fp
install_list[]={install_tsc,install_trap,install_hk,install_f
call
};

#else
fp
install_list[]={install_tsc,install_trap,install_dos_rdy,in
stall_
fcall};
#endif


word init_data_end=1;


Copr. 1995 Zenith Data Systems Corp.
#include "cr.h"
#include "k2.h"
#include "spawn.h"
#include "hm.h"
#include "sio.h"
#include "sm.h"

#if defined( _MSC_VER   )
#pragma warning( disable : 4704 )
#endif

static OCCLUDEUNION HostOcc;
static OCCLUDEUNION OldHostOcc = { -1, -1, -1,
-1 };
static OCCLUDEUNION *pSetOccData;
static int          iSetOccType;
static BYTE         fSCOSNotified;
static BYTE         fRepaintRequired = FALSE;
static char         nOccDefineAcked = PMI_NOACK;
static char         nOccCloseAcked = PMI_NOACK;
static int          iHostOccludeIdx =
SMD_NOACTIVETHREAD;
```

```
void SetSCOSNotified( BYTE fNewSCOSNotified )
{
  fSCOSNotified = fNewSCOSNotified;
}

void SetOccDefineAcked( char nOccDefineStatus )
{
  nOccDefineAcked = nOccDefineStatus;
}

char GetOccDefineAcked( void )
{
  return ( nOccDefineAcked );
}

void SetOccCloseAcked( char nOccCloseStatus )
{
  nOccCloseAcked = nOccCloseStatus;
}

char GetOccCloseAcked( void )
{
  return ( nOccCloseAcked );
}


int DrawSUIOSK( OCCLUDEUNION *NewOSKRect,
int iOccType )
{
  OCCLUDEUNION *OSKRect;
  int yDrawOSK, xDrawOSK;

  if ( NewOSKRect == NULL )
    OSKRect = &HostOcc;
  else
    OSKRect = NewOSKRect;

  switch ( iOccType )
  {
    case SUI_OCCRWIN:
      yDrawOSK = OSKRect->occRWin.yULWin;
      xDrawOSK = OSKRect->occRWin.xULWin;
      break;

    case SUI_OCCDOSTEXT:
      yDrawOSK = OSKRect->occText.yULRow *
SCS_OSKTEXTCHARHEIGHT;

      xDrawOSK = OSKRect->occText.xULCol *
SCS_OSKTEXTCHARWIDTH;
      break;

    case SUI_OCCDOSGRAPHICS:
      yDrawOSK = OSKRect->occDosGraph.yULDos
      xDrawOSK = OSKRect->occDosGraph.xULDos;
      break;

    default:
      TRACE( "ERROR: Invalid occlusion type
specified in
DrawSUIOSK()\r" );
      return ( ERR_INTERNAL );
  }

#if !defined( PROD )
  sprintf( szTempStr, "NOTICE: Request to draw
OSK at x:%d, y:%d,
sent to SUI\r",
          xDrawOSK, yDrawOSK );
  TRACE( szTempStr );
#endif

  AX( SUI_MOVEOSK );
  BX( yDrawOSK );
  CX( xDrawOSK );
  return ( ( *lpfnSUICallBack )() );
}

int CreateOccludedArea( OCCLUDEUNION
*OccMap, int iOccType, int
iNewCacheFreeMem )
{
  if ( !GetSCSActiveStatus() )
    return ( ERR_INTERNAL );

  if ( OldHostOcc.occRWin.xULWin == -1 &&
      OldHostOcc.occRWin.yULWin == -1 )
  {
    OldHostOcc.occRWin.xULWin =
UIConfigData.xPosLastOSKScreen;
    OldHostOcc.occRWin.yULWin =
UIConfigData.yPosLastOSKScreen;
  }

  switch ( iOccType )
  {
    case SUI_OCCRWIN:
      UIConfigData.xPosLastOSKScreen =
OccMap->occRWin.xULWin;
      UIConfigData.yPosLastOSKScreen =
OccMap->occRWin.yULWin;
      return ( SetWinHostOcclude(
&OccMap->occRWin ) );

    case SUI_OCCDOSTEXT:
      UIConfigData.xPosLastOSKScreen =
OccMap->occText.xULCol;
      UIConfigData.yPosLastOSKScreen =
OccMap->occText.yULRow;
      return ( SetDOSTextHostOcclude(
&OccMap->occText ) );

    case SUI_OCCDOSGRAPHICS:
      UIConfigData.xPosLastOSKScreen =
OccMap->occDosGraph.xULDos;
      UIConfigData.yPosLastOSKScreen =
OccMap->occDosGraph.yULDos;
      return ( SetDOSGraphHostOcclude(
&OccMap->occDosGraph ) );

    case SUI_NOOCCTYPE:
    default:
      TRACE( "ERROR: Invalid occlusion type
specified in
CreateOccludeArea()\r" );
      return ( ERR_INTERNAL );
  }
}


int SetWinHostOcclude( OCCLUDERWIN *OccRWIN
)
{
  if ( iHostOccludeIdx != SMD_NOACTIVETHREAD )

  {
    TRACE( "NOTICE: Attempt to reenter
SetWinHostOcclude() before
it is done, returning error\r" );
    return ( ERR_SUCCESS );
  }

  SetOccDefineAcked( PMI_NOACK );

  HostOcc.occRWin.xULWin = OccRWIN->xULWin;
  HostOcc.occRWin.yULWin = OccRWIN->yULWin;
  HostOcc.occRWin.xLRWin = ( OccRWIN->xLRWin
- OccRWIN->xULWin )
+ 1;
  HostOcc.occRWin.yLRWin = ( OccRWIN->yLRWin
- OccRWIN->yULWin )
+ 1;

#if !defined( PROD )
  sprintf( szTempStr, "\NOTICE: Occlusion Region
for Windows at
x:%d, y:%d, x:%d, y:%d\r",
          HostOcc.occRWin.xULWin,
HostOcc.occRWin.yULWin,
          HostOcc.occRWin.xLRWin,
HostOcc.occRWin.yLRWin );
  TRACE( szTempStr );
#endif

  if ( SendPrivateMessage( PMI_REQOCCDEFINE,
sizeof ( OCCLUDERWIN
),
                    ( char * )&HostOcc.occRWin ) !=
ERR_SUCCESS )
  {
    TRACE( "ERROR: PM for occlude region not
sent due to
SendPrivateMessage() error\r" );
    DrawSUIOSK( &OldHostOcc, SUI_OCCRWIN );
    return ( ERR_SUCCESS );
  }

  if ( ( iHostOccludeIdx = GetTempEventNum() ) < 0
)
  {
    TRACE( "ERROR: Out of temporary threads,
drawing OSK
anyway\r" );
    DrawSUIOSK( NULL, SUI_OCCRWIN );
    return ( ERR_INTERNAL );
  }

  AddThread( iHostOccludeIdx, ( NEARPROC
)WaitForDefineOcc, NULL
SMD_MANYTIMES, FALSE,
          SCS_WAITACKPOLLFREQ,
SCS_WAITACKMAXRETRY );

  return ( ERR_SUCCESS );
}
```

```
void WaitForDefineOcc( void )
{
  if ( GetOccDefineAcked() != PMI_NOACK )
  {
    DelThread( iHostOccludeIdx );

    if ( GetOccDefineAcked() == PMI_ACKEDTRUE )
    {
      TRACE( "NOTIFY: Message acknowledgement
detected, enable
SUI to begin OSK paint\r" );
      OldHostOcc = HostOcc;
      DrawSUIOSK( NULL, SUI_OCCRWIN );
    }
    else
    {
      TRACE( "ERROR: Message acknowledgement
detected, abort OSK
paint\r" );
      DrawSUIOSK( &OldHostOcc, SUI_OCCRWIN );

    }

    iHostOccludeIdx = SMD_NOACTIVETHREAD;

  }
  else if ( GetRetryLimit( iHostOccludeIdx ) == 0 )
  {
    TRACE( "ERROR: Timeout, define Occ message
acknowledgment not
received, allow draw anyway.\r" );
    DelThread( iHostOccludeIdx );
    iHostOccludeIdx = SMD_NOACTIVETHREAD;
    DrawSUIOSK( NULL, SUI_OCCRWIN );
    SetOccDefineAcked( PMI_ACKEDFALSE );
  }
}

int CloseHostOcclude( void )
{
  if ( iHostOccludeIdx != SMD_NOACTIVETHREAD )

  {
    TRACE( "NOTICE: Attempt to reenter
CloseHostOcclude() before
it is done, returning error\r" );
    return ( ERR_INTERNAL );
  }

  if ( GetCurrHostMode() == PND_DOSAPP )
  {
    TRACE( "NOTICE: Already at DOS not need to
close Windows
occlude\r" );
    return ( ERR_SUCCESS );
  }

  SetOccCloseAcked( PMI_NOACK );

  if ( !IsOSKUniClose( GetCurrScrCode() ) )
  {
    if ( SendPrivateMessage( PMI_REQOCCCLOSE,
0, NULL ) !=
ERR_SUCCESS )
    {
      TRACE( "ERROR: PM for closure of occlude
region not sent
due to SendPrivateMessage() error\r" );

      return ( ERR_SUCCESS );
    }

    if ( ( iHostOccludeIdx = GetTempEventNum() ) <
0 )
      return ( ERR_INTERNAL );

    AddThread( iHostOccludeIdx, ( NEARPROC
)WaitForCloseOcc,
NULL, SMD_MANYTIMES, FALSE,
            SCS_WAITACKPOLLFREQ,
SCS_WAITACKMAXRETRY );
  }
  else
  {
    TRACE( "NOTICE: Unilateral closure of Windows
OSK identified,
no PM sent\r" );
    SetFullRepaint( ERR_SUCCESS );
  }

  return ( ERR_SUCCESS );
}

void WaitForCloseOcc( void )
{
  if ( GetOccCloseAcked() != PMI_NOACK )
  {
    DelThread( iHostOccludeIdx );
```

```
  if ( GetOccCloseAcked() == PMI_ACKEDTRUE )
  {
    TRACE( "NOTIFY: Message acknowledgement
for close of OCC
detected\r" );
    SetFullRepaint( ERR_SUCCESS );
  }
  else
  {
    TRACE( "ERROR: Message acknowledgement
for close of OCC
detected, failed close\r" );
    SetFullRepaint( ERR_INTERNAL );
  }

  iHostOccludeldx = SMD_NOACTIVETHREAD;

 }
 else if ( GetRetryLimit( iHostOccludeIdx ) == 0 )
 {
  DelThread( iHostOccludeIdx );
  iHostOccludeIdx = SMD_NOACTIVETHREAD;

  TRACE( "ERROR: Close Occ acknowledgment
not received, set for
success anyway\r" );
  SetFullRepaint( ERR_SUCCESS );
 }
}



int SetDOSGraphHostOcclude(
OCCLUDEDOSGRAPHICS *OccDosGraphics )
{
 HostOcc = *( OCCLUDEUNION *
)OccDosGraphics;
 if ( !isOSKAsSetupDlg( GetCurrScrCode() ) )
 {
  TRACE( "NOTICE: Beginning immediate redraw
of DOS Graphics
OSK\r" );
  DrawSUIOSK( NULL, SUI_OCCDOSGRAPHICS
);

  TRACE( "NOTICE: Waiting for SUI video busy for
the DOS
Graphics OSK\r" );

  if ( SMVideoBusy( DoDOSGraphHostOcclude ) !=
ERR_SUCCESS )
   return ( ERR_INTERNAL );
 }
 else
 {
  TRACE( "NOTICE. OSK As Setup Dialog, no
SCOS calls, cleaning
screen.\r" );

  SetVideoMode( SUI_INITIALVIDMODE );
  DrawSUIOSK( NULL, SUI_OCCDOSGRAPHICS
);
 }
}

void DoDOSGraphHostOcclude( void )
{

#if !defined( PROD )
 sprintf( szTempStr, "NOTICE: Occlusion Region for
DOS Graphics
at x:%d, y:%d, x:%d, y:%d\r",
      HostOcc.occDosGraph.xULDos,
HostOcc.occDosGraph.yULDos,
      HostOcc.occDosGraph.xLRDos,
HostOcc.occDosGraph.yLRDos
);
 TRACE( szTempStr );
#endif

 SetSCSHostOcclude( &HostOcc,
SUI_OCCDOSGRAPHICS, TRUE );




}


int SetDOSTextHostOcclude( OCCLUDETEXT
*OccDosText )
{

 HostOcc.occText.yULRow =
OccDosText->yULRow /
SCS_OSKTEXTCHARHEIGHT;
 HostOcc.occText.xULCol = OccDosText->xULCol /
SCS_OSKTEXTCHARWIDTH;
 HostOcc.occText.yLRRow = ( (
OccDosText->yLRRow + 1 ) /
SCS_OSKTEXTCHARHEIGHT ) - 1;
 HostOcc.occText.xLRCol = ( (
OccDosText->xLRCol + 1 ) /
SCS_OSKTEXTCHARWIDTH ) - 1;

 *OccDosText = HostOcc.occText;

 TRACE( "NOTICE: Beginning immediate redraw of
DOS Text OSK\r"
);
 DrawSUIOSK( NULL, SUI_OCCDOSTEXT );

#if !defined( PROD )
 sprintf( szTempStr, "NOTICE: Occlusion Region for
DOS Text at
x:%d, y:%d, x:%d, y:%d\r",
      HostOcc.occText.xULCol,
HostOcc.occText.yULRow,
      HostOcc.occText.xLRCol,
HostOcc.occText.yLRRow );
 TI ACE( szTempStr );
#endif

 return ( SetSCSHostOcclude( &HostOcc,
SUI_OCCDOSTEXT, TRUE ) );
}


int SetSCSHostOcclude( OCCLUDEUNION *occ,
OCCTYPE iNewOccType,
BYTE fNewRepaintRequired )
{
 if ( iHostOccludeIdx != SMD_NOACTIVETHREAD )

 {
  TRACE( "NOTICE: Attempt to reenter
SetSCSHostOcclude() before
it is done, returning error\r" );
  return ( ERR_INTERNAL );
 }

 SetFullRepaint( ERR_INPROGRESS );

 pSetOccData = occ;
 iSetOccType = iNewOccType;
 fRepaintRequired = fNewRepaintRequired;

 if ( ( iHostOccludeIdx = GetTempEventNum() ) < 0
)
  return ( ERR_INTERNAL );

 AddThread( iHostOccludeIdx, ( NEARPROC
)DoSCSHostOcclude, NULL,
SMD_MANYTIMES, FALSE,
      SCS_DOHOSTOCCPOLLFREQ,
SCS_DOHOSTOCCMAXRETRY );

 return ( ERR_SUCCESS );
}

voi DoSCSHostOcclude( void )
{
 int iOccError;

 if ( ( iOccError = DefineSCSOcclude(
pSetOccData, iSetOccType,
fRepaintRequired ) ) != ERR_SUCCESS )
 {
  if ( iOccError != ERR_SCSBUSY )
  {
   SetFullRepaint( ERR_INTERNAL );
   DelThread( iHostOccludeIdx );
   iHostOccludeIdx = SMD_NOACTIVETHREAD;

   TRACE( "ERROR: Unrecoverable error occured
in the call to
DefineSCSOcclude()\r" );
  }
  else if ( GetRetryLimit( iHostOccludeIdx ) == 0 )
  {
   SetFullRepaint( ERR_INTERNAL );
   DelThread( iHostOccludeIdx );
   iHostOccludeIdx = SMD_NOACTIVETHREAD;

   TRACE( "ERROR: Exhausted the max number
of retries in
DefineSCSOcclude()\r" );
  }
 }
 else
 {
  SetFullRepaint( ERR_SUCCESS );
  DelThread( iHostOccludeIdx );
  iHostOccludeIdx = SMD_NOACTIVETHREAD;
  TRACE( "NOTICE: Success in calling
DefineSCSOcclude()\r" );
 }
}

#if defined( _MSC_VER  )
#pragma warning( default : 4704 )
#endif

Copr. 1995 Zenith Data Systems Corp.
#include "cr.h"
#include "sio.h"
#include "spawn.h"
#include "sm.h"

#if defined( _MSC_VER  )
#pragma warning( disable : 4704 )
#endif

static BYTE     bGearIdx = 0;
static int      iTempThreadIdx =
SMD_NOACTIVETHREAD;
static int      iSleepThreadIdx =
SMD_NOACTIVETHREAD;
static BOOL     fPNDActive = FALSE;
static PENCALIB  CurrPenCalib;
static ZDSTRAPREC PNDTrapRec;
static BYTE     nCurrPenButtonMode =
PND_LEFTMOUSE;
static BYTE     nCurrHostMode = PND_DOSAPP;
static BYTE     fSleepActive = FALSE;

static APIFUNC aAPIFuncTable[] =
{
 { SMI_PNDLOADING, PenDriverLoading },
 { 0, 0 },
};

APIFUNC *GetPNDFuncTable( void )
{
 return ( aAPIFuncTable );
}

BYTE GetCurrHostMode( void )
{
 BYTE nTmpHostMode;

 PCB_BEGINCRITICAL;

 nTmpHostMode = nCurrHostMode;

 PCB_ENDCRITICAL;

 return ( nTmpHostMode );
}

void CheckPenDriver( void )
{
 int iHotIcon;

 if ( GetConnectRequested() ||
GetRequestHostList() )
  return;

 if ( GetPNDActiveStatus() )
 {
  if ( ( iHotIcon = GetHotIcon() ) >= 0 )
  {
   ErrorBeep();

   switch( iHotIcon )
   {
    case PND_ICONSLEEP:
     ActivateSleepMode();
     break;

    case PND_ICONSETUP:
     LoadSUI( SUI_LASTSETUPDLGSCREEN, 0
);
     break;

    case PND_ICONOSK:
     if ( GetSCSCallProgress() ==
SMI_SCSCONNECTED )
      LoadSUI( SUI_LASTOSKSCREEN, 0 );
     break;

    case PND_ICONPALLETTE:
     RotatePallette();
     break;

    case PND_ICONSPEAKER:
     ToggleSpeaker();
     break;

    case PND_ICONLRMOUSE:
     if ( nCurrPenButtonMode ==
PND_LEFTMOUSE )
     {
      SetPenButtonMode( PND_RIGHTMOUSE );
      EnableRightMouseButton( FON );
     }
     else
     {
      SetPenButtonMode( PND_LEFTMOUSE );
      EnableRightMouseButton( FOFF );
     }
     break;

    case PND_ICONHOSTCTRLMODE:
     DoHostControlMode( TRUE );
     break;

    case PND_UDEF1:
    case PND_UDEF2:
     SendUDHotIcon( iHotIcon );
     break;
   }
  }
 }
}

void SetPNDActiveStatus( BOOL fPenDriverStat )
{
 fPNDActive = fPenDriverStat;
}

BOOL GetPNDActiveStatus( void )
{
 return ( fPNDActive );
}

APIFUNCRET PenDriverLoading( struct REGW
*CallerRegs )
{
 if ( ( iTempThreadIdx = GetTempEventNum() ) ==
-1 )
 {
  CallerRegs->ax = ( UINT )ERR_PNDINTERNAL;
  goto exit;
 }

 CurrPenCalib.wXUpperPenCalib =
UIConfigData.wXUpperPenCalib;
 CurrPenCalib.wYUpperPenCalib =
UIConfigData.wYUpperPenCalib;
 CurrPenCalib.wXLowerPenCalib =
UIConfigData.wXLowerPenCalib;
 CurrPenCalib.wYLowerPenCalib =
UIConfigData.wYLowerPenCalib;
 CurrPenCalib.wHITopMargin = PND_TOPMARGIN;
 CurrPenCalib.wHIRightMargin =
PND_RIGHTMARGIN,
 CurrPenCalib.wHIVertSpace =
PND_VERTSPACING;
 CurrPenCalib.wHIXWidth = PND_WIDTH;
 CurrPenCalib.wHIYHeight = PND_HEIGHT;

 sprintf( szTempStr, "NOTICE: Using Calibration:
%d,%d -
%d,%d\r", UIConfigData.wXUpperPenCalib,
      UIConfigData.wYUpperPenCalib,
UIConfigData.wXLowerPenCalib,
UIConfigData.wYLowerPenCalib );
 TRACE( szTempStr );

 CallerRegs->dx = HIWORD( ( ( DWORD )( (
PENCALIB FAR *
)&CurrPenCalib ) ) );
 CallerRegs->si = LOWORD( ( ( DWORD )( (
PENCALIB FAR *
)&CurrPenCalib ) ) );

 AddThread( iTempThreadIdx, InitPND, NULL,
SMD_ONETIME, FALSE
INI_POLLFREQ,
      0 );
exit:
 SetPNDActiveStatus( TRUE );
 SetForegroundRegs( CallerRegs );
}

void InitPND( void )
{
 #if !defined( NDEBUG )
 crs_x = 0;
 crs_y = 24;
 #endif

 DelThread( iTempThreadIdx );
 if ( SetDeviceMode( PND_MOUSEMODE ) != 0 )
  goto error;

 chk_video();

 if ( NotifyVideoMode( GetCurrVidMode() ) !=
ERR_SUCCESS )
  goto error;
```

```
 if ( nCurrPenButtonMode == PND_LEFTMOUSE )
   EnableRightMouseButton( FOFF );
 else
   EnableRightMouseButton( FON );


 goto success;

error:
 TRACE( "ERROR: Pen Driver initialization failed.\r"
);
 return;

success:
 TRACE( "NOTICE: Pen Driver successfully
initialized.\r" );
}

void InitPNDTrapRec( void )
{
 fil_chr( ( NPSTR )&PNDTrapRec, 0, sizeof(
ZDSTRAPREC ) );

 PNDTrapRec.tr.tr_int = SMI_PNDINTNUM;

 PNDTrapRec.tr.tr_asm_srv =
CRU_ONBUSYEITHER;

 strcpy( PNDTrapRec.szSMAfterSignature,
szSMSignature );
}

TRAPREC *GetPNDTrapRec( void )
{
 return ( &PNDTrapRec.tr );
}

int GetHotIcon( void )
{
 REG_W InRegs, OutRegs;

 if ( !GetPNDActiveStatus() )
   return ( PND_NOICON );

 fil_chr( ( NPSTR )&InRegs, 0, sizeof( REG_W ) );

 InRegs.ax = PND_GETDATA;
 InRegs.es = NULL;
 InRegs.dx = NULL;
 InRegs.cx = 0;

 intn( &InRegs, &OutRegs, PND_INTNUM );

 return ( OutRegs.bx );
}

int SetDeviceMode( int iPenMode )
{
 REG_W InRegs, OutRegs;

 if ( !GetPNDActiveStatus() )
   return ( ERR_INTERNAL );

 fil_chr( ( NPSTR )&InRegs, 0, sizeof( REG_W ) );

 InRegs.ax = PND_SETDEVICEMODE;
 InRegs.bx = iPenMode;

 intn( &InRegs, &OutRegs, PND_INTNUM );

 return ( ERR_SUCCESS );
}

int NotifyVideoMode( int iVideoMode )
{
 REG_W InRegs, OutRegs;

 if ( !GetPNDActiveStatus() )
   return ( ERR_INTERNAL );

 fil_chr( ( NPSTR )&InRegs, 0, sizeof( REG_W ) );

 InRegs.ax = PND_SETVIDEOMODE;
 InRegs.bx = iVideoMode;

 InRegs.si = GetXScreenRes( iVideoMode );
 InRegs.di = GetYScreenRes( iVideoMode );
 InRegs.cx = MAKEWORD( GetYCharRes(),
GetXCharRes() );

 intn( &InRegs, &OutRegs, PND_INTNUM );

 return ( ERR_SUCCESS );
}

int SetSetupDlgMode( int iDlgMode )
{
 REG_W InRegs, OutRegs;

 if ( !GetPNDActiveStatus() )
   return ( ERR_INTERNAL );

 fil_chr( ( NPSTR )&InRegs, 0, sizeof( REG_W ) );

 InRegs.ax = PND_SETUPDLGMODE;
 InRegs.bx = iDlgMode;

 intn( &InRegs, &OutRegs, PND_INTNUM );

 return ( ERR_SUCCESS );
}

int SetOSKMode( OCCLUDEUNION *OccArea,
OCCTYPE OccType )
{
 REG_W InRegs, OutRegs;

 if ( !GetPNDActiveStatus() )
   return ( -1 );

 fil_chr( ( NPSTR )&InRegs, 0, sizeof( REG_W ) );

 InRegs.ax = PND_OSKDIMEN;

 if ( OccArea == NULL )
   InRegs.bx = InRegs.cx = InRegs.dx = InRegs.si =
0;
 else
 {
   switch ( OccType )
   {
     case SUI_OCCDOSTEXT:

       InRegs.cx = OccArea->occText.yULRow *
SCS_OSKTEXTCHARHEIGHT;
       InRegs.bx = OccArea->occText.xULCol *
SCS_OSKTEXTCHARWIDTH;
       InRegs.si = OccArea->occText.yLRRow *
SCS_OSKTEXTCHARHEIGHT;
       InRegs.dx = OccArea->occText.xLRCol *
SCS_OSKTEXTCHARWIDTH;
       break;

     case SUI_OCCDOSGRAPHICS:
       InRegs.bx = OccArea->occDosGraph.xULDos;
       InRegs.cx = OccArea->occDosGraph.yULDos;
       InRegs.dx = OccArea->occDosGraph.xLRDos;
       InRegs.si = OccArea->occDosGraph.yLRDos;
       break;

     case SUI_OCCRWIN:
       InRegs.bx = OccArea->occRWin.xULWin;
       InRegs.cx = OccArea->occRWin.yULWin;
       InRegs.dx = OccArea->occRWin.xLRWin;
       InRegs.si = OccArea->occRWin.yLRWin;
       break;

     default:
       return ( ERR_INTERNAL );
   }
 }

 intn( &InRegs, &OutRegs, PND_INTNUM );

 return ( ERR_SUCCESS );
}

int SetPenButtonMode( BYTE nNewPenButtonMode
)
{
 REG_W InRegs, OutRegs;

 if ( !GetPNDActiveStatus() )
   return ( -1 );

 if ( nNewPenButtonMode != nCurrPenButtonMode )
 {
   fil_chr( ( NPSTR )&InRegs, 0, sizeof( REG_W ) );

   InRegs.ax = PND_SETMOUSEBUTTON;

   intn( &InRegs, &OutRegs, PND_INTNUM );

   nCurrPenButtonMode = nNewPenButtonMode;
 }

 return ( ERR_SUCCESS );
}

int SetHostMode( int iHostMode )
{
 REG_W InRegs, OutRegs;

 if ( !GetPNDActiveStatus() )
   return ( ERR_INTERNAL );

 fil_chr( ( NPSTR )&InRegs, 0, sizeof( REG_W ) );

 InRegs.ax = PND_HOSTMODE;
 InRegs.bx = iHostMode;

 intn( &InRegs, &OutRegs, PND_INTNUM );

 nCurrHostMode = LOBYTE( iHostMode );

 return ( ERR_SUCCESS );
}

int SetCalibMode( int iCalibMode, int xCalibPnt, int
yCalibPnt )
{
 REG_W InRegs, OutRegs;

 if ( !GetPNDActiveStatus() )
   return ( ERR_INTERNAL );

 fil_chr( ( NPSTR )&InRegs, 0, sizeof( REG_W ) );

 InRegs.ax = PND_SETCALIBMODE;
 InRegs.bx = iCalibMode;
 InRegs.cx = xCalibPnt;
 InRegs.dx = yCalibPnt;

 intn( &InRegs, &OutRegs, PND_INTNUM );

 return ( ERR_SUCCESS );
}

int GetCalibState( int iCalibMode, int *xUpperCol, int
*yUpperRow,
             int *xLowerCol, int *yLowerRow )
{
 REG_W InArgs, OutArgs;
 int iCalibDone;
 int iReturn;

 fil_chr( ( NPSTR )&InArgs, 0, sizeof ( InArgs ) );

 InArgs.ax = PND_GETCALIBSTAT;

 intn( &InArgs, &OutArgs, PND_INTNUM );

 if ( iCalibMode == PND_CALIBLR )
   iCalibDone = OutArgs.bx & PND_CALIBLRSTAT;
 else
   iCalibDone = OutArgs.bx & PND_CALIBULSTAT;

 if ( iCalibDone )
 {
   if ( OutArgs.bx & PND_CALIBVALID )
     iReturn = PND_CALIBDONEVALID
   else
     iReturn = PND_CALIBDONEINVALID;

   if ( iCalibMode == PND_CALIBLR )
   {
     *xUpperCol = OutArgs.cx;
     *yUpperRow = OutArgs.dx;
     *xLowerCol = OutArgs.si;
     *yLowerRow = OutArgs.di;
   }
 }
 else
   iReturn = PND_CALIBNOTDONE;

 return ( iReturn );
}

int EnableNewCalib( BOOL fEnableNewCalib )
{
 REG_W InArgs, OutArgs;

 fil_chr( ( NPSTR )&InArgs, 0, sizeof ( InArgs ) );

 InArgs.ax = PND_ENABLENEWCALIB;
 InArgs.bx = ( WORD )fEnableNewCalib;

 intn( &InArgs, &OutArgs, PND_INTNUM );

 return ( ERR_SUCCESS );
}

int ActivateSleepMode( void )
{
 if ( iSleepThreadIdx != SMD_NOACTIVETHREAD )
 {
   if ( GetSCSCallProgress() ==
SMI_SCSCONNECTED )
     DoHostControlMode( FALSE );
   else
     DoSuspend( TRUE );

   DelThread( iSleepThreadIdx );
   iSleepThreadIdx = SMD_NOACTIVETHREAD;
 }
 else
 {
   if ( ( iSleepThreadIdx = GetTempEventNum() ) ==
-1 )
     return ( ERR_INTERNAL );

   AddThread( iSleepThreadIdx, WaitForSleep,
NULL, SMD_ONETIME,
FALSE,
          PND_SLEEPPOLLFREQ, 0 );
 }

 return ( ERR_SUCCESS );
}

void WaitForSleep( void )
{
 if ( GetRetryLimit( iSleepThreadIdx ) == 0 )
 {
   DelThread( iSleepThreadIdx );
   iSleepThreadIdx = SMD_NOACTIVETHREAD;

   DoSleep();
 }
}


#if defined( _MSC_VER  )
#pragma warning( default : 4704 )
#endif


Copr. 1995 Zenith Data Systems Corp.

#include "cr.h"
#include "spawn.h"
#include "sio.h"
#include "sm.h"

#if defined( _MSC_VER  )
#pragma warning( disable : 4704 )
#endif

static PROXIMTRAPREC PRXTrapRec;
static PROXIMVARIABLES PRXVariables;
static PROXIMVERSIONINFO PRXVersionInfo;
static PRXCB lpfnPRXCallBack = NULL;
static int iConnStrengthThreadIdx =
SMD_NOACTIVETHREAD;
static int iPRXSetupThreadIdx =
SMD_NOACTIVETHREAD;
static int iCurrLinkQuality = PRX_NOLINKQUALITY;

static APIFUNC aAPIFuncTable[] =
{
 { SMI_PRXPOWERMANCB, RegisterPowerManCB
},
 { SMI_PRXUNLOADING, ProximDriverUnload },
 { SMI_PRXNETCONFIG, NetConfigData },
 { SMI_PRXXCHGREVINFO, XchgRevInfo },
 { 0, 0 }
};

APIFUNC *GetPRXFuncTable( void )
{
 return ( aAPIFuncTable );
}

BOOL GetPRXActiveStatus( void )
{
 return ( lpfnPRXCallBack != NULL );
}

void InitPRXTrapRec( void )
{
 fil_chr( ( NPSTR )&PRXTrapRec, 0, sizeof(
PROXIMTRAPREC ) );

 PRXTrapRec.tr.tr_int = SMI_PRXINTNUM;
 PRXTrapRec.tr.tr_asm_srv = CRU_REFLECTINT;


 mem_cp( SIG_RLNOEMSIGNATURE,
PRXTrapRec.szSMBeforeSignature,
       sizeof ( PRXTrapRec.szSMBeforeSignature )
);
}

TRAPREC *GetPRXTrapRec( void )
{
 return ( &PRXTrapRec.tr );
}

void CheckSystem( void )
{
 int iNewLinkQuality;

 if ( GetSuspendFlag() )
 {
   if ( GetSCSCallProgress() ==
SMI_SCSCONNECTED )
```

```
    DoHostControlMode( FALSE );
   else
    DoSuspend( TRUE );
 }

 if ( ( iNewLinkQuality = GetLinkQuality() ) !=
ERR_INTERNAL )
 {
  if ( iNewLinkQuality != iCurrLinkQuality )
  {
   switch( iNewLinkQuality )
   {
    case PRX_DISCONNECTED:
     SetTowerIcon( SBS_TOWERON,
SBS_WAVESOFF );
     break;

    case PRX_LOWQUALITY:
     SetTowerIcon( SBS_TOWERON,
SBS_WAVESHIGHBLINK );
     break;

    case PRX_HIGHQUALITY:
     SetTowerIcon( SBS_TOWERON,
SBS_WAVESON );
     break;
   }

   iCurrLinkQuality = iNewLinkQuality;
  }
 }
}


APIFUNCRET RegisterPowerManCB( struct REGW
*CallerRegs )
{
 lpfnPRXCallBack = MK_FP( CallerRegs->es,
CallerRegs->si );

 if ( ( iPRXSetupThreadIdx = GetTempEventNum() )
< 0 )
  return;

 AddThread( iPRXSetupThreadIdx,
WaitForPRXSetup, NULL,
SMD_ONETIME, FALSE,
        1, 0 );

 CallerRegs->ax = ( WORD )ERR_SUCCESS;

 SetForegroundRegs( CallerRegs );
}

void WaitForPRXSetup( void )
{
 PROXIMVARIABLES far *NewPRXVariables;
 WORD wSegNewVars;
 WORD wOffNewVars;
 int iSizeNewVariables = 0;

 DelThread( iPRXSetupThreadIdx );
 iPRXSetupThreadIdx = SMD_NOACTIVETHREAD;

 if ( lpfnPRXCallBack != NULL )
 {
  AX( PRX_CBPRXVARIABLES );
  ( *lpfnPRXCallBack )();

  _asm
  {
   or  ax,ax
   jnz error

   mov iSizeNewVariables, cx
   mov wSegNewVars, es
   mov wOffNewVars, si
 error:
  }

  if ( iSizeNewVariables > 0 )
  {
   NewPRXVariables = MK_FP( wSegNewVars,
wOffNewVars );

   if ( iSizeNewVariables <= sizeof ( PRXVariables
) )
    PRXVariables = *NewPRXVariables.
  }
 }
}

APIFUNCRET ProximDriverUnload( struct REGW
*CallerRegs )
{
 lpfnPRXCallBack = NULL;

 CallerRegs->ax = ERR_SUCCESS;

 SetForegroundRegs( CallerRegs );
}

APIFUNCRET NetConfigData( struct REGW
*CallerRegs )
{
 PROXIMNETCONFIGDATA far *pPRXNetConfig =
  ( PROXIMNETCONFIGDATA far * )MK_FP(
CallerRegs->es,
CallerRegs->si );

 if ( CallerRegs->cx <= sizeof (
PROXIMNETCONFIGDATA ) )
 {
  pPRXNetConfig->nDomainID =
UIConfigData.nDomainID;
  CallerRegs->ax = ERR_SUCCESS;
 }
 else
  CallerRegs->ax = ( WORD )ERR_INTERNAL;

 SetForegroundRegs( CallerRegs );
}

APIFUNCRET XchgRevInfo( struct REGW
*CallerRegs )
{
 PROXIMVERSIONINFO far *NewPRXVersionInfo;

 if ( CallerRegs->cx <= sizeof (
PROXIMVERSIONINFO ) )
 {
  NewPRXVersionInfo = MK_FP( CallerRegs->es.
CallerRegs->di );


  PRXVersionInfo.wMajorVersion =
GEN_SMMAJORVERSIONNUM;
  PRXVersionInfo.wMinorVersion =
GEN_SMMINORVERSIONNUM;
  PRXVersionInfo.lpszModuleName = ( LPSTR
)szSMModuleName;

  CallerRegs->es = SEG( &PRXVersionInfo );
  CallerRegs->si = OFF( &PRXVersionInfo ).

  ^: llerRegs->ax = ERR_SUCCESS;
 }
 else
  CallerRegs->ax = ( WORD )ERR_INTERNAL;

 SetForegroundRegs( CallerRegs );
}

int NotifySuspend( void )
{
 if ( lpfnPRXCallBack == NULL )
  return ( ERR_INTERNAL );

 AX( PRX_CBSUSPEND );
 return ( ( *lpfnPRXCallBack )() );
}

int NotifyResume( void )
{
 if ( lpfnPRXCallBack == NULL )
  return ( ERR_INTERNAL );

 AX( PRX_CBRESUME );
 return ( ( *lpfnPRXCallBack )() );
}

int SetSecurityID( char *szNewSecurityID )
{
 if ( lpfnPRXCallBack == NULL )
  return ( ERR_INTERNAL );

 _asm
 {
  mov  ax, PRX_CBSETSECUREID
  push ds
  pop  es
  mov  si, szNewSecurityID
 }

 return ( ( *lpfnPRXCallBack )() );
}

BOOL IsSynchronized( void )
{
 BOOL fNewSynchronizeFlag;

 if ( PRXVariables.lpszSynchronizeFlag == NULL )
  return ( ERR_INTERNAL );

 PCB_BEGINCRITICAL,
 fNewSynchronizeFlag = ( BOOL
)*PRXVariables.lpszSynchronizeFlag;
 PCB_ENDCRITICAL;

 return ( fNewSynchronizeFlag );
}

LPSTR GetRomVersion( void )
{
 LPSTR lpszNewRomVersion;

 if ( PRXVariables.lpszRomVersion == NULL )
  return ( NULL );

 PCB_BEGINCRITICAL;
 lpszNewRomVersion = ( LPSTR
)PRXVariables.lpszRomVersion;
 PCB_ENDCRITICAL;

 return ( lpszNewRomVersion );
}

int GetLinkQuality( void )
{
 int iNewLinkQuality;

 if ( PRXVariables.lpszLinkQuality == NULL )
  return ( ERR_INTERNAL );

 PCB_BEGINCRITICAL;
 iNewLinkQuality = ( int
)*PRXVariables.lpszLinkQuality;
 PCB_ENDCRITICAL,

 return ( iNewLinkQuality );
}

#if defined( _MSC_VER )
#pragma warning( default : 4704 )
#endif


Copr 1995 Zenith Data Systems Corp.

#include "cr.h"
#include "sio.h"
#include "k2.h"
#include "spawn.h"
#include "rparm.h"
#include "hm.h"
#include "sm.h"

#if defined( _MSC_VER )
#pragma warning( disable : 4704 )
#endif

static BYTE bGearIdx = 0;

static ZDSTRAPREC       SCSTrapRec,
static CALLREC          SCSRecvMsgRec;
static CALLREC          SCSEventLoopRec;
static BOOL             fSCSActive = FALSE;
static BOOL             fMonStatus = FALSE;
static BOOL             fLocalKbdStatus = FALSE;
static BOOL             fHostControlRequested =
FALSE;
static BOOL             fConnectRequested;
static BYTE             fSendPMRetryDone = FALSE;
static BYTE             fWaitVidUnblockActive =
FALSE;
static BYTE             fBadVideoMsgRecv = FALSE;

static BOOL             fUpdatingConnectStatus =
FALSE;

static int              iSetMonDone = FALSE;
static int              iSetMemDone = FALSE;
static int              iFullRepaintDone = FALSE;
static int              iFreeMemPercent = 0;
static BYTE             nOSKType;
static BYTE             fRepaintRequired = FALSE;
static CONNERROR        nConnectErrorCode =
SCS_NOCONNERROR;
static PRIVATEMSGBUFF   RecvPriMsgBuff;
static PRIVATEMSGBUFF   SendPriMsgBuff,
static SYSTEMSTATUSBUFF SystemStatusBuff:
static int              iSCOSErrNo;
static int              iTempThreadIdx;
static int              iSUIThreadIdx,
static int              iFileMemThreadIdx;
static int              iDiscoThreadIdx;
static int              iHostControlThreadIdx;
static int              iCancelConnectThreadIdx;
static int              iOkThreadIdx:
static int              iPMRetryThreadIdx =
SMD_NOACTIVETHREAD;
static int              iWaitVidUnblockThreadIdx =
SMD_NOACTIVETHREAD;
static FARCALLENTRY     lpfnFarCallEntry = NULL;

static char             *szHostFileName = NULL;

static APIFUNC aAPIFuncTable[]=
{
 { SMI_SCSLOADING, SCSLoading },
 { SMI_SLLOADSUI, SLLoadSUI },
 { SMI_SLENABLEKBD, SLEnableKbd },
 { SMI_SLGETFRAMETYPE, SLGetFrameType },
 { SMI_SLDEFINEOLDVIDVECTOR,
SLDefineOldVidVector },
 { SMI_SLGETMLIDSTATUS, SLGetMLIDStatus },
 { SMI_UNLOADOSK, UnloadOSK },
 { SMI_CHANGETOBADVIDEO,
ChangeToBadVideo }.
 { SMI_REQNOTIFYDOSWIN, NotifyDosWin },
 { SMI_REQUNIOCCCLOSE, NotifyUniOccClose },
 { SMI_ACKFLASHBREAK, AckFlashBreak },
 { SMI_ACKTOTALFILES, AckTotalFlashFiles },
 { SMI_ACKPATHASSTRING, AckPathFlashFile },
 { SMI_ACKACTIVEUPDATE, AckActiveUpdate },
 { SMI_ACKOCCDEFINE, AckOccDefine },
 { SMI_ACKOCCCLOSE, AckOccClose },
 { 0, 0 }
};

BOOL GetUpdatingConnectStatus( void )
{
 return ( fUpdatingConnectStatus );
}

void SetUpdatingConnectStatus( BOOL fNewStatus )
{
 fUpdatingConnectStatus = fNewStatus;
}

APIFUNC *GetSCSFuncTable( void )
{
 return ( aAPIFuncTable );
}

void SetSCSActiveStatus( BOOL fNewSCSActive )
{
 fSCSActive = fNewSCSActive;
}

BOOL GetSCSActiveStatus( void )
{
 return ( fSCSActive );
}

void SetConnectRequested( BOOL
fNewConnectRequested, BYTE
nUpdateIcon )
{
 if ( ( fConnectRequested = fNewConnectRequested
) ==
SCS_CONNECTREQUESTED )
 {
  if ( nUpdateIcon == SCS_UPDATEICON )
   SetWaitingIcon( SBS_WAITINGICONON, TRUE
);
 }
 else
 {
  if ( nUpdateIcon == SCS_UPDATEICON )
   SetWaitingIcon( SBS_WAITINGICONOFF,
TRUE );
 }
}

BOOL GetConnectRequested( void )
{
 return ( fConnectRequested );
}

NPSTR GetPrivateMsgBuff( int *iBuffLen )
{
 *iBuffLen = RecvPriMsgBuff.iBuffLen;

 return ( RecvPriMsgBuff.sMsgBuff );
}

char GetConnectErrCode( void )
{
 return ( nConnectErrorCode );
}

int GetSCOSErrNo( BYTE nClearError )
{
 int iNewSCOSErrNo = 0;

 PCB_BEGINCRITICAL;
 iNewSCOSErrNo = iSCOSErrNo;

 if ( nClearError == SCS_CLEARERROR )
  iSCOSErrNo = 0;

 PCB_ENDCRITICAL;

 return ( iNewSCOSErrNo );
}
```

```
void SetFullRepaint( int iNewFullRepaintDone )
{
 iFullRepaintDone = iNewFullRepaintDone;
}

void InitSCSTrapRec( void )
{
 fil_chr( ( NPSTR )&SCSTrapRec, 0, sizeof(
ZDSTRAPREC ) );

 SCSTrapRec.tr.tr_int = SMI_SCSINTNUM;
 SCSTrapRec.tr.tr_asm_srv = 2;

 strcpy( SCSTrapRec.szSMAfterSignature.
szSMSignature );
}

TRAPREC *GetSCSTrapRec( void )
{
 return ( &SCSTrapRec.tr );
}

void InitSCSCallRec( void )
{
 DWORD dwCallService = ( DWORD )( FARPROC
)SCSEventLoopService;

 fil_chr( ( NPSTR )&SCSEventLoopRec, 0 sizeof(
CALLREC ) ),

 SCSEventLoopRec.cFarCallOpCode = ( BYTE
)SMD_CALLOPCODE.
 SCSEventLoopRec.aCallBack[0] = LOBYTE(
LOWORD( dwCallService )
),
 SCSEventLoopRec.aCallBack[1] = HIBYTE(
LOWORD( dwCallService )
);
 SCSEventLoopRec.aCallBack[2] = LOBYTE(
HIWORD( dwCallService )
);
 SCSEventLoopRec.aCallBack[3] = HIBYTE(
HIWORD( dwCallService )
);
 SCSEventLoopRec.cFarRetOpCode = ( BYTE
)SMD_RETOPCODE;
 strcpy( SCSEventLoopRec.szSMAfterSignature,
SIG_SMSIGNATURE ),

 dwCallService = ( DWORD )( FARPROC
)SCSRecvMsgService,
 mem_cp( ( PVOID )&SCSEventLoopRec. ( PVOID
)&SCSRecvMsgRec,
sizeof ( CALLREC ) );
 SCSRecvMsgRec.aCallBack[0] = LOBYTE(
LOWORD( dwCallService ) );
 SCSRecvMsgRec.aCallBack[1] = HIBYTE(
LOWORD( dwCallService ) );
 SCSRecvMsgRec.aCallBack[2] = LOBYTE(
HIWORD( dwCallService ) );
 SCSRecvMsgRec.aCallBack[3] = HIBYTE(
HIWORD( dwCallService ) );
}

void FAR SCSEventLoopService( void )
{
 _asm
 {
  or   ah,ah
  jnz  process
  jmp  exit

process:
  cli

  push  ds
  push  ax
  push  bx
  push  cx
  push  dx
  push  si
  push  di
  mov   ds,cs:000Ah
 };

 PushEventNum( SMI_SCSEVENTNUM );
 lpfnFarCallEntry = MK_FP( _ccode, _fcall_entry );

 _asm
 {
  pop  di
  pop  si
  pop  dx
  pop  cx
  pop  bx
  pop  ax
  mov  al,ah
  xor  ah,ah
  add  ax, SMI_EVENTLOOPBASE

  sti

  call [lpfnFarCallEntry]

  pop  ds
 };

exit:
 return;
}

void FAR SCSRecvMsgService( void )
{
 _asm
 {
  cli

  push  ds
  push  ax
  push  bx
  push  cx
  push  dx
  push  si
  push  di
  mov   ds,cs:000Ah
 };

 PushEventNum( SMI_SCSEVENTNUM );
 lpfnFarCallEntry = MK_FP( _ccode, _fcall_entry );

 _asm
 {
  pop  di
  pop  si
  pop  dx
  pop  cx
  pop  bx
  pop  ax

  push dx
  pop  ds
  mov  ax, [di]
  add  ax. SMI_PRIMSGBASE

  mov  ds,cs:000Ah


  sti

  call [lpfnFarCallEntry]

  pop  ds
 };
}

APIFUNCRET SCSLoading( struct REGW
*CallerRegs )
{
 CallerRegs->ax = 0x0001,

 CallerRegs->bx = SEG( &SCSRecvMsgRec );
 CallerRegs->si = OFF( &SCSRecvMsgRec );
 CallerRegs->dx = SEG( &SCSEventLoopRec );
 CallerRegs->di = OFF( &SCSEventLoopRec );

 CallerRegs->cx = SMD_DISPATFREQ;

 SetForegroundRegs( CallerRegs )

 if ( ( iTempThreadIdx = GetTempEventNum() ) < 0
)
   return;

 AddThread( iTempThreadIdx, ( NEARPROC
)SetupSCOS, NULL,
SMD_ONETIME, FALSE,
        SCS_LOADSCSPOLLFREQ, 0 );
}

APIFUNCRET UnloadOSK( struct REGW
*CallerRegs )
{
 int iCurrScrCode = GetCurrScrCode();

 if ( GetSUIReady() && IsOSK( iCurrScrCode ) )
 {
   SetCurrScrCode( iCurrScrCode |
SUI_OSKVIDCHANGEMASK );
   UnloadSUI( SUI_NOUNLOADSUI );
 }
}

APIFUNCRET ChangeToBadVideo( struct REGW
*CallerRegs )
{
 if ( GetSCSCallProgress() ==
SMI_SCSCONNECTED )
 {
   fBadVideoMsgRecv = TRUE:
   DiscoDisableConnection();
 }
}

APIFUNCRET NotifyDosWin( struct REGW
*CallerRegs )
{
 int iMsgStatus,

 PCB_BEGINCRITICAL

 if ( ( iMsgStatus = PrepPrivateMessage(
CallerRegs ) ) ==
ERR_SUCCESS )
   SetHostMode( ( int )*RecvPriMsgBuff.sMsgBuff );

 PCB_ENDCRITICAL

 if ( iMsgStatus == ERR_SUCCESS )
   SendPrivateMessage(
PMI_ACKNOTIFYDOSWIN, 0, NULL );

 SetForegroundRegs( CallerRegs );
}

APIFUNCRET NotifyUniOccClose( struct REGW
*CallerRegs )
{
 int iMsgStatus,

 PCB_BEGINCRITICAL

 iMsgStatus = PrepPrivateMessage( CallerRegs );

 PCB_ENDCRITICAL

 if ( iMsgStatus == ERR_SUCCESS )
 {
   TRACE( "NOTICE: Received UNI close PM,
closing OSK\r" );
   SendPrivateMessage( PMI_ACKUNIOCCCLOSE.
0, NULL );

   if ( IsOSK( GetCurrScrCode() ) )
   {
     SetCurrScrCode( GetCurrScrCode() |
SUI_OSKUNICLOSEMASK );
     UnloadSUI( SUI_NOUNLOADSUI );
   }
 }

 SetForegroundRegs( CallerRegs );
}

APIFUNCRET AckFlashBreak( struct REGW
*CallerRegs )
{
 PCB_BEGINCRITICAL

 if ( PrepPrivateMessage( CallerRegs ) ==
ERR_SUCCESS )
   SetTmpFilePercent( *( int *
)RecvPriMsgBuff.sMsgBuff );

 PCB_ENDCRITICAL

 SetForegroundRegs( CallerRegs );
}

APIFUNCRET AckTotalFlashFiles( struct REGW
*CallerRegs )
{
 PCB_BEGINCRITICAL

 if ( PrepPrivateMessage( CallerRegs ) ==
ERR_SUCCESS )
   SetTotalFlashFiles( *( int *
)RecvPriMsgBuff.sMsgBuff );

 PCB_ENDCRITICAL

 SetForegroundRegs( CallerRegs );
}

APIFUNCRET AckPathFlashFile( struct REGW
*CallerRegs )
{
 PCB_BEGINCRITICAL

 if ( PrepPrivateMessage( CallerRegs ) ==
ERR_SUCCESS )
   SetPathFlashFile( ( LPSTR
)RecvPriMsgBuff.sMsgBuff );

 PCB_ENDCRITICAL

 SetForegroundRegs( CallerRegs );
}

APIFUNCRET AckActiveUpdate( struct REGW
*CallerRegs )
{
 PCB_BEGINCRITICAL

 if ( PrepPrivateMessage( CallerRegs ) ==
ERR_SUCCESS )
 {
   if ( RecvPriMsgBuff.iBuffLen > 1 )
     SetNameActiveUpdate( ( LPSTR
)RecvPriMsgBuff.sMsgBuff );
   else
     SetNameActiveUpdate( ( LPSTR )NULL );
 }

 PCB_ENDCRITICAL

 SetForegroundRegs( CallerRegs );
}

APIFUNCRET AckOccDefine( struct REGW
*CallerRegs )
{
 PCB_BEGINCRITICAL

 if ( PrepPrivateMessage( CallerRegs ) ==
ERR_SUCCESS )
 {
   if ( RecvPriMsgBuff.iBuffLen > 1 )
   {
     if ( LOBYTE( *( int * )RecvPriMsgBuff.sMsgBuff
) == TRUE )
       SetOccDefineAcked( PMI_ACKEDTRUE );
     else
       SetOccDefineAcked( PMI_ACKEDFALSE );
   }
   else
     SetOccDefineAcked( PMI_ACKEDFALSE );
 }

 PCB_ENDCRITICAL

 SetForegroundRegs( CallerRegs );
}

APIFUNCRET AckOccClose( struct REGW
*CallerRegs )
{
 PCB_BEGINCRITICAL

 if ( PrepPrivateMessage( CallerRegs ) ==
ERR_SUCCESS )
 {
   if ( RecvPriMsgBuff.iBuffLen > 1 )
   {
     if ( LOBYTE( *( int * )RecvPriMsgBuff.sMsgBuff
) == TRUE )
       SetOccCloseAcked( PMI_ACKEDTRUE );
     else
       SetOccCloseAcked( PMI_ACKEDFALSE );
   }
   else
     SetOccCloseAcked( PMI_ACKEDFALSE );
 }

 PCB_ENDCRITICAL

 SetForegroundRegs( CallerRegs );
}


int PrepPrivateMessage( struct REGW *CallerRegs )
{
 int iReturn;
 LPSTR lpsRecvMsg = ( LPSTR )MAKELONG(
CallerRegs->di,
CallerRegs->dx );

 fil_chr( ( PVOID )&RecvPriMsgBuff, 0, sizeof(
RecvPriMsgBuff )
);

 if ( lpsRecvMsg != NULL && CallerRegs->bx <
SCS_MAXLENMSGBUFF )
 {
   fmem_cp( ( LPSTR )lpsRecvMsg, ( LPSTR
)&RecvPriMsgBuff.iMsgID, CallerRegs->bx );
   CallerRegs->ax = 1;
   iReturn = 0;

#if !defined( PROD )
   sprintf( szTempStr, "NOTICE: Received Private
Message
#:%d\r", RecvPriMsgBuff.iMsgID );
   TRACE( szTempStr );
   sprintf( szTempStr, "NOTICE: First byte of the
Private
Message: %d\r", *RecvPriMsgBuff.sMsgBuff );
   TRACE( szTempStr );
```

```
#endif
 }
 else
 {
  CallerRegs->ax = 0;
  iReturn = ERR_INTERNAL;
 }

 return ( iReturn );

}

void SetupSCOS( void )
{
 REG_W InArgs, OutArgs;

 if ( iTempThreadIdx >= 0 )
 {
  DelThread( iTempThreadIdx );
  iTempThreadIdx = -1;
 }

 fil_chr( ( NPSTR )&SystemStatusBuff, 0, sizeof (
SystemStatusBuff ) );
 fil_chr( ( NPSTR )&InArgs, 0, sizeof ( InArgs ) );

 InArgs.ax = ( WORD
)SCS_SETUPSYSSTATBUFF
 InArgs.dx = SEG( &SystemStatusBuff );
 InArgs.di = OFF( &SystemStatusBuff );

 intn( &InArgs, &OutArgs, SCS_INTNUM );

 SetupSCOSErrNo( &ISCOSErrNo );

 SetSCSActiveStatus( TRUE );
}

int SetupSCOSErrNo( int FAR *iMemLocation )
{
 REG_W InArgs, OutArgs;

 fil_chr( ( NPSTR )&InArgs, 0, sizeof ( InArgs ) );

 InArgs.ax = SCS_ERRNOLOCATION;
 InArgs.es = SEG( iMemLocation );
 InArgs.bx = OFF( iMemLocation );

 intn( &InArgs, &OutArgs, SCS_INTNUM );

 if ( OutArgs.ax != ERR_SUCCESS )
  return ( ERR_INTERNAL );

 return ( ERR_SUCCESS );
}

int BlockSCOSVideo( BYTE fVideoStatus )
{
 REG_W InArgs, OutArgs;

 InArgs.ax = SCS_SCOSVIDEO | ( fVideoStatus ?
SCS_SCOSVIDBLOCK :
SCS_SCOSVIDUNBLOCK );

 intn( &InArgs, &OutArgs, SCS_INTNUM );

 if ( OutArgs.ax != ERR_SUCCESS )
  return ( ERR_INTERNAL );

 return ( ERR_SUCCESS );
}



int DoHostControlMode( BOOL fHostControlStatus )
{
 if ( GetSCSCallProgress() ==
SMI_SCSDISCONNECTED )
  return ( ERR_INTERNAL );

 if ( ( iHostControlThreadIdx = GetTempEventNum()
) < 0 )
  return ( ERR_INTERNAL );

 AddThread( iHostControlThreadIdx,
WaitForHostControl, NULL,
SMD_MANYTIMES, FALSE,
        SCS_HOSTCTRLPOLLFREQ,
SCS_HOSTCTRLMAXRETRY );

 if ( fHostControlStatus )
 {
  if ( SendPrivateMessage(
PMI_REQHOSTCONTROL, 0, NULL ) !=
ERR_SUCCESS )
   return ( ERR_INTERNAL );
 }

 fHostControlRequested = TRUE;

 SetWaitingIcon( SBS_WAITINGICONON, TRUE );
}

void WaitForHostControl( void )
{
 static BYTE fDisconnectRequested = FALSE;

 if ( !fDisconnectRequested )
 {
  DiscoDisableConnection();
  fDisconnectRequested = TRUE;
 }

 if ( GetSCSCallProgress() ==
SMI_SCSDISCONNECTED )
  DelThread( iHostControlThreadIdx );
 else if ( GetRetryLimit( iHostControlThreadIdx ) ==
0 )
 {
  DelThread( iHostControlThreadIdx );
  DoSuspend( TRUE );
 }
}

int !!akeTheConnection( BOOL fNewMonStatus,
BO⌐J
fNewLocalKbdStatus )
{
 int iHostVersionNum = GetCurrHostVersionNum(),
 char *szCurrNodeAddress =
GetCurrNodeAddress();

 if ( *szCurrNodeAddress == NULL ||
iHostVersionNum == 0 )
  return ( ERR_INTERNAL );

 if ( iHostVersionNum < MAKEWORD(
GEN_HMEXPMINORVERSIONNUM,
GEN_HMEXPMAJORVERSIONNUM ) )
 {
  SMVideoBusy( DoVersionMsgBox );
  return ( ERR_SUCCESS );
 }

 SetConnectRequested(
SCS_CONNECTREQUESTED, SCS_UPDATEICON
);

 if ( GetSUIReady() )
  SMVideoBusy( DoExecConnect );
 else
 {
  if ( SMDosBusy( CBExecConnect ) !=
ERR_SUCCESS )
   return ( ERR_INTERNAL );
 }

 return ( ERR_SUCCESS );
}

void DoVersionMsgBox( void )
{
 char szTempStr[ STR_STRMAXLENERR ];

 sr rintf( szTempStr, STR_SUIHOSTVERTOOLOW,
szSMVersionName );
 OpenMessageBox( szTempStr, 0,
SUI_CENTERJUSTIFIED, SUI_OK );
}

int ResumeTheConnection( void )
{
 if ( IsPWRequired() )
  DoMessageBox( NULL, SUI_LOGIN,
SUI_LEFTJUSTIFIED, SUI_OK |
SUI_CANCEL,
          CBLoginButtonPressed,
SUI_LOGINTIMEOUT );
 else
 {
  OpenMessageBox( STR_SUIRESUMINGCONN,
0, SUI_LEFTJUSTIFIED, 0
);

  SetConnectRequested(
SCS_CONNECTREQUESTED,
SCS_NOUPDATEICON
);

  if ( ( iCancelConnectThreadIdx =
GetTempEventNum() ) ==
ERR_INTERNAL )
   return( ERR_INTERNAL );

  TimerManager( TF_SET,
iCancelConnectThreadIdx, 30L );

  AddThread( iCancelConnectThreadIdx,
WaitForCancelConnect,
NULL, SMD_MANYTIMES,
        FALSE, SUI_CANCELCONNPOLLFREQ,
SUI_CANCELCONNMAXRETRY );

  if ( SMDosBusy( CBExecConnect ) !=
ERR_SUCCESS )
   return( ERR_INTERNAL );
 }

 return ( ERR_SUCCESS );
}

void CBLoginButtonPressed( int iButtonCode )
{
 if ( iButtonCode == SUI_OK )
 {
  SetConnectRequested(
SCS_CONNECTREQUESTED,
SCS_NOUPDATEICON
);

  OpenMessageBox( STR_SUIRESUMINGCONN2
0, SUI_LEFTJUSTIFIED, 0
);

  if ( ( iCancelConnectThreadIdx =
GetTempEventNum() ) ==
ERR_INTERNAL )
   return;

  TimerManager( TF_SET,
iCancelConnectThreadIdx, 30L );

  AddThread( iCancelConnectThreadIdx,
WaitForCancelConnect,
NULL, SMD_MANYTIMES,
        FALSE, SUI_CANCELCONNPOLLFREQ,
SUI_CANCELCONNMAXRETRY );

  SMDosBusy( CBExecConnect );
 }
 else
  CBMsgBoxButtonPressed( iButtonCode );
}

void CBMsgBoxButtonPressed( int iButtonCode )
{
 int iActionCode = GetCurrActionCode();

 HideMessageBox();

 if ( iActionCode == SUI_LASTCONNECTION ||
iActionCode ==
SUI_BADVIDEOMSG )
  SMVideoBusy( DoNextScreen );

}

void DoNextScreen( void )
{
 LoadSUI( SUI_SPECIFIEDSCREEN,
SUI_HOSTSELECTION );
}

void DoExecConnect( void )
{
 SMDosBusy( CBExecConnect );
}



void CBExecConnect( void )
{
 REG_W InArgs, OutArgs;
 RPARM *SCSRParm;
 char *szCurrNodeAddress =
GetCurrNodeAddress();
 char *szCurrHostName = GetLBHost( -1 );

 nConnectErrorCode = SCS_NOCONNERROR;


 if ( ( SCSRParm = ( RPARM * )malloc( sizeof (
RPARM ) ) ) ==
NULL )
  return;

 fil_chr( ( NPSTR )SCSRParm, 0, sizeof( RPARM )
);

 SCSRParm->rptermtyp = 0;
 SCSRParm->rpprotocol = SCS_SPX,
 strcpy( SCSRParm->rpinternet,
szCurrNodeAddress );

 if ( IsPWRequired() )
 {
  strcpy( SCSRParm->rpdopw, szPassword );
  strcpy( SCSRParm->rpdoid,
SCS_STRDEFUSERID );

  UIConfigData.bLastConnPassword = TRUE;

 }
 else
  UIConfigData.bLastConnPassword = FALSE;


#if defined( IPTEST )
 #pragma message( "Warning: IP Address is fixed."
)
 strcpy( SCSRParm->rpinternet,
"000000000020A60010E6" );
#endif

#if !defined( PROD )
 sprintf( szTempStr, "NOTICE: pw - %s\r      uid -
%s\r
nid - %s\r", SCSRParm->rpdopw,
        SCSRParm->rpdoid, SCSRParm->rpinternet
);
 TRACE( szTempStr );
#endif

 InArgs.ax = SCS_SMAKECON;
 InArgs.es = SEG( SCSRParm );
 InArgs.bx = OFF( SCSRParm );

 SetSCSAbortFlag( FALSE );
 SetMsgBoxReturnCode( SUI_NOBUTTONS );

 _and_isr_flg( ~SMD_SCHEDULERS );

 intn( &InArgs, &OutArgs, SCS_INTNUM );

 DelThread( iCancelConnectThreadIdx );

 SetConnectRequested(
SCS_NOCONNECTREQUESTED,
SCS_NOUPDATEICON
);

 if ( OutArgs.ax == SCS_ACCEPTED ||
    GetSCOSErrNo( SCS_RETAINERROR ) ==
SCS_NOLOGINERROR )
 {
  nConnectErrorCode = SCS_NOCONNERROR;
  strcpy( UIConfigData.szLastNodeAddress,
szCurrNodeAddress );
  strcpy( UIConfigData.szLastHostName,
szCurrHostName );
  SetCurrHostName( szCurrHostName );

  If ( ( iSUIThreadIdx = GetTempEventNum() ) ==
ERR_INTERNAL )
   return;

  AddThread( iSUIThreadIdx, ( NEARPROC
)WaitForSUIUnload, NULL
        SMD_POLLED, FALSE,
SCS_WAITSUIPOLLFREQ, 0 );

  AddThread( SCS_DISCOEVENTNUM,
WaitForStatusChange, NULL,
        SMD_POLLED, FALSE,
SCS_DISCOPOLLFREQ, 0 );

  UnloadSUI( SUI_NOUNLOADSUI );
 }
 else
 {
  SetWaitingIcon( SBS_WAITINGICONOFF,
SCS_UPDATEICON );

  *UIConfigData.szLastNodeAddress = NULL;

  if ( nConnectErrorCode ==
SCS_NOCONNERROR )
   nConnectErrorCode = TranslateConnectError();

  switch ( nConnectErrorCode )
  {
   case SCS_ERRTIMEOUT:
    DoMessageBox(
STR_SUICONNECTTIMEOUT, 0,
SUI_CENTERJUSTIFIED, SUI_OK,
CBMsgBoxButtonPressed, 0 );
     break;

   case SCS_ERRPASSWORD:
```

```
      DoMessageBox(
STR_SUIPASSWORDREJECTED, 0,
SUI_CENTERJUSTIFIED, SUI_OK,
CBMsgBoxButtonPressed, 0 );
      break,

    case SCS_ERRLOGINID
      DoMessageBox(
STR_SUILOGINIDREJECTED, 0,
SUI_CENTERJUSTIFIED, SUI_OK,
CBMsgBoxButtonPressed, 0 );
      break;

    case SCS_ERRUNSUPVIDMODE:
      DoMessageBox( STR_SUIUNSUPVIDMODE,
0,
SUI_CENTERJUSTIFIED, SUI_OK,
CBMsgBoxButtonPressed, 0 );
      break,

    case SCS_ERRUSERABORT
      CBMsgBoxButtonPressed( SUI_CANCEL );
      break;

    case SCS_ERRUNKNOWN
    default.
      DoMessageBox(
STR_SUICONNECTERRUNKNOWN, 0,
SUI_CENTERJUSTIFIED, SUI_OK,
CBMsgBoxButtonPressed, 0 );
      break;
   }
  }

  free( SCSRParm );
}

void WaitForCancelConnect( void )
{
  static int iWaitForSUI = 0;

  if ( GetMsgBoxReturnCode() == SUI_CANCEL )
   nConnectErrorCode = SCS_ERRUSERABORT
  else if ( GetRetryLimit( iCancelConnectThreadIdx )
== 0 )
   nConnectErrorCode = SCS_ERRTIMEOUT;

  if ( nConnectErrorCode != SCS_NOCONNERROR
)
  {
   SetSCSAbortFlag( TRUE );
   DelThread( iCancelConnectThreadIdx ).
  }

  if (TimerManager (TF_CHECK,
iCancelConnectThreadIdx, 0) ==
TIMEOUT_FIRED)
  {
   switch (iWaitForSUI)
   {
    case 0:
    TimerManager (TF_RESET,
iCancelConnectThreadIdx, 0);

    HideMessageBox ();

    if (TimerManager (TF_CHECK,
iCancelConnectThreadIdx. 0L) ==
TIMEOUT_AVAILABLE)
    {
      TimerManager (TF_SET,
iCancelConnectThreadIdx. 1L);
      iWaitForSUI = 1;
    }
    break,

    case 1:
    TimerManager (TF_RESET,
iCancelConnectThreadIdx, 0);

    OpenMessageBox( STR_SUIRESUMINGCONN,
0, SUI_LEFTJUSTIFIED,
SUI_CANCEL );

    iWaitForSUI = 0;
    break;
   }
  }

}

void WaitForStatusChange( void )
{
  static char nOldVideoMode = -1;
  char nCurrVideoMode = GetCurrVidMode();
  int iCurrScrCode;
  int nSUIStatus;

  if ( nOldVideoMode == -1 )
   nOldVideoMode = nCurrVideoMode;

  if ( GetSCSCallProgress() ==
SMI_SCSDISCONNECTED )
  {
   nSUIStatus = GetSUIStatus();

   if ( !fHostControlRequested || ( DoSuspend(
TRUE ) !=
ERR_SUCCESS ) )
   {
    fHostControlRequested = FALSE;

    if ( nSUIStatus != SMI_SUIUNLOADING &&
nSUIStatus !=
SMI_SUIDEACTIVATING )
     {
      DelThread( SCS_DISCOEVENTNUM );

      SetCurrHostName( szNullStr );
      SetWaitingIcon( SBS_WAITINGICONOFF,
TRUE );

      if ( IsSetupDlg( GetCurrScrCode() ) )
       UpdateSUIConnectStatus();
      else
      {

       if ( fBadVideoMsgRecv )
       {
        fBadVideoMsgRecv = FALSE;

        LoadSUI( SUI_BADVIDEOMSG,
SUI_NOSCREEN );
       }
       else
        LoadSUI( SUI_SPECIFIEDSCREEN,
SUI_HOSTSELECTION );
      }
     }
   }
  }
  else
  {
   iCurrScrCode = GetCurrScrCode();

   if ( nCurrVideoMode != nOldVideoMode )

   {
    if ( GetSUIReady() &&
        IsOSK( iCurrScrCode ) &&
!IsOSKAsSetupDlg(
iCurrScrCode ) )
      UnloadSUI( SUI_NOUNLOADSUI );
   }
  }

  nOldVideoMode = nCurrVideoMode;
}

void WaitForSUIUnload( void )
{
  if ( !GetSUIReady() )
   DelThread( iSUIThreadIdx );
}

int SetMonitor( BOOL fNewMonStatus, BOOL
fNewLocalKbdStatus )
{
  iSetMonDone = ERR_INPROGRESS;

  if ( !GetSCSActiveStatus() )
   return ( ERR_INTERNAL );

  if ( GetSCSCallProgress() !=
SMI_SCSCONNECTED )
   iSetMonDone = ERR_SUCCESS;
  else
  {
   fMonStatus = fNewMonStatus;
   fLocalKbdStatus = fLocalKbdStatus;

   if ( SMDosBusy( CBExecMonitor ) !=
ERR_SUCCESS )
   {
    iSetMonDone = ERR_INTERNAL;
    return ( ERR_INTERNAL );
   }
  }

  return ( ERR_SUCCESS );
}

void CBExecMonitor( void )
{
  REG_W InArgs, OutArgs;

  InArgs.ax = ( fMonStatus ? SCS_MONITORON :
SCS_MONITOROFF );
  InArgs.ax |= ( fLocalKbdStatus ?
SCS_LOCALKBDON :
SCS_LOCALKBDOFF );

  SetReentrancy( FALSE );
  intn( &InArgs, &OutArgs, SCS_INTNUM );
  SetReentrancy( TRUE );

  if ( OutArgs.ax == SCS_ACCEPTED )
  {
   nConnectErrorCode = SCS_NOCONNERROR;
   iSetMonDone = ERR_SUCCESS;
  }
  else
  {
   nConnectErrorCode =
SCS_ERRFULLSCRPAINT;
   iSetMonDone = ERR_SUCCESS;
   TRACE( "ERROR: CoSession monitor call was
not accepted.
Reported as accepted anyway.\r" );
  }
}

int CheckMonitor( void )
{
  return ( iSetMonDone );
}

int SetSCSMemory( int iNewFreeMemPercent, int
iNewOSKType, BYTE
nDosBusy )
{
  iSetMemDone = ERR_INPROGRESS;
  nOSKType = LOBYTE( iNewOSKType );

  if ( !GetSCSActiveStatus() )
   return ( ERR_INTERNAL );

  iFreeMemPercent = iNewFreeMemPercent;

  If ( nDosBusy == SMI_SCSWAITFORDOS )
  {
   if ( SMDosBusy( CBExecSCSMemory ) != 0 )
    return ( ERR_INTERNAL );
  }
  else
   CBExecSCSMemory();

  return ( ERR_SUCCESS );
}

void CBExecSCSMemory( void )
{
  REG_W InArgs, OutArgs;

  if ( nOSKType == SUI_WINDOWSOSK )
   InArgs.ax = SCS_FREEOSKMEM;
  else
   InArgs.ax = SCS_FREEMEM;

  InArgs.dx = iFreeMemPercent;

#if !defined( PROD )
  sprintf( szTempStr, "NOTICE: Memory call
number#: %x,
requesting allocation of %d%% of SRWIN
memory.\r",
        InArgs.ax, InArgs.dx );
  TRACE( szTempStr );
#endif

  SetReentrancy( FALSE );
  intn( &InArgs, &OutArgs, SCS_INTNUM );
  SetReentrancy( TRUE );

  if ( OutArgs.ax == SCS_ACCEPTED )
   iSetMemDone = ERR_SUCCESS;
  else
   iSetMemDone = ERR_INTERNAL;
}

BOOL CheckSCSMemory( void )
{
  return ( iSetMemDone );
}



int RequestFullRepaint( BYTE fRepaintRequired,
WORD wScreenCode )
{
  iFullRepaintDone = ERR_INPROGRESS;


  if ( !GetSCSActiveStatus() )
   return ( ERR_INTERNAL );

  if ( IsOSKWinGraphics( wScreenCode ) )
  {
   TRACE( "NOTICE: Closing the Windows Host No
Paint Zone\r" );

   if ( CloseHostOcclude() != ERR_SUCCESS )

   {
    TRACE( "NOTICE: Attempt to close No Paint
Zone on Host
failed, continuing anyway\r" );
    return ( iFullRepaintDone = ERR_SUCCESS );

   }
  }
  else
  {
   TRACE( "NOTICE: Closing the DOS or DOS
Graphics occlusion
region\r" );

   if ( SetSCSHostOcclude( ( OCCLUDEUNION *
)NULL,
SUI_NOOCCTYPE, fRepaintRequired ) !=
ERR_SUCCESS )
   {
    TRACE( "ERROR: an error occured in calling
SetSCSHostOcclude(), continuing anyway\r" );
    return ( iFullRepaintDone = ERR_SUCCESS );
   }
  }

  return ( ERR_SUCCESS );
}



int CheckFullRepaint( void )
{
  return ( iFullRepaintDone );
}

int DiscoDisableConnection( void )
{
  if ( !GetSCSActiveStatus() )
   return ( ERR_INTERNAL );

  if ( ( iDiscoThreadIdx = GetTempEventNum() ) < 0
)
   return ( ERR_INTERNAL );

  AddThread( iDiscoThreadIdx, WaitForDisco, NULL,
SMD_ONETIME,
FALSE,
         1, 0 );

  SetWaitingIcon( SBS_WAITINGICONON, TRUE );

  return ( ERR_SUCCESS );
}

void WaitForDisco( void )
{
  REG_W InArgs, OutArgs;

  DelThread( iDiscoThreadIdx );

  InArgs.ax = SCS_DISCODISABLECON;

  intn( &InArgs, &OutArgs, SCS_INTNUM );

}

int SendPrivateMessage( int iMsgID, int iBuffLen,
char *sMsgBuff
)
{
  REG_W InArgs, OutArgs;

  fil_chr( &InArgs, 0, sizeof ( InArgs ) );
  fil_chr( &SendPriMsgBuff, 0, sizeof (
SendPriMsgBuff ) );

  SendPriMsgBuff.iMsgID = iMsgID;

  if ( ( SendPriMsgBuff.iBuffLen = iBuffLen ) > 0 )
   mem_cp( sMsgBuff, SendPriMsgBuff.sMsgBuff,
iBuffLen );
  InArgs.ax = SCS_SENDPRIMSG;

  InArgs.dx = SEG( &SendPriMsgBuff );
  InArgs.di = OFF( &SendPriMsgBuff );

  InArgs.bx = SendPriMsgBuff.iBuffLen + sizeof (
SendPriMsgBuff.iBuffLen ) +
         sizeof ( SendPriMsgBuff.iMsgID );
```

```
#if !defined( PROD )
  sprintf( szTempStr, "NOTICE: Sent Private
Message #:%d\r"
SendPriMsgBuff.iMsgID );
  TRACE( szTempStr );
#endif

  intn( &InArgs, &OutArgs, SCS_INTNUM );

  if ( OutArgs.ax != SCS_ACCEPTED )
  {
    TRACE( "ERROR: CoSession Send Private
Message function
returned an error\r" );

  }

  return ( OutArgs.ax == SCS_ACCEPTED ?
ERR_SUCCESS :
ERR_INTERNAL );
}

void WaitForSendPM( void )
{
  REG_W InArgs, OutArgs.

  InArgs.ax = SCS_SENDPRIMSG;

  InArgs.dx = SEG( &SendPriMsgBuff );
  InArgs.di = OFF( &SendPriMsgBuff );

  InArgs.bx = SendPriMsgBuff.iBuffLen + sizeof (
SendPriMsgBuff.iBuffLen ) +
           sizeof ( SendPriMsgBuff.iMsgID );

#if !defined( PROD )
  sprintf( szTempStr, "NOTICE: Sent Private
Message #:%d\r",
SendPriMsgBuff.iMsgID );
  TRACE( szTempStr );
#endif

  intn( &InArgs, &OutArgs, SCS_INTNUM );

  if ( OutArgs.ax == SCS_ACCEPTED )
  {
    TRACE( "NOTICE: Send PM retry succeeded!" );

    PCB_BEGINCRITICAL.

    SendPriMsgBuff.iMsgID = 0;

    PCB_ENDCRITICAL.
  }
  else
    TRACE( "NOTICE: Send PM retry failed\r" );

  if ( GetRetryLimit( iPMRetryThreadIdx ) == 0 ||
SendPriMsgBuff.iMsgID == 0 )
  {
    TRACE( "NOTICE: Send PM retry thread
expired\r" );
    DelThread( iPMRetryThreadIdx );
    iPMRetryThreadIdx = SMD_NOACTIVETHREAD;

    PCB_BEGINCRITICAL,
    fSendPMRetryDone = TRUE,
    PCB_ENDCRITICAL;
  }
}


int GetSCSCallProgress( void )
{
  BYTE nCallProgress;
  PCB_BEGINCRITICAL
  nCallProgress = SystemStatusBuff.nCallProgress;
  PCB_ENDCRITICAL

  return ( nCallProgress ).
}

int GetSCSProtocolId( void )
{
  BYTE nProtocolId;

  PCB_BEGINCRITICAL
  nProtocolId = SystemStatusBuff.nProtocolId
  PCB_ENDCRITICAL

  return ( nProtocolId ).
}

int GetSCSVideoMode( void )
{
  BYTE nCurrentVidMode,

  PCB_BEGINCRITICAL
  nCurrentVidMode =
SystemStatusBuff.nCurrentVidMode;
  PCB_ENDCRITICAL

  return ( nCurrentVidMode );
}

void SetSCSAbortFlag( BYTE fNewAbortRequest )
{
  PCB_BEGINCRITICAL
  SystemStatusBuff.fAbortRequestConnect =
fNewAbortRequest;
  PCB_ENDCRITICAL
}

int ReceiveHostFile( char *szHostFileName, LPSTR
sFileBuff, LONG
lFileSize )
{
  REG_W InArgs, OutArgs;

  fil_chr( ( NPSTR )&InArgs, 0, sizeof ( InArgs ) );

  InArgs.ax = SCS_XFERFILE |
SCS_TOSARATOGA;
  InArgs.ds = SEG( szHostFileName );
  InArgs.si = OFF( szHostFileName ).
  InArgs.es = SEG( sFileBuff );
  InArgs.di = OFF( sFileBuff );
  InArgs.dx = HIWORD( lFileSize );
  InArgs.cx = LOWORD( lFileSize ),

#if !defined( FLASHTEST )
  intn( &InArgs, &OutArgs, SCS_INTNUM );

  return ( OutArgs.ax == SCS_ACCEPTED ?
ERR_SUCCESS :
ERR_INTERNAL );
#else
  return ( ERR_SUCCESS );
#endif
}

int SendUDHotIcon( int iHotIconID )
{
  int iScanCodeIdx, iNumCodes:
  int iReturn = ERR_SUCCESS;
  BYTE nHiScanByte, nLoScanByte,
  SCANCODE *pScanCodes:

  if ( iHotIconID == PND_UDEF1 )
    pScanCodes = UIConfigData.aUDHotIcon1
  else
    pScanCodes = UIConfigData.aUDHotIcon2;

  iNumCodes = GetNumScanCodes( pScanCodes ).

  for ( iScanCodeIdx = 0; iScanCodeIdx <
iNumCodes,
++iScanCodeIdx )
  {
    if ( ( nHiScanByte = HIBYTE( pScanCodes[
iScanCodeIdx
].wScanCode ) ) > 0 )
    {
      if ( SendScanCode( nHiScanByte ) ==
ERR_INTERNAL )
      {
        iReturn = ERR_INTERNAL;
        break;
      }
    }

    if ( ( nLoScanByte = LOBYTE( pScanCodes[
iScanCodeIdx
].wScanCode ) ) > 0 )
    {
      if ( SendScanCode( nLoScanByte ) ==
ERR_INTERNAL )
      {
        iReturn = ERR_INTERNAL;
        break;
      }
    }
  }

  return ( iReturn ).
}

int GetNumScanCodes( SCANCODE FAR
*pScanCodes )
{
  int iNumCodes, iScanCodeIdx,

  for ( iNumCodes = 0, iScanCodeIdx = 0;
iScanCodeIdx <
SUI_MAXNUMSCANCODES;
       ++iScanCodeIdx )
  {
    if ( LOBYTE( pScanCodes[ iScanCodeIdx
].wScanCode ) == 0 )
      break;

    iNumCodes++;
  }

  return ( iNumCodes );
}

int SendScanCode( BYTE nScanCode )
{
  REG_W InArgs, OutArgs;

  PCB_BEGINCRITICAL;

  fil_chr( ( NPSTR )&InArgs, 0, sizeof ( InArgs ) );

  InArgs.ax = MAKEWORD( nScanCode, HIBYTE(
SCS_SENDKBDSCANCODE )
);

  intn( &InArgs  &OutArgs, SCS_INTNUM ).

  PCB_BEGINCRITICAL;

  return ( OutArgs.ax );
}

int SendLockKbdMouse( BOOL bLocked )
{
  if ( bLocked )
    return ( SendPrivateMessage(
PMI_REQSCSLOCKKBMO. 0, NULL ) );
  else
    return ( SendPrivateMessage(
PMI_REQSCSUNLOCKKBMO, 0, NULL )
);
}

int SendDimScreen( BOOL bDimmed )
{
  if ( bDimmed )
    return ( SendPrivateMessage(
PMI_REQSCSBLANKSCR, 0, NULL ) );
  else
    return ( SendPrivateMessage(
PMI_REQSCSUNBLANKSCR, 0, NULL )
);
}

CONNERROR TranslateConnectError( void )
{
  switch ( ( SCOSCONNERROR )GetSCOSErrNo(
SCS_CLEARERROR ) )
  {
    case SCS_PASSWORDREJECTED:
      return ( SCS_ERRPASSWORD );

    case SCS_LOGINIDREJECTED:
    case SCS_LOGINUSERREJECTED:
      return ( SCS_ERRLOGINID );

    case SCS_REMOTEDISCONNECTED.
    case SCS_RESPONSETIMEOUT:
      return ( SCS_ERRTIMEOUT );

    case SCS_UNSUPPORTEDVIDMODE:
      return ( SCS_ERRUNSUPVIDMODE );

    default:
      return ( SCS_ERRUNKNOWN );
  }
}

#if defined( _MSC_VER   )
#pragma warning( default : 4704 )
#endif
Copr. 1995 Zenith Data Systems Corp.
#include "cr.h"
#include "sio.h"
#include "k2.h"
#include "spawn.h"
#include "rparm.h"
#include "hm.h"
#include "sm.h"

#if defined( _MSC_VER   )
#pragma warning( disable : 4704 )
#endif

int SetSCSSaraStatus( int iNewStatus )
{
  REG_W InArgs, OutArgs;

  fil_chr( ( NPSTR )&InArgs, 0, sizeof ( InArgs ) );

  InArgs.ax = iNewStatus;

#if !defined( PROD )
  if ( iNewStatus == SCS_SETBUSY )
    TRACE( "NOTICE: Attempting to set the SCS
busy flag\r" );
  else
    TRACE( "NOTICE: Attempting to set the SCS
idle flag\r" );
#endif

  intn( &InArgs, &OutArgs, SCS_INTNUM );

  return ( OutArgs.ax == SCS_ACCEPTED ?
ERR_SUCCESS :
ERR_INTERNAL );
}

int SetSCSFullRepaint( void )
{
  REG_W InArgs, OutArgs;

  fil_chr( ( NPSTR )&InArgs, 0, sizeof ( InArgs ) );

  InArgs.ax = SCS_FULLREPAINT;

  TRACE( "NOTICE: Requesting full repaint from
SCS\r" );

  intn( &InArgs, &OutArgs, SCS_INTNUM );

  return ( OutArgs.ax == SCS_ACCEPTED ?
ERR_SUCCESS .
ERR_INTERNAL );
}

int SetSCSScrolling( BYTE nScrollStatus )
{
  REG_W InArgs, OutArgs:

  fil_chr( ( NPSTR )&InArgs, 0, sizeof ( InArgs ) );

  InArgs.ax = SCS_SETSCROLLING | nScrollStatus;

#if !defined( PROD )
  if ( nScrollStatus == SCS_DISABLESCROLL )
    TRACE( "NOTICE: Requesting the disabling of
scroll from
SCS\r" );
  else
    TRACE( "NOTICE: Requesting the enabling of
scroll from SCS\r"
);
#endif

  intn( &InArgs, &OutArgs, SCS_INTNUM );

  return ( OutArgs.ax == SCS_ACCEPTED ?
ERR_SUCCESS
ERR_INTERNAL ):
}

int SetSCSOcclude( OCCLUDEUNION *occ, int
iOccType )
{
  REG_W InArgs, OutArgs;

  fil_chr( ( NPSTR )&InArgs, 0, sizeof ( InArgs ) );

  if ( occ != NULL )
  {
    switch ( iOccType )
    {
      case SUI_NOOCCTYPE:
      case SUI_OCCDOSTEXT:
        InArgs.bx = AbsToZero(
occ->occText.yULRow );
        InArgs.cx = AbsToZero( occ->occText.xULCol
);
        InArgs.si = occ->occText.yLRRow;

        InArgs.di = occ->occText.xLRCol;
        break;

      case SUI_OCCDOSGRAPHICS:
        InArgs.bx = AbsToZero(
occ->occDosGraph.xULDos );
        InArgs.cx = AbsToZero(
occ->occDosGraph.yULDos ),
        InArgs.si = occ->occDosGraph.xLRDos;
        InArgs.di = occ->occDosGraph.yLRDos;
        break:

      default:
        return ( ERR_INTERNAL );
    }
  }
```

```
  else
    TRACE( "NOTICE: Clipping region at zero\r" );

  InArgs.ax = SCS_OCCLUDE2;

  TRACE( "NOTICE: Requesting the establishment
of a clipping
region from SCS\r" );

  intn( &InArgs, &OutArgs, SCS_INTNUM );

  return ( OutArgs.ax == SCS_ACCEPTED ?
ERR_SUCCESS :
ERR_INTERNAL );
}

int DefineSCSOcclude( OCCLUDEUNION *occ, int
iOccType, BYTE
fRepaint )
{
  if ( SetSCSSaraStatus( SCS_SETBUSY ) !=
ERR_SUCCESS )
  {
    TRACE( "ERROR: Attempt to secure SCS busy
flag failed\r" );
    return ( ERR_SCSBUSY );
  }

  if ( SetSCSOcclude( occ, iOccType ) !=
ERR_SUCCESS )
  {
    TRACE( "ERROR: Attempt to define SCS
clipping region
failed\r" );
    return ( ERR_SCSOCCFAILED );
  }

  if ( occ == NULL )
  {
    if ( SetSCSScrolling( SCS_ENABLESCROLL ) !=
ERR_SUCCESS )
    {
      TRACE( "ERROR: Attempt to enable scrolling
failed\r" );
      return ( ERR_SCSSCROLLING );
    }
  }
  else
  {
    if ( SetSCSScrolling( SCS_DISABLESCROLL ) !=
ERR_SUCCESS )
    {
      TRACE( "ERROR. Attempt to disable scrolling
failed\r" );
      return ( ERR_SCSSCROLLING );
    }
  }

  if ( SetSCSSaraStatus( SCS_SETIDLE ) !=
ERR_SUCCESS )
  {
    TRACE( "ERROR. Attempt to secure SCS busy
flag failed\r" );
    return ( ERR_SCSIDLE );
  }

  if ( fRepaint )
  {
    if ( SetSCSFullRepaint() != ERR_SUCCESS )
    {
      TRACE( "ERROR: Repaint request in SCS
failed\r" );
      return ( ERR_SCSFULLREPAINT );
    }
  }

  TRACE( "NOTICE: Occlusion region definition for
DOS Text or
Graphics was successful!\r" );

  return ( ERR_SUCCESS );
}

#if defined( _MSC_VER )
#pragma warning( default : 4704 )
#endif

Copr. 1995 Zenith Data Systems Corp.
#include "cr.h"
#include "sio.h"
#include "k2.h"
#include "spawn.h"
#include "rparm.h"
#include "hm.h"
#include "sm.h"

#if defined( _MSC_VER )
#pragma warning( disable : 4704 )
#endif

static int iSLLoadThreadIdx;
static LONG lOldVidVector;

LONG GetOldVidVector( void )
{
  return ( lOldVidVector );
}

APIFUNCRET SLDefineOldVidVector( struct REGW
*CallerRegs )
{
  TRAPREC *tr = GetVIDTrapRec();

  lOldVidVector = MAKELONG( CallerRegs->bx,
CallerRegs->dx );

  PCB_BEGINCRITICAL;

  tr->tr_old_int = lOldVidVector;

  PCB_ENDCRITICAL;
}

APIFUNCRET SLEnableKbd( struct REGW
*CallerRegs )
{
  EnableKbdAfterBoot();
}

APIFUNCRET SLGetFrameType( struct REGW
*CallerRegs )
{
  CallerRegs->ax = ( WORD
)UIConfigData.nFrameType;

  SetForegroundRegs( CallerRegs );
}

APIFUNCRET SLGetMLIDStatus( struct REGW
*CallerRegs )
{
  CallerRegs->ax = GetPRXActiveStatus();

  SetForegroundRegs( CallerRegs );
}

APIFUNCRET SLLoadSUI( struct REGW
*CallerRegs )
{
  if ( ( iSLLoadThreadIdx = GetTempEventNum() ) <
0 )
    return;

  AddThread( iSLLoadThreadIdx, ( NEARPROC
)CBExecLoadSUI, NULL,
SMD_ONETIME, FALSE,
          SMI_SLPOLLFREQ, 0 );
}

void CBExecLoadSUI( void )
{
  DelThread( iSLLoadThreadIdx );

  InitSaratoga( SBS_SUILOADING );

  if ( GetEEPROMInited() )
  {
    TRACE( "NOTICE: Beginning pen calibration due
to EEPROM
initialization\r" );
    LoadSUI( SUI_DOPENCALIBRATION,
SUI_NOSCREEN );
  }
  else
  {
    if ( !IsNodeAddressBlank(
UIConfigData.szLastNodeAddress ) &&

        GetSystemResumeBit() )
      LoadSUI( SUI_LASTCONNECTION,
SUI_NOSCREEN );
    else
      LoadSUI( SUI_SPECIFIEDSCREEN,
SUI_HOSTSELECTION );
  }

  ClearSystemResumeBit();
}

#if defined( _MSC_VER )
#pragma warning( default : 4704 )
#endif
Copr. 1995 Zenith Data Systems Corp.
#include "cr.h"
#include "spawn.h"
#include "k2.h"
#include "sio.h"
#include "sm.h"

int SortList(int wTotalEntries, int wEntrySize, int
wPrimeOffset,
          int wSecondOffset,  char *cpEntryBuff)
{
  int wInnerLoop;
  int wOutLoop;
  int wInnerOffset;
  int wOutOffset;
  int wResult;

  if( (wTotalEntries <= 0) || (wEntrySize <= 0) ||
(wPrimeOffset
== wSecondOffset)
     || (wPrimeOffset >= wEntrySize) ||
(wSecondOffset >=
wEntrySize)
     || (wPrimeOffset < 0 ) || (wSecondOffset < 0) )
    return(ERR_INVALIDPARM);

  wOutOffset = 0;
  for(wOutLoop = 0; wOutLoop < (wTotalEntries - 1);
wOutLoop++)
  {
    wInnerOffset = wOutOffset + wEntrySize;
    for(wInnerLoop = (wOutLoop + 1); wInnerLoop <
wTotalEntries;
wInnerLoop++)
    {

wResult=stricmp(cpEntryBuff+wOutOffset+wPrimeOff
set,
cpEntryBuff+wInnerOffset+wPrimeOffset);
       if(wResult > 0)
        SwapEntries(cpEntryBuff+wOutOffset,
cpEntryBuff+wInnerOffset, wEntrySize);
      if(wResult == 0)
      {

wResult=stricmp(cpEntryBuff+wOutOffset+wSecond
Offset,
cpEntryBuff+wInnerOffset+wSecondOffset);
        if(wResult > 0)
          SwapEntries(cpEntryBuff+wOutOffset,
cpEntryBuff+wInnerOffset, wEntrySize);
      }
      wInnerOffset = wInnerOffset + wEntrySize;
    }
    wOutOffset = wOutOffset + wEntrySize;
  }
  return(ERR_SUCCESS);
}

int SwapEntries(char *cpEntry1, char *cpEntry2, int
wEntrySize)
{
  char cSwapBuff[SRT_MAXLENSWAPBUFF];
  int  wRestSize;
  int  wCopyUnit;

   if( wEntrySize <= 0 )
    return(ERR_INVALIDPARM);

  wRestSize = wEntrySize;
  do
  {
    if(wRestSize >= SRT_MAXLENSWAPBUFF)
      wCopyUnit = SRT_MAXLENSWAPBUFF;
    else
      wCopyUnit = wRestSize;
    mem_cp(cpEntry1+(wEntrySize-wRestSize),
cSwapBuff,
wCopyUnit);
    mem_cp(cpEntry2+(wEntrySize-wRestSize),
cpEntry1+(wEntrySize-wRestSize), wCopyUnit);
    mem_cp(cSwapBuff,
cpEntry2+(wEntrySize-wRestSize),
wCopyUnit);
    wRestSize -= SRT_MAXLENSWAPBUFF;
  } while (wRestSize > 0);

   return(ERR_SUCCESS);
}

long GetEntryOffset(int wTotalEntries, int
wEntrySize, int
wKeyOffset,
               int wKeyNumber, char *cpEntryBuff)
{
  int wLoop;
  int wKeyCount;
  int wOffset;

   if( (wTotalEntries <= 0) || (wEntrySize <= 0) ||
(wKeyNumber
<= 0)
     || (wKeyOffset >= wEntrySize) || (wKeyOffset < 0
)
     || (wKeyNumber > wTotalEntries) )
    return((long)ERR_INVALIDPARM);

  wKeyCount=1;
  wOffset=0;

  if(wKeyCount == wKeyNumber)
    return(0L);

  for(wLoop = 1; wLoop < wTotalEntries; wLoop++)
  {
    if( (stricmp(cpEntryBuff+wOffset+wKeyOffset,
cpEntryBuff+wOffset+wEntrySize+wKeyOffset)) != 0)
      wKeyCount++;
    wOffset = wOffset + wEntrySize;
    if(wKeyCount == wKeyNumber)
      return((long)wOffset);
  }

   return((long)ERR_INVALIDPARM);
}
Copr. 1995 Zenith Data Systems Corp.


#include "cr.h"
#include "sio.h"
#include "spawn.h"
#include "k2.h"
#include "sm.h"

#if defined( _MSC_VER )
#pragma warning( disable : 4704 )
#endif

static TRAPREC         SUIMouseTrapRec;
static CALLREC         SUICallRec;
static SUICB           lpfnTempProc;
static SUIACTIONCODE   ActionCode = 0;
static DWORD           dwOldSUIIntVec;
static int             iTempThreadIdx;
static int             iPrepSUIThreadIdx;
static int             iUnloadSUIThreadIdx;
static int             iCleanupSUIThreadIdx;
static WORD            pJmpBuff[ 5 ];
static BOOL            fVideoBlocked = FALSE;
static char            nSUIStatus =
SMI_SUINOTLOADED;
static BYTE            nResidentStatus;
static WORD            wSUIPSP;
static WORD            wSavedSP;
static WORD            wSavedBP;
static CURRHOSTNAME    CurrHostName;

static APIFUNC aAPIFuncTable[] =
{
  { SMI_SETCONTRAST, GetSetContrast },
  { SMI_SETBRIGHTNESS, GetSetBrightness },
  { SMI_CALIBUPLEFT, CalibratePen },
  { SMI_CALIBCANCEL, CalibrateCancel },
  { SMI_SETAUTOSHUTOFF, GetSetAutoShutOff },
  { SMI_SETSLEEPTIME, GetSetSleepTime },
  { SMI_REBOOTHOST, RebootHost },
  { SMI_ACTIVEUPDATE, RequestActiveUpdate },

  { SMI_DOUPDATE, DoUpdate },
  { SMI_UPDATEHOSTLIST, UpdateHostList },
  { SMI_GETHOSTLISTSTAT, GetHostListStatus },
  { SMI_GETCONNECTSTAT, GetConnectStatus },
  { SMI_REQUESTCONNECT, RequestConnDisco },
  { SMI_GETPASSWORDSTAT, GetPasswordStatus
},
  { SMI_LBSETNETGROUP, LBGetSetNetGroup },
  { SMI_LBSETNETHOST, LBGetSetNetHost },
  { SMI_LBSETNETFRAMETYPE,
LBGetSetNetFrameType },
  { SMI_SETCONNECTTYPE, GetSetConnectType
},
  { SMI_SETPASSWORD, GetSetPassword },
  { SMI_UPDATEDIMLOC, UpdateDimenLoc },
  { SMI_REQUESTUNLOAD, RequestUnload },
  { SMI_SETMSGBOXRETCODE,
SetSUIMBRetCode },
  { SMI_SETUILANGUAGE, GetSetUILanguage },
  { SMI_SETACTIVESTAT, SetActiveStatus },
  { SMI_SETKEYSTROKE, SetKeyStroke },
  { SMI_GETKEYBOARDSTAT, GetKeyBoardStatus
},
  { SMI_GETABOUTDIALOG, GetAboutDialog },
  { SMI_SETUDHOTICON, GetSetUDHotIcon },
  { SMI_SETSECURITYID, GetSetSecurityID },
  { SMI_SETDOMAINID, GetSetDomainID },
  { SMI_SETLOCKKBDMOUSE,
GetSetLockKbdMouse },
  { SMI_SETDIMSCREEN, GetSetDimScreen },
  { SMI_SETVIDEOBLOCK, BlockUnblockVideo },
  { SMI_NOTIFYSCRCODE, NotifyScreenCode },
  { 0, 0 }
};
```

```
APIFUNC *GetSUIFuncTable( void )
{
 return ( aAPIFuncTable );
}

CALLREC FAR *GetSUICallRec( void )
{
 return ( ( CALLREC FAR *)&SUICallRec );
}

TRAPREC *GetSUIMouseTrapRec( void )
{
 SUIMouseTrapRec.tr_int = PND_INTNUM;
 SUIMouseTrapRec.tr_asm_srv =
CRU_REFLECTINT;

 return ( &SUIMouseTrapRec );
}

int GetCurrActionCode( void )
{
 return ( ActionCode );
}

WORD GetCurrScrCode( void )
{
 return ( wScreenCode );
}

void SetCurrScrCode( WORD wNewScreenCode )
{
 wScreenCode = wNewScreenCode,
}

char GetSUIStatus( void )
{
 return ( nSUIStatus );
}

void InitSUICallRec( void )
{
 DWORD dwCallService = ( DWORD )( FARPROC
)SUICallService;
 fil_chr( ( NPSTR )&SUICallRec, 0, sizeof(
CALLREC ) ),

 SUICallRec.cFarCallOpCode =
SMD_CALLOPCODE,
 SUICallRec.aCallBack[0] = LOBYTE( LOWORD(
dwCallService ) );
 SUICallRec.aCallBack[1] = HIBYTE( LOWORD(
dwCallService ) ),
 SUICallRec.aCallBack[2] = LOBYTE( HIWORD(
dwCallService ) );
 SUICallRec.aCallBack[3] = HIBYTE( HIWORD(
dwCallService ) );
 SUICallRec.cFarRetOpCode =
SMD_RETOPCODE;
 strcpy( SUICallRec.szSMAfterSignature,
SIG_SMSIGNATURE );

 dwOldSUIIntVec = set_int_vec( SMI_SUIINTNUM,
( DWORD )( (
FARPROC )&SUICallRec ) );
}

void RestoreOldSUIIntVec( void )
{
 set_int_vec( SMI_SUIINTNUM, dwOldSUIIntVec ),
}

BOOL GetSUIReady( void )
{
 return ( lpfnSUICallBack != ( SUICB )NULL &&
nSUIStatus ==
SMI_SUILOADED );
}

APIFUNCRET SetActiveStatus( struct REGW
*CallerRegs )
{
 PCB_BEGINCRITICAL
 lpfnSUICallBack = ( SUICB )MK_FP(
CallerRegs->dx,
CallerRegs->si ),
 PCB_ENDCRITICAL

 wSUIPSP = get_cur_psp();

 CallerRegs->ax = SUI_PARTIALDIALOGSET;
 SetForegroundRegs( CallerRegs );

 nSUIStatus = SMI_SUILOADED;
}

APIFUNCRET RequestUnload( struct REGW
*CallerRegs )
{
 if ( !GetRequestHostList() &&
     GetConnectRequested() ==
SCS_NOCONNECTREQUESTED &&
     GetSCSCallProgress() ==
SMI_SCSCONNECTED )
 {
  CallerRegs->ax = SMI_UNLOADACCEPTED;
  UnloadSUI( SUI_NOUNLOADSUI );
 }
 else
  CallerRegs->ax = SMI_UNLOADDENIED;

 SetForegroundRegs( CallerRegs );
}

APIFUNCRET RequestConnDisco( struct REGW
*CallerRegs )
{
 if ( GetConnectRequested() )
  CallerRegs->ax = ERR_SUCCESS;
 else
 {
  if ( IsGetFunction( CallerRegs ) )
  {
   if ( GetSCSCallProgress() ==
SMI_SCSCONNECTED )
    CallerRegs->ax = DiscoDisableConnection();
   else
    CallerRegs->ax = ( WORD )ERR_INTERNAL;
  }
  else
  {
   if ( GetLBCurrHost() ==
HLb_NOHOSTSELECTED )
   {
    OpenMessageBox(
STR_SUINOHOSTSELECTED, 0,
SUI_CENTERJUSTIFIED, SUI_OK ):
    CallerRegs->ax = ( WORD )ERR_INTERNAL;
   }
   else
    CallerRegs->ax = MakeTheConnection( TRUE.
FALSE );
  }
 }

 SetForegroundRegs( CallerRegs ):
}

APIFUNCRET GetConnectStatus( struct REGW
*CallerRegs )
{
 char *szHostName;
 int iCallProgress;
 int iProtocolId;
 int iReturn;


 if ( !GetSCSActiveStatus() )
 {
  iReturn = ERR_NOTSUPPORTED;
  goto exit;
 }

 iProtocolId = GetSCSProtocolId();
 iCallProgress = GetSCSCallProgress();

 fil_chr( &CurrHostName, 0, sizeof (
CURRHOSTNAME ) );
 CurrHostName.lpszHostName = szNullStr;

 BuffHead.iStructLen = sizeof ( CURRHOSTNAME
);
 BuffHead.iBuffLen = sizeof ( CURRHOSTNAME );
 BuffHead.Buff = ( LPVOID )&CurrHostName;

 CallerRegs->dx = SEG( &BuffHead );
 CallerRegs->si = OFF( &BuffHead );

 switch ( iCallProgress )
 {
  case SMI_SCSCONNECTED:
   iReturn = SMI_CONNECTED;

   if ( ( szHostName = GetCurrHostName() ) !=
NULL )
    CurrHostName.lpszHostName = ( LPSTR
)szHostName;
   break;

  case SMI_SCSWAITINGFORCONNECT:
   iReturn = SMI_CONNECTED;
   break;

  case SMI_SCSDIALING:
   iReturn = SMI_CONNECTED:
   break;

  case SMI_SCSLOGGINGIN:
   iReturn = SMI_LOGGINGIN;
   break;

  case SMI_SCSDISCONNECTED:
   iReturn = SMI_DISCONNECTED;
   break;

  default:
   iReturn = ERR_INTERNAL;
   break;
 }

 CallerRegs->ax = iReturn;

 switch ( iProtocolId )
 {
  case SMI_SCSNETWARESPX:
   iReturn = SMI_NETWARESPX;
   break;

  case SMI_SCSASYNC:
   iReturn = SMI_MODEM;
   break;

  default:
   iReturn = ERR_INTERNAL;
   break;
 }

exit:
 CallerRegs->bx = iReturn:
 SetForegroundRegs( CallerRegs );
}

APIFUNCRET BlockUnblockVideo( struct REGW
*CallerRegs )
{
 PCB_BEGINCRITICAL,
 fVideoBlocked = !IsGetFunction( CallerRegs );
 PCB_ENDCRITICAL,

 CallerRegs->ax = BlockSCOSVideo( ( BYTE
)fVideoBlocked );

 SetForegroundRegs( CallerRegs );
}

BOOL GetVideoBlocked( void )
{
 return ( fVideoBlocked );
}


int LoadSUI( SUIACTIONCODE NewActionCode,
WORD wNewScreenCode )
{
 WORD wCurrVidMode;
 BYTE nCurrHostMode,

 if ( NewActionCode == SUI_LASTOSKSCREEN )
 {
  if ( IsNoScreen( UIConfigData.nLastOSKScreen )
)
   wNewScreenCode = SUI_BIGALPHA;
  else
   wNewScreenCode =
UIConfigData.nLastOSKScreen;
 }
 else if ( NewActionCode ==
SUI_LASTSETUPDLGSCREEN )
 {
  if ( IsNoScreen(
UIConfigData.nLastSetupDlgScreen ) )
   wNewScreenCode = SUI_HOSTSELECTION;
  else
   wNewScreenCode =
UIConfigData.nLastSetupDlgScreen;
 }

 if ( ( IsSetupDlg( wScreenCode ) && IsSetupDlg(
wNewScreenCode
) ) ||
     ( IsOSK( wScreenCode ) && IsOSK(
wNewScreenCode ) ) )
  return ( ERR_INTERNAL );
 else if ( IsSetupDlg( wScreenCode ) && IsOSK(
wNewScreenCode )
)
  return ( ERR_INTERNAL );

 ActionCode = NewActionCode;

 if ( nSUIStatus == SMI_SUINOTLOADED )
  nSUIStatus = SMI_SUILOADING;

 if ( GetSUIReady() )
  wOldScreenCode = wScreenCode;

 if ( ( iPrepSUIThreadIdx = GetTempEventNum() )
== ERR_INTERNAL
)
  return ( ERR_INTERNAL );

 AddThread( iPrepSUIThreadIdx, WaitForPrepSUI,
NULL, SMD_POLLED,
FALSE,
       SUI_LOADSUIPOLLFREQ, 0 );

 wScreenCode = wNewScreenCode;

 if ( IsOSK( wScreenCode ) )
 {
  wCurrVidMode = GetCurrVidMode();
  nCurrHostMode = GetCurrHostMode();

  if ( !IsOSKVideoSupported( wCurrVidMode ) &&
nCurrHostMode ==
PND_DOSAPP )
    wScreenCode |=
SUI_OSKASSETUPDIALOGMASK;

  if ( wCurrVidMode != SUI_TEXTVIDMODE &&
nCurrHostMode !=
PND_DOSAPP )
    wScreenCode |=
SUI_OSKINWINGRAPHICSMASK;
 }

 return ( ERR_SUCCESS );
}



void WaitForPrepSUI( void )
{
 static PREPSUISTATES iStatePrepSUI =
SUI_NOPREPSTATE;
 int iCheck;

 switch ( iStatePrepSUI )
 {
  case SUI_NOPREPSTATE:
   if ( IsSetupDlg( wScreenCode ) || IsNoScreen(
wScreenCode )
)
   {

    TRACE( "NOTICE: Setup Dialogs or 'No
Screen'
requested.\r" );

    SetMonitor( FALSE, TRUE );
    iStatePrepSUI = SUI_CHECKMONITOROFF;


   }
   else if ( IsOSKAsSetupDlg( wScreenCode ) )
   {
    TRACE( "NOTICE: OSK as Setup Dialog
requested.\r" );
    SetMonitor( FALSE, FALSE );
    iStatePrepSUI = SUI_CHECKMONITOROFF;


   }
   else
   {
    TRACE( "NOTICE: DOS or Windows OSK
requested, nothing
else to do!\r" ):
    iStatePrepSUI = SUI_PREPSUCCESS;
   }
   break;

  case SUI_CHECKMONITOROFF:
   iCheck = CheckMonitor();

   if ( iCheck == ERR_SUCCESS )
   {
    if ( IsOSKAsSetupDlg( wOldScreenCode ) )
    {
     TRACE( "NOTICE: Monitor off complete, old
screen - OSK
as setup dialog\r" );
     iStatePrepSUI = SUI_PREPSUCCESS;
    }
    else if ( IsOSK( wOldScreenCode ) )
    {
     TRACE( "NOTICE: Monitor off complete, old
screen -
OSK\r" );
     RequestFullRepaint( FALSE,
wOldScreenCode );
     iStatePrepSUI = SUI_CHECKFULLREPAINT;
    }
    else
    {
     TRACE( "NOTICE: Monitor off complete, no
old screen\r"
```

```
);
        iStatePrepSUI = SUI_PREPSUCCESS;
      }
    }
    else if ( iCheck == ERR_INTERNAL )
      iStatePrepSUI = SUI_PREPERROR;
    break;

   case SUI_CHECKFULLREPAINT:
    iCheck = CheckFullRepaint();

    if ( iCheck == ERR_SUCCESS )
    {
      TRACE( "NOTICE: Occlusion region in SCOS
closed through
Full Repaint\r" );
      iStatePrepSUI = SUI_PREPSUCCESS;
    }
    else if ( iCheck == ERR_INTERNAL )
    {
      TRACE( "ERROR: Closure of occlusion region
failed in SCOS
through Full Repaint\r" );
      iStatePrepSUI = SUI_PREPERROR;
    }
    break;

   case SUI_PREPSUCCESS
    TRACE( "NOTICE: We're here, we're here!\r" );

    InitSUI();
    SMDosBusy( CBExecSUI );
    goto exit;

   case SUI_PREPERROR
    TRACE( "ERROR: SUI Load Prep failed\r" );

    if ( nSUIStatus == SMI_SUILOADING )
      nSUIStatus = SMI_SUINOTLOADED;
    else
      nSUIStatus = SMI_SUIINACTIVE;

   default
exit
    iStatePrepSUI = SUI_NOPREPSTATE;
    DelThread( iPrepSUIThreadIdx );
    break;
  }
}

void CBExecSUI( void )
{
  int iVideoMode = GetCurrVidMode();

  if ( GetSCSCallProgress() ==
SMI_SCSCONNECTED )
  {
   if ( IsSetupDlg( wScreenCode ) || IsNoScreen(
wScreenCode ) )

   {
     if ( iVideoMode != SUI_INITIALVIDMODE )
       SetVideoMode( SUI_INITIALVIDMODE );
   }
   else
   {
     if ( !IsOSKVideoSupported( iVideoMode ) &&
GetCurrHostMode() == PND_DOSAPP )
     {
       SetVideoMode( SUI_INITIALVIDMODE );
     }
   }
  }
  else
   SetVideoMode( SUI_INITIALVIDMODE );

  if ( nSUIStatus == SMI_SUILOADING )
  {
   if ( !at_dos_prompt() )
   {
     _and_isr_flg( ~SMD_SCHEDULERS );

     if ( JimExec( szSUIExecName, NULL ) !=
ERR_SUCCESS )
     {
       SetVideoMode( SUI_TEXTVIDMODE );
       dspf( STR_SUILOADERROR1 );
     }
     else
     {
       if ( ( iTempThreadIdx = GetTempEventNum() )
< 0 )
         return;

       AddThread( iTempThreadIdx,
WaitForSUILoad, NULL,
SMD_POLLED, FALSE,
              SUI_LOADSUIPOLLFREQ,
SUI_LOADSUIMAXRETRY );
      }
    }
    else
    {
      SetVideoMode( SUI_TEXTVIDMODE );
      dspf( STR_SUILOADERROR2 );
    }
  }
  else
  {
    nSUIStatus = SMI_SUILOADED;
    SMDosBusy( CBExecLoadScreen );
  }
}

void WaitForSUILoad( void )
{
  if ( GetSUIReady() )
  {
    DelThread( iTempThreadIdx );
    iTempThreadIdx = SMD_NOACTIVETHREAD;

    SMDosBusy( CBExecLoadScreen );
  }
}

void CBExecLoadScreen( void )
{
  if ( !GetSUIReady() )
    return;

  switch ( ActionCode )
  {
    case SUI_DOPENCALIBRATION
      SetSetupDlgMode( PND_SETUPDLGON );
      DoMessageBox( NULL,
SUI_PENCALIBRATION, SUI_LEFTJUSTIFIED,
SUI_CANCEL,
              CBMsgBoxButtonPressed, 0 );
      break;

    case SUI_LASTCONNECTION.
      SetSetupDlgMode( PND_SETUPDLGON );
      ResumeTheConnection();
      break;

    case SUI_BADVIDEOMSG:
      SetSetupDlgMode( PND_SETUPDLGON );
      DoMessageBox( STR_SUIBADVIDEOMSG, 0,
SUI_CENTERJUSTIFIED,
SUI_OK,
              CBMsgBoxButtonPressed, 0 );
      break;

    default:
      if ( IsSetupDlg( wOldScreenCode ) )
        SetSetupDlgMode( PND_SETUPDLGOFF );
      else if ( IsOSK( wOldScreenCode ) &&
!IsOSKAsSetupDlg(
wOldScreenCode ) )
        SetOSKMode( NULL, SUI_NOOCCTYPE );

      if ( IsSetupDlg( wScreenCode ) ||
IsOSKAsSetupDlg(
wScreenCode ) )
        SetSetupDlgMode( PND_SETUPDLGON );
      DoLoadScreen();
      break;
  }
}

void DoLoadScreen( void )
{
  int iNewScreenCode = LOBYTE( wScreenCode );
  int iOSKConfig;
  int xPosOSK, yPosOSK;

  if ( IsSetupDlg( wScreenCode ) || IsNoScreen(
wScreenCode ) )
  {
    iOSKConfig = UIConfigData.nLastOSKDlgScreen;
    xPosOSK = 0;
    yPosOSK = 0;
  }
  else
  {
    iOSKConfig = 0;
    xPosOSK = UIConfigData.xPosLastOSKScreen;
    yPosOSK = UIConfigData.yPosLastOSKScreen;
  }

  if ( !IsNoScreen( wScreenCode ) )
  {
    EnableBusyCursor( SUI_BUSYCURSOROFF );


    PCB_BEGINCRITICAL
    AX( SUI_DISPLAYDIALOG );
    BX( iNewScreenCode );
    CX( iOSKConfig );
    SI( yPosOSK );
    DI( xPosOSK );

    ( *lpfnSUICallBack )();
    PCB_ENDCRITICAL
  }
}

int UnloadSUI( BYTE nNewResidentStatus )
{
  if ( !GetSUIReady() )
    return ( ERR_INTERNAL );

  SetWaitingIcon( SBS_WAITINGICONON, TRUE );


  if ( nNewResidentStatus == SUI_UNLOADSUI )
    nSUIStatus = SMI_SUIUNLOADING;
  else
    nSUIStatus = SMI_SUIDEACTIVATING;

  nResidentStatus = nNewResidentStatus;

  if ( IsNoScreen( wScreenCode ) )
    HideMessageBox();

  if ( ( iUnloadSUIThreadIdx = GetTempEventNum()
) < 0 )
    return ( ERR_INTERNAL );

  AddThread( iUnloadSUIThreadIdx
WaitForUnloadSUI, NULL,
SMD_POLLED, FALSE,
        SUI_UNLOADSUIPOLLFREQ, 0 );

  if ( GetThreadAddress( SCS_DISCOEVENTNUM )
== NULL )
    AddThread( SCS_DISCOEVENTNUM,
WaitForStatusChange, NULL,
          SMD_POLLED, FALSE,
SCS_DISCOPOLLFREQ, 0 );

  return ( ERR_SUCCESS );
}

void WaitForUnloadSUI( void )
{
  static UNLOADSUISTATES iStateUnloadSUI =
SUI_NOUNLOADSUISTATE;

  switch ( iStateUnloadSUI )
  {
    case SUI_NOUNLOADSUISTATE:
      if ( !IsOSK( wScreenCode ) )
      {
        SetEEUIData();
        iStateUnloadSUI = SUI_GETACTIVEUPDATE;
      }
      else
        iStateUnloadSUI =
SUI_UNLOADSUISUCCESS;
      break;

    case SUI_GETACTIVEUPDATE:
      GetActiveUpdate();
      SetTimeLimit( iUnloadSUIThreadIdx,
SUI_PRIMSGPOLLFREQ );
      iStateUnloadSUI = SUI_DIMSCREEN,
      break;

    case SUI_DIMSCREEN:
      TRACE( "NOTICE: In the SUI_DIMSCREEN
state.\r" );
      SendDimScreen( UIConfigData.bDimScreen );
      SetTimeLimit( iUnloadSUIThreadIdx,
SUI_PRIMSGPOLLFREQ );
      iStateUnloadSUI = SUI_LOCKKBDMOUSE;

      break;

    case SUI_LOCKKBDMOUSE:
      TRACE( "NOTICE: In the
SUI_LOCKKBDMOUSE state.\r" );
      SendLockKbdMouse(
UIConfigData.bLockKbdMouse );
      SetTimeLimit( iUnloadSUIThreadIdx,
SUI_LOADSUIPOLLFREQ );
      iStateUnloadSUI =
SUI_UNLOADSUISUCCESS;
      break;

    case SUI_UNLOADSUISUCCESS:
    default:
      DelThread( iUnloadSUIThreadIdx ).
      SMDosBusy( CBExecUnloadSUI ),
      iStateUnloadSUI = SUI_NOCLEANUPSTATE;
      break;
  }
}

void CBExecUnloadSUI( void )
{
  lpfnTempProc = lpfnSUICallBack,

  if ( IsSetupDlg( wScreenCode ) || IsNoScreen(
wScreenCode ) ||
      IsOSKAsSetupDlg( wScreenCode ) )
    SetSetupDlgMode( PND_SETUPDLGOFF );
  else if ( IsOSK( wScreenCode ) )
    SetOSKMode( NULL, SUI_NOOCCTYPE );

  if ( nResidentStatus == SUI_UNLOADSUI )
    lpfnSUICallBack = NULL;

  PSP_TERMINATE( wSUIPSP ) = ( LONG )(
FARPROC
)SUITerminateAddress.

  _asm
  {
    cli


    mov wSavedSP, sp
    mov wSavedBP, bp
    mov ax, SUI_CLOSEDIALOG
    xor bx,bx
    mov bl, nResidentStatus

    sti
  };

  ( *lpfnTempProc )( );

  if ( nResidentStatus == SUI_NOUNLOADSUI )
    CleanupUnloadSUI();

}

void SUITerminateAddress( void )
{
  _asm
  {
    mov ds, cs:000Ah
    mov ss, cs:000Ah
    mov sp. wSavedSP
    mov bp, wSavedBP
  };

  CleanupUnloadSUI();
}

void CleanupUnloadSUI( void )
{
  MREG MInArgs;

  if ( nResidentStatus == SUI_UNLOADSUI )
  {
    if ( !GetPNDActiveStatus() )
    {
      MInArgs = MEventOutArgs;
      MInArgs.ax = 0x000C;
      mouse( &MInArgs, &MEventOutArgs );
    }
  }

  AddThread( SUI_CLEANUPEVENTNUM,
WaitForCleanupSUI, NULL,
SMD_POLLED, FALSE,
        SUI_LOADSUIPOLLFREQ, 0 );
}

void WaitForCleanupSUI( void )
{
  static CLEANUPSUISTATES iStateCleanupSUI =
SUI_NOCLEANUPSTATE;
  int iCheck;

  switch ( iStateCleanupSUI )
  {
    case SUI_NOCLEANUPSTATE:
      if ( IsSetupDlg( wScreenCode ) || IsNoScreen(
wScreenCode )
||
          IsOSKAsSetupDlg( wScreenCode ) )
      {
        TRACE( "NOTICE: Unload of Setup Dialogs or
OSK-As-Setup-Dialog identified.\r" );
        SetMonitor( TRUE, FALSE );
        iStateCleanupSUI =
SUI_CHECKMONITORON;
      }
      else if ( IsOSKVidChange( wScreenCode ) )

      {
        TRACE( "NOTICE: Unload of OSK due to vid
change from DOS
or Windows identified.\r" );
```

```
      RequestFullRepaint( FALSE, wScreenCode );

      iStateCleanupSUI =
SUI_CHECKFULLPAINTCLEANUP;
    }
    else
    {
      TRACE( "NOTICE: Manual unload of OSK
from DOS or Windows
identified.\r" );
      RequestFullRepaint( TRUE, wScreenCode );

      iStateCleanupSUI =
SUI_CHECKFULLPAINTCLEANUP;
    }
    break;

  case SUI_CHECKMONITORON:
    iCheck = CheckMonitor();

    if ( iCheck == ERR_SUCCESS )
    {
      TRACE( "NOTICE: CoSession monitor on
mode successful.\r"
);
      iStateCleanupSUI =
SUI_CLEANUPSUCCESS
    }
    else if ( iCheck == ERR_INTERNAL )
    {
      TRACE( "NOTICE: CoSession monitor on
mode failed \r" );
      iStateCleanupSUI = SUI_CLEANUPERROR;
    }
    break;

  case SUI_CHECKFULLPAINTCLEANUP:
    iCheck = CheckFullRepaint();

    if ( iCheck == ERR_SUCCESS )
    {
      if ( IsOSKVidChange( wScreenCode ) )

      {
        if ( IsOSKWinGraphics( wScreenCode ) )

        {
          TRACE( "NOTICE: Full Repaint successful
for vid
change in SRWIN for Windows OSK\r" );
          iStateCleanupSUI =
SUI_CLEANUPSUCCESS
        }
        else
        {
          TRACE( "NOTICE: Full Repaint successful
for vid
change in DOS or DOS Graphics OSK\r" );
          SetMonitor( TRUE, FALSE );
          iStateCleanupSUI =
SUI_CHECKMONITORON;
        }
      }
      else
      {
#if !defined( PROD )
        if ( IsOSKWinGraphics( wScreenCode ) )

        {
          TRACE( "NOTICE: Full Repaint successful
for Windows
OSK\r" );
        }
        else
        {
          TRACE( "NOTICE: Repaint successful for
DOS or DOS
Graphics OSK\r" );
        }
#endif
        iStateCleanupSUI =
SUI_CLEANUPSUCCESS;
      }
    }
    else if ( iCheck == ERR_INTERNAL )
    {
      TRACE( "NOTICE: Full Repaint failed for OSK
of unknown
type\r" );
      iStateCleanupSUI = SUI_CLEANUPERROR;
    }
    break;

  case SUI_CLEANUPSUCCESS:
    TRACE( "NOTICE: SUI cleanup successful\r" );

  case SUI_CLEANUPERROR:
  default:
    if ( nResidentStatus == SUI_UNLOADSUI )
      nSUIStatus = SMI_SUINOTLOADED;
    else
      nSUIStatus = SMI_SUIINACTIVE;

    fil_chr( szPassword, 0, sizeof ( szPassword ) );

    wScreenCode = wOldScreenCode =
SUI_NOSCREEN;
    iStateCleanupSUI = SUI_NOCLEANUPSTATE;
    DelThread( SUI_CLEANUPEVENTNUM );
    SetWaitingIcon( SBS_WAITINGICONOFF,
TRUE );
    break;
  }
}

#if defined( _MSC_VER )
#pragma warning( default : 4704 )
#endif
Copr. 1995 Zenith Data Systems Corp.
#include "cr.h"
#include "sio.h"
#include "spawn.h"
#include "k2.h"
#include "lm.h"
#include "sm.h"

#if defined( _MSC_VER )
#pragma warning( disable : 4704 )
#endif

static BYTE fSecurityWarning = FALSE;
static BYTE fDomainWarning = FALSE;
static BYTE nMsgBoxReturnCode = 0;
static int iProcMsgBoxThreadIdx = -1;

void SetDomainWarning( BYTE
fNewDomainWarning )
{
  fDomainWarning = fNewDomainWarning;
}

void SetSecurityWarning( BYTE
fNewSecurityWarning )
{
  fSecurityWarning = fNewSecurityWarning;
}

void SetMsgBoxReturnCode( BYTE
nNewReturnCode )
{
  PCB_BEGINCRITICAL;
  nMsgBoxReturnCode = nNewReturnCode;
  PCB_ENDCRITICAL;
}

BYTE GetMsgBoxReturnCode( void )
{
  BYTE nReturnCode = nMsgBoxReturnCode;

  nMsgBoxReturnCode = 0;

  return ( nReturnCode );
}

APIFUNCRET SetSUIMBRetCode( struct REGW
*CallerRegs )
{
  SetMsgBoxReturnCode( LOBYTE( CallerRegs->bx
) );

  CallerRegs->ax = ERR_SUCCESS;

  SetForegroundRegs( CallerRegs );
}

APIFUNCRET SetKeyStroke( struct REGW
*CallerRegs )
{
  BYTE nHiScanByte;

  if ( ( nHiScanByte = HIBYTE( CallerRegs->bx ) ) >
0 )
    SendScanCode( nHiScanByte );

  SendScanCode( LOBYTE( CallerRegs->bx ) );

  CallerRegs->ax = ERR_SUCCESS;

  SetForegroundRegs( CallerRegs );
}

APIFUNCRET GetSetLockKbdMouse( struct REGW
*CallerRegs )
{
  BOOL bLockKbdMouse;

  if ( IsGetFunction( CallerRegs ) )
    CallerRegs->ax = UIConfigData.bLockKbdMouse
?
SMI_ENABLEDLOCKKBDMOUSE :
          SMI_DISABLEDLOCKKBDMOUSE;
  else
  {
    bLockKbdMouse = ( CallerRegs->bx == ( WORD
)SMI_ENABLEDLOCKKBDMOUSE );
    CallerRegs->ax = ERR_SUCCESS;

    if ( GetSCSCallProgress() ==
SMI_SCSCONNECTED )
    {
      if ( SendLockKbdMouse( bLockKbdMouse ) ==
ERR_SUCCESS )
        UIConfigData.bLockKbdMouse =
bLockKbdMouse;
      else
        CallerRegs->ax = ( WORD )ERR_INTERNAL;
    }
    else
      UIConfigData.bLockKbdMouse =
bLockKbdMouse;
  }

  SetForegroundRegs( CallerRegs );
}

APIFUNCRET GetSetDimScreen( struct REGW
*CallerRegs )
{

  BOOL bDimScreen;

  if ( IsGetFunction( CallerRegs ) )
    CallerRegs->ax = UIConfigData.bDimScreen ?
SMI_ENABLEDDIMSCREEN
          SMI_DISABLEDDIMSCREEN;
  else
  {
    bDimScreen = ( CallerRegs->bx == ( WORD
)SMI_ENABLEDDIMSCREEN
);
    CallerRegs->ax = ERR_SUCCESS;

    if ( GetSCSCallProgress() ==
SMI_SCSCONNECTED )
    {
      if ( SendDimScreen( bDimScreen ) ==
ERR_SUCCESS )
        UIConfigData.bDimScreen = bDimScreen;
      else
        CallerRegs->ax = ( WORD )ERR_INTERNAL;
    }
    else
      UIConfigData.bDimScreen = bDimScreen;
  }

  SetForegroundRegs( CallerRegs );
}

APIFUNCRET GetSetConnectType( struct REGW
*CallerRegs )
{
  if ( CallerRegs->ax & 0x8000 )
    CallerRegs->ax = UIConfigData.bConnectType;
  else
    UIConfigData.bConnectType = CallerRegs->ax;

  SetForegroundRegs( CallerRegs );
}

APIFUNCRET GetKeyBoardStatus( struct REGW
*CallerRegs )
{
  CallerRegs->ax = SMI_KBDNOTPRESENT;
  SetForegroundRegs( CallerRegs );
}

APIFUNCRET GetAboutDialog( struct REGW
*CallerRegs )
{
  char szTempStr[ STR_STRMAXLENERR ];
  int iBIOSVersionNum = GetBIOSVersion();
  int iMsgBoxTotalLines;

  sprintf( szTempStr, STR_SMABOUTBOX,
szSMVersionName, HIBYTE(
iBIOSVersionNum ),
        LOBYTE( iBIOSVersionNum ) );

  iMsgBoxTotalLines = FillMsgBoxBuff( MsgBoxBuff,
szTempStr.
SUI_CENTERJUSTIFIED );

  BuffHead.iStructLen = sizeof ( MSGBOXBUFF );
  BuffHead.iBuffLen = sizeof ( MSGBOXBUFF ) *
iMsgBoxTotalLines:
  BuffHead.Buff = ( LPVOID )MsgBoxBuff;

  CallerRegs->ax = ( WORD )ERR_SUCCESS;
  CallerRegs->dx = SEG( &BuffHead );
  CallerRegs->si = OFF( &BuffHead );

  SetForegroundRegs( CallerRegs );
}

APIFUNCRET GetSetUDHotIcon( struct REGW
*CallerRegs )
{
  BUFFHEADER FAR *pBuffHeader;
  SCANCODE FAR *pScanCodes;
  int iBuffLen;


  if ( IsGetFunction( CallerRegs ) )
  {
    if ( CallerRegs->bx == SUI_UDHOTICON1 )
      pScanCodes = UIConfigData.aUDHotIcon1,
    else
      pScanCodes = UIConfigData.aUDHotIcon2;

    BuffHead.Buff = ( LPVOID )pScanCodes;
    BuffHead.iBuffLen = GetNumScanCodes(
pScanCodes ) * sizeof (
SCANCODE ),
    BuffHead.iStructLen = sizeof ( SCANCODE );

    CallerRegs->dx = SEG( &BuffHead );
    CallerRegs->si = OFF( &BuffHead );
    CallerRegs->ax = ERR_SUCCESS,
  }
  else
  {
    pBuffHeader = MK_FP( CallerRegs->dx,
CallerRegs->si );
    pScanCodes = ( SCANCODE FAR *
)pBuffHeader->Buff;

    if ( pBuffHeader == NULL || pScanCodes ==
NULL )
      CallerRegs->ax = ( WORD )ERR_INTERNAL;
    else if ( pBuffHeader->iStructLen == 0 ||
pBuffHeader->iBuffLen == 0 )
      CallerRegs->ax = ( WORD )ERR_INTERNAL;
    else
    {
      iBuffLen = pBuffHeader->iBuffLen >
SUI_MAXNUMSCANCODES *
sizeof ( SCANCODE ) ?
          SUI_MAXNUMSCANCODES * sizeof (
SCANCODE ) :
pBuffHeader->iBuffLen;

      if ( CallerRegs->bx == SUI_UDHOTICON1 )
      {
        fil_chr( UIConfigData.aUDHotIcon1, 0,
          SUI_MAXNUMSCANCODES * sizeof (
SCANCODE ) );
        fmem_cp( ( LPVOID )pScanCodes, ( LPVOID
)UIConfigData.aUDHotIcon1,
          iBuffLen );
      }
      else
      {
        fil_chr( UIConfigData.aUDHotIcon2, 0,
          SUI_MAXNUMSCANCODES * sizeof (
SCANCODE ) );
        fmem_cp( ( LPVOID )pScanCodes, ( LPVOID
)UIConfigData.aUDHotIcon2,
          iBuffLen );
      }

      CallerRegs->ax = ERR_SUCCESS;
    }
  }

  SetForegroundRegs( CallerRegs );
}

APIFUNCRET GetSetSecurityID( struct REGW
*CallerRegs )
{
  LPSTR lpszNewSecurityID,
  int iLenSecurityID;

  if ( IsGetFunction( CallerRegs ) )
  {
```

```
  CallerRegs->dx = SEG(
UIConfigData.szSecurityID );
  CallerRegs->si = OFF( UIConfigData.szSecurityID
);
  CallerRegs->ax = ERR_SUCCESS;
 }
 else
 {
  if ( GetSCSCallProgress() ==
SMI_SCSDISCONNECTED )
  {
   lpszNewSecurityID = MK_FP( CallerRegs->dx,
CallerRegs->si
);
   iLenSecurityID = fstr_len( lpszNewSecurityID );

   if ( lpszNewSecurityID != NULL &&
      iLenSecurityID <=
SUI_MAXLENSECURITYSUI )
   {
    fmem_cp( ( LPVOID )lpszNewSecurityID, (
LPVOID
)UIConfigData.szSecurityID,
        iLenSecurityID + 1 );

    CallerRegs->ax = SetSecurityID(
UIConfigData.szSecurityID
);
   }
   else
    CallerRegs->ax = ( WORD )ERR_INTERNAL;
  }
  else
  {
   if ( !fSecurityWarning )
   {
    OpenMessageBox( STR_SUISECURITYID, 0,
SUI_LEFTJUSTIFIED,
SUI_OK );
    fSecurityWarning = TRUE;
   }

   CallerRegs->ax = ( WORD )ERR_INTERNAL;
  }
 }

 SetForegroundRegs( CallerRegs );
}

APIFUNCRET GetSetDomainID( struct REGW
*CallerRegs )
{
 char nNewDomainID;

 if ( IsGetFunction( CallerRegs ) )
 {
  CallerRegs->ax = ( WORD
)UIConfigData.nDomainID;
 }
 else
 {
  nNewDomainID = LOBYTE( CallerRegs->bx );

  if ( nNewDomainID >= PRX_MINDOMAINID &&
nNewDomainID <=
PRX_MAXDOMAINID )
  {
   UIConfigData.nDomainID = nNewDomainID;

   if ( !fDomainWarning )
   {
    OpenMessageBox( STR_SUIDOMAINID, 0,
SUI_LEFTJUSTIFIED,
SUI_OK );
    fDomainWarning = TRUE;
   }

   CallerRegs->ax = ERR_SUCCESS;
  }
  else
   CallerRegs->ax = ( WORD )ERR_INTERNAL;
 }

 SetForegroundRegs( CallerRegs );
}

APIFUNCRET GetSetUILanguage( struct REGW
*CallerRegs )
{
 CallerRegs->ax = ( WORD )SMI_UIUSENGLISH;

 SetForegroundRegs( CallerRegs );
}

APIFUNCRET RebootHost( struct REGW
*CallerRegs )
{
 REG_W InArgs, OutArgs;

 fil_chr( ( NPSTR )&InArgs, 0, sizeof ( InArgs ) );

 InArgs.ax = SCS_REBOOTHOST;

 intn( &InArgs, &OutArgs, SCS_INTNUM );

 if ( OutArgs.ax == SCS_ACCEPTED )
  CallerRegs->ax = ERR_SUCCESS;
 else
  CallerRegs->ax = ( WORD )ERR_INTERNAL;

 SetForegroundRegs( CallerRegs );
}

APIFUNCRET GetPasswordStatus( struct REGW
*CallerRegs )
{
 CallerRegs->ax = ( WORD )IsPWRequired();

 SetForegroundRegs( CallerRegs );
}

APIFUNCRET GetSetPassword( struct REGW
*CallerRegs )
{
 LPSTR szNewPassword;

 if ( IsGetFunction( CallerRegs ) )
 {
  CallerRegs->dx = SEG( szPassword );
  CallerRegs->si = OFF( szPassword );
 }
 else
 {
  szNewPassword = ( LPSTR )MAKELP(
CallerRegs->dx,
CallerRegs->si );
  fmem_cp( ( LPVOID )szNewPassword, ( LPVOID
)szPassword,
       SUI_MAXLENPASSWORD );
 }

 CallerRegs->ax = ERR_SUCCESS;

 SetForegroundRegs( CallerRegs );
}

APIFUNCRET UpdateHostList( struct REGW
*CallerRegs )
{
 CallerRegs->ax = ( WORD )RequestHostList();

 SetForegroundRegs( CallerRegs );
}

APIFUNCRET GetHostListStatus( struct REGW
*CallerRegs )
{


 if ( !GetSCSActiveStatus() )
  CallerRegs->ax = ( WORD
)ERR_NOTSUPPORTED;


 CallerRegs->ax = GetStatusHLInMem();

 SetForegroundRegs( CallerRegs );
}

APIFUNCRET LBGetSetNetGroup( struct REGW
*CallerRegs )
{
 if ( IsGetFunction( CallerRegs ) )
 {
  if ( GetStatusHLInMem() == SMI_BLANK )
  {
   CallerRegs->ax = ( WORD
)ERR_NOTSUPPORTED;
   goto exit;
  }

  if ( ( int )CallerRegs->bx > 0 )
  {
   ListBoxEntry.lpszEntry = ( LPSTR
)GetLBGroup(
CallerRegs->bx );
   ListBoxEntry.nAttribute =
SUI_LBENTRYENABLED;
   CallerRegs->dx = SEG( &ListBoxEntry );
   CallerRegs->si = OFF( &ListBoxEntry );
   CallerRegs->ax = ERR_SUCCESS;

  }
  else if ( ( int )CallerRegs->bx == 0 )
  {
   ListBoxEntry.lpszEntry = ( LPSTR
)GetLBGroup( -1 );
   ListBoxEntry.nAttribute =
SUI_LBENTRYENABLED;
   CallerRegs->dx = SEG( &ListBoxEntry ),
   CallerRegs->si = OFF( &ListBoxEntry );
   CallerRegs->ax = GetLBCurrGroup();
  }
  else
   CallerRegs->ax = GetNumGroupEntries();
 }
 else
 {
  SetLBCurrGroup( CallerRegs->bx );
  CallerRegs->ax = ERR_SUCCESS;
 }

exit:
 SetForegroundRegs( CallerRegs );
}

APIFUNCRET LBGetSetNetHost( struct REGW
*CallerRegs )
{
 if ( IsGetFunction( CallerRegs ) )
 {
  if ( GetStatusHLInMem() == SMI_BLANK )
  {
   CallerRegs->ax = ( WORD
)ERR_NOTSUPPORTED;
   goto exit;
  }

  if ( ( int )CallerRegs->bx > 0 )
  {
   ListBoxEntry.lpszEntry = ( LPSTR )GetLBHost(
CallerRegs->bx
);
   ListBoxEntry.nAttribute = GetLBHostStatus(
CallerRegs->bx
);
   CallerRegs->dx = SEG( &ListBoxEntry );
   CallerRegs->si = OFF( &ListBoxEntry );
   CallerRegs->ax = 0;
  }
  else if ( ( int )CallerRegs->bx == 0 )
  {
   ListBoxEntry.lpszEntry = ( LPSTR )GetLBHost(
SUI_LBCURRENTRY );
   ListBoxEntry.nAttribute = GetLBHostStatus(
SUI_LBCURRENTRY
);
   CallerRegs->dx = SEG( &ListBoxEntry );
   CallerRegs->si = OFF( &ListBoxEntry );
   CallerRegs->ax = ( WORD )GetLBCurrHost();
  }
  else
   CallerRegs->ax = GetNumHostEntries();
 }
 else
 {
  SetLBCurrHost( CallerRegs->bx );
  CallerRegs->ax = 0;
 }

exit
 SetForegroundRegs( CallerRegs );
}

APIFUNCRET UpdateDimenLoc( struct REGW
*CallerRegs )
{
 OCCLUDEUNION OccUnion;
 int iActualVidMode;

 CallerRegs->ax = ( WORD )ERR_SUCCESS;
 iActualVidMode = GetCurrVidMode();

 if ( !GetSCSActiveStatus() || IsSetupDlg(
wScreenCode ) ||
IsNoScreen( wScreenCode ) )
 {
  CallerRegs->ax = ( WORD
)ERR_NOTSUPPORTED;
  goto exit;
 }

 if ( CallerRegs->bx == 0xFFFF && CallerRegs->cx
== 0xFFFF &&
    CallerRegs->si == 0xFFFF && CallerRegs->di
== 0xFFFF )
 {
  UnloadSUI( SUI_NOUNLOADSUI );
 }
 else
 {
  if ( iActualVidMode > SUI_TEXTVIDMODE )
  {
   if ( IsOSKWinGraphics( wScreenCode ) )
   {
    OccUnion.occRWin.yULWin = CallerRegs->bx;
    OccUnion.occRWin.xULWin = CallerRegs->cx;
    OccUnion.occRWin.yLRWin = CallerRegs->si;
    OccUnion.occRWin.xLRWin = CallerRegs->di;

    CallerRegs->ax = CreateOccludedArea(
&OccUnion,
SUI_OCCRWIN, SCS_OSKFREEMEMPERCENT );
    SetOSKMode( &OccUnion, SUI_OCCRWIN );
   }
   else
   {
    OccUnion.occDosGraph.yULDos =
CallerRegs->bx;
    OccUnion.occDosGraph.xULDos =
CallerRegs->cx;
    OccUnion.occDosGraph.yLRDos =
CallerRegs->si;
    OccUnion.occDosGraph.xLRDos =
CallerRegs->di;

    CallerRegs->ax = CreateOccludedArea(
&OccUnion,
SUI_OCCDOSGRAPHICS,
SCS_OSKFREEMEMPERCENT );

    if ( !IsOSKAsSetupDlg( wScreenCode ) )

     SetOSKMode( &OccUnion.
SUI_OCCDOSGRAPHICS );
   }
  }
  else
  {
   OccUnion.occText.yULRow = CallerRegs->bx;
   OccUnion.occText.xULCol = CallerRegs->cx;
   OccUnion.occText.yLRRow = CallerRegs->si;
   OccUnion.occText.xLRCol = CallerRegs->di;

   CallerRegs->ax = CreateOccludedArea(
&OccUnion,
SUI_OCCDOSTEXT,
SCS_OSKFREEMEMPERCENT );
   SetOSKMode( &OccUnion, SUI_OCCDOSTEXT
);
  }
 }

exit.
 SetForegroundRegs( CallerRegs );
}

APIFUNCRET GetSetContrast( struct REGW
*CallerRegs )
{
 BYTE nContrastIdx;

 if ( IsGetFunction( CallerRegs ) )
  CallerRegs->ax = ( WORD
)UIConfigData.nContrastIdx,
 else
 {
  nContrastIdx = LOBYTE( CallerRegs->bx );

  if ( ( CallerRegs->ax = ( WORD )SetContrast(
nContrastIdx ) )
      == ERR_SUCCESS )
   UIConfigData.nContrastIdx = nContrastIdx;
 }

 SetForegroundRegs( CallerRegs );
}

APIFUNCRET GetSetBrightness( struct REGW
*CallerRegs )
{
 BYTE nBrightnessIdx;

 if ( IsGetFunction( CallerRegs ) )
  CallerRegs->ax = ( WORD
)UIConfigData.nBrightnessIdx;
 else
 {
  nBrightnessIdx = LOBYTE( CallerRegs->bx );

  if ( ( CallerRegs->ax = ( WORD )SetBrightness(
nBrightnessIdx
) )
      == ERR_SUCCESS )
   UIConfigData.nBrightnessIdx = nBrightnessIdx;
 }

 SetForegroundRegs( CallerRegs );
}

APIFUNCRET GetSetAutoShutOff( struct REGW
*CallerRegs )
```

```
{
  if ( IsGetFunction( CallerRegs ) )
    CallerRegs->ax = ( WORD
)UIConfigData.bAutoShutoff;
  else
  {
    if ( LOBYTE( CallerRegs->bx ) == TRUE )
    {
      CallerRegs->ax = SetSuspendTimeout(
SBS_SUSPENDIN60MIN );
      UIConfigData.bAutoShutoff = TRUE;
    }
    else
    {
      CallerRegs->ax = SetSuspendTimeout(
SBS_SUSPENDDISABLED );

      UIConfigData.bAutoShutoff = FALSE;
    }
  }

  SetForegroundRegs( CallerRegs );
}

APIFUNCRET GetSetSleepTime( struct REGW
*CallerRegs )
{
  BYTE nSleepTimeIdx;

  if ( IsGetFunction( CallerRegs ) )
  {
    if ( UIConfigData.nSleepTimeIdx ==
SBS_SLEEPDISABLED )
      CallerRegs->ax = ( WORD
)SUI_NOSLEEPSLIDERIDX - 1;
    else
      CallerRegs->ax = ( WORD
)UIConfigData.nSleepTimeIdx - 1;
  }
  else
  {
    nSleepTimeIdx = LOBYTE( CallerRegs->bx ) + 1;

    if ( nSleepTimeIdx == SUI_NOSLEEPSLIDERIDX
)
      nSleepTimeIdx = ( BYTE
)SBS_SLEEPDISABLED;

    if ( ( CallerRegs->ax = SetSleepTimeout(
nSleepTimeIdx ) )
         == ERR_SUCCESS )
    {
      if ( nSleepTimeIdx == SBS_SLEEPDISABLED )
      {
        if ( ( CallerRegs->ax = SetPowerEnable(
SBS_POWERMANDISABLED ) )
           == ERR_SUCCESS )
        {
          if ( ( CallerRegs->ax = SetDozeTimeout(
SBS_DOZEDISABLED ) )
             == ERR_SUCCESS )
            UIConfigData.nSleepTimeIdx =
nSleepTimeIdx;
        }
      }
      else
      {
        if ( ( CallerRegs->ax = SetPowerEnable(
SBS_POWERMANENABLED ) )
           == ERR_SUCCESS )
        {
          if ( ( CallerRegs->ax = SetDozeTimeout(
SBS_DOZEDISABLED ) )
             == ERR_SUCCESS )
            UIConfigData.nSleepTimeIdx =
nSleepTimeIdx;
        }
      }
    }
  }

  SetForegroundRegs( CallerRegs );
}

int EnableBusyCursor( int iStatus )
{
  int iReturn;

  AX( SUI_SHOWHIDEBUSYCURSOR );
  BX( iStatus );

  iReturn = ( *lpfnSUICallBack )();

  return ( iReturn );
}

int DoMessageBox( NPSTR szMsgText, int
iScrNumber, char
nAlignment, int iButtons,
             MODALMSGBOXCB fnCallBack, int
iMsgBoxTimeOut )
{
  if ( !GetSUIReady() )
    return ( ERR_INTERNAL );

  if ( iMsgBoxTimeOut > 0 )
    iMsgBoxTimeOut += 2;

  if ( ( iProcMsgBoxThreadIdx =
GetTempEventNum() ) < ERR_SUCCESS
)
    return ( ERR_INTERNAL );

  AddThread( iProcMsgBoxThreadIdx, ( NEARPROC
)ProcessMessageBox,
NULL, SMD_POLLED,
         FALSE, SUI_PROCMSGBOXPOLLFREQ,
0 );

  if ( fnCallBack != NULL )
    DoModalMsgBox( fnCallBack, iMsgBoxTimeOut );

  ProcessMessageBox( szMsgText, iScrNumber,
nAlignment, iButtons
);

  return ( ERR_SUCCESS );
}

void ProcessMessageBox( NPSTR szNewMsgText,
int iNewScrNumber,
char nNewAlignment, int iNewButtons )
{
  static NPSTR szMsgText,
  static char nAlignment;
  static int iButtons;
  static int iScrNumber;
  static int iProcMsgBoxState =
SUI_NOPROCMSGBOXSTATE;

  switch ( iProcMsgBoxState )
  {
    case SUI_NOPROCMSGBOXSTATE:
      szMsgText = szNewMsgText;
      iScrNumber = iNewScrNumber;
      nAlignment = nNewAlignment;
      iButtons = iNewButtons;
      iProcMsgBoxState = SUI_HIDEMSGBOX;
      break;

    case SUI_HIDEMSGBOX:
      HideMessageBox();
      iProcMsgBoxState = SUI_SHOWMSGBOX;
      break;

    case SUI_SHOWMSGBOX:
      OpenMessageBox( szMsgText, iScrNumber,
nAlignment, iButtons
);
      iProcMsgBoxState =
SUI_NOPROCMSGBOXSTATE;
      DelThread( iProcMsgBoxThreadIdx );
      break;
  }
}

int OpenMessageBox( NPSTR szMsgText, int
iScrNumber, char
nAlignment, int iButtons )
{
  int iSeg = 0, iOff = 0;
  int iMsgBoxTotalLines,

  if ( !GetSUIReady() )
    return ( ERR_INTERNAL );

  if ( szMsgText != NULL )
    iScrNumber = 0;
  else
    goto exit;

  if ( strlen( szMsgText ) > STR_STRMAXLENERR -
1 )
    return ( ERR_INTERNAL );

  iMsgBoxTotalLines = FillMsgBoxBuff( MsgBoxBuff,
szMsgText,
nAlignment );

  if ( *MsgBoxBuff[ 0 ].lpszText == NULL )
    return ( ERR_INTERNAL );

  BuffHead.iStructLen = sizeof ( MSGBOXBUFF );
  BuffHead.iBuffLen = sizeof ( MSGBOXBUFF ) *
iMsgBoxTotalLines,
  BuffHead.Buff = ( LPVOID )MsgBoxBuff;

  iSeg = SEG( &BuffHead );
  iOff = OFF( &BuffHead );

exit:

  AX( SUI_SHOWMSGBOX );
  BX( iButtons );
  CX( iScrNumber );
  DX( iSeg );
  SI( iOff );

  return ( ( *lpfnSUICallBack )() );
}

int FillMsgBoxBuff( MSGBOXBUFF MsgBoxBuff[],
char *szMsgText,
char nAlignment )
{
  int iTerminator, iMsgBoxLineIdx,
iMsgBoxTotalLines;
  char *szPtrTempStr = szTempMsgStr;

  strcpy( szTempMsgStr, szMsgText );

  fil_chr( MsgBoxBuff, 0, sizeof ( MSGBOXBUFF ) *
SMI_SUIMAXMSGBOXLINES );

  for ( iMsgBoxLineIdx = 0, iMsgBoxTotalLines = 0;
      iMsgBoxLineIdx <
SMI_SUIMAXMSGBOXLINES; ++iMsgBoxLineIdx
)
  {
    if ( ( iTerminator = str_pos( STR_SEPARATOR,
szPtrTempStr ) )
> 0 )
    {
      *( szPtrTempStr + ( iTerminator - 1 ) ) = NULL;
      MsgBoxBuff[ iMsgBoxLineIdx ].lpszText = (
LPSTR
)szPtrTempStr;
      MsgBoxBuff[ iMsgBoxLineIdx ].nAlignment =
nAlignment;
      szPtrTempStr += iTerminator;
      iMsgBoxTotalLines++;
    }
    else
      MsgBoxBuff[ iMsgBoxLineIdx ].lpszText =
szNullStr;
  }

  return ( iMsgBoxTotalLines );
}

int HideMessageBox( void )
{
  if ( !GetSUIReady() )
    return ( ERR_INTERNAL );

  AX( SUI_HIDEMSGBOX );

  return ( ( *lpfnSUICallBack )() );
}

int UpdateSUIConnectStatus( void )
{
  if ( !GetSUIReady() )
    return ( ERR_INTERNAL );

  SetUpdatingConnectStatus( TRUE );

  AX( SUI_UPDATECONNECTSTATUS );

  return ( ( *lpfnSUICallBack )() );
}

#if defined( _MSC_VER   )
#pragma warning( default : 4704 )
#endif
Copr. 1995 Zenith Data Systems Corp.
#include "cr.h"
#include "frame.h"
#include "spawn.h"
#include "sm.h"

static BYTE fFrameWarning = FALSE;

static char aFrameTypes[][6]=
{
  "802.2",
  "802.3",
  "II",
  "SNAP",
};

APIFUNCRET LBGetSetNetFrameType( struct
REGW *CallerRegs )
{
  if ( IsGetFunction( CallerRegs ) )
  {
    int iCurrFrameIdx = UIConfigData.nFrameType -
PRX_FRAMEBASE;
    CallerRegs->dx = SEG( &ListBoxEntry );
    CallerRegs->si = OFF( &ListBoxEntry );

    if ( ( int )CallerRegs->bx > 0 )
    {
      ListBoxEntry.lpszEntry = ( LPSTR
)aFrameTypes[
CallerRegs->bx - 1 ];
      ListBoxEntry.nAttribute =
SUI_LBENTRYENABLED;
      CallerRegs->ax = ERR_SUCCESS;

    }
    else if ( ( int )CallerRegs->bx == 0 )
    {
      ListBoxEntry.lpszEntry =
        ( LPSTR )aFrameTypes[ iCurrFrameIdx ];
      ListBoxEntry.nAttribute =
SUI_LBENTRYENABLED;
      CallerRegs->ax = iCurrFrameIdx + 1;
    }
    else
      CallerRegs->ax =
PRX_NUMOFAVAILFRAMES;
  }
  else
  {
    if ( !fFrameWarning )
    {
      OpenMessageBox( STR_SUIFRAMETYPE, 0,
SUI_LEFTJUSTIFIED,
SUI_OK );
      fFrameWarning = TRUE;
    }

    UIConfigData.nFrameType = PRX_FRAMEBASE
+ ( CallerRegs->bx -
1 );
    CallerRegs->ax = ERR_SUCCESS;
  }

  SetForegroundRegs( CallerRegs );
}

APIFUNCRET NotifyScreenCode( struct REGW
*CallerRegs )
{
  BYTE nLastOSKScreen;
  BYTE nLastSetupDlgScreen;

  if ( ( nLastOSKScreen = LOBYTE( CallerRegs->bx
) & SUI_OSKMASK
) > 0 )
  {
    if ( IsSetupDlg( GetCurrScrCode() ) )

      UIConfigData.nLastOSKDlgScreen =
nLastOSKScreen;
    else
      UIConfigData.nLastOSKScreen =
nLastOSKScreen;
  }

  if ( ( nLastSetupDlgScreen = LOBYTE(
CallerRegs->bx ) &
SUI_SETUPDLGMASK ) > 0 )
    UIConfigData.nLastSetupDlgScreen =
nLastSetupDlgScreen;

  CallerRegs->ax = ERR_SUCCESS;

  SetForegroundRegs( CallerRegs );
}
Copr. 1995 Zenith Data Systems Corp.
#include "cr.h"
#include "sio.h"
#include "spawn.h"
#include "k2.h"
#include "sm.h"

#if defined( _MSC_VER   )
#pragma warning( disable : 4704 )
#endif

static int iCalibMode = -1;
static int iCalibThreadIdx = 0;
static int xCalibCol, yCalibRow;
static BOOL fCalibLowRight;

static CALIBPENSTATES PenCalibStates;

APIFUNCRET CalibratePen( struct REGW
*CallerRegs )
{
  if ( fCalibLowRight )
  {
    CallerRegs->ax = SMI_CALIBLOWRIGHT;
```

```
   CallerRegs->cx = SHC_XVGARES -
SUI_XCALIBPOINT,
   CallerRegs->bx = SHC_YVGARES -
SUI_YCALIBPOINT,
   fCalibLowRight = FALSE;
  }

  if ( IsGetFunction( CallerRegs ) )
   iCalibMode = PND_CALIBLR;
  else
  {
   fCalibLowRight = TRUE;
   iCalibMode = PND_CALIBUL,
  }

  if ( ( iCalibThreadIdx = GetTempEventNum() ) < 0 )
  {
   CallerRegs->ax = ( WORD )ERR_INTERNAL;
  }
  else
  {
   PenCalibStates = SUI_INITIALCALIBSTATE,
   xCalibCol = CallerRegs->cx;
   yCalibRow = CallerRegs->bx;
   CallerRegs->ax = ERR_SUCCESS;

   AddThread( iCalibThreadIdx. WaitForPenCalib
NULL.
SMD_POLLED, FALSE
           SMI_CALIBPOLLFREQ, 0 );
  }

  SetForegroundRegs( CallerRegs );
}

APIFUNCRET CalibrateCancel( struct REGW
*CallerRegs )
{
  DelThread( iCalibThreadIdx );
  EnableNewCalib( FALSE );

  CallerRegs->ax = ERR_SUCCESS;

  SetForegroundRegs( CallerRegs );

  if ( GetCurrActionCode() ==
SUI_LASTCONNECTION )
    LoadSUI( SUI_SPECIFIEDSCREEN,
SUI_HOSTSELECTION );
}

void WaitForPenCalib( void )
{
  int xUpperCol, yUpperRow. xLowerCol,
yLowerRow;
  int iCalibState;
  PENCALIB CurrPenCalib;

  switch( PenCalibStates )
  {
   case SUI_INITIALCALIBSTATE:
    if ( SetCalibMode( iCalibMode, xCalibCol,
yCalibRow ) == 0
)
      PenCalibStates = SUI_CHECKCALIB,
    else
      PenCalibStates = SUI_CALIBERROR;
    break;

   case SUI_CHECKCALIB:
    iCalibState = GetCalibState( iCalibMode,
&xUpperCol,
&yUpperRow,
                  &xLowerCol, &yLowerRow
);

    if ( iCalibState != PND_CALIBNOTDONE )
    {
     if ( iCalibMode == PND_CALIBLR )
     {
      if ( iCalibState == PND_CALIBDONEVALID )
      {
       CurrPenCalib.wXUpperPenCalib =
xUpperCol;
       CurrPenCalib.wYUpperPenCalib =
yUpperRow;
       CurrPenCalib.wXLowerPenCalib =
xLowerCol;
       CurrPenCalib.wYLowerPenCalib =
yLowerRow;

       SetEEMouseConfig( &CurrPenCalib );
       EnableNewCalib( TRUE );

       PenCalibStates = SUI_CALIBSUCCESS;
      }
      else
       PenCalibStates = SUI_CALIBERROR;
     }
      else
       PenCalibStates = SUI_CALIBSUCCESS,
     }
     break;

    case SUI_CALIBERROR:
    case SUI_CALIBSUCCESS:
     AX( SUI_CALIBPOINTDONE );
     ( *lpfnSUICallBack )();
     DelThread( iCalibThreadIdx );

     if ( iCalibMode == PND_CALIBLR &&
GetCurrActionCode() ==
SUI_DOPENCALIBRATION )
       LoadSUI( SUI_SPECIFIEDSCREEN,
SUI_HOSTSELECTION );
     break;
  }
}

#if defined( _MSC_VER )
#pragma warning( default : 4704 )
#endif
```

Copr. 1995 Zenith Data Systems Corp

```
#include "cr.h"
#include "sio.h"
#include "spawn.h"
#include "k2.h"
#include "hm.h"
#include "lm.h"
#include "sm.h"

#if defined( _MSC_VER )
#pragma warning( disable : 4704 )
#endif

static FLASHUPDATESTATES FlashUpdateState
FlashStateOnError;
static MEM_REC MemRec;
static char far *sFlashImageBuff = NULL,
static char *szPathFlashFile = NULL;
static char *szNameActiveUpdate = NULL;
static int iDoUpdateThreadIdx.
iActiveUpdateThreadIdx,
static int iFlashUpdateState;
static int iTmpFilePercent, iOldTmpFilePercent,
iOldTmpDispPercent;

static int iTotalFlashFiles;
static int iCurrFlashFile;
static LONG lLenCurrFlashFile,
static int iSectorFlashStatus;

APIFUNCRET DoUpdate( struct REGW *CallerRegs
)
{
  if ( GetSCSCallProgress() !=
SMI_SCSCONNECTED )
    CallerRegs->ax = ( WORD )ERR_INTERNAL,
  else
  {
   if ( ( iDoUpdateThreadIdx = GetTempEventNum()
) ==
ERR_INTERNAL )
    {
     CallerRegs->ax = ( WORD )ERR_INTERNAL;
    }
    else
    {
     if ( IsFlashSupported() )
     {
      FlashUpdateState = FLU_SAFETYCHECK;
      AddThread( iDoUpdateThreadIdx,
WaitForFlashUpdate, NULL,
SMD_MANYTIMES, FALSE,
               FLU_POLLFREQ, FLU_MAXRETRY );

      CallerRegs->ax = ( WORD )ERR_SUCCESS;
     }
     else
      CallerRegs->ax = ( WORD )ERR_INTERNAL;

    }
  }

  SetForegroundRegs( CallerRegs );
}

APIFUNCRET RequestActiveUpdate( struct REGW
*CallerRegs )
{
  char *szCurrentUpdate = GetNameActiveUpdate();
  int iMsgBoxTotalLines;
  WORD wReturn,
  FLASHUPDATESTATES PowerState;

  if ( *szCurrentUpdate != ' ' && *szCurrentUpdate !=
NULL )
  {
   if ( ( PowerState = CheckFlashPowerState() ) !=
FLU_NOFLUSTATE )
   {
    switch( PowerState )
    {
     case FLU_GETBATTERYINFOERROR:
      iMsgBoxTotalLines = FillMsgBoxBuff(
MsgBoxBuff,
STR_FLUGETBATINFOERROR,

SUI_CENTERJUSTIFIED
);
      break;

     case FLU_NOTONACERROR
      iMsgBoxTotalLines = FillMsgBoxBuff(
MsgBoxBuff.
STR_FLUNOAC, SUI_CENTERJUSTIFIED );
      break;

     case FLU_BATNOTATTACHEDERROR
      iMsgBoxTotalLines = FillMsgBoxBuff(
MsgBoxBuff
STR_FLUNOBATERROR, SUI_CENTERJUSTIFIED
);
      break,

     case FLU_BATCAPTOOLOWERROR:
      iMsgBoxTotalLines = FillMsgBoxBuff(
MsgBoxBuff.
STR_FLUBATTOOLOWERROR,
SUI_CENTERJUSTIFIED );
      break:

     default:
      iMsgBoxTotalLines = FillMsgBoxBuff(
MsgBoxBuff,
STR_FLUUNKNOWNBATERROR,
SUI_CENTERJUSTIFIED );
    }

    wReturn = ( WORD
)ERR_UPGRADENOTAVAIL,
   }
   else if ( GetSCSCallProgress() !=
SMI_SCSCONNECTED )
   {
    iMsgBoxTotalLines = FillMsgBoxBuff(
MsgBoxBuff,
STR_FLUNOCONNECTERROR,
SUI_CENTERJUSTIFIED );
    wReturn = ( WORD
)ERR_UPGRADENOTAVAIL;
   }
   else if ( GetLinkQuality() != PRX_HIGHQUALITY
)
   {
    iMsgBoxTotalLines = FillMsgBoxBuff(
MsgBoxBuff,
STR_FLULINKTOOLOWERROR,
SUI_CENTERJUSTIFIED );
    wReturn = ( WORD
)ERR_UPGRADENOTAVAIL;
   }
   else if ( GetCurrHostMode() != PND_DOSAPP )
   {
    iMsgBoxTotalLines = FillMsgBoxBuff(
MsgBoxBuff,
STR_FLUNOTINDOSAPP, SUI_CENTERJUSTIFIED
);
    wReturn = ( WORD
)ERR_UPGRADENOTAVAIL;
   }
   else
   {
    MsgBoxBuff[0].lpszText = ( LPSTR
)szCurrentUpdate.
    MsgBoxBuff[0].nAlignment =
SUI_CENTERJUSTIFIED,
    iMsgBoxTotalLines = 1;
    wReturn = ERR_SUCCESS;
    TRACE( "NOTICE: Flash upgrade safety checks
passed.\r" );
   }
  }
  else
  {
   iMsgBoxTotalLines = FillMsgBoxBuff(
MsgBoxBuff,
STR_FLUNOFLASHFILES,
SUI_CENTERJUSTIFIED );
   wReturn = ( WORD )ERR_UPGRADENOTAVAIL;

  }

  BuffHead.iStructLen = sizeof ( MSGBOXBUFF );
  BuffHead.iBuffLen = sizeof ( MSGBOXBUFF ) *
iMsgBoxTotalLines;
  BuffHead.Buff = ( LPVOID )MsgBoxBuff;

  CallerRegs->dx = SEG( &BuffHead );
  CallerRegs->si = OFF( &BuffHead );
  CallerRegs->ax = wReturn;

  SetForegroundRegs( CallerRegs );
}

void WaitForFlashUpdate( void )
{
  int iSizeFlashSector;
  int iNumberOfFlash;
  int iNewTmpFilePercent, iNewTmpDispPercent;
  int iRetryLimit = GetRetryLimit(
iDoUpdateThreadIdx );
  FlashStateOnError = FlashUpdateState;

  switch ( FlashUpdateState )
  {
   case FLU_NOFLUSTATE:

   case FLU_SAFETYCHECK:
    FlashUpdateState = FLU_INITMEM;

    SetWaitingIcon( SBS_WAITINGICONON, TRUE
);

    if ( UIConfigData.nSleepTimeIdx !=
SBS_SLEEPDISABLED )
    {
     SetPowerEnable(
SBS_POWERMANDISABLED );
     TRACE( "NOTICE: Disabled powerman for
flash update\r" );
    }
    break;


   case FLU_INITMEM:
    TRACE( "NOTICE: Initializing and allocating
memory\r" );

    if ( ( szPathFlashFile = ( NPSTR )malloc(
SCS_MAXLENFILENAME + 1 ) ) == NULL )
     FlashUpdateState = FLU_MEMERROR;
    else
    {
     if ( SMDosBusy( GetFlashImageBuff ) !=
ERR_SUCCESS )
      FlashUpdateState = FLU_MEMERROR;
     else
     {
      FlashUpdateState = FLU_ALLOCDOSMEM;
      ResetRetryLimit( iDoUpdateThreadIdx );
     }
    }
    break;

   case FLU_ALLOCDOSMEM:
    if ( sFlashImageBuff == NULL )
    {
     if ( iRetryLimit == FLU_MAXDOSBUSY )
     {
      TRACE( "ERROR: Failed to allocate required
buffer\r" );
      FlashUpdateState = FLU_MEMERROR;
     }
    }
    else
    {
     TRACE( "NOTICE: Successfully acquired
memory\r" );

     iTotalFlashFiles = FLU_NUMBERUNKNOWN;
     iCurrFlashFile = 0;

     fil_chr( szPathFlashFile, 0,
SCS_MAXLENFILENAME );

     FlashUpdateState =
FLU_SENDREQFLASHUPD;
     ResetRetryLimit( iDoUpdateThreadIdx );

    }
    break;
```

```
    case FLU_SENDREQFLASHUPD:
      TRACE( "NOTICE: Requesting the flash
upgrade from the
Host\r" );
      iSizeFlashSector = FLU_SIZEFLASHSECTOR /
1024;

      if ( SendPrivateMessage(
PMI_REQFLASHUPD, sizeof( int ),
          ( NPSTR )&iSizeFlashSector ) !=
ERR_SUCCESS )
        FlashUpdateState =
FLU_SENDPRIMSGERROR;
      else
      {
        if ( iRetryLimit == 0 )
          SetRetryLimit( iDoUpdateThreadIdx, 1 );

        SetTmpFilePercent( 0 );
        SetTimeLimit( iDoUpdateThreadIdx,
FLU_PRIMSGPOLLFREQ );
        FlashUpdateState =
FLU_WAITFORTMPFLASHFILES;
      }
      break;

    case FLU_WAITFORTMPFLASHFILES:
      iNewTmpFilePercent = GetTmpFilePercent();

      if ( iNewTmpFilePercent == 0 )
      {
        if ( iRetryLimit <= FLU_MAXPCNTTMPFILE )

        {
          TRACE( "ERROR: Timeout waiting for first
percent of
temp files.\r" );
          FlashUpdateState =
FLU_NOACKTEMPFILESERROR;
        }
        else if ( iRetryLimit %
FLU_MODPCNTTMPFILE == 0 )
        {
          TRACE( "ERROR: Requesting flash update
from host once
again\r" );
          FlashUpdateState =
FLU_SENDREQFLASHUPD;
        }
      }
      else
      {
        UpdateTmpFilePercentage(
iNewTmpFilePercent );
        iOldTmpFilePercent = iNewTmpFilePercent;
        iOldTmpDispPercent = iNewTmpDispPercent =
(
iNewTmpFilePercent * 2 ) / 100;
        FlashUpdateState =
FLU_UPDATETMPFILEPERCENT;
        ResetRetryLimit( iDoUpdateThreadIdx );
      }
      break;

    case FLU_UPDATETMPFILEPERCENT:
      iNewTmpFilePercent = GetTmpFilePercent();

      iNewTmpDispPercent = ( iNewTmpFilePercent *
2 ) / 100;
      if ( iNewTmpFilePercent == iOldTmpFilePercent
)
      {
        if ( iRetryLimit <= FLU_MAXPCNTTMPFILE ||
            iNewTmpFilePercent == 100 )
        {
          ResetRetryLimit( iDoUpdateThreadIdx );
          FlashUpdateState =
FLU_WAITFORNUMFILES;
          TRACE( "NOTICE: Done waiting for number
of files,
onward!\r" );

#if !defined( PROD )
          if ( iNewTmpFilePercent != 100 )
            TRACE( "ERROR: Timeout waiting for next
percent of
temp files.\r" );
#endif
        }
      }
      else
      {
        ResetRetryLimit( iDoUpdateThreadIdx );
        iOldTmpFilePercent = iNewTmpFilePercent;

        if ( iNewTmpDispPercent !=
iOldTmpDispPercent )
        {
          TRACE( "NOTICE: Updating percentage of
tmp file
processing\r" );
          UpdateTmpFilePercentage(
iNewTmpFilePercent );
          iOldTmpDispPercent =
iNewTmpDispPercent;
        }
      }
      break;

    case FLU_WAITFORNUMFILES:
      TRACE( "NOTICE: Waiting for total number of
flash files\r"
);

      iNumberOfFlash = GetTotalFlashFiles();

      if ( iNumberOfFlash ==
FLU_NUMBERUNKNOWN )
      {
        if ( iRetryLimit <= FLU_MAXUPDREQ )

        {
          TRACE( "ERROR: Timeout waiting for
number of flash
files.\r" );
          FlashUpdateState =
FLU_NOACKNUMFILESERROR;
        }
      }
      else if ( iNumberOfFlash <=
FLU_ERRHOSTBASE )
      {
#if !defined( PROD )
        sprintf( szTempStr, "NOTICE: Number of flash
files
returned as an error code - %d\r", iNumberOfFlash );

        TRACE( szTempStr );
#endif
        switch ( iNumberOfFlash )
        {
          case FLU_ERRREADHOSTDAT:
            FlashUpdateState = FLU_READHOSTDAT;
            break;

          case FLU_ERRMISSINGFILE:
            FlashUpdateState = FLU_MISSINGFILE;
            break;

          case FLU_ERRNOFLASHFILES:
            FlashUpdateState = FLU_NOFLASHFILES;
            break;

          case FLU_ERROUTOFDISKSPACE:
            FlashUpdateState =
FLU_OUTOFDISKSPACE;
            break;

          case FLU_ERRFILECORRUPTED:
            FlashUpdateState =
FLU_FILECORRUPTED;
            break;

          case FLU_ERRNOCHECKSUM:
            FlashUpdateState = FLU_NOCHECKSUM;

            break;

          default:
            FlashUpdateState =
FLU_HOSTUNKNOWNERR;
            break;
        }
      }
      else
      {
        WORD wExtendedMem =
GetSizeOfExtendedMem();

#if !defined( PROD )
        sprintf( szTempStr, "NOTICE: Number of flash
files - %d
\r", iNumberOfFlash );
        TRACE( szTempStr );
#endif
        if ( iNumberOfFlash >
FLU_2MEGTHREASHHOLD &&
            wExtendedMem <
FLU_1MEGEXTENDEDRAM )
        {
          FlashUpdateState =
FLU_1MEGSYSTEMERROR;
        }
        else if ( iNumberOfFlash ==
FLU_2MEGTHREASHHOLD &&
                wExtendedMem ==
FLU_1MEGEXTENDEDRAM )
        {
          FlashUpdateState =
FLU_2MEGSYSTEMERROR;

        }
        else
        {
          iCurrFlashFile = 1;

          FlashUpdateState = FLU_SENDREQPATH;
          Set2MegFlash( ( iNumberOfFlash >
FLU_2MEGTHREASHHOLD )
);
          SetTimeLimit( iDoUpdateThreadIdx,
FLU_POLLFREQ );
          ResetRetryLimit( iDoUpdateThreadIdx );
        }
      }
      break;

    case FLU_SENDREQPATH:
      *szPathFlashFile = NULL;

      if ( SendPrivateMessage(
PMI_REQPATHFROMIDX, sizeof ( int
),
                          ( NPSTR )&iCurrFlashFile )
!=
ERR_SUCCESS )
        FlashUpdateState =
FLU_SENDPRIMSGERROR;
      else
      {
        if ( iRetryLimit == 0 )
          SetRetryLimit( iDoUpdateThreadIdx, 1 );

        FlashUpdateState =
FLU_WAITFORPATHFLASHFILE;
        SetTimeLimit( iDoUpdateThreadIdx,
FLU_PRIMSGPOLLFREQ );
      }
      break;

    case FLU_WAITFORPATHFLASHFILE:
      if ( *GetPathFlashFile() == NULL )
      {
        if ( iRetryLimit < FLU_MAXPATHREQ )
        {
          TRACE( "ERROR: Timeout waiting for
response to path
request\r" );
          FlashUpdateState =
FLU_NOACKPATHERROR;
        }
        else if ( iRetryLimit % FLU_MODPATHREQ
== 0 )
        {
          TRACE( "NOTICE: Trying again to receive
the next path
name\r" );
          FlashUpdateState = FLU_SENDREQPATH;
        }
      }
      else
      {
        if ( *ParseForFileName( GetPathFlashFile() )
==
FLU_FLASHFILEID )
        {
          FlashUpdateState =
FLU_RECEIVEHOSTFILE;
          ResetRetryLimit( iDoUpdateThreadIdx );
          SetTimeLimit( iDoUpdateThreadIdx,
FLU_POLLFREQ );
        }
        else
        {
          TRACE( "NOTICE: Protected file
encountered, skipping to
the next file\r" );
          goto after_flash;
        }
      }
      break;

    case FLU_RECEIVEHOSTFILE:
#if !defined( PROD )
      sprintf( szTempStr, "NOTICE: File name
received - %s \r",
              GetPathFlashFile() );
      TRACE( szTempStr );
#endif
      if ( ReceiveHostFile( GetPathFlashFile(),
sFlashImageBuff,
FLU_SIZEFLASHSECTOR )
            != ERR_SUCCESS )
      {
        if ( iRetryLimit <= FLU_MAXRECVFILEREQ )
        {
          if ( iCurrFlashFile > 1 )
          {
            TRACE( "ERROR: Timeout waiting for
successful
ReceiveHostFile() request, from sector\r" );
            FlashUpdateState =
FLU_NOACKRECEIVEFATALERROR;
          }
          else
          {
            TRACE( "ERROR: Timeout waiting for
successful
ReceiveHostFile() request\r" );
            FlashUpdateState =
FLU_NOACKRECEIVEFILEERROR;
          }
        }
      }
      else
      {
        TRACE( "NOTICE: Finally beginning reflash of
the
specified sector\r" );
        FlashUpdateState = FLU_FLASHIT;
        ResetRetryLimit( iDoUpdateThreadIdx );
      }
      break;

    case FLU_FLASHIT:
      if ( ( iSectorFlashStatus = FlashSector(
sFlashImageBuff,
          iCurrFlashFile ) ) !=
SBS_FLASHSUCCESS )
      {
        if ( iSectorFlashStatus ==
SBS_FLASHACNOTATTACHED ||
            iRetryLimit <= FLU_MAXFLASHIT )

          FlashUpdateState =
FLU_FLASHFATALERROR;
      }
      else
      {
after_flash:
        UpdateFlashPercentage( iCurrFlashFile );
        ResetRetryLimit( iDoUpdateThreadIdx );

        if ( ++iCurrFlashFile > iTotalFlashFiles )
          FlashUpdateState = FLU_CLEAREEROM;
        else
          FlashUpdateState = FLU_SENDREQPATH;

      }
      break;

    case FLU_CLEAREEROM:
      TRACE( "NOTICE: Clearing EEPROM\r" );

      if ( ClearEEPROM() != ERR_SUCCESS )
      {
        if ( iRetryLimit <= FLU_MAXCLEAREEROM )

          FlashUpdateState =
FLU_EEROMNOCLRERROR;
      }
      else
      {
        ResetRetryLimit( iDoUpdateThreadIdx );
        FlashUpdateState =
FLU_FLASHUPDATECOMPLETE;
        SendPrivateMessage( PMI_REQFLASHDONE,
0, NULL );
      }
      break;

    case FLU_FLASHUPDATECOMPLETE:
      SendPrivateMessage( PMI_REQFLASHDONE,
0, NULL );
      FlashUpdateState = FLU_REBOOT;
      SetTimeLimit( iDoUpdateThreadIdx,
FLU_PRIMSGPOLLFREQ );
      break;

    case FLU_REBOOT:
      reboot( CRU_COLDBOOT );
      break;

    default:
      WaitForFlashError();
  }

  if ( FlashUpdateState >
FLU_BEGINERRORSTATES )
    WaitForFlashError();
}

void WaitForFlashError( void )
{
```

```
  SendPrivateMessage( PMI_REQFLASHDONE, 0,
NULL );

  if ( sFlashImageBuff == NULL )
  {
   DelThread( iDoUpdateThreadIdx );
   SetWaitingIcon( SBS_WAITINGICONOFF, TRUE
);
  }
  else
  {
   SetRetryLimit( iDoUpdateThreadIdx, 1 );
   HideMessageBox();
   SMDosBusy( ReleaseFlashMem );
   return;
  }

  switch ( FlashUpdateState )
  {
   case FLU_NOFLASHFILES:
    OpenMessageBox( STR_FLUNOFLASHFILES,
0, SUI_LEFTJUSTIFIED,
SUI_OK );
    break;

   case FLU_READHOSTDAT:
    OpenMessageBox( STR_FLUREADHOSTDAT,
0, SUI_LEFTJUSTIFIED
SUI_OK );
    break;

   case FLU_MISSINGFILE:
    OpenMessageBox( STR_FLUMISSINGFLASH,
0, SUI_LEFTJUSTIFIED,
SUI_OK );
    break;

   case FLU_OUTOFDISKSPACE:
    OpenMessageBox(
STR_FLUOUTOFDISKSPACE, 0,
SUI_LEFTJUSTIFIED, SUI_OK );
    break;

   case FLU_FILECORRUPTED:
    OpenMessageBox(
STR_FLUFILECORRUPTED, 0,
SUI_LEFTJUSTIFIED,
SUI_OK );
    break;

   case FLU_NOCHECKSUM:
    OpenMessageBox( STR_FLUNOCHECKSUM,
0, SUI_LEFTJUSTIFIED,
SUI_OK );
    break;

   case FLU_NOACKTEMPFILESERROR:
    OpenMessageBox(
STR_FLUNOACKTMPERROR, 0,
SUI_LEFTJUSTIFIED,
SUI_OK );
    break;

   case FLU_NOACKNUMFILESERROR:
    OpenMessageBox(
STR_FLUNOACKNUMFILEERR, 0,
SUI_LEFTJUSTIFIED, SUI_OK );
    break;

   case FLU_NOACKPATHERROR:
    OpenMessageBox(
STR_FLUNOACKPATHERROR, 0,
SUI_LEFTJUSTIFIED, SUI_OK );
    break;

   case FLU_NOACKRECEIVEFILEERROR:
    OpenMessageBox(
STR_FLUNOACKRECVFILEERR, 0,
SUI_LEFTJUSTIFIED, SUI_OK );
    break;

   case FLU_NOACKRECEIVEFATALERROR:
    OpenMessageBox(
STR_FLUNOACKRECVFATAL, 0,
SUI_LEFTJUSTIFIED, SUI_OK );
    break;

   case FLU_SENDPRIMSGERROR:
    OpenMessageBox( STR_FLUSENDPRIMSG, 0,
SUI_LEFTJUSTIFIED,
SUI_OK );
    break;

   case FLU_1MEGSYSTEMERROR:
    OpenMessageBox(
STR_FLU1MEGSYSERROR, 0
SUI_LEFTJUSTIFIED,
SUI_OK );
    break;

   case FLU_2MEGSYSTEMERROR:
    OpenMessageBox(
STR_FLU2MEGSYSERROR, 0,
SUI_LEFTJUSTIFIED,
SUI_OK );
    break;

   case FLU_FLASHFATALERROR:
    switch ( iSectorFlashStatus )
    {
     case SBS_FLASHACNOTATTACHED:
      OpenMessageBox( STR_FLUNOAC, 0,
SUI_LEFTJUSTIFIED,
SUI_OK );
      break;

     case SBS_FLASHERASEERROR:
      OpenMessageBox( STR_FLUFLASHERASE,
0,
SUI_LEFTJUSTIFIED, SUI_OK );
      break;

     case SBS_FLASHPROGERROR:
      OpenMessageBox( STR_FLUFLASHPROG,
0, SUI_LEFTJUSTIFIED,
SUI_OK );
      break;

     default:
      OpenMessageBox(
STR_FLUFLASHUNKNOWN, 0,
SUI_LEFTJUSTIFIED, SUI_OK );
      break;
    }
    break;

   case FLU_EEROMNOCLRERROR:
    OpenMessageBox( STR_FLUEEROMNOCLR,
0, SUI_LEFTJUSTIFIED,
SUI_OK );
    break;

   case FLU_HOSTUNKNOWNERR:
    OpenMessageBox(
STR_FLUUNKNOWNHOSTERR, 0,
SUI_LEFTJUSTIFIED, SUI_OK );
    break;

   case FLU_MEMERROR:
    OpenMessageBox(
STR_FLURAMALLOCATION, 0,
SUI_LEFTJUSTIFIED,
SUI_OK );
    break;

   default:
    OpenMessageBox(
STR_FLUUNKNOWNERROR, 0,
SUI_LEFTJUSTIFIED,
SUI_OK );
  }
}

void GetFlashImageBuff( void )
{
  WORD wSector;

  TRACE( "NOTICE: Allocating memory from
CoSession for the
reflash buffer\r" );

  SetSCSMemory( SCS_DLGFREEMEMPERCENT,
SCS_FREEMEM, ( BYTE
)SMI_SCSNOWAITFORDOS );

  if ( ( wSector = GetFreeMCB( ( WORD )(
FLU_SIZEFLASHSECTOR / 16
) ) ) != 0 )
   sFlashImageBuff = MK_FP( wSector, 0 );
}

void ReleaseFlashMem( void )
{
  if ( szPathFlashFile != NULL )
  {
   free( szPathFlashFile );
   szPathFlashFile = NULL;
  }

  if ( sFlashImageBuff != NULL )
  {
   SetFreeMCB( SEG( sFlashImageBuff ) );
   sFlashImageBuff = NULL;
  }

  TRACE( "NOTICE: Returning memory to
CoSession, used by the
reflash buffer\r" );

  SetSCSMemory( 0, SCS_FREEMEM, ( BYTE
)SMI_SCSNOWAITFORDOS );


  if ( UIConfigData.nSleepTimeIdx !=
SBS_SLEEPDISABLED )
   SetPowerEnable( SBS_POWERMANENABLED );

}

int UpdateTmpFilePercentage( int
iNewTmpFilePercent )
{
  int iPercentage;

  iPercentage = ( iNewTmpFilePercent * 2 ) / 100;

  AX( SUI_UPDATEFLASHPRCNT );
  BX( iPercentage );

  ( *lpfnSUICallBack )();

  return ( ERR_SUCCESS );
}

int UpdateFlashPercentage( int iFlashFileNum )
{
  int iPercentage.

  if ( iTotalFlashFiles <= 0 )
   return ( ERR_INTERNAL ):

  iPercentage = ( iFlashFileNum * 100 ) /
iTotalFlashFiles;

  AX( SUI_UPDATEFLASHPRCNT );
  BX( iPercentage );

  ( *lpfnSUICallBack )();

  return ( ERR_SUCCESS );
}

int GetActiveUpdate( void )
{
  if ( GetSCSCallProgress() !=
SMI_SCSCONNECTED )
   TRACE( "NOTICE: Not currently connected for
GetActiveUpdate(), sending PM anyway\r" );

  if ( IsFlashSupported() )
  {
   if ( szNameActiveUpdate == NULL )
    if ( ( szNameActiveUpdate = ( NPSTR )malloc(
SUI_MAXLENACTIVEUPD + 1 ) ) == NULL )
     return ( ERR_INTERNAL );

   fil_chr( szNameActiveUpdate, 0,
SUI_MAXLENACTIVEUPD + 1 );

   if ( SendPrivateMessage(
PMI_REQACTIVEUPGRADE, 0, NULL ) !=
ERR_SUCCESS )
    return ( ERR_INTERNAL );

   TRACE( "NOTICE: Sent Private Message to
determine the name of
the active upgrade on the Host.\r" );

   if ( ( iActiveUpdateThreadIdx =
GetTempEventNum() ) ==
ERR_INTERNAL )
    return ( ERR_INTERNAL );

   AddThread( iActiveUpdateThreadIdx.
WaitForActiveUpdate, NULL,
SMD_MANYTIMES,
          FALSE, FLU_PRIMSGPOLLFREQ,
FLU_MAXRETRY );


  }
  else
  {
   TRACE( "ERROR: Flash not supported\r" );
   return ( ERR_INTERNAL );
  }

  return ( ERR_SUCCESS );
}

void WaitForActiveUpdate( void )
{
  int iRetryLimit = GetRetryLimit(
iActiveUpdateThreadIdx );

  if ( *GetNameActiveUpdate() == NULL )
  {
   if ( iRetryLimit < FLU_MAXACTUPDREQ )

    DelThread( iActiveUpdateThreadIdx );
   else if ( iRetryLimit % FLU_MODACTUPDREQ
== 0 )
   {
    if ( SendPrivateMessage(
PMI_REQACTIVEUPGRADE, 0, NULL ) !=
ERR_SUCCESS )
      DelThread( iActiveUpdateThreadIdx );
   }
  }
  else
   DelThread( iActiveUpdateThreadIdx );
}

int SetPathFlashFile( LPSTR szNewPathFlashFile )
{
  if ( szPathFlashFile == NULL )
   return ( ERR_INTERNAL );
  PCB_BEGINCRITICAL;
  fmem_cp( ( LPVOID )szNewPathFlashFile, (
LPVOID
)szPathFlashFile,
        fstr_len( szNewPathFlashFile ) + 1 );
  PCB_ENDCRITICAL;

  return ( ERR_SUCCESS );
}

char *GetPathFlashFile( void )
{
  return ( szPathFlashFile );
}

int SetTotalFlashFiles( int iNewTotalFlashFiles )
{
  iTotalFlashFiles = iNewTotalFlashFiles;

  return ( ERR_SUCCESS );
}

int GetTotalFlashFiles( void )
{
  int iReturn;

  PCB_BEGINCRITICAL;
  iReturn = iTotalFlashFiles;
  PCB_ENDCRITICAL;

  return ( iReturn );
}

int SetNameActiveUpdate( LPSTR
szNewActiveUpdate )
{
  if ( szNameActiveUpdate == NULL )
   return ( ERR_INTERNAL );

  PCB_BEGINCRITICAL;
  if ( szNewActiveUpdate == NULL )
   *szNameActiveUpdate = ' ';
  else
   fmem_cp( ( LPVOID )szNewActiveUpdate, (
LPVOID
)szNameActiveUpdate,
         SUI_MAXLENACTIVEUPD );
  PCB_ENDCRITICAL;

  return ( ERR_SUCCESS );
}

char *GetNameActiveUpdate( void )
{
  if ( szNameActiveUpdate == NULL )
   return ( szNullStr );
  else
   return ( szNameActiveUpdate );
}

int SetTmpFilePercent( int iNewPercent )
{
  iTmpFilePercent = iNewPercent;

  return ( ERR_SUCCESS );
}

int GetTmpFilePercent( void )
{
  int iReturn;

  PCB_BEGINCRITICAL;
  iReturn = iTmpFilePercent;
  PCB_ENDCRITICAL;

  return ( iReturn );
}
```

```
FLASHUPDATESTATES CheckFlashPowerState(
void )
{
  LONG lBatteryInfo = GetBatteryInfo():

  if ( lBatteryInfo ==
SBS_GETBATTERYINFOERROR )
    return ( FLU_GETBATTERYINFOERROR );

  if ( ( lBatteryInfo & SBS_ACDCSTATEMASK ) !=
SBS_ACDCSTATEMASK
)
    return ( FLU_NOTONACERROR );

  if ( ( lBatteryInfo &
SBS_BATTERYATTACHEDMASK ) !=
SBS_BATTERYATTACHED )
    return ( FLU_BATNOTATTACHEDERROR );

  if ( HIBYTE( LOWORD( ( lBatteryInfo &
SBS_BATTERYCAPACITYMASK )
) ) < SBS_BATTERYFLASHMINCAP )
    return ( FLU_BATCAPTOOLOWERROR );

  return ( FLU_NOFLUSTATE ):
}

#if defined( _MSC_VER  )
#pragma warning( default . 4704 )
#endif
Copr 1995 Zenith Data Systems Corp
#include "cr.h"
#include "sio.h"
#include "spawn.h"
#include "sm.h"

#if defined( _MSC_VER  )
#pragma warning( disable  4704 )
#endif


TIMEOUT timeoutStatus = TIMEOUT_AVAILABLE.


static void TimeoutFire ( void );


static DOSBUSYCB fnDosBusyCallBack = NULL,
static VIDBUSYCB fnVidBusyCallBack1 = NULL;
static VIDBUSYCB fnVidBusyCallBack2 = NULL,
static MODALMSGBOXCB fnMsgBoxCallBack =
NULL:
static int iTempThreadIdx =
SMD_NOACTIVETHREAD;
static int iOkThreadIdx;
static int iVideoBusyThreadIdx =
SMD_NOACTIVETHREAD;
static int iSpkrThreadIdx =
SMD_NOACTIVETHREAD,
BYTE aDummyFCB1[] = "\0          ";
BYTE aDummyFCB2[] = "\0          ";

static char *sVideoStateBuff;


void GetForegroundRegs( struct REGW *InRegs )
{
  register struct sreg *s:
  register struct REGW *r
  struct glob_stk far *p

  r = InRegs:
  s = _int_frame:

  r->es = s->es
  r->bp = s->bp
  r->di = s->di:
  r->si = s->si;
  r->cx = s->cx;

  *(word*)&p = s->saved_sp,
  *(((word*)&p)+1) = s->saved_ss;

  r->ds = p->ds,
  r->dx = p->dx
  r->bx = p->bx,
  r->ax = p->ax,
}

void SetForegroundRegs( struct REGW *OutRegs )
{
  struct sreg *s
  struct REGW *r:
  struct glob_stk far *p;

  r = OutRegs;
  s = _int_frame;

  s->es = r->es;
  s->bp = r->bp,
  s->di = r->di;
  s->si = r->si;
  s->cx = r->cx;

  p = ( struct glob_stk far * )MK_FP( s->saved_ss,
s->saved_sp );


  p->ds = r->ds;
  p->dx = r->dx;
  p->bx = r->bx,
  p->ax = r->ax;
}

#if !defined( PROD )
void Trace( char *szOutStr )
{
  REG_W InRegs, OutRegs;

  fil_chr( ( NPSTR )&InRegs, 0, sizeof( REG_W ) ),

  InRegs.ax = SID_FUNCNUM | SID_OUTSTRING;
  InRegs.si = SID_SISIG,
  InRegs.di = SID_DISIG,
  InRegs.ds = SEG( szOutStr );
  InRegs.dx = OFF( szOutStr )

  intn( &InRegs, &OutRegs, SID_INTNUM );
}
#endif

void CallAPIFunction( APIFUNC aAPIFuncTable[] )
{
  APIFUNCPTR fpAPIFunction;
  struct REGW CallerRegs;

  PCB_BEGINCRITICAL
  GetForegroundRegs( &CallerRegs );
  PCB_ENDCRITICAL

  fpAPIFunction = ( APIFUNCPTR )GetAPIFunction(
aAPIFuncTable,
&CallerRegs ).

  if ( fpAPIFunction != NULL )
    ( *fpAPIFunction )( &CallerRegs );
  else
  {
    CallerRegs.ax = ( WORD
)ERR_NOTSUPPORTED;
    SetForegroundRegs( &CallerRegs );
  }
}

NEARPROC GetAPIFunction( APIFUNC
aAPIFuncTable[], struct REGW
*pCallerRegs )
{
  WORD wFuncCode = pCallerRegs->ax & 0x7FFF;
  int iFuncIdx = 0;

  if ( aAPIFuncTable == NULL )
    return ( NULL );

  while ( TRUE )
  {
    if ( wFuncCode == aAPIFuncTable[ iFuncIdx
].wFuncCode )
      return( aAPIFuncTable[ iFuncIdx ].fpAPIFunc );

    if ( aAPIFuncTable[ ++iFuncIdx ].wFuncCode ==
0 &&
        aAPIFuncTable[ iFuncIdx ].fpAPIFunc ==
NULL )
      return ( NULL );
  }
}

int ErrorBeep( void )
{
  sound( SMU_ERRORFREQ, SMU_ERRORDUR );

  if ( iSpkrThreadIdx >= 0 )
  {
    TRACE( "NOTICE: ErrorBeep() reentered\r" );
    return ( ERR_SUCCESS ),
  }

  if ( ( iSpkrThreadIdx = GetTempEventNum() ) < 0 )
    return ( ERR_INTERNAL );

  AddThread( iSpkrThreadIdx, DoSpkrRestore,
NULL, SMD_ONETIME,
FALSE, SHC_SPKRPOLLFREQ,
          0 ).

  return ( ERR_SUCCESS );
}

void DoSpkrRestore( void )
{
  DelThread( iSpkrThreadIdx );

  iSpkrThreadIdx = SMD_NOACTIVETHREAD:

  TRACE( "NOTICE: Speaker frequency restored for
PDV" );

  SetPenSpkFreq();
}

int SMDosBusy( DOSBUSYCB fnCallBack )
{
  if ( iTempThreadIdx >= 0 )
  {
    TRACE( "ERROR: SMDosBusy was reentered\r"
);
    DEBUG_BREAK;
    return ( 0 );
  }

  if ( ( iTempThreadIdx = GetTempEventNum() ) < 0
)
    return ( ERR_INTERNAL );

  fnDosBusyCallBack = fnCallBack

  AddThread( iTempThreadIdx, SMCheckDosBusy,
NULL. SMD_MANYTIMES,
FALSE. DBT_POLLFREQ,
          DBT_MAXRETRY );

  return ( ERR_SUCCESS );
}

void SMCheckDosBusy( void )
{
  BOOL fMadeDosBusy = FALSE;

  if ( *_isr_flg_ptr & ~SMD_SCHEDULERS )
    return;

  if ( dos_busy( 0 ) )
  {
    if ( GetRetryLimit( iTempThreadIdx ) == 0 )
    {
      TRACE( "ERROR: Timed out waiting for DOS
busy\r" );
      DEBUG_BREAK;
    }
    else
      return;
  }

  DelThread( iTempThreadIdx );
  iTempThreadIdx = SMD_NOACTIVETHREAD;

  ( *fnDosBusyCallBack )();
}

int SMVideoBusy( VIDBUSYCB fnCallBack )
{
  if ( fnVidBusyCallBack1 != NULL )
  {
    if ( fnVidBusyCallBack2 != NULL )
    {
      TRACE( "NOTICE: SMVideoBusy() reentered
more than twice,
waiting for SUI video busy\r" );
      DEBUG_BREAK;
      return ( ERR_INTERNAL );
    }
    else
    {
      TRACE( "NOTICE: SMVideoBusy() reentered
waiting for SUI
video busy\r" );
      fnVidBusyCallBack2 = fnCallBack;
    }
  }
  else
    fnVidBusyCallBack1 = fnCallBack;

  if ( iVideoBusyThreadIdx ==
SMD_NOACTIVETHREAD )
  {
    if ( ( iVideoBusyThreadIdx =
GetTempEventNum() ) < 0 )
      return ( ERR_INTERNAL );

    AddThread( iVideoBusyThreadIdx,
SMCheckVideoBusy, NULL.
SMD_POLLED, FALSE,
            SCS_VIDBLOCKPOLLFREQ, 0 );
  }

  return ( ERR_SUCCESS );
}

void SMCheckVideoBusy( void )
{
  static BYTE nCntVideoBlocked = 0;

  if ( !GetVideoBlocked() )
  {
    if ( ++nCntVideoBlocked >= 3 )
    {
      nCntVideoBlocked = 0;
      DelThread( iVideoBusyThreadIdx );
      iVideoBusyThreadIdx =
SMD_NOACTIVETHREAD;
      TRACE( "NOTICE: SUI video not busy, notify
the threads!\r"
);

      if ( fnVidBusyCallBack1 != NULL )
      {
        ( *fnVidBusyCallBack1 )();
        fnVidBusyCallBack1 = NULL;
      }

      if ( fnVidBusyCallBack2 != NULL )
      {
        ( *fnVidBusyCallBack2 )();
        fnVidBusyCallBack2 = NULL;
      }
    }
  }
  else
    nCntVideoBlocked = 0;
}

void SetReentrancy( BOOL fEnable )
{
  static BYTE bOldIsrFlg;

  if ( fEnable )
  {
    PCB_BEGINCRITICAL;
    bOldIsrFlg = *_isr_flg_ptr;
    *_isr_flg_ptr = SMD_NOREENTRANCE;
    PCB_ENDCRITICAL;
  }
  else
  {
    PCB_BEGINCRITICAL;
    *_isr_flg_ptr = bOldIsrFlg;
    PCB_ENDCRITICAL;
  }
}


int RestoreVideoMode( void )
{

  if ( sVideoStateBuff == NULL )
    return ( ERR_INTERNAL );


  VideoState( sVideoStateBuff,
SHC_VIDEOHARDWARE |
SHC_VIDEODATAAREA | SHC_COLORPALREGS.
          SHC_RESTOREVIDEO );

  free( sVideoStateBuff );

  sVideoStateBuff = NULL;

  return ( ERR_SUCCESS );



}

WORD SetVideoMode( BYTE nRequestedMode )
{
  int AX;

  AX = MAKEWORD( nRequestedMode, 0 );
  int10( AX );

  return ( ERR_SUCCESS ):
}
```

```
int VideoState( char *sVidBuff, char nDataType, char
nOperation )
{
  REG_W InRegs, OutRegs;

  fil_chr( ( NPSTR )&InRegs, 0, sizeof( REG_W ) );

  if ( nOperation != SHC_SIZEOFBUFF )
  {
    if ( sVidBuff != NULL )
    {
      InRegs.es = SEG( sVidBuff );
      InRegs.bx = OFF( sVidBuff );
    }
    else
      return ( ERR_INTERNAL );
  }

  InRegs cx = ( int )nDataType;
  InRegs ax = MAKEWORD( nOperation,
SHC_VIDSTATEFUNC );

  intn( &InRegs, &OutRegs, 0x10 );

  if ( nOperation == SHC_SIZEOFBUFF )
    return ( OutRegs.bx );
  else
    return ( ERR_SUCCESS ),
}

int JimExec( char szProgName[], char
sCmdLineParm[] )
{
  int iReturn = 0,
  EXECPARMS ep:
  BYTE aCmdLineTail[] = "\0\r".
  WORD wSegEP, wOffEP wSegPN, wOffPN;
  WORD wOldPSP;

  ep.wSegEnv = 0;

  if ( sCmdLineParm == NULL )
  {
    ep.wOffCmdLineTail = OFF( aCmdLineTail ).
    ep.wSegCmdLineTail = SEG( aCmdLineTail );
  }
  else
  {
    ep.wOffCmdLineTail = OFF( sCmdLineParm );
    ep.wSegCmdLineTail = SEG( sCmdLineParm );
  }

  ep.wOffFCB1 = OFF( aDummyFCB1 );
  ep.wSegFCB1 = SEG( aDummyFCB1 );
  ep.wOffFCB2 = OFF( aDummyFCB2 );
  ep.wSegFCB2 = SEG( aDummyFCB2 );

  wSegEP = SEG( &ep );
  wOffEP = OFF( &ep );
  wSegPN = SEG( szProgName );
  wOffPN = OFF( szProgName ),

  wOldPSP = set_my_psp():

  AX( SMD_DOSEXEC );
  ES( wSegEP );
  BX( wOffEP );
  DS( wSegPN );
  DX( wOffPN ),

  _asm
  {
    int 21h
    jnc success
    mov iReturn,ax
  };

success:
  restore_psp( wOldPSP );
  return ( iReturn );
}

WORD GetFreeMCB( WORD wNumPara )
{
  REG_W InRegs, OutRegs.
  WORD wReturn = 0, wFlags;

  fil_chr( ( NPSTR )&InRegs, 0, sizeof( REG_W ) );

  InRegs.ax = SMD_DOSALLOCMEM;
  InRegs.bx = wNumPara,

  PCB_BEGINCRITICAL,

  wFlags = intn( &InRegs. &OutRegs, SMD_DOSINT
);

  PCB_ENDCRITICAL,

  if ( !( wFlags & GEN_CARRYFLAG ) )
    return ( OutRegs.ax );
  else
    return ( 0 );
}

int SetFreeMCB( WORD wSegment )
{
  REG_W InRegs, OutRegs;
  WORD wFlags.

  fil_chr( ( NPSTR )&InRegs, 0, sizeof( REG_W ) );

  InRegs.ax = SMD_DOSFREEMEM,
  InRegs.es = wSegment;

  PCB_BEGINCRITICAL;

  wFlags = intn( &InRegs, &OutRegs, SMD_DOSINT
);

  PCB_ENDCRITICAL;

  if ( !( wFlags & GEN_CARRYFLAG ) )
    return ( ERR_SUCCESS );
  else
    return ( OutRegs.ax );
}

int StuffKeyStr( char *szStr )
{
  char *cKey = szStr;

  if ( strlen( szStr ) > SHC_MAXLENKBBUFF )
    return ( ERR_INTERNAL );

  while ( TRUE )
  {
    if ( *cKey )
      stuff_key( MAKEWORD( *cKey++, 0 ) );
    else
      return ( ERR_SUCCESS );
  }
}


BOOL IsGetFunction( struct REGW *CallerRegs )
{
  return ( CallerRegs->ax & 0x8000 );
}

char *ParseForFileName( char *szPathName )
{
  int iChar;

  for ( iChar = strlen( szPathName ) - 1; iChar >= 0;
--iChar )
  {
    if ( szPathName[ iChar ] == '\\' )
      return ( szPathName + iChar + 1 );
  }

  return ( NULL );
}

BOOL IsNodeAddressBlank( char *szNodeAddress )
{

  return ( strlen( szNodeAddress ) == 0 ),


}

int DoModalMsgBox( MODALMSGBOXCB
fnCallBack, int iMsgBoxTimeOut )
{
  if ( ( fnMsgBoxCallBack = fnCallBack ) == NULL )
    return ( ERR_INTERNAL );

  if ( ( iOkThreadIdx = GetTempEventNum() ) <
ERR_SUCCESS )
    return ( ERR_INTERNAL );

  SetMsgBoxReturnCode( SUI_NOBUTTONS );

  if ( iMsgBoxTimeOut > 0 )
    AddThread( iOkThreadIdx, WaitForOK, NULL,
SMD_MANYTIMES,
FALSE, SUI_MSGBOXPOLLFREQ,
          iMsgBoxTimeOut );
  else
    AddThread( iOkThreadIdx, WaitForOK, NULL,
SMD_POLLED, FALSE,
SUI_MSGBOXPOLLFREQ,
          0 ),

  return ( ERR_SUCCESS );
}

void WaitForOK( void )
{
  int iButtonCode;

  if ( ( iButtonCode = GetMsgBoxReturnCode() ) !=
SUI_NOBUTTONS )
  {
    DelThread( iOkThreadIdx );
    ( *fnMsgBoxCallBack )( iButtonCode );
  }
  else if ( GetThreadType( iOkThreadIdx ) ==
SMD_MANYTIMES )
  {
    if ( GetRetryLimit( iOkThreadIdx ) == 0 )
    {
      DelThread( iOkThreadIdx );
      ( *fnMsgBoxCallBack )( SUI_NOBUTTONS );
    }
  }
}

int AbsToZero( int iValue )
{
  return ( iValue < 0 ? 0 : iValue );
}

TIMEOUT TimerManager (TIMEOUT_FLAG
fTimeout, int iThreadIdx, long
lTicks)
{
   static int  iTimeoutThreadIdx;
   static int  iThreadInUseIdx = -1;
   TIMEOUT  timeoutReply,

   switch (fTimeout)
   {
     case TF_SET:
     if (timeoutStatus == TIMEOUT_AVAILABLE)
     {
       if ( ( iTimeoutThreadIdx =
GetTempEventNum() ) !=
ERR_INTERNAL )
       {
         AddThread( iTimeoutThreadIdx
TimeoutFire, NULL,
SMD_ONETIME, FALSE,
                   lTicks, 0 );
         timeoutStatus = TIMEOUT_RUNNING,
         iThreadInUseIdx = iThreadIdx;

         timeoutReply = timeoutStatus
       }
       else
         timeoutReply = TIMEOUT_ERROR.
     }
     break;

     case TF_RESET
     if (iThreadInUseIdx == iThreadIdx)
     {
       timeoutStatus = TIMEOUT_AVAILABLE;
       timeoutReply = timeoutStatus;
       iThreadInUseIdx = -1;
     }
     else
       timeoutReply = TIMEOUT_NOTAVAILABLE,
     break;

     case TF_CHECK:
     if (iThreadInUseIdx == iThreadIdx ||
timeoutStatus ==
TIMEOUT_AVAILABLE)
       timeoutReply = timeoutStatus;
     else
       timeoutReply = TIMEOUT_NOTAVAILABLE;
     break;
   }

   return timeoutReply;
}

static void TimeoutFire ( void )
{
   timeoutStatus = TIMEOUT_FIRED;
}

#if defined( _MSC_VER   )
#pragma warning( default : 4704 )
#endif



Copr. 1995 Zenith Data Systems Corp.
#include "cr.h"
#include "sio.h"
#include "spawn.h"
#include "sm.h"

#if defined( _MSC_VER   )
#pragma warning( disable : 4704 )
#endif

static ZDSTRAPREC VIDTrapRec;
static char nXCharRes = -1;
static char nYCharRes = -1;
static int  iYScreenRes = -1;
static iCurrVidMode = 0;

static iPenNotifyThreadIdx = -1;

void InitVIDTrapRec( void )
{
  fil_chr( ( NPSTR )&VIDTrapRec, 0, sizeof(
ZDSTRAPREC ) );

  VIDTrapRec.tr.tr_int = SBS_VIDINTNUM;

  VIDTrapRec.tr.tr_asm_srv =
CRU_ONBUSYOLDINT;

  strcpy( VIDTrapRec.szSMAfterSignature,
szSMSignature );
}

TRAPREC *GetVIDTrapRec( void )
{
  return ( &VIDTrapRec.tr );
}

char GetYCharRes( void )
{
  if ( nYCharRes > 0 )
    return ( nYCharRes );
  else
    return ( SCS_HEIGHTOFTEXTCHAR );
}

char GetXCharRes( void )
{
  if ( nXCharRes > 0 )
    return ( nXCharRes ),
  else
    return ( SCS_WIDTHOFTEXTCHAR );
}

int GetXScreenRes( int iVideoMode )
{
  switch ( iVideoMode )
  {
    case 0x00:
    case 0x01:
      return ( 320 );

    case 0x02:
    case 0x03
      return ( 640 );

    case 0x04:
    case 0x05:
      return ( 320 );

    case 0x06.
      return ( 640 );

    case 0x07:
      return ( 720 ),

    case 0x08:
    case 0x09:
    case 0x0A:
    case 0x0B:
    case 0x0C:
      return ( ERR_INTERNAL );

    case 0x0D:
      return ( 320 );

    case 0x0E:
    case 0x0F:
    case 0x10:
    case 0x11:
    case 0x12:
      return ( 640 );

    default:
      return ( ERR_INTERNAL );
  }
}

int GetYScreenRes( int iVideoMode )
{
  if ( iVideoMode <= SBS_HIGHTEXTVIDMODE &&
iYScreenRes > 0 )
    return ( iYScreenRes );
  else
  {
    switch ( iVideoMode )
```

```
  {
    case 0x00.
    case 0x01.
    case 0x02:
    case 0x03:
    case 0x04
    case 0x05
    case 0x06.
      return ( 400 );

    case 0x07
      return ( 350 ),

    case 0x08
    case 0x09:
    case 0x0A
    case 0x0B
    case 0x0C
      return ( ERR_INTERNAL );

    case 0x0D:
    case 0x0E:
      return ( 200 );

    case 0x0F
    case 0x10
      return ( 350 );

    case 0x11
    case 0x12.
      return ( 480 ).

    default
      return ( ERR_INTERNAL );
  }
 }
}

int GetCurrVidMode( void )
{
 return ( iCurrVidMode ).
}

BOOL VIDTrapService( void )
{
 struct REGW Regs,
 BOOL fReturn = TRUE.

 GetForegroundRegs( &Regs )

 switch ( HIBYTE( Regs.ax ) )
 {
  case SBS_SETVIDEOMODEFUNCS
    TRACE( "NOTICE: Set video mode
intercepted\r" );

    iCurrVidMode = LOBYTE( Regs.ax ) &
~SBS_VIDMODEMASK,


    AfterModePenNotify()
    break,

  case SBS_CHARACTERGENFUNCS
    TRACE( "NOTICE Set text font after mode set
intercepted\r"
).

    if ( iCurrVidMode <=
SBS_HIGHTEXTVIDMODE )
      AfterModePenNotify().
    break;

  default
    return ( FALSE );
 }

 return ( TRUE );
}

void AfterModePenNotify( void )
{
 if ( iPenNotifyThreadIdx >= 0 )
   return.

 if ( ( iPenNotifyThreadIdx = GetTempEventNum() )
< 0 )
   return;

 AddThread( iPenNotifyThreadIdx,
WaitForPenNotify, NULL,
SMD_ONETIME, FALSE,
          SBS_PENNOTIFYPOLLFREQ, 0 );
}

void WaitForPenNotify( void )
{
 char FAR *pNumScreenRows = ( char FAR *
)SHC_ADDSCREENROWS.
 char FAR *pNumCharScans = ( char FAR *
)SHC_ADDCHARSCANLINES;

 DelThread( iPenNotifyThreadIdx ):
 iPenNotifyThreadIdx = -1;

 if ( iCurrVidMode <= SBS_HIGHTEXTVIDMODE )
 {
  nYCharRes = *pNumCharScans;
  iYScreenRes = nYCharRes * (
*pNumScreenRows + 1 );
 }
 else
  iYScreenRes = -1;

 NotifyVideoMode( iCurrVidMode );
}

#if defined( _MSC_VER )
#pragma warning( default : 4704 )
#endif


Copr. 1995 Zenith Data Systems Corp.

MAX_STK_TOP   =   01780h

CMD_LINE_SZ   =   80h
MIN_STK_SZ    =   100h

_TEXT    segment   byte public 'CODE'
_TEXT    ends
_VTX segment byte public 'CODE'
_VTX ends
_ITEXT   segment   byte public 'CODE'
_ITEXT   ends
_ZTEXT   segment   byte public 'CODE'
_ZTEXT   ends
_FITEXT SEGMENT PARA PUBLIC 'CODE'
_FITEXT ENDS
_FXDATA   segment word public 'DATA'
_FXDATA   ends
_FDATA    segment word public 'DATA'
_FDATA    ends
_VDATA    segment word public 'DATA'
_VDATA    ends
_RDATA    segment word public 'DATA'
_RDATA    ends
_IDATA    segment word public 'DATA'
_IDATA    ends
_DATA     segment word public 'DATA'
_DATA     ends
_BSS segment word public 'BSS'
_BSS ends
_BSSEND segment byte public 'BSSEND'
_BSSEND ends


CGROUP   group _TEXT,_VTX,_ITEXT,_ZTEXT
DGROUP   group
_FDATA,_FXDATA,_VDATA,_RDATA,_IDATA,_DAT
A,_BSS,_BSSEND
   assume
cs:CGROUP,ds:DGROUP,ss:DGROUP

_STACK  SEGMENT WORD STACK 'STACK'
_STACK  ENDS

__acrtused    =   09876h
public __acrtused


dly     MACRO    n
    REPT n
        jmp  short $+2
    ENDM
        ENDM

inc2     MACRO    reg
        inc  reg
        inc  reg
        ENDM

dec2     MACRO    reg
        dec  reg
        dec  reg
        ENDM

OP_RET   =   0C3h
OP_CALN  =   0E8h

get MACRO    seg_reg
    push ss
    pop  seg_reg
    ENDM



_DATA    segment word public 'DATA'
extrn
data_beg:byte,_nul_ptr:byte,fdata_beg:byte,fxdata_b
eg:byte
extrn vdata_beg:byte,rdata_beg:byte.bss_top:byte

public __cdata,__ccode
public __dummy_iret,exit_rdy,put_iret,__isr_flg_ptr
__isr_flg_ptr  dw   offset CGROUP:__isr_flg
__ccode        dw   CGROUP
__cdata        dw   DGROUP


put_iret  dw   offset CGROUP:__dummy_iret
_DATA     ends

_IDATA    segment word public 'DATA'
__heap        dw   offset DGROUP:bss_top
__env         dw  0
_cmd_line dw  0
_icode_beg    dw  0
_idata_end    dw  0
vtx_size  dw  0
vtx_target    dw  0
vtx_ovl       dw   offset CGROUP:__dummy_ret
exit_vec  dw   offset CGROUP:__dummy_ret
target_data   dw  0
source_data   dw  0
data_gap  dw  0
res_size  dw  0
exit_rdy  dw   offset CGROUP:__dummy_ret
res_enabled   db  0
extrn _config_block:byte
extrn __tsr_name:byte
extrn idata_beg:byte
extrn __max_stack:word
public res_enabled,exit_rdy,__heap,__env
public
target_data,source_data,data_gap,res_size,exit_vec
public
_cmd_line,_icode_beg,_idata_end,vtx_size,vtx_target
,vtx_ovl

_IDATA ends

_BSS segment word public 'BSS'
extrn bss_beg:byte
_resident db   2 dup(?)
__my_psp  dw   1 dup(?)
psp_tbl       dw   1 dup(?)

__sint_list   dw   1 dup(?)
_res_stack_beg dw   1 dup(?)
_res_free_stack     dw   1 dup(?)
public _res_stack_beg,_res_free_stack,__sint_list

public __my_psp,_cmd_line,_resident,psp_tbl
_BSS ends


_ITEXT    segment   byte public 'CODE'
    ASSUME
CS:CGROUP,DS:DGROUP,SS:DGROUP

extrn isr_psp:word,isr_cblk:byte
extrn vtx_beg:byte
extrn itext_beg:byte
extrn gtx_beg:byte
extrn code_top:byte

public set_cmem
set_cmem  proc near
        cld
        pop  si
        mov  dx,ds
        mov  ax,word ptr ds:[2ch]
        mov  bp,DGROUP
        mov  ds,bp
        mov  es,bp
        mov  [__env],ax
        mov  cx,offset DGROUP:bss_top
        mov  di,offset DGROUP:bss_beg
        sub  cx,di
        xor  ax,ax
        mov  cs:[__lim_ctl],ax
        shr  cx,1
        rep  stosw
        mov  [__my_psp],dx


        mov  es,dx
        mov  bx,MAX_STK_TOP
        mov  ax,[__max_stack]
        add  ax,di
        jnc  scm0
scm0_1:        mov  ax,bx
scm0.          cmp  ax,bx
        ja   scm0_1
        mov  cl,4
        shr  ax,cl
        add  ax,CMD_LINE_SZ/16
        xchg ax,bx
        add  bx,bp
        sub  bx,dx
        mov  ah.4Ah
        int  21h
        jnc  scm1
        mov  ah,4Ah
        int  21h
        jc   scm_err

scm1:         mov  es,bp
        add  bx,dx
        sub  bx,bp
        shl  bx,cl
        sub  bx,CMD_LINE_SZ
        mov  [_cmd_line],bx
        cli
        mov  ss,bp
        mov  sp,bx
        sti
        cmp  sp,offset
DGROUP:bss_top+MIN_STK_SZ
        jb   scm_err
        add  dx,8
        mov  cs:[isr_psp],dx
        mov  [psp_tbl],dx
        mov  ax.offset CGROUP:gtx_beg
        sub  ax.offset CGROUP:vtx_beg
        mov  [vtx_size],ax
        jmp  si

scm_err: mov  ax,4c01h
        int  21h

set_cmem  endp

_FITEXT   segment
assume cs:_FITEXT

public get_cmd_arg
get_cmd_arg    proc far
        cld


        mov  di,[_cmd_line]
        mov  ds,[__my_psp]
        get  es
        mov  si,80h
        mov  cx,7fh
        and  cl,[si]
        inc  si
        rep  movsb
        xor  ax,ax
        stosb


        push ds
        pop  es
        get  ds
        mov  di,102h
        mov  si,offset DGROUP:_config_block+2
        movsw
        movsw
        movsw


        mov  cl,32
        mov  di,5ch
        mov  si,offset DGROUP:__tsr_name
        rep  movsb

        ret
get_cmd_arg    endp
_FITEXT   ends

assume cs:CGROUP

init_fdata:   cld


        mov  si,offset DGROUP:fxdata_beg
        mov  di,offset DGROUP:vdata_beg
ifd_fx:       cmp  si,offset DGROUP:fdata_beg
        jae  ifd1
        lodsw
        xchg ax,bx
        lodsw
        sub  ax,bx
        mov  cs:[bx-2],ax
        mov  byte ptr cs:[bx-3],OP_CALN
        jmp  ifd_fx

public init_rdata
init_rdata:   mov  si,offset DGROUP:rdata_beg
        mov  di,offset DGROUP:idata_beg

ifd1:         sti
        cld
```

```
        cmp  si,di
        jae  ifd_ex
        lodsw
        mov  word ptr [si-2],offset
CGROUP:__dummy_ret
        push si
        push di
        call ax
        pop  di
        pop  si
        get  ds
        jmp  ifd1

ifd_ex:     ret

_TEXT   SEGMENT
public start
start:      jmp  start1

public go_res
go_res      rep  movsb
        int  21h
__dummy_ret:  ret
__dummy_iret. iret
public __dummy_ret,__dummy_iret
extrn __isr_flg:byte,__lim_ctl:word
_TEXT   ENDS


extrn isr_data:word
extrn _main:near
start1      call set_cmem
        call get_cmd_arg
        call init_fdata
        call _main
        push ax
        mov  byte ptr cs:[__isr_flg],07fh
        mov  es,[__env]
        mov  ah,49h
env_patch label word
public env_patch
        int  21h
        cmp  [res_enabled],1
        jz   ist2

ist1:       xor  bx,bx
        mov  cs:[bx],bx
        call word ptr [exit_rdy]
        pop  ax
        mov  ah,4ch
        int  21h
public _exit
_exit:      pop  ax
        jmp  short ist1


ist2:       mov  ax,[__heap]
        add  ax,0fh
        mov  cl,4
        shr  ax,cl
        add  ax,DGROUP
        sub  ax,[__my_psp]
        xchg ax,dx


        mov  si,offset DGROUP:data_beg
        mov  ax,_DATA
        mov  bp,[_idata_end]
        inc2 bp
        sub  bp,offset DGROUP:data_beg
        jbe  ist3
        shr  bp,cl
        add  ax,bp
        shl  bp,cl
        add  si,bp

ist3:       mov  bx,offset CGROUP:vtx_beg
        mov  bp,[vtx_size]
        mov  di,[_icode_beg]
        or   di,di
        jnz  ist3_1
        mov  di,bx
ist3_1:     cmp  di,bx
        jbe  ist3_2
        mov  di,bx
ist3_2:     mov  [vtx_target],di
        add  di,bp
        add  di,0fh
        shr  di,cl
        mov  bx,es
        add  bx,di

ist4:       mov  [target_data],bx
        mov  [source_data],si
        sub  ax,bx
        mov  [data_gap],ax
        sub  dx,ax
        mov  [res_size],dx
        sub  [__cdata],ax
        mov  byte ptr [_resident],0ffh
        call init_rdata


        cli
        call word ptr [vtx_ovl]
        cli


        nop
        xchg bx,bx
fx_graph  label    word


        nop
        xchg bx,bx
fx_fmem_mv    label    word


        nop
        xchg bx,bx
fx_ega_gr label word


        nop
        xchg bx,bx
fx_uptraps    label word


        nop
        xchg bx,bx
fx_ ,w_app    label    word


        nop
        xchg bx,bx
fx_swptk  label word



        nop
        xchg bx,bx
fx_spw_fix    label    word

        mov  ax,[__cdata]
        mov  cs:[isr_data],ax
        mov  es,[target_data]
        mov  si,[source_data]
        mov  dx,[res_size]
        xor  di,di
        mov  ax,[__heap]
        add  ax,0fh
        and  al,0f0h
        mov  [__heap],ax
        xchg ax,cx
        sub  cx,si
        cld
        cli
        mov  cs:[__isr_flg],0
        pop  ax
        mov  ah,31h
        nop
        xchg bx,bx
fx_lim_res    label word
        call go_res
fx_go_res label word

public
fx_go_res,fx_lim_res,fx_spw_fix,fx_spw_app,fx_uptra
ps ,, _graph
public fx_fmem_mv,fx_ega_gr,fx_swptk

_ITEXT    ends

end start
Copr. 1995 Zenith Data Systems Corp.
tLISTBOXENTRY struc
lpszEntry dd 0
cAttribute db 0
ends

MB_LEFTJUSTIFIED equ 0
MB_CENTERED equ 1
MB_RIGHTJUSTIFIED equ 2

PENDRIVER_INTERRUPT equ 67h
SM_FUNCTION_INTERRUPT equ 68h

SM_GET_KEYBOARD_STATUS equ 062h
SM_GET_USER_INTERFACE_LANGUAGE equ
056h
SM_SET_ACTIVE_STATUS equ 060h
SM_GET_INITIAL_SCREEN equ 08050h
SM_GET_ABOUT_DIALOG equ 063h
SM_GET_NEXT_CREDITS_DIALOG equ 64h
SM_UPDATE_DIMENSIONS equ 052h
SM_REQUEST_UNLOAD equ 08053h
SM_REPORT_BUTTON_CLICKED equ 8055H
SM_CALIBRATE_UPPERLEFT equ 0ch
SM_CALIBRATE_LOWERRIGHT equ 800Ch
SM_CANCEL_CALIBRATION equ 00eh
SM_REBOOT_HOST equ 011h
SM_SET_KEYSTROKE equ 061h
SM_REQUEST_ACTIVE_FLASH_UPGRADE equ
12h
SM_PERFORM_FLASH_UPDATE equ 13h
SM_GET_CONNECTION_STATUS equ 22h
SM_GET_HOST_LIST_STATUS equ 21h
SM_UPDATE_HOST_LIST equ 20h
SM_GET_PASSWORD_STATUS equ 25h
SM_REQUEST_CONNECTION equ 23h
SM_REQUEST_DISCONNECTION equ 8023h
SM_ABORT_REQUEST_CONNECTION equ 24h

SM_TEST_FUNCTION equ 0FFFFh

UI_REQUEST_CLOSURE equ 053h
UI_REQUEST_DISPLAY equ 051h
UI_SHOW_MESSAGE_BOX equ 055h
UI_HIDE_MESSAGE_BOX equ 056h
UI_CALIBRATION_COMPLETE equ 0Dh
UI_FLASH_UPDATE_PERCENTAGE equ 14h
UI_GET_SUI_VERSION_NUMBER equ 69h
GET_HOST_LIST_STATUS      equ 021h


RES_NO_SCREEN         EQU 0
RES_OSK_ALPHA         EQU 1
RES_OSK_NUM           EQU 2
RES_OSK_FULL          EQU 3
RES_OSK_BIG           EQU 4
RES_OSK_BIG_ALPHA     EQU 5
RES_OSK_BIG_NUM       EQU 6
RES_OSK_BIG_FULL      EQU 7
RES_SETUPS_HOST       EQU 8h
RES_SETUPS_HOTKEYS    EQU 16h
RES_SETUPS_MAINTENANCE EQU 24h
RES_SETUPS_MODEM      EQU 32h
RES_SETUPS_POWER      EQU 40h
RES_SETUPS_SCREEN     EQU 48h


GETSET_AUTOMATIC_SHUTOFF        equ 0fh
GETSET_BRIGHTNESS               equ 0bh
GETSET_CONTRAST                 equ 0ah
GETSET_CUSTOM_AUTOANSWER_STRING equ
36h
GETSET_CUSTOM_CONNECT_STRING    equ 38h
GETSET_CUSTOM_DISCONNECT_STRING equ
37h
GETSET_CUSTOM_INIT_STRING       equ 035h
GETSET_HOST_CONNECTION_TYPE     equ 02ch
GETSET_MODEM_ANSWER_ON_RING     equ
032h
GETSET_MODEM_BAUD_RATE_ENTRY    equ
29h
GETSET_MODEM_HOST_DESC_ENTRY    equ
26h
GETSET_MODEM_HOST_PHONE_ENTRY   equ
27h
GETSET_MODEM_MANUFACTURER_ENTRY equ
28h
GETSET_MODEM_PREFIX             equ 030h
GETSET_MODEM_RETRY_DELAY        equ 034h
GETSET_MODEM_RETRY_LIMIT        equ 033h
GETSET_MODEM_SUFFIX             equ 031h
GETSET_MODEM_TONE_OR_PULSE      equ 02fh
GETSET_NETWORK_GROUP_ENTRY      equ 2ah
GETSET_NETWORK_HOST_ENTRY       equ 2bh
GETSET_PASSWORD                 equ 02eh
GETSET_SLEEPMODE_PERIOD         equ 10h
GETSET_SECURITY_ID              equ 66h
GETSET_DOMAIN_ID                equ 67h
GETSET_LOCK_HOST_KEYBOARD       equ 68h
GETSET_DIM_HOST_SCREEN          equ 6Ah
GETSET_USER_DEFINED_HOT_ICON    equ 65h
GETSET_USER_ID                  equ 02dh



Copr. 1995 Zenith Data Systems Corp.
      .MODEL  small

SMI_SUIEVENTNUM EQU 0

extrn _PushEventNum:near
extrn _lpfnFarCallEntry:near

_TEXT SEGMENT WORD PUBLIC 'CODE'
ASSUME DS: DGROUP, SS: DGROUP

ASSUME CS: _TEXT

public _SUICallService
_SUICallService PROC far

      push    bp
      mov     bp,sp

      cli

      push    ds
      push    ax
      push    bx
    push cx
      push    dx
      mov     ds, cs:000Ah

      mov     ax, SMI_SUIEVENTNUM
    push ax
      call    _PushEventNum
    add  sp,2

      pop     dx
      pop     cx
      pop     bx
      pop     ax

      sti

      call    DWORD PTR _lpfnFarCallEntry

      pop     ds
      mov     sp,bp
      pop     bp
      ret

_SUICallService     ENDP

public _GetPendingEvent
_GetPendingEvent PROC near

      push    bp
      mov     bp,sp

      mov     ax, cs:0010h

      mov     sp,bp
      pop     bp
      ret

_GetPendingEvent ENDP

_TEXT ENDS

END
Copr. 1995 Zenith Data Systems Corp.
include pd.inc

      .MODEL  small

_TEXT SEGMENT WORD PUBLIC 'CODE'
ASSUME DS: DGROUP, SS: DGROUP

ASSUME CS: _TEXT

public _SetPenSpkFreq
_SetPenSpkFreq proc near
  push    bp
  mov     bp,sp

  mov     al, PD_TIMER2_16BIT_MODE
  cli
  out     43h, al
  jmp     short $+2
  mov     ax, PD_PSEO_FREQUENCY
  out     42h, al
  jmp     short $+2
  mov     al, ah
  out     42h, al
  sti

  mov     sp,bp
  pop     bp
  ret
_SetPenSpkFreq endp

_TEXT ENDS

END

Copr. 1995 Zenith Data Systems Corp.
#include "cr.h"
#include "sio.h"
#include "spawn.h"
#include "frame.h"
#include "sm.h"
#include "sl.h"

#if defined( _MSC_VER )
#pragma warning( disable : 4704 )
#endif

static char szPrompt[] = STR_PROMPT;
static char szLSLProg[] = STR_LSL;
```

```
static char szLSLProgParm[
SL_LSL_CMD_LENGTH ];
static char szIPXODIProg[] = STR_IPXODI;
static char szProximProg[] = STR_PROXIM;
static char szSMANProg[] =
STR_SMANPROGNAME;
static char szSViewProg[] =
STR_SVIEWPROGNAME;
static char szSViewParm[] =
STR_WELCOMESCREEN
static char szPenDrvProg[] =
STR_PDRVPROGNAME;
static char szSDrvNetProg[] =
STR_SDRVNETPROGNAME;
static char szRWinProg[] = STR_RWINPROGNAME;
static char szCommandProg[] =
STR_COMMANDPROGNAME;
static char szCommandParm[] =
STR_COMMANDPARM;
static char szCommandDir[] = STR_COMMANDDIR;
static char szFormatPrompt[ 10 ];
static char szCommandLine[ 80 ];
static char szNullStr[] = "\0";
static char szOutStr[ 80 ];
static char szProgParmsStr[ 80 ];

static BOOL fExit, fNextCommand, fAutoStart =
FALSE fError =
FALSE
static BYTE fVIDRedir = FALSE, fTitleScreen =
FALSE, fLoadSMLow =
FALSE
        fAllowAbort = FALSE,
static char *cToken, *szProgName, *szProgParms;

static int iErrorCode = ERR_SUCCESS;
static int iCol;
static WORD wParms;
static word alsrStack[ MAX_STACKSIZE + 1 ];

static GENERALSTATEIDXS iGeneralState,
static COMMANDSTATEIDXS iCommandState,
static TRAPREC VIDTrapRec,
static TRAPREC SMTrapRec;

void main()
{
 int iCmdLineIdx,
 BYTE nLenCmdLine;

 sprintf( szFormatPrompt "\n%s", szPrompt );

 chk_video().
 get_crs(),
 crs_x = bcrs_x,
 crs_y = bcrs_y;
 mv_crs();

 fExit = FALSE;

 iCmdLineIdx = str_pos( '-', cmd_line );
 nLenCmdLine = str_len( cmd_line );

 while ( iCmdLineIdx > 0 && iCmdLineIdx <
nLenCmdLine )
 {
  switch ( cmd_line[ iCmdLineIdx ] | 0x20 )
  {
   case 'g':
    fAutoStart = TRUE;

    if ( ( ( cmd_line[ iCmdLineIdx + 1 ] | 0x20 ) ==
't' ) )
    {
     fTitleScreen = TRUE;
     fVIDRedir = TRUE;
    }
    break;

   case 'l':
    fLoadSMLow = TRUE,
    break;

   case 'a':
    fAllowAbort = TRUE;
    break.

   default:
    printf( "\nERROR: invalid parameter\n" );
    break;
  }

  *( cmd_line + iCmdLineIdx - 1 ) = ' ';

  iCmdLineIdx = str_pos( '-', cmd_line );
 }

 if ( !fVIDRedir )
 {
  printf( "Saratoga Loader, Copyright (c) 1994-1995
Zenith Data
Sy<-->ms\n" );
  printf( "Mobile Systems Engineering, Version
1.1\n" );
 }

 if ( fAutoStart )
 {
  clr_scr();

  crs_x = 0;
  crs_y = 0;
  mv_crs();

  if ( fTitleScreen )
  {
   RunProgram( szSViewProg, szSViewParm );
  }

  if ( KeyPressedIn( 2 ) )
  {
   switch( GetActionKey() )
   {
    case KBD_DIAG:
     change_dir( szCommandDir );
     RunProgram( szCommandProg,
szCommandParm );
     DoExit( 1 );
     break;

    case KBD_ABORTLOAD:
     if ( fAllowAbort )
      DoExit( 1 );
     break,
   }
  }
 }

 do
 {
  *.:l = 0;

  if ( !fError )
   fil_chr( szCommandLine, 0, sizeof (
szCommandLine ) );
  else
   fError = FALSE;

  if ( !fAutoStart )
  {
   printf( szFormatPrompt );
   edit_str( szCommandLine,
MAX_WIDTHOFSCREEN - sizeof (
szPrompt ), &iCol, pckey );
   up_case( szCommandLine );
  }
  else
  {
   szCommandLine[0] = 'C';
   szCommandLine[1] = 'W';
   fAutoStart = FALSE;
  }

  cToken = szCommandLine;
  iGeneralState = STM_COMMAND;
  iCommandState = COM_UNKNOWN;
  fNextCommand = FALSE;

  while ( *cToken != NULL && !fNextCommand &&
!fExit )
  {
   if ( iGeneralState > STM_UNKNOWN )
    iGeneralState = STM_UNKNOWN;

   if ( ( iErrorCode = ( *fnStateTableProcs[
iGeneralState ]
)() ) == ERR_INTERNAL )
    fExit = TRUE;
  }
 } while ( !fExit );

 DoExit( 0 );
}

void DoExit( int iStatus )
{
 RemoveVidTrap();
 SetVideoMode( SUI_TEXTVIDMODE | 0x80 );

 exit( iStatus );
}

int ProcessIdle( void )
{
 return ( ERR_SUCCESS );
}

int ParseCommand( void )
{
 switch ( *cToken )
 {
  case 'R':
   if ( *( cToken + 1 ) == VAL_SPACE )
   {
    iGeneralState = STM_PARM;
    iCommandState = COM_RUNPROG;
    cToken += 2;
   }
   else if ( *( cToken + 1 ) == NULL )
   {
    iGeneralState = STM_EXECUTE;
    iCommandState = COM_RUNSM;
   }
   else
    goto com_unknown;
   break;

  case 'C':
   if ( *( cToken + 2 ) == NULL )
   {
    iGeneralState = STM_EXECUTE;

    if ( *( cToken + 1 ) == 'D' )
     iCommandState = COM_RUNDOSCOS;
    else if ( *( cToken + 1 ) == 'W' )
     iCommandState = COM_RUNWINCOS;
    else
     goto com_unknown;
   }
   else
    goto com_unknown;
   break;

  case 'X':
   if ( *( cToken + 1 ) == 'X' )
    iGeneralState = STM_EXIT;
   else
    goto com_unknown;
   break;

  default:
com_unknown:
   printf( "\nERROR: command unknown" );
   fError = fNextCommand = TRUE;
 }

 return ( ERR_SUCCESS );
}

int ParseParameters( void )
{
 switch ( iCommandState )
 {
  case COM_RUNPROG:
   if ( ( wParms = str_pos( VAL_SPACE, cToken )
) > 0 )
   {
    *( cToken + ( wParms - 1 ) ) = NULL;
    szProgName = cToken;
    cToken += wParms;
    sprintf( szProgParmsStr, " %s\r", cToken );
    szProgParms = szProgParmsStr;
   }
   else
   {
    szProgName = cToken;
    szProgParms = szNullStr;
   }

   iGeneralState = STM_EXECUTE;
   break;

  default:
   fError = TRUE;
   printf( "\nERROR: unknown command in the
parse parameter
state" );
   break;
 }

 return ( ERR_SUCCESS );
}

int ExecuteCommand( void )
{
 if ( !fVIDRedir )
  printf( "\n" );

 switch ( iCommandState )
 {
  case COM_RUNSM:
   fNextCommand = TRUE;
   RunProgram( szSMANProg, szNullStr );
   break;

  case COM_RUNDOSCOS:
  case COM_RUNWINCOS:
   fNextCommand = TRUE;

   if ( fVIDRedir )
    InitTraps( ITR_SETVIDTRAP );
   else
    InitTraps( ITR_NOSETVIDTRAP );

   if ( LoadSM( fLoadSMLow ?
SMD_ALLOCFIRSTFIT :
SMD_ALLOCBESTFIT ) != ERR_SUCCESS )
    break;

   strcpy( szLSLProgParm, " " );

   switch ( GetFrameType() )
   {
    case SL_FT_E802_2:
     strcat( szLSLProgParm,
SL_LSL_CMD_E802_2 );
     break;

    case SL_FT_EII:
     strcat( szLSLProgParm, SL_LSL_CMD_EII );
     break;

    case SL_FT_ESNAP:
     strcat( szLSLProgParm,
SL_LSL_CMD_ESNAP );
     break;

    case SL_FT_E802_3:
     strcat( szLSLProgParm,
SL_LSL_CMD_E802_3 );
     break;

    default:
     if ( !fVIDRedir )
      printf( "ERROR: Invalid Frame Type
detected. The
default Frame Type 802.3 will be used.\n" );
     strcat( szLSLProgParm,
SL_LSL_CMD_E802_3 );
     break;
   }

   if (
#if defined( MOUSE )
      RunProgram( "mouse.com", szNullStr ) !=
ERR_SUCCESS
||
#else
      RunProgram( szPenDrvProg, szNullStr ) !=
ERR_SUCCESS
||
#endif
      LoadNetwork() != ERR_SUCCESS ||
      RunProgram( szSDrvNetProg, " -N1
-O2048 -WT20V" ) !=
ERR_SUCCESS )
    break;

   if ( iCommandState == COM_RUNWINCOS )
    RunProgram( szRWinProg, szNullStr );

   KickSUI();
   break;

  case COM_RUNPROG:
   fNextCommand = TRUE;
   RunProgram( szProgName, szProgParms );
   break;

  default:
   fError = TRUE;
   printf( "\nERROR: unknown command in the
execution state"
);
   break;
 }

 return ( ERR_SUCCESS );
}

int ProcessSLExit( void )
{
 fExit = TRUE;

 return ( ERR_SUCCESS );
}

int ProcessStateUnknown( void )
{
 printf( "\nERROR: unknown state" );

 return ( ERR_INTERNAL );
}

int RunProgram( char *szProgName, char
*szProgParms )
```

```
{
  int iSpawnReturn.

  if ( ( iSpawnReturn = spawn_nr( szProgName,
szProgParms ) ) >=
0 )
    iSpawnReturn = ERR_SUCCESS;
  else
  {
    if ( !fVIDRedir )
      pnntf( "\nERROR: %s, spawn error %d",
szProgName,
             iSpawnReturn );
    fError = TRUE,
  }

  return ( iSpawnReturn ),
}

int LoadMLID( char *szProgName )
{
  int iLoadIdx:

  for ( iLoadIdx = 0; iLoadIdx <
MAX_MLIDLOADRETRY  ++iLoadIdx )
  {
    if ( RunProgram( szProgName, szNullStr ) !=
ERR_SUCCESS )
      return ( ERR_INTERNAL );

    if ( GetMLIDStatus() == TRUE )
      return ( ERR_SUCCESS ),
  }

  spnntf( szOutStr,
         "\nERROR: The load sequence was aborted
due to a
failure in the loading of:\n%s.\n",
         szProximProg ):

  DisplayError( szOutStr ):

  return ( ERR_INTERNAL );
}

int EnableKbd( void )
{
  REG_W InArgs, OutArgs;

  fil_chr( &InArgs, 0, sizeof ( InArgs ) );

  InArgs.ax = SMI_SLENABLEKBD.

  intn( &InArgs, &OutArgs, SMI_SCSINTNUM );

  return ( 0 ).
}

int GetFrameType( void )
{
  REG_W InArgs, OutArgs.

  fil_chr( &InArgs, 0. sizeof ( InArgs ) );

  InArgs.ax = SMI_SLGETFRAMETYPE:

  intn( &InArgs, &OutArgs, SMI_SCSINTNUM ),

  return ( OutArgs.ax ).
}

int GetMLIDStatus( void )
{
  REG_W InArgs, OutArgs;

  fil_chr( &InArgs, 0, sizeof ( InArgs ) ):

  InArgs.ax = SMI_SLGETMLIDSTATUS,

  Intn( &InArgs, &OutArgs, SMI_SCSINTNUM );

  return ( OutArgs.ax );
}

void SetOldVidVector( LONG lOldVidVector )
{
  REG_W InArgs, OutArgs,

  fil_chr( &InArgs, 0, sizeof ( InArgs ) );

  InArgs.ax = SMI_SLDEFINEOLDVIDVECTOR:
  InArgs.bx = OFF( lOldVidVector );
  InArgs.dx = SEG( lOldVidVector );
  intn( &InArgs, &OutArgs, SMI_SCSINTNUM );
}

int KickSUI( void )
{
  REG_W InArgs, OutArgs,

  RemoveVidTrap();

  fil_chr( &InArgs, 0, sizeof ( InArgs ) );

  InArgs.ax = SMI_SLLOADSUI;

  Intn( &InArgs, &OutArgs, SMI_SCSINTNUM );

  EnableKbd();

  return ( 0 );
}

int LoadSM( int iMemStrategy )
{
  int iRunStatus;

  if ( iMemStrategy != SMD_ALLOCFIRSTFIT )
  {
    PatchMCB();
    SetMemStrategy( iMemStrategy );
  }

  iRunStatus = RunProgram( szSMANProg,
szNullStr );

  SetMemStrategy( SMD_ALLOCFIRSTFIT )

  return ( iRunStatus );
}

int LoadNetwork( void )
{
  if ( RunProgram( szLSLProg, szLSLProgParm ) !=
ERR_SUCCESS ||
       LoadMLID( szProximProg )              !=
ERR_SUCCESS ||
       RunProgram( szIPXODIProg, szNullStr )  !=
ERR_SUCCESS )
    return ( ERR_INTERNAL );

  return ( ERR_SUCCESS );
}

int KeyPressedIn( int iDelay )
{
  int iTickCount:
  long iSyncCount.

  kbflag = 0;

  if ( fVIDRedir )
  {
    if ( fAllowAbort )
      printf( "\n[CTRL]+[ALT]+A to abort load
sequence or
[CTRL]+[ALT]+D to load diagnostic...\n" );
    else
      printf( "\n[CTRL]+[ALT]+D to load
diagnostic...\n" ),
  }

  for ( iTickCount = 0; iTickCount < iDelay;
++iTickCount )
  {
    lSyncCount = sync_ticks():

    while ( TRUE )
    {
      if ( sync_ticks() - iSyncCount >= 20 )
        break;

      if ( anykey() )
        return ( TRUE );
    }
  }

  return ( FALSE );
}

ACTIONKEYS GetActionKey( void )
{
  WORD wKey;

  if ( anykey() )
  {
    wKey = pckey();

    if ( kbflag & KBD_CTRLMASK &&
         kbflag & KBD_ALTMASK )
    {
      switch( wKey )
      {
        case KBD_DSCAN:
          return ( KBD_DIAG ):

        case KBD_ASCAN:
          return ( KBD_ABORTLOAD ),
      }
    }
  }

  return ( KBD_NOACTIONKEY );
}

void InitTraps( BYTE nVidTrapStatus )
{
  install_trap( ( fp )TrapService, MAX_STACKSIZE *
sizeof ( int
), SMD_FULLREENTER );
  enable_tsr( alsrStack, MAX_STACKSIZE * sizeof (
int ) );

  if ( nVidTrapStatus == ITR_SETVIDTRAP )
  {
    VIDTrapRec.tr_int = SBS_VIDINTNUM;
    VIDTrapRec.tr_asm_srv =
CRU_ONBUSYOLDINT:

    add_trap( &VIDTrapRec );

    fVIDRedir = TRUE;
  }

  SMTrapRec.tr_int = SBS_SLINTNUM;
  SMTrapRec.tr_asm_srv = CRU_ONBUSYOLDINT:

  add_trap( &SMTrapRec );
}

BOOL RemoveVidTrap( void )
{
  BOOL fReturn = FALSE;
  DWORD dwCurrVidTrap.
  DWORD dwOldVidTrap = VIDTrapRec.tr_old_int,

  PCB_BEGINCRITICAL;

  if ( VIDTrapRec.tr_int > 0 )
  {
    SetOldVidVector( dwOldVidTrap );
    if ( ( dwCurrVidTrap = clr_trap( &VIDTrapRec ) )
!=
dwOldVidTrap )
      set_int_vec( SBS_VIDINTNUM, dwCurrVidTrap
);


    VIDTrapRec.tr_int = 0,

    fReturn = TRUE:
    fVIDRedir = FALSE;
  }

  PCB_ENDCRITICAL;

  return ( fReturn );
}

void DisplayError( char *szErrStr )
{
  RemoveVidTrap();
  SetVideoMode( SUI_TEXTVIDMODE | 0x80 );

  pnntf( szErrStr );
}

WORD TrapService( struct trap_rec *CurrTrapRec )
{
  struct REGW InRegs, OutRegs;
  WORD wFlags;

  GetForegroundRegs( &InRegs );

  switch ( CurrTrapRec->tr_int )
  {
    case SBS_VIDINTNUM:
      switch ( HIBYTE( InRegs.ax ) )
      {
        case SBS_TELETYPE:
          break;

        case SBS_RELOCATEDSCRADD:

          wFlags = intn( &InRegs, &OutRegs,
SBS_VIDINTNUM );
          SetForegroundRegsFlags( &OutRegs,
SFR_SETFLAGS, wFlags
);
          SetVideoMode( SUI_INITIALVIDMODE );

          break:

        default:
          return ( ( WORD )CurrTrapRec );
      }
      break;

    case SBS_SLINTNUM:
      wFlags = intn( &InRegs. &OutRegs,
SBS_INTNUM );
      SetForegroundRegsFlags( &OutRegs,
SFR_SETFLAGS, wFlags );
      break;

    default:
      return ( ( WORD )CurrTrapRec );
  }

  return ( 0 );
}

void GetForegroundRegs( struct REGW *InRegs )
{
  register struct sreg *s;
  register struct REGW *r;
  struct glob_stk far *p;

  r = InRegs;
  s = _int_frame;

  r->es = s->es;
  r->bp = s->bp;
  r->di = s->di;
  r->si = s->si;
  r->cx = s->cx;

  *(word*)&p = s->saved_sp;
  *(((word*)&p)+1) = s->saved_ss;

  r->ds = p->ds;
  r->dx = p->dx:
  r->bx = p->bx:
  r->ax = p->ax,
}

void SetForegroundRegsFlags( struct REGW
*OutRegs. BYTE
fSetFlags, WORD wFlags )
{
  struct sreg *s,
  struct REGW *r;
  struct glob_stk far *p;

  r = OutRegs:
  s = _int_frame;

  s->es = r->es.
  s->bp = r->bp.
  s->di = r->di;
  s->si = r->si;
  s->cx = r->cx;

  p = ( struct glob_stk far * )MK_FP( s->saved_ss,
s->saved_sp );


  p->ds = r->ds;
  p->dx = r->dx;
  p->bx = r->bx;
  p->ax = r->ax;

  if ( fSetFlags == SFR_SETFLAGS )
    p->Flags = wFlags:
}

WORD SetVideoMode( BYTE nRequestedMode )
{
  int AX;

  AX = MAKEWORD( nRequestedMode, 0 );
  int10( AX );

  return ( 0 );
}


#if defined( _MSC_VER   )
#pragma warning( default : 4704 )
#endif
Copr. 1995 Zenith Data Systems Corp.

#include "cr.h"
#include "sio.h"
#include "spawn.h"
#include "frame.h"
#include "sm.h"

#define MCB_TARGETSEGMENT 0xC000
#define MCB_TARGETSEGSIZE 0x1000
#define MCB_OWNERDOS 0x0008

MCB far *GetFirstMCB( void );
MCB far *GetNextMCB( MCB far *lpCurrMCB );
MCB far *GetLastMCB( void );
```

```
int PatchMCB( void )
{
  MCB far *lpLastMCB;
  MCB far *lpBeyondLastMCB;
  MCB far *lpTargetMCB;

  PCB_BEGINCRITICAL

  if ( ( lpLastMCB = GetLastMCB() ) == NULL )
    return ( ERR_INTERNAL );

  lpLastMCB->cType = 'M';
  lpLastMCB->wSize -= 1;

  if ( ( lpBeyondLastMCB = GetNextMCB(
lpLastMCB ) ) == NULL )
    return ( ERR_INTERNAL );

  lpBeyondLastMCB->cType = 'M';
  lpBeyondLastMCB->wSize =
MCB_TARGETSEGMENT - SEG(
lpBeyondLastMCB ) - 1;
  lpBeyondLastMCB->wOwner =
MCB_OWNERDOS;

  lpTargetMCB = ( MCB far * )MK_FP(
MCB_TARGETSEGMENT, 0 );
  lpTargetMCB->cType = 'Z';
  lpTargetMCB->wOwner = 0;
  lpTargetMCB->wSize = ( WORD
)MCB_TARGETSEGSIZE - 1;

  return ( ERR_SUCCESS );
}

int SetMemStrategy( int iStatCode )
{
  REG_W InRegs, OutRegs;
  WORD wFlags;

  fil_chr( ( NPSTR )&InRegs, 0, sizeof( REG_W ) );

  InRegs.ax = SMD_GETSETALLOCSTRAT |
SMD_SETALLOCSTRAT;
  InRegs.bx = iStatCode;

  wFlags = intn( &InRegs, &OutRegs, SMD_DOSINT
);

  if ( !( wFlags & GEN_CARRYFLAG ) )
    return ( ERR_SUCCESS );
  else
    return ( ERR_INTERNAL );
}

MCB far *GetFirstMCB( void )
{
  REG_W InRegs, OutRegs;
  WORD wFlags;
  unsigned far *lpListOfLists;

  fil_chr( ( NPSTR )&InRegs, 0, sizeof( REG_W ) );

  InRegs.ax = SMD_GETLISTOFLISTS;

  wFlags = intn( &InRegs, &OutRegs, SMD_DOSINT
);

  if ( !( wFlags & GEN_CARRYFLAG ) )
  {
    lpListOfLists = ( unsigned far * ) MK_FP(
OutRegs.es
OutRegs.bx - 2 );

    return ( ( MCB far * ) MK_FP( *lpListOfLists, 0 ) );
  }
  else
    return ( NULL );
}

MCB far *GetNextMCB( MCB far *lpCurrMCB )
{
  return ( MK_FP( SEG( lpCurrMCB ) +
lpCurrMCB->wSize + 1, 0 ) );

}

MCB far *GetLastMCB( void )
{
  MCB far *lpLastMCB = GetFirstMCB();

  while ( TRUE )
  {
    if ( lpLastMCB == NULL )
      return ( NULL );

    lpLastMCB = GetNextMCB( lpLastMCB );

    if ( lpLastMCB->cType == 'Z' )
      return ( lpLastMCB );
  }
}

Copr. 1995 Zenith Data Systems Corp

#include "cr.h"
#include "spawn.h"
#include "sm.h"
#include "lm.h"

BOOL f2MegFlash = FALSE;
static BYTE nCurrVidPallette = 0;
static BYTE nCurrSpeakerState = FON;
static BYTE nCurrRightMouseButton = FOFF;
static BYTE fSuspendInProgress = FOFF;

BYTE aBrightValues[] =
{
0,
3,
6,
9,
18,
21,
25,
27,
29,
31,
33,
35,
37,
39,
41,
43,
45,
47,
49,
51,
53,
55,
57,
59,
};

BYTE aContrastValues[] =
{
26,
27,
28,
29,
30,
31,
32,
34,
36,
38,
39,
40,
41,
42,
43,
44,
45,
46,
47,
48,
49,
50,
51,
52,
};

int SetContrast( BYTE nContrastIdx )
{
  REG_W InRegs, OutRegs;
  WORD wFlags,

  fil_chr( ( NPSTR )&InRegs, 0, sizeof( REG_W ) );

  InRegs.ax = SBS_SARATOGAFUNC;
  InRegs.bx = SBS_ADJUSTCONTRAST;
  InRegs.ax |= aContrastValues[ nContrastIdx ];

#if !defined( NOINT15 )
  wFlags = intn( &InRegs, &OutRegs,
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL );
}

int SetBrightness( BYTE nBrightnessIdx )
{
  REG_W InRegs, OutRegs,
  WORD wFlags;

  fil_chr( ( NPSTR )&InRegs, 0, sizeof( REG_W ) );

  InRegs.ax = SBS_SARATOGAFUNC;
  InRegs.bx = SBS_ADJUSTBRIGHTNESS;
  InRegs.ax |= aBrightValues[ nBrightnessIdx ];

#if !defined( NOINT15 )
  wFlags = intn( &InRegs, &OutRegs,
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL );
}

int SetPowerEnable( BYTE nPowerManIdx )
{
  REG_W InRegs, OutRegs;
  WORD wFlags,

  fil_chr( ( NPSTR )&InRegs, 0, sizeof( REG_W ) );

  InRegs.ax = SBS_SARATOGAFUNC;
  InRegs.bx = SBS_SETPOWERENABLE;
  InRegs.ax |= ( WORD )nPowerManIdx;


#if !defined( NOINT15 )
  wFlags = intn( &InRegs, &OutRegs,
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL );
}

int SetDozeTimeout( BYTE nDozeIdx )
{
  REG_W InRegs, OutRegs;
  WORD wFlags.

  fil_chr( ( NPSTR )&InRegs, 0. sizeof( REG_W ) );

  InRegs.ax = SBS_SARATOGAFUNC;
  InRegs.bx = SBS_SETDOZETIMEOUT;
  InRegs.ax |= ( WORD )nDozeIdx;

#if !defined( NOINT15 )
  wFlags = intn( &InRegs, &OutRegs,
SBS_SLINTNUM );
#else
  wFlags = 0;
#endif

  if ( !( wFlags & GEN_CARRYFLAG ) )
    return ( ERR_SUCCESS ),
  else
    return ( ERR_INTERNAL );
}

int SetSleepTimeout( BYTE nSleepIdx )
{
  REG_W InRegs, OutRegs;
  WORD wFlags;

  fil_chr( ( NPSTR )&InRegs, 0, sizeof( REG_W ) );

  InRegs.ax = SBS_SARATOGAFUNC;
  InRegs.bx = SBS_SETSLEEPTIMEOUT;
  InRegs.ax |= nSleepIdx;

#if !defined( NOINT15 )
  wFlags = intn( &InRegs, &OutRegs,
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL );
}

int SetSuspendTimeout( BYTE nSuspendIdx )
{
  REG_W InRegs, OutRegs;
  WORD wFlags;

  fil_chr( ( NPSTR )&InRegs, 0, sizeof( REG_W ) );

  InRegs.ax = SBS_SARATOGAFUNC;
  InRegs.bx = SBS_SETSUSPENDTIMEOUT;
  InRegs.ax |= nSuspendIdx;

#if !defined( NOINT15 )
  wFlags = intn( &InRegs, &OutRegs,
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL );
}

void Set2MegFlash( BOOL fNew2MegFlash )
{
  f2MegFlash = fNew2MegFlash;
}

BOOL IsFlashSupported( void )
{
  REG_W InRegs. OutRegs.

  fil_chr( ( NPSTR )&InRegs, 0, sizeof ( InRegs ) ),

  InRegs.ax  = SBS_SARATOGAFLASH;
  InRegs.ax |= SBS_FLASHAVAILABLE;

#if !defined( FLASHTEST )
  intn( &InRegs, &OutRegs, SBS_SLINTNUM );
#else
  return ( TRUE );
#endif

  return ( OutRegs.ax ==
SBS_FLASHAVAILRETCODE );
}

int FlashSector( LPSTR sFlashImageBuff, int
iCurrFlashFile )
{
  REG_W InRegs, OutRegs;
  int iFlashSector, iReturn,
  WORD wFlags;
  LONG l20BitEffAdd

  if ( iCurrFlashFile <= 0 || sFlashImageBuff ==
NULL )
    return ( ERR_INVALIDPARM );

  if ( EnableFlashWrite( TRUE ) != ERR_SUCCESS
)
    return ( ERR_INTERNAL ),

  fil_chr( &InRegs, 0, sizeof ( InRegs ) );

  if ( f2MegFlash )
    iFlashSector = SBS_2MEGBASESECTOR + (
iCurrFlashFile - 1 );
  else
    iFlashSector = SBS_1MEGBASESECTOR + (
iCurrFlashFile - 1 )

  l20BitEffAdd = ( ( LONG )SEG( sFlashImageBuff )
* 16 ) + OFF(
sFlashImageBuff );

  InRegs.ax = MAKEWORD( SBS_FLASHNOTEXT,
HIBYTE(
SBS_SARATOGAFLASH ) );
  InRegs.bx = MAKEWORD( LOBYTE( HIWORD(
l20BitEffAdd ) ),
                     LOBYTE( iFlashSector ) );
  InRegs.di = LOWORD( l20BitEffAdd );

#if !defined( FLASHTEST )
  wFlags = intn( &InRegs, &OutRegs,
SBS_SLINTNUM );
#else
  wFlags = 0;
#endif

  if ( !( wFlags & GEN_CARRYFLAG ) )
    iReturn = SBS_FLASHSUCCESS;
  else
    iReturn = HIBYTE( OutRegs.ax );

  EnableFlashWrite( FALSE );

  return ( iReturn );
}
```

```
int EnableFlashWrite( BOOL fEnable )
{
 REG_W InRegs, OutRegs.
 WORD wFlags;

 fil_chr( &InRegs, 0, sizeof ( InRegs ) );

 InRegs.ax = MAKEWORD( LOBYTE( ( fEnable ?
SBS_ENABLEWRITE
SBS_DISABLEWRITE ) ),
                HIBYTE( SBS_SARATOGAFUNC
) );
 InRegs.bx = SBS_ENABLEDISABLEWRITE;

#if !defined( FLASHTEST )
 wFlags = intn( &InRegs. &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int RotatePallette( void )
{
 REG_W InRegs, OutRegs;
 int iCurrVideoMode = GetCurrVidMode().
 BYTE nNewVidPallette,

 fil_chr( ( NPSTR )&InRegs, 0, sizeof( REG_W ) );

 if ( iCurrVideoMode == SUI_INITIALVIDMODE )
 {
  if ( nCurrVidPallette != SBS_INVVIDPALLETTE )
   nNewVidPallette = SBS_INVVIDPALLETTE;
  else
   nNewVidPallette = SBS_DEFVIDPALLETTE,
 }
 else
 {
  if ( ( nNewVidPallette = nCurrVidPallette + 1 ) >
     SBS_MAXNUMVIDPAL )
   nNewVidPallette = SBS_DEFVIDPALLETTE.
 }

 InRegs.ax = ( WORD )( SBS_VIDEO |
nNewVidPallette );
 InRegs.bx = ( WORD )( SBS_VIDEOPALLETTE );

#if !defined( NOINT15 )
 intn( &InRegs, &OutRegs, SBS_VIDINTNUM ),
#else
#endif

 nCurrVidPallette = nNewVidPallette,

 return ( ERR_SUCCESS );
}

int ToggleSpeaker( void )
{
 REG_W InRegs, OutRegs:
 WORD wFlags;
 BYTE nNewSpeakerState;

 fil_chr( ( NPSTR )&InRegs, 0. sizeof( REG_W ) ).

 if ( nCurrSpeakerState == FON )
  nNewSpeakerState = FOFF.
 else
  nNewSpeakerState = FON;

 InRegs.ax = SBS_SARATOGAFUNC |
nNewSpeakerState;
 InRegs.bx = SBS_ENADISSPEAKER;

#if !defined( NOINT15 )
 wFlags = intn( &InRegs. &OutRegs,
SBS_SLINTNUM );
#else
 wFlags = 0;
#endif

 if ( !( wFlags & GEN_CARRYFLAG ) )
 {
  nCurrSpeakerState = nNewSpeakerState;
  return ( ERR_SUCCESS );
 }
 else
  return ( ERR_INTERNAL );
}

BYTE GetRightMouseStatus( void )
{
 return ( nCurrRightMouseButton );
}

int EnableRightMouseButton( BYTE
nNewRightMouseButton )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC |
nNewRightMouseButton;
 InRegs.bx = SBS_ENADISRIGHTMOUSE;

#if !defined( NOINT15 )
 wFlags = intn( &InRegs, &OutRegs.
SBS_SLINTNUM );
#else
 wFlags = 0;
#endif

 if ( !( wFlags & GEN_CARRYFLAG ) )
 {
  nCurrRightMouseButton =
nNewRightMouseButton,
  return ( ERR_SUCCESS );
 }
 else
  return ( ERR_INTERNAL );
}

int SetTowerIcon( BYTE nTowerStatus, BYTE
nWavesStatus )
{
 REG_W InRegs, OutRegs;
 WORD wFlags.

 fil_chr( ( NPSTR )&InRegs, 0, sizeof( REG_W ) ),

 InRegs.ax = SBS_SARATOGAFUNC |
nTowerStatus;
 InRegs.bx = SBS_TOWERWAVESICON;
 InRegs.cx = ( WORD )nWavesStatus.

#if !defined( NOINT15 )
 wFlags = intn( &InRegs, &OutRegs.
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int DoSleep( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_GOTOSLEEP:

#if !defined( NOINT15 )
 wFlags = intn( &InRegs, &OutRegs.
SBS_SLINTNUM ).
#else
 wFlags = 0;
#endif

 if ( !( wFlags & GEN_CARRYFLAG ) )
  return ( ERR_SUCCESS );
 else
  return ( ERR_INTERNAL );
}

int DoSuspend( BOOL fSaveEEROMData )
{
 REG_W InRegs, OutRegs;

 fil_chr( ( NPSTR )&InRegs, 0, sizeof( REG_W ) );


 if ( fSaveEEROMData )
  SetEEUIData();

 InRegs.ax = SBS_SARATOGAFUNC;
 InRegs.bx = SBS_GOTOSUSPEND;

#if !defined( NOINT15 )
 intn( &InRegs, &OutRegs, SBS_SLINTNUM );
#else
#endif

 return ( ERR_INTERNAL );
}

int SetSuspendFlagPointer( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_SUSPENDFLAGPTR;
 InRegs.es = SEG( &fSuspendInProgress );
 InRegs.dx = OFF( &fSuspendInProgress );

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
 {
  SetSuspendFlag( FOFF );
  return ( ERR_SUCCESS );
 }
 else
  return ( ERR_INTERNAL );
}

void SetSuspendFlag( BOOL fStatus )
{
 PCB_BEGINCRITICAL;
 fSuspendInProgress = LOBYTE( fStatus ),
 PCB_ENDCRITICAL:
}

BOOL GetSuspendFlag( void )
{
 BOOL fReturn;

 PCB_BEGINCRITICAL;
 fReturn = fSuspendInProgress;
 PCB_ENDCRITICAL,

 return ( fReturn );
}

int GetSystemResumeBit( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_GETSYSRESUMEBIT;

#if !defined( NOINT15 )
 wFlags = intn( &InRegs, &OutRegs,
SBS_SLINTNUM ),
#else
 wFlags = 0;
#endif

 if ( !( wFlags & GEN_CARRYFLAG ) )
  return ( OutRegs.ax & 0x00FF );
 else
  return ( ERR_INTERNAL );
}

int ClearSystemResumeBit( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_CLEARSYSRESUMEBIT;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int SetWaitingIcon( BYTE nWaitingIconStatus, BYTE
fBusyCursor )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_WAITINGICON;
 InRegs.ax |= nWaitingIconStatus,

#if !defined( NOINT15 )
 wFlags = intn( &InRegs, &OutRegs,
SBS_SLINTNUM );
#else
 wFlags = 0;
#endif

 if ( nWaitingIconStatus ==
SBS_WAITINGICONOFF )
 {
  if ( fBusyCursor )
   EnableBusyCursor( SUI_BUSYCURSOROFF );

  GetHotIcon();
 }
 else
 {
  if ( fBusyCursor )
   EnableBusyCursor( SUI_BUSYCURSORON );

 }

 if ( !( wFlags & GEN_CARRYFLAG ) )
  return ( ERR_SUCCESS );
 else
  return ( ERR_INTERNAL );
}

int EnableKbdAfterBoot( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_ENABLEKBD;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL ),
}

LONG GetBatteryInfo( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_GETBATTERYINFO;

#if !defined( NOINT15 )
 wFlags = intn( &InRegs. &OutRegs.
SBS_SLINTNUM );
#else
 wFlags = 0;
#endif

 if ( !( wFlags & GEN_CARRYFLAG ) )
#if !defined( NOINT15 )
  return ( MAKELONG( OutRegs.ax, OutRegs.bx )
);
#else
  return ( SBS_NOINT15BATTERYINFO );
#endif
 else
  return ( SBS_GETBATTERYINFOERROR );

}

WORD GetSizeOfExtendedMem( void )
{
 BYTE nExtMemHigh, nExtMemLow;

 PCB_BEGINCRITICAL
```

```
  outb( SBS_CMOSPORT
SBS_CMOSREADHIGHBYTE ).
  nExtMemHigh = inputb(
SBS_CMOSEXTENDEDMEM );
  outb( SBS_CMOSPORT
SBS_CMOSREADLOWBYTE )
  nExtMemLow = inputb(
SBS_CMOSEXTENDEDMEM )

  PCB_ENDCRITICAL

  return ( MAKEWORD( nExtMemLow,
nExtMemHigh ) );
}

int GetBIOSVersion( void )
{
  REG_W InRegs, OutRegs,
  WORD wFlags;

  fil_chr( ( NPSTR )&InRegs, 0, sizeof( REG_W ) );

  InRegs ax = SBS_SARATOGAFUNC;
  InRegs bx = SBS_GETBIOSVERSION,

#if !defined( NOINT15 )
  wFlags = intn( &InRegs  &OutRegs
SBS_SLINTNUM ),
#else
  wFlags = 0,
#endif

  if ( !( wFlags & GEN_CARRYFLAG ) )
#if !defined( NOINT15 )
    return ( OutRegs.ax );
#else
    return ( 0 ).
#endif
  else
    return ( 0 );
}
```

Copr 1995 Zenith Data Systems Corp.

```
#include "cr.h"
#include "sio.h"
#include "spawn.h"
#include "sm.h"

#define SMD_MAXGEARIMAGES 8

#if defined( _MSC_VER  )
#pragma warning( disable  4704 )
#endif

static char aGearImages[] = { "|/-\\|/-\\" };

static BYTE nClockReenterCount = 0;
static WORD wLastKey.
static BOOL fDispatchActive = FALSE;
static BOOL fRecsInstalled = FALSE;
static int  aEventStack[ SMD_EVENTSTACKLIMIT ];
static int  iEventStackPtr =
SMD_EVENTSTACKLIMIT - 1;
static int  iTempThreadIdx = -1.


EVENT EventQueue[ SMD_MAXTHREADS ];

int AddThread( int iIdx, NEARPROC fpThread,
APIFUNC
aAPIFuncTable[].
           THREADTYPEID ThreadTypeId, BOOL
fReentrant, LONG
lTimeLimit,
           int iRetryLimit )
{
  if ( iIdx >= SMD_MAXTHREADS )
    return ( ERR_INTERNAL );

  PCB_BEGINCRITICAL
  EventQueue[ iIdx ].fpThread = fpThread;
  EventQueue[ iIdx ].aAPIFuncTable =
aAPIFuncTable,
  EventQueue[ iIdx ].ThreadTypeId = ThreadTypeId;
  EventQueue[ iIdx ].lTimeLimit = lTimeLimit;
  EventQueue[ iIdx ].lTimeCurrent = 0L.
  EventQueue[ iIdx ].iRetryLimit = iRetryLimit.
  EventQueue[ iIdx ].iInitRetryLimit = iRetryLimit;
  EventQueue[ iIdx ].nReenterCount = 0;
  EventQueue[ iIdx ].bReentrant = fReentrant,
  PCB_ENDCRITICAL

  return ( ERR_SUCCESS ).
}

BYTE IsThreadActive( int iIdx )
{
  BYTE fThreadStatus.
  NEARPROC fpThread;

  if ( iIdx >= SMD_MAXTHREADS )
    return ( FALSE );

  fpThread = EventQueue[ iIdx ].fpThread;

  PCB_BEGINCRITICAL

  fThreadStatus = ( fpThread != NULL && fpThread
!= ( NEARPROC
)SMD_THREADACTIVE );

  PCB_ENDCRITICAL

  return ( fThreadStatus );
}

void ResetTime( int iIdx )
{
  if ( iIdx >= SMD_MAXTHREADS )
    return;

  EventQueue[ iIdx ].lTimeCurrent = 0;
}

int SetRetryLimit( int iIdx, int iNewRetryLimit )
{
  if ( iIdx >= SMD_MAXTHREADS )
    return ( ERR_INTERNAL );

  PCB_BEGINCRITICAL
  EventQueue[ iIdx ].iRetryLimit = iNewRetryLimit;
  EventQueue[ iIdx ].lTimeCurrent = 0;
  PCB_ENDCRITICAL

  return ( ERR_SUCCESS );
}

BYTE GetRetryLimit( int iIdx )
{
  int iReturn;

  if ( iIdx >= SMD_MAXTHREADS )
    return ( 0 );

  if ( ( iReturn = EventQueue[ iIdx ].iRetryLimit ) < 0
)
    iReturn = 0.

  return ( iReturn ),
}

BYTE GetInitRetryLimit( int iIdx )
{
  int iReturn;

  if ( iIdx >= SMD_MAXTHREADS )
    return ( 0 );

  if ( ( iReturn = EventQueue[ iIdx ].iInitRetryLimit ) <
0 )
    iReturn = 0;

  return ( iReturn );
}

int ResetRetryLimit( int iIdx )
{
  if ( iIdx >= SMD_MAXTHREADS )
    return ( ERR_INTERNAL );

  PCB_BEGINCRITICAL
  EventQueue[ iIdx ].iRetryLimit = EventQueue[ iIdx
].iInitRetryLimit;
  EventQueue[ iIdx ].lTimeCurrent = 0;
  PCB_ENDCRITICAL

  return ( ERR_SUCCESS );
}

int SetTimeLimit( int iIdx, LONG lNewTimeLimit )
{
  if  iIdx >= SMD_MAXTHREADS )
    return ( ERR_INTERNAL );


  PCB_BEGINCRITICAL
  EventQueue[ iIdx ].lTimeLimit = lNewTimeLimit;
  PCB_ENDCRITICAL

  return ( ERR_SUCCESS );
}

THREADTYPEID GetThreadType( int iIdx )
{
  if ( iIdx >= SMD_MAXTHREADS )
    return ( ERR_INTERNAL );


  return ( EventQueue[ iIdx ].ThreadTypeId ).
}

NEARPROC GetThreadAddress( int iIdx )
{
  if ( iIdx >= SMD_MAXTHREADS )
    return ( ( NEARPROC )NULL );


  return ( EventQueue[ iIdx ].fpThread );
}

int DelThread( int iIdx )
{
  int iReturn = 0;

  if ( iIdx >= SMD_MAXTHREADS || iIdx < 0 )
  {
    TRACE( "ERROR: Invalid thread ID passed to
DelThread()\r" );
    return ( ERR_INTERNAL );
  }

  PCB_BEGINCRITICAL
  EventQueue[ iIdx ].fpThread = NULL,
  PCB_ENDCRITICAL

#if !defined( PROD )
  sprintf( szTempStr, "NOTICE: Temp thread
deallocated - %d\r",
iIdx );
  TRACE( szTempStr );
#endif

  return ( iReturn );
}

int InitDispatcher( void )
{
  iTempThreadIdx = GetTempEventNum()

  if ( iTempThreadIdx < 0 )
    return ( ERR_INTERNAL );

  fil_chr( ( NPSTR )EventQueue, 0, sizeof(
EventQueue ) );

  AddThread( iTempThreadIdx, InstallRecs, NULL,
SMD_ONETIME,
FALSE, INI_POLLFREQ,
          0 );

  InitVIDTrapRec();
  add_trap( GetVIDTrapRec() );

  InitPNDTrapRec();
  add_trap( GetPNDTrapRec() );

  InitSCSTrapRec();
  add_trap( GetSCSTrapRec() );

  InitPRXTrapRec();
  add_trap( GetPRXTrapRec() );

  AddThread( SMI_PNDEVENTNUM, NULL,
GetPNDFuncTable(),
SMD_ONDEMAND, FALSE,
          SMI_PNDPOLLFREQ, 0 );
  AddThread( SMI_SUIEVENTNUM, NULL,
GetSUIFuncTable().
SMD_ONDEMAND, FALSE,
          SMI_SUIPOLLFREQ, 0 );
  AddThread( SMI_SCSEVENTNUM, NULL,
GetSCSFuncTable(),
SMD_ONDEMAND, TRUE,
          SMI_SCSPOLLFREQ, 0 );
  AddThread( SMI_PRXEVENTNUM, NULL,
GetPRXFuncTable(),
SMD_ONDEMAND, FALSE,
          SMI_PRXPOLLFREQ, 0 );
}

int ShutDownDispatcher( void )
{
  RestoreOldSUIIntVec();
  return ( 0 );
}

void InstallRecs( void )
{
  DelThread( iTempThreadIdx );

  AddThread( PND_EVENTNUM, CheckPenDriver.
NULL, SMD_POLLED.
FALSE,
          PND_POLLFREQ, 0 );
  AddThread( PRX_EVENTNUM. CheckSystem,
NULL, SMD_POLLED.
          FALSE, PRX_POLLFREQ, 0 ).

  InitSUICallRec();
  InitSCSCallRec(),

  SetSuspendFlagPointer();
  add_trap( GetSUIMouseTrapRec() );

  fRecsInstalled = TRUE;
}



void Dispatch( THREADTYPEID ActiveThreadId, int
iEventThreadIdx )
{
  int iThreadIdx;
  BOOL fNextEntry = FALSE;
  EVENT *ev;
  NEARPROC fpOriginalThread = NULL;

  struct REGW Regs;

  if ( iEventThreadIdx >= SMD_MAXTHREADS )
    goto Exit;

  SetDispatchActive( TRUE );

  ev = &EventQueue[ iEventThreadIdx ];

  if ( ActiveThreadId == SMD_ONDEMAND )
  {
    if ( ev->bReentrant || ev->nReenterCount == 0 )
    {
      PCB_BEGINCRITICAL
      ++ev->nReenterCount;
      PCB_ENDCRITICAL

      if ( ev->aAPIFuncTable != NULL )
        CallAPIFunction( ev->aAPIFuncTable );
      else
        TRACE( "ERROR: Function table is NULL in
dispatcher" ),

      PCB_BEGINCRITICAL
      --ev->nReenterCount;
      PCB_ENDCRITICAL
    }
    else
    {
      GetForegroundRegs( &Regs );
      Regs.ax = ( WORD )ERR_INTERNAL;
      SetForegroundRegs( &Regs );
    }

    goto Exit;
  }


  for ( iThreadIdx = 0; iThreadIdx <
SMD_MAXTHREADS; ++iThreadIdx
)
  {
    ev = &EventQueue[ iThreadIdx ];

    if ( ev->fpThread != NULL )
    {
      if ( ev->ThreadTypeId == ActiveThreadId ||
          ActiveThreadId ==
SMD_ALLTHREADTYPES )
      {

        if ( ev->bReentrant || ev->nReenterCount == 0
)
        {
          PCB_BEGINCRITICAL
          ++ev->nReenterCount;
          PCB_ENDCRITICAL
        }
        else
        {
#if !defined( PROD )
          sprintf( szTempStr, "NOTICE: Thread #%d
reentered, but
returned\r", iThreadIdx );
          TRACE( szTempStr );
#endif
          goto Exit,
        }

        switch ( ev->ThreadTypeId )
        {
          case SMD_ONETIME:
            if ( ev->lTimeCurrent >= 0 )
            {
              if ( ++ev->lTimeCurrent >= ev->lTimeLimit
)
```

```
        {
          ev->lTimeCurrent = -1;
          TRACE( "NOTICE: ONETIME thread
expired\r" );
        }
        else
          fNextEntry = TRUE
      }
      else
        fNextEntry = TRUE,
      break,

    case SMD_MANYTIMES:
      if ( ev->lTimeCurrent >= 0 )
      {
        if ( ++ev->lTimeCurrent >= ev->lTimeLimit
)
        {
          if ( --ev->iRetryLimit <= 0 )
          {
            ev->lTimeCurrent = -1;
            TRACE( "NOTICE: MANYTIMES
thread expired\r" );
          }
          else
            ev->lTimeCurrent = 0;
        }
        else
          fNextEntry = TRUE,
      }
      else
        fNextEntry = TRUE,
      break.

    case SMD_POLLED
      if ( ++ev->lTimeCurrent >= ev->lTimeLimit )
        ev->lTimeCurrent = 0,
      else
        fNextEntry = TRUE;
      break,

    default:
      fNextEntry = TRUE:
      break;
   }
  }
  else
    fNextEntry = TRUE,

  if ( fNextEntry )
  {
    fNextEntry = FALSE.
    PCB_BEGINCRITICAL
    --ev->nReenterCount;
    PCB_ENDCRITICAL
  }
  else
  {
    if ( ev->fpThread != NULL && ev->fpThread !=
( NEARPROC
)SMD_THREADACTIVE )
    {
      fpOriginalThread = ev->fpThread:
      ( *ev->fpThread )().

      PCB_BEGINCRITICAL
      if ( fpOriginalThread == ev->fpThread &&
          ( WORD )( ev->nReenterCount - 1 ) <
          ( WORD )ev->nReenterCount )
        --ev->nReenterCount:
      PCB_ENDCRITICAL
    }
  }
 }

}

Exit:
  SetDispatchActive( FALSE );
}

WORD TrapService( struct trap_rec *CurrTrapRec )
{
  REG_W Regs;
  MREG MInArgs;
  WORD wReturn = 0;

  switch ( CurrTrapRec->tr_int )
  {
    case SMI_SUIINTNUM:
      Dispatch( SMD_ONDEMAND,
SMI_SUIEVENTNUM );
      break;

    case SMI_SCSINTNUM.
      Dispatch( SMD_ONDEMAND.
SMI_SCSEVENTNUM ):
      break;

    case SMI_PNDINTNUM:
      Dispatch( SMD_ONDEMAND,
SMI_PNDEVENTNUM );
      break:

    case SMI_PRXINTNUM:
      Dispatch( SMD_ONDEMAND.
SMI_PRXEVENTNUM );
      break;

    case SBS_VIDINTNUM:
      VIDTrapService();
      return ( ( WORD )CurrTrapRec );
      break;

    case PND_INTNUM:
      GetForegroundRegs( &Regs );

      if ( Regs.ax == PND_SETEVENTHANDLER &&
!GetPNDActiveStatus() )
      {
        MInArgs.ax = 0x000C;
        MInArgs.es = Regs.es,
        MInArgs.dx = Regs.dx;
        MInArgs.cx = Regs.cx;

        mouse( &MInArgs. &MEventOutArgs ):
      }
      else
        return ( ( WORD )CurrTrapRec ),

    default:
      return ( ( WORD )CurrTrapRec );
  }
  return ( wReturn );
}

void FCallService( WORD wAX )
{
  switch ( PopEventNum() )
  {
    case SMI_SUIEVENTNUM:
      Dispatch( SMD_ONDEMAND
SMI_SUIEVENTNUM );
      break;

    case SMI_SCSEVENTNUM
      Dispatch( SMD_ONDEMAND,
SMI_SCSEVENTNUM ).
      break;




  }
}

void ClockTick( void )
{


  add_tsc_event( SMD_DISPATFREQ ):




    Dispatch( SMD_ALLTHREADTYPES, 0 );

}

void DecClockReCount( void )
{
  PCB_BEGINCRITICAL;
  --nClockReenterCount,
  PCB_ENDCRITICAL;
}

#if !defined( NDEBUG )
void KbdService( WORD wHotKey )
{

  wLastKey = wHotKey;

}

WORD GetLastKey( void )
{
  WORD wTempLastKey = wLastKey,
  wLastKey = 0:

  return ( wTempLastKey );
}
#endif

void SetDispatchActive( BOOL bNewDispatchActive
)
{
  PCB_BEGINCRITICAL
  fDispatchActive = bNewDispatchActive;
  PCB_ENDCRITICAL
}

BOOL GetDispatchActive( void )
{
  BOOL fCurrentDisActive:

  PCB_BEGINCRITICAL
  fCurrentDisActive = fDispatchActive;
  PCB_ENDCRITICAL

  return ( fCurrentDisActive );
}

void CrankGear( BYTE *bGearIdx, char *szLabel )
{
  BYTE bNewGearIdx = *bGearIdx;
  if ( ++bNewGearIdx >= SMD_MAXGEARIMAGES )
    bNewGearIdx = 0:

  ++crs_x;

  *bGearIdx = bNewGearIdx;
}

void PushEventNum( int iEventNum )
{
  aEventStack[ iEventStackPtr ] = iEventNum;
  iEventStackPtr = iEventStackPtr > 0 ?
iEventStackPtr - 1 :
iEventStackPtr
}

int PopEventNum( void )
{
  int iReturn;

  PCB_BEGINCRITICAL
  iEventStackPtr = iEventStackPtr <
SMD_EVENTSTACKLIMIT - 1 ?
iEventStackPtr + 1 : iEventStackPtr;
  iReturn = aEventStack[ iEventStackPtr ];
  PCB_ENDCRITICAL

  return ( iReturn );
}

int GetTempEventNum( void )
{
  register int iThreadIdx,
  int iReturn = ERR_INTERNAL;

  PCB_BEGINCRITICAL

  for ( iThreadIdx = SMD_REUSETHREADS - 1;
iThreadIdx <
SMD_MAXTHREADS;
      ++iThreadIdx )
  {
    if ( EventQueue[ iThreadIdx ].fpThread == NULL )

    {
#if !defined( PROD )
      sprintf( szTempStr, "NOTICE: Temp thread
allocated - %d\r",
iThreadIdx );
      TRACE( szTempStr ):
#endif
      iReturn = iThreadIdx.
      EventQueue[ iThreadIdx ].fpThread = (
NEARPROC
)SMD_THREADACTIVE;
      break;
    }
  }

  PCB_ENDCRITICAL

#if !defined( PROD )
  if ( iReturn == ERR_INTERNAL )
    TRACE( "ERROR: Out of temporary threads" );
#endif

  return ( iReturn ):
}

#if defined( _MSC_VER  )
#pragma warning( default : 4704 )
#endif
Copr. 1995 Zenith Data Systems Corp.

#include "cr.h"
#include "sio.h"
#include "spawn.h"
#include "k2.h"
#include "frame.h"
#include "sm.h"

#if defined( _MSC_VER  )
#pragma warning( disable . 4704 )
#endif

THREADTYPEID  ActiveThreadType =
SMD_NOTHREAD,

char        szSMSignature[] =
SIG_SMSIGNATURE;
char        szSMVersionName[] =
STR_SMVERSIONNAME;
char        szSMVersionNum[] =
STR_SMVERSIONNUM;
char        szSMModuleName[] =
STR_SMMODULENAME;
char        szSUIExecName[] = SUI_EXECNAME;
char        szSCSAbortConn[] =
SMI_SCSABORTCONN;
char        szTempStr[ GEN_MAXLENTEMPSTR ];
char        szTempMsgStr[
GEN_MAXLENTEMPSTR * 2 ];
char        szNullStr[] = "\0";
SCANCODE    aUDHotIcon1Def[] =
SUI_UDHOTICON1DEF;
char        szPassword[ SUI_MAXLENPASSWORD
+ 1 ];
char        nRLNIntNum = 0;
char        fEEPROMInited = FALSE;
WORD        wScreenCode = SUI_NOSCREEN;
WORD        wOldScreenCode =
SUI_NOSCREEN;
MREG        MEventOutArgs,
FARCALLENTRY lpfnFarCallEntry = NULL;
SUICB       lpfnSUICallBack = NULL;
UICONFIGDATA  UIConfigData;
LISTBOXENTRY  ListBoxEntry;
MSGBOXBUFF    MsgBoxBuff[
SMI_SUIMAXMSGBOXLINES ];
BUFFHEADER    BuffHead;

BOOL fConnectRequested = FALSE;

char GetEEPROMInited( void )
{
  return ( fEEPROMInited ):
}

void InitUIConfigData( void )
{
  if ( GetEEUIData( &UIConfigData ) ==
ERR_SUCCESS )
  {
    if ( UIConfigData.nMajorVersionNum ==
GEN_SMMAJORVERSIONNUM
&&
        UIConfigData.nMinorVersionNum ==
GEN_SMMINORVERSIONNUM )
    {
      if ( ( ( int )UIConfigData.wXLowerPenCalib -
            ( int )UIConfigData.wXUpperPenCalib ) >=
200 )
      {
        if ( UIConfigData.wXUpperPenCalib ==
PND_XUPPERPENCALIB
&&
            UIConfigData.wYUpperPenCalib ==
PND_YUPPERPENCALIB
&&
            UIConfigData.wXLowerPenCalib ==
PND_XLOWERPENCALIB
&&
            UIConfigData.wYLowerPenCalib ==
PND_YLOWERPENCALIB )
          InitEEPROM();
      }
      else
        InitEEPROM():

    }
    else
      InitEEPROM();
  }
  else
    InitEEPROM():

  fil_chr( &MEventOutArgs, 0, sizeof ( MREG ) );
  lpfnFarCallEntry = MK_FP( _ccode, _fcall_entry );
}

void InitEEPROM( void )
{
  TRACE( "ERROR: Invalid values or unable to read
from EEPROM\r"
);

  fil_chr( &UIConfigData, 0, sizeof ( UICONFIGDATA
) ):

  UIConfigData.wBuffLen        = sizeof (
UICONFIGDATA ):
```

```
  UIConfigData.nMajorVersionNum =
GEN_SMMAJORVERSIONNUM;
  UIConfigData.nMinorVersionNum =
GEN_SMMINORVERSIONNUM;
  UIConfigData.bConnectType    =
SMI_NETWORKCONNECT;
  UIConfigData.nDomainID       = PRX_DOMAIN0;

  UIConfigData.nContrastIdx    =
SHC_DEFCONTRASTIDX;
  UIConfigData.nBrightnessIdx  =
SHC_DEFBRIGHTNESSIDX;

  UIConfigData.nSleepTimeIdx   =
SBS_SLEEPDISABLED;
  UIConfigData.bAutoShutoff    = FALSE;

  UIConfigData.wUILanguage     =
SMI_UIUSENGLISH;
  UIConfigData.nFrameType      =
PRX_FRAME8023;

  UIConfigData.nLastOSKScreen      =
SUI_BIGALPHA;
  UIConfigData.nLastOSKDlgScreen   =
SUI_BIGALPHA;
  UIConfigData.nLastSetupDlgScreen =
SUI_HOSTSELECTION;

  UIConfigData.xPosLastOSKScreen   =
SUI_XULBIGALPHA;
  UIConfigData.yPosLastOSKScreen   =
SUI_YULBIGALPHA;

  mem_cp( aUDHotIcon1Def,
UIConfigData.aUDHotIcon1,
SUI_MAXLENDEFHOTICON );

  TRACE( "NOTICE: Using pen calibration values
set to zero.\r" );

  UIConfigData.wXUpperPenCalib =
PND_XUPPERPENCALIB;
  UIConfigData.wYUpperPenCalib =
PND_YUPPERPENCALIB;
  UIConfigData.wXLowerPenCalib =
PND_XLOWERPENCALIB;
  UIConfigData.wYLowerPenCalib =
PND_YLOWERPENCALIB;

  fEEPROMInited = TRUE;

  SetEEUIData();

  SetContrast( UIConfigData.nContrastIdx );
  SetBrightness( UIConfigData.nBrightnessIdx );
}

void InitSUI( void )
{
  SetDomainWarning( FALSE );
  SetSecurityWarning( FALSE );
}

void InitSaratoga( BYTE nInitType )
{
  if ( nInitType == SBS_DRIVERSLOADING )
  {
    TRACE( "NOTICE: Power management disabled
for driver load
sequence.\r" );
    SetPowerEnable( SBS_POWERMANDISABLED
);
  }
  else if ( nInitType == SBS_SUILOADING )
  {
    if ( SetSleepTimeout(
UIConfigData.nSleepTimeIdx ) ==
ERR_SUCCESS )
    {
      if ( UIConfigData.nSleepTimeIdx ==
SBS_SLEEPDISABLED )
      {
        TRACE( "NOTICE: Power management now
disabled, DOZE
disabled\r" );
        SetPowerEnable(
SBS_POWERMANDISABLED );
        SetDozeTimeout( SBS_DOZEDISABLED );
      }
      else
      {
        TRACE( "NOTICE: Power management now
enabled, DOZE
disabled\r" );
        SetPowerEnable(
SBS_POWERMANENABLED );
        SetDozeTimeout( SBS_DOZEDISABLED );
      }

      if ( UIConfigData.bAutoShutoff )
      {
        TRACE( "NOTICE: Suspend after 60 minutes
enabled\r" );
        SetSuspendTimeout( SBS_SUSPENDIN60MIN
);
      }
      else
      {
        TRACE( "NOTICE: Suspend disabled\r" );
        SetSuspendTimeout(
SBS_SUSPENDDISABLED );
      }
    }
  }

}

int GetEEMouseConfig( void )
{
  REG_W InRegs, OutRegs;
  PENCALIB pc;
  WORD wFlags;

  fil_chr( &InRegs, 0, sizeof ( REG_W ) );
  fil_chr( &pc, 0, sizeof ( PENCALIB ) );

  InRegs.ax = SBS_SARATOGAFUNC;
  InRegs.bx = SBS_EEPROMTOMEMORY;
  InRegs.cx = SBS_LENMOUSECFGDATA;
  InRegs.dx = PND_OFFCALIB;

  InRegs.es = SEG( &pc );
  InRegs.di = OFF( &pc );

#if !defined( NOINT15 )
  wFlags = intn( &InRegs, &OutRegs,
SBS_SLINTNUM );
#else
  wFlags = 0;
#endif

  if ( !( wFlags & GEN_CARRYFLAG ) )
  {
    UIConfigData.wXUpperPenCalib =
pc.wXUpperPenCalib;
    UIConfigData.wYUpperPenCalib =
pc.wYUpperPenCalib;
    UIConfigData.wXLowerPenCalib =
pc.wXLowerPenCalib;
    UIConfigData.wYLowerPenCalib =
pc.wYLowerPenCalib;

    return ( ERR_SUCCESS );
  }
  else
    return ( ERR_INTERNAL );
}

int SetEEMouseConfig( PENCALIB *pc )
{
  UIConfigData.wXUpperPenCalib =
pc->wXUpperPenCalib;
  UIConfigData.wYUpperPenCalib =
pc->wYUpperPenCalib;
  UIConfigData.wXLowerPenCalib =
pc->wXLowerPenCalib;
  UIConfigData.wYLowerPenCalib =
pc->wYLowerPenCalib;

  return ( SetEEUIData() );
}

int SetEEUIData( void )
{
  REG_W InRegs, OutRegs;
  WORD wFlags;
  UICONFIGDATA OldUIConfigData;
  int iReturn = ERR_SUCCESS;

  fil_chr( &OldUIConfigData, 0, sizeof (
UICONFIGDATA ) );

  if ( GetEEUIData( &OldUIConfigData ) ==
ERR_SUCCESS )
  {
    if ( mem_cmp( ( NPSTR )&OldUIConfigData, (
NPSTR
)&UIConfigData,
        sizeof( UICONFIGDATA ) ) != sizeof(
UICONFIGDATA ) )

    {
      fil_chr( &InRegs, 0, sizeof ( REG_W ) );

      InRegs.ax = SBS_SARATOGAFUNC;
      InRegs.bx = SBS_MEMORYTOEEPROM;
      InRegs.cx = sizeof ( UICONFIGDATA );
      InRegs.dx = SBS_OFFUICFGDATA;
      InRegs.es = SEG( &UIConfigData );
      InRegs.di = OFF( &UIConfigData );

#if !defined( NOINT15 )
      PCB_BEGINCRITICAL
      wFlags = intn( &InRegs, &OutRegs,
SBS_SLINTNUM );
      PCB_ENDCRITICAL
#else
      wFlags = 0;
#endif
      if ( !( wFlags & GEN_CARRYFLAG ) )
        iReturn = ERR_SUCCESS;
      else
        iReturn = ERR_INTERNAL;
    }
  }
  else
    iReturn = ERR_INTERNAL;

#if !defined( PROD )
  if ( iReturn == ERR_INTERNAL )
    TRACE( "ERROR: SetEEUIData() error returned
from extended
BIOS call to save EEPROM data\r" );
#endif

  return ( iReturn );
}

int GetEEUIData( UICONFIGDATA
*CurrUIConfigData )
{
  REG_W InRegs, OutRegs;
  WORD wFlags;
  UICONFIGDATA TempUIConfigData;

  fil_chr( &InRegs, 0, sizeof ( REG_W ) );

  InRegs.ax = SBS_SARATOGAFUNC;
  InRegs.bx = SBS_EEPROMTOMEMORY;
  InRegs.cx = sizeof ( UICONFIGDATA );
  InRegs.dx = SBS_OFFUICFGDATA;
  InRegs.es = SEG( &TempUIConfigData );
  InRegs.di = OFF( &TempUIConfigData );

#if !defined( NOINT15 )
  PCB_BEGINCRITICAL
  wFlags = intn( &InRegs, &OutRegs,
SBS_SLINTNUM );
  PCB_ENDCRITICAL
#else
  wFlags = 0;
#endif

  if ( !( wFlags & GEN_CARRYFLAG ) )
  {
    *CurrUIConfigData = TempUIConfigData;

    return ( ERR_SUCCESS );
  }
  else
    return ( ERR_INTERNAL );
}

int ClearEEPROM( void )
{
  REG_W InRegs, OutRegs;
  WORD wFlags;
  UICONFIGDATA UINullData;

  fil_chr( &InRegs, 0, sizeof ( InRegs ) );
  fil_chr( &UINullData, 0, sizeof ( UINullData ) );

  InRegs.ax = SBS_SARATOGAFUNC;
  InRegs.bx = SBS_MEMORYTOEEPROM;
  InRegs.cx = sizeof ( UICONFIGDATA );
  InRegs.dx = SBS_OFFUICFGDATA;
  InRegs.es = SEG( &UINullData );
  InRegs.di = OFF( &UINullData );

#if !defined( FLASHTEST )
  wFlags = intn( &InRegs, &OutRegs,
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL );
}

#if defined( _MSC_VER )
#pragma warning( default : 4704 )
#endif
```

Copr. 1995 Zenith Data Systems Corp.

```
#include "cr.h"
#include "spawn.h"
#include "k2.h"
#include "sio.h"
#include "sm.h"

#if defined( _MSC_VER )
#pragma warning( disable : 4704 )
#endif

HOSTLISTENTRIES HostListEntries = { 0, 0 };
static HOSTLISTENTRIES BroadcastHLEntries = {
0, 0 };
static int         iHLStatus = SMI_BLANK;
static int         iHLThreadid = -1;
static int         iWaitForHLThreadIdx;
static int         iLBCurrHost = 0;
static int         iLBCurrGroup = 0;
static int         iCurrGroupIdx = 0;
static int         iNumGroups = 0;
static char        szWorkAroundNodeAdd[
SCS_MAXLENNODEADD ];
static char        szSerialDup[
SCS_MAXLENSERIALNUM ];
static char        szCurrHostName[
SCS_MAXLENHOSTNAME + 1 ];

static char        fRequestHostList = FALSE;

void SetCurrHostName( char *szNewCurrHostName
)
{
  strcpy( szCurrHostName, szNewCurrHostName );
}

char *GetCurrHostName( void )
{
  return ( szCurrHostName );
}

int GetLBCurrHost( void )
{
  return ( iLBCurrHost );
}

void SetLBCurrHost( int iNewLBCurrHost )
{
  iLBCurrHost = iNewLBCurrHost;
}

char GetRequestHostList( void )
{
  return ( fRequestHostList );
}

void SetRequestHostList( int iNewRequestHostList )
{
  PCB_BEGINCRITICAL;
  fRequestHostList = LOBYTE( iNewRequestHostList
);
  PCB_ENDCRITICAL;
}

int GetLBCurrGroup( void )
{
  return ( iLBCurrGroup );
}

void SetLBCurrGroup( int iNewLBCurrGroup )
{
  if ( iLBCurrGroup != iNewLBCurrGroup )
    iCurrGroupIdx = GetGroupIdx( iNewLBCurrGroup
);

  iLBCurrGroup = iNewLBCurrGroup;
}

char *GetLBGroup( int iGroupNum )
{
  int iUseGroup;
  char *szReturn;
  int iLBGroupIdx;

  if ( iHLStatus != SMI_AVAILABLE ||
HostListEntries.iNumEntries
== 0 )
    return ( szNullStr );

  iUseGroup = ( iGroupNum ==
SUI_LBCURRENTRY ? iLBCurrGroup :
iGroupNum );

  iLBGroupIdx = GetGroupIdx( iUseGroup );

  szReturn = HostListEntries.aHostListBuff[
iLBGroupIdx
].HostDataBuff.szGroupName;
```

```
 return ( szReturn == NULL ? szNullStr : szReturn
);
}

char *GetLBHost( int iHostNum )
{
 char *szReturn;

 if ( GetCurrActionCode() ==
SUI_LASTCONNECTION )
  return ( UIConfigData.szLastHostName );

 if ( iHLStatus != SMI_AVAILABLE ||
HostListEntries.iNumEntries
== 0 )
  return ( szNullStr );

 szReturn = HostListEntries.aHostListBuff[
GetHostIdx( iHostNum
) ].HostDataBuff.szHostName;

 return ( szReturn == NULL ? szNullStr : szReturn
);
}

int GetLBHostStatus( int iHostNum )
{
 int iReturn;

 if ( iHLStatus != SMI_AVAILABLE ||
HostListEntries.iNumEntries
== 0 )
  return ( SUI_LBENTRYENABLED );

 iReturn = HostListEntries.aHostListBuff[
GetHostIdx( iHostNum )
].HostDataBuff.nHostStatus;

 if ( iReturn == SCS_HOSTAVAILABLE )
  iReturn = SUI_LBENTRYENABLED;
 else
  iReturn = SUI_LBENTRYDISABLED;

 return ( iReturn );
}

int SetLBHostStatus( int iHostNum, BYTE
nNewHostStatus )
{
 if ( iHLStatus != SMI_AVAILABLE ||
HostListEntries.iNumEntries
== 0 )
  return ( ERR_INTERNAL );

 HostListEntries.aHostListBuff[ GetHostIdx(
iHostNum )
].HostDataBuff.nHostStatus = nNewHostStatus;

 return ( ERR_SUCCESS );
}

char *GetCurrNodeAddress( void )
{
 int iHostIdx;
 char *szReturn = NULL;

 if ( GetCurrActionCode() ==
SUI_LASTCONNECTION )
  return ( UIConfigData.szLastNodeAddress );

 if ( iHLStatus != SMI_AVAILABLE ||
HostListEntries.iNumEntries
== 0 )
  return ( szNullStr );

 if ( iLBCurrHost > 0 )
 {
  iHostIdx = GetGroupIdx( iLBCurrGroup ) + (
iLBCurrHost - 1 );
  szReturn = HostListEntries.aHostListBuff[
iHostIdx
].szNodeAddress;
 }

 return ( szReturn == NULL ? szNullStr : szReturn
);
}

WORD GetCurrHostVersionNum( void )
{
 int iHostIdx;
 BYTE nMinorVersion;
 BYTE nMajorVersion;

 if ( iHLStatus != SMI_AVAILABLE ||
HostListEntries.iNumEntries
== 0 )
  return ( 0 );

 if ( iLBCurrHost > 0 )
  iHostIdx = GetHostIdx( SUI_LBCURRENTRY );
 else
  return ( 0 );

 nMinorVersion = HostListEntries.aHostListBuff[
iHostIdx
].HostDataBuff.nMinorVersion;
 nMajorVersion = HostListEntries.aHostListBuff[
iHostIdx
].HostDataBuff.nMajorVersion;

 return ( MAKEWORD( nMinorVersion,
nMajorVersion ) );
}

BOOL IsPWRequired( void )
{
 BOOL fReturn = FALSE;

 if ( GetCurrActionCode() ==
SUI_LASTCONNECTION )
  return ( UIConfigData.bLastConnPassword );

 if ( iHLStatus != SMI_AVAILABLE ||
HostListEntries.iNumEntries
== 0 )
  return ( FALSE );

 if ( iLBCurrHost > 0 )
  fReturn = HostListEntries.aHostListBuff[
GetHostIdx(
SUI_LBCURRENTRY ) ].HostDataBuff.
        bPasswordProtect;

 return ( fReturn );
}

int GetNumHostEntries( void )
{
 int iNextGroupIdx;

 if ( iHLStatus != SMI_AVAILABLE )
  return ( ERR_INTERNAL );

 if ( ( iNextGroupIdx = GetGroupIdx( iLBCurrGroup
+ 1 ) ) >= 0 )
  return ( iNextGroupIdx - iCurrGroupIdx );
 else
  return ( HostListEntries.iNumEntries -
iCurrGroupIdx );
}

int GetNumGroupEntries( void )
{
 if ( iHLStatus != SMI_AVAILABLE )
  return ( ERR_INTERNAL );

 return ( iNumGroups );
}

int GetGroupIdx( int iGroupNum )
{
 LONG lGroupIdx;

 lGroupIdx = GetEntryOffset(
HostListEntries.iNumEntries,
        sizeof ( HOSTLISTBUFF ),
SCS_MAXLENNODEADD,
        iGroupNum, ( NPSTR
)HostListEntries.aHostListBuff );

 if ( lGroupIdx >= 0 )
  return ( ( int )lGroupIdx / sizeof (
HOSTLISTBUFF ) );
 else
  return ( ERR_INTERNAL );
}

int GetGroupNum( int iHostIdx )
{
 LONG lLowGroupIdx = 0L;
 LONG lHighGroupIdx = 0L;
 int iGroupNum;

 for ( iGroupNum = 1; lHighGroupIdx >= 0;
++iGroupNum )
 {
  lLowGroupIdx = lHighGroupIdx;
  lHighGroupIdx = GetEntryOffset(
HostListEntries.iNumEntries,
          sizeof ( HOSTLISTBUFF
),
SCS_MAXLENNODEADD,
          iGroupNum, ( NPSTR
)HostListEntries.aHostListBuff );
  lHighGroupIdx /= sizeof ( HOSTLISTBUFF );

  if ( ( LONG )iHostIdx >= lLowGroupIdx && (
LONG )iHostIdx <=
lHighGroupIdx )
    return ( iGroupNum );
 }

 return ( HLD_NOTINGROUP );
}

int GetHostIdx( int iHostNum )
{
 int iUseHost;
 int iHostIdx;

 iUseHost = ( iHostNum == SUI_LBCURRENTRY ?
iLBCurrHost :
iHostNum );
 iHostIdx = iCurrGroupIdx + ( iUseHost - 1 );

 return ( iHostIdx );
}

int SortGroupHost( void )
{
 int iGroupNum;
 int iSortStatus

 iSortStatus =
  SortList( HostListEntries.iNumEntries, sizeof (
HOSTLISTBUFF
),
        SCS_OFFGROUPKEY,
SCS_OFFHOSTKEY,
        ( NPSTR )HostListEntries.aHostListBuff );

 if ( iSortStatus == ERR_SUCCESS )
 {
  for ( iNumGroups = 0, iGroupNum = 1;
iGroupNum <=
HostListEntries.iNumEntries;
     ++iGroupNum )
  {
   if ( GetGroupIdx( iGroupNum ) >= 0 )
    iNumGroups++;
  }
 }

 return ( iSortStatus );
}

int SortSerialNums( void )
{
 int iEntryIdx;

 if ( HostListEntries.aHostListBuff == NULL ||
HostListEntries.iNumEntries <= 0 )
  return ( ERR_INTERNAL );

 for ( iEntryIdx = 0; iEntryIdx <
HostListEntries.iNumEntries;
++iEntryIdx )
  HostListEntries.aHostListBuff[ iEntryIdx ].
   HostDataBuff.sHostSerial[
SCS_MAXLENSERIALNUM - 1 ] = 0;

 return ( SortList( HostListEntries.iNumEntries,
sizeof (
HOSTLISTBUFF ),
      SCS_OFFSERIALNUM, NULL, ( NPSTR
)HostListEntries.aHostListBuff ) );
}

int ValidateSerialNums( void )
{
 int iEntryIdx, iNextEntryIdx;
 int iSerialStatus = HLD_VALIDSERIALS;

 szSerialDup[0] = '\0';

 if ( SortSerialNums() != ERR_SUCCESS )
  return ( FALSE );

 for ( iEntryIdx = 0; iEntryIdx <
HostListEntries.iNumEntries;
++iEntryIdx )
 {
  if ( IsZeroString( HostListEntries.aHostListBuff[
iEntryIdx
].
          HostDataBuff.sHostSerial ) )
   iSerialStatus = HLD_INVALIDSERIALS;
  else
  {
   if ( ( iNextEntryIdx = iEntryIdx + 1 ) <
HostListEntries.iNumEntries )
   {
    if ( !strcmp( HostListEntries.aHostListBuff[
iEntryIdx
].HostDataBuff.sHostSerial,
        HostListEntries.aHostListBuff[
iNextEntryIdx ].
        HostDataBuff.sHostSerial ) )
     iSerialStatus = HLD_DUPLICATESERIALS;
   }
  }

  if ( iSerialStatus != HLD_VALIDSERIALS )

  {
   strcpy( szSerialDup,
HostListEntries.aHostListBuff[
iEntryIdx ].
         HostDataBuff.sHostSerial );
   break;
  }
 }

 return ( iSerialStatus );
}

int RequestHostList( void )
{
 SetRequestHostList( TRUE );

 if ( !GetSCSActiveStatus() )
  return ( ERR_INTERNAL );

 if ( ( AllocHLMem( &HostListEntries,
HLD_MAXNUMHOSTENTRIES ) )
!= ERR_SUCCESS )
  return ( ERR_OUTOFMEM );

 if ( ( AllocHLMem( &BroadcastHLEntries,
HLD_MAXNUMHOSTENTRIES )
) != ERR_SUCCESS )
  return ( ERR_OUTOFMEM );

 HostListEntries.iNumEntries = 0;
 iLBCurrHost = iLBCurrGroup = 0;

 if ( ( SendRequestHostList() == ERR_SUCCESS )
&&
     ( ( iWaitForHLThreadIdx =
GetTempEventNum() ) >= 0 ) )
 {
  AddThread( iWaitForHLThreadIdx, WaitForHLD,
NULL,
SMD_MANYTIMES, FALSE,
        HLD_POLLFREQ, HLD_MAXRETRIES );

  SetStatusHLInMem( SMI_INPROGRESS );
 }
 else
 {
  FreeHLMem( &HostListEntries );
  FreeHLMem( &BroadcastHLEntries );
  SetStatusHLInMem( SMI_AVAILABLE );
  return ( ERR_INTERNAL );
 }

 return ( ERR_SUCCESS );
}

void WaitForHLD( void )
{
 int iNumEntries;
 int iSerialStatus;
 LONG lGroupHostNums;
 int iHostConnectIdx;

 CancelRequestHostList();

 if ( ( iNumEntries = *( int *
)BroadcastHLEntries.aHostListBuff
) > 0 )
 {
  BroadcastHLEntries.iNumEntries = iNumEntries;

  mem_mv( ( PVOID )( ( BYTE * )(
BroadcastHLEntries.aHostListBuff ) +
SCS_HOSTLISTNUMOFFSET ),
      ( PVOID )(
BroadcastHLEntries.aHostListBuff ),
iNumEntries *
       sizeof ( HOSTLISTBUFF ) + sizeof ( int ) );

  SaveNewHosts();
 }

 if ( GetRetryLimit( iWaitForHLThreadIdx ) > 0 &&
SendRequestHostList() == ERR_SUCCESS )
 {
  SetStatusHLInMem( SMI_INPROGRESS );
 }
 else
 {
  DelThread( iWaitForHLThreadIdx );
```

```
  if ( HostListEntries.iNumEntries > 0 )
  {
   AllocHLMem( &HostListEntries,
HostListEntries.iNumEntries
  );

   if ( ( iSerialStatus = ValidateSerialNums() ) !=
HLD_VALIDSERIALS )
    {
     if ( iSerialStatus == HLD_INVALIDSERIALS )
      OpenMessageBox(
STR_HLDINVSERIALNUMS, 0,
SUI_LEFTJUSTIFIED, SUI_OK );
     else
      OpenMessageBox(
STR_HLDDUPSERIALNUMS, 0,
SUI_LEFTJUSTIFIED, SUI_OK );
    }

    SortGroupHost();

    if ( GetSCSCallProgress() !=
SMI_SCSDISCONNECTED )
    {
     if ( ( iHostConnectIdx = FindNodeAddress(
&HostListEntries,

UIConfigData.szLastNodeAddress )
) != FNA_NOTFOUND )
      HostListEntries.aHostListBuff[
iHostConnectIdx ]
                    HostDataBuff.nHostStatus =
SCS_HOSTAVAILABLE;
    }

    if ( ( lGroupHostNums = FindFirstAvailHost(
&HostListEntries ) ) != HLD_NOHOSTAVAIL )
    {
     iLBCurrGroup = HIWORD( lGroupHostNums );
     iLBCurrHost = LOWORD( lGroupHostNums );
    }
    else
    {
     iLBCurrGroup = iNumGroups > 0 ? 1 : 0;
     iLBCurrHost = 0;
    }
   }
   else
   {
    FreeHLMem( &HostListEntries );
    iLBCurrGroup = 0;
    iLBCurrHost = 0;
   }

   FreeHLMem( &BroadcastHLEntries );

   SetStatusHLInMem( SMI_AVAILABLE );
   SetRequestHostList( FALSE );
  }
}

int SendRequestHostList( void )
{
 WORD wSeg, wOff, wReturn

 wSeg = SEG( BroadcastHLEntries.aHostListBuff );
 wOff = OFF( BroadcastHLEntries.aHostListBuff );

 _asm
 {
  push dx
  push di
  push bx

  mov ax, SCS_REQUESTHOSTLIST
  mov dx, wSeg
  mov di, wOff
  mov bx, HLD_MAXNUMHOSTENTRIES

  int SCS_INTNUM

  pop bx
  pop di
  pop dx

  mov wReturn, ax
 }

 if ( wReturn == SCS_ACCEPTED )
  return ( ERR_SUCCESS );
 else
  return ( ERR_INTERNAL );
}

int CancelRequestHostList( void )
{
 _asm
 {
  mov ax, SCS_CANCELREQHOSTLIST
  int SCS_INTNUM
 }

 return ( ERR_SUCCESS );
}

int SaveNewHosts( void )
{
 int iBCHostIdx;

 for ( iBCHostIdx = 0; iBCHostIdx <
BroadcastHLEntries.iNumEntries; ++iBCHostIdx )
 {
  if ( FindNodeAddress( &HostListEntries,
        BroadcastHLEntries.aHostListBuff[
iBCHostIdx
].szNodeAddress ) == FNA_NOTFOUND )
   {
    HostListEntries.aHostListBuff[
HostListEntries.iNumEntries++ ] =
        BroadcastHLEntries.aHostListBuff[ iBCHostIdx
];
   }
 }

 return ( ERR_SUCCESS );
}

int FindNodeAddress( HOSTLISTENTRIES
*pHostListEntries, char
*szKeyNodeAddress )
{
 int iHostIdx;
 int iMaxHostIdx = pHostListEntries->iNumEntries;

 for ( iHostIdx = 0; iHostIdx < iMaxHostIdx;
++iHostIdx )
 {
  if ( strcmp( pHostListEntries->aHostListBuff[
iHostIdx
].szNodeAddress,
            szKeyNodeAddress ) == 0 )
   return ( iHostIdx );
 }

 return ( FNA_NOTFOUND );
}

LONG FindFirstAvailHost( HOSTLISTENTRIES
*pHostListEntries )
{
 int iHostIdx;
 int iGroupNum, iHostNum;
 int iMaxHostIdx = pHostListEntries->iNumEntries;

 for ( iHostIdx = 0; iHostIdx < iMaxHostIdx;
++iHostIdx )
 {
  if ( pHostListEntries->aHostListBuff[ iHostIdx
].HostDataBuff.nHostStatus ==
       SCS_HOSTAVAILABLE )
   {
    iGroupNum = GetGroupNum( iHostIdx );
    iHostNum = ( iHostIdx - GetGroupIdx(
iGroupNum ) ) + 1;
    return ( MAKELONG( iHostNum, iGroupNum ) );

   }
 }

 return ( ( LONG )HLD_NOHOSTAVAIL );
}

int AllocHLMem( HOSTLISTENTRIES
*pHostListEntries, int
iNumEntries )
{

 if ( pHostListEntries->aHostListBuff == NULL )
 {
  if ( ( pHostListEntries->aHostListBuff = (
HOSTLISTBUFF *
)malloc(
        iNumEntries * sizeof ( HOSTLISTBUFF ) +
sizeof ( int )
) ) == NULL )
   {
    TRACE( "ERROR: malloc failed in
AllocHLMem()\r" );
    return ( ERR_INTERNAL );
   }
   else
    fill_chr( ( PVOID
)pHostListEntries->aHostListBuff, 0,
iNumEntries *
          sizeof ( HOSTDATABUFF ) + sizeof ( int
) );
 }
  else
  {
  }

  pHostListEntries->iNumEntries = iNumEntries

  return ( ERR_SUCCESS );
}

int GetStatusHLInMem( void )
{
 if ( GetCurrActionCode() ==
SUI_LASTCONNECTION )
   return ( SMI_AVAILABLE );
 else
   return ( iHLStatus );
}

void SetStatusHLInMem( int iNewHostListStatus )
{
 if ( ( iHLStatus = iNewHostListStatus ) ==
SMI_INPROGRESS )
   SetWaitingIcon( SBS_WAITINGICONON, TRUE
);
 else
   SetWaitingIcon( SBS_WAITINGICONOFF, TRUE
);
}

void FreeHLMem( HOSTLISTENTRIES
*pHostListEntries )
{
 if ( pHostListEntries->aHostListBuff != NULL )
 {
  free( pHostListEntries->aHostListBuff );
  pHostListEntries->aHostListBuff = NULL;
 }
}

void FreeAllHLMem( void )
{
 FreeHLMem( &HostListEntries );
 FreeHLMem( &BroadcastHLEntries );
}

BOOL IsZeroString( char szString[] )
{
 int iStrIdx;
 int iStrLen;

 for ( iStrIdx = 0, iStrLen = strlen( szString );
      iStrIdx < iStrLen; ++iStrIdx )
   if ( szString[ iStrIdx ] != '0' )
     return ( FALSE );

 return ( TRUE );
}

#if defined( _MSC_VER   )
#pragma warning( default : 4704 )
#endif
Copr. 1995 Zenith Data Systems Corp.

#include "cr.h"
#include "spawn.h"
#include "k2.h"
#include "sio.h"
#include "sm.h"

#if defined( _MSC_VER   )
#pragma warning( disable : 4704 )
#endif

#define STK_SZ (5000)
word isr_stk[STK_SZ+1];



extern char sms[];
extern char attrc[],attrm[];
extern char already[];
extern char unloaddone[];
extern char unloadnot[],
extern word init_data_end;

extern BOOL fNetware;



main()
{
 int i;

 chk_video();
 get_crs();
 crs_x = bcrs_x;
 crs_y = bcrs_y;
 mv_crs();

 if ( second_load() )
 {
  i = str_pos( '-', cmd_line ),
  if ( i && ( ( cmd_line[i] | 0x20 ) == 'u' ) )
  {
   if( remove_tsr() )
   {
    ShutDownDispatcher();
    dspf( unloaddone );
   }
   else
    dspf( unloadnot );
  }
  else
   dspf( already );

  mv_crs();

  return( 1 );
 }


 sprintf( szTempStr, sms, szSMVersionName );
 dspf( szTempStr );

 get_crs();
 crs_x = bcrs_x;
 crs_y = bcrs_y + 3;
 mv_crs();



 DEBUG_BREAK,

 InitUIConfigData();
 InitSaratoga( SBS_DRIVERSLOADING ),
 InitDispatcher();

 malloc_on( SHC_MAXLENHEAP );
 idata_end=&init_data_end;
 icode_beg=main,
 stay_resident(isr_stk,STK_SZ*2);



 install_tsc( ( fp )ClockTick, 3500,
          SMD_SCHEDULERS | SMD_HOTKEYS |

          SMD_FARCALLS |
SMD_GENERALTRAPS | SMD_COMMSVCS |
SMD_INTSSVCS | SMD_MOUSEKWATCH );

 install_trap( ( fp )TrapService, 2500,
SMD_FULLREENTER );
 install_fcall( ( fp )FCallService, 4000,
SMD_FULLREENTER, 0
szNullStr, 0 );

 add_tsc_event( SMD_DISPATFREQ );

 return ( 0 );
}

#if defined( _MSC_VER   )
#pragma warning( default : 4704 )
#endif



Copr. 1995 Zenith Data Systems Corp.


#include "cr.h"
#include "spawn.h"
#include "k2.h"
#include "sm.h"

#if !defined( NDEBUG )
WORD aHotKeys[] = { SMI_SF1, SMI_SF2,
SMI_SF3, SMI_SF4, SMI_SF5,
SMI_SF6,
                  SMI_SF7, SMI_SF8, SMI_SF9,
SMI_SF10,
SMI_SALTQ, 0 };
#endif



char attrc[]={0x17,0x1E,0x13,0x1F,0x1B,0xA};
char attrm[]={0x07,0x0F,0x07,0x07,0x07,0xF};



char sms[] =
```

```
 "\mSaratoga Manager, (C) Copyright 1994,1995,
Zenith Data
Systems\m"
 "Mobile Systems Engineering, Version %s\m",

char already[] =
 "ERROR: SM already present.\m"
 "Enter SM -U to unload.\m";

char unloaddone[]="SM has been removed from
memory.";
char unloadnot[]="ERROR: SM could not be
removed from memory.";

char _tsr_name[]="Saratoga Manager (C) 1994-1995
ZDS".


struct cfg_rec config_block = {
    sizeof(config_block),
    'S','M','A','N',
    MAKEWORD( GEN_SMMINORVERSIONNUM,
GEN_SMMAJORVERSIONNUM ),
    };




#if !defined( NDEBUG )



fp
install_list[]={install_tsc,install_trap,install_hk,install_f
call
};

#else
fp
install_list[]={install_tsc,install_trap,install_dos_rdy,in
stall_
fcall};
#endif



word init_data_end=1;



Copr 1995 Zenith Data Systems Corp
#include "cr.h"
#include "k2.h"
#include "spawn.h"
#include "hm.h"
#include "sio.h"
#include "sm.h"

#if defined( _MSC_VER  )
#pragma warning( disable : 4704 )
#endif

static OCCLUDEUNION HostOcc.
static OCCLUDEUNION OldHostOcc = { -1, -1, -1,
-1 };
static OCCLUDEUNION *pSetOccData;
static int          iSetOccType,
static BYTE          fSCOSNotified;
static BYTE          fRepaintRequired = FALSE;
static char         nOccDefineAcked = PMI_NOACK,
static char         nOccCloseAcked = PMI_NOACK;
static int         iHostOccludeIdx =
SMD_NOACTIVETHREAD



void SetSCOSNotified( BYTE fNewSCOSNotified )
{
 fSCOSNotified = fNewSCOSNotified;
}

void SetOccDefineAcked( char nOccDefineStatus )
{
 nOccDefineAcked = nOccDefineStatus;
}

char GetOccDefineAcked( void )
{
 return ( nOccDefineAcked );
}

void SetOccCloseAcked( char nOccCloseStatus )
{
 nOccCloseAcked = nOccCloseStatus;
}

char GetOccCloseAcked( void )
{
 return ( nOccCloseAcked );
}



int DrawSUIOSK( OCCLUDEUNION *NewOSKRect,
int iOccType )
{
 OCCLUDEUNION *OSKRect;
 int yDrawOSK, xDrawOSK;

 if ( NewOSKRect == NULL )
  OSKRect = &HostOcc;
 else
  OSKRect = NewOSKRect;

 switch ( iOccType )
 {
  case SUI_OCCRWIN:
   yDrawOSK = OSKRect->occRWin.yULWin;
   xDrawOSK = OSKRect->occRWin.xULWin;
   break;

  case SUI_OCCDOSTEXT:
   yDrawOSK = OSKRect->occText.yULRow *
SCS_OSKTEXTCHARHEIGHT;

   xDrawOSK = OSKRect->occText.xULCol *
SCS_OSKTEXTCHARWIDTH;
   break

  case SUI_OCCDOSGRAPHICS:
   yDrawOSK = OSKRect->occDosGraph.yULDos;
   xDrawOSK = OSKRect->occDosGraph.xULDos;
   break;

  default.
   TRACE( "ERROR: Invalid occlusion type
specified in
DrawSUIOSK()\r" );
   return ( ERR_INTERNAL );
 }

#if !defined( PROD )
 sprintf( szTempStr, "NOTICE: Request to draw
OSK at x:%d, y:%d,
sent to SUI\r",
       xDrawOSK, yDrawOSK );
 TRACE( szTempStr );
#endif

 AX( SUI_MOVEOSK );
 BX( yDrawOSK );
 CX( xDrawOSK );
 return ( ( *lpfnSUICallBack )() ).
}

int CreateOccludedArea( OCCLUDEUNION
*OccMap, int iOccType, int
iNewCacheFreeMem )
{
 if ( !GetSCSActiveStatus() )
  return ( ERR_INTERNAL ),

 if ( OldHostOcc.occRWin.xULWin == -1 &&
    OldHostOcc.occRWin.yULWin == -1 )
 {
  OldHostOcc.occRWin.xULWin =
UIConfigData.xPosLastOSKScreen;
  OldHostOcc.occRWin.yULWin =
UIConfigData.yPosLastOSKScreen;
 }

 switch ( iOccType )
 {
  case SUI_OCCRWIN:
   UIConfigData.xPosLastOSKScreen =
OccMap->occRWin.xULWin;
   UIConfigData.yPosLastOSKScreen =
OccMap->occRWin.yULWin;
   return ( SetWinHostOcclude(
&OccMap->occRWin ) );

  case SUI_OCCDOSTEXT:
   UIConfigData.xPosLastOSKScreen =
OccMap->occText.xULCol;
   UIConfigData.yPosLastOSKScreen =
OccMap->occText.yULRow;
   return ( SetDOSTextHostOcclude(
&OccMap->occText ) );

  case SUI_OCCDOSGRAPHICS:
   UIConfigData.xPosLastOSKScreen =
OccMap->occDosGraph.xULDos;
   UIConfigData.yPosLastOSKScreen =
OccMap->occDosGraph.yULDos;
   return ( SetDOSGraphHostOcclude(
&OccMap->occDosGraph ) );

  case SUI_NOOCCTYPE:
  default.
   TRACE( "ERROR: Invalid occlusion type
specified in
CreateOccludeArea()\r" ),
   return ( ERR_INTERNAL );
 }
}


int SetWinHostOcclude( OCCLUDERWIN *OccRWIN
)
{
 if ( iHostOccludeIdx != SMD_NOACTIVETHREAD )

 {
  TRACE( "NOTICE: Attempt to reenter
SetWinHostOcclude() before
it is done, returning error\r" );
  return ( ERR_SUCCESS );
 }

 SetOccDefineAcked( PMI_NOACK );

 HostOcc.occRWin.xULWin = OccRWIN->xULWin;
 HostOcc.occRWin.yULWin = OccRWIN->yULWin;
 HostOcc.occRWin.xLRWin = ( OccRWIN->xLRWin
- OccRWIN->xULWin )
+ 1.
 HostOcc.occRWin.yLRWin = ( OccRWIN->yLRWin
- OccRWIN->yULWin )
+ 1;

#if !defined( PROD )
 sprintf( szTempStr, "\rNOTICE: Occlusion Region
for Windows at
x:%d, y:%d, x:%d, y:%d\r",
       HostOcc.occRWin.xULWin,
HostOcc.occRWin.yULWin,
       HostOcc.occRWin.xLRWin,
HostOcc.occRWin.yLRWin );
 TRACE( szTempStr );
#endif

 if ( SendPrivateMessage( PMI_REQOCCDEFINE,
sizeof ( OCCLUDERWIN
),
                 ( char * )&HostOcc.occRWin ) !=
ERR_SUCCESS )
 {
  TRACE( "ERROR. PM for occlude region not
sent due to
SendPrivateMessage() error\r" );
  DrawSUIOSK( &OldHostOcc, SUI_OCCRWIN );
  return ( ERR_SUCCESS );
 }

 if ( ( iHostOccludeIdx = GetTempEventNum() ) < 0
)
 {
  TRACE( "ERROR: Out of temporary threads,
drawing OSK
anyway\r" );
  DrawSUIOSK( NULL, SUI_OCCRWIN );
  return ( ERR_INTERNAL ).
 }

 AddThread( iHostOccludeIdx, ( NEARPROC
)WaitForDefineOcc, NULL,
SMD_MANYTIMES, FALSE,
        SCS_WAITACKPOLLFREQ,
SCS_WAITACKMAXRETRY ).

 return ( ERR_SUCCESS );
}

void WaitForDefineOcc( void )
{
 if ( GetOccDefineAcked() != PMI_NOACK )
 {
  DelThread( iHostOccludeIdx );

  if ( GetOccDefineAcked() == PMI_ACKEDTRUE )
  {
   TRACE( "NOTIFY: Message acknowledgement
detected, enable
SUI to begin OSK paint\r" );
   OldHostOcc = HostOcc;
   DrawSUIOSK( NULL, SUI_OCCRWIN );
  }
  else
  {
   TRACE( "ERROR: Message acknowledgement
detected, abort OSK
paint\r" );
   DrawSUIOSK( &OldHostOcc, SUI_OCCRWIN );

  }

  iHostOccludeIdx = SMD_NOACTIVETHREAD;

 }
 else if ( GetRetryLimit( iHostOccludeIdx ) == 0 )
 {
  TRACE( "ERROR: Timeout, define Occ message
acknowledgment not
received, allow draw anyway.\r" );
  DelThread( iHostOccludeIdx );
  iHostOccludeIdx = SMD_NOACTIVETHREAD;
  DrawSUIOSK( NULL, SUI_OCCRWIN );
  SetOccDefineAcked( PMI_ACKEDFALSE );
 }
}

int CloseHostOcclude( void )
{
 if ( iHostOccludeIdx != SMD_NOACTIVETHREAD )

 {
  TRACE( "NOTICE: Attempt to reenter
CloseHostOcclude() before
it is done, returning error\r" );
  return ( ERR_INTERNAL );
 }

 if ( GetCurrHostMode() == PND_DOSAPP )
 {
  TRACE( "NOTICE. Already at DOS not need to
close Windows
occlude\r" );
  return ( ERR_SUCCESS );
 }

 SetOccCloseAcked( PMI_NOACK );

 if ( !IsOSKUniClose( GetCurrScrCode() ) )
 {
  if ( SendPrivateMessage( PMI_REQOCCCLOSE,
0, NULL ) !=
ERR_SUCCESS )
  {
   TRACE( "ERROR: PM for closure of occlude
region not sent
due to SendPrivateMessage() error\r" );

   return ( ERR_SUCCESS );
  }

  if ( ( iHostOccludeIdx = GetTempEventNum() ) <
0 )
   return ( ERR_INTERNAL );

  AddThread( iHostOccludeIdx, ( NEARPROC
)WaitForCloseOcc,
NULL, SMD_MANYTIMES, FALSE,
          SCS_WAITACKPOLLFREQ,
SCS_WAITACKMAXRETRY );
 }
 else
 {
  TRACE( "NOTICE: Unilateral closure of Windows
OSK identified,
no PM sent\r" );
  SetFullRepaint( ERR_SUCCESS );
 }

 return ( ERR_SUCCESS );
}

void WaitForCloseOcc( void )
{
 if ( GetOccCloseAcked() != PMI_NOACK )
 {
  DelThread( iHostOccludeIdx );

  if ( GetOccCloseAcked() == PMI_ACKEDTRUE )
  {
   TRACE( "NOTIFY: Message acknowledgement
for close of OCC
detected\r" );
   SetFullRepaint( ERR_SUCCESS );
  }
  else
  {
   TRACE( "ERROR: Message acknowledgement
for close of OCC
detected, failed close\r" );
   SetFullRepaint( ERR_INTERNAL );
  }

  iHostOccludeIdx = SMD_NOACTIVETHREAD;

 }
 else if ( GetRetryLimit( iHostOccludeIdx ) == 0 )
 {
  DelThread( iHostOccludeIdx );
  iHostOccludeIdx = SMD_NOACTIVETHREAD;
```

```
  TRACE( "ERROR: Close Occ acknowledgment
not received, set for
success anyway\r" ).
  SetFullRepaint( ERR_SUCCESS );
 }
}

int SetDOSGraphHostOcclude(
OCCLUDEDOSGRAPHICS *OccDosGraphics )
{
 HostOcc = *( OCCLUDEUNION *
)OccDosGraphics;
 if ( !IsOSKAsSetupDlg( GetCurrScrCode() ) )
 {
  TRACE( "NOTICE: Beginning immediate redraw
of DOS Graphics
OSK\r" );
  DrawSUIOSK( NULL, SUI_OCCDOSGRAPHICS
);

  TRACE( "NOTICE: Waiting for SUI video busy for
the DOS
Graphics OSK\r" ),

  if ( SMVideoBusy( DoDOSGraphHostOcclude ) !=
ERR_SUCCESS )
   return ( ERR_INTERNAL );
 }
 else
 {
  TRACE( "NOTICE  OSK As Setup Dialog, no
SCOS calls. clearing
screen.\r" ).

  SetVideoMode( SUI_INITIALVIDMODE );
  DrawSUIOSK( NULL. SUI_OCCDOSGRAPHICS
),
 }
}

void DoDOSGraphHostOcclude( void )
{

#if !defined( PROD )
 sprintf( szTempStr, "NOTICE: Occlusion Region for
DOS Graphics
at x:%d, y:%d, x:%d, y:%d\r",
        HostOcc.occDosGraph.xULDos,
HostOcc.occDosGraph.yULDos,
        HostOcc.occDosGraph.xLRDos,
HostOcc occDosGraph.yLRDos
);
 TRACE( szTempStr );
#endif

 SetSCSHostOcclude( &HostOcc,
SUI_OCCDOSGRAPHICS. TRUE );

}

int SetDOSTextHostOcclude( OCCLUDETEXT
*OccDosText )
{

 HostOcc.occText.yULRow =
OccDosText->yULRow /
SCS_OSKTEXTCHARHEIGHT.
 HostOcc.occText.xULCol = OccDosText->xULCol /
SCS_OSKTEXTCHARWIDTH;
 HostOcc.occText.yLRRow = ( (
OccDosText->yLRRow + 1 ) /
SCS_OSKTEXTCHARHEIGHT ) - 1;
 HostOcc.occText.xLRCol = ( (
OccDosText->xLRCol + 1 ) /
SCS_OSKTEXTCHARWIDTH ) - 1;

 *OccDosText = HostOcc.occText;

 TRACE( "NOTICE: Beginning immediate redraw of
DOS Text OSK\r"
).
 DrawSUIOSK( NULL, SUI_OCCDOSTEXT );

#if !defined( PROD )
 sprintf( szTempStr, "NOTICE: Occlusion Region for
DOS Text at
x:%d, y:%d, x:%d, y:%d\r",
        HostOcc.occText.xULCol,
HostOcc.occText.yULRow,
        HostOcc.occText.xLRCol,
HostOcc.occText.yLRRow );
 TRACE( szTempStr );
#endif

 return ( SetSCSHostOcclude( &HostOcc,
SUI_OCCDOSTEXT. TRUE ) );
}

int SetSCSHostOcclude( OCCLUDEUNION *occ,
OCCTYPE iNewOccType,
BYTE fNewRepaintRequired )
{
 if ( iHostOccludeIdx != SMD_NOACTIVETHREAD )

 {
  TRACE( "NOTICE: Attempt to reenter
SetSCSHostOcclude() before
it is done, returning error\r" );
   return ( ERR_INTERNAL );
 }

 SetFullRepaint( ERR_INPROGRESS ).

 pSetOccData = occ
 iSetOccType = iNewOccType;
 fRepaintRequired = fNewRepaintRequired;

 if ( ( iHostOccludeIdx = GetTempEventNum() ) < 0
)
   return ( ERR_INTERNAL );

 AddThread( iHostOccludeIdx, ( NEARPROC
)D ·.'CSHostOcclude, NULL
SM.'_MANYTIMES, FALSE,
        SCS_DOHOSTOCCPOLLFREQ.
SCS_DOHOSTOCCMAXRETRY );

 return ( ERR_SUCCESS );
}

void DoSCSHostOcclude( void )
{
 int iOccError

 if ( ( iOccError = DefineSCSOcclude(
pSetOccData, iSetOccType,
fRepaintRequired ) ) != ERR_SUCCESS )
 {
  if ( iOccError != ERR_SCSBUSY )
  {
   SetFullRepaint( ERR_INTERNAL )
   DelThread( iHostOccludeIdx );
   iHostOccludeIdx = SMD_NOACTIVETHREAD,

   TRACE( "ERROR: Unrecoverable error occured
in the call to
DefineSCSOcclude()\r" );
  }
  else if ( GetRetryLimit( iHostOccludeIdx ) == 0 )
  {
   SetFullRepaint( ERR_INTERNAL );
   DelThread( iHostOccludeIdx ),
   iHostOccludeIdx = SMD_NOACTIVETHREAD,

   TRACE( "ERROR: Exhausted the max number
of retries in
DefineSCSOcclude()\r" );
  }
 }
 else
 {
  s.:tFullRepaint( ERR_SUCCESS );
  !'elThread( iHostOccludeIdx );
  iHostOccludeIdx = SMD_NOACTIVETHREAD:
  TRACE( "NOTICE: Success in calling
DefineSCSOcclude()\r" );
 }

}

#if defined( _MSC_VER   )
#pragma warning( default : 4704 )
#endif

Copr. 1995 Zenith Data Systems Corp.
#include "cr.h"
#include "sio.h"
#include "spawn.h"
#include "sm.h"

#if defined( _MSC_VER   )
#pragma warning( disable : 4704 )
#endif

static BYTE      bGearIdx = 0;
static int       iTempThreadIdx =
SMD_NOACTIVETHREAD;
static int       iSleepThreadIdx =
SMD_NOACTIVETHREAD;
static BOOL      fPNDActive = FALSE;
static PENCALIB  CurrPenCalib.
static ZDSTRAPREC PNDTrapRec;
static BYTE      nCurrPenButtonMode =
PND_LEFTMOUSE;
static BYTE      nCurrHostMode = PND_DOSAPP;
static BYTE      fSleepActive = FALSE;

static APIFUNC aAPIFuncTable[] =
{
 { SMI_PNDLOADING, PenDriverLoading },
 { 0, 0 },
};

APIFUNC *GetPNDFuncTable( void )
{
 return ( aAPIFuncTable );
}

BYTE GetCurrHostMode( void )
{
 BYTE nTmpHostMode.

 PCB_BEGINCRITICAL

 nTmpHostMode = nCurrHostMode

 PCB_ENDCRITICAL

 return ( nTmpHostMode );
}

void CheckPenDriver( void )
{
 int iHotIcon;

 if ( GetConnectRequested() ||
GetRequestHostList() )
   return;

 if ( GetPNDActiveStatus() )
 {
  if ( ( iHotIcon = GetHotIcon() ) >= 0 )
  {
   ErrorBeep();

   switch( iHotIcon )
   {
    case PND_ICONSLEEP:
     ActivateSleepMode();
     break;

    case PND_ICONSETUP:
     LoadSUI( SUI_LASTSETUPDLGSCREEN, 0
);
     break;

    case PND_ICONOSK:
     if ( GetSCSCallProgress() ==
SMI_SCSCONNECTED )
       LoadSUI( SUI_LASTOSKSCREEN, 0 );
     break;

    case PND_ICONPALLETTE:
     RotatePallette();
     break;

    case PND_ICONSPEAKER:
     ToggleSpeaker();
     break;

    case PND_ICONLRMOUSE:
     if ( nCurrPenButtonMode ==
PND_LEFTMOUSE )
      {
       SetPenButtonMode( PND_RIGHTMOUSE );
       EnableRightMouseButton( FON );
      }
      else
      {
       SetPenButtonMode( PND_LEFTMOUSE );
       EnableRightMouseButton( FOFF );
      }
      break;

    case PND_ICONHOSTCTRLMODE:
     DoHostControlMode( TRUE );
     break;

    case PND_UDEF1:
    case PND_UDEF2.
     SendUDHotIcon( iHotIcon );
     break:
   }
  }
 }
}

void SetPNDActiveStatus( BOOL fPenDriverStat )
{
 fPNDActive = fPenDriverStat;
}

BOOL GetPNDActiveStatus( void )
{
 return ( fPNDActive );
}

APIFUNCRET PenDriverLoading( struct REGW
*CallerRegs )
{
 if ( ( iTempThreadIdx = GetTempEventNum() ) ==
-1 )
 {
  CallerRegs->ax = ( UINT )ERR_PNDINTERNAL,
  goto exit;
 }

 CurrPenCalib.wXUpperPenCalib =
UIConfigData.wXUpperPenCalib;
 CurrPenCalib.wYUpperPenCalib =
UIConfigData.wYUpperPenCalib;
 CurrPenCalib.wXLowerPenCalib =
UIConfigData.wXLowerPenCalib:
 CurrPenCalib.wYLowerPenCalib =
UIConfigData.wYLowerPenCalib;
 CurrPenCalib.wHITopMargin = PND_TOPMARGIN;
 CurrPenCalib.wHIRightMargin =
PND_RIGHTMARGIN:
 CurrPenCalib.wHIVertSpace =
PND_VERTSPACING;
 CurrPenCalib.wHIXWidth = PND_WIDTH;
 CurrPenCalib.wHIYHeight = PND_HEIGHT:

 sprintf( szTempStr, "NOTICE: Using Calibration:
%d.%d -
%d,%d\r", UIConfigData.wXUpperPenCalib,
        UIConfigData.wYUpperPenCalib,
UIConfigData.wXLowerPenCalib,
UIConfigData.wYLowerPenCalib );
 TRACE( szTempStr );

 CallerRegs->dx = HIWORD( ( ( DWORD )( (
PENCALIB FAR *
)&CurrPenCalib ) ) );
 CallerRegs->si = LOWORD( ( ( DWORD )( (
PENCALIB FAR *
)&CurrPenCalib ) ) );

 AddThread( iTempThreadIdx, InitPND, NULL,
SMD_ONETIME, FALSE,
INI_POLLFREQ,
        0 );
exit:
 SetPNDActiveStatus( TRUE );
 SetForegroundRegs( CallerRegs ):
}

void InitPND( void )
{
 #if !defined( NDEBUG )
 crs_x = 0;
 crs_y = 24;
 #endif

 DelThread( iTempThreadIdx );
 if ( SetDeviceMode( PND_MOUSEMODE ) != 0 )
  goto error;

 chk_video();

 if ( NotifyVideoMode( GetCurrVidMode() ) !=
ERR_SUCCESS )
  goto error;

 if ( nCurrPenButtonMode == PND_LEFTMOUSE )
  EnableRightMouseButton( FOFF );
 else
  EnableRightMouseButton( FON );


 goto success,

error:
 TRACE( "ERROR: Pen Driver Initialization failed.\r"
);
 return;

success:
 TRACE( "NOTICE: Pen Driver successfully
initialized.\r" ).
}

void InitPNDTrapRec( void )
{
```

```
  fil_chr( ( NPSTR )&PNDTrapRec, 0, sizeof(
ZDSTRAPREC ) );

  PNDTrapRec.tr.tr_int = SMI_PNDINTNUM;

  PNDTrapRec.tr.tr_asm_srv =
CRU_ONBUSYEITHER;

  strcpy( PNDTrapRec.szSMAfterSignature
szSMSignature );
}

TRAPREC *GetPNDTrapRec( void )
{
  return ( &PNDTrapRec.tr );
}

int GetHotIcon( void )
{
  REG_W InRegs, OutRegs,

  if ( !GetPNDActiveStatus() )
    return ( PND_NOICON );

  fil_chr( ( NPSTR )&InRegs, 0, sizeof( REG_W ) );

  InRegs.ax = PND_GETDATA,
  InRegs.es = NULL,
  InRegs.dx = NULL,
  InRegs.cx = 0,

  intn( &InRegs, &OutRegs, PND_INTNUM ),

  return ( OutRegs.bx );
}

int SetDeviceMode( int iPenMode )
{
  REG_W InRegs, OutRegs.

  if ( !GetPNDActiveStatus() )
    return ( ERR_INTERNAL );

  fil_chr( ( NPSTR )&InRegs, 0, sizeof( REG_W ) );

  InRegs.ax = PND_SETDEVICEMODE;
  InRegs.bx = iPenMode;

  intn( &InRegs, &OutRegs, PND_INTNUM );

  return ( ERR_SUCCESS );
}

int NotifyVideoMode( int iVideoMode )
{
  REG_W InRegs, OutRegs.

  if ( !GetPNDActiveStatus() )
    return ( ERR_INTERNAL );

  fil_chr( ( NPSTR )&InRegs, 0, sizeof( REG_W ) );

  InRegs.ax = PND_SETVIDEOMODE,
  InRegs.bx = iVideoMode,

  InRegs.si = GetXScreenRes( iVideoMode );
  InRegs.di = GetYScreenRes( iVideoMode );
  InRegs.cx = MAKEWORD( GetYCharRes(),
GetXCharRes() );

  intn( &InRegs, &OutRegs, PND_INTNUM );

  return ( ERR_SUCCESS );
}

int SetSetupDlgMode( int iDlgMode )
{
  REG_W InRegs, OutRegs;

  if ( !GetPNDActiveStatus() )
    return ( ERR_INTERNAL );

  fil_chr( ( NPSTR )&InRegs, 0, sizeof( REG_W ) );

  InRegs.ax = PND_SETUPDLGMODE;
  InRegs.bx = iDlgMode;

  intn( &InRegs, &OutRegs, PND_INTNUM );

  return ( ERR_SUCCESS );
}

int SetOSKMode( OCCLUDEUNION *OccArea
OCCTYPE OccType )
{
  REG_W InRegs, OutRegs.

  if ( !GetPNDActiveStatus() )
    return ( -1 );

  fil_chr( ( NPSTR )&InRegs, 0, sizeof( REG_W ) );

  I..,.egs.ax = PND_OSKDIMEN,

  if ( OccArea == NULL )
    InRegs.bx = InRegs.cx = InRegs.dx = InRegs.si =
0;
  else
  {
    switch ( OccType )
    {
      case SUI_OCCDOSTEXT:

        InRegs.cx = OccArea->occText.yULRow *
SCS_OSKTEXTCHARHEIGHT;
        InRegs.bx = OccArea->occText.xULCol *
SCS_OSKTEXTCHARWIDTH;
        InRegs.si = OccArea->occText.yLRRow *
SCS_OSKTEXTCHARHEIGHT;
        InRegs.dx = OccArea->occText.xLRCol *
SCS_OSKTEXTCHARWIDTH;
        break;

      case SUI_OCCDOSGRAPHICS:
        InRegs.bx = OccArea->occDosGraph.xULDos;
        InRegs.cx = OccArea->occDosGraph.yULDos,
        InRegs.dx = OccArea->occDosGraph.xLRDos:
        InRegs.si = OccArea->occDosGraph.yLRDos.
        break:

      case SUI_OCCRWIN.
        InRegs.bx = OccArea->occRWin.xULWin
        InRegs.cx = OccArea->occRWin.yULWin;
        InRegs.dx = OccArea->occRWin.xLRWin;
        InRegs.si = OccArea->occRWin.yLRWin:
        break;

      default:
        return ( ERR_INTERNAL );
    }
  }

  in.:.( &InRegs, &OutRegs, PND_INTNUM );

  return ( ERR_SUCCESS );
}

int SetPenButtonMode( BYTE nNewPenButtonMode
)
{
  REG_W InRegs, OutRegs.

  if ( !GetPNDActiveStatus() )
    return ( -1 ),

  if ( nNewPenButtonMode != nCurrPenButtonMode )
  {
    fil_chr( ( NPSTR )&InRegs, 0, sizeof( REG_W ) )

    InRegs.ax = PND_SETMOUSEBUTTON;

    intn( &InRegs, &OutRegs, PND_INTNUM ),

    nCurrPenButtonMode = nNewPenButtonMode;
  }

  return ( ERR_SUCCESS );
}

int SetHostMode( int iHostMode )
{
  REG_W InRegs, OutRegs;

  if ( !GetPNDActiveStatus() )
    return ( ERR_INTERNAL );

  fil_chr( ( NPSTR )&InRegs, 0, sizeof( REG_W ) );

  InRegs.ax = PND_HOSTMODE;
  InRegs.bx = iHostMode;

  intn( &InRegs, &OutRegs, PND_INTNUM );

  nCurrHostMode = LOBYTE( iHostMode );

  return ( ERR_SUCCESS );
}

int SetCalibMode( int iCalibMode, int xCalibPnt, int
yCalibPnt )
{
  REG_W InRegs, OutRegs;

  if ( !GetPNDActiveStatus() )
    return ( ERR_INTERNAL );

  fil_chr( ( NPSTR )&InRegs, 0, sizeof( REG_W ) );

  InRegs.ax = PND_SETCALIBMODE;
  InRegs.bx = iCalibMode,
  InRegs.cx = xCalibPnt,
  InRegs.dx = yCalibPnt;

  intn( &InRegs, &OutRegs, PND_INTNUM );

  return ( ERR_SUCCESS );
}

int GetCalibState( int iCalibMode, int *xUpperCol, int
*yUpperRow,
              int *xLowerCol, int *yLowerRow )
{
  REG_W InArgs, OutArgs;
  int iCalibDone;
  int iReturn;

  fil_chr( ( NPSTR )&InArgs, 0, sizeof ( InArgs ) );

  InArgs.ax = PND_GETCALIBSTAT;

  intn( &InArgs, &OutArgs, PND_INTNUM );

  if ( iCalibMode == PND_CALIBLR )
    iCalibDone = OutArgs.bx & PND_CALIBLRSTAT;
  else
    iCalibDone = OutArgs.bx & PND_CALIBULSTAT:

  if ( iCalibDone )
  {
    if ( OutArgs.bx & PND_CALIBVALID )
      iReturn = PND_CALIBDONEVALID:
    else
      iReturn = PND_CALIBDONEINVALID:

    if ( iCalibMode == PND_CALIBLR )
    {
      *xUpperCol = OutArgs.cx.
      *yUpperRow = OutArgs.dx:
      *xLowerCol = OutArgs.si;
      *yLowerRow = OutArgs.di;
    }
  }
  else
    iReturn = PND_CALIBNOTDONE,

  return ( iReturn );
}

int EnableNewCalib( BOOL fEnableNewCalib )
{
  REG_W InArgs, OutArgs:

  fil_chr( ( NPSTR )&InArgs, 0, sizeof ( InArgs ) );

  InArgs.ax = PND_ENABLENEWCALIB;
  InArgs.bx = ( WORD )fEnableNewCalib:

  intn( &InArgs, &OutArgs, PND_INTNUM );

  return ( ERR_SUCCESS );
}

int ActivateSleepMode( void )
{
  if ( iSleepThreadIdx != SMD_NOACTIVETHREAD )
  {
    if ( GetSCSCallProgress() ==
SMI_SCSCONNECTED )
      DoHostControlMode( FALSE );
    else
      DoSuspend( TRUE );

    DelThread( iSleepThreadIdx );
    iSleepThreadIdx = SMD_NOACTIVETHREAD;
  }
  else
  {
    if ( ( iSleepThreadIdx = GetTempEventNum() ) ==
-1 )
      return ( ERR_INTERNAL );

    AddThread( iSleepThreadIdx, WaitForSleep,
NULL, SMD_ONETIME,
FALSE,
              PND_SLEEPPOLLFREQ, 0 );
  }

  return ( ERR_SUCCESS );
}

void WaitForSleep( void )
{
  if ( GetRetryLimit( iSleepThreadIdx ) == 0 )
  {
    DelThread( iSleepThreadIdx );
    iSleepThreadIdx = SMD_NOACTIVETHREAD;

    DoSleep();
  }
}

#if defined( _MSC_VER )
#pragma warning( default : 4704 )
#endif


Copr. 1995 Zenith Data Systems Corp.

#include "cr.h"
#include "spawn.h"
#include "sio.h"
#include "sm.h"

#if defined( _MSC_VER )
#pragma warning( disable : 4704 )
#endif

static PROXIMTRAPREC PRXTrapRec;
static PROXIMVARIABLES PRXVariables;
static PROXIMVERSIONINFO PRXVersionInfo;
static PRXCB lpfnPRXCallBack = NULL;
static int iConnStrengthThreadIdx =
SMD_NOACTIVETHREAD:
static int iPRXSetupThreadIdx =
SMD_NOACTIVETHREAD;
static int iCurrLinkQuality = PRX_NOLINKQUALITY:

static APIFUNC aAPIFuncTable[] =
{
  { SMI_PRXPOWERMANCB, RegisterPowerManCB
},
  { SMI_PRXUNLOADING, ProximDriverUnload },
  { SMI_PRXNETCONFIG, NetConfigData },
  { SMI_PRXXCHGREVINFO, XchgRevInfo },
  { 0, 0 }
};

APIFUNC *GetPRXFuncTable( void )
{
  return ( aAPIFuncTable );
}

BOOL GetPRXActiveStatus( void )
{
  return ( lpfnPRXCallBack != NULL );
}

void InitPRXTrapRec( void )
{
  fil_chr( ( NPSTR )&PRXTrapRec, 0, sizeof(
PROXIMTRAPREC ) );

  PRXTrapRec.tr.tr_int = SMI_PRXINTNUM;
  PRXTrapRec.tr.tr_asm_srv = CRU_REFLECTINT;


  mem_cp( SIG_RLNOEMSIGNATURE,
PRXTrapRec.szSMBeforeSignature,
         sizeof ( PRXTrapRec.szSMBeforeSignature )
);
}

TRAPREC *GetPRXTrapRec( void )
{
  return ( &PRXTrapRec.tr );
}

void CheckSystem( void )
{
  int iNewLinkQuality;

  if ( GetSuspendFlag() )
  {
    if ( GetSCSCallProgress() ==
SMI_SCSCONNECTED )
      DoHostControlMode( FALSE );
    else
      DoSuspend( TRUE );
  }

  if ( ( iNewLinkQuality = GetLinkQuality() ) !=
ERR_INTERNAL )
  {
    if ( iNewLinkQuality != iCurrLinkQuality )
    {
      switch( iNewLinkQuality )
      {
        case PRX_DISCONNECTED:
          SetTowerIcon( SBS_TOWERON,
SBS_WAVESOFF );
          break;

        case PRX_LOWQUALITY:
          SetTowerIcon( SBS_TOWERON,
SBS_WAVESHIGHBLINK );
          break:
```

```
      case PRX_HIGHQUALITY
        SetTowerIcon( SBS_TOWERON,
SBS_WAVESON );
        break;
    }

    iCurrLinkQuality = iNewLinkQuality;
  }
 }
}

APIFUNCRET RegisterPowerManCB( struct REGW
*CallerRegs )
{
 lpfnPRXCallBack = MK_FP( CallerRegs->es,
CallerRegs->si );

 if ( ( iPRXSetupThreadIdx = GetTempEventNum() )
< 0 )
   return;

 AddThread( iPRXSetupThreadIdx,
WaitForPRXSetup, NULL,
SMD_ONETIME, FALSE,
        1, 0 );

 CallerRegs->ax = ( WORD )ERR_SUCCESS;

 SetForegroundRegs( CallerRegs );
}

void WaitForPRXSetup( void )
{
 PROXIMVARIABLES far *NewPRXVariables
 WORD wSegNewVars;
 WORD wOffNewVars;
 int iSizeNewVariables = 0;

 DelThread( iPRXSetupThreadIdx );
 iPRXSetupThreadIdx = SMD_NOACTIVETHREAD;

 if ( lpfnPRXCallBack != NULL )
 {
  AX( PRX_CBPRXVARIABLES );
  ( *lpfnPRXCallBack )();

  _asm
  {
    or  ax,ax
    jnz error

    mov iSizeNewVariables, cx
    mov wSegNewVars, es
    mov wOffNewVars, si
  error:
  }

  if ( iSizeNewVariables > 0 )
  {
    NewPRXVariables = MK_FP( wSegNewVars,
wOffNewVars );

    if ( iSizeNewVariables <= sizeof ( PRXVariables
) )
      PRXVariables = *NewPRXVariables;
  }
 }
}

APIFUNCRET ProximDriverUnload( struct REGW
*CallerRegs )
{
 lpfnPRXCallBack = NULL;

 CallerRegs->ax = ERR_SUCCESS;

 SetForegroundRegs( CallerRegs );
}

APIFUNCRET NetConfigData( struct REGW
*CallerRegs )
{
 PROXIMNETCONFIGDATA far *pPRXNetConfig =
   ( PROXIMNETCONFIGDATA far * )MK_FP(
CallerRegs->es,
CallerRegs->si );

 if ( CallerRegs->cx <= sizeof (
PROXIMNETCONFIGDATA ) )
 {
   pPRXNetConfig->nDomainID =
UIConfigData.nDomainID;
   CallerRegs->ax = ERR_SUCCESS;
 }
 else
   CallerRegs->ax = ( WORD )ERR_INTERNAL;

 SetForegroundRegs( CallerRegs );
}

APIFUNCRET XchgRevInfo( struct REGW
*CallerRegs )
{
 PROXIMVERSIONINFO far *NewPRXVersionInfo;

 if ( CallerRegs->cx <= sizeof (
PROXIMVERSIONINFO ) )
 {
   NewPRXVersionInfo = MK_FP( CallerRegs->es,
CallerRegs->di );


   PRXVersionInfo.wMajorVersion =
GEN_SMMAJORVERSIONNUM,
   PRXVersionInfo.wMinorVersion =
GEN_SMMINORVERSIONNUM;
   PRXVersionInfo.lpszModuleName = ( LPSTR
)szSMModuleName;

   CallerRegs->es = SEG( &PRXVersionInfo );
   CallerRegs->si = OFF( &PRXVersionInfo );

   CallerRegs->ax = ERR_SUCCESS;
 }
 else
   CallerRegs->ax = ( WORD )ERR_INTERNAL;

 SetForegroundRegs( CallerRegs );
}

int NotifySuspend( void )
{
 if ( lpfnPRXCallBack == NULL )
   return ( ERR_INTERNAL );

 AX( PRX_CBSUSPEND );
 return ( ( *lpfnPRXCallBack )() );
}

int NotifyResume( void )
{
 if ( lpfnPRXCallBack == NULL )
   return ( ERR_INTERNAL );

 AX( PRX_CBRESUME );
 return ( ( *lpfnPRXCallBack )() );
}

int SetSecurityID( char *szNewSecurityID )
{
 if ( lpfnPRXCallBack == NULL )
   return ( ERR_INTERNAL );

 _asm
 {
   mov  ax, PRX_CBSETSECUREID
   push ds
   pop  es
   mov  si, szNewSecurityID
 }

 return ( ( *lpfnPRXCallBack )() );
}

BOOL IsSynchronized( void )
{
 BOOL fNewSynchronizeFlag;

 if ( PRXVariables.lpszSynchronizeFlag == NULL )
   return ( ERR_INTERNAL );

 PCB_BEGINCRITICAL;
 fNewSynchronizeFlag = ( BOOL
)*PRXVariables.lpszSynchronizeFlag;
 PCB_ENDCRITICAL;

 return ( fNewSynchronizeFlag );
}

LPSTR GetRomVersion( void )
{
 LPSTR lpszNewRomVersion;

 if ( PRXVariables.lpszRomVersion == NULL )
   return ( NULL );

 PCB_BEGINCRITICAL;
 lpszNewRomVersion = ( LPSTR
)PRXVariables.lpszRomVersion;
 PCB_ENDCRITICAL;

 return ( lpszNewRomVersion );
}

int GetLinkQuality( void )
{
 int iNewLinkQuality;

 if ( PRXVariables.lpszLinkQuality == NULL )
   return ( ERR_INTERNAL );

 PCB_BEGINCRITICAL;
 iNewLinkQuality = ( int
)*PRXVariables.lpszLinkQuality;
 PCB_ENDCRITICAL;

 return ( iNewLinkQuality );
}

#if defined( _MSC_VER )
#pragma warning( default : 4704 )
#endif


Copr. 1995 Zenith Data Systems Corp.

#include "cr.h"
#include "sio.h"
#include "k2.h"
#include "spawn.h"
#include "rparm.h"
#include "hm.h"
#include "sm.h"

#if defined( _MSC_VER )
#pragma warning( disable : 4704 )
#endif

static BYTE bGearIdx = 0;

static ZDSTRAPREC       SCSTrapRec,
static CALLREC          SCSRecvMsgRec;
static CALLREC          SCSEventLoopRec;
static BOOL             fSCSActive = FALSE,
static BOOL             fMonStatus = FALSE;
static BOOL             fLocalKbdStatus = FALSE;
static BOOL             fHostControlRequested =
FALSE;
static BOOL             fConnectRequested;
static BYTE             fSendPMRetryDone = FALSE,
static BYTE             fWaitVidUnblockActive =
FALSE;
static BYTE             fBadVideoMsgRecv = FALSE;

static BOOL             fUpdatingConnectStatus =
FALSE;

static int              iSetMonDone = FALSE;
static int              iSetMemDone = FALSE;
static int              iFullRepaintDone = FALSE;
static int              iFreeMemPercent = 0;
static BYTE             nOSKType,
static BYTE             fRepaintRequired = FALSE;
static CONNERROR        nConnectErrorCode =
SCS_NOCONNERROR;
static PRIVATEMSGBUFF   RecvPriMsgBuff;
static PRIVATEMSGBUFF   SendPriMsgBuff;
static SYSTEMSTATUSBUFF SystemStatusBuff;
static int              iSCOSErrNo;
static int              iTempThreadIdx;
static int              iSUIThreadIdx;
static int              iFileMemThreadIdx;
static int              iDiscoThreadIdx;
static int              iHostControlThreadIdx,
static int              iCancelConnectThreadIdx;
static int              iOkThreadIdx,
static int              iPMRetryThreadIdx =
SMD_NOACTIVETHREAD,
static int              iWaitVidUnblockThreadIdx =
SMD_NOACTIVETHREAD;
static FARCALLENTRY     lpfnFarCallEntry = NULL;

static char             *szHostFileName = NULL;

static APIFUNC aAPIFuncTable[]=
{
 { SMI_SCSLOADING, SCSLoading },
 { SMI_SLLOADSUI, SLLoadSUI },
 { SMI_SLENABLEKBD, SLEnableKbd },
 { SMI_SLGETFRAMETYPE, SLGetFrameType },
 { SMI_SLDEFINEOLDVIDVECTOR,
SLDefineOldVidVector },
 { SMI_SLGETMLIDSTATUS, SLGetMLIDStatus },
 { SMI_UNLOADOSK, UnloadOSK },
 { SMI_CHANGETOBADVIDEO,
ChangeToBadVideo },
 { SMI_REQNOTIFYDOSWIN, NotifyDosWin },
 { SMI_REQUNIOCCCLOSE, NotifyUniOccClose },
 { SMI_ACKFLASHBREAK, AckFlashBreak },
 { SMI_ACKTOTALFILES, AckTotalFlashFiles },
 { SMI_ACKPATHASSTRING, AckPathFlashFile },
 { SMI_ACKACTIVEUPDATE, AckActiveUpdate },
 { SMI_ACKOCCDEFINE, AckOccDefine },
 { SMI_ACKOCCCLOSE, AckOccClose },
 { 0, 0 }
};

BOOL GetUpdatingConnectStatus( void )
{
 return ( fUpdatingConnectStatus );
}

void SetUpdatingConnectStatus( BOOL fNewStatus )
{
 fUpdatingConnectStatus = fNewStatus;
}

APIFUNC *GetSCSFuncTable( void )
{
 return ( aAPIFuncTable );
}

void SetSCSActiveStatus( BOOL fNewSCSActive )
{
 fSCSActive = fNewSCSActive;
}

BOOL GetSCSActiveStatus( void )
{
 return ( fSCSActive );
}

void SetConnectRequested( BOOL
fNewConnectRequested, BYTE
nUpdateIcon )
{
 if ( ( fConnectRequested = fNewConnectRequested
) ==
SCS_CONNECTREQUESTED )
 {
   if ( nUpdateIcon == SCS_UPDATEICON )
     SetWaitingIcon( SBS_WAITINGICONON, TRUE
);
 }
 else
 {
   if ( nUpdateIcon == SCS_UPDATEICON )
     SetWaitingIcon( SBS_WAITINGICONOFF,
TRUE );
 }
}

BOOL GetConnectRequested( void )
{
 return ( fConnectRequested );
}

NPSTR GetPrivateMsgBuff( int *iBuffLen )
{
 *iBuffLen = RecvPriMsgBuff.lBuffLen;

 return ( RecvPriMsgBuff.sMsgBuff );
}

char GetConnectErrCode( void )
{
 return ( nConnectErrorCode );
}

int GetSCOSErrNo( BYTE nClearError )
{
 int iNewSCOSErrNo = 0;

 PCB_BEGINCRITICAL;
 iNewSCOSErrNo = iSCOSErrNo;

 if ( nClearError == SCS_CLEARERROR )
   iSCOSErrNo = 0;

 PCB_ENDCRITICAL;

 return ( iNewSCOSErrNo );
}

void SetFullRepaint( int iNewFullRepaintDone )
{
 iFullRepaintDone = iNewFullRepaintDone;
}

void InitSCSTrapRec( void )
{
 fil_chr( ( NPSTR )&SCSTrapRec, 0, sizeof(
ZDSTRAPREC ) );

 SCSTrapRec.tr.tr_int = SMI_SCSINTNUM;
 SCSTrapRec.tr.tr_asm_srv = 2;

 strcpy( SCSTrapRec.szSMAfterSignature,
szSMSignature ),
}

TRAPREC *GetSCSTrapRec( void )
{
```

```
 return ( &SCSTrapRec.tr ),
}

void InitSCSCallRec( void )
{
 DWORD dwCallService = ( DWORD )( FARPROC
)SCSEventLoopService,

 fil_chr( ( NPSTR )&SCSEventLoopRec, 0. sizeof(
CALLREC ) );

 SCSEventLoopRec.cFarCallOpCode = ( BYTE
)SMD_CALLOPCODE;
 SCSEventLoopRec.aCallBack[0] = LOBYTE(
LOWORD( dwCallService )
);
 SCSEventLoopRec.aCallBack[1] = HIBYTE(
LOWORD( dwCallService )
);
 SCSEventLoopRec.aCallBack[2] = LOBYTE(
HIWORD( dwCallService )
).
 SCSEventLoopRec.aCallBack[3] = HIBYTE(
HIWORD( dwCallService )
);
 SCSEventLoopRec.cFarRetOpCode = ( BYTE
)SMD_RETOPCODE;
 strcpy( SCSEventLoopRec.szSMAfterSignature,
SIG_SMSIGNATURE ).

 dwCallService = ( DWORD )( FARPROC
)SCSRecvMsgService
 mem_cp( ( PVOID )&SCSEventLoopRec, ( PVOID
)&SCSRecvMsgRec,
sizeof ( CALLREC ) );
 SCSRecvMsgRec.aCallBack[0] = LOBYTE(
LOWORD( dwCallService ) );
 SCSRecvMsgRec.aCallBack[1] = HIBYTE(
LOWORD( dwCallService ) );
 SCSRecvMsgRec.aCallBack[2] = LOBYTE(
HIWORD( dwCallService ) );
 SCSRecvMsgRec.aCallBack[3] = HIBYTE(
HIWORD( dwCallService ) );
}

void FAR SCSEventLoopService( void )
{
 _asm
 {
  or   ah,ah
  jnz  process
  jmp  exit

process:
  cli

  push ds
  push ax
  push bx
  push cx
  push dx
  push si
  push di
  mov  ds,cs:000Ah
 };

 PushEventNum( SMI_SCSEVENTNUM ).
 lpfnFarCallEntry = MK_FP( _ccode, _fcall_entry );

 _asm
 {
  pop di
  pop si
  pop dx
  pop cx
  pop bx
  pop ax
  mov al,ah
  xor ah,ah
  add ax, SMI_EVENTLOOPBASE

  sti

  call [lpfnFarCallEntry]

  pop ds
 };

exit:
 return,
}

void FAR SCSRecvMsgService( void )
{
 _asm
 {
  cli

  push ds
  push ax
  push bx
  push cx
  push dx
  push si
  push di
  mov  ds,cs:000Ah
 }.

 PushEventNum( SMI_SCSEVENTNUM );
 lpfnFarCallEntry = MK_FP( _ccode, _fcall_entry );

 _asm
 {
  pop di
  pop si
  pop dx
  pop cx
  pop bx
  pop ax

  push dx
  pop ds
  mov ax, [di]
  add ax, SMI_PRIMSGBASE

  mov ds.cs:000Ah


  sti

  call [lpfnFarCallEntry]

  pop ds
 };
}

APIFUNCRET SCSLoading( struct REGW
*CallerRegs )
{
 CallerRegs->ax = 0x0001;

 CallerRegs->bx = SEG( &SCSRecvMsgRec );
 CallerRegs->si = OFF( &SCSRecvMsgRec ).
 CallerRegs->dx = SEG( &SCSEventLoopRec );
 CallerRegs->di = OFF( &SCSEventLoopRec );

 CallerRegs->cx = SMD_DISPATFREQ.

 SetForegroundRegs( CallerRegs );

 if ( ( iTempThreadIdx = GetTempEventNum() ) < 0
)
  return;

 AddThread( iTempThreadIdx, ( NEARPROC
)SetupSCOS, NULL,
SMD_ONETIME, FALSE,
        SCS_LOADSCSPOLLFREQ, 0 );
}

APIFUNCRET UnloadOSK( struct REGW
*CallerRegs )
{
 int iCurrScrCode = GetCurrScrCode();

 if ( GetSUIReady() && IsOSK( iCurrScrCode ) )
 {
  SetCurrScrCode( iCurrScrCode |
SUI_OSKVIDCHANGEMASK );
  UnloadSUI( SUI_NOUNLOADSUI );
 }
}

APIFUNCRET ChangeToBadVideo( struct REGW
*CallerRegs )
{
 If ( GetSCSCallProgress() ==
SMI_SCSCONNECTED )
 {
  fBadVideoMsgRecv = TRUE;
  DiscoDisableConnection();
 }
}

APIFUNCRET NotifyDosWin( struct REGW
*CallerRegs )
{
 int iMsgStatus;

 PCB_BEGINCRITICAL

 if ( ( iMsgStatus = PrepPrivateMessage(
CallerRegs ) ) ==
ERR_SUCCESS )
  SetHostMode( ( int )*RecvPriMsgBuff.sMsgBuff );

 PCB_ENDCRITICAL

 if ( iMsgStatus == ERR_SUCCESS )
  SendPrivateMessage(
PMI_ACKNOTIFYDOSWIN, 0, NULL );

 SetForegroundRegs( CallerRegs );
}

APIFUNCRET NotifyUniOccClose( struct REGW
*CallerRegs )
{
 int iMsgStatus;

 PCB_BEGINCRITICAL

 iMsgStatus = PrepPrivateMessage( CallerRegs );

 PCB_ENDCRITICAL

 if ( iMsgStatus == ERR_SUCCESS )
 {
  TRACE( "NOTICE: Received UNI close PM,
closing OSKV" );
  SendPrivateMessage( PMI_ACKUNIOCCCLOSE.
0, NULL );

  if ( IsOSK( GetCurrScrCode() ) )
  {
   SetCurrScrCode( GetCurrScrCode() |
SUI_OSKUNICLOSEMASK );
   UnloadSUI( SUI_NOUNLOADSUI ).
  }
 }

 SetForegroundRegs( CallerRegs );
}

APIFUNCRET AckFlashBreak( struct REGW
*CallerRegs )
{
 PCB_BEGINCRITICAL

 if ( PrepPrivateMessage( CallerRegs ) ==
ERR_SUCCESS )
  SetTmpFilePercent( *( int *
)RecvPriMsgBuff.sMsgBuff );

 PCB_ENDCRITICAL

 SetForegroundRegs( CallerRegs );
}

APIFUNCRET AckTotalFlashFiles( struct REGW
*CallerRegs )
{
 PCB_BEGINCRITICAL

 if ( PrepPrivateMessage( CallerRegs ) ==
ERR_SUCCESS )
  SetTotalFlashFiles( *( int *
)RecvPriMsgBuff.sMsgBuff );

 PCB_ENDCRITICAL

 SetForegroundRegs( CallerRegs );
}

APIFUNCRET AckPathFlashFile( struct REGW
*CallerRegs )
{
 PCB_BEGINCRITICAL

 If ( PrepPrivateMessage( CallerRegs ) ==
ERR_SUCCESS )
  SetPathFlashFile( ( LPSTR
)RecvPriMsgBuff.sMsgBuff );

 PCB_ENDCRITICAL

 SetForegroundRegs( CallerRegs );
}

APIFUNCRET AckActiveUpdate( struct REGW
*CallerRegs )
{
 PCB_BEGINCRITICAL

 if ( PrepPrivateMessage( CallerRegs ) ==
ERR_SUCCESS )
 {
  if ( RecvPriMsgBuff.iBuffLen > 1 )
   SetNameActiveUpdate( ( LPSTR
)RecvPriMsgBuff.sMsgBuff );
  else
   SetNameActiveUpdate( ( LPSTR )NULL );
 }

 PCB_ENDCRITICAL

 SetForegroundRegs( CallerRegs );
}

APIFUNCRET AckOccDefine( struct REGW
*CallerRegs )
{
 PCB_BEGINCRITICAL

 if ( PrepPrivateMessage( CallerRegs ) ==
ERR_SUCCESS )
 {
  if ( RecvPriMsgBuff.iBuffLen > 1 )
  {
   if ( LOBYTE( *( int * )RecvPriMsgBuff.sMsgBuff
) == TRUE )
    SetOccDefineAcked( PMI_ACKEDTRUE );
   else
    SetOccDefineAcked( PMI_ACKEDFALSE );
  }
  else
   SetOccDefineAcked( PMI_ACKEDFALSE );
 }

 PCB_ENDCRITICAL

 SetForegroundRegs( CallerRegs );
}

APIFUNCRET AckOccClose( struct REGW
*CallerRegs )
{
 PCB_BEGINCRITICAL

 if ( PrepPrivateMessage( CallerRegs ) ==
ERR_SUCCESS )
 {
  if ( RecvPriMsgBuff.iBuffLen > 1 )
  {
   if ( LOBYTE( *( int * )RecvPriMsgBuff.sMsgBuff
) == TRUE )
    SetOccCloseAcked( PMI_ACKEDTRUE );
   else
    SetOccCloseAcked( PMI_ACKEDFALSE );
  }
  else
   SetOccCloseAcked( PMI_ACKEDFALSE );
 }

 PCB_ENDCRITICAL

 SetForegroundRegs( CallerRegs );
}


int PrepPrivateMessage( struct REGW *CallerRegs )
{
 int iReturn;
 LPSTR lpsRecvMsg = ( LPSTR )MAKELONG(
CallerRegs->di.
CallerRegs->dx );

 fil_chr( ( PVOID )&RecvPriMsgBuff, 0, sizeof(
RecvPriMsgBuff )
);

 if ( lpsRecvMsg != NULL && CallerRegs->bx <
SCS_MAXLENMSGBUFF )
 {
  fmem_cp( ( LPSTR )lpsRecvMsg, ( LPSTR
)&RecvPriMsgBuff.iMsgID, CallerRegs->bx );
  CallerRegs->ax = 1;
  iReturn = 0,

#if !defined( PROD )
  sprintf( szTempStr, "NOTICE: Received Private
Message
#:%d\r", RecvPriMsgBuff.iMsgID );
  TRACE( szTempStr );
  sprintf( szTempStr, "NOTICE: First byte of the
Private
Message: %d\r", *RecvPriMsgBuff.sMsgBuff );
  TRACE( szTempStr );
#endif
 }
 else
 {
  CallerRegs->ax = 0;
  iReturn = ERR_INTERNAL;
 }

 return ( iReturn );


}

void SetupSCOS( void )
{
 REG_W InArgs, OutArgs,

 if ( iTempThreadIdx >= 0 )
```

```
  {
    DelThread( iTempThreadIdx );
    iTempThreadIdx = -1;
  }

  fil_chr( ( NPSTR )&SystemStatusBuff, 0, sizeof (
SystemStatusBuff ) );
  fil_chr( ( NPSTR )&InArgs, 0, sizeof ( InArgs ) );

  InArgs.ax = ( WORD
)SCS_SETUPSYSSTATBUFF;
  InArgs.dx = SEG( &SystemStatusBuff );
  InArgs.di = OFF( &SystemStatusBuff );

  intn( &InArgs, &OutArgs, SCS_INTNUM );

  SetupSCOSErrNo( &iSCOSErrNo );

  SetSCSActiveStatus( TRUE );
}

int SetupSCOSErrNo( int FAR *iMemLocation )
{
  REG_W InArgs, OutArgs.

  fil_chr( ( NPSTR )&InArgs, 0, sizeof ( InArgs ) );

  InArgs.ax = SCS_ERRNOLOCATION,
  InArgs.es = SEG( iMemLocation );
  InArgs.bx = OFF( iMemLocation );

  intn( &InArgs, &OutArgs, SCS_INTNUM );

  if ( OutArgs.ax != ERR_SUCCESS )
    return ( ERR_INTERNAL );

  return ( ERR_SUCCESS );
}

int BlockSCOSVideo( BYTE fVideoStatus )
{
  REG_W InArgs, OutArgs,

  InArgs.ax = SCS_SCOSVIDEO | ( fVideoStatus ?
SCS_SCOSVIDBLOCK :
SCS_SCOSVIDUNBLOCK );

  intn( &InArgs, &OutArgs, SCS_INTNUM );

  if ( OutArgs.ax != ERR_SUCCESS )
    return ( ERR_INTERNAL );

  return ( ERR_SUCCESS );
}



int DoHostControlMode( BOOL fHostControlStatus )
{
  if ( GetSCSCallProgress() ==
SMI_SCSDISCONNECTED )
    return ( ERR_INTERNAL );

  if ( ( iHostControlThreadIdx = GetTempEventNum()
) < 0 )
    return ( ERR_INTERNAL );

  AddThread( iHostControlThreadIdx,
WaitForHostControl, NULL,
SMD_MANYTIMES, FALSE,
          SCS_HOSTCTRLPOLLFREQ,
SCS_HOSTCTRLMAXRETRY );

  if ( fHostControlStatus )
  {
    if ( SendPrivateMessage(
PMI_REQHOSTCONTROL, 0, NULL ) !=
ERR_SUCCESS )
      return ( ERR_INTERNAL );
  }

  fHostControlRequested = TRUE;

  SetWaitingIcon( SBS_WAITINGICONON, TRUE );
}

void WaitForHostControl( void )
{
  static BYTE fDisconnectRequested = FALSE;

  if ( !fDisconnectRequested )
  {
    DiscoDisableConnection(),
    fDisconnectRequested = TRUE;
  }

  if ( GetSCSCallProgress() ==
SMI_SCSDISCONNECTED )
    DelThread( iHostControlThreadIdx );
  else if ( GetRetryLimit( iHostControlThreadIdx ) ==
0 )
  {
    DelThread( iHostControlThreadIdx );
    DoSuspend( TRUE );
  }
}

int MakeTheConnection( BOOL fNewMonStatus,
BOOL
fNewLocalKbdStatus )
{
  int iHostVersionNum = GetCurrHostVersionNum();
  char *szCurrNodeAddress =
GetCurrNodeAddress();

  if ( *szCurrNodeAddress == NULL ||
iHostVersionNum == 0 )
    return ( ERR_INTERNAL );

  if ( iHostVersionNum < MAKEWORD(
GEN_HMEXPMINORVERSIONNUM,
GEN_HMEXPMAJORVERSIONNUM ) )
  {
    SMVideoBusy( DoVersionMsgBox );
    return ( ERR_SUCCESS );
  }

  SetConnectRequested(
SCS_CONNECTREQUESTED, SCS_UPDATEICON
);

  if ( GetSUIReady() )
    SMVideoBusy( DoExecConnect );
  else
  {
    if ( SMDosBusy( CBExecConnect ) !=
ERR_SUCCESS )
      return ( ERR_INTERNAL );
  }

  return ( ERR_SUCCESS );
}

void DoVersionMsgBox( void )
{
  char szTempStr[ STR_STRMAXLENERR ];

  sprintf( szTempStr, STR_SUIHOSTVERTOOLOW,
szSMVersionName );
  OpenMessageBox( szTempStr, 0,
SUI_CENTERJUSTIFIED, SUI_OK );
}

int ResumeTheConnection( void )
{
  if ( IsPWRequired() )
    DoMessageBox( NULL, SUI_LOGIN,
SUI_LEFTJUSTIFIED, SUI_OK |
SUI_CANCEL,
              CBLoginButtonPressed,
SUI_LOGINTIMEOUT );
  else
  {
    OpenMessageBox( STR_SUIRESUMINGCONN,
0, SUI_LEFTJUSTIFIED, 0
);

    SetConnectRequested(
SCS_CONNECTREQUESTED,
SCS_NOUPDATEICON
);

    if ( ( iCancelConnectThreadIdx =
GetTempEventNum() ) ==
ERR_INTERNAL )
      return( ERR_INTERNAL );

    TimerManager( TF_SET,
iCancelConnectThreadIdx, 30L );

    AddThread( iCancelConnectThreadIdx,
WaitForCancelConnect,
NULL, SMD_MANYTIMES,
            FALSE, SUI_CANCELCONNPOLLFREQ,
SUI_CANCELCONNMAXRETRY );

    if ( SMDosBusy( CBExecConnect ) !=
ERR_SUCCESS )
      return( ERR_INTERNAL );
  }

  return ( ERR_SUCCESS );
}

void CBLoginButtonPressed( int iButtonCode )
{
  if ( iButtonCode == SUI_OK )
  {
    SetConnectRequested(
SCS_CONNECTREQUESTED,
SCS_NOUPDATEICON
);

    OpenMessageBox( STR_SUIRESUMINGCONN2,
0, SUI_LEFTJUSTIFIED, 0
);

    if ( ( iCancelConnectThreadIdx =
GetTempEventNum() ) ==
ERR_INTERNAL )
      return;

    TimerManager( TF_SET,
iCancelConnectThreadIdx, 30L );

    AddThread( iCancelConnectThreadIdx,
WaitForCancelConnect,
NULL, SMD_MANYTIMES,
            FALSE, SUI_CANCELCONNPOLLFREQ,
SUI_CANCELCONNMAXRETRY );

    SMDosBusy( CBExecConnect );
  }
  else
    CBMsgBoxButtonPressed( iButtonCode );
}

void CBMsgBoxButtonPressed( int iButtonCode )
{
  int iActionCode = GetCurrActionCode();

  HideMessageBox();

  if ( iActionCode == SUI_LASTCONNECTION ||
iActionCode ==
SUI_BADVIDEOMSG )
    SMVideoBusy( DoNextScreen );

}

void DoNextScreen( void )
{
  LoadSUI( SUI_SPECIFIEDSCREEN,
SUI_HOSTSELECTION );
}

void DoExecConnect( void )
{
  SMDosBusy( CBExecConnect );
}


void CBExecConnect( void )
{
  REG_W InArgs, OutArgs;
  RPARM *SCSRParm;
  char *szCurrNodeAddress =
GetCurrNodeAddress();
  char *szCurrHostName = GetLBHost( -1 );

  nConnectErrorCode = SCS_NOCONNERROR;


  if ( ( SCSRParm = ( RPARM * )malloc( sizeof (
RPARM ) ) ) ==
NULL )
    return;

  fil_chr( ( NPSTR )SCSRParm, 0, sizeof( RPARM )
);

  SCSRParm->rptermtyp = 0;
  SCSRParm->rpprotocol = SCS_SPX;

  strcpy( SCSRParm->rpinternet,
szCurrNodeAddress );

  if ( IsPWRequired() )
  {
    strcpy( SCSRParm->rpdopw, szPassword );
    strcpy( SCSRParm->rpdoid,
SCS_STRDEFUSERID );

    UIConfigData.bLastConnPassword = TRUE;

  }
  else
    UIConfigData.bLastConnPassword = FALSE;


#if defined( IPTEST )
  #pragma message( "Warning: IP Address is fixed."
)
  strcpy( SCSRParm->rpinternet,
"000000000020A60010E6" );
#endif

#if !defined( PROD )
  sprintf( szTempStr, "NOTICE: pw - %s\r      uid -
%s\r
nid - %s\r", SCSRParm->rpdopw,
        SCSRParm->rpdoid, SCSRParm->rpinternet
);
  TRACE( szTempStr );
#endif

  InArgs.ax = SCS_SMAKECON;
  InArgs.es = SEG( SCSRParm );
  InArgs.bx = OFF( SCSRParm );

  SetSCSAbortFlag( FALSE );
  SetMsgBoxReturnCode( SUI_NOBUTTONS );

  _and_isr_flg( ~SMD_SCHEDULERS );

  intn( &InArgs, &OutArgs, SCS_INTNUM );

  DelThread( iCancelConnectThreadIdx );

  SetConnectRequested(
SCS_NOCONNECTREQUESTED,
SCS_NOUPDATEICON
);

  if ( OutArgs.ax == SCS_ACCEPTED ||
      GetSCOSErrNo( SCS_RETAINERROR ) ==
SCS_NOLOGINERROR )
  {
    nConnectErrorCode = SCS_NOCONNERROR;
    strcpy( UIConfigData.szLastNodeAddress,
szCurrNodeAddress );
    strcpy( UIConfigData.szLastHostName,
szCurrHostName );
    SetCurrHostName( szCurrHostName );

    if ( ( iSUIThreadIdx = GetTempEventNum() ) ==
ERR_INTERNAL )
      return;

    AddThread( iSUIThreadIdx, ( NEARPROC
)WaitForSUIUnload, NULL,
            SMD_POLLED, FALSE,
SCS_WAITSUIPOLLFREQ, 0 );

    AddThread( SCS_DISCOEVENTNUM,
WaitForStatusChange, NULL,
            SMD_POLLED, FALSE,
SCS_DISCOPOLLFREQ, 0 );

    UnloadSUI( SUI_NOUNLOADSUI );
  }
  else
  {
    SetWaitingIcon( SBS_WAITINGICONOFF,
SCS_UPDATEICON );

    *UIConfigData.szLastNodeAddress = NULL;

    if ( nConnectErrorCode ==
SCS_NOCONNERROR )
      nConnectErrorCode = TranslateConnectError();

    switch ( nConnectErrorCode )
    {
      case SCS_ERRTIMEOUT:
        DoMessageBox(
STR_SUICONNECTTIMEOUT, 0,
SUI_CENTERJUSTIFIED, SUI_OK,
CBMsgBoxButtonPressed, 0 );
        break;

      case SCS_ERRPASSWORD:
        DoMessageBox(
STR_SUIPASSWORDREJECTED, 0,
SUI_CENTERJUSTIFIED, SUI_OK,
CBMsgBoxButtonPressed, 0 ),
        break;

      case SCS_ERRLOGINID:
        DoMessageBox(
STR_SUILOGINIDREJECTED, 0,
SUI_CENTERJUSTIFIED, SUI_OK,
CBMsgBoxButtonPressed, 0 );
        break;

      case SCS_ERRUNSUPVIDMODE:
        DoMessageBox( STR_SUIUNSUPVIDMODE,
0,
SUI_CENTERJUSTIFIED, SUI_OK,
CBMsgBoxButtonPressed, 0 );
```

```
      break;

    case SCS_ERRUSERABORT:
      CBMsgBoxButtonPressed( SUI_CANCEL );
      break;

    case SCS_ERRUNKNOWN:
    default:
      DoMessageBox(
STR_SUICONNECTERRUNKNOWN, 0,
SUI_CENTERJUSTIFIED, SUI_OK,
CBMsgBoxButtonPressed, 0 );
      break;
    }
  }

  free( SCSRParm );
}

void WaitForCancelConnect( void )
{
  static int iWaitForSUI = 0;

  if ( GetMsgBoxReturnCode() == SUI_CANCEL )
    nConnectErrorCode = SCS_ERRUSERABORT;
  else if ( GetRetryLimit( iCancelConnectThreadIdx )
== 0 )
    nConnectErrorCode = SCS_ERRTIMEOUT;

  if ( nConnectErrorCode != SCS_NOCONNERROR
)
  {
    SetSCSAbortFlag( TRUE );
    DelThread( iCancelConnectThreadIdx );
  }

  if (TimerManager (TF_CHECK,
iCancelConnectThreadIdx, 0) ==
TIMEOUT_FIRED)
  {
    switch (iWaitForSUI)
    {
      case 0:
      TimerManager (TF_RESET,
iCancelConnectThreadIdx, 0);

      HideMessageBox ();

      if (TimerManager (TF_CHECK,
iCancelConnectThreadIdx, 0L) ==
TIMEOUT_AVAILABLE)
      {
        TimerManager (TF_SET,
iCancelConnectThreadIdx, 1L);
        iWaitForSUI = 1;
      }
      break;

      case 1:
      TimerManager (TF_RESET,
iCancelConnectThreadIdx, 0);

      OpenMessageBox( STR_SUIRESUMINGCONN,
0, SUI_LEFTJUSTIFIED,
SUI_CANCEL );

      iWaitForSUI = 0;
      break;
    }
  }

}

void WaitForStatusChange( void )
{
  static char nOldVideoMode = -1;
  char nCurrVideoMode = GetCurrVidMode();
  int iCurrScrCode;
  int nSUIStatus;

  if ( nOldVideoMode == -1 )
    nOldVideoMode = nCurrVideoMode;

  if ( GetSCSCallProgress() ==
SMI_SCSDISCONNECTED )
  {
    nSUIStatus = GetSUIStatus();

    if ( !fHostControlRequested || ( DoSuspend(
TRUE ) !=
ERR_SUCCESS ) )
    {
      fHostControlRequested = FALSE;

      if ( nSUIStatus != SMI_SUIUNLOADING &&
nSUIStatus !=
SMI_SUIDEACTIVATING )
      {
        DelThread( SCS_DISCOEVENTNUM );
        SetCurrHostName( szNullStr );
        SetWaitingIcon( SBS_WAITINGICONOFF,
TRUE );

        if ( IsSetupDlg( GetCurrScrCode() ) )
          UpdateSUIConnectStatus();
        else
        {

          if ( fBadVideoMsgRecv )
          {
            fBadVideoMsgRecv = FALSE;

            LoadSUI( SUI_BADVIDEOMSG,
SUI_NOSCREEN );
          }
          else
            LoadSUI( SUI_SPECIFIEDSCREEN,
SUI_HOSTSELECTION );
        }
      }
    }
  }
  else
  {
    iCurrScrCode = GetCurrScrCode();

    if ( nCurrVideoMode != nOldVideoMode )

    {
      if ( GetSUIReady() &&
          IsOSK( iCurrScrCode ) &&
!IsOSKAsSetupDlg(
iCurrScrCode ) )
          UnloadSUI( SUI_NOUNLOADSUI );
    }
  }

  nOldVideoMode = nCurrVideoMode;
}

void WaitForSUIUnload( void )
{
  if ( !GetSUIReady() )
    DelThread( iSUIThreadIdx );
}

int SetMonitor( BOOL fNewMonStatus, BOOL
fNewLocalKbdStatus )
{
  iSetMonDone = ERR_INPROGRESS;

  if ( !GetSCSActiveStatus() )
    return ( ERR_INTERNAL );

  if ( GetSCSCallProgress() !=
SMI_SCSCONNECTED )
    iSetMonDone = ERR_SUCCESS;
  else
  {
    fMonStatus = fNewMonStatus;
    fLocalKbdStatus = fLocalKbdStatus;

    if ( SMDosBusy( CBExecMonitor ) !=
ERR_SUCCESS )
    {
      iSetMonDone = ERR_INTERNAL;
      return ( ERR_INTERNAL );
    }
  }

  return ( ERR_SUCCESS );
}

void CBExecMonitor( void )
{
  REG_W InArgs, OutArgs;

  InArgs.ax = ( fMonStatus ? SCS_MONITORON :
SCS_MONITOROFF );
  InArgs.ax |= ( fLocalKbdStatus ?
SCS_LOCALKBDON :
SCS_LOCALKBDOFF );

  SetReentrancy( FALSE );
  intn( &InArgs, &OutArgs, SCS_INTNUM );
  SetReentrancy( TRUE );

  if ( OutArgs.ax == SCS_ACCEPTED )
  {
    nConnectErrorCode = SCS_NOCONNERROR;
    iSetMonDone = ERR_SUCCESS;
  }
  else
  {
    nConnectErrorCode =
SCS_ERRFULLSCRPAINT;
    iSetMonDone = ERR_SUCCESS;
    TRACE( "ERROR: CoSession monitor call was
not accepted.
Reported as accepted anyway.\r" );
  }
}

int CheckMonitor( void )
{
  return ( iSetMonDone );
}

int SetSCSMemory( int iNewFreeMemPercent, int
iNewOSKType, BYTE
nDosBusy )
{
  iSetMemDone = ERR_INPROGRESS;
  nOSKType = LOBYTE( iNewOSKType );

  if ( !GetSCSActiveStatus() )
    return ( ERR_INTERNAL );

  iFreeMemPercent = iNewFreeMemPercent;

  if ( nDosBusy == SMI_SCSWAITFORDOS )
  {
    if ( SMDosBusy( CBExecSCSMemory ) != 0 )
      return ( ERR_INTERNAL );
  }
  else
    CBExecSCSMemory();

  return ( ERR_SUCCESS );
}

void CBExecSCSMemory( void )
{
  REG_W InArgs, OutArgs;

  if ( nOSKType == SUI_WINDOWSOSK )
    InArgs.ax = SCS_FREEOSKMEM;
  else
    InArgs.ax = SCS_FREEMEM;

  InArgs.dx = iFreeMemPercent;

#if !defined( PROD )
  sprintf( szTempStr, "NOTICE: Memory call
number#: %x,
requesting allocation of %d%% of SRWIN
memory.\r",
          InArgs.ax, InArgs.dx );
  TRACE( szTempStr );
#endif

  SetReentrancy( FALSE );
  intn( &InArgs, &OutArgs, SCS_INTNUM );
  SetReentrancy( TRUE );

  if ( OutArgs.ax == SCS_ACCEPTED )
    iSetMemDone = ERR_SUCCESS;
  else
    iSetMemDone = ERR_INTERNAL;
}

BOOL CheckSCSMemory( void )
{
  return ( iSetMemDone );
}

int RequestFullRepaint( BYTE fRepaintRequired,
WORD wScreenCode )
{
  iFullRepaintDone = ERR_INPROGRESS;

  if ( !GetSCSActiveStatus() )
    return ( ERR_INTERNAL );

  if ( IsOSKWinGraphics( wScreenCode ) )
  {
    TRACE( "NOTICE: Closing the Windows Host No
Paint Zone\r" );

    if ( CloseHostOcclude() != ERR_SUCCESS )

    {
      TRACE( "NOTICE: Attempt to close No Paint
Zone on Host
failed, continuing anyway\r" );
      return ( iFullRepaintDone = ERR_SUCCESS );

    }
  }
  else
  {
    TRACE( "NOTICE: Closing the DOS or DOS
Graphics occlusion
region\r" );

    if ( SetSCSHostOcclude( ( OCCLUDEUNION *
)NULL,
SUI_NOOCCTYPE, fRepaintRequired ) !=
ERR_SUCCESS )
    {
      TRACE( "ERROR: an error occured in calling
SetSCSHostOcclude(), continuing anyway\r" );
      return ( iFullRepaintDone = ERR_SUCCESS );
    }
  }

  return ( ERR_SUCCESS );
}

int CheckFullRepaint( void )
{
  return ( iFullRepaintDone );
}

int DiscoDisableConnection( void )
{
  if ( !GetSCSActiveStatus() )
    return ( ERR_INTERNAL );

  if ( ( iDiscoThreadIdx = GetTempEventNum() ) < 0
)
    return ( ERR_INTERNAL );

  AddThread( iDiscoThreadIdx, WaitForDisco, NULL,
SMD_ONETIME,
FALSE,
          1, 0 );

  SetWaitingIcon( SBS_WAITINGICONON, TRUE );

  return ( ERR_SUCCESS );
}

void WaitForDisco( void )
{
  REG_W InArgs, OutArgs;

  DelThread( iDiscoThreadIdx );

  InArgs.ax = SCS_DISCODISABLECON;

  intn( &InArgs, &OutArgs, SCS_INTNUM );

}

int SendPrivateMessage( int iMsgID, int iBuffLen,
char *sMsgBuff
)
{
  REG_W InArgs, OutArgs;

  fil_chr( &InArgs, 0, sizeof ( InArgs ) );
  fil_chr( &SendPriMsgBuff, 0, sizeof (
SendPriMsgBuff ) );

  SendPriMsgBuff.iMsgID = iMsgID;

  if ( ( SendPriMsgBuff.iBuffLen = iBuffLen ) > 0 )
    mem_cp( sMsgBuff, SendPriMsgBuff.sMsgBuff,
iBuffLen );
  InArgs.ax = SCS_SENDPRIMSG;

  InArgs.dx = SEG( &SendPriMsgBuff );
  InArgs.di = OFF( &SendPriMsgBuff );

  InArgs.bx = SendPriMsgBuff.iBuffLen + sizeof (
SendPriMsgBuff.iBuffLen ) +
          sizeof ( SendPriMsgBuff.iMsgID );

#if !defined( PROD )
  sprintf( szTempStr, "NOTICE: Sent Private
Message #:%d\r",
SendPriMsgBuff.iMsgID );
  TRACE( szTempStr );
#endif

  intn( &InArgs, &OutArgs, SCS_INTNUM );

  if ( OutArgs.ax != SCS_ACCEPTED )
  {
    TRACE( "ERROR: CoSession Send Private
Message function
returned an error\r" );
```

```
  }

  return ( OutArgs.ax == SCS_ACCEPTED ?
ERR_SUCCESS .
ERR_INTERNAL );
}

void WaitForSendPM( void )
{
  REG_W InArgs, OutArgs:

  InArgs.ax = SCS_SENDPRIMSG;

  InArgs.dx = SEG( &SendPriMsgBuff );
  InArgs.di = OFF( &SendPriMsgBuff );

  InArgs.bx = SendPriMsgBuff.iBuffLen + sizeof (
SendPriMsgBuff.iBuffLen ) +
          sizeof ( SendPriMsgBuff.iMsgID );

#if !defined( PROD )
  sprintf( szTempStr, "NOTICE: Sent Private
Message #:%d\r",
SendPriMsgBuff.iMsgID ):
  TRACE( szTempStr ):
#endif

  intn( &InArgs. &OutArgs. SCS_INTNUM )

  if ( OutArgs.ax == SCS_ACCEPTED )
  {
    TRACE( "NOTICE: Send PM retry succeeded!" ),

    PCB_BEGINCRITICAL

    SendPriMsgBuff.iMsgID = 0,

    PCB_ENDCRITICAL;
  }
  else
    TRACE( "NOTICE: Send PM retry failed\r" ),

  if ( GetRetryLimit( iPMRetryThreadIdx ) == 0 ||
SendPriMsgBuff.iMsgID == 0 )
  {
    TRACE( "NOTICE: Send PM retry thread
expired\r" );
    DelThread( iPMRetryThreadIdx );
    iPMRetryThreadIdx = SMD_NOACTIVETHREAD;

    PCB_BEGINCRITICAL.
    fSendPMRetryDone = TRUE,
    PCB_ENDCRITICAL:
  }
}


int GetSCSCallProgress( void )
{
  BYTE nCallProgress:
  PCB_BEGINCRITICAL
  nCallProgress = SystemStatusBuff.nCallProgress;
  PCB_ENDCRITICAL

  return ( nCallProgress ):
}

int GetSCSProtocolId( void )
{
  BYTE nProtocolId:

  PCB_BEGINCRITICAL
  nProtocolId = SystemStatusBuff.nProtocolId;
  PCB_ENDCRITICAL

  return ( nProtocolId );
}

int GetSCSVideoMode( void )
{
  BYTE nCurrentVidMode.

  PCB_BEGINCRITICAL
  nCurrentVidMode =
SystemStatusBuff.nCurrentVidMode;
  PCB_ENDCRITICAL

  return ( nCurrentVidMode ):
}

void SetSCSAbortFlag( BYTE fNewAbortRequest )
{
  PCB_BEGINCRITICAL
  SystemStatusBuff.fAbortRequestConnect =
fNewAbortRequest:
  PCB_ENDCRITICAL
}

int ReceiveHostFile( char *szHostFileName, LPSTR
sFileBuff, LONG
lFileSize )
{
  REG_W InArgs, OutArgs;

  fil_chr( ( NPSTR )&InArgs, 0, sizeof ( InArgs ) );

  InArgs.ax = SCS_XFERFILE |
SCS_TOSARATOGA;
  InArgs.ds = SEG( szHostFileName ):
  InArgs.si = OFF( szHostFileName ):
  InArgs.es = SEG( sFileBuff ):
  InArgs.di = OFF( sFileBuff ):
  InArgs.dx = HIWORD( lFileSize ).
  InArgs.cx = LOWORD( lFileSize ):

#if !defined( FLASHTEST )
  intn( &InArgs, &OutArgs, SCS_INTNUM ):

  return ( OutArgs.ax == SCS_ACCEPTED ?
ERR_SUCCESS .
ERR_INTERNAL ):
#else
  return ( ERR_SUCCESS ):
#endif
}

int SendUDHotIcon( int iHotIconID )
{
  int iScanCodeIdx, iNumCodes:
  int iReturn = ERR_SUCCESS;
  BYTE nHiScanByte, nLoScanByte,
  SCANCODE *pScanCodes:

  if ( iHotIconID == PND_UDEF1 )
    pScanCodes = UIConfigData.aUDHotIcon1;
  else
    pScanCodes = UIConfigData.aUDHotIcon2.

  iNumCodes = GetNumScanCodes( pScanCodes ),

  for ( iScanCodeIdx = 0: iScanCodeIdx <
iNumCodes:
++iScanCodeIdx )
  {
    if ( ( nHiScanByte = HIBYTE( pScanCodes[
iScanCodeIdx
].wScanCode ) ) > 0 )
    {
      if ( SendScanCode( nHiScanByte ) ==
ERR_INTERNAL )
      {
        iReturn = ERR_INTERNAL,
        break:
      }
    }

    if ( ( nLoScanByte = LOBYTE( pScanCodes[
iScanCodeIdx
].wScanCode ) ) > 0 )
    {
      if ( SendScanCode( nLoScanByte ) ==
ERR_INTERNAL )
      {
        iReturn = ERR_INTERNAL.
        break,
      }
    }
  }

  return ( iReturn ):
}

int GetNumScanCodes( SCANCODE FAR
*pScanCodes )
{
  int iNumCodes, iScanCodeIdx;

  for ( iNumCodes = 0, iScanCodeIdx = 0;
iScanCodeIdx <
SUI_MAXNUMSCANCODES;
      ++iScanCodeIdx )
  {
    if ( LOBYTE( pScanCodes[ iScanCodeIdx
].wScanCode ) == 0 )
      break;

    iNumCodes++;
  }

  return ( iNumCodes ):
}

int SendScanCode( BYTE nScanCode )
{
  REG_W InArgs, OutArgs;

  PCB_BEGINCRITICAL.

  fil_chr( ( NPSTR )&InArgs, 0, sizeof ( InArgs ) ):

  InArgs.ax = MAKEWORD( nScanCode, HIBYTE(
SCS_SENDKBDSCANCODE )
):

  intn( &InArgs, &OutArgs, SCS_INTNUM ):

  PCB_BEGINCRITICAL;

  return ( OutArgs.ax ):
}

int SendLockKbdMouse( BOOL bLocked )
{
  if ( bLocked )
    return ( SendPrivateMessage(
PMI_REQSCSLOCKKBMO, 0, NULL ) ):
  else
    return ( SendPrivateMessage(
PMI_REQSCSUNLOCKKBMO, 0, NULL )
):
}

int SendDimScreen( BOOL bDimmed )
{
  if ( bDimmed )
    return ( SendPrivateMessage(
PMI_REQSCSBLANKSCR, 0 NULL ) ):
  else
    return ( SendPrivateMessage(
PMI_REQSCSUNBLANKSCR, 0, NULL )
):
}

CONNERROR TranslateConnectError( void )
{
  switch ( ( SCOSCONNERROR )GetSCOSErrNo(
SCS_CLEARERROR ) )
  {
    case SCS_PASSWORDREJECTED:
      return ( SCS_ERRPASSWORD ):

    case SCS_LOGINIDREJECTED:
    case SCS_LOGINUSERREJECTED.
      return ( SCS_ERRLOGINID ):

    case SCS_REMOTEDISCONNECTED
    case SCS_RESPONSETIMEOUT.
      return ( SCS_ERRTIMEOUT ),

    case SCS_UNSUPPORTEDVIDMODE.
      return ( SCS_ERRUNSUPVIDMODE ):

    default:
      return ( SCS_ERRUNKNOWN ),
  }
}

#if defined( _MSC_VER   )
#pragma warning( default : 4704 )
#endif
Copr. 1995 Zenith Data Systems Corp.
#include "cr.h"
#include "sio.h"
#include "k2.h"
#include "spawn.h"
#include "rparm.h"
#include "hm.h"
#include "sm.h"

#if defined( _MSC_VER   )
#pragma warning( disable : 4704 )
#endif

int SetSCSSaraStatus( int iNewStatus )
{
  REG_W InArgs, OutArgs;

  fil_chr( ( NPSTR )&InArgs, 0, sizeof ( InArgs ) );

  InArgs.ax = iNewStatus;

#if !defined( PROD )
  if ( iNewStatus == SCS_SETBUSY )
    TRACE( "NOTICE: Attempting to set the SCS
busy flag\r" );
  else
    TRACE( "NOTICE: Attempting to set the SCS
idle flag\r" );
#endif

  intn( &InArgs, &OutArgs, SCS_INTNUM );

  return ( OutArgs.ax == SCS_ACCEPTED ?
ERR_SUCCESS .
ERR_INTERNAL );
}

int SetSCSFullRepaint( void )
{
  REG_W InArgs, OutArgs;

  fil_chr( ( NPSTR )&InArgs, 0, sizeof ( InArgs ) );

  InArgs.ax = SCS_FULLREPAINT;

  TRACE( "NOTICE: Requesting full repaint from
SCS\r" );

  intn( &InArgs, &OutArgs, SCS_INTNUM );

  return ( OutArgs.ax == SCS_ACCEPTED ?
ERR_SUCCESS :
ERR_INTERNAL );
}

int SetSCSScrolling( BYTE nScrollStatus )
{
  REG_W InArgs, OutArgs;

  fil_chr( ( NPSTR )&InArgs. 0, sizeof ( InArgs ) );

  InArgs.ax = SCS_SETSCROLLING | nScrollStatus;

#if !defined( PROD )
  if ( nScrollStatus == SCS_DISABLESCROLL )
    TRACE( "NOTICE: Requesting the disabling of
scroll from
SCS\r" );
  else
    TRACE( "NOTICE: Requesting the enabling of
scroll from SCS\r"
);
#endif

  intn( &InArgs, &OutArgs, SCS_INTNUM );

  return ( OutArgs.ax == SCS_ACCEPTED ?
ERR_SUCCESS :
ERR_INTERNAL );
}

int SetSCSOcclude( OCCLUDEUNION *occ, int
iOccType )
{
  REG_W InArgs, OutArgs;

  fil_chr( ( NPSTR )&InArgs, 0, sizeof ( InArgs ) );

  if ( occ != NULL )
  {
    switch ( iOccType )
    {
      case SUI_NOOCCTYPE:
      case SUI_OCCDOSTEXT:
        InArgs.bx = AbsToZero(
occ->occText.yULRow );
        InArgs.cx = AbsToZero( occ->occText.xULCol
);
        InArgs.si = occ->occText.yLRRow;

        InArgs.di = occ->occText.xLRCol;
        break.

      case SUI_OCCDOSGRAPHICS.
        InArgs.bx = AbsToZero(
occ->occDosGraph.xULDos );
        InArgs.cx = AbsToZero(
occ->occDosGraph.yULDos );
        InArgs.si = occ->occDosGraph.xLRDos;
        InArgs.di = occ->occDosGraph.yLRDos;
        break;

      default:
        return ( ERR_INTERNAL );
    }
  }
  else
    TRACE( "NOTICE: Clipping region at zero\r" );

  InArgs.ax = SCS_OCCLUDE2;

  TRACE( "NOTICE: Requesting the establishment
of a clipping
region from SCS\r" );

  intn( &InArgs, &OutArgs, SCS_INTNUM );

  return ( OutArgs.ax == SCS_ACCEPTED ?
ERR_SUCCESS :
ERR_INTERNAL ),
}

int DefineSCSOcclude( OCCLUDEUNION *occ, int
iOccType. BYTE
```

```
fRepaint )
{
 if ( SetSCSSaraStatus( SCS_SETBUSY ) !=
ERR_SUCCESS )
 {
   TRACE( "ERROR: Attempt to secure SCS busy
flag failed\r" );
   return ( ERR_SCSBUSY );
 }

 if ( SetSCSOcclude( occ, iOccType ) !=
ERR_SUCCESS )
 {
   TRACE( "ERROR: Attempt to define SCS
clipping region
failed\r" )
   return ( ERR_SCSOCCFAILED );
 }

 if ( occ == NULL )
 {
   if ( SetSCSScrolling( SCS_ENABLESCROLL ) !=
ERR_SUCCESS )
   {
     TRACE( "ERROR: Attempt to enable scrolling
failed\r" ).
     return ( ERR_SCSSCROLLING );
   }
 }
 else
 {
   if ( SetSCSScrolling( SCS_DISABLESCROLL ) !=
ERR_SUCCESS )
   {
     TRACE( "ERROR: Attempt to disable scrolling
failed\r" );
     return ( ERR_SCSSCROLLING );
   }
 }

 if ( SetSCSSaraStatus( SCS_SETIDLE ) !=
ERR_SUCCESS )
 {
   TRACE( "ERROR: Attempt to secure SCS busy
flag failed\r" ),
   return ( ERR_SCSIDLE );
 }

 if ( fRepaint )
 {
   if ( SetSCSFullRepaint() != ERR_SUCCESS )
   {
     TRACE( "ERROR: Repaint request in SCS
failed\r" );
     return ( ERR_SCSFULLREPAINT );
   }
 }

 TRACE( "NOTICE: Occlusion region definition for
DOS Text or
Graphics was successful\r" );

 return ( ERR_SUCCESS );
}

#if defined( _MSC_VER )
#pragma warning( default 4704 )
#endif

Copr 1995 Zenith Data Systems Corp
#include "cr.h"
#include "sio.h"
#include "k2.h"
#include "spawn.h"
#include "rparm.h"
#include "hm.h"
#include "sm.h"

#if defined( _MSC_VER )
#pragma warning( disable 4704 )
#endif

static int iSLLoadThreadIdx;
static LONG lOldVidVector;


LONG GetOldVidVector( void )
{
 return ( lOldVidVector );
}

APIFUNCRET SLDefineOldVidVector( struct REGW
*CallerRegs )
{
 TRAPREC *tr = GetVIDTrapRec();

 lOldVidVector = MAKELONG( CallerRegs->bx,
CallerRegs->dx ),

 PCB_BEGINCRITICAL;

 tr->tr_old_int = lOldVidVector;

 PCB_ENDCRITICAL;
}

APIFUNCRET SLEnableKbd( struct REGW
*CallerRegs )
{
 EnableKbdAfterBoot();
}

APIFUNCRET SLGetFrameType( struct REGW
*CallerRegs )
{
 CallerRegs->ax = ( WORD
)UIConfigData.nFrameType;

 SetForegroundRegs( CallerRegs );
}

APIFUNCRET SLGetMLIDStatus( struct REGW
*CallerRegs )
{
 CallerRegs->ax = GetPRXActiveStatus();

 SetForegroundRegs( CallerRegs ):
}

APIFUNCRET SLLoadSUI( struct REGW
*CallerRegs )
{
 if ( ( iSLLoadThreadIdx = GetTempEventNum() ) <
0 )
   return;

 AddThread( iSLLoadThreadIdx, ( NEARPROC
)CBExecLoadSUI, NULL.
SMD_ONETIME, FALSE,
         SMI_SLPOLLFREQ, 0 ).
}

void CBExecLoadSUI( void )
{
 DelThread( iSLLoadThreadIdx );

 InitSaratoga( SBS_SUILOADING );

 if ( GetEEPROMInited() )
 {
   TRACE( "NOTICE: Beginning pen calibration due
to EEPROM
initialization\r" );
   LoadSUI( SUI_DOPENCALIBRATION,
SUI_NOSCREEN );
 }
 else
 {
   if ( !isNodeAddressBlank(
UIConfigData.szLastNodeAddress ) &&

       GetSystemResumeBit() )
     LoadSUI( SUI_LASTCONNECTION,
SUI_NOSCREEN );
   else
     LoadSUI( SUI_SPECIFIEDSCREEN,
SUI_HOSTSELECTION );
 }

 ClearSystemResumeBit();
}

#if defined( _MSC_VER )
#pragma warning( default : 4704 )
#endif
Copr. 1995 Zenith Data Systems Corp.
#include "cr.h"
#include "spawn.h"
#include "k2.h"
#include "sio.h"
#include "sm.h"



int SortList(int wTotalEntries, int wEntrySize. int
wPrimeOffset,
         int wSecondOffset,  char *cpEntryBuff)
{
 int wInnerLoop;
 int wOutLoop;
 int wInnerOffset;
 int wOutOffset.
 int wResult;

 if( (wTotalEntries <= 0) || (wEntrySize <= 0) ||
(wPrimeOffset
== wSecondOffset)
   || (wPrimeOffset >= wEntrySize) ||
(wSecondOffset >=
wEntrySize)
   || (wPrimeOffset < 0 ) || (wSecondOffset < 0) )
  return(ERR_INVALIDPARM);

 wOutOffset = 0;
 for(wOutLoop = 0; wOutLoop < (wTotalEntries - 1);
wOutLoop++)
 {
   wInnerOffset = wOutOffset + wEntrySize;
   for(wInnerLoop = (wOutLoop + 1); wInnerLoop <
wTotalEntries;
wInnerLoop++)
   {

wResult=stricmp(cpEntryBuff+wOutOffset+wPrimeOff
set,
cpEntryBuff+wInnerOffset+wPrimeOffset);
     if(wResult > 0)
      SwapEntries(cpEntryBuff+wOutOffset,
cpEntryBuff+wInnerOffset, wEntrySize);
     if(wResult == 0)
     {

wResult=stricmp(cpEntryBuff+wOutOffset+wSecond
Offset.
cpEntryBuff+wInnerOffset+wSecondOffset):
      if(wResult > 0)
        SwapEntries(cpEntryBuff+wOutOffset.
cpEntryBuff+wInnerOffset, wEntrySize):
     }
     wInnerOffset = wInnerOffset + wEntrySize;
   }
   wOutOffset = wOutOffset + wEntrySize.
 }
 return(ERR_SUCCESS);
}

int SwapEntries(char *cpEntry1, char *cpEntry2, int
wEntrySize)
{
 char cSwapBuff[SRT_MAXLENSWAPBUFF];
 int  wRestSize;
 int  wCopyUnit;

  if( wEntrySize <= 0 )
  return(ERR_INVALIDPARM);

 wRestSize = wEntrySize;
 do
 {
   if(wRestSize >= SRT_MAXLENSWAPBUFF)
    wCopyUnit = SRT_MAXLENSWAPBUFF,
   else
    wCopyUnit = wRestSize,
   mem_cp(cpEntry1+(wEntrySize-wRestSize),
cSwapBuff,
wCopyUnit);
   mem_cp(cpEntry2+(wEntrySize-wRestSize),
cpEntry1+(wEntrySize-wRestSize), wCopyUnit);
   mem_cp(cSwapBuff,
cpEntry2+(wEntrySize-wRestSize),
wCopyUnit);
   wRestSize -= SRT_MAXLENSWAPBUFF.
 } while (wRestSize > 0).

 return(ERR_SUCCESS);
}

long GetEntryOffset(int wTotalEntries, int
wEntrySize, int
wKeyOffset,
              int wKeyNumber, char *cpEntryBuff)
{
 int wLoop;
 int wKeyCount;
 int wOffset;

  if( (wTotalEntries <= 0) || (wEntrySize <= 0) ||
(wKeyNumber
<= 0)
   || (wKeyOffset >= wEntrySize) || (wKeyOffset < 0
)
   || (wKeyNumber > wTotalEntries) )
  return((long)ERR_INVALIDPARM);

 wKeyCount=1;
 wOffset=0;

 if(wKeyCount == wKeyNumber)
  return(0L);

 for(wLoop = 1; wLoop < wTotalEntries; wLoop++)
 {
  if( (stricmp(cpEntryBuff+wOffset+wKeyOffset,
cpEntryBuff+wOffset+wEntrySize+wKeyOffset)) != 0)
     wKeyCount++;
   wOffset = wOffset + wEntrySize;
   if(wKeyCount == wKeyNumber)
     return((long)wOffset);
 }

 return((long)ERR_INVALIDPARM);
}
Copr. 1995 Zenith Data Systems Corp.


#include "cr.h"
#include "sio.h"
#include "spawn.h"
#include "k2.h"
#include "sm.h"

#if defined( _MSC_VER )
#pragma warning( disable : 4704 )
#endif

static TRAPREC        SUIMouseTrapRec;
static CALLREC        SUICallRec;
static SUICB        lpfnTempProc;
static SUIACTIONCODE   ActionCode = 0;
static DWORD          dwOldSUIIntVec;
static int          iTempThreadIdx;
static int          iPrepSUIThreadIdx;
static int          iUnloadSUIThreadIdx;
static int          iCleanupSUIThreadIdx:
static WORD           pJmpBuff[ 5 ];
static BOOL          fVideoBlocked = FALSE,
static char         nSUIStatus =
SMI_SUINOTLOADED;
static BYTE          nResidentStatus;
static WORD           wSUIPSP;
static WORD           wSavedSP;
static WORD           wSavedBP;
static CURRHOSTNAME    CurrHostName;

static APIFUNC aAPIFuncTable[] =
{
 { SMI_SETCONTRAST, GetSetContrast },
 { SMI_SETBRIGHTNESS, GetSetBrightness },
 { SMI_CALIBUPLEFT, CalibratePen },
 { SMI_CALIBCANCEL, CalibrateCancel },
 { SMI_SETAUTOSHUTOFF, GetSetAutoShutOff },
 { SMI_SETSLEEPTIME, GetSetSleepTime },
 { SMI_REBOOTHOST, RebootHost },
 { SMI_ACTIVEUPDATE, RequestActiveUpdate },

 { SMI_DOUPDATE, DoUpdate },
 { SMI_UPDATEHOSTLIST, UpdateHostList },
 { SMI_GETHOSTLISTSTAT, GetHostListStatus }.
 { SMI_GETCONNECTSTAT, GetConnectStatus },
 { SMI_REQUESTCONNECT, RequestConnDisco },
 { SMI_GETPASSWORDSTAT, GetPasswordStatus
},
 { SMI_LBSETNETGROUP, LBGetSetNetGroup },
 { SMI_LBSETNETHOST. LBGetSetNetHost },
 { SMI_LBSETNETFRAMETYPE.
LBGetSetNetFrameType },
 { SMI_SETCONNECTTYPE, GetSetConnectType
},
 { SMI_SETPASSWORD, GetSetPassword },
 { SMI_UPDATEDIMLOC, UpdateDimenLoc },
 { SMI_REQUESTUNLOAD, RequestUnload },
 { SMI_SETMSGBOXRETCODE,
SetSUIMBRetCode },
 { SMI_SETUILANGUAGE, GetSetUILanguage },
 { SMI_SETACTIVESTAT, SetActiveStatus },
 { SMI_SETKEYSTROKE, SetKeyStroke },
 { SMI_GETKEYBOARDSTAT, GetKeyBoardStatus
},
 { SMI_GETABOUTDIALOG, GetAboutDialog },
 { SMI_SETUDHOTICON, GetSetUDHoticon },
 { SMI_SETSECURITYID, GetSetSecurityID },
 { SMI_SETDOMAINID, GetSetDomainID },
 { SMI_SETLOCKKBDMOUSE,
GetSetLockKbdMouse },
 { SMI_SETDIMSCREEN, GetSetDimScreen },
 { SMI_SETVIDEOBLOCK, BlockUnblockVideo },
 { SMI_NOTIFYSCRCODE, NotifyScreenCode },
 { 0, 0 }
};

APIFUNC *GetSUIFuncTable( void )
{
 return ( aAPIFuncTable );
}

CALLREC FAR *GetSUICallRec( void )
{
 return ( ( CALLREC FAR *)&SUICallRec );
}

TRAPREC *GetSUIMouseTrapRec( void )
{
 SUIMouseTrapRec.tr_int = PND_INTNUM;
 SUIMouseTrapRec.tr_asm_srv =
CRU_REFLECTINT:
```

```
  return ( &SUIMouseTrapRec );
}

int GetCurrActionCode( void )
{
  return ( ActionCode );
}

WORD GetCurrScrCode( void )
{
  return ( wScreenCode );
}

void SetCurrScrCode( WORD wNewScreenCode )
{
  wScreenCode = wNewScreenCode;
}

char GetSUIStatus( void )
{
  return ( nSUIStatus );
}

void InitSUICallRec( void )
{
  DWORD dwCallService = ( DWORD )( FARPROC
)SUICallService;
  fil_chr( ( NPSTR )&SUICallRec, 0, sizeof(
CALLREC ) );

  SUICallRec.cFarCallOpCode =
SMD_CALLOPCODE;
  SUICallRec.aCallBack[0] = LOBYTE( LOWORD(
dwCallService ) );
  SUICallRec.aCallBack[1] = HIBYTE( LOWORD(
dwCallService ) );
  SUICallRec.aCallBack[2] = LOBYTE( HIWORD(
dwCallService ) );
  SUICallRec.aCallBack[3] = HIBYTE( HIWORD(
dwCallService ) );
  SUICallRec.cFarRetOpCode =
SMD_RETOPCODE;
  strcpy( SUICallRec.szSMAfterSignature,
SIG_SMSIGNATURE );

  dwOldSUIIntVec = set_int_vec( SMI_SUIINTNUM,
( DWORD )( (
FARPROC )&SUICallRec ) );
}

void RestoreOldSUIIntVec( void )
{
  set_int_vec( SMI_SUIINTNUM, dwOldSUIIntVec );
}

BOOL GetSUIReady( void )
{
  return ( lpfnSUICallBack != ( SUICB )NULL &&
nSUIStatus ==
SMI_SUILOADED );
}

APIFUNCRET SetActiveStatus( struct REGW
*CallerRegs )
{
  PCB_BEGINCRITICAL;
  lpfnSUICallBack = ( SUICB )MK_FP(
CallerRegs->dx,
CallerRegs->si );
  PCB_ENDCRITICAL;

  wSUIPSP = get_cur_psp();

  CallerRegs->ax = SUI_PARTIALDIALOGSET;
  SetForegroundRegs( CallerRegs );

  nSUIStatus = SMI_SUILOADED;
}

APIFUNCRET RequestUnload( struct REGW
*CallerRegs )
{
  if ( !GetRequestHostList() &&
       GetConnectRequested() ==
SCS_NOCONNECTREQUESTED &&
       GetSCSCallProgress() ==
SMI_SCSCONNECTED )
  {
    CallerRegs->ax = SMI_UNLOADACCEPTED;
    UnloadSUI( SUI_NOUNLOADSUI );
  }
  else
    CallerRegs->ax = SMI_UNLOADDENIED;

  SetForegroundRegs( CallerRegs );
}

APIFUNCRET RequestConnDisco( struct REGW
*CallerRegs )
{
  if ( GetConnectRequested() )
    CallerRegs->ax = ERR_SUCCESS;
  else
  {
    if ( IsGetFunction( CallerRegs ) )
    {
      if ( GetSCSCallProgress() ==
SMI_SCSCONNECTED )
        CallerRegs->ax = DiscoDisableConnection();
      else
        CallerRegs->ax = ( WORD )ERR_INTERNAL;
    }
    else
    {
      if ( GetLBCurrHost() ==
HLD_NOHOSTSELECTED )
      {
        OpenMessageBox(
STR_SUINOHOSTSELECTED, 0,
SUI_CENTERJUSTIFIED, SUI_OK );
        CallerRegs->ax = ( WORD )ERR_INTERNAL;
      }
      else
        CallerRegs->ax = MakeTheConnection( TRUE,
FALSE );
    }
  }

  SetForegroundRegs( CallerRegs );
}

APIFUNCRET GetConnectStatus( struct REGW
*CallerRegs )
{
  char *szHostName;
  int iCallProgress;
  int iProtocolId;
  int iReturn;


  if ( !GetSCSActiveStatus() )
  {
    iReturn = ERR_NOTSUPPORTED;
    goto exit;
  }

  iProtocolId = GetSCSProtocolId();
  iCallProgress = GetSCSCallProgress();

  fil_chr( &CurrHostName, 0, sizeof (
CURRHOSTNAME ) );
  CurrHostName.lpszHostName = szNullStr;

  BuffHead.iStructLen = sizeof ( CURRHOSTNAME
);
  BuffHead.iBuffLen = sizeof ( CURRHOSTNAME );
  BuffHead.Buff = ( LPVOID )&CurrHostName;

  CallerRegs->dx = SEG( &BuffHead );
  CallerRegs->si = OFF( &BuffHead );

  switch ( iCallProgress )
  {
    case SMI_SCSCONNECTED:
      iReturn = SMI_CONNECTED;

      if ( ( szHostName = GetCurrHostName() ) !=
NULL )
        CurrHostName.lpszHostName = ( LPSTR
)szHostName;
      break;

    case SMI_SCSWAITINGFORCONNECT:
      iReturn = SMI_CONNECTED;
      break;

    case SMI_SCSDIALING:
      iReturn = SMI_CONNECTED;
      break;

    case SMI_SCSLOGGINGIN:
      iReturn = SMI_LOGGINGIN;
      break;

    case SMI_SCSDISCONNECTED:
      iReturn = SMI_DISCONNECTED;
      break;

    default:
      iReturn = ERR_INTERNAL;
      break;
  }

  CallerRegs->ax = iReturn;

  switch ( iProtocolId )
  {
    case SMI_SCSNETWARESPX:
      iReturn = SMI_NETWARESPX;
      break;

    case SMI_SCSASYNC:
      iReturn = SMI_MODEM;
      break;

    default:
      iReturn = ERR_INTERNAL;
      break;
  }

exit:
  CallerRegs->bx = iReturn;
  SetForegroundRegs( CallerRegs );
}

APIFUNCRET BlockUnblockVideo( struct REGW
*CallerRegs )
{
  PCB_BEGINCRITICAL;
  fVideoBlocked = !IsGetFunction( CallerRegs );
  PCB_ENDCRITICAL;

  CallerRegs->ax = BlockSCOSVideo( ( BYTE
)fVideoBlocked );

  SetForegroundRegs( CallerRegs );
}

BOOL GetVideoBlocked( void )
{
  return ( fVideoBlocked );
}


int LoadSUI( SUIACTIONCODE NewActionCode,
WORD wNewScreenCode )
{
  WORD wCurrVidMode;
  BYTE nCurrHostMode;

  if ( NewActionCode == SUI_LASTOSKSCREEN )
  {
    if ( IsNoScreen( UIConfigData.nLastOSKScreen )
)
      wNewScreenCode = SUI_BIGALPHA;
    else
      wNewScreenCode =
UIConfigData.nLastOSKScreen;
  }
  else if ( NewActionCode ==
SUI_LASTSETUPDLGSCREEN )
  {
    if ( IsNoScreen(
UIConfigData.nLastSetupDlgScreen ) )
      wNewScreenCode = SUI_HOSTSELECTION;
    else
      wNewScreenCode =
UIConfigData.nLastSetupDlgScreen;
  }

  if ( ( IsSetupDlg( wScreenCode ) && IsSetupDlg(
wNewScreenCode
) ) ||
       ( IsOSK( wScreenCode ) && IsOSK(
wNewScreenCode ) ) )
    return ( ERR_INTERNAL );
  else if ( IsSetupDlg( wScreenCode ) && IsOSK(
wNewScreenCode )
)
    return ( ERR_INTERNAL );

  ActionCode = NewActionCode;

  if ( nSUIStatus == SMI_SUINOTLOADED )
    nSUIStatus = SMI_SUILOADING;

  if ( GetSUIReady() )
    wOldScreenCode = wScreenCode;

  if ( ( iPrepSUIThreadIdx = GetTempEventNum() )
== ERR_INTERNAL
)
    return ( ERR_INTERNAL );

  AddThread( iPrepSUIThreadIdx, WaitForPrepSUI,
NULL, SMD_POLLED,
FALSE,
          SUI_LOADSUIPOLLFREQ, 0 );

  wScreenCode = wNewScreenCode;

  if ( IsOSK( wScreenCode ) )
  {
    wCurrVidMode = GetCurrVidMode();
    nCurrHostMode = GetCurrHostMode();

    if ( !IsOSKVideoSupported( wCurrVidMode ) &&
nCurrHostMode ==
PND_DOSAPP )
      wScreenCode |=
SUI_OSKASSETUPDIALOGMASK;

    if ( wCurrVidMode != SUI_TEXTVIDMODE &&
nCurrHostMode !=
PND_DOSAPP )
      wScreenCode |=
SUI_OSKINWINGRAPHICSMASK;
  }

  return ( ERR_SUCCESS );
}


void WaitForPrepSUI( void )
{
  static PREPSUISTATES iStatePrepSUI =
SUI_NOPREPSTATE;
  int iCheck;

  switch ( iStatePrepSUI )
  {
    case SUI_NOPREPSTATE:
      if ( IsSetupDlg( wScreenCode ) || IsNoScreen(
wScreenCode )
)
      {

        TRACE( "NOTICE: Setup Dialogs or No
Screen'
requested.\r" );

        SetMonitor( FALSE, TRUE );
        iStatePrepSUI = SUI_CHECKMONITOROFF;


      }
      else if ( IsOSKAsSetupDlg( wScreenCode ) )
      {
        TRACE( "NOTICE: OSK as Setup Dialog
requested.\r" );
        SetMonitor( FALSE, FALSE );
        iStatePrepSUI = SUI_CHECKMONITOROFF;


      }
      else
      {
        TRACE( "NOTICE: DOS or Windows OSK
requested, nothing
else to do!\r" );
        iStatePrepSUI = SUI_PREPSUCCESS;
      }
      break;

    case SUI_CHECKMONITOROFF:
      iCheck = CheckMonitor();

      if ( iCheck == ERR_SUCCESS )
      {
        if ( IsOSKAsSetupDlg( wOldScreenCode ) )
        {
          TRACE( "NOTICE: Monitor off complete, old
screen - OSK
as setup dialog\r" );
          iStatePrepSUI = SUI_PREPSUCCESS;
        }
        else if ( IsOSK( wOldScreenCode ) )
        {
          TRACE( "NOTICE: Monitor off complete, old
screen -
OSK\r" );
          RequestFullRepaint( FALSE,
wOldScreenCode );
          iStatePrepSUI = SUI_CHECKFULLREPAINT;
        }
        else
        {
          TRACE( "NOTICE: Monitor off complete, no
old screen\r"
);
          iStatePrepSUI = SUI_PREPSUCCESS;
        }
      }
      else if ( iCheck == ERR_INTERNAL )
        iStatePrepSUI = SUI_PREPERROR;
      break;

    case SUI_CHECKFULLREPAINT:
      iCheck = CheckFullRepaint();

      if ( iCheck == ERR_SUCCESS )
      {
```

```
      TRACE( "NOTICE: Occlusion region in SCOS
closed through
Full Repaint\r" )
      iStatePrepSUI = SUI_PREPSUCCESS:
    }
    else if ( iCheck == ERR_INTERNAL )
    {
      TRACE( "ERROR. Closure of occlusion region
failed in SCOS
through Full Repaint\r" );
      iStatePrepSUI = SUI_PREPERROR;
    }
    break;

   case SUI_PREPSUCCESS:
    TRACE( "NOTICE: We're here, we're here!\r" );

    InitSUI(),
    SMDosBusy( CBExecSUI ),
    goto exit,

   case SUI_PREPERROR:
    TRACE( "ERROR: SUI Load Prep failed\r" );

    if ( nSUIStatus == SMI_SUILOADING )
     nSUIStatus = SMI_SUINOTLOADED:
    else
     nSUIStatus = SMI_SUIINACTIVE.

   default:
exit
    iStatePrepSUI = SUI_NOPREPSTATE.
    DelThread( iPrepSUIThreadIdx ),
    break;
 }
}

void CBExecSUI( void )
{
 int iVideoMode = GetCurrVidMode();

 if ( GetSCSCallProgress() ==
SMI_SCSCONNECTED )
 {
  if ( IsSetupDlg( wScreenCode ) || IsNoScreen(
wScreenCode ) )

  {
   if ( iVideoMode != SUI_INITIALVIDMODE )
    SetVideoMode( SUI_INITIALVIDMODE );
  }
  else
  {
   if ( !IsOSKVideoSupported( iVideoMode ) &&
GetCurrHostMode() == PND_DOSAPP )
   {
    SetVideoMode( SUI_INITIALVIDMODE );
   }
  }
 }
 else
  SetVideoMode( SUI_INITIALVIDMODE );

 if ( nSUIStatus == SMI_SUILOADING )
 {
  if ( !at_dos_prompt() )
  {
   _and_isr_flg( ~SMD_SCHEDULERS );

   if ( JimExec( szSUIExecName, NULL ) !=
ERR_SUCCESS )
   {
    SetVideoMode( SUI_TEXTVIDMODE );
    dspf( STR_SUILOADERROR1 );
   }
   else
   {
    if ( ( iTempThreadIdx = GetTempEventNum() )
< 0 )
      return:

    AddThread( iTempThreadIdx,
WaitForSUILoad, NULL,
SMD_POLLED, FALSE.
          SUI_LOADSUIPOLLFREQ,
SUI_LOADSUIMAXRETRY );
   }
  }
  else
  {
   SetVideoMode( SUI_TEXTVIDMODE );
   dspf( STR_SUILOADERROR2 ):
  }
 }
 else
 {
  nSUIStatus = SMI_SUILOADED;
  SMDosBusy( CBExecLoadScreen ),
 }
}

void WaitForSUILoad( void )
{
 if ( GetSUIReady() )
 {
  DelThread( iTempThreadIdx );
  iTempThreadIdx = SMD_NOACTIVETHREAD;

  SMDosBusy( CBExecLoadScreen );
 }
}

void CBExecLoadScreen( void )
{
 if ( !GetSUIReady() )
  return;

 switch ( ActionCode )
 {
  case SUI_DOPENCALIBRATION:
   SetSetupDlgMode( PND_SETUPDLGON ).
   DoMessageBox( NULL,
SUI_PENCALIBRATION, SUI_LEFTJUSTIFIED,
SUI_CANCEL,
          CBMsgBoxButtonPressed, 0 );
   break.

  case SUI_LASTCONNECTION.
   SetSetupDlgMode( PND_SETUPDLGON ),
   ResumeTheConnection();
   break;

  case SUI_BADVIDEOMSG:
   SetSetupDlgMode( PND_SETUPDLGON ).
   DoMessageBox( STR_SUIBADVIDEOMSG, 0,
SUI_CENTERJUSTIFIED,
SUI_OK,
          CBMsgBoxButtonPressed, 0 );
   break;

  default:
   if ( IsSetupDlg( wOldScreenCode ) )
    SetSetupDlgMode( PND_SETUPDLGOFF );
   else if ( IsOSK( wOldScreenCode ) &&
!IsOSKAsSetupDlg(
wOldScreenCode ) )
    SetOSKMode( NULL, SUI_NOOCCTYPE ),

   if ( IsSetupDlg( wScreenCode ) ||
IsOSKAsSetupDlg(
wScreenCode ) )
    SetSetupDlgMode( PND_SETUPDLGON );
   DoLoadScreen();
   break;
 }
}

void DoLoadScreen( void )
{
 int iNewScreenCode = LOBYTE( wScreenCode ),
 int iOSKConfig,
 int xPosOSK, yPosOSK;

 if ( IsSetupDlg( wScreenCode ) || IsNoScreen(
wScreenCode ) )
 {
  iOSKConfig = UIConfigData.nLastOSKDlgScreen,
  xPosOSK = 0;
  yPosOSK = 0.
 }
 else
 {
  iOSKConfig = 0;
  xPosOSK = UIConfigData.xPosLastOSKScreen;
  yPosOSK = UIConfigData.yPosLastOSKScreen;
 }

 if ( !IsNoScreen( wScreenCode ) )
 {
  EnableBusyCursor( SUI_BUSYCURSOROFF );


  PCB_BEGINCRITICAL
  AX( SUI_DISPLAYDIALOG );
  ?) ( iNewScreenCode );
  CX( iOSKConfig );
  SI( yPosOSK );
  DI( xPosOSK );

  ( *lpfnSUICallBack )(),
  PCB_ENDCRITICAL
 }
}

int UnloadSUI( BYTE nNewResidentStatus )
{
 if ( !GetSUIReady() )
  return ( ERR_INTERNAL );

  SetWaitingIcon( SBS_WAITINGICONON, TRUE );


 if ( nNewResidentStatus == SUI_UNLOADSUI )
  nSUIStatus = SMI_SUIUNLOADING;
 else
  nSUIStatus = SMI_SUIDEACTIVATING;

 nResidentStatus = nNewResidentStatus;

 if ( IsNoScreen( wScreenCode ) )
  HideMessageBox();

 if ( ( iUnloadSUIThreadIdx = GetTempEventNum()
) < 0 )
  return ( ERR_INTERNAL );

 AddThread( iUnloadSUIThreadIdx,
WaitForUnloadSUI, NULL,
SMD_POLLED, FALSE,
       SUI_UNLOADSUIPOLLFREQ, 0 );

 if ( GetThreadAddress( SCS_DISCOEVENTNUM )
== NULL )
  AddThread( SCS_DISCOEVENTNUM,
WaitForStatusChange, NULL,
        SMD_POLLED, FALSE.
SCS_DISCOPOLLFREQ, 0 );

 return ( ERR_SUCCESS );
}

void WaitForUnloadSUI( void )
{
 static UNLOADSUISTATES iStateUnloadSUI =
SUI_NOUNLOADSUISTATE;

 switch ( iStateUnloadSUI )
 {
  case SUI_NOUNLOADSUISTATE:
   if ( !IsOSK( wScreenCode ) )
   {
    SetEEUIData();
    iStateUnloadSUI = SUI_GETACTIVEUPDATE;
   }
   else
    iStateUnloadSUI =
SUI_UNLOADSUISUCCESS;
   break;

  case SUI_GETACTIVEUPDATE.
   GetActiveUpdate();
   SetTimeLimit( iUnloadSUIThreadIdx,
SUI_PRIMSGPOLLFREQ );
   iStateUnloadSUI = SUI_DIMSCREEN;
   break;

  case SUI_DIMSCREEN:
   TRACE( "NOTICE: In the SUI_DIMSCREEN
state.\r" );
   SendDimScreen( UIConfigData.bDimScreen );
   SetTimeLimit( iUnloadSUIThreadIdx,
SUI_PRIMSGPOLLFREQ );
   iStateUnloadSUI = SUI_LOCKKBDMOUSE;

   break;

  case SUI_LOCKKBDMOUSE.
   TRACE( "NOTICE: In the
SUI_LOCKKBDMOUSE state.\r" );
   SendLockKbdMouse(
UIConfigData.bLockKbdMouse );
   SetTimeLimit( iUnloadSUIThreadIdx,
SUI_LOADSUIPOLLFREQ );
   iStateUnloadSUI =
SUI_UNLOADSUISUCCESS;
   break;

  case SUI_UNLOADSUISUCCESS:
  default:
   DelThread( iUnloadSUIThreadIdx );
   SMDosBusy( CBExecUnloadSUI );
   iStateUnloadSUI = SUI_NOCLEANUPSTATE;
   break;
 }
}

void CBExecUnloadSUI( void )
{
 lpfnTempProc = lpfnSUICallBack;

 if ( IsSetupDlg( wScreenCode ) || IsNoScreen(
wScreenCode ) ||
     IsOSKAsSetupDlg( wScreenCode ) )
  SetSetupDlgMode( PND_SETUPDLGOFF );
 else if ( IsOSK( wScreenCode ) )
  SetOSKMode( NULL, SUI_NOOCCTYPE ).

 if ( nResidentStatus == SUI_UNLOADSUI )
  lpfnSUICallBack = NULL;

 PSP_TERMINATE( wSUIPSP ) = ( LONG )(
FARPROC
)SUITerminateAddress;

 _asm
 {
  cli

  mov wSavedSP, sp
  mov wSavedBP, bp
  mov ax, SUI_CLOSEDIALOG
  xor bx,bx
  mov bl, nResidentStatus

  sti
 };

 ( *lpfnTempProc )( );

 if ( nResidentStatus == SUI_NOUNLOADSUI )
  CleanupUnloadSUI();

}

void SUITerminateAddress( void )
{
 _asm
 {
  mov ds, cs:000Ah
  mov ss, cs:000Ah
  mov sp, wSavedSP
  mov bp, wSavedBP
 };

 CleanupUnloadSUI();
}

void CleanupUnloadSUI( void )
{
 MREG MInArgs:

 if ( nResidentStatus == SUI_UNLOADSUI )
 {
  if ( !GetPNDActiveStatus() )
  {
   MInArgs = MEventOutArgs;
   MInArgs.ax = 0x000C;
   mouse( &MInArgs, &MEventOutArgs );
  }
 }

 AddThread( SUI_CLEANUPEVENTNUM,
WaitForCleanupSUI, NULL,
SMD_POLLED, FALSE,
       SUI_LOADSUIPOLLFREQ, 0 );
}

void WaitForCleanupSUI( void )
{
 static CLEANUPSUISTATES iStateCleanupSUI =
SUI_NOCLEANUPSTATE;
 int iCheck;

 switch ( iStateCleanupSUI )
 {
  case SUI_NOCLEANUPSTATE.
   if ( IsSetupDlg( wScreenCode ) || IsNoScreen(
wScreenCode )
||
       IsOSKAsSetupDlg( wScreenCode ) )
   {
    TRACE( "NOTICE: Unload of Setup Dialogs or
OSK-As-Setup-Dialog identified.\r" );
    SetMonitor( TRUE, FALSE );
    iStateCleanupSUI =
SUI_CHECKMONITORON;
   }
   else if ( IsOSKVidChange( wScreenCode ) )

   {
    TRACE( "NOTICE: Unload of OSK due to vid
change from DOS
or Windows identified.\r" );
    RequestFullRepaint( FALSE, wScreenCode );

    iStateCleanupSUI =
SUI_CHECKFULLPAINTCLEANUP;
   }
   else
   {
    TRACE( "NOTICE: Manual unload of OSK
from DOS or Windows
identified.\r" );
    RequestFullRepaint( TRUE, wScreenCode );
```

```
      iStateCleanupSUI =
SUI_CHECKFULLPAINTCLEANUP;
    }
    break;

   case SUI_CHECKMONITORON:
    iCheck = CheckMonitor();

    If ( iCheck == ERR_SUCCESS )
    {
     TRACE( "NOTICE: CoSession monitor on
mode successful.\r"
);
      iStateCleanupSUI =
SUI_CLEANUPSUCCESS;
    }
    else if ( iCheck == ERR_INTERNAL )
    {
     TRACE( "NOTICE: CoSession monitor on
mode failed.\r" );
      iStateCleanupSUI = SUI_CLEANUPERROR;
    }
    break;

   case SUI_CHECKFULLPAINTCLEANUP:
    iCheck = CheckFullRepaint()

    if ( iCheck == ERR_SUCCESS )
    {
     if ( IsOSKVidChange( wScreenCode ) )

     {
      if ( IsOSKWinGraphics( wScreenCode ) )

      {
       TRACE( "NOTICE: Full Repaint successful
for vid
change in SRWIN for Windows OSK\r" );
        iStateCleanupSUI =
SUI_CLEANUPSUCCESS;
      }
      else
      {
       TRACE( "NOTICE: Full Repaint successful
for vid
change in DOS or DOS Graphics OSK\r" );
        SetMonitor( TRUE, FALSE );
        iStateCleanupSUI =
SUI_CHECKMONITORON.
      }
     }
     else
     {
#if !defined( PROD )
      if ( IsOSKWinGraphics( wScreenCode ) )

      {
       TRACE( "NOTICE: Full Repaint successful
for Windows
OSK\r" );
      }
      else
      {
       TRACE( "NOTICE: Repaint successful for
DOS or DOS
Graphics OSK\r" )
      }
#endif
      iStateCleanupSUI =
SUI_CLEANUPSUCCESS.
     }
    }
    else if ( iCheck == ERR_INTERNAL )
    {
     TRACE( "NOTICE: Full Repaint failed for OSK
of unknown
type\r" );
     iStateCleanupSUI = SUI_CLEANUPERROR;
    }
    break;

   case SUI_CLEANUPSUCCESS:
    TRACE( "NOTICE: SUI cleanup successful\r" );

   case SUI_CLEANUPERROR:
   default:
    if ( nResidentStatus == SUI_UNLOADSUI )
     nSUIStatus = SMI_SUINOTLOADED;
    else
     nSUIStatus = SMI_SUIINACTIVE;

    fil_chr( szPassword. 0, sizeof ( szPassword ) );

    wScreenCode = wOldScreenCode =
SUI_NOSCREEN:
    iStateCleanupSUI = SUI_NOCLEANUPSTATE;
    DelThread( SUI_CLEANUPEVENTNUM );
    SetWaitingIcon( SBS_WAITINGICONOFF.
TRUE );
     break;
  }
}

#if defined( _MSC_VER )
#pragma warning( default : 4704 )
#endif
Copr. 1995 Zenith Data Systems Corp.
#include "cr.h"
#include "sio.h"
#include "spawn.h"
#include "k2.h"
#include "lm.h"
#include "sm.h"

#if defined( _MSC_VER )
#pragma warning( disable : 4704 )
#e i 'if

static BYTE fSecurityWarning = FALSE;
static BYTE fDomainWarning = FALSE;
static BYTE nMsgBoxReturnCode = 0;
static int iProcMsgBoxThreadIdx = -1;

void SetDomainWarning( BYTE
fNewDomainWarning )
{
 fDomainWarning = fNewDomainWarning;
}

void SetSecurityWarning( BYTE
fNewSecurityWarning )
{
 fSecurityWarning = fNewSecurityWarning;
}

void SetMsgBoxReturnCode( BYTE
nNewReturnCode )
{
 PCB_BEGINCRITICAL;
 nMsgBoxReturnCode = nNewReturnCode
 PCB_ENDCRITICAL;
}

BYTE GetMsgBoxReturnCode( void )
{
 BYTE nReturnCode = nMsgBoxReturnCode;

 nMsgBoxReturnCode = 0;

 return ( nReturnCode );
}

APIFUNCRET SetSUIMBRetCode( struct REGW
*CallerRegs )
{
 Se.MsgBoxReturnCode( LOBYTE( CallerRegs->bx
) ).

 CallerRegs->ax = ERR_SUCCESS:

 SetForegroundRegs( CallerRegs );
}

APIFUNCRET SetKeyStroke( struct REGW
*CallerRegs )
{
 BYTE nHIScanByte,

 if ( ( nHIScanByte = HIBYTE( CallerRegs->bx ) ) >
0 )
  SendScanCode( nHIScanByte ),

 SendScanCode( LOBYTE( CallerRegs->bx ) );

 CallerRegs->ax = ERR_SUCCESS;

 SetForegroundRegs( CallerRegs );
}

APIFUNCRET GetSetLockKbdMouse( struct REGW
*CallerRegs )
{
 BOOL bLockKbdMouse;

 if ( IsGetFunction( CallerRegs ) )
  CallerRegs->ax = UIConfigData.bLockKbdMouse
?
SMI_ENABLEDLOCKKBDMOUSE :
             SMI_DISABLEDLOCKKBDMOUSE;
 else
 {
  bLockKbdMouse = ( CallerRegs->bx == ( WORD
)SMI_ENABLEDLOCKKBDMOUSE );
  CallerRegs->ax = ERR_SUCCESS.

  if ( GetSCSCallProgress() ==
SMI_SCSCONNECTED )
  {
   if ( SendLockKbdMouse( bLockKbdMouse ) ==
ERR_SUCCESS )
     UIConfigData.bLockKbdMouse =
bLockKbdMouse;
    else
     CallerRegs->ax = ( WORD )ERR_INTERNAL,
  }
  else
   UIConfigData.bLockKbdMouse =
bLockKbdMouse,
 }

 SetForegroundRegs( CallerRegs );
}

APIFUNCRET GetSetDimScreen( struct REGW
*CallerRegs )
{

 BOOL bDimScreen,

 if ( IsGetFunction( CallerRegs ) )
  CallerRegs->ax = UIConfigData.bDimScreen ?
SMI_ENABLEDDIMSCREEN .
             SMI_DISABLEDDIMSCREEN;
 else
 {
  bDimScreen = ( CallerRegs->bx == ( WORD
)SMI_ENABLEDDIMSCREEN
);
  CallerRegs->ax = ERR_SUCCESS.

  if ( GetSCSCallProgress() ==
SMI_SCSCONNECTED )
  {
   if ( SendDimScreen( bDimScreen ) ==
ERR_SUCCESS )
     UIConfigData.bDimScreen = bDimScreen;
    else
     CallerRegs->ax = ( WORD )ERR_INTERNAL,
  }
  else
   UIConfigData.bDimScreen = bDimScreen;
 }

 SetForegroundRegs( CallerRegs );
}

APIFUNCRET GetSetConnectType( struct REGW
*CallerRegs )
{
 if ( CallerRegs->ax & 0x8000 )
  CallerRegs->ax = UIConfigData.bConnectType;
 else
  UIConfigData.bConnectType = CallerRegs->ax;

 SetForegroundRegs( CallerRegs );
}

APIFUNCRET GetKeyBoardStatus( struct REGW
*CallerRegs )
{
 CallerRegs->ax = SMI_KBDNOTPRESENT;
 SetForegroundRegs( CallerRegs );
}

APIFUNCRET GetAboutDialog( struct REGW
*CallerRegs )
{
 char szTempStr[ STR_STRMAXLENERR ];
 int iBIOSVersionNum = GetBIOSVersion();
 int iMsgBoxTotalLines;

 sprintf( szTempStr, STR_SMABOUTBOX,
szSMVersionName, HIBYTE(
iBIOSVersionNum ),
         LOBYTE( iBIOSVersionNum ) );

 iMsgBoxTotalLines = FillMsgBoxBuff( MsgBoxBuff,
szTempStr,
SUI_CENTERJUSTIFIED );

 BuffHead.iStructLen = sizeof ( MSGBOXBUFF )
 BuffHead.iBuffLen = sizeof ( MSGBOXBUFF ) *
iMsgBoxTotalLines,
 BuffHead.Buff = ( LPVOID )MsgBoxBuff

 CallerRegs->ax = ( WORD )ERR_SUCCESS;
 CallerRegs->dx = SEG( &BuffHead ),
 CallerRegs->si = OFF( &BuffHead );

 SetForegroundRegs( CallerRegs );
}

APIFUNCRET GetSetUDHotIcon( struct REGW
*CallerRegs )
{
 BUFFHEADER FAR *pBuffHeader;
 SCANCODE FAR *pScanCodes,
 int iBuffLen;


 if ( IsGetFunction( CallerRegs ) )
 {
  if ( CallerRegs->bx == SUI_UDHOTICON1 )
   pScanCodes = UIConfigData.aUDHotIcon1;
  else
   pScanCodes = UIConfigData.aUDHotIcon2;

  BuffHead.Buff = ( LPVOID )pScanCodes;
  BuffHead.iBuffLen = GetNumScanCodes(
pScanCodes ) * sizeof (
SCANCODE );
  BuffHead.iStructLen = sizeof ( SCANCODE );

  CallerRegs->dx = SEG( &BuffHead );
  CallerRegs->si = OFF( &BuffHead ),
  CallerRegs->ax = ERR_SUCCESS;
 }
 else
 {
  pBuffHeader = MK_FP( CallerRegs->dx,
CallerRegs->si );
  pScanCodes = ( SCANCODE FAR *
)pBuffHeader->Buff;

  if ( pBuffHeader == NULL || pScanCodes ==
NULL )
   CallerRegs->ax = ( WORD )ERR_INTERNAL;
  else if ( pBuffHeader->iStructLen == 0 ||
pBuffHeader->iBuffLen == 0 )
   CallerRegs->ax = ( WORD )ERR_INTERNAL;
  else
  {
   iBuffLen = pBuffHeader->iBuffLen >
SUI_MAXNUMSCANCODES *
sizeof ( SCANCODE ) ?
          SUI_MAXNUMSCANCODES * sizeof (
SCANCODE ) :
pBuffHeader->iBuffLen.

   if ( CallerRegs->bx == SUI_UDHOTICON1 )
   {
    fil_chr( UIConfigData.aUDHotIcon1, 0,
          SUI_MAXNUMSCANCODES * sizeof (
SCANCODE ) );
    fmem_cp( ( LPVOID )pScanCodes, ( LPVOID
)UIConfigData.aUDHotIcon1,
          iBuffLen );
   }
   else
   {
    fil_chr( UIConfigData.aUDHotIcon2, 0,
          SUI_MAXNUMSCANCODES * sizeof (
SCANCODE ) );
    fmem_cp( ( LPVOID )pScanCodes, ( LPVOID
)UIConfigData.aUDHotIcon2,
          iBuffLen );
   }

   CallerRegs->ax = ERR_SUCCESS;
  }
 }

 SetForegroundRegs( CallerRegs );
}

APIFUNCRET GetSetSecurityID( struct REGW
*CallerRegs )
{
 LPSTR lpszNewSecurityID;
 int iLenSecurityID;

 if ( IsGetFunction( CallerRegs ) )
 {
  CallerRegs->dx = SEG(
UIConfigData.szSecurityID );
  CallerRegs->si = OFF( UIConfigData.szSecurityID
);
  CallerRegs->ax = ERR_SUCCESS;
 }
 else
 {
  if ( GetSCSCallProgress() ==
SMI_SCSDISCONNECTED )
  {
   lpszNewSecurityID = MK_FP( CallerRegs->dx,
CallerRegs->si
```

```
);
    iLenSecurityID = fstr_len( lpszNewSecurityID );

    if ( lpszNewSecurityID != NULL &&
        iLenSecurityID <=
SUI_MAXLENSECURITYSUI )
    {
     fmem_cp( ( LPVOID )lpszNewSecurityID, (
LPVOID
)UIConfigData.szSecurityID,
            iLenSecurityID + 1 );

     CallerRegs->ax = SetSecurityID(
UIConfigData.szSecurityID
).
    }
    else
     CallerRegs->ax = ( WORD )ERR_INTERNAL;
   }
   else
   {
    if ( !fSecurityWarning )
    {
     OpenMessageBox( STR_SUISECURITYID, 0,
SUI_LEFTJUSTIFIED,
SUI_OK );
     fSecurityWarning = TRUE;
    }

    CallerRegs->ax = ( WORD )ERR_INTERNAL.
   }
  }

 SetForegroundRegs( CallerRegs );
}

APIFUNCRET GetSetDomainID( struct REGW
*CallerRegs )
{
 char nNewDomainID;

 if ( IsGetFunction( CallerRegs ) )
 {
  CallerRegs->ax = ( WORD
)UIConfigData.nDomainID,
 }
 else
 {
  nNewDomainID = LOBYTE( CallerRegs->bx );

  if ( nNewDomainID >= PRX_MINDOMAINID &&
nNewDomainID <=
PRX_MAXDOMAINID )
  {
   UIConfigData.nDomainID = nNewDomainID;

   if ( !fDomainWarning )
   {
    OpenMessageBox( STR_SUIDOMAINID, 0,
SUI_LEFTJUSTIFIED,
SUI_OK );
    fDomainWarning = TRUE;
   }

   CallerRegs->ax = ERR_SUCCESS;
  }
  else
   CallerRegs->ax = ( WORD )ERR_INTERNAL,
 }

 SetForegroundRegs( CallerRegs );
}

APIFUNCRET GetSetUILanguage( struct REGW
*CallerRegs )
{
 CallerRegs->ax = ( WORD )SMI_UIUSENGLISH;

 SetForegroundRegs( CallerRegs );
}

APIFUNCRET RebootHost( struct REGW
*CallerRegs )
{
 REG_W InArgs, OutArgs;

 fil_chr( ( NPSTR )&InArgs, 0, sizeof ( InArgs ) );

 InArgs.ax = SCS_REBOOTHOST;

 intn( &InArgs, &OutArgs, SCS_INTNUM );

 if ( OutArgs.ax == SCS_ACCEPTED )
  CallerRegs->ax = ERR_SUCCESS;
 else
  CallerRegs->ax = ( WORD )ERR_INTERNAL;

 SetForegroundRegs( CallerRegs );
}

APIFUNCRET GetPasswordStatus( struct REGW
*CallerRegs )
{
 CallerRegs->ax = ( WORD )isPWRequired();

 SetForegroundRegs( CallerRegs );
}

APIFUNCRET GetSetPassword( struct REGW
*CallerRegs )
{
 LPSTR szNewPassword;

 if ( IsGetFunction( CallerRegs ) )
 {
  CallerRegs->dx = SEG( szPassword );
  CallerRegs->si = OFF( szPassword );
 }
 else
 {
  szNewPassword = ( LPSTR )MAKELP(
CallerRegs->dx,
CallerRegs->si );
   fmem_cp( ( LPVOID )szNewPassword, ( LPVOID
)sz~ ssword,
          SUI_MAXLENPASSWORD );
 }

 CallerRegs->ax = ERR_SUCCESS.

 SetForegroundRegs( CallerRegs );
}

APIFUNCRET UpdateHostList( struct REGW
*CallerRegs )
{
 CallerRegs->ax = ( WORD )RequestHostList();

 SetForegroundRegs( CallerRegs );
}

APIFUNCRET GetHostListStatus( struct REGW
*CallerRegs )
{

 if ( !GetSCSActiveStatus() )
  CallerRegs->ax = ( WORD
)ERR_NOTSUPPORTED;

 CallerRegs->ax = GetStatusHLInMem();

 SetForegroundRegs( CallerRegs );
}

APIFUNCRET LBGetSetNetGroup( struct REGW
*CallerRegs )
{
 if ( IsGetFunction( CallerRegs ) )
 {
  if ( GetStatusHLInMem() == SMI_BLANK )
  {
   CallerRegs->ax = ( WORD
)ERR_NOTSUPPORTED;
   goto exit,
  }

  if ( ( int )CallerRegs->bx > 0 )
  {
   ListBoxEntry.lpszEntry = ( LPSTR
)GetLBGroup(
CallerRegs->bx );
   ListBoxEntry.nAttribute =
SUI_LBENTRYENABLED,
   CallerRegs->dx = SEG( &ListBoxEntry );
   CallerRegs->si = OFF( &ListBoxEntry );
   CallerRegs->ax = ERR_SUCCESS,

  }
  else if ( ( int )CallerRegs->bx == 0 )
  {
   ListBoxEntry.lpszEntry = ( LPSTR
)GetLBGroup( -1 );
   ListBoxEntry.nAttribute =
SUI_LBENTRYENABLED;
   CallerRegs->dx = SEG( &ListBoxEntry );
   CallerRegs->si = OFF( &ListBoxEntry );
   CallerRegs->ax = GetLBCurrGroup();
  }
  else
   CallerRegs->ax = GetNumGroupEntries(),
 }
 else
 {
   SetLBCurrGroup( CallerRegs->bx );
   CallerRegs->ax = ERR_SUCCESS;
  }

exit:
 SetForegroundRegs( CallerRegs );
}

APIFUNCRET LBGetSetNetHost( struct REGW
*CallerRegs )
{
 if ( IsGetFunction( CallerRegs ) )
 {
  if ( GetStatusHLInMem() == SMI_BLANK )
  {
   CallerRegs->ax = ( WORD
)ERR_NOTSUPPORTED;
   goto exit;
  }

  if ( ( int )CallerRegs->bx > 0 )
  {
   ListBoxEntry.lpszEntry = ( LPSTR )GetLBHost(
CallerRegs->bx
);
   ListBoxEntry.nAttribute = GetLBHostStatus(
CallerRegs->bx
);
   CallerRegs->dx = SEG( &ListBoxEntry );
   CallerRegs->si = OFF( &ListBoxEntry );
   CallerRegs->ax = 0;
  }
  else if ( ( int )CallerRegs->bx == 0 )
  {
   ListBoxEntry.lpszEntry = ( LPSTR )GetLBHost(
SUI_LBCURRENTRY );
   ListBoxEntry.nAttribute = GetLBHostStatus(
SUI_LBCURRENTRY
);
   CallerRegs->dx = SEG( &ListBoxEntry );
   CallerRegs->si = OFF( &ListBoxEntry );
   CallerRegs->ax = ( WORD )GetLBCurrHost();
  }
  else
   CallerRegs->ax = GetNumHostEntries();
 }
 else
 {
  SetLBCurrHost( CallerRegs->bx ),
  CallerRegs->ax = 0:
 }

exit:
 SetForegroundRegs( CallerRegs );
}

APIFUNCRET UpdateDimenLoc( struct REGW
*CallerRegs )
{
 OCCLUDEUNION OccUnion;
 int iActualVidMode;

 CallerRegs->ax = ( WORD )ERR_SUCCESS;
 iActualVidMode = GetCurrVidMode();

 if ( !GetSCSActiveStatus() || IsSetupDlg(
wScreenCode ) ||
IsNoScreen( wScreenCode ) )
 {
  CallerRegs->ax = ( WORD
)ERR_NOTSUPPORTED:
  goto exit;
 }

 if ( CallerRegs->bx == 0xFFFF && CallerRegs->cx
== 0xFFFF &&
    CallerRegs->si == 0xFFFF && CallerRegs->di
== 0xFFFF )
 {
  UnloadSUI( SUI_NOUNLOADSUI );
 }
 else
 {
  if ( iActualVidMode > SUI_TEXTVIDMODE )
  {
   if ( IsOSKWinGraphics( wScreenCode ) )
   {
    OccUnion.occRWin.yULWin = CallerRegs->bx;
    OccUnion.occRWin.xULWin = CallerRegs->cx;
    OccUnion.occRWin.yLRWin = CallerRegs->si;
    OccUnion.occRWin.xLRWin = CallerRegs->di;

    CallerRegs->ax = CreateOccludedArea(
&OccUnion,
SUI_OCCRWIN, SCS_OSKFREEMEMPERCENT );
    SetOSKMode( &OccUnion, SUI_OCCRWIN );
   }
   else
   {
      OccUnion.occDosGraph.yULDos =
CallerRegs->bx;
      OccUnion.occDosGraph.xULDos =
CallerRegs->cx;
      OccUnion.occDosGraph.yLRDos =
CallerRegs->si;
      OccUnion.occDosGraph.xLRDos =
CallerRegs->di;

      CallerRegs->ax = CreateOccludedArea(
&OccUnion,
SUI_OCCDOSGRAPHICS,
SCS_OSKFREEMEMPERCENT );

      if ( !IsOSKAsSetupDlg( wScreenCode ) )

       SetOSKMode( &OccUnion,
SUI_OCCDOSGRAPHICS );
    }
   }
   else
   {
    OccUnion.occText.yULRow = CallerRegs->bx;
    OccUnion.occText.xULCol = CallerRegs->cx;
    OccUnion.occText.yLRRow = CallerRegs->si;
    OccUnion.occText.xLRCol = CallerRegs->di;

    CallerRegs->ax = CreateOccludedArea(
&OccUnion,
SUI_OCCDOSTEXT,
SCS_OSKFREEMEMPERCENT );
    SetOSKMode( &OccUnion, SUI_OCCDOSTEXT
);
   }
  }

exit:
 SetForegroundRegs( CallerRegs );
}

APIFUNCRET GetSetContrast( struct REGW
*CallerRegs )
{
 BYTE nContrastIdx,

 if ( IsGetFunction( CallerRegs ) )
  CallerRegs->ax = ( WORD
)UIConfigData.nContrastIdx:
 else
 {
  nContrastIdx = LOBYTE( CallerRegs->bx );

  if ( ( CallerRegs->ax = ( WORD )SetContrast(
nContrastIdx ) )
      == ERR_SUCCESS )
   UIConfigData.nContrastIdx = nContrastIdx;
 }

 SetForegroundRegs( CallerRegs );
}

APIFUNCRET GetSetBrightness( struct REGW
*CallerRegs )
{
 BYTE nBrightnessIdx;

 if ( IsGetFunction( CallerRegs ) )
  CallerRegs->ax = ( WORD
)UIConfigData.nBrightnessIdx;
 else
 {
  nBrightnessIdx = LOBYTE( CallerRegs->bx );

  if ( ( CallerRegs->ax = ( WORD )SetBrightness(
nBrightnessIdx
) )
      == ERR_SUCCESS )
   UIConfigData.nBrightnessIdx = nBrightnessIdx;
 }

 SetForegroundRegs( CallerRegs );
}

APIFUNCRET GetSetAutoShutOff( struct REGW
*CallerRegs )
{
 if ( IsGetFunction( CallerRegs ) )
  CallerRegs->ax = ( WORD
)UIConfigData.bAutoShutoff;
 else
 {
  if ( LOBYTE( CallerRegs->bx ) == TRUE )
  {
   CallerRegs->ax = SetSuspendTimeout(
SBS_SUSPENDIN60MIN );
   UIConfigData.bAutoShutoff = TRUE;
  }
  else
  {
```

```
    CallerRegs->ax = SetSuspendTimeout(
SBS_SUSPENDDISABLED );

    UIConfigData.bAutoShutoff = FALSE;
   }
  }

  SetForegroundRegs( CallerRegs );
}

APIFUNCRET GetSetSleepTime( struct REGW
*CallerRegs )
{
  BYTE nSleepTimeIdx;

  if ( IsGetFunction( CallerRegs ) )
  {
   if ( UIConfigData.nSleepTimeIdx ==
SBS_SLEEPDISABLED )
    CallerRegs->ax = ( WORD
)SUI_NOSLEEPSLIDERIDX - 1;
   else
    CallerRegs->ax = ( WORD
)UIConfigData.nSleepTimeIdx - 1;
  }
  else
  {
   nSleepTimeIdx = LOBYTE( CallerRegs->bx ) + 1;

   if ( nSleepTimeIdx == SUI_NOSLEEPSLIDERIDX
)
    nSleepTimeIdx = ( BYTE
)SBS_SLEEPDISABLED

   if ( ( CallerRegs->ax = SetSleepTimeout(
nSleepTimeIdx ) )
        == ERR_SUCCESS )
   {
    if ( nSleepTimeIdx == SBS_SLEEPDISABLED )
    {
     if ( ( CallerRegs->ax = SetPowerEnable(
SBS_POWERMANDISABLED ) )
         == ERR_SUCCESS )
     {
      if ( ( CallerRegs->ax = SetDozeTimeout(
SBS_DOZEDISABLED ) )
          == ERR_SUCCESS )
       UIConfigData.nSleepTimeIdx =
nSleepTimeIdx;
     }
    }
    else
    {
     if ( ( CallerRegs->ax = SetPowerEnable(
SBS_POWERMANENABLED ) )
         == ERR_SUCCESS )
     {
      if ( ( CallerRegs->ax = SetDozeTimeout(
SBS_DOZEDISABLED ) )
          == ERR_SUCCESS )
       UIConfigData.nSleepTimeIdx =
nSleepTimeIdx;
     }
    }
   }
  }

  SetForegroundRegs( CallerRegs );
}

int EnableBusyCursor( int iStatus )
{
  int iReturn;

  AX( SUI_SHOWHIDEBUSYCURSOR );
  BX( iStatus );

  iReturn = ( *lpfnSUICallBack )();

  return ( iReturn )
}

int DoMessageBox( NPSTR szMsgText, int
iScrNumber, char
nAlignment, int iButtons,
            MODALMSGBOXCB fnCallBack, int
iMsgBoxTimeOut )
{
  if ( !GetSUIReady() )
   return ( ERR_INTERNAL );

  if ( iMsgBoxTimeOut > 0 )
   iMsgBoxTimeOut += 2;

  if ( ( iProcMsgBoxThreadIdx =
GetTempEventNum() ) < ERR_SUCCESS
)
   return ( ERR_INTERNAL );

  A 'c Thread( iProcMsgBoxThreadIdx, ( NEARPROC
)ProcessMessageBox,
NULL, SMD_POLLED,
            FALSE, SUI_PROCMSGBOXPOLLFREQ,
0 );

  if ( fnCallBack != NULL )
   DoModalMsgBox( fnCallBack, iMsgBoxTimeOut );

  ProcessMessageBox( szMsgText, iScrNumber,
nAlignment, iButtons
);

  return ( ERR_SUCCESS );
}

void ProcessMessageBox( NPSTR szNewMsgText,
int iNewScrNumber,
char nNewAlignment, int iNewButtons )
{
  static NPSTR szMsgText;
  static char nAlignment;
  static int iButtons;
  static int iScrNumber;
  static int iProcMsgBoxState =
SUI_NOPROCMSGBOXSTATE;

  switch ( iProcMsgBoxState )
  {
   case SUI_NOPROCMSGBOXSTATE:
    szMsgText = szNewMsgText;
    iScrNumber = iNewScrNumber
    nAlignment = nNewAlignment:
    iButtons = iNewButtons;
    iProcMsgBoxState = SUI_HIDEMSGBOX;
    break;

   case SUI_HIDEMSGBOX:
    HideMessageBox();
    i-procMsgBoxState = SUI_SHOWMSGBOX;
    break;

   case SUI_SHOWMSGBOX:
    OpenMessageBox( szMsgText. iScrNumber,
nAlignment, iButtons
);
    iProcMsgBoxState =
SUI_NOPROCMSGBOXSTATE:
    DelThread( iProcMsgBoxThreadIdx );
    break;
  }
}

int OpenMessageBox( NPSTR szMsgText, int
iScrNumber, char
nAlignment, int iButtons )
{
  int iSeg = 0, iOff = 0;
  int iMsgBoxTotalLines;

  if ( !GetSUIReady() )
   return ( ERR_INTERNAL );

  if ( szMsgText != NULL )
   iScrNumber = 0;
  else
   goto exit;

  if ( strlen( szMsgText ) > STR_STRMAXLENERR -
1 )
   return ( ERR_INTERNAL );

  iMsgBoxTotalLines = FillMsgBoxBuff( MsgBoxBuff,
szMsgText,
nAlignment );

  if ( *MsgBoxBuff[ 0 ].lpszText == NULL )
   . turn ( ERR_INTERNAL );

  BuffHead.iStructLen = sizeof ( MSGBOXBUFF );
  BuffHead.iBuffLen = sizeof ( MSGBOXBUFF ) *
iMsgBoxTotalLines,
  BuffHead.Buff = ( LPVOID )MsgBoxBuff;

  iSeg = SEG( &BuffHead );
  iOff = OFF( &BuffHead );

exit:

  AX( SUI_SHOWMSGBOX );
  BX( iButtons );
  CX( iScrNumber );
  DX( iSeg );
  SI( iOff );

  return ( ( *lpfnSUICallBack )() );
}

int FillMsgBoxBuff( MSGBOXBUFF MsgBoxBuff[],
char *szMsgText,
char nAlignment )
{
  int iTerminator, iMsgBoxLineIdx,
iMsgBoxTotalLines;
  char *szPtrTempStr = szTempMsgStr;

  strcpy( szTempMsgStr, szMsgText );

  fil_chr( MsgBoxBuff, 0, sizeof ( MSGBOXBUFF ) *
SMI_SUIMAXMSGBOXLINES );

  for ( iMsgBoxLineIdx = 0, iMsgBoxTotalLines = 0;
       iMsgBoxLineIdx <
SMI_SUIMAXMSGBOXLINES; ++iMsgBoxLineIdx
)
  {
   if ( ( iTerminator = str_pos( STR_SEPARATOR,
szPtrTempStr ) )
> 0 )
   {
     *( szPtrTempStr + ( iTerminator - 1 ) ) = NULL;
     MsgBoxBuff[ iMsgBoxLineIdx ].lpszText = (
LPSTR
)szPtrTempStr;
     MsgBoxBuff[ iMsgBoxLineIdx ].nAlignment =
nAlignment:
     szPtrTempStr += iTerminator,
     iMsgBoxTotalLines++,
   }
   else
     MsgBoxBuff[ iMsgBoxLineIdx ].lpszText =
szNullStr;
  }

  return ( iMsgBoxTotalLines );
}

int HideMessageBox( void )
{
  if ( !GetSUIReady() )
   return ( ERR_INTERNAL );

  AX( SUI_HIDEMSGBOX );

  return ( ( *lpfnSUICallBack )() );
}

int UpdateSUIConnectStatus( void )
{
  if ( !GetSUIReady() )
   return ( ERR_INTERNAL );

  SetUpdatingConnectStatus( TRUE );

  AX( SUI_UPDATECONNECTSTATUS );

  return ( ( *lpfnSUICallBack )() );
}

#if defined( _MSC_VER  )
#pragma warning( default : 4704 )
#endif
Copr. 1995 Zenith Data Systems Corp.
#include "cr.h"
#include "frame.h"
#include "spawn.h"
#include "sm.h"

static BYTE fFrameWarning = FALSE,

static char aFrameTypes[][6]=
{
  "802.2",
  "802.3",
  "II",
  "SNAP",
};

APIFUNCRET LBGetSetNetFrameType( struct
REGW *CallerRegs )
{
  if ( IsGetFunction( CallerRegs ) )
  {
   int iCurrFrameIdx = UIConfigData.nFrameType -
PRX_FRAMEBASE;
   CallerRegs->dx = SEG( &ListBoxEntry );
   CallerRegs->si = OFF( &ListBoxEntry );

   if ( ( int )CallerRegs->bx > 0 )
   {
    ListBoxEntry.lpszEntry = ( LPSTR
)aFrameTypes[
CallerRegs->bx - 1 ];
    ListBoxEntry.nAttribute =
SUI_LBENTRYENABLED,
    CallerRegs->ax = ERR_SUCCESS;
   }
   else if ( ( int )CallerRegs->bx == 0 )
   {
    ListBoxEntry.lpszEntry =
     ( LPSTR )aFrameTypes[ iCurrFrameIdx ];
    ListBoxEntry.nAttribute =
SUI_LBENTRYENABLED;
    CallerRegs->ax = iCurrFrameIdx + 1;
   }
   else
    CallerRegs->ax =
PRX_NUMOFAVAILFRAMES;
  }
  else
  {
   if ( !fFrameWarning )
   {
    OpenMessageBox( STR_SUIFRAMETYPE, 0,
SUI_LEFTJUSTIFIED,
SUI_OK );
    fFrameWarning = TRUE;
   }

   UIConfigData.nFrameType = PRX_FRAMEBASE
+ ( CallerRegs->bx -
1 );
   CallerRegs->ax = ERR_SUCCESS:
  }

  SetForegroundRegs( CallerRegs );
}

APIFUNCRET NotifyScreenCode( struct REGW
*CallerRegs )
{
  BYTE nLastOSKScreen;
  BYTE nLastSetupDlgScreen;

  if ( ( nLastOSKScreen = LOBYTE( CallerRegs->bx
) & SUI_OSKMASK
) > 0 )
  {
   if ( IsSetupDlg( GetCurrScrCode() ) )

    UIConfigData.nLastOSKDlgScreen =
nLastOSKScreen;
   else
    UIConfigData.nLastOSKScreen =
nLastOSKScreen;
  }

  if ( ( nLastSetupDlgScreen = LOBYTE(
CallerRegs->bx ) &
SUI_SETUPDLGMASK ) > 0 )
   UIConfigData.nLastSetupDlgScreen =
nLastSetupDlgScreen;

  CallerRegs->ax = ERR_SUCCESS;

  SetForegroundRegs( CallerRegs );
}
Copr. 1995 Zenith Data Systems Corp.
#include "cr.h"
#include "sio.h"
#include "spawn.h"
#include "k2.h"
#include "sm.h"

#if defined( _MSC_VER  )
#pragma warning( disable : 4704 )
#endif

static int iCalibMode = -1;
static int iCalibThreadIdx = 0;
static int xCalibCol, yCalibRow;
static BOOL fCalibLowRight;

static CALIBPENSTATES PenCalibStates;

APIFUNCRET CalibratePen( struct REGW
*CallerRegs )
{
  if ( fCalibLowRight )
  {
   CallerRegs->ax = SMI_CALIBLOWRIGHT;
   CallerRegs->cx = SHC_XVGARES -
SUI_XCALIBPOINT;
   CallerRegs->bx = SHC_YVGARES -
SUI_YCALIBPOINT;
   fCalibLowRight = FALSE;
  }

  if ( IsGetFunction( CallerRegs ) )
   iCalibMode = PND_CALIBLR;
  else
  {
   fCalibLowRight = TRUE,
   iCalibMode = PND_CALIBUL;
  }
```

```
  if ( ( iCalibThreadIdx = GetTempEventNum() ) < 0 )
  {
    CallerRegs->ax = ( WORD )ERR_INTERNAL;
  }
  else
  {
    PenCalibStates = SUI_INITIALCALIBSTATE;
    xCalibCol = CallerRegs->cx;
    yCalibRow = CallerRegs->bx;
    CallerRegs->ax = ERR_SUCCESS;

    AddThread( iCalibThreadIdx, WaitForPenCalib,
NULL,
SMD_POLLED, FALSE,
           SMI_CALIBPOLLFREQ, 0 );
  }

  SetForegroundRegs( CallerRegs );
}

APIFUNCRET CalibrateCancel( struct REGW
*CallerRegs )
{
  DelThread( iCalibThreadIdx );
  EnableNewCalib( FALSE );

  CallerRegs->ax = ERR_SUCCESS;

  SetForegroundRegs( CallerRegs );

  if ( GetCurrActionCode() ==
SUI_LASTCONNECTION )
    LoadSUI( SUI_SPECIFIEDSCREEN,
SUI_HOSTSELECTION );
}

void WaitForPenCalib( void )
{
  int xUpperCol, yUpperRow, xLowerCol,
yLowerRow
  int iCalibState
  PENCALIB CurrPenCalib

  switch( PenCalibStates )
  {
    case SUI_INITIALCALIBSTATE:
      if ( SetCalibMode( iCalibMode, xCalibCol,
yCalibRow ) == 0
)
        PenCalibStates = SUI_CHECKCALIB,
      else
        PenCalibStates = SUI_CALIBERROR.
      break.

    case SUI_CHECKCALIB:
      iCalibState = GetCalibState( iCalibMode,
&xUpperCol,
&yUpperRow,
                          &xLowerCol, &yLowerRow
);

      if ( iCalibState != PND_CALIBNOTDONE )
      {
        if ( iCalibMode == PND_CALIBLR )
        {
          if ( iCalibState == PND_CALIBDONEVALID )
          {
            CurrPenCalib.wXUpperPenCalib =
xUpperCol;
            CurrPenCalib.wYUpperPenCalib =
yUpperRow;
            CurrPenCalib.wXLowerPenCalib =
xLowerCol;
            CurrPenCalib.wYLowerPenCalib =
yLowerRow;

            SetEEMouseConfig( &CurrPenCalib );
            EnableNewCalib( TRUE );

            PenCalibStates = SUI_CALIBSUCCESS;
          }
          else
            PenCalibStates = SUI_CALIBERROR;
        }
        else
          PenCalibStates = SUI_CALIBSUCCESS;
      }
      break,

    case SUI_CALIBERROR
    case SUI_CALIBSUCCESS
      AX( SUI_CALIBPOINTDONE );
      ( *lpfnSUICallBack )().
      DelThread( iCalibThreadIdx )

      if ( iCalibMode == PND_CALIBLR &&
GetCurrActionCode() ==
SUI_DOPENCALIBRATION )
        LoadSUI( SUI_SPECIFIEDSCREEN,
SUI_HOSTSELECTION );
        break;
  }
}

#if defined( _MSC_VER )
#pragma warning( default : 4704 )
#endif
```

Copr. 1995 Zenith Data Systems Corp.

```
#include "cr.h"
#include "sio.h"
#include "spawn.h"
#include "k2.h"
#include "hm.h"
#include "lm.h"
#include "sm.h"

#if defined( _MSC_VER )
#pragma warning( disable : 4704 )
#endif

static FLASHUPDATESTATES FlashUpdateState.
FlashStateOnError;
static MEM_REC MemRec.
static char far *sFlashImageBuff = NULL;
static char *szPathFlashFile = NULL;
static char *szNameActiveUpdate = NULL;
static int  iDoUpdateThreadIdx,
iActiveUpdateThreadIdx;
static int  iFlashUpdateState;
static int  iTmpFilePercent, iOldTmpFilePercent,
iOldTmpDispPercent;

static int iTotalFlashFiles,
static int iCurrFlashFile,
static LONG lLenCurrFlashFile;
static int lSectorFlashStatus;

APIFUNCRET DoUpdate( struct REGW *CallerRegs
)
{
  if ( GetSCSCallProgress() !=
SMI_SCSCONNECTED )
    CallerRegs->ax = ( WORD )ERR_INTERNAL;
  else
  {
    if ( ( iDoUpdateThreadIdx = GetTempEventNum()
) ==
ERR_INTERNAL )
    {
      CallerRegs->ax = ( WORD )ERR_INTERNAL;
    }
    else
    {
      if ( IsFlashSupported() )
      {
        FlashUpdateState = FLU_SAFETYCHECK;
        AddThread( iDoUpdateThreadIdx,
WaitForFlashUpdate, NULL,
SMD_MANYTIMES, FALSE,
                FLU_POLLFREQ, FLU_MAXRETRY );

        CallerRegs->ax = ( WORD )ERR_SUCCESS;
      }
      else
        CallerRegs->ax = ( WORD )ERR_INTERNAL;

    }
  }

  SetForegroundRegs( CallerRegs );
}

APIFUNCRET RequestActiveUpdate( struct REGW
*CallerRegs )
{
  char *szCurrentUpdate = GetNameActiveUpdate();
  int iMsgBoxTotalLines;
  WORD wReturn,
  FLASHUPDATESTATES PowerState;

  if ( *szCurrentUpdate != ' ' && *szCurrentUpdate !=
NULL )
  {
    if ( ( PowerState = CheckFlashPowerState() ) !=
FLU_NOFLUSTATE )
    {
      switch( PowerState )
      {
        case FLU_GETBATTERYINFOERROR:
          iMsgBoxTotalLines = FillMsgBoxBuff(
MsgBoxBuff,
STR_FLUGETBATINFOERROR,

SUI_CENTERJUSTIFIED
);
          break;

        case FLU_NOTONACERROR:
          iMsgBoxTotalLines = FillMsgBoxBuff(
MsgBoxBuff,
STR_FLUNOAC, SUI_CENTERJUSTIFIED );
          break;

        case FLU_BATNOTATTACHEDERROR:
          iMsgBoxTotalLines = FillMsgBoxBuff(
MsgBoxBuff,
STR_FLUNOBATERROR, SUI_CENTERJUSTIFIED
);
          break;

        case FLU_BATCAPTOOLOWERROR:
          iMsgBoxTotalLines = FillMsgBoxBuff(
MsgBoxBuff,
STR_FLUBATTOOLOWERROR,
SUI_CENTERJUSTIFIED );
          break;

        default
          iMsgBoxTotalLines = FillMsgBoxBuff(
MsgBoxBuff,
STR_FLUUNKNOWNBATERROR,
SUI_CENTERJUSTIFIED );
      }

      wReturn = ( WORD
)ERR_UPGRADENOTAVAIL;
    }
    else if ( GetSCSCallProgress() !=
SMI_SCSCONNECTED )
    {
      iMsgBoxTotalLines = FillMsgBoxBuff(
MsgBoxBuff,
STR_FLUNOCONNECTERROR,
SUI_CENTERJUSTIFIED );
      wReturn = ( WORD
)ERR_UPGRADENOTAVAIL;
    }
    else if ( GetLinkQuality() != PRX_HIGHQUALITY
)
    {
      iMsgBoxTotalLines = FillMsgBoxBuff(
MsgBoxBuff,
STR_FLULINKTOOLOWERROR,
SUI_CENTERJUSTIFIED );
      wReturn = ( WORD
)ERR_UPGRADENOTAVAIL;
    }
    else if ( GetCurrHostMode() != PND_DOSAPP )
    {
      iMsgBoxTotalLines = FillMsgBoxBuff(
MsgBoxBuff,
STR_FLUNOTINDOSAPP, SUI_CENTERJUSTIFIED
);
      wReturn = ( WORD
)ERR_UPGRADENOTAVAIL;
    }
    else
    {
      MsgBoxBuff[0].lpszText = ( LPSTR
)szCurrentUpdate;
      MsgBoxBuff[0].nAlignment =
SUI_CENTERJUSTIFIED;
      iMsgBoxTotalLines = 1;
      wReturn = ERR_SUCCESS;
      TRACE( "NOTICE: Flash upgrade safety checks
passed.\r" );
    }
  }
  else
  {
    iMsgBoxTotalLines = FillMsgBoxBuff(
MsgBoxBuff,
STR_FLUNOFLASHFILES,
SUI_CENTERJUSTIFIED );
    wReturn = ( WORD )ERR_UPGRADENOTAVAIL.

  }

  BuffHead.iStructLen = sizeof ( MSGBOXBUFF );
  BuffHead.iBuffLen = sizeof ( MSGBOXBUFF ) *
iMsgBoxTotalLines;
  BuffHead.Buff = ( LPVOID )MsgBoxBuff.

  CallerRegs->dx = SEG( &BuffHead );
  CallerRegs->si = OFF( &BuffHead );

  CallerRegs->ax = wReturn.

  SetForegroundRegs( CallerRegs );
}

void WaitForFlashUpdate( void )
{
  int iSizeFlashSector;
  int iNumberOfFlash,
  int iNewTmpFilePercent, iNewTmpDispPercent;
  int iRetryLimit = GetRetryLimit(
iDoUpdateThreadIdx );
  FlashStateOnError = FlashUpdateState;

  switch ( FlashUpdateState )
  {
    case FLU_NOFLUSTATE:

    case FLU_SAFETYCHECK:
      FlashUpdateState = FLU_INITMEM;

      SetWaitingIcon( SBS_WAITINGICONON, TRUE
);

      if ( UIConfigData.nSleepTimeIdx !=
SBS_SLEEPDISABLED )
      {
        SetPowerEnable(
SBS_POWERMANDISABLED );
        TRACE( "NOTICE: Disabled powerman for
flash update\r" );
      }
      break,


    case FLU_INITMEM:
      TRACE( "NOTICE: Initializing and allocating
memory\r" );

      if ( ( szPathFlashFile = ( NPSTR )malloc(
SCS_MAXLENFILENAME + 1 ) ) == NULL )
        FlashUpdateState = FLU_MEMERROR;
      else
      {
        if ( SMDosBusy( GetFlashImageBuff ) !=
ERR_SUCCESS )
          FlashUpdateState = FLU_MEMERROR;
        else
        {
          FlashUpdateState = FLU_ALLOCDOSMEM;
          ResetRetryLimit( iDoUpdateThreadIdx ),
        }
      }
      break;

    case FLU_ALLOCDOSMEM:
      if ( sFlashImageBuff == NULL )
      {
        if ( iRetryLimit == FLU_MAXDOSBUSY )
        {
          TRACE( "ERROR: Failed to allocate required
buffer\r" );
          FlashUpdateState = FLU_MEMERROR;
        }
      }
      else
      {
        TRACE( "NOTICE: Successfully acquired
memory\r" );

        iTotalFlashFiles = FLU_NUMBERUNKNOWN;
        iCurrFlashFile = 0;

        fil_chr( szPathFlashFile, 0,
SCS_MAXLENFILENAME );

        FlashUpdateState =
FLU_SENDREQFLASHUPD;
        ResetRetryLimit( iDoUpdateThreadIdx );

      }
      break;

    case FLU_SENDREQFLASHUPD:
      TRACE( "NOTICE: Requesting the flash
upgrade from the
Host\r" );
      iSizeFlashSector = FLU_SIZEFLASHSECTOR /
1024;

      if ( SendPrivateMessage(
PMI_REQFLASHUPD, sizeof( int ),
          ( NPSTR )&iSizeFlashSector ) !=
ERR_SUCCESS )
        FlashUpdateState =
FLU_SENDPRIMSGERROR;
      else
```

```
      {
        if ( iRetryLimit == 0 )
          SetRetryLimit( iDoUpdateThreadIdx, 1 );

        SetTmpFilePercent( 0 );
        SetTimeLimit( iDoUpdateThreadIdx.
FLU_PRIMSGPOLLFREQ );
        FlashUpdateState =
FLU_WAITFORTMPFLASHFILES;
      }
      break;

    case FLU_WAITFORTMPFLASHFILES:
      iNewTmpFilePercent = GetTmpFilePercent();

      if ( iNewTmpFilePercent == 0 )
      {
        if ( iRetryLimit <= FLU_MAXPCNTTMPFILE )

        {
          TRACE( "ERROR: Timeout waiting for first
percent of
temp files.\r" );
          FlashUpdateState =
FLU_NOACKTEMPFILESERROR;
        }
        else if ( iRetryLimit %
FLU_MODPCNTTMPFILE == 0 )
        {
          TRACE( "ERROR: Requesting flash update
from host once
again\r" );
          FlashUpdateState =
FLU_SENDREQFLASHUPD;
        }
      }
      else
      {
        UpdateTmpFilePercentage(
iNewTmpFilePercent );
        iOldTmpFilePercent = iNewTmpFilePercent;
        iOldTmpDispPercent = iNewTmpDispPercent =
(
iNewTmpFilePercent * 2 ) / 100;
        FlashUpdateState =
FLU_UPDATETMPFILEPERCENT;
        ResetRetryLimit( iDoUpdateThreadIdx );
      }
      break;

    case FLU_UPDATETMPFILEPERCENT:
      iNewTmpFilePercent = GetTmpFilePercent();

      iNewTmpDispPercent = ( iNewTmpFilePercent *
2 ) / 100
      if ( iNewTmpFilePercent == iOldTmpFilePercent
)
      {
        if ( iRetryLimit <= FLU_MAXPCNTTMPFILE ||
            iNewTmpFilePercent == 100 )
        {
          ResetRetryLimit( iDoUpdateThreadIdx );
          FlashUpdateState =
FLU_WAITFORNUMFILES;
          TRACE( "NOTICE: Done waiting for number
of files,
onward!\r" );

#if !defined( PROD )
          if ( iNewTmpFilePercent != 100 )
            TRACE( "ERROR: Timeout waiting for next
percent of
temp files.\r" );
#endif
        }
      }
      else
      {
        ResetRetryLimit( iDoUpdateThreadIdx );
        iOldTmpFilePercent = iNewTmpFilePercent;

        if ( iNewTmpDispPercent !=
iOldTmpDispPercent )
        {
          TRACE( "NOTICE: Updating percentage of
tmp file
processing\r" );
          UpdateTmpFilePercentage(
iNewTmpFilePercent );
          iOldTmpDispPercent =
iNewTmpDispPercent;
        }
      }
      break;

    case FLU_WAITFORNUMFILES:
      TRACE( "NOTICE: Waiting for total number of
flash files\r"
);
      iNumberOfFlash = GetTotalFlashFiles();

      if ( iNumberOfFlash ==
FLU_NUMBERUNKNOWN )
      {
        if ( iRetryLimit <= FLU_MAXUPDREQ )

        {
          TRACE( "ERROR: Timeout waiting for
number of flash
files.\r" );
          FlashUpdateState =
FLU_NOACKNUMFILESERROR;
        }
      }
      else if ( iNumberOfFlash <=
FLU_ERRHOSTBASE )
      {
#if !defined( PROD )
        sprintf( szTempStr, "NOTICE: Number of flash
files
returned as an error code - %d\r", iNumberOfFlash );

        TRACE( szTempStr );
#endif
        switch ( iNumberOfFlash )
        {
          case FLU_ERRREADHOSTDAT:
            FlashUpdateState = FLU_READHOSTDAT;
            break;

          case FLU_ERRMISSINGFILE:
            FlashUpdateState = FLU_MISSINGFILE;
            break;

          case FLU_ERRNOFLASHFILES:
            FlashUpdateState = FLU_NOFLASHFILES;
            break;

          case FLU_ERROUTOFDISKSPACE:
            FlashUpdateState =
FLU_OUTOFDISKSPACE;
            break;

          case FLU_ERRFILECORRUPTED:
            FlashUpdateState =
FLU_FILECORRUPTED;
            break;

          case FLU_ERRNOCHECKSUM:
            FlashUpdateState = FLU_NOCHECKSUM;

            break;

          default:
            FlashUpdateState =
FLU_HOSTUNKNOWNERR;
            break;
        }
      }
      else
      {
        WORD wExtendedMem =
GetSizeOfExtendedMem();

#if !defined( PROD )
        sprintf( szTempStr, "NOTICE: Number of flash
files - %d
\r", iNumberOfFlash );
        TRACE( szTempStr );
#endif
        if ( iNumberOfFlash >
FLU_2MEGTHREASHHOLD &&
             wExtendedMem <
FLU_1MEGEXTENDEDRAM )
        {
          FlashUpdateState =
FLU_1MEGSYSTEMERROR;
        }
        else if ( iNumberOfFlash ==
FLU_2MEGTHREASHHOLD &&
             wExtendedMem ==
FLU_1MEGEXTENDEDRAM )
        {
          FlashUpdateState =
FLU_2MEGSYSTEMERROR;

        }
        else
        {
          iCurrFlashFile = 1;

          FlashUpdateState = FLU_SENDREQPATH;
          Set2MegFlash( ( iNumberOfFlash >
FLU_2MEGTHREASHHOLD )
);
          SetTimeLimit( iDoUpdateThreadIdx.
FLU_POLLFREQ );
          ResetRetryLimit( iDoUpdateThreadIdx );
        }
      }
      break;

    case FLU_SENDREQPATH:
      *szPathFlashFile = NULL;

      if ( SendPrivateMessage(
PMI_REQPATHFROMIDX, sizeof ( int
),
                    ( NPSTR )&iCurrFlashFile )
!=
ERR_SUCCESS )
        FlashUpdateState =
FLU_SENDPRIMSGERROR;
      else
      {
        if ( iRetryLimit == 0 )
          SetRetryLimit( iDoUpdateThreadIdx, 1 );

        FlashUpdateState =
FLU_WAITFORPATHFLASHFILE;
        SetTimeLimit( iDoUpdateThreadIdx.
FLU_PRIMSGPOLLFREQ );
      }
      break;

    case FLU_WAITFORPATHFLASHFILE:
      if ( *GetPathFlashFile() == NULL )
      {
        if ( iRetryLimit < FLU_MAXPATHREQ )
        {
          TRACE( "ERROR: Timeout waiting for
response to path
request\r" );
          FlashUpdateState =
FLU_NOACKPATHERROR;
        }
        else if ( iRetryLimit % FLU_MODPATHREQ
== 0 )
        {
          TRACE( "NOTICE: Trying again to receive
the next path
name\r" );
          FlashUpdateState = FLU_SENDREQPATH;
        }
      }
      else
      {
        if ( *ParseForFileName( GetPathFlashFile() )
==
FLU_FLASHFILEID )
        {
          FlashUpdateState =
FLU_RECEIVEHOSTFILE;
          ResetRetryLimit( iDoUpdateThreadIdx );
          SetTimeLimit( iDoUpdateThreadIdx.
FLU_POLLFREQ );
        }
        else
        {
          TRACE( "NOTICE: Protected file
encountered, skipping to
the next file\r" );
          goto after_flash;
        }
      }
      break;

    case FLU_RECEIVEHOSTFILE:
#if !defined( PROD )
      sprintf( szTempStr, "NOTICE: File name
received - %s \r",
              GetPathFlashFile() );
      TRACE( szTempStr );
#endif
      if ( ReceiveHostFile( GetPathFlashFile(),
sFlashImageBuff,
FLU_SIZEFLASHSECTOR )
            != ERR_SUCCESS )
      {
        if ( iRetryLimit <= FLU_MAXRECVFILEREQ )
        {
          if ( iCurrFlashFile > 1 )
          {
            TRACE( "ERROR: Timeout waiting for
successful
ReceiveHostFile() request, from sector\r" );
            FlashUpdateState =
FLU_NOACKRECEIVEFATALERROR;
          }
          else
          {
            TRACE( "ERROR: Timeout waiting for
successful
ReceiveHostFile() request\r" );
            FlashUpdateState =
FLU_NOACKRECEIVEFILEERROR.
          }
        }
      }
      else
      {
        TRACE( "NOTICE: Finally beginning reflash of
the
specified sector\r" );
        FlashUpdateState = FLU_FLASHIT;
        ResetRetryLimit( iDoUpdateThreadIdx );
      }
      break;

    case FLU_FLASHIT:
      if ( ( iSectorFlashStatus = FlashSector(
sFlashImageBuff,
            iCurrFlashFile ) ) !=
SBS_FLASHSUCCESS )
      {
        if ( iSectorFlashStatus ==
SBS_FLASHACNOTATTACHED ||
            iRetryLimit <= FLU_MAXFLASHIT )

          FlashUpdateState =
FLU_FLASHFATALERROR;
      }
      else
      {
after_flash
        UpdateFlashPercentage( iCurrFlashFile );
        ResetRetryLimit( iDoUpdateThreadIdx );

        if ( ++iCurrFlashFile > iTotalFlashFiles )
          FlashUpdateState = FLU_CLEAREEROM:
        else
          FlashUpdateState = FLU_SENDREQPATH,

      }
      break;

    case FLU_CLEAREEROM:
      TRACE( "NOTICE: Clearing EEPROM\r" );

      if ( ClearEEPROM() != ERR_SUCCESS )
      {
        if ( iRetryLimit <= FLU_MAXCLEAREEROM )

          FlashUpdateState =
FLU_EEROMNOCLRERROR;
      }
      else
      {
        ResetRetryLimit( iDoUpdateThreadIdx );
        FlashUpdateState =
FLU_FLASHUPDATECOMPLETE;
        SendPrivateMessage( PMI_REQFLASHDONE,
0, NULL ),
      }
      break

    case FLU_FLASHUPDATECOMPLETE:
      SendPrivateMessage( PMI_REQFLASHDONE,
0, NULL );
      FlashUpdateState = FLU_REBOOT;
      SetTimeLimit( iDoUpdateThreadIdx,
FLU_PRIMSGPOLLFREQ );
      break;

    case FLU_REBOOT:
      reboot( CRU_COLDBOOT );
      break;

    default:
      WaitForFlashError();
  }

  if ( FlashUpdateState >
FLU_BEGINERRORSTATES )
    WaitForFlashError();
}

void WaitForFlashError( void )
{
  SendPrivateMessage( PMI_REQFLASHDONE, 0,
NULL );

  if ( sFlashImageBuff == NULL )
  {
    DelThread( iDoUpdateThreadIdx );
    SetWaitingIcon( SBS_WAITINGICONOFF, TRUE
);
  }
  else
  {
    SetRetryLimit( iDoUpdateThreadIdx, 1 );
    HideMessageBox();
    SMDosBusy( ReleaseFlashMem );
    return;
  }
```

```
 switch ( FlashUpdateState )
 {
  case FLU_NOFLASHFILES:
   OpenMessageBox( STR_FLUNOFLASHFILES,
0, SUI_LEFTJUSTIFIED,
SUI_OK );
    break;

  case FLU_READHOSTDAT:
   OpenMessageBox( STR_FLUREADHOSTDAT,
0, SUI_LEFTJUSTIFIED,
SUI_OK );
    break;

  case FLU_MISSINGFILE.
   OpenMessageBox( STR_FLUMISSINGFLASH,
0, SUI_LEFTJUSTIFIED,
SUI_OK ):
    break;

  case FLU_OUTOFDISKSPACE:
   OpenMessageBox(
STR_FLUOUTOFDISKSPACE, 0.
SUI_LEFTJUSTIFIED, SUI_OK );
    break,

  case FLU_FILECORRUPTED
   OpenMessageBox(
STR_FLUFILECORRUPTED, 0.
SUI_LEFTJUSTIFIED
SUI_OK ),
    break,

  case FLU_NOCHECKSUM.
   OpenMessageBox( STR_FLUNOCHECKSUM.
0, SUI_LEFTJUSTIFIED,
SUI_OK ),
    break:

  case FLU_NOACKTEMPFILESERROR
   OpenMessageBox(
STR_FLUNOACKTMPERROR, 0.
SUI_LEFTJUSTIFIED,
SUI_OK ):
    break.

  case FLU_NOACKNUMFILESERROR:
   OpenMessageBox(
STR_FLUNOACKNUMFILEERR. 0.
SUI_LEFTJUSTIFIED, SUI_OK ),
    break,

  case FLU_NOACKPATHERROR:
   OpenMessageBox(
STR_FLUNOACKPATHERROR. 0,
SUI_LEFTJUSTIFIED, SUI_OK );
    break,

  case FLU_NOACKRECEIVEFILEERROR:
   OpenMessageBox(
STR_FLUNOACKRECVFILEERR, 0,
SUI_LEFTJUSTIFIED, SUI_OK );
    break;

  case FLU_NOACKRECEIVEFATALERROR:
   OpenMessageBox(
STR_FLUNOACKRECVFATAL. 0,
SUI_LEFTJUSTIFIED, SUI_OK );
    break

  case FLU_SENDPRIMSGERROR:
   OpenMessageBox( STR_FLUSENDPRIMSG. 0
SUI_LEFTJUSTIFIED.
SUI_OK ;
    break;

  case FLU_1MEGSYSTEMERROR:
   OpenMessageBox(
STR_FLU1MEGSYSERROR, 0,
SUI_LEFTJUSTIFIED,
SUI_OK );
    break;

  case FLU_2MEGSYSTEMERROR:
   OpenMessageBox(
STR_FLU2MEGSYSERROR, 0,
SUI_LEFTJUSTIFIED,
SUI_OK );
    break;

  case FLU_FLASHFATALERROR:
   switch ( iSectorFlashStatus )
   {
    case SBS_FLASHACNOTATTACHED:
     OpenMessageBox( STR_FLUNOAC, 0,
SUI_LEFTJUSTIFIED,
SUI_OK );
      break;

    case SBS_FLASHERASEERROR:
     OpenMessageBox( STR_FLUFLASHERASE,
0,
SUI_LEFTJUSTIFIED, SUI_OK );
      break;

    case SBS_FLASHPROGERROR:
     OpenMessageBox( STR_FLUFLASHPROG,
0, SUI_LEFTJUSTIFIED,
SUI_OK );
      break;

    default:
     OpenMessageBox(
STR_FLUFLASHUNKNOWN, 0,
SUI_LEFTJUSTIFIED, SUI_OK );
      break;
   }
   break;

  case FLU_EEROMNOCLRERROR:
   OpenMessageBox( STR_FLUEEROMNOCLR,
0, SUI_LEFTJUSTIFIED,
SUI_OK );
    break;

  case FLU_HOSTUNKNOWNERR
   OpenMessageBox(
STR_FLUUNKNOWNHOSTERR, 0,
SUI_LEFTJUSTIFIED, SUI_OK );
    break.

  case FLU_MEMERROR:
   OpenMessageBox(
STR_FLURAMALLOCATION, 0,
SUI_LEFTJUSTIFIED,
SUI_OK );
    break;

  default:
   OpenMessageBox(
STR_FLUUNKNOWNERROR, 0,
SUI_LEFTJUSTIFIED,
SUI_OK );
 }
}

void GetFlashImageBuff( void )
{
 WORD wSector;

 TRACE( "NOTICE: Allocating memory from
CoSession for the
reflash buffer\r" ),

 SetSCSMemory( SCS_DLGFREEMEMPERCENT,
SCS_FREEMEM, ( BYTE
)SMI_SCSNOWAITFORDOS );

 if ( ( wSector = GetFreeMCB( ( WORD )(
FLU_SIZEFLASHSECTOR / 16
) ) ) != 0 )
  sFlashImageBuff = MK_FP( wSector, 0 );
}

void ReleaseFlashMem( void )
{
 if ( szPathFlashFile != NULL )
 {
  free( szPathFlashFile );
  szPathFlashFile = NULL;
 }

 if ( sFlashImageBuff != NULL )
 {
  SetFreeMCB( SEG( sFlashImageBuff ) );
  sFlashImageBuff = NULL;
 }

 TRACE( "NOTICE: Returning memory to
CoSession, used by the
reflash buffer\r" );

 SetSCSMemory( 0, SCS_FREEMEM, ( BYTE
)SMI_SCSNOWAITFORDOS );


 if ( UIConfigData.nSleepTimeIdx !=
SBS_SLEEPDISABLED )
  SetPowerEnable( SBS_POWERMANENABLED );

}

int UpdateTmpFilePercentage( int
iNewTmpFilePercent )
{
 int iPercentage;

 iPercentage = ( iNewTmpFilePercent * 2 ) / 100;

 AX( SUI_UPDATEFLASHPRCNT );
 BX( iPercentage );

 ( *lpfnSUICallBack )();

 return ( ERR_SUCCESS );
}

int UpdateFlashPercentage( int iFlashFileNum )
{
 int iPercentage;

 if ( iTotalFlashFiles <= 0 )
  return ( ERR_INTERNAL );

 iPercentage = ( iFlashFileNum * 100 ) /
iTotalFlashFiles;

 AX( SUI_UPDATEFLASHPRCNT );
 BX( iPercentage );

 ( *lpfnSUICallBack )();

 return ( ERR_SUCCESS );
}

int GetActiveUpdate( void )
{
 if ( GetSCSCallProgress() !=
SMI_SCSCONNECTED )
  TRACE( "NOTICE: Not currently connected for
GetActiveUpdate(), sending PM anyway\r" );

 if ( IsFlashSupported() )
 {
  if ( szNameActiveUpdate == NULL )
   if ( ( szNameActiveUpdate = ( NPSTR )malloc(
SUI_MAXLENACTIVEUPD + 1 ) ) == NULL )
    return ( ERR_INTERNAL );

  fil_chr( szNameActiveUpdate, 0,
SUI_MAXLENACTIVEUPD + 1 );

  if ( SendPrivateMessage(
PMI_REQACTIVEUPGRADE, 0, NULL ) !=
ERR_SUCCESS )
   return ( ERR_INTERNAL );

  TRACE( "NOTICE: Sent Private Message to
determine the name of
the active upgrade on the Host.\r" );

  if ( ( iActiveUpdateThreadIdx =
GetTempEventNum() ) ==
ERR_INTERNAL )
   return ( ERR_INTERNAL );

  AddThread( iActiveUpdateThreadIdx,
WaitForActiveUpdate, NULL,
SMD_MANYTIMES,
        FALSE, FLU_PRIMSGPOLLFREQ,
FLU_MAXRETRY );


 }
 else
 {
  TRACE( "ERROR: Flash not supported\r" )
  return ( ERR_INTERNAL );
 }

 return ( ERR_SUCCESS );
}

void WaitForActiveUpdate( void )
{
 int iRetryLimit = GetRetryLimit(
iActiveUpdateThreadIdx );

 if ( *GetNameActiveUpdate() == NULL )
 {
  if ( iRetryLimit < FLU_MAXACTUPDREQ )

   DelThread( iActiveUpdateThreadIdx );
  else if ( iRetryLimit % FLU_MODACTUPDREQ
== 0 )
  {
   if ( SendPrivateMessage(
PMI_REQACTIVEUPGRADE, 0, NULL ) !=
ERR_SUCCESS )
    DelThread( iActiveUpdateThreadIdx );
  }
 }
 else
  DelThread( iActiveUpdateThreadIdx );
}

int SetPathFlashFile( LPSTR szNewPathFlashFile )
{
 if ( szPathFlashFile == NULL )
  return ( ERR_INTERNAL );
 PCB_BEGINCRITICAL:
 fmem_cp( ( LPVOID )szNewPathFlashFile, (
LPVOID
)szPathFlashFile,
       fstr_len( szNewPathFlashFile ) + 1 );
 PCB_ENDCRITICAL;

 return ( ERR_SUCCESS );
}

char *GetPathFlashFile( void )
{
 return ( szPathFlashFile );
}

int SetTotalFlashFiles( int iNewTotalFlashFiles )
{
 iTotalFlashFiles = iNewTotalFlashFiles;

 return ( ERR_SUCCESS );
}

int GetTotalFlashFiles( void )
{
 int iReturn.

 PCB_BEGINCRITICAL,
 iReturn = iTotalFlashFiles,
 PCB_ENDCRITICAL;

 return ( iReturn );
}

int SetNameActiveUpdate( LPSTR
szNewActiveUpdate )
{
 if ( szNameActiveUpdate == NULL )
  return ( ERR_INTERNAL );

 PCB_BEGINCRITICAL;
 if ( szNewActiveUpdate == NULL )
  *szNameActiveUpdate = ' ';
 else
  fmem_cp( ( LPVOID )szNewActiveUpdate, (
LPVOID
)szNameActiveUpdate,
        SUI_MAXLENACTIVEUPD );
 PCB_ENDCRITICAL;

 return ( ERR_SUCCESS );
}

char *GetNameActiveUpdate( void )
{
 if ( szNameActiveUpdate == NULL )
  return ( szNullStr );
 else
  return ( szNameActiveUpdate );
}

int SetTmpFilePercent( int iNewPercent )
{
 iTmpFilePercent = iNewPercent;

 return ( ERR_SUCCESS );
}

int GetTmpFilePercent( void )
{
 int iReturn,

 PCB_BEGINCRITICAL;
 iReturn = iTmpFilePercent,
 PCB_ENDCRITICAL;

 return ( iReturn );
}

FLASHUPDATESTATES CheckFlashPowerState(
void )
{
 LONG lBatteryInfo = GetBatteryInfo();

 if ( lBatteryInfo ==
SBS_GETBATTERYINFOERROR )
  return ( FLU_GETBATTERYINFOERROR );

 if ( ( lBatteryInfo & SBS_ACDCSTATEMASK ) !=
SBS_ACDCSTATEMASK
)
  return ( FLU_NOTONACERROR );

 if ( ( lBatteryInfo &
SBS_BATTERYATTACHEDMASK ) !=
SBS_BATTERYATTACHED )
  return ( FLU_BATNOTATTACHEDERROR );
```

```
 if ( HIBYTE( LOWORD( ( lBatteryInfo &
SBS_BATTERYCAPACITYMASK )
) ) < SBS_BATTERYFLASHMINCAP )
   return ( FLU_BATCAPTOOLOWERROR );

 return ( FLU_NOFLUSTATE );
}

#if defined( _MSC_VER )
#pragma warning( default : 4704 )
#endif
Copr 1995 Zenith Data Systems Corp.
#include "cr.h"
#include "sio.h"
#include "spawn.h"
#include "sm.h"

#if defined( _MSC_VER )
#pragma warning( disable : 4704 )
#endif


TIMEOUT timeoutStatus = TIMEOUT_AVAILABLE;


static void TimeoutFire ( void );


static DOSBUSYCB fnDosBusyCallBack = NULL;
static VIDBUSYCB fnVidBusyCallBack1 = NULL;
static VIDBUSYCB fnVidBusyCallBack2 = NULL
static MODALMSGBOXCB fnMsgBoxCallBack =
NULL;
static int iTempThreadIdx =
SMD_NOACTIVETHREAD
static int iOkThreadIdx;
static int iVideoBusyThreadIdx =
SMD_NOACTIVETHREAD
static int iSpkrThreadIdx =
SMD_NOACTIVETHREAD
BYTE aDummyFCB1[] = "\0          ";
BYTE aDummyFCB2[] = "\0          ";

static char *sVideoStateBuff;


void GetForegroundRegs( struct REGW *InRegs )
{
  register struct sreg *s;
  register struct REGW *r;
  struct glob_stk far *p;

  r = InRegs.
  s = _int_frame;

  r->es = s->es;
  r->bp = s->bp;
  r->di = s->di;
  r->si = s->si;
  r->cx = s->cx;

  *(word*)&p = s->saved_sp;
  *(((word*)&p)+1) = s->saved_ss;

  r->ds = p->ds;
  r->dx = p->dx;
  r->bx = p->bx;
  r->ax = p->ax;
}

void SetForegroundRegs( struct REGW *OutRegs )
{
  struct sreg *s;
  struct REGW *r;
  struct glob_stk far *p;

  r = OutRegs;
  s = _int_frame;

  s->es = r->es;
  s->bp = r->bp.
  s->di = r->di.
  s->si = r->si,
  s->cx = r->cx

  p = ( struct glob_stk far * )MK_FP( s->saved_ss,
s->saved_sp ).


  p->ds = r->ds.
  p->dx = r->dx
  p->bx = r->bx:
  p->ax = r->ax:
}

#if !defined( PROD )
void Trace( char *szOutStr )
{
  REG_W InRegs. OutRegs;

  fil_chr( ( NPSTR )&InRegs, 0, sizeof( REG_W ) );

  InRegs.ax = SID_FUNCNUM | SID_OUTSTRING;
  InRegs.si = SID_SISIG;
  InRegs.di = SID_DISIG;
  InRegs.ds = SEG( szOutStr );
  InRegs.dx = OFF( szOutStr );

  intn( &InRegs, &OutRegs, SID_INTNUM );
}
#endif

void CallAPIFunction( APIFUNC aAPIFuncTable[] )
{
  APIFUNCPTR fpAPIFunction;
  struct REGW CallerRegs;

  PCB_BEGINCRITICAL
  GetForegroundRegs( &CallerRegs );
  PCB_ENDCRITICAL

  fpAPIFunction = ( APIFUNCPTR )GetAPIFunction(
aAPIFuncTable,
&CallerRegs ).

  if ( fpAPIFunction != NULL )
    ( *fpAPIFunction )( &CallerRegs );
  else
  {
    CallerRegs.ax = ( WORD
)ERR_NOTSUPPORTED;
    SetForegroundRegs( &CallerRegs );
  }
}

NEARPROC GetAPIFunction( APIFUNC
aAPIFuncTable[], struct REGW
*pCallerRegs )
{
  WORD wFuncCode = pCallerRegs->ax & 0x7FFF;
  int iFuncIdx = 0.

  if ( aAPIFuncTable == NULL )
    return ( NULL );

  while ( TRUE )
  {
    if ( wFuncCode == aAPIFuncTable[ iFuncIdx
].wFuncCode )
      return( aAPIFuncTable[ iFuncIdx ].fpAPIFunc );

    if ( aAPIFuncTable[ ++iFuncIdx ].wFuncCode ==
0 &&
        aAPIFuncTable[ iFuncIdx ].fpAPIFunc ==
NULL )
      return ( NULL );
  }
}

int ErrorBeep( void )
{
  sound( SMU_ERRORFREQ, SMU_ERRORDUR );

  if ( iSpkrThreadIdx >= 0 )
  {
    TRACE( "NOTICE: ErrorBeep() reentered\r" );
    return ( ERR_SUCCESS );
  }

  if ( ( iSpkrThreadIdx = GetTempEventNum() ) < 0 )
    return ( ERR_INTERNAL );

  AddThread( iSpkrThreadIdx, DoSpkrRestore,
NULL, SMD_ONETIME,
FALSE, SHC_SPKRPOLLFREQ,
          0 );

  return ( ERR_SUCCESS );
}

void DoSpkrRestore( void )
{
  DelThread( iSpkrThreadIdx );

  iSpkrThreadIdx = SMD_NOACTIVETHREAD;

  TRACE( "NOTICE: Speaker frequency restored for
PDV" );

  SetPenSpkFreq();
}

int SMDosBusy( DOSBUSYCB fnCallBack )
{
  if ( iTempThreadIdx >= 0 )
  {
    TRACE( "ERROR: SMDosBusy was reentered\r"
);
    DEBUG_BREAK;
    return ( 0 );
  }

  if ( ( iTempThreadIdx = GetTempEventNum() ) < 0
)
    return ( ERR_INTERNAL );

  fnDosBusyCallBack = fnCallBack;

  AddThread( iTempThreadIdx, SMCheckDosBusy,
NULL, SMD_MANYTIMES,
FALSE, DBT_POLLFREQ,
          DBT_MAXRETRY );

  return ( ERR_SUCCESS );
}

void SMCheckDosBusy( void )
{
  BOOL fMadeDosBusy = FALSE;

  if ( *_isr_flg_ptr & ~SMD_SCHEDULERS )
    return;

  if ( dos_busy( 0 ) )
  {
    if ( GetRetryLimit( iTempThreadIdx ) == 0 )
    {
      TRACE( "ERROR: Timed out waiting for DOS
busy\r" );
      DEBUG_BREAK.
    }
    else
      return;
  }

  DelThread( iTempThreadIdx );
  iTempThreadIdx = SMD_NOACTIVETHREAD;

  ( *fnDosBusyCallBack )();
}

int SMVideoBusy( VIDBUSYCB fnCallBack )
{
  if ( fnVidBusyCallBack1 != NULL )
  {
    if ( fnVidBusyCallBack2 != NULL )
    {
      TRACE( "NOTICE: SMVideoBusy() reentered
more than twice,
waiting for SUI video busy\r" );
      DEBUG_BREAK,
      return ( ERR_INTERNAL );
    }
    else
    {
      TRACE( "NOTICE: SMVideoBusy() reentered
waiting for SUI
video busy\r" );
      fnVidBusyCallBack2 = fnCallBack;
    }
  }
  else
    fnVidBusyCallBack1 = fnCallBack;

  if ( iVideoBusyThreadIdx ==
SMD_NOACTIVETHREAD )
  {
    if ( ( iVideoBusyThreadIdx =
GetTempEventNum() ) < 0 )
      return ( ERR_INTERNAL );

    AddThread( iVideoBusyThreadIdx,
SMCheckVideoBusy, NULL,
SMD_POLLED, FALSE,
          SCS_VIDBLOCKPOLLFREQ, 0 );
  }

  return ( ERR_SUCCESS );
}

void SMCheckVideoBusy( void )
{
  static BYTE nCntVideoBlocked = 0;

  if ( !GetVideoBlocked() )
  {
    if ( ++nCntVideoBlocked >= 3 )
    {
      nCntVideoBlocked = 0;
      DelThread( iVideoBusyThreadIdx );
      iVideoBusyThreadIdx =
SMD_NOACTIVETHREAD;
      TRACE( "NOTICE: SUI video not busy, notify
the threads!\r"
);

      if ( fnVidBusyCallBack1 != NULL )
      {
        ( *fnVidBusyCallBack1 )();
        fnVidBusyCallBack1 = NULL;
      }

      if ( fnVidBusyCallBack2 != NULL )
      {
        ( *fnVidBusyCallBack2 )();
        fnVidBusyCallBack2 = NULL;
      }
    }
  }
  else
    nCntVideoBlocked = 0;
}

void SetReentrancy( BOOL fEnable )
{
  static BYTE bOldIsrFlg;

  if ( !fEnable )
  {
    PCB_BEGINCRITICAL;
    bOldIsrFlg = *_isr_flg_ptr;
    *_isr_flg_ptr = SMD_NOREENTRANCE;
    PCB_ENDCRITICAL;
  }
  else
  {
    PCB_BEGINCRITICAL;
    *_isr_flg_ptr = bOldIsrFlg.
    PCB_ENDCRITICAL:
  }
}


int RestoreVideoMode( void )
{

  if ( sVideoStateBuff == NULL )
    return ( ERR_INTERNAL );


  VideoState( sVideoStateBuff,
SHC_VIDEOHARDWARE |
SHC_VIDEODATAAREA | SHC_COLORPALREGS,
          SHC_RESTOREVIDEO );

  free( sVideoStateBuff );

  sVideoStateBuff = NULL;

  return ( ERR_SUCCESS );


}

WORD SetVideoMode( BYTE nRequestedMode )
{
  int AX;

  AX = MAKEWORD( nRequestedMode, 0 );
  Int10( AX );

  return ( ERR_SUCCESS );
}

int VideoState( char *sVidBuff, char nDataType, char
nOperation )
{
  REG_W InRegs, OutRegs;

  fil_chr( ( NPSTR )&InRegs, 0, sizeof( REG_W ) );

  if ( nOperation != SHC_SIZEOFBUFF )
  {
    if ( sVidBuff != NULL )
    {
      InRegs.es = SEG( sVidBuff );
      InRegs.bx = OFF( sVidBuff );
    }
    else
      return ( ERR_INTERNAL );
  }
```

```
 InRegs cx = ( int )nDataType:
 InRegs.ax = MAKEWORD( nOperation,
SHC_VIDSTATEFUNC );

 intn( &InRegs, &OutRegs. 0x10 );

 if ( nOperation == SHC_SIZEOFBUFF )
  return ( OutRegs.bx ),
 else
  return ( ERR_SUCCESS );
}

int JimExecr char szProgName[], char
sCmdLineParm[] )
{
 int iReturn = 0:
 EXECPARMS ep.
 BYTE aCmdLineTail[] = "\0\r":
 WORD wSegEP, wOffEP, wSegPN, wOffPN;
 WORD wOldPSP;

 ep.wSegEnv = 0;

 if ( sCmdLineParm == NULL )
 {
  ep wOffCmdLineTail = OFF( aCmdLineTail ).
  ep.wSegCmdLineTail = SEG( aCmdLineTail ):
 }
 else
 {
  ep wOffCmdLineTail = OFF( sCmdLineParm ),
  ep wSegCmdLineTail = SEG( sCmdLineParm );
 }

 ep.wOffFCB1 = OFF( aDummyFCB1 ):
 ep wSegFCB1 = SEG( aDummyFCB1 );
 ep.wOffFCB2 = OFF( aDummyFCB2 );
 ep.wSegFCB2 = SEG( aDummyFCB2 );

 wSegEP = SEG( &ep );
 wOffEP = OFF( &ep ):
 wSegPN = SEG( szProgName ):
 wOffPN = OFF( szProgName ),

 wOldPSP = set_my_psp().

 AX( SMD_DOSEXEC ),
 ES( wSegEP ):
 BX( wOffEP ):
 DS( wSegPN ),
 DX( wOffPN ),

 _asm
 {
  int 21h
  jnc success
  mov iReturn.ax
 }:

success:
 restore_psp( wOldPSP ):
 return ( iReturn ):
}

WORD GetFreeMCB( WORD wNumPara )
{
 REG_W InRegs, OutRegs;
 WORD wReturn = 0, wFlags:

 fil_chr( ( NPSTR )&InRegs, 0, sizeof( REG_W ) ):

 InRegs ax = SMD_DOSALLOCMEM:
 InRegs.bx = wNumPara;

 PCB_BEGINCRITICAL;

 wFlags = intn( &InRegs, &OutRegs, SMD_DOSINT
).

 PCB_ENDCRITICAL;

 if ( !( wFlags & GEN_CARRYFLAG ) )
  return ( OutRegs.ax );
 else
  return ( 0 ):
}

int SetFreeMCB( WORD wSegment )
{
 REG_W InRegs, OutRegs,
 WORD wFlags,

 fil_chr( ( NPSTR )&InRegs, 0. sizeof( REG_W ) );

 InRegs ax = SMD_DOSFREEMEM:
 InRegs.es = wSegment:

 PCB_BEGINCRITICAL;

 wFlags = intn( &InRegs. &OutRegs SMD_DOSINT
);

 PCB_ENDCRITICAL;

 if ( !( wFlags & GEN_CARRYFLAG ) )
  return ( ERR_SUCCESS ):
 else
  return ( OutRegs.ax ):
}

int StuffKeyStr( char *szStr )
{
 char *cKey = szStr;

 if ( strlen( szStr ) > SHC_MAXLENKBBUFF )
  return ( ERR_INTERNAL ):

 while ( TRUE )
 {
  if ( *cKey )
   stuff_key( MAKEWORD( *cKey++, 0 ) );
  else
   return ( ERR_SUCCESS );
 }
}


BOOL IsGetFunction( struct REGW *CallerRegs )
{
 return ( CallerRegs->ax & 0x8000 ),
}

char *ParseForFileName( char *szPathName )
{
 int iChar;

 for ( iChar = strlen( szPathName ) - 1; iChar >= 0;
--iChar )
 {
  if ( szPathName[ iChar ] == '\\' )
   return ( szPathName + iChar + 1 );
 }

 return ( NULL ):
}

BOOL IsNodeAddressBlank( char *szNodeAddress )
{

 return ( strlen( szNodeAddress ) == 0 ):



}

int DoModalMsgBox( MODALMSGBOXCB
fnCallBack, int iMsgBoxTimeOut )
{
 if ( ( fnMsgBoxCallBack = fnCallBack ) == NULL )
  return ( ERR_INTERNAL ):

 if ( ( iOkThreadIdx = GetTempEventNum() ) <
ERR_SUCCESS )
  return ( ERR_INTERNAL );

 SetMsgBoxReturnCode( SUI_NOBUTTONS );

 if ( iMsgBoxTimeOut > 0 )
  AddThread( iOkThreadIdx, WaitForOK. NULL,
SMD_MANYTIMES,
FALSE, SUI_MSGBOXPOLLFREQ,
          iMsgBoxTimeOut ):
 else
  AddThread( iOkThreadIdx, WaitForOK, NULL,
SMD_POLLED, FALSE,
SUI_MSGBOXPOLLFREQ,
          0 ):

 return ( ERR_SUCCESS );
}

void WaitForOK( void )
{
 int iButtonCode;

 if ( ( iButtonCode = GetMsgBoxReturnCode() ) !=
SUI_NOBUTTONS )
 {
  DelThread( iOkThreadIdx ):
  ( *fnMsgBoxCallBack )( iButtonCode );
 }
 else if ( GetThreadType( iOkThreadIdx ) ==
SML_MANYTIMES )
 {
  if ( GetRetryLimit( iOkThreadIdx ) == 0 )
  {
   DelThread( iOkThreadIdx );
   ( *fnMsgBoxCallBack )( SUI_NOBUTTONS );
  }
 }
}

int AbsToZero( int iValue )
{
 return ( iValue < 0 ? 0 : iValue );
}

TIMEOUT TimerManager (TIMEOUT_FLAG
fTimeout, int iThreadIdx, long
lTicks)
{
  static int  iTimeoutThreadIdx;
  static int  iThreadInUseIdx = -1;
  TIMEOUT  timeoutReply;

  switch (fTimeout)
  {
    case TF_SET:
    If (timeoutStatus == TIMEOUT_AVAILABLE)
    {
      if ( ( iTimeoutThreadIdx =
GetTempEventNum() ) !=
ERR_INTERNAL )
      {
        AddThread( iTimeoutThreadIdx,
TimeoutFire, NULL,
SMD_ONETIME, FALSE,
              lTicks, 0 ):
        timeoutStatus = TIMEOUT_RUNNING.
        iThreadInUseIdx = iThreadIdx;

        timeoutReply = timeoutStatus:
      }
      else
        timeoutReply = TIMEOUT_ERROR:
    }
    break;

    case TF_RESET:
    if (iThreadInUseIdx == iThreadIdx)
    {
      timeoutStatus = TIMEOUT_AVAILABLE;
      timeoutReply = timeoutStatus,
      iThreadInUseIdx = -1;
    }
    else
      timeoutReply = TIMEOUT_NOTAVAILABLE;
    break;

    case TF_CHECK:
    if (iThreadInUseIdx == iThreadIdx ||
timeoutStatus ==
TIMEOUT_AVAILABLE)
      timeoutReply = timeoutStatus;
    else
      timeoutReply = TIMEOUT_NOTAVAILABLE;
    break:
  }

  return timeoutReply,
}

static void TimeoutFire ( void )
{
  timeoutStatus = TIMEOUT_FIRED:
}

#if defined( _MSC_VER   )
#pragma warning( default : 4704 )
#endif



Copr. 1995 Zenith Data Systems Corp.
#include "cr.h"
#include "sio.h"
#include "spawn.h"
#include "sm.h"

#if defined( _MSC_VER   )
#pragma warning( disable : 4704 )
#endif

static ZDSTRAPREC VIDTrapRec;
static char nXCharRes = -1;
static char nYCharRes = -1;
static int  iYScreenRes = -1;
static iCurrVidMode = 0:

static iPenNotifyThreadIdx = -1,

void InitVIDTrapRec( void )
{
 fil_chr( ( NPSTR )&VIDTrapRec, 0, sizeof(
ZDSTRAPREC ) ):

 VIDTrapRec.tr.tr_int = SBS_VIDINTNUM;
 VIDTrapRec.tr.tr_asm_srv =
CRU_ONBUSYOLDINT:

 strcpy( VIDTrapRec.szSMAfterSignature,
szSMSignature );
}

TRAPREC *GetVIDTrapRec( void )
{
 return ( &VIDTrapRec.tr ):
}

char GetYCharRes( void )
{
 if ( nYCharRes > 0 )
  return ( nYCharRes );
 else
  return ( SCS_HEIGHTOFTEXTCHAR );
}

char GetXCharRes( void )
{
 if ( nXCharRes > 0 )
  return ( nXCharRes ),
 else
  return ( SCS_WIDTHOFTEXTCHAR );
}

int GetXScreenRes( int iVideoMode )
{
 switch ( iVideoMode )
 {
  case 0x00:
  case 0x01:
   return ( 320 ):

  case 0x02:
  case 0x03:
   return ( 640 ):

  case 0x04:
  case 0x05.
   return ( 320 ):

  case 0x06:
   return ( 640 ):

  case 0x07
   return ( 720 ),

  case 0x08:
  case 0x09:
  case 0x0A:
  case 0x0B:
  case 0x0C:
   return ( ERR_INTERNAL ):

  case 0x0D:
   return ( 320 ),

  case 0x0E:
  case 0x0F:
  case 0x10:
  case 0x11:
  case 0x12:
   return ( 640 ):

  default:
   return ( ERR_INTERNAL ):
 }
}

int GetYScreenRes( int iVideoMode )
{
 if ( iVideoMode <= SBS_HIGHTEXTVIDMODE &&
iYScreenRes > 0 )
  return ( iYScreenRes ):
 else
 {
  switch ( iVideoMode )
  {
   case 0x00:
   case 0x01:
   case 0x02:
   case 0x03:
   case 0x04:
   case 0x05:
   case 0x06:
    return ( 400 ):

   case 0x07.
    return ( 350 ):

   case 0x08:
   case 0x09:
   case 0x0A:
   case 0x0B:
   case 0x0C:
    return ( ERR_INTERNAL ):
```

```
    case 0x0D:
    case 0x0E:
      return ( 200 );

    case 0x0F:
    case 0x10:
      return ( 350 );

    case 0x11:
    case 0x12:
      return ( 480 );

    default:
      return ( ERR_INTERNAL );
  }
 }
}

int GetCurrVidMode( void )
{
 return ( iCurrVidMode );
}

BOOL VIDTrapService( void )
{
 struct REGW Regs;
 BOOL fReturn = TRUE;

 GetForegroundRegs( &Regs );

 switch ( HIBYTE( Regs.ax ) )
 {
  case SBS_SETVIDEOMODEFUNCS:
    TRACE( "NOTICE: Set video mode
intercepted\r" );

    iCurrVidMode = LOBYTE( Regs.ax ) &
~SBS_VIDMODEMASK;


    AfterModePenNotify();
    break;

  case SBS_CHARACTERGENFUNCS:
    TRACE( "NOTICE: Set text font after mode set
intercepted\r"
);

    if ( iCurrVidMode <=
SBS_HIGHTEXTVIDMODE )
      AfterModePenNotify();
    break;

  default:
    return ( FALSE );
 }

 return ( TRUE );
}

void AfterModePenNotify( void )
{
 if ( iPenNotifyThreadIdx >= 0 )
   return;

 if ( ( iPenNotifyThreadIdx = GetTempEventNum() )
< 0 )
   return;

 AddThread( iPenNotifyThreadIdx,
WaitForPenNotify, NULL,
SMD_ONETIME, FALSE,
          SBS_PENNOTIFYPOLLFREQ, 0 );
}

void WaitForPenNotify( void )
{
 char FAR *pNumScreenRows = ( char FAR *
)SHC_ADDSCREENROWS;
 char FAR *pNumCharScans = ( char FAR *
)SHC_ADDCHARSCANLINES;

 DelThread( iPenNotifyThreadIdx );
 iPenNotifyThreadIdx = -1;

 if ( iCurrVidMode <= SBS_HIGHTEXTVIDMODE )
 {
   nYCharRes = *pNumCharScans;
   iYScreenRes = nYCharRes * (
*pNumScreenRows + 1 );
 }
 else
   iYScreenRes = -1;

 NotifyVideoMode( iCurrVidMode );
}

#if defined( _MSC_VER )
#pragma warning( default : 4704 )
#endif


Copr. 1995 Zenith Data Systems Corp.

MAX_STK_TOP   =   01780h

CMD_LINE_SZ   =   80h
MIN_STK_SZ    =   100h

_TEXT    segment   byte public 'CODE'
_TEXT    ends
_VTX segment byte public 'CODE'
_VTX ends
_ITEXT   segment   byte public 'CODE'
_ITEXT   ends
_ZTEXT   segment   byte public 'CODE'
_ZTEXT   ends
_FITEXT SEGMENT PARA PUBLIC 'CODE'
_FITEXT ENDS
_FXDATA   segment word public 'DATA'
_FXDATA   ends
_FDATA    segment word public 'DATA'
_FDATA    ends
_VDATA    segment word public 'DATA'
_VDATA    ends
_RDATA    segment word public 'DATA'
_RDATA    ends
_IDATA    segment word public 'DATA'
_IDATA    ends
_DATA     segment word public 'DATA'
_DATA     ends
_BSS segment word public 'BSS'
_BSS ends
_BSSEND segment byte public 'BSSEND'
_BSSEND ends


CGROUP    group _TEXT,_VTX,_ITEXT,_ZTEXT
DGROUP    group
_FDATA,_FXDATA,_VDATA,_RDATA,_IDATA,_DAT
A,_BSS,_BSSEND
    assume
cs:CGROUP,ds:DGROUP,ss:DGROUP

_STACK  SEGMENT WORD STACK 'STACK'
_STACK  ENDS

__acrtused   =   09876h
public __acrtused


dly     MACRO    n
    REPT n
       jmp  short $+2
    ENDM
       ENDM

inc2    MACRO    reg
       inc  reg
       inc  reg
       ENDM

dec2    MACRO    reg
       dec  reg
       dec  reg
       ENDM

OP_RET   =   0C3h
OP_CALN  =   0E8h

get  MACRO    seg_reg
    push ss
    pop  seg_reg
    ENDM


_DATA    segment word public 'DATA'
extrn
data_beg:byte,_nul_ptr:byte,fdata_beg:byte,fxdata_b
eg:byte
extrn vdata_beg:byte,rdata_beg:byte,bss_top:byte

public __cdata,__ccode
public __dummy_iret,exit_rdy,put_iret,__isr_flg_ptr
__isr_flg_ptr  dw   offset CGROUP:__isr_flg
__ccode        dw   CGROUP
__cdata        dw   DGROUP


put_iret  dw   offset CGROUP:__dummy_iret
_DATA    ends

_IDATA   segment word public 'DATA'
__heap        dw   offset DGROUP:bss_top
__env         dw   0
_cmd_line dw   0
_icode_beg    dw   0
_idata_end    dw   0
vtx_size  dw   0
vtx_target    dw   0
vtx_ovl       dw   offset CGROUP:__dummy_ret
exit_vec  dw   offset CGROUP:__dummy_ret
target_data   dw   0
source_data   dw   0
data_gap  dw   0
res_size  dw   0
exit_rdy  dw   offset CGROUP:__dummy_ret
res_enabled   db   0
extrn _config_block:byte
extrn __tsr_name:byte
extrn idata_beg:byte
extrn __max_stack:word
public res_enabled,exit_rdy,__heap,__env
public
target_data,source_data,data_gap,res_size,exit_vec
public
_cmd_line,_icode_beg,_idata_end,vtx_size,vtx_target
,vtx_ovl

_IDATA ends

_BSS segment word public 'BSS'
extrn bss_beg:byte
_resident db   2 dup(?)
__my_psp  dw   1 dup(?)
psp_tbl       dw   1 dup(?)

__sint_list   dw   1 dup(?)
_res_stack_beg dw   1 dup(?)
_res_free_stack    dw   1 dup(?)
public _res_stack_beg,_res_free_stack,__sint_list

public __my_psp,_cmd_line,_resident,psp_tbl
_BSS ends


_ITEXT   segment   byte public 'CODE'
    ASSUME
CS:CGROUP,DS:DGROUP,SS:DGROUP

extrn isr_psp:word,isr_cblk:byte
extrn vtx_beg:byte
extrn itext_beg:byte
extrn gtx_beg:byte
extrn code_top:byte

public set_cmem
set_cmem  proc near
        cld
        pop  si
        mov  dx,ds
        mov  ax,word ptr ds:[2ch]
        mov  bp,DGROUP
        mov  ds,bp
        mov  es,bp
        mov  [__env],ax
        mov  cx,offset DGROUP:bss_top
        mov  di,offset DGROUP:bss_beg
        sub  cx,di
        xor  ax,ax
        mov  cs:[__lim_ctl],ax
        shr  cx,1
        rep  stosw
        mov  [__my_psp],dx


        mov  es,dx
        mov  bx,MAX_STK_TOP
        mov  ax,[__max_stack]
        add  ax,di
        jnc  scm0
scm0_1:       mov  ax,bx
scm0:         cmp  ax,bx
        ja   scm0_1
        mov  cl,4
        shr  ax,cl
        add  ax,CMD_LINE_SZ/16
        xchg ax,bx
        add  bx,bp
        sub  bx,dx
        mov  ah,4Ah
        int  21h
        jnc  scm1
        mov  ah,4Ah
        int  21h
        jc   scm_err

scm1:         mov  es,bp
        add  bx,dx
        sub  bx,bp
        shl  bx,cl
        sub  bx,CMD_LINE_SZ
        mov  [_cmd_line],bx
        cli
        mov  ss,bp
        mov  sp,bx
        sti
        cmp  sp,offset
DGROUP:bss_top+MIN_STK_SZ
        jb   scm_err
        add  dx,8
        mov  cs:[isr_psp],dx
        mov  [psp_tbl],dx
        mov  ax,offset CGROUP:gtx_beg
        sub  ax,offset CGROUP:vtx_beg
        mov  [vtx_size],ax
        jmp  si

scm_err: mov  ax,4c01h
        int  21h

set_cmem  endp

_FITEXT   segment
assume cs:_FITEXT

public get_cmd_arg
get_cmd_arg    proc far
        cld


        mov  di,[_cmd_line]
        mov  ds,[__my_psp]
        get  es
        mov  si,80h
        mov  cx,7fh
        and  cl,[si]
        inc  si
        rep  movsb
        xor  ax,ax
        stosb


        push ds
        pop  es
        get  ds
        mov  di,102h
        mov  si,offset DGROUP:_config_block+2
        movsw
        movsw
        movsw


        mov  cl,32
        mov  di,5ch
        mov  si,offset DGROUP:__tsr_name
        rep  movsb

        ret
get_cmd_arg    endp
_FITEXT   ends

assume cs:CGROUP

init_fdata:   cld


        mov  si,offset DGROUP:fxdata_beg
        mov  di,offset DGROUP:vdata_beg
ifd_fx:       cmp  si,offset DGROUP:fdata_beg
        jae  ifd1
        lodsw
        xchg ax,bx
        lodsw
        sub  ax,bx
        mov  cs:[bx-2],ax
        mov  byte ptr cs:[bx-3],OP_CALN
        jmp  ifd_fx

public init_rdata
init_rdata:   mov  si,offset DGROUP:rdata_beg
        mov  di,offset DGROUP:idata_beg

ifd1:         sti
        cld
        cmp  si,di
        jae  ifd_ex
        lodsw
        mov  word ptr [si-2],offset
CGROUP:__dummy_ret
        push si
        push di
        call ax
        pop  di
        pop  si
        get  ds
        jmp  ifd1

ifd_ex:       ret

_TEXT   SEGMENT
public start
start:        jmp  start1
```

```
public go_res
go_res:     rep movsb
      int 21h
__dummy_ret:  ret
__dummy_iret:  iret
public __dummy_ret,__dummy_iret
extrn __isr_flg:byte,__lim_ctl:word
_TEXT    ENDS


extrn isr_data:word
extrn _main:near
start1:      call set_cmem
      call get_cmd_arg
      call init_fdata
      call _main
      push ax
      mov byte ptr cs:[__isr_flg],07fh
      mov es,[__env]
      mov ah,49h
env_patch label word
public env_patch
      int 21h
      cmp [res_enabled],1
      jz  ist2

ist1      xor bx,bx
      mov cs:[bx],bx
      call word ptr [exit_rdy]
      pop ax
      mov ah,4ch
      int 21h
public _exit
_exit:      pop ax
      jmp short ist1


ist2:      mov ax,[__heap]
      add ax,0fh
      mov cl,4
      shr ax,cl
      add ax,DGROUP
      sub ax,[__my_psp]
      xchg ax,dx


      mov si,offset DGROUP:data_beg
      mov ax,_DATA
      mov bp,[_idata_end]
      inc2 bp
      sub bp,offset DGROUP:data_beg
      jbe ist3
      shr bp,cl
      add ax,bp
      shl bp,cl
      add si,bp

ist3:      mov bx,offset CGROUP:vtx_beg
      mov bp,[vtx_size]
      mov di,[_icode_beg]
      or di,di
      jnz ist3_1
      mov di,bx
ist3_1:      cmp di,bx
      jbe ist3_2
      mov di,bx
ist3_2:      mov [vtx_target],di
      add di,bp
      add di,0fh
      shr di,cl
      mov bx,cs
      add bx,di

ist4:      mov [target_data],bx
      mov [source_data],si
      sub ax,bx
      mov [data_gap],ax
      sub dx,ax
      mov [res_size],dx
      sub [__cdata],ax
      mov byte ptr [_resident],0ffh
      call init_rdata


      cli
      call word ptr [vtx_ovl]
      cli



      nop
      xchg bx,bx
fx_graph label    word


      nop
      xchg bx,bx
fx_fmem_mv    label    word

      nop
      xchg bx,bx
fx_ega_gr label word



      nop
      xchg bx,bx
fx_uptraps    label word



      nop
      xchg bx,bx
fx_spw_app    label    word



      nop
      xchg bx,bx
fx_swptk label word




      nop
      xchg bx,bx
fx_spw_fix    label    word

      mov ax,[__cdata]
      mov cs:[isr_data],ax
      mov es,[target_data]
      mov si,[source_data]
      mov dx,[res_size]
      xor di,di
      mov ax,[__heap]
      add ax,0fh
      and al,0f0h
      mov [__heap],ax
      xchg ax,cx
      sub cx,si
      cld
      cli
      mov cs:[__isr_flg],0
      pop ax
      mov ah,31h
      nop
      xchg bx,bx
fx_lim_res    label word
      call go_res
fx_go_res label word

public
fx_go_res,fx_lim_res,fx_spw_fix,fx_spw_app,fx_uptra
ps,fx_graph
public fx_fmem_mv,fx_ega_gr,fx_swptk

_ITEXT    ends

end start
Copr. 1995 Zenith Data Systems Corp.
tLISTBOXENTRY struc
lpszEntry dd 0
cAttribute db 0
ends

MB_LEFTJUSTIFIED equ 0
MB_CENTERED equ 1
MB_RIGHTJUSTIFIED equ 2

PENDRIVER_INTERRUPT equ 67h
SM_FUNCTION_INTERRUPT equ 68h

SM_GET_KEYBOARD_STATUS equ 062h
SM_GET_USER_INTERFACE_LANGUAGE equ
056h
SM_SET_ACTIVE_STATUS equ 060h
SM_GET_INITIAL_SCREEN equ 08050h
SM_GET_ABOUT_DIALOG equ 063h
SM_GET_NEXT_CREDITS_DIALOG equ 64h
SM_UPDATE_DIMENSIONS equ 052h
SM_REQUEST_UNLOAD equ 08053h
SM_REPORT_BUTTON_CLICKED equ 8055H
SM_CALIBRATE_UPPERLEFT equ 0ch
SM_CALIBRATE_LOWERRIGHT equ 800Ch
SM_CANCEL_CALIBRATION equ 00eh
SM_REBOOT_HOST equ 011h
SM_SET_KEYSTROKE equ 061h
SM_REQUEST_ACTIVE_FLASH_UPGRADE equ
12h
SM_PERFORM_FLASH_UPDATE equ 13h
SM_GET_CONNECTION_STATUS equ 22h
SM_GET_HOST_LIST_STATUS equ 21h
SM_UPDATE_HOST_LIST equ 20h
SM_GET_PASSWORD_STATUS equ 25h
SM_REQUEST_CONNECTION equ 23h
SM_REQUEST_DISCONNECTION equ 8023h
SM_ABORT_REQUEST_CONNECTION equ 24h

SM_TEST_FUNCTION equ 0FFFFh

UI_REQUEST_CLOSURE equ 053h
UI_REQUEST_DISPLAY equ 051h
UI_SHOW_MESSAGE_BOX equ 055h
UI_HIDE_MESSAGE_BOX equ 056h
UI_CALIBRATION_COMPLETE equ 00h
UI_FLASH_UPDATE_PERCENTAGE equ 14h
UI_GET_SUI_VERSION_NUMBER equ 69h
GET_HOST_LIST_STATUS    equ 021h


RES_NO_SCREEN        EQU 0
RES_OSK_ALPHA        EQU 1
RES_OSK_NUM          EQU 2
RES_OSK_FULL         EQU 3
RES_OSK_BIG          EQU 4
RES_OSK_BIG_ALPHA    EQU 5
RES_OSK_BIG_NUM      EQU 6
RES_OSK_BIG_FULL     EQU 7
RES_SETUPS_HOST      EQU 8h
RES_SETUPS_HOTKEYS   EQU 16h
RES_SETUPS_MAINTENANCE EQU 24h
RES_SETUPS_MODEM     EQU 32h
RES_SETUPS_POWER     EQU 40h
RES_SETUPS_SCREEN    EQU 48h


GETSET_AUTOMATIC_SHUTOFF       equ 0fh
GETSET_BRIGHTNESS              equ 0bh
GETSET_CONTRAST                equ 0ah
GETSET_CUSTOM_AUTOANSWER_STRING equ
36h
GETSET_CUSTOM_CONNECT_STRING   equ 38h
GETSET_CUSTOM_DISCONNECT_STRING equ
37h
GETSET_CUSTOM_INIT_STRING      equ 035h
GETSET_HOST_CONNECTION_TYPE    equ 02ch
GETSET_MODEM_ANSWER_ON_RING    equ
032h
GETSET_MODEM_BAUD_RATE_ENTRY   equ
29h
GETSET_MODEM_HOST_DESC_ENTRY   equ
26h
GETSET_MODEM_HOST_PHONE_ENTRY  equ
27h
GETSET_MODEM_MANUFACTURER_ENTRY equ
28h
GETSET_MODEM_PREFIX            equ 030h
GETSET_MODEM_RETRY_DELAY       equ 034h
GETSET_MODEM_RETRY_LIMIT       equ 033h
GETSET_MODEM_SUFFIX            equ 031h
GETSET_MODEM_TONE_OR_PULSE     equ 02fh
GETSET_NETWORK_GROUP_ENTRY     equ 2ah
GETSET_NETWORK_HOST_ENTRY      equ 2bh
GETSET_PASSWORD                equ 02eh
GETSET_SLEEPMODE_PERIOD        equ 10h
GETSET_SECURITY_ID             equ 66h
GETSET_DOMAIN_ID               equ 67h
GETSET_LOCK_HOST_KEYBOARD      equ 68h
GETSET_DIM_HOST_SCREEN         equ 6Ah
GETSET_USER_DEFINED_HOT_ICON   equ 65h
GETSET_USER_ID                 equ 02dh



Copr. 1995 Zenith Data Systems Corp.
      .MODEL small

SMI_SUIEVENTNUM EQU 0

extrn _PushEventNum:near
extrn _lpfnFarCallEntry:near

_TEXT SEGMENT WORD PUBLIC 'CODE'
ASSUME DS: DGROUP, SS: DGROUP

ASSUME CS: _TEXT

public _SUICallService
_SUICallService PROC far

      push   bp
      mov    bp,sp

      cli

      push   ds
      push   ax
      push   bx
    push cx
      push   dx
      mov    ds, cs:000Ah

      mov    ax, SMI_SUIEVENTNUM
    push ax
      call  _PushEventNum
    add sp,2

      pop    dx
      pop    cx
      pop    bx
      pop    ax

      sti

      call  DWORD PTR _lpfnFarCallEntry

      pop    ds
      mov    sp,bp
      pop    bp
      ret

_SUICallService    ENDP

public _GetPendingEvent
_GetPendingEvent PROC near

      push   bp
      mov    bp,sp

      mov    ax, cs:0010h

      mov    sp,bp
      pop    bp
      ret

_GetPendingEvent ENDP

_TEXT ENDS

END
Copr. 1995 Zenith Data Systems Corp
include pd.inc

      .MODEL  small

_TEXT SEGMENT WORD PUBLIC 'CODE'
ASSUME DS: DGROUP, SS: DGROUP

ASSUME CS: _TEXT

public _SetPenSpkFreq
_SetPenSpkFreq proc near
  push   bp
  mov    bp,sp

  mov    al, PD_TIMER2_16BIT_MODE
  cli
  out    43h, al
  jmp    short $+2
  mov    ax, PD_PSEO_FREQUENCY
  out    42h, al
  jmp    short $+2
  mov    al, ah
  out    42h, al
  sti

  mov    sp,bp
  pop    bp
  ret
_SetPenSpkFreq endp

_TEXT ENDS

END

Copr. 1995 Zenith Data Systems Corp
#define STR_PROMPT          "SL>"
#define STR_SMANPROGNAME    "sm.exe"
#define STR_SVIEWPROGNAME   "sv.exe"
#define STR_LSL             "lsl.com"
#define STR_IPXODI          "ipxodi.com"

#if defined( PCMCIA )
 #define STR_PROXIM         "clpcm.com"
#elif defined( CLISA ) || defined( MOUSE )
 #define STR_PROXIM         "clisa.com"
#elif defined( PROD )
 #define STR_PROXIM         "rl2oem.com"
#else
 #define STR_PROXIM         "rl2oem.com"
#endif

#define STR_PDRVPROGNAME    "pd.exe"
#define STR_SDRVNETPROGNAME "sdrvnet.exe"
#define STR_RWINPROGNAME    "srwin.exe"
#define STR_COMMANDPROGNAME
"command.com"
#define STR_COMMANDPARM     " /c diag.bat\r"
#define STR_COMMANDDIR      "c:\\"
#define STR_WELCOMESCREEN   " welcome.pcx
0x12\r"

#define VAL_SPACE           0x20
#define MAX_WIDTHOFSCREEN   80
#define MAX_STACKSIZE       1024
#define MAX_MLIDLOADRETRY   3

#define KBD_CTRLMASK        0x0004
#define KBD_ALTMASK         0x0008
```

```
#define KBD_DSCAN        0x2000
#define KBD_ASCAN        0x1E00

#define SFR_NOSETFLAGS     0x00
#define SFR_SETFLAGS       0x01

#define ITR_NOSETVIDTRAP   0x00
#define ITR_SETVIDTRAP     0x01

typedef enum _tagACTIONKEYS
{
  KBD_NOACTIONKEY,
  KBD_DIAG,
  KBD_ABORTLOAD,
} ACTIONKEYS;

typedef int ( * STATETABLEPROC )();

int exit( int );

int        ProcessIdle( void );
int        ParseCommand( void );
int        ParseParameters( void );
int        ExecuteCommand( void );
int        ProcessSLExit( void );
int        ProcessStateUnknown( void );
void        DoExit( int );
int        GetFrameType( void );
int        GetMLIDStatus( void )
void        SetOldVidVector( LONG lOldVidVector );
int        RunProgram( char *szProgName  char
*szProgParms ),
int        LoadMLID( char *szProgName ).
int        LoadNetwork( void );
int        KeyPressedIn( int iDelay );
int        KickSUI( void ),
int        EnableKbd( void );
ACTIONKEYS GetActionKey( void );
BOOL        RemoveVidTrap( void );
void        DisplayError( char *szErrStr ),
void        initTraps( BYTE nVidTrapStatus );
WORD        TrapService( struct trap_rec
*CurrTrapRec ):
void        GetForegroundRegs( struct REGW *InRegs
);
void        SetForegroundRegsFlags( struct REGW
*OutRegs. BYTE
fSetFlags. WORD wFlags );
WORD        SetVideoMode( BYTE nRequestedMode
).
int        LoadSM( int iMemStrategy );

STATETABLEPROC fnStateTableProcs[] =
{
  ProcessIdle,
  ParseCommand,
  ParseParameters,
  ExecuteCommand,
  ProcessSLExit,
  ProcessStateUnknown,
};

typedef enum tagGENERALSTATEIDXS
{
  STM_IDLE,
  STM_COMMAND,
  STM_PARM,
  STM_EXECUTE,
  STM_EXIT,
  STM_UNKNOWN,
} GENERALSTATEIDXS.

typedef enum tagCOMMANDSTATEIDXS
{
  COM_UNKNOWN,
  COM_DISPDBUGSTRS,
  COM_RUNSM,
  COM_RUNPROG,
  COM_RUNDOSCOS,
  COM_RUNWINCOS,
} COMMANDSTATEIDXS
```
Copr 1995 Zenith Data Systems Corp.
```
int  SortingList(int, int, int, int, char *);
long GetEntryOffset(int, int, int, int, char *);
int  SwapEntries( char *, char *, int);

#define SH_SWAP_BUFF_LEN 35
```

```
Copr 1995 Zenith Data Systems Corp.

model small

MINOR_VERSION =30
MAJOR_VERSION =1

.code

extrn UseNormalColors:near
extrn DoClickEvent:near
extrn FindRegionForControl:near
extrn CancelPenDown:near
extrn Bin2ASCII:near
extrn BlackenScreen:near
extrn ClearScreen:near
extrn DisinstallInterrupts:near
extrn DoHideOSK:near
extrn Draw4Color:near
extrn DrawMessageBox:near
extrn DrawString:near
extrn ForceTotalRepaint:near
extrn ForceTotalRepaint1:near
extrn GetBitMapHeight:near
extrn GetListData:near
extrn GetStringWidth:near
extrn GetVGAState:near
extrn GoFirstControl:near
extrn GoNextControl:near
extrn GoNextControl:near
extrn HandleDelayedSet:near
extrn HideOSK:near
extrn IsItNumericKey:near
extrn JumpOnAL:near
extrn JumpOnAX:near
extrn PenEntry:near
extrn PenExit:near
extrn PointControlCaption:near
extrn PointError:near
extrn PrepareMessageBox:near
extrn ReGrayOSKTypeButtons:near
extrn RemoveMessageBox:near
extrn RepaintOSK:near
extrn Repaint:near
extrn RepaintAndSetTab:near
extrn RepaintForClick:near
extrn RepaintIndividualControl:near
extrn RepaintIndividualListBox:near
extrn RepaintUnderOSK:near
extrn RepaintWork:near
extrn ReportError:near
extrn RestVGAState:near
extrn RestoreRegion:near
extrn RetainOSKRightAndShow:near
extrn SaveFormHeight:near
extrn SetInitialTab:near
extrn SetListCurrent:near
extrn SetNewTabItemWork:near
extrn SetOSKEnlargedButtons:near
extrn SetOSKReducedButtons:near
extrn StopProtecting:near
extrn UIMain:far
extrn UndoCurrentTabItem:near
extrn UnprotectOSK:near
extrn SearchActiveRegions:near
extrn StopCursor:near
extrn ResumeCursor:near
extrn DefineNewOskArea:near

extrn GetPhysicalKeyState:near

include uiinclud.inc

DATASEG_BEGIN
extrn AboutIcon:word
extrn ColoredAboutIcon:byte
extrn ControlDataStorageArea:byte
extrn OSK:tControl
extrn ScanCodeHeader:tBUFFHEADER
extrn ScanCodePasser:tSCANCODES
extrn bAltNumberCount:byte
extrn bAwaitingMoveCompletion:byte
extrn bCurrentShadowColor:byte
extrn bCursorActive:byte
extrn bDoingEvents:byte
extrn bDontCenterOSK:byte
extrn bDontChangeProtection:byte
extrn bFormColor:byte
extrn bKeyChanged:byte
extrn bKeyState:byte
extrn bKeyboardCode:byte
extrn bLanguageToUse:byte
extrn bLeavePenOn:byte
extrn bLocalState:byte
extrn bMessageBoxID:byte
extrn bMessageBoxRequested:byte
extrn bModalFlag:byte
extrn bNewDisplayRequested:byte
extrn bNoDimensionUpdate:byte
extrn bOSKLastState:byte
extrn bPenShowing:byte
extrn bPopUpRequired:byte
extrn bRemoveMessageBoxRequested:byte
extrn bRepaintNeeded:byte
extrn bResetHotKeyDataLength:byte
extrn bScreenMode:byte
extrn bShadowColor:byte
extrn bSuppressHideShow:byte
extrn bTestMode:byte
extrn bTriggerPenOnForClick:byte
extrn cmdAbout:tControl
extrn cmdCalibratePen:tControl
extrn cmdClearHotKey1:tCONTROL
extrn cmdClearHotKey2:tCONTROL
extrn cmdDefault:tControl
extrn cmdDisconnect:tCONTROL
extrn cmdDisconnect:tControl
extrn cmdDomainIDSpinUp:tControl
extrn cmdEdit:tControl
extrn cmdHost:tCONTROL
extrn cmdHost:tControl
extrn cmdHotKeys:tCONTROL
extrn cmdHotKeys:tControl
extrn cmdMaintenance:tCONTROL
extrn cmdMaintenance:tControl
extrn cmdModem:tCONTROL
extrn cmdModem:tControl
extrn cmdModemConnect:tCONTROL
extrn cmdModemConnect:tControl
extrn cmdModemConnect:tControl
extrn cmdNetworkConnect:tCONTROL
extrn cmdNetworkConnect:tControl
extrn cmdNetworkUpdate:tCONTROL
extrn cmdNetworkUpdate:tControl
extrn cmdOSKAbout:tControl
extrn cmdOSKAlphaKeyboard:tControl
extrn cmdOSKEnlarge:tControl
extrn cmdOSKFullKeyboard:tControl
extrn cmdOSKNumKeyboard:tControl
extrn cmdOSKReduce:tCONTROL
extrn cmdOSKReduce:tControl
extrn cmdPasswordOKCancel_Cancel:tControl
extrn cmdPasswordOKCancel_OK:tControl
extrn cmdPhoneBookOKCancel_Cancel:tControl
extrn cmdPhoneBookOKCancel_OK:tControl
extrn cmdPower:tCONTROL
extrn cmdPower:tControl
extrn cmdRebootHost:tControl
extrn cmdScreen:tCONTROL
extrn cmdScreen:tControl
extrn cmdSerialConnect:tControl
extrn cmdToolBarClose:tControl
extrn cmdToolBarClose:tControl
extrn cmdToolbarClose:tCONTROL
extrn cmdUpgrade:tControl
extrn cmdUserIdOKCancel_Cancel:tControl
extrn cmdUserIdOKCancel_OK:tControl
extrn fraConnectionOptions:tCONTROL
extrn fraConnectionOptions:tControl
extrn fraModemConnection:tCONTROL
extrn fraModemConnection:tControl
extrn fraModemCustom:tCONTROL
extrn fraModemCustom:tControl
extrn fraNetworkConnection:tCONTROL
extrn fraNetworkConnection:tControl
extrn fraSerialConnection:tCONTROL
extrn fraSerialConnection:tControl
extrn frmAlphaKeyboard:tCONTROL
extrn frmHost:tCONTROL
extrn frmHost:tControl
extrn frmHotKey:tCONTROL
extrn frmHotKey:tControl
extrn frmMaintenance:tCONTROL
extrn frmMaintenance:tControl
extrn frmMessageBox:tCONTROL
extrn frmMessageBox:tControl
extrn frmMessageBox_End:byte
extrn frmModem:tCONTROL
extrn frmModem:tControl
extrn frmNumericKeyboard:tCONTROL
extrn frmNumericKeyboard:tControl
extrn frmPasswordBox:tCONTROL
extrn frmPasswordBox:tControl
extrn frmPhoneBookEdit:tCONTROL
extrn frmPhoneBookEdit:tControl
extrn frmPower:tCONTROL
extrn frmPower:tControl
extrn frmScreen:tCONTROL
extrn frmScreen:tControl
extrn frmUserIdBox:tControl
extrn lblMessageBox0:tCONTROL
extrn lblMessageBox0:tControl
extrn lblMessageBox0:tCONTROL
extrn lblOSKBigCruzer:tControl
extrn lblOSKChiselLine:tCONTROL
extrn lblOSKChiselLine:tControl
extrn lblOSKSmallCruzer:tControl
extrn lblPasswordBox1:tControl
extrn lblUserIdBox1:tControl
extrn lstHostPhones:tCONTROL
extrn lstHostPhones:tControl
extrn lstManufacturer:tControl
extrn lstNetworkGroups:tCONTROL
extrn lstNetworkGroups:tControl
extrn lstNetworkHosts:tCONTROL
extrn lstNetworkHosts:tControl
extrn MainForm:tControl
extrn mnuToolbar:tCONTROL
extrn mnuToolbar:tControl
extrn optModem:tControl
extrn optNetwork:tControl
extrn optPulse:tControl
extrn optSerial:tControl
extrn optTone:tControl
extrn pClickRegion:word
extrn pCurrentFont:word
extrn pCurrentToolBarButton:word
extrn pEditBoxFont:word
extrn pFirstControl:word
extrn pGraphicFont:word
extrn pNextActiveRegion:word
extrn pNormFont:word
extrn pOSKFirstRegion:word
extrn pPenDownActiveRegion:word
extrn pPenUpListRegion:word
extrn pPenUpListRegion:word
extrn pPenUpListRegion:word
extrn pTabRegion:word
extrn pszProgressTable:word
extrn pszProgressTable_End:word
extrn rActiveRegions:tRegion
extrn rCalibrateLRCHeader:tBUFFHEADER
extrn rCalibrateULCHeader:tBUFFHEADER
extrn rCallProgressHeader:tBUFFHEADER
extrn rCursorRegion:tREGION
extrn rErrorMess1Header:tBUFFHEADER
extrn rErrorMess2Header:tBUFFHEADER
extrn rErrorMess3Header:tBUFFHEADER
extrn rErrorMess4Header:tBUFFHEADER
extrn rREGION:tREGION
extrn rRebootHostHeader:tBUFFHEADER
extrn rUpgradeCompHeader:tBUFFHEADER
extrn rUpgradeHeader:tBUFFHEADER
extrn rUpgradeNAHeader:tBUFFHEADER
extrn rUpgradeProgHeader:tBUFFHEADER
extrn szCalibrationXString:byte
extrn szCallProgressFill:byte
extrn szCallProgressFill:byte
extrn szInvalidProgress:byte
extrn szInvalidProgress:byte
extrn szListItemBuffer1:byte
extrn szListItemBuffer2:byte
extrn szSerial:byte
extrn szUpgradeProgressPercent:byte
extrn txtCurrentHost:tCONTROL
extrn txtCurrentHost:tControl
extrn txtDomainID:tcontrol
extrn txtHotKey1:tCONTROL
extrn txtHotKey2:tCONTROL
extrn txtPBDescription:tCONTROL
extrn txtPBDescription:tControl
extrn txtPBPhoneNumber:tCONTROL
extrn txtPBPhoneNumber:tControl
extrn txtPassword:tControl
extrn txtSecurityID:tControl
extrn txtUserId:tControl
extrn uifont4:word
extrn wCurrentFormBottom:word
extrn wCurrentFormHeight:word
extrn wCurrentResource:word
extrn wCurrentResource:word
extrn wDisplayRequested:word
extrn wKeyPressed:word
extrn wListCurrentItem:word
extrn wMessageContinuationDX:word
extrn wMessageContinuationSI:word
extrn wNormFontHeight:word
extrn wPSPSegment:word
extrn wPenDownColumn:word
extrn wPreviousFormHeight:word
extrn wScreenSegment:word
extrn wShiftCaption:word

bOSKMoveRequested db 0

bSuppressDimensionUpdate db 0

bNextOSKConfiguration db 0
  public bNextOSKConfiguration

bHourGlassMode db 0
  public bHourGlassMode

bHourGlassCursor label byte
dw 1000000000000011b
dw 1111111111111111b
dw 1000000000000011b
dw 1100000000000111b
dw 1100000000000111b
dw 1110000000001111b
dw 1111000000011111b
dw 1111100000111111b
dw 1111100000111111b
dw 1111000000011111b
dw 1110000000001111b
dw 1100000000000111b
dw 1100000000000111b
dw 1000000000000011b
dw 1111111111111111b
dw 1000000000000011b
dw 0000000000000000b
dw 0111111111111100b
dw 0011111111111000b
dw 0001111111110000b
dw 0001111111110000b
dw 0000101010100000b
dw 0000010101000000b
dw 0000001010000000b
dw 0000001010000000b
dw 0000011111000000b
dw 0000110101100000b
dw 0001101010110000b
dw 0001010101010000b
dw 0011111111111000b
dw 0111111111111100b
dw 0000000000000000b

bArrowCursor label byte

dw 0011111111111111b
dw 0001111111111111b
dw 0000111111111111b
dw 0000011111111111b
dw 0000001111111111b
dw 0000000111111111b
dw 0000000011111111b
dw 0000000001111111b
dw 0000000000111111b
dw 0000000000011111b
dw 0000000111111111b
dw 0000000011111111b
dw 0011000011111111b
dw 1111100001111111b
dw 1111100001111111b
dw 1111110001111111b

dw 0000000000000000b
dw 0100000000000000b
dw 0110000000000000b
dw 0111000000000000b
dw 0111100000000000b
dw 0111110000000000b
dw 0111111000000000b
dw 0111111100000000b
dw 0111111110000000b
dw 0111110000000000b
dw 0110110000000000b
dw 0100011000000000b
dw 0000011000000000b
dw 0000001100000000b
dw 0000001100000000b
dw 0000000000000000b

bHandMode db 0
  public bHandMode

bHandCursor label byte
dw 1111100111111111b
dw 1111000001111111b
dw 1111000001111111b
dw 1111000001111111b
dw 1111000001111111b
dw 1001000000001111b
dw 0000000000000011b
dw 0000000000000011b
dw 1000000000000011b
dw 1000000000000011b
dw 1100000000000011b
dw 1100000000000011b
dw 1110000000000011b
dw 1110000000000011b
dw 1111000000000111b
dw 1111100000001111b

dw 0000000000000000b
dw 0000011000000000b
dw 0000011000000000b
dw 0000011000000000b
dw 0000011000000000b
dw 0001011000000000b
dw 0110011010100000b
dw 0110011010101000b
```

```
dw 0011011010101000b
dw 0011111110101000b
dw 0001111111111000b
dw 0001111111111000b
dw 0000111111111000b
dw 0000111111110000b
dw 0000011111100000b
dw 0000000000000000b


ourpalette db 00h,01h,02h,03h,04h,05h,14h,07h
        db 38h,39h,3ah,3bh,3ch,3dh,3eh,3fh,00h

ourcolors label byte
db 00h, 00h, 00h
db 00h, 2Ah, 00h
db 2Fh, 00h, 00h
db 2Ah, 2Ah, 00h
db 00h, 00h, 2Ah
db 00h, 2Ah, 2Ah
db 1Eh, 00h, 2Ah
db 2Dh, 2Dh, 2Dh
db 10h, 10h, 10h
db 1Ah, 3Fh, 15h
db 3Fh  15h, 15h
db 3Fh, 3Fh, 15h
db 15h  15h  3Fh
db 0Eh, 3Fh, 3Fh
db 3Fh  15h, 3Fh
db 3Fh, 3Eh, 3Fh
db 00h  00h  00h

wHotKeyWork dw 0
bHotKeyIsShifted db 0
bHotKeyBuild db 20 dup(0)

bHotKeyAscii db 0.0.0,0
bKeyWasShifted db 0
wHotKeyShiftKeyUps dw 7 dup(0)
bFinalWasAlt db 0
wHotKeyRightPixel dw 0
  public wHotKeyRightPixel

bCapsLockState db 0
bNumLockState db 0

bCalibrateOnly db 0

bPasswordOnly db 0

bConnectRequested db 0

bGetConnectionStatus db 0

wCurrentCallProgress dw 0

bFlashPercentageFlag db 0

wCountryCode  dw 0

bCalibrationCompleteFlag db 0

wAboutClickTimer  dw 0
bAboutClickActive db 0

bPollingTimer     db 0

bLastKeyboardState db 0
bUpdateOSKLockKeys db 0

wCurrentHostList dw 0


wClosureRequest dw 0

SMNotRunningError db 13,10."SM Not
Running",13,10."$"


SMFunctionDispatcher dd DummyFunction
  public SMFunctionDispatcher


bReportOskDimensions db 0
  public bReportOSKDimensions

DATASEG_END



.code

main proc far
  call UIMain

  mov ax.4c00h
  int 21h
main endp

DoCustomStartups proc far
  public DoCustomStartups

  mov al,SM_FUNCTION_INTERRUPT
  mov ah,035h
  int 21h

  cmp word ptr es:[bx+10],"s"+256*"a"
  jnz main1a
  cmp word ptr es:[bx+12],"r"+256*"a"
  jnz main1a
  jmp main2
main1a:
  jmp InvalidStartup

main2:
  mov word ptr SMFunctionDispatcher[0],bx
  mov word ptr SMFunctionDispatcher[2],es

  SM_FUNCTION SM_GET_KEYBOARD_STATUS
  jl main3
  mov bKeyboardCode,al

main3:
  SM_FUNCTION
SM_GET_USER_INTERFACE_LANGUAGE
  jl main4
  m.. bLanguageToUse,al

main4
  mov si,offset UIFunctionDispatcher
  mov dx,cs
  SM_FUNCTION SM_SET_ACTIVE_STATUS
  jl main6

  test al,128
  jz main6a
  and al,not(128)
  mov bTestMode,-1

main6a:
  cmp ax,1
  jnz main6
  call HideModemOptions

main6:

  ret

InvalidStartup
  mov dx,offset SMNotRunningError
  mov ah,9
  int 21h
  mov ax,4c01h
  int 21h
DoCustomStartups endp


DoSMFunction proc far
  public DoSMFunction

  or al,al
  jnz dsmf1
  xor ah,ah
  dec ax
  jr., dsmf2
dsmf1
  call dword ptr SMFunctionDispatcher
dsmf2
  cmp ax,0
  ret
DoSMFunction endp

UIFunctionDispatcher proc far
  public UIFunctionDispatcher

  push ds
  push ax
  mov ax,OURDATASEG
  mov ds,ax
  pop ax

  inc bDoingEvents
  push si
  push bx
  or ax,ax
  jz uifd1
  call JumpOnAX

  dw
UI_GET_SUI_VERSION_NUMBER,GetSuiVersionN
umber
  dw UI_HIDE_MESSAGE_BOX,HideMessageBox
  dw UI_REQUEST_CLOSURE,RequestClosure
  dw UI_REQUEST_DISPLAY,RequestDisplay
  dw
UI_SHOW_MESSAGE_BOX,ShowSMMessageBox
  dw
UI_CALIBRATION_COMPLETE,CalibrationComplete
  dw
UI_FLASH_UPDATE_PERCENTAGE,FlashUpdateP
ercentage
  dw
UI_UPDATE_CONNECTION_STATUS,UpdateConn
ectionStatus
  dw
UI_SHOW_HIDE_BUSY_CURSOR,ShowHideBusyC
ursor
  dw UI_MOVE_OSK,DoOSKMoveRequest
  dw 0

uifd1:
  mov ax,-1
  jmp ReturnWithAX

DoOSKMoveRequest:

  mov OSK.TopPixel,bx
  mov OSK.LeftPixel,cx
  mov bOSKMoveRequested,-1
  mov bPopupRequired,-1
  jmp ReturnSuccess


GetSuiVersionNumber.
  mov al,MINOR_VERSION
  mov ah,MAJOR_VERSION
  jmp ReturnWithAX

HideMessageBox:
  cmp bMessageBoxID,0
  jz hmb1

  mov bx,wCurrentResource
  test bx,0111111111111000b
  jnz hmb2

  call far ptr disinstallint09

hmb2:
 mov bRemoveMessageBoxRequested,-1
 mov ax,0
 mov bPopupRequired,-1
 jmp ReturnWithAX
hmb1
 mov ax,-7
 jmp ReturnWithAX

RequestDisplay

  mov bLocalState.1
  test bx,not(111b)
  jnz qqq1

  mov osk.TopPixel,si
  mov osk.LeftPixel,di
  mov bDontCenterOSK,-1

  or mnuToolBar.ControlState,INVISIBLE
  mov pFirstControl,offset OSK

  push cx
  push bx
  call ResetForRestart
  pop bx
  pop cx
  jmp rrr1

qqq1.
  and cl,111b
  mov bNextOSKConfiguration,cl

rrr1:
  mov ax,bx
  and al,111b
  cmp al,4
  jnz rdis1
  jmp ReturnInvalidParm

rdis1:
  mov ax,bx
  shr ax,1
  shr ax,1
  shr ax,1

  cmp ax,MAX_TOOLBARBUTTONS
  jbe rb2q
  jmp ReturnInvalidParm

rb2q:
  push bx
  mov ah,0Fh
  int 10h
  and al,1111111b
  pop bx
  mov bScreenMode,al
  cmp al,VGA_MODE
  jz rd1
  cmp al,3
  jz rd2b
  cmp al,7
  jz rd2

  jmp ReturnInvalidParm

rd2:
  mov ax,0b000h
  jmp rd2a
rd2b:

  mov ax,0b800h
rd2a:
  mov wScreenSegment,ax
  cmp bx,7
  jbe rd1
  jmp ReturnInvalidParm

rd1:
  test bx,1111111111111000b
  jz rd1a
  call far ptr installint09
  jmp rd1b

rd1a
  mov bReportOSKDimensions,-1

rd1b:
  mov bNewDisplayRequested,-1
  mov wDisplayRequested,BX
  mov bPopupRequired.-1

  test wDisplayRequested,111111000b
  jnz rd1bbx1

  mov bAwaitingMoveCompletion,-1
  mov bLeavePenOn,0
  jmp rd1bbx

rd1bbx1:
  cmp bLeavePenOn,0
  jnz rd1bbx
  mov bLeavePenOn,-1
  cmp bDoingEvents,1
  ja  rd1bbx
  call PenExit

rd1bbx.
  xor ax,ax
  jmp ReturnWithAX

ShowSMMessageBox:

  cmp bMessageBoxID,0
  jz smg2
  cmp bRemoveMessageBoxRequested,-1
  jz smg2

  jmp ssmb1

smg2:
  or cx,cx
  jz smg1
  cmp cx,8
  jz smg1
  cmp cx,9
  jz smg1
  mov ax,-2
  jmp ReturnWithAX

smg1:
  push bx
  push cx
  push dx
  push si
  push di
  push es
  or cx,cx
  jz smb1
  cmp cx,8
  jz smb3
  cmp cx,9
  jnz smb1

  mov bNewDisplayRequested,-1
  mov wDisplayRequested,8*1
  mov bPopupRequired,-1
  mov bPasswordOnly,-1
  jmp smb3xx

smb3:
  mov bNewDisplayRequested,-1
  mov wDisplayRequested,8*3
  mov bPopupRequired,-1
  mov bCalibrateOnly,-1
```

```
smb3xx:
 xor ax,ax
 xor bx,bx
 jmp smb2

smb1
 cmp wCurrentResource,0
 jnz smb11a
 or wCurrentResource,256*128

smb11a:
 mov bMessageBoxID,-1
 call PrepareMessageBox
 mov bMessageBoxRequested,-1

smb2
 pop es
 pop di
 pop si
 pop dx
 pop cx
 pop bx
 or bx,bx
 jz ssmb2
 call far ptr installint09

ssmb2
 mov bPopupRequired,-1
 jmp ReturnSuccess

ssmb1:
 mov ax,-6
 jmp ReturnWithAX


CalibrationComplete:
 cmp bMessageBoxId,MB_CALIBRATEULC
 jz cc1
 cmp bMessageBoxId,MB_CALIBRATELRC
 jz cc2
 mov ax,-2
 jmp ReturnWithAx

cc1
 mov bCalibrationCompleteFlag,1
 mov bPopupRequired,-1
 jmp ReturnSuccess

cc2
 mov bCalibrationCompleteFlag,2
 mov bPopupRequired,-1
 jmp ReturnSuccess


FlashUpdatePercentage:
 cmp bl,bFlashPercentageFlag
 jz fup1
 mov bPopupRequired,-1
fup1:
 mov bFlashPercentageFlag,bl
 jmp ReturnSuccess


RequestClosure:

 push es
 push bp
 push di
 mov wClosureRequest,bx
 cmp bx,1
 jnz rcl1

 call DisinstallInterrupts
 jmp rcl1a

rcl1
 mov bRepaintNeeded,0
 call ForceTotalRepaint1
 mov ax,479
 mov wCurrentFormBottom,ax
 inc ax
 mov wCurrentFormHeight,ax

rcl1a
 call far ptr disinstallint09
 mov ah,0fh
 int 10h
 and al,1111111b
 cmp al,12h
 jnz rqc1a

 call GetVGAState
 push wCurrentResource
 call DoHideOSK
 pop wCurrentResource
 test wCurrentResource,not(111b)
 jz rqc1

 call unprotectosk
 call BlackenScreen

rqc1:
 call RestVGAState

rqc1a:
 call FreeScreen

 cmp wClosureRequest,1
 jnz rcl2
 mov bx,wPSPsegment
 mov ah,50h
 int 21h

rcl2.
 mov ax,wCurrentResource
 test al,111b
 jnz rc1

 mov ah,bOSKLastState
 and ah,111b
 or al,ah

rc1:
 cmp wClosureRequest,1
 jnz rcl3
 pop di
 pop bp
 pop es

 mov ah,04ch
 int 21h

rcl3:
 call ResetForRestart
 xor ah,ah
 pop di
 pop bp
 pop es

 test wCurrentResource,111111111b
 jnz rrc1

 mov bLeavePenOn,0
 cmp bDoingEvents,0
 jnz rrc1

 call PenEntry
rrc1:
 jmp ReturnWithAX


UpdateConnectionStatus:

 SM_FUNCTION SM_GET_HOST_LIST_STATUS
 call GrayNetworkLists
 cmp ax,1
 jle ucs2a

 SM_FUNCTION SM_UPDATE_HOST_LIST
 mov bRepaintNeeded, PAINTALL

ucs2:
 mov bPopUpRequired,-1
ucs2a:
 mov bLeavePenOn,-1
 jmp ReturnSuccess


ShowHideBusyCursor:
 cmp bx,1
 jb shbc1
 ja ReturnInvalidParm
 call SetArrowCursor
 jmp ReturnSuccess

shbc1:
 call SetHourGlassCursor
 jmp ReturnSuccess

ReturnSuccess:
 xor ax,ax
 jmp ReturnWithAX

ReturnInvalidParm:
 mov ax,-3
 jmp ReturnWithAX



ReturnWithAX:
 pop bx
ReturnWithBX:
 pop si
ReturnWithSI.
 dec bDoingEvents
 pop ds
 ret
UIFunctionDispatcher endp

ResetForRestart proc near

  mov wCurrentResource,0
  mov pTabRegion,0
  push ax
  mov bShadowColor,SHADOW_COLOR
  mov bCurrentShadowColor,SHADOW_COLOR
  mov pOSKFirstRegion,-1
  call UseNormalColors
  pop ax
  ret
resetforrestart endp

DoCustomEvents proc far
 public DoCustomEvents
 cmp bUpdateOSKLockKeys,0
 jz dce0
 mov bUpdateOSKLockKeys,0
 call GetPhysicalKeyState
dce0:

 cmp bAboutClickActive,0
 jz cte4
 cmp wAboutClickTimer,8
 jb cte4
 mov bAboutClickActive,0
 call DoHideOSK
 call ShowAbout
cte4:

 cmp bOSKMoveRequested,0
 jz cfe0
 mov bOSKMoveRequested,0
 mov bSuppressDimensionUpdate,-1
 mov bx,offset OSK
 and [bx].ControlState,not(INVISIBLE)
 mov pNextActiveRegion,offset rActiveRegions
 mov pOSKFirstRegion,-1
 call UnprotectOSK
 mov bDontChangeProtection,-1
 call RepaintOSK
 mov bDontChangeProtection,0
 mov bSuppressDimensionUpdate,0
 call ReportCurrentResource
 mov bAwaitingMoveCompletion,0

 cmp bScreenMode,12h
 jnz lpo1
 mov bTriggerPenOnForClick,-1
 jmp lpo2
lpo1:
 mov bLeavePenOn,-1
lpo2:

cfe0:

 cmp bNewDisplayRequested,0
 jz cfe1
 mov bAwaitingMoveCompletion,0
 call DoExternalDisplayRequest
cfe1:


 cmp bRemoveMessageBoxRequested,0
 jz de4e
 mov bRemoveMessageBoxRequested,0
 cmp bMessageBoxID,MB_CALIBRATELRC
 jz de4e1
 cmp bMessageBoxID,MB_CALIBRATEULC
 jz de4e1
 cmp bMessageBoxRequested,0
 jz nv1
 call StopProtecting
 mov pFirstControl,offset MainForm
 mov wPreviousFormHeight,480
 mov bFormColor,FORM_COLOR
 call Repaint
 jmp nv2
nv1:



 call RemoveMessageBox
de4e:

 cmp bMessageBoxRequested,0
 jz de4b
nv2:
 call DoHideOSK
 call DrawMessageBox
 mov bMessageBoxRequested,0
de4b.


 cmp bCalibrationCompleteFlag,1
 jb de4ff
 ja de4e1
 call DoCalibrateLRC
 jmp dce_quickexit

de4e1.
 mov bCalibrationCompleteFlag,0
 mov bMessageBoxID,0
 call StopProtecting

 cmp bCalibrateOnly,-1
 jnz de4e2
 call BlackenScreen
 mov bCalibrateOnly,0
 mov wCurrentResource,0
 call FreeScreen
 call far ptr disinstallint09
 mov bMessageBoxId,0
 call UnprotectOSK
 call ForceTotalRepaint
 mov bRepaintNeeded,0
 jmp de4f
de4e2:

 call ClearScreen
 call ForceTotalRepaint
de4f:
 mov bLeavePenOn,-1
de4ff:



 cmp bFlashPercentageFlag,0
 jz de4g
 xor al,al
 xchg al,bFlashPercentageFlag
 xor ah,ah
 call ShowUpgradeProgress
de4g:

 call CheckUpdateHostList
 jnc de4h
 SM_FUNCTION SM_GET_HOST_LIST_STATUS
 jz de4h1
 jmp de4h
de4h1:
 call UngrayNetworkLists
 mov bRepaintNeeded,-1
de4h:

 cmp bGetConnectionStatus,0
 jz mcs1
 SM_FUNCTION
SM_GET_CONNECTION_STATUS

 cmp ax,wCurrentCallProgress
 jz mcs1

 or ax,ax
 jnz mcs3

 mov bGetConnectionStatus,0
 mov wCurrentCallProgress,ax
 mov bRepaintNeeded,0
 mov bPopUpRequired,0
 mov bLeavePenOn,0
 call far ptr disinstallint09
 jmp mcs1


mcs3:
 cmp bMessageBoxID,0
 jz mcs2
 push ax
 call RemoveMessageBox
 pop ax
mcs2:
 call ShowCallProgress
mcs1:


 cmp bConnectRequested,0
 jz cfarc1
 call RepaintAndSetTab

 mov wCurrentCallProgress,1234
 mov bGetConnectionStatus,-1
 mov bPopupRequired,-1
 mov bConnectRequested,0
 SM_FUNCTION SM_REQUEST_CONNECTION
 jge cfarc1
cfarc2:
 mov bGetConnectionStatus,0
 call ReportError
cfarc1:


 cmp bMessageBoxRequested,0
 jz ndrq1
 jmp dce0
```

```
ndrq1:


 clc
 ret
dce_quickexit:
 stc
 ret
DoCustomEvents endp

DoToolBarButtonClick proc far
 public DoToolBarButtonClick
 push si
 push ax

 cmp si,offset cmdHost
 jnz dtbc1a
 call InitializeDefaults
 call UpdateHostList
 test fraNetworkConnection.ControlState,INVISIBLE
 jnz darp1
 mov si,offset lstNetworkHosts
 mov ax,[si].id
 mov cx,-1
 call GetListData
 or dx,dx
 jnz darp1

 or cmdDisconnect.ControlState,DISABLED or
GRAYED
 or cmdToolBarClose.ControlState,DISABLED or
GRAYED
 and txtSecurityID.ControlState,not(GRAYED or
DISABLED)
 or cmdRebootHost.ControlState,GRAYED or
DISABLED
 or cmdUpgrade.ControlState,GRAYED or
DISABLED
 or cmdNetworkConnect.ControlState,DISABLED or
GRAYED
darp1
 jmp dtbc1b

dtbc1a:
 call SetControlsForConnectState
 jmp dtbc1b

dtbc1c:
dtbc1b:

 pop ax
 pop si
 ret
DoToolBarButtonClick endp

DummyFunction proc far
 mov ax,-1
 ret
DummyFunction endp

CheckScreenUpdateNeeded proc far
 public CheckScreenUpdateNeeded
 call CheckUpdateHostList
 ret
CheckScreenUpdateNeeded endp

CheckUpdateHostList proc near

 cmp bMessageBoxID,0
 jnz de4ha
 cmp pCurrentToolBarButton,offset cmdHost
 jnz de4ha
 test fraNetworkConnection.ControlState,INVISIBLE
 jnz de4ha
 test cmdNetworkUpdate.Controlstate,GRAYED or
DISABLED
 jz de4ha
 stc
 ret
de4ha:
 clc
 ret
CheckUpdateHostList endp


DoCalibrate proc near

 call UndoCurrentTabItem
 mov pTabRegion,0
 call DoHideOSK
 mov si,offset rCalibrateULCHeader
 mov dx,seg rCalibrateULCHeader
 mov bMessageBoxid,MB_CALIBRATEULC
 call CalibrateAny
 mov bLeavePenOn,-1
 call penexit
 mov bx,4
 mov cx,4
 SM_FUNCTION SM_CALIBRATE_UPPERLEFT
 ret
DoCalibrate endp

DoCalibrateLRC proc near
 mov si,offset rCalibrateLRCHeader
 mov dx,seg rCalibrateLRCHeader
 mov bMessageBoxId,MB_CALIBRATELRC
 mov bCalibrationCompleteFlag,0
 call CalibrateAny
 mov bx,480-9+4
 mov cx,640-11+4
 SM_FUNCTION SM_CALIBRATE_LOWERRIGHT
 ret
DoCalibrateLRC endp

CalibrateAny proc near
 push dx
 push si

 call blackenscreen
 xor cx,cx
 xor dx,dx
 mov si,offset szCalibrationXString
 mov pCurrentFont,offset UIFont4
 mov bx,15
 call DrawString

 mov cx,640-11
 mov dx,480-9
 mov bx,15
 mov si,offset szCalibrationXString
 call DrawString
 pop si
 pop dx
 mov bx,MBX_CANCEL
 call PrepareMessageBox
 call DrawMessageBox
 ret
CalibrateAny endp

ShowUpgradeProgress proc near
 cmp bMessageBoxID,0
 jz sup3
 push ax
 call RemoveMessageBox
 pop ax
sup3:
 cmp ax,100
 jae sup4
 mov cl,3
 mov bx,offset szUpgradeProgressPercent
 call Bin2Ascii

sup2:
 cmp bx,offset szUpgradeProgressPercent+3
 jae sup1
 mov byte ptr [bx],' '
 inc bx
 jmp sup2

sup1:
 call DoHideOSK
 mov si,offset rUpgradeProgHeader
 mov dx,seg rUpgradeProgHeader
 mov bMessageBoxId,MB_UPGRADE_PROGRESS

 mov bx,MBX_NOBUTTON
 call PrepareMessageBox
 call DrawMessageBox
 ret

sup4:
 call DoHideOSK
 mov si,offset rUpgradeCompHeader
 mov dx,seg rUpgradeCompHeader
 mov bMessageBoxId,MB_UPGRADE_COMPLETE

 mov bx,MBX_NOBUTTON
 call PrepareMessageBox
 call DrawMessageBox
 ret
ShowUpgradeProgress endp

DoExternalDisplayRequest proc near

 mov pNextActiveRegion,offset rActiveRegions
 mov pOSKFirstRegion,-1
 call DoHideOSK
 cmp bMessageBoxID,0
 jz dedr1
 call RemoveMessageBox
dedr1:
 mov ax,wDisplayRequested
dedr2:
 test ax,not(111b)
 jz dedr2a

 push ax
 call RestoreOurColors
 pop ax
dedr2a:
 test wCurrentResource,not(111b)
 jnz cfe2
 test ax,not(111b)
 jz cfe2

 mov osk.pixelheight,0
 push ax
 xor bx,bx
 xor cx,cx
 mov di,SCREEN_WIDTH_PIXELS - 1
 mov si,SCREEN_HEIGHT_PIXELS - 1

 SM_FUNCTION SM_UPDATE_DIMENSIONS

 cmp bCalibrateOnly,-1
 jnz cfe2a
 pop ax
 mov wDisplayRequested,0
 mov wCurrentResource,8*256
 call far ptr Installint09
 call DoCalibrate
 jmp cfe6
cfe2a:

 cmp bPasswordOnly,-1
 jnz cfe2b
 pop ax
 mov wDisplayRequested,0
 mov wCurrentResource,9*256
 call far ptr installint09
 call blackenscreen
 mov
wCurrentHostList,GETSET_NETWORK_HOST_ENT
RY
 call GetPassword
 jmp cfe6
cfe2b:

 call ClearScreen
 pop ax

cfe2:
 mov bl,not(ISDOWN)
 and cmdHost.ControlState,bl
 and cmdHotKeys.ControlState,bl
 and cmdMaintenance.ControlState,bl
 and cmdModem.ControlState,bl
 and cmdPower.ControlState,bl
 and cmdScreen.ControlState,bl

 shr ax,1
 shr ax,1
 shr ax,1
 and ax,7
 jz cfe3
 mov pOSKFirstRegion,-1
 or OSK.ControlState,INVISIBLE
 call ForceTotalRepaint

 mov si,offset cmdHost
 dec ax
 jz cfe4
 mov si,offset cmdHotKeys
 dec ax
 jz cfe4
 mov si,offset cmdMaintenance
 dec ax
 jz cfe4
 mov si,offset cmdModem
 dec ax
 jz cfe4
 mov si,offset cmdPower
 dec ax
 jz cfe4
 mov si,offset cmdScreen
 dec ax
 jz cfe4
 jmp cfe3

cfe4:
 or [si].ControlState,ISDOWN
 and mnuToolbar.Controlstate,not(INVISIBLE)
 call SaveFormHeight
 mov bRepaintNeeded,-1
 call RepaintAndSetTab

 cmp bCalibrateOnly,-1
 jnz eeff
 mov bCalibrateOnly,0
 call DoCalibrate
 jmp cfe6
eeff:
 cmp bPasswordOnly,-1
 jnz eegg
 mov bPasswordOnly,0
 mov
wCurrentHostList,GETSET_NETWORK_HOST_ENT
RY
 call GetPassword
 jmp cfe6
eegg:


 jmp cfe5

cfe3:
 test wCurrentResource,not(111b)
 jz cfe3a
 call BlackenScreen
cfe3a:
 or mnuToolbar.Controlstate,INVISIBLE

cfe5:
 mov ax,wDisplayRequested
 call ReconfigureOSK
cfe6:
 mov bNewDisplayRequested,0
 ret
DoExternalDisplayRequest endp

restoreourcolors proc near

 mov ax,1002h
 push ds
 pop es
 mov dx,offset ourpalette
 int 10h
 mov si,offset ourpalette
 mov bx,offset ourcolors
 mov cx,17
 rrr:
 push cx
 lodsb
 mov ch,[bx]
 mov cl,[bx+1]
 mov dh,[bx+2]
 add bx,3
 push bx
 mov bl,al
 xor bh,bh
 mov ax,1010h
 int 10h
 pop bx
 pop cx
 loop rrr
 ret
restoreourcolors endp

ReconfigureOSK proc near
 public ReconfigureOSK

 and ax,111b
 jz cfe6a
 mov bNextOSKConfiguration,0

 mov OSK.ID,ax
 test cmdOSKReduce.ControlState,INVISIBLE
 jnz cfe7
 call SetOSKReducedButtons

cfe7:
 test OSK.ID,RES_OSK_BIG
 jz cfe8
 call SetOSKEnlargedButtons

cfe8:
 mov ax,OSK.ID
 and al,11b
 cmp al,RES_OSK_ALPHA
 jz cfe8a
 cmp al,RES_OSK_NUM
 jz cfe8b
 cmp al,RES_OSK_FULL
 jmp cfe8c
 jmp cfe6a

cfe8a:
 mov si,offset cmdOSKAlphaKeyboard
 call far ptr DoOSKSmallKeyboard
 jmp cfe6a

cfe8b:
 mov si,offset cmdOSKNumKeyboard
 call far ptr DoOSKNumKeyboard
 jmp cfe6a

cfe8c:
 mov si,offset cmdOSKFullKeyboard
 call far ptr DoOSKFullKeyboard
 jmp cfe6a

cfe6a:
 ret
ReconfigureOSK endp
```

```
GetHostName proc near

 call ClearHostName
 or dx,dx
 jz ghn3
 push ds
 pop es
 mov di,txtCurrentHost.pStorageOffset
 mov cx.txtCurrentHost.wDataLength
 dec cx
 mov ds,dx
 cmp [si].iBuffLen,0
 jnz ghn1
 jmp ghn2

ghn1
 lds si,dword ptr [si].pBuffOff
 lds si,dword ptr [si].lpszHostName
 rep movsb
ghn2:
 push es
 pop ds
ghn3:
 ret
GetHostName endp

ClearHostName proc near

 push di
 mov di,txtCurrentHost.pStorageOffset
 mov byte ptr [di],0
 pop di
 ret
ClearHostName endp

GetPassword proc near

 mov bx.offset lblPasswordBox1
 mov si,offset frmPasswordBox
 call ShowPasswordIDBox
 mov si,offset txtPassword
 call SetInitialTab
 ret
GetPassword endp

GrayNetworkLists proc near
 or cmdNetworkUpdate.ControlState,DISABLED or
GRAYED
 or cmdNetworkConnect.ControlState,DISABLED or
GRAYED
 or lstNetworkGroups.ControlState,DISABLED or
GRAYED
 or lstNetworkHosts.ControlState,DISABLED or
GRAYED
 or cmdDisconnect.ControlState,DISABLED or
GRAYED
 or cmdToolBarClose ControlState,DISABLED or
GRAYED
 and txtSecurityID.ControlState,not(GRAYED or
DISABLED)
 or cmdRebootHost.ControlState.GRAYED or
DISABLED
 or cmdUpgrade.ControlState,GRAYED or
DISABLED
 ret
GrayNetworkLists endp

UnGrayNetworkLists proc near
 and cmdNetworkUpdate ControlState,not
(DISABLED or GRAYED)
 test cmdDisconnect.ControlState,DISABLED
 jz ugnl1
 and cmdNetworkConnect.ControlState,not
(DISABLED or GRAYED)

ugnl1:
 and lstNetworkGroups.ControlState,not (DISABLED
or GRAYED)
 and lstNetworkHosts.ControlState,not (DISABLED
or GRAYED)
 ret
UngrayNetworkLists endp

BlackenAndFree proc near

 call BlackenScreen
 call FreeScreen
 mov wCurrentResource.0
 ret
BlackenAndFree endp


HandleButtonClicks proc far
 public HandleButtonClicks


 mov si,pClickRegion
 mov di,si
 mov ax,[si].pCurrentControl
 mov si,ax
 call JumpOnAX

 dw offset cmdEdit,offset DoCmdEdit
 dw offset cmdPhoneBookOKCancel_OK,offset
DoCmdPhoneBookOK
 dw offset cmdPhoneBookOKCancel_Cancel,offset
DoCmdPhoneBookCancel
 dw offset cmdAbout,offset DoCmdAbout
 dw offset cmdOSKEnlarge,offset DoOSKEnlarge1
 dw offset cmdOSKReduce,offset DoOSKReduce1
 dw offset cmdOSKFullKeyboard,offset
DoOSKFullKeyboard1
 dw offset cmdOSKAlphaKeyboard,offset
DoOSKSmallKeyboard1
 dw offset cmdOSKNumKeyboard,offset
DoOSKNumKeyboard1
 dw offset cmdCalibratePen,offset StartCalibrate
 dw offset cmdRebootHost,offset DoReboot
 dw offset cmdUpgrade,offset DoUpgrade
 dw offset optNetwork,offset DoOptNetwork
 dw offset optModem,offset DoOptModem
 dw offset optSerial,offset DoOptSerial
 dw offset lstNetworkHosts,offset
DoLstNetworkHosts
 dw offset cmdNetworkUpdate,offset
DoNetWorkUpdate
 dw offset cmdNetworkConnect,offset
DoNetworkConnect
 dw offset cmdModemConnect,offset
DoModemConnect
 dw offset cmdSerialConnect,offset
DoSerialConnect
 dw offset cmdPasswordOKCancel_OK,offset
DoCmdPasswordOK
 dw offset cmdPasswordOKCancel_Cancel,offset
DoCmdPasswordCancel
 dw offset cmdDisconnect,offset DoDisconnect
 dw offset cmdDefault,offset DoDefault
 dw offset cmdClearHotKey1,offset ClearHotKey1
 dw offset cmdClearHotKey2,offset ClearHotKey2
 dw 0
 ret

DoDefault:
 SM_FUNCTION SM_GET_MODEM_DEFAULTS
 mov bRepaintNeeded,-1
 ret

DoCmdEdit:
 call DoHideOSK
 and
frmPhoneBookEdit.ControlState,not(INVISIBLE)

 mov ax,lstHostPhones.ID
 xor cx,cx
 call GetListData

 push ds
 pop es
 mov si,offset szListItemBuffer1
 mov di,txtPBDescription.pStorageOffset
 mov cx,txtPBDescription.wDataLength
 dec cx
 rep movsb

 mov si,offset szListItemBuffer2
 mov di,txtPBPhoneNumber.pStorageOffset
 mov cx,txtPBDescription.wDataLength
 dec cx
 rep movsb

 mov bModalFlag,-1
 call repaintwork


 mov si,offset txtPBDescription
 call SetInitialTab
 ret

DoCmdPhoneBookOK:
 push ds
 pop es
 mov di,offset szListItemBuffer1
 mov si,txtPBDescription.pStorageOffset
 mov cx,txtPBDescription.wDataLength
 dec cx
 rep movsb
 xor al,al
 stosb
 mov di,offset szListItemBuffer2
 mov si,txtPBPhoneNumber.pStorageOffset
 mov cx,txtPBPhoneNumber.wDataLength
 dec cx
 rep movsb
 xor al,al
 stosb
 mov ax,lstHostPhones.ID
 mov cx,wListCurrentItem
 call SetListCurrent
 jmp DoCmdPhoneBookCancel

DoCmdPhoneBookCancel:
 mov bModalFlag,0
 call DoHideOSK
 or frmPhoneBookEdit.ControlState,INVISIBLE
 call ClearScreen
 call ForceTotalRepaint
 ret

DoCmdPasswordCancel:
 mov bModalFlag,0
 call DoHideOSK
 or frmPasswordBox.ControlState,INVISIBLE
 cmp wCurrentResource,8*1
 jz dcc1

 cmp bPasswordOnly,-1
 jnz dcc1
 mov bPasswordOnly,0
 mov pTabRegion,0
 call BlackenAndFree
 call ForceTotalRepaint
 mov bRepaintNeeded,0
 call far ptr DisInstallInt09
 mov bl,MBB_CANCEL
 xor bh,bh
 SM_FUNCTION
SM_REPORT_BUTTON_CLICKED
 ret

dcc1:
 call ClearScreen
 call ForceTotalRepaint
 ret

DoCmdPasswordOK:
 mov bModalFlag,0
 call DoHideOSK
 or osk.Controlstate,INVISIBLE

 or frmPasswordBox ControlState,INVISIBLE
 cmp wCurrentResource.1*8
 jz dcpo1

 cmp bPasswordOnly,-1
 jnz dcpo1
 mov bPasswordOnly,0
 call blackenandfree
 mov pTabRegion,0
 call forcetotalrepaint
 mov bRepaintNeeded,0
 call far ptr DisInstallInt09

 mov bl,MBB_OK
 xor bh,bh
 SM_FUNCTION
SM_REPORT_BUTTON_CLICKED
 ret

dcpo1:
 call ClearScreen
 call ForceTotalRepaint
 cmp bPasswordOnly,-1
 jnz dcpo2
 mov bPasswordOnly,0
 jmp dcpo3
dcpo2:

RequestConnection:
 SM_FUNCTION SM_REQUEST_CONNECTION
 jl dcpo2a
 SM_FUNCTION
SM_GET_CONNECTION_STATUS
 jnz dcpo2a

 mov bPopUpRequired,0
 mov bRepaintNeeded,0
 mov bLeavePenOn,0
 ret


dcpo2a:
 mov bGetConnectionStatus,-1
 mov wCurrentCallProgress,1234

dcpo3:
 mov bPopUpRequired,-1
 ret

DoNetworkUpdate:
 SM_FUNCTION SM_UPDATE_HOST_LIST
 call GrayNetworkLists
dnu1:
 mov bRepaintNeeded, PAINTALL AND (NOT
PAINTTOOLBARS)
 ret

DoNetworkConnect.
 mov
wCurrentHostList,GETSET_NETWORK_HOST_ENT
RY

DoAnyConnect:
 SM_FUNCTION SM_GET_PASSWORD_STATUS

 jg dnc1
 jl dnc2
 jmp RequestConnection

dnc1.
 call GetPassword
 ret
dnc2:
 call ReportError
 ret

DoDisconnect:
 mov wCurrentCallProgress,1234
 mov bGetConnectionStatus,-1
 or cmdDisconnect.ControlState,GRAYED or
DISABLED
 or cmdToolBarClose.ControlState,DISABLED or
GRAYED
 and txtSecurityID.ControlState,not(GRAYED or
DISABLED)
 or cmdRebootHost.ControlState.GRAYED or
DISABLED
 or cmdUpgrade.ControlState,GRAYED or
DISABLED
 call RepaintCurrent
 mov si,pTabRegion
 call SetNewTabItemWork
 SM_FUNCTION
SM_REQUEST_DISCONNECTION
 ret



DoModemConnect:
 mov
wCurrentHostList.GETSET_MODEM_HOST_DESC_
ENTRY
 jmp DoAnyConnect

DoSerialConnect:
 mov wCurrentHostList,0
 jmp DoAnyConnect


DoOSKEnlarge1:
 call PrepUserResize
DoOSKEnlarge:
 or OSK.ID,RES_OSK_BIG
 or wCurrentResource,RES_OSK_BIG
 call SetOSKEnlargedButtons
 call HideOSK
 mov OSK.PixelHeight,0
 call RetainOSKRightAndShow
 call ReportCurrentResource
 ret

DoOSKReduce1:
 call PrepUserResize
DoOSKReduce:
 and OSK.ID,not(RES_OSK_BIG)
 and wCurrentResource,not(RES_OSK_BIG)
 call SetOSKReducedButtons
 call HideOSK
 call RepaintUnderOSK
 or OSK.ControlState,INVISIBLE
 call RetainOSKRightAndShow
 call ReportCurrentResource
 ret

DoOSKFullKeyboard1:
 call PrepUserResize
DoOSKFullKeyboard:
 or OSK.ID,RES_OSK_FULL
 or wCurrentResource,RES_OSK_FULL
 call ReGrayOSKTypeButtons

 cmp bScreenMode,VGA_MODE
 jz dofk2
 add ax,16
dofk2:

 ROUND_TO_BYTE_BOUNDARY ax
 mov OSK.PixelWidth,ax
 sub ax,bx
 sub ax,bx

 add ax,16
 mov lblOSKChiselLine.PixelWidth,ax
 sub ax,16
 mov ax,frmAlphaKeyboard.PixelWidth
 add ax,bx
```

```
 call RetainOSKRightAndShow
 call ReportCurrentResource
 ret

DoOSKSmallKeyboard1:
 call PrepUserResize

DoOSKSmallKeyboard:
 mov ax,OSK.ID
 and ax,not(RES_OSK_ALPHA + RES_OSK_NUM)

 or ax,RES_OSK_ALPHA
 mov OSK.ID,ax
 mov ax,wCurrentResource
 and ax,not(RES_OSK_ALPHA + RES_OSK_NUM)

 or ax,RES_OSK_ALPHA
 mov wCurrentResource,ax

 call ReGrayOSKTypeButtons
 or frmNumericKeyboard.ControlState,INVISIBLE
 call RetainOSKRightAndShow
 call ReportCurrentResource
 ret

DoOSKNumKeyboard1
 call PrepUserResize

DoOSKNumKeyboard:
 mov ax.OSK.ID
 and ax,not(RES_OSK_ALPHA + RES_OSK_NUM)

 or ax,RES_OSK_NUM
 mov OSK.ID,ax
 mov ax,wCurrentResource
 and ax,not(RES_OSK_ALPHA + RES_OSK_NUM)

 or ax,RES_OSK_NUM
 mov wCurrentResource,ax
 call ReGrayOSKTypeButtons
 or frmAlphaKeyboard.ControlState,INVISIBLE
 call RetainOSKRightAndShow
 call ReportCurrentResource
 ret

DoOptNetwork
 call SetNetworkFrame
 call UpdateHostList
 call RepaintForClick
 ret

DoOptModem.
 call SetModemFrame
 call RepaintForClick
 ret

DoOptSerial
 call SetSerialFrame
 call RepaintForClick
 ret

DoLstNetworkHosts
 ret

DoCmdAbout.
 cmp bAboutClickActive,0
 jnz dca1
 mov wAboutClickTimer,0
 mov bAboutClickActive,-1
 ret
dca1

 mov bAboutClickActive,0
 test cmdToolBarClose.ControlState,DISABLED or
GRAYED
 jnz dca2
 call far ptr TryUnload
dca2:
 ret

DoUpgrade:
 call DoHideOSK
 SM_FUNCTION
SM_REQUEST_ACTIVE_FLASH_UPGRADE
 jge du1
 cmp ax,-6
 jnz du4

 or dx,dx
 jz du4a

 mov bMessageBoxID,-1
 mov bx,MBX_OK
 call PrepareMessageBox
 mov bMessageBoxRequested.-1
 mov bPopupRequired,-1
 call far ptr Installint09
 ret

du4:
 call ReportError
du4a:
 ret

du1;
 or dx,dx
 jnz du2
 mov bMessageBoxID,MB_NOUPGRADE
 mov si,offset rUpgradeNAHeader
 mov dx,seg rUpgradeNAHeader
 mov bx,MBX_OK
 jmp du3
du2:

 mov wMessageContinuationSI,offset
rUpgradeHeader
 mov wMessageContinuationDX,seg
rUpgradeHeader
 mov bMessageBoxId,MB_UPGRADE
 mov bx,MBX_YESNO

du3.
 call PrepareMessageBox
 call DrawMessageBox
 ret

StartCalibrate
 call DoCalibrate
 r.

DoReboot.
 call DoHideOSK
 mov si,offset rRebootHostHeader
 mov dx,seg rRebootHostHeader
 mov bMessageBoxId,MB_REBOOT
 mov bx,MBX_YESNO
 call PrepareMessageBox
 call DrawMessageBox
 ret

ClearHotKey1.
 mov bx,offset txtHotKey1
 xor ax,ax
 mov [bx].wDataLength,ax
 mov ScanCodeHeader.iBuffLen,2
 mov word ptr ScanCodePasser,ax

 push bx
 call PassScanCodeList
 pop si
 call FindRegionForControl
 jc chc1
 mov si,offset txtHotKey1
 call ResetHotKeyEditField
chc1:
 ret

ClearHotKey2:
 mov bx,offset txtHotKey2
 xor ax,ax
 mov [bx].wDataLength,ax
 mov ScanCodeHeader.iBuffLen,2
 mov word ptr ScanCodePasser,ax
 push bx
 call PassScanCodeList
 pop si
 call FindRegionForControl
 jc chc2
 mov si,offset txtHotKey2
 call ResetHotKeyEditField
chc2
 ret
HandleButtonClicks endp


ResetHotKeyEditField proc near
 mov pPenDownActiveRegion,bx
 mov pClickRegion,bx
 mov ax,[si]
 call RepaintIndividualControl
 mov bResetHotKeyDataLength,-1
 mov wHotKeyRightPixel,0
 mov wPenDownColumn,0
 call DoClickEvent
 ret
ResetHotKeyEditField endp

HandleMessageBoxClick proc far
 public HandleMessageBoxClick
 call JumpOnAX
 dw MB_CALIBRATEULC or (MBB_CANCEL *
256),offset
CancelCalibrateULC
 dw MB_CALIBRATELRC or (MBB_CANCEL *
256),offset
CancelCalibrateLRC
 dw MB_SHOWCALLPROGRESS or
(MBB_CANCEL * 256),offset
AbortConnection
 dw MB_REBOOT or (MBB_YES * 256),offset
DoRebootYes
 dw MB_UPGRADE or (MBB_YES * 256),offset
DoUpgradeYes
 dw MB_ABOUT or (MBB_OK * 256),offset
DoAboutOK
 dw MB_CREDITS or (MBB_OK * 256),offset
DoAboutOK
 dw 0
 call RemoveMessageBox
 ret

CancelCalibrateULC:
 cmp bCalibrateOnly,-1
 jnz ccu1
 SM_FUNCTION SM_CANCEL_CALIBRATION
 mov bCalibrationCompleteFlag,2
 mov bpopuprequired,-1
 ret
ccu1:
 mov bMessageBoxID,0
 call StopProtecting
 call ClearScreen
 SM_FUNCTION SM_CANCEL_CALIBRATION

 call ForceTotalRepaint
 call repaint
 ret

CancelCalibrateLRC:
 call RemoveMessageBox
 call DoCalibrate
 ret

AbortConnection
 SM_FUNCTION
SM_ABORT_REQUEST_CONNECTION
 jge ac1
 cmp ax,-5
 jnz ac1
 ret
ac1:
 call RemoveMessageBox
 mov bGetConnectionStatus,0
 mov bRepaintNeeded,-1
 ret

DoRebootYes:
 call RemoveMessageBox
 SM_FUNCTION SM_REBOOT_HOST
 jz dry1
 call ReportError
 ret
dry1:
 mov bNewDisplayRequested,-1
 mov wDisplayRequested,1*8
 ret

DoUpgradeYes:
 call RemoveMessageBox
 SM_FUNCTION SM_PERFORM_FLASH_UPDATE

 jz duy1
 call ReportError
 ret
duy1:
 xor ax,ax
 call ShowUpgradeProgress
 ret


DoAboutOK:
 call RemoveMessageBox
 SM_FUNCTION
SM_GET_NEXT_CREDITS_DIALOG
 jl dcmbok2
 mov ax,si
 or ax,dx
 jz dcmbok2
 mov bMessageBoxID,MB_CREDITS
 mov bx,MBX_OK
 call PrepareMessageBox
 call DrawMessageBox
dcmbok2:
 ret
HandleMessageBoxClick endp


HideModemOptions proc near

 or cmdModem.ControlState,INVISIBLE
 xor bx,bx
 mov cx,120

 mov cmdHost.PixelWidth,cx
 add bx,cx
 mov cmdHotKeys.LeftPixel,bx
 mov cmdHotKeys PixelWidth,cx
 add bx,cx
 mov cmdMaintenance.LeftPixel,bx
 mov cmdMaintenance.PixelWidth,cx
 add bx,cx
 mov cmdPower.LeftPixel,bx
 mov cmdPower.PixelWidth,cx
 add bx,cx
 mov cmdScreen.LeftPixel,bx
 mov cmdScreen.PixelWidth,cx
 add bx,cx
 mov mnuToolbar.PixelWidth,bx
 mov frmHost.PixelWidth,bx
 mov frmHotKey.PixelWidth,bx
 mov frmMaintenance.PixelWidth,bx
 mov frmScreen.PixelWidth,bx
 mov frmPower.PixelWidth,bx

 sub bx,32
 mov cmdToolbarClose.LeftPixel,bx

 sub cmdDisconnect.LeftPixel,24
 sub cmdNetworkUpdate.LeftPixel,24
 sub cmdNetworkConnect.LeftPixel,24
 or fraConnectionOptions.ControlState,INVISIBLE
 sub fraNetworkConnection.TopPixel,40
 sub frmHost.PixelHeight,40
 sub lstNetworkHosts.LeftPixel,8

 ret
HideModemOptions endp

InitializeDefaults proc near

 mov ax,GETSET_HOST_CONNECTION_TYPE
 mov ah,80h
 SM_FUNCTION ax
 jl id1
 or al,al
 jz id1

 mov si,offset optModem
 call SetModemFrame
 cmp al,1
 jz id2

 mov si,offset optSerial
 call SetSerialFrame
 cmp al,2
 jz id2

id1:
 mov si,offset optNetwork
 call SetNetworkFrame


id2:
 mov bx,[si].pStorageOffset
 mov byte ptr [bx],1

 call SetControlsForConnectState
 ret
InitializeDefaults endp

SetControlsForConnectState proc near

 or cmdDisconnect.ControlState,GRAYED or
DISABLED
 or cmdToolBarClose.ControlState,DISABLED or
GRAYED
 or cmdNetWorkConnect.ControlState,GRAYED or
DISABLED
 or cmdModemConnect.ControlState.GRAYED or
DISABLED

 and txtSecurityID.ControlState,not (GRAYED or
DISABLED)
 or cmdRebootHost.ControlState,GRAYED or
DISABLED
 or cmdUpgrade.ControlState,GRAYED or
DISABLED


 SM_FUNCTION
SM_GET_CONNECTION_STATUS
 jl id3

 or ax,ax
 jnz id3a

 and cmdDisconnect.ControlState,not(GRAYED or
DISABLED)
 and cmdToolBarClose.ControlState,not(DISABLED
or GRAYED)
 or txtSecurityID.ControlState,GRAYED or
DISABLED
 and cmdRebootHost.ControlState,not(GRAYED or
DISABLED)
 and cmdUpgrade.ControlState,not(GRAYED or
DISABLED)
```

```
 call GetHostName
 jmp id3

id3a:
 call ClearHostName
 and
cmdNetworkConnect.ControlState,not(GRAYED or
DISABLED)
 and cmdModemConnect.ControlState,not(GRAYED
or DISABLED)
 jmp id3

id3:
 ret
SetControlsForConnectState endp

SetModemFrame proc near

 call UndoAllHostTypes
 and
fraModemConnection.ControlState,not(INVISIBLE)
 ret
SetModemFrame endp


SetNetworkFrame proc near

 call UndoAllHostTypes
 and
fraNetworkConnection.ControlState,not(INVISIBLE)
 ret
SetNetworkFrame endp

SetSerialFrame proc near

 call UndoAllHostTypes
 and
fraSerialConnection.ControlState,not(INVISIBLE)
 ret
SetSerialFrame endp

ShowAbout proc near

 mov bMessageBoxID,MB_ABOUT
 SM_FUNCTION SM_GET_ABOUT_DIALOG
 jge sa1
 call PointError
sa1:
 mov bx,MBX_OK
 call PrepareMessageBox

 and lblMessageBox0.ControlState,not(INVISIBLE)
 call DrawMessageBox
 or lblMessageBox0.ControlState,INVISIBLE

 push word ptr bshadowcolor
 mov bshadowcolor,11

 mov si,offset abouticon
 mov cx,frmMessageBox.LeftPixel
 mov dx,frmMessageBox.TopPixel
 add dx,16
 add cx,32
 call draw4color
 pop word ptr bshadowcolor
 ret
ShowAbout endp

ShowCallProgress proc near


 mov wCurrentCallProgress,ax
 cmp ax,4
 jnz setcp0
 mov bGetConnectionStatus,0
 mov bLeavePenOn,-1
 mov bRepaintNeeded,-1
 ret

setcp0:
 mov si,ax
 add si,si
 add si,offset pszProgressTable
 cmp si,offset pszProgressTable_End
 jb setcp1
 mov si,offset szInvalidProgress
 jmp setcp2
setcp1:
 mov si,[si]
setcp2:
 push ds
 pop es
 mov di,offset szCallProgressFill
 mov cx,PROGRESS_MAXLEN
 rep movsb
 call DoHideOSK


 mov si,offset rCallProgressHeader
 mov dx,seg rCallProgressHeader
 n'~ bMessageBoxId,MB_SHOWCALLPROGRESS

 mov bx,MBX_CANCEL
 call PrepareMessageBox
 call DrawMessageBox
 ret
ShowCallProgress endp

ShowPasswordIDBox proc near


 push si
 push bx
 mov ax,wCurrentHostList
 or ax,ax
 jnz spid1
 mov si,offset szSerial
 jmp spid2
spid1:
 xor cx,cx
 call GetListData
spid2:
 pop bx
 push si
 mov si,bx
 call pointcontrolcaption
 add bx,3+14
 mov di,bx
 push ds
 pop es
 pop si
 mov cx,20
 rep movsb
 xor al,al
 stosb
 call DoHideOSK
  mov osk.toppixel,8

 pop si
 ar = [si].ControlState,not(INVISIBLE)
 cmp bPasswordOnly,-1
 jnz spid3
 cmp wCurrentResource,9*256
 jnz spid3
   call repaint
 mov si,offset txtPassword
 call setinitialtab


   ret
spid3:
 mov bModalFlag,-1
 call repaintwork

 mov si,offset txtPassword
 call setinitialtab
 ret
ShowPasswordIDBox endp

TryUnload proc far
 public TryUnload

 push ax
 push bx
 mov bx,wCurrentResource
 SM_FUNCTION SM_REQUEST_UNLOAD
 cmp ax,1
 jz tu1

 mov bLocalState,0
 mov bLeavePenOn,0
tu1:
 pop bx
 pop ax
 ret
TryUnload endp

Un :AllHostTypes proc near

 or fraNetworkConnection.ControlState,INVISIBLE
 or fraSerialConnection.ControlState,INVISIBLE
 or fraModemConnection.ControlState,INVISIBLE
 ret
UndoAllHostTypes endp

UpdateDimensions proc near
 public updatedimensions


 cmp bSuppressDimensionUpdate,0
 jz ud00
 ret
ud00:
 cmp bNoDimensionUpdate,0
 jz ud0
 ret
ud0:
 push bx
 push cx
 push di
 push si

 mov bx,rRegion.wCurrentTop
 mov cx,rRegion.wCurrentLeft
 mov di,rRegion.wCurrentRight
 mov si,rRegion.wCurrentBottom
 call UpdateDimensionsWork
 pop si
 pop di
 pop cx
 pop bx
 ret
UpdateDimensions endp


UpdateDimensionsWork proc near
 public UpdateDimensionsWork


 cmp bSuppressDimensionUpdate,0
 jz udx0
 ret

udx0:
 cmp bx,0
 jge ud1a
 xor bx,bx
ud1a:
 cmp si,0
 jge ud1b
 xor si,si
ud1b:
 cmp di,0
 jge ud1c
 xor di,di
ud1c
 cmp cx,0
 jge ud1
 mov cx,0
ud1:

 cmp bScreenMode,VGA_MODE
 jz ud4

 push bx
 push es
 xor bx,bx
 mov es,bx
 mov bx,0484h
 mov bl,es:[bx]
 inc bl
 xor bh,bh
 shl bx,1
 shl bx,1
 shl bx,1
 cmp si,bx
 jb ud4a
 dec bx
 mov si,bx
ud4a:
 pop es
 pop bx

ud4:
 cmp di,640
 jb ud2
 mov di,640-1
ud2:
 cmp si,480
 jb ud3
 mov si,480-1
ud3:
 call restvgastate

 mov ax,sm_update_dimensions
 SM_FUNCTION SM_UPDATE_DIMENSIONS

 call getvgastate
 ret
UpdateDimensionsWork endp


DrawAboutIcon proc far
 public DrawAboutIcon

 push si
 mov si,offset ColoredAboutIcon
 mov cx,rRegion.wCurrentLeft
 mov dx,rRegion.wCurrentTop
 add dx,1
 add dx,wShiftCaption
 call draw4color
 pop si
 ret
DrawAboutIcon endp

DoCustomTimerProcedures proc far
 public DoCustomTimerProcedures


 inc wAboutClickTimer
 inc bPollingTimer


 cmp byte ptr cs:bWeOwnInt09,0
 jnz dctp1
 cmp pOSKFirstRegion,-1
 jz dctp1
 push es
 push bx
 mov bx,040h
 mov es,bx
 mov bx,17h
 mov bl,es:[bx]
 and bl,(SCROLL_LOCK_DOWN or
NUM_LOCK_DOWN or CAPS_LOCK_DOWN)
 cmp bl,bLastKeyboardState
 jz dctp2
 mov bLastKeyboardState,bl
 mov bPopupRequired,-1
 mov bUpdateOSKLockKeys,-1
dctp2:
 pop bx
 pop es
dctp1:


 ret
DoCustomTimerProcedures endp

GetCustomPopUpRequest proc far
 public GetCustomPopupRequest


 cmp bAboutClickActive,0
 jz gapur3
 cmp wAboutClickTimer,8
 jae gapur1
gapur3:
 and bPollingTimer,1111b
 jnz gapur2

 call CheckUpdateHostList
 jc gapur1
 cmp bGetConnectionStatus,0
 jnz gapur1
 jmp gapur2

gapur1:
 stc
 ret
gapur2:
 clc
 ret
GetCustomPopUpRequest endp

GetGraphicCaptionForScanCode proc near
 cmp bx,39h
 jnz gcsc1

 push pGraphicFont
 pop pCurrentFont
 mov al,spacebar_icon
 mov ah,0
 stosw
 dec di
 clc
 ret

gcsc1:
 push dx
 push cx
 push si
 push rRegion.pCurrentControl
 push pFirstControl
 mov pFirstControl,offset OSK
 call GoFirstControl

dkc4:
 cmp [si].ControlType,KEYBUTTON
 jb dkc6
 cmp [si].ControlType,CAPSLOCKBUTTON
 ja dkc6
 cmp [si].id,bx
 jnz dkc6

 mov dx,[si].wDataLength
 call PointControlCaption
 jcxz dkc5a

 mov ah,byte ptr [si].id
 call IsItNumericKey
 jnz dkc5e
```

```
 cmp bNumLockState,0
 jz dkc5e
 cmp bHotKeyIsShifted,0
 jnz dkc5e

 xchg dh,dl
 jmp dkc5a

dkc5e:
 mov bx,cx
 mov al,[bx+3]
 stosb
 mov byte ptr es:[di],0
 push pGraphicFont
 pop pCurrentFont
 clc
 jmp dkc5

dkc5a
 mov ah,bHotKeyIsShifted
 push dx
 sub dl,32
 cmp dl,dh
 pop dx
 jnz dkc5c

 cmp bCapsLockState,0
 jz dkc5c
 not ah

dkc5c
 mov al,dl
 cmp ah,0
 jz dkc5b
 mov al,dh
dkc5b.
 stosb
 mov byte ptr es:[di],0
 push pNormFont
 pop pCurrentFont
 clc
 jmp dkc5
dkc6
 call GoNextControl
 jnc dkc4
dkc5
 pop pFirstControl
 pop rRegion.pCurrentControl
 pop si
 pop cx
 pop dx
 ret
GetGraphicCaptionForScanCode endp

ConvertSpecialKeys proc near


 cmp ah,0Fh
 jnz spk1
 mov ax,0f09h
 jmp spk2

spk1
 cmp ah,54h
 jb spk9
 cmp ah,5dh
 ja spk9
 sub ah,(54h - 3bh)
spk2
  mov wHotKeyWork,ax
  mov al,SHIFT_KEY
  stosb
  jmp spk9

spk9:
 mov ax,wHotKeyWork

 cmp ah,78h
 jb spk9a
 cmp ah,83h
 ja spk9a
 mov al,ALT_KEY
 stosb
 cmp ah,78h+9
 ja spk9b
 je spk9c
 mov al,ah
 sub al,78h
 add al,"1"
 jmp spk9q
spk9c:
 mov al,"0"
 jmp spk9q
spk9b.
 mov al,"-"
 cmp ah,83h
 jnz spk9q
 mov al,"="
spk9q:
 mov wHotKeyWork,ax
 jmp spk30

spk9a:
 cmp ah,68h
 jb spk10
 cmp ah,71h
 ja spk10
 sub ah,(68h - 3bh)
 mov wHotKeyWork,ax
 mov al,ALT_KEY
 stosb
spk10:
 mov ax,wHotKeyWork
 cmp ah,5eh
 jb spk20
 cmp ah,67h
 ja spk20
 sub ah,(5eh - 3bh)
 mov wHotkeyWork,ax
 mov al,CTRL_KEY
 stosb

spk20:
 mov ax,wHotKeyWork
 mov al,ah
 call JumpOnAL
 db 77h
 dw offset CtrlHome
 db 84h
 dw offset CtrlPU
 db 73h
 dw offset CtrlLA
 db 74h
 dw offset CtrlRA
 db 75h
 dw offset CtrlEnd
 db 76h
 dw offset CtrlPD
 db 0
 mov ax,wHotKeyWork
 jmp spk30
CtrlHome:
 mov ah,47h
 jmp spk29
CtrlPU:
 mov ah,49h
 jmp spk29
CtrlLA:
 mov ah,4bh
 jmp spk29
CtrlRA:
 mov ah,4dh
 jmp spk29
CtrlEnd:
 mov ah,4fh
 jmp spk29
CtrlPD:
 mov ah,51h
 jmp spk29
spk29:
 mov al,CTRL_KEY
 stosb
 xor al,al
 mov wHotKeyWork,ax
spk30:
 ret
ConvertSpecialKeys endp

InstallInt09 proc far


if need_tsr ne 0
 jmp short $ + 7
bWeOwnInt09 db 0

Old09Int dd 0
 push es
 push bx

 xor bx,bx
 mov es,bx
 mov ax,es:[bx+(4*9)]
 mov dx,es:[bx+(4*9)+2]
 mov cx,cs
 cmp dx,cx
 jnz ii9a
 cmp ax,offset new09int
 jnz ii9a


 jmp ii9b
ii9a:
 mov word ptr cs:old09int,ax
 mov word ptr cs:old09int[2],dx
 mov dx,cs
 mov ax,offset new09int
 cli
 mov es:[bx+(4*9)],ax
 mov es:[bx+(4*9)+2],dx
 sti
 mov cs:bWeOwnInt09,-1
 call GetPhysicalKeyState

ii9b:
 pop bx
 pop es
endif
 ret
InstallInt09 endp


DisinstallInt09 proc far
 public DisinstallInt09
if need_tsr ne 0
 push es
 xor bx,bx
 mov es,bx
 mov ax,es:[bx+(4*9)]
 mov dx,es:[bx+(4*9)+2]
 cmp ax,offset new09int
 jnz di9a
 mov ax,cs
 cmp dx,ax
 jnz di9a
 mov ax,word ptr cs:old09int
 mov dx,word ptr cs:old09int[2]
 cli
 mov es:[bx+(4*9)],ax
 mov es:[bx+(4*9)+2],dx
 mov cs:bWeOwnInt09,0
 sti
di9a:
 pop es
endif
 ret
DisinstallInt09 endp

New09Int proc far

if need_tsr ne 0
 pushf
 call dword ptr cs:Old09int

 pushf
 push ax
 push ds
 mov ax,OURDATASEG
 mov ds,ax
 mov ah,1
 int 16h
 jz n9i2
 mov ah,0
 int 16h
 cmp bHourGlassMode,0
 jnz n9i2
 mov wKeyPressed,ax
 mov bKeyChanged,-1
 mov bPopupRequired,-1

n9i2:
 call GetPhysicalKeyState

 pop ds
 pop ax
 popf
endif
 iret
New09Int endp

UpdateHostList proc near


 test fraNetworkConnection.ControlState,INVISIBLE
 jnz dtbc1

 call UngrayNetworkLists

 SM_FUNCTION SM_GET_HOST_LIST_STATUS
 jl dtbc1
 jz dtbc1
 call GrayNetworkLists
 cmp ax,1
 jz dtbc1
 SM_FUNCTION SM_UPDATE_HOST_LIST
dtbc1:
 ret
UpdateHostList endp


PrepUserResize proc near

 test wCurrentResource,not(111b)
 jnz purs1
 mov bReportOSKDimensions,-1
 mov bLeavePenOn,0
 mov bAwaitingMoveCompletion,-1
purs1:
 ret
PrepUserResize endp

DoBeforeRepaintingForm proc far
 public DoBeforeRepaintingForm

 push ax
 cmp si,offset osk
 jz rf0
 cmp si,offset frmMessageBox
 jz rf0
 mov ax,wCurrentResource
 and ax,1000000000000111b
 or ax,[si].ID
 mov wCurrentResource,ax
 call ReportCurrentResource
rf0:
 pop ax
 test wCurrentResource,0111111111111111b
 jnz rf0c
 cmp bMessageBoxID,-1
 jnz rf0c
 jmp rf0d
rf0c:
 test wCurrentResource,not(1000000000000111b)
 jnz rf1a
rf0d:
 call UpdateDimensions
rf1a:
 ret
DoBeforeRepaintingForm endp


ReportCurrentResource proc near


 cmp bReportOSKDimensions,0
 jnz rcr1
 push ax
 push bx
 mov bx,wCurrentResource
 xor bh,bh
 SM_FUNCTION SM_NOTIFY_NEW_SETUP
 pop bx
 pop ax
rcr1:
 mov bReportOSKDimensions,0
 ret
ReportCurrentResource endp

DoAfterRepaintingList proc far
 public DoAfterRepaintingList
 ret
DoAfterRepaintingList endp


DoCustomListPenUp proc far
 public DoCustomListPenUp
 call JumpOnAX
 dw offset lstNetworkGroups,offset
DoLstNetworkGroups
 dw offset lstManufacturer,offset DoLstManufacturer
 dw 0
 jmp hlpu1x

DoLstNetworkGroups.
 mov si,offset lstNetworkHosts
 call RepaintIndividualListBox
 jmp hlpu1x

DoLstManufacturer:

 mov si,pPenUpListRegion
 test [si].bListItemFlags,4
 jz dlm1
 test fraModemCustom.ControlState,INVISIBLE
 jz dlm2

 and fraModemCustom.ControlState,not(INVISIBLE)

 mov ax,128
 jmp dlm3
dlm1:
 test fraModemCustom.ControlState,INVISIBLE
 jnz dlm2

 or fraModemCustom.ControlState,INVISIBLE
 mov ax,-128

dlm3:
 push wCurrentFormHeight
 pop wPreviousFormHeight
 add frmModem.PixelHeight,ax

 call RepaintForClick
 mov si,pClickRegion
 call RestoreRegion
 call undocurrenttabitem
```

```
 mov pTabRegion,0
 mov si,pPenUpListRegion
 call SetNewTabItemWork
 mov pClickRegion,0
 jmp hlpu1x

dlm2
 jmp hlpu1x

hlpu1x:
 ret
DoCustomListPenUp endp

CheckListDataAvailable proc far
 public CheckListDataAvailable

 cmp ax,GETSET_NETWORK_HOST_ENTRY
 jz gld_wait
 cmp ax,GETSET_NETWORK_GROUP_ENTRY
 jz gld_wait
 jmp gld00
gld_wait:
 test cmdNetworkUpdate.ControlState,DISABLED or
GRAYED
 jz gld00
 stc
 ret
gld00
 clc
 ret
CheckListDataAvailable endp

DoCustomControlPenDown proc far
 public DoCustomControlPenDown

 cmp al,KEYEDITBOX
 jnz dpd2a
 mov bResetHotKeyDataLength,-1
 mov wHotKeyRightPixel,0
dpd2a
 ret
DoCustomControlPenDown endp

DoHotKeyEdit proc far
 public DoHotKeyEdit
LEFT_SHIFT_SCANCODE equ 42
RIGHT_SHIFT_SCANCODE equ 54
LEFT_CONTROL_SCANCODE equ 29
RIGHT_CONTROL_SCANCODE equ 0E0h*256+29
LEFT_ALT_SCANCODE equ 56
RIGHT_ALT_SCANCODE equ 0E0h*256+56

 push ax
 mov bx,pTabRegion
 mov bx,[bx].pCurrentControl
 cmp bResetHotKeyDataLength,0
 jz qqii3
 mov bResetHotKeyDataLength,0
 mov [bx].wDataLength,0
qqii3
 mov ax,[si].ID

 cmp wHotKeyRightPixel,540-48-8
 jb dhke0
 jmp dhke99

dhke0:
 cmp bNumlockState,0
 jz dke0a
 test bKeyState,ALT_DOWN
 jz dke0a
 push ax
 call IsItNumericKey
 pop ax
 jnz dke0a
 jmp dke0b
dke0a:
 mov bAltNumberCount,0


dke0b:
 mov bKeyWasShifted,0
 push bx
 push ax
 mov di,offset wHotKeyShiftKeyups
 mov cx,[bx].wDataLength
 mov si,[bx].pStorageOffset
 add si,cx
dhk11:
 jcxz dhk10
 dec si
 dec si
 mov ax,[si]
 test al,80h
 jz dhk2
 and al,not(80h)
 call IsItShiftKey
 jz dhk9b
 mov bKeyWasShifted,-1
dhk2:
 inc si
 inc si
 jmp dhk10
dhk9b.
 mov bFinalWasAlt,0
 call IsItAltKey
 jnz dhk9a
 mov bFinalWasAlt,-1
dhk9a:
 cld
 movsw
 dec si
 dec si
 dec cx
 dec cx
 jmp dhk11
dhk10:
 pop ax

 call IsItShiftKey
 jnz dhk12
dhk15:
 add [bx].wDataLength,4
 mov [si],ax
 or al,80h
 inc si
 inc si
 mov [si],ax
 inc si
 inc si
 call RestoreShiftKeyups
 jmp dhk6

dhk12:
 cmp bKeyWasShifted,-1
 jz dhk16
 cmp di,offset wHotKeyShiftKeyups
 ja dhk15
dhk16:
 push ax
 call RestoreShiftKeyups
 pop ax
 mov [si],ax
 inc si
 inc si
 or al,80h
 mov [si],ax
 add [bx].wDataLength,4
 jmp dhk6

dhk6:
 mov cx,[bx].wDataLength
 mov si,[bx].pStorageOffset
 push ds
 pop es

 mov ScanCodeHeader.iBuffLen,cx
 mov di,offset ScanCodePasser
 jc * jke
 re. movsb
jke:
 pop bx
 mov si,bx
 push si

 call PassScanCodeList
 pop si

 call RepaintCurrent
dhke99:
 pop ax
 ret
DoHotKeyEdit endp


PassScanCodeList proc near

 mov ax,[bx].ID
 mov bl,ah
 xor bh,bh
 xor ah,ah
 mov dx,seg ScanCodeHeader
 mov si,offset ScanCodeHeader
 SM_FUNCTION ax
 ret
PassScanCodeList endp


RepaintCurrent proc near

 push pPenDownActiveRegion
 push pTabRegion
 pop pPenDownActiveRegion
 call RepaintIndividualControl
 pop pPenDownActiveRegion
 ret
RepaintCurrent endp

IsItShiftKey proc near
 call IsItLeftOrRightShift
 jz iisk1
 cmp ax,LEFT_CONTROL_SCANCODE
 jz iisk1
 cmp ax,RIGHT_CONTROL_SCANCODE
 jz iisk1
 call IsItAltKey
iisk1:
 ret
IsItShiftKey endp


IsItAltKey proc near

 cmp ax,LEFT_ALT_SCANCODE
 jz iiak1
 cmp ax,RIGHT_ALT_SCANCODE
iiak1:
 ret
IsItAltKey endp

IsItLeftOrRightShift proc near

 cmp ax,LEFT_SHIFT_SCANCODE
 jz iilor1
 cmp ax,RIGHT_SHIFT_SCANCODE
iilor1:
 ret
IsItLeftOrRightShift endp

GetCustomEditBoxContents proc far
 public GetCustomEditBoxContents

 cmp al,KEYEDITBOX
 jnz gcebc1
 call GetHotIcon
 stc
 ret
gcebc1:
 clc
 ret
GetCustomEditBoxContents endp

GetHotIcon proc near



 push di
 push si
 push ax
 push bx
 push dx
 push cx
 mov di,[si].pStorageOffset
 mov ax,[si].ID
 mov bl,ah
 xor bh,bh
 mov ah,80h
 push ds
 push si
 SM_FUNCTION ax
 jge ghi2
 pop si
 pop ds
 jmp ghi1
ghi2
 push ds
 pop es

 mov ds,dx
 mov cx,word ptr [si].iBuffLen
 lds si,dword ptr [si].pBuffOff
 push cx
 jcxz ghi2a
 rep movsb
ghi2a:
 pop cx
 pop si
 pop ds
 mov [si].wDataLength,cx
ghi1:
 pop cx
 pop dx
 pop bx
 pop ax
 pop si
 pop di
 ret
GetHotIcon endp

RepaintCustomEditBoxContents proc far
 public RepaintCustomEditBoxContents


 cmp al,KEYEDITBOX
 jnz dcreb1
 call DrawKeyCombo
 cmp bCursorActive,0
 jz qqq
 mov di,offset rCursorRegion
 call resumecursor
qqq:
 stc
 ret
dcreb1:
 clc
 ret
RepaintCustomEditBoxContents endp


DrawKeyCombo proc near

 push bp
 mov bp,[si].wDataLength
 mov si,[si].pStorageOffset
 mov bHotKeyIsShifted,0
 mov bCapsLockState,0
 mov bNumLockState,0
dkk2:
 dec bp
 jl dkk1z
 dec bp
 jl dkk1z
 jmp dkk2a
dkk1z:
 jmp dkk1

dkk2a.
 lodsw
 test al,10000000b
 jz dkk2d
 and al,01111111b
 call IsItLeftOrRightShift
 jnz dkk2
 mov bHotKeyIsShifted,0
 jmp dkk2
dkk2d:
 cmp al,45h
 jnz dkk2e
 not bNumlockState
dkk2e.
 cmp al,58
 jnz dkk2f
 not bCapsLockState
dkk2f:
 call IsItLeftOrRightShift
 jz dkk2b
 jmp dkk2c
dkk2b:
 mov bHotKeyIsShifted,-1
dkk2c:
 push bx
 mov bx,ax
 push ds
 pop es
 mov di,offset bHotKeyBuild
 call GetGraphicCaptionForScanCode
 pop bx

 jc dkk2
 push si
 mov si,offset bHotKeyBuild
 call getstringwidth
 push ax
 push cx
 push dx
 push bx
 add dx,4
 push bx
 push ax
 mov al,[si]
 mov bx,pCurrentFont
 cmp bx,pGraphicFont
 jnz dkk5
 push dx
 call GetBitMapHeight
 pop dx
 cmp ax,wNormFontHeight
 jae dkk5
 sub ax,wNormFontHeight
 neg ax
 shr ax,1
 add dx,ax
dkk5:
 pop ax
 pop bx

 push ax
 push bp
 call DrawString
 pop bp
 pop ax

 pop bx
 pop dx
 pop cx
 add cx,ax
```

```
 add cx,4
 pop ax
 pop si
 mov wHotKeyRightPixel,cx
 jmp dkk2
dkk1:
 pop bp
 ret
DrawKeyCombo endp

RestoreShiftKeyups proc near

rsku1:
 dec di
 dec di
 cmp di,offset wHotKeyShiftKeyups
 jb rsku2
 mov ax,[di]
 mov [si],ax
 inc si
 inc si
 jmp rsku1
rsku2
 ret
RestoreShiftKeyups endp

FreeScreen proc near
 public freescreen

 mov bx,-1
 mov cx,bx
 mov si,bx
 mov di,bx
 SM_FUNCTION SM_UPDATE_DIMENSIONS
 ret
FreeScreen endp


SetArrowCursor proc near

 push ax
 push bx
 push cx
 push dx
 push es
 mov bHourGlassMode,0

 mov bx,0
 mov cx,0
 push ds
 pop es
 mov dx,offset bArrowCursor
 mov ax,9
 int 33h
 pop es
 pop dx
 pop cx
 pop bx
 pop ax
 ret
SetArrowCursor endp


SetHourGlassCursor proc near

 push ax
 push bx
 push cx
 push dx
 push es
 mov bHourGlassMode,-1
 mov bx,8
 mov cx,8
 push ds
 pop es
 mov dx,offset bHourGlassCursor
 mov ax,9
 int 33h
 pop es
 pop dx
 pop cx
 pop bx
 pop ax
 ret
SetHourGlassCursor endp

SetHandCursor proc near
 public SetHandCursor

 push ax
 push bx
 push cx
 push dx
 push si
 push di
 push es

 cmp dx,OSK.toppixel
 jl shc1
 push dx
 sub dx,OSK.pixelheight
 cmp dx,OSK.toppixel
 pop dx
 jge shc1
 cmp cx,OSK.leftpixel
 jl shc1
 push cx
 sub cx,OSK.pixelwidth
 cmp cx,OSK.leftpixel
 pop cx
 jge shc1

 test OSK.ControlState,INVISIBLE
 jnz shc1


 cmp bHandMode,-1
 mov bHandMode,-1
 jz shc3
 jmp shc2

shc1:
 cmp bHandMode,0
 jz shc3
 mov bHandMode,0
 cmp bHourGlassMode,0
 jnz shc4
 call SetArrowCursor
 jmp shc3
shc4:
 call SetHourGlassCursor
 jmp shc3
shc2:
 mov bx,5
 mov cx,0
 push ds
 pop es
 mov dx,offset bHandCursor
 mov ax,9
 int 33h
shc3:
 pop es
 pop di
 pop si
 pop dx
 pop cx
 pop bx
 pop ax
 ret
SetHandCursor endp
end main
```

Copr. 1995 Zenith Data Systems Corp.

```
tLISTBOXENTRY struc
lpszEntry dd 0
cAttribute db 0
ends

tMSGBOXBUFF struc
pTextOff dw 0
pTextSeg dw 0
cAlignment db 0
ends
tBUFFHEADER struc
iStructLen dw 0
iBuffLen   dw 0
pBufOff   dd 0
ends

tHOSTLIST struc
lpsNodeAddress dd 0
lpszGroupName  dd 0
lpszHostName   dd 0
iHostVersion   dw 0
lpsSerial      dd 0
lpsReserved    dd 0
ends

tSCANCODES struc
iScanCode  dw 0
ends


MB_LEFTJUSTIFIED equ 0
MB_CENTERED equ 1
MB_RIGHTJUSTIFIED equ 2

PENDRIVER_INTERRUPT equ 67h
SM_FUNCTION_INTERRUPT equ 68h

SM_GET_KEYBOARD_STATUS equ 062h
SM_SET_ACTIVE_STATUS equ 060h
SM_GET_INITIAL_SCREEN equ 08050h
SM_GET_ABOUT_DIALOG equ 063h
SM_GET_NEXT_CREDITS_DIALOG equ 64h
SM_UPDATE_DIMENSIONS equ 052h
SM_REQUEST_UNLOAD equ 08053h
SM_REPORT_BUTTON_CLICKED equ 8055H
SM_CALIBRATE_UPPERLEFT equ 0ch
SM_CALIBRATE_LOWERRIGHT equ 800Ch
SM_CANCEL_CALIBRATION equ 00eh
SM_REBOOT_HOST equ 011h
SM_SET_KEYSTROKE equ 061h
SM_REQUEST_ACTIVE_FLASH_UPGRADE equ
12h
SM_PERFORM_FLASH_UPDATE equ 13h
SM_GET_CONNECTION_STATUS equ 22h
SM_GET_HOST_LIST_STATUS equ 21h
SM_UPDATE_HOST_LIST equ 20h
SM_GET_PASSWORD_STATUS equ 25h
SM_REQUEST_CONNECTION equ 23h
SM_REQUEST_DISCONNECTION equ 8023h
SM_ABORT_REQUEST_CONNECTION equ 24h
SM_GET_MODEM_DEFAULTS equ 39h
SM_BLOCK_VIDEO_ACCESS equ 58h
SM_UNBLOCK_VIDEO_ACCESS equ 8058h


SM_TEST_FUNCTION equ 0FFFFh


UI_REQUEST_CLOSURE equ 053h
UI_REQUEST_DISPLAY equ 051h
UI_SHOW_MESSAGE_BOX equ 055h
UI_HIDE_MESSAGE_BOX equ 056h
UI_CALIBRATION_COMPLETE equ 0Dh
UI_FLASH_UPDATE_PERCENTAGE equ 14h
UI_GET_SUI_VERSION_NUMBER equ 69h
UI_UPDATE_CONNECTION_STATUS equ 3bh
GET_HOST_LIST_STATUS     equ 021h
UI_MOVE_OSK equ 05bh


RES_NO_SCREEN        EQU 0
RES_OSK_ALPHA        EQU 1
RES_OSK_NUM          EQU 2
RES_OSK_FULL         EQU 3
RES_OSK_BIG          EQU 4
RES_OSK_BIG_ALPHA    EQU 5
RES_OSK_BIG_NUM      EQU 6
RES_OSK_BIG_FULL     EQU 7
RES_SETUPS_HOST      EQU 1*8
RES_SETUPS_HOTKEYS   EQU 2*8
RES_SETUPS_MAINTENANCE EQU 3*8
RES_SETUPS_MODEM     EQU 4*8
RES_SETUPS_POWER     EQU 5*8
RES_SETUPS_SCREEN    EQU 6*8


GETSET_AUTOMATIC_SHUTOFF      equ 0fh
GETSET_BRIGHTNESS             equ 0bh
GETSET_CONTRAST               equ 0ah
GETSET_CUSTOM_AUTOANSWER_STRING equ
36h
GETSET_CUSTOM_CONNECT_STRING   equ 38h
GETSET_CUSTOM_DISCONNECT_STRING equ
37h
GETSET_CUSTOM_INIT_STRING      equ 035h
GETSET_HOST_CONNECTION_TYPE    equ 02ch
GETSET_MODEM_ANSWER_ON_RING    equ
032h
GETSET_MODEM_BAUD_RATE_ENTRY   equ
29h
GETSET_MODEM_HOST_DESC_ENTRY   equ
26h
GETSET_MODEM_HOST_PHONE_ENTRY  equ
27h
GETSET_MODEM_MANUFACTURER_ENTRY equ
28h
GETSET_MODEM_PREFIX            equ 030h
GETSET_MODEM_RETRY_DELAY       equ 034h
GETSET_MODEM_RETRY_LIMIT       equ 033h
GETSET_MODEM_SUFFIX            equ 031h
GETSET_MODEM_TONE_OR_PULSE     equ 02fh
GETSET_NETWORK_GROUP_ENTRY     equ 2ah
GETSET_NETWORK_HOST_ENTRY      equ 2bh
GETSET_PASSWORD                equ 02eh
GETSET_SLEEPMODE_PERIOD        equ 10h
GETSET_SECURITY_ID             equ 66h
GETSET_DOMAIN_ID               equ 67h
GETSET_LOCK_HOST_KEYBOARD      equ 68h
GETSET_DIM_HOST_SCREEN         equ 6Ah
GETSET_USER_DEFINED_HOT_ICON   equ 65h
GETSET_USER_ID                 equ 02dh
GETSET_FRAME_TYPE_ENTRY        equ 3ah
GETSET_USER_INTERFACE_LANGUAGE equ
057h
```

Copr. 1995 Zenith Data Systems Corp.

```
.model small
include uiinclud.inc
DATASEG_BEGIN
extrn ControlDataStorageArea:byte
extrn bFormColor:byte
extrn bLightColor:byte
extrn bOutLineColor:byte
extrn bScreenMode:byte
extrn bShadowColor:byte

upbuttontable label word
 db 0
 dw offset upbuttonulc
 dw offset upbuttontop
 dw offset upbuttonurc
 dw offset upbuttonleft
 dw offset upbuttonmiddle
 dw offset upbuttonright
 dw offset upbuttonllc
 dw offset upbuttonbottom
 dw offset upbuttonlrc
UPBUTTONULC label byte
db 1
db 3
DB 00000000b,00000000b,00000000b,01111111b
DB 01111111b,00000000b,00000000b,10000000b
DB 01111111b,00000000b,00000000b,10000000b
UPBUTTONTOP label byte
db 1
db BUTTONTOPHEIGHT
DB 00000000b,00000000b,00000000b,11111111b
DB 11111111b,00000000b,00000000b,00000000b
DB 11111111b,00000000b,00000000b,00000000b
UPBUTTONURC label byte
db 1
db 3
DB 00000000b,00000000b,00000000b,11111110b
DB 11111100b,00000000b,00000010b,00000001b
DB 11111000b,00000000b,00000110b,00000001b
UPBUTTONLEFT label byte
db 1
db 1
DB 01100000b,00011111b,00000000b,10000000b

UPBUTTONMIDDLE label byte
db 1
db 1
DB 00000000b,11111111b,00000000b,00000000b
UPBUTTONRIGHT label byte
db 1
db 1
DB 00000000b,11111000b,00000110b,00000001b


UPBUTTONLLC label byte
db 1
db 3
DB 01000000b,00000000b,00111111b,10000000b
DB 00000000b,00000000b,01111111b,10000000b
DB 00000000b,00000000b,00000000b,01111111b
UPBUTTONBOTTOM label byte
db 1
db BUTTONBOTTOMHEIGHT
DB 00000000b,00000000b,11111111b,00000000b
DB 00000000b,00000000b,11111111b,00000000b
DB 00000000b,00000000b,00000000b,11111111b
UPBUTTONLRC label byte
db 1
db 3
DB 00000000b,00000000b,11111110b,00000001b
DB 00000000b,00000000b,11111110b,00000001b
DB 00000000b,00000000b,00000000b,11111110b
dnbuttontable label word
 db 0
 dw offset dnbuttonulc
 dw offset dnbuttontop
 dw offset dnbuttonurc
 dw offset dnbuttonleft
 dw offset dnbuttonmiddle
 dw offset dnbuttonright
 dw offset dnbuttonllc
 dw offset dnbuttonbottom
 dw offset dnbuttonlrc
DNBUTTONULC label byte
db 1
db 3
DB 00000000b,00000000b,00000000b,01111111b
DB 00000000b,00000000b,00000000b,11111111b
DB 00000000b,00000000b,00111111b,11000000b


DNBUTTONTOP label byte
db 1
db BUTTONTOPHEIGHT
DB 00000000b,00000000b,00000000b,11111111b
DB 00000000b,00000000b,00000000b,11111111b
DB 00000000b,00000000b,11111111b,00000000b
DNBUTTONURC label byte
```

```
db 1
db 3
DB 00000000b,00000000b,00000000b,11111110b
DB 00000000b,00000000b,00000000b,11111111b
DB 00000000b,00000000b,11111110b,00000001b

DNBUTTONLEFT label byte
db 1
db 1
DB 00000000b,00111111b,00000000b,11000000b

DNBUTTONMIDDLE label byte
db 1
db 1
DB 00000000b,11111111b,00000000b,00000000b

DNBUTTONRIGHT label byte
db 1
db 1
DB 00000000b,11111110b,00000000b,00000001b

DNBUTTONLLC label byte
db 1
db 3
DB 00000000b,00111111b,00000000b,11000000b
DB 00000000b,00111111b,00000000b,11000000b
DB 00000000b,00000000b,00000000b,11111111b
DNBUTTONBOTTOM label byte
db 1
db BUTTONBOTTOMHEIGHT
DB 00000000b,11111111b,00000000b,00000000b
DB 00000000b,11111111b,00000000b,00000000b
DB 00000000b,00000000b,00000000b,11111111b
DNBUTTONLRC label byte
db 1
db 3
DB 00000000b,11111110b,00000000b,00000001b
DB 00000000b,11111110b,00000000b,00000001b
DB 00000000b,00000000b,00000000b,11111110b

chiselboxtable label word
 db 11b
 dw offset chiselboxulc
 dw offset chiselboxtop
 dw offset chiselboxurc
 dw offset chiselboxleft
 dw offset chiselboxmiddle
 dw offset chiselboxnght
 dw offset chiselboxllc
 dw offset chiselboxbottom
 dw offset chiselboxlrc
chiselboxulc label byte
db 1,3

 db 00000000b,11111111b,00000000b,00000000b
 db 00000000b,00000000b,11111111b,00000000b
 db 01111111b,00000000b,10000000b,00000000b
chiselboxtop label byte
db 1,3
db 00000000b,11111111b,00000000b,00000000b
db 00000000b,00000000b,11111111b,00000000b
db 11111111b,00000000b,00000000b,00000000b
chiselboxurc label byte
db 1,3
db 00000000b,11110000b,00000000b,00000000b
db 00000000b,01110000b,10000000b,00000000b
db 11000000b,00110000b,00000000b,00000000b
chiselboxleft label byte
db 1,1

db 01000000b,0011111b,10000000b,00000000b
chiselboxmiddle label byte
db 1,1
db 00000000b,11111111b,00000000b,00000000b
chiselboxnght label byte
db 1 1
 db 01000000b,00110000b,10000000b,00000000b
chiselboxllc label byte
db 1,3
db 01000000b,00000000b,10111111b,00000000b
db 01111111b,10000000b,00000000b,00000000b
db 00000000b,11111111b,00000000b,00000000b
chiselboxbottom label byte
db 1,3
db 00000000b,00000000b,11111111b,00000000b
db 11111111b,00000000b,00000000b,00000000b
db 00000000b,11111111b,00000000b,00000000b
chiselboxlrc label byte
db 1,3
db 01000000b,00110000b 10000000b,00000000b
db 11000000b 00110000b,00000000b,00000000b
db 00000000b,11110000b,00000000b,00000000b

lineboxtable label word
 db 11b
 dw offset lineboxulc
 dw offset lineboxtop
 dw offset lineboxurc
 dw offset lineboxleft
 dw offset lineboxmiddle
 dw offset lineboxright
 dw offset lineboxllc
 dw offset lineboxbottom
 dw offset lineboxlrc
lineboxulc label byte
db 1,1
 db 00000000b,00000000b,00000000b,00000000b
lineboxtop label byte
db 1,1
db 00000000b,00000000b,00000000b,11111111b
lineboxurc label byte
db 1,1
 db 00000000b,00000000b,00000000b,00000000b
lineboxleft label byte
db 1,1
db 00000000b,0000000b,00000000b,10000000b
lineboxmiddle label byte
db 1,1
db 00000000b,00000000b,00000000b,00000000b
lineboxright label byte
db 1,1
db 00000000b,00000000b,00000000b,10000000b
lineboxllc label byte
db 1,1
 db 00000000b,00000000b,00000000b,00000000b
lineboxbottom label byte
db 1,1
 db 00000000b,00000000b,00000000b,00000000b

lineboxlrc label byte
db 1,1
 db 00000000b,00000000b,00000000b,00000000b
textboxtable label word
 db 0
 dw offset textboxulc
 dw offset textboxtop
 dw offset textboxurc
 dw offset textboxleft
 dw offset textboxmiddle
 dw offset textboxright
 dw offset textboxllc
 dw offset textboxbottom
 dw offset textboxlrc
sliderboxtable label word
 db 0
 dw offset sliderboxulc
 dw offset sliderboxtop
 dw offset sliderboxurc
 dw offset textboxleft
sliderboxmiddle label word
 dw offset nomiddle
 dw offset sliderboxright
 dw offset sliderboxllc
 dw offset sliderboxbottom
 dw offset sliderboxlrc

sunkenframetable label word
 db 0
 dw offset textboxulc
 dw offset textboxtop
 dw offset textboxurc
 dw offset textboxleft
 dw offset nomiddle
 dw offset textboxright
 dw offset textboxllc
 dw offset textboxbottom
 dw offset textboxlrc

textboxulc label byte
db 1 3
db 00000000b,11111111b,00000000b,00000000b
db 00000000b,11111100b,00000011b,00000000b
db 00000000b,11111100b,00000010b,00000001b

Sliderboxulc label byte
db 1,5

db 00000000b,11111111b,00000000b,00000000b
db 00000000b,11111111b,00000000b,00000000b
db 00000000b,11111111b,00000000b,00000000b
db 00000000b,11111100b,00000011b,00000000b
db 00000000b,11111100b,00000010b,00000001b
textboxtop label byte
db 1,3
db 00000000b,11111111b,00000000b,00000000b
db 00000000b,00000000b,11111111b,00000000b
db 00000000b,11111111b,00000000b,00000000b

sliderboxtop label byte
db 1,5
db 00000000b,11111111b,00000000b,00000000b
db 00000000b,11111111b,00000000b,00000000b
db 00000000b,11111111b,00000000b,00000000b
db 00000000b,00000000b,11111111b,00000000b
db 00000000b,11111111b,00000000b,00000000b
textboxurc label byte
db 1,3

db 00000000b,11100000b,00000000b,00000000b
db 01000000b,00100000b,10000000b,00000000b
db 01000000b,10100000b,00000000b,00000000b

sliderboxurc label byte
db 1,5
db 00000000b,11111111b,00000000b,00000000b
db 00000000b,11111111b,00000000b,00000000b
db 00000000b,11111111b,00000000b,00000000b
db 01000000b,00111111b,10000000b,00000000b
db 01000000b,10111111b,00000000b,00000000b
textboxleft label byte
db 1,1
db 00000000b,11111100b,00000010b,00000001b
textboxmiddle label byte
db 1,1
db 11111111b,00000000b,00000000b,00000000b
textboxright label byte
db 1,1
db 01000000b,10100000b,00000000b,00000000b

sliderboxright label byte
db 1,1
db 01000000b,10111111b,00000000b,00000000b
textboxllc label byte
db 1,3
db 00000000b,11111101b,00000010b,00000000b
db 00000011b,11111100b,00000000b,00000000b
db 00000000b,11111111b,00000000b,00000000b
sliderboxllc label byte
db 1,5
db 00000000b,11111101b,00000010b,00000000b
db 00000011b,11111100b,00000000b,00000000b
db 00000000b,11111111b,00000000b,00000000b
db 00000000b,11111111b,00000000b,00000000b
db 00000000b,11111111b,00000000b,00000000b
textboxbottom label byte
db 1,3
db 00000000b,11111111b,00000000b,00000000b
db 11111111b,00000000b,00000000b,00000000b
db 00000000b,11111111b,00000000b,00000000b

sliderboxbottom label byte
db 1,5
db 00000000b,11111111b,00000000b,00000000b
db 11111111b,00000000b,00000000b,00000000b
db 00000000b,11111111b,00000000b,00000000b
db 00000000b,11111111b,00000000b,00000000b
db 00000000b,11111111b,00000000b,00000000b
textboxlrc label byte
db 1,3
db 01000000b,10100000b,00000000b,00000000b
db 11000000b,00100000b,00000000b,00000000b
db 00000000b,11100000b,00000000b,00000000b

sliderboxlrc label byte
db 1,5
db 01000000b,10111111b,00000000b,00000000b
db 11000000b,00111111b,00000000b,00000000b
db 00000000b,11111111b,00000000b,00000000b
db 00000000b,11111111b,00000000b,00000000b
db 00000000b,11111111b,00000000b,00000000b

sliderbutton label byte
 public SliderButton
db 2
db 18

db 00111111b,00000000b,00000000b,00000000b
db 11000000b,00000000b,00000000b,00000000b
db 01000000b,00111111b,00000000b,00000000b
db 00000000b,11000000b,00100000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b

db 00000000b,11100000b,00010000b,00000000b
db 10000000b,01111111b,00000000b,00000000b
db 00000000b,11100000b,00010000b,00000000b
db 10000010b,01111001b,00000100b,00000000b
db 00000000b,11100000b,00010000b,00000000b
db 10000010b,01111001b,00000100b,00000000b
db 00000000b,11100000b,00010000b,00000000b
db 10000010b,01111001b,00000100b,00000000b
db 00000000b,11100000b,00010000b,00000000b
db 10000010b,01111001b,00000100b,00000000b
db 00000000b,11100000b,00010000b,00000000b
db 00000010b,00111001b,01000100b,00000000b
db 00000000b,11000000b,00100000b,00000000b
db 00000000b,00000000b,00111111b,00000000b
db 00000000b,00000000b,11000000b,00000000b
nomiddle label byte
db 1,1
db 00000000b,00000000b,00000000b,00000000b

CHECKEDBOX label byte
 public CheckedBox
if CHECKMARK_CHECKBOXES eq 0

db 2
db 16
DB 00000000b,11111111b,00000000b,00000000b
 DB 00000000b,11111111b,00000000b,00000000b
DB 00000000b,10000000b,01111111b,00000000b
 DB 00000000b,00000111b,11111000b,00000000b
DB 00000000b,10000000b,01000000b,00111111b
 DB 00000100b,00001011b,00000000b,11110000b
DB 00011111b,10000000b,01000000b,00100000b
 DB 11110100b,00001011b,00000000b,00000000b
DB 00010011b,10000000b,01000000b,00101100b
 DB 10010100b,00001011b,00000000b,01100000b
DB 00010001b,10000000b,01000000b,00101110b
 DB 00010100b,00001011b,00000000b,11100000b
DB 00011000b,10000000b,01000000b,00100111b
 DB 00110100b,00001011b,00000000b,11000000b
DB 00011100b,10000000b,01000000b,00100011b
 DB 01110100b,00001011b,00000000b,10000000b
DB 00011000b,10000000b,01000000b,00100111b
 DB 00110100b,00001011b,00000000b,11000000b
DB 00010001b,10000000b,01000000b,00101110b
 DB 00010100b,00001011b,00000000b,11100000b
DB 00010011b,10000000b,01000000b,00101100b
 DB 10010100b,00001011b,00000000b,01100000b
DB 00011111b,10000000b,01000000b,00100000b
 DB 11110100b,00001011b,00000000b,00000000b
DB 00000000b,10011111b,01000000b,00100000b
 DB 00000100b,11111011b,00000000b,00000000b
DB 00111111b,11000000b,00000000b,00000000b
 DB 11111100b,00000011b,00000000b,00000000b
DB 00000000b,11111111b,00000000b,00000000b
 DB 00000000b,11111111b,00000000b,00000000b
DB 00000000b,11111111b,00000000b,00000000b
 DB 00000000b,11111111b,00000000b,00000000b

else
db 2
db 16
DB 00000000b,11111111b,00000000b,00000000b
  DB
00000000b,11111110b,00000000b,00000000b
DB 00000000b,10000000b,01111111b,00000000b
  DB
00000000b,00000110b,11111000b,00000000b
DB 00000000b,10000000b,01000000b,00111111b
  DB
00000100b,00001010b,00000000b,11110000b
DB 00011111b,10000000b,01000000b,00100000b
  DB
11110100b,00001010b,00000000b,00000000b
DB 00011111b,10000000b,01000000b,00100000b
  DB
11010100b,00001010b,00000000b,00100000b
DB 00011111b,10000000b,01000000b,00100000b
  DB
10010100b,00001010b,00000000b,01100000b
DB 00011111b,10000000b,01000000b,00100000b
  DB
00010100b,00001010b,00000000b,11100000b
DB 00010010b,10000000b,01000000b,00101101b
  DB
00110100b,00001010b,00000000b,11000000b
DB 00010000b,10000000b,01000000b,00101111b
  DB
01110100b,00001010b,00000000b,10000000b
DB 00011000b,10000000b,01000000b,00100111b
  DB
11110100b,00001010b,00000000b,00000000b
DB 00011101b,10000000b,01000000b,00100010b
  DB
11110100b,00001010b,00000000b,00000000b
DB 00011111b,10000000b,01000000b,00100000b
  DB
11110100b,00001010b,00000000b,00000000b
DB 00000000b,10011111b,01000000b,00100000b
```

```
DB
00000100b,11111010b,00000000b,00000000b
DB 00111111b,11000000b,00000000b,00000000b
DB
11111100b,00000010b,00000000b,00000000b
DB 00000000b,11111111b,00000000b,00000000b
DB
00000000b,11111110b,00000000b,00000000b
DB 00000000b,11111111b,00000000b,00000000b
DB
00000000b,11111110b,00000000b,00000000b

endif
UNCHECKEDBOX label byte
 public UnCheckedBox

db 2
db 16
DB 00000000b,11111111b,00000000b,00000000b
 DB 00000000b,11111110b,00000000b,00000000b
DB 00000000b,10000000b,01111111b,00000000b
 DB 00000000b,00000110b,11111000b,00000000b
DB 00000000b,10000000b,01000000b,00111111b
 DB 00000100b,00001010b,00000000b,11110000b
DB 00011111b,10000000b,01000000b,00100000b
 DB 11110100b,00001010b,00000000b,00000000b
DB 00011111b,10000000b,01000000b,00100000b
 DB 11110100b,00001010b,00000000b,00000000b
DB 00011111b,10000000b,01000000b,00100000b
 DB 11110100b,00001010b,00000000b,00000000b
DB 00011111b,10000000b,01000000b,00100000b
 DB 11110100b,00001010b,00000000b,00000000b
DB 00011111b,10000000b,01000000b,00100000b
 DB 11110100b,00001010b,00000000b,00000000b
DB 00011111b,10000000b,01000000b,00100000b
 DB 11110100b,00001010b,00000000b,00000000b
DB 00011111b,10000000b,01000000b,00100000b
 DB 11110100b,00001010b,00000000b,00000000b
DB 00011111b,10000000b,01000000b,00100000b
 DB 11110100b,00001010b,00000000b,00000000b
DB 00011111b,10000000b,01000000b,00100000b
 DB 11110100b,00001010b,00000000b,00000000b
DB 00000000b,10011111b,01000000b,00100000b
 DB 00000100b,11111010b,00000000b,00000000b
DB 00111111b,11000000b,00000000b,00000000b
 DB 11111100b,00000010b,00000000b,00000000b
DB 00000000b,11111111b,00000000b,00000000b
 DB 00000000b,11111110b,00000000b,00000000b
DB 00000000b,11111111b,00000000b,00000000b
 DB 00000000b,11111110b,00000000b,00000000b
if DIAMOND_OPTBUTTONS eq 0
unseloptbutton label byte
 public UnSelOptButton
db 2
db 15
db 00000000b,11111111b,00000000b,00000000b
 db 00000000b,00000000b,00000000b,00000000b
db 00000000b,11111000b,00000111b,00000000b
 db 00000000b,01000000b,10000000b,00000000b
db 00000000b,11100000b,00010000b,00001111b
 db 00000000b,00010000b,00100000b,11000000b
db 00000111b,11000000b,00101000b,00010000b
 db 11000000b,00001000b,00010000b,00100000b
db 00001111b,11000000b,00010000b,00100000b
 db 11100000b,00001000b,00010000b,00000000b
db 00011111b,10000000b,01000000b,00100000b
 db 11110100b,00000010b,00001000b,00000000b
db 00011111b,10000000b,01000000b,00100000b
 db 11110100b,00000010b,00001000b,00000000b
db 00011111b,10000000b,01000000b,00100000b
 db 11110100b,00000010b,00001000b,00000000b
db 00011111b,10000000b,01000000b,00100000b
 db 11110100b,00000010b,00001000b,00000000b
db 00011111b,11000000b,00000000b,00100000b
 db 11110100b,00000010b,00001000b,00000000b
db 00001111b,11000000b,00100000b,00010000b
 db 11101000b,00000100b,00010000b,00000000b
db 00000111b,11100000b,00011000b,00000000b
 db 11001000b,00010100b,00100000b,00000000b
db 00000000b,11111000b,00000111b,00000000b
 db 00110000b,00001000b,11000000b,00000000b
db 00000111b,11111000b,00000000b,00000000b
 db 11000000b,00100000b,00000000b,00000000b
db 00000000b,10000000b,00000000b,00000000b
 db 00000000b,00000000b,00000000b,00000000b
seloptbutton label byte
 public SelOptButton
db 2
db 15
db 00000000b,11111111b,00000000b,00000000b
 db 00000000b,10000000b,00000000b,00000000b
db 00000000b,11111000b,00000111b,00000000b
 db 00000000b,01000000b,10000000b,00000000b
db 00000000b,11100000b,00010000b,00001111b
 db 00000000b,00010000b,00100000b,11000000b
db 00000111b,11000000b,00101000b,00010000b
 db 11000000b,00001000b,00010000b,00100000b
db 00001100b,11000000b,00010011b,00100000b
 db 01100000b,00001000b,10010000b,00000000b
db 00011000b,10000000b,01000000b,00100111b
 db 00110100b,00000010b,00001000b,11000000b
db 00010000b,10000000b,01001000b,00100111b
 db 00010100b,00000010b,00101000b,11000000b
db 00010000b,10000000b,01001000b,00100111b
 db 00010100b,00000010b,00101000b,11000000b
db 00010000b,10000000b,01001000b,00100111b
 db 00010100b,00000010b,00101000b,11000000b
db 00011000b,11000000b,00000000b,00100111b
 db 00110100b,00000010b,00001000b,11000000b
db 00001100b,11000000b,00100011b,00010000b
 db 01101000b,00000100b,10010000b,00000000b
db 00000111b,11100000b,00011000b,00000000b
 db 11001000b,00010100b,00100000b,00000000b
db 00000000b,11111000b,00000111b,00000000b
 db 00110000b,00001000b,11000000b,00000000b
db 00000111b,11111000b,00000000b,00000000b
 db 11000000b,00100000b,00000000b,00000000b
db 00000000b,11111111b,00000000b,00000000b
 db 00000000b,10000000b,00000000b,00000000b
else
unseloptbutton label byte
 public UnSelOptButton

db 2
db 15
db 00000001b,11111110b,00000000b,00000000b
db  00000000b,11111110b,00000000b,00000000b
db 00000000b,11111100b,00000010b,00000001b
db  10000000b,01111110b,00000000b,00000000b
db 00000001b,11111000b,00000100b,00000010b
db  01000000b,00111110b,10000000b,00000000b
db 00000011b,11110000b,00001000b,00000100b
db  10100000b,00011110b,01000000b,00000000b
db 00000111b,11100000b,00010000b,00001000b
db  11010000b,00001110b,00100000b,00000000b
db 00001111b,11000000b,00100000b,00010000b
db  11101000b,00000110b,00010000b,00000000b
db 00011111b,10000000b,01000000b,00100000b
db  11110100b,00000010b,00001000b,00000000b
db 00111111b,00000000b,10000000b,01000000b
db  11111010b,00000000b,00000100b,00000000b
db 00011111b,10000000b,01000000b,00100000b
db  11110100b,00000010b,00001000b,00000000b
db 00001111b,11000000b,00100000b,00010000b
db  11101000b,00000110b,00010000b,00000000b
db 00000111b,11100000b,00010000b,00001000b
db  11010000b,00001110b,00100000b,00000000b
db 00000011b,11110000b,00001000b,00000100b
db  10100000b,00011110b,01000000b,00000000b
db 00000001b,11111000b,00000100b,00000010b
db  01000000b,00111110b,10000000b,00000000b
db 00000000b,11111100b,00000010b,00000001b
db  10000000b,01111110b,00000000b,00000000b
db 00000000b,11111110b,00000001b,00000000b
db  00000000b,11111110b,00000000b,00000000b
seloptbutton label byte
 public SelOptButton

db 2
db 15
db 00000001b,11111110b,00000000b,00000000b
db  00000000b,11111110b,00000000b,00000000b
db 00000000b,11111100b,00000010b,00000001b
db  10000000b,01111110b,00000000b,00000000b
db 00000001b,11111000b,00000100b,00000010b
db  01000000b,00111110b,10000000b,00000000b
db 00000011b,11110000b,00001000b,00000100b
db  10100000b,00011110b,01000000b,00000000b
db 00000110b,11100000b,00010000b,00001001b
db  11010000b,00001110b,00100000b,00000000b
db 00001100b,11000000b,00100000b,00010011b
db  01101000b,00000110b,00010000b,10000000b
db 00011000b,10000000b,01000000b,00100111b
db  00110100b,00000010b,00001000b,11000000b
db 00110000b,00000000b,10000000b,01001111b
db  00011010b,00000000b,00000100b,11100000b
db 00011000b,10000000b,01000000b,00100111b
db  00110100b,00000010b,00001000b,11000000b
db 00001100b,11000000b,00100000b,00010011b
db  01101000b,00000110b,00010000b,10000000b
db 00000110b,11100000b,00010000b,00001001b
db  11010000b,00001110b,00100000b,00000000b
db 00000011b,11110000b,00001000b,00000100b
db  10100000b,00011110b,01000000b,00000000b
db 00000001b,11111000b,00000100b,00000010b
db  01000000b,00111110b,10000000b,00000000b
db 00000000b,11111100b,00000010b,00000001b
db  10000000b,01111110b,00000000b,00000000b
db 00000000b,11111110b,00000001b,00000000b
db  00000000b,11111110b,00000000b,00000000b

endif
bSpectrumPattern label byte
 public bSpectrumPattern
db 21+2
db 2
db  00000000b,00000000b,00000000b,11111111b
db  00000000b,00000000b,00000000b,11111111b
db  00000000b,00000000b,00100100b,11011011b
db  00000000b,00000000b,10101010b,01010101b
db  00000000b,00000000b,10101010b,01010101b
db  00000000b,00000000b,11011011b,00100100b
db  00000000b,00000000b,11111111b,00000000b
db  00000000b,00000000b,11111111b,00000000b
db  00000000b,00100100b,11011011b,00000000b
db  00000000b,01010101b,10101010b,00000000b
db  00000000b,01010101b,10101010b,00000000b
db  00000000b,01010101b,10101010b,00000000b
db  00000000b,11011011b,00100100b,00000000b
db  00000000b,11111111b,00000000b,00000000b
db  00000000b,11111111b,00000000b,00000000b
db  00100100b,11011011b,00000000b,00000000b
db  01010101b,10101010b,00000000b,00000000b
db  01010101b,10101010b,00000000b,00000000b
db  01010101b,10101010b,00000000b,00000000b
db  11011011b,00100100b,00000000b,00000000b
db  11111111b,00000000b,00000000b,00000000b
db  11111111b,00000000b,00000000b,00000000b
db  11111111b,00000000b,00000000b,00000000b
db  00000000b,00000000b,00000000b,11111111b
db  00000000b,00000000b,00000000b,11111111b
db  00000000b,00000000b,00010010b,11101101b
db  00000000b,00000000b,01010101b,10101010b
db  00000000b,00000000b,01010101b,10101010b
db  00000000b,00000000b,11101101b,00010010b
db  00000000b,00000000b,11111111b,00000000b
db  00000000b,00000000b,11111111b,00000000b
db  00000000b,00010010b,11101101b,00000000b
db  00000000b,10101010b,01010101b,00000000b
db  00000000b,10101010b,01010101b,00000000b
db  00000000b,10101010b,01010101b,00000000b
db  00000000b,11101101b,00010010b,00000000b
db  00000000b,11111111b,00000000b,00000000b
db  00000000b,11111111b,00000000b,00000000b
db  00010010b,11101101b,00000000b,00000000b
db  10101010b,01010101b,00000000b,00000000b
db  10101010b,01010101b,00000000b,00000000b
db  10101010b,01010101b,00000000b,00000000b
db  11101101b,00010010b,00000000b,00000000b
db  11111111b,00000000b,00000000b,00000000b
db  11111111b,00000000b,00000000b,00000000b
db  11111111b,00000000b,00000000b,00000000b
bTallNotchPattern label byte
 public bTallNotchPattern
db 1
db 8
db  00000001b,00000000b,00000010b,00000000b
db  00000001b,00000000b,00000010b,00000000b
db  00000001b,00000000b,00000010b,00000000b
db  00000001b,00000000b,00000010b,00000000b
db  00000001b,00000000b,00000010b,00000000b
db  00000001b,00000000b,00000010b,00000000b
db  00000001b,00000000b,00000010b,00000000b
db  00000011b,00000000b,00000000b,00000000b
bShortNotchPattern label byte
 public bShortNotchPattern
db 1
db 5
db  00000001b,00000000b,00000010b,00000000b
db  00000001b,00000000b,00000010b,00000000b
db  00000001b,00000000b,00000010b,00000000b
db  00000001b,00000000b,00000010b,00000000b
db  00000011b,00000000b,00000000b,00000000b



rectanglepointers label word
recflags  db 0
reculc   dw 0
rectop   dw 0
recurc   dw 0
recleft  dw 0
recmiddle dw 0
recright  dw 0
recllc   dw 0
recbottom dw 0
reclrc   dw 0
recend label word
buttonflags db 0
buttoncolumn dw 0
buttonrow dw 0
buttonheight db 0
buttonlength db 0
DATASEG_END
.code
extrn CheckIfCovered:near
extrn FillScreenArea:near
extrn NewRowForCheckIfCovered:near
extrn PointScreenDest:near


Draw4Color proc near
  public Draw4Color
  cmp bScreenMode,VGA_MODE
  jz d4c0
  ret
d4c0:
  push word ptr bLightColor
  push word ptr bFormColor
  push word ptr bShadowColor
  push word ptr bOutlineColor
  cmp byte ptr [si],-1
  jnz d4c10
  lodsb
  lodsb
  mov bLightColor,al
  lodsb
  mov bFormColor,al
  lodsb
  mov bShadowColor,al
  lodsb
  mov bOutlineColor,al

d4c10:
  call pointscreendest
  lodsw

  mov bx,ax
  xor ah,ah
  mov bp,80
  sub bp,ax

  vgaloadlatches
d4e:
if need_osk ne 0
  call checkifcovered
  jnc d4e1

  lodsb
  lodsb
  lodsb
  lodsb
  jmp d4d
endif
d4e1:
  mov al,es:[di]
  lodsb
  or al,al
  jz d4a
  vgawritecolor bLightColor
d4a:
  mov al,es:[di]
  lodsb
  or al,al
  jz d4b
  vgawritecolor bFormColor
d4b:
  mov al,es:[di]
  lodsb
  or al,al
  jz d4c
  vgawritecolor bShadowColor
d4c:
  mov al,es:[di]
  lodsb
  or al,al
  jz d4d
  vgawritecolor bOutlineColor
d4d:
  inc di
  dec bl
  jnz d4e
  add di,bp
  dec bh
  jz d4f
  mov ax,80
  sub ax,bp
  mov bl,al
if need_osk ne 0
  call NewRowForCheckIfCovered
endif
  jmp d4e
d4f:
  pop  word ptr bOutlineColor
  pop  word ptr bShadowColor
  pop  word ptr bFormColor
  pop  word ptr bLightColor
  ret
draw4color endp

DrawRectangle proc near
  mov buttoncolumn,cx
  mov buttonrow,dx
  mov buttonheight,bh
  mov buttonlength,bl
  push ds
  pop es
  mov di,offset rectanglepointers
  mov cx,offset recend - offset rectanglepointers
  rep movsb
  mov si,recmiddle
  or si,si
```

```
 jz dmomid
 lodsb
 lodsb

 mov bl,11111111b
 mov bh,bLightColor
 lodsb
 cmp al,bl
 jz dre1
 mov bh,bFormColor
 lodsb
 cmp al,bl
 jz dre1
 mov bh,bShadowColor
 lodsb
 cmp al,bl
 jz dre1
 mov bh,bOutlineColor
 lodsb
 cmp al,bl
 jnz dmomid
dre1:
 mov recmiddle,0
 mov si,recleft
 mov al,[si]
 xor ah,ah
 sal ax,1
 sal ax,1
 sal ax,1

 add ax,buttoncolumn
 mov cx,ax
 mov dx,buttonrow
 mov si,rectop
 mov al,[si+1]
 xor ah,ah
 add dx,ax
 mov al,buttonlength
 xor ah,ah
 mov si,ax
 mov al,buttonheight
 xor ah,ah
 add ax,ax
 jz dmomid


 call fillscreenarea
dmomid:
 cmp bScreenMode,VGA_MODE
 jz dre0
 ret
dre0:
 mov dx,buttonrow
 cmp buttonheight,0
 jnz drx1
 test recflags,1
 jz drx1
 mov cx,buttoncolumn
 sub cx,8
 jmp drx3
drx1
 mov cx,buttoncolumn
 mov si,reculc
 call draw4color
drx2:
 mov cx,buttoncolumn
drx3:
 mov bl,buttonlength
 or bl,bl
 jz drb1a
drb1
 add cx,8
 push bx
 push cx
 mov dx,buttonrow
 mov si,rectop
 call draw4color
 pop cx
 pop bx
 dec bl
 jnz drb1
drb1a:
 add cx,8
 cmp buttonheight,0
 jnz drx4
 test recflags,1
 jz drx4
 jmp drb99
drx4:
 mov dx,buttonrow
 mov si,recurc
 call draw4color
 mov dx,buttonrow
 add dx,3
 mov bh,buttonheight
 or bh,bh
 jz drb4
 push bx
 call rectanglebody
 pop bx
 call rectanglebody
drb4:
 mov cx,buttoncolumn
 push cx
 push dx
 mov si,recllc
 call draw4color
 pop dx
 pop cx
 add cx,8
 mov bl,buttonlength
 or bl,bl
 jz drb5a
drb5:
 push bx
 push cx
 push dx
 mov si,recbottom
 call draw4color
 pop dx
 pop cx
 pop bx
 add cx,8
 dec bl
 jnz drb5
drb5a.
 mov si,reclrc
 call draw4color
drb99:
 ret
drawrectangle endp


rectanglebody proc near
drb3:
 push bx
 push dx
 mov cx,buttoncolumn
 push cx
 mov si,recleft
 call draw4color
 pop cx
 pop dx
 pop bx
 add cx,8
 mov bl,buttonlength
 or bl,bl
 jz drb2a
drb2:
 cmp recmiddle,0
 jnz drb2b
 mov al,buttonlength
 xor ah,ah
 sal ax,1
 sal ax,1
 sal ax,1
 add cx,ax
 jmp drb2a
drb2b
 push bx
 push cx
 push dx
 mov si,recmiddle
 call draw4color
 pop dx
 pop cx
 pop bx
 add cx,8
 dec bl
 jnz drb2
drb2a:
 push bx
 push dx
 mov si,recright
 call draw4color
 pop dx
 pop bx
 inc dx
 dec bh
 jz drb4q
 jmp drb3
drb4q:
 ret

rectanglebody endp

DrawUpButton proc near
 public DrawUpButton
 public drawupbutton
 push si
 mov si,offset upbuttontable
 call drawrectangle
 pop si
 ret
drawupbutton endp

DrawDnButton proc near
 public DrawDnButton
 public drawdnbutton
 push si
 mov si,offset dnbuttontable
 call drawrectangle
 pop si
 ret
drawdnbutton endp

DrawChiselBox proc near
 public DrawChiselBox
 public drawchiselbox
 mov si,offset chiselboxtable
 call drawrectangle
 ret
drawchiselbox endp


DrawTextLine proc near
 public DrawTextLine
 push bx
 call PointScreenDest
 pop bx
dtl2:
if need_osk ne 0
 call CheckIfCovered
 jc dtl1
endif
 mov ax,196+256*7
 mov word ptr es:[di],ax
dtl1.
 inc di
 inc di
 dec bl
 jnz  dtl2

 ret
DrawTextLine endp

DrawTextForm proc near
 public DrawTextForm
 mov ax,223+15*256
 push bx
 call DrawTextHorizontalBar
 pop bx
 mov al,bh
 xor ah,ah
 add ax,ax
 DIVIDE_BY_8 ax
 mov bh,al
 dec bh
dtxf2:
 add dx,8
 cmp bh,0
 jle dtxf1
 push bx
 mov ax," "+15*256
 call DrawTextHorizontalBar
 pop bx
 dec bh
 jmp dtxf2
dtxf1.
 mov ax,220+15*256
 call DrawTextHorizontalBar
 ret
DrawTextForm endp

DrawTextHorizontalBar proc near
 push ax
 push dx
 push cx
 push bx
 call PointScreenDest
 pop bx
 pop cx
 pop dx
 pop ax

if need_osk ne 0
 call CheckIfCovered
 jc dtf1
endif
 push ax
 mov al,222
 mov es:[di],ax
 pop ax
dtf1:
 inc di
 inc di

 push bx
dtf3:
if need_osk ne 0
 call CheckIfCovered
 jc dtf2
endif
 mov es:[di],ax
dtf2:
 inc di
 inc di
 dec bl
 jnz dtf3
if need_osk ne 0
 call CheckIfCovered
 jc dtf4

endif
 mov al,221
 mov es:[di],ax
dtf4:
 pop bx
 ret
DrawTextHorizontalBar endp

DrawSunkenFrame proc near
 public DrawSunkenFrame
 public drawsunkenframe
 mov si,offset sunkenframetable
 call drawrectangle
 ret
drawsunkenframe endp

DrawTextBox proc near
 public DrawTextBox
 public drawtextbox
 push si
 mov si,offset textboxtable
 call drawrectangle
 pop si
 ret
drawtextbox endp


DrawSliderBox proc near
 public DrawSliderBox
 mov sliderboxmiddle,offset textboxmiddle
 push si
 mov si,offset sliderboxtable
 call drawrectangle
 pop si
 ret
DrawSliderBox endp

DrawSpectrumBox proc near
 public DrawSpectrumBox
 mov sliderboxmiddle,offset nomiddle
 push si
 mov si,offset sliderboxtable
 call drawrectangle
 pop si
 ret
DrawSpectrumBox endp

DrawLinebox proc near
 public DrawLineBox
 public drawlinebox
 mov si,offset lineboxtable
 call drawrectangle
 ret
drawlinebox endp
end
```

Copr. 1995 Zenith Data Systems Corp.

```
.model small
.code
extrn BlockVideo:near
extrn CancelOSKPenDown:near
extrn CheckHotKeyEdit:near
extrn CheckPenDownCoordinates:near
extrn DisinstallInt09:far
extrn DoCloseOSK:near
extrn DoHideOSK:near
extrn DoListSlide:near
extrn DoMessageBoxClick:near
extrn DoSlideBarPenDown:near
extrn DoSpinDown:near
extrn DoSpinUp:near
extrn DoVSBDnArrow:near
extrn DoVSBDnArrow:near
extrn DoVSBUpArrow:near
extrn DrawSolidXorBox:near
extrn FindRegionForControl:near
extrn GetTabControlType:near
extrn GetTypeAndState:near
extrn GoNextControl:near
extrn GoNextControl:near
extrn GoPreviousControl:near
extrn GoPreviousControl:near
extrn HandleDelayedSet:near
extrn HandleOSKAlreadyDown:near
extrn HandleOSKKeyPenDown:near
extrn HandleOSKKeyPenUp:near
extrn HideForm:near
```

```
extrn HidePen:near
extrn IgnorePen:near
extrn IsItButton:near
extrn IsItCheckBox:near
extrn IsItEditBox:near
extrn IsItListBox:near
extrn IsItSlideBar:near
extrn ListitemClick:near
extrn ListitemClick:near
extrn ListitemClick:near
extrn Repaint:near
extrn RepaintIndividualControl:near
extrn RepaintUnderOSK:near
extrn RestorePenRegion:near
extrn RestoreRegion:near
extrn ResumeCursor:near
extrn ResumePen:near
extrn SaveFormHeight:near
extrn SearchActiveRegions:near
extrn SetNewTabItemWork:near
extrn SetPenColumnRegion:near
extrn SetPenRowRegion:near
extrn SetHandCursor:near


extrn SetTypaMatic:near
extrn ShowOSK:near
extrn ShowOSKForClick:near
extrn ShowPen:near
extrn ShowTabBox:near
extrn UnlockVideo:near
extrn UndoCurrentTabItem:near
extrn UnprotectOSK:near
extrn UpdateDimensions:near
extrn UpdateDimensionsWork:near


include uiinclud.inc


DATASEG_BEGIN
extrn bEnlargeFlag:byte


extrn ControlDataStorageArea:byte
extrn OSK:tControl
extrn VSBBacking:tControl
extrn VSBDnArrow:tControl
extrn VSBSlider:tControl
extrn VSBUpArrow:tControl
extrn bAutoScrollMode:byte
extrn bAutoScrollMode:byte
extrn bAutoScrollMode:byte
extrn bDontShowOSK:byte
extrn bDrawStringPWFlag:byte
extrn bGetDataFromLocalStorage:byte
extrn bIgnoringMove:byte
extrn bIgnoringPen:byte
extrn bLeavePenOn:byte
extrn bMoveMode:byte
extrn bMoveMode:byte
extrn bPenEventHappened:byte
extrn bPenEventType:byte
extrn bPopUpRequired:byte
extrn bRepaintNeeded:byte
extrn bScreenMode:byte
extrn bShadowColor:byte
extrn bSuppressHideShow:byte
extrn bTypamaticState:byte
extrn frmMessageBox:tCONTROL
extrn frmMessageBox_end:tCONTROL
extrn pClickRegion:word
extrn pCurrentToolBarButton:word
extrn pDelayedSetControl:word
extrn pNextActiveRegion:word
extrn pOSKFirstRegion:word
extrn pPenDownActiveRegion:word
extrn pPenDownLegendRegion:word
extrn pPenDownListItem:word
extrn pPenDownListItem:word
extrn pPenDownListItem:word
extrn pPenDownListRegion:word
extrn pPenDownListRegion:word
extrn pPenDownListRegion:word
extrn pPenUpListRegion:word
extrn pPenUpListRegion:word
extrn pPenUpListRegion:word
extrn pTabRegion:word
extrn rActiveRegions:tRegion
extrn rCursorRegion:tREGION
extrn rMoveStartRegion:tRegion
extrn rMoveStartRegion:tRegion
extrn rREGION:tREGION
extrn vsbBacking:tControl
extrn vsbSlider:tControl
extrn vsbUparrow:tControl
extrn wAutoScrollTimer:word
extrn wAutoScrollTimer:word
extrn wCurrentResource:word
extrn wHotKeyRightPixel:word
extrn wListSlideRow:word
extrn wListSlideRow:word
extrn wListSlideRow:word
extrn wMoveModePenColumn:word
extrn wMoveModePenRow:word
extrn wOSKTitleBarBottomRow:word
extrn wPenCurrentColumn:word
extrn wPenCurrentRow:word
extrn wPenDownColumn:word
extrn wPenDownRow:word
extrn wPenUpColumn:word
extrn wPenUpRow:word


wHotKeyRightPixelSave dw 0


wPenColumnMin dw 0
wPenColumnMax dw 0
wPenRowMin dw 0
wPenRowMax dw 0

bAwaitingMoveCompletion db 0
  public bAwaitingMoveCompletion
bMoveModeBusy db 0
bBoxShowing db 0
rBoxRegion label tRegion

DATASEG_END

.code
DoToolBarButtonDown  proc near
  call HandleDelayedSet
  mov si,pCurrentToolBarButton
  and [si].ControlState,not(ISDOWN)
  call SaveFormHeight
  mov pPenDownActiveRegion,0
  mov bRepaintNeeded, PAINTALL AND (NOT
PAINTTOOLBARS)
  mov bPopupRequired,-1
  ret
DoToolBarButtonDown  endp


CancelPenDown proc near
  public CancelPenDown

  mov si,pPenDownActiveRegion
  or si,si
  jz cpd1
  mov wPenUpRow,-1
  mov wPenUpColumn,-1
  call dopenupevent
cpd1:
  ret
CancelPenDown endp


DoButtonPenDown proc near

  cmp si,offset vsbBacking
  jz dpe7c
  cmp si,offset vsbSlider
  jz dpe7c
  or ah,ISDOWN
  mov [si].ControlState,ah
  call RepaintIndividualControl
dpe7c:

  cmp si,offset vsbUpArrow
  jnz dpe7d
  call UndoCurrentTabItem
  mov pTabRegion,0
  call SetTypaMatic
  mov di,pPenDownActiveRegion
  call DoVSBUpArrow
  jmp dpe7x
dpe7d:

  cmp si,offset vsbDnArrow
  jnz dpe7e
  call UndoCurrentTabItem
  mov pTabRegion,0
  call SetTypaMatic
  mov di,pPenDownActiveRegion
  call DoVSBDnArrow
  jmp dpe7x
dpe7e:

  cmp al,SPINUPBUTTON
  jnz dpe7a
  call SetTypaMatic
  call DoSpinUp
  jmp dpe7x
dpe7a:
  cmp al,SPINDOWNBUTTON
  jnz dpe7b
  call SetTypaMatic
  call DoSpinDown
  jmp dpe7x
dpe7b:

if need_osk ne 0
  call HandleOSKKeyPenDown
endif
dpe7x:
  ret
DoButtonPenDown endp


DoClickEvent proc near
  public DoClickEvent

  mov si,pClickRegion
  call PrepareClickRegisters

  call IsItEditBox
  jnz dce3
  push ax
  call ShowTabBox
  pop ax
if need_osk ne 0

  call ShowOSKForClick
endif
  ret
dce3:


  call IsItButton
  jnz dce4
  push si
  push di
  call ShowTabBox
  pop di
  pop si
  cmp si,offset frmMessageBox
  jb dce1a
  cmp si,offset frmMessageBox_end
  ja dce1a

  call DoMessageBoxClick
  ret

dce1a:
  cmp si,offset vsbBacking
  jz DoVsbBacking
  cmp si,offset vsbSlider
  jnz dce1b

DoVsbSlider:
  sub di,type rRegion * 3
DoVsbBacking:
  push wPenUpRow
  pop wListSlideRow
  call DoListSlide
  ret

dce1b:
  call HandleButtonClicks
  ret
dce4:

  call IsItCheckbox
  jnz dce2
dce4b:
  cmp al,OPTIONBUTTON
  jnz dce4f
  call UndoAllOptionButtons
dce4f:
  mov bx,[si].pStorageOffset
  not byte ptr [bx]
  and byte ptr [bx],1

  push ax
  cmp al,CHECKBOX
  jz dce4h
  mov ax,[si].ID
  mov bl,ah
  xor ah,ah
  jmp dce4i
dce4h:

  mov ax,[si].ID
  mov bl,[bx]

dce4i:
  xor bh,bh
  SM_FUNCTION ax
  pop ax

  call RepaintIndividualControl
  call ShowTabBox
  call HandleButtonClicks
  ret

dce2:
  call IsItListBox
  jnz dce5
  call ListItemClick
  jnc dec2a
if need_osk ne 0
  call DoHideOSK
endif
  call HandleButtonClicks
dec2a:
  ret
dce5:

  ret
DoClickEvent endp


DoMoveQuit proc near

if need_osk ne 0
  test wCurrentResource,111111000b
  jnz lx0
  mov bAwaitingMoveCompletion,-1
lx0:
  mov bLeavePenOn,0
  call IgnorePen

  mov dx,wPenUpRow
  cmp dx,wPenRowMin
  ja lx1
  mov dx,wPenRowMin
  mov wPenUpRow,dx
lx1:
  cmp dx,wPenRowMax
  jb lx2
  mov dx,wPenRowMax
  mov wPenUpRow,dx
lx2:
  mov cx,wPenUpColumn
  cmp cx,wPenColumnMin
  ja ex1
  mov cx,wPenColumnMin
  mov wPenUpColumn,cx
ex1:
  cmp cx,wPenColumnMax
  jb ex2
  mov cx,wPenColumnMax
  mov wPenUpColumn,cx
ex2:
  call ShowMovedFormDestination

  call HideBox
  mov si,pPenDownActiveRegion

  test wCurrentResource,not(111b)
  jnz eeff1

  cmp [si].wCurrentLeft,0
  jge ndl
  mov [si].wCurrentLeft,0
ndl:

  cmp bScreenMode,12h
  jnz eeqq1
  mov ax,[si].wCurrentTop
  round_to_byte_boundary ax
  add ax,[si].wCurrentHeight
  dec ax
  dec ax
  mov [si].wCurrentBottom,ax

  mov ax,[si].wCurrentLeft
  round_to_byte_boundary ax
  add ax,[si].wCurrentWidth
  dec ax
  mov [si].wCurrentRight,ax

eeqq1:

  call passOSKDimensions
  mov di,offset rMoveStartRegion
  call HideForm
  jmp dpu3


eeff1:
  mov di,offset rMoveStartRegion
  call HideForm
  call RepaintUnderOSK
  mov si,pPenDownActiveRegion

  mov ax,[di].wCurrentTop
  sub ax,[si].wCurrentTop
  sub [bx].TopPixel,ax
  mov ax,[di].wCurrentLeft
  sub ax,[si].wCurrentLeft
  ROUND_TO_BYTE_BOUNDARY ax
```

```
 mov cx,[bx].LeftPixel
 test ch,100b
 jz hpu1
 or ch,11111000b
hpu1:
 sub cx,ax

 cmp cx,0
 jge fos1
 mov cx,0
fos1:

 ROUND_TO_BYTE_BOUNDARY cx
 mov [bx].LeftPixel,cx

 cmp bx,offset osk
 jnz dpu3
 or [bx].ControlState,INVISIBLE


 call ShowOSK
 mov bLeavePenOn,-1


 push wHotKeyRightPixelSave
 pop wHotKeyRightPixel

 mov si,pTabRegion
 push rCursorRegion.wCurrentLeft
 pop  wPenDownColumn
 call SetNewTabItemWork

dpu3:
 mov pPenDownActiveRegion,0
 mov bMoveMode,0
 call RestorePenRegion
 call ResumePen
endif
 mov cx,wPenCurrentColumn
 mov dx,wPenCurrentRow
 call SetHandCursor

 ret
DoMoveQuit endp

PassOSKDimensions proc near
 public passOSKDimensions

 mov bx,[si].wCurrentTop
 ROUND_TO_BYTE_BOUNDARY bx
 mov cx,[si].wCurrentLeft
 ROUND_TO_BYTE_BOUNDARY cx
 mov di,[si].wCurrentRight
 mov si,[si].wCurrentBottom
      cmp bScreenMode,12h
      jnz pod1
      test wCurrentResource,4
      jnz pod1
      inc si
pod1:
 call UpdateDimensionsWork
 ret
PassOSKDimensions endp

DoPenDownEvent proc near

 call CancelPendown

if need_osk ne 0

 mov bDontShowOSK,0

endif

 call CheckPenDownCoordinates
 or si,si
 jnz dpe5a
 jmp dpdExit
dpe5a:

 cmp [si].wCurrentHeight,-1
 jnz dpe1a
 cmp [si].wListHandle,0
 jz dpe1b

dpe21:
 mov pPenDownListRegion,si
 cmp [si].wListItemIndex,0
 jnz dpe21a
 jmp dpdIgnore
dpe21a:
 mov pClickRegion,si
 mov pPenDownListItem,si
 jmp dpdExit

dpe1b:
 mov pPenDownLegendRegion,si
 sub si,type rActiveRegions
 mov pPenDownActiveRegion,si

dpe1a:
 call GetTypeAndState

 cmp al,FORM
 jr. dpe1e
 te.t an,MOVEABLE
 jnz dpe8e1
 jmp dpdIgnore
dpe8e1:

 push ax
 mov ax,[si].TopPixel
 add ax,16
 cmp dx,ax
 pop ax
 jbe dpe8e2
 cmp dx,wOSKTitleBarBottomRow
 jbe dpe8e2
 jmp dpdIgnore
dpe8e2:
 call PrepareToMoveForm
 jmp dpdExit

dpe1e:
  call IsItButton
  jnz dpe6
  test ah,GRAYED
  jz dpe1g
  jmp dpdIgnore
dpe1g:
  mov bDrawStringPWFlag,0
  test ah,ISDOWN
  jz dpe8a1

dpe8a.
if need_osk ne 0
 push ax
 call HandleOSKAlreadyDown
 pop ax
 jnc dpe8a2
 jmp dpdexit
endif
dpe8a2:
 jr.. dpdIgnore

dpe8a1:
  mov bx,pPenDownActiveRegion
  cmp bx,pTabRegion
  jnz dpe1f
dpe1d:
  mov pTabRegion,0
dpe1f:
  push si
  push ax
  call DoButtonPenDown
  pop ax
  pop si

 cmp al,TOOLBARBUTTON
 jnz dce1
 cmp si,pCurrentToolBarButton
 jz dce1
 call ForceDelayedSet
 call DoToolBarButtonClick
 call DoToolBarButtonDown
dce1:
 jmp dpdExit
dpe6:

  call IsItSlideBar
  jnz dpd2
  mov cx,wPenDownColumn
  call DoSlideBarPenDown
  jmp dpdExit
dpd2:

  call IsItCheckBox
  jnz dpd3
  call DoButtonPenDown
  jmp dpdExit

dpd3:
  c.. DoCustomControlPenDown
  jmp dpdExit

dpdIgnore:
 mov pPenDownActiveRegion,0
dpdExit:
 ret
DoPenDownEvent endp

ForceDelayedSet proc near

 push pTabRegion
 mov pTabRegion,0
 call HandleDelayedSet
 pop pTabRegion
 ret
ForceDelayedSet endp

DoPenEvent proc near
 public DoPenEvent
dpe1:
 xor al,al
 xchg al,bPenEventType
 mov bPenEventHappened,0

 cmp bIgnoringPen,0
 jz dpe0
 jmp dpe99
dpe0:

 test al,PENUP
 jz  dpe2
 call DoPenUpEvent
 jmp dpe4

dpe2:
 test al,PENDOWN
 jz  dpe3
 cmp bMoveMode,0
 jz dpe3z
 and al,not(PENDOWN)
 jmp dpe3
dpe3z:
 call DoPenDownEvent
 jmp dpe4

dpe3:
 test al,PENMOVED
 jz dpe4
 cmp bIgnoringMove,0
 jnz dpe99
dpe3y:
 cmp bMoveModeBusy,0
 jnz dpemmb
 mov bMoveModeBusy,-1


 call DoPenMoveEvent

 mov bMoveModeBusy,0
 and bPenEventType,not PENMOVED
dpemmb:


 jmp dpe4

dpe4:
 cmp bPenEventHappened,0
 jz dpe99
 jmp dpe1

dpe99:
 ret
DoPenEvent endp


DoPenMoveEvent proc near

 mov dx,wPenCurrentRow
 mov cx,wPenCurrentColumn

 cmp bMoveMode,-1
 jnz dpe25

 call ShowMovedFormDestination
 jmp dpmExit

dpe25:
 cmp pPenDownListRegion,0
 jz dpe20
 mov bAutoScrollMode,0
 call SearchActiveRegions
 mov si,pPenDownListRegion
 cmp di,si
 jnz dpe25a
 jmp dpmExit
dpe25a:
 or di,di
 jz dpe22
 mov ax,[si].wListHandle
 cmp ax,[di].wListHandle
 jnz dpe22
 mov si,di
 mov pPenDownActiveRegion,si
 mov pPenDownLegendRegion,0
 jmp dpe21

dpe22:
 mov si,pPenDownListRegion
 cmp dx,[si].wCurrentTop
 jb dpe23
 cmp dx,[si].wCurrentBottom
 ja dpe24
 jmp dpmExit

dpe23:
 mov wAutoScrollTimer,0
 mov bAutoScrollMode,-1
 jmp dpmExit

dpe24:
 mov wAutoScrollTimer,0
 mov bAutoScrollMode,1
 jmp dpmExit

dpe20:
 mov si,pPenDownActiveRegion
 or si,si
 jz dpmExit
 call GetTypeAndState

 call IsItSlideBar
 jnz dpe26
 call DoSlideBarPenDown
 jmp dpdExit
dpe26:

 cmp si,offset vsbSlider
 jnz dpe27
 mov wListSlideRow,dx
 call UndoCurrentTabItem
 mov di,pPenDownActiveRegion
 mov pTabRegion,di
 sub di,type rRegion * 3
 call DoListSlide
 jmp dpmExit
dpe27:
dpmExit:

 ret
DoPenMoveEvent endp


DoPenUpEvent proc near
 public DoPenUpEvent

 mov bTypamaticState,0
 push pPenDownListItem
 pop pPenUpListRegion
 mov pPenDownListRegion,0
 mov pPenDownListItem,0
 mov bAutoScrollMode,0

if need_osk ne 0
  cmp bMoveMode,-1
  jnz dpu1
  call DoMoveQuit
  call unblockvideo

  jmp dpuExit
dpu1:
endif

 mov si,pPenDownActiveRegion
 or si,si
 jnz dpe9c
 jmp dpuExit
dpe9c:

 mov di,si
 mov si,[si].pCurrentControl
 mov ax,[si]

 cmp al,CLOSEBUTTON
 jnz dpu4
 push pTabRegion
 mov pTabRegion,0
 call HandleDelayedSet
 pop pTabRegion
if need_osk ne 0
 cmp di,pOSKFirstRegion
 jb dpu4a
 call DoCloseOSK
 jmp dpuExit
dpu4a:
endif

 call TryUnload
 call UndoButtonDown
 jmp dpuExit
dpu4:


if need_osk ne 0
 call HandleOSKKeyPenUp
 jc dpuExit
endif

 cmp si,offset vsbBacking
 jz dpe10
 cmp si,offset vsbSlider
 jz dpe10
 cmp al,TOOLBARBUTTON
 jz dpe10
 call UndoButtonDown
```

```
dpe10

 mov dx,wPenUpRow
 mov cx,wPenUpColumn
 mov si,pPenDownLegendRegion
 or si,si
 jz dpe11
 cmp dx,[si].wCurrentTop
 jb dpe11
 cmp dx,[si].wCurrentBottom
 ja dpe11
 cmp cx,[si].wCurrentLeft
 jb dpe11
 cmp cx,[si].wCurrentRight
 ja dpe11
 jmp dpe12

dpe11:
 mov si,pPenDownActiveRegion
 cmp dx,[si].wCurrentTop
 jb dpe9
 cmp dx,[si].wCurrentBottom
 ja dpe9
 cmp cx,[si].wCurrentLeft
 jb dpe9
 cmp cx,[si].wCurrentRight
 ja dpe9

dpe12
 push pPenDownActiveRegion
 pop pClickRegion
 jmp dpuExit

dpe9
 cmp al,TOOLBARBUTTON
 jnz dpe9b
 mov si,pPenDownActiveRegion
 mov si,[si].pCurrentControl
 cmp si,pCurrentToolBarButton
 jz dpe9b
 call UndoButtonDown
dpe9b

dpuExit:
 mov pPenDownActiveRegion,0
 ret
DoPenUpEvent endp


DoSpacebar proc near
 public DoSpaceBar

 call GetTabControlType
 jnz dsb0c
 ret
dsb0c:

 call IsItButton
 jnz dsb1

 cmp al,TOOLBARBUTTON
 jnz dsb0d
 test ah,ISDOWN
 jz dsb0a
 ret
dsb0a

 test ah,SKIPTAB
 jz dsb0b
 ret
dsb0b.

if need_osk ne 0
 call CancelOSKPenDown
endif

 or [bx].ControlState,ISDOWN
 cmp [bx].ControlType,ToolbarButton
 jz dsb0

 mov pPenDownActiveRegion,si
 push si
 call RepaintIndividualControl
 pop si
 mov pPenDownActiveRegion,0
 jmp dsb0d
dsb0
 call DoToolBarButtonDown
 ret
dsb0d
 mov pClickRegion,si
 ret

dsb1:
 call IsItCheckBox
 jnz dsb2
if need_osk ne 0
 call CancelOSKPenDown
endif
 mov pClickRegion,si
 ret
dsb2:
 ret
DoSpacebar endp


PrepareClickRegisters proc near
 public PrepareClickRegisters
 mov pPenDownActiveRegion,si
 mov di,si
 mov si,[si].pCurrentControl
 mov ax,[si]
 ret
PrepareClickRegisters endp

PrepareToMoveForm proc near

 push wHotKeyRightPixel
 pop  wHotKeyRightPixelSave
if need_osk ne 0
ptm1:
 mov bMoveMode,-1
 mov bLeavePenOn,0
 call UndoCurrentTabItem
 push si
 mov si,pPenDownActiveRegion
 push si
 push ds
 pop es
 mov di,offset rMoveStartRegion
 mov cx,type rMoveStartRegion
 rep movsb
 pop si
 mov dx,wPenDownRow
 sub dx,[si].wCurrentTop
 mov wMoveModePenRow,dx

 mov cx,wPenDownColumn
 sub cx,[si].wCurrentLeft
 mov wMoveModePenColumn,cx
  push si
 call UnprotectOSK
  call blockvideo
  pop si
  call ShowBox
 mov cx,0
 add cx,wPenDownColumn
 sub cx,[si].wCurrentLeft

 mov dx,639-16
 mov wPenColumnMax,dx
 mov wPenColumnMin,cx
 cmp wPenDownColumn,dx
 jae eeex
 call SetPenColumnRegion
eeex.
 mov cx,wMoveModePenRow
 call getmaxvalidscreenrow
 mov wPenRowMin,cx
 mov wPenRowMax,dx
 cmp wPenDownRow,dx
 jae ptxx1
 call SetPenRowRegion
ptxx1:
 pop si
endif
 ret
PrepareToMoveForm endp


GetMaxValidScreenRow proc near
 public GetMaxValidScreenRow


 mov dx,479-16
 cmp bScreenMode,VGA_MODE
 jz ptmf1z

 push bx
 push es
 xor bx,bx
 mov es,bx
 mov bx,0484h
 mov bl,byte ptr es:[bx]
 xor bh,bh
 shl bx,1
 shl bx,1
 shl bx,1
 mov dx,bx
 sub dx,16
 pop es
 pop bx
ptmf1z:
 ret
GetMaxValidScreenRow endp

ShowMovedFormDestination proc near
 mov si,pPenDownActiveRegion
 mov bx,[si].pCurrentControl
 sub dx,wMoveModePenRow
 mov [si].wCurrentTop,dx
 add dx,[si].wCurrentHeight
 dec dx
 mov [si].wCurrentBottom,dx
 sub cx,wMoveModePenColumn
 mov [si].wCurrentLeft,cx
 add cx,[si].wCurrentWidth
 dec cx
 mov [si].wCurrentRight,cx
  call ShowBox
 ret
ShowMovedFormDestination endp


UndoAllOptionButtons proc near

 push si
 mov si,pPenDownActiveRegion
 mov si,[si].pCurrentControl
 mov rRegion.pCurrentControl,si

uaob2:
 call GoPreviousControl
 jc uaob1a
 cmp [si].ControlType,LAST_ENDOFOBJECT
 ja uaob2
uaob1:
 call GoNextControl
 jmp uaob1b
uaob1a:
 clc
uaob1b:
 jc uaob3
 mov al,[si].Controltype
 cmp al,LAST_ENDOFOBJECT
 jbe uaob3
 cmp [si].ControlType,OPTIONBUTTON
 jnz uaob1

 mov bx,[si].pStorageOffset
 mov byte ptr [bx],0
 call FindRegionForControl
 jc uaob1

 push pPenDownActiveRegion
 mov pPenDownActiveRegion,bx
 mov si,[bx].pCurrentControl
 mov ax,[si]
 mov bGetDataFromLocalStorage,-1
 call RepaintIndividualControl
 mov bGetDataFromLocalStorage,0
 pop pPenDownActiveRegion
 jmp uaob1

uaob3:
 mov si,pPenDownActiveRegion
 call RestoreRegion
 pop si
 ret
UndoAllOptionButtons endp


UndoButtonDown proc near
 public UndoButtonDown
 test ah,ISDOWN
 jz dpe10a
 and ah,not(ISDOWN)
 mov [si].ControlState,ah
 call RepaintIndividualControl
dpe10a:
 ret
UndoButtonDown endp

ShowBox proc near
 push si
 cmp bBoxShowing,0
 jz shb1
 push si
 call HideBox
 pop si
shb1:
 push ds
 pop es
 mov di,offset rBoxRegion
 mov cx,size rBoxRegion
 cld
 rep movsb
 mov bBoxShowing,-1
 mov si,offset rBoxRegion
 call DrawSolidXORBox
 pop si
 ret
ShowBox endp
HideBox proc near
 cmp bBoxShowing,0
 jz hb1
 mov si,offset rBoxRegion
 call DrawSolidXORBox
 mov bBoxShowing,0
hb1.
 ret
HideBox endp


end


Copr. 1995 Zenith Data Systems Corp.

.MODEL SMALL
.code
extrn getvgastate:near
extrn blockvideo:near
extrn unblockvideo:near
extrn FillScreenArea:near
extrn AddControlToActiveList:near
extrn AddLegendToActiveList:near
extrn AdjustBoxDimensions:near
extrn AdjustButtonDimensions:near
extrn AdjustFormHeight:near
extrn Draw4Color:near
extrn DrawButtonCaption:near
extrn DrawChiselBox:near
extrn DrawOnButton:near
extrn DrawEditBoxCaption:near
extrn DrawLabel:near
extrn DrawLineBox:near
extrn DrawNotches:near
extrn DrawOSKLegend:near
extrn DrawSliderBox:near
extrn DrawSpectrum:near
extrn DrawSpectrumBox:near
extrn DrawString:near
extrn DrawSunkenFrame:near
extrn DrawTextBox:near
extrn DrawTextForm:near
extrn DrawTextLine:near
extrn DrawUpButton:near
extrn GetCaptionHeight:near
extrn GetControlRegion:near
extrn GetNumericControl:near
extrn GetTextControl:near
extrn IsItButton:near
extrn IsItCheckBox:near
extrn IsItEditBox:near
extrn IsItLegend:near
extrn IsItListBox:near
extrn IsItSlideBar:near
extrn PaintGraphicCaption:near
extrn PointControlCaption:near
extrn PointControlMiscItem:near
extrn PositionGraphicCaption:near
extrn Repaint:near
extrn RepaintListBox:near
extrn RestoreRegion:near
extrn SetColorsForControl:near
extrn SetFontForCaption:near
extrn SetProtectionForControl:near
extrn StartNewObjectLevel:near
extrn StartToolButtonObjectLevel:near
extrn UpdateLegendRegion:near
extrn UseGrayedColors:near
extrn UseNormalColors:near
extrn RestVGAState:near


include uiinclud.inc
DATASEG_BEGIN
wOSKTitleBarBottomRow dw 0
 public wOSKTitleBarBottomRow
extrn ControlDataStorageArea:byte
extrn rLegendRegion:tREGION
extrn CheckedBox:byte
extrn DrawStringTextModeColor:byte
extrn OSK:tControl
extrn SelOptButton:byte
extrn SliderButton:byte
extrn UnCheckedBox:byte
extrn UnSelOptButton:byte
extrn bCaptionBackgroundColor:byte
extrn bCaptionForegroundColor:byte
extrn bCaptionForegroundColor:byte
extrn bDeskTopColor:byte
extrn bDoingSpin:byte
extrn bDrawStringPWFlag:byte
extrn bDummyBlank:byte
extrn bEditBoxFGColor:byte
extrn bEnlargeFlag:byte
```

```
extrn bFormColor:byte
extrn bGetDataFromLocalStorage:byte
extrn bModalFlag:byte
extrn bPreviewMode:byte
extrn bPreviewMode:byte
extrn bRepaintMode:byte
extrn bRepaintNeeded:byte
extrn bScreenMode:byte
extrn bTitleForegroundColor:byte
extrn bUnderlinedCharacter:byte
extrn iIgnoreLevel:word
extrn iLeftAdders:word
extrn iTopAdders:word
extrn pCurrentFont:word
extrn pCurrentToolBarButton:word
extrn pCurrentToolButtonRegion:word
extrn pCurrentToolButtonRegion:word
extrn pEditBoxFont:word
extrn pNextActiveRegion:word
extrn pNormFont:word
extrn pPenDownActiveRegion:word
extrn pPenUpListRegion:word
extrn pPenUpListRegion:word
extrn pPenUpListRegion:word
extrn rActiveRegions:tRegion
extrn rREGION:tREGION
extrn wCurrentFormBottom:word
extrn wCurrentFormHeight:word
extrn wCurrentFormLeft:word
extrn wCurrentFormRight:word
extrn wCurrentResource:word
extrn wCurrentResource:word
extrn wGraphicLegendRight:word
extrn wGraphicLegendRight:word
extrn wGraphicLegendRight:word
extrn wNextTop:word
extrn wPreviousFormHeight:word
extrn wToolBarHeight:word
extrn wToolBarHeight:word
extrn pDelayedSetControl:word
extrn osksecondrow:tcontrol
DATASEG_END


.code

RepaintControl proc near
  public RepaintControl
  test ah,INVISIBLE
  jz rc1

  cmp al,TOOLBARBUTTON
  jnz rc10
  inc iIgnoreLevel
rc10
  ret

rc1:
  call SetColorsForControl

  call GetControlRegion

  cmp bPreviewMode,0
  jz rc1a
  cmp al,TOOLBARBUTTON
  jnz rc0a
  call StartToolButtonObjectLevel
  mov pCurrentToolBarButton,si
rc0a:
  call AdjustFormHeight
  ret


rc1a:
  cmp al,FIRSTBUTTONTYPE
  jb rc2
  cmp al,LASTBUTTONTYPE
  ja rc2

  push ax
  push si
  call RepaintButton
  pop si
  pop ax


rc1b.
  cmp al,TOOLBARBUTTON
  jnz rc9
  test ah,ISDOWN
  jnz rc9a
  inc iIgnoreLevel
  jmp rc9
rc9a.
  mov pCurrentToolBarButton,si
  call DoToolBarButtonClick
  call StartToolButtonObjectLevel
  push pNextActiveRegion
  pop pCurrentToolButtonRegion
rc9

  call AddControlToActiveList
  cmp al,FIRSTFOCUSABLEBUTTONTYPE
  jb rc9b
  cmp al,LASTFOCUSABLEBUTTONTYPE
  ja rc9b
  call AddLegendToActiveList
rc9b:
  ret

rc2:
  call IsItCheckBox
  jnz rc4
  call RepaintCheckBox
  call AddControlToActiveList
  call AddLegendToActiveList
  ret

rc4:
  call IsItEditBox
  jnz rc5
  call RepaintEditBox
  call AddControlToActiveList
  ret

rc5:
  call IsItListBox
  jnz rc6
  push si
  call RepaintListBox
  pop ax
  mov si,pPenUpListRegion
  push rRegion.pCurrentControl
  call DoAfterRepaintingList
  pop  rRegion.pCurrentControl
  ret

rc6:
  call IsItLegend
  jnz rc7
  call RepaintLegend
  ret

rc7:
  cmp al,PROGRESSBAR
  jnz rc7a
  call repaintspectrumbar
  call addcontroltoactivelist
  ret
rc7a:
  call IsItSlidebar
  jnz rc8
  call RepaintSpectrumBar
  call AddControlToActiveList
  call AddLegendToActiveList
  ret

rc8:
  cmp al,LINEBOX
  jnz rc12
  call RepaintLineBox
  ret

rc12:
  cmp al,CHISELBOX
  jnz rc14
  call RepaintChiselBox
  ret

rc14:

  cmp al,ICON
  jnz rc15
  call RepaintIcon
  call AddControlToActiveList

  ret

rc15.
  cmp al,SUNKENFRAME
  jnz rc16
  call RepaintSunkenFrame
  ret

rc16:
   ret
RepaintControl endp

RepaintIndividualControl proc near
  public RepaintIndividualControl

  push ax
  push si
  call SetProtectionForControl
  call blockvideo
  call getvgastate
   push ax
   mov ax,REMOVE_PEN_CURSOR
   int pen_function
   pop ax

  mov si,pPenDownActiveRegion
  call RestoreRegion
  call SetColorsForControl

  cmp al,ICON
  jnz ric1
  call repainticon
  jmp sr9
ric1:

  cmp al,CHECKBOX
  jz sr1
  cmp al,OPTIONBUTTON
  jz sr1
  jmp sr2
sr1:
  call RepaintCheckBox
  jmp sr9
sr2:

  call IsItButton
  jnz sr3

if need_osk ne 0
  cmp si,offset OSK
  jb sr2a
  test OSK.ID,4
  jz sr2a
  mov bEnlargeFlag,-1
sr2a:
endif

  call RepaintButton
if need_osk ne 0
  mov bEnlargeFlag,0
endif
  jmp sr9
sr3:

  cmp al,SLIDEBAR
  jz sr3a
  cmp al,SPECTRUMBAR
  jz sr3a
  jmp sr4
sr3a:
  call RepaintSpectrumBar
sr4:


  cmp bDoingSpin,-1
  jnz sr4a
  call IsItEditBox
  jz sr4b
sr4a.
  cmp al,UNFRAMEDEDITBOX
  jz sr4b
  cmp al,KEYEDITBOX
  jnz sr6
sr4b:
  call RepaintEditBox
sr5:
  jmp sr9

sr6
sr9:
  call restvgastate
  push ax
  mov ax,DISPLAY_PEN_CURSOR
  INT PEN_FUNCTION
  pop ax
  call unblockvideo
  call UseNormalColors
  pop si
  pop ax
  ret
RepaintIndividualControl endp

RepaintGroupObject proc near
  public RepaintGroupObject
  test ah,INVISIBLE
  jz rgo1

  inc iIgnoreLevel
  ret

rgo1:

rgo0a:
  call GetControlRegion


rgo0
  cmp al,TOOLBAR
  jnz rgo4
  push word ptr [si].PixelHeight
  pop wToolbarHeight
rgo4:
  call StartNewObjectLevel
  cmp bPreviewMode,0
  jz rgo4a
  call AdjustFormHeight
  ret

rgo4a:
  mov ax,word ptr [si].controltype

  cmp al,TOOLBAR
  jnz rgo2
  call RepaintToolbar
  ret

rgo2:
  cmp al,FORM
  jnz rgo3
  push ax
  push si
  call RepaintForm
  pop si
  pop ax

  test ah,MOVEABLE
  jz rgo2a
  call AddControlToActiveList
rgo2a:
  ret

rgo3:
  cmp al,GROUPBOX
  jnz rgo5
  call RepaintGroupBox
  ret

rgo5:
  ret
RepaintGroupObject endp

RepaintButton proc near
  public RepaintButton
  call AdjustButtonDimensions
  test ah,ISDOWN
  jnz rb1

  mov
DrawStringTextModeColor,TEXTMODE_KEY_UP_C
OLOR
 push dx
  call DrawUpbutton
 pop dx
  xor al,al
  jmp short rb2

rb1:
  mov
DrawStringTextModeColor,TEXTMODE_KEY_DOW
N_COLOR
  call DrawDnbutton
  mov al,2

rb2:
  push word ptr bDrawStringPWFlag
  mov bDrawStringPWFlag,0
  call DrawButtonCaption
  pop word ptr bDrawStringPWFlag
rb99:
  ret
RepaintButton endp

RepaintCheckBox proc near
  push ax
  test ah,ISDOWN
  jz rpcb3
  call UseGrayedColors
rpcb3:
  push si
  cmp bGetDataFromLocalStorage,0
  jz rpcb3d
  mov bx,[si].pStorageOffset
  jmp rpcb3e

rpcb3d:
  push ax
  push cx
  mov cl,al
  mov ax,[si].ID
  mov ch,ah
  mov ah,80h
  SM_FUNCTION ax
  mov bx,[si].pStorageOffset
  jl rpcb3a

  cmp cl,OPTIONBUTTON
  jnz rpcb3b
  cmp al,ch
  jnz rpcb3c
  mov al,1
```

```
 jmp rpcb3b
rpcb3c:
 xor al,al

rpcb3b:
 mov [bx],al
rpcb3a:
 pop cx
 pop ax

rpcb3e:

 cmp byte ptr [bx],0
 jnz rpcb1

 mov si,offset UncheckedBox
 cmp al,CHECKBOX
 jz rpcb2
 mov si,offset UnselOptButton
 jmp rpcb2

rpcb1:
 mov si,offset CheckedBox
 cmp al,CHECKBOX
 jz rpcb2
 mov si,offset SelOptButton

rpcb2
 call draw4color
 pop si

 call PointControlCaption
 jz rpcb99
 or cx,cx
 jz rpcb4

 mov bx,cx
 jmp dtc

rpcb4:
 or bx,bx
 jz rpcb99

dtc:
 push si
 mov si,bx
 add si,3
 call SetFontForCaption
 call GetCaptionHeight
 mov dx,rRegion.wCurrentTop
 add ax,dx
 mov rLegendRegion.wCurrentBottom,ax
 mov cx,rRegion.wCurrentLeft
 add cx,20
 mov bl,bCaptionForegroundColor
 xor bh,bh

 sub cx,4
 call UpdateLegendRegion
 add cx,4
 add rLegendRegion.wCurrentRight,4
 call DrawLabel
 pop si

rpcb99:
 pop ax
 ret
RepaintCheckBox endp

RepaintChiselBox proc near
 dec rRegion.wCurrentHeight
 call AdjustBoxDimensions

 cmp si,offset osk
 jb rcb2
 push rRegion.wCurrentTop
 pop wOSKTitleBarBottomRow

rcb2:

 cmp bScreenMode,VGA_MODE
 jz rcb1
 sub wOSKTitleBarBottomRow,8

 add wNextTop,7
 call DrawTextLine
 ret

rcb1:
 call DrawChiselBox
 ret
RepaintChiselBox endp

RepaintEditBox proc near
 push ax
 call AdjustButtonDimensions
 cmp al,UNFRAMEDEDITBOX
 jz reb99a
 call DrawTextBox
reb99a:
 call DrawEditBoxCaption

reb4:
 push si
 mov al,[si].ControlType
 cmp al,NUMEDITBOX
 jnz reb7

 call GetNumericControl
 jmp reb8

reb7:
 call GetCustomEditBoxContents
 jnc reb8a
 jmp reb5aa
reb8a:
  cmp pDelayedSetControl,0
  jnz reb8
 call GetTextControl
reb8:
 cmp al,PWEDITBOX
 jnz reb5
 mov bDrawstringPWFlag -1
reb5:
 mov si,[si].pStorageOffset
reb5aa:
 mov bl,bEditBoxFGColor
 xor bh,bh
 push pEditBoxFont
 pop pCurrentFont
 mov dx,rRegion.wCurrentTop
 cmp al,UNFRAMEDEDITBOX
 jz reb5a
 inc dx
 inc dx
 inc dx
 inc dx
reb5a:
 mov cx,rRegion.wCurrentLeft
 add cx,9
 call RepaintCustomEditBoxContents
 jc reb9

 cmp al,UNFRAMEDEDITBOX
 jnz reb6
 sub cx,5
 mov bh,bFormColor
 or bh,WITHBACKCOLOR
 mov ax,rRegion.wCurrentRight
 sub ax,cx
reb6:
 push word ptr bUnderlinedCharacter
 call DrawString
 pop word ptr bUnderlinedCharacter
reb9:
 pop si
reb99:
 pop ax
 ret
RepaintEditBox endp

RepaintForm proc near
 call DoBeforeRepaintingForm
 call AdjustButtonDimensions

 push rRegion.wCurrentRight
 pop wCurrentFormRight
 push rRegion.wCurrentLeft
 pop wCurrentFormLeft

if need_osk ne 0
 cmp si,offset osk
 jz rf1
endif
 push word ptr [si].PixelHeight
 pop wCurrentFormHeight
 push rRegion.wCurrentBottom
 pop wCurrentFormBottom

rf1:
 test bRepaintMode,1
 jz rf99e
 jmp rf99
rf99e:

 cmp bScreenMode,VGA_MODE
 jz rf9
 push ax
 mov ax,rRegion.wCurrentHeight
 sub ax,8
 sar ax,1
 mov bh,al
 pop ax
 call DrawTextForm
 jmp rf10

rf9:
 call DrawUpbutton

rf10:
if need_osk ne 0
 cmp si,offset osk
 jnz rf100
 cmp bScreenMode,VGA_MODE
 jnz rf101
 mov bl,byte ptr OSK.ID
 and bl,11b
 cmp bl,10b
 jz rf101
 call DrawOskLegend
rf101:
 jmp rf99
endif

rf100:
 cmp bModalFlag,0
 jz rf100z
 or wCurrentResource,8000h
 mov
wPreviousFormHeight,SCREEN_HEIGHT_PIXELS
rf100z:

 mov ax,wPreviousFormHeight
 sub ax,wCurrentFormHeight
 jl  rf99

 push si
 mov dx,rRegion.wCurrentBottom
 push word ptr bDeskTopColor
 test wCurrentResource,not(111b)
 jnz rf98
 mov bDeskTopColor,BLACK
rf98:
 CLEAR_RECTANGLE 0,dx,80,ax,bDeskTopColor
 pop word ptr bDeskTopColor
 pop si
rf99:
 ret
RepaintForm endp

RepaintGroupBox proc near
 call AdjustButtonDimensions
 push si
 call DrawChiselbox
 pop si

 call PointControlCaption
 jz rgb99
 or bx,bx
 jz rgb99
 call SetFontForCaption

 push si
 mov si,bx
 add si,3
 mov bl,bCaptionForegroundColor
 mov bh,bCaptionBackgroundColor
 or bh,16
 mov dx,rRegion.wCurrentTop
 sub dx,4
 mov cx,rRegion.wCurrentLeft
 add cx,8
 call DrawString
 pop si
rgb99:
 ret
RepaintGroupBox endp

RepaintIcon proc near

 push si
 mov si,[si].id
 or si,si
 jz ri1
 push ax
 call Draw4Color
 pop ax
ri1:
 pop si
 ret
RepaintIcon endp

RepaintLegend proc near

 call PointControlCaption
 jnz rl1a
 jmp rl1
rl1a:
 or bx,bx
 jnz rl3
 cmp bScreenMode,VGA_MODE
 jz rl1aa

 push si
 push ax
 mov ah,16+1
 call PointControlMiscItem
 pop ax
 pop si
 or bx,bx
 jnz rl3n
 jmp rl1
rl3n:
 push si
 push ax
 mov DrawStringTextModeColor,15
 mov si,bx
 mov dx,rRegion.wCurrentTop

  sub dx,8
 mov cx,rRegion.wCurrentLeft
 call DrawString
 pop ax
 pop si
 jmp rl1

rl1aa:
 mov bx,cx
 call SetFontForCaption
 xor cx,cx
 push cx
 jmp rl3a
rl3:
 push cx
 call SetFontForCaption
rl3a:
 add bx,3
 push si
 push bx
 mov bl,bCaptionForegroundColor
 mov al,[si].ControlType
 mov bh,32

 cmp al,LEFTLEGEND
 jz rl2
 shl bh,1
 cmp al,CENTEREDLEGEND
 jz rl2
 shl bh,1
rl2:
 test [si].ControlState,BACKFILL
 jz rl4
 or bh,bCaptionBackgroundColor
 or bh,16
rl4:
 mov ax,[si].PixelWidth
 pop si
 mov dx,rRegion.wCurrentTop
 mov cx,rRegion.wCurrentLeft
 call DrawString
 pop si
 pop cx

 jcxz rl1
rl5:

 push rRegion.wCurrentLeft
 pop wGraphicLegendRight
 mov bx,cx
 call PositionGraphicCaption
rl6:
 call PaintGraphicCaption
rl1:
 ret
RepaintLegend endp

RepaintLineBox proc near
 call AdjustBoxDimensions
 call drawlinebox
 ret
RepaintLineBox endp

RepaintSpectrumBar proc near

 call AdjustButtonDimensions
 cmp [si].controltype,progressbar
 jz rsb21
 cmp [si].ControlType,SLIDEBAR
 jz rsb21
 call DrawSpectrumBox
 call DrawSpectrum
```

```
 jmp rsb20
rsb21:
 call DrawSliderBox
rsb20.

 call DrawEditBoxCaption
 call DrawNotches
 mov ax,[si].ID
 mov ah,080h
 SM_FUNCTION ax
 mov bx,[si].pStorageOffset
 jl rsb20a
 mov [bx],al
rsb20a:
 mov al,[bx]
 cmp [si].controltype,progressbar
 jz rsb20b
  mov ah,byte ptr [si].id[1]
  dec ah
 cmp al,ah
 jbe rsb20b
 mov al,ah
rsb20b:

 cmp ah,8-1
 jz rsb20c
 mov ah,8
 jmp rsb20d
rsb20c
 mov ah,24
rsb20d:
 mul ah
 mov cx,rRegion.wCurrentLeft
 ADD CX,ax
 mov dx,rRegion.wCurrentTop
 cmp [si].controltype.PROGRESSBAR
 jz rsb99

 push pNormFont
 pop pCurrentFont
 mov si,offset bdummyblank
 mov ax,10
 mov bh,CENTERED
 add dx,3
 call UpdateLegendRegion
 sub dx,3
 mov ax,rLegendRegion.wCurrentTop
 add ax,7
 mov rLegendRegion.wCurrentBottom,ax

 mov si,offset sliderbutton
 call draw4color

rsb99:
 ret
RepaintSpectrumBar endp

RepaintSunkenFrame proc near
 push si
 call AdjustButtonDimensions
 call DrawSunkenFrame
 pop si
 ret
RepaintSunkenFrame endp

RepaintToolbar proc near

 call AdjustButtonDimensions

 test bRepaintNeeded.PAINTTOOLBARS
 jz rtb99

 push bx
 push cx
 push dx
 call DrawUpbutton
 pop dx
 pop cx
 pop bx

 sub bl,64/8
 mov bh,13
 add cx,32
 call DrawUpButton

 call PointControlCaption
 jz rtb99
 or cx,cx
 jz rt1
 mov bx.cx
 jmp rt2
rt1:
 or bx,bx
 jz rtb99

rt2:
 call SetFontForCaption
 push si
 add bx,3
 mov si,bx
 mov cx,rRegion.wCurrentLeft
 mov dx,rRegion.wCurrentTop
 add cx,32+8
 add dx,8

 mov bl,bTitleForegroundColor
 xor bh,bh
 call drawstring
 pop si
rtb99:
 ret
RepaintToolbar endp

end

Copr. 1995 Zenith Data Systems Corp.

.model small

SPTR = 8
include uiinclud.inc

DATASEG_BEGIN
extrn ControlDataStorageArea:byte
extrn bScreenMode:byte
extrn pGraphicFont:word
extrn wScreenSegment:word
wScanAdder dw 0

bXORFill db 0
bPatternToUse db 10101010b
dashpattern db 10101010b
rightdashpattern db 10101010b

ColoredAboutIcon label byte
 public ColoredAboutIcon
db -1,WHITE,GRAY,CYAN,BLACK
AboutIcon label byte
 public AboutIcon
db 4,26
db 00000000b,00000000b,00111111b,00000000b
db 00000000b,00000000b,11111111b,00000000b
db 00000000b,00000000b,11111111b,00000000b
db 00000000b,00000000b,11111100b,00000000b

db f000000b,00000000b,00111111b,00000000b
db 00000000b,00000000b,11111111b,00000000b
db 00000000b,00000000b,11111111b,00000000b
db 00000000b,00000000b,11111100b,00000000b

db 00000000b,00000000b,00111111b,00000000b
db 00000000b,00000000b,11111111b,00000000b
db 00000000b,00000000b,11111111b,00000000b
db 00000000b,00000000b,11111100b,00000000b

db 00000000b,000000000,00111000b,00000111b
db 00000000b,000000000,00000000b,11111111b
db 00000000b,000000000,00000000b,11111111b
db 00000000b,000000000,00001100b,11110000b

db 00000000b,000000000,00110000b,00001111b
db 00000000b,000000000,00000000b,11111111b
db 00000000b,000000000,00000000b,11111111b
db 00000000b,000000000,00000100b,11110000b

db 00000000b,000000000,00110000b,00001111b
db 00000000b,000000000,00000000b,11111111b
db 00000000b,000000000,00000000b,11111111b
db 00000000b,000000000,00000100b,11110000b

db 00000000b,000000000,00110000b,00001111b
db 00000000b,000000000,00000000b,11111111b
db 00000000b,000000000,00000000b,11111111b
db 00000000b,000000000,00000100b,11110000b

db 00000000b,000000000,00110000b,00001111b
db 11111111b,000000000,00000000b,00000000b
db 11111111b,000000000,00000000b,00000000b
db 11100000b,000000000,00000100b,01111000b

db 00000000b,000000000,00110000b,00001111b
db 11111111b,000000000,00000000b,00000000b
db 11111111b,000000000,00000000b,00000000b
db 11100000b,000000000,00000100b,01111000b

db 00000000b,000000000,00110000b,00001111b
db 11111111b,000000000,00000000b,00000000b
db 11111111b,000000000,00000000b,00000000b
db 11100000b,000000000,00000100b,01111000b

db 00000000b,000000000,00110000b,00001111b
db 11111111b,000000000,00000000b,00011110b
db 11111111b,000000000,00000000b,00111100b
db 11100000b,000000000,00000100b,01111000b

db 00000000b,000000000,00110000b,00001111b
db 11111111b,000000000,00000000b,00000000b
db 11111111b,000000000,00000000b,00000000b
db 11100000b,000000000,00000100b,01111000b

db 00000000b,000000000,00110000b,00001111b
db 11111111b,000000000,00000000b,00000110b
db 11111111b,000000000,00000000b,00110000b
db 11100000b,000000000,00000100b,01111000b

db 00000000b,000000000,00110000b,00001111b
db 11111111b,000000000,00000000b,00000000b
db 11111111b,000000000,00000000b,00000000b
db 11100000b,000000000,00000100b,01111000b

db 00000000b,000000000,00110000b,00001111b
db 11111111b,000000000,00000000b,00000000b
db 11111111b,000000000,00000000b,00000000b
db 11100000b,000000000,00000100b,01111000b

db 00000000b,000000000,00110000b,00001111b
db 11111111b,000000000,00000000b,00000001b
db 11111111b,000000000,00000000b,11000000b
db 11100000b,000000000,00000100b,01111000b

db 00000000b,000000000,00110000b,00001111b
db 11111111b,000000000,00000000b,00000000b
db 11111111b,000000000,00000000b,00000000b
db 11100000b,000000000,00000100b,01111000b

db 00000000b,000000000,00110000b,00001111b
db 11111111b,000000000,00000000b,00110000b
db 11111111b,000000000,00000000b,00000110b
db 11100000b,000000000,00000100b,01111000b

db 00000000b,000000000,00111000b,00000111b
db 11111111b,000000000,00000000b,00001111b
db 11111111b,000000000,00000000b,11111100b
db 11100000b,000000000,00001100b,01110000b

db 00000000b,000000000,00111000b,00000111b
db 11111111b,000000000,00000000b,00000000b
db 11111111b,000000000,00000000b,00000000b
db 11100000b,000000000,00001100b,01110000b

db 00000000b,000000000,00111000b,00000111b
db 11111111b,000000000,00000000b,00000000b
db 11111111b,000000000,00000000b,00000000b
db 11100000b,000000000,00001100b,01110000b

db 00000000b,000000000,00111000b,00000111b
db 00000000b,000000000,00000000b,11111111b
db 00000000b,000000000,00000000b,11111111b
db 00000000b,000000000,00001100b,11110000b

db 00000000b,000000000,00111100b,00000011b
db 00000000b,000000000,00000000b,11111111b
db 00000000b,000000000,00000000b,11111111b
db 00000000b,000000000,00011100b,11100000b

db 00000000b,000000000,00111110b,00000001b
db 00000000b,000000000,00000000b,11111111b
db 00000000b,000000000,00000000b,11111111b
db 00000000b,000000000,00011110b,11000000b

db 00000000b,00000000b,00111111b,00000000b
db 00000000b,00000000b,11111111b,00000000b
db 00000000b,00000000b,11111111b,00000000b
db 00000000b,00000000b,11111100b,00000000b

db 00000000b,00000000b,00111111b,00000000b
db 00000000b,00000000b,11111111b,00000000b
db 00000000b,00000000b,11111111b,00000000b
db 00000000b,00000000b,11111100b,00000000b

db 00000000b,00000000b,00111111b,00000000b
db 00000000b,00000000b,11111111b,00000000b
db 00000000b,00000000b,11111111b,00000000b
db 00000000b,00000000b,11111100b,00000000b

db 00000000b,00000000b,00111111b,00000000b
db 00000000b,00000000b,11111111b,00000000b
db 00000000b,00000000b,11111111b,00000000b
db 00000000b,00000000b,11111100b,00000000b

SmallAboutIcon label byte
 public SmallAboutIcon
db 3,26-10

db 00000000b,00000000b,00111111b,00000000b
db 00000000b,00000000b,11111111b,00000000b
db 00000000b,00000000b,11111110b,00000000b

db 00000000b,000000000,00111000b,00000111b
db 00000000b,000000000,00000000b,11111111b
db 00000000b,000000000,00001110b,11110000b

db 00000000b,000000000,00110000b,00001111b
db 00000000b,000000000,00000000b,11111111b
db 00000000b,000000000,00000110b,11111000b

db 00000011b,000000000,00110000b,00001110b
db 11111111b,000000000,00000000b,00000000b
db 11100000b,000000000,00000110b,00111000b

db 00000011b,000000000,00110000b,00001110b
db 11111111b,000000000,00000000b,00000000b
db 11100000b,000000000,00000110b,00111000b

db 00000011b,000000000,00110000b,00001110b
db 11111111b,000000000,00000000b,01100011b
db 11100000b,000000000,00000110b,00111000b

db 00000011b,000000000,00110000b,00001110b
db 11111111b,000000000,00000000b,00000000b
db 11100000b,000000000,00000110b,00111000b

db 00000011b,000000000,00110000b,00001110b
db 11111111b,000000000,00000000b,00100010b
db 11100000b,000000000,00000110b,00111000b

db 00000011b,000000000,00110000b,00001110b
db 11111111b,000000000,00000000b,00000000b
db 11100000b,000000000,00000110b,00111000b

db 00000011b,000000000,00110000b,00001110b
db 11111111b,000000000,00000000b,00011100b
db 11100000b,000000000,00000110b,00111000b

db 00000011b,000000000,00110000b,00001110b
db 11111111b,000000000,00000000b,01000001b
db 11100000b,000000000,00000110b,00111000b

db 00000011b,000000000,00111000b,00000110b
db 11111111b,000000000,00000000b,00111110b
db 11100000b,000000000,00001110b,00110000b

db 00000011b,000000000,00111000b,00000110b
db 11111111b,000000000,00000000b,00000000b
db 11100000b,000000000,00001110b,00110000b

db 00000000b,000000000,00111000b,00000111b
db 00000000b,000000000,00000000b,11111111b
db 00000000b,000000000,00001110b,11110000b

db 00000000b,000000000,00111100b,00000011b
db 00000000b,000000000,00000000b,11111111b
db 00000000b,000000000,00011110b,11100000b

db 00000000b,00000000b,00111111b,00000000b
db 00000000b,00000000b,11111111b,00000000b
db 00000000b,00000000b,11111110b,00000000b

db 00000000b,00000000b,00111111b,00000000b
db 00000000b,00000000b,11111111b,00000000b
db 00000000b,00000000b,11111110b,00000000b

db 00000000b,00000000b,00111111b,00000000b
db 00000000b,00000000b,11111111b,00000000b
db 00000000b,00000000b,11111110b,00000000b


DATASEG_END
.code


PointScreendest proc near
 public PointScreenDest

if need_osk ne 0


 mov bx,479

 sub bx,dx
 mov wScansToBottom,bx
 mov bx,wCoveredAreaHeight
 mov wCoveredRowCountdown,bx
 mov bx,wCoveredAreaTop
 sub bx,dx
 jnb psd1
 mov bx,wCoveredAreaBottom
 sub bx,dx
 jae psd2
 mov bx,-1
 jmp psd1
psd2:
 mov wCoveredRowCountdown,bx
 xor bx,bx
psd1:
 mov wUncoveredRowCountdown,bx
endif
 DIVIDE_BY_8 cx
if need_osk ne 0
  mov wBytesToStart,cx
```

```
 mov wBytesToStartInit,cx

 mov bx,80
 sub bx,cx
 mov wBytesToRight,bx
 mov wBytesToRightInit,bx
 mov bx,wCoveredAreaWidth
 mov wCoveredByteCountdown,bx
 mov bx,wCoveredAreaLeft
 sub bx,cx
 jge psd1a
 mov bx,wCoveredAreaRight
 sub bx,cx
 jge psd2a
 mov bx,-1
 jmp psd1a
psd2a:
 inc bx
 mov wCoveredByteCountdown,bx
 xor bx,bx
psd1a:
 mov wUncoveredByteCountdown,bx
 mov wUncoveredByteInit,bx
 mov bx,wCoveredByteCountdown
 mov wCoveredByteInit,bx
psd1b:
 cmp bScreenMode,VGA_MODE
 jnz psd20
endif

 mov ax,SCREEN_WIDTH_BYTES
 mul dx
 mov bx,ax

 add bx,cx
 mov ax,VGASEGMENT
 mov es,ax
 mov di,bx
 ret
psd20:
 mov ax,dx
 mov bx,SPTR
 xor dx,dx
 div bx
 mov bx,160
 mul bx
 add ax,cx
 add ax,cx
 mov di,ax
 mov bx,ax

 mov es,wScreenSegment
 ret
pointscreendest endp

CheckIfCovered proc near
 public CheckIfCovered
 cmp wBytesToStart,0
 jge cic10
 inc wBytesToStart
 stc
 ret
cic10:
 cmp wBytesToRight,0
 jg cic0
 stc
 ret
cic0:
 dec wBytesToRight
 cmp wScansToBottom,0
 jg cic0a
 stc
 ret
cic0a:
 cmp wUncoveredRowCountdown,0
 jnz cic1


 cmp wUncoveredByteCountdown,0
 jnz cic2
 dec wCoveredByteCountdown
 jnz cic3
 mov wUncoveredByteCountdown,-1
cic3:
 cmp bCoveredAreaOnly,0
 jz cic3a
 clc
 ret
cic3a:
 stc
 ret
cic2:
 dec wUncoveredByteCountdown
cic1:
 cmp bCoveredAreaOnly,0
 jz cic1a
 stc
 ret
cic1a:
 clc
 ret
CheckIfCovered endp

NewRowForCheckIfCovered proc near
 public NewRowForCheckIfCovered
 dec wScansToBottom
 cmp wUncoveredRowCountdown,0
 jz nrfcic1
 dec wUncoveredRowCountdown
 jz nrfcic2
 push ax
 jmp nrfcic2b
 ret
nrfcic1:
 cmp wCoveredRowCountdown,0
 jz nrfcic3
 dec wCoveredRowCountdown

nrfcic2:
 push ax
 mov ax,wUncoveredByteInit
 mov wUncoveredByteCountdown,ax
 mov ax,wCoveredByteInit
 mov wCoveredByteCountdown,ax
 jmp nrfcic2b
nrfcic3:
 mov wUncoveredRowCountdown,-1
 push ax
nrfcic2b:
 mov ax,wBytesToRightInit
 mov wBytesToRight,ax
 mov ax,wBytesToStartInit
 mov wBytesToStart,ax
 pop ax
 ret
NewRowForCheckIfCovered endp

FillScreenArea proc near
 public FillScreenArea

if need_osk ne 0
 cmp bScreenMode,VGA_MODE
 jz fsa0
ftms4:
 push ax
 push si

 push cx
 push bx
 push dx
 call PointScreenDest
 pop dx
 pop bx
 pop cx
ftms1:
if need_osk ne 0
 call checkifcovered
 jc ftms2
endif
 mov al,' '
 mov ah,bh
 mov es:[di],ax
ftms2:
 inc di
 inc di
 dec si
 jnz ftms1

 pop si
 pop ax
 sub ax,SPTR
 jle ftms3
 add dx,SPTR
 jmp ftms4
ftms3:
 ret

endif
fsa0:


 or ax,ax
 jnz fsa2
 ret
fsa2:
 or si,si
 jnz fsa3
 ret
fsa3:
 push bp
 push di
 push ax
 push bx
 call pointscreendest
 pop bx
 mov bp,SCREEN_WIDTH_BYTES
 sub bp,si
 mov wScanAdder,bp
 vgaloadlatches

 mov ax,011111111b*256+8
 out dx,ax


 mov al,bh
 pop bx
fsa1:
 mov cx,si
 mov bp,ax

fsa5:
if need_osk ne 0
 call CheckIfCovered
 jnc fsa4a
else
 jmp fsa4a
endif
 inc di
 loop fsa5
 jmp fsa4b
fsa4a:
 vgaloadlatches
 mov ax,011111111b*256+8
 out dx,ax
 mov ax,bp
 mov ah,es:[di]
 stosb
fsa4:
 loop fsa5
fsa4b
 add di,wScanAdder
if need_osk ne 0
 call NewRowForCheckIfCovered
endif
 dec bx
 jnz fsa1
 pop di
 pop bp


 ret

fillscreenarea endp

DATASEG_BEGIN
bCoveredAreaOnly   db 0,0
 public bCoveredAreaOnly
wCoveredAreaTopHold dw -1
 public wCoveredAreaTopHold
wCoveredAreaTop    dw -1
 public wCoveredAreaTop
wCoveredAreaBottom dw 260
 public wCoveredAreaBottom
wCoveredAreaLeft   dw 40
 public wCoveredAreaLeft
wCoveredAreaRight  dw 60
 public wCoveredAreaRight
wCoveredAreaWidth  dw 21
 public wCoveredAreaWidth
wCoveredAreaHeight dw 121
 public wCoveredAreaHeight

wScansToBottom dw 0
wBytesToRight dw 0
wBytesToRightInit dw 0



wUncoveredRowCountdown dw 0
wCoveredRowCountdown   dw 0
wUncoveredByteCountdown dw 0
wCoveredByteCountdown dw 0
wUncoveredByteInit   dw 0
wCoveredByteInit     dw 0
wBytesToStart dw 0
wBytesToStartInit dw 0
bDrawStringPWFlag  db 0,0
 public bDrawStringPWFlag
pCurrentFont dw 0
 public pCurrentFont
wCurrentFontHeight dw 0
 public wCurrentFontHeight
pDrawStringTabList dw 0
 public pDrawStringTabList
pNextTabItem dw 0
drawstringwidth  dw 0
finaldh db 0
maxdi dw 0
maxsi dw 0
bytestowrite db 0
startingmask db 0
endingmask db 0
PixelsToPadLeft dw 0
PixelsToPadRight dw 0
LeftPaddingCountdown dw 0
RightPaddingCountdown dw 0
drawstringsegment dw 0
drawstringbitflags db 0
DrawstringTextModeColor db 0
 public DrawStringTextModeColor
drawstringbackcolor db 0
drawstringcolumn dw 0
drawstringrow    dw 0
drawstringcolor  db 0
drawstringptr    dw 0
drawstringspacewidth db 0
drawstringheight db 0
dsnextlineptr dw 0
scancountdown db 0
scansdone db 0
nextchrbitmap dw 0
allrowsdone db 0
bProcessUnderlines db 0
bUnderlinedCharacter db 0,0
 public bUnderlinedCharacter
bZeros db 5 dup(0)
bOnes  db 5 dup(-1)

scanbuffer db 80 dup(0)
DATASEG_END

.code

DrawLabel proc near
 public DrawLabel
 mov bProcessUnderlines,-1
 call drawstring
 mov bProcessUnderlines,0
 ret
DrawLabel endp

GetLabelWidth proc near
 public GetLabelWidth
 mov bProcessUnderlines,-1
 call GetStringWidth
 mov bProcessUnderlines,0
 ret
GetLabelWidth endp

DrawString proc near
 public DrawString


 mov bUnderlinedCharacter,0
 mov allrowsdone,0
 mov drawstringwidth,ax
 mov drawstringbitflags,bh
 and bh,1111b
 mov drawstringbackcolor,bh
 mov drawstringcolumn,cx
 mov drawstringrow,dx
 mov drawstringptr,si
 mov drawstringcolor,bl
 mov bx,pCurrentFont
 mov ax,[bx]
 mov drawstringspacewidth,al
 mov drawstringheight,ah
 cmp bScreenMode,VGA_MODE
 jz ds1
 cmp bx,pGraphicFont
 jnz dst1
 ret
dst1:
dst7:
 push si
 push dx
 call PointScreenDest
 pop dx
 pop si
dst4:
 lodsb
 or al,al
 jz dst3
 cmp al,13
 jnz dst6
 add dx,8
 mov cx,DrawStringColumn
 jmp dst7
dst6:
if need_osk ne 0
 call checkifcovered
 jc dst2
endif
  mov ah,DrawStringTextModeColor
  cmp ax,222+32*256
  jnz dst5
  mov ax,221+2*256

dst5.
  mov word ptr es:[di],ax
dst2
 inc di
 inc di
 jmp dst4
dst3
 ret
```

```
ds1:
 mov dsnextlineptr,0
 mov ah,drawstringheight
 mov scancountdown,ah
 mov scansdone,0
 mov si,drawstringptr
 xor cx,cx
 xor dx,dx
 mov maxdi,offset scanbuffer +80
 call getstringwidth
 mov bx,ax
 mov maxdi,offset scanbuffer
 test drawstringbitflags,16
 jz dsb1
 test drawstringbitflags,32+64+128
 jz dsb2
dsb1.
 test drawstringbitflags,16+64+128
 jnz ds1v1
dsb2:
 mov ax,bx
 mov drawstringwidth,ax
ds1v1:
  mov ax,drawstringwidth
ds1v2:
  mov cx,drawstringcolumn
  and cx,111b
  add ax,cx
  or ax,ax
  jz ds1v
  add ax,8
ds1vv
  shr ax,1
  shr ax,1
  shr ax 1

  add maxdi,ax
  cmp maxdi,offset scanbuffer+80
  jbe ds1v
  mov maxdi,offset scanbuffer+80
ds1v.
 mov ax,drawstringwidth
 sub ax,bx
 jge ds1q
 xor ax,ax
ds1q:
 xor cx,cx
 xor dx,dx
 test drawstringbitflags,32+64+128
 jz ds1z1

 test drawstringbitflags,32
 jz ds1a
ds1z1:
 xor cx,cx
 mov dx,ax
 jmp ds1z
ds1a:
 test drawstringbitflags,64
 jz ds1b
 xor dx,dx
 sar ax,1
 adc dx,1
 add dx,ax
 mov cx,ax
 jmp ds1z
ds1b
 mov cx,ax
 xor dx,dx
ds1z
 mov PixelsToPadLeft,cx
 mov PixelsToPadRight,dx
ds8.
 push PixelsToPadLeft
 pop LeftPaddingCountdown
 push PixelsToPadRight
 pop RightPaddingCountdown

 call clearscanbuffer
 call PrepareTabbing
 mov cl,byte ptr drawstringcolumn
 call LocateDrawstringPointer
 mov startingmask,dh
   mov cx,drawstringwidth
   add cx,drawstringcolumn
 mov ah,128
 and cl,111b
 ror ah,cl
 mov endingmask,ah
 xor dl,dl
 mov di,offset scanbuffer
 mov ax,LeftPaddingCountdown
 mov cx,ax
 DIVIDE_BY_8 ax
 add di,ax
 and cl,111b
 xor ch,ch
 mov si,drawstringptr
 jcxz ds4
 jmp ds11
ds4:
 lodsb
 or al,al
 jnz ds2a
 jmp ds2
ds2a:
 cmp al,13
 jnz ds2b
 jmp ds3
ds2b:
 cmp al,9
 jnz ds2e
 mov bx,pNextTabItem
 cmp word ptr [bx],0
 jz ds4
 mov al,dl
 stosb
 xor dl,dl
 mov cx,[bx]
 call LocateDrawstringPointer
 mov di,offset scanbuffer
 DIVIDE_BY_8 cx
 add di,cx
 inc bx
 inc bx
 mov pNextTabItem,bx
 jmp ds4
ds2e:
 cmp bDrawStringPWFlag,0
 jz ds2f
 mov al,"*"
ds2f:
 cmp al,32
 jb ds4
 ja ds4a
ds4b:
 jmp ds10
ds4a:
 cmp al,255
 je ds4b
if NEED_ALTKEYS ne 0
 cmp al,"&"
 jnz ds4c
 cmp bProcessUnderlines,0
 jz ds4c
 cmp byte ptr [si],0
 jz ds4c
 cmp byte ptr [si],"&"
 jnz ds4
ds4c:
endif

 sub al,32
 xor ah,ah
 add ax,ax
 mov bx,ax
 add bx,pCurrentFont
 mov ax,[bx+2]
 mov nextchrbitmap,ax
 mov bx,[bx]
 mov cl,byte ptr [bx]
 mov ch,byte ptr [bx+1]
  xor al,al
  cmp cl,128
  jae qqv
 mov al,ch
 shr al,1
 shr al,1
 shr al,1
 shr al,1
qqv
 mov ah,scansdone
 cmp ah,al
 jae ds11d
 jmp ds11
ds11d:
 sub ah,al
 mov al,ah
 cmp cl,128
 jae xxv
 and ch,1111b
xxv:
 mul ch
 inc bx
 inc bx
 add bx,ax
 cmp bx,nextchrbitmap
 jb ds16
 cmp drawstringheight,0
 jnz ds11a
 mov allrowsdone,-1
 jmp ds11
ds11a:
if NEED_ALTKEYS ne 0

 cmp byte ptr [si-2],"&"
 jnz ds11b
 cmp byte ptr [si-3],"&"
 jz ds11b
 cmp bProcessUnderlines,0
 jz ds11b

 mov bx,drawstringptr
 inc bx
 cmp bx,si
 jz ds11b

 mov bl,scansdone
 mov bh,drawstringheight
 inc bl
 dec bh
 cmp bl,bh
 jb ds11c
 ja ds11b
 mov bl,[si-1]
 mov bUnderlinedCharacter,bl
 mov bx,offset bOnes
 jmp ds16
ds11c:
 mov bx,offset bZeros
 jmp ds16

ds11b.
endif
 jmp ds11

ds16:
 mov al,[bx]
ds17
 mov ah,8
ds15:
 rol al,1
 jnc ds12
 or dl,dh
ds12:
 ror dh,1
 jnc ds13
 xchg al,dl
 cmp di,maxdi
 jae ds19
 stosb
ds19:
 mov al,dl
 xor dl,dl
ds13:
 dec cl
 jnz ds14
 jmp ds4
ds14:
 dec ah
 jnz ds15
 inc bx
 dec ch
 jnz ds16
 inc ch
 xor al,al
 jmp ds17
ds10:
 mov cl,drawstringspacewidth
ds11:
 xor ch,ch
ds6:
 ror dh,1
 jnc ds5
 mov al,dl
 cmp di,maxdi
 jae ds18
 stosb
ds18:
 xor dl,dl
ds5:
 loop ds6
 jmp ds4
ds3:
 mov dsnextlineptr,si
ds2:
ds2d1:
 cmp di,maxdi
 jae ds2d
 xchg ax,dx
 stosb
 xor al,al
 xchg ax,dx
ds2d:
 xor al,al
ds22de:
 cmp di,maxdi
 jae ds22df
 stosb
 jmp ds22de
ds22df:
ds20:
 mov finaldh,dh
 cmp allrowsdone,-1
 jnz ds23b
 jmp ds23
ds23b:
 mov dx,drawstringrow
 mov cx,drawstringcolumn
 mov si,maxdi
 dec si
     jge ds23qq
 cmp drawstringheight,0
 jnz ds23qq
     mov allrowsdone,-1
     jmp ds23
ds23qq:
 mov maxsi,si
 mov si,offset scanbuffer
ds23a:
 call pointscreendest
 mov bh,drawstringcolor
 vgaloadlatches
ds21:
if need_osk ne 0
 call CheckIfCovered
 jnc ds21a
else
 jmp ds21a
endif

ds21c:
 cmp si,maxsi
 jg ds22x
 lodsb
 jmp ds22a

ds21a:
 cmp si,maxsi
 jg ds22x
 mov al,es:[di]
 lodsb
 or al,al
 jz ds22
 push ax
 vgawritecolor bh
 pop ax
ds22:
 test drawstringbitflags,16
 jz ds22a
 mov ah,es:[di]
 cmp si,maxdi
 jnz ds22b

   not al
   mov ah,endingmask
   not ah
rr2:
   ror ah,1
   jnc rr1
   and al,ah
   jmp rr2
rr1:
   vgawritecolor drawstringbackcolor
rr3:
   jmp ds22a


ds22b:
 cmp si,offset scanbuffer + 1
 jnz ds22d
 mov ah,startingmask
 test ah,128
 jnz ds22d
ds22e:
 rol ah,1
ds22e1:
 or al,ah
 rol ah,1
 jnc ds22e1

ds22d:
 not al
 vgawritecolor drawstringbackcolor
ds22a:
 inc di
 jmp ds21
ds22x:
ds23:
 push ds
 pop es
 inc scansdone
 cmp allrowsdone,-1
 jz ds7
 cmp drawstringheight,0
 jz ds7a
 dec scancountdown
 jz ds7
ds7a:
 mov si,drawstringptr
 inc drawstringrow
 jmp ds8
ds7:
 mov si,dsnextlineptr
 or si,si
 jz ds9
```

```
mov drawstnngptr,si
 jmp ds1


ds9
 mov bDrawStnngPWFlag,0
 ret
drawstring endp

GetStringWidth proc near
 public GetStringWidth
 call PrepareTabbing

 push si
 push di
 push dx
 push bx
 xor dx,dx
 mov di,pCurrentFont
gsw1:
 lodsb
 or al,al
 jz gsw2
 cmp al,13
 jz gsw2
 cmp al,9
 jnz gsw1a
 mov bx,pNextTabItem
 cmp word ptr [bx],0
 jz gsw1
 mov dx,[bx]
 inc bx
 inc bx
 mov pNextTabItem,bx
 jmp gsw1
gsw1a:
 cmp al," "
 jb gsw1
 ja gsw3
gsw4
 mov al,[di]
gsw5.
 xor ah,ah
 add dx,ax
 jmp gsw1
gsw3
 cmp al,255
 jz gsw4
 cmp al,"&"
 jnz gsw3a
 cmp bProcessUnderlines,0
 jz gsw3a
 cmp byte ptr [si],"&"
 jz gsw3a
 cmp byte ptr [si],0
 jz gsw3a
 jmp gsw1
gsw3a
 sub al,32
 xor ah,ah
 add ax,ax
 mov bx,di
 add bx,ax
 mov bx,[bx]
 mov al,[bx]
 jmp gsw5
gsw2:
 mov ax,dx
 pop bx
 pop dx
 pop di
 pop si
 ret
GetStringWidth endp

clearscanbuffer proc near
 push ds
 pop es
 mov di,offset scanbuffer
 mov cx 80
 xor al,al
 rep stosb
 ret
clearscanbuffer endp

PrepareTabbing proc near
 push pDrawStringTabList
 pop pNextTabItem
 ret
PrepareTabbing endp


LocateDrawStringPointer proc near
 mov dh,128
 and cl,111b
 ror dh,cl
 ret
LocateDrawStringPointer endp

DrawSolidXORBox proc near
 public DrawSolidXorBox
 mov al,11111111b
 call DrawXORBox
 ret
DrawSolidXORBox endp


DrawXORBox proc near
 public DrawXorBox
 mov bPatternToUse,al
 mov cx,[si].wCurrentLeft
 cmp cx,[si].wCurrentRight
 jz dxb7
 mov dx,[si].wCurrentTop
 cmp dx,[si].wCurrentBottom
 jz dxb8a
 cmp bXorFill,-1
 jz dxb10

 call XORHorizontal

 mov dx,[si].wCurrentBottom
 dec dx
dxb8:
 cmp bScreenMode.VGA_MODE
 jz dxb8a

 inc dx

 mov ax,dx
 sub ax,[si].wCurrentTop
 cmp ax,8
 jge dxb8a
 jmp dxb8c
dxb8a.
 call XORHorizontal
dxb8c:
 mov cx,[si].wCurrentLeft
 jcxz dxb6
 cmp bScreenMode,VGA_MODE
 jnz dxb6
 dec cx
dxb6:
 call XORVertical
 mov cx,[si].wCurrentRight
 inc cx
dxb7:
 cmp bScreenMode,VGA_MODE
 jz dxb7a
 mov ax,[si].wCurrentRight
 sub ax,[si].wCurrentLeft
 cmp ax,8
 jl dxb13
  sub cx,8
 call XORVertical
 jmp dxb13
dxb7a:
 call XORVertical
dxb12:
dxb13:
 ret
dxb10:
 cmp dx,[si].wCurrentBottom
 jae dxb11
 push dx
 call XORHorizontal
 pop dx
 inc dx
 jmp dxb10
dxb11:
 mov bXorFill,0
 jmp dxb12
DrawXORBox endp


XORHorizontal proc near
 mov cx,[si].wCurrentLeft
 cmp bScreenMode.VGA_MODE
 jz xh0
 add cx,8
 call pointscreendest

 mov ax,[si].wCurrentRight
 DIVIDE_BY_8 ax
 xchg ax,cx
 sub cx,ax
txh2:
 call XORTextByte

 inc di
 inc di
 loop txh2
 ret
xh0
 call pointscreendest
 push cx
  mov al,bPatternToUse
  mov dashpattern,al
  mov cx,[si].wCurrentLeft
  and cl,111b
  jz xh1
  mov al,dashpattern
  shl al,cl
  shr al,cl
  mov dashpattern,al
xh1:
 pop cx
 mov ax,[si].wCurrentRight
  push ax
  push cx
   mov cx,ax
   mov al,bPatternToUse
   and cl,111b
   mov ch,7
   sub ch,cl
   jz xh2
   mov cl,ch
   sar al,cl
   sal al,cl
xh2:
   mov rightdashpattern,al
  pop cx
  pop ax
 DIVIDE_BY_8 ax
 inc ax
 sub ax,cx
 jz dxb1
 mov cx,ax
 VGASETXOR
dxb2:
if need_osk ne 0
 call CheckIfCovered
 jc dxb2a
endif
 mov al,es:[di]
 mov al,dashpattern
 vgawritecolor 15
dxb2a:
 inc di
 mov al,bPatternToUse
 cmp cx,2
 jnz dxb3
 mov al,rightdashpattern
dxb3:
 mov dashpattern,al
 loop dxb2
dxb1:
 VGALOADLATCHES
 ret
XORHorizontal endp

DrawDashedXORBox proc near
 public DrawDashedXORBox

 mov al,10101010b

 call DrawXORBox
 ret
DrawDashedXORBox endp

XORTextByte proc near
if need_osk ne 0
 call checkifcovered
 jc txh1
endif
 mov al,es:[di+1]
 mov ah,al
 not ah
 and ah,01111111b
 and al,10000000b
 or al,ah
 mov es:[di+1],al
txh1:
 ret
XORTextByte endp

XORVertical proc near
 mov dx,[si].wCurrentTop
 cmp bScreenMode.VGA_MODE
 jz xv0
tmxv1:
 push dx
 push cx
 call pointscreendest
 pop cx
 pop dx
 call XORTextByte
 add dx,8

 cmp dx,[si].wCurrentBottom
 jl tmxv1
 ret
xv0:
 push cx
 call pointscreendest
 pop cx
 mov bh,10000000b
 and cl,111b
 jz xv1
 ror bh,cl

xv1
 VGASETXOR
 mov bl,bPatternToUse
 mov cx,[si].wCurrentTop
   inc cx
dxb5:
 cmp cx,[si].wCurrentBottom
 jae dxb4
if need_osk ne 0
 call CheckIfCovered
 jc dxb5a
endif
 mov al,es:[di]
 mov al,bl
 and al,bh
 vgawritecolor 15
dxb5a:
 add di,SCREEN_WIDTH_BYTES
 rol bl,1
 inc cx
if need_osk ne 0
 call NewRowForCheckIfCovered
endif
 jmp dxb5
dxb4:
 VGALOADLATCHES
 ret
XORVertical endp


end
Copr. 1995 Zenith Data Systems Corp.
.model small
include uiinclud.inc
DATASEG_BEGIN
extrn ControlDataStorageArea:byte
extrn rRegion:tREGION
extrn OSK:tControl
extrn bCoveredAreaOnly:byte
extrn bDrawStringPWFlag:byte
extrn bNullString:byte
extrn pCurrentFont:word
extrn pDrawStringTabList:word
extrn pNormFont:word
extrn pTabHandler:word
extrn pTabRegion:word
extrn rCursorRegion:tREGION
extrn uifont0:word
extrn wCoveredAreaTop:word
extrn wCursorTimer:word
extrn wKeyPressed:word
extrn wPenDownColumn:word
extrn wShortCutKey:word
extrn wHotKeyRightPixel:word
extrn pDelayedSetControl:word
extrn pDelayedSetRegion:word
bCursorActive    db 0
 public bCursorActive
bCursorState     db 0
bCursorPWFlag    db 0

bEditBoxType db 0
pEditBoxControl dw 0


pEditBoxFont dw uifont0
 public pEditBoxFont

wEditBoxLeftPixel dw 0
wEditBoxRightPixel dw 0
wEditBoxTopPixel dw 0
bEditBoxFGColor db 0
 public bEditBoxFGColor
bEditBoxBGColor db 15
wEditBufferSize dw 0
pEditBufferStart dw 0
wEditBufferInsertPoint dw 0
DATASEG_END
.code
extrn CheckIfOnlyOSK:near
extrn DoListBoxKey:near
extrn DoSlideBarLeftArrow:near
extrn DoSlideBarRightArrow:near
extrn DoSpaceBar:near
extrn DoSpinDown:near
extrn DoSpinUp:near
extrn DoTab:near
extrn DrawSolidXorBox:near
extrn DrawString:near
extrn GetTabControlType:near
extrn GoNextControl:near
extrn GoNextControl:near
extrn GoPreviousControl:near
extrn GoPreviousControl:near
```

```
extrn IsItButton:near
extrn IsItCheckBox:near
extrn IsItEditBox:near
extrn IsItListBox:near
extrn IsItSlideBar:near
extrn JumpOnAL:near
extrn PointNextTabControl:near
extrn PointPreviousTabControl:near
extrn ProtectOSK:near
extrn Repaint:near
extrn SetNumericControl:near
extrn SetTextControl:near


DrawEditBoxText proc near
if need_osk ne 0
 call ProtectOSK
endif

 mov si,pEditBufferStart
 mov bl,bEditBoxFGColor
 mov bh,bEditBoxBGColor
 or bh,WITHBACKCOLOR+LEFTJUSTIFIED
 mov dx,wEditBoxTopPixel
 mov cx,wEditBoxLeftPixel
 mov ax,wEditBoxRightPixel
 sub ax,cx
debt1
 mov pCurrentFont,offset uifont0
 mov pDrawStringTabList,offset bNullString
 call DrawString
 ret
DrawEditBoxText endp

ChangeCursorState proc near
  push wCoveredAreaTop
  push word ptr bCoveredAreaOnly

if neeo_osk ne 0
  call protectOSK
endif

  mov si,offset rCursorRegion
  call DrawSolidXORBox
  not bCursorState
  mov wCursorTimer,0
  pop  word ptr bCoveredAreaOnly
  pop  wCoveredAreaTop
  ret
ChangeCursorState endp

DeleteEditBufferCharacter proc near
  push ds
  pop es
  call PointEditBufferCurrent
  or al,al
  jz dc1
  mov si,di
  inc si
  mov cx,pEditBufferStart
  add cx,wEditBufferSize
  dec cx
  sub cx,si
  inc cx
  jz dc1
  rep movsb
dc1.
  ret
DeleteEditBufferCharacter endp

DoBackSpaceEdit prdc near

DoBackSpaceEdit1:
  call DoLeftArrowEdit
  jc bs1
  call DoDelKeyEdit
bs1:
  ret
DoBackSpaceEdit endp

DoCursorFlash proc near
  public DoCursorFlash

  cmp bCursorActive,0
  jz dcf1
  cmp wCursorTimer,10
  jb dcf1
  call ChangeCursorState
dcf1:
  ret
DoCursorFlash endp

DoDelKeyEdit proc near
  call DeleteEditBufferCharacter
  clc
  ret
DoDelKeyEdit endp

DoEditBoxKey proc near
  mov pEditBoxControl,bx

  cmp [bx].ControlType,PWEDITBOX
  jnz debk3
  mov bDrawStringPWFlag,-1
debk3:

  cmp al," "
  jae debk1
  call DoEditBoxSpecialKey
  jnc debk2
  ret
debk1:

  cmp bEditBoxType,NUMEDITBOX
  jnz debk1a
  cmp al,"0"
  jb debk99
  cmp al,"9"
  ja debk99
debk1a:

  push bx
  call InsertEditBufferCharacter
  pop bx

debk2:
  call StopCursor
  mov al,bEditBoxType
  mov si,pEditBoxControl

  cmp al,NUMEDITBOX
  jnz debk4
  push bx
  call SetNumericControl
  pop bx
  jmp debk10
debk4:

  cmp al,PWEDITBOX
  jz debk5
  call SetTextControl
  jmp debk6
debk5.
  mov pDelayedSetControl,si
  push pTabRegion
  pop pDelayedSetRegion
debk6:
debk10:
  call DrawEditBoxText
  m v di,offset rCursorRegion
  c l ResumeCursor
debk99:
  ret
DoEditBoxKey endp

DoEditBoxSpecialKey proc near

  mov al,ah
  call JumpOnAL

  db UP_ARROW_SCAN_CODE
  dw offset debsUpArrow
  db DOWN_ARROW_SCAN_CODE
  dw offset debsDownArrow
  db LEFT_ARROW_SCAN_CODE
  dw offset debsLeftArrow
  db RIGHT_ARROW_SCAN_CODE
  dw offset debsRightArrow
  db DEL_SCAN_CODE
  dw offset debsDel
  db HOME_SCAN_CODE
  dw offset debsHome
  db END_SCAN_CODE
  dw offset debsEnd
  db BACKSPACE_SCAN_CODE
  dw offset debsBackSpace
  db 0
  stc
  ret

debsLeftArrow:
  call DoLeftArrowEdit
  ret
debsRightArrow:
  call DoRightArrowEdit
  ret
debsDel:
  call DoDelKeyEdit
  r.
debsHome:
  call DoHomeKeyEdit
  ret
debsEnd:
  call DoEndKeyEdit
  ret
debsBackSpace:
  call DoBackSpaceEdit
  ret
debsUpArrow:
  mov si,pEditBoxControl
  mov rRegion.pCurrentControl,si
  call GoNextControl
  jc debsua1
  cmp [si].ControlType,SPINUPBUTTON
  jnz debsua2
  call DoSpinUp
debsua2:
  call GoPreviousControl
debsua1:
  clc
  ret

debsDownArrow:
  mov si,pEditBoxControl
  mov rRegion.pCurrentControl,si
  call GoNextControl
  jc debsda1
  call GoNextControl
  jc debsda2
  cmp [si].ControlType,SPINDOWNBUTTON
  jnz debsda3
  call DoSpinDown
debsda3:
  call GoPreviousControl
debsda2.
  call GoPreviousControl
debsda1:
  clc
  ret
DoEditBoxSpecialKey endp

DoEndKeyEdit proc near

deke2:
  call PointEditBufferCurrent
  or al,al
  jz deke1
  inc wEditBufferInsertPoint
  jmp deke2
deke1:
  clc
  ret
DoEndKeyEdit endp

DoHomeKeyEdit proc near

  mov wEditBufferInsertPoint,0
  clc
  ret
DoHomeKeyEdit endp

DoKeyEvent proc near
  public DoKeyEvent
dke1:
  mov ax,wKeyPressed
if need_osk ne 0
  call CheckIfOnlyOSK
  jnc dke1b
  ret
dke1b:
endif

  cmp al,TABKEY
  jnz dke3
  mov pTabHandler,offset PointNextTabControl
  call DoTab
  ret
dke3:

  cmp ax,SHIFTTABKEY
  jnz dke4
  mov pTabHandler,offset PointPreviousTabControl
  call DoTab
  ret
 dke4:

if NEED_ALTKEYS ne 0
  or al,al
  jnz dke6a
  call DoShortCutKey
  jnc dke6a
  ret
dke6a:
endif

  call GetTabControlType
  jnz dke1c
  ret
dke1c:

  call IsItEditBox
  jnz dke4a
  mov bEditBoxType,al
  mov ax,wKeyPressed
  call DoEditBoxKey
  ret
dke4a:
  call IsItListBox
  jnz dke4b
  mov ax,wKeyPressed
  call DoListBoxKey
  ret
dke4b:

  call IsItSlideBar
  jnz dke4e
  mov ax,wKeyPressed
  or al,al
  jnz dke4b1
  mov di,si
  mov si,bx
  cmp ah,LEFT_ARROW_SCAN_CODE
  jz dke4b2
  cmp ah,RIGHT_ARROW_SCAN_CODE
  jnz dke4b1
  call DoSlideBarRightArrow
  jmp dke4b1
dke4b2:
  call DoSlideBarLeftArrow
dke4b1:
  ret
dke4e:

  call IsItCheckBox
  jz dke4c
  call IsItButton
  jnz dke5
dke4c:
  mov ax,wKeyPressed
  cmp al," "
  jnz dke2
  call DoSpacebar
  ret
dke2:
  cmp al,13
  jnz dke5
  call DoSpaceBar
  ret
dke5:


  ret
DoKeyEvent endp

DoShortCutKey proc near
if NEED_ALTKEYS ne 0
  push ds
  pop es
  mov di,offset ScanCodeTable_End - 1
  mov cx,offset ScanCodeTable_End - offset
ScanCodeTable
  std
  push ax
  mov al,ah
  repnz scasb
  pop ax
  cld
  jnz dke6
  sub di,offset ScanCodeTable
  add di,offset AltKeyTable
  mov al,es:[di+1]
  mov ah,128
  mov wShortCutKey,ax

  mov pTabHandler,offset PointNextTabControl
  call DoTab1
  mov wShortCutKey,0
  jnc dke8
  jmp dke6ret

dke8:
  call GetTabControlType
  call IsItEditBox
  jnz dke7
  jmp dke6ret
dke7:
  mov ah,0
  mov al," "
  mov wKeyPressed,ax
  jmp dke6
dke6ret:
  stc
  ret
endif
dke6:
  clc
  ret
DoShortCutKey endp

DoLeftArrowEdit proc near

 cmp wEditBufferInsertPoint,0
 ja la1
 stc
 jmp la2
la1:
```

```
 dec wEditBufferInsertPoint
 clc
la2
 ret
DoLeftArrowEdit endp

DoRightArrowEdit proc near

  call PointEditBufferCurrent
  or al,al
  jnz ewb0
  stc
  jmp short ra1
ewb0:
  mov bx,wEditBufferInsertPoint
ewb1
  inc wEditBufferInsertPoint
  clc
ra1:
  ret
DoRightArrowEdit endp

GetInsertionPixelOffset proc near

  push si
  push dx
  push cx
  push bx
  mov si,pEditBufferStart
  mov bx.pEditBoxFont
  mov cx.wEditBufferInsertPoint
  xor dx,dx
  jcxz gip1
gip2
  lodsb
  or al.al
  jz gip1
  cmp al," "
  jae gip3
  jb gip4
gip3:
  cmp bDrawStringPWFlag,0
  jz gip3a
  mov al,"*"
gip3a:
  sub al," "
  xor ah,ah
  add ax,ax
  mov bx,ax
  add bx,pEditBoxFont
  or ax,ax
  jnz gip5
  mov al.[bx]
  jmp gip6
gip5.
  mov bx,[bx]
  mov al,[bx]
  xor ah,ah
gip6
  add dx,ax
gip4
  loop gip2
gip1:
  mov ax,dx
  pop bx
  pop cx
  pop dx
  pop si
  ret
GetInsertionPixelOffset endp

InsertEditBufferCharacter proc near
  push ds
  pop es
  mov di,pEditBufferStart
  mov cx.wEditBufferSize
  dec cx
  add di,cx
  dec di
  cmp byte ptr [di],0
  jnz ic2
  mov si,di
  dec si
  mov bx.wEditBufferInsertPoint
  sub cx,bx
  jz ic2
  dec cx
  jl  ic2
  je icx1
  std
  rep movsb
  cld
icx1:
  inc wEditBufferInsertPoint
  mov byte ptr [di].al
ic2
  ret
InsertEditBufferCharacter endp
```

```
PointEditBufferCurrent proc near
  mov bx,word ptr wEditBufferInsertPoint
  mov di,pEditBufferStart
  add di,bx
  mov al,[di]
  ret
PointEditBufferCurrent endp

SetInsertionPointFromClick proc near

  push si
  push ax
  push bx
  push cx

  cmp cx,wEditBoxLeftPixel
  ja sipfc1
  xor ax,ax
  jmp sipfb98
sipfc1:

  sub cx,wEditBoxLeftPixel
  m.. si,pEditBufferStart
sipfc3:
  lodsb
  or al,al
  jz sipfb2
  mov bx,pEditBoxFont
  cmp bDrawStringPWFlag,0
  jz sipfb0
  mov al,"*"
sipfb0:
  cmp al," "
  je  sipfb4
  jb sipfb3
  sub al," "
  xor ah,ah
  add ax,ax
  add bx,ax
  mov bx,[bx]
  mov al,[bx]
  jmp short sipfb5
sipfb4:
  mov al,[bx]
sipfb5:
  xor ah,ah
  sub cx,ax
  jge sipfb3
sipfb2:

  dec si
  sub si,pEditBufferStart
  mov ax,si
sipfb98:
  mov wEditBufferInsertPoint,ax
  pop cx
  pop bx
  pop ax
  pop si
  ret
SetInsertionPointFromClick endp

StartCursor proc near
  public StartCursor
  mov si,pTabRegion
  mov bx,[si].pCurrentControl
  cmp [bx].ControlType,PWEDITBOX
  jnz sc0
  mov bDrawStringPWFlag,-1
  mov bCursorPWFlag,-1
  jmp short sc00
sc0
  mov bCursorPWFlag,0
sc00.
  mov ax,[bx].pStorageOffset
  mov pEditBufferStart,ax
  mov ax,[bx].wDataLength
  mov wEditBufferSize,ax
  mov ax,pNormFont
  mov pCurrentFont,ax
  mov wEditBufferInsertPoint,0

  mov di,offset rCursorRegion
  mov ax,[si].wCurrentTop
  inc ax
  inc ax
  inc ax
  inc ax
  mov [di].wCurrentTop,ax
  mov wEditBoxTopPixel,ax
  mov ax,[si],wCurrentBottom
  dec ax
  dec ax
  dec ax
  dec ax
  mov [di].wCurrentBottom,ax
  mov ax,[si].wCurrentRight
  sub ax,9
  mov wEditBoxRightPixel,ax
```

```
  mov ax,[si].wCurrentLeft
  add ax,9
  mov wEditBoxLeftPixel,ax

  mov cx,wPenDownColumn
  call SetInsertionPointFromClick
  call ResumeCursor
  mov bDrawStringPWFlag,0
  ret
StartCursor endp

ResumeCursor Proc Near
 public ResumeCursor
  mov al,bCursorPWFlag
  mov bDrawStringPWFlag,al

  push si
  xor ax,ax
  mov si,pTabRegion
  mov si,[si].pCurrentControl
  cmp byte ptr [si].ControlType,KEYEDITBOX
  pop si
  jnz rcc1a
  mov ax,wHotKeyRightPixel
  or ax,ax
  jz rcc1
  jmp rcc1b
rcc1a.
  call GetInsertionPixelOffset
rcc1:
  add ax,wEditBoxLeftPixel
rcc1b:
  mov [di].wCurrentLeft,ax
  mov [di].wCurrentRight,ax
  mov bCursorState,0
  mov bCursorActive,-1
  call ChangeCursorState
  mov bDrawStringPWFlag,0
  ret
ResumeCursor endp

StopCursor proc near
  public StopCursor

  cmp bCursorActive,0
  jz sc1
  cmp bCursorState,0
  jz sc1
  call ChangeCursorState
sc1.
  mov bCursorActive,0
  ret
StopCursor endp


end
```

```
Copr. 1995 Zenith Data Systems Corp.
.model small

include uibitequ.inc
include uiinclud.inc
DATASEG_BEGIN
extrn ControlDataStorageArea:byte


uifont0 label word
  public uifont0
 db 3
 db 16


 dw ch33,ch34,ch35,ch36,ch37,ch38,ch39
 dw
ch40,ch41,ch42,ch43,ch44,ch45,ch46,ch47,ch48,ch4
9
 dw
ch50,ch51,ch52,ch53,ch54,ch55,ch56,ch57,ch58,ch5
9
 dw
ch60,ch61,ch62,ch63,ch64,ch65,ch66,ch67,ch68,ch6
9
 dw
ch70,ch71,ch72,ch73,ch74,ch75,ch76,ch77,ch78,ch7
9
 dw
ch80,ch81,ch82,ch83,ch84,ch85,ch86,ch87,ch88,ch8
9
 dw
ch90,ch91,ch92,ch93,ch94,ch95,ch96,ch97,ch98,ch9
9
 dw
ch100,ch101,ch102,ch103,ch104,ch105,ch106,ch107
,ch108,ch109
```

```
 dw
ch110,ch111,ch112,ch113,ch114,ch115,ch116,ch117
,ch118,ch119
 dw
ch120,ch121,ch122,ch123,ch124,ch125,ch126,ch127
,ch128,ch129
 dw
ch130,ch131,ch132,ch133,ch134,ch135,ch136,ch137
,ch138,ch139
 dw
ch140,ch141,ch142,ch143,ch144,ch145,ch146,ch147
,ch148,ch149
 dw
ch150,ch151,ch152,ch153,ch154,ch155,ch156,ch157
,ch158,ch159
 dw
ch160,ch161,ch162,ch163,ch164,ch165,ch166,ch167
,ch168,ch169
 dw
ch170,ch171,ch172,ch173,ch174,ch175,ch176,ch177
,ch178,ch179
 dw
ch180,ch181,ch182,ch183,ch184,ch185,ch186,ch187
,ch188,ch189
 dw
ch190,ch191,ch192,ch193,ch194,ch195,ch196,ch197
,ch198,ch199
 dw
ch200,ch201,ch202,ch203,ch204,ch205,ch206,ch207
,ch208,ch209
 dw
ch210,ch211,ch212,ch213,ch214,ch215,ch216,ch217
,ch218,ch219
 dw
ch220,ch221,ch222,ch223,ch224,ch225,ch226,ch227
,ch228,ch229
 dw
ch230,ch231,ch232,ch233,ch234,ch235,ch236,ch237
,ch238,ch239
 dw
ch240,ch241,ch242,ch243,ch244,ch245,ch246,ch247
,ch248,ch249
 dw ch250,ch251,ch252,ch253,ch254,ch255


ch33 label byte
DB 4,021h
DB _XX_____
DB _XX_____
DB _XX_____
DB _XX_____
DB _XX_____
DB _XX_____
DB _XX_____
DB ________
DB _XX_____
DB _XX_____

ch34 label byte
DB 6,021h
DB XX__XX__
DB XX__XX__
DB XX__XX__
DB XX__XX__

ch35 label byte
DB 8,021h
DB __XX_XX_
DB __XX_XX_
DB _XXXXXXX
DB __XX_XX_
DB __XX_XX_
DB _XX_XX__
DB _XX_XX__
DB XXXXXXX_
DB _XX_XX__
DB _XX_XX__

ch36 label byte
DB 8,021h
DB ___XX___
DB __XXXX__
DB _XX__XX_
DB _XX__XX_
DB _XX_____
DB __XXXX__
DB _____XX_
DB _____XX_
DB _XX__XX_
DB __XXXX__
DB ___XX___

ch37 label byte
DB 11,022h
DB _XXX____,_XX_____
DB XX_XX___,XX______
DB XX_XX__X,X_______
DB XX_XX_XX,________
DB _XXX_XX_,________
```

```
DB ____XX_X,XX______
DB ___XX_XX,_XX_____
DB __XX__XX,_XX_____
DB _XX___XX,_XX_____
DB XX_____X,XX______

ch38 label byte
DB 9,021h
DB ___XXX__
DB __XX_XX_
DB __XX_XX_
DB __XX_XX_
DB ___XXX__
DB __XXX___
DB _XX_XX_X
DB _XX__XXX
DB _XX__XX_
DB __XXXXXX

ch39 label byte
DB 4,021h
DB _XX_____
DB _XX_____
DB _XX_____
DB _XX_____

ch40 label byte
DB 4,021h
DB __XX____
DB _XX_____
DB _XX_____
DB _XX_____
DB _XX_____
DB _XX_____
DB _XX_____
DB _XX_____
DB _XX_____
DB _XX_____
DB _XX_____
DB _XX_____
DB __XX____

ch41 label byte
DB 4,021h
DB XX______
DB _XX_____
DB _XX_____
DB _XX_____
DB _XX_____
DB _XX_____
DB _XX_____
DB _XX_____
DB _XX_____
DB _XX_____
DB _XX_____
DB _XX_____
DB XX______

ch42 label byte
DB 6,021h
DB __XX____
DB XXXXXX__
DB __XX____
DB _XXXX___
DB _X__X___

ch43 label byte
DB 8,041h
DB ___XX___
DB ___XX___
DB ___XX___
DB _XXXXXX_
DB ___XX___
DB ___XX___
DB ___XX___

ch44 label byte
DB 4,0A1h
DB _XX_____
DB _XX_____
DB XX______

ch45 label byte
DB 5,071h
DB XXXX____

ch46 label byte
DB 4,0A1h
DB _XX_____
DB _XX_____

ch47 label byte
DB 4,021h
DB __XX____
DB __XX____
DB __XX____
DB __XX____
DB _XX_____
DB _XX_____
DB _XX_____
DB _XX_____
DB XX______
DB XX______
DB XX______
DB XX______

ch48 label byte
DB 8,021h
DB __XXXX__
DB _XX__XX_
DB _XX__XX_
DB _XX__XX_
DB _XX__XX_
DB _XX__XX_
DB _XX__XX_
DB _XX__XX_
DB _XX__XX_
DB __XXXX__

ch49 label byte
DB 8,021h
DB ___XX___
DB _XXXX___
DB ___XX___
DB ___XX___
DB ___XX___
DB ___XX___
DB ___XX___
DB ___XX___
DB ___XX___
DB ___XX___

ch50 label byte
DB 8,021h
DB __XXXX__
DB _XX__XX_
DB _XX__XX_
DB _____XX_
DB ____XX__
DB ___XX___
DB __XX____
DB _XX_____
DB _XX_____
DB _XXXXXX_

ch51 label byte
DB 8,021h
DB __XXXX__
DB _XX__XX_
DB _____XX_
DB _____XX_
DB ___XXX__
DB _____XX_
DB _____XX_
DB _____XX_
DB _XX__XX_
DB __XXXX__

ch52 label byte
DB 8,021h
DB _____XX_
DB ____XXX_
DB ___XXXX_
DB __XXXX_
DB __XX_XX_
DB __XX_XX_
DB _XX__XX_
DB _XXXXXX_
DB _____XX_
DB _____XX_

ch53 label byte
DB 8,021h
DB _XXXXXX_
DB _XX_____
DB _XX_____
DB _XX_____
DB _XXXXX__
DB _XX__XX_
DB _____XX_
DB _____XX_
DB _XX__XX_
DB __XXXX__

ch54 label byte
DB 8,021h
DB __XXXX__
DB _XX__XX_
DB _XX_____
DB _XX_____
DB _XXXXX__
DB _XX__XX_
DB _XX__XX_
DB _XX__XX_
DB _XX__XX_
DB __XXXX__

ch55 label byte
DB 8,021h
DB _XXXXXX_
DB _____XX_
DB ____XX__
DB ____XX__
DB ___XX___
DB ___XX___
DB ___XX___
DB __XX____
DB __XX____
DB __XX____

ch56 label byte
DB 8,021h
DB __XXXX__
DB _XX__XX_
DB _XX__XX_
DB _XX__XX_
DB __XXXX__
DB _XX__XX_
DB _XX__XX_
DB _XX__XX_
DB _XX__XX_
DB __XXXX__

ch57 label byte
DB 8,021h
DB __XXXX__
DB _XX__XX_
DB _XX__XX_
DB _XX__XX_
DB _XX__XX_
DB _XXXXX_
DB _____XX_
DB _____XX_
DB _XX__XX_
DB __XXXX__

ch58 label byte
DB 4,041h
DB _XX_____
DB _XX_____
DB ________
DB ________
DB ________
DB ________
DB _XX_____
DB _XX_____

ch59 label byte
DB 4,041h
DB _XX_____
DB _XX_____
DB ________
DB ________
DB ________
DB ________
DB _XX_____
DB _XX_____
DB XX______

ch60 label byte
DB 8,031h
DB _____XX_
DB ____XX__
DB ___XX___
DB __XX____
DB _XX_____
DB __XX____
DB ___XX___
DB ____XX__
DB _____XX_

ch61 label byte
DB 8,051h
DB _XXXXXX_
DB ________
DB ________
DB _XXXXXX_

ch62 label byte
DB 8,031h
DB _XX_____
DB __XX____
DB ___XX___
DB ____XX__
DB _____XX_
DB ____XX__
DB ___XX___
DB __XX____
DB _XX_____

ch63 label byte
DB 8,021h
DB __XXXX__
DB _XX__XX_
DB _XX__XX_
DB _____XX_
DB ____XX__
DB ___XX___
DB ___XX___
DB ________
DB ___XX___
DB ___XX___

ch64 label byte
DB 14,012h
DB _____XXX,X_______
DB ___XXX__,XXX_____
DB __XX____,__XX____
DB __XX__XX,X_XX____
DB _XX__XX_,XX_XX___
DB _XX__XX_,XX_XX___
DB _XX_XX__,XX_XX___
DB _XX_XX_X,X__XX___
DB _XX_XX_X,X__XX___
DB __XX_XX_,XXXX____
DB __XX____,________
DB ___XXX__,_XXX____
DB _____XXX,XX______

ch65 label byte
DB 8,021h
DB ___XX___
DB ___XX___
DB __XXXX__
DB __XXXX__
DB __X__X__
DB _XX__XX_
DB _XX__XX_
DB _XXXXXX_
DB XX____XX
DB XX____XX

ch66 label byte
DB 10,022h
DB _XXXXXXX,________
DB _XX____X,X_______
DB _XX____X,X_______
DB _XX____X,X_______
DB _XXXXXXX,________
DB _XX____X,X_______
DB _XX____X,X_______
DB _XX____X,X_______
DB _XX____X,X_______
DB _XXXXXXX,________

ch67 label byte
DB 9,021h
DB ___XXXX_
DB __XX__XX
DB _XX____X
DB _XX_____
DB _XX_____
DB _XX_____
DB _XX_____
DB _XX____X
DB __XX__XX
DB ___XXXX_

ch68 label byte
DB 10,022h
DB _XXXXXX_,________
DB _XX___XX,________
DB _XX____X,X_______
DB _XX____X,X_______
DB _XX____X,X_______
DB _XX____X,X_______
DB _XX____X,X_______
DB _XX____X,X_______
DB _XX___XX,________
DB _XXXXXX_,________

ch69 label byte
DB 9,021h
DB _XXXXXXX
DB _XX_____
DB _XX_____
DB _XX_____
DB _XXXXXX_
DB _XX_____
DB _XX_____
DB _XX_____
DB _XX_____
DB _XXXXXXX

ch70 label byte
DB 8,021h
DB _XXXXXXX
DB _XX_____
DB _XX_____
DB _XX_____
DB _XXXXXX_
DB _XX_____
DB _XX_____
DB _XX_____
DB _XX_____
DB _XX_____
```

```
ch71 label byte
DB 10,022h
DB ___XXXXX_______
DB __XX__X,X______
DB _XX_____X______
DB _XX_____,_______
DB _XX_____,_______
DB _XX__XXX,X_____
DB _XX___X,X______
DB _XX___X,X______
DB __XX___X,X______
DB ___XXXX_,X______

ch72 label byte
DB 10,022h
DB _XX___X,X______
DB _XX___X,X______
DB _XX___X,X______
DB _XX___X,X______
DB _XXXXXXX,X______
DB _XX___X,X______
DB _XX___X,X______
DB _XX___X,X______
DB _XX___X,X______
DB _XX___X,X______

ch73 label byte
DB 4,021h
DB _XX____
DB _XX____
DB _XX____
DB _XX____
DB _XX____
DB _XX____
DB _XX____
DB _XX____
DB _XX____
DB _XX____

ch74 label byte
DB 7,021h
DB ____XX_
DB ____XX_
DB ____XX_
DB ____XX_
DB ____XX_
DB ____XX_
DB ____XX_
DB XX__XX_
DB XX__XX_
DB _XXXX__

ch75 label byte
DB 9,022h
DB _XX__XX,_______
DB _XX__XX_,_______
DB _XX_XX__,_______
DB _XXXX___,_______
DB _XXX____,_______
DB _XXXX___,_______
DB _XX_XX__,_______
DB _XX__XX_,_______
DB _XX___XX,_______
DB _XX___X,X______

ch76 label byte
DB 8,021h
DB _XX____
DB _XX____
DB _XX____
DB _XX____
DB _XX____
DB _XX____
DB _XX____
DB _XX____
DB _XX____
DB _XXXXXXX

ch77 label byte
DB 12,022h
DB _XX_____XX____
DB _XX_____XX____
DB _XXX____XXX____
DB _XXX____XXX____
DB _XXXX__X,XXX____
DB _XXXX__X,XXX____
DB _XX_XXXX_XX____
DB _XX_XXXX_XX____
DB _XX__XX__XX____
DB _XX__XX__XX____

ch78 label byte
DB 10,022h
DB _XX___X,X______
DB _XXX__X,X______
DB _XXXX__X,X______
DB _XXXX__X,X______
DB _XX_XX_X,X______
DB _XX_XX_X,X______
DB _XX__XXX,X______
DB _XX__XXX,X______
DB _XX___XX,X______
DB _XX___X,X______

ch79 label byte
DB 10,022h
DB ___XXXX_,_______
DB __XX__XX,_______
DB _XX___X,X______
DB _XX___X,X______
DB _XX___X,X______
DB _XX___X,X______
DB _XX___X,X______
DB _XX___X,X______
DB __XX__XX,_______
DB ___XXXX_,_______

ch80 label byte
DB 9,022h
DB _XXXXXXX,_______
DB _XX___X,X______
DB _XX___X,X______
DB _XX___X,X______
DB _XX___X,X______
DB _XXXXXXX,_______
DB _XX____,_______
DB _XX____,_______
DB _XX____,_______
DB _XX____,_______

ch81 label byte
DB 10,022h
DB ___XXXX_,_______
DB __XX__XX,_______
DB _XX___X,X______
DB _XX___X,X______
DB _XX___X,X______
DB _XX___X,X______
DB _XX___X,X______
DB _XX__XXX,X______
DB __XX__XX,_______
DB ___XXXXX,X______

ch82 label byte
DB 10,022h
DB _XXXXXXX,_______
DB _XX___X,X______
DB _XX___X,X______
DB _XX___X,X______
DB _XX___X,X______
DB _XXXXXXX,_______
DB _XX___X,X______
DB _XX___X,X______
DB _XX___X,X______
DB _XX____,XX______

ch83 label byte
DB 9,021h
DB __XXXXX_
DB _XX___XX
DB _XX___XX
DB _XX_____
DB __XXX___
DB ____XXX_
DB ______XX
DB _XX___XX
DB _XX___XX
DB __XXXXX_

ch84 label byte
DB 8,021h
DB XXXXXXXX
DB ___XX___
DB ___XX___
DB ___XX___
DB ___XX___
DB ___XX___
DB ___XX___
DB ___XX___
DB ___XX___
DB ___XX___

ch85 label byte
DB 10,022h
DB _XX___X,X______
DB _XX___X,X______
DB _XX___X,X______
DB _XX___X,X______
DB _XX___X,X______
DB _XX___X,X______
DB _XX___X,X______
DB _XX___X,X______
DB __XX__XX,_______
DB ___XXXX_,_______

ch86 label byte
DB 8,021h
DB XX____XX
DB XX____XX
DB _XX__XX_
DB _XX__XX_
DB _XX__XX_
DB __X__X__
DB __XXXX__
DB __XXXX__
DB ___XX___
DB ___XX___

ch87 label byte
DB 14,022h
DB XX____XX,____XX__
DB XX____XX,____XX__
DB XX____XX,____XX__
DB _XX__XXX,X__XX___
DB _XX__XXX,X__XX___
DB __XX_X__,X_XX____
DB __XXXX__,XXXX____
DB ___XX___,_XX_____
DB ___XX___,_XX_____
DB ___XX___,_XX_____

ch88 label byte
DB 9,022h
DB XX_____X,X_______
DB XX_____X,X_______
DB _XX___XX,_______
DB __XX_XX_,_______
DB ___XXX__,_______
DB ___XXX__,_______
DB __XX_XX_,_______
DB _XX___XX,_______
DB XX_____X,X_______
DB XX_____X,X_______

ch89 label byte
DB 10,022h
DB XX______,XX______
DB XX______,XX______
DB _XX____X,X_______
DB __XX__XX,_______
DB ___XXXX_,_______
DB ____XX__,_______
DB ____XX__,_______
DB ____XX__,_______
DB ____XX__,_______
DB ____XX__,_______

ch90 label byte
DB 9,022h
DB XXXXXXXX,X_______
DB _______X,X_______
DB ______XX,_______
DB _____XX_,_______
DB ____XX__,_______
DB ___XX___,_______
DB __XX____,_______
DB _XX_____,_______
DB XX______,_______
DB XXXXXXXX,X_______

ch91 label byte
DB 4,021h
DB _XXX____
DB _XX_____
DB _XX_____
DB _XX_____
DB _XX_____
DB _XX_____
DB _XX_____
DB _XX_____
DB _XX_____
DB _XX_____
DB _XX_____
DB _XX_____
DB _XXX____

ch92 label byte
DB 4,021h
DB XX______
DB XX______
DB XX______
DB XX______
DB _XX_____
DB _XX_____
DB _XX_____
DB _XX_____
DB __XX____
DB __XX____
DB __XX____
DB __XX____

ch93 label byte
DB 4,021h
DB XXX_____
DB _XX_____
DB _XX_____
DB _XX_____
DB _XX_____
DB _XX_____
DB _XX_____
DB _XX_____
DB _XX_____
DB _XX_____
DB _XX_____
DB _XX_____
DB XXX_____

ch94 label byte
DB 5,021h
DB __X_____
DB _XXX____
DB XX_XX___

ch95 label byte
DB 8,0E1h
DB XXXXXXXX

ch96 label byte
DB 5,011h
DB _XXX____
DB __XX____
DB ___XX___

ch97 label byte
DB 8,051h
DB __XXXX__
DB _XX__XX_
DB ___XXXX_
DB __XX_XX_
DB _XX__XX_
DB _XX__XX_
DB __XXXXX_

ch98 label byte
DB 8,021h
DB _XX_____
DB _XX_____
DB _XX_____
DB _XXXXX__
DB _XX__XX_
DB _XX__XX_
DB _XX__XX_
DB _XX__XX_
DB _XX__XX_
DB _XXXXX__

ch99 label byte
DB 7,051h
DB __XXXX__
DB _XX__XX_
DB _XX_____
DB _XX_____
DB _XX_____
DB _XX__XX_
DB __XXXX__

ch100 label byte
DB 8,021h
DB _____XX_
DB _____XX_
DB _____XX_
DB __XXXXX_
DB _XX__XX_
DB _XX__XX_
DB _XX__XX_
DB _XX__XX_
DB _XX__XX_
DB __XXXXX_

ch101 label byte
DB 8,051h
DB __XXXX__
DB _XX__XX_
DB _XXXXXX_
DB _XX_____
DB _XX_____
DB _XX__XX_
DB __XXXX__

ch102 label byte
DB 4,021h
DB __XX____
DB _XX_____
DB _XX_____
DB XXXX____
DB _XX_____
DB _XX_____
DB _XX_____
DB _XX_____
DB _XX_____
DB _XX_____

ch103 label byte
DB 8,051h
DB __XXXXX_
DB _XX__XX_
```

```
DB _XX__XX_
DB _XX__XX_
DB _XX__XX_
DB _XX__XX_
DB __XXXXX_
DB _____XX_
DB _XX__XX_
DB __XXXX__

ch104 label byte
DB 8,021h
DB _XX_____
DB _XX_____
DB _XX_____
DB _XXXXX__
DB _XX__XX_
DB _XX__XX_
DB _XX__XX_
DB _XX__XX_
DB _XX__XX_
DB _XX__XX_

ch105 label byte
DB 4,021h
DB _XX_____
DB _XX_____
DB ________
DB _XX_____
DB _XX_____
DB _XX_____
DB _XX_____
DB _XX_____
DB _XX_____
DB _XX_____

ch106 label byte
DB 4,021h
DB _XX_____
DB _XX_____
DB ________
DB _XX_____
DB _XX_____
DB _XX_____
DB _XX_____
DB _XX_____
DB _XX_____
DB _XX_____
DB _XX_____
DB _XX_____
DB XX______

ch107 label byte
DB 7,021h
DB _XX_____
DB _XX_____
DB _XX_____
DB _XX__XX_
DB _XX_XX__
DB _XXXX___
DB _XXX____
DB _XXXX___
DB _XX_XX__
DB _XX__XX_

ch108 label byte
DB 4,021h
DB _XX_____
DB _XX_____
DB _XX_____
DB _XX_____
DB _XX_____
DB _XX_____
DB _XX_____
DB _XX_____
DB _XX_____
DB _XX_____

ch109 label byte
DB 12,052h
DB _XXXXXXX,XX______
DB _XX__XX_,_XX_____
DB _XX__XX_,_XX_____
DB _XX__XX_,_XX_____
DB _XX__XX_,_XX_____
DB _XX__XX_,_XX_____
DB _XX__XX_,_XX_____

ch110 label byte
DB 8,051h
DB _XXXXX__
DB _XX__XX_
DB _XX__XX_
DB _XX__XX_
DB _XX__XX_
DB _XX__XX_
DB _XX__XX_

ch111 label byte
DB 8,051h
DB __XXXX__
DB _XX__XX_
DB _XX__XX_
DB _XX__XX_
DB _XX__XX_
DB _XX__XX_
DB __XXXX__

ch112 label byte
DB 8,051h
DB _XXXXX__
DB _XX__XX_
DB _XX__XX_
DB _XX__XX_
DB _XX__XX_
DL _XX__XX_
DB _XXXXX__
DB _XX_____
DB _XX_____
DB _XX_____

ch113 label byte
DB 8,051h
DB __XXXXX_
DB _XX__XX_
DB _XX__XX_
DB _XX__XX_
DB _XX__XX_
DB _XX__XX_
DB __XXXXX_
DB _____XX_
DB _____XX_
DB _____XX_

ch114 label byte
DB 5,051h
DB _XXXX___
DB _XXX____
DB _XX_____
DB _XX_____
DB _XX_____
DB _XX_____
DB _XX_____

ch115 label byte
DB 8,051h
DB __XXXX__
DB _XX__XX_
DB _XX_____
DB __XXXX__
DB _____XX_
DB _XX__XX_
DB __XXXX__

ch116 label byte
DB 4,031h
DB _XX_____
DB _XX_____
DB XXXX____
DB _XX_____
DB _XX_____
DB _XX_____
DB _XX_____
DB _XX_____
DB __XX____

ch117 label byte
DB 8,051h
DB _XX__XX_
DB _XX__XX_
DB _XX__XX_
DB _XX__XX_
DB _XX__XX_
DB _XX__XX_
DB __XXXXX_

ch118 label byte
DB 8,051h
DB XX____XX
DB XX____XX
DB _XX__XX_
DB _XX__XX_
DB __XXXX__
DB ___XX___
DB ___XX___

ch119 label byte
DB 10,052h
DB XX______,XX______
DB XX__XX__,XX______
DB _XX_XX_X,X_______
DB _XX_XX_X,X_______
DB _XXXXXXX,X_______
DB __XX__XX,________
DB __XX__XX,________

ch120 label byte
DB 8,051h
DB XX____XX
DB _XX__XX_
DB __XXXX__
DB ___XX___
DB __XXXX__
DB _XX__XX_
DB XX____XX

ch121 label byte
DB 8,051h
DB XX____XX
DB XX____XX
DB _XX__XX_
DB _XX__XX_
DB __XXXX__
DB __XXXX__
DB ___XX___
DB ___XX___
DB __XX____
DB _XX_____

ch122 label byte
DB 8,051h
DB _XXXXXX_
DB _____XX_
DB ____XX__
DB ___XX___
DB __XX____
DB _XX_____
DB _XXXXXX_

ch123 label byte
DB 5,021h
DB ___XX___
DB __XX____
DB __XX____
DB __XX____
DB __XX____
DB __XX____
DB _XX_____
DB __XX____
DB __XX____
DB __XX____
DB __XX____
DB __XX____
DB ___XX___

ch124 label byte
DB 4,021h
DB _XX_____
DB _XX_____
DB _XX_____
DB _XX_____
DB _XX_____
DB _XX_____
DB _XX_____
DB _XX_____
DB _XX_____
DB _XX_____
DB _XX_____
DB _XX_____
DB _XX_____

ch125 label byte
DB 5,021h
DB XX______
DB _XX_____
DB _XX_____
DB _XX_____
DB _XX_____
DB _XX_____
DB __XX____
DB _XX_____
DB _XX_____
DB _XX_____
DB _XX_____
DB _XX_____
DB XX______

ch126 label byte
DB 5,021h
DB XXX_X___
DB X_XXX___

ch127 label byte
DB 4,031h
DB _XX_____
DB _XX_____
DB _XX_____
DB _XX_____
DB _XX_____
DB _XX_____
DB _XX_____
DB _XX_____
DB _XX_____

ch128 label byte
DB 9,021h
DB ___XXXX_
DB __XX__XX
DB _XX____X
DB _XX_____
DB _XX_____
DB _XX_____
DB _XX_____
DB _XX____X
DB __XX__XX
DB ___XXXX_
DB ____XX__
DB _____XX_
DB ___XXX__

ch129 label byte
DB 8,021h
DB _XX__XX_
DB _XX__XX_
DB ________
DB _XX__XX_
DB _XX__XX_
DB _XX__XX_
DB _XX__XX_
DB _XX__XX_
DB _XX__XX_
DB __XXXXX_

ch130 label byte
DB 8,011h
DB ___XXX__
DB ___XX___
DB __XX____
DB ________
DB __XXXX__
DB _XX__XX_
DB _XXXXXX_
DB _XX_____
DB _XX_____
DB _XX__XX_
DB __XXXX__

ch131 label byte
DB 8,011h
DB ___XX___
DB __XXXX__
DB _XX__XX_
DB ________
DB __XXXX__
DB _XX__XX_
DB ___XXXX_
DB __XX_XX_
DB _XX__XX_
DB _XX__XX_
DB __XXXXX_

ch132 label byte
DB 8,021h
DB _XX__XX_
DB _XX__XX_
DB ________
DB __XXXX__
DB _XX__XX_
DB ___XXXX_
DB __XX_XX_
DB _XX__XX_
DB _XX__XX_
DB __XXXXX_

ch133 label byte
DB 8,011h
DB __XXX___
DB ___XX___
DB ____XX__
DB ________
DB __XXXX__
DB _XX__XX_
DB ___XXXX_
DB __XX_XX_
DB _XX__XX_
DB _XX__XX_
DB __XXXXX_

ch134 label byte
DB 8,011h
DB ___XX___
DB __XXXX__
DB ___XX___
DB ________
DB __XXXX__
DB _XX__XX_
DB ___XXXX_
DB __XX_XX_
DB _XX__XX_
DB _XX__XX_
DB __XXXXX_

ch135 label byte
DB 7,051h
DB __XXXX__
DB _XX__XX_
DB _XX_____
```

```
DB _XX_____
DB _XX_____
DB _XX__XX_
DB __XXXX__
DB ___XX___
DB ____XX__
DB __XXX___

ch136 label byte
DB 8,011h
DB ___XX___
DB __XXXX__
DB _XX__XX_
DB ________
DB __XXXX__
DB _XX__XX_
DB _XXXXXX_
DB _XX_____
DB _XX_____
DB _XX__XX_
DB __XXXX__

ch137 label byte
DB 8,021h
DB _XX__XX_
DB _XX__XX_
DB ________
DB __XXXX__
DB _XX__XX_
DB _XXXXXX_
DB _XX_____
DB _XX_____
DB _XX__XX_
DB __XXXX__

ch138 label byte
DB 8,011h
DB __XXX___
DB ___XX___
DB ____XX__
DB ________
DB __XXXX__
DB _XX__XX_
DB _XXXXXX_
DB _XX_____
DB _XX_____
DB _XX__XX_
DB __XXXX__

ch139 label byte
DB 4,021h
DB X__X____
DB X__X____
DB ________
DB _XX_____
DB _XX_____
DB _XX_____
DB _XX_____
DB _XX_____
DB _XX_____
DB _XX_____

ch140 label byte
DB 4,011h
DB _XX_____
DB XXXX____
DB ________
DB ________
DB _XX_____
DB _XX_____
DB _XX_____
DB _XX_____
DB _XX_____
DB _XX_____
DB _XX_____

ch141 label byte
DB 4,011h
DB XXX_____
DB _XX_____
DB __XX____
DB ________
DB _XX_____
DB _XX_____
DB _XX_____
DB _XX_____
DB _XX_____
DB _XX_____
DB _XX_____

ch142 label byte
DB 8,001h
DB _XX__XX_
DB ________
DB ___XX___
DB ___XX___
DB __XXXX__
DB __XXXX__
DB __X__X__
```

```
DB _XX__XX_
DB _XX__XX_
DB _XXXXXX_
DB XX____XX
DB XX____XX

ch143 label byte
DB 8,001h
DB __XXXX__
DB ___XX___
DB ________
DB ___XX___
DB ___XX___
DB __XXXX__
DB __X__X__
DB _XX__XX_
DB _XX__XX_
DB _XXXXXX_
DB XX____XX
DB XX____XX

ch144 label byte
DB 8,001h
DB ____XX__
DB ___XX___
DB _XXXXXXX
DB _XX_____
DB _XX_____
DB _XX_____
DB _XXXXXX_
DB _XX_____
DB _XX_____
DB _XX_____
DB _XX_____
DB _XXXXXXX

ch145 label byte
DB 12,052h
DB __XXXXXX,XX______
DB _XX__XX_,_XX_____
DB ___XXXXX,XXX_____
DB __XX_XX_,________
DB _XX__XX_,________
DB _XX__XX_,_XX_____
DB __XXXXXX,XX______

ch146 label byte
DB 13,022h
DB ___XXXXX,XXXX____
DB ___XXXX_,________
DB __XX_XX_,________
DB __XX_XX_,________
DB __XX_XXX,XXX_____
DB _XX__XX_,________
DB _XX__XX_,________
DB _XXXXXX_,________
DB XX___XX_,________
DB XX___XXX,XXXX____

ch147 label byte
DB 8,011h
DB ___XX___
DB __XXXX__
DB _XX__XX_
DB ________
DB __XXXX__
DB _XX__XX_
DB _XX__XX_
DB _XX__XX_
DB _XX__XX_
DB _XX__XX_
DB __XXXX__

ch148 label byte
DB 8,021h
DB _XX__XX_
DB _XX__XX_
DB ________
DB __XXXX__
DB _XX__XX_
DB _XX__XX_
DB _XX__XX_
DB _XX__XX_
DB _XX__XX_
DB __XXXX__

ch149 label byte
DB 8,011h
DB __XXX___
DB ___XX___
DB ____XX__
DB ________
DB __XXXX__
DB _XX__XX_
DB _XX__XX_
DB _XX__XX_
DB _XX__XX_
DB _XX__XX_
DB __XXXX__
```

```
ch150 label byte
DB 8,011h
DB ___XX___
DB __XXXX__
DB _XX__XX_
DB ________
DB _XX__XX_
DB _XX__XX_
DB _XX__XX_
DB _XX__XX_
DB _XX__XX_
DB _XX__XX_
DB __XXXXX_

ch151 label byte
DB 8,011h
DB __XXX___
DB ___XX___
DB ____XX__
DB ________
DB _XX__XX_
DB _XX__XX_
DB _XX__XX_
DB _XX__XX_
DB _XX__XX_
DB _XX__XX_
DB __XXXXX_

ch152 label byte
DB 8,021h
DB _XX__XX_
DB _XX__XX_
DB ________
DB XX____XX
DB XX____XX
DB _XX__XX_
DB _XX__XX_
DB __XXXX__
DB __XXXX__
DB ___XX___
DB ___XX___
DB __XX____
DB _XX_____

ch153 label byte
DB 10,002h
DB __XX__XX,________
DB ________,________
DB __XXXX__,________
DB __XX__XX,________
DB _XX____X,X_______
DB _XX____X,X_______
DB _XX____X,X_______
DB _XX____X,X_______
DB _XX____X,X_______
DB _XX____X,X_______
DB __XX__XX,________
DB ___XXXX_,________

ch154 label byte
DB 10,002h
DB __XX__XX,________
DB ________,________
DB _XX____X,X_______
DB _XX____X,X_______
DB _XX____X,X_______
DB _XX____X,X_______
DB _XX____X,X_______
DB _XX____X,X_______
DB _XX____X,X_______
DB _XX____X,X_______
DB __XX__XX,________
DB ___XXXX_,________

ch155 label byte
DB 8,041h
DB ____XX__
DB __XXXX__
DB _XX_XXX_
DB _XX_X___
DB _XX_X___
DB _XXX____
DB _XXX_XX_
DB __XXXX__
DB __XX____

ch156 label byte
DB 8,021h
DB __XXX___
DB _XX_XX__
DB _XX_____
DB _XX_____
DB __XX____
DB _XXXX___
DB __XX____
DB __XX____
DB _XX__XX_
DB _XXXXX__
```

```
ch157 label byte
DB 8,021h
DB XX____XX
DB XX____XX
DB _XX__XX_
DB _XX__XX_
DB XXXXXXXX
DB ___XX___
DB XXXXXXXX
DB ___XX___
DB ___XX___
DB ___XX___

ch158 label byte
DB 8,051h
DB _XXXXX__
DB _XX__XX_
DB _XX__XX_
DB _XX__XX_
DB _XX__XX_
DB _XX__XX_
DB _XXXXX__
DB _XX_____
DB _XX_____
DB _XX_____

ch159 label byte
DB 4,021h
DB __XX____
DB _XX_____
DB _XX_____
DB XXXX____
DB _XX_____
DB _XX_____
DB _XX_____
DB _XX_____
DB _XX_____
DB _XX_____

ch160 label byte
DB 8,011h
DB ___XXX__
DB ___XX___
DB __XX____
DB ________
DB __XXXX__
DB _XX__XX_
DB ___XXXX_
DB __XX_XX_
DB _XX__XX_
DB _XX__XX_
DB __XXXXX_

ch161 label byte
DB 4,011h
DB _XXX____
DB _XX_____
DB XX______
DB ________
DB _XX_____
DB _XX_____
DB _XX_____
DB _XX_____
DB _XX_____
DB _XX_____
DB _XX_____

ch162 label byte
DB 8,011h
DB ___XXX__
DB ___XX___
DB __XX____
DB ________
DB __XXXX__
DB _XX__XX_
DB _XX__XX_
DB _XX__XX_
DB _XX__XX_
DB _XX__XX_
DB __XXXX__

ch163 label byte
DB 8,011h
DB ___XXX__
DB ___XX___
DB __XX____
DB ________
DB _XX__XX_
DB _XX__XX_
DB _XX__XX_
DB _XX__XX_
DB _XX__XX_
DB _XX__XX_
DB __XXXXX_

ch164 label byte
DB 8,021h
DB _XXXX_X_
DB _X_XXXX_
```

```
DB ________
DB _XXXXX__
DB _XX__XX_
DB _XX__XX_
DB _XX__XX_
DB _XX__XX_
DB _XX__XX_
DB _XX__XX_

ch165 label byte
DB 10,002h
DB __X_XXXX.________
DB ________.________
DB _XX____X,X_______
DB _XXX___X,X_______
DB _XXXX__X,X_______
DB _XXXX__X,X_______
DB _XX_XX_X,X_______
DB _XX_XX_X,X_______
DB _XX__XXX,X_______
DB _XX__XXX,X_______
DB _XX___XX,X_______
DB _XX____X,X_______

ch166 label byte
DB 5,021h
DB __X_____
DB ___X____
DB __XX____
DB _X_X____
DB __XX____
DB ________
DB _XXX____

ch167 label byte
DB 5,021h
DB _XXX____
DB _X_X____
DB _X_X____
DB _X_X____
DB _XXX____
DB ________
DB _XXX____

ch168 label byte
DB 8,021h
DB ___XX___
DB ___XX___
DB ________
DB ___XX___
DB ___XX___
DB __XX____
DB _XX_____
DB _XX__XX_
DB _XX__XX_
DB __XXXX__

ch169 label byte
DB 8,0E1h
DB XXXXXXXX

ch170 label byte
DB 8,061h
DB _XXXXXX_
DB _____XX_
DB _____XX_

ch171 label byte
DB 11,022h
DB __XX_____XX______
DB _XXX____,XX___!__
DB __XX___X,X_______
DB __XX__XX,________
DB __XX_XX_,________
DB ____XX_X,X_______
DB ___XX_X_,XX______
DB __XX____,XX______
DB _XX____X,X_______
DB XX____XX,XX______

ch172 label byte
DB 11,022h
DB __XX_____XX______
DB _XXX____,XX______
DB __XX___X,X_______
DB __XX__XX,________
DB __XX_XX_,________
DB ____XX__,XX______
DB ___XX__X,XX______
DB __XX__XX,_X______
DB _XX___XX,XX______
DB XX______,XX______

ch173 label byte
DB 4,021h
DB _XX_____
DB _XX_____
DB ________
DB _XX_____
DB _XX_____
DB _XX_____
DB _XX_____
DB _XX_____
DB _XX_____
DB _XX_____

ch174 label byte
DB 7,061h
DB __XX_XX_
DB _XX_XX__
DB XX_XX___
DB _XX_XX__
DB __XX_XX_

ch175 label byte
DB 7,061h
DB XX_XX___
DB _XX_XX__
DB __XX_XX_
DB _XX_XX__
DB XX_XX___

ch176 label byte
DB 8,0E1h
DB XXXXXXXX

ch177 label byte
DB 8,0E1h
DB XXXXXXXX

ch178 label byte
DB 8,0E1h
DB XXXXXXXX

ch179 label byte
DE ·· 021h
DB _XX_____
DB _XX_____
DB _XX_____
DB _XX_____
DB _XX_____
DB _XX_____
DB ________
DB _XX_____
DB _XX_____
DB _XX_____
DB _XX_____
DB _XX_____
DB _XX_____

ch180 label byte
DB 8,0E1h
DB XXXXXXXX

ch181 label byte
DB 8,0E1h
DB XXXXXXXX

ch182 label byte
DB 8,0E1h
DB XXXXXXXX

ch183 label byte
DB 8,0E1h
DB XXXXXXXX

ch184 label byte
DB 8,0E1h
DB XXXXXXXX

ch185 label byte
DB 8,0E1h
DB XXXXXXXX

ch ·.5 label byte
DB ·,0E1h
DB XXXXXXXX

ch187 label byte
DB 8,0E1h
DB XXXXXXXX

ch188 label byte
DB 8,0E1h
DB XXXXXXXX

ch189 label byte
DB 8,0E1h
DB XXXXXXXX

ch190 label byte
DB 8,0E1h
DB XXXXXXXX

ch191 label byte
DB 8,0E1h
DB XXXXXXXX

ch192 label byte
DB 8,0E1h
DB XXXXXXXX

ch193 label byte
DB 8,0E1h
DB XXXXXXXX

ch194 label byte
DB 8,0E1h
DB XXXXXXXX

ch195 label byte
DB 8,0E1h
DB XXXXXXXX

ch196 label byte
DB 8,0E1h
DB XXXXXXXX

ch197 label byte
DB 8,0E1h
DB XXXXXXXX

ch198 label byte
DB 8,0E1h
DB XXXXXXXX

ch199 label byte
DB 8,0E1h
DB XXXXXXXX

ch200 label byte
DB 8,0E1h
DB XXXXXXXX

ch201 label byte
DB 8,0E1h
DB XXXXXXXX

ch202 label byte
DB 8,0E1h
DB XXXXXXXX

ch203 label byte
DB 8,0E1h
DB XXXXXXXX

ch204 label byte
DB 8,0E1h
DB XXXXXXXX

ch205 label byte
DB 8,0E1h
DB XXXXXXXX

ch206 label byte
DB 8,0E1h
DB XXXXXXXX

ch207 label byte
DB 8,0E1h
DB XXXXXXXX

ch208 label byte
DB 8,0E1h
DB XXXXXXXX

ch209 label byte
DB 8,0E1h
DB XXXXXXXX

ch210 label byte
DB 8,0E1h
DB XXXXXXXX

ch211 label byte
DB 8,0E1h
DB XXXXXXXX

ch212 label byte
DB 8,0E1h
DB XXXXXXXX

ch213 label byte
DB 8,0E1h
DB XXXXXXXX

ch214 label byte
DB 8,0E1h
DB XXXXXXXX

ch215 label byte
DB 8,0E1h
DB XXXXXXXX

ch216 label byte
DB 8,0E1h
DB XXXXXXXX

ch217 label byte
DB 8,0E1h
DB XXXXXXXX

ch218 label byte
DB 8,0E1h
DB XXXXXXXX

ch219 label byte
DB 8,0E1h
DB XXXXXXXX

ch220 label byte
DB 8,0E1h
DB XXXXXXXX

ch221 label byte
DB 8,0E1h
DB XXXXXXXX

ch222 label byte
DB 8,0E1h
DB XXXXXXXX

ch223 label byte
DB 8,0E1h
DB XXXXXXXX

ch224 label byte
DB 8,0E1h
DB XXXXXXXX

ch225 label byte
DB 8,021h
DB __XXXX__
DB _XX__XX_
DB _XX__XX_
DB _XX__XX_
DB _XX_XX__
DB _XX__XX_
DB _XX__XX_
DB _XX__XX_
DB _XX__XX_
DB _XX_XX__

ch226 label byte
DB 8,0E1h
DB XXXXXXXX

ch227 label byte
DB 7,021h
DB __XXXX__
DB _XXXXX__
DB _XXXXX__
DB _XXXXX__
DB _XXXXX__
DB __XXXX__
DB ____XX__
DB ____XX__
DB ____XX__
DB ____XX__

ch228 label byte
DB 8,0E1h
DB XXXXXXXX

ch229 label byte
DB 8,0E1h
DB XXXXXXXX

ch230 label byte
DB 8,041h
DB _XX__XX_
DB _XX__XX_
DB _XX__XX_
DB _XX__XX_
DB _XX__XX_
DB _XX__XX_
DB _XX__XX_
DB _XXXXXXX
DB _XX_____
DB _XX_____
DB _XX_____

ch231 label byte
DB 8,0E1h
DB XXXXXXXX

ch232 label byte
DB 8,0E1h
DB XXXXXXXX

ch233 label byte
DB 8,0E1h
DB XXXXXXXX

ch234 label byte
DB 8,0E1h
DB XXXXXXXX
```

```
ch235 label byte
DB 8,0E1h
DB XXXXXXXX

ch236 label byte
DB 8,0E1h
DB XXXXXXXX

ch237 label byte
DB 10,022h
DB ___XXXXX,X_______
DB __XX__XX,________
DB _XX___XX,X_______
DB _XX__XXX,X_______
DB _XX_XX_X,X_______
DB _XX_XX_X,X_______
DB _XXXX__X,X_______
DB _XXX___X,X_______
DB __XX__XX,________
DB _XXXXXX_,________

ch238 label byte
DB 8,0E1h
DB XXXXXXXX

ch239 label byte
DB 8,0E1h
DB XXXXXXXX

ch240 label byte
DB 8,0E1h
DB XXXXXXXX

ch241 label byte
DB 8,051h
DB ___XX___
DB ___XX___
DB _XXXXXX_
DB ___XX___
DB ___XX___
DB ________
DB _XXXXXX_

ch242 label byte
DB 8,0E1h
DB XXXXXXXX

ch243 label byte
DB 8,0E1h
DB XXXXXXXX

ch244 label byte
DB 8,0E1h
DB XXXXXXXX

ch245 label byte
DB 8,0E1h
DB XXXXXXXX

ch246 label byte
DB 8,0E1h
DB XXXXXXXX

ch247 label byte
DB 8,0E1h
DB XXXXXXXX

ch248 label byte
DB 5,021h
DB _XXX____
DB _X_X____
DB _X_X____
DB _XXX____

ch249 label byte
DB 4,061h
DB _XX_____
DB _XX_____

ch250 label byte
DB 4,061h
DB _XX_____
DB _XX_____

ch251 label byte
DB 8,0E1h
DB XXXXXXXX

ch252 label byte
DB 8,051h
DB _XXXXX__
DB _XX__XX_
DB _XX__XX_
DB _XX__XX_
DB _XX__XX_
DB _XX__XX_
DB _XX__XX_

ch253 label byte
DB 4,021h
DB _XX_____
DB X_XX____
DB __XX____
DB _XX_____
DB XXXX____

ch254 label byte
DB 8,0E1h
DB XXXXXXXX
ch255 label byte

DATASEG_END
end
Copr. 1995 Zenith Data Systems Corp.

.model small

include uibitequ.inc
include uiinclud.inc
DATASEG_BEGIN
extrn ControlDataStorageArea:byte


urfont1 label word
  public urfont1
  db 2
  db 10

  dw ch33,ch34,ch35,ch36,ch37,ch38,ch39
  dw
ch40,ch41,ch42,ch43,ch44,ch45,ch46,ch47,ch48,ch4
9
  dw
ch50,ch51,ch52,ch53,ch54,ch55,ch56,ch57,ch58,ch5
9
  dw
ch60,ch61,ch62,ch63,ch64,ch65,ch66,ch67,ch68,ch6
9
  dw
ch70,ch71,ch72,ch73,ch74,ch75,ch76,ch77,ch78,ch7
9
  dw
ch80,ch81,ch82,ch83,ch84,ch85,ch86,ch87,ch88,ch8
9
  dw
ch90,ch91,ch92,ch93,ch94,ch95,ch96,ch97,ch98,ch9
9
  dw
ch100,ch101,ch102,ch103,ch104,ch105,ch106,ch107
,ch108,ch109
  dw
ch110,ch111,ch112,ch113,ch114,ch115,ch116,ch117
,ch118,ch119
  dw
ch120,ch121,ch122,ch123,ch124,ch125,ch126,ch127
,ch128,ch129
  dw
ch130,ch131,ch132,ch133,ch134,ch135,ch136,ch137
,ch138,ch139
  dw
ch140,ch141,ch142,ch143,ch144,ch145,ch146,ch147
,ch148,ch149
  dw
ch150,ch151,ch152,ch153,ch154,ch155,ch156,ch157
,ch158,ch159
  dw
ch160,ch161,ch162,ch163,ch164,ch165,ch166,ch167
,ch168,ch169
  dw
ch170,ch171,ch172,ch173,ch174,ch175,ch176,ch177
,ch178,ch179
  dw
ch180,ch181,ch182,ch183,ch184,ch185,ch186,ch187
,ch188,ch189
  dw
ch190,ch191,ch192,ch193,ch194,ch195,ch196,ch197
,ch198,ch199
  dw
ch200,ch201,ch202,ch203,ch204,ch205,ch206,ch207
,ch208,ch209
  dw
ch210,ch211,ch212,ch213,ch214,ch215,ch216,ch217
,ch218,ch219
  dw
ch220,ch221,ch222,ch223,ch224,ch225,ch226,ch227
,ch228,ch229
  dw
ch230,ch231,ch232,ch233,ch234,ch235,ch236,ch237
,ch238,ch239
  dw
ch240,ch241,ch242,ch243,ch244,ch245,ch246,ch247
,ch248,ch249
  dw ch250,ch251,ch252,ch253,ch254,ch255


ch33 label byte
DB 3,011h
DB _X_____
DB _X_____
DB _X_____
DB _X_____
DB _X_____
DB _______
DB _X_____

ch34 label byte
DB 4,011h
DB _X_X___
DB _X_X___

ch35 label byte
DB 6,011h
DB __X_X__
DB __X_X__
DB _XXXXX_
DB __X_X__
DB _XXXXX_
DB __X_X__
DB __X_X__

ch36 label byte
DB 5,011h
DB ___X___
DB __XXX__
DB _X_____
DB __XX___
DB ____X__
DB _X__X__
DB __XX___
DB ___X___

ch37 label byte
DB 10,012h
DB __XX____X______
DB _X__X__X_______
DB _X__X_X________
DB __XX_X_X,X______
DB ____X_X__X_____
DB ___X__X__X_____
DB __X____X,X_____

ch38 label byte
DB 8,011h
DB __XX___
DB _X__X__
DB _X__X__
DB __XX__XX
DB _X__X_X_
DB _X___X__
DB __XXX_X_

ch39 label byte
DB 2,011h
DB _X_____
DB _X_____

ch40 label byte
DB 3,011h
DB __X____
DB _X_____
DB _X_____
DB _X_____
DB _X_____
DB _X_____
DB _X_____
DB __X____

ch41 label byte
DB 3,011h
DB _X_____
DB __X____
DB __X____
DB __X____
DB __X____
DB __X____
DB __X____
DB _X_____

ch42 label byte
DB 5,011h
DB _X__X__
DB __XX___
DB __XX___
DB _X__X__

ch43 label byte
DB 6,021h
DB ___X___
DB ___X___
DB _XXXXX__
DB ___X___
DB ___X___

ch44 label byte
DB 2,071h
DB _X_____
DB _X______

ch45 label byte
DB 3,041h
DB _XX_____

ch46 label byte
DB 2,071h
DB _X______

ch47 label byte
DB 3,011h
DB __X_____
DB __X_____
DB __X_____
DB __X_____
DB _X______
DB _X______
DB _X______

ch48 label byte
DB 5,011h
DB __XX____
DB _X__X___
DB _X__X___
DB _X__X___
DB _X__X___
DB _X__X___
DB __XX____

ch49 label byte
DB 5,011h
DB ___X____
DB __XX____
DB ___X____
DB ___X____
DB ___X____
DB ___X____
DB __XXX___

ch50 label byte
DB 5,011h
DB __XX____
DB _X__X___
DB ____X___
DB ___X____
DB __X_____
DB _X__X___
DB _XXXX___

ch51 label byte
DB 5,011h
DB __XX____
DB _X__X___
DB ____X___
DB ___X____
DB ____X___
DB _X__X___
DB __XX____

ch52 label byte
DB 5,011h
DB ____X___
DB ___XX___
DB __X_X___
DB _X__X___
DB _XXXX___
DB ____X___
DB ____X___

ch53 label byte
DB 5,011h
DB _XXXX___
DB _X______
DB _X______
DB __XX____
DB ____X___
DB _X__X___
DB __XX____

ch54 label byte
DB 5,011h
DB __XX____
DB _X______
DB _X______
DB _XXX____
DB _X__X___
DB _X__X___
DB __XX____

ch55 label byte
DB 5,011h
DB _XXXX___
DB _X__X___
DB ___X____
DB ___X____
DB __X_____
DB __X_____
DB __X_____
```

ch56 label byte
DB 5,011h
DB __XX____
DB _X__X___
DB _X__X___
DB __XX____
DB _X__X___
DB _X__X___
DB __XX____ ch57 label byte
DB 5,011h
DB __XX____
DB _X__X___
DB _X__X___
DB __XXX___
DB ____X___
DB ____X___
DB __XX____ ch58 label byte
DB 2,031h
DB _X______
DB ________
DB ________
DB ________
DB _X______ ch59 label byte
DB 2,031h
DB _X______
DB ________
DB ________
DB ________
DB _X______
DB _X______ ch60 label byte
DB 6,021h
DB _____X__
DB ___XX___
DB _XX_____
DB ___XX___
DB _____X__ ch61 label byte
DB 6,031h
DB _XXXX___
DB ________
DB _XXXX___ ch62 label byte
DB 6,021h
DB _X______
DB __XX____
DB ____XX__
DB __XX____
DB _X______ ch63 label byte
DB 5,011h
DB __XX____
DB _X__X___
DB ____X___
DB ___X____
DB __X_____
DB ________
DB __X_____ ch64 label byte
DB 9,012h
DB ___XXXX_,________
DB __X____X,________
DB _X__XXX_,X_______
DB _X_X__X_,X_______
DB _X_X__X_,X_______
DB _X__XX_X,________
DB __X_____,________
DB ___XXXX_,________ ch65 label byte
DB 8,011h
DB ____X___
DB ____X___
DB ___X_X__
DB ___X_X__
DB __XXXXX_
DB __X___X_
DB _XXX_XXX ch66 label byte
DB 7,011h
DB _XXXX___
DB __X__X__
DB __X__X__
DB __XXX___
DB __X__X__
DB __X__X__
DB _XXXX___ ch67 label byte
DB 7,011h
DB ___XXXX_
DB __X___X_
DB __X_____
DB __X_____
DB __X_____
DB __X___X_
DB ___XXX__ ch68 label byte
DB 8,011h
DB _XXXX___
DB __X__X__
DB __X___X_
DB __X___X_
DB __X___X_
DB __X__X__
DB _XXXX___ ch69 label byte
DB 7,011h
DB _XXXXX__
DB __X__X__
DB __X_____
DB __XXX___
DB __X_____
DB __X__X__
DB _XXXXX__ ch70 label byte
DB 6,011h
DB _XXXXX__
DB __X__X__
DB __X_____
DB __XXX___
DB __X_____
DB __X_____
DB _XXX____ ch71 label byte
DB 8,011h
DB ___XXXX_
DB __X___X_
DB __X_____
DB __X__XXX
DB __X___X_
DB __X___X_
DB ___XXX__ ch72 label byte
DB 8,011h
DB _XXX_XXX
DB __X___X_
DB __X___X_
DB __XXXXX_
DB __X___X_
DB __X___X_
DB _XXX_XXX ch73 label byte
DB 4,011h
DB _XXX____
DB __X_____
DB __X_____
DB __X_____
DB __X_____
DB __X_____
DB _XXX____ ch74 label byte
DB 5,011h
DB __XXX___
DB ___X____
DB ___X____
DB ___X____
DB ___X____
DB _X_X____
DB _XX_____ ch75 label byte
DB 8,011h
DB _XXX_XX_
DB __X__X__
DB __X_X___
DB __XXX___
DB __X__X__
DB __X___X_
DB _XXX__XX ch76 label byte
DB 6,011h
DB _XXX____
DB __X_____
DB __X_____
DB __X_____
DB __X_____
DB __X__X__
DB _XXXXX__ ch77 label byte
DB 10,012h
DB _XX_____,XX______
DB __XX___X,X_______
DB __XX___X,X_______
DB __X_X_X_,X_______
DB __X_X_X_,X_______
DB __X__X__,X_______
DB _XXX_X_X,XX______ ch78 label byte
DB 8,011h
DB _XX__XXX
DB __XX__X_
DB __XX__X_
DB __X_X_X_
DB __X__XX_
DB __X__XX_
DB _XXX__X_ ch79 label byte
DB 8,011h
DB ___XXX__
DB __X__X__
DB __X__X__
DB __X__X__
DB __X__X__
DB __X__X__
DB ___XXX__ ch80 label byte
DB 6,011h
DB _XXXX___
DB __X__X__
DB __X__X__
DB __XXX___
DB __X_____
DB __X_____
DB _XXX____ ch81 label byte
DB 8,011h
DB ___XXX__
DB __X__X__
DB __X__X__
DB __X__X__
DB __X__X__
DB __X__X__
DB ___XXX__
DB ____XXX_ ch82 label byte
DB 7,011h
DB _XXXX___
DB __X__X__
DB __X__X__
DB __XXX___
DB __X_X___
DB __X__X__
DB _XXX_XX_ ch83 label byte
DB 6,011h
DB __XXX___
DB _X__X___
DB _X______
DB __XXX___
DB _____X__
DB _X___X__
DB _XXXX___ ch84 label byte
DB 6,011h
DB _XXXXX__
DB _X_X_X__
DB ___X____
DB ___X____
DB ___X____
DB ___X____
DB __XXX___ ch85 label byte
DB 8,011h
DB _XXX_XXX
DB __X__X__
DB __X__X__
DB __X__X__
DB __X__X__
DB __X__X__
DB ___XXX__ ch86 label byte
DB 8,011h
DB _XXX_XXX
DB __X__X__
DB __X__X__
DB ___X_X__
DB ___X_X__
DB ____X___
DB ____X___ ch87 label byte
DB 10,012h
DB _XXX___X,XX______
DB __X__X__,X_______
DB __X__X__,X_______
DB __X_X_X_,X_______
DB __X_X_X_,X_______
DB ___X___X,________
DB ___X___X,________ ch88 label byte
DB 8,011h
DB _XX___XX
DB __X___X_
DB ___X_X__
DB ____X___
DB ___X_X__
DB __X___X_
DB _XX___XX ch89 label byte
DB 8,011h
DB _XXX_XXX
DB __X___X_
DB ___X_X__
DB ___X_X__
DB ____X___
DB ____X___
DB ___XXX__ ch90 label byte
DB 6,011h
DB _XXXXX__
DB _X___X__
DB ____X___
DB ___X____
DB __X_____
DB _X___X__
DB _XXXXX__ ch91 label byte
DB 3,011h
DB _XX_____
DB _X______
DB _X______
DB _X______
DB _X______
DB _X______
DB _X______
DB _XX_____ ch92 label byte
DB 3,011h
DB _X______
DB _X______
DB _X______
DB _X______
DB __X_____
DB __X_____
DB __X_____ ch93 label byte
DB 3,011h
DB _XX_____
DB __X_____
DB __X_____
DB __X_____
DB __X_____
DB __X_____
DB __X_____
DB _XX_____ ch94 label byte
DB 5,001h
DB __XX____
DB _X__X___ ch95 label byte
DB 5,081h
DB XXXXX___ ch96 label byte
DB 3,001h
DB _X______
DB __X_____ ch97 label byte
DB 5,031h
DB __XX____
DB ____X___
DB __XXX___
DB _X__X___
DB __XXX___ ch98 label byte
DB 5,011h
DB XX______

```
DB _X______
DB _XXX____
DB _X__X___
DB _X__X___
DB _X__X___
DB __XX____

ch99 label byte
DB 5,031h
DB __XX____
DB _X__X___
DB _X______
DB _X__X___
DB __XX____

ch100 label byte
DB 5,011h
DB ___XX___
DB ____X___
DB __XXX___
DB _X__X___
DB _X__X___
DB _X__X___
DB __XXX___

ch101 label byte
DB 5,031h
DB __XX____
DB _X__X___
DB _XXXX___
DB _X______
DB __XX____

ch102 label byte
DB 3,011h
DB __X_____
DB _X______
DB XXX_____
DB _X______
DB _X______
DB _X______
DB _XX_____

ch103 label byte
DB 5,031h
DB __XXX___
DB _X__X___
DB _X__X___
DB __XXX___
DB ____X___
DB __XX____

ch104 label byte
DB 5,011h
DB XX______
DB _X______
DB _XXX____
DB _X__X___
DB _X__X___
DB _X__X___
DB _X__X___

ch105 label byte
DB 2,011h
DB _X______
DB ________
DB XX______
DB _X______
DB _X______
DB _X______
DB _X______

ch106 label byte
DB 2,011h
DB _X______
DB ________
DB XX______
DB _X______
DB _X______
DB _X______
DB _X______
DB _X______

ch107 label byte
DB 5,011h
DB XX______
DB _X______
DB _X__X___
DB _X_X____
DB _XXX____
DB _X__X___
DB _X__X___

ch108 label byte
DB 2,011h
DB XX______
DB _X______
DB _X______
DB _X______
DB _X______
DB _X______
DB _X______

ch109 label byte
DB 8,031h
DB X_XX_XX_
DB _X__X__X
DB _X__X__X
DB _X__X__X
DB _X__X__X

ch110 label byte
DB 5,031h
DB X_XX____
DB _X__X___
DB _X__X___
DB _X__X___
DB _X__X___

ch111 label byte
DB 5,031h
DB __XX____
DB _X__X___
DB _X__X___
DB _X__X___
DB __XX____

ch112 label byte
DB 5,031h
DB X_XX____
DB _X__X___
DB _X__X___
DB _XXX____
DB _X______
DB _XX_____

ch113 label byte
DB 5,031h
DB __XX____
DB _X__X___
DB _X__X___
DB __XXX___
DB ____X___
DB ___XX___

ch114 label byte
DB 4,031h
DB X_XX____
DB _X_X____
DB _X______
DB _X______
DB _XX_____

ch115 label byte
DB 4,031h
DB __XX____
DB _X______
DB _XXX____
DB ___X____
DB _XX_____

ch116 label byte
DB 3,021h
DB _X______
DB XXX_____
DB _X______
DB _X______
DB _X______
DB __X_____

ch117 label byte
DB 5,031h
DB XX_XX___
DB _X__X___
DB _X__X___
DB _X__X___
DB __XXX___

ch118 label byte
DB 5,031h
DB X___X___
DB _X_X____
DB _X_X____
DB __X_____
DB __X_____

ch119 label byte
DB 8,031h
DB _XX_X_XX
DB _X__X__X
DB _X_X_X_X
DB __X___X_
DB __X___X_

ch120 label byte
DB 5,031h
DB XX_XX___
DB _X_X____
DB __X_____
DB _X_X____
DB XX_XX___

ch121 label byte
DB 5,031h
DB _X__X___
DB _X__X___
DB _X__X___
DB __XX____
DB __X_____
DB _X______

ch122 label byte
DB 5,031h
DB _XXXX___
DB ___X____
DB __X_____
DB _X__X___
DB _XXXX___

ch123 label byte
DB 4,011h
DB ___X____
DB __X_____
DB __X_____
DB _XX_____
DB __X_____
DB __X_____
DB ___X____

ch124 label byte
DB 2,011h
DB _X______
DB _X______
DB _X______
DB _X______
DB _X______
DB _X______
DB _X______

ch125 label byte
DB 4,011h
DB _X______
DB __X_____
DB __X_____
DB __XX____
DB __X_____
DB __X_____
DB _X______

ch126 label byte
DB 6,011h
DB __XX_X__
DB _X_XX___

ch127 label byte
DB 4,011h
DB _XX_____
DB _XX_____
DB _XX_____
DB _XX_____
DB _XX_____
DB _XX_____
DB _XX_____

ch128 label byte
DB 7,011h
DB ___XXXX_
DB __X___X_
DB __X_____
DB __X_____
DB __X_____
DB __X___X_
DB ___XXX__
DB ____X___

ch129 label byte
DB 5,011h
DB _X__X___
DB ________
DB XX_XX___
DB _X__X___
DB _X__X___
DB _X__X___
DB __XXX___

ch130 label byte
DB 5,001h
DB ___X____
DB __X_____
DB ________
DB __XX____
DB _X__X___
DB _XXXX___
DB _X______
DB __XX____

ch131 label byte
DB 5,001h
DB ___X____
DB __X_X___
DB ________
DB __XX____
DB ____X___
DB __XXX___
DB _X__X___
DB __XXX___

ch132 label byte
DB 5,011h
DB __X_X___
DB ________
DB __XX____
DB ____X___
DB __XXX___
DB _X__X___
DB __XXX___

ch133 label byte
DB 5,001h
DB __X_____
DB ___X____
DB ________
DB __XX____
DB ____X___
DB __XXX___
DB _X__X___
DB __XXX___

ch134 label byte
DB 5,001h
DB __X_X___
DB ___X____
DB ________
DB __XX____
DB ____X___
DB __XXX___
DB _X__X___
DB __XXX___

ch135 label byte
DB 5,031h
DB __XX____
DB _X__X___
DB _X______
DB _X__X___
DB __XX____
DB ___X____

ch136 label byte
DB 5,001h
DB __XX____
DB _X__X___
DB ________
DB __XX____
DB _X__X___
DB _XXXX___
DB _X______
DB __XX____

ch137 label byte
DB 5,011h
DB _X_X____
DB ________
DB __XX____
DB _X__X___
DB _XXXX___
DB _X______
DB __XX____

ch138 label byte
DB 5,001h
DB __X_____
DB ___X____
DB ________
DB __XX____
DB _X__X___
DB _XXXX___
DB _X______
DB __XX____

ch139 label byte
DB 2,011h
DB XX______
DB ________
DB XX______
DB _X______
DB _X______
DB _X______
DB _X______

ch140 label byte
DB 2,011h
DB XX______
DB ________
DB XX______
DB _X______
```

DB _X_____
DB _X_____
DB _X_____ ch141 label byte
DB 2,001h
DB X______
DB _X_____
DB _______
DB XX_____
DB _X_____
DB _X_____
DB _X_____
DB _X_____ ch142 label byte
DB 8,011h
DB ____X__
DB ____X__
DB ___X_X__
DB ___X_X__
DB __XXXXX_
DB __X___X_
DB _XXX_XXX ch143 label byte
DB 8,001h
DB ___X_X__
DB ____X__
DB ____X__
DB ___X_X__
DB ___X_X__
DB __XXXXX_
DB __X___X_
DB _XXX_XXX ch144 label byte
DB 7,001h
DB ___X____
DB _XXXXX__
DB __X__X__
DB __X_____
DB __XXX___
DB __X_____
DB __X__X__
DB _XXXXX__ ch145 label byte
DB 8,031h
DB __XX_XX_
DB ____X__X
DB __XXXXXX
DB _X__X___
DB __XX_XX_ ch146 label byte
DB 9,012h
DB ___XXXXX,X_______
DB ____XX__,X_______
DB ___X_X__,_______
DB ___X_XXX,_______
DB __XXXX__,_______
DB __X__X__,X_______
DB _XX_XXXX,X_______ ch147 label byte
DB 5,001h
DB __XX____
DB _X__X___
DB _______
DB __XX____
DB _X__X___
DB _X__X___
DB _X__X___
DB __XX____ ch148 label byte
DB 5,011h
DB _X__X___
DB _______
DB __XX____
DB _X__X___
DB _X__X___
DB _X__X___
DB __XX____ ch149 label byte
DB 5,001h
DB __X_____
DB ___X____
DB _______
DB __XX____
DB _X__X___
DB _X__X___
DB _X__X___
DB __XX____ ch150 label byte
DB 5,001h

DB __X_____
DB _X_X____
DB _______
DB XX_XX___
DB _X__X___
DB _X__X___
DB _X__X___
DB __XXX___ ch151 label byte
DB 5,001h
DB _X______
DB __X_____
DB _______
DB XX_XX___
DB _X__X___
DB _X__X___
DB _X__X___
DB __XXX___ ch152 label byte
DB 5,011h
DB _X__X___
DB _______
DB _X__X___
DB _X__X___
DB _X__X___
DB __XX____
DB __X_____
DB _X______ ch153 label byte
DB 8,011h
DB ___XXX__
DB __X___X_
DB __X___X_
DB __X___X_
DB __X___X_
DB __X___X_
DB ___XXX__ ch154 label byte
DB 8,011h
DB _XXX_XXX
DB __X___X_
DB __X___X_
DB __X___X_
DB __X___X_
DB __X___X_
DB ___XXX__ ch155 label byte
DB 5,021h
DB ___X____
DB __XX____
DB _X__X___
DB _X______
DB _X__X___
DB __XX____
DB __X_____ ch156 label byte
DB 5,011h
DB __X_____
DB _X_X____
DB _X______
DB _XXX____
DB __X_____
DB __X_____
DB _XXXX___ ch157 label byte
DB 5,011h
DB XX_XX___
DB X___X___
DB XXXXX___
DB _X_X____
DB _XXXX___
DB __X_____
DB _XXX____ ch158 label byte
DB 5,031h
DB X_XX____
DB _X__X___
DB _X__X___
DB _XXX____
DB _X______
DB _XX_____ ch159 label byte
DB 3,011h
DB __X_____
DB _X______
DB XXX_____
DB _X______
DB _X______
DB _X______
DB _XX_____ ch160 label byte
DB 5,001h
DB __X___
DB _X____
DB ______
DB _XX___
DB ___X__
DB __XXX__
DB _X__X__
DB __XXX__ ch161 label byte
DB 2,001h
DB _X_____
DB X______
DB ______
DB XX_____
DB _X_____
DB _X_____
DB _X_____
DB _X_____ ch162 label byte
DB 5,001h
DB __X___
DB _X____
DB ______
DB _XX___
DB _X__X__
DB _X__X__
DB _X__X__
DB _XX___ ch163 label byte
DB 5,001h
DB __X___
DB _X____
DB ______
DB XX_XX__
DB _X__X__
DB _X__X__
DB _X__X__
DB __XXX__ ch164 label byte
DB 5,001h
DB __X_X__
DB _X_X___
DB ______
DB X_XX___
DB _X__X__
DB _X__X__
DB _X__X__
DB _X__X__ ch165 label byte
DB 8,001h
DB __X_XX__
DB _XX__XXX
DB _XX__X_
DB __XX__X_
DB __X_X_X_
DB __X__XX_
DB __X__XX_
DB _XXX__X_ ch166 label byte
DB 3,011h
DB _X_____
DB __X____
DB _XX____
DB _XX____
DB ______
DB _XX____ ch167 label byte
DB 3,011h
DB _XX____
DB _XX____
DB _XX____
DB _XX____
DB ______
DB _XX____ ch168 label byte
DB 5,021h
DB ___X___
DB ______
DB ___X___
DB __X____
DB _X_____
DB _X__X__
DB __XX___ ch169 label byte
DB 5,081h
DB XXXXX___ ch170 label byte
DB 6,041h
DB _XXXXX__
DB _____X__ ch171 label byte
DB 8,011h
DB __X____X
DB _XX___X_
DB __X__X__
DB _XXXXXX_
DB ___X___X
DB __X___X_
DB _X___XXX ch172 label byte
DB 8,011h
DB __X____X
DB _XX___X_
DB __X__X__
DB _XXXX__X
DB ___X_X_X
DB __X__XXX
DB _X_____X ch173 label byte
DB 3,021h
DB _X______
DB ________
DB _X______
DB _X______
DB _X______
DB _X______
DB _X______ ch174 label byte
DB 5,051h
DB __X_X___
DB _X_X____
DB __X_X___ ch175 label byte
DB 5,051h
DB _X_X____
DB __X_X___
DB _X_X____ ch176 label byte
DB 5,081h
DB XXXXX___ ch177 label byte
DB 5,081h
DB XXXXX___ ch178 label byte
DB 5,081h
DB XXXXX___ ch179 label byte
DB 2,011h
DB _X______
DB _X______
DB _X______
DB ________
DB _X______
DB _X______
DB _X______ ch180 label byte
DB 5,081h
DB XXXXX___ ch181 label byte
DB 5,081h
DB XXXXX___ ch182 label byte
DB 5,081h
DB XXXXX___ ch183 label byte
DB 5,081h
DB XXXXX___ ch184 label byte
DB 5,081h
DB XXXXX___ ch185 label byte
DB 5,081h
DB XXXXX___ ch186 label byte
DB 5,081h
DB XXXXX___ ch187 label byte
DB 5,081h
DB XXXXX___

```
ch188 label byte
DB 5,081h
DB XXXXX___

ch189 label byte
DB 5,081h
DB XXXXX___

ch190 label byte
DB 5,081h
DB XXXXX___

ch191 label byte
DB 5,081h
DB XXXXX___

ch192 label byte
DB 5,081h
DB XXXXX___

ch193 label byte
DB 5,081h
DB XXXXX___

ch194 label byte
DB 5,081h
DB XXXXX___

ch195 label byte
DB 5,081h
DB XXXXX___

ch196 label byte
DB 5,081h
DB XXXXX___

ch197 label byte
DB 5,081h
DB XXXXX___

ch198 label byte
DB 5,081h
DB XXXXX___

ch199 label byte
DB 5,081h
DB XXXXX___

ch200 label byte
DB 5,081h
DB XXXXX___

ch201 label byte
DB 5,081h
DB XXXXX___

ch202 label byte
DB 5,081h
DB XXXXX___

ch203 label byte
DB 5,081h
DB XXXXX___

ch204 label byte
DB 5,081h
DB XXXXX___

ch205 label byte
DB 5,081h
DB XXXXX___

ch206 label byte
DB 5,081h
DB XXXXX___

ch207 label byte
DB 5,081h
DB XXXXX___

ch208 label byte
DB 5,081h
DB XXXXX___

ch209 label byte
DB 5,081h
DB XXXXX___

ch210 label byte
DB 5,081h
DB XXXXX___

ch211 label byte
DB 5,081h
DB XXXXX___

ch212 label byte
DB 5,081h
DB XXXXX___

ch213 label byte
DB 5,081h
DB XXXXX___

ch214 label byte
DB 5,081h
DB XXXXX___

ch215 label byte
DB 5,081h
DB XXXXX___

ch216 label byte
DB 5,081h
DB XXXXX___

ch217 label byte
DB 5,081h
DB XXXXX___

ch218 label byte
DB 5,081h
DB XXXXX___

ch219 label byte
DB 5,081h
DB XXXXX___

ch220 label byte
DB 5,081h
DB XXXXX___

ch221 label byte
DB 5,081h
DB XXXXX___

ch222 label byte
DB 5,081h
DB XXXXX___

ch223 label byte
DB 5,081h
DB XXXXX___

ch224 label byte
DB 5,081h
DB XXXXX___

ch225 label byte
DB 5,011h
DB __XX____
DB _X__X___
DB _X__X___
DB _X_X____
DB _X__X___
DB _X__X___
DB _X_X____

ch226 label byte
DB 5,081h
DB XXXXX___

ch227 label byte
DB 6,011h
DB __XXX___
DB _XXX____
DB _XXX____
DB __XX____
DB ___X____
DB ___X____
DB ___X____

ch228 label byte
DB 5,081h
DB XXXXX___

ch229 label byte
DB 5,081h
DB XXXXX___

ch230 label byte
DB 6,041h
DB _X__X___
DB _X__X___
DB _X__X___
DB _XXX_X__
DB _X______

ch231 label byte
DB 5,081h
DB XXXXX___

ch232 label byte
DB 5,081h
DB XXXXX___

ch233 label byte
DB 5,081h
DB XXXXX___

ch234 label byte
DB 5,081h
DB XXXXX___

ch235 label byte
DB 5,081h
DB XXXXX___

ch236 label byte
DB 5,081h
DB XXXXX___

ch237 label byte
DB 6,011h
DB ___XXXX_
DB __X__XX_
DB __X__XX_
DB __X_X_X_
DB __XX__X_
DB __XX__X_
DB __XXXX__

ch238 label byte
DB 5,081h
DB XXXXX___

ch239 label byte
DB 5,081h
DB XXXXX___

ch240 label byte
DB 5,081h
DB XXXXX___

ch241 label byte
DB 6,011h
DB ___X____
DB ___X____
DB _XXXXX__
DB ___X____
DB ___X____
DB ________
DB _XXXXX__

ch242 label byte
DB 5,081h
DB XXXXX___

ch243 label byte
DB 5,081h
DB XXXXX___

ch244 label byte
DB 5,081h
DB XXXXX___

ch245 label byte
DB 5,081h
DB XXXXX___

ch246 label byte
DB 5,081h
DB XXXXX___

ch247 label byte
DB 5,081h
DB XXXXX___

ch248 label byte
DB 3,011h
DB _X______
DB X_X_____
DB _X______

ch249 label byte
DB 2,041h
DB _X______

ch250 label byte
DB 2,041h
DB _X______

ch251 label byte
DB 5,081h
DB XXXXX___

ch252 label byte
DB 5,031h
DB X_XX____
DB _X__X___
DB _X__X___
DB _X__X___
DB _X__X___

ch253 label byte
DB 3,011h
DB XX______
DB __X_____
DB _X______
DB XXX_____

ch254 label byte
DB 5,081h
DB XXXXX___
ch255 label byte

DATASEG_END
end
Copr. 1995 Zenith Data Systems Corp.

.model small

include uibitequ.inc
include uiinclud.inc

DATASEG_BEGIN
extrn ControlDataStorageArea:byte

uifont2 label word
 public uifont2
 db 6
 db 20

 dw ch33,ch34,ch35,ch36,ch37,ch38,ch39
 dw
ch40,ch41,ch42,ch43,ch44,ch45,ch46,ch47,ch48,ch4
9
 dw
ch50,ch51,ch52,ch53,ch54,ch55,ch56,ch57,ch58,ch5
9
 dw
ch60,ch61,ch62,ch63,ch64,ch65,ch66,ch67,ch68,ch6
9
 dw
ch70,ch71,ch72,ch73,ch74,ch75,ch76,ch77,ch78,ch7
9
 dw
ch80,ch81,ch82,ch83,ch84,ch85,ch86,ch87,ch88,ch8
9
 dw
ch90,ch91,ch92,ch93,ch94,ch95,ch96,ch97,ch98,ch9
9
 dw
ch100,ch101,ch102,ch103,ch104,ch105,ch106,ch107
,ch108,ch109
 dw
ch110,ch111,ch112,ch113,ch114,ch115,ch116,ch117
,ch118,ch119
 dw
ch120,ch121,ch122,ch123,ch124,ch125,ch126,ch127
,ch128,ch129
 dw
ch130,ch131,ch132,ch133,ch134,ch135,ch136,ch137
,ch138,ch139
 dw
ch140,ch141,ch142,ch143,ch144,ch145,ch146,ch147
,ch148,ch149
 dw
ch150,ch151,ch152,ch153,ch154,ch155,ch156,ch157
,ch158,ch159
 dw
ch160,ch161,ch162,ch163,ch164,ch165,ch166,ch167
,ch168,ch169
 dw
ch170,ch171,ch172,ch173,ch174,ch175,ch176,ch177
,ch178,ch179
 dw
ch180,ch181,ch182,ch183,ch184,ch185,ch186,ch187
,ch188,ch189
 dw
ch190,ch191,ch192,ch193,ch194,ch195,ch196,ch197
,ch198,ch199
 dw
ch200,ch201,ch202,ch203,ch204,ch205,ch206,ch207
,ch208,ch209
 dw
ch210,ch211,ch212,ch213,ch214,ch215,ch216,ch217
,ch218,ch219
 dw
ch220,ch221,ch222,ch223,ch224,ch225,ch226,ch227
,ch228,ch229
 dw
ch230,ch231,ch232,ch233,ch234,ch235,ch236,ch237
,ch238,ch239
 dw
ch240,ch241,ch242,ch243,ch244,ch245,ch246,ch247
,ch248,ch249
 dw ch250,ch251,ch252,ch253,ch254,ch255

ch33 label byte
DB 7,021h
DB ___X____
DB __XXX___
DB __XXX___
DB __XXX___
DB __XXX___
DB __XXX___
DB ___X____
```

DB ___X____
DB ___X____
DB ___X____
DB ________
DB __XXX___
DB __XXX___ ch34 label byte
DB 10,021h
DB __XX__XX
DB __XX__XX
DB __XX__XX
DB __XX__XX ch35 label byte
DB 12,022h
DB ______X_,__X_____
DB ______X_,__X_____
DB _____XX_,_XX_____
DB _____X__,_X______
DB __XXXXXX,XXXX____
DB ____X___,X_______
DB ___XX__X,X_______
DB ___X___X,________
DB XXXXXXXX,XX______
DB __X___X_,________
DB _XX__XX_,________
DB _X___X__,________
DB _X___X__,________ ch36 label byte
DB 12,012h
DB _____X__,________
DB _____X__,________
DB ____XXXX,________
DB __XX_X__,XX______
DB _XX__X__,_X______
DB _XX__X__,________
DB _XXX_X__,________
DB __XXXXXX,________
DB ____XXXX,XX______
DB _____X__,XXX_____
DB _____X__,_XX_____
DB _X___X__,_XX_____
DB _XX__X__,XX______
DB ___XXXXX,________
DB _____X__,________
DB _____X__,________ ch37 label byte
DB 20,023h
DB ____XXXX,______XX,________
DB __XXX__X,XXXXXXXX,________
DB _XX______,X____XX_,________
DB _XX____X,X___XX__,________
DB XX______X,___XX___,________
DB XX____XX,__XX___X,XXX_____
DB XXX__XX_,_XX__XXX,__XX____
DB _XXXX___,XX__XX__,___X____
DB _______X,X___XX__,__XX____
DB ______XX,__XX___,__X______
DB _____XX_,___XX___,_XX_____
DB ____XX__,___XXX__,XX______
DB ___XX___,____XXXX,________ ch38 label byte
DB 19,023h
DB ________X,XXXX____,________
DB ______XX,___XX___,________
DB _____XX_,___XX___,________
DB _____XXX,__XX_I___,________
DB ______XX,_XX______,________
DB ______XX,X___XXXX,XX______
DB ____XX_X,XX____XX,________
DB __XXX___,XX____X_,________
DB __XX____,XXX__XX_,________
DB _XX_____,XXX_X__,________
DB _XXX____,__XXX___,________
DB __XXX___,__XXXX__,XX______
DB ___XXXXX,XXX_XXXX,________ ch39 label byte
DB 6,021h
DB __XX____
DB __XX____
DB __XX____
DB __XX____ ch40 label byte
DB 8,021h
DB _____XX_
DB ____XX__
DB ___XX___
DB __XX____
DB __XX____
DB _XXX____
DB _XX_____
DB _XX_____
DB _XX_____

DB _XX_____
DB _XXX____
DB __XX____
DB __XX____
DB ___XX___
DB ____XX__
DB _____XX_ ch41 label byte
DB 8,021h
DB _XX_____
DB __XX____
DB ___XX___
DB ____XX__
DB ____XX__
DB ____XXX_
DB _____XX_
DB _____XX_
DB _____XX_
DB _____XX_
DB ____XXX_
DB ____XX__
DB ____XX__
DB ___XX___
DB __XX____
DB _XX_____ ch42 label byte
DB 12,012h
DB _____XX_,________
DB __X__XX_,_X______
DB __XX_XX_,XX______
DB ____XXXX,________
DB ____XXXX,________
DB __XX_XX_,XX______
DB __X__XX_,_X______
DB _____XX_,________ ch43 label byte
DB 14,042h
DB ______XX,________
DB ______XX,________
DB ______XX,________
DB ______XX,________
DB _XXXXXXX,XXXXX___
DB ______XX,________
DB ______XX,________
DB ______XX,________
DB ______XX,________ ch44 label byte
DB 6,0D1h
DB _XXX____
DB _XXX____
DB ___X____
DB __X_____
DB _X______ ch45 label byte
DB 7,091h
DB _XXXXXX_ ch46 label byte
DB 6,0D1h
DB _XXX____
DB _XXX____ ch47 label byte
DB 7,031h
DB _____XX_
DB _____XX_
DB ____XX__
DB ____XX__
DB ___XX___
DB ___XX___
DB __XX____
DB __XX____
DB _XX_____
DB _XX_____
DB XX______
DB XX______ ch48 label byte
DB 12,022h
DB ____XXXX,________
DB __XX____,XX______
DB __XX____,XX______
DB _XX_____,_XX_____
DB _XX_____,_XX_____
DB _XX_____,_XX_____
DB _XX_____,_XX_____
DB _XX_____,_XX_____
DB _XX_____,_XX_____
DB _XX_____,_XX_____
DB __XX____,XX______
DB __XX____,XX______
DB ___XXXX,________ ch49 label byte
DB 12,022h
DB _____X_,________
DB ___XXX_,________
DB __XX_XX_,________
DB _____XX_,________
DB _____XX_,________
DB _____XX_,________
DB _____XX_,________
DB _____XX_,________
DB _____XX_,________
DB _____XX_,________
DB _____XX_,________
DB _____XX_,________
DB __XXXXXX,XX______ ch50 label byte
DB 12,022h
DB __XXXXX,________
DB _X____X,X_______
DB _X______,XX______
DB ________,XX______
DB ________,XX______
DB ________,XX______
DB ______X,X_______
DB _____XX,________
DB _____XX_,________
DB ___X___,________
DB __X____,________
DB _X_____,___X____
DB _XXXXXXX,XX______ ch51 label byte
DB 12,022h
DB __XXXXX,________
DB __XX__X,X_______
DB _XX_____,XX______
DB ________,XX______
DB ______X,X_______
DB _____XX,________
DB ___XXXX,X_______
DB ________,XX______
DB ________,_XX_____
DB ________,XX______
DB ________,_XX_____
DB _XXX____,XX______
DB __XXXXXX,X_______ ch52 label byte
DB 12,022h
DB ________,XX______
DB ______X,XX______
DB _____X_,XX______
DB ____X__,XX______
DB ___X___,XX______
DB __X____,XX______
DB _X_____,XX______
DB _X______,XX______
DB _XXXXXXX,XXXX____
DB ________,XX______
DB ________,XX______
DB ________,XX______
DB ________,XX______ ch53 label byte
DB 12,022h
DB ____XXX,XXX_____
DB ___XX__,________
DB __XX___,________
DB _XX____,________
DB _XXXXXX,________
DB _____XXXX,X_______
DB ______X,XX______
DB ________,XXX_____
DB ________,_XX_____
DB ________,_XX_____
DB ________,XX______
DB _XXX__X,X_______
DB __XXXXX,________ ch54 label byte
DB 12,022h
DB _____XX,X_______
DB ___XX__,________
DB __XX___,________
DB _XX____,________
DB __XX_XXX,X_______
DB _XXXX___,XX______
DB _XX_____,_XX_____
DB _XX_____,_XX_____
DB _XX_____,_XX_____
DB _XX_____,_XX_____
DB _XX_____,_XX_____
DB __XX____,XX______
DB ___XXXXX,X_______ ch55 label byte
DB 12,022h
DB __XXXXXX,XXX_____
DB _X______,XX______
DB _X______,XX______
DB _______,XX______
DB _______X,X_______
DB _______X,X_______
DB ______XX,________
DB ______XX,________
DB _____XX_,________
DB _____XX_,________
DB ____XX__,________
DB ____XX__,________
DB ____XX__,________ ch56 label byte
DB 12,022h
DB ____XXXX,X_______
DB ___XX___,XX______
DB __XX____,_XX_____
DB __XX____,_XX_____
DB __XXX___,_XX_____
DB ___XXX_X,X_______
DB ____XXXX,________
DB __XX__XX,XX______
DB _XX______,XXX_____
DB _XX_____,_XX_____
DB _XX_____,_XX_____
DB __XX____,XX______
DB ___XXXXX,X_______ ch57 label byte
DB 12,022h
DB ___XXXXX,X_______
DB __XX____,XX______
DB _XX_____,_XX_____
DB _XX_____,_XX_____
DB _XX_____,_XX_____
DB _XX_____,_XX_____
DB _XX_____,_XX_____
DB __XX___X,XXX_____
DB ___XXXX_,XX______
DB ________,XX______
DB _______X,X_______
DB ______XX,________
DB ___XXX__,________ ch58 label byte
DB 7,061h
DB __XXX___
DB __XXX___
DB ________
DB ________
DB ________
DB ________
DB ________
DB __XXX___
DB __XXX___ ch59 label byte
DB 7,061h
DB __XXX___
DB __XXX___
DB ________
DB ________
DB ________
DB ________
DB ________
DB __XXX___
DB __XXX___
DB ____X___
DB ___X____
DB __X_____ ch60 label byte
DB 14,052h
DB ________,__XXX___
DB ________,XXX_____
DB _____XXX,X_______
DB ___XXX__,________
DB _XXX____,________
DB ___XXX__,________
DB _____XXX,X_______
DB ________,XXX_____
DB ________,__XXX___ ch61 label byte
DB 14,062h
DB _XXXXXXX,XXXXX___
DB ________,________
DB ________,________
DB ________,________
DB _XXXXXXX,XXXXX___ ch62 label byte
DB 14,052h
DB _XXX____,________
DB ___XXX__,________
DB _____XXX,X_______
DB ________,XXX_____
DB ________,__XXX___
DB ________,XXX_____

```
DB _____XXX,X_______
DB ___XXX__,________
DB _XXX____,________

ch63 label byte
DB 11,022h
DB ___XXXXX,________
DB __X____X,X_______
DB _XX_____,XX______
DB _XX_____,XX______
DB ________,XX______
DB _______X,X_______
DB ______XX,________
DB ______X_,________
DB _____X__,________
DB _____X__,________
DB ________,________
DB ____XXX_,________
DB ____XXX_,________

ch64 label byte
DB 23,023h
DB ________,XXXXXXXX,X_______
DB ______XX,X_______,XXX_____
DB ___XXX__,________,__XX____
DB ___XX___,________,___XX___
DB __XX____,__XXXX_X,X___X___
DB __XX____,XXX___XX,X___XX__
DB _XX____X,X_____XX,____XX__
DB _XX____X,X_____XX,____XX__
DB _XX___XX,_____XX_,____X___
DB _XX___XX,_____XX_,___XX___
DB _XX___XX,X___XXX_,__XX____
DB __XX___X,XXXX__XX,XX______
DB __XX____,________,________
DB ___XXX__,________,__XX____
DB _____XXX,_______X,XXX_____
DB _______X,XXXXXXXX,________

ch65 label byte
DB 17,023h
DB ________,X_______,________
DB _______X,XX______,________
DB ______XX,XXX_____,________
DB ______X_,_XX_____,________
DB _____XX_,_XXX____,________
DB _____X__,__XX____,________
DB ____XX__,__XXX___,________
DB ____X___,___XX___,________
DB ___XXXXX,XXXXXX__,________
DB ___X____,____XX__,________
DB __XX____,____XXX_,________
DB __X_____,_____XX_,________
DB XXXXX___,___XXXXX,X_______

ch66 label byte
DB 16,022h
DB _XXXXXXX,XXX_____
DB ___XX___,___XX___
DB ___XX___,____XX__
DB ___XX___,____XX__
DB ___XX___,____XX__
DB ___XX___,___XX___
DB ___XXXXX,XXXX____
DB ___XX___,___XXX__
DB ___XX___,_____XX_
DB ___XX___,_____XX_
DB ___XX___,_____XX_
DB ___XX___,___XXX__
DB _XXXXXXX,XXXX____

ch67 label byte
DB 16,022h
DB _____XXX,XXXX__X_
DB ___XXX__,___XXXX_
DB __XX____,_____XX_
DB __XX____,______X_
DB _XXX____,________
DB _XX_____,________
DB _XX_____,________
DB _XX_____,________
DB _XXX____,________
DB __XX____,________
DB __XX____,______X_
DB ___XXX__,____XX__
DB _____XXX,XXXX____

ch68 label byte
DB 17,022h
DB _XXXXXXX,XXXX____
DB ___XX___,___XXX__
DB ___XX___,_____XX_
DB ___XX___,_____XX_
DB ___XX___,_____XXX
DB ___XX___,______XX
DB ___XX___,______XX
DB ___XX___,______XX
DB ___XX___,_____XXX
DB ___XX___,_____XX_
DB ___XX___,_____XX_
DB ___XX___,___XXX__
DB _XXXXXXX,XXXX____

ch69 label byte
DB 15,022h
DB _XXXXXXX,XXXXXX__
DB ___XX___,____XX__
DB ___XX___,_____X__
DB ___XX___,________
DB ___XX___,___X____
DB ___XX___,__X_____
DB ___XXXXX,XXXX____
DB ___XX___,__X_____
DB ___XX___,__X_____
DB ___XX___,________
DB ___XX___,_____X__
DB ___XX___,____XX__
DB _XXXXXXX,XXXXXX__

ch70 label byte
DB 13,022h
DB _XXXXXXX,XXXXX___
DB ___XX___,___XX___
DB ___XX___,____X___
DB ___XX___,________
DB ___XX___,__X_____
DB ___XX___,__X_____
DB ___XXXXX,XXX_____
DB ___XX___,__X_____
DB ___XX___,__X_____
DB ___XX___,________
DB ___XX___,________
DB ___XX___,________
DB _XXXXXX_,________

ch71 label byte
DB 17,023h
DB _____XXX,XXXX__X_,________
DB ___XXX__,___XXXX_,________
DB __XX____,_____XX_,________
DB __XX____,______X_,________
DB _XXX____,________,________
DB _XX_____,________,________
DB _XX_____,___XXXXX,X_______
DB _XX_____,_____XX_,________
DB _XXX____,_____XX_,________
DB __XX____,_____XX_,________
DB __XX____,_____XX_,________
DB ___XXX__,___XXX__,________
DB _____XXX,XXXXX___,________

ch72 label byte
DB 17,022h
DB _XXXXXX_,__XXXXXX
DB ___XX___,____XX__
DB ___XX___,____XX__
DB ___XX___,____XX__
DB ___XX___,____XX__
DB ___XX___,____XX__
DB ___XXXXX,XXXXXX__
DB ___XX___,____XX__
DB ___XX___,____XX__
DB ___XX___,____XX__
DB ___XX___,____XX__
DB ___XX___,____XX__
DB _XXXXXX_,__XXXXXX

ch73 label byte
DB 3 021h
DB _XXXXXX_
DB ___XX___
DB ___XX___
DB ___XX___
DB ___XX___
DB ___XX___
DB ___XX___
DB ___XX___
DB ___XX___
DB ___XX___
DB ___XX___
DB ___XX___
DB _XXXXXX_

ch74 label byte
DB 9,021h
DB __XXXXXX
DB ____XX__
DB ____XX__
DB ____XX__
DB ____XX__
DB ____XX__
DB ____XX__
DB ____XX__
DB ____XX__
DB ____XX__
DB ____XX__
DB XXX_X___
DB _XXX____

ch75 label byte
DB 17,023h
DB _XXXXXX_,__XXXXXX,________
DB ___XX___,____XX__,________
DB ___XX___,___X____,________
DB ___XX___,__X_____,________
DB ___XX___,_X______,________
DB ___XX___,X_______,________
DB ___XX__X,X_______,________
DB ___XX_X_,XX______,________
DB ___XXX__,_XX_____,________
DB ___XX___,__XX____,________
DB ___XX___,___XX___,________
DB ___XX___,____XXX_,________
DB _XXXXXX_,__XXXXXX,X_______

ch76 label byte
DB 15,022h
DB _XXXXXX_,________
DB ___XX___,________
DB ___XX___,________
DB ___XX___,________
DB ___XX___,________
DB ___XX___,________
DB ___XX___,________
DB ___XX___,________
DB ___XX___,________
DB ___XX___,_____X__
DB ___XX___,_____X__
DB ___XX___,____XX__
DB _XXXXXXX,XXXXXX__

ch77 label byte
DB 21,023h
DB _XXXX___,________,XXXX____
DB ___XXX__,_______X,XX______
DB ___XXX__,_______X,XX______
DB ___X_XX_,______X_,XX______
DB ___X_XX_,______X_,XX______
DB ___X__XX,_____X__,XX______
DB ___X__XX,_____X__,XX______
DB ___X___X,X___X___,XX______
DB ___X___X,X___X___,XX______
DB ___X____,XX_X____,XX______
DB ___X____,XXXX____,XX______
DB ___X____,_XX_____,XX______
DB _XXXXX__,_XX___XX,XXXX____

ch78 label byte
DB 17,022h
DB _XXX____,___XXXXX
DB __XXX___,_____X__
DB ___XXX__,_____X__
DB ___XXXX_,_____X__
DB ___X_XXX,_____X__
DB ___X__XX,X____X__
DB ___X___X,XX___X__
DB ___X____,XXX__X__
DB ___X____,_XXX_X__
DB ___X____,__XXXX__
DB ___X____,___XXX__
DB ___X____,____XX__
DB _XXXXX__,_____X__

ch79 label byte
DB 17,022h
DB _____XXX,XXXX____
DB ___XXX__,___XXX__
DB __XX____,_____XX_
DB __XX____,_____XX_
DB _XXX____,_____XXX
DB _XX_____,______XX
DB _XX_____,______XX
DB _XX_____,______XX
DB _XXX____,_____XXX
DB __XX____,_____XX_
DB __XX____,_____XX_
DB ___XXX__,___XXX__
DB _____XXX,XXXX____

ch80 label byte
DB 13,022h
DB _XXXXXXX,XX______
DB ___XX___,_XXX____
DB ___XX___,__XXX___
DB ___XX___,___XX___
DB ___XX___,___XX___
DB ___XX___,__XXX___
DB ___XX___,_XXX____
DB ___XXXXX,XX______
DB ___XX___,________
DB ___XX___,________
DB ___XX___,________
DB ___XX___,________
DB _XXXXXX_,________

ch81 label byte
DB 17,022h
DB _____XXX,XXXX____
DB ___XXX__,___XXX__
DB __XX____,_____XX_
DB __XX____,_____XX_
DB _XXX____,_____XXX
DB _XX_____,______XX
DB _XX_____,______XX
DB _XX_____,______XX
DB _XXX____,_____XXX
DB __XX____,_____XX_
DB __XX____,_____XX_
DB ___XXX__,___XXX__
DB _____XXX,XXXX____
DB ________,XXXXX___
DB ________,___XXXXX

ch82 label byte
DB 16,022h
DB _XXXXXXX,XXX_____
DB ___XX___,__XXX___
DB ___XX___,___XXX__
DB ___XX___,____XX__
DB ___XX___,___XXX__
DB ___XX___,__XXX___
DB ___XXXXX,XXX_____
DB ___XX___,XX______
DB ___XX___,_XX_____
DB ___XX___,__XX____
DB ___XX___,___XX___
DB ___XX___,____XX__
DB _XXXXXX_,____XXXX

ch83 label byte
DB 13,022h
DB ___XXXXX,__X_____
DB __XX____,XXX_____
DB _XX_____,__X_____
DB _XX_____,__X_____
DB __XX____,________
DB __XXXX__,________
DB ____XXXX,X_______
DB _______X,XXX_____
DB ________,_XXX____
DB _X______,__XX____
DB _X______,__XX____
DB _XXX____,_XX_____
DB _X_XXXXX,XX______

ch84 label byte
DB 14,022h
DB XXXXXXXX,XXXXXX__
DB XX____XX,____XX__
DB X_____XX,_____X__
DB X_____XX,_____X__
DB ______XX,________
DB ______XX,________
DB ______XX,________
DB ______XX,________
DB ______XX,________
DB ______XX,________
DB ______XX,________
DB ______XX,________
DB ____XXXX,XX______

ch85 label byte
DB 17,022h
DB _XXXXXX_,___XXXXX
DB ___XX___,_____X__
DB ___XX___,_____X__
DB ___XX___,_____X__
DB ___XX___,_____X__
DB ___XX___,_____X__
DB ___XX___,_____X__
DB ___XX___,_____X__
DB ___XX___,_____X__
DB ___XX___,_____X__
DB ____XX__,____X___
DB ____XXX_,___XX___
DB ______XX,XXX_____

ch86 label byte
DB 17,023h
DB XXXXXX__,____XXXX,X_______
DB __XX____,_____X__,________
DB __XXX___,____XX__,________
DB ___XX___,____X___,________
DB ___XXX__,___XX___,________
DB ____XX__,___X____,________
DB ____XXX_,__XX____,________
DB _____XX_,__X_____,________
DB _____XXX,_XX_____,________
DB ______XX,_X______,________
DB ______XX,XXX_____,________
DB _______X,XX______,________
DB ________,X_______,________

ch87 label byte
DB 22,023h
DB XXXXXX_X,XXXXX___,_XXXXX__
DB __XX____,_XX_____,___X____
```

DB __XXX___.XXX____,__XX____
DB ___XX___,__XX____,__X_____
DB ___XXX__,__XXX___,_XX_____
DB ____XX__,__XXX___,_X______
DB ____XXX_,__XXXX__,XX______
DB _____XX_,_X__XX__X_______
DB _____XXX_,X__XXX_,X_______
DB ______XX,X____XXX,________
DB ______XX,X____XXX,________
DB _______X,_______X_,________
DB _______X,_______X_,________ ch88 label byte
DB 17,023h
DB XXXXXXX_,__XXXXX,X_______
DB __XXX___,_____XX_,________
DB ___XXX__,_____XX__,________
DB ____XXX_,___XX___,________
DB _____XXX,__XX____,________
DB _______XX,XXX_____,________
DB ________X,XX______,________
DB _______XX,XXX_____,________
DB ______XX_,_XXX____,________
DB _____XX__,__XXX___,________
DB ____XX___,___XXX__,________
DB ___XX____,____XXX_,________
DB XXXXXX__,__XXXXXX,X________ ch89 label byte
DB 18,023h
DB XXXXXXX_,____XXXX,XX_______
DB __XXX___,_______XX,________
DB ___XXX__,______XX_,________
DB ____XXX_,_____XX__,________
DB _____XXX,___XX___,________
DB _______XX,X_XX____,________
DB ________X,XXX_____,________
DB _________,XX______,________
DB _________,XX______,________
DB _________,XX______,________
DB _________,XX______,________
DB _________,XX______,________
DB _______XX,XXXX____,________ ch90 label byte
DB 15,022h
DB _XXXXXXX,XXXXXX__
DB _XX______,___XXX__
DB _X_______,__XXX___
DB _X_______,_XXX____
DB _________,XXX_____
DB ________X,XX______
DB _______XX,X_______
DB _____XXX,_________
DB ____XXX_,_________
DB ___XXX__,______X__
DB __XXX___,_____X__
DB _XXX____,____XX__
DB _XXXXXXX,XXXXXX__ ch91 label byte
DB 8,011h
DB __XXXXX_
DB __XX____
DB __XX____
DB __XX____
DB __XX____
DB __XX____
DB __XX____
DB __XX____
DB __XX____
DB __XX____
DB __XX____
DB __XX____
DB __XX____
DB __XX____
DB __XX____
DB __XX____
DB __XXXXX_ ch92 label byte
DB 7,021h
DB XX______
DB _X______
DB _XX_____
DB __X_____
DB __XX____
DB ___X____
DB ___XX___
DB ____X___
DB ____XX__
DB _____X__
DB _____XX_
DB ______X_
DB _______X_ ch93 label byte
DB 8,011h
DB _XXXXX__
DB ____XX__
DF ____XX__
DB ____XX__
DB ____XX__
DB ____XX__
DB ____XX__
DB ____XX__
DB ____XX__
DB ____XX__
DB ____XX__
DB ____XX__
DB ____XX__
DB ____XX__
DB ____XX__
DB ____XX__
DB _XXXXX__ ch94 label byte
DB 11,022h
DB ____XXX_,________
DB ___XX_XX,________
DB __XX___X,X_______
DB _XX_____,XX______ ch95 label byte
ch95 label byte
DB 19,003h
DB ___XXXXX,XXXXXXXX,XXX_____
DB __XX____,________X,XX______
DB _XX_____,_______XX,X_______
DB ________,______XXX,________
DB ________,_____XXX_,________
DB ________,____XXX__,________
DB ________,___XXX___,________
DB ________,__XXX____,________
DB ________,XXX______,________
DB _______X,XX_______,________
DB ______XX,X________,________
DB _____XXX,_________,________
DB ____XXX_,_________,________
DB ___XXX__,_________,_XX_____
DB __XXX___,________,XX______
DB _XXXXXXX,XXXXXXXX,X_______ ch96 label byte
DB 8,031h
DB __XXX___
DB ____XX__ ch97 label byte
DB 11,062h
DB ____XXXX,________
DB __XX___X,X_______
DB __XX___X,X_______
DB ______XXX,X_______
DB __XXX__X,X_______
DB _XX____X,X_______
DB _XX____X,X_______
DB _XXX__XX,X_______
DB __XXXX_X,XX______ ch98 label byte
DB 12,012h
DB ___X____,________
DB _XXX____,________
DB __XX____,________
DB __XX____,________
DB __XX____,________
DB __XX_XXX,X_______
DB __XXX__X,XX______
DB __XX____,XXX_____
DB __XX____,_XX_____
DB __XX____,_XX_____
DB __XX____,_XX_____
DB __XX____,_XX_____
DB __XXX___,XX______
DB ____XXXX,________ ch99 label byte
DB 11,062h
DB ____XXXX,________
DB __XX___X,XX______
DB _XX_____,XX______
DB _XX_____,________
DB _XX_____,________
DB _XX_____,________
DB _XXX____,________
DB __XXX___,XX______
DB ____XXXX,________ ch100 label byte
DB 12,012h
DB ________X______
DB ______X,XX_____
DB ________XX_____
DB ________XX_____
DB ________XX_____
DB ____XXX_,XX_____
DB __XX__XX,XX_____
DB _XX____X,XX_____
DB _XX_____XX_____
DB _XX_____XX_____
DB _XX_____XX_____
DB _XXX____XX_____
DB __XXX__X,XX_____
DB ____XXX_,XXX_____ ch101 label byte
DB 11,062h
DB ____XXX_,________
DB __XX___X,X_______
DB _XX_____XX_______
DB _XXXXXXX,XX______
DB _XX_____,________
DB _XX_____,________
DB _XXX____,________
DB __XXX___XX_______
DB ____XXXX,________ ch102 label byte
DB 7,011h
DB ____XXX_
DB ___X_XX_
DB __XX____
DB __XX____
DB __XX____
DB _XXXXX__
DB __XX____
DB __XX____
DB __XX____
DB __XX____
DB __XX____
DB __XX____
DB __XX____
DB _XXXXX__ ch103 label byte
DB 12,062h
DB ___XXXXX,________
DB __XX___X,XXX_____
DB _XX_____XX_______
DB _XX_____XX_______
DB __XX___X,X_______
DB ___XXXXX,________
DB _XX_____,________
DB _XX_____,________
DB __XXXXXX,XXX_____
DB _XX_____,_XX_____
DB XX_______XX_____
DB XX______,_XX_____
DB _XXXXXXX,X_______ ch104 label byte
DB 12,012h
DB ___X____,________
DB _XXX____,________
DB __XX____,________
DB __XX____,________
DB __XX____,________
DB __XX_XXX,X_______
DB __XXX___,XX______
DB __XX____XX______
DB __XX____XX______
DB __XX____XX______
DB __XX____XX______
DB __XX____XX______
DB _XXXX__X,XXX_____ ch105 label byte
DB 6,021h
DB __XX____
DB __XX____
DB ________
DB ________
DB _XXX____
DB __XX____
DB __XX____
DB __XX____
DB __XX____
DB __XX____
DB __XX____
DB _XXXX___ ch106 label byte
DB 6,021h
DB __XX____
DB __XX____
DB ________
DB _XXX____
DB __XX____
DB __XX____
DB __XX____
DB __XX____
DB __XX____
DB __XX____
DB __XX____
DB __XX____
DB __XX____
DB X_X_____
DB XX______ ch107 label byte
DB 12,012h
DB ___X____,________
DB _XXX____,________
DB __XX____,________
DB __XX____,________
DB __XX____,________
DB __XX___X,XXX_____
DB __XX____,X_______
DB __XX___X,________
DB __XX__X_,________
DB __XX_XX_,________
DB __XXX_XX,________
DB __XX___X,X_______
DB __XX____,XX______
DB _XXXX__X,XXXX____ ch108 label byte
DB 6,011h
DB ___X____
DB _XXX____
DB __XX____
DB __XX____
DB __XX____
DB __XX____
DB __XX____
DB __XX____
DB __XX____
DB __XX____
DB __XX____
DB __XX____
DB __XX____
DB _XXXX___ ch109 label byte
DB 18,063h
DB _XXX_XXX,X__XXXX_,________
DB __XXX___,XXX___XX,________
DB __XX____,XX____XX,________
DB __XX____,XX____XX,________
DB __XX____,XX____XX,________
DB __XX____,XX____XX,________
DB __XX____,XX____XX,________
DB __XX____,XX____XX,________
DB _XXXX__X,XXX__XXX,X_______ ch110 label byte
DB 12,062h
DB _XXX_XXX,X_______
DB __XXX___,XX______
DB __XX____,XX______
DB __XX____,XX______
DB __XX____,XX______
DB __XX____,XX______
DB __XX____,XX______
DB __XX____,XX______
DB _XXXX__X,XXX_____ ch111 label byte
DB 12,062h
DB ____XXXX,________
DB __XX___X,XX______
DB _XX_____,XXX_____
DB _XX_____,_XX_____
DB _XX_____,_XX_____
DB _XX_____,_XX_____
DB _XXX____,_XX_____
DB __XXX___,XX______
DB ____XXXX,________ ch112 label byte
DB 12,062h
DB _XXX_XXX,________
DB __XXX__X,XX______
DB __XX____,XXX_____
DB __XX____,_XX_____
DB __XX____,_XX_____
DB __XX____,_XX_____
DB __XX____,_XX_____
DB __XXX___,XX______
DB __XX_XXX,X_______
DB __XX____,________
DB __XX____,________
DB __XX____,________

```
DB _XXXX___.________

ch113 label byte
DB 12,062h
DB ___XXXX_._X______
DB __XX___X,XX______
DB _XX_____,XX______
DB _XX_____,XX______
DB _XX_____,XX______
DB _XX_____,XX______
DB _XXX____,XX______
DB __XXX__X,XX______
DB ___XXXX_,XX______
DB ________,XX______
DB ________,XX______
DB ________,XX______
DB ________X,XXX_____

ch114 label byte
DB 9,061h
DB _XXX_XXX
DB __XXX_XX
DB __XX____
DB __XX____
DB __XX____
DB __XX____
DB __XX____
DB __XX____
DB _XXXX___

ch115 label byte
DB 10,062h
DB ___XXXX_,X_______
DB _XX____X,X_______
DB _XX_____,X_______
DB __XXX___,________
DB ___XXXX_,________
DB _____XXX,________
DB _X_____X,X_______
DB _XX____X,X_______
DB _X_XXXX_,________

ch116 label byte
DB 7,031h
DB ___X____
DB ___X____
DB __XX____
DB _XXXXX__
DB __XX____
DB __XX____
DB __XX____
DB __XX____
DB __XX____
DB __XX____
DB __XX____
DB ___XXX__

ch117 label byte
DB 12,062h
DB _XXX___X,XX______
DB __XX____,XX______
DB __XX____,XX______
DB __XX____,XX______
DB __XX____,XX______
DB __XX____,XX______
DB __XX____,XX______
DB __XX___X,XX______
DB ___XXXX_,XXX_____

ch118 label byte
DB 11,062h
DB XXXXX___,XXX_____
DB _XX_____,_X______
DB __XX____,X_______
DB __XX____,X_______
DB ___XX__X,________
DB ___XX__X,________
DB ____XXX_,________
DB ____XXX_,________
DB _____X__,________

ch119 label byte
DB 17,063h
DB XXXX__XX,XXX__XXX,X_______
DB _XX____X,X______X,________
DB __XX____,XX____X_,________
DB __XX____,XX____X_,________
DB ___XX__X,_XX__X__,________
DB ___XX__X,_XX__X__,________
DB ____XXX_,__XXX___,________
DB ____XXX_,__XXX___,________
DB _____X__,___X____,________

ch120 label byte
DB 12,062h
DB _XXXX__X,XXX_____
DB __XX____,XX______
DB ___XX__X,________
DB ____XXX_,________
DB ____XX_.______
DB ____X_XX,______
DB ___X___X,X_____
DB __XX____XX_____
DB _XXXX__X,XXX____

ch121 label byte
DB 11,062h
DB XXXX____XXX____
DB _XX______X_____
DB __XX_____X_____
DB __XX_____X_____
DB ___XX__X,______
DB ___XX__X,______
DB ____XXX_.______
DB ____XXX_.______
DB _____X_.______
DB ____XX_.______
DB _____X_.______
DB XX_X_____ ______
DB XXX______ ______

ch122 label byte
DB 11,062h
DB _XXXXXXX,XX_____
DB _XX____X,X_____
DB _X____XX,______
DB ____XX_.______
DB ____XX_.______
DB ___XX___.______
DB __XX_____X_____
DB _XX_____XX_____
DB _XXXXXXX,XX_____

ch123 label byte
DB 10,011h
DB _____XX_
DB ____XX__
DB ____XX__
DB ____XX__
DB ____XX__
DB ____XX__
DB ____XX__
DB ____XX__
DB __XX___
DB ____XX__
DB ____XX__
DB ____XX__
DB ____XX__
DB ____XX__
DB ____XX__
DB _____XX_

ch124 label byte
DB 6,011h
DB __XX____
DB __XX____
DB __XX____
DB __XX____
DB __XX____
DB __XX____
DB __XX____
DB __XX____
DB __XX____
DB __XX____
DB __XX____
DB __XX____
DB __XX____
DB __XX____
DB __XX____
DB __XX____
DB __XX____
DB __XX____

ch125 label byte
DB 10,011h
DB ___XX___
DB ____XX__
DB ____XX__
DB ____XX__
DB ____XX__
DB ____XX__
DB ____XX__
DB ____XX__
DB _____XX_
DB ____XX__
DB ____XX__
DB ____XX__
DB ____XX__
DB ____XX__
DB ____XX__
DB ____XX__
DB ___XX___

ch126 label byte
DB 12,022h
DB __XXXX___X____
DB _XX__XX_._XX____
DB _X____XX.XX______

ch127 label byte
DB 8,021h
DB __XXXX__
DB __XXXX__
DB __XXXX__
DB __XXXX__
DB __XXXX__
DB __XXXX__
DB __XXXX__
DB __XXXX__
DB __XXXX__
DB __XXXX__
DB __XXXX__
DB __XXXX__
DB __XXXX__

ch128 label byte
DB 16,022h
DB _____XXX,XXXX__X_
DB ___XXX__,___XXXX_
DB __XX____,______XX_
DB __XX____,_______X_
DB _XXX____,________
DB _XX_____,________
DB _XX_____,________
DB _XX_____,________
DB _XXX____,________
DB __XX____,________
DB __XX____,_______X_
DB ___XXX__,_____XX__
DB _____XXX,XXXX____
DB ________,X_______
DB ________,XXX_____
DB ________,__XX____
DB ________X,XXX_____

ch129 label byte
DB 12,032h
DB ___XX__X,X_______
DB ___XX__X,X_______
DB ________,________
DB _XXX___X,XX______
DB __XX____,XX______
DB __XX____,XX______
DB __XX____,XX______
DB __XX____,XX______
DB __XX____,XX______
DB __XX____,XX______
DB __XX___X,XX______
DB ___XXXX_,XXX_____

ch130 label byte
DB 11,032h
DB _____XXX,________
DB ____XX__,________
DB ________,________
DB ____XXX_,________
DB __XX___X,X_______
DB _XX_____,XX______
DB _XXXXXXX,XX______
DB _XX_____,________
DB _XX_____,________
DB _XXX____,________
DB __XXX___,XX______
DB ____XXXX,________

ch131 label byte
DB 11,022h
DB _____X__,________
DB ____XXX_,________
DB ___X___X,________
DB ________,________
DB ____XXXX,________
DB __XX___X,X_______
DB __XX___X,X_______
DB ______XXX,X_______
DB __XXX__X,X_______
DB _XX____X,X_______
DB _XX____X,X_______
DB _XXX__XX,X_______
DB __XXXX_X,XX______

ch132 label byte
DB 11,032h
DB __XX___X,X_______
DB __XX___X,X_______
DB ________,________
DB ____XXXX,________
DB __XX___X,X_______
DB __XX___X,X_______
DB ______XXX,X_______
DB __XXX__X,X_______
DB _XX____X,X_______
DB _XX____X,X_______
DB _XXX__XX,X_______
DB __XXXX_X,XX______

ch133 label byte
DB 11,032h
DB ___XXX__,________
DB ______XX_,________
DB ________,________
DB ____XXXX,________
DB __XX___X,X_______
DB __XX___X,X_______
DB ______XXX,X_______
DB __XXX__X,X_______
DB _XX____X,X_______
DB _XX____X,X_______
DB _XXX__XX,X_______
DB __XXXX_X,XX______

ch134 label byte
DB 11,002h
DB ____XXX_,________
DB ___XX_XX,________
DB ___X___X,________
DB ___XX_XX,________
DB ____XXX_,________
DB ________,________
DB ____XXXX,________
DB __XX___X,X_______
DB __XX___X,X_______
DB ______XXX,X_______
DB __XXX__X,X_______
DB _XX____X,X_______
DB _XX____X,X_______
DB _XXX__XX,X_______
DB __XXXX_X,XX______

ch135 label byte
DB 11,062h
DB ____XXXX,________
DB __XX___X,XX______
DB _XX_____,XX______
DB _XX_____,________
DB _XX_____,________
DB _XX_____,________
DB _XXX____,________
DB __XXX___,XX______
DB ____XXXX,________
DB _____X__,________
DB _____XXX,________
DB _______X,X_______
DB ____XXXX,________

ch136 label byte
DB 11,022h
DB _____X__,________
DB ____XXX_,________
DB ___X___X,________
DB ________,________
DB ____XXX_,________
DB __XX___X,X_______
DB _XX_____,XX______
DB _XXXXXXX,XX______
DB _XX_____,________
DB _XX_____,________
DB _XXX____,________
DB __XXX___,XX______
DB ____XXXX,________

ch137 label byte
DB 11,032h
DB __XX___X,X_______
DB __XX___X,X_______
DB ________,________
DB ____XXX_,________
DB __XX___X,X_______
DB _XX_____,XX______
DB _XXXXXXX,XX______
DB _XX_____,________
DB _XX_____,________
DB _XXX____,________
DB __XXX___,XX______
DB ____XXXX,________

ch138 label byte
DB 11,032h
DB ___XXX__,________
DB ______XX_,________
DB ________,________
DB ____XXX_,________
DB __XX___X,X_______
DB _XX_____,XX______
DB _XXXXXXX,XX______
DB _XX_____,________
DB _XX_____,________
DB _XXX____,________
DB __XXX___,XX______
DB ____XXXX,________

ch139 label byte
DB 6,031h
DB XX__XX__
DB XX__XX__
```

```
DB ________
DB _XXX____
DB __XX____
DB __XX____
DB __XX____
DB __XX____
DB __XX____
DB __XX____
DB __XX____
DB _XXXX___

ch140 label byte
DB 6,031h
DB _XXXX___
DB XX__XX__
DB ________
DB _XXX____
DB __XX____
DB __XX____
DB __XX____
DB __XX____
DB __XX____
DB __XX____
DB __XX____
DB _XXXX___

ch141 label byte
DB 6.031h
DB XXX_____
DB __XX____
DB ________
DB _XXX____
DB __XX____
DB __XX____
DB __XX____
DB __XX____
DB __XX____
DB __XX____
DB __XX____
DB _XXXX___

ch142 label byte
DB 17,003h
DB _____XX_,__XX____,________
DB ________,________,________
DB ________.X_______,________
DB _______X,XX______,________
DB ______XX,XXX_____,________
DB ______X_,_XX_____,________
DB _____XX_,_XXX____,________
DB _____X__,__XX____,________
DB ____XX__,_XXX____,________
DB ____X___,___XX___,________
DB ___XXXXX,XXXXXX__,________
DB ___X____,____XX__,________
DB __XX____,____XXX_,________
DB __X_____,_____XX_,________
DB XXXXX___,___XXXXX,X_______

ch143 label byte
DB 17,003h
DB ______XX,_XX_____,________
DB ______X_,_X______,________
DB ______XX,_XX_____,________
DB _______X,XX______,________
DB ______XX,XXX_____,________
DB ______X_,_XX_____,________
DB _____XX_,_XXX____,________
DB _____X__,__XX____,________
DB ____XX__,_XXX____,________
DB ____X___,___XX___,________
DB ___XXXXX.XXXXXX__,________
DB ___X____,____XX__,________
DB __XX____,____XXX_,________
DB __X_____,_____XX_,________
DB XXXXX___,___XXXXX,X_______

ch144 label byte
DB 15,002h
DB _______X,X_______
DB ________,________
DB _XXXXXXX,XXXXXX__
DB ___XX___,____XX__
DB ___XX___,_____X__
DB ___XX___,________
DB ___XX___,_X______
DB ___XX___,_X______
DB ___XXXXX,XXX_____
DB ___XX___,_X______
DB ___XX___,_X______
DB ___XX___,________
DB ___XX___,_____X__
DB ___XX___,____XX__
DB _XXXXXXX,XXXXXX__

ch145 label byte
DB 17,062h
DB ____XXXX,__XXX___
DB __XX___X,XX___XX_

DB __XX__X,X____XX
DB _____XXX,XXXXXXXX
DB __XXX__X,X______
DB _XX____X,X______
DB _XX____X,XX_____
DB _XXX__XX,XXX___XX
DB __XXXX__,__XXXX__

ch146 label byte
DB 21,023h
DB ______X,XXXXXXXX,XXXX___
DB ______X,_XX______XX___
DB _____XX,_XX______X___
DB _____X_,_XX_________
DB _____XX_,_XX______X___
DB _____X__,XX_______X___
DB ____XX__,XXXXXXX,XX____
DB ___X____,XX_______X____
DB ___XXXXX,XXX______X____
DB ___X____,_XX_________
DB _XX_____,_XX______X___
DB _X______,_XX______XX___
DB XXXXX__X,XXXXXXXX,XXXX___

ch147 label byte
DB 12,022h
DB ______X_,________
DB ______XXX,________
DB ____X___X________
DB ________,________
DB ___XXXX,________
DB __XX__X,XX______
DB _XX_____,XXX_____
DB _XX_____,_XX_____
DB _XX_____,_XX_____
DB _XX_____,_XX_____
DB _XXX____,_XX_____
DB __XXX___XX______
DB ____XXXX,________

ch148 label byte
DB 12,032h
DB ___XX__X,X______
DB ___XX__X,X______
DB ________,________
DB ____XXXX________
DB __XX__X,XX______
DB _XX_____,XXX_____
DB _XX_____,_XX_____
DB _XX_____,_XX_____
DB _XX_____,_XX_____
DB _XXX____,_XX_____
DB __XXX___XX______
DB ____XXXX,________

ch149 label byte
DB 12,032h
DB ___XXX_,________
DB _____XX_,________
DB ________________
DB ___XXXX,________
DB __XX__X,XX______
DB _XX_____,XXX_____
DB _XX_____,_XX_____
DB _XX_____,_XX_____
DB _XX_____,_XX_____
DB _XXX____,_XX_____
DB __XXX___XX______
DB ____XXXX,________

ch150 label byte
DB 12,032h
DB ___XXX_,________
DB ____XX_XX_______
DB ________________
DB _XXX___X,XX______
DB __XX____,XX______
DB __XX____,XX______
DB __XX____,XX______
DB __XX____,XX______
DB __XX____,XX______
DB __XX____,XX______
DB __XX___X,XX______
DB __XXXX_,XXX______

ch151 label byte
DB 12,032h
DB ___XXX_,________
DB _____XX_,________
DB ________________
DB _XXX___X,XX______
DB __XX____,XX______
DB __XX____,XX______
DB __XX____,XX______
DB __XX____,XX______
DB __XX____,XX______
DB __XX____,XX______
DB __XX___X,XX______
DB ___XXXX_,XXX_____

ch152 label byte
DB 11,032h
DB ___XX__X,X_______
DB ___XX__X,X_______
DB ________,________
DB XXXX____,XXX_____
DB _XX_____,_X______
DB __XX____,X_______
DB __XX____,X_______
DB ___XX__X,________
DB ___XX__X,________
DB ____XXX_,________
DB ____XXX_,________
DB _____X__,________
DB ____XX__,________
DB ____X___,________
DB XX_X____,________
DB XXX_____,________

ch153 label byte
DB 17,002h
DB _____XX_,__XX____
DB ________,________
DB _____XXX,XXXX____
DB ___XXX__,___XXX__
DB __XX____,_____XX_
DB __XX____,_____XX_
DB _XXX____,_____XXX
DB _XX_____,______XX
DB _XX_____,______XX
DB _XX_____,______XX
DB _XXX____,_____XXX
DB __XX____,_____XX_
DB __XX____,_____XX_
DB ___XXX__,___XXX__
DB _____XXX,XXXX____

ch154 label byte
DB 17,002h
DB _____XX_,___XX___
DB ________,________
DB _XXXXXX_,___XXXXX
DB ___XX___,_____X__
DB ___XX___,_____X__
DB ___XX___,_____X__
DB ___XX___,_____X__
DB ___XX___,_____X__
DB ___XX___,_____X__
DB ___XX___,_____X__
DB ___XX___,_____X__
DB ___XX___,_____X__
DB ____XX__,____X___
DB ____XXX_,___XX___
DB ______XX,XXX_____

ch155 label byte
DB 12,042h
DB ________,_X______
DB ________,X_______
DB ____XXXX,X_______
DB __XX___X,XX______
DB _XX____X,XX______
DB _XX___X_,________
DB _XX___X_,________
DB _XX__X__,________
DB _XXX_X__,________
DB __XXX___,_X______
DB ___XXXXX,X_______
DB ___X____,________
DB __X_____,________

ch156 label byte
DB 12,022h
DB ______XX,X_______
DB _____X__,_XX_____
DB ____XX__,_XX_____
DB ____XX__,________
DB ____XX__,________
DB ____XX__,________
DB __XXXXXX,X_______
DB ____XX__,________
DB ____XX__,________
DB ____XX__,________
DB _XXXX___,___X____
DB XX__XXXX,XXX_____
DB _XXXX_XX,XX______

ch157 label byte
DB 12,022h
DB XXXXX___,XXXX____
DB _XX_____,__X_____
DB __XX____,_X______
DB ___XX___,X_______
DB ____XX_X,________
DB XXXXXXXX,XXXX____
DB _____XX_,________
DB _____XX_,________
DB XXXXXXXX,XXXX____
DB _____XX_,________

DB _____XX_,________
DB _____XX_,________
DB ___XXXXX,X_______

ch158 label byte
DB 12,062h
DB _XXX_XXX,________
DB __XXX__X,XX______
DB __XX____,XXX_____
DB __XX____,_XX_____
DB __XX____,_XX_____
DB __XX____,_XX_____
DB __XX____,_XX_____
DB __XXX___,XX______
DB __XX_XXX,X_______
DB __XX____,________
DB __XX____,________
DB __XX____,________
DB _XXXX___,________

ch159 label byte
DB 7,011h
DB ____XXX_
DB ___X_XX_
DB __XX____
DB __XX____
DB __XX____
DB _XXXXX__
DB __XX____
DB __XX____
DB __XX____
DB __XX____
DB __XX____
DB __XX____
DB __XX____
DB _XXXXX__

ch160 label byte
DB 11,032h
DB _______XX,X_______
DB _____XX_,________
DB ________,________
DB ____XXXX,________
DB __XX___X,X_______
DB __XX___X,X_______
DB _____XXX,X_______
DB __XXX__X,X_______
DB _XX____X,X_______
DB _XX____X,X_______
DB _XXX__XX,X_______
DB __XXXX_X,XX______

ch161 label byte
DB 6,031h
DB __XXX___
DB _XX_____
DB ________
DB _XXX____
DB __XX____
DB __XX____
DB __XX____
DB __XX____
DB __XX____
DB __XX____
DB __XX____
DB _XXXX___

ch162 label byte
DB 12,032h
DB ______XX,X_______
DB _____XX_,________
DB ________,________
DB ____XXXX,________
DB __XX___X,XX______
DB _XX_____,XXX_____
DB _XX_____,_XX_____
DB _XX_____,_XX_____
DB _XX_____,_XX_____
DB _XXX____,_XX_____
DB __XXX___,XX______
DB ____XXXX,________

ch163 label byte
DB 12,032h
DB ______XX,X_______
DB _____XX_,________
DB ________,________
DB _XXX___X,XX______
DB __XX____,XX______
DB __XX____,XX______
DB __XX____,XX______
DB __XX____,XX______
DB __XX____,XX______
DB __XX____,XX______
DB __XX___X,XX______
DB ___XXXX_,XXX_____

ch164 label byte
DB 12,032h
```

DB ___XXX__,X_______
DB __X__XXX,________
DB ________,________
DB _XXX_XXX,X_______
DB __XXX___,XX______
DB __XX____,XX______
DB __XX____,XX______
DB __XX____,XX______
DB __XX____,XX______
DB __XX____,XX______
DB __XX____,XX______
DB _XXXX__X,XXX_____ ch165 label byte
DB 17,002h
DB _____X__,XXX_____
DB ________,________
DB _XXX____,___XXXXX
DB __XXX___,_____X__
DB ___XXX__,_____X__
DB ___XXXX_,_____X__
DB ___X_XXX,_____X__
DB ___X__XX,X____X__
DB ___X___X,XX___X__
DB ___X____,XXX__X__
DB ___X____,_XXX_X__
DB ___X____,__XXXX__
DB ___X____,___XXX__
DB ___X____,____XX__
DB _XXXXX__,_____X__ ch166 label byte
DB 8,021h
DB __XXXX__
DB _XX__XX_
DB _____XX_
DB __XXXXX_
DB _XX__XX_
DB _XX__XX_
DB __XXX_XX
DB ________
DB _XXXXXX_ ch167 label byte
DB 8,021h
DB __XXXX__
DB _XX__XX_
DB _XX__XX_
DB _XX__XX_
DB _XX__XX_
DB _XX__XX_
DB __XXXX__
DB ________
DB _XXXXXX_ ch168 label byte
DB 11,022h
DB ____XXX_,________
DB ____XXX_,________
DB ________,________
DB _____X__,________
DB _____X__,________
DB ____X___,________
DB ___XX___,________
DB __XX____,________
DB _XX_____,________
DB _XX_____,XX______
DB _XX_____,XX______
DB __XX____,X_______
DB ___XXXXX,________ ch169 label byte
DB 12,0F2h
DB ________,________
DB XXXXXXXX,XXXX____ ch170 label byte
DB 14,092h
DB _XXXXXXX,XXXXX___
DB ________,___XX___
DB ________,___XX___
DB ________,___XX___ ch171 label byte
DB 16,022h
DB ___X____,_____XX_
DB _XXX____,____XX__
DB __XX____,___XX___
DB __XX____,__XX____
DB __XX____,_XX_____
DB _XXXX___,XX______
DB _______X,X_______
DB ______XX,___XXX__
DB _____XX_,__X__XX_
DB ____XX__,_____XX_
DB ___XX___,____XX__
DB __XX____,___XX_X_
DB _XX_____,__XXXXX_ ch172 label byte
DB 16,022h
DB ___X____,_____XX_
DB _XXX____,____XX__
DB __XX____,___XX___
DB __XX____,__XX____
DB __XX____,_XX_____
DB _XXXX___,XX______
DB _______X,X_______
DB ______XX,_____XX_
DB _____XX_,____XXX_
DB ____XX__,___X_XX_
DB ___XX___,__X__XX_
DB __XX____,__XXXXX_
DB _XX_____,_____XX_ ch173 label byte
DB 7,021h
DB __XXX___
DB __XXX___
DB ________
DB ___X____
DB ___X____
DB ___X____
DB ___X____
DB __XXX___
DB __XXX___
DB __XXX___
DB __XXX___
DB __XXX___
DB ___X____ ch174 label byte
DB 12,072h
DB ____XX__,_XX_____
DB ___XX___,XX______
DB __XX___X,X_______
DB _XX___XX,________
DB __XX___X,X_______
DB ___XX___,XX______
DB ____XX__,_XX_____ ch175 label byte
DB 12,072h
DB _XX___XX,________
DB __XX___X,X_______
DB ___XX___,XX______
DB ____XX__,_XX_____
DB ___XX___,XX______
DB __XX___X,X_______
DB _XX___XX,________ ch176 label byte
DB 12,0F2h
DB ________,________
DB XXXXXXXX,XXXX____ ch177 label byte
DB 12,0F2h
DB ________,________
DB XXXXXXXX,XXXX____ ch178 label byte
DB 12,0F2h
DB ________,________
DB XXXXXXXX,XXXX____ ch179 label byte
DB 6,021h
DB __XX____
DB __XX____
DB __XX____
DB __XX____
DB __XX____
DB __XX____
DB __XX____
DB ________
DB ________
DB __XX____
DB __XX____
DB __XX____
DB __XX____
DB __XX____
DB __XX____
DB __XX____ ch180 label byte
DB 12,0F2h
DB ________,________
DB XXXXXXXX,XXXX____ ch181 label byte
DB 12,0F2h
DB ________,________
DB XXXXXXXX,XXXX____ ch182 label byte
DB 12,0F2h
DB ________,________
DB XXXXXXXX,XXXX____ ch183 label byte
DB 12,0F2h
DB ________,________
DB XXXXXXXX,XXXX____ ch184 label byte
DB 12,0F2h
DB ________,________
DB XXXXXXXX,XXXX____ ch185 label byte
DB 12,0F2h
DB ________,________
DB XXXXXXXX,XXXX____ ch186 label byte
DB 12,0F2h
DB ________,________
DB XXXXXXXX,XXXX____ ch187 label byte
DB 12,0F2h
DB ________,________
DB XXXXXXXX,XXXX____ ch188 label byte
DB 12,0F2h
DB ________,________
DB XXXXXXXX,XXXX____ ch189 label byte
DB 12,0F2h
DB ________,________
DB XXXXXXXX,XXXX____ ch190 label byte
DB 12,0F2h
DB ________,________
DB XXXXXXXX,XXXX____ ch191 label byte
DB 12,0F2h
DB ________,________
DB XXXXXXXX,XXXX____ ch192 label byte
DB 12,0F2h
DB ________,________
DB XXXXXXXX,XXXX____ ch193 label byte
DB 12,0F2h
DB ________,________
DB XXXXXXXX,XXXX____ ch194 label byte
DB 12,0F2h
DB ________,________
DB XXXXXXXX,XXXX____ ch195 label byte
DB 12,0F2h
DB ________,________
DB XXXXXXXX,XXXX____ ch196 label byte
DB 12,0F2h
DB ________,________
DB XXXXXXXX,XXXX____ ch197 label byte
DB 12,0F2h
DB ________,________
DB XXXXXXXX,XXXX____ ch198 label byte
DB 12,0F2h
DB ________,________
DB XXXXXXXX,XXXX____ ch199 label byte
DB 12,0F2h
DB ________,________
DB XXXXXXXX,XXXX____ ch200 label byte
DB 12,0F2h
DB ________,________
DB XXXXXXXX,XXXX____ ch201 label byte
DB 12,0F2h
DB ________,________
DB XXXXXXXX,XXXX____ ch202 label byte
DB 12,0F2h
DB ________,________
DB XXXXXXXX,XXXX____ ch203 label byte
DB 12,0F2h
DB ________,________
DB XXXXXXXX,XXXX____ ch204 label byte
DB 12,0F2h
DB ________,________
DB XXXXXXXX,XXXX____ ch205 label byte
DB 12,0F2h
DB ________,________
DB XXXXXXXX,XXXX____ ch206 label byte
DB 12,0F2h
DB ________,________
DB XXXXXXXX,XXXX____ ch207 label byte
DB 12,0F2h
DB ________,________
DB XXXXXXXX,XXXX____ ch208 label byte
DB 12,0F2h
DB ________,________
DB XXXXXXXX,XXXX____ ch209 label byte
DB 12,0F2h
DB ________,________
DB XXXXXXXX,XXXX____ ch210 label byte
DB 12,0F2h
DB ________,________
DB XXXXXXXX,XXXX____ ch211 label byte
DB 12,0F2h
DB ________,________
DB XXXXXXXX,XXXX____ ch212 label byte
DB 12,0F2h
DB ________,________
DB XXXXXXXX,XXXX____ ch213 label byte
DB 12,0F2h
DB ________,________
DB XXXXXXXX,XXXX____ ch214 label byte
DB 12,0F2h
DB ________,________
DB XXXXXXXX,XXXX____ ch215 label byte
DB 12,0F2h
DB ________,________
DB XXXXXXXX,XXXX____ ch216 label byte
DB 12,0F2h
DB ________,________
DB XXXXXXXX,XXXX____ ch217 label byte
DB 12,0F2h
DB ________,________
DB XXXXXXXX,XXXX____ ch218 label byte
DB 12,0F2h
DB ________,________
DB XXXXXXXX,XXXX____ ch219 label byte
DB 12,0F2h
DB ________,________
DB XXXXXXXX,XXXX____ ch220 label byte
DB 12,0F2h
DB ________,________
DB XXXXXXXX,XXXX____ ch221 label byte
DB 12,0F2h
DB ________,________
DB XXXXXXXX,XXXX____ ch222 label byte

```
DB 12,0F2h
DB ________,________
DB XXXXXXXX,XXXX____

ch223 label byte
DB 12,0F2h
DB ________,________
DB XXXXXXXX,XXXX____

ch224 label byte
DB 12,0F2h
DB ________,________
DB XXXXXXXX,XXXX____

ch225 label byte
DB 12,022h
DB ____XXXX,________
DB ___XX__X,X_______
DB __XX____,XX______
DB __XX____,XX______
DB __XX___X,X_______
DB __XX__XX,________
DB __XX___X,X_______
DB __XX____,XX______
DB __XX____,_XX_____
DB __XX____,_XX_____
DB __XX____,_XX_____
DB __XX_XX_,XX______
DB _XXX__XX,X_______

ch226 label byte
DB 12,0F2h
DB ________,________
DB XXXXXXXX,XXXX____

ch227 label byte
DB 11,022h
DB ___XXXXX,XX______
DB __XXXX__,X_______
DB _XXXXX__,X_______
DB _XXXXX__,X_______
DB _XXXXX__,X_______
DB __XXXX__,X_______
DB ___XXX__,X_______
DB _____X__,X_______
DB _____X__,X_______
DB _____X__,X_______
DB _____X__,X_______
DB _____X__,X_______
DB _____X__,X_______

ch228 label byte
DB 12,0F2h
DB ________,________
DB XXXXXXXX,XXXX____

ch229 label byte
DB 12,0F2h
DB ________,________
DB XXXXXXXX,XXXX____

ch230 label byte
DB 12,072h
DB _XX_____,XX______
DB _XX_____,XX______
DB _XX_____,XX______
DB _XX_____,XX______
DB _XX_____,XX______
DB _XX_____,XX______
DB _XXX___X,XX__1___
DB _XXXXXXX,_XXX____
DB _XX_____,________
DB _XX_____,________
DB _XX_____,________
DB _XX_____,________

ch231 label byte
DB 12,0F2h
DB ________,________
DB XXXXXXXX,XXXX____

ch232 label byte
DB 12,0F2h
DB ________,________
DB XXXXXXXX,XXXX____

ch233 label byte
DB 12,0F2h
DB ________,________
DB XXXXXXXX,XXXX____

ch234 label byte
DB 12,0F2h
DB ________,________
DB XXXXXXXX,XXXX____

ch235 label byte
DB 12,0F2h
DB ________,________
DB XXXXXXXX,XXXX____

ch236 label byte
DB 12,0F2h
DB ________,________
DB XXXXXXXX,XXXX____

ch237 label byte
DB 17,022h
DB ______XXX,XXXX_XX_
DB ___XXX__,___XXX__
DB __XX____,___XXXX_
DB __XX____,_XX_XX_
DB _XXX____,_XX__XXX
DB _XX_____,XX____XX
DB _XX_____,X_____XX
DB _XX____X,X_____XX
DB _XXX__XX,______XXX
DB __XX_XX_,______XX_
DB __XXXX__,______XX_
DB ___XXX__,____XXX__
DB __XX_XXX,XXXX____

ch238 label byte
DB 12,0F2h
DB ________,________
DB XXXXXXXX,XXXX____

ch239 label byte
DB 12,0F2h
DB ________,________
DB XXXXXXXX,XXXX____

ch240 label byte
DB 12,0F2h
DB ________,________
DB XXXXXXXX,XXXX____

ch241 label byte
DB 14,042h
DB ______XX,________
DB ______XX,________
DB ______XX,________
DB ______XX,________
DB _XXXXXXX,XXXXX___
DB ______XX,________
DB ______XX,________
DB ______XX,________
DB ______XX,________
DB ________,________
DB _XXXXXXX,XXXXX___

ch242 label byte
DB 12,0F2h
DB ________,________
DB XXXXXXXX,XXXX____

ch243 label byte
DB 12,0F2h
DB ________,________
DB XXXXXXXX,XXXX____

ch244 label byte
DB 12,0F2h
DB ________,________
DB XXXXXXXX,XXXX____

ch245 label byte
DB 12,0F2h
DB ________,________
DB XXXXXXXX,XXXX____

ch246 label byte
DB 12,0F2h
DB ________,________
DB XXXXXXXX,XXXX____

ch247 label byte
DB 12,0F2h
DB ________,________
DB XXXXXXXX,XXXX____

ch248 label byte
DB 8,021h
DB __XXXX__
DB _XX__XX_
DB _XX__XX_
DB __XXXX__

ch249 label byte
DB 6,071h
DB __XX____
DB __XX____

ch250 label byte
DB 6,071h
DB __XX____
DB __XX____

ch251 label byte
DB 12,0F2h
DB ________,________
DB XXXXXXXX,XXXX____

ch252 label byte
DB 12,062h
DB _XXX_XXX,X_____
DB __XXX___XX_____
DB __XX____XX_____
DB __XX____XX_____
DB __XX____XX_____
DB __XX____XX_____
DB __XX____XX_____
DB __XX____XX_____
DB _XXXX__X,XXX____

ch253 label byte
DB 7,021h
DB __XXX__
DB _X__XX__
DB ___XX__
DB ___XX__
DB __XX_X_
DB _XXXXX__

ch254 label byte
DB 12,0F2h
DB ________,________
DB XXXXXXXX,XXXX____
ch255 label byte

DATASEG_END
end
Copr. 1995 Zenith Data Systems Corp.

.model small
include uibitequ.inc
include uiinclud.inc

DATASEG_BEGIN
extrn ControlDataStorageArea:byte

uifont3 label word
 public uifont3
 db 6
 db 0

 dw ch33,ch34,ch35,ch36,ch37,ch38,ch39
 dw
ch40,ch41,ch42,ch43,ch44,ch45,ch46,ch47,ch48,ch4
9
 dw
ch50,ch51,ch52,ch53,ch54,ch55,ch56,ch57,ch58,ch5
9
 dw
ch60,ch61,ch62,ch63,ch64,ch65,ch66,ch67,ch68,ch6
9
 dw
ch70,ch71,ch72,ch73,ch74,ch75,ch76,ch77,ch78,ch7
9
 dw ch80,ch81,ch82,ch83

ch33 label byte
DB 7,001h
DB ___X___
DB __XXX__
DB _XXXXX_
DB XXXXXXX_
DB __XXX__
DB __XXX__
DB __XXX__

ch34 label byte
DB 7,001h
DB __XXX__
DB __XXX__
DB __XXX__
DB XXXXXXX_
DB _XXXXX__
DB __XXX__
DB ___X___

if need_osk eq 0
ch35 label byte
else

ch35 label byte
db 15 , 2
db XXXXXXXX,XXXXXXX_
db X_______,______X_
db X_XXXXXX,X_XXX_X_
db X_XXXXXX,X_XXX_X_
db X_XXXXXX,X_XXX_X_
db X_XXXXXX,X_XXX_X_
db X_______,______X_
db XXXXXXXX,XXXXXXX_

ch36 label byte
db 11 , 2
db XXXXXXXX,XXX_____
db X_______,__X_____
db X_XXXXXX,X_X_____
db X_XXXXXX,X_X_____
db X_XXXXXX,X_X_____
db X_XXXXXX,X_X_____
db X_______,__X_____
db XXXXXXXX,XXX_____

ch37 label byte
db 13 , 2
db ____XXXX,XXXXX___
db ____X___,____X___
db ____X___,____X___
db ____X___,____X___
db ____X___,____X___
db XXXXXXXX,X___X___
db X_______,XXXXX___
db X_______,X_______
db X_______,X_______
db X_______,X_______
db X_______,X_______
db XXXXXXXX,X_______

ch38 label byte
db 10 , 2
db _X______,_X______
db XXX_____,XXX_____
db _XXX___X,XX______
db __XXX_XX,X_______
db ___XXXXX,________
db ____XXX_,________
db ___XXXXX,________
db __XXX_XX,X_______
db _XXX___X,XX______
db XXX_____,XXX_____
db _X______,_X______

ch39 label byte
db 18 , 3
db _XXXXX__,________,________
db _XX_____,________,________
db _XX_____,XXX___XX,X_______
db _XXXX__X,X_XX_XX_,XX______
db _XX_____,XXX__XX_,________
db _XX_____,__XX_XX_,________
db _XX____X,X_XX_XX_,XX______
db _XXXXX__,XXX___XX,X_______

ch40 label byte
db 10 , 2
db _XXXXX__,XX______
db _XX____X,XX______
db _XX_____,XX______
db _XXXX___,XX______
db _XX_____,XX______
db _XX_____,XX______
db _XX_____,XX______
db _XX_____,XX______

ch41 label byte
db 13 , 2
db _XXXXX__,XXXX____
db _XX____X,X__XX___
db _XX_____,___XX___
db _XXXX___,__XX____
db _XX_____,_XX_____
db _XX_____,XX______
db _XX____X,X_______
db _XX____X,XXXXX___

ch42 label byte
db 13 , 2
db _XXXXX_X,XXXXX___
db _XX_____,__XX____
db _XX_____,_XX_____
db _XXXX___,XXXX____
db _XX_____,___XX___
db _XX_____,___XX___
db _XX____X,X__XX___
db _XX_____,XXXX____

ch43 label byte
db 14 , 2
db _XXXXX__,___XX___
db _XX_____,__XXX___
db _XX_____,_XXXX___
db _XXXX___,XX_XX___
db _XX____X,X__XX___
db _XX____X,XXXXXX__
db _XX_____,___XX___
db _XX_____,___XX___

ch44 label byte
db 13 , 2
db _XXXXX_X,XXXXX___
```

```
db _XX____X,X_______
db _XX____X,X_______
db _XXXX__X,XXXX____
db _XX_____,___XX___
db _XX_____,___XX___
db _XX____X,X__XX___
db _XX_____,XXXX____

ch45 label byte
db 13 , 2
db _XXXXX__,_XXX____
db _XX_____,XX______
db _XX____X,X_______
db _XXXX__X,XXXX____
db _XX____X,X__XX___
db _XX____X,X__XX___
db _XX____X,X__XX___
db _XX_____,XXXX____

ch46 label byte
db 13 , 2
db _XXXXX_X,XXXXX___
db _XX_____,___XX___
db _XX_____,___XX___
db _XXXX___,__XX____
db _XX_____,__XX____
db _XX_____,_XX_____
db _XX_____,_XX_____
db _XX_____,_XX_____

ch47 label byte
db 13 , 2
db _XXXXX__,XXXX____
db _XX____X,X__XX___
db _XX____X,X__XX___
db _XXXX___,XXXX____
db _XX____X,X__XX___
db _XX____X,X__XX___
db _XX____X,X__XX___
db _XX_____,XXXX____

ch48 label byte
db 13 , 2
db _XXXXX__,XXXX____
db _XX____X,X__XX___
db _XX____X,X__XX___
db _XXXX__X,X__XX___
db _XX_____,XXXXX___
db _XX_____,___XX___
db _XX_____,___XX___
db _XX_____,XXX_____

ch49 label byte
db 17 , 3
db _XXXXX__,XX__XXXX,________
db _XX____X,XX_XX__X,X_______
db _XX_____,XX_XX__X,X_______
db _XXXX___,XX_XX__X,X_______
db _XX_____,XX_XX__X,X_______
db _XX_____,XX_XX__X,X_______
db _XX_____,XX_XX__X,X_______
db _XX_____,XX__XXXX,________

ch50 label byte
db 14 , 2
db _XXXXX__,XX__XX__
db _XX____X,XX_XXX__
db _XX_____,XX__XX__
db _XXXX___,XX__XX__
db _XX_____,XX__XX__
db _XX_____,XX__XX__
db _XX_____,XX__XX__
db _XX_____,XX__XX__

ch51 label byte
db 17 , 3
db _XXXXX__,XX__XXXX,________
db _XX____X,XX_XX__X,X_______
db _XX_____,XX_____X,X_______
db _XXXX___,XX____XX,________
db _XX_____,XX___XX_,________
db _XX_____,XX__XX__,________
db _XX_____,XX_XX___,________
db _XX_____,XX_XXXXX,X_______

ch52 label byte
db 18 3
db _XXXXX__,_______X,X_______
db _XX__XX_,_______X,X_______
db _XX__XX_,XXXXX_XX,XX______
db _XX__XX_,XXX____X,X_______
db _XXXXX__,XX_____X,X_______
db _XX_____,XX_____X,X_______
db _XX_____,XX_____X,X_______
db _XX_____,XX______,XX______

ch53 label byte
DB 12,2
DB _XXXXXXX,XXX_____
DB XXXXX__X,XXXX____
DB XXXXX__X,XXXX____
DB XXXXX__X,XXXX____
DB XXXXX__X,XXXX____
DB XXXXX__X,XXXX____
DB XXX_____,_XXX____
DB XXXX____,XXXX____
DB XXXXX__X,XXXX____
DB _XXXXXXX,XXX_____

ch54 label byte
db 8 , 1
db XXX__XXX
db XXX__XXX
db XXX__XXX
db XXX__XXX
db XXX__XXX
db XXX__XXX

ch55 label byte
db 30 , 4
db _XXXXX__,________,________,_XX_____
db _XX__XX_,________,________,_XX_____
db _XX__XX_,XXXXX_XX,X___XXX_,_XX_XX__
db _XXXXX__,XXX__XX_,XX_XX_XX,_XXXX___
db _XX__XX_,XX___XXX,XX__XXXX,_XXX____
db _XX__XX_,XX___XX_,___XX_XX,_XXX____
db _XX__XX_,XX___XX_,XX_XX_XX,_XXXX___
db _XXXXX__,XX____XX,X__XXXX,_XX_XX__

ch56 label byte
db 20 , 3
db __XXXX__,________,_____XXX
db _XX__XX_,________,_____XX_
db _XX_____,XX_XX__X,XX___XX_
db __XXXX__,XX_XX_XX,_XX__XX_
db _____XX_,XX_XX__X,XX___XXX
db _____XX_,XX_XX___,_XX__XXX
db _XX__XX_,XX_XX_XX,_XX__XX_
db __XXXX__,_XXXX__X,XX___XX_
db ________,___XX___,________
db ________,_XXX____,________

ch57 label byte
db 17 3
db _____X__,________,________
db ____XX__,________,________
db ___XXX__,________,________
db __XXXXXX,XXXXXXXX,X_______
db _XXXXXXX,XXXXXXXX,X_______
db _XXXXXXX,XXXXXXXX,X_______
db __XXXXXX,XXXXXXXX,X_______
db ___XXX__,________,________
db ____XX__,________,________
db _____X__,________,________

ch58 label byte
db 15 , 2
db _XX_____,________
db _XX_____,________
db _XX_XXXX,___XXX__
db _XX_XX_X,X_XX_XX_
db _XX_XX_X,X__XXX__
db _XX_XX_X,X____XX_
db _XX_XX_X,X_XX_XX_
db _XX_XX_X,X__XXX__

ch59 label byte
db 12,2
db XXXXXXXX,XXXX____
db XXXXXXXX,XXXX____
db XX______,________
db XX_XXX__,________
db XX_XXXXX,________
db XX_XXXXX,XX______
db XX_XX_XX,________
db XX_____X,X_______
db XX______,XX______
db XX______,_XX_____
db XX______,__XX____
db XX______,________

ch60 label byte
db 8 , 1
db ___XX___
db __XXXX__
db _XXXXXX_
db XXXXXXXX
db ___XX___
db ___XX___
db ___XX___
db _XXXXXX_
db ___XX___
db _XXXXXX_
db ___XX___
db _XXXXXX_

ch61 label byte
DB 12.2
DB _XXXXXXX,XXX_____
DB XXXXX__X,XXXX____
DB XXXX___X,XXXX____
DB XXX____X,XXXX____
DB XX__X__X,XXXX____
DB XXXXX__X,XXXX____
DB XXXXX__X,XXXX____
DB XXXXX__X,XXXX____
DB XXXXX__X,XXXX____
DB _XXXXXXX,XXX_____

ch62 label byte
db 16 , 2
db _X____XX,________
db _X___XXX,________
db _X__XXXX,________
db _X_XXXXX,XXXXXXX_
db _X_XXXXX,XXXXXXX_
db _X__XXXX,________
db _X___XXX,_X______
db _X____XX,_XX____X
db _______X,_XXX___X
db ________,_XXXX__X
db __XXXXXX,XXXXXX_X
db __XXXXXX,XXXXXX_X
db ________,_XXXX__X
db ________,_XXX___X
db ________,_XX____X
db ________,_X______

ch63 label byte
db 16 , 2
db _XXXX___,_____XXX
db _XX_XX__,______XX
db _XX__XX_,_XXX__XX
db _XX__XX_,XX_XX_XX
db _XX__XX_,XXXXX_XX
db _XX__XX_,XX____XX
db _XX_XX__,XX_XX_XX
db _XXXX___,_XXX__XX

ch64 label byte
db 12,2
db ________,__XX____
db XX______,__XX____
db _XX_____,__XX____
db __XX____,__XX____
db ___XX___,__XX____
db ____XX_X,X_XX____
db __XXXXXX,X_XX____
db ____XXXX,X_XX____
db ______XX,X_XX____
db ________,__XX____
db XXXXXXXX,XXXX____
db XXXXXXXX,XXXX____

ch65 label byte
db 8 , 1
db _XXXXXX_
db ___XX___
db _XXXXXX_
db ___XX___
db _XXXXXX_
db ___XX___
db ___XX___
db ___XX___
db XXXXXXXX
db _XXXXXX_
db __XXXX__
db ___XX___

ch66 label byte
db 9 , 2
db ____XX__,________
db ___XXXX_,________
db __XXXXXX,________
db _XXXXXXX,X_______
db ____XX__,________
db ____XX__,________
db ____XX__,________
db ____XX__,________
db ____XX__,________

ch67 label byte
DB 23,3
DB _XXXXXXX,XXX_____,_XX_____
DB XXXXX__X,XXXX___X,X__XX___
DB XXXXX__X,XXXX__XX,X__XXX__
DB XXXX____,XXXX__XX,XXXXXX__
DB XXXX_XX_,XXXX_XXX,XXXXXXX_
DB XXX__XX_,_XXX_X__,______X_
DB XXX_____,_XXX_X__,_XX___X_
DB XX__XXXX,__XX_X__,_XX___X_
DB XX__XXXX,__XX__X_,_____X__
DB _XXXXXXX,XXX____X,XXXXX___

ch68 label byte
db 30 , 4
db _____X__,________,________,________
db ____XX__,________,________,___XXX__
db ___XXX__,________,________,___XXX__
db __XXXX__,________,________,___XXX__
db _XXXXXXX,XXXXXXXX,XXXXXXXX,XXXXXX__
db _XXXXXXX,XXXXXXXX,XXXXXXXX,XXXXXX__
db __XXXXXX,XXXXXXXX,XXXXXXXX,XXXXXX__
db ___XXX__,________,________,________
db ____XX__,________,________,________
db _____X__,________,________,________

ch69 label byte
db 10 , 2
db ____X___,________
db ___XX___,________
db __XXX___,________
db _XXXXXXX,XX______
db _XXXXXXX,XX______
db __XXX___,________
db ___XX___,________
db ____X___,________

ch70 label byte
db 10, 2
db ______X_,________
db ______XX,________
db ______XX,X_______
db _XXXXXXX,XX______
db _XXXXXXX,XX______
db ______XX,X_______
db ______XX,________
db ______X_,________

ch71 label byte
db 15 , 2
db _______X,X_______
db ______XX,XX______
db _____XXX,XXX_____
db ____XXX_,_XXX____
db ___XXX__,__XXX___
db __XXX___,___XXX__
db _XXXXXX_,_XXXXXX_
db _XXXXXX_,_XXXXXX_
db _____XX_,_XX_____
db _____XX_,_XX_____
db _____XXX,XXX_____

ch72 label byte
db 15 , 2
db ________,________
db ________,________
db ___XX__X,XX__XX__
db ___XX___,XX__XX__
db __XXXX__,XX_XXXX_
db __XXXX__,XX__XX__
db _XX__XX_,XX__XX__
db _XXXXXX_,XX__XX__
db _XX__XX_,XX__XX__
db _XX__XX_,XX___XX_
db ________,________

ch73 label byte
db 20 , 3
db ________,________,________
db ________,________,________
db __XXXX__,XX______,_XXX____
db _XX__XX_,XX______,__XX____
db _XX____X,XXX_XXXX,X_XX____
db _XX_____,XX__XXX_,__XX____
db _XX_____,XX__XX__,__XX____
db _XX_____,XX__XX__,__XX____
db _XX__XX_,XX__XX__,__XX____
db __XXXX__,_XX_XX__,__XX____
db ________,________,________

ch74 label byte
db 9 , 2
db ____XX__,________
db ____XX__,________
db ____XX__,________
db ____XX__,________
db ____XX__,________
db _XXXXXXX,X_______
db __XXXXXX,________
db ___XXXX_,________
db ____XX__,________

ch75 label byte
db 16 , 2
db ____X___,________
db ___XX___,_____XXX
db __XXX___,_____XXX
db _XXXX___,_____XXX
db XXXXXXXX,XXXXXXXX
db XXXXXXXX,XXXXXXXX
db _XXXXXXX,XXXXXXXX
db __XXX___,________
db ___XX___,________
db ____X___,________
```

```
ch76 label byte
DB 4,1
DB ________
DB ________
DB _XXX____
DB _XX_____
DB _XX_____
DB _XX_____
DB _XX_____
DB _XX_____
DB _XX_____
DB _XX_____
DB _XX_____
DB _XX_____
DB _XX_____
DB _XXX____

ch77 label byte
DB 4,01h
DB ________
DB ________
DB XXX_____
DB _XX_____
DB _XX_____
DB _XX_____
DB _XX_____
DB _XX_____
DB _XX_____
DB _XX_____
DB _XX_____
DB _XX_____
DB _XX_____
DB XXX_____

ch78 label byte
db 4,1
db ________

ch79 label byte
db 7,1
db XXXXXXX_
db X_____X_
db X_XXX_X_
db X_XXX_X_
db X_XXX_X_
db X_XXX_X_
db X_____X_
db XXXXXXX_

ch80 label byte
db 16,2
db XXXXXXXX,XXXXXXXX
db XXXXXXXX,XXXXXXXX
db X_______,_______X
db X_______,_______X
db X_______,_______X
db X_______,_______X
db X_______,_______X
db X_______,_______X
db XXXXXXXX,XXXXXXXX

ch81 label byte
DB 8,1
DB ___XX___
DB ___XX___
DB ___XX___
DB _XXXXXX_
DB ___XX___
DB ___XX___
DB ___XX___

ch82 label byte
db 23,3
db __XXXXXX,XXXXXXXX,XXXXXX__
db _XXXXXXX,XXXXXXXX,XXXXXXX_
db _XX_____,________,_____XX_
db _XX_____,________,_____XX_
db _XX_____,________,_____XX_
db _XX_____,________,_____XX_
db _XX_____,________,_____XX_
db _XXXXXXX,XXXXXXXX,XXXXXXX_
db __XXXXXX,XXXXXXXX,XXXXXX__


ch83 label byte

endif

DATASEG_END
end
Copr. 1995 Zenith Data Systems Corp.

.model small
include uibitequ.inc
include uiinclud.inc

DATASEG_BEGIN
extrn ControlDataStorageArea:byte

uifont4 label word
 public uifont4

 db 6
 db 0

 dw ch33,ch34,ch35,ch36,ch37,ch38,ch39
 dw
ch40,ch41,ch42,ch43,ch44,ch45,ch46,ch47,ch48,ch4
9
 dw ch50,ch51,ch52,ch53,ch54


ch33 label byte
DB 16,002h
db XXXXXXXX,XXXXXXXX
db XXXXXXXX,XXXXXXXX


ch34 label byte


ch35 label byte
DB ?,001h
db ?4 dup(XX______)

ch36 label byte
db 22,3
db _______X,XXXXXXX_,_______
db _____XXX,XXXXXXXX,X_______
db ____XXXX,___XXXXX,XX______
db ___XXX__,___XXXXX,XXX_____
db __XX____,___XXXXX,XXXX____
db _XX_____,___XXXXX,XXXXX___
db _XX_____,___XXXXX,XXXXX___
db XX______,___XXXXX,XXXXXX__
db XX______,___XXXXX,XXXXXX__
db XX______,___XXXXX,XXXXXX__
db XX______,___XXXXX,XXXXXX__
db XX______,___XXXXX,XXXXXX__
db XX______,___XXXXX,XXXXXX__
db _XX_____,___XXXXX,XXXXX___
db _XX_____,___XXXXX,XXXXX___
db __XX____,___XXXXX,XXXX____
db ___XXX__,___XXXXX,XXX_____
db ____XXXX,___XXXXX,XX______
db _____XXX,XXXXXXXX,X_______
db _______X,XXXXXXX_,_______

ch37 label byte
db 40,5
db
________,________,___XX___,________,________
db
________,________,___XX___,________,________
db
________,________,___XX___,________,________
db
____XX__,________,___XX___,________,__XX___
_
db
____XXX_,________,________,________,_XXX___
_
db
_____XXX,________,________,________,XXX____
_
db
______XX,X_______,XXXXXXXX,_______X,XX_____
__
db
_______X,XX____XX,XXXXXXXX,XX____XX,X______
___
db
________,XXX__XXX,XXXXXXXX,XXX__XXX,________
db
________,____XXXX,XXXXXXXX,XXXX____,________
db
________,___XXXXX,XXXXXXXX,XXXXX___,________
db
________,__XXXXXX,XXXXXXXX,XXXXXX__,________
db
________,__XXXXXX,XXXXXXXX,XXXXXX__,________
db
________,_XXXXXXX,XXXXXXXX,XXXXXXX_,________
db
________,_XXXXXXX,XXXXXXXX,XXXXXXX_,________
db
XXXXXX__,_XXXXXXX,XXXXXXXX,XXXXXXX_,__
XXXXXX
db
XXXXXX__,_XXXXXXX,XXXXXXXX,XXXXXXX_,__
XXXXXX
db
________,_XXXXXXX,XXXXXXXX,XXXXXXX_,________
db
________,_XXXXXXX,XXXXXXXX,XXXXXXX_,________
db
________,__XXXXXX,XXXXXXXX,XXXXXX__,________
db
________,__XXXXXX,XXXXXXXX,XXXXXX__,________
db
________,___XXXXX,XXXXXXXX,XXXXX___,________
db
________,____XXXX,XXXXXXXX,XXXX____,________
db
________,XXX__XXX,XXXXXXXX,XXX__XXX,________
db
_______X,XX___XX,XXXXXXXX,XX___XX,X________
db
______XX,X_______,XXXXXXXX,_______X,XX_____
db
_____XXX,________,________,________,XXX____
db
____XXX_,________,________,________,_XXX___
db
____XX__,________,___XX___,________,__XX___
db
________,________,___XX___,________,________
db
________,________,___XX___,________,________
db
________,________,___XX___,________,________


ch38 label byte
db 36,5
db
________,________,________,________,________
db
________,________,________,________,________
db
________,________,________,________,________
db
________,________,___XXXXX,X_______,________
db
________,________,______XX,________,________
db
XX______,___XXXXX,_____XX_,________,________
db
XX______,______X_,____XX__,________,________
db
XX______,_____X__,___XXXXX,X_______,________
db
XX______,___XXXXX,________,________,________
db
XX_XXX__,________,________,________,________
db
XX_XXXX_,XXXX____,X_______,________,________
db
XX_XXXXX,XXXXX_XX,________,________,________
db
XX_XXXXX,XXXXXXXX,________,________,__XX_
db
XX______,________,________,________,__XX____
db
XXXXXXXX,XXXXXXXX,XXXXXXXX,XXXXXXXX,X
XXX____
db
XXXXXXXX,XXXXXXXX,XXXXXXXX,XXXXXXXX,X
XXX____
db
XX______,________,________,________,__XX____
db
XX______,________,________,________,__XX____
db
XX______,________,________,________,__XX____
db
XX______,________,________,________,__XX____

ch39 label byte
db 30,4
db ___XXXXX,XXXXXXXX,XXXXXXXX,XXXX____
db __XXXXXX,XXXXXXXX,XXXXXXXX,XXXXX___
db __XXXXXX,XXXXXXXX,XXXXXXXX,XXXXX___
db __XXXXXX,XXXXXXXX,XXXXXXXX,XXXXX___
db __XXXX__,________,________,_XXXX___
db __XXXX__,________,________,_XXXX___
db __XXXX__,_XXXXX__,_XXXXX__,_XXXX___
db __XXXX__,_XXXXX__,_XXXXX__,_XXXX___
db __XXXX__,________,________,_XXXX___
db __XXXX__,__XX____,___XX___,_XXXX___
db __XXXX__,________,________,_XXXX___
db __XXXX__,________,________,_XXXX___
db __XXXX__,______XX,XX______,_XXXX___
db __XXXX__,________,________,_XXXX___
db __XXXX__,_XX_____,_____XX_,_XXXX___
db __XXXX__,__XXXXXX,XXXXXX__,_XXXX___
db ___XXX__,___XXXXX,XXXXX___,_XXX____
db ___XXX__,________,________,_XXX____
db ___XXX__,________,________,_XXX____
db ___XXXXX,XXXXXXXX,XXXXXXXX,XXXX____
db ____XXXX,XXXXXXXX,XXXXXXXX,XXX_____
db _____XXX,XXXXXXXX,XXXXXXXX,XX______

ch40 label byte
db 17,3
db _XX_____,_____XX,________
db XXXX____,____XXX,X_______
db XXXXX___,____XXXX,X______
db _XXXXX__,__XXXXX,________
db _XXXXX_,__XXXXX_,________
db __XXXXX,_XXXXX__,________
db ___XXXX,XXXXX___,________
db ____XXX,XXXX____,________
db _____XX,XXX_____,________
db ____XXX,XXXX____,________
db ___XXXX,XXXXX___,________
db __XXXXX,_XXXXX__,________
db _XXXXX_,__XXXXX_,________
db _XXXXX__,__XXXXX,________
db XXXXX___,____XXXX,X______
db XXXX____,____XXX,X_______
db _XX_____,_____XX,________


ch41 label byte
db 78,10
db
________,________,________,________,________,
________,________,__
________,________
db
___XXXX,_XXXXX_,__XXX__X,XX_XXX__,XXXX
__XX,XXXX__XX,XXXX____XX
_____X,XXXXXX__,________
db
__XX___X,X__X___X,X_X___X,___X___X,___X__
X_______XX,___XX___XX
X_____XX,___XXX,________
db
_XX_____X___X,___X_X____X,___X___X,_________
X_______XX,____XX___XX
X_____XX_____X,X_______
db
_X_______X_____X___X_____X___X______X
________XX,___XX___X_
XX____XX_______X_______
db
XX_______X___XX____X_____X___X___XXX__
XX,XXX___XX_____XX,X,X_
XX____XX_______XX______
db
XX_____X_XX___X____X_____X___X___X__
X________XX____X___X__
_X_____XX______XX______
db
XX_______X___X____X____X___X___X___X___X
_______XX,_XXX___XX,XX
XXX___XX_______XX______
db
XX_______X___X____X____X___X___X___X___X__
X_______XX_______X___
_XX___XX_______X_______
db
XX_______XX___X___XXXX___XXX___XXX__
_XX,XXXX___XX_____XX___
_XX___XX______X,X______
db
_X______________________________
________XX______X___
__XX___XX_____XX______
db
_XX_____X_______________________
________XX______X___
__XX__,XXXXXXX________
db
__XXX__X,XX______,________,________,________
________,________
```

```
________,_________,________
db
____XXXX,_________,_________,_________,_________
X,XXXXXXX_,______X__,__
________,_________,________
db
________,_________,_________,_________,XXXXXXX
X,XXXXXXXX,XXXXXXXX,XX
XXXXXX,XXX______,_XXX____
db
________,_________,______XXX,______XXX,XXXXXX
XX,XXXXXXXX,XXXXXXXX,XX
XXXXXX,XXXXXXXX,XXXXXXX_
db
________,________X,XXXXXXXX,XXXXXXXX,XXXX
XXXX,XXXXXXXX,XXXXXX__,__
__XXXX,XX__XXXX,XXXXX___
db
________,__XXXXXX,XXXXXXXX,XXXXXXXX,XXX
XXXXX,XXXXX_XX,X________,__
________,_________,________
db
______XX,XXXXXXXX,XXXXXXXX,XXXXXXXX,XX
XXXXX_,_________,_________,__
________,_________,________
db
__XXXXXX,XXXXXXXX,XXXXXXXX,XXXXXXXX,XX
________,_________,________,__
________,_________,________
db
XXXXXXXX,XXXXXXXX,XXX__XXX,XXX______,____
________,_________,_________,__
________,_________,________
db
XXXXXXXX,XXXXXXXX,X________,_________,_____
________,_________,_________,__
________,_________,________
db
__XXXXXX,XXXXXX__,_________,_________,_______
__,_________,_________,__
________,_________,________

ch42 label byte
db 38 , 5
db
XXXXXXXX,XXXXXXXX,XXXXXXXX,XXXXXXXX,X
XXXXX__
db
X_______,_________,_________,_________,_____X__
db
X_______,_________,_________,_________,_____X__
db
X_______,_________,_________,_________X,XXX__X_
_
db
X_______,_________,_________,_________X,XXX__X_
_
db
X_____XX,XXXXXXXX,XXXXXXXX,XX_____X,XXX
__X__
db
X____XXX,XXXXXXXX,XXXXXXXX,XXX____X,XXX
__X__
db
X____XXX,XXXXXXXX,XXXXXXXX,XXX____X,XXX
__X__
db
X____XXX,XXXXXXXX,XXXXXXXX,XXX____X,XXX
__X__
db
X____XXX,XXXXXXXX,XXXXXXXX,XXX____X,XXX
__X__
db
X____XXX,XXXXXXXX,XXXXXXXX,XXX____X,XXX
__X__
db
X____XXX,XXXXXXXX,XXXXXXXX,XXX____X,XXX
__X__
db
X____XXX,XXXXXXXX,XXXXXXXX,XXX____X,XXX
__X__
db
X____XXX,XXXXXXXX,XXXXXXXX,XXX____X,XXX
__X__
db
X____XXX,XXXXXXXX,XXXXXXXX,XXX____X,XXX
__X__
db
X____XXX,XXXXXXXX,XXXXXXXX,XXX____X,XXX
__X__
db
X____XXX,XXXXXXXX,XXXXXXXX,XXX____X,XXX
__X__
db
X____XXX,XXXXXXXX,XXXXXXXX,XXX____X,XXX
__X__
db
X_____XX,XXXXXXXX,XXXXXXXX,XX_____X,XXX
__X__
```

```
db
X_______,_________,_________,_______X,XXX__X_
_
db
X_______,_________,_________,_______X,XXX__X_
_
db
X_______,_________,_________,______XX,XXX__X_
_
db
X__XXXXX,X_______,______XXX,XXXXXXXX,XXX_
_X__
db
X__XX___,_________,_________,_XXXXXXX,XXX__X
__
db
X__XXXXX,XXXXXXXX,XXXXXXXX,XXXXXXXX,XX
X__X__
db
X_______,_________,_________,_________,_XX__X__
db
X_______,_________,_________,_________,_XX__X__
db
X_______,_________,_______X,XXXXXX__,_XX__X
__
db
X_______,_________,______XX,XXXXXXX_,_XX__X
__
db
X_______,_________,______XX,XXXXXXX_,_XX__X
__
db
X_______,_________,_______X,XXXXXX__,_XX__X
__
db
X_,_______,_________,_________,_________XX__X__
db
X_______,_________,_________,_________,_XX__X__
db
X__XXXXX,XXXXXXXX,XXXXXXXX,XXXXXXXX,XX
X__X__
db
X__XXXXX,XXXXXXXX,XXXXXXXX,XXXXXXXX,XX
X__X__
db
X_______,_________,_________,_________,_____X__
db
X_______,_________,_________,_________,_____X__
db
XXXXXXXX,XXXXXXXX,XXXXXXXX,XXXXXXXX,X
XXXXX__

ch43 label byte
db 38 , 5
db
XXXXXXXX,XXXXXXXX,XXXXXXXX,XXXXXXXX,X
XXXXX__
db
X_______,_________,_________,_________,_____X__
db
X__XXXXX,XXXXXXXX,XXXXXXXX,XXXXXXXX,XX
X__X__
db
X__XXXXX,XXXXXXXX,XXXXXXXX,XXXXXXXX,XX
X__X__
db
X__XXXXX,XXXXXXXX,XXXXXXXX,XXXXXXXX,XX
X__X__
db
X__XX__X,XXXXXXXX,XXXXXXXX,XXXXXXXX,XX
X__X__
db
X__X___X,XXXXXXXX,XXXXXXXX,XXXXXXXX,XX
X__,__
db
X____XX,_XXXXXXX,XXXXXXXX,XXXXXXXX,XX
X__X__
db
X____XX_,___XXXXX,XXXXXXXX,XXXXXXXX,XXX
__X__
db
X__XX___,______XXX,XXXXXXXX,XXXXXXXX,XXX
__X__
db
X__XX___,_________,_XXXXXXX,XXXXXXXX,XXX_
_X__
db
X__X____,_________,_________,_XXXXXXX,XXX__X
__
db
X__X____,_________,_________,__XXXXXX,XXX__X
__
db
X__X____,_________,_________,_XXXXXXX,XXX__X
__
db
X__XX___,_________,______XXX,XXXXXXXX,XXX__
X__
```

```
db
X__XXX__,_________,______XX,XXXXXXXX,XXX__
X__
db
X__XXXX_,_________,_______X,XXXXXXXX,XXX__
X__
db
X__XXXXX,_________,_________XXXXXXXX,XXX__
X__
db
X__XXXXX,X_______,___X____,_XXXXXXX,XXX__
X__
db
X__XXXXX,XX______,__XXXX__,__XXXXXX,XXX_
_X__
db
X__XXXXX,XXX_____,XXXXXXX_,_XXXXXXX,XXX
__X__
db
X__XXXXX,XXXXX__X,XXXXXXXX,X________,______
_X__
db
X__XXXXX,XXXXXXXX,XXXXXXXX,X__XXXXX,X_
__X__
db
X__XXXXX,XXXXXXXX,XXXXXXXX,X_XX_XX_,XX
__X__
db
X__XXXXX,XXXXXXXX,XXXXXXXX,X_XX_XX_,XX
__X__
db
X__XXXXX,XXXXXXXX,XXXXXXXX,X_XX____,XX_
_X__
db
X__XXXXX,XXXXXXXX,XXXXXXXX,X_XX_XX_,XX
__X__
db
X__XXXXX,XXXXXXXX,XXXXXXXX,X_XX_XX_,XX
__X__
db
X__XXXXX,XXXXXXXX,XXXXXXXX,X_XXXXXX,XX
__X__
db
X__XXXXX,XXXXXXXX,XXXXXXXX,X__XXXXX,X_
__X__
db
X__XXXXX,XXXXXXXX,XXXXXXXX,X_______,_____
_X__
db
X__XXXXX,XXXXXXXX,XXXXXXXX,XX______,____
__X__
db
X__XXXXX,XXXXXXXX,XXXXXXXX,XXXXXXXX,XX
X__X__
db
X__XXXXX,XXXXXXXX,XXXXXXXX,XXXXXXXX,XX
X__X__
db
X_______,_________,_________,_________,_____X__
db
X_______,_________,_________,_________,_____X__
db
X_______,_________,_________,_________,_____X__
db
XXXXXXXX,XXXXXXXX,XXXXXXXX,XXXXXXXX,X
XXXXX__

ch44 label byte
db 38 , 5
db
XXXXXXXX,XXXXXXXX,XXXXXXXX,XXXXXXXX,X
XXXXX__
db
X_______,_________,_________,_________,_____X__
db
X__XXXXX,XXXXXXXX,XXXXXXXX,XXXXXXXX,XX
X__X__
db
X__XXXXX,XXXXXXXX,XXXXXXXX,XXXXXXXX,XX
X__X__
db
X__XXXXX,XXXXX_XX,XXXXXXX_,XXXXXXXX,XX
X__X__
db
X__XXXXX,XXXX__XX,XXXXXXX_,_XXXXXXX,XX
X__X__
db
X__XXXXX,XXX___XX,XXXXXXX_,__XXXXXX,XXX
__X__
db
X__XXXXX,XX____XX,XXXXXXX_,___XXXXX,XXX
__X__
db
X__XXXXX,XX____XX,XXXXXXX_,___XXXXX,XXX
__X__
db
X__XXXXX,X_____XX,XXXXXXX_,____XXXX,XXX_
_X__
```

```
db
X__XXXXX,X_____XX,XXXXXXX_,____XXXX,XXX_
_X__
db
X__XXXXX,X_____XX,XXXXXXX_,____XXXX,XXX_
_X__
db
X__XXXXX,X_____XX,XXXXXXX_,____XXXX,XXX_
_X__
db
X__XXXXX,X_____XX,XXXXXXX_,____XXXX,XXX_
_X__
db
X__XXXXX,XX_____X,XXXXXX__,___XXXXX,XXX_
_X__
db
X__XXXXX,XX______,XXXXX___,___XXXXX,XXX_
_X__
db
X__XXXXX,XXX_____,_________,__XXXXXX,XXX__
X__
db
X__XXXXX,XXXX____,_________,_XXXXXXX,XXX_
_X__
db
X__XXXXX,XXXXX___,_________,XXXXXXXX,XXX_
_X__
db
X__XXXXX,XXXXXX__,________X,XXXXXXXX,XXX
__X__
db
X__XXXXX,XXXXXX__,XXXXX__X,XXXXXXXX,XX
X__X__
db
X__XXXXX,XXXXXX__,X______X,XXXXXXXX,XXX
__X__
db
X__XXXXX,XXXXXX__,X______X,XXXXXXXX,XXX
__X__
db
X__XXXXX,XXXXXX__,X______X,XXXXXXXX,XXX
__X__
db
X__XXXXX,XXXXXX__,X______X,XXXXXXXX,XXX
__X__
db
X__XXXXX,XXXXXX__,X______X,XXXXXXXX,XXX
__X__
db
X__XXXXX,XXXXXX__,X______X,XXXXXXXX,XXX
__X__
db
X__XXXXX,XXXXXX__,X______X,XXXXXXXX,XXX
__X__
db
X__XXXXX,XXXXXX__,X______X,XXXXXXXX,XXX
__X__
db
X__XXXXX,XXXXXX__,X______X,XXXXXXXX,XXX
__X__
db
X__XXXXX,XXXXXX__,X______X,XXXXXXXX,XXX
__X__
db
X__XXXXX,XXXXXX__,X______X,XXXXXXXX,XXX
__X__
db
X__XXXXX,XXXXXX__,X______X,XXXXXXXX,XXX
__X__
db
X__XXXXX,XXXXXX__,X______X,XXXXXXXX,XXX
__X__
db
X__XXXXX,XXXXXX__,X______X,XXXXXXXX,XXX
__X__
db
X_______,_________,_________,_________,_____X__
db
X_______,_________,_________,_________,_____X__
db
XXXXXXXX,XXXXXXXX,XXXXXXXX,XXXXXXXX,X
XXXXX__

ch45 label byte
db 38 , 5
db
XXXXXXXX,XXXXXXXX,XXXXXXXX,XXXXXXXX,X
XXXXX__
db
X_______,_________,_________,_________,_____X__
db
X__XXXXX,XXXXXXXX,XXXXXXXX,XXXXXXXX,XX
X__X__
db
X__XXXXX,XXXXXXXX,XXXXXXXX,XXXXXXXX,XX
X__X__
db
X__XXXXX,XXXXXXXX,XXXXXXXX,XXXXXXXX,XX
X__X__
```

```
db
X__XXXXX,XXXXXXXX,XXXXXXXX,XXXXXXXX,XX
X__X__
db
X__XXXXX,XXXXXXXX,X_______,________,_____
X__
db
X__XXXXX,XXXXX___,________,________,_____X
__
db
X__XXXXX,XX______,________,________,_____X_
_
db
X__XXXXX,________,________,________,_____X_
_
db
X__XXXX_,________,________,________,_____X_
_
db
X__XXXX_,________,________,________,_____X_
_
db
X__XXX__,________,XXXX____,________,_____X_
_
db
X__XXX__,________,_X__X___,_XXXXXXX,XXX__
X__
db
X__XXXXX,XXXXXXXX,XX__XXXX,XXXXXXXX,XX
X__X__
db
X__XXX__,_______X,XX__XXXX,XXXXXXXX,XXX_
_X__
db
X__XXX__,____XXXX,________,________,_____X_
_
db
X__XXX__,____X___,________,________,_____X_
_
db
X__XXXX_,___XX_XX,XXXXXXXX,XXXXXXXX,XX
X__X__
db
X__XXXXX,XXXX__XX,XXXXXX__,_XX___XX,____
_X__
db
X__XXXXX,XXX__XXX,XXXXXX__,_XX___XX,____
_X__
db
X__XXXXX,XXX_XXXX,XXXXXXXX,XXXXXXXX,XX
X__X__
db
X__XXXXX,XX__XXXX,XXXXXX__,_XX___XX,____
_X__
db
X__XXXXX,XX_XXXXX,XXXXXX__,_XX___XX,____
_X__
db
X__XXXXX,X__XXXXX,XXXXXXXX,XXXXXXXX,XX
X__X__
db
X__XXXXX,X__XXXXX,XXXXXX__,_XX___XX,____
_X__
db
X__XXXXX,X_XXXXXX,XXXXXX__,_XX___XX,____
_X__
db
X__XXXXX,__XXXXXX,XXXXXX__,_XX___XX,____
_X__
db
X__XXXXX,__XXXXXX,XXXXXXXX,XXXXXXXX,XX
X__X__
db
X__XXXXX,________,________,________,_____X_
_
db
X__XXXXX,XXXXXXXX,XXXXXXXX,XXXXXXXX,XX
X__X__
db
X__XXXXX,________,________,________,_____X_
_
db
X__XXXXX,________,________,________,_____X_
_
db
X__XXXXX,________,________,________,_____X_
_
db
X__XXXXX,________,________,________,_____X_
_
db
X_______,________,________,________,_____X__
db
X_______,________,________,________,_____X__
db
XXXXXXXX,XXXXXXXX,XXXXXXXX,XXXXXXXX,X
XXXXX__

ch46 label byte
db 38 , 5
db
XXXXXXXX,XXXXXXXX,XXXXXXXX,XXXXXXXX,X
XXXXX__
db
X_______,________,________,________,_____X__
db
X__XXXXX,XXXXXXXX,XXXX____,________,_____
X__
db
X__XXXXX,XXXXXXXX,XXX_____,________,__X__
X__
db
X__XXXXX,XXXXXXXX,XX______,________,_XX__
X__
db
X__XXXXX,XXXXXXXX,X_______,________,XXX__
X__
db
X__XXXXX,XXXXXXXX,________,_______X,XXX__
X__
db
X__XXXXX,XXXXXXXX,________,______XX,XXX_
_X__
db
X__XXXXX,XXXXXXX_,________,________,_XX__
X__
db
X__XXXXX,XXXXXX__,________,________,XXX__
X__
db
X__XXXXX,XXXXX___,________,_______X,XXX__
X__
db
X__XXXXX,XXXX____,________,______XX,XXX__
X__
db
X__XXXXX,XXX_____,________,_____XXX,XXX__
X__
db
X__XXXXX,XXXXXXXX,________,____XXXX,XXX_
_X__
db
X__XXXXX,XXXXXXX_,________,___XXXXX,XXX_
_X__
db
X__XXXXX,XXXXXX__,________,__XXXXXX,XXX_
_X__
db
X__XXXXX,XXXXX___,________,_____XXX,XXX__
X__
db
X__XXXXX,XXXXX___,________,____XXXX,XXX__
X__
db
X__XXXXX,XXXX____,________,___XXXXX,XXX__
X__
db
X__XXXXX,XXX_____,________,__XXXXXX,XXX__
X__
db
X__XXXXX,XX______,________,_XXXXXXX,XXX__
X__
db
X__XXXXX,X_______,________,XXXXXXXX,XXX__
X__
db
X__XXXXX,________,_______X,XXXXXXXX,XXX__
X__
db
X__XXXXX,XXXXXX__,______XX,XXXXXXXX,XXX
__X__
db
X__XXXXX,XXXXX___,_____XXX,XXXXXXXX,XXX
__X__
db
X__XXXXX,XXXX____,____XXXX,XXXXXXXX,XXX
__X__
db
X__XXXXX,XXX_____,___XXXXX,XXXXXXXX,XXX
__X__
db
X__XXXXX,XXX_____,__XXXXXX,XXXXXXXX,XXX
__X__
db
X__XXXXX,XX______,_XXXXXXX,XXXXXXXX,XXX
__X__
db
X__XXXXX,X_______,XXXXXXXX,XXXXXXXX,XXX
__X__
db
X__XXXXX,X______X,XXXXXXXX,XXXXXXXX,XXX
__X__
db
X__XXXXX,______XX,XXXXXXXX,XXXXXXXX,XXX
__X__
db
X__XXXX_,_____XXX,XXXXXXXX,XXXXXXXX,XXX
__X__
db
X__XXX__,____XXXX,XXXXXXXX,XXXXXXXX,XXX
__X__
db
X_______,________,________,________,_____X__
db
X_______,________,________,________,_____X__
db
XXXXXXXX,XXXXXXXX,XXXXXXXX,XXXXXXXX,X
XXXXX__

ch47 label byte
db 38 , 5
db
XXXXXXXX,XXXXXXXX,XXXXXXXX,XXXXXXXX,X
XXXXX__
db
X_______,________,________,________,_____X__
db
X__XXXXX,XXXXXXXX,XXXXXXXX,XXXXXXXX,XX
X__X__
db
X__XXXXX,XXXXXXXX,XXXXXXXX,XXXXXXXX,XX
X__X__
db
X__XXXX_,________,________,________,_____X_
_
db
X__XXX__,________,________,________,_____X_
_
db
X__XXX__,________,________,________,_____X_
_
db
X__XXX__,________,________,________,_____X_
_
db
X__XXX__,________,________,________,_____X_
_
db
X__XXX__,__XXXXXX,XXXXXXXX,XXXXXXXX,XX
X__X__
db
X__XXX__,__X__XXX,XXXXXXXX,XXXXXXXX,XXX
__X__
db
X__XXX__,__XXXXXX,XXXXXXXX,XXXXXXXX,XX
X__X__
db
X__XXX__,__X__XXX,XXXXXXXX,XXXXXXXX,XXX
__X__
db
X__XXX__,__XXXXXX,XXXXXXXX,XXXXXXXX,XX
X__X__
db
X__XXX__,__X__XXX,XXXXXXXX,XXXXXXXX,XXX
__X__
db
X__XXX__,__XXXXXX,XXXXXXXX,XXXXXXXX,XX
X__X__
db
X__XXX__,__X__XXX,XXXXXXXX,XXXXXXXX,XXX
__X__
db
X__XXX__,__XXXXXX,XXXXXXXX,XXXXXXXX,XX
X__X__
db
X__XXX__,__X__XXX,XXXXXXXX,XXXXXXXX,XXX
__X__
db
X__XXX__,__XXXXXX,XXXXXXXX,XXXXXXXX,XX
X__X__
db
X__XXX__,__X__XXX,XXXXXXXX,XXXXXXXX,XXX
__X__
db
X__XXX__,__XXXXXX,XXXXXXXX,XXXXXXXX,XX
X__X__
db
X__XXX__,__X__XXX,XXXXXXXX,XXXXXXXX,XXX
__X__
db
X__XXX__,__XXXXXX,XXXXXXXX,XXXXXXXX,XX
X__X__
db
X__XXXX_,__X__XXX,XXXXXXXX,XXXXXXXX,XX
X__X__
db
X__XXXX_,__XXXXXX,XXXXXXXX,XXXXXXXX,XX
X__X__
db
X__XXXX_,__X__XXX,XXXXXXXX,XXXXXXXX,XX
X__X__
db
X__XXXX_,__XXXXXX,XXXXXXXX,XXXXXXXX,XX
X__X__
db
X__XXXX_,________,________,________,_____X_
_
db
X__XXXX_,________,________,________,_____X_
_
db
X__XXXXX,________,________,________,_____X_
_
db
X__XXXXX,X_______,________,________,_____X_
_
db
X__XXXXX,XXXXXXXX,XXXXXXXX,XXXXXXXX,XX
X__X__
db
X__XXXXX,XXXXXXXX,XXXXXXXX,XXXXXXXX,XX
X__X__
db
X__XXXXX,XXXXXXXX,XXXXXXXX,XXXXXXXX,XX
X__X__
db
X_______,________,________,________,_____X__
db
X_______,________,________,________,_____X__
db
XXXXXXXX,XXXXXXXX,XXXXXXXX,XXXXXXXX,X
XXXXX__

ch48 label byte
db 35 , 5
db
____XX_,________,________,________,________
db
___XXX_,________,________,________,________
db
__XXX__X,________,________,________,________
db
_XXX__X,XXX_____,________,________,________
_
db
_XX__XX,XXXXX___,________,________,________
_
db
_XX__XXX,XXXXXXXX,X_______,________,_______
__
db
_XX_XXXX,XXXXXXXX,XXXXXXXX,X_______,____
____
db
____XXXX,XXXXXXXX,XXXXXXXX,XX______,____
____
db
____XXXX,XXXXXXXX,XXXXXXXX,X_______,____
___
db
_____XXX,XXXXXXXX,XXXXX___,________,____
___
db
______XX,XXXXXXXX,XXXXXX__,________,____
___
db
_______X,XXXXXXXX,XXXXXXX_,________,____
___
db
________,XXXXXXXX,XXXXXXXX,________,____
___
db
________,_XXXXXXX,XXX_XXXX,X_______,____
___
db
________,__XXXXXX,XX____XX,XX______,______
__
db
________,___XXXXX,_______X,X_______,______
_
db
________,_____XX_,________,_XXXXXXX,XXX__
__
db
________,________,________,_XX_____,_XXX__
_
db
________,________,________,_X___X_,__XX___
db
________,________,________,_X__XX_,__XX___
_
db
________,________,________,_X___X_,__XX___
db
________,________,________,_X___X_,__XX___
db
________,________,________,_X___X_,__XX___
db
________,________,________,_X___X_,__XX___
db
________,________,________,_XX_____,_XXX__
_
```

```
db
________,________,________,_XXXXXXX,XXXX__
__
db
________,________,________,__XXXXXX,XXXX__
__

ch49 label byte
db 35 , 5
db
_____XX_,________,________,________,________
db
____XXX_,________,________,________,________
db
___XXX__,X_______,________,________,________
db
__XXX__X,XXX_____,________,________,_______
_
db
__XX__XX,XXXXX___,________,________,_______
_
db
_XX__XXX,XXXXXXXX,X_______,________,_______
__
db
_XX_XXXX,XXXXXXXX,XXXXXXXX,X_______,____
____
db
____XXXX,XXXXXXXX,XXXXXXXX,XX______,____
____
db
____XXXX,XXXXXXXX,XXXXXXXX,X_______,____
____
db
_____XXX,XXXXXXXX,XXXXX___,________,_____
___
db
______XX,XXXXXXXX,XXXXXX__,________,_____
___
db
_______X,XXXXXXXX,XXXXXXX_,________,_____
___
db
________,XXXXXXXX,XXXXXXXX,________,_____
___
db
________,_XXXXXXX,XXX_XXXX,X_______,_____
___
db
________,__XXXXXX,XX____XX,XX______,______
_
db
________,___XXXXX,_______X,X_______,_______
_
db
________,_____XX_,________,_XXXXXXX,XXX___
__
db
________,________,________,_XX_____,_XXX___
_
db
________,________,________,_X___XX_,__XX___
_
db
________,________,________,_X__X__X,__XX___
_
db
________,________,________,_X_____X,__XX____
db
________,________,________,_X___XX_,__XX___
_
db
________,________,________,_X__XX__,__XX___
_
db
________,________,________,_X__XXXX,__XX___
_
db
________,________,________,_XX_____,_XXX___
_
db
________,________,________,_XXXXXXX,XXXX__
__
db
________,________,________,__XXXXXX,XXXX__
__

ch50 label byte
db 78 , 10
db
________,________,________,________,________,
________,________,__
________,________,________
db
____XXXX,__XXXXX_,__XXX__X,XX_XXX__,XXXX
__XX,XXXX__XX,XXXX____,XX
_____X,XXXXXX__,________
db
__XX___X,X__X___X,X__X____,X___X__X,___X__
______XX,___XX___,XX
X_____,XX___XXX,________
db
_XX_____,X__X____,X__X____,X___X__X,______
X_,______XX,____XX__,XX
X_____,XX_____X,X_______
db
_X______,___X____X__X____,X___X__X,______X
_,______XX,____XX__X_
XX____,XX______,X_______
db
XX______,___X__XX,___X____,X___X___,XXX___
XX,XXX___XX,____XX_X,X_
XX____,XX______,XX______
db
XX _____,___X_XX_,___X____,X___X___,___X__
X__ _____XX,____X__X,__
_X____,XX______,XX______
db
XX______,___X__X_,___X____,X___X___,___X__X
_,______XX,_XXX__XX,XX
XXX___,XX______,XX______
db
XX______,___X___X,___X____,X___X__X,___X__
X_,______XX,______X_,__
_XX___,XX______,X_______
db
XX______,___XX___,X___XXXX,___XXX__,XXX__
_XX,XXXX__XX,_____XX_,__
_XX___,XX_____X,X_______
db
_X______,________,________,________,________,
______XX,_____X__,__
__XX__,XX____XX,________
db
_XX_____,_X______,________,________,________
,______XX,_____X__,__
__XX__,XXXXXXX_,________
db
__XXX__X,XX______,________,________,________
_,________,________,__
________,________,________
db
____XXXX,________,________,________,________
,________,________,__
________,________,________

ch51 label byte
db 36,5
db
________,________,________,_____XXX,XXXX___
_
db
___ _____,________,________,________,_XX_____
db
________,________,________,________,XX______
db
________,________,_____XXX,XXX____X,X______
_
db
________,______XX,XXX_____,XX____XX,______
_
db
XX______,XXXX____,X_______X,X____XX_,______
__
db
XX______,__X____X,______XX,____XXXX,XXXX__
__
db
XX______,_X____XX,XXX__XXX,XXX_____,______
__
db
XX______,XXXX____,________,________,________
_
db
XX_XXX__,________,________,________,________
_
db
XX_XXXX_,XXXX____,X_______,________,______
__
db
XX_XXXXX,XXXXX_XX,________,________,______
__
db
XX_XXXXX,XXXXXXXX,________,________,__XX_
___
db
XX______,________,________,________,__XX____
db
XXXXXXXX,XXXXXXXX,XXXXXXXX,XXXXXXXX,X
XXX____
db
XXXXXXXX,XXXXXXXX,XXXXXXXX,XXXXXXXX,X
XXX____
db
XX______,________,________,________,__XX____
db
XX______,________,________,________,__XX____
db
XX______,________,________,________,__XX____
db
XX______,________,________,________,__XX____

ch52 label byte
db 16,2
db _XXXXXXX,XXXXXXX_
db X_______,_______X
db X__XXXX_,_XXXX__X
db X___XX__,__XX___X
db X_______,_______X
db X_____XX,XX_____X
db X_X_____,_____X_X
db X__XXXXX,XXXXX__X
db X_______,_______X
db _XXXXXXX,XXXXXXX_

ch53 label byte
db 11,2
db XX______,_XX_____
db _XX_____,XX______
db __XX___X,X_______
db ___XX_XX,________
db ____XX__,________
db ___XX_XX,________
db __XX___X,X_______
db _XX_____,XX______
db XX______,_XX_____

ch54 label byte
DATASEG_END
end

Copr 1995 Zenith Data Systems Corp.
.model small
include uiinclud.inc

WORKBUF equ "                    ",0

VCENT=480/2

HCENT=640/2

DWIDE=MAXMESSAGELINE

DHIGH=248

DLEFT=HCENT-(DWIDE/2)

DTOP=VCENT-(DHIGH/2)


DATASEG_BEGIN
BEGIN_FORM_DEFINITIONS


mainform label tCONTROL
  public MainForm

mnuToolbar label tControl
  public mnuToolBar
  BEGIN_TOOLBAR %INVISIBLE,0,0,640,96
  FONT=BIGFONT
  ENGLISH
  CAPTION "CruisePAD Setup"



cmdAbout label tControl
  public cmdAbout
  MAKE_ABOUTBUTTON %NORMSTATE,0,0,32,33

CmdHost label tCONTROL
  public CmdHost
  BEGIN_TOOLBARBUTTON %ISDOWN,0,0,104,64

  GRAPHIC_CAPTION HOST_ICON
  FONT=SMALLFONT
  ENGLISH
  CAPTION "Host"


FrmHost label tCONTROL
  public FrmHost
  NEXTCONTROL=RES_SETUPS_HOST
  BEGIN_FORM

txtCurrentHost label tCONTROL
  public txtCurrentHost
  MAKE_UNFRAMED_EDITBOX
DISABLED,104,16,384,16,48
  ENGLISH
  CAPTION "Current Host:"

CmdDisconnect label tCONTROL
  public CmdDisconnect
  MAKE_COMMANDBUTTON
%NORMSTATE,520,%SAMETOP,88,24
  ENGLISH
  CAPTION "Disconnect"

ChkDimHost label tCONTROL
  public ChkDimHost
  NEXTCONTROL=GETSET_DIM_HOST_SCREEN
  MAKE_CHECKBOX 0,32,%NEXTTOP+8
  ENGLISH
  CAPTION "Dim host screen"



fraConnectionOptions label tControl
  public fraConnectionOptions
  BEGIN_FRAME
%NORMSTATE,0,%NEXTTOP+8,584,96
  MAKE_LINEBOX 0,16,0 ,584,1
  MAKE_LEFTLEGEND 0,32,12
  ENGLISH
  CAPTION "Connection:"


NEXTCONTROL=GETSET_HOST_CONNECTION_
TYPE + (0*256)
optNetwork label tCONTROL
  public optNetwork
  MAKE_OPTIONBUTTON 0,120,%SAMETOP
  ENGLISH
  CAPTION "Network"

optModem label tCONTROL
  public optModem

NEXTCONTROL=GETSET_HOST_CONNECTION_
TYPE + (1*256)
  MAKE_OPTIONBUTTON 0,200,%SAMETOP
  ENGLISH
  CAPTION "Modem"


NEXTCONTROL=GETSET_HOST_CONNECTION_
TYPE + (2*256)
optSerial label tCONTROL
  public optSerial
  MAKE_OPTIONBUTTON 0,280,%SAMETOP
  ENGLISH
  CAPTION "Serial"
END_FRAME

HOSTFRAMETOP=120

fraNetworkConnection label tControl
  public fraNetworkConnection
  BEGIN_FRAME
%NORMSTATE,32,HOSTFRAMETOP,480,96

lstNetworkGroups label tCONTROL
  public lstNetworkGroups

NEXTCONTROL=GETSET_NETWORK_GROUP_E
NTRY
  MAKE_LISTBOX %NORMSTATE,0,0,224,96+16
  ENGLISH
  CAPTION "Groups"

lstNetworkHosts label tCONTROL
  public lstNetworkHosts

NEXTCONTROL=GETSET_NETWORK_HOST_ENT
RY
  MAKE_LISTBOX %NORMSTATE,240,0,224,96+16
  ENGLISH
  CAPTION "Hosts"

cmdNetworkUpdate label tCONTROL
  public cmdNetworkUpdate
  MAKE_COMMANDBUTTON
%NORMSTATE,520-32,%SAMETOP+40,88,24
  ENGLISH
  CAPTION "Update List"

cmdNetworkConnect label tControl
  public cmdNetworkConnect
  MAKE_COMMANDBUTTON
%NORMSTATE,520-32,%NEXTTOP+8 ,88,24
  ENGLISH
  CAPTION "Connect"

END_FRAME
```

```
fraModemConnection label tControl
  public fraModemConnection
BEGIN_FRAME
%INVISIBLE,32,HOSTFRAMETOP,480,96

lstHostPhones label tCONTROL
  public lstHostPhones
NEXTCONTROL=GETSET_MODEM_HOST_DESC
_ENTRY
+(256*GETSET_MODEM_HOST_PHONE_ENTRY)
  MAKE_LISTBOX_NOSCROLL
%NORMSTATE,0,0,480,96+16
  SETTAB 280
  HOSTPHONECAPTION EQU "Hosts",9,"Phone"
  ENGLISH
  CAPTION HOSTPHONECAPTION

cmdEdit label tCONTROL
  public cmdEdit
  MAKE_COMMANDBUTTON
%NORMSTATE,520-32,%SAMETOP+40,88,24
  ENGLISH
  CAPTION "Edit..."

cmdModemConnect label tCONTROL
  public cmdModemConnect
  MAKE_COMMANDBUTTON
%NORMSTATE,520-32,%NEXTTOP+8,88,24
  ENGLISH
  CAPTION "Connect"

END_FRAME

fraSerialConnection label tControl
  public fraSerialConnection
  BEGIN_FRAME
%INVISIBLE,32,HOSTFRAMETOP,480,96

cmdSerialConnect label tCONTROL
  public cmdSerialConnect
  MAKE_COMMANDBUTTON
%NORMSTATE,520-32,0,88,24
  ENGLISH
  CAPTION "Connect"

END_FRAME

txtSerialHost label tCONTROL
  public txtSerialHost


END_FORM
END_TOOLBARBUTTON


cmdHotKeys label tControl
  public cmdHotKeys
  BEGIN_TOOLBARBUTTON
0,%TBBNEXTLEFT,%TBBSAMETOP,%TBBSAMEW
IDE,%TBBSAMEHIGH
  GRAPHIC_CAPTION HOTKEY_ICON
  FONT=SMALLFONT
  ENGLISH
  CAPTION "Hot Keys"

FrmHotKey label tCONTROL
  public FrmHotKey
  NEXTCONTROL=RES_SETUPS_HOTKEYS
  BEGIN_FORM

txtHOTKEY1 label tCONTROL
  public txtHOTKEY1

NEXTCONTROL=GETSET_USER_DEFINED_HOT_
ICON + 256*1
  MAKE_KEY_EDITBOX
%SKIPTAB,64+56-40-16,24,496-40 ,32
  GRAPHIC_CAPTION HAND1_ICON

cmdClearHotKey1 label tCONTROL
  public cmdClearHotKey1
  MAKE_COMMANDBUTTON
%SKIPTAB,%NEXTLEFT+8 %SAMETOP,48,32
  ENGLISH
  CAPTION "Clear"

txtHOTKEY2 label tCONTROL
  public txtHOTKEY2

NEXTCONTROL=GETSET_USER_DEFINED_HOT_
ICON + 256*2
  MAKE_KEY_EDITBOX
%SKIPTAB,64+56-40-16,%NEXTTOP+24,496-40,32
  GRAPHIC_CAPTION HAND2_ICON

cmdClearHotKey2 label tCONTROL
  public cmdClearHotKey2
  MAKE_COMMANDBUTTON
%SKIPTAB,%NEXTLEFT+8 %SAMETOP,48,32
  ENGLISH
  CAPTION "Clear"

END_FORM
END_TOOLBARBUTTON

cmdMaintenance label tControl
  public cmdMaintenance
  BEGIN_TOOLBARBUTTON
0,%TBBNEXTLEFT,%TBBSAMETOP,%TBBSAMEW
IDE,%TBBSAMEHIGH
  GRAPHIC_CAPTION MAINT_ICON
  FONT=SMALLFONT
  ENGLISH
  CAPTION "Maintenance"

FrmMaintenance label tCONTROL
  public FrmMaintenance
  NEXTCONTROL=RES_SETUPS_MAINTENANCE
  BEGIN_FORM

CmdCalibratePen label tCONTROL
  public CmdCalibratePen
  MAKE_COMMANDBUTTON
%NORMSTATE,8+40,16+8,96,24
  ENGLISH
  CAPTION "Calibrate Pen"

CmdRebootHost label tCONTROL
  public CmdRebootHost
  MAKE_COMMANDBUTTON
%NORMSTATE,%SAMELEFT,%NEXTTOP+20,%SA
MEWIDE,%SAMEHIGH
  ENGLISH
  CAPTION "Reboot Host"

CmdUpgrade label tCONTROL
  public CmdUpgrade
  MAKE_COMMANDBUTTON
%NORMSTATE,%SAMELEFT,%NEXTTOP+20,%SA
MEWIDE,%SAMEHIGH
  ENGLISH
  CAPTION "Upgrade"

  BEGIN_GROUPBOX
%NORMSTATE,312+8-88-40,24,304-8-16-8+88,96-1
6-24+32+64-24
  ENGLISH
  CAPTION "Network"

txtSecurityID label tCONTROL
  public txtSecurityID
  NEXTCONTROL=GETSET_SECURITY_ID
  MAKE_PW_EDITBOX
%NORMSTATE,72+8,16+8,56+88,24,20
  ENGLISH
  CAPTION "Security ID"

txtDomainID label tCONTROL
  public txtDomainID
  NEXTCONTROL=GETSET_DOMAIN_ID
  MAKE_NUM_EDITBOX
%NORMSTATE,%SAMELEFT,%SAMETOP+32+8,3
2,%SAMEHIGH,2
  ENGLISH
  CAPTION "Domain ID"

  MAKE_SPINUPBUTTON
%NORMSTATE+SKIPTAB,%NEXTLEFT,%SAMETO
P-4 16,16
  GRAPHIC_CAPTION UPARROWBITMAP

cmdDomainIDSpinUp label tCONTROL
  public cmdDomainIDSpinUp
  MAKE_SPINDOWNBUTTON
%NORMSTATE+SKIPTAB,%SAMELEFT,%NEXTTO
P,16,16
  GRAPHIC_CAPTION DNARROWBITMAP

lstFrameType label tCONTROL
  public lstFrameType

NEXTCONTROL=GETSET_FRAME_TYPE_ENTRY
  MAKE_LISTBOX_NOSCROLL
%NORMSTATE,72+72+88,16,96+16,96+16-24+4
  ENGLISH
  CAPTION "Frame Type"

  END_GROUPBOX

END_FORM
END_TOOLBARBUTTON

cmdModem label tControl
  public cmdModem
  BEGIN_TOOLBARBUTTON
0,%TBBNEXTLEFT,%TBBSAMETOP,%TBBSAMEW
IDE,%TBBSAMEHIGH
  GRAPHIC_CAPTION MODEM_ICON
  FONT=SMALLFONT
  ENGLISH
  CAPTION "Modem"

frmModem label tCONTROL
  public frmModem
  NEXTCONTROL=RES_SETUPS_MODEM
  BEGIN_FORM
  BEGIN_GROUPBOX
%NORMSTATE,16,24,288+8,64+8
  ENGLISH
  CAPTION "Dialing"

optTone label tCONTROL
  public optTone
    NEXTCONTROL=
GETSET_MODEM_TONE_OR_PULSE +(0*256)
    MAKE_OPTIONBUTTON 0,16,16
    ENGLISH
    CAPTION "Tone"

    NEXTCONTROL=
GETSET_MODEM_TONE_OR_PULSE +(1*256)
optPulse label tCONTROL
    public optPulse
    MAKE_OPTIONBUTTON
%NORMSTATE,%SAMELEFT,%NEXTTOP+12
    ENGLISH
    CAPTION "Pulse"

TxtPefix label tCONTROL
  public TxtPefix
    NEXTCONTROL=GETSET_MODEM_PREFIX
    MAKE_EDITBOX
%NORMSTATE,120,12,168,24,10
    ENGLISH
    CAPTION "Prefix"

TxtSuffix label tCONTROL
  public TxtSuffix
    NEXTCONTROL=GETSET_MODEM_SUFFIX
    MAKE_EDITBOX
%NORMSTATE,%SAMELEFT,%NEXTTOP+4,%SA
MEWIDE,%SAMEHIGH,%SAMELEN
    ENGLISH
    CAPTION "Suffix"

  END_GROUPBOX

LstManufacturer label tCONTROL
  public LstManufacturer


NEXTCONTROL=GETSET_MODEM_MANUFACTU
RER_ENTRY
  MAKE_LISTBOX
%NORMSTATE,328,24,140,104+4
  ENGLISH
  CAPTION "Manufacturer"

LstBaudRate label tCONTROL
  public LstBaudRate

NEXTCONTROL=GETSET_MODEM_BAUD_RATE_
ENTRY
  MAKE_LISTBOX
%NORMSTATE,486-16,%SAMETOP,%SAMEWIDE,
%SAMEHIGH
  ENGLISH
  CAPTION "Baud Rate"

  ANSWERONRINGCAPTION EQU "Answer",13,"on
Ring"
TxtAnswerOnRing label tCONTROL
  public TxtAnswerOnRing

NEXTCONTROL=GETSET_MODEM_ANSWER_ON
_RING
  MAKE_NUM_EDITBOX
%NORMSTATE,128-56-8,96+16+8,24,24,1
  ENGLISH
  CAPTION ANSWERONRINGCAPTION
  HOLDSAMETOP=SAMETOP
  MAKE_SPINUPBUTTON
%NORMSTATE+SKIPTAB,%NEXTLEFT,%SAMETO
P-4,16,16
  GRAPHIC_CAPTION UPARROWBITMAP
  MAKE_SPINDOWNBUTTON
%NORMSTATE+SKIPTAB,%SAMELEFT,%NEXTTO
P,16,16
  GRAPHIC_CAPTION DNARROWBITMAP

  RETRYLIMITCAPTION EQU "Retry",13,"Limit"
TxtRetryLimit label tCONTROL
  public TxtRetryLimit

NEXTCONTROL=GETSET_MODEM_RETRY_LIMIT
  MAKE_NUM_EDITBOX
%NORMSTATE,%NEXTLEFT+48,%SAMETOP-12,3
2,24,2
  ENGLISH
  CAPTION RETRYLIMITCAPTION
  HOLDSAMEWIDE=SAMEWIDE
  MAKE_SPINUPBUTTON
%NORMSTATE+SKIPTAB,%NEXTLEFT,%SAMETO
P-4,16,16
  GRAPHIC_CAPTION UPARROWBITMAP
  MAKE_SPINDOWNBUTTON
%NORMSTATE+SKIPTAB,%SAMELEFT,%NEXTTO
P,16,16
  GRAPHIC_CAPTION DNARROWBITMAP

  RETRYDELAYCAPTION EQU "Retry",13,"Delay"
TxtRetryDelay label tCONTROL
  public TxtRetryDelay

NEXTCONTROL=GETSET_MODEM_RETRY_DELA
Y
  MAKE_NUM_EDITBOX
%NORMSTATE,%SAMELEFT+64,SAMETOP-12,40,
24,3
  ENGLISH
  CAPTION RETRYDELAYCAPTION
  MAKE_SPINUPBUTTON
%NORMSTATE+SKIPTAB,%NEXTLEFT,%SAMETO
P-4,16,16
  GRAPHIC_CAPTION UPARROWBITMAP
  MAKE_SPINDOWNBUTTON
%NORMSTATE+SKIPTAB,%SAMELEFT,%NEXTTO
P,16,16
  GRAPHIC_CAPTION DNARROWBITMAP


fraModemCustom label tControl
  public fraModemCustom
BEGIN_FRAME
%INVISIBLE,32,%NEXTTOP+16,480,96

NEXTCONTROL=GETSET_CUSTOM_INIT_STRIN
G
  MAKE_EDITBOX
%NORMSTATE,104-8,0,320,24,40
  ENGLISH
  CAPTION "Initialization"


NEXTCONTROL=GETSET_CUSTOM_AUTOANSW
ER_STRING
  MAKE_EDITBOX
%NORMSTATE,%SAMELEFT,%NEXTTOP+4,208,2
4,10
  ENGLISH
  CAPTION "Auto Answer"


NEXTCONTROL=GETSET_CUSTOM_DISCONNEC
T_STRING
  MAKE_EDITBOX
%NORMSTATE,%SAMELEFT,%NEXTTOP+4,208,2
4,10
  ENGLISH
  CAPTION "Disconnect"


NEXTCONTROL=GETSET_CUSTOM_CONNECT_
STRING
  MAKE_EDITBOX
%NORMSTATE,%SAMELEFT,%NEXTTOP+4,208,2
4,10
  ENGLISH
  CAPTION "Connect Resp"

CmdDefault label tCONTROL
  public CmdDefault
  MAKE_COMMANDBUTTON
%NORMSTATE,520-32,%SAMETOP,88,24
  ENGLISH
  CAPTION "Default"

  END_FRAME

END_FORM
END_TOOLBARBUTTON


cmdPower label tControl
  public cmdPower
  BEGIN_TOOLBARBUTTON
0,%TBBNEXTLEFT,%TBBSAMETOP,%TBBSAMEW
IDE,%TBBSAMEHIGH
  GRAPHIC_CAPTION POWER_ICON
  FONT=SMALLFONT
  ENGLISH
  CAPTION "Power"

frmPower label tCONTROL
```

```
 public frmPower
 NEXTCONTROL=RES_SETUPS_POWER
 BEGIN_FORM

 MAKE_LEFTLEGEND 0,312,32
 GRAPHIC_CAPTION %VLINE2X64

 MAKE_LEFTLEGEND 0,312,SAMETOP+24
 GRAPHIC_CAPTION %VLINE2X64

 MAKE_LEFTLEGEND 0,312,SAMETOP+24+32
 GRAPHIC_CAPTION %VLINE2X64

 MAKE_LEFTLEGEND 0,72+4,32
 GRAPHIC_CAPTION SLEEP_ICON
 ENGLISH
 CAPTION "Sleep Delay"

hsbSleep label tCONTROL
 public hsbSleep

NEXTCONTROL=GETSET_SLEEPMODE_PERIOD
+(8*256)
 MAKE_SLIDEBAR
0,%SAMELEFT-4,%SAMETOP+24,224+8-48,16+2

 MAKE_LEFTLEGEND
0 %SAMELEFT+4,%NEXTTOP+10
 CAPTION "1    2    4    6    8    12    16
Never"

 MAKE_LEFTLEGEND
0,%SAMELEFT+32,%SAMETOP+24
 CAPTION "Minutes of inactivity"

 MAKE_LEFTLEGEND 0,16,%SAMETOP+24
 CAPTION "Sleep is a low power state that
extends"

 MAKE_LEFTLEGEND
0,%SAMELEFT,%SAMETOP+16
 CAPTION "battery life  CruisePad will wake up
from sleep"

 MAKE_LEFTLEGEND
0,%SAMELEFT,%SAMETOP+16
 CAPTION "immediately after the display is
touched."

 MAKE_LEFTLEGEND 0,328+24+16+16,32
 GRAPHIC_CAPTION HIBERNATE_ICON
 ENGLISH
 CAPTION "Hibernate"

chkAutoShutoff label tCONTROL
 public chkAutoShutoff

NEXTCONTROL=GETSET_AUTOMATIC_SHUTOF
F
 MAKE_CHECKBOX 0,328+16,60
 ENGLISH
 HIBLEGEND equ "Auto hibernate after 60
minutes" 13,"of sleep"
 CAPTION HIBLEGEND

 MAKE_LEFTLEGEND
0,%SAMELEFT,%SAMETOP+40
 CAPTION "Hibernate is a very low power state"

 MAKE_LEFTLEGEND
0,%SAMELEFT,%SAMETOP+16
 CAPTION "that consumes almost no battery"

 MAKE_LEFTLEGEND
0,%SAMELEFT,%SAMETOP+16
 CAPTION "power. CruisePad will wake up from"

 MAKE_LEFTLEGEND
0,%SAMELEFT,%SAMETOP+16
 CAPTION "hibernate about 10 seconds after"

 MAKE_LEFTLEGEND
0,%SAMELEFT,%SAMETOP+16
 CAPTION "the display is touched."

END_FORM
END_TOOLBARBUTTON

cmdScreen label tControl
 public cmdScreen
 BEGIN_TOOLBARBUTTON
0,%TBBNEXTLEFT,%TBBSAMETOP,%TBBSAMEW
IDE,%TBBSAMEHIGH
 GRAPHIC_CAPTION SCREEN_ICON
 FONT=SMALLFONT
 ENGLISH
 CAPTION "Screen"

FrmScreen label tCONTROL
 public FrmScreen
 NEXTCONTROL=RES_SETUPS_SCREEN
 BEGIN_FORM

 MAKE_LEFTLEGEND 0,72+4,32
 GRAPHIC_CAPTION BRIGHTNESS_ICON
 ENGLISH
 CAPTION "Brightness"

HsbBrightness label tCONTROL
 public HsbBrightness
 NEXTCONTROL=GETSET_BRIGHTNESS +
(24*256)
 MAKE_SPECTRUMBAR
0,%SAMELEFT-4,%SAMETOP+24,224+8-48+16,16
+2

 MAKE_LEFTLEGEND
0,%SAMELEFT-32,%NEXTTOP+8
 ENGLISH
 CAPTION "Dark"

 MAKE_LEFTLEGEND
0,%SAMELEFT+208,%SAMETOP
 ENGLISH
 CAPTION "Light"

 MAKE_LEFTLEGEND 0,312,32
 ENGLISH
 GRAPHIC_CAPTION %VLINE2X64

 MAKE_LEFTLEGEND 0,336+40+4,32
 GRAPHIC_CAPTION CONTRAST_ICON
 ENGLISH
 CAPTION "Contrast"

HsbContrast label tCONTROL
 public HsbContrast
 NEXTCONTROL= GETSET_CONTRAST
+(24*256)
 MAKE_SPECTRUMBAR
0,%SAMELEFT-4,%SAMETOP+24,224+8-48+16,16
+2
 MAKE_LEFTLEGEND
0,%SAMELEFT-32,%NEXTTOP+8
 ENGLISH
 CAPTION "Low"

 MAKE_LEFTLEGEND
0,%SAMELEFT+208,%SAMETOP
 ENGLISH
 CAPTION "High"

END_FORM
END_TOOLBARBUTTON

cmdToolBarClose label tControl
 public cmdToolBarClose
 MAKE_CLOSEBUTTON
%NORMSTATE,104*5+64+8,0,32,33
 GRAPHIC_CAPTION BIG_X_ICON

 ADJUST_TOOLBAR_WIDTH %TBBNEXTLEFT
END_TOOLBAR

frmFirstModalForm label tControl
 public frmFirstModalForm

frmPasswordBox label tControl
 public frmPasswordBox
 NEXTCONTROL=8000h

  CONTROL
FORM,%INVISIBLE,DLEFT,%DTOP+DHIGH/3+80
,DWIDE,%DHIGH*2/3+16,0

lblPasswordBox1 label tControl
 public lblPasswordBox1
 MAKE_CENTEREDLEGEND
%NORMSTATE,0,32,DWIDE,16
 CAPTION "Connect to.

txtPassword label tControl
 public txtPassword
 NEXTCONTROL=GETSET_PASSWORD
 MAKE_PW_EDITBOX
%NORMSTATE,140,%NEXTTOP+16,88,24,10
 CAPTION "Password"

 BEGIN_FRAME
%NORMSTATE,0,%NEXTTOP+16,DWIDE,24
cmdPasswordOKCancel_OK label tControl
 public cmdPasswordOKCancel_OK
 MAKE_COMMANDBUTTON
%NORMSTATE,DWIDE/2-64-16-24,0,64+24,24
 CAPTION "OK"

cmdPasswordOKCancel_Cancel label tControl
 public cmdPasswordOKCancel_Cancel
 MAKE_COMMANDBUTTON
%NORMSTATE,DWIDE/2+16-8,%SAMETOP,64+24
24
 CAPTION "Cancel"

END_FRAME
 MAKE_CENTEREDLEGEND
%NORMSTATE,0,%NEXTFRAMETOP+16,DWIDE,1
6
 caption "Press 'OK' if no password."

END_FORM

frmPhoneBookEdit label tControl
 public frmPhoneBookEdit
 NEXTCONTROL=8000h
 CONTROL
FORM,%INVISIBLE,40+20,%DTOP+DHIGH/2+40,56
0-208,%DHIGH/2,0

txtPBDescription label tControl
 public txtPBDescription
 MAKE_EDITBOX
%NORMSTATE,96,16,96+88+40,24,20
 CAPTION "Description"

txtPBPhoneNumber label tControl
 public txtPBPhoneNumber
 MAKE_EDITBOX
%NORMSTATE,%SAMELEFT,%NEXTTOP+8,%SA
MEWIDE,%SAMEHIGH,20
 CAPTION "Phone #"

BEGIN_FRAME
%NORMSTATE,0,%NEXTTOP+16,DWIDE,24
 cmdPhoneBookOKCancel_OK label tControl
 public cmdPhoneBookOKCancel_OK
 MAKE_COMMANDBUTTON
%NORMSTATE,DWIDE/2-64-16-24,0,64+24,24
 CAPTION "OK"

cmdPhoneBookOKCancel_Cancel label tControl
 public cmdPhoneBookOKCancel_Cancel
 MAKE_COMMANDBUTTON
%NORMSTATE,DWIDE/2+16-8,%SAMETOP,64+24,
24
 CAPTION "Cancel"

END_FRAME
END_FORM

END_FORM_DEFINITIONS

ControlDataStorageArea label byte
 public ControlDataStorageArea
  db TOTALSTORAGE dup(0)

DATASEG_END
end
```

Copr. 1995 Zenith Data Systems Corp

```
.MODEL SMALL
include uincliud.inc
DATASEG_BEGIN
extrn ControlDataStorageArea:byte
extrn FirstStandardControl:tCONTROL
extrn FontTable:word
extrn LastStandardControl:tCONTROL
extrn OSK:tControl
extrn bCurrentControlType:byte
extrn pNormFont:word
extrn rREGION:tREGION
extrn uifont4:word
extrn wCurrentFormBottom:word
extrn wCurrentFormHeight:word
extrn wGraphicCaptionHeight:word
extrn wNormFontHeight:word
extrn wPreviousFormBottom:word
extrn wPreviousFormHeight:word
extrn frmMessageBox:tCONTROL
extrn frmMessageBox_end:tCONTROL

bPreviewMode db 0
 public bPreviewMode
pLastForm dw 0
 public pLastForm
wLastFormTop dw 0
wLastFormHeight dw 0
wFormWidth dw 0
 public wFormWidth
DATASEG_END

.code
extrn DrawDnButton:near
extrn DrawUpButton:near
extrn GetStringWidth:near
extrn PointControlCaption:near
extrn SetFontForCaption:near

GetBitMapHeight proc near
 public GetBitMapHeight

 or al,al
 jz gch1
 sub al,32
 xor ah,ah
 add ax,ax
 add bx,ax
 mov di,[bx+2]
 mov bx,[bx]
 mov ah,[bx]
 mov al,[bx+1]
 cmp ah,128
 jae gch5
 and al,1111b
gch5:
 xor ah,ah
 inc bx
 inc bx
 sub di,bx
 xchg ax,di
 xor dx,dx
 or di,di
 jz gch2
 div di
 jmp short gch3
gch2:
 xor al,al
gch1:
 xor ah,ah
gch3:
 ret
GetBitMapHeight endp

GetCaptionHeight proc near
 public GetCaptionHeight

 push di
 push si
 push bx
 push dx
 or bx,bx
 jnz gch4
 xor ax,ax
 jmp gch1a
gch4:
 mov al,[bx]
 shl al,1
 shr al,1
 shr al,1
 shr al,1
 shr al,1
 shr al,1
 xor ah,ah
 cmp al,11b * 2
 jnz gch6
 cmp bCurrentControlType,LEFTLEGEND
 jz gch9

 cmp bx,offset osk
 jae gch6

 cmp bx,offset frmMessageBox
 jb gch10
 cmp bx,offset frmMessageBox_end
 ja gch10
 jmp gch9
gch10:
 cmp bx,offset FirstStandardControl
 jb gch7
 cmp bx,offset LastStandardControl
 jb gch8
gch7:
 cmp bCurrentControlType,SPINUPBUTTON
 jz gch6
 cmp bCurrentControlType,SPINDOWNBUTTON
 jz gch6
gch9:
 mov si,offset uifont4
 jmp gch8
gch6:
 mov si,ax
 mov si,[si+offset FontTable]
gch8:
 mov al,[si+1]
 xor ah,ah
 or al,al
 jnz gch1a
```

```
 xchg bx,si
 add si,3

 lodsb
 call GetBitMapHeight
gch1a
 pop dx
 pop bx
 pop si
 pop di
 ret
GetCaptionHeight endp

GetCaptionWidth proc near
 public GetCaptionWidth

 add bx,3
 push bx
 push si
 mov si,bx
 call GetStringWidth
 pop si
 pop bx
 ret
GetCaptionWidth endp

GetCombinedCaptionHeight proc near
 public GetCombinedCaptionHeight

  push bx
  push cx
  mov bx,cx
  call GetCaptionHeight
  mov wGraphicCaptionHeight,ax
  pop cx
  pop bx
  mov dx,ax
  push cx
  push dx
  call GetCaptionHeight
  pop dx
  pop cx
  add ax,dx
  ret
GetCombinedCaptionHeight endp

GetLegendHeight proc near
 public GetLegendHeight
 push ax
 push si
 push dx
 push cx
 call PointControlCaption
 jz glh1
 push cx
 or bx,bx
 jz glh2

 push si
 call Setfontforcaption
 mov cx,ax
 add bx,3
 mov si,bx
 mov bx,ax

glh4:
 lodsb
 or al,al
 jz glh3
 cmp al,13
 jnz glh4
 add bx,cx
 jmp glh4
glh3:
 pop si
glh2:
 pop cx
 push bx
 mov bx,cx
 call GetCaptionHeight
 pop bx
 cmp ax,bx
 jb glh5
 mov bx,ax
glh5
 jmp short glh6
glh1:
 xor bx,bx
glh6
 pop cx
 pop dx
 pop si
 pop ax
 ret
GetLegendHeight endp

GetNormFontHeight proc near
 public GetNormFontHeight
  push bx
  mov bx,pNormFont
  mov al,[bx+1]
  pop bx
  xor ah,ah
  mov wNormFontHeight,ax
  ret
GetNormFontHeight endp

SaveFormHeight proc near
 public SaveFormHeight

 push wCurrentFormHeight
 pop wPreviousFormHeight
 push wCurrentFormBottom
 pop wPreviousFormBottom
 ret
SaveFormHeight endp

AdjustBoxDimensions proc near
 public AdjustBoxDimensions
 mov cx,rRegion.wCurrentLeft
 mov dx,rRegion.wCurrentTop
 mov ax,rRegion.wCurrentWidth
 DIVIDE_BY_8 ax
 mov bl,al
 mov ax,rRegion.wCurrentHeight
 sar ax,1
 mov bh,al
 ret
AdjustBoxDimensions endp

AdjustButtonDimensions proc near
 public AdjustButtonDimensions
 push ax
 mov ax,rRegion.wCurrentHeight
 sub ax,BUTTONTOPHEIGHT +
BUTTONBOTTOMHEIGHT
 sar ax,1
 mov bh,al
 mov ax,rRegion.wCurrentWidth
 sub ax,BUTTONLEFTPIXELS +
BUTTONRIGHTPIXELS
 DIVIDE_BY_8 ax
 mov bl,al
 pop ax
 ret
AdjustButtonDimensions endp

AdjustFormHeight proc near
 public AdjustFormHeight


 mov al,[si].ControlType
 cmp al,FORM
 jnz rgo0b

 mov pLastForm,si
 mov bx,rRegion.wCurrentTop
 mov wLastFormTop,bx
 mov wLastFormHeight,0
 jmp rgo4aa

rgo0b:
 cmp al,FRAME
 jz rgo0bb
 mov bx,rRegion.wCurrentRight
 add bx,16
 and bl,11111000b
 cmp bx,wFormWidth
 jle rgo0bb
 mov wFormWidth,bx

rgo0bb:
 mov bx,rRegion.wCurrentBottom
 sub bx,wLastFormTop
 cmp bx,wLastFormHeight
 jle rgo4aa
 mov wLastFormHeight,bx
 add bx,24
 push si
 mov si,pLastForm
 or si,si
 jz rgo4ab
 test [si].ControlState,EXPLICITSIZE
 jnz rgo4ab
 mov [si].PixelHeight,bx
rgo4ab:
 pop si
rgo4aa:
 ret
AdjustFormHeight endp
end


Copr. 1995 Zenith Data Systems Corp.

.model small
.code
extrn Ascii2Bin:near
extrn Bin2ASCII:near

include uiinclud.inc

DATASEG_BEGIN
extrn ControlDataStorageArea:byte
DATASEG_END

.code

SetNumericControl proc near
 public SetNumericControl

  push ax
  push si
  mov ax,[si].ID
  push ax
  mov si,[si].pStorageOffset
  call Ascii2Bin
  pop ax
  SM_FUNCTION ax
  pop si
  pop ax
  ret
SetNumericControl endp

GetNumericControl proc near
 public GetNumericControl

  push ax
  mov ax,[SI].ID
  mov ah,80h
  SM_FUNCTION ax
  jl reb4a

  push cx
  push bx
  mov cl,byte ptr [si].wDataLength
  dec cl
  mov bx,[si].pStorageOffset
  call bin2ascii
  mov byte ptr [bx],0
  pop bx
  pop cx

reb4a:
  pop ax
  ret
GetNumericControl endp

SetTextControl proc near
 public SetTextControl
  push ax
  push si
  mov ax,[si].ID
  mov si,[si].pStorageOffset
  mov dx,ds
  SM_FUNCTION ax
  pop si
  pop ax
  ret
SetTextControl endp

GetTextControl proc near
 public GetTextControl

  push si
  push ax
  push dx
  push cx
  push di
  mov cx,[SI].wDataLength
  mov di,[SI].pStorageOffset
  dec cx
  jle gnuc1
  mov ax,[SI].ID
  mov ah,80h
  SM_FUNCTION ax
  jl gnuc1

  push es
  push ds
  push ds
  pop es
  mov ds,dx
  rep movsb
  pop ds
  pop es
gnuc1:
   pop di
   pop cx
   pop dx
   pop ax
   pop si
   ret
GetTextControl endp
end

Copr. 1995 Zenith Data Systems Corp.

.MODEL SMALL
.code
extrn AddControlToActiveList:near
extrn AdjustButtonDimensions:near
extrn DoPenEvent:near
extrn DrawLabel:near
extrn DrawString:near
extrn DrawSunkenFrame:near
extrn DrawTextBox:near
extrn FindRegionForControl:near
extrn GetNormFontHeight:near
extrn JumpOnAL:near
extrn PointControlCaption:near
extrn PopRegion:near
extrn PushRegion:near
extrn Repaint:near
extrn RepaintButton:near
extrn RestoreRegion:near
extrn SetControlTabList:near
extrn SetFontForCaption:near
extrn SetNewTabItem:near
extrn SetNewTabItem:near
extrn ShowTabBox:near
extrn StoreRegion:near
extrn UndoCurrentTabItem:near
include uiinclud.inc


DATASEG_BEGIN
extrn ControlDataStorageArea:byte
extrn bButtonForegroundColor:byte
extrn bCaptionForegroundColor:byte
extrn bCaptionForegroundColor:byte
extrn bCaptionForegroundColor:byte
extrn bIgnoringMove:byte
extrn bNullString:byte
extrn pClickRegion:word
extrn pCurrentFont:word
extrn pNextActiveRegion:word
extrn pNormFont:word
extrn pTabRegion:word
extrn rActiveRegions:tRegion
extrn rREGION:tREGION
extrn rTabRegion:tREGION
extrn wNormFontHeight:word
extrn wPenCurrentRow:word

FirstStandardControl label tCONTROL
 public FirstStandardControl

VScrollControls label tCONTROL
NEXTCONTROL=32000
VsbBacking label tControl
 public vsbBacking
 MAKE_COMMANDBUTTON
%NORMSTATE,0,0,16,16*3

VsbUpArrow label tControl
 public vsbUparrow
 MAKE_SYMBOLBUTTON
%NORMSTATE,0,0,16,16
 GRAPHIC_CAPTION UPARROWBITMAP

VsbSlider label tControl
 public vsbSlider
 MAKE_COMMANDBUTTON
%NORMSTATE,0,%NEXTTOP,16,16

VsbDnArrow label tControl
 public VSBDnArrow
 MAKE_SYMBOLBUTTON
%NORMSTATE,0,%NEXTTOP,16,16
 GRAPHIC_CAPTION DNARROWBITMAP

LastStandardControl label tCONTROL
 public LastStandardControl



bListItemNormForeground db BLACK
bListItemNormBackground db WHITE
bListItemGrayedForeground db GRAY
bListItemGrayedBackground db WHITE
bListItemSelectedForeground db WHITE
bListItemSelectedBackground db BLACK


wListCurrentItem dw 0
 public wListCurrentItem

bListItemNoStore db 0

wHoldCurrentListIndex dw 0

wListGetSet dw 0
wListIndex dw 0
```

```
bListItemAttribute db 0

wListSlideRow dw 0
 public wListSlideRow

LISTITEMBUFFERSIZE equ 80


rListBoxItem tListBoxEntry <szListItemBuffer,0>
rListBoxItem1 tListBoxEntry <szListItemBuffer1,0>
rListBoxItem2 tListBoxEntry <szListItemBuffer2,0>

szListItemBuffer label byte
 db LISTITEMBUFFERSIZE+1 dup(0)
szListItemBuffer1 label byte
 public szListItemBuffer1
 db LISTITEMBUFFERSIZE+1 dup(0)
szListItemBuffer2 label byte
 public szListItemBuffer2
 db LISTITEMBUFFERSIZE+1 dup(0)

pPenDownListRegion dw 0
 public pPenDownListRegion
pPenUpListRegion dw 0
 public pPenUpListRegion
pPenDownListItem dw 0
 public pPenDownListItem
rListItemRegion tRegion <0,0,0,0,0,-1,0,0>

wAutoScrollTimer  dw 0
 public wAutoScrollTimer
bAutoScrollMode   db 0
 public bAutoScrollMode
bRepaintItemsOnly db 0
 public bRepaintItemsOnly

wCurrentMaxListItem dw 0
 public wCurrentMaxListItem
wCurrentTopListItem dw 0
wCurrentScrollBarHeight dw 0
bListRepaintNeeded  db 0
pListGrayedItemSkipped dw 0
DATASEG_END

.code

AddListItemToActiveList proc near
 push si
 mov si,offset rListItemRegion
 call StoreRegion
 pop si
 ret
AddListItemToActiveList endp

RepaintListBox proc near
 public RepaintListBox


 cmp al,LISTBOX
 jz rlb1
 cmp al,LISTBOXNOSCROLL
 jz rlb1
 ret
rlb1:

 push si
 push cx
 call GetListMaxAndTop
 push pNextActiveRegion
 pop pPenUpListRegion
 mov rRegion.bListItemFlags,128
 call AddControlToActiveList
 mov rRegion.bListItemFlags,0
 pop cx
 pop si

 call SetControlTabList

 push ax
 call AdjustButtonDimensions

rlb3a:
 cmp bRepaintItemsOnly,0
 mov bRepaintItemsOnly,0
 jnz rlb3i

 push dx
 push cx
 push bx
 add dx,20
 sub bh,10
 cmp al,LISTBOXNOSCROLL
 jz rlb2
 sub bl,2
rlb2:
 call DrawTextBox
 pop bx
 pop cx
 pop dx
 push si
 push dx
 push cx
 push bx
 call DrawSunkenFrame
 pop bx
 pop cx
 pop dx
 pop si

 push cx
 call PointControlCaption
 pop cx
 jz rlb3
 or bx,bx
 jz rlb3
 call SetFontForCaption

 push si
 mov si,bx
 add si,3
 add cx,12
 add dx,4
 mov bl,bButtonForegroundColor
 xor bh,bh
 call drawlabel
 pop si

rlb3i:
 pop ax
 push ax
 cmp al,LISTBOXNOSCROLL
 jz rlb3
 push si
 call PushRegion
 call DrawVerticalScrollBar
 call PopRegion
 pop si
rlb3:
 mov bx,si
 or bx,bx
 pop ax
 jnz rlb16
 jmp rlb4
rlb16:

 call GetListMaxItem

 push pNextActiveRegion
 pop [bx].pFirstRegionRecord

 mov rListItemRegion.pCurrentControl,si
 mov dx,rRegion.wCurrentTop
 add dx,21+3
 mov rListItemRegion.wCurrentTop,dx
 add dx,wNormFontHeight
 dec dx
 mov rListItemRegion.wCurrentBottom,dx
 mov cx,rRegion.wCurrentLeft
 add cx,4+4+1
 mov rListItemRegion.wCurrentLeft,cx
 mov cx,rRegion.wCurrentRight
 sub cx,(29+4+4+1)-8
 cmp [si].ControlType,LISTBOXNOSCROLL
 jnz rlb11
 add cx,16
rlb11:
 mov rListItemRegion.wCurrentRight,cx
 mov ax,[bx].ID
 mov cx,[bx].wTopVisible
 inc cx
 mov rListItemRegion.wListItemIndex,cx
rlb14:
 mov cx,rListItemRegion.wListItemIndex
 mov ax,[bx].ID
 mov rListItemRegion.wListHandle,ax
 mov rListItemRegion.wCurrentHeight,-1
 push bx
 push si
 or cx,cx
 jz rlb15a
 cmp cx,wCurrentMaxListItem
 jbe rlb15
rlb15a:
 mov rListItemRegion.wListItemIndex,0
 mov bl,0
 jmp rlb12
rlb15:
 call getlistdata
 cmp wCurrentMaxListItem,dx
 jnz rlb12
 or bl,4
rlb12:
 mov rListItemRegion.bListItemFlags,bl
 mov si,pNextActiveRegion
 call AddListItemToActiveList
 call DrawListItem
 pop si
 pop bx
 mov ax,wNormFontHeight
 push ax
 add ax,rListItemRegion.wCurrentBottom
 cmp ax,rRegion.wCurrentBottom
 pop ax
 ja rlb13
 add rListItemRegion.wCurrentTop,ax
 add rListItemRegion.wCurrentBottom,ax
 cmp rListItemRegion.wListItemIndex,0
 jz rlb14a
 inc rListItemRegion.wListItemIndex
rlb14a:
 jmp rlb14
rlb13:
 mov ax,[si]
rlb4:
rlb99:
 ret
RepaintListBox endp

RepaintIndividualListBox proc near
 public RepaintIndividualListBox
 call FindRegionForControl
 jnc dlng1
 ret

dlng1:
 push pNextActiveRegion
 mov pNextActiveRegion,bx
 mov si,bx
 call RestoreRegion
 mov ax,[si]
 call RepaintListBox
 pop pNextActiveRegion
 clc
 ret
RepaintIndividualListBox endp

CopyListItemFromSM proc near
 push ds
 pop es
 mov ds,dx
 mov al,[si].cAttribute
 mov es:bListItemAttribute,al
 push cx
 mov cx,LISTITEMBUFFERSIZE
 or dx,dx
 jz gld4
 lds si,[si].lpszEntry
 mov ax,ds
 or ax,si
 jz gld4
 rep movsb

gld4:
 pop cx
 xor al,al
 stosb
 push es
 pop ds
 ret
CopyListItemFromSM endp

DoAutoScrollEvent proc near
 public DoAutoScrollEvent
 cmp wAutoScrollTimer,1
 jb dase99

 mov wAutoScrollTimer,0
 mov si,pTabRegion
 cmp bAutoScrollMode,1
 jnz dase1
 mov ax,[si].wCurrentBottom
 cmp wPenCurrentRow,ax
 jbe dase99
 call DoListDownArrow
 jmp short dase2
dase1:
 mov ax,[si].wCurrentTop
 cmp wPenCurrentRow,ax
 jae dase99
 call DoListUpArrow
dase2:
 jc dase99
 mov pClickRegion,si
dase99:
 ret
DoAutoScrollEvent endp

DoListBoxKey proc near
 public DoListBoxKey
 cmp al,' '
 jae dlbk1
 mov al,ah

 call JumpOnAL
 db UP_ARROW_SCAN_CODE
 dw offset dlbua
 db DOWN_ARROW_SCAN_CODE
 dw offset dlbda
 db 0
dlbk1:
 ret

dlbua:
 call DoListUpArrow
 jc dlbda1
 mov pClickRegion,si
 mov pPenUpListRegion,si
dlbda1:
 ret

dlbda:
 call DoListDownArrow
 jc dlbda2
 mov pClickRegion,si
 mov pPenUpListRegion,si
dlbda2:
 ret
DoListBoxKey endp

DoListDownArrow proc near


 mov si,pTabRegion
 or si,si
 jnz dlda1a
 jmp dlda1
dlda1a:

 cmp [si].wListHandle,0
 jnz dlda1ax
 jmp dlda1
dlda1ax:
 cmp [si].wListItemIndex,0
 jnz dlda1x
 jmp dlda1
dlda1x:
 test [si].bListItemFlags,4
 jz dlda3
 jmp dlda1
dlda3:
 mov ax,[si].wListHandle
 mov bx,type rTabRegion
 cmp ax,[si+bx].wListhandle
 jnz dlda2
 add si,bx
 test [si].bListItemFlags,1
 jnz dlda3

dlda2a:
 clc
 ret
dlda2:
 push si
 mov bx,[si].pCurrentControl
 inc [bx].wTopVisible
 mov ax,[bx].pFirstRegionRecord
 mov cx,si
 mov si,ax
dlda3a:
 cmp si,cx
 je dlda4
 mov di,si
 add si,type rRegion
 mov dx,[si].wListItemIndex
 mov [di].wListItemIndex,dx
 mov dl,[si].bListItemFlags
 mov [di].bListItemFlags,dl
 jmp short dlda3a

dlda4:
 inc [si].wListItemIndex
 mov cx,[si].wListItemIndex
 mov ax,[si].wListHandle
 push si
 call GetListData
 pop si
 mov [si].bListItemFlags,bl
 mov cx,LIST_LAST_ITEM
 mov ax,[si].wListHandle
 push si
 call GetListData
 pop si
 cmp dx,[si].wListItemIndex
 jnz dlda5
 or [si].bListItemFlags,4
dlda5:
 mov bListRepaintNeeded,-1
 pop si
 sub si,type rTabRegion
 jmp dlda3
dlda1:
 stc
 ret
DoListDownArrow endp

DoListSlide proc near
```

```
 public DoListSlide


 push di
 call FindListBoxForVSB
 pop di

 call GetListMaxAndTop
 call GetListTopItemRange
 cmp cx,1
 jle dvs1
 mov bx,cx
 mov ax,wListSlideRow
 mov dx,[di].wCurrentBottom
 sub dx,28
 cmp ax,dx
 jle dvs3
 mov ax,dx
dvs3.
 sub ax,[di].wCurrentTop
 sub ax,16
 jge dvs2
 xor ax,ax
dvs2:
 mov dx,100
 mul dx
 mov cx,[di].wCurrentHeight
 sub cx,2*16
 div cx
 mul bx
 mov cx 100
 div cx
 cmp [si].wTopVisible,ax
 jz dvs1
 mov [si].wTopVisible,ax
 mov bRepaintItemsOnly,-1
 call RepaintIndividualListBox
dvs1:
 ret
DoListSlide endp

DoListUpArrow proc near

 mov si,pTabRegion
 mov pListGrayedItemSkipped,si
 or si,si
 jnz dlua1a
 jmp dlua1
dlua1a:
 cmp [si].wListHandle,0
 jnz dlua3
 jmp dlua1
dlua3.
 cmp [si].wListItemIndex,1
 jnz dlua1b
 jmp dlua1
dlua1b:
 cmp si,offset rActiveRegions
 jbe dlua2
 mov bx,type rTabRegion
 neg bx
 mov ax,[si].wListHandle
 cmp [si+bx].wlistHandle,ax
 jnz dlua2
 add si,bx
 test [si].bListItemFlags,1
 jz dlua1c
 cmp [si].wListItemIndex,1
 jz dlua1

 cmp [si+bx].wListHandle,ax
 jz dlua1d
 call ScrollDownList
 mov si,pListGrayedItemSkipped
 add si,type rTabRegion
 jmp dlua1c
dlua1d:
 jmp dlua3
dlua1c.
 clc
 ret
dlua2

 call ScrollDownList
 jmp dlua3
dlua1:
 stc
 ret
DoListUpArrow endp

DoVsbDnArrow proc near
 public doVSBDnArrow
 call FindListBoxForVSB
 mov ax,[di].wListHandle
dvda3:
 cmp [di].wListHandle,ax
 jnz dvda1
 cmp [di].wListItemIndex,0
 jz dvda2
 test [di].bListItemFlags,4
 jnz dvda2
 add di,type rRegion
 jmp dvda3
dvda1:
 inc [si].wTopVisible
 mov bRepaintItemsOnly,-1
 call RepaintIndividualListBox
dvda2:
 ret
DoVsbDnArrow endp

DoVsbUpArrow proc near
 public doVSBUpArrow

 call FindListBoxForVSB
 cmp [si].wTopVisible,1
 jb dvua2
 dec [si].wTopVisible
 mov bRepaintItemsOnly,-1
 call RepaintIndividualListBox
dvua2:
 ret
DoVsbUpArrow endp

FindListBoxForVSB proc near

dvua1:
 add di,type rRegion
 cmp [di].wLISTHANDLE,0
 jz dvua1
 mov si,[di].pCurrentControl
 ret
FindListBoxForVSB endp

GetListData proc near
 public GetListData
LIST_CURRENT_ITEM equ 0
LIST_LAST_ITEM    equ -1
 push di
 cmp cx,-1
 jnz glx1
 call GetListDataWork
 jmp glx99
glx1:
 cmp cx,0
 jnz glx2
 call GetListDataWork

 mov wListCurrentItem,dx
 not bl
 and bl,1
 or bl,2
 jmp glx99

glx2:
 mov bListItemNoStore,-1
 push ax
 push cx
 xor cx,cx
 call GetListDataWork
 mov wHoldCurrentListIndex,ax
 pop cx
 pop ax
 call GetListDataWork
 not bl
 and bl,1
 cmp dx,wHoldCurrentListIndex
 jnz glx3
 or bl,2
glx3:
 jmp glx99
glx99:
 pop di
 ret
GetListData Endp

GetListDataWork proc near
 call CheckListDataAvailable
 jnc gld00

gld_wait1:
 mov dx,0
 ret
gld00:
 mov wListGetSet,ax
 mov bx,cx
 mov ah,80h
 SM_FUNCTION ax
 jl gld1
 cmp cx,-1
 jnz gld2
 mov dx,ax
 ret
gld1.
 mov dx,0
 ret
gld2:
 cmp cx,0
 jz tmp1
 mov ax,cx
tmp1:
 cmp bListItemNoStore,0
 jz gld2a
 mov bListItemNoStore,0
 ret
gld2a:
 mov wListIndex,ax
 mov ax,wListGetSet
 mov di,offset szListItemBuffer
 cmp ah,0
 jz gld3
 mov di,offset szListItemBuffer1
gld3:
 call CopyListItemFromSM
 mov ax,wListGetSet
 or ah,ah
 jz gld5

 mov byte ptr szListItemBuffer2,0
 mov al,ah
 mov ah,80h
 mov bx,cx
 SM_FUNCTION ax
 jl gld6
 mov ax,dx
 or ax,si
 jz gld6
 mov di,offset szListItemBuffer2
 call CopyListItemFromSM

gld6:
 push ds
 pop es
 mov si,offset szListItemBuffer1
 mov di,offset szListItemBuffer
gld6a:
 cmp di,offset szListItemBuffer +
LISTITEMBUFFERSIZE
 jae gld6b
 lodsb
 or al,al
 jz gld6b
 stosb
 jmp gld6a
gld6b:
 mov si,offset szListItemBuffer2
gld6c.
 cmp di,offset szListItemBuffer +
LISTITEMBUFFERSIZE
 jae gld6d
 mov al,9
 stosb
gld6e:
 cmp di,offset szListItemBuffer +
LISTITEMBUFFERSIZE
 jae gld6d
 lodsb
 stosb
 or al,al
 jnz gld6e

gld6d:


gld5:
 mov bl,bListItemAttribute
 mov dx,wListIndex
 mov si,offset szListItemBuffer
 ret
GetListDataWork endp


HandleListPenUp proc near
 public HandleListPenUp

 mov si,pPenUpListRegion
 or si,si
 jnz hlpu1a
 jmp hlpu1
hlpu1a:
 mov ax,[si].pCurrentControl
 or ax,ax
 jnz hlpu1b
 jmp hlpu1
hlpu1b:
 call DoCustomListPenUp

hlpu1:
 mov pPenUpListRegion,0
 ret
HandleListPenUp endp

ListItemClick proc near
 public ListItemClick


 test [di].wListItemIndex,07FFh
 jnz lic1
 jmp lic11
lic1:
 test [di].bListItemFlags,1
 jz lic2
 jmp lic11
lic2:
 cmp bListRepaintNeeded,-1
 jz lic7

 test [di].bListItemFlags,2
 jz lic3
 call ShowTabBox
 jmp lic11
lic3:
 call UndoCurrentTabItem
 call ChangeListItem
 mov si,di
 call DrawListItem
 call SetNewTabItem
 jmp lic10

lic7:
 mov bListRepaintNeeded,0
 call UndoCurrentTabItem
 inc bIgnoringMove
 call ChangeListItem
 mov si,[di].pCurrentControl
 mov bRepaintItemsOnly,-1
 call RepaintIndividualListBox
 call SetNewTabItem
 dec bIgnoringMove

lic10:
 stc
 jmp short lic12
lic11:
 clc
lic12:
 ret
ListItemClick endp


ChangeListItem proc near

 call UndoOldCurrentListItem
 or [di].bListItemFlags,2
 mov cx,[di].wListItemIndex
 mov ax,[di].wListHandle
 push ax
 push cx
 call GetListData
 pop cx
 pop ax
 call SetListCurrent
 ret
ChangeListItem endp

ScrollDownList proc near

 push si
 mov bx,[si].pCurrentControl
 dec [bx].wTopVisible
 mov cx,si
 mov ax,[si].wListHandle
 mov bx,type rTabRegion
dlua7:
 cmp [si+bx].wListHandle,ax
 jnz dlua6
 add si,bx
 jmp dlua7

dlua6:
 neg bx
dlua9:
 cmp si,cx
 jz dlua8
 mov dx,[si+bx].wListItemIndex
 mov [si].wListItemIndex,dx
 mov dl,[si+bx].bListItemFlags
 mov [si].bListItemFlags,dl
 add si,bx
 jmp short dlua9
dlua8:
 dec [si].wListItemIndex
 mov cx,[si].wListItemIndex
 mov ax,[si].wListHandle
 push si
 call GetListData
 pop si
 mov [si].bListItemFlags,bl
 mov cx,LIST_LAST_ITEM
 mov ax,[si].wListHandle
 push si
 call GetListData
 pop si
 cmp dx,[si].wListItemIndex
 jnz dlua5
 or [si].bListItemFlags,4
```

```
dlua5

  mov bListRepaintNeeded,-1
  pop si
  add si,type rTabRegion
  ret
ScrollDownList endp

SetListCurrent proc near
  public SetListCurrent
  cmp ah,0
  jnz slc1

  mov si,offset rListBoxItem
  push ax
  mov dx,ds
  mov ah,bListItemAttribute
  mov [si].cAttribute,ah
  mov word ptr [si].lpszEntry[0],offset
szListItemBuffer
  mov word ptr [si].lpszEntry[2],ds
  xor ah,ah
  mov bx,cx
  SM_FUNCTION ax
  pop ax
  ret

slc1
  mov si,offset rListBoxItem1
  push ax
  mov dx,ds
  mov ah,bListItemAttribute
  mov [si].cAttribute,ah
  mov word ptr [si].lpszEntry[0],offset
szListItemBuffer1
  mov word ptr [si].lpszEntry[2],ds
  xor ah,ah
  mov bx,cx
  SM_FUNCTION ax
  pop ax
  mov si,offset rListBoxItem2
  push ax
  mov al,ah
  mov dx,ds
  mov ah,bListItemAttribute
  mov [si].cAttribute,ah
  mov word ptr [si].lpszEntry[0],offset
szListItemBuffer2
  mov word ptr [si].lpszEntry[2],ds
  xor ah,ah
  mov bx,cx
  SM_FUNCTION ax
  pop ax
  ret
SetListCurrent endp

DrawVerticalScrollBar proc near
  public DrawVerticalScrollBar

  mov si,offset VsbBacking
  mov rRegion.pCurrentControl,si
  mov cx,rRegion.wCurrentRight
  sub cx,23
  ROUND_TO_BYTE_BOUNDARY cx

  mov rRegion.wCurrentLeft,cx
  push cx
  add cx,12
  dec cx
  mov rRegion.wCurrentRight,cx
  pop cx
  add rRegion.wCurrentTop,21
  mov dx,rRegion.wCurrentTop
  mov ax,rRegion.wCurrentHeight
  mov [si].TopPixel,dx
  sub ax,24
  mov rRegion.wCurrentHeight,ax
  mov wCurrentScrollBarHeight,ax
  mov [si].PixelHeight,ax
  mov ax,16
  mov rRegion.wCurrentWidth,ax
  mov ax,[si]
  call RepaintButton
  mov rRegion.bListItemFlags,128
  call AddControlToActiveList


  mov si,offset VsbUpArrow
  mov rRegion.pCurrentControl,si
  mov ax,16
  mov rRegion.wCurrentHeight,ax
  add ax,rRegion.wCurrentTop
  mov rRegion.wCurrentBottom,ax
  mov ax,[si]
  mov dx,rRegion.wCurrentTop
  mov cx,rRegion.wCurrentLeft
  call RepaintButton
  mov rRegion.bListItemFlags,128
  call AddControlToActiveList
  push rRegion.wCurrentBottom


  mov si,offset VsbDnArrow
  mov rRegion.pCurrentControl,si
  mov dx,VsbBacking.TopPixel
  add dx,VsbBacking.PixelHeight
  mov rRegion.wCurrentBottom,dx
  mov ax,16
  sub dx,ax
  mov rRegion.wCurrentTop,dx
  mov rRegion.wCurrentHeight,ax
  mov [si].TopPixel,dx
  mov cx,rRegion.wCurrentLeft
  mov ax,[si]
  call RepaintButton
  mov rRegion.bListItemFlags,128
  call AddControlToActiveList
  pop  rRegion.wCurrentBottom


  mov si,offset VsbSlider
  mov rRegion.pCurrentControl,si

  call GetListTopItemRange
  jg dts3
dts4:
  xor ax,ax
  jmp dts1
dts3:
  mov ax,100
  mov bx,wCurrentTopListItem
  or bx,bx
  jz dts4
  inc bx
  mul bx
  div cx
  mov dx,wCurrentScrollBarHeight
  sub dx,16*3
  mul dx
  mov cx,100
  div cx
dts1:
  add ax,rRegion.wCurrentBottom
  mov bx,rRegion.wCurrentTop
  sub bx,16
  cmp ax,bx
  jbe dts2
  mov ax,bx
dts2:
  mov rRegion.wCurrentTop,ax
  mov dx,ax
  add ax,rRegion.wCurrentHeight
  dec ax
  mov rRegion.wCurrentBottom,ax
  mov cx,rRegion.wCurrentLeft
  mov ax,[si]
  call RepaintButton
  mov rRegion.bListItemFlags,128
  call AddControlToActiveList
  ret
DrawVerticalScrollBar endp

GetListTopItemRange proc near

  call GetNormFontHeight
  mov cx,ax
  mov ax,wCurrentScrollBarHeight
  xor dx,dx
  div cx
  mov cx,wCurrentMaxListItem
  sub cx,ax
  inc cx
  ret
GetListTopItemRange endp

DrawListItem proc near
  public DrawListItem

  push si
  push bx
  push di
  mov di,si
  mov ax,[di].wListHandle
  mov cx,[di].wListItemIndex
  or cx,cx
  jnz dli1

  mov si,offset bNullString
  mov bl,0
  jmp dli2
dli1:
  call GetListData
dli2:
  mov al,[di].bListItemFlags
  mov bl,bListItemNormForeground
  mov bh,bListItemNormBackground
  test al,1
  jz dli3
  mov bl,bListItemGrayedForeground
  mov bh,bListItemGrayedBackground
  jmp dli4
dli3:
  test al,2
  jz dli4
  mov bl,bListItemSelectedForeground
  mov bh,bListItemSelectedBackground
dli4:
  or bh,LEFTJUSTIFIED+WITHBACKCOLOR
  mov ax,[di].wCurrentRight
  mov cx,[di].wCurrentLeft
  sub ax,cx
  inc ax
  mov dx,[di].wCurrentTop
  push pNormFont
  pop pCurrentFont
  call DrawString
  pop di
  pop bx
  pop si
  ret
DrawListItem endp

GetListMaxItem proc near
  public GetListMaxItem

  push ax
  mov ax,[bx].ID
  mov cx,LIST_LAST_ITEM
  push dx
  push bx
  push si

  call GetListData
  mov wCurrentMaxListItem,dx
  pop si
  pop bx
  pop dx
  pop ax
  ret
GetListMaxItem endp

GetListMaxAndTop proc near
  public GetListMaxAndTop

  mov bx,si
  call GetListMaxItem
  push [si].wTopVisible
  pop wCurrentTopListItem
  ret
GetListMaxAndTop endp

UndoOldCurrentListItem proc near
  push si
  mov bx,[di].pCurrentControl
  mov si,[bx].pFirstRegionRecord
lic5:
  test [si].bListItemFlags,2
  jnz lic4
  mov ax,[si].wListHandle
  add si,type rRegion
  cmp ax,[si].wListHandle
  jz lic5

  jmp short lic5

lic4:
  and [si].bListItemFlags, not(2)
  call DrawListItem
lic6:
  pop si
  ret
UndoOldCurrentListItem endp

end

Copr. 1995 Zenith Data Systems Corp.

.MODEL SMALL
.CODE
extrn PenOff:near
extrn PenOn:near
extrn HidePen:near
extrn ActivatePen:near
extrn CheckIfOnlyOSK:near
extrn DoAutoScrollEvent:near
extrn DoClickEvent:near
extrn DoCursorFlash:near
extrn DoKeyEvent:near
extrn DoPenEvent:near
extrn DoSpinDown:near
extrn DoSpinUp:near
extrn DoVSBDnArrow:near
extrn FillScreenArea:near
extrn GetNormFontHeight:near
extrn GetTabControlType:near
extrn HandleListPenUp:near
extrn Repaint:near
extrn RepaintAndSetTab:near
extrn RepaintOSKInMemory:near
extrn SendKey:near
extrn SendKeyDownScanCode:near
extrn SetFormHeights:near
extrn ShowPen:near
extrn DoVSBDnArrow:near
extrn DoVSBUpArrow:near

include uiinclud.inc

if need_tsr ne 0
ProgEnd segment public 'stack'
ProgEnd ends
endif

DATASEG_BEGIN
extrn ControlDataStorageArea:byte
extrn MainForm:tControl
extrn OSK:tControl
extrn VSBDnArrow:tControl
extrn VSBUpArrow:tControl
extrn bAutoScrollMode:byte
extrn bAutoScrollMode:byte
extrn bAutoScrollMode:byte
extrn bCursorActive:byte
extrn bPenEventHappened:byte
extrn bSuppressShow:byte
extrn pPenUpListRegion:word
extrn pPenUpListRegion:word
extrn pPenUpListRegion:word
extrn uifont0:word
extrn uifont1:word
extrn uifont2:word
extrn uifont3:word
extrn vsbUparrow:tControl
extrn wAutoScrollTimer:word
extrn wAutoScrollTimer:word
extrn wCoveredAreaTop:word
DATASEG_END


if need_tsr eq 0
 SET_PEN_EVENT_HANDLER = 0ch
 PEN_ACTIVATE_FUNCTION = 33h
endif

INSTALL_INT macro intnum
  jmp short $ + 6
old&intnum&int dd 0
  push ds
  mov ah,35h
  mov al,0&intnum&h
  int 21h
  mov word ptr cs:old&intnum&int,bx
  mov word ptr cs:old&intnum&int[2],es
  push cs
  pop ds
  mov dx,offset new&intnum&int
  mov ah,25h
  mov al,0&intnum&h
  int 21h
  pop ds
endm
REMOVE_INT macro intnum
  push ds
  mov dx,word ptr cs:old&intnum&int
  mov ds,word ptr cs:old&intnum&int[2]
  mov al,intnum&h
  mov ah,25h
  int 21h
  pop ds
endm

DATASEG_BEGIN

wPSPSegment dw 0
  public wPSPSegment


bTestMode  db 0
  public bTestMode

bLanguageToUse  db 0
  public bLanguageToUse

wCurrentResource dw 0
  public wCurrentResource
bNewDisplayRequested db 0
  public bNewDisplayRequested
wDisplayRequested dw 0
  public wDisplayRequested
bMessageBoxRequested db 0
  public bMessageBoxRequested
bRemoveMessageBoxRequested db 0
  public bRemoveMessageBoxRequested
bMessageBoxID db 0
  public bMessageBoxID
```

```
bMessageBoxResult db 0
 public bMessageBoxResult
bGetDataFromLocalStorage db 0
 public bGetDataFromLocalStorage
bDummyBlank db ' ',0
 public bDummyBlank

wDivisors label word
dw 10000
dw 1000
wDivisors100 label word
dw 100
wTenWord label word
dw 10
dw 1

bNullString db 0,0
 public bNullString

wJumpTableBase dw 0

wCursorTimer dw 0
 public wCursorTimer

wTypamaticTimer dw 0
pTypamaticOSKControl dw 0
bTypamaticState db 0
 public bTypamaticState

bDoingEvents db 0
 public bDoingEvents
bPopUpRequired db 0
 public bPopUpRequired

wVideoStateBuffer dw 9 dup(0)
bOrgScreenMode db 0
bScreenMode db 0
 public bScreenMode
wScreenSegment dw 0
 public wScreenSegment

bMoveMode     db 0
 public bMoveMode
wMoveModePenRow dw 0
 public wMoveModePenRow
wMoveModePenColumn dw 0
 public wMoveModePenColumn

bNoDimensionUpdate db 0
 public bNoDimensionUpdate

wKeyPressed dw 0
 public wKeyPressed
bKeyChanged db 0
 public bKeyChanged

wShortCutKey        dw 0
 public wShortCutKey

rActiveRegions label tRegion
 public rActiveRegions
 db MAX_ACTIVE_CONTROLS * type tRegion
dup(0)

rMoveStartRegion tRegion <0,0,0,0,0,0,0,0>
 public rMoveStartRegion
rPushedRegion   tRegion <0,0,0,0,0,0,0,0>
 public rPushedRegion
rRegion         tRegion <0,0,0,0,0,0,0,0>
 public rREGION
rLegendRegion   tRegion <0,0,0,0,0,-1,0,0>
 public rLegendRegion
rTabRegion      tRegion <0,0,0,0,0,-1,0,0>
 public rTabRegion
rCursorRegion   tRegion <0,0,0,0,0,0,0,0>
 public rCursorRegion

pPenDownActiveRegion dw 0
 public pPenDownActiveRegion
pPenDownLegendRegion dw 0
 public pPenDownLegendRegion

pClickRegion dw 0
 public pClickRegion

pOSKFirstRegion dw -1
 public pOSKFirstRegion

pNextActiveRegion dw 0
 public pNextActiveRegion
pCurrentToolButtonRegion dw 0
 public pCurrentToolButtonRegion
pOrgTabRegion dw 0

pCurrentToolBarButton dw 0
 public pCurrentToolBarButton
pFirstControl   dw 0
 public pFirstControl

bLocalState   db 1
 public bLocalState

FontTable label word
 public FontTable
pNormFont    dw offset uifont0
 public pNormFont
pSmallFont   dw offset uifont1
pBigFont     dw offset uifont2
pGraphicFont dw offset uifont3
 public pGraphicFont

wNormFontHeight dw 0
 public wNormFontHeight

bFormColor     db FORM_COLOR,0
 public bFormColor
bShadowColor   db SHADOW_COLOR,0
 public bShadowColor
bOutLineColor  db OUTLINE_COLOR,0
 public bOutLineColor
bLightColor    db LIGHT_COLOR,0
 public bLightColor

bDesktopColor          db BLUE,0
 public bDeskTopColor
bIconForegroundColor   db BLACK,0
 public bIconForegroundColor
bIconBackgroundColor   db
WHITE+WITHBACKCOLOR,0
 public bIconBackgroundColor
bButtonForegroundColor  db BLACK,0
 public bButtonForegroundColor
bCaptionForegroundColor db BLACK,0
 public bCaptionForegroundColor
bCaptionBackgroundColor db GRAY,0
 public bCaptionBackgroundColor
bTitleForegroundColor   db BLACK,0
 public bTitleForegroundColor

bRepaintNeeded   db 0
 public bRepaintNeeded
bRepaintMode     db 0
 public bRepaintMode
bDontChangeProtection db 0
 public bDontChangeProtection
bDoingSpin db 0
 public bDoingSpin
bModalFlag db 0
 public bModalFlag
bModalFlagHold db 0
 public bModalFlagHold

pGraphicsCaption dw 0
 public pGraphicsCaption
pTextCaption     dw 0
 public pTextCaption
wShiftCaption    dw 0
 public wShiftCaption
wCaptionTop      dw 0
 public wCaptionTop
wGraphicCaptionHeight dw 0
 public wGraphicCaptionHeight
wGraphicLegendRight dw 0
 public wGraphicLegendRight

iIgnoreLevel      dw 0
 public iIgnoreLevel
iObjectLevel      dw 0
 public iObjectLevel

iTopAdders label word
 public iTopAdders
        dw 10 dup(0)
iLeftAdders label word
 public iLeftAdders
        dw 10 dup(0)
wDeltaLeft dw 0
 public wDeltaLeft
wDeltaTop  dw 0
 public wDeltaTop

if NEED_ALTKEYS ne 0
AltKeyTable label byte
  db "1234567890"
  db "QWERTYUIOP"
  db "ASDFGHJKL"
  db "ZXCVBNM"
AltKeyTable_end label byte

ScanCodeTable label byte
  db 120,121,122,123,124,125,126,127,128,129
  db 16,17,18,19,20,21,22,23,24,25
  db 30,31,32,33,34,35,36,37,38
  db 44,45,46,47,48,49,50
ScanCodeTable_end label byte
endif
DATASEG_END
.CODE
uimain proc far
  public UIMain

  mov ax,OURDATASEG
  mov ds,ax
  mov ax,5100h
  int 21h
  mov wPSPsegment,bx

  mov ah,0fh
  int 10h
  and al,1111111b
  mov bScreenMode,al
  mov bOrgScreenMode,al

if need_tsr eq 0
  mov ah,0
  mov al,12h
  mov bScreenMode,al
  int 10h
endif

  call ActivatePen

  call far ptr DoCustomStartups

  mov pFirstControl,offset MainForm
  call GetNormFontHeight
  call SetFormHeights

  call InstallInterrupts

if need_tsr eq 0
  call showpen
  mov bRepaintNeeded,-1
  call doevents
  mov ah,0
  mov al,bOrgScreenMode
  and al,1111111b
  int 10h
  call DisinstallInterrupts
  mov ax,0
  int 33h
  ret
else
  mov dx,ProgEnd
  sub dx,wPspSegment
  inc dx
  mov ax,03100h
  int 21h
endif

uimain endp

DoEvents proc near
  public DoEvents

 mov bLocalState,1
deloop:

 call far ptr DoCustomEvents
 jnc delp1
 jmp de100
delp1:

  cmp bRepaintNeeded,0
  jz de4a
  call RepaintAndSetTab
if need_osk ne 0
  call RepaintOSKInMemory
endif
de4a:

  call DoCursorFlash

  cmp bPenEventHappened,0
  jz de2
  call DoPenEvent
de2:

if need_tsr eq 0
  mov ah,1
  int 16h
  jz dpk1
  mov ah,0
  int 16h
  mov bKeyChanged,-1
  mov wKeyPressed,ax
endif
dpk1:

  cmp bTestMode,0
  jz de1
  cmp bKeyChanged,0
  jz de1
  call DoTestModeEvent
de1:

  call CheckTypamaticState
  jnc cte3
  call DoTypamaticEvent
cte3:
  cmp bAutoScrollMode,0
  jz cte1
  call DoAutoScrollEvent
cte1:

  cmp wKeyPressed,0
  jz de6
  call GetTabControlType
  cmp al,KEYEDITBOX
  jz de6
  call DoKeyEvent
  mov wKeyPressed,0
de6:

  cmp pClickRegion,0
  jz de5
  call DoClickEvent
  mov pClickRegion,0
  mov pPenDownActiveRegion,0
de5:
  cmp pPenUpListRegion,0
  jz de5a
  call HandleListPenUp
de5a:

de99:

if need_tsr ne 0
  cmp bRepaintNeeded,0
  jz de101
  jmp deloop
de101:
  cmp bPopupRequired,0
  jz de100
endif

  cmp bLocalState,0
  jz de100
  mov bPopupRequired,0
  jmp deloop
de100:
  ret
DoEvents endp

DoTestModeEvent proc near

  mov ax,wKeyPressed
  cmp al,0
  jnz dke1a

  cmp ah,78h
  jb cfrk1
  cmp ah,7eh
  ja cfrk1
  jmp cfrk2
cfrk1:
  cmp ah,47h
  jae dke1a
cfrk2:
  mov bl,ah
  SM_FUNCTION SM_TEST_FUNCTION
dke1a:
  ret
DoTestModeEvent endp
```

```
CheckTypamaticState proc near
 cmp bTypamaticState,1
 ja  dte1
 jz  dte1a
dte1b:
 clc
 ret
dte1a:
 cmp wTypamaticTimer,8
 jb dte1b
 inc bTypamaticState
 jmp dte1b
dte1:
 cmp wTypamaticTimer,4
 jb dte1b
 stc
 ret
CheckTypamaticState endp

DoTypamaticEvent proc near



  mov si,pTypamaticOSKControl

if need_osk ne 0
 cmp si,offset OSK
 jb dte3
 call CheckIfOnlyOSK
 jnc dte2a
 call SendKeyDownScanCode
 jmp dte98
dte2a
 call SendKey
 jmp dte98
dte3
endif

 mov al,[si].ControlType

 cmp al,SPINUPBUTTON
 jnz dte3a
 call DoSpinUp
 jmp dte98
dte3a

 cmp al,SPINDOWNBUTTON
 jnz dte3b
 call DoSpinDown
 jmp dte98
dte3b

 cmp si,offset vsbUpArrow
 jnz dte3c
 mov di,pPenDownActiveRegion
 call DoVSBUpArrow
 jmp dte98
dte3c:

 cmp si,offset vsbDnArrow
 jnz dte3d
 mov di,pPenDownActiveRegion
 call DoVSBDnArrow
 jmp dte98
dte3d

 jmp dte98

dte98
 mov wTypamaticTimer,0
dte99
 ret
DoTypamaticEvent endp

SetTypaMatic proc near
  public SetTypaMatic
   mov pTypamaticOSKControl,si
   mov wTypamaticTimer,0
   mov bTypamaticState,1
   ret
SetTypamatic endp



ClearScreen proc near
  public ClearScreen

  CLEAR_RECTANGLE
0,0,SCREEN_WIDTH_BYTES,SCREEN_HEIGHT_P
IXELS,bDesktopColor
  ret
ClearScreen endp

BlackenScreen proc near
  public BlackenScreen
  cmp bScreenMode,VGA_MODE
  jnz bls1

  CLEAR_RECTANGLE
0,0,SCREEN_WIDTH_BYTES,SCREEN_HEIGHT_P
IXELS,0
bls1:
  ret
BlackenScreen endp



GetVGAState proc near

  public GetVGAState
if need_tsr ne 0
  cmp bScreenMode,VGA_MODE
  jz gvs0
  ret
gvs0:
  push ax
  push cx
  push bx
  push dx
  mov bx,offset wVideoStateBuffer
  mov dx,03ceh
  mov cl,0
gvs1:
  mov al,cl
  out dx,al
  inc dx
  in al,dx
  dec dx
  mov ah,al
  mov al,cl
  mov [bx],ax
  inc bx
  inc bx
  inc cl
  cmp cl,8
  jbe gvs1
  pop dx
  pop bx
  pop cx
  pop ax
endif
  ret
getvgastate endp



RestVGAState proc near
  public RestVGAState
  if need_tsr ne 0
  cmp bScreenMode,VGA_MODE
  jz rvs0
  ret
rvs0:
  push ax
  push cx
  push bx
  push dx
  mov bx,offset wVideoStateBuffer
  mov cx,9
  mov dx,03ceh
rvs1:
  mov ax,[bx]
  out dx,ax
  inc bx
  inc bx
  loop rvs1
  pop dx
  pop bx
  pop cx
  pop ax
endif
  ret
restvgastate endp

Ascii2Bin proc near
  public Ascii2Bin

  push cx
  xor bx,bx
  xor cx,cx
a2b1:
  lodsb
  cmp al," "
  jz a2b1
  jb a2b3
a2b2:
  cmp al,"0"
  jb a2b3
  cmp al,"9"
  ja a2b3
  xor ah,ah
  sub al,"0"
  xchg bx,ax
  mul word ptr wTenWord
  push dx
  xchg cx,ax
  mul word ptr wTenWord
  xchg ax,cx
  pop dx
  add cx,dx
  add ax,bx
  adc cx,0
  xchg bx,ax
  lodsb
  jmp a2b2
a2b3:
  dec si
  mov dx,cx
  pop cx
  ret
ascii2bin endp

Bin2Ascii proc near
  public Bin2ASCII

  push si
  push dx
  xor ch,ch
m4d0:
  mov si,offset wDivisors
  cmp cl,5
  jz m4d1
  inc si
  inc si
  cmp cl,4
  jz m4d1
  inc si
  inc si
  cmp cl,3
  jz m4d1
  inc si
  inc si
  cmp cl,2
  jz m4d1
  inc si
  inc si
  cmp cl,1
  jz m4d1
  jmp m4dx
m4d1:
  xor dx,dx
  div word ptr [si]
  or al,30h
  cmp al,"0"
  jnz m4d2a
  cmp cl,1
  jz m4d2
  cmp ch,-1
  jz m4d2
  jmp m4d3
m4d2a
  mov ch,-1
m4d2:
  mov [bx],al
  inc bx
m4d3:
  inc si
  inc si
  mov ax,dx
  dec cl
  jnz m4d1
m4dx:
  pop dx
  pop si
  ret
Bin2Ascii endp



JumpOnAL proc near
  public JumpOnAL
          pop     wJumpTableBase
          push    si
          push    ax
          mov     si,wJumpTableBase
joal_rp:    mov     ah,cs:[si]
          or      ah,ah
          jz      joal_nm
          cmp     ah,al
          jz      joal_m
          add     si,3
          jmp     joal_rp
joal_nm:    inc     si
joal_nmr:   mov     wJumpTableBase,si
          pop     ax
          pop     si
          push    wJumpTableBase
          ret
joal_m:     mov     ax,cs:[si+1]
          mov     si,ax
          jmp     joal_nmr
JumpOnAL     endp

JumpOnAX proc near
  public JumpOnAX
          pop     wJumpTableBase
          push    si
          push    ax
          push    bx
          mov     si,wJumpTableBase
joax_rp:    mov     bx,cs:[si]
          or      bx,bx
          jz      joax_nm
          cmp     ax,bx
          jz      joax_m
          add     si,4
          jmp     joax_rp
joax_nm:    inc     si
          inc     si
joax_nmr:   mov     wJumpTableBase,si
          pop     bx
          pop     ax
          pop     si
          push    wJumpTableBase
          ret
joax_m:     mov     ax,cs:[si+2]
          mov     si,ax
          jmp     joax_nmr
JumpOnAX     endp


DisinstallInterrupts proc near
  public DisInstallInterrupts

  REMOVE_INT 1c

if NEED_CRITICAL ne 0
  remove_int  0
  remove_int  24
  remove_int  23
endif

If need_tsr ne 0
  REMOVE_INT 10
endif

    ret
DisinstallInterrupts endp


InstallInterrupts proc near
  INSTALL_INT 1c

if NEED_CRITICAL ne 0
  INSTALL_INT 0
  INSTALL_INT 24
  INSTALL_INT 23
endif

if need_tsr ne 0
  INSTALL_INT 10
endif
    ret
InstallInterrupts endp


New10Int proc far

if need_tsr ne 0
 jmp n10i1
int10active dw 0
n10i1:
 inc cs:int10active
 pushf
 call dword ptr cs:old10int
 dec cs:int10active
 jnz n10i2


 push ax
 push ds
 mov ax,OURDATASEG
 mov ds,ax
 call DoPopUp
 pop ds
 pop ax

n10i2:
endif
 iret

New10Int endp


New1cInt proc far
  push ax
  push ds
  mov ax,OURDATASEG
  mov ds,ax

  inc wCursorTimer
  inc wTypamaticTimer
  inc wAutoScrollTimer
  call far ptr DoCustomTimerProcedures
```

```
if need_tsr ne 0
 call CheckTypamaticState
 jnc n8i4
 jmp n8i5
n8i4:
 cmp bAutoScrollMode,0
 jnz n8i5

 cmp bCursorActive,0
 jz n8i8
 cmp wCursorTimer,10
 jae n8i5
n8i8:
 call far ptr GetCustomPopUpRequest
 jc n8i5
n8i9:
 jmp n8i6
n8i5:
 mov bPopupRequired,-1
n8i6:
 call DoPopup
endif
n8i1:
 pop ds
 pop ax
 jmp dword ptr cs:Old1cInt
New1cInt endp


DoPopUp proc near
 public DoPopUp

if need_tsr ne 0
 cmp bPopupRequired,0
 jz n8i1a

 cmp cs:int10active,0
 jnz n8i1a
 cmp bDoingEvents,0
 jnz n8i1a
 cmp bLocalState,0
 jz n8i1a

 pushf
 cli
 inc bDoingEvents
 mov bPopupRequired,0
 sti

 push es
 push bp
 push bx
 push cx
 push dx
 push di
 push si

n8i2:

 extrn penentry:near
 call penentry


 cld
 call GetVgaState
 call DoEvents
 call RestVgaState
 extrn penexit:near
 call penexit
 pop si
 pop di
 pop dx
 pop cx
 pop bx
 pop bp
 pop es
 cli
 dec bDoingEvents
 popf
n8i1a:
endif
 ret
DoPopUp endp



if NEED_CRITICAL ne 0
fatal_error_code dw 0

New24Int      proc     far
 mov cs:fatal_error_code,di

 pop     ax
 pop     ax
 pop     ax
 pop     ax
 pop     bx
 pop     cx
 pop     dx
 pop     si
 pop     di
 pop     bp
 pop     ds
 pop     es
 mov     bp,sp
 mov     ax,[bp+4]
 push    ax
 popf
 mov     ax,[bp+2]
 mov     [bp]+4,ax
 mov     ax,[bp+0]
 mov     [bp+2],ax
 pop     ax
 mov     ax,1
 stc
 ret
New24Int      endp

New0Int       proc far
              mov  ax,0
              mov  dx,0
              iret
New0Int       endp

control_c_pressed db 0

New23Int  proc far
          mov cs:control_c_pressed,-1
          iret
New23Int  endp

endif


end
Copr. 1995 Zenith Data Systems Corp.

.MODEL SMALL
.code
extrn freescreen:near
extrn UpdateDimensions:near
extrn BlackenScreen:near
extrn DefineCoveredArea:near
extrn FindRegionForControl:near
extrn GoFirstControl:near
extrn GoNextControl:near
extrn GoNextControl:near
extrn isItLegend:near
extrn JumpOnAX:near
extrn PointControlCaption:near
extrn Repaint:near
extrn SetNewTabItemWork:near
extrn SetProtectionForControl:near
extrn UndoCurrentTabItem:near
extrn CancelPenDown:near

include uiinclud.inc
WORKBUF equ "                                        ",0
VCENT=480/2
HCENT=640/2
DWIDE=MAXMESSAGELINE
DHIGH=248
DLEFT=HCENT-(DWIDE/2)
DTOP=VCENT-(DHIGH/2)
DATASEG_BEGIN
extrn ControlDataStorageArea:byte
extrn MainForm:tControl
extrn bCoveredAreaOnly:byte
extrn bDontChangeProtection:byte
extrn bFormColor:byte
extrn bMessageBoxID:byte
extrn bMessageBoxResult:byte
ext. i bModalFlag:byte
extrn bModalFlagHold:byte
extrn pFirstControl:word
extrn pTabRegion:word
extrn pTabRegionHold:word
extrn wCoveredAreaTop:word
extrn wCoveredAreaTopHold:word
extrn wCurrentResource:word
extrn wCurrentResource:word
extrn wPreviousFormHeight:word
extrn rErrorMess1Header:tBUFFHEADER
extrn rErrorMess2Header:tBUFFHEADER
extrn rErrorMess3Header:tBUFFHEADER
extrn rErrorMess4Header:tBUFFHEADER
extrn rRegion:tregion


iSMStrucLen dw 0
pSMBufferStart dw 0,0
pSMBufferEnd  dw 0

wMessageBoxHeight dw 0
  public wMessageBoxHeight
pMessageBoxButtonFrame dw 0
  public pMessageBoxButtonFrame

wMessageContinuationSI dw 0
  public wMessageContinuationSI
wMessageContinuationDX dw 0
  public wMessageContinuationDX


BEGIN_FORM_DEFINITIONS

frmMessageBox label tControl
 public frmMessageBox
CURRENTFORM=$
 CONTROL
FORM,%NORMSTATE,DLEFT,DTOP,DWIDE,DHIG
H,0
lblMessageBox0 label tControl
 public lblMessageBox0
 MAKE_CENTEREDLEGEND
%INVISIBLE,0,16,DWIDE,16
 GRAPHIC_CAPTION SMALL_CRUZER

lblMessageBox1 label tControl
 MAKE_CENTEREDLEGEND
%NORMSTATE,0,32,DWIDE,16
 CAPTION %WORKBUF

lblMessageBox2 label tControl
 MAKE_CENTEREDLEGEND
%NORMSTATE,0,32+16*1,DWIDE,16
 CAPTION %WORKBUF

lblMessageBox3 label tControl
 MAKE_CENTEREDLEGEND
%NORMSTATE,0,32+16*2,DWIDE,16
 CAPTION %WORKBUF

lblMessageBox4 label tControl
 MAKE_CENTEREDLEGEND
%NORMSTATE,0,32+16*3,DWIDE,16
 CAPTION %WORKBUF

lblMessageBox5 label tControl
 MAKE_CENTEREDLEGEND
%NORMSTATE,0,32+16*4,DWIDE,16
 CAPTION %WORKBUF

lblMessageBox6 label tControl
 MAKE_CENTEREDLEGEND
%NORMSTATE,0,32+16*5,DWIDE.16
 CAPTION %WORKBUF

lblMessageBox7 label tControl
 MAKE_CENTEREDLEGEND
%NORMSTATE,0,32+16*6,DWIDE,16
 CAPTION %WORKBUF

lblMessageBox8 label tControl
 MAKE_CENTEREDLEGEND
%NORMSTATE,0,32+16*7,DWIDE,16
 CAPTION %WORKBUF



fraMessageBoxOK label tControl
  public fraMessageBoxOK
BEGIN_FRAME
%INVISIBLE,0,%NEXTTOP+8,DWIDE,24
cmdMessageBoxOK_OK label tControl
 public cmdMessageBoxOK_OK
 MAKE_COMMANDBUTTON
%NORMSTATE,DWIDE/2-32,0,64,24
 CAPTION "OK"
END_FRAME
fraMessageBoxCancel label tControl
  public fraMessageBoxCancel
BEGIN_FRAME
%INVISIBLE,0,%NEXTTOP+8,DWIDE,24
cmdMessageBoxCancel_Cancel label tControl
 public cmdMessageBoxCancel_Cancel
 MAKE_COMMANDBUTTON
%NORMSTATE,DWIDE/2-32,0,64,24
 CAPTION "Cancel"
END_FRAME
fraMessageBoxOKCancel label tControl
  public fraMessageBoxOKCancel
BEGIN_FRAME
%INVISIBLE,0,%NEXTTOP+8,DWIDE,24
cmdMessageBoxOKCancel_OK label tControl
 public cmdMessageBoxOKCancel_OK
 MAKE_COMMANDBUTTON
%NORMSTATE,DWIDE/2-64-16-24,0,64+24,24
 CAPTION "OK"
cmdMessageBoxOKCancel_Cancel label tControl
 public cmdMessageBoxOKCancel_Cancel
 MAKE_COMMANDBUTTON
%NORMSTATE,DWIDE/2+16-8,%SAMETOP,64+24.
24
 CAPTION "Cancel"
END_FRAME
fraMessageBoxARI label tControl
  public fraMessageBoxARI
BEGIN_FRAME
%INVISIBLE,0,%NEXTTOP+8,DWIDE,24
cmdMessageBoxARI_Abort label tControl
 public cmdMessageBoxARI_Abort
 MAKE_COMMANDBUTTON
%NORMSTATE,DWIDE/2-64-16-16,0,56,24
 CAPTION "Abort"
cmdMessageBoxARI_Retry label tControl
 public cmdMessageBoxARI_Retry
 MAKE_COMMANDBUTTON
%NORMSTATE,%NEXTLEFT+8,0,56,24
 CAPTION "Retry"
cmdMessageBoxARI_Ignore label tControl
 public cmdMessageBoxARI_Ignore
 MAKE_COMMANDBUTTON
%NORMSTATE,%NEXTLEFT+8,0,56,24
 CAPTION "Ignore"
END_FRAME
fraMessageBoxYNC label tControl
  public fraMessageBoxYNC
BEGIN_FRAME
%INVISIBLE,0,%NEXTTOP+8,DWIDE,24
cmdMessageBoxYNC_Yes label tControl
 public cmdMessageBoxYNC_Yes
 MAKE_COMMANDBUTTON
%NORMSTATE,DWIDE/2-64-16-16,0,56,24
 CAPTION "Yes"
cmdMessageBoxYNC_No label tControl
 public cmdMessageBoxYNC_No
 MAKE_COMMANDBUTTON
%NORMSTATE,%NEXTLEFT+8,0,56,24
 CAPTION "No"
cmdMessageBoxYNC_Cancel label tControl
 public cmdMessageBoxYNC_Cancel
 MAKE_COMMANDBUTTON
%NORMSTATE,%NEXTLEFT+8,0,56,24

 CAPTION "Cancel"
END_FRAME
fraMessageBoxYNR label tControl
  public fraMessageBoxYNR
BEGIN_FRAME
%INVISIBLE,0,%NEXTTOP+8,DWIDE,24
cmdMessageBoxYNR_Yes label tControl
 public cmdMessageBoxYNR_Yes
 MAKE_COMMANDBUTTON
%NORMSTATE,DWIDE/2-64-16-16,0,56,24
 CAPTION "Yes"
cmdMessageBoxYNR_No label tControl
 public cmdMessageBoxYNR_No
 MAKE_COMMANDBUTTON
%NORMSTATE,%NEXTLEFT+8,0,56,24
 CAPTION "No"
cmdMessageBoxYNR_Retry label tControl
 public cmdMessageBoxYNR_Retry
 MAKE_COMMANDBUTTON
%NORMSTATE,%NEXTLEFT+8,0,56,24
 CAPTION "Retry"
END_FRAME
fraMessageBoxYesNo label tControl
  public fraMessageBoxYesNo
BEGIN_FRAME
%INVISIBLE,0,%NEXTTOP+8,DWIDE,24
cmdMessageBoxYesNo_Yes label tControl
 public cmdMessageBoxYesNo_Yes
 MAKE_COMMANDBUTTON
%NORMSTATE,DWIDE/2-64-16-24,0,64+24,24
 CAPTION "Yes"
cmdMessageBoxYesNo_No label tControl
 public cmdMessageBoxYesNo_No
 MAKE_COMMANDBUTTON
%NORMSTATE,DWIDE/2+16-8,%SAMETOP,64+24,
24
 CAPTION "No"
END_FRAME
fraMessageBoxRetryCancel label tControl
  public fraMessageBoxRetryCancel
BEGIN_FRAME
%NORMSTATE,0,%NEXTTOP+8,DWIDE,24
cmdMessageBoxRetryCancel_Retry label tControl
 public cmdMessageBoxRetryCancel_Retry
 MAKE_COMMANDBUTTON
%NORMSTATE,DWIDE/2-64-16-24,0,64+24,24
 CAPTION "Retry"
cmdMessageBoxRetryCancel_Cancel label tControl
 public cmdMessageBoxRetryCancel_Cancel
 MAKE_COMMANDBUTTON
%NORMSTATE,DWIDE/2+16-8,%SAMETOP,64+24,
24
 CAPTION "Cancel"
END_FRAME
frmMessageBox_end label byte
 public frmMessageBox_end
 END_FORM

END_FORM_DEFINITIONS
```

```
DATASEG_END

 code

CopyMessageToMessageBox proc near

  push word ptr pFirstControl
  mov pFirstControl,offset frmMessageBox
  call GoFirstControl
smb5:
  mov al,[si].ControlType
  call IsItLegend
  jnz smb4
  mov di,si
  call pointControlCaption
  or bx,bx
  jz smb4
sbm5a.
  push ds
  call ReadNextMessageLine
  jc smb6

  cmp al,2
  jbe sbm5b
  xor al,al
sbm5b
  add al,LEFTLEGEND
  mov es:[di].ControlType,al
  and es:[di].ControlState,not(INVISIBLE)
  mov ax es:[di] TopPixel
  add ax,es:[di].PixelHeight
  mov es:wMessageBoxHeight,ax
  add bx,3
  mov di,bx
  mov cx 41

  rep movsb
  xor al,al
  stosb
  jmp smb7

smb6:
  cmp es.wMessageContinuationDX,0
  jz sbm6a
  pop ds
  push es
  push di
  xor dx,dx
  xchg dx,wMessageContinuationDX
  xor si,si
  xchg si,wMessageContinuationSI
  push ax
  push bx
  call PrepareMessageForReading
  pop bx
  pop ax
  pop es
  pop di
  jmp sbm5a


sbm6a:
  or es:[di].ControlState,INVISIBLE

smb7:
  pop ds
smb4.
  call GoNextControl
  jnc smb5

  pop word ptr pFirstControl
  ret
CopyMessageToMessageBox endp

DrawMessageBox proc near
  public DrawMessageBox
  call CancelPenDown

  call UndoCurrentTabItem
  mov pFirstControl,offset frmMessageBox
  mov wPreviousFormHeignt,0
  mov bFormColor,LT_CYAN
  call Repaint

  call GoFirstControl
dmb2.
  cmp [si].ControlType,FRAME
  jnz dmb5
  test [si].ControlState,INVISIBLE
  jz dmb5

dmb6
  call GoNextControl
  jc dmb3
  cmp [si].ControlType,ENDFRAME
  jnz dmb6
  jmp dmb4
dmb5:
  cmp [si].ControlType,COMMANDBUTTON
  jz dmb1
dmb4:
  call GoNextControl
  jnc dmb2
  jmp dmb3

dmb1:
  call FindRegionForControl
  mov si,bx
  call SetNewTabItemWork
dmb3:
  ret
DrawMessageBox endp

PointError proc near
  public PointError


  mov si,offset rErrorMess1Header
  inc ax
  jz se1
  mov si,offset rErrorMess2Header
  inc ax
  jz se1
  mov si,offset rErrorMess3Header
  inc ax
  jz se1
  mov si,offset rErrorMess4Header
se1.
  mov dx,seg rErrorMess1Header
  ret
PointError endp

PrepareMessageBox proc near
  public PrepareMessageBox
  mov al,bModalFlag
  mov bModalFlagHold,al
  mov bModalFlag,0
  push pTabRegion
  pop pTabRegionHold

  push dx
  push si
  p. h bx
  ca l UndoCurrentTabItem
  mov pTabRegion,0
  pop bx
  pop si
  pop dx


  call SetMBXButtons
  call PrepareMessageForReading
  call CopyMessageToMessageBox
  mov ax,wMessageBoxHeight
  add ax,16
  mov bx,pMessageBoxButtonFrame
  or bx,bx
  jz smb8
  mov [bx].TopPixel,ax
  add ax,24+16
smb8:
  mov frmMessageBox.PixelHeight,ax
  ret
PrepareMessageBox endp

PrepareMessageForReading proc near
  push ds
  pop es
  mov ds,dx
  mov ax,[si].iStructLen
  mov es:iSMStrucLen,ax
  mov ax,[si].iBuffLen
  mov bx,word ptr [si].pBuffOff
  add ax,bx
  mov es:pSMBufferStart,bx
  mov es:pSMBufferEnd,ax
  mov ax,word ptr [si].pBuffOff[2]
  mov es:pSMBufferStart[2],ax
  push es
  pop ds
  ret
Pre..reMessageForReading endp

ReadNextMessageLine proc near
  push ds
  pop es
  mov ax,pSMBufferStart
  cmp ax,pSMBufferEnd
  jb mml1
  stc
  ret
mml1:
  mov ax,iSMStrucLen
  lds si,dword ptr pSMBufferStart
  add es:pSMBufferStart,ax
  mov al,[si].cAlignment
  lds si,dword ptr [si].pTextOff
  clc
  ret
ReadNextMessageLine endp

RemoveMessageBox proc near
  public RemoveMessageBox
  mov al,bModalFlagHold
  mov bModalFlag,al


  mov bMessageBoxID,0
  mov bDontChangeProtection,-1
  mov bx,offset frmMessageBox
  call DefineCoveredArea
  push wCoveredAreaTopHold
  pop wCoveredAreaTop
  mov bCoveredAreaOnly,-1
  mov pFirstControl,offset MainForm
  mov wPreviousFormHeight,480
  mov bFormColor,FORM_COLOR
  and wCurrentResource, not(256*128)
  cmp wCurrentResource,0
  jnz rmb1
  call BlackenScreen

  mov pTabRegion,0
  call freescreen
rmb1:

  call CheckScreenUpdateNeeded
  jnc rmb3
  call StopProtecting
rmb3:
  call Repaint
rmb2:
  call StopProtecting

  push pTabRegionHold
  pop si

  call SetNewTabItemWork
  ret
RemoveMessageBox endp

StopProtecting proc near
  public StopProtecting
  mov bDontChangeProtection,0
  mov wCoveredAreaTop,-1
  mov bCoveredAreaOnly,0
  ret
StopProtecting endp

ReportError proc near
  public ReportError
  call PointError
  mov bx,MBX_OK
  call PrepareMessageBox
  call DrawMessageBox
  ret
ReportError endp

ReportMessageClick proc near
  public ReportMessageClick
  mov al,bMessageBoxID
  push ax
  push bx
  cmp al,-1
  jnz rmc1
  mov bl,bMessageBoxResult
  xor bh,bh
  SM_FUNCTION
SM_REPORT_BUTTON_CLICKED
rmc1:
  pop bx
  pop ax
  cmp al,-1
  ret
ReportMessageClick endp

SetMBXButtons proc near

  push si
  push bx
  push word ptr pFirstControl
  mov pFirstControl,offset frmMessageBox

  call GoFirstControl
smb2:
  cmp [si].ControlType,FRAME
  jnz smb1
  or [si].ControlState,INVISIBLE
smb1:
  call GoNextControl
  jnc smb2
  pop word ptr pFirstControl
  pop bx
  pop si
  mov ax,bx
  or ax,ax
  jz smb100

  call JumpOnAX
  dw MBX_OK,offset smb_OK
  dw MBX_CANCEL,offset smb_CANCEL
  dw MBX_OKCANCEL,offset smb_OKCANCEL
  dw MBX_ABORTRETRYIGNORE,offset
smb_ABORTRETRYIGNORE
  dw MBX_YESNOCANCEL,offset
smb_YESNOCANCEL
  dw MBX_YESNORETRY,offset
smb_YESNORETRY
  dw MBX_YESNO,offset smb_YESNO
  dw MBX_RETRYCANCEL,offset
smb_RETRYCANCEL
  dw 0
  xor bx,bx
  jmp smb100

smb_OK:
  mov bx,offset fraMessageBoxOK
  jmp smb99

smb_CANCEL:
  mov bx,offset fraMessageBoxCancel
  jmp smb99

smb_OKCANCEL:
  mov bx,offset fraMessageBoxOKCancel
  jmp smb99

smb_ABORTRETRYIGNORE:
  mov bx,offset fraMessageBoxARI
  jmp smb99

smb_YESNOCANCEL:
  mov bx,offset fraMessageBoxYNC
  jmp smb99

smb_YESNORETRY:
  mov bx,offset fraMessageBoxYNR
  jmp smb99

smb_YESNO:
  mov bx,offset fraMessageBoxYesNo
  jmp smb99

smb_RETRYCANCEL.
  mov bx,offset fraMessageBoxRetryCancel
  jmp smb99


smb99:
  and [bx].ControlState,not(INVISIBLE)

smb100:
  mov pMessageBoxButtonFrame,bx
  ret
SetMBXButtons endp

DoMessageBoxClick proc near
  public DoMessageBoxClick
  mov ax,si
  call JumpOnAX
  dw offset cmdMessageBoxOK_OK,offset
DoCmdMessageBoxOK
  dw offset cmdMessageBoxCancel_Cancel,offset
DoCmdMessageBoxCancel
  dw offset cmdMessageBoxOKCancel_OK,offset
DoCmdMessageBoxOK
  dw offset cmdMessageBoxOKCancel_Cancel,offset
DoCmdMessageBoxCancel
  dw offset cmdMessageBoxARI_Abort,offset
DoCmdMessageBoxAbort
  dw offset cmdMessageBoxARI_Retry,offset
DoCmdMessageBoxRetry
  dw offset cmdMessageBoxARI_Ignore,offset
DoCmdMessageBoxIgnore
  dw offset cmdMessageBoxYNC_Yes,offset
DoCmdMessageBoxYes
  dw offset cmdMessageBoxYNC_No,offset
DoCmdMessageBoxNo
  dw offset cmdMessageBoxYNC_Cancel,offset
DoCmdMessageBoxCancel
  dw offset cmdMessageBoxYNR_Yes,offset
DoCmdMessageBoxYes
  dw offset cmdMessageBoxYNR_No,offset
DoCmdMessageBoxNo
  dw offset cmdMessageBoxYNR_Retry,offset
DoCmdMessageBoxRetry
  dw offset cmdMessageBoxYesNo_Yes,offset
DoCmdMessageBoxYes
  dw offset cmdMessageBoxYesNo_No,offset
DoCmdMessageBoxNo
  dw offset
cmdMessageBoxRetryCancel_Retry,offset
DoCmdMessageBoxRetry
```

```
 dw offset
cmdMessageBoxRetryCancel_Cancel,offset
DoCmdMessageBoxCancel
 dw 0
DoCmdMessageBoxCancel:
 mov ah,MBB_CANCEL
 jmp dcmbc1
DoCmdMessageBoxAbort:
 mov ah,MBB_ABORT
 jmp dcmbc1
DoCmdMessageBoxRetry:
 mov ah,MBB_RETRY
 jmp dcmbc1
DoCmdMessageBoxIgnore:
 mov ah,MBB_IGNORE
 jmp dcmbc1
DoCmdMessageBoxYes:
 mov ah,MBB_YES
 jmp dcmbc1
DoCmdMessageBoxNo:
 mov ah,MBB_NO
 jmp dcmbc1
DoCmdMessageBoxOK:
 mov ah,MBB_OK
 jmp dcmbc1

dcmbc1:
 mov bMessageBoxResult,ah
 call ReportMessageClick
 jz dcmbc2
 call HandleMessageBoxClick
 ret

dcmbc2:
 call RemoveMessageBox
 ret
DoMessageBoxClick endp

END


Copr 1995 Zenith Data Systems Corp.

 model small
include uiinclud.inc
DATASEG_BEGIN
extrn ControlDataStorageArea:byte

szErrorMess1 db "Function Not Supported",0
szErrorMess2 db "Internal Execution Error",0
szErrorMess3 db "Invalid Parameter Error",0
szErrorMess4 db "Unknown Error Code",0

ErrorMess1 label byte
 tMSGBOXBUFF <offset szErrorMess1,seg
szErrorMess1,MB_CENTERED>
MESSSIZE=$-ErrorMess1
rErrorMess1Header tBUFFHEADER <type
tMSGBOXBUFF,MESSSIZE,ErrorMess1>
  public rErrorMess1Header
ErrorMess2 label byte
 tMSGBOXBUFF <offset szErrorMess2,seg
szErrorMess2,MB_CENTERED>
MESSSIZE=$-ErrorMess2
rErrorMess2Header tBUFFHEADER <type
tMSGBOXBUFF,MESSSIZE,ErrorMess2>
  public rErrorMess2Header
ErrorMess3 label byte
 tMSGBOXBUFF <offset szErrorMess3,seg
szErrorMess3,MB_CENTERED>
MESSSIZE equ $-ErrorMess3
rErrorMess3Header tBUFFHEADER <type
tMSGBOXBUFF,MESSSIZE,ErrorMess3>
  public rErrorMess3Header
ErrorMess4 label byte
 tMSGBOXBUFF <offset szErrorMess4,seg
szErrorMess4,MB_CENTERED>
MESSSIZE equ $-ErrorMess4
rErrorMess4Header tBUFFHEADER <type
tMSGBOXBUFF,MESSSIZE,ErrorMess4>
  public rErrorMess4Header
szCalibrateULCMess1 label byte
 db "Touch the pen on the X in",0
szCalibrateULCMess2 label byte
 db "the upper left hand corner",0
szCalibrateULCMess3 label byte
 db "of the screen",0

CalibrateULC label byte
 tMSGBOXBUFF <offset szCalibrateULCMess1,seg
szCalibrateULCMess1,MB_CENTERED>
 tMSGBOXBUFF <offset szCalibrateULCMess2,seg
szCalibrateULCMess2,MB_CENTERED>
 tMSGBOXBUFF <offset szCalibrateULCMess3,seg
szCalibrateULCMess3,MB_CENTERED>
MESSSIZE1 equ $-CalibrateULC
rCalibrateULCHeader tBUFFHEADER <type
tMSGBOXBUFF,MESSSIZE1,CalibrateULC>
 public rCalibrateULCHeader
szCalibrateLRCMess1 label byte
 db "Touch the pen on the X in",0
szCalibrateLRCMess2 label byte
 db "the lower right hand corner",0
szCalibrateLRCMess3 label byte
 db "of the screen",0
CalibrateLRC label byte
 tMSGBOXBUFF <offset szCalibrateLRCMess1,seg
szCalibrateLRCMess1,MB_CENTERED>
 tMSGBOXBUFF <offset szCalibrateLRCMess2,seg
szCalibrateLRCMess2,MB_CENTERED>
 tMSGBOXBUFF <offset szCalibrateLRCMess3,seg
szCalibrateLRCMess3,MB_CENTERED>
MESSSIZE2 equ $-CalibrateLRC
rCalibrateLRCHeader tBUFFHEADER <type
tMSGBOXBUFF,MESSSIZE2,CalibrateLRC>
 public rCalibrateLRCHeader
szRebootMess1 label byte
 db "You are about to reboot",0
szRebootMess2 label byte
 db "your host machine ",0
szRebootMess3 label byte
 db "Remote rebooting could result",0
szRebootMess4 label byte
 db "in data loss on the host.",0
szRebootMess5 label byte
 db "Are you sure you want to continue?",0

RebootHost label byte
 tMSGBOXBUFF <offset szRebootMess1,seg
szRebootMess1,MB_CENTERED>
 tMSGBOXBUFF <offset szRebootMess2,seg
szRebootMess2,MB_CENTERED>
 tMSGBOXBUFF <offset szRebootMess3,seg
szRebootMess3,MB_CENTERED>
 tMSGBOXBUFF <offset szRebootMess4,seg
szRebootMess4,MB_CENTERED>
 tMSGBOXBUFF <offset szRebootMess5,seg
szRebootMess5,MB_CENTERED>
MESSSIZE3 equ $-RebootHost
rRebootHostHeader tBUFFHEADER <type
tMSGBOXBUFF,MESSSIZE3,RebootHost>
 public rRebootHostHeader

szUpgradeMess1 label byte
 db "You are about to upgrade",0
szUpgradeMess2 label byte
 db "your CruisePad.",0
szUpgradeMess3 label byte
 db "Interrupting this upgrade may cause",0
szUpgradeMess4 label byte
 db "problems that require a service call.",0
szUpgradeMess5 label byte
 db "Are you sure you want to continue?",0

Upgrade label byte
 tMSGBOXBUFF <offset szUpgradeMess1,seg
szUpgradeMess1,MB_CENTERED>
 tMSGBOXBUFF <offset szUpgradeMess2,seg
szUpgradeMess2,MB_CENTERED>
 tMSGBOXBUFF <offset szUpgradeMess3,seg
szUpgradeMess3,MB_CENTERED>
 tMSGBOXBUFF <offset szUpgradeMess4,seg
szUpgradeMess4,MB_CENTERED>
 tMSGBOXBUFF <offset szUpgradeMess5,seg
szUpgradeMess5,MB_CENTERED>
MESSSIZE4 equ $-Upgrade
rUpgradeHeader tBUFFHEADER <type
tMSGBOXBUFF,MESSSIZE4,Upgrade>
 public rUpgradeHeader
szUpgradeProgMess1 label byte
 db "Upgrading progress.. "
szUpgradeProgressPercent db " 0% complete",0
 public szUpgradeProgressPercent
szUpgradeProgMess2 label byte
 db " ",0
szUpgradeProgMess3 label byte
 db "Interrupting this upgrade may cause",0
szUpgradeProgMess4 label byte
 db "problems that require a service call.",0


UpgradeProg label byte
 tMSGBOXBUFF <offset szUpgradeProgMess1,seg
szUpgradeProgMess1,MB_CENTERED>
 tMSGBOXBUFF <offset szUpgradeProgMess2,seg
szUpgradeProgMess2,MB_CENTERED>
 tMSGBOXBUFF <offset szUpgradeProgMess3,seg
szUpgradeProgMess3,MB_CENTERED>
 tMSGBOXBUFF <offset szUpgradeProgMess4,seg
szUpgradeProgMess4,MB_CENTERED>
MESSSIZE5 equ $-UpgradeProg

rUpgradeProgHeader tBUFFHEADER <type
tMSGBOXBUFF,MESSSIZE5,UpgradeProg>
 public rUpgradeProgHeader
szUpgradeCompMess1 label byte
 db "Upgrade Complete"
szUpgradeCompMess2 label byte
 db " ",0
szUpgradeCompMess3 label byte
 db "Rebooting CruisePad.. ",0
szUpgradeCompMess4 label byte
 db " ",0

UpgradeComp label byte
 tMSGBOXBUFF <offset szUpgradeCompMess1,seg
szUpgradeCompMess1,MB_CENTERED>
 tMSGBOXBUFF <offset szUpgradeCompMess2,seg
szUpgradeCompMess2,MB_CENTERED>
 tMSGBOXBUFF <offset szUpgradeCompMess3,seg
szUpgradeCompMess3,MB_CENTERED>
 tMSGBOXBUFF <offset szUpgradeCompMess4,seg
szUpgradeCompMess4,MB_CENTERED>
MESSSIZE6 equ $-UpgradeComp

rUpgradeCompHeader tBUFFHEADER <type
tMSGBOXBUFF,MESSSIZE6,UpgradeCom>
  public rUpgradeCompHeader
szUpgradeNAMess1 label byte
 db "No flash upgrade is available",0
szUpgradeNAMess2 label byte
 db "on the currently active",0
szUpgradeNAMess3 label byte
 db "Host connection.",0

UpgradeNA label byte
 tMSGBOXBUFF <offset szUpgradeNAMess1,seg
szUpgradeNAMess1,MB_CENTERED>
 tMSGBOXBUFF <offset szUpgradeNAMess2,seg
szUpgradeNAMess2,MB_CENTERED>
 tMSGBOXBUFF <offset szUpgradeNAMess3,seg
szUpgradeNAMess3,MB_CENTERED>
MESSSIZE7 equ $-UpgradeNA

rUpgradeNAHeader tBUFFHEADER <type
tMSGBOXBUFF,MESSSIZE7,UpgradeNA>
  public rUpgradeNAHeader
pszProgressTable label word
 public pszProgressTable
 dw offset szCallConnected
 dw offset szCallDialing
 dw offset szCallWaiting
 dw offset szCallLogging
 dw offset szCallDisconnected
 dw offset szCallInvalidHost
 dw offset szCallInvalidPW
 dw offset szCallTimeout
 dw offset szCallBusy
 dw offset szCallNoCarrier
 dw offset szCallNoDialTone
 dw offset szCallWaitingRedial
pszProgressTable_End label word
 public pszProgressTable_End


szCallConnected     db    "Connected",0
szCallDialing       db    "Dialing",0
szCallWaiting       db    "Waiting",0
szCallLogging       db    "Logging In",0
szCallDisconnected  db    "Disconnected",0
szCallInvalidHost   db    "Invalid Host",0
szCallInvalidPW     db    "Invalid Password",0
szCallTimeout       db    "Connection Timeout",0
szCallBusy          db    "Busy",0
szCallNoCarrier     db    "No Carrier",0
szCallNoDialTone    db    "No Dial Tone",0
szCallWaitingRedial db    "Waiting for Redial",0
szInvalidProgress   db 0
  public szInvalidProgress
szCallProgressMess1 label byte
 db "Call progress..."
szCallProgressFill label byte
 public szCallProgressFill
 db PROGRESS_MAXLEN+1 dup(0)
CallProgress label byte
 tMSGBOXBUFF <offset szCallProgressMess1,seg
szCallProgressMess1,MB_CENTERED>
 MESSSIZE8 equ $-CallProgress
rCallProgressHeader tBUFFHEADER <type
tMSGBOXBUFF,MESSSIZE8,CallProgress>
  public rCallProgressHeader
szCalibrationXString db CALIBRATION_X,0
 public szCalibrationXString

szSerial db "Serial",0
 public szSerial
DATASEG_END

end


Copr. 1995 Zenith Data Systems Corp.

.model small
include uiinclud.inc
TEXTMODEPGUP equ "Pg",24
TEXTMODEPGDN equ "Pg",25
KH= H100
DATASEG_BEGIN
extrn ControlDataStorageArea:byte
BEGIN_FORM_DEFINITIONS
osk label tcontrol
  public OSK
  CURRENTFORM=$
  NEXTCONTROL=RES_OSK_FULL
  CONTROL FORM,%(INVISIBLE or
MOVEABLE),0,4*16,488,0,160

cmdOSKAbout label tControl
  public cmdOSKAbout
  MAKE_SYMBOLBUTTON
%Normstate+Skiptab,0,0,24,KH
  ABOUTFACE equ "[",1,"]"
  GRAPHIC_CAPTION SMALL_KEYBOARD_ICON

  TEXTMODE_CAPTION aboutface

lblOSKSmallCruzer label tControl
  public lblOSKSmallCruzer
  MAKE_LEFTLEGEND
%NORMSTATE,%NEXTLEFT,%SAMETOP+8
  GRAPHIC_CAPTION SMALL_CRUZER
  TEXTMODE_CAPTION " CruisePAD"


cmdOSKFullKeyboard label tControl
 public cmdOSKFullKeyboard
MAKE_SYMBOLBUTTON
%GRAYED+ISDOWN+SKIPTAB+COMPENSATE,%
FROMRIGHT or
118,0,24,KH
  GRAPHIC_CAPTION FULL_KEYBOARD_ICON
  TEXTMODE_CAPTION "[F]"
cmdOSKAlphaKeyboard label tControl
 public cmdOSKAlphaKeyboard
  MAKE_SYMBOLBUTTON
%NORMSTATE+SKIPTAB,NEXTLEFT,0,24,KH
  GRAPHIC_CAPTION SMALL_KEYBOARD_ICON
  TEXTMODE_CAPTION "[A]"

cmdOSKNumKeyboard label tControl
  public cmdOSKNumKeyboard
  MAKE_SYMBOLBUTTON
%NORMSTATE+SKIPTAB,NEXTLEFT,0,24,KH
  GRAPHIC_CAPTION NUM_KEYBOARD_ICON
  TEXTMODE_CAPTION "[N]"

cmdOSKReduce label tControl
  public cmdOSKReduce
  MAKE_SYMBOLBUTTON
%INVISIBLE+SKIPTAB,NEXTLEFT,0,24,KH
  GRAPHIC_CAPTION
REDUCE_KEYBOARD_ICON
  REDUCEICON equ "[",18,"]"
  TEXTMODE_CAPTION REDUCEICON


cmdOSKEnlarge label tControl
  public cmdOSKEnlarge
  MAKE_SYMBOLBUTTON
%NORMSTATE+SKIPTAB,NEXTLEFT,0,24,KH
  GRAPHIC_CAPTION
ENLARGE_KEYBOARD_ICON
  TEXTMODE_CAPTION REDUCEICON


  NEXTCONTROL=0
  MAKE_CLOSEBUTTON
%NORMSTATE+SKIPTAB,NEXTLEFT,0,24,KH
  GRAPHIC_CAPTION KEYBOARD_EXIT_ICON
  TEXTMODE_CAPTION "[X]"
lblOSKChiselLine label tControl
  public lblOSKChiselLine
  MAKE_CHISELBOX %NORMSTATE
,8,%NEXTTOP,480-8,1


  BEGIN_FRAME
%NORMSTATE,0,%NEXTTOP,0,H50
  END_FRAME


  BEGIN_FRAME
%NORMSTATE,0,%NEXTFRAMETOP,0,0
  END_FRAME

  BEGIN_FRAME
%NORMSTATE,0,%SAMEFRAMETOP,8,0
  END_FRAME
frmAlphaKeyboard label tControl
  public frmAlphaKeyboard
  BEGIN_FRAME %NORMSTATE or
```

```
widen,%NEXTFRAMELEFT,%SAMEFRAMETOP,36,
100*6

oskfirstrow label tCONTROL
   public oskfirstrow
   MAKE_KEYBUTTON %NORMSTATE or WIDEN
or COMPENSATE,0,0,24,KH
   GRAPHIC_CAPTION ESC_KEY
   TEXTMODE_CAPTION "Esc"
   DEFINE_KEY 1,27,27,27,255


   MAKE_KEYBUTTON
%NORMSTATE,%NEXTLEFT+8,%SAMETOP,24,KH

   GRAPHIC_CAPTION F1_KEY
   TEXTMODE_CAPTION "F1"
   DEFINE_KEY 59,59,84,94,104


   MAKE_KEYBUTTON
%NORMSTATE,%NEXTLEFT,%SAMETOP,24,KH
   GRAPHIC_CAPTION F2_KEY
   TEXTMODE_CAPTION "F2"
   DEFINE_KEY 60,60,85,95,105

   MAKE_KEYBUTTON
%NORMSTATE,%NEXTLEFT,%SAMETOP,24,KH
   GRAPHIC_CAPTION F3_KEY
   TEXTMODE_CAPTION "F3"
   DEFINE_KEY 61,61,86,96,106

   MAKE_KEYBUTTON
%NORMSTATE,%NEXTLEFT,%SAMETOP,24,KH
   GRAPHIC_CAPTION F4_KEY
   TEXTMODE_CAPTION "F4"
   DEFINE_KEY 62,62,87,97,107

   MAKE_KEYBUTTON
%NORMSTATE,%NEXTLEFT+8,%SAMETOP,24,KH

   GRAPHIC_CAPTION F5_KEY
   TEXTMODE_CAPTION "F5"
   DEFINE_KEY 63,63,88,98,108

   MAKE_KEYBUTTON
%NORMSTATE,%NEXTLEFT,%SAMETOP,24,KH
   GRAPHIC_CAPTION F6_KEY
   TEXTMODE_CAPTION "F6"
   DEFINE_KEY 64,64,89,99,109

   MAKE_KEYBUTTON
%NORMSTATE,%NEXTLEFT,%SAMETOP,24,KH
   GRAPHIC_CAPTION F7_KEY
   TEXTMODE_CAPTION "F7"
   DEFINE_KEY 65,65,90,100,110

   MAKE_KEYBUTTON
%NORMSTATE,%NEXTLEFT,%SAMETOP,24,KH
   GRAPHIC_CAPTION F8_KEY
   TEXTMODE_CAPTION "F8"
   DEFINE_KEY 66,66,91,101,111

   MAKE_KEYBUTTON
%NORMSTATE,%NEXTLEFT+8,%SAMETOP,24,KH

   GRAPHIC_CAPTION F9_KEY
   TEXTMODE_CAPTION "F9"
   DEFINE_KEY 67,67,92,102,112

   MAKE_KEYBUTTON %NORMSTATE or
WIDEN,%NEXTLEFT,%SAMETOP,24,KH
   GRAPHIC_CAPTION F10_KEY
   TEXTMODE_CAPTION "F10"
   DEFINE_KEY 68,68,93,103,113

   MAKE_KEYBUTTON %NORMSTATE or
WIDEN,%NEXTLEFT,%SAMETOP,24,KH
   GRAPHIC_CAPTION F11_KEY
   TEXTMODE_CAPTION "F11"
   DEFINE_KEY 57h,133,135,137,139

   MAKE_KEYBUTTON %NORMSTATE or
WIDEN,%NEXTLEFT,%SAMETOP,24,KH
   GRAPHIC_CAPTION F12_KEY
   TEXTMODE_CAPTION "F12"
   DEFINE_KEY 58h,134,136,138,140

osksecondrow label tCONTROL
  public osksecondrow
   MAKE_KEYBUTTON %NORMSTATE or WIDEN
or
COMPENSATE,0,%NEXTTOP50,24,KH
   DEFINE_KEY 41,96,126,255,255

   MAKE_KEYBUTTON
%NORMSTATE,%NEXTLEFT,%SAMETOP,24,KH
   DEFINE_KEY 2,49,33,255,120

   MAKE_KEYBUTTON
%NORMSTATE,%NEXTLEFT,%SAMETOP,24,KH
   DEFINE_KEY 3,50,64,3,121

   MAKE_KEYBUTTON
%NORMSTATE,%NEXTLEFT,%SAMETOP,24,KH
   DEFINE_KEY 4,51,35,255,122

   MAKE_KEYBUTTON
%NORMSTATE,%NEXTLEFT,%SAMETOP,24,KH
   DEFINE_KEY 5,52,36,255,123

   MAKE_KEYBUTTON
%NORMSTATE,%NEXTLEFT,%SAMETOP,24,KH
   DEFINE_KEY 6,53,37,255,124

   MAKE_KEYBUTTON
%NORMSTATE,%NEXTLEFT,%SAMETOP,24,KH
   DEFINE_KEY 7,54,94,30,125

   MAKE_KEYBUTTON
%NORMSTATE,%NEXTLEFT,%SAMETOP,24,KH
   DEFINE_KEY 8,55,38,255,126

   MAKE_KEYBUTTON
%NORMSTATE,%NEXTLEFT,%SAMETOP,24,KH
   DEFINE_KEY 9,56,42,255,127

   MAKE_KEYBUTTON
%NORMSTATE,%NEXTLEFT,%SAMETOP,24,KH
   DEFINE_KEY 10,57,40,255,128

   MAKE_KEYBUTTON
%NORMSTATE,%NEXTLEFT,%SAMETOP,24,KH
   DEFINE_KEY 11,48,41,255,129

   MAKE_KEYBUTTON
%NORMSTATE,%NEXTLEFT,%SAMETOP,24,KH
   DEFINE_KEY 12,45,95,31,130

   MAKE_KEYBUTTON
%NORMSTATE,%NEXTLEFT,%SAMETOP,24,KH
   DEFINE_KEY 13,61,43,255,131

   MAKE_KEYBUTTON %NORMSTATE
,%NEXTLEFT,%SAMETOP,-1,KH
   GRAPHIC_CAPTION BS_KEY
   DEFINE_KEY 14,8, 8,127,255
   BACKSPACECAPTION equ 32,17,196,196
   TEXTMODE_CAPTION BACKSPACECAPTION
   SETWIDTHS 40,56,48,48

   MAKE_KEYBUTTON %NORMSTATE or WIDEN
or
COMPENSATE,0,%NEXTTOP,32,KH
   GRAPHIC_CAPTION TAB_KEY
   TEXTMODE_CAPTION " Tab"
   DEFINE_KEY 15,9,15,255,255

   MAKE_KEYBUTTON
%NORMSTATE,%NEXTLEFT,%SAMETOP,24,KH
   DEFINE_KEY 16,113,81,17,16

   MAKE_KEYBUTTON
%NORMSTATE,%NEXTLEFT,%SAMETOP,24,KH
   DEFINE_KEY 17,119,87,23,17

   MAKE_KEYBUTTON
%NORMSTATE,%NEXTLEFT,%SAMETOP,24,KH
   DEFINE_KEY 18,101,69, 5,18

   MAKE_KEYBUTTON
%NORMSTATE,%NEXTLEFT,%SAMETOP,24,KH
   DEFINE_KEY 19,114,82,18,19

   MAKE_KEYBUTTON
%NORMSTATE,%NEXTLEFT,%SAMETOP,24,KH
   DEFINE_KEY 20,116,84,20,20

   MAKE_KEYBUTTON
%NORMSTATE,%NEXTLEFT,%SAMETOP,24,KH
   DEFINE_KEY 21,121,89,25,21

   MAKE_KEYBUTTON
%NORMSTATE,%NEXTLEFT,%SAMETOP,24,KH
   DEFINE_KEY 22,117,85,21,22

   MAKE_KEYBUTTON
%NORMSTATE,%NEXTLEFT,%SAMETOP,24,KH
   DEFINE_KEY 23,105,73, 9,23

   MAKE_KEYBUTTON
%NORMSTATE,%NEXTLEFT,%SAMETOP,24,KH
   DEFINE_KEY 24,111,79,15,24

   MAKE_KEYBUTTON
%NORMSTATE,%NEXTLEFT,%SAMETOP,24,KH
   DEFINE_KEY 25,112,80,16,25

   MAKE_KEYBUTTON
%NORMSTATE,%NEXTLEFT,%SAMETOP,24,KH
   GRAPHIC_CAPTION LEFT_BRAKET_KEY
   TEXTMODE_CAPTION " ["
   DEFINE_KEY 26,91,123,27,255

   MAKE_KEYBUTTON
%NORMSTATE,%NEXTLEFT,%SAMETOP,24,KH
   GRAPHIC_CAPTION RIGHT_BRAKET_KEY
   TEXTMODE_CAPTION " ]"

   DEFINE_KEY 27,93,125,29,255

   MAKE_KEYBUTTON %NORMSTATE
,%NEXTLEFT,%SAMETOP,-1,KH
   DEFINE_KEY 43,92,124,28,255
   SETWIDTHS 32,40,40,32

OSKCapsLock label TControl
   public OSKCapslock

   MAKE_CAPSLOCKBUTTON %NORMSTATE or
WIDEN or
COMPENSATE,0,%NEXTTOP,40,KH
   GRAPHIC_CAPTION CAPS_KEY
   TEXTMODE_CAPTION " Caps"
   DEFINE_KEY 58,255,255,255,255

   MAKE_KEYBUTTON
%NORMSTATE,%NEXTLEFT,%SAMETOP,24,KH
   DEFINE_KEY 30,97,65, 1,30

   MAKE_KEYBUTTON
%NORMSTATE,%NEXTLEFT,%SAMETOP,24,KH
   DEFINE_KEY 31,115,83,19,31

   MAKE_KEYBUTTON
%NORMSTATE,%NEXTLEFT,%SAMETOP,24,KH
   DEFINE_KEY 32,100,68, 4,32

   MAKE_KEYBUTTON
%NORMSTATE,%NEXTLEFT,%SAMETOP,24,KH
   DEFINE_KEY 33,102,70, 6,33

   MAKE_KEYBUTTON
%NORMSTATE,%NEXTLEFT,%SAMETOP,24,KH
   DEFINE_KEY 34,103,71, 7,34

   MAKE_KEYBUTTON
%NORMSTATE,%NEXTLEFT,%SAMETOP,24,KH
   DEFINE_KEY 35,104,72, 8,35

   MAKE_KEYBUTTON
%NORMSTATE,%NEXTLEFT,%SAMETOP,24,KH
   DEFINE_KEY 36,106,74,10,36

   MAKE_KEYBUTTON
%NORMSTATE,%NEXTLEFT,%SAMETOP,24,KH
   DEFINE_KEY 37,107,75,11,37

   MAKE_KEYBUTTON
%NORMSTATE,%NEXTLEFT,%SAMETOP,24,KH
   DEFINE_KEY 38,108,76,12,38

   MAKE_KEYBUTTON
%NORMSTATE,%NEXTLEFT,%SAMETOP,24,KH
   DEFINE_KEY 39,59,58,255,255

   MAKE_KEYBUTTON
%NORMSTATE,%NEXTLEFT,%SAMETOP,24,KH
   DEFINE_KEY 40,39,34,255,255

   MAKE_KEYBUTTON %NORMSTATE
,%NEXTLEFT,%SAMETOP,-1,KH
   GRAPHIC_CAPTION ENTER_KEY
   ENTERKEYCAPTION equ
32,17,196,217,32,32,32
   TEXTMODE_CAPTION ENTERKEYCAPTION
   DEFINE_KEY 28,13,13,10,255
   SETWIDTHS 48,64,56,56

   MAKE_LSHIFTKEYBUTTON %NORMSTATE or
WIDEN or
COMPENSATE,0,%NEXTTOP,56,KH
   GRAPHIC_CAPTION SHIFT_KEY
   TEXTMODE_CAPTION " Shift  "
   DEFINE_KEY 42,255,255,255,255

   MAKE_KEYBUTTON
%NORMSTATE,%NEXTLEFT,%SAMETOP,24,KH
   DEFINE_KEY 44,122,90,26,44

   MAKE_KEYBUTTON
%NORMSTATE,%NEXTLEFT,%SAMETOP,24,KH
   DEFINE_KEY 45,120,88,24,45

   MAKE_KEYBUTTON
%NORMSTATE,%NEXTLEFT,%SAMETOP,24,KH
   DEFINE_KEY 46,99,67, 3,46

   MAKE_KEYBUTTON
%NORMSTATE,%NEXTLEFT,%SAMETOP,24,KH
   DEFINE_KEY 47,118,86,22,47

   MAKE_KEYBUTTON
%NORMSTATE,%NEXTLEFT,%SAMETOP,24,KH
   DEFINE_KEY 48,98,66, 2,48

   MAKE_KEYBUTTON
%NORMSTATE,%NEXTLEFT,%SAMETOP,24,KH
   DEFINE_KEY 49,110,78,14,49

   MAKE_KEYBUTTON
%NORMSTATE,%NEXTLEFT,%SAMETOP,24,KH
   DEFINE_KEY 50,109,77,13,50

   MAKE_KEYBUTTON
%NORMSTATE,%NEXTLEFT,%SAMETOP,24,KH
   DEFINE_KEY 51,44,60,255,255

   MAKE_KEYBUTTON
%NORMSTATE,%NEXTLEFT,%SAMETOP,24,KH
   DEFINE_KEY 52,46,62,255,255

   MAKE_KEYBUTTON
%NORMSTATE,%NEXTLEFT,%SAMETOP,24,KH
   DEFINE_KEY 53,47,63,255,255

   MAKE_RSHIFTKEYBUTTON %NORMSTATE
,%NEXTLEFT,%SAMETOP,-1,KH
   GRAPHIC_CAPTION SHIFT_KEY
   TEXTMODE_CAPTION " Shift  "
   DEFINE_KEY 54,255,255,255,255
   SETWIDTHS 56,72,64,64

ctrlkey1 label tcontrol
   public ctrlkey1
   MAKE_CTRLKEYBUTTON %NORMSTATE or
WIDEN or
COMPENSATE,0,%NEXTTOP,32,KH
   GRAPHIC_CAPTION CTRL_KEY
   TEXTMODE_CAPTION " Ctl"
   DEFINE_KEY 29,255,255,255,255

altkey1 label tcontrol
   public altkey1
   MAKE_ALTKEYBUTTON
%NORMSTATE,%NEXTLEFT+32,%SAMETOP,32,K
H
   GRAPHIC_CAPTION ALT_KEY
   DEFINE_KEY 56,255,255,255,255
   TEXTMODE_CAPTION "Alt  "

   MAKE_KEYBUTTON
%NORMSTATE,%NEXTLEFT,%SAMETOP,7*24,KH
   DEFINE_KEY 57,32,32,32,32

altkey2 label tcontrol
   public altkey2
   MAKE_ALTKEYBUTTON
%NORMSTATE,%NEXTLEFT,%SAMETOP,32,KH
   GRAPHIC_CAPTION ALT_KEY
   TEXTMODE_CAPTION "Alt  "
   DEFINE_KEY 0E0h*256+56,255,255,255,255

ctrlkey2 label tcontrol
   public ctrlkey2
   MAKE_CTRLKEYBUTTON %NORMSTATE
,%NEXTLEFT+24,%SAMETOP,-1,KH
   GRAPHIC_CAPTION CTRL_KEY
   TEXTMODE_CAPTION "Ctl"
   DEFINE_KEY 0E0h*256+29,255,255,255,255
   SETWIDTHS 32,48,40,40

   END_FRAME


frmNumericKeyboard label tControl
 public frmNumericKeyboard
BEGIN_FRAME %NORMSTATE or
compensate,%NEXTFRAMELEFT,%SAMEFRAMET
OP,96,%H100*6

   MAKE_KEYBUTTON %NORMSTATE or
WIDEN,0,0,24,KH
   GRAPHIC_CAPTION PRT_KEY
   TEXTMODE_CAPTION "Prt"
   DEFINE_KEY 0E036h,255,255,255,255

OSKScrollLock label TControl
   public OSKScrollLock

   MAKE_SCROLLLOCKBUTTON %NORMSTATE
or
WIDEN,%NEXTLEFT,%SAMETOP,24,KH
   GRAPHIC_CAPTION SLK_KEY
   TEXTMODE_CAPTION "SLk"
   DEFINE_KEY 046h,255,255,255,255
```

```
 MAKE_KEYBUTTON %NORMSTATE or
WIDEN,%NEXTLEFT,%SAMETOP,24,KH
  GRAPHIC_CAPTION PSE_KEY
  TEXTMODE_CAPTION "Pse"
  DEFINE_KEY 0E046h,255,255,255,255

 MAKE_KEYBUTTON %NORMSTATE or
WIDEN,%NEXTLEFT,%SAMETOP,24,KH
  GRAPHIC_CAPTION SYSREQ_KEY
  TEXTMODE_CAPTION "Sys"
  DEFINE_KEY 105,255,255,255,255

OSKNumLock label TControl
  public OSKNumLock

 MAKE_NUMLOCKBUTTON %NORMSTATE or
WIDEN,0,%NEXTTOP50,24,KH
  GRAPHIC_CAPTION NLK_KEY
  TEXTMODE_CAPTION "NLk"
  DEFINE_KEY 045h,255,255,255,255

 MAKE_KEYBUTTON %NORMSTATE or
WIDEN,%NEXTLEFT,%SAMETOP,24,KH
  DEFINE_KEY 0E035h,47,47,255,255

 MAKE_KEYBUTTON %NORMSTATE or
WIDEN,%NEXTLEFT,%SAMETOP,24,KH
  DEFINE_KEY 37h,42,42,255,255

 MAKE_KEYBUTTON %NORMSTATE or
WIDEN,%NEXTLEFT,%SAMETOP,24,KH
  DEFINE_KEY 4Ah,45,45,255,255

 MAKE_KEYBUTTON %NORMSTATE or
WIDEN,0,%NEXTTOP,24,KH
  GRAPHIC_CAPTION HM_KEY
  TEXTMODE_CAPTION "Hm"
  DEFINE_KEY 71,71,55,77h,255

 MAKE_KEYBUTTON %NORMSTATE or
WIDEN,%NEXTLEFT,%SAMETOP,24,KH
  GRAPHIC_CAPTION UA_KEY
  UACAPTION equ " ",24
  TEXTMODE_CAPTION UACAPTION
  DEFINE_KEY 72,72,56,255,255

 MAKE_KEYBUTTON %NORMSTATE or
WIDEN,%NEXTLEFT,%SAMETOP,24,KH
  GRAPHIC_CAPTION PGUP_KEY
  TEXTMODE_CAPTION TEXTMODEPGUP
  DEFINE_KEY 73,73,57,84h,255

 MAKE_KEYBUTTON %NORMSTATE or
WIDEN,%NEXTLEFT,%SAMETOP,24,KH*2
  DEFINE_KEY 4eh,43,43,255,255
  GRAPHIC_CAPTION PLUS_KEY
  PLUSCAPTION equ 32,43,32,222,13,32,32,32
  TEXTMODE_CAPTION PLUSCAPTION

 MAKE_KEYBUTTON %NORMSTATE or
WIDEN,0,%NEXTTOP or
PRIORFLAG,24,KH
  GRAPHIC_CAPTION LA_KEY
  LACAPTION equ " ",27
  TEXTMODE_CAPTION LACAPTION
  DEFINE_KEY 75,75,52,73h,255

 MAKE_KEYBUTTON %NORMSTATE or
WIDEN,%NEXTLEFT,%SAMETOP,24,KH
  GRAPHIC_CAPTION GRAPHIC_SPACER
  TEXTMODE_CAPTION " "

  DEFINE_KEY 76,76,53,255,255

 MAKE_KEYBUTTON %NORMSTATE or
WIDEN,%NEXTLEFT,%SAMETOP,24,KH
  GRAPHIC_CAPTION RA_KEY
  RACAPTION equ " ",26
  TEXTMODE_CAPTION RACAPTION
  DEFINE_KEY 77,77,54,74h,255

 MAKE_KEYBUTTON %NORMSTATE or
WIDEN,0,%NEXTTOP,24,KH
  GRAPHIC_CAPTION END_KEY
  TEXTMODE_CAPTION "End"
  DEFINE_KEY 79,79,49,75h,255

 MAKE_KEYBUTTON %NORMSTATE or
WIDEN,%NEXTLEFT,%SAMETOP,24,KH
  GRAPHIC_CAPTION DA_KEY
  DACAPTION equ " ",25
  TEXTMODE_CAPTION DACAPTION
  DEFINE_KEY 80,80,50,255,255

 MAKE_KEYBUTTON %NORMSTATE or
WIDEN,%NEXTLEFT,%SAMETOP,24,KH
  GRAPHIC_CAPTION PGDN_KEY
  TEXTMODE_CAPTION TEXTMODEPGDN

  DEFINE_KEY 81,81,51,76h,255


 MAKE_KEYBUTTON %NORMSTATE or
WIDEN,%NEXTLEFT,%SAMETOP,24,H200
  GRAPHIC_CAPTION ENT_KEY
  ENTCAPTION equ 69,110,116,222,13,32,32,32
  TEXTMODE_CAPTION ENTCAPTION

  DEFINE_KEY 0e01ch,13,13,10,255


 MAKE_KEYBUTTON
%NORMSTATE,0,%NEXTTOP or
PRIORFLAG,-1,KH
  GRAPHIC_CAPTION INS_KEY
  TEXTMODE_CAPTION "Ins  "
  DEFINE_KEY 82,82,48,255,255
  SETWIDTHS 48,64,64,64

 MAKE_KEYBUTTON %NORMSTATE or
WIDEN,%NEXTLEFT,%SAMETOP,24,KH
  GRAPHIC_CAPTION DEL_KEY
  TEXTMODE_CAPTION "Del"
  DEFINE_KEY 83,83,46,255,255


 END_FRAME

 END_FORM
END_FORM_DEFINITIONS

DATASEG_END

end



Copr 1995 Zenith Data Systems Corp

.MODEL SMALL
.code
extrn AdjustButtonDimensions:near
extrn Ascii2Bin:near
extrn CheckIfCovered:near
extrn DefineCoveredArea:near
extrn DoPenUpEvent:near
extrn Draw4Color:near
extrn DrawString:near
extrn DrawUpButton:near
extrn FillScreenArea:near
extrn GetTabControlType:near
extrn GoFirstControl:near
extrn GoNextControl:near
extrn GoNextControl:near
extrn Repaint:near
extrn RepaintWork:near
extrn RestVGAState:near
extrn SetCaptionPointers:near
extrn SetFormHeights:near
extrn SetNewTabItemWork1:near
extrn SetNewTabItemWork:near
extrn SetProtectionForControl:near
extrn SetTypaMatic:near
extrn UndoButtonDown:near
extrn UndoCurrentTabItem:near
extrn freescreen:near
extrn reconfigureosk:near
extrn usenormalcolors:near
extrn repaintindividualcontrol:near

include uiinclud.inc


DATASEG_BEGIN
ext: bReportOSKDimensions:byte
ext: bNextOSKConfiguration:byte
extrn cmdHotKeys:tCONTROL
extrn frmNumericKeyboard:tCONTROL
extrn rCursorRegion:tREGION
extrn cmdOSKFullKeyboard:tCONTROL
extrn cmdOSKReduce:tCONTROL
extrn cmdOSKEnlarge:tCONTROL
extrn cmdOSKFullKeyboad:tCONTROL
extrn frmOSKAlphaKeyboad:tCONTROL
extrn frmOSKNumericKeyboad:tCONTROL
extrn lblOSKSmallCruzer:tCONTROL
extrn lblOSKChiselLine:tCONTROL
extrn cmdOSKAbout:tCONTROL
extrn cmdOSKNumKeyboard:tCONTROL
extrn cmdOSKAlphaKeyboard:tCONTROL
extrn frmAlphaKeyboard:tCONTROL
extrn ControlDataStorageArea:byte
extrn OSK:tControl

extrn OSKCapsLock:tControl
extrn OSKNumLock:tControl
extrn OSKScrollLock:tControl

extrn AboutIcon:byte
extrn SmallAboutIcon:byte
extrn bCoveredAreaOnly:byte
extrn bDeskTopColor:byte
extrn bDontChangeProtection:byte
extrn bKeyChanged:byte
extrn bModalFlag:byte
extrn bNoDimensionUpdate:byte
extrn bPopUpRequired:byte
extrn bRepaintMode:byte
extrn bRepaintNeeded:byte
extrn bScreenMode:byte
extrn bShadowColor:byte
extrn pCurrentFont:word
extrn pCurrentToolBarButton:word
extrn pFirstControl:word
extrn pGraphicFont:word
extrn pNextActiveRegion:word
extrn pOSKFirstRegion:word
extrn pPenDownActiveRegion:word
extrn pTabRegion:word
extrn rActiveRegions:tRegion
extrn rREGION:tREGION
extrn rTabRegion:tREGION
extrn uifont4:word
extrn wCoveredAreaLeft:word
extrn wCoveredAreaTop:word
extrn wCoveredAreaTopHold:word
extrn wCurrentResource:word
extrn wCurrentResource:word
extrn wFormWidth:word
extrn wKeyPressed:word
extrn wHotKeyRightPixel:word
extrn ctrlkey1:tCONTROL
extrn ctrlkey2:tCONTROL
extrn altkey1:tCONTROL
extrn altkey2:tCONTROL



bDontCenterOSK db 0
  public bDontCenterOSK

bIgnoreOSKShow db 0

ScanCodePasser label tSCANCODES
  public ScanCodePasser
        dw 400 dup(0)
SCANCODESIZE equ $-ScanCodePasser

ScanCodeHeader tBUFFHEADER <type
tSCANCODES,SCANCODESIZE,ScanCodePasser>
  public ScanCodeHeader

bResetHotKeyDataLength db 0

 public bResetHotKeyDataLength
bKeyboardCode db 0
 public bKeyboardCode

bKeyStatePrev dw 0

bOSKLastState db 0
 public bOSKLastState

bReleaseShift db 0
  public bReleaseShift

bKeyState db 0,0
  public bKeyState

bAltNumberCount db 0
  public bAltNumberCount

bAltNumberAccum db 0,0,0,0

bDontShowOSK db 0
  public bDontShowOSK

bEnlargeFlag db 0,0
  public bEnlargeFlag


wKeyWidth dw 0
  public wKeyWidth

bCaptionLetter  db " ",0,0
  public bCaptionLetter

bDummyCaption db 0,80 dup(0)
  public bDummyCaption

bBigCruzerWork db BIG_CRUZER,0
bSmallCruzerWork db SMALL_CRUZER,0
bKeyDownType db 0
DATASEG_END
.code

ShowOSKForClick proc near
  public ShowOSKForClick



  cmp bNextOSKConfiguration,0
  jz sofc1
  push ax
  mov al,bNextOSKConfiguration
  and al,111b
  xor ah,ah
  mov bIgnoreOSKShow,-1
  call ReconfigureOSK
  mov bIgnoreOSKShow,0
  pop ax

sofc1:
  cmp bDontShowOSK,0
  jnz dce4d

  cmp al,PWEDITBOX
  jz eeff

  cmp al,KEYEDITBOX
  jz eeff
  cmp bKeyboardCode,0
  jnz dce4d
eeff:

  test osk.ControlState,INVISIBLE
  jz dce4d

  mov ax,rCursorRegion.wCurrentTop


  cmp ax,480/2
  jae dce4d1
  mov ax,480
  sub ax,osk.PixelHeight
  jmp dce4d2
dce4d1:
  mov ax,0
dce4d2:
  mov osk.TopPixel,ax
  call ShowOSK
dce4d:
  ret
ShowOSKForClick endp

CancelOSKPenDown proc near
  public CancelOSKPenDown

   push si
   push bx
   push ax
   mov si,pPenDownActiveRegion
   cmp si,pOSKFirstRegion
   jb copd1

   call DoPenUpEvent
copd1:
   pop ax
   pop bx
   pop si
   ret
CancelOSKPenDown endp

SetOSKReducedButtons proc near
  public SetOSKReducedButtons


 or cmdOSKReduce.ControlState,INVISIBLE
 and cmdOSKEnlarge.ControlState,not(INVISIBLE)
 ret
SetOSKReducedButtons endp

SetOSKEnlargedButtons proc near
  public SetOSKEnlargedButtons


 or cmdOSKEnlarge ControlState,INVISIBLE
 and cmdOSKReduce.ControlState,not(INVISIBLE)
 ret
SetOSKEnlargedButtons endp

ReGrayOSKTypeButtons proc near
  public ReGrayOSKTypeButtons

 call hideOSK
 call RepaintUnderOSK
 or OSK.ControlState,INVISIBLE
 mov al,not(GRAYED+ISDOWN)
 and cmdOSKFullKeyboard.ControlState,al
 and cmdOSKAlphaKeyboard.ControlState,al
 and cmdOSKNumKeyboard.ControlState,al
 or [si].ControlState,GRAYED+ISDOWN
```

```
and frmAlphaKeyboard.ControlState,not(INVISIBLE)
and
frmNumericKeyboard.ControlState,not(INVISIBLE)
ret

ReGrayOSKTypeButtons endp

RetainOSKRightAndShow proc near
  public RetainOSKRightAndShow

  cmp bIgnoreOSKShow,-1
  jnz roras1
  ret
roras1:
  call SetOSKCoordinates
  cmp bReportOSKDimensions,0
  jz roras1b
   mov si,offset rREGION
    mov di,offset osk
    mov ax,[di].toppixel
     push dx
     extrn getmaxvalidscreenrow:near
     call getmaxvalidscreenrow
     cmp ax,dx
     jbe eeee
     mov ax,dx
      mov [di].toppixel,ax



eeee
     pop dx
     mov [si].wCurrentTop,ax
     add ax,[di].pixelheight
     dec ax
     mov [si].wCurrentBottom,ax
     mov ax,[di].leftpixel
     mov [si].wCurrentLeft,ax
     add ax,[di].pixelwidth
     dec ax
     mov [si].wCurrentRight,ax
     cmp bScreenMode,12h
     jz rgr
     mov ax,16
     add [si].wCurrentRight,ax
      add ax,8
     add [si].wCurrentBottom,ax
rgr
     extrn PassOSKDimensions:near
    call PassOSKDimensions
   jmp eer
roras1b:
 call ShowOSK

 cmp pTabRegion,0
 jz eer
 mov si,offset rTabRegion
 call SetNewTabItemWork1
eer:
 ret
RetainOSKRightAndShow endp


setoskcoordinates proc near
  public setoskcoordinates
  mov bx,offset OSK
  mov [bx].PixelHeight,0
  push osk.LeftPixel
  mov [bx].LeftPixel,0

  call ComputeOSKHeight
  pop osk.LeftPixel


  mov bx,OSK.PixelHeight

  cmp bDontCenterOSK,-1
  jz roras1a
  mov ax,640
  sub ax,OSK.PixelWidth
  sar ax,1
   ROUND_TO_BYTE_BOUNDARY ax
  mov OSK.LeftPixel,ax
roras1a:
  mov ax,OSK.TopPixel
  add ax,bx
  cmp bScreenMode,12h
  jz roras3
  cmp ax,25*8
  jbe roras2
  mov ax,25*8
  sub ax,bx
  jmp roras4
roras3:
  cmp ax,480
  jbe roras2
  mov ax,480
  sub ax,bx
roras4:
  cmp bDontCenterOSK,-1
  mov bDontCenterOSK,0
  jz roras2
 mov OSK.TopPixel,ax
roras2:
 ret
setoskcoordinates endp

DoHideOSK proc near
 public DoHideOSK

 test osk.ControlState,INVISIBLE
 jnz dho1

 call HideOSK
 call RepaintUnderOSK
 or OSK.ControlState,INVISIBLE
dho1:
 and wCurrentResource,not(111b)
 ret
DoHideOSK endp

HideOSK proc near
 public HideOSK

 test osk.ControlState,INVISIBLE
 jnz hosk1
 push ax
 push si
 push bx
 mov di,pOSKFirstRegion
 cmp di,-1
 jz hok1
 call HideForm
 push pOSKFirstRegion
 pop pNextActiveRegion
 mov pOSKFirstRegion,-1
hok1:
 pop bx
 pop si
 pop ax
hosk1:
 ret
HideOSK endp


HideForm proc near
 public HideForm

 push di
 mov bx,[di].pCurrentControl
 push bx
 or [bx].ControlState,INVISIBLE
 call UnprotectOSK

 mov dx,[di].wCurrentTop
 mov cx,[di].wCurrentLeft
 mov bh,bDeskTopColor
 test wCurrentResource,not(111b)
 jnz hf1
  jmp noclear

 mov bh,0
 cmp bScreenMode,12h
 jz hf1

 mov bh,7

hf1:
 mov ax,[di].wCurrentHeight
 mov si,[di].wCurrentRight
 sub si,cx
 inc si
 DIVIDE_BY_8 si

 call FillScreenArea
noclear:
 pop bx
 pop di
 ret
HideForm endp


InterpretShift proc near
 public InterpretShift

 call IsItNumericKey
 jnz is1
 test bl,NUM_LOCK_DOWN
 jz is1

 test bl,L_SHIFT_DOWN or R_SHIFT_DOWN
 jnz sld1
   mov al,dh
   ret
sld1:

 and bl,not(L_SHIFT_DOWN or R_SHIFT_DOWN)
 mov ah,dl
 xor al,al
 ret

if 0
 mov bh,bl
 and bl,not(L_SHIFT_DOWN or R_SHIFT_DOWN)
 not bh
 and bh,L_SHIFT_DOWN or R_SHIFT_DOWN
 or bl,bh
endif

is1:
 mov bh,dl
 sub bh,dh
 cmp bh,32
 jz sk2a
is2:
 test bl,L_SHIFT_DOWN or R_SHIFT_DOWN
 jnz sk2c
 mov al,dl
 ret
sk2c:
 mov al,dh
     cmp ah,dl
     jnz sk2c2
     mov ah,dh
     xor al,al
     jmp sk2c1
sk2c2
    cmp al,ah
    jnz sk2c1
    xor al,al
sk2c1:



 ret

sk2a:
 xor bh,bh
 test bl,CAPS_LOCK_DOWN
 jz sk2b
 mov bh,-1
sk2b:
 test bl,L_SHIFT_DOWN or R_SHIFT_DOWN
 jz sk2d
 not bh
sk2d:
 or bh,bh
 jz sk2e
 mov al,dh
 ret
sk2e.
 mov al,dl
 ret
InterpretShift endp

ReShowOSK proc near
 public ReshowOSK

 push ax
 push si
   cmp pOSKFirstRegion,-1
   jnz eezz
   mov pOSKFirstRegion,offset rActiveRegions
eezz:
 push pOSKFirstRegion
 pop pNextActiveRegion
 or osk.ControlState,INVISIBLE
 mov bRepaintMode,1

 call ShowOSK
 pop si
 pop ax
 ret
ReShowOSK endp

RepaintOSK proc near
  public RepaintOSK

 push bx
  push pNextActiveRegion
  pop pOSKFirstRegion
  push pFirstControl
  mov pFirstControl,offset OSK
   test OSK.ID,4
   jz rod1
   mov bEnlargeFlag,-1
rod1:
  call RepaintWork
  mov bEnlargeFlag,0
  pop pFirstControl
  mov bx,wCurrentResource
  and bx,not(111b)
  or bx,OSK.ID
  mov wCurrentResource,bx
 pop bx
 ret
RepaintOSK endp

DrawOSKLegend proc near
 public DrawOSKLegend

 push si
 push ax
 push rRegion.wCurrentHeight
 push rRegion.wCurrentWidth

 mov si,offset rRegion
 mov al,byte ptr OSK.ID
 and al,11b
 cmp al,2
 jnz rod6

 jmp rod2a
rod6:
 mov dx,[si].wCurrentTop
 mov cx,[si].wCurrentLeft

 add cx,24
 mov bx,20
 mov ax,OSK.PixelWidth
 sub ax,24*6
 cmp bEnlargeFlag,0
 jz rod3
 add bx,20-8
 sub ax,8*6
 add cx,8
rod3:
 push si
 push bx
 mov rRegion.wCurrentHeight,bx
 mov rRegion.wCurrentWidth,ax
 call adjustbuttondimensions
 pop bx
 pop si
 mov ax,24
 cmp bEnlargeFlag,0
 jz rod4
 add ax,8
rod4:
 mov rRegion.wCurrentHeight,bx
 mov rRegion.wCurrentWidth,ax
 mov dx,[si].wCurrentTop
 mov cx,[si].wCurrentLeft
 call adjustbuttondimensions
 push si
 pop si
 push word ptr bshadowcolor
 mov bshadowcolor,3
 mov cx,[si].wCurrentLeft
 mov dx,[si].wCurrentTop
 add cx,8


 inc dx
 inc dx
 inc dx
 inc dx

 mov si,offset abouticon
 cmp bEnlargeFlag,0
 jnz rod5
 mov si,offset smallabouticon


rod5:
 push cx
 push dx
 call draw4color
 pop dx
 pop cx
 pop word ptr bshadowcolor
 cmp bEnlargeFlag,0
 jnz rod7
 mov si,offset bSmallCruzerWork
 add cx,32
 add dx,2
 jmp rod8
rod7:
 mov si,offset bBigCruzerWork
 add dx,4
 add cx,40

rod8:


 mov pCurrentFont,offset UIFont4
 call drawstring



rod2a.
 pop  rRegion.wCurrentWidth
 pop  rRegion.wCurrentHeight
 pop ax
 pop si
```

```
 ret
DrawOSKLegend endp

ShowOSK proc near
 public ShowOSK
 test osk.ControlState,INVISIBLE
 jz sosk1

 call DefineNewOSKArea


 call UseNormalColors
 call RepaintOSK
sosk1:
 ret
ShowOSK endp


DefineNewOSKArea proc near
 public DefineNewOSKArea
 mov bx,offset osk
 and [bx].ControlState,not(INVISIBLE)
 call ComputeOSKHeight
 mov ax,480
 cmp osk.TopPixel,ax
 jb so1a
 sub ax,OSK.PixelHeight
 mov osk.TopPixel,ax
so1a
 call DefineCoveredArea
 ret
DefineNewOSKArea endp

ComputeOSKHeight proc near
 push bx
 test OSK.ID,4
 jz coh1
 mov bEnlargeFlag,-1
coh1.
 or cmdOSKAbout.ControlState,INVISIBLE
 or lblOSKSmallCruzer.ControlState,INVISIBLE
 mov lblOSKChiselLine.PixelWidth,8
 mov OSK.PixelWidth,8
 push pFirstControl
 mov pFirstControl,bx
 call SetFormHeights
 mov bEnlargeFlag,0
 mov ax,wFormWidth
 sub ax,OSK.LeftPixel
 ROUND_TO_BYTE_BOUNDARY ax
 cmp bScreenMode,12h
 jz coh2
 sub ax,16
coh2
 mov OSK.PixelWidth,ax
 cmp bScreenMode,12h
 jnz so2a
 sub ax,16
 mov lblOSKChiselLine.PixelWidth,ax
 mov lblOSKChiselLine.LeftPixel,8
 sub osk.PixelHeight,16
 jmp so2
so2a.
 mov lblOSKChiselLine.PixelWidth,ax
 mov lblOSKChiselLine.LeftPixel,0
 mov al,byte ptr OSK.ID
 and al,11b
 cmp al,2
 jz so2a1
 and cmdOSKAbout.ControlState,not(INVISIBLE)
 and
lblOSKSmallCruzer.ControlState,not(INVISIBLE)
 mov cmdOSKAbout.TopPixel,0
so2a1:
 sub osk.PixelHeight,24+8
 cmp bEnlargeFlag,0
 jz so2
 sub osk.PixelHeight,8
so2:
 pop pFirstcontrol
so1:
 pop bx
 ret
ComputeOSKHeight endp

RepaintOSKInMemory proc near
 public RepaintOSKInMemory
 test osk.ControlState,INVISIBLE
 jnz de4


 mov bDontChangeProtection,-1
 call ProtectOSK
 call RepaintOSK
 mov bDontChangeProtection,0
de4
 ret
RepaintOSKInMemory endp

SendKey proc near
 public SendKey


 push ax
 call SetKeyRegisters

 cmp cx,0FFFFh
 jnz sk01
 cmp dx,0FFFFh
 jnz sk01
 mov al,0

 jmp sk8a
sk01:
 test bl,ALT_DOWN
 jz sk1
 cmp ch,255
 jnz ska1
 test bl,NUM_LOCK_DOWN
 jz ska1
 cmp dh,"0"
 jb ska1
 cmp dh,"9"
 ja ska1
  mov bl,bAltNumberCount
  xor bh,bh
  add bx,offset bAltNumberAccum
  mov [bx],dh
  mov byte ptr [bx+1],0
  inc bAltNumberCount
  cmp bAltNumberCount,3
  jz ska2
  cmp byte ptr bAltNumberAccum,"3"
  jb ska4
  cmp bAltNumberCount,2
  jb ska4
ska2:
  call GetAltNumberValue
  cmp bx,255
  jbe ska3
ska4:
  jmp sk10
ska3:
  mov ax,bx
  jmp sk8a
ska1:
 cmp ch,255
 jz sk10
 mov ah,ch
 xor al,al
 jmp sk8
sk1
 mov bAltNumberCount,0

 test bl,CTRL_DOWN
 jz sk2
  cmp cl,64
  jae sk1b


  cmp ah,dl
  jnz sk1a
sk1b:
  mov ah,cl
  xor al,al
  jmp sk8
sk1a:
 mov al,cl
 jmp sk8
sk2
 test bl,NUM_LOCK_DOWN
 jz sk3
 call IsItNumericKey
 jz sk11

sk3:
 cmp ah,78
 jz sk11
 cmp ah,74
 jz sk11
 cmp ah,59+10
 jb sk11a
 jmp sk8a
sk11a:
 test bl,L_SHIFT_DOWN or R_SHIFT_DOWN
 jnz sk11


 cmp ah,59
 jb sk11
   mov al,0
   jmp sk8a
sk11:
 call InterpretShift
sk8
 cmp al,255
 jz sk10
sk8a:
 mov wKeyPressed,ax
sk9:
 mov bKeyChanged,-1
sk10
 pop ax
 ret
SendKey endp

GetAltNumberValue proc near
 public GetAltNumberValue

  mov bAltNumberCount,0
  push si
  mov si,offset bAltNumberAccum
  call Ascii2Bin
  pop si
  mov byte ptr bAltNumberAccum,0
  ret
GetAltNumberValue endp


SetKeyRegisters proc near
 public SetKeyRegisters

 mov cx,[si].pStorageOffset
 mov dx,[si].wDataLength

 mov ax,[si].id
 xchg ah,al
 mov bl,bKeyState
 ret
SetKeyRegisters endp

ProtectOSK proc near
 public ProtectOSK


 cmp pOSKFirstRegion,-1
 jz pca1
 test osk.ControlState,INVISIBLE
 jnz pca1
 push wCoveredAreaTopHold
 pop wCoveredAreaTop
 mov bCoveredAreaOnly,0
pca1:
 ret
ProtectOSK endp



ResetShiftKeys proc near

 push ax
 push si
 push rRegion.pCurrentControl
 push pFirstControl
 mov pFirstControl,offset OSK
 call GoFirstControl
 jc rsk1
rsk3:
 mov al,[si].ControlType
 cmp al,RSHIFTKEYBUTTON
 jb rsk2
 cmp al,ALTKEYBUTTON
 ja rsk2
 jne rsk3b
 cmp bAltNumberCount,0
 jz rsk3b

 jmp rsk2
rsk3b.
 test [si].ControlState,ISDOWN
 jz rsk2
 call CheckIfOnlyOSK
 jnc rsk3c
 call SendKeyUpScanCode
rsk3c:
 and [si].ControlState,not(ISDOWN)
rsk2:
 call GoNextControl
 jnc rsk3
rsk1:
 pop pFirstControl
 pop rRegion.pCurrentControl
 pop si
 pop ax
 ret
ResetShiftKeys endp



UnprotectOSK proc near
 public UnprotectOSK
 mov wCoveredAreaTop,-1
 mov bCoveredAreaOnly,0
 ret
UnprotectOSK endp

IsItNumericKey proc near
 public IsItNumericKey


 cmp ah,71
 jb iink2
 cmp ah,83
 ja iink2
 cmp ah,74
 jz iink2
 cmp ah,78
 jz iink2
 cmp ah,ah
 jmp iink1
iink2:
 or ah,ah
iink1:
 ret
IsItNumericKey endp

IsItNumericOnNumKeyPad proc near
 public IsItNumericOnNumKeypad
 test bKeyState,NUM_LOCK_DOWN
 jz iino1
 test bKeyState,L_SHIFT_DOWN or
R_SHIFT_DOWN
 jnz iino1
 call SetKeyRegisters
 call IsItNumericKey
 jz iino2
iino1.
 clc
 ret
iino2:
 stc
 ret
IsItNumericOnNumKeyPad endp

SetOSKKeyCaptionString proc near
 public SetOSKKeyCaptionString
 call SetKeyRegisters
 call InterpretShift

 cmp bScreenMode.VGA_MODE
 jnz dbc3a

 mov bx,offset bDummyCaption
 xor ah,ah
 mov [bx+3],ax
 jmp dbc3b

dbc3a:

 push si
 mov di,si
 mov si,offset bCaptionLetter
 mov byte ptr [si+1],al
 call SetKeyCaption
 pop si

dbc3b
 xor cx,cx
 call SetCaptionPointers
 ret
SetOSKKeyCaptionString endp

SetKeyCaption proc near
 public SetKeyCaption


 push ax
 mov dx,rRegion.wCurrentHeight
 DIVIDE_BY_8 dx
 mov dh,dl
 mov bx,offset bDummyCaption
 mov cx,rRegion.wCurrentWidth
 mov ah,222
 cmp [di].ControlType,KEYBUTTON
 jae skc5
 mov ah,"]"
skc5:
 DIVIDE_BY_8 cx
 dec cx
 cmp bEnlargeFlag,0
 jz skc0
 test [di].ControlState,WIDEN
 jnz skc0
 dec cx
skc0:
 test [di].ControlState,DOUBLEWIDEN
 jz skc0a
 inc cx
skc0a:
 mov wKeyWidth,cx
```

```
 xor di,di
 push ds
 pop es
 mov di,offset bDummyCaption+3

skc2:
 lodsb
 or al,al
 jz skc1
 stosb
 inc di
 loop skc2

skc2c:

 cmp byte ptr [si],222
 jnz skc1

skc2cc:
 add cx,wKeyWidth
 inc cx
 inc cx
 jmp skc2

skc1:

 jcxz skc3
 mov al,' '
skc4
 stosb
 inc di
 loop skc4
skc3:
 cmp bEnlargeflag,0
 jz skc3a

 mov al,' '
 cmp byte ptr [si],0
 jz skc3aa
 lodsb
skc3aa
 stosb
 inc di
skc3ab:
 dec dh
 jz skc3b
 mov al,13
 stosb
 mov al,220
 cmp dh 1
 jz skc3ab1
 mov al,' '
skc3ab1:
 mov cl,dl
 xor ch,ch
 rep stosb
 jmp skc3ab

skc3a:
 mov al,ah
 stosb
skc3b
 xor al,al
 stosb
 pop ax
 ret
SetKeyCaption endp

HandleOSKKeyPenUp proc near
 public HandleOSKKeyPenUp

 cmp al,FIRSTKEYTYPE
 jbe dpe10b
 cmp al,LASTKEYTYPE
 ja dpe10b

 cmp bReleaseShift,0
 mov bReleaseShift,0
 jz dpe8bb
 call GetBitForShiftKey
 cmp bl,ALT_DOWN
 jnz dpu20
 cmp bAltNumberCount,0
 jz dpu20
 push bx
 push ax
 call GetAltNumberValue
 cmp bx,255
 ja nrs1
 mov wKeyPressed,bx
 mov bKeyChanged,-1
 mov bPopUpRequired,-1
nrs1:
 pop ax
 pop bx

dpu20:
 not bl
 and bKeyState,bl
 call UndoButtonDown
 call CheckIfOnlyOSK
 jnc dpu21
 call SendKeyUpScanCode
dpu21:
 mov bNoDimensionUpdate,-1

 call SetBiosLockState

 call ReShowOSK
 mov bNoDimensionUpdate,0
 mov bKeyChanged,-1
dpe8bb:
 jmp hopu1

dpe10b:
 cmp al,KEYBUTTON
 jnz hopu2
 push word ptr bKeyState
 pop word ptr bKeyStatePrev

 test bKeystate, L_SHIFT_DOWN +
R_SHIFT_DOWN + CTRL_DOWN +
ALT_DOWN
 jn_ hopu3
 call UndoButtonDown
 call CheckIfOnlyOSK
 jnc hopu4
 call SendKeyUpScanCode
hopu4:
 jmp hopu1
hopu3:
 call undobuttondown
 call CheckIfOnlyOSK
 jnc hopu5
 call SendKeyUpScanCode
hopu5:
 and bKeystate, not( L_SHIFT_DOWN +
R_SHIFT_DOWN + CTRL_DOWN +
ALT_DOWN )
 cmp bAltNumberCount,0
 jz dpe10be
 or bKeystate,ALT_DOWN
dpe10be:
 call ResetShiftKeys
 mov bNoDimensionUpdate,-1

 test bKeyStatePrev,L_SHIFT_DOWN +
R_SHIFT_DOWN
 jnz hopu5a
 call repaintctrlandalt
 jmp hopu5b
hopu5a:
 call ReShowOSK
hopu5b:
 mov bNoDimensionUpdate,0
 jmp hopu1
hopu2:
 clc
 ret
hopu1:
 mov pPenDownActiveRegion,0
 s_
 re_
HandleOSKKeyPenUp endp

repaintctrlandalt proc near
 cmp osk.id,2
 jz rcaa1
 cmp osk.id,6
 jz rcaa1
 push si
 push pPenDownActiveRegion
 mov si,offset ctrlkey1
 call repaintspecifickey
 mov si,offset ctrlkey2
 call repaintspecifickey
 mov si,offset altkey1
 call repaintspecifickey
 mov si,offset altkey2
 call repaintspecifickey
 pop pPenDownActiveRegion
 pop si
rcaa1:
 ret
repaintctrlandalt endp

repaintspecifickey proc near
 mov bx,pOSKFirstRegion
 cmp bx,-1
 jz rpsk2
rpsk1:
 cmp bx,pNextActiveRegion
 jae rpsk2
 cmp [bx].pCurrentControl,si
 jz rpsk3
 add bx,type rActiveRegions
 jmp rpsk1
rpsk3:
 mov pPenDownActiveRegion,bx
 mov ax,[si]
 call repaintindividualcontrol

rpsk2:
 ret
repaintspecifickey endp

HandleOSKKeyPenDown proc near
 public HandleOSKKeyPenDown
 mov bKeyDownType,al

 cmp al,KEYBUTTON
 jb dpe8bb
 cmp al,CAPSLOCKBUTTON
 ja dpe8bb
 call CheckHotKeyEdit
 jnc dpe8gg
 call far ptr DoHotKeyEdit
 cmp al,KEYBUTTON
 ja dpe8b
 jmp dpe8x
dpe8gg:
 cmp al,KEYBUTTON
 jnz dpe8b
 call SetTypaMatic
 call CheckIfOnlyOSK
 jnc dpe8g
 call SendKeyDownScanCode
 jmp dpe8x
dpe8g:
 call SendKey
 jmp dpe8x
dpe8bb:
 cmp al,KEYBUTTON
dpe8b:
 jb dpe8x
 cmp al,CAPSLOCKBUTTON
 ja dpe8x

 call GetBitForShiftKey
 or bKeyState,bl
 call CheckHotKeyEdit
 jc dpe8h
 mov bNoDimensionUpdate,-1
 call CheckIfOnlyOSK
 jnc dpe8h
 call SendKeyDownScanCode
dpe8h:
 cmp bKeyDownType,ALTKEYBUTTON
 jz dpe8hh
 cmp bKeyDownType,CTRLKEYBUTTON
 jnz dpe8hi
dpe8hh:
 call repaintctrlandalt
 jmp dpe8hj
dpe8hi:
 call SetBiosLockState
 call ReShowOSK
dpe8hj:
 mov bNoDimensionUpdate 0
 mov bKeyChanged -1
dpe8x:
 ret
HandleOSKKeyPenDown endp

CheckHotKeyEdit proc near
 public CheckHotKeyEdit

 cmp pCurrentToolBarButton,offset cmdHotKeys
 jnz qqii2
 call CheckIfOnlyOSK
 jc qqii2
 cmp wHotKeyRightPixel,540-48-8
 jae qqii2
 push ax
 push si
 call GetTabControlType
 cmp al,KEYEDITBOX
 pop si
 pop ax
 jz qqii1
qqii2:
 clc
 ret
qqii1:
 stc
 ret
CheckHotKeyEdit endp

HandleOSKAlreadyDown proc near
 public HandleOSKAlreadyDown
 cmp al,KEYBUTTON
 jbe dpe8ex
 cmp al,CAPSLOCKBUTTON
 ja dpe8ex
 mov bReleaseShift,-1
 push ax
 call checkhotkeyedit
 pop ax
 jnc xxdd
 cmp al,SCROLLLOCKBUTTON
 jb xxdd

 call far ptr DoHotKeyEdit

xxdd:
 stc
 ret
dpe8ex:
 clc
 ret
HandleOSKAlreadyDown endp

GetBitForShiftKey proc near

 push ax

 mov bl,R_SHIFT_DOWN
 sub al,RSHIFTKEYBUTTON
dpe8d:
 jz dpe8c
 shl bl,1
 dec al
 jmp dpe8d
dpe8c:
 pop ax
 ret
GetBitForShiftKey endp

CheckIfOnlyOSK proc near
 public CheckIfOnlyOSK

 test wCurrentResource,not(111b)
 jnz dke1bx
 cmp bModalFlag,-1
 jz dke1bx
 stc
 ret
dke1bx:
 clc
 ret
CheckIfOnlyOSK endp

SendKeyDownScanCode proc near
 public SendKeyDownScanCode
 push bx
 push ax

 call RestVgaState

 mov bx,[si].ID

 SM_FUNCTION SM_SET_KEYSTROKE
 call IsItLockKey
 jnz skds1
 or bl,80h
 SM_FUNCTION SM_SET_KEYSTROKE
skds1:
 pop ax
 pop bx
 ret
SendKeyDownScanCode endp

IsItLockKey proc near
 push bx
 and bl,01111111b
 cmp bx,58
 jz iilk1
 cmp bx,46h
 jz iilk1
 cmp bx,45h
iilk1:
 pop bx
 ret
IsItLockKey endp

SendKeyUpScanCode proc near
 push ax
 push bx

 call restvgastate

 mov bx,[si].ID
```

```
  call IsItLockKey
  jnz skusc1
  SM_FUNCTION SM_SET_KEYSTROKE
skusc1:
  or bl,10000000b
  SM_FUNCTION SM_SET_KEYSTROKE
  pop bx
  pop ax
  ret
SendKeyUpScanCode endp

DoCloseOSK proc near
  public DoCloseOSK

  call UndoCurrentTabItem
  and [si].ControlState,not(ISDOWN)
  call RaiseAllOSKKeys



  mov ax,wCurrentResource
  and al,111b
  mov bOSKLastState,al


  test wCurrentResource,not(111b)
  jnz dh1
  and wCurrentResource,not(111b)
    call freescreen
    jmp dh13

dh1

  push wCurrentResource
  call DoHideOSK
  cmp wCurrentResource,0
  jnz dh11
  call FreeScreen
  jmp dh12
dh11:
  mov bDontShowOSK,-1
dh12:
  pop wCurrentResource
  mov si,pTabRegion
  call SetNewTabItemWork
dh13:
  ret
DoCloseOSK endp



RaiseAllOSKKeys proc near

  push si
  push pFirstControl
  mov si,offset OSK
  mov pFirstControl,si
rao1:
  mov al,[si].ControlType
  cmp al,KEYBUTTON
  jb rao2
  cmp al,ALTKEYBUTTON
  ja rao2
  and [si].Controlstate,not(ISDOWN)
rao2:
  call GoNextControl
  jnc rao1
  pop pFirstControl
  pop si
  ret
RaiseAllOSKKeys endp

RepaintUnderOSK proc near
  public RepaintUnderOSK

if need_osk ne 0
  push si
  push di
  push bx
  push wCoveredAreaTopHold
  pop wCoveredAreaTop
  mov bCoveredAreaOnly,-1
  or OSK.ControlState,INVISIBLE
  mov bRepaintNeeded,-1
  call Repaint
  and OSK.ControlState,not(INVISIBLE)
  pop bx
  pop di
  pop si
  call UnprotectOSK
endif
  ret
RepaintUnderOSK endp


GetPhysicalKeyState proc near
  public GetPhysicalKeyState
  push ds
  push es
  push bx
  push ax
  mov ax,OURDATASEG
  mov ds,ax
  mov bx,40h
  mov es,bx
  mov bx,017h
  mov al,es:[bx]
  and al,SCROLL_LOCK_DOWN or
NUM_LOCK_DOWN or CAPS_LOCK_DOWN
  mov ah,bKeyState
  mov bl,ah
  and ah,SCROLL_LOCK_DOWN or
NUM_LOCK_DOWN or CAPS_LOCK_DOWN
  cmp ah,al
  jz gpks0

  and bl,not (SCROLL_LOCK_DOWN or
NUM_LOCK_DOWN or
CAPS_LOCK_DOWN)
  or bl,al
  mov bKeyState,al

  and OskCapsLock.ControlState,not ISDOWN


  and OskNumLock.ControlState,not ISDOWN
  and OskScrollLock.ControlState,not ISDOWN

  test al,CAPS_LOCK_DOWN
  jz gpks1
  or OskCapsLock.ControlState,ISDOWN


gpks1:
  test al,NUM_LOCK_DOWN
  jz gpks2
  or OskNumLock.ControlState,ISDOWN
gpks2:
  test al,SCROLL_LOCK_DOWN
  jz gpks3
  or OskScrollLock.ControlState,ISDOWN
gpks3:
    cmp pOSKFirstRegion,-1
    jz gpks0
    call ReshowOSK


gpks0:
  pop ax
  pop bx
  pop es
  pop ds
  ret
GetPhysicalKeyState endp

SetBiosLockState proc near
    push es
    push bx
    push ax
    mov bx,40h
    mov es,bx
    mov bx,017h
    mov al,bKeyState
    and al,SCROLL_LOCK_DOWN or
NUM_LOCK_DOWN or CAPS_LOCK_DOWN
    mov ah,es:[bx]
    and ah,not(SCROLL_LOCK_DOWN or
NUM_LOCK_DOWN or
CAPS_LOCK_DOWN)
    or ah,al
    mov es:[bx],ah
    pop ax
    pop bx
    pop es
    ret
SetBiosLockState endp




end

Copr. 1995 Zenith Data Systems Corp


.MODEL SMALL
include uiinclud.inc
DATASEG_BEGIN
bCurrentShadowColor db DARKGRAY
  public bCurrentShadowColor
extrn wCurrentResource:word
extrn ControlDataStorageArea:byte
extrn rLegendRegion:tREGION
extrn FirstStandardControl:tCONTROL
extrn FontTable:word
extrn LastStandardControl:tCONTROL
extrn MainForm:tControl
extrn OSK:tControl
extrn bButtonForegroundColor:byte
extrn bCaptionForegroundColor:byte
extrn bCaptionForegroundColor:byte
extrn bCaptionForegroundColor:byte
extrn bCoveredAreaOnly:byte
extrn bCursorActive:byte
extrn bDontChangeProtection:byte
extrn bFormColor:byte
extrn bIconBackgroundColor:byte
extrn bIconForegroundColor:byte
extrn bLanguageToUse:byte
extrn bLightColor:byte
extrn bNullString:byte
extrn bOutLineColor:byte
extrn bPreviewMode:byte
extrn bPreviewMode:byte
extrn bRepaintMode:byte
extrn bRepaintNeeded:byte
extrn bScreenMode:byte
extrn bShadowColor:byte
extrn bShortNotchPattern:byte
extrn bSpectrumPattern:byte
extrn bTallNotchPattern:byte
extrn iIgnoreLevel:word
extrn iLeftAdders:word
extrn iObjectLevel:word
extrn iTopAdders:word
extrn pClickRegion:word
extrn pCurrentFont:word
extrn pCurrentToolButtonRegion:word
extrn pCurrentToolButtonRegion:word
extrn pDrawStringTabList:word
extrn pFirstControl:word
extrn pGraphicsCaption:word
extrn pLastForm:word
extrn pNextActiveRegion:word
extrn pTabHandler:word
extrn pTabRegion:word
extrn pTextCaption:word
extrn rActiveRegions:tRegion
extrn rREGION:tREGION
extrn uifont4:word
extrn wCaptionTop:word
extrn wCaptionTop:word
extrn wCaptionTop:word
extrn wCurrentFontHeight:word
extrn wCurrentFormBottom:word
extrn wCurrentFormHeight:word
extrn wDeltaLeft:word
extrn wDeltaTop:word
extrn wFormWidth:word
extrn wGraphicCaptionHeight:word
extrn wGraphicLegendRight:word
extrn wGraphicLegendRight:word
extrn wGraphicLegendRight:word
extrn wShiftCaption:word
extrn wToolBarHeight:word
extrn wToolBarHeight:word
extrn frmMessageBox:tCONTROL
extrn frmMessageBox_end:tCONTROL
extrn UIFont3:word

extrn osksecondrow:tcontrol

bCurrentControlType db 0
  public bCurrentControlType
DATASEG_END
.code
extrn blockvideo:near
extrn unblockvideo:near

extrn DoClickEvent:near
extrn DoTab:near
extrn Draw4Color:near
extrn DrawLabel:near
extrn DrawString:near
extrn FindRegionForControl:near
extrn GetCaptionHeight:near
extrn GetCaptionWidth:near
extrn GetCombinedCaptionHeight:near
extrn GetControlRegion:near
extrn GetLabelWidth:near
extrn IsItNumericOnNumKeypad:near
extrn PointNextTabControl:near
extrn PrepareClickRegisters:near
extrn ProtectOSK:near
extrn RepaintControl:near
extrn RepaintGroupObject:near
extrn RepaintOSKInMemory:near
extrn SetKeyCaption:near
extrn SetNewTabItem:near
extrn SetNewTabItem:near
extrn SetOSKKeyCaptionString:near
extrn ShowTabBox:near
extrn UnprotectOSK:near
extrn UpdateLegendRegion:near

DrawButtonCaption proc near
  public DrawButtonCaption

  xor ah,ah
  mov wShiftCaption,ax

  mov wGraphicCaptionHeight,0

  push si
  mov al,[si].ControlType
if need_osk ne 0
  cmp al,KEYBUTTON
  jnz dbc5

  call IsItNumericOnNumKeyPad
  jc dbc7

endif
dbc5:
  call PointControlCaption
  jnz dbc99a


  mov al,[si].ControlType
if need_osk ne 0
  cmp al,KEYBUTTON
  jnz dbc3

dbc7
  call SetOSKKeyCaptionString
  jmp dbc99a

endif

dbc3:
if need_abouticon ne 0
  cmp al,ABOUTBUTTON
  jnz dbc4
  call DrawAboutIcon
  jmp dbc99
endif

dbc4:
  jmp dbc99

dbc99a:
  cmp bScreenMode,VGA_MODE
  jz dbc99d


  mov dx,rRegion.wCurrentTop
  and dl,11111000b
  jmp dbc99e

dbc99d:
  call GetCombinedCaptionHeight
  jnz dbc99b
  jmp dbc99

dbc99b:
  mov dx,rRegion.wCurrentHeight
  sub dx,ax
  jge dbc99c
  jmp dbc99
dbc99c:
  sar dx,1
  add dx,rRegion.wCurrentTop
  add dx,wShiftCaption
dbc99e:
  mov wCaptionTop,dx
  mov bx,pGraphicsCaption
  or bx,bx
  jnz dbc1xx
  jmp dbc1
dbc1xx:
if need_osk ne 0
  cmp bScreenMode,VGA_MODE
  jz dbc8

  mov ah,16+1
  call PointControlMiscItem
  or bx,bx
  jz dbc1
  call SetFontForCaption

  push si
  mov di,si
  mov si,bx
  call SetKeyCaption
  pop si
  add bx,3

  mov cx,rRegion.wCurrentLeft
  mov dx,rRegion.wCurrentTop
  jmp dbc9



dbc8:
```

```
endif

 call SetFontForCaption

 call GetCaptionWidth
 or ax,ax
 jz dbc1
 mov cx,rRegion.wCurrentWidth
 sub cx,ax
 jl dbc1
 sar cx,1
 jnc dbc6
 inc cx
dbc6
 mov dx.rRegion.wCurrentLeft
 ROUND_TO_BYTE_BOUNDARY dx
 add cx.dx
 dec cx
 add cx,wShiftCaption
 mov dx,wCaptionTop

dbc9
 push si
 push ax
 mov al,[si].ControlType
 mov di,si
 mov si,bx
 mov bl,biconForegroundColor
 test [di].ControlState,DISABLED or GRAYED
 jz dbc2a
 mov bl,bShadowColor
dbc2a
 mov bh,bIconBackgroundColor
 cmp al,SYMBOLBUTTON
 jb  dbc2
 xor bh,bh
dbc2:
 pop ax
 call DrawString
 pop si

dbc1
 mov bx,pTextCaption
 or bx,bx
 jz dbc99
 call SetFontForCaption
 mov dx,wCaptionTop
 add dx,wGraphicCaptionHeight
 add ax,dx
 mov rLegendRegion.wCurrentBottom,ax
 add bx,3
 push si
 mov cx.rRegion.wCurrentLeft
 ROUND_TO_BYTE_BOUNDARY cx
 add cx,wShiftCaption
 mov ax,rRegion.wCurrentWidth
 mov si,bx
 mov bl,bButtonForegroundColor
 mov bh,CENTERED
 call UpdateLegendRegion
 call DrawLabel
 pop si
dbc99:
 pop si
 ret
DrawButtonCaption endp

DrawEditBoxCaption proc near
 public DrawEditBoxCaption

 push rRegion.wCurrentLeft
 pop  wGraphicLegendRight
 call PointControlCaption
 jnz reb99b
 jmp debc1
reb99b:
 or bx,bx
 jz reb3

 push cx
 call SetFontForCaption
 add bx,3
 push si
 mov si,bx
 call getlabelwidth
 mov dx,rRegion.wCurrentTop
 mov cx,rRegion.wCurrentLeft
 sub cx,ax
 mov wGraphicLegendRight,ax

 mov ax.rRegion.wCurrentHeight
 sar ax,1
 add dx,ax
 mov ax,wCurrentFontHeight
 sar ax,1
 sub dx,ax

 mov bl,bCaptionForegroundColor
 xor bh,bh
 call DrawLabel
 pop si
 pop cx

reb3:
 jcxz debc1
 mov bx,cx
 push rRegion.wCurrentHeight
 pop wCurrentFontHeight
 call PositionGraphicCaption
 call PaintGraphicCaption

debc1:
 ret
DrawEditBoxCaption endp

DrawNotches proc near
 public DrawNotches

  push si
  push ax
  sub rRegion.wCurrentRight,8
  mov al,byte ptr [si+1].id
  mov cx,rRegion.wCurrentLeft
  cmp al,8
  mov ax,24
  jz rsb2
  mov ax,8

rsb2:
  mov si,offset bTallNotchPattern
  cmp cx,rRegion.wCurrentLeft
  je rsb4
  add cx,ax
  cmp cx,rRegion.wCurrentRight
  jae rsb4a
  mov si,offset bShortNotchPattern
rsb4a:
  sub cx,ax
rsb4:
  mov dx,rRegion.wCurrentBottom
  inc dx
  push cx
  push ax
  call draw4color
  pop ax
  pop cx
  add cx,ax
  cmp cx,rRegion.wCurrentRight
  jb rsb2
rsb3:
  add rRegion.wCurrentRight,8

  pop ax
  pop si
  ret
DrawNotches endp

DrawSpectrum proc near
 public DrawSpectrum

  push si
  mov dx,rRegion.wCurrentTop
  mov cx,rRegion.wCurrentLeft
  mov ax,rRegion.wCurrentBottom
  sub ax,3
  add cx,8
  add dx,5
rsb1:
  push ax
  push cx
  push dx
  mov si,offset bSpectrumPattern
  call draw4color
  pop dx
  pop cx
  pop ax

  inc dx
  inc dx
  cmp dx,ax
  jb rsb1
  pop si
  ret
DrawSpectrum endp

ForceTotalRepaint proc near
 public ForceTotalRepaint
 call ForceTotalRepaint1
 mov bRepaintNeeded,-1
 ret
ForceTotalRepaint endp


ForceTotalRepaint1 proc near
 public ForceTotalRepaint1

 mov pFirstControl,offset MainForm
 mov bFormColor,FORM_COLOR
 mov wCurrentFormHeight,0
 mov wCurrentFormBottom,0
 ret
ForceTotalRepaint1 endp


GetTabControlType proc near
 public GetTabControlType
 xor ax,ax
 mov si,pTabRegion
 or si,si

 jz gtct1
 mov bx,[si].pCurrentControl
 mov ax,[bx]
 or ax,ax
gtct1:
 ret
GetTabControlType endp

GetTypeAndState proc near
 public GetTypeAndState

  mov di,si
  mov si,[si].pCurrentControl
  mov al,[si].ControlType
  mov ah,[si].ControlState
  ret
GetTypeAndState endp

GoFirstControl proc near
 public GoFirstControl


 mov si,pFirstControl
 mov rRegion.pCurrentControl,si
 clc
 ret
GoFirstControl endp

GoNextControl proc near
 public GoNextControl

  mov si,rRegion.pCurrentControl
  add si,type tControl
gnc3:
  test byte ptr [si],128
  jz gnc1
  mov si,[si+1]
  jmp gnc3

gnc1:
  cmp byte ptr [si],0
  jnz gnc2
  mov si,rRegion.pCurrentControl
  stc
  ret
gnc2
  mov rRegion.pCurrentControl,si
  clc
  ret
GoNextControl endp

GoPreviousControl proc near
 public GoPreviousControl


 mov si,rRegion.pCurrentControl
gpc2:
 mov al,[si-1]
 or al,al
 jnz gpc3
 stc
 ret
gpc3:
 cmp al,255
 jz gpc1

 mov si,[si-3]
 jmp gpc2
gpc1:
 sub si,type tControl
 mov rRegion.pCurrentControl,si
 clc
 ret
GoPreviousControl endp


IgnoreObject proc near
 cmp al,FIRST_ENDOFOBJECT
 jb io2
 cmp al,LAST_ENDOFOBJECT
 jbe io1
 cmp al,TOOLBARBUTTON
 jz io2
 ret
io1:
 dec iIgnoreLevel
 ret
io2:
 inc iIgnoreLevel
 ret
IgnoreObject endp

PaintGraphicCaption proc near
 public PaintGraphicCaption

 push si
 mov si,bx
 mov bl,bCaptionForegroundColor
 xor bh,bh
 call drawstring
 pop si
 ret
PaintGraphicCaption endp

PointControlCaption proc near
 public PointControlCaption
 push di
 push ax

 xor cx,cx
 xor di,di
 mov bx,si
 mov al,[bx]
 mov bCurrentControlType,al
 add bx,type tControl
pcc4:
 mov al,[bx]
 test al,128
 jnz pcc1
 or di,di
 jnz pcc5
 xor bx,bx
 jmp pcc2
pcc5:
 mov bx,di
 jmp short pcc2

pcc1:
 test al,16
 jnz pcc3

 mov ah,al
 and ah,GRAPHICFONT
 cmp ah,GRAPHICFONT
 jnz pcc8
 mov cx,bx
 jmp pcc3

pcc8.
 mov ah,al
 and ah,1111b
 cmp ah,bLanguageToUse
 jz pcc2
 or ah,ah
 jnz pcc3
 mov di,bx
pcc3:
 mov bx,[bx+1]
 jmp short pcc4
pcc2:
 mov ax.bx
 or ax,cx
 call SetCaptionPointers
 pop ax
 pop di
 ret
PointControlCaption endp

PointControlMiscItem proc near
 public PointControlMiscItem



 mov bx,si
 add bx,type tControl
plh4:
 mov al,[bx]

 test al,128
 jnz plh1
 sub bx,bx
 ret

plh1:
 and al,ah
 cmp al,ah
```

```
 jz plh2
 mov bx,[bx+1]
 jmp short plh4
plh2:
 add bx,3
 or bx,bx
 ret
PointControlMiscItem endp

PositionGraphicCaption proc near
 public PositionGraphicCaption


 call GetCaptionHeight
 mov wGraphicCaptionHeight,ax
 push wCurrentFontHeight
 call SetFontForCaption
 pop wCurrentFontHeight
 call GetCaptionWidth
 mov cx,wGraphicLegendRight
 sub cx,ax
 sub cx,8
 mov dx,rRegion.wCurrentTop
 mov ax,wGraphicCaptionHeight
 sar ax,1
 sub dx,ax
 mov ax,wCurrentFontHeight
 sar ax,1
 add dx,ax
 ret
PositionGraphicCaption endp

RePaint proc near
 public Repaint
 mov bCursorActive,0
 mov pNextActiveRegion,offset rActiveRegions
 call RepaintWork
 ret
Repaint Endp

RepaintAndSetTab proc near
 public RepaintAndSetTab
 call Repaint
 mov pTabRegion,0
 push pCurrentToolButtonRegion
 pop pClickRegion

 cmp pClickRegion,0
 jnz rast1
 push pNextActiveRegion
 pop pTabRegion
 mov pTabHandler,offset PointNextTabControl
 call DoTab
 ret
rast1:
 call ShowTabBox
 mov pClickRegion,0
 ret
RepaintAndSetTab endp

RepaintForClick proc near
 public RepaintForClick

 push si
 mov bRepaintNeeded,-1
 call repaint

if need_osk ne 0
 call RepaintOSKInMemory
endif

 pop si

 call FindRegionForControl
 mov si,bx
 mov pClickRegion,si
 call PrepareClickRegisters
 call SetNewTabItem
 ret
RepaintForClick endp

RepaintWork proc near
 public RepaintWork

 mov iObjectLevel,0
 mov iIgnoreLevel,0
 call blockvideo

 call GoFirstControl
 jmp rp2

rp0:
 call GoNextControl
rp2:
 jnc rp1

 call unblockvideo
 mov bRepaintNeeded,0
 mov bRepaintMode,0
 mov bPreviewMode,0
 ret

rp1:
 mov al,[si].ControlType
 cmp iIgnoreLevel,0
 jz rp5
 call IgnoreObject
 jmp rp0

rp5:
 mov ah,[si].ControlState
 cmp al,FIRST_ENDOFOBJECT
 jb rp6
 cmp al,LAST_ENDOFOBJECT
 ja rp7
 dec iObjectLevel
 jmp rp0

rp6:
 call SetProtectionForControl
 call RepaintGroupObject
 jmp rp0

rp7:
 call SetProtectionForControl
 call RepaintControl
 jmp rp0
RepaintWork endp

SetCaptionPointers proc near
 public SetCaptionPointers
 mov pTextCaption,bx
 mov pGraphicsCaption,cx
 ret
SetCaptionPointers endp

SetColorsForControl proc near
 public SetColorsForControl

 call UseNormalColors
 test ah,DISABLED or GRAYED
 jz rc13
 call UseGrayedColors
rc13:
 ret
SetColorsForControl endp

SetControlTabList proc near
 public SetControlTabList

 push ax
 push bx
 mov ah,16+2
 call PointControlMiscItem
 jnz sctl1
 mov bx,offset bNullString
sctl1:
 mov pDrawStringTabList,bx
 pop bx
 pop ax
 ret
SetControlTabList endp

SetFontForCaption proc near
 public SetFontForCaption
 push bx
 mov al,[bx]
 and al,ANYFONT
 rol al,1
 rol al,1
 rol al,1
 rol al,1
 xor ah,ah
 cmp al,11b * 2
 jnz sffc1
 cmp bCurrentControlType,LEFTLEGEND
 jz sffc4
 cmp bx,offset OSK
 jae sffc1

 cmp bx,offset frmMessageBox
 jb sffc5
 cmp bx,offset frmMessageBox_end
 ja sffc5
 jmp sffc4
sffc5:
 cmp bx,offset FirstStandardControl
 jb sffc2
 cmp bx,offset LastStandardControl
 jb sffc1
sffc2:
 cmp bCurrentControlType,SPINUPBUTTON
 jz sffc1
 cmp bCurrentControlType,SPINDOWNBUTTON
 jz sffc1
sffc4:
 mov bx,offset uifont4
 jmp sffc3
sffc1:
 mov bx,offset FontTable
 add bx,ax
 mov bx,[bx]
sffc3:
 mov pCurrentFont,bx
 mov ax,[bx]
 mov al,ah
 xor ah,ah
 mov wCurrentFontHeight,ax
 pop bx
 ret
SetFontForCaption endp

SetFormHeights proc near
 public SetFormHeights
 mov bPreviewMode,-1
 mov si,pFirstControl
 push word ptr [si]
 and [si].ControlState,not(INVISIBLE)
 mov pLastForm,0
 mov wFormWidth,0
 push si
 call RepaintWork
 pop si
 pop word ptr [si]
 ret
SetFormHeights endp

SetProtectionForControl proc near
 public SetProtectionForControl

 cmp bDontChangeProtection,0
 jnz rp6b

if need_osk ne 0
 cmp si,offset OSK
 jae rp6a
 mov bCurrentShadowColor,DARKGRAY
 call protectOSK
 ret

rp6a:
  mov bCurrentShadowColor,DARKGRAY
  test wCurrentResource,not(111b)
  jnz rp6c

  mov bCurrentShadowColor,DARKGRAY+1

rp6c:
 call unprotectOSK
endif

rp6b:
 ret
SetProtectionForControl endp

StartNewObjectLevel proc near
 public StartNewObjectLevel

 push dx
 push cx
 inc iObjectLevel
 mov bx,iObjectLevel
 add bx,bx
 mov dx,wDeltaTop
 mov iTopAdders[bx],dx
 mov cx,wDeltaLeft
 mov iLeftAdders[bx],cx
 pop cx
 pop dx
 ret
StartNewObjectLevel endp

StartToolButtonObjectLevel proc near
 public StartToolButtonObjectLevel
 push wToolBarHeight
 pop wDeltaTop
 mov wDeltaLeft,0
 call StartNewObjectLevel
 ret
StartToolButtonObjectLevel endp

UseGrayedColors proc near
 public UseGrayedColors
 push ax
 mov al,bCurrentShadowColor

 mov bShadowColor,al

 mov bOutlineColor,al

 mov bLightColor,FORM_COLOR
 mov bButtonForeGroundColor,al
 pop ax
 ret
UseGrayedColors endp

UseNormalColors proc near
 public UseNormalColors

 push word ptr bCurrentShadowColor
 pop word ptr bShadowColor
 mov bOutlineColor,OUTLINE_COLOR
 mov bLightColor,LIGHT_COLOR
 mov bButtonForeGroundColor,OUTLINE_COLOR
 ret
UseNormalColors endp
end



Copr. 1995 Zenith Data Systems Corp.
.model small
.code
extrn DoPopUp:near
extrn RestVGAState:near

extrn SetHandCursor:near

include uiinclud.inc


DATASEG_BEGIN
extrn ControlDataStorageArea:byte
extrn bAwaitingMoveCompletion:byte
extrn bDoingEvents:byte
extrn bHourGlassMode:byte
extrn bLocalState:byte
extrn bMessageBoxID:byte
extrn bPopUpRequired:byte
extrn bScreenMode:byte

bTimesHidden db 1

bTriggerPenOnForClick db 0
 public bTriggerPenOnForClick

bLeavePenOn db 0
 public bLeavePenOn


bPenEventHappened    db 0
 public bPenEventHappened
bPenEventType db 0
 public bPenEventType

bIgnoringPen db 0
 public bIgnoringPen

bIgnoringMove db 0
 public bIgnoringMove

wPenCurrentColumn    dw 0
 public wPenCurrentColumn
wPenCurrentRow       dw 0
 public wPenCurrentRow
wPenDownColumn       dw 0
 public wPenDownColumn
wPenDownRow          dw 0
 public wPenDownRow
wPenUpColumn         dw 0
 public wPenUpColumn
wPenUpRow            dw 0
 public wPenUpRow


DATASEG_END

.code

ActivatePen proc near
 public ActivatePen
 push es
 mov ax,SET_PEN_EVENT_HANDLER
 mov dx,offset PenEventHandler
 push cs
 pop es
 mov cx,PENMOVED or PENUP or PENDOWN
 int PEN_ACTIVATE_FUNCTION
 pop es
 ret
ActivatePen endp



BlockVideo proc near
 public blockvideo

 push ax
 SM_FUNCTION SM_BLOCK_VIDEO_ACCESS
 pop ax
 ret
BlockVideo endp

UnblockVideo proc near
 public unblockvideo
 push ax
```

```
 SM_FUNCTION SM_UNBLOCK_VIDEO_ACCESS

 pop ax
 ret
UnblockVideo endp


PenEventHandler proc far

 push ds
 push bx
 push dx
 mov bx,OURDATASEG
 mov ds,bx


 cmp bTriggerPenOnForClick,0
 jz peh00
 mov bLeavePenOn,-1
 mov bTriggerPenOnForClick,0
peh00:


 cmp bAwaitingMoveCompletion,0
 jnz peh21

 cmp bIgnoringPen,0
 jnz peh21

 cmp bHourGlassMode,0
 jnz peh21

 cmp bLocalState,0
 jnz peh20

peh21:
 jmp peh3a



peh20:
 cmp bScreenMode,VGA_MODE
 jz mmm

 ROUND_TO_BYTE_BOUNDARY dx
 jmp nnn

mmm.
 call SetHandCursor
nnn:


 cmp al,PENMOVED
 jnz peh0a
 mov bx.wPenCurrentColumn
 sub bx,cx
 jge peh0b
 neg bx
peh0b:
 cmp bx,4
 jge peh0a
 mov bx,wPenCurrentRow
 sub bx,dx
 jge peh0c
 neg bx
peh0c:
 cmp bx.2
 jge peh0a
 mov wPenCurrentColumn,cx
 mov wPenCurrentRow,dx
 jmp peh3a

peh0a
 mov bPenEventHappened,-1
 test al,(PENUP or PENDOWN)
 jz peh1

peh1
 or bPenEventType,al
 mov wPenCurrentColumn,cx
 mov wPenCurrentRow,dx
 test al,PENDOWN
 jz peh2
 mov wPenDownColumn,cx
 mov wPenDownRow,dx
peh2:
 test al,PENUP
 jz peh3
 mov wPenUpColumn,cx
 mov wPenUpRow,dx
peh3.

if need_tsr ne 0
 mov bPopupRequired,-1
 pushf
 cli
 push ax
 call DoPopUp
 pop ax
 popf

endif

peh3a:
 pop dx
 pop bx
 pop ds
 ret
PenEventHandler endp


IgnorePen proc near
 public IgnorePen

 inc bIgnoringPen
 ret
IgnorePen endp

SetPenRowRegion proc near
 public SetPenRowRegion

 push ax
 mov ax,08h
 int PEN_FUNCTION
 pop ax
 ret
SetPenRowRegion endp


SetPenColumnRegion proc near
 public SetPenColumnRegion
 push ax
 mov ax,07h
 int PEN_FUNCTION
 pop ax
 ret
SetPenColumnRegion endp

ResumePen proc near
 public ResumePen
 dec bIgnoringPen
 ret
ResumePen endp


PenEntry proc near
 public PenEntry


 cmp bLeavePenOn,0
 jz p1
 cmp bTimesHidden,0
 jnz p1
 push ax
 mov ax,REMOVE_PEN_CURSOR
 int PEN_FUNCTION
 inc bTimesHidden
 pop ax
p1:
 ret
PenEntry endp

PenExit proc near
 public penexit


 cmp bLeavePenOn,0
 jz pex1
 cmp bTimesHidden,0
 jz pex1
 push ax
 push cx

 mov cx,5
agn:
 mov ax,DISPLAY_PEN_CURSOR
 int PEN_FUNCTION
 loop agn
 pop cx
 mov bTimesHidden,0
 pop ax
pex1:
 ret
PenExit endp

end
```

Copr. 1995 Zenith Data Systems Corp.

```
.MODEL SMALL
include uiinclud.inc
DATASEG_BEGIN
extrn iLeftAdders:word
extrn iTopAdders:word
extrn ControlDataStorageArea:byte
extrn OSK:tControl
extrn SliderButton:byte
extrn bCoveredAreaOnly:byte
extrn bEnlargeFlag:byte
extrn bModalFlag:byte
extrn bPreviewMode:byte
extrn bPreviewMode:byte
extrn bScreenMode:byte
extrn bUnderlinedCharacter:byte
extrn frmFirstModalForm:tControl
extrn iObjectLevel:word
extrn pNextActiveRegion:word
extrn pOSKFirstRegion:word
extrn pPenDownActiveRegion:word
extrn pPenDownLegendRegion:word
extrn rActiveRegions:tRegion
extrn rLegendRegion:tRegion
extrn rPushedRegion:tRegion
extrn rREGION:tREGION
extrn wCoveredAreaBottom:word
extrn wCoveredAreaHeight:word
extrn wCoveredAreaLeft:word
extrn wCoveredAreaRight:word
extrn wCoveredAreaTop:word
extrn wCoveredAreaTopHold:word
extrn wCoveredAreaWidth:word
extrn wDeltaLeft:word
extrn wDeltaTop:word
extrn wPenDownColumn:word
extrn wPenDownRow:word


wToolbarHeight dw 0
 public wToolBarHeight
wCurrentFormHeight dw 0
 public wCurrentFormHeight
wCurrentFormBottom dw 0
 public wCurrentFormBottom
wPreviousFormHeight dw 0
 public wPreviousFormHeight
wPreviousFormBottom dw 0
 public wPreviousFormBottom

wCurrentFormLeft  dw 0
 public wCurrentFormLeft
wCurrentFormRight dw 0
 public wCurrentFormRight


wNextTop dw 0
 public wNextTop
wPriorNextTop dw 0
wPriorPriorNextTop dw 0
wNextFrameTop dw 0
wNextLeft dw 0
wNextFrameLeft dw 0
wSameLeft dw 0
wSameHigh dw 0
wSameWide dw 0
wSameTop dw 0
wPriorSameTop dw 0
wPriorPriorSameTop dw 0
wSameFrameTop dw 0
extrn oskfirstrow:tControl
extrn osksecondrow:tControl

DATASEG_END
.code
extrn GetLabelWidth:near
extrn GetLegendHeight:near
extrn IsItLegend:near
extrn PointControlMiscItem:near
extrn ProtectOSK:near
extrn Repaint:near
extrn SetPenColumnRegion:near
extrn SetPenRowRegion:near


GetControlRegion proc near
 public GetControlRegion

 mov dx,[si].TopPixel
 call HandleTopConstants
 mov wDeltaTop,dx

 mov cx,wPriorSameTop
 mov wPriorPriorSameTop,cx
 mov cx,wPriorNextTop
 mov wPriorPriorNextTop,cx
 mov cx,wSameTop
 mov wPriorSameTop,cx
 mov cx,wNextTop
 mov wPriorNextTop,cx

 mov wSameTop,dx
 mov wNextTop,dx

 xor cx,cx

 cmp bScreenMode,VGA_MODE
 jz htm1
 cmp al,FORM
 jz htm1
 add cx,8
 add dx,8

htm1:

 mov bx,iObjectLevel
 add bx,bx
gcl2:
 add cx,iLeftAdders[bx]
 add dx,iTopAdders[bx]
 or bx,bx
 jz gcl1
 dec bx
 dec bx
 jmp short gcl2
gcl1:

 mov bx,[si].LeftPixel


 cmp al,FORM
 jnz gcl1d

 test bh,100b
 jz gcl1a
 or  bh,11111000b
 jmp short gcl1a

gcl1d:
 call HandleLeftConstants


 test [si].LeftPixel,FROMRIGHT
 jz  gcl1a
 cmp al,FORM
 jz gcl1a

if need_osk ne 0
 cmp bEnlargeFlag,0
 jz gcu6

 push ax
 push dx
 mov ax,4
 mul bx
 mov bx,3
 div bx
 mov bx,ax
 pop dx
 pop ax

endif

gcu6:
 cmp bPreviewMode,0
 jz gcu6a
 xor bx,bx
 jmp gcl1f

gcu6a:
 neg bx
 add bx,wCurrentFormRight
 sub bx,wCurrentFormLeft

if need_osk ne 0
 cmp bScreenMode,VGA_MODE
 jz gcl1a
 add bx,8
 cmp bEnlargeFlag,0
 jnz gcl1a
 sub bx,16

endif
gcl1a:
 cmp bScreenMode,VGA_MODE
 jz gcl1f

 mov ax,[si]

if need_osk ne 0

 test ah,COMPENSATE
 jz gcl1f
 cmp al,FORM
 jz gcl1f
 sub bx,8
 cmp bEnlargeFlag,0
 jz gcl1f
 sub bx,8
endif

gcl1f:
 mov wDeltaLeft,bx
 add cx,bx
```

```
gcl1b
  mov rRegion.wCurrentTop,dx
  mov rRegion.wCurrentLeft,cx
  mov wSameLeft,bx
  mov wNextLeft,bx

  mov bx,[si].PixelWidth

if need_osk ne 0

  cmp bx,-1
  jnz gcl4e

  push ax
  mov ah,16+3
  call PointControlMiscItem
  pop ax
  or bx,bx
  jz gcl4e4

  cmp bScreenMode,VGA_MODE
  jz gcl4e1
  cmp bEnlargeFlag,0
  jnz gcl4e3
  mov bx,[bx+4]
  jmp gcl4f
gcl4e3
  mov bx,[bx+6]
  jmp gcl4f

gcl4e1:

  cmp bEnlargeFlag,0
  jnz gcl4e2
  mov bx,[bx]
  jmp gcl4f
gcl4e2
  mov bx,[bx+2]
gcl4f
  jmp glc4a
gcl4e4
  mov bx,-1

endif

gcl4e
  cmp bx,SAMEWIDE
  jnz gcl4
  mov bx,wSameWide
  jmp glc4a

gcl4
if need_osk ne 0

  cmp bEnlargeFlag,0
  jz gcl1e

  cmp al,FORM
  jz gcl1e
  cmp al,CHISELBOX
  jz gcl1e

  push dx
  push ax
  mov ax,4
  mul bx
  mov bx,3
  div bx
  mov bx,ax
  test bl,11b

  jz ewe
  add bx,8
  and bl,11111000b

ewe
  pop ax
  pop dx

gcl1e
  cmp bScreenMode,VGA_MODE
  jz glc4a

  cmp bEnlargeFlag,0
  jnz glc4a

  test [si].ControlState,WIDEN
  jz glc4a
  test [si].ControlState,DOUBLEWIDEN
  jz glc4c
  add bx,8
glc4c:
  add bx,8

endif

glc4a:
  and bl,11111100b
  mov wSameWide,bx
  mov rRegion.wCurrentWidth,bx
  add wNextLeft,bx
  add bx,cx
  dec bx
  mov rRegion.wCurrentRight,bx

if need_osk ne 0
  cmp bScreenMode,VGA_MODE
  jz gcu10

  test [si].ControlState,COMPENSATE
  jz glc4r
  test [si].LeftPixel,FROMRIGHT
  jnz glc4r
  sub wNextLeft,8


glc4r:

  test [si].ControlState,WIDEN
  jz gcu10
  test [si].ControlState,COMPENSATE
  jz gcu10b



  add wNextLeft,8
gcu10b:

  cmp bEnlargeFlag,0
  jz gcu10
gcu10a:
  sub rRegion.wCurrentWidth,8
  sub rRegion.wCurrentRight,8
endif

gcu10:


  mov bx,[si].PixelHeight
  or bx,bx
  jnz gcu1

  call isitlegend
  jnz gcu1

  call GetLegendHeight
  jmp short gcu2


gcu1:

  call HandleHeightConstants

gcu2:
  mov rRegion.wCurrentHeight,bx
  mov wSameHigh,bx
  add wNextTop,bx
  add bx,dx
  dec bx
  mov rRegion.wCurrentBottom,bx

if need_osk ne 0
  cmp al,FORM
  jnz htf1
  cmp bScreenMode,VGA_MODE
  jz htf1
  mov bx,16
  add rRegion.wCurrentRight,bx
  add rRegion.wCurrentWidth,bx
  add bx,8
  add rRegion.wCurrentBottom,bx
  add rRegion.wCurrentHeight,bx

endif

htf:
  cmp al,FRAME
  jnz glc4b
  push wNextLeft
  pop wNextFrameLeft
  push wNextTop
  pop wNextFrameTop
  push wSameTop
  pop wSameFrameTop

glc4b:
  ret
GetControlRegion  endp

AddControlToActiveList proc near
  public AddControlToActiveList
 test ah,DISABLED
 jnz actal1

if NEED_ALTKEYS ne 0
  push ax
  mov al,bUnderLinedCharacter
  mov ah,128
  cmp al,"z"
  ja atal1
  cmp al,"a"
  jb atal1
  sub al,32
atal1:
  mov rRegion.wListItemIndex,ax
  pop ax
endif

 mov si,offset rRegion
 call StoreRegion

if NEED_ALTKEYS ne 0
  mov rRegion.wListItemIndex,0
  mov bUnderLinedCharacter,0
endif
actal1:
 ret
AddControlToActiveList endp

AddLegendToActiveList proc near
  public AddLegendToActiveList

 test ah,DISABLED or GRAYED
 jnz alta1

 push rRegion.pCurrentControl
 pop  rLegendRegion.pCurrentControl

 mov  rLegendRegion.wCurrentHeight,-1
 mov si,offset rLegendRegion
 call StoreRegion
alta1:
 ret
AddLegendToActiveList endp

CheckHeightEnlarge proc near
if need_osk ne 0

  cmp bEnlargeFlag,0
  jz gcl3e
  cmp bScreenMode,VGA_MODE
  jz che1

  cmp al,ABOUTBUTTON
  ja che1
  cmp al,COMMANDBUTTON
  jb che1
  jmp gcl3e

che1:
  push ax
  push dx
  mov ax,5
  mul bx
  mov bx,3
  div bx
  mov bx,ax
  pop dx
  pop ax

endif

gcl3e:
  ret
CheckHeightEnlarge endp

CheckPenDownCoordinates proc near
  public CheckPenDownCoordinates

  mov pPenDownActiveRegion,0
  mov pPenDownLegendRegion,0
  mov cx,wPenDownColumn
  mov dx,wPenDownRow
  call SearchActiveRegions
  mov pPenDownActiveRegion,di
  mov si,di
  ret
CheckPenDownCoordinates endp

DefineCoveredArea proc near
  public DefineCoveredArea

  push ax
  mov ax,[bx].TopPixel

  mov wCoveredAreaTopHold,ax
  mov wCoveredAreaTop,-1
  add ax,[bx].PixelHeight
  mov wCoveredAreaBottom,ax
  mov ax,[bx].LeftPixel
  test ah,100b
  jz dca3
  or ah,11111000b
dca3:
  push ax
  DIVIDE_BY_8 ax
  mov wCoveredAreaLeft,ax
  pop ax
  add ax,[bx].PixelWidth
  dec ax
  DIVIDE_BY_8 ax
  mov wcoveredAreaRight,ax
  mov ax,[bx].PixelHeight
  mov wCoveredAreaHeight,ax
  mov ax,[bx].PixelWidth
  DIVIDE_BY_8 ax
  mov wCoveredAreaWidth,ax
  mov bCoveredAreaOnly,0
  pop ax
  ret
DefineCoveredArea endp

FindRegionForControl proc near
  public FindRegionForControl

  mov bx,offset rActiveRegions
uaob6:
  cmp bx,pOSKFirstRegion
  jae uaob4
  cmp bx,pNextActiveRegion
  jae uaob4
  cmp [bx].pCurrentControl,si
  jz uaob5
  add bx,type rActiveRegions
  jmp uaob6

uaob5:
  clc
  ret

uaob4:
  stc
  ret
FindRegionForControl endp

HandleHeightConstants proc near


  cmp bx,SAMEHIGH
  jnz gcl3
  cmp al,FRAME
  jz gcl3a
  mov bx,wSameHigh
gcl3a:
  ret

gcl3:
  cmp bx,H100
  jae gcl5
  ret

gcl5:
  cmp bScreenMode,VGA_MODE
  jz gcl6

  cmp bx,H50
  jnz gcl5e
  mov bx,H50TEXTHEIGHT
  ret

gcl5e:
  call CheckHeightEnlarge

  cmp bx,H100
  jnz gcl5a
  mov bx,H100TEXTHEIGHT
  ret

gcl5a:
  cmp bx,H166
  jnz gcl5b
  mov bx,H166TEXTHEIGHT
  ret

gcl5b:
  cmp bx,H200
  jnz gcl5c
  mov bx,H200TEXTHEIGHT
  ret

gcl5c:
  cmp bx,H333
  jnz gcl5d
  mov bx,H333TEXTHEIGHT
  ret

gcl5d:


  push dx
  push ax
  mov ax,bx
  xor dx,dx
```

```
mov bx,1200
div bx
mov bx,H100TEXTHEIGHT
mul bx
mov bx,ax
pop ax
pop dx
ret

gcl6
 cmp bx,H50
 jnz gcl6e
 mov bx,H50VGAHEIGHT
 ret
gcl6e
 call CheckHeightEnlarge
 cmp bx,H100
 jnz gcl6a
 mov bx,H100VGAHEIGHT
 ret

gcl6a:
 cmp bx,H166
 jnz gcl6b
 mov bx,H166VGAHEIGHT
 ret

gcl6b
 cmp bx,H200
 jnz gcl6c
 mov bx,H200VGAHEIGHT
 ret

gcl6c
 cmp bx,H333
 jnz gcl6d
 mov bx,H333VGAHEIGHT
 ret

gcl6d

 push dx
 push ax
 mov ax,bx
 xor dx,dx
 mov bx,1200
 div bx
 mov bx,H100VGAHEIGHT
 mul bx
 mov bx,ax
 pop ax
 pop dx
 ret
HandleHeightConstants endp

HandleLeftConstants proc near

 test bh 11111100b
 jnz hlc1
 ret

hlc1
 and bh,not(FROMRIGHT/256)

 cmp bx SAMELEFT - 511
 jb hlc9

 cmp bx,NEXTLEFT - 511
 jb hlc4

 cmp bx NEXTFRAMELEFT - 511
 jb hlc5

 jmp hlc6

hlc4

  sub bx,SAMELEFT
  add bx,wSameLeft
  jmp hlc9


hlc5:
  sub bx,NEXTLEFT
  add bx,wNextLeft
  jmp hlc9


hlc6
  sub bx,NEXTFRAMELEFT
  add bx,wNextFrameLeft
  jmp hlc9

hlc9
  ret
HandleLeftConstants endp

HandleTopConstants proc near
 test dh,11111100b
 jnz htc1
 ret
htc1:
 test dh,80h
 jz htc2
 test dh,40h
 jz htc1a

 push wPriorPriorNextTop
 pop wNextTop
 push wPriorPriorSameTop
 pop wSameTop
 jmp htc1b

htc1a
 push wPriorNextTop
 pop wNextTop
 push wPriorSameTop
 pop wSameTop

htc1b:
 and dh,not(80h+40h)

htc2:

 and dh,not(FROMRIGHT/256)

 cmp dx,SAMETOP - 511
 jb htc9

 cmp dx,NEXTTOP - 511
 jb htc4

 cmp dx,SAMEFRAMETOP - 511
 jb htc5

 cmp dx,NEXTFRAMETOP - 511
 jb htc6

 cmp dx,NEXTTOP50 - 511
 jb htc7

 jmp htc8
htc4:

  sub dx,SAMETOP
  add dx,wSameTop
  jmp htc9

htc5:
  sub dx,NEXTTOP
  add dx,wNextTop
  jmp htc9

htc6:
  sub dx,SAMEFRAMETOP
  add dx,wSameFrameTop
  jmp htc9

htc7:
  sub dx,NEXTFRAMETOP
  add dx,wNextFrameTop
  jmp htc9


htc8:
  sub dx,NEXTTOP50
  add dx,wNextTop
  cmp bScreenMode,VGA_MODE
  jnz htc8a
  add dx,H50VGAHEIGHT
  jmp htc9

htc8a:
  add dx,H50TEXTHEIGHT
  jmp htc9
htc9:
  ret
HandleTopConstants endp

PointAssociatedLegend proc near
 public PointAssociatedLegend

 push ax
 mov ax,[si].pCurrentControl
 add si,type rRegion
 cmp ax,[si].pCurrentControl
 pop ax
 ret
PointAssociatedLegend endp

PopRegion proc near
 public PopRegion
mov si,offset rPushedRegion
call RestoreRegion
ret
PopRegion endp

PushRegion proc near
 public PushRegion
push si
push di
push ds
pop es
mov si,offset rRegion
mov di,offset rPushedRegion
mov cx,type rRegion
rep movsb
pop di
pop si
ret
PushRegion endp

RestorePenRegion proc near
 public RestorePenRegion
 xor cx,cx
 mov dx,639
 call SetPenColumnRegion
 xor cx,cx
 mov dx,479
 call SetPenRowRegion
 ret
RestorePenRegion endp

RestoreRegion proc near
 public RestoreRegion

 mov di,offset rRegion
 push ds
 pop es
 mov cx type rRegion
 rep movsb
 mov cx,rRegion.wCurrentLeft
 mov dx,rRegion.wCurrentTop
 mov si,rRegion.pCurrentControl
 mov ax,[si]
 ret
RestoreRegion endp

SearchActiveRegions proc near
 public SearchActiveRegions

 push si
 xor di,di
 mov si,offset rActiveRegions

cpdc2:
 cmp si,pNextActiveRegion
 jae cpdc3

 cmp bModalFlag,0
 jz cpdc2a
 cmp [si].pCurrentControl.offset frmFirstModalForm
 jb cpdc1
cpdc2a:

 cmp cx,[si].wCurrentLeft
 jl cpdc1
 cmp cx,[si].wCurrentRight
 jg cpdc1
 cmp dx,[si].wCurrentTop
 jl cpdc1
 cmp dx,[si].wCurrentBottom
 jg cpdc1

 mov di,si


cpdc1:
 add si,type rActiveRegions
 jmp short cpdc2

cpdc3
  or di,di
  pop si
  ret
SearchActiveRegions endp

StoreRegion proc near
 public StoreRegion

mov di,pNextActiveRegion
push ds
pop es
mov cx,type rRegion
rep movsb
mov pNextActiveRegion,di
ret
StoreRegion endp

UpdateLegendRegion proc near
 public UpdateLegendRegion

 push bp
 push bx
 push ax
 mov bp,sp
 mov rLegendRegion.wCurrentTop,dx
 mov rLegendRegion.wCurrentLeft.cx
 call GetLabelWidth
 test bh,CENTERED
 jz ulb1


 mov bx,[bp]
 sar bx,1
 add bx,rLegendRegion.wCurrentLeft
 push ax
 sar ax,1
 sub bx,ax
 mov rLegendRegion.wCurrentLeft,bx
 pop ax
 add ax,bx
 jmp ulb2

ulb1:
 add ax,cx
ulb2:
 mov rLegendRegion.wCurrentRight,ax
 pop ax
 pop bx
 pop bp
 ret
UpdateLegendRegion endp
end
Copr 1995 Zenith Data Systems Corp.

.model small
.code
extrn Repaint:near
extrn RepaintIndividualControl:near
extrn SetNewTabItem:near
extrn SetNewTabItem:near
extrn StoreRegion.near
extrn UndoCurrentTabItem:near



include uiinclud.inc
DATASEG_BEGIN
extrn ControlDataStorageArea:byte
extrn pClickRegion:word
extrn pNextActiveRegion:word
extrn pPenDownActiveRegion:word
extrn rActiveRegions:tRegion
extrn rLegendRegion:tRegion
extrn rREGION:tREGION

DATASEG_END


.code

DoSlideBarPenDown proc near
 public DoSlideBarPenDown


 mov bx,[si].PixelWidth
 sub cx,[di].wCurrentLeft
 jge dsbpd2
 xor cx,cx
dsbpd2:
  sub bx,8
 cmp cx,bx
 jbe dsbpd4
 mov cx,bx
dsbpd4


 mov ax,100
 mul cx
 div bx
  mov cl,byte ptr [si].id[1]
  xor ch,ch
  dec cx
 mul cx
 mov cx,100
 div cx
 cmp dx,50
 jb dsbpd1
 inc ax
dsbpd1:

 mov bx,[si].pStorageOffset
 cmp byte ptr [bx],al
 jz dsbpd3
 call SetSlideBarPosition
dsbpd3

 ret
DoSlideBarPenDown endp

SetSlideBarPosition proc near
 push bx
 push ax
 call UndoCurrentTabItem
 mov pClickRegion,di
```

```
pop ax
pop bx

mov byte ptr [bx],al
mov bl,al
xor bh,bh
mov ax,[si].ID
  xor ah,ah
SM_FUNCTION ax
mov ax,[si]
call RepaintIndividualControl

push pNextActiveRegion
mov di,pClickRegion
add di,type rRegion
mov pNextActiveRegion,di
mov rLegendRegion.pCurrentControl,si
mov si,offset rLegendRegion
call StoreRegion
pop pNextActiveRegion

call SetNewTabItem
mov pClickRegion,0
ret
SetSlideBarPosition endp

DoSlideBarRightArrow proc near
public DoSlideBarRightArrow

mov pPenDownActiveRegion,di
mov bx,[si].pStorageOffset
mov al,byte ptr [bx]
 push ax
 mov ah,byte ptr [si+1].id
 dec ah
cmp al,ah
 pop ax
jae dsbra1
inc al
call SetSlideBarPosition
dsbra1:
mov pPenDownActiveRegion,0
 ret
DoSlideBarRightArrow endp

DoSlideBarLeftArrow proc near
 public DoSlideBarLeftArrow
 mov pPenDownActiveRegion,di
 mov pClickRegion,di
 mov bx,[si].pStorageOffset
 mov al,byte ptr [bx]
 or al,al
 jz dsbla1
 dec al
 call SetSlideBarPosition
dsbla1:
 mov pPenDownActiveRegion,0
 ret
DoSlideBarLeftArrow endp
end


Copr. 1995 Zenith Data Systems Corp.
.MODEL SMALL
include uiinclud.inc
DATASEG_BEGIN
extrn ControlDataStorageArea:byte
extrn bDoingSpin:byte
extrn pPenDownActiveRegion:word
extrn rActiveRegions:tRegion
extrn rRegion:tRegion
DATASEG_END


.code
extrn FindRegionForControl:near
extrn GoPreviousControl:near
extrn GoPreviousControl:near
extrn IsItEditBox:near
extrn RepaintIndividualControl:near
extrn SetNumericControl:near


DoSpinDown proc near
 public DoSpinDown
 push si
 call SetPreviousEditFieldForSpin
 jc dsd1

 cmp cx,4
 jb dsd13

 mov cx,10
dsd14:
 call DecrementAsciiField
 loop dsd14
 jmp dsd15
dsd13:
 call DecrementAsciiField
dsd15:
 call RepaintSpinnedEditBox
dsd1:
 pop si
 mov rRegion.pCurrentControl,si
 ret
DoSpinDown endp

DecrementAsciiField proc near


 push di
dsd11:
 dec di
 cmp di,bx
 jb dsd10
 mov al,[di]
 cmp al,"9"
 ja dsd11
 cmp al,"0"
 jb dsd11
 jz dsd12
 dec byte ptr [di]
 jmp dsd10
dsd12:
 mov byte ptr [di],"9"
 jmp dsd11
dsd10:
 pop di
 ret
DecrementAsciiField endp

DoSpinUp proc near
 public DoSpinUp

 push si
 call SetPreviousEditFieldForSpin
 jc dsu1
 cmp cx,4
 jb dsu13


 mov cx,10
dsu14:
 call IncrementAsciiField
 loop dsu14
 jmp dsu15

dsu13:
 call IncrementAsciiField

dsu15:
 call RepaintSpinnedEditBox
dsu1:
 pop si
 mov rRegion.pCurrentControl,si
 ret
DoSpinUp endp

SetPreviousEditFieldForSpin proc near


 mov rRegion.pCurrentControl,si
dsu2:
 call GoPreviousControl
 jnc dsu2a
 ret
dsu2a:
 mov ax,[si]
 call IsItEditBox
 jnz dsu2

 push ds
 pop es
 mov di,[si].wDataLength

 mov cx,di
 mov bx,[si].pStorageOffset
 add di,bx
 dec di
 push di

 push si
 mov si,bx
dsu4:
 cmp si,di
 jz dsu5
 lodsb
 or al,al
 jnz dsu4
dsu3:
 dec si

 std
dsu6:
 movsb
 cmp si,bx
 jae dsu6
 mov al,"0"
dsu7:
 cmp di,bx
 jb dsu5
 stosb
 jmp dsu7
dsu5:
 cld
 pop si
 pop di
 clc
 ret
SetPreviousEditFieldForSpin endp

RepaintSpinnedEditBox proc near
 call SetNumericControl
 call FindRegionForControl
 jc dsu1c

 push pPenDownActiveRegion
 mov pPenDownActiveRegion,bx
 mov bDoingSpin,-1
 call RepaintIndividualControl
 mov bDoingSpin,0
 pop pPenDownActiveRegion
dsu1c:
 ret
RepaintSpinnedEditBox endp

IncrementAsciiField proc near

 push di
dsu11:
 dec di
 cmp di,bx
 jb dsu10
 mov al,[di]
 cmp al,"0"
 jb dsu11
 cmp al,"9"
 ja dsu11
 jz dsu12
 inc byte ptr [di]
 jmp dsu10
dsu12:
 mov byte ptr [di],"0"
 jmp dsu11
dsu10:
 pop di
 ret
IncrementAsciiField endp
end


Copr. 1995 Zenith Data Systems Corp.

.MODEL SMALL
include uiinclud.inc
DATASEG_BEGIN
extrn wHotKeyRightPixel:word
extrn ControlDataStorageArea:byte
extrn OSK:tControl
extrn VSBBacking:tControl
extrn VSBDnArrow:tControl
extrn VSBSlider:tControl
extrn bModalFlag:byte
extrn bPenEventHappened:byte
extrn frmFirstModalForm:tControl
extrn pClickRegion:word
extrn pNextActiveRegion:word
extrn pOSKFirstRegion:word
extrn rActiveRegions:tRegion
extrn rTabRegion:tREGION
extrn vsbBacking:tControl
extrn vsbSlider:tControl
extrn wPenDownColumn:word
extrn wPenDownRow:word
extrn wShortCutKey:word
extrn bMoveMode:byte
pTabHandler   dw 0
 public pTabHandler

pOrgTabRegion dw 0
pTabRegion dw 0
 public pTabRegion


pTabRegionHold dw 0
 public pTabRegionHold
wTabLoopCount  dw 0
pDelayedSetControl dw 0
 public pDelayedSetControl
pDelayedSetRegion dw 0
 public pDelayedSetRegion
 extrn rCursorRegion:tREGION

DATASEG_END

.CODE
extrn DoClickEvent:near
extrn DrawDashedXORBox:near
extrn DrawSolidXorBox:near
extrn FindRegionForControl:near
extrn PointAssociatedLegend:near
extrn ProtectOSK:near
extrn RetainOSKRightAndShow:near
extrn SetProtectionForControl:near
extrn ShowOSKForClick:near
extrn StartCursor:near
extrn StopCursor:near
extrn SetTextControl:near

DoTab proc near
 public DoTab


 mov wShortCutKey,0

DoTab1:

 mov wTabLoopCount,0

 mov wPenDownColumn,-1
 mov wPenDownRow,-1
 mov bPenEventHappened,0

 mov si,pTabRegion
 or si,si
 jnz hat3
 mov wShortCutKey,0
 stc
 ret

hat3:
 call word ptr pTabHandler


hat1:


if NEED_ALTKEYS ne 0
 cmp si,pTabRegion
 jnz hat6
 push ax
 mov ax,wShortCutKey
 cmp ax,[si].wListItemIndex
 pop ax
 jz hat2
 push pClickRegion
 mov pClickRegion,si
 call ShowTabBox
 pop pClickRegion
 stc
 ret
hat6:
 inc wTabLoopCount
 cmp wTabLoopCount,MAX_ACTIVE_CONTROLS
 jbe hat5
 stc
 ret
hat5:
 cmp wShortCutKey,0
 jz hat1b
 push ax
 mov ax,wShortCutKey
 cmp ax,[si].wListItemIndex
 pop ax
 jnz hat3
 mov wShortCutKey,0
hat1b.
endif

 test [si].bListItemFlags,128
 jnz hat1a
 cmp [si].wCurrentHeight,-1
 jnz hat2
 test [si].bListItemFlags,2
 jnz hat2
hat1a:
 call word ptr pTabHandler
 jnc hat1c
 ret

hat1c:
 jmp hat1

hat2:
 push pClickRegion
 mov pClickRegion,si
 call ShowTabBox
 pop pClickRegion
 clc
 ret
DoTab endp

IsItButton proc near
 public IsItButton
```

```
 cmp al,FIRSTBUTTONTYPE
 jb iib1
 cmp al,LASTBUTTONTYPE
 ja iib1
 cmp ax,ax
iib1:
 ret
IsItButton endp

IsItCheckBox proc near
  public IsItCheckBox

 cmp al,CHECKBOX
 jz iicb1
 cmp al,OPTIONBUTTON
iicb1:
 ret
IsItCheckBox endp

IsItEditBox proc near
  public IsItEditBox

 cmp al,FIRSTEDITBOXTYPE
 jb iieb1
 cmp al,LASTEDITBOXTYPE
 ja iieb1
 cmp ax,ax
iieb1
 ret
IsItEditBox endp

IsItLegend proc near
  public IsItLegend
  cmp al,FIRSTLEGENDTYPE
  jb iil1
  cmp al,LASTLEGENDTYPE
  ja iil1
  cmp ax ax
iil1
  ret
IsItLegend endp

IsItListBox proc near
  public IsItListBox

 cmp al,FIRSTLISTBOXTYPE
 jb iilb1
 cmp al,LASTLISTBOXTYPE
 ja iilb1
 cmp ax,ax
iilb1
 ret
IsItListBox endp

IsItSlideBar proc near
  public IsItSlideBar
  cmp al,SLIDEBAR
  jz iisb1
  cmp al,SPECTRUMBAR
iisb1:
  ret
IsItSlideBar endp

PointNextTabControl proc near
  public PointNextTabControl
  mov pOrgTabRegion,si
  jmp dke2bb
dke2b
  cmp si,pOrgTabRegion
  jnz dke2bb
  stc
  ret
dke2bb.
  add si,size rActiveRegions
  cmp si,pOSKFirstRegion
  jae dke2aa
  cmp si,pNextActiveRegion
  jb dke2a

dke2aa.
  mov si,offset rActiveRegions

dke2a
  call CheckSkipTab
  jnz dke2b
  clc
  ret
PointNextTabControl endp

PointPreviousTabControl proc near
  public PointPreviousTabControl
pptc2:
  sub si,size rActiveRegions
  cmp si,offset rActiveRegions
 jae pptc1
 mov si,pNextActiveRegion
 sub si,size rActiveRegions
 cmp si,pOSKFirstRegion
 jb pptc1
 mov si,pOSKFirstRegion
 sub si,size rActiveRegions
pptc1:
 call CheckSkipTab
 jnz pptc2
 ret
PointPreviousTabControl endp

SetInitialTab proc near
 public SetInitialTab
 call FindRegionForControl
 jc sit1
 mov pClickRegion,bx
  push [bx].wCurrentTop
  pop rCursorRegion.wCurrentTop

 call DoClickEvent
sit1
 ret
SetInitialTab endp

SetNewTabItem proc near
 public SetNewTabItem

 mov si,pClickRegion
 or si,si
 jz snti1
 call SetNewTabItemWork
snti1:
 ret
SetNewTabItem endp

SetNewTabItemWork proc near
 public SetNewTabItemWork
 or si,si
 jz dce4a
 call SetTabControl
SetNewTabItemWork1:
 public SetNewTabItemWork1
 push si
 mov si,[si].pCurrentControl
 call SetProtectionForControl
 mov bx,si
 pop si
 mov ax,[bx]

 call ISITEDITBOX
 jnz dce4c
 push ax
  push wHotKeyRightPixel
  call ShowOSKForCLick
  pop wHotKeyRightPixel
 call STARTCURSOR
 pop ax
if need_osk ne 0
endif
 jmp dce4a
dce4c:

 call ISITLISTBOX
 jnz dce4e
 call DrawDashedXORBox
 jmp dce4a
dce4e:

 call ShowCommandButtonTabBox
 push bx
 mov bx,[si].pCurrentControl
 cmp [bx].ControlType,Toolbarbutton
 pop bx
 jz dce4a
 call PointAssociatedLegend
 jnz dce4a
dce4g:
 call DrawDashedXORBox
dce4a:

 ret
SetNewTabItemWork endp

SetTabControl proc near
 push si
 mov pTabRegion,si
 mov cx,type rTabRegion
 mov di,offset rTabRegion
 push ds
 pop es
 rep movsb
 pop si
 ret
SetTabControl endp

ShowCommandButtonTabBox proc near
 push bx
 push si
 mov bx,[si].pCurrentControl
 mov al,[bx]
 call ISITBUTTON
 jnz sctb1x
 cmp al,TOOLBARBUTTON
 jz scbt1a
 cmp al,SYMBOLBUTTON
 jb sctb1z
sctb1x:
 cmp al,closebutton
 jz scbt1q
 cmp al,aboutbutton
 jz scbt1q

 jmp scbt1
sctb1z:
 cmp bx,offset vsbSlider
 jnz scbt4
 add [si].wCurrentTop,4
 sub [si].wCurrentBottom,4
 add [si].wCurrentLeft,8
 sub [si].wCurrentRight,4
 call DrawDashedXorBox
 add [si].wCurrentRight,4
 sub [si].wCurrentLeft,8
 add [si].wCurrentBottom,4
 sub [si].wCurrentTop,4
 jmp scbt1
scbt4

 cmp bx,offset vsbBacking
 jb scbt2
 cmp bx,offset vsbDnArrow
 ja scbt2
 jmp scbt1
scbt1r:
 mov cx,3
 mov dx,1
 jmp scbt1aa
scbt1q:
 mov cx,4
 mov dx,6
 jmp scbt1aa
scbt1a:
 mov cx,3
 mov dx,20
scbt1aa:
 xor ax,ax
 test [bx].ControlState,ISDOWN
 jz scbt2b
 inc ax
 inc ax
scbt2b:
 add cx,ax
 add dx,ax
 mov ax,-1

 jmp scbt2a
scbt2:

 mov cx,-1
 mov dx,0
 xor ax,ax
scbt2a:
 add [si].wCurrentTop,cx
 sub [si].wCurrentBottom,cx
 add [si].wCurrentLeft,dx
 sub [si].wCurrentRight,dx

 push dx
 push cx

 or ax,ax
 jz scbt5
 call DrawDashedXORBox
 jmp scbt6
scbt5
 call DrawSolidXORBox
scbt6
 pop cx
 pop dx
 sub [si].wCurrentTop,cx
 add [si].wCurrentBottom,cx
 sub [si].wCurrentLeft,dx
 add [si].wCurrentRight,dx

scbt1:
 pop si
 pop bx
 ret

ShowCommandButtonTabBox endp

ShowTabBox proc near
 public ShowTabBox

 push ax
 mov ax,pClickRegion
 cmp ax,pOSKFirstRegion
 pop ax
 jae stbx1
 call UndoCurrentTabItem
 call SetNewTabItem
 call HandleDelayedSet
stbx1:
 ret
ShowTabBox endp

UndoCurrentTabItem proc near
 public UndoCurrentTabItem

if need_osk ne 0
 call ProtectOSK
endif

 push si
 push di
 mov si,pTabRegion
 or si,si
 jz stb1
 push si
 call StopCursor
 call ShowCommandButtonTabBox
 pop si
stb3
 push si
 mov si,[si].pCurrentControl
 mov al,[si].ControlType
 pop si
 cmp al,Toolbarbutton
 jz stb1
 call IsItListBox
 jz stb2

 call PointAssociatedLegend
 jnz stb1
stb2:
 call DrawDashedXORBox

stb1:
 pop di
 pop si
 ret
UndoCurrentTabItem endp

CheckSkipTab proc near
 push bx
 mov bx,[si].pCurrentControl
 cmp bModalFlag,0
 jz cst1
 cmp bx,offset frmFirstModalForm
 jb cst2
cst1:
 mov bl,[bx].ControlState
 test bl,SKIPTAB or DISABLED or GRAYED
cst2:
 pop bx
 ret
CheckSkipTab endp

HandleDelayedSet proc near
 public HandleDelayedSet

 cmp pDelayedSetControl,0
 jz hds1
 push ax
 push si
 cmp bMoveMode,0
 jnz hst2
 mov ax,pTabRegion
 cmp ax,pDelayedSetRegion
 jz hst2
 xor si,si
 mov si,pDelayedSetControl
 call SetTextControl
 mov pDelayedSetControl,0
hst2:
 pop si
 pop ax
hds1:
 ret
HandleDelayedSet endp
END
```

Copr. 1995 Zenith Data Systems Corp.

```
________ equ  0
_______X equ  1
______X_ equ  2
______XX equ  3
```

```
_____X__ equ 4
_____X_X equ 5
_____XX_ equ 6
_____XXX equ 7
____X___ equ 8
____X__X equ 9
____X_X_ equ 10
____X_XX equ 11
____XX__ equ 12
____XX_X equ 13
____XXX_ equ 14
____XXXX equ 15
___X____ equ 16
___X___X equ 17
___X__X_ equ 18
___X__XX equ 19
___X_X__ equ 20
___X_X_X equ 21
___X_XX_ equ 22
___X_XXX equ 23
___XX___ equ 24
___XX__X equ 25
___XX_X_ equ 26
___XX_XX equ 27
___XXX__ equ 28
___XXX_X equ 29
___XXXX_ equ 30
___XXXXX equ 31
__X_____ equ 32
__X____X equ 33
__X___X_ equ 34
__X___XX equ 35
__X__X__ equ 36
__X__X_X equ 37
__X__XX_ equ 38
__X__XXX equ 39
__X_X___ equ 40
__X_X__X equ 41
__X_X_X_ equ 42
__X_X_XX equ 43
__X_XX__ equ 44
__X_XX_X equ 45
__X_XXX_ equ 46
__X_XXXX equ 47
__XX____ equ 48
__XX___X equ 49
__XX__X_ equ 50
__XX__XX equ 51
__XX_X__ equ 52
__XX_X_X equ 53
__XX_XX_ equ 54
__XX_XXX equ 55
__XXX___ equ 56
__XXX__X equ 57
__XXX_X_ equ 58
__XXX_XX equ 59
__XXXX__ equ 60
__XXXX_X equ 61
__XXXXX_ equ 62
__XXXXXX equ 63
_X______ equ 64
_X_____X equ 65
_X____X_ equ 66
_X____XX equ 67
_X___X__ equ 68
_X___X_X equ 69
_X___XX_ equ 70
_X___XXX equ 71
_X__X___ equ 72
_X__X__X equ 73
_X__X_X_ equ 74
_X__X_XX equ 75
_X__XX__ equ 76
_X__XX_X equ 77
_X__XXX_ equ 78
_X__XXXX equ 79
_X_X____ equ 80
_X_X___X equ 81
_X_X__X_ equ 82
_X_X__XX equ 83
_X_X_X__ equ 84
_X_X_X_X equ 85
_X_X_XX_ equ 86
_X_X_XXX equ 87
_X_XX___ equ 88
_X_XX__X equ 89
_X_XX_X_ equ 90
_X_XX_XX equ 91
_X_XXX__ equ 92
_X_XXX_X equ 93
_X_XXXX_ equ 94
_X_XXXXX equ 95
_XX_____ equ 96
_XX____X equ 97
_XX___X_ equ 98
_XX___XX equ 99
_XX__X__ equ 100
_XX__X_X equ 101
_XX__XX_ equ 102
_XX__XXX equ 103
_XX_X___ equ 104
_XX_X__X equ 105
_XX_X_X_ equ 106
_XX_X_XX equ 107
_XX_XX__ equ 108
_XX_XX_X equ 109
_XX_XXX_ equ 110
_XX_XXXX equ 111
_XXX____ equ 112
_XXX___X equ 113
_XXX__X_ equ 114
_XXX__XX equ 115
_XXX_X__ equ 116
_XXX_X_X equ 117
_XXX_XX_ equ 118
_XXX_XXX equ 119
_XXXX___ equ 120
_XXXX__X equ 121
_XXXX_X_ equ 122
_XXXX_XX equ 123
_XXXXX__ equ 124
_XXXXX_X equ 125
_XXXXXX_ equ 126
_XXXXXXX equ 127
X_______ equ 128
X______X equ 129
X_____X_ equ 130
X_____XX equ 131
X____X__ equ 132
X____X_X equ 133
X____XX_ equ 134
X____XXX equ 135
X___X___ equ 136
X___X__X equ 137
X___X_X_ equ 138
X___X_XX equ 139
X___XX__ equ 140
X___XX_X equ 141
X___XXX_ equ 142
X___XXXX equ 143
X__X____ equ 144
X__X___X equ 145
X__X__X_ equ 146
X__X__XX equ 147
X__X_X__ equ 148
X__X_X_X equ 149
X__X_XX_ equ 150
X__X_XXX equ 151
X__XX___ equ 152
X__XX__X equ 153
X__XX_X_ equ 154
X__XX_XX equ 155
X__XXX__ equ 156
X__XXX_X equ 157
X__XXXX_ equ 158
X__XXXXX equ 159
X_X_____ equ 160
X_X____X equ 161
X_X___X_ equ 162
X_X___XX equ 163
X_X__X__ equ 164
X_X__X_X equ 165
X_X__XX_ equ 166
X_X__XXX equ 167
X_X_X___ equ 168
X_X_X__X equ 169
X_X_X_X_ equ 170
X_X_X_XX equ 171
X_X_XX__ equ 172
X_X_XX_X equ 173
X_X_XXX_ equ 174
X_X_XXXX equ 175
X_XX____ equ 176
X_XX___X equ 177
X_XX__X_ equ 178
X_XX__XX equ 179
X_XX_X__ equ 180
X_XX_X_X equ 181
X_XX_XX_ equ 182
X_XX_XXX equ 183
X_XXX___ equ 184
X_XXX__X equ 185
X_XXX_X_ equ 186
X_XXX_XX equ 187
X_XXXX__ equ 188
X_XXXX_X equ 189
X_XXXXX_ equ 190
X_XXXXXX equ 191
XX______ equ 192
XX_____X equ 193
XX____X_ equ 194
XX____XX equ 195
XX___X__ equ 196
XX___X_X equ 197
XX___XX_ equ 198
XX___XXX equ 199
XX__X___ equ 200
XX__X__X equ 201
XX__X_X_ equ 202
XX__X_XX equ 203
XX__XX__ equ 204
XX__XX_X equ 205
XX__XXX_ equ 206
XX__XXXX equ 207
XX_X____ equ 208
XX_X___X equ 209
XX_X__X_ equ 210
XX_X__XX equ 211
XX_X_X__ equ 212
XX_X_X_X equ 213
XX_X_XX_ equ 214
XX_X_XXX equ 215
XX_XX___ equ 216
XX_XX__X equ 217
XX_XX_X_ equ 218
XX_XX_XX equ 219
XX_XXX__ equ 220
XX_XXX_X equ 221
XX_XXXX_ equ 222
XX_XXXXX equ 223
XXX_____ equ 224
XXX____X equ 225
XXX___X_ equ 226
XXX___XX equ 227
XXX__X__ equ 228
XXX__X_X equ 229
XXX__XX_ equ 230
XXX__XXX equ 231
XXX_X___ equ 232
XXX_X__X equ 233
XXX_X_X_ equ 234
XXX_X_XX equ 235
XXX_XX__ equ 236
XXX_XX_X equ 237
XXX_XXX_ equ 238
XXX_XXXX equ 239
XXXX____ equ 240
XXXX___X equ 241
XXXX__X_ equ 242
XXXX__XX equ 243
XXXX_X__ equ 244
XXXX_X_X equ 245
XXXX_XX_ equ 246
XXXX_XXX equ 247
XXXXX___ equ 248
XXXXX__X equ 249
XXXXX_X_ equ 250
XXXXX_XX equ 251
XXXXXX__ equ 252
XXXXXX_X equ 253
XXXXXXX_ equ 254
XXXXXXXX equ 255
Copr. 1995 Zenith Data Systems Corp.
NEED_ABOUTICON equ 1
NEED_OSK   equ 1
NEED_TSR   equ 1
NEED_GETSET equ 1
NEED_EDIT  equ 1
NEED_LISTS equ 1
NEED_ALTKEYS equ 0
NEED_CRITICAL equ 0
DIAMOND_OPTBUTTONS   equ 1
CHECKMARK_CHECKBOXES equ 1

PENDRIVER_INTERRUPT equ 67h
SM_FUNCTION_INTERRUPT equ 68h

MAX_TOOLBARBUTTONS equ 6
PIXELS_PER_NOTCH equ 24
NOTCH_COUNT equ 8
MAXMESSAGELINE = 328
PROGRESS_MAXLEN equ 20

MB_ABOUT equ 1
MB_CREDITS equ 2
MB_CALIBRATEULC equ 3
MB_CALIBRATELRC equ 4
MB_REBOOT equ 5
MB_UPGRADE equ 6
MB_UPGRADE_PROGRESS equ 7
MB_UPGRADE_COMPLETE equ 8
MB_NOUPGRADE equ 9
MB_SHOWCALLPROGRESS equ 10

SM_ABORT_REQUEST_CONNECTION equ 24h
SM_BLOCK_VIDEO_ACCESS equ 58h
SM_CALIBRATE_LOWERRIGHT equ 800Ch
SM_CALIBRATE_UPPERLEFT equ 0ch
SM_CANCEL_CALIBRATION equ 00eh
SM_GET_ABOUT_DIALOG equ 063h
SM_GET_CONNECTION_STATUS equ 22h
SM_GET_HOST_LIST_STATUS equ 21h
SM_GET_INITIAL_SCREEN equ 08050h
SM_GET_KEYBOARD_STATUS equ 062h
SM_GET_MODEM_DEFAULTS equ 39h
SM_GET_NEXT_CREDITS_DIALOG equ 64h
SM_GET_PASSWORD_STATUS equ 25h
SM_GET_USER_INTERFACE_LANGUAGE equ
057h
SM_PERFORM_FLASH_UPDATE equ 13h
SM_REBOOT_HOST equ 011h
SM_REPORT_BUTTON_CLICKED equ 8055H
SM_REQUEST_ACTIVE_FLASH_UPGRADE equ
12h
SM_REQUEST_CONNECTION equ 23h
SM_REQUEST_DISCONNECTION equ 8023h
SM_REQUEST_UNLOAD equ 08053h
SM_SET_ACTIVE_STATUS equ 060h
SM_SET_KEYSTROKE equ 061h
SM_UNBLOCK_VIDEO_ACCESS equ 8058h
SM_UPDATE_DIMENSIONS equ 052h
SM_UPDATE_HOST_LIST equ 20h
SM_NOTIFY_NEW_SETUP equ 05ah

UI_CALIBRATION_COMPLETE equ 0Dh
UI_FLASH_UPDATE_PERCENTAGE equ 14h
UI_GET_SUI_VERSION_NUMBER equ 69h
UI_HIDE_MESSAGE_BOX equ 056h
UI_MOVE_OSK equ 05bh
UI_REQUEST_CLOSURE equ 053h
UI_REQUEST_DISPLAY equ 051h
UI_SHOW_MESSAGE_BOX equ 055h
UI_UPDATE_CONNECTION_STATUS equ 03bh
UI_SHOW_HIDE_BUSY_CURSOR equ 059h

RES_NO_SCREEN        EQU 0
RES_OSK_ALPHA        EQU 1
RES_OSK_NUM          EQU 2
RES_OSK_FULL         EQU 3
RES_OSK_BIG          EQU 4
RES_OSK_BIG_ALPHA    EQU 5
RES_OSK_BIG_NUM      EQU 6
RES_OSK_BIG_FULL     EQU 7
RES_SETUPS_HOST      EQU 1*8
RES_SETUPS_HOTKEYS   EQU 2*8
RES_SETUPS_MAINTENANCE EQU 3*8
RES_SETUPS_MODEM     EQU 4*8
RES_SETUPS_POWER     EQU 5*8
RES_SETUPS_SCREEN    EQU 6*8

GETSET_AUTOMATIC_SHUTOFF      equ 0fh
GETSET_BRIGHTNESS             equ 0bh
GETSET_CONTRAST               equ 0ah
GETSET_CUSTOM_AUTOANSWER_STRING equ
36h
GETSET_CUSTOM_CONNECT_STRING  equ 38h
GETSET_CUSTOM_DISCONNECT_STRING equ
37h
GETSET_CUSTOM_INIT_STRING     equ 035h
GETSET_DIM_HOST_SCREEN        equ 6Ah
GETSET_DOMAIN_ID              equ 67h
GETSET_HOST_CONNECTION_TYPE   equ 02ch
GETSET_LOCK_HOST_KEYBOARD     equ 68h
GETSET_MODEM_ANSWER_ON_RING   equ
032h
GETSET_MODEM_BAUD_RATE_ENTRY  equ
29h
GETSET_MODEM_HOST_DESC_ENTRY  equ
28h
GETSET_MODEM_HOST_PHONE_ENTRY equ
27h
GETSET_MODEM_MANUFACTURER_ENTRY equ
26h
GETSET_MODEM_PREFIX           equ 030h
GETSET_MODEM_RETRY_DELAY      equ 034h
GETSET_MODEM_RETRY_LIMIT      equ 033h
GETSET_MODEM_SUFFIX           equ 031h
GETSET_MODEM_TONE_OR_PULSE    equ 02fh
GETSET_NETWORK_GROUP_ENTRY    equ 2ah
GETSET_NETWORK_HOST_ENTRY     equ 2bh
GETSET_PASSWORD               equ 02eh
GETSET_SECURITY_ID            equ 66h
GETSET_SLEEPMODE_PERIOD       equ 10h
GETSET_USER_DEFINED_HOT_ICON  equ 65h
GETSET_USER_ID                equ 02dh
GETSET_FRAME_TYPE_ENTRY       equ 3ah

global AboutIcon:byte
global ColoredAboutIcon:byte

HLINE16X2       equ 33
VLINE2X64       equ 35
CONTRAST_ICON   equ 36
BRIGHTNESS_ICON equ 37
SLEEP_ICON      equ 38
ABOUT_ICON      equ 39
BIG_X_ICON      equ 40
BIG_CRUZER      equ 41
HOST_ICON       equ 42
HOTKEY_ICON     equ 43
MAINT_ICON      equ 44
MODEM_ICON      equ 45
POWER_ICON      equ 46
SCREEN_ICON     equ 47
```

```
HAND1_ICON      equ 48
HAND2_ICON      equ 49
SMALL_CRUZER     equ 50
HIBERNATE_ICON   equ 51
SMALL_ABOUT     equ 52
CALIBRATION_X    equ 53

SPACEBAR_ICON    equ 82

Copr. 1995 Zenith Data Systems Corp

SM_TEST_FUNCTION equ 0FFFFh
MB_LEFTJUSTIFIED equ 0
MB_CENTERED equ 1
MB_RIGHTJUSTIFIED equ 2

UPARROWBITMAP    equ 33
DNARROWBITMAP    equ 34

FULL_KEYBOARD_ICON equ 35
SMALL_KEYBOARD_ICON equ 36
REDUCE_KEYBOARD_ICON equ 37
KEYBOARD_EXIT_ICON equ 38
ESC_KEY equ 39
F1_KEY equ 40
F2_KEY equ 41
F3_KEY equ 42
F4_KEY equ 43
F5_KEY equ 44
F6_KEY equ 45
F7_KEY equ 46
F8_KEY equ 47
F9_KEY equ 48
F10_KEY equ 49
F11_KEY equ 50
F12_KEY equ 51
PRT_KEY equ 52
SLK_KEY equ 53
PSE_KEY equ 54
BREAK_KEY equ 55
SYSREQ_KEY equ 56
BS_KEY equ 57
INS_KEY equ 58
HM_KEY equ 59
PGUP_KEY equ 60
NLK_KEY equ 61
TAB_KEY equ 62
DEL_KEY equ 63
END_KEY equ 64
PGDN_KEY equ 65
UA_KEY equ 66
CAPS_KEY equ 67
ENTER_KEY equ 68
LA_KEY equ 69
RA_KEY equ 70
SHIFT_KEY equ 71
ALT_KEY equ 72
CTRL_KEY equ 73
DA_KEY equ 74
ENT_KEY equ 75
LEFT_BRAKET_KEY equ 76
RIGHT_BRAKET_KEY equ 77
GRAPHIC_SPACER equ 78
NUM_KEYBOARD_ICON equ 79
ENLARGE_KEYBOARD_ICON equ 80
PLUS_KEY equ 81

BUTTONTOPHEIGHT equ 3
BUTTONBOTTOMHEIGHT equ 3
BUTTONLEFTPIXELS equ 8
BUTTONRIGHTPIXELS equ 8
TITLEBARHEIGHT equ 32

RESET_PEN_DRIVER      equ 00h
DISPLAY_PEN_CURSOR    equ 01h
REMOVE_PEN_CURSOR     equ 02h
SET_PEN_EVENT_HANDLER = 20h
GET_CURSOR_HOTSPOT   equ 2Ah

PEN_FUNCTION equ 33h
PEN_ACTIVATE_FUNCTION =  67h

PENMOVED        equ 1
PENDOWN         equ 2
PENUP          equ 4

FORM_COLOR equ gray
SHADOW_COLOR equ darkgray
OUTLINE_COLOR equ black
LIGHT_COLOR equ  white

TEXTMODE_KEY_UP_COLOR equ 112
TEXTMODE_KEY_DOWN_COLOR equ 32

WITHBACKCOLOR  equ 16
LEFTJUSTIFIED  equ 32
CENTERED      equ 64
RIGHTJUSTIFIED equ 128

LEFT_ARROW_SCAN_CODE   equ 75
RIGHT_ARROW_SCAN_CODE  equ 77
DEL_SCAN_CODE          equ 83
HOME_SCAN_CODE         equ 71
END_SCAN_CODE          equ 79
UP_ARROW_SCAN_CODE     equ 72
DOWN_ARROW_SCAN_CODE   equ 80

BACKSPACE_SCAN_CODE    equ 14

SHIFTTABKEY   equ 0F00h
BACKSPACE    equ 8
TARKEY       equ 9

PAINTALL     equ 255
PAINTTOOLBARS equ 2
PAINTFORMS   equ 4
MAX_ACTIVE_CONTROLS equ 220

NORMSTATE   equ 0
GRAYED      equ 1
SKIPTAB     equ 2
DISABLED    equ 4
INVISIBLE   equ 8
ISDOWN      equ 16
WIDEN      equ 32
MOVEABLE    equ 64
COMPENSATE  equ 64
BACKFILL    equ 128
DOUBLEWIDEN  equ 128
EXPLICITSIZE equ 128

TOOLBAR       equ 1
FORM        equ 2
DIALOGBOX     equ 3
FRAME        equ 4
GROUPBOX      equ 5

ENDFRAME      equ 6
ENDDIALOGBOX   equ 7
ENDFORM       equ 8
ENDTOOLBAR     equ 9
ENDTOOLBARBUTTON equ 10
ENDOFOBJECT    equ 11

FIRST_ENDOFOBJECT equ ENDFRAME
LAST_ENDOFOBJECT equ ENDOFOBJECT

CO'MANDBUTTON  equ 12
CANCELBUTTON   equ 13
TOOLBARBUTTON  equ 14
SYMBOLBUTTON   equ 15
SPINUPBUTTON   equ 16
SPINDOWNBUTTON equ 17

CLOSEBUTTON    equ 18
ABOUTBUTTON    equ 19
KEYBUTTON      equ 20

RSHIFTKEYBUTTON  equ 21
LSHIFTKEYBUTTON  equ 22
CTRLKEYBUTTON    equ 23
ALTKEYBUTTON     equ 24
SCROLLLOCKBUTTON equ 25
NUMLOCKBUTTON    equ 26
CAPSLOCKBUTTON   equ 27

FIRSTBUTTONTYPE equ COMMANDBUTTON
LASTBUTTONTYPE  equ CAPSLOCKBUTTON

FIRSTFOCUSABLEBUTTONTYPE equ
COMMANDBUTTON
LASTFOCUSABLEBUTTONTYPE equ
TOOLBARBUTTON

FIRSTKEYTYPE equ KEYBUTTON
LASTKEYTYPE equ CAPSLOCKBUTTON

CHECKBOX      equ 28
OPTIONBUTTON   equ 29

EDITBOX       equ 30
UCEDITBOX      equ 31
PWEDITBOX      equ 32
NUMEDITBOX     equ 33
KE'EDITBOX     equ 34
UN RAMEDEDITBOX equ 35

FIRSTEDITBOXTYPE equ EDITBOX
LASTEDITBOXTYPE  equ UNFRAMEDEDITBOX

LISTBOX       equ 36
LISTBOXNOSCROLL equ 37
SPINBUTTON     equ 38

FIRSTLISTBOXTYPE equ LISTBOX
LASTLISTBOXTYPE  equ LISTBOXNOSCROLL

VSCROLLBAR    equ 39
SLIDEBAR      equ 40
SPECTRUMBAR    equ 41
PROGRESSBAR    equ 42

FIRSTSCROLLBARTYPE equ VSCROLLBAR
LASTSCROLLBARTYPE  equ PROGRESSBAR

TITLEBAR      equ 43

LEFTLEGEND    equ 44
CENTEREDLEGEND equ 45
RIGHTLEGEND    equ 46

CHISELBOX     equ 47

LINEBOX       equ 48
ICON         equ 49
SUNKENFRAME    equ 50

FIRSTLEGENDTYPE equ LEFTLEGEND
LASTLEGENDTYPE equ RIGHTLEGEND

NORMFONT       equ 0
SMALLFONT      equ 32
BIGFONT       equ 64
GRAPHICFONT    equ 32+64
ANYFONT       equ 32+64

ENGLISH_LANGUAGE equ 0
FRENCH_LANGUAGE equ 1
GERMAN_LANGUAGE equ 2

NORMFONT equ 0
SMALLFONT equ 32
BIGFONT   equ 64
GRAPHICFONT equ 32+64

VGA_MODE equ 12h
VGASEGMENT =0A000h
SCREEN_HEIGHT_PIXELS =480
SCREEN_WIDTH_BYTES =80
SCREEN_WIDTH_PIXELS = 640

SAMETOP      equ 4096
NEXTTOP      equ 4096+1024
SAMEFRAMETOP  equ 4096+1024*2
NEXTFRAMETOP  equ 4096+1024*3
NEXTTOP50    equ 4096+1024*4

PRIORFLAG    equ 08000h
PRIORPRIORFLAG equ 0C000h

SAMELEFT     equ 4096
NEXTLEFT     equ 8192
NEXTFRAMELEFT equ 4096+8192
FROMRIGHT    equ 16384

SAMEHIGH     equ 0

H100        equ 1200
H100TEXTHEIGHT equ 8
H100VGAHEIGHT  equ 20
H166        equ 2000
H166TEXTHEIGHT equ 16
H166VGAHEIGHT equ 33
H200        equ 2400
H200TEXTHEIGHT equ 16
H200VGAHEIGHT equ 40
H333        equ 4000
H333TEXTHEIGHT equ 32
H333VGAHEIGHT equ 66

H50         equ 8000h
H50TEXTHEIGHT equ 0
H50VGAHEIGHT equ 8

SAMEWIDE     equ 0
W100        equ 1200
W200        equ 2400
W300        equ 3600

MBB_OK     equ 001h
MBB_CANCEL equ 002h
MBB_ABORT  equ 004h
MBB_RETRY  equ 008h
MBB_IGNORE equ 010h
MBB_YES    equ 020h
MBB_NO     equ 040h

MBX_NOBUTTON equ 0
MBX_OK      equ MBB_OK
MBX_CANCEL   equ MBB_CANCEL
MBX_OKCANCEL equ MBB_OK or MBB_CANCEL
MBX_ABORTRETRYIGNORE equ MBB_ABORT or
MBB_RETRY or MBB_IGNORE
MBX_YESNOCANCEL equ MBB_YES or MBB_NO
or MBB_CANCEL
MBX_YESNORETRY equ MBB_YES or MBB_NO or
MBB_RETRY
MBX_YESNO equ MBB_YES or MBB_NO
MBX_RETRYCANCEL equ MBB_RETRY or
MBB_CANCEL

R_SHIFT_DOWN equ 1
L_SHIFT_DOWN equ 2
CTRL_DOWN equ 4
ALT_DOWN equ 8
SCROLL_LOCK_DOWN equ 16
NUM_LOCK_DOWN equ 32
CAPS_LOCK_DOWN equ 64
INS_STATE_ACTIVE equ 128

BLACK     equ 0
BLUE     equ 1
GREEN     equ 2
CYAN     equ 3
RED     equ 4
MAGENTA   equ 5
BROWN     equ 6
GRAY     equ 7
DARKGRAY  equ 8
LT_BLUE   equ 9
LT_GREEN  equ 10
LT_CYAN   equ 11
LT_RED    equ 12
LT_MAGENTA equ 13
YELLOW    equ 14
WHITE     equ 15

Copr. 1995 Zenith Data Systems Corp.
ifndef MAJOR_VERSION
.code
extrn CheckListDataAvailable:far
extrn CheckScreenUpdateNeeded:far
extrn DisinstallInt09:far
extrn DoAfterRepaintingList:far
extrn DoBeforeRepaintingForm:far
extrn DoCustomControlPenDown:far
extrn DoCustomEvents:far
extrn DoCustomListPenUp:far
extrn DoCustomStartups:far
extrn DoCustomTimerProcedures:far
extrn DoHotKeyEdit:far
extrn DoSMFunction:far
extrn DoToolBarButtonClick:far
extrn DrawAboutIcon:far
extrn GetCustomEditBoxContents:far
extrn GetCustomPopupRequest:far
extrn HandleButtonClicks:far
extrn HandleMessageBoxClick:far
extrn RepaintCustomEditBoxContents:far
extrn TryUnload:far
endif
Copr. 1995 Zenith Data Systems Corp.
include uifarext.inc

DATASEG_BEGIN macro
UIDATA segment public 'data'
assume ds:UIDATA
ENDM

DATASEG_END macro
UIDATA ends
endm
OURDATASEG EQU UIDATA

include uicustom.inc
include uiequate.inc
include uistrucs.inc
include uimacros.inc

Copr. 1995 Zenith Data Systems Corp.

NEXTSTORAGE  = offset ControlDataStorageArea
TOTALSTORAGE = 0
NEXTCONTROL = 1
FRAMETOP = 0
```

```
FRAMELEFT = 0

SM_FUNCTION macro fnum
 mov ax,fnum
 call far ptr DoSMFunction
endm

ROUND_TO_BYTE_BOUNDARY macro r
 sar r,1
 sar r,1
 sar r,1
 sal r,1
 sal r,1
 sal r,1
endm

DIVIDE_BY_8 macro r
 sar r,1
 sar r,1
 sar r,1
endm

TEXTMODEINIT macro
  mov ax,0003h
  int 10h
endm

DEBUGGER macro
    push ax
    push cx
     textmodeinit
    pop cx
    pop ax
    int 3
endm

CLEAR_RECTANGLE macro
CLft,CTop,CWi,CHi,Colr
  mov cx,CLft
  mov dx,CTop
  mov si,CWi
  mov ax,CHi
  mov bh,Colr
  call FillScreenArea
endm


vgainit macro
  mov ax,VGA_MODE
  int 10h
endm

vgaloadlatches macro
  mov dx,03ceh
  mov ax,0205h
  out dx,ax
  mov ax,0003h
  out dx,ax
endm

VGASETXOR macro
  mov dx,03ceh
  mov ax,0205h
  out dx,ax
  mov ax,0003h or (00011000b * 256)
  out dx,ax
endm

vgawritecolor macro colr
  mov ah,al
  mov al,8
  out dx,ax
  mov al,colr
  mov es:[di],al
endm


ENGLISH macro
LANGUAGE=ENGLISH_LANGUAGE
endm

FRENCH macro
LANGUAGE=FRENCH_LANGUAGE
endm

GERMAN macro
LANGUAGE=GERMAN_LANGUAGE
endm

ADJUST_FORM_HEIGHT MACRO NewHeight
CURRENTLOCATION=$
org CURRENTFORM + PixelHeight
   dw Newheight + FRAMETOP
org CURRENTLOCATION
endm


ADJUST_FORM_WIDTH MACRO NewWidth
CURRENTLOCATION=$
org CURRENTFORM + PixelWidth
   dw NewWidth + FRAMELEFT
org CURRENTLOCATION
endm


ADJUST_FRAME_WIDTH macro NewWidth
CURRENTLOCATION=$
org CURRENTFRAME + PixelWidth
   dw NewWidth
org CURRENTLOCATION
endm

ADJUST_TOOLBAR_WIDTH MACRO NewWidth
CURRENTLOCATION=$
org CURRENTTOOLBAR + PixelWidth
   dw NewWidth
org CURRENTLOCATION
endm

MAKE_CAPTION_STRUCTURE macro CaptionText
CAPTION_END_POINTER=$
 dw 0
 db CaptionText
 db 0
 dw THIS_CAPTION_START
 db 254
THIS_CAPTION_END=$
org CAPTION_END_POINTER
dw THIS_CAPTION_END
org THIS_CAPTION_END
LANGUAGE=0
endm

GRAPHIC_CAPTION macro CaptionText
THIS_CAPTION_START=$
 db 128 or GRAPHICFONT
 MAKE_CAPTION_STRUCTURE CaptionText
endm

CAPTION macro CaptionText
THIS_CAPTION_START=$
 db 128 or LANGUAGE or FONT
 MAKE_CAPTION_STRUCTURE CaptionText
endm


TEXTMODE_CAPTION macro tmcstring
THIS_MISC_ITEM_START =$
 db 128 or 16 or 1
MISC_ITEM_END_POINTER=$
 dw 0
 db tmcstring
 db 0
 dw THIS_MISC_ITEM_START
 db 253
THIS_MISC_ITEM_END=$
org MISC_ITEM_END_POINTER
dw THIS_MISC_ITEM_END
org THIS_MISC_ITEM_END
endm

SETTAB macro tabstop
THIS_MISC_ITEM_START =$
 db 128 or 16 or 3
MISC_ITEM_END_POINTER=$
 dw 0
 dw tabstop
 dw 0
 dw THIS_MISC_ITEM_START
 db 252
THIS_MISC_ITEM_END=$
org MISC_ITEM_END_POINTER
dw THIS_MISC_ITEM_END
org THIS_MISC_ITEM_END
endm


SETWIDTHS macro
graphwidth,textwidth,egraphwidth,etextwidth
THIS_MISC_ITEM_START =$
 db 128 or 16 or 3
MISC_ITEM_END_POINTER=$
 dw 0
 dw graphwidth
 dw textwidth
 dw egraphwidth
 dw etextwidth
 dw THIS_MISC_ITEM_START
 db 252
THIS_MISC_ITEM_END=$
org MISC_ITEM_END_POINTER
dw THIS_MISC_ITEM_END
org THIS_MISC_ITEM_END
endm

CONTROL macro
CTyp,CSta,CLft,CTop,CWi,CHi,CLen
 STOREOFF = NEXTSTORAGE
if (CTyp eq CHECKBOX ) or (CTyp eq
OPTIONBUTTON )
  STORESZ = 1
elseif (CTyp ge FIRSTLISTBOXTYPE) and (CTyp le
LASTLISTBOXTYPE)
  STORESZ = 0
  STOREOFF=0
elseif (CTyp ge FIRSTEDITBOXTYPE) and (CTyp le
LASTEDITBOXTYPE)
  STORESZ = CLen + 1
elseif (CTyp ge FIRSTSCROLLBARTYPE) and
(CTyp le
LASTSCROLLBARTYPE)
  STORESZ = 1
else
  STORESZ = 0
endif
 CURRENTCONTROL=$
 tCONTROL
<CTyp,CSta,NEXTCONTROL,CLft,CTop,CWi,CHi,S
TORESZ,STOREOFF,0FFh>
 NEXTCONTROL=0
 FONT=NORMFONT
 LANGUAGE=0

SAMESTATE=CSta
SAMELEN=CLen
 NEXTSTORAGE = NEXTSTORAGE + STORESZ
 TOTALSTORAGE = TOTALSTORAGE +
STORESZ
endm


BEGIN_FORM_DEFINITIONS MACRO
  db 0
endm

END_FORM_DEFINITIONS MACRO
  db 0
endm


BEGIN_TOOLBAR macro CSta,CLft,CTop,CWi,CHi
CURRENTTOOLBAR=$
  CONTROL TOOLBAR,CSta,CLft,CTop,CWi,CHi,0
TBBOTTOM=Ctop+CHi
TBLEFT=CLft
TBWIDE=CWi
endm

BEGIN_TOOLBARBUTTON macro
CSta,CLft,CTop,CWi,CHi
  CONTROL
TOOLBARBUTTON,CSta,CLft,CTop+TITLEBARHEI
GHT,CWi,CHi,0
  TBBNEXTLEFT=CLft+CWi
  TBBSAMETOP=CTop
  TBBSAMEHIGH=CHi
  TBBSAMEWIDE=CWi
endm

BEGIN_FORM macro
  CURRENTFORM=$
  CONTROL FORM,0,0,0,6*104,0,0
endm

BEGIN_GROUPBOX macro
CSta,CLft,CTop,CWi,CHi
  CONTROL
GROUPBOX,CSta,CLft,CTop,CWi,CHi,0
endm


BEGIN_FRAME macro CSta,CLft,CTop,CWi,Chi
  FRAMETOP=CTop
  FRAMELEFT=CLft
  CURRENTFRAME=$
  CONTROL FRAME,CSta,CLft,CTop,CWi,CHi,0
endm

END_FORM macro
  CONTROL ENDFORM,0,0,0,0,0,0
endm

END_TOOLBARBUTTON macro
  CONTROL ENDTOOLBARBUTTON,0,0,0,0,0,0
endm

END_GROUPBOX macro
  CONTROL ENDOFOBJECT,0,0,0,0,0,0
endm

END_FRAME macro
  FRAMETOP=0
  FRAMELEFT=0
  CONTROL ENDFRAME,0,0,0,0,0,0
endm

END_TOOLBAR macro
  CONTROL ENDTOOLBAR ,0,0,0,0,0,0
endm

MAKE_UNFRAMED_EDITBOX macro
CSta,CLft,CTop,CWi,CHi,CLen
  CONTROL
UNFRAMEDEDITBOX,CSta,CLft,CTop,CWi,CHi,CLe
n
endm

MAKE_PW_EDITBOX macro
CSta,CLft,CTop,CWi,CHi,CLen
  CONTROL
PWEDITBOX,CSta,CLft,CTop,CWi,CHi,CLen
endm

MAKE_KEY_EDITBOX macro
CSta,CLft,CTop,CWi,Chi
  CONTROL
KEYEDITBOX,CSta,CLft,CTop,CWi,CHi,800


endm

MAKE_NUM_EDITBOX macro
CSta,CLft,CTop,CWi,CHi,CLen
  CONTROL
NUMEDITBOX,CSta,CLft,CTop,CWi,CHi,CLen
endm

MAKE_EDITBOX macro
CSta,CLft,CTop,CWi,CHi,CLen
  CONTROL
EDITBOX,CSta,CLft,CTop,CWi,CHi,CLen
endm

MAKE_COMMANDBUTTON macro
CSta,CLft,CTop,CWi,CHi
  CONTROL
COMMANDBUTTON,CSta,CLft,CTop,CWi,CHi,0
endm

MAKE_SYMBOLBUTTON macro
CSta,CLft,CTop,CWi,CHi
  CONTROL
SYMBOLBUTTON,CSta,CLft,CTop,CWi,CHi,0
endm

MAKE_SPINUPBUTTON macro
CSta,CLft,CTop,CWi,CHi
  CONTROL
SPINUPBUTTON,CSta,CLft,CTop,CWi,CHi,0
endm

MAKE_SPINDOWNBUTTON macro
CSta,CLft,CTop,CWi,CHi
  CONTROL
SPINDOWNBUTTON,CSta,CLft,CTop,CWi,CHi,0
endm

MAKE_ABOUTBUTTON macro
CSta,CLft,CTop,CWi,CHi
  CONTROL
ABOUTBUTTON,CSta,CLft,CTop,CWi,CHi,0
endm

make_closebutton macro CSta,CLft,CTop,CWi,CHi
  control
CLOSEBUTTON,CSta,CLft,CTop,CWi,CHi,0
endm

MAKE_KEYBUTTON macro
CSta,CLft,CTop,CWi,CHi
  CURRENTKEY=$
  CONTROL
KEYBUTTON,CSta,CLft,CTop,CWi,CHI,0
endm

MAKE_LSHIFTKEYBUTTON macro
CSta,CLft,CTop,CWi,CHi
  CURRENTKEY=$
  CONTROL
LSHIFTKEYBUTTON,CSta,CLft,CTop,CWi,CHi,0
endm

MAKE_RSHIFTKEYBUTTON macro
CSta,CLft,CTop,CWi,CHi
  CURRENTKEY=$
  CONTROL
RSHIFTKEYBUTTON,CSta,CLft,CTop,CWi,CHi,0
endm

MAKE_CTRLKEYBUTTON macro
CSta,CLft,CTop,CWi,CHi
  CURRENTKEY=$
  CONTROL
CTRLKEYBUTTON,CSta,CLft,CTop,CWi,CHi,0
endm
```

```
MAKE_ALTKEYBUTTON macro
CSta,CLft,CTop,CWi,CHi
  CURRENTKEY=$
  CONTROL
ALTKEYBUTTON,CSta,CLft,CTop,CWi,CHi,0
endm

MAKE_CAPSLOCKBUTTON macro
CSta,CLft,CTop,CWi,CHi
  CURRENTKEY=$
  CONTROL
CAPSLOCKBUTTON,CSta,CLft,CTop,CWi,CHi,0
endm

MAKE_NUMLOCKBUTTON macro
CSta,CLft,CTop,CWi,CHi
  CURRENTKEY=$
  CONTROL
NUMLOCKBUTTON,CSta,CLft,CTop,CWi,CHi,0
endm

MAKE_SCROLLLOCKBUTTON macro
CSta,CLft,CTop,CWi,CHi
  CURRENTKEY=$
  CONTROL
SCROLLLOCKBUTTON,CSta,CLft,CTop,CWi,CHi,0
endm

MAKE_CHECKBOX macro CSta,CLft,CTop
  CONTROL CHECKBOX,CSta,CLft,CTop,16,16,0
endm

MAKE_OPTIONBUTTON macro CSta,CLft,CTop
  CONTROL
OPTIONBUTTON,CSta,CLft,CTop,16,16,0
endm

MAKE_LEFTLEGEND macro CSta,CLft,CTop
  CONTROL LEFTLEGEND,CSta,CLft,CTop,0,0,0
endm


MAKE_CHISELBOX macro CSta,CLft,CTop,CWi,Chi
  CONTROL
CHISELBOX,CSta,CLft,CTop,CWi,Chi,0
endm


MAKE_SUNKENFRAME macro
CSta,CLft,CTop,CWi,Chi
  CONTROL
SUNKENFRAME,CSta,CLft,CTop,CWi,Chi,0
endm

MAKE_CENTEREDLEGEND macro
CSta,Clft,CTop,Cwi,Chi
  CONTROL
CENTEREDLEGEND,CSta,CLft,CTop,CWi,Chi,0
endm

MAKE_ICON macro CSta,Clft,CTop
  CONTROL ICON,CSta,CLft,CTop,16,16,0
endm

MAKE_LISTBOX_NOSCROLL macro
CSta,CLft,CTop,CWi,CHi,CLen
 CONTROL
LISTBOXNOSCROLL,CSta,CLft,CTop,CWi,CHi,0
endm

MAKE_LISTBOX macro
CSta,CLft,CTop,CWi,CHi,CLen
 CONTROL LISTBOX,CSta,CLft,CTop,CWi,CHi,0
endm

MAKE_SPINBUTTON macro
CSta,CLft,CTop,CWi,CHi,CLen
 CONTROL
SPINBUTTON,CSta,CLft,CTop,CWi,CHi,0
endm

MAKE_SPECTRUMBAR macro
CSta,CLft,CTop,CWi,CHi,CLen
 CONTROL
SPECTRUMBAR,CSta,CLft,CTop,CWi,CHi,0
endm

MAKE_SLIDEBAR macro
CSta,CLft,CTop,CWi,CHi,CLen
 CONTROL SLIDEBAR,CSta,CLft,CTop,CWi,CHi,0
endm

MAKE_LINEBOX macro CSta,CLft,CTop,CWi,CHi
 CONTROL LINEBOX,CSta,CLft,CTop,CWi,CHi,0
endm

DEFINE_KEY macro
ScnCode,NormVal,ShftVal,CtrlVal,AltVal
 THIS_MISC_ITEM_START =$
 org CURRENTKEY + ID
 dw ScnCode
 org CURRENTKEY + wDATALENGTH
 dw Normval+ShftVal*256
 org CURRENTKEY + pStorageOffset
 dw CtrlVal+AltVal*256
 org THIS_MISC_ITEM_START
endm

DEFINE_ICON macro icoaddr
 THIS_MISC_ITEM_START = $
 org CURRENTCONTROL + ID
 dw icoaddr
 org THIS_MISC_ITEM_START
endm
```

Copr. 1995 Zenith Data Systems Corp.

```
tControl struc
ControlType   db ?
ControlState  db ?
ID            dw ?
LeftPixel     dw ?
TopPixel      dw ?
PixelWidth    dw ?
PixelHeight   dw ?
wDataLength   dw ?
pStorageOffset dw ?
ControlEOC    db ?
ends

wTopVisible equ pStorageOffset

pFirstRegionRecord equ wDataLength

tRegion struc
pCurrentControl dw ?
wCurrentTop     dw ?
wCurrentBottom  dw ?
wCurrentLeft    dw ?
wCurrentRight   dw ?
wCurrentHeight  dw ?
wCurrentWidth   dw ?
wListHandle     dw ?
wListItemIndex  dw ?
bListItemFlags  db ?
ends
tLISTBOXENTRY struc
lpszEntry dd 0
cAttribute db 0
ends

tMSGBOXBUFF struc
pTextOff dw 0
pTextSeg dw 0
cAlignment db 0
ends
tBUFFHEADER struc
iStructLen dw 0
iBuffLen   dw 0
pBuffOff   dd 0
ends

tHOSTLIST struc
lpsNodeAddress dd 0
lpszGroupName  dd 0
lpszHostName   dd 0
iHostVersion   dw 0
lpsSerial      dd 0
lpsReserved    dd 0
ends

tSCANCODES struc
iScanCode  dw 0
ends
```

```
Copr. 1995 Zenith Data Systems Corp.


#define N_DIG (16)
#define BCD_BYTES (2+(N_DIG/2))
#define BCD_TOP (1+(N_DIG/2))
#define BCD_WORDS (1+(N_DIG/4))
#define BCD_BIAS (0x4000)

typedef word bcd[BCD_WORDS];
extern char _bcd_buf[];

#define bi(bs,q1,q2,q3,q4,xp) \
{(xp+BCD_BIAS-1)+((1 bs
(-1))<<14),0x##q4,0x##q3,0x##q2,0x##q1}

#define bi0 {0,0,0,0,0}
#define bi1 bi(+,1000,0,0,0,1)

#define bcdv(vn,bs,q1,q2,q3,q4,xp) \
bcd vn={(xp+BCD_BIAS-1)+((1 bs
(-1))<<14),0x##q4,0x##q3,0x##q2,0x##q1}

#define bcd2dec(x,s,integer,frac)
bcd2d(x,s,((integer)<<8)|(frac))

#define bc_abs(x) *(((byte*)(x))+1)&=0x7f
#define bc_chs(x) *(((byte*)(x))+1)^=0x80
#define bc_mabs(x) *(((byte*)(x))+1)|=0x80
#define bc_sgn(x)   (char)((*(int*)(x)<0)?'-':'+')
#define bc_isneg(x) (*(int*)(x)<0)
#define bc_ispos(x) (*(int*)(x)>0)
#define bc_is0(x) (!(*((char*)(x)+BCD_TOP)))
#define bc_not0(x) (*((char*)(x)+BCD_TOP))
#define bc_clr(x)
*(word*)(x)=*((word*)(x)+BCD_WORDS-1)=0
#define bc_m10(x) (*(word*)(x))++
#define bc_d10(x) (*(word*)(x))--
#define bc_m100(x) (*(word*)(x))+=2
#define bc_d100(x) (*(word*)(x))-=2
#define bc_mp(x,n) *(word*)(x)+=(n)
#define bc_dp(x,n) *(word*)(x)-=(n)
#define bc_nid(x)
((int)((*(int*)(x)&0x7fff)-BCD_BIAS+1))
#define bc_nfd(x)
((int)(-(*(int*)(x)&0x7fff)+BCD_BIAS-1+N_DIG))
#define bc_msd(x)
(char)((*((byte*)(x)+BCD_TOP)>>4))
#define bc_lsd(x) (char)((*((byte*)(x)+2)&0xf))



void bequ(bcd x,bcd y);
void badd(bcd x,bcd y, bcd z);
void bsub(bcd x,bcd y, bcd z);
void bmul(bcd x,bcd y, bcd z);
void bdiv(bcd x,bcd y, bcd z);
void bsqrt(bcd x, bcd y);
void bhalf(bcd x,bcd y);
int bcmp(bcd x, bcd y);
void bround(bcd x, int n);
void btrunc(bcd x, bcd y);
void bfrac(bcd x, bcd y);

char *bcd2e(bcd x, char *s, int nd);
char *bcd2d(bcd x, char *s, word fmt);
int bcd2asc(bcd x, int nd);
long bcd2l(bcd x);
char *asc2bcd(char *s, bcd x);
void i2bcd(int n, bcd x);
void w2bcd(word w, bcd x);
void l2bcd(long nn, bcd x);
void ul2bcd(dword ww, bcd x);
Copr. 1995 Zenith Data Systems Corp.

#define HM_BACKSP   0x0008
#define HM_ENTER    0x000D
#define HM_INVALID_KEY  0x00FE
#define HM_WIN_DONE_PW  0x00E0
#define HM_WIN_GET_STA  0x00E1
#define HM_WIN_GET_HOST 0x00E2
#define HM_OSKOCC_DEFINE_ACK_TO_HM
0x00E3
#define HM_OSKOCC_CLOSE_ACK_TO_HM
0x00E4
#define HM_OSKOCC_CLOSE_UNI_TO_HM
0x00E5

#define WM_POST_MSG     (0x0400 + 0x1000)
#define WM_WIN_KEY      (WM_USER + 0x1002)

#define WM_OSKOCC_DEFINE_ACK  (WM_USER
+ 0x1003)
#define WM_OSKOCC_CLOSE_ACK   (WM_USER
+ 0x1004)
#define WM_OSKOCC_CLOSE_UNI   (WM_USER
+ 0x1005)

#define WM_ENABLE_CLOSE (WM_USER +
0x1010)

void  FAR PASCAL SetHook(HWND);
void  FAR PASCAL RemoveHook(void);
void  FAR PASCAL SwitchFilter(int);
LRESULT CALLBACK CheckKeys (int nCode,
WORD wParam, LONG lParam);


void  FAR PASCAL UnloadOSKOCCACK(void);

Copr. 1995 Zenith Data Systems Corp.


#define HSE_VERI_BAD_PARM1  1
#define HSE_VERI_BAD_PARM2  2
#define HSE_VERI_BAD_PARM3  3
#define HSE_VERI_BAD_PARM4  4
#define HSE_VERI_BAD_PARM5  5
#define HSE_VERI_BAD_PARM6  6
#define HSE_CORRECT_SERIAL_NUMBER 0

#define HSE_CRC_RAND_LEN  9
#define HSE_SERIAL_LEN     10
Copr. 1995 Zenith Data Systems Corp.




#define SL_FT_E802_2  10
#define SL_FT_E802_3  11
#define SL_FT_EII     12
#define SL_FT_ESNAP   13


#define SL_FT_LEN_NVRAM 1
#define SL_FIELDOFFSET(struct, field)  ((int)(
(&((struct)->field)) - ((char NEAR*)(struct)) ))


#define SL_LSL_CMD_E802_2
"/C=ETH8022.CFG\r"
#define SL_LSL_CMD_E802_3
"/C=ETH8023.CFG\r"
#define SL_LSL_CMD_EII     "/C=ETHII.CFG\r"
#define SL_LSL_CMD_ESNAP
"/C=ETHSNAP.CFG\r"


#define SL_LSL_CMD_LENGTH    16
Copr. 1995 Zenith Data Systems Corp


typedef struct CALLVXDPARASTRUC
{
 int  iCallID;
 int  iIconOrFuncID;
 int  iInt2FAPI;
};

typedef struct Win386_Startup_Info_Struc
{
 unsigned char  SIS_Version_Major;
 unsigned char  SIS_Version_Miner;
 unsigned long  SIS_Next_Dev_Ptr;
 unsigned long  SIS_Virt_Dev_File_Ptr,
 unsigned long  SIS_Reference_Data,
 unsigned long  SIS_Instance_Data_Ptr;
};

typedef struct HostSysStatus
{
 char  cVideoMode;
 char  cUserName[11];
 char  cConnStatus;
 char  cProtocolID;
};

#define HM_FLASH_FNSIZE 14
#define HM_FLASH_FNUM   32
#define HM_FILEBUFF_LEN 2048
#define HM_FLASH_NAME_LEN 40

typedef struct FILESET
{
 unsigned int iCheckSum[HM_FLASH_FNUM];
 int  iErrorCode,
 char  cFlashName[HM_FLASH_NAME_LEN];
 int  iFlashNameLen;
 int  iTotalProtectFiles;
 unsigned char cFileAttr[HM_FLASH_FNUM];
 int  iProtectFileNum[HM_FLASH_FNUM];
 int  iTotalPieces;
 int  iTotalFiles;
 int  iFileLen[HM_FLASH_FNUM];
 int  iFileNameLen[HM_FLASH_FNUM];
 char
cFileName[HM_FLASH_FNUM][HM_FLASH_FNSIZ
E];
};

#define HM_ERR_LOG_MAX 10
typedef struct ERRORLOG
{
 char  cErrorCode[5];
 char  iLineNumber[5];
 char  cModuleName[8];
 char  cMisce[10];
 char  cMinute;
 char  cHour;
 char  cDay;
 char  cMonth;
};

#define HM_BRCAST_RESP 20
#define HM_SERAIL_NUM_DEFA  1

#define HM_VERSION 100

#define HM_PATH_LEN 66



#define FALSE     0
#define TRUE      1
#define HM_OFF    0
#define ON        1
#define NULL      0

#define HM_DOS_MODE   0
#define HM_WINDOWS_MODE  1

#define HM_PM_DOSWIN    0
#define HM_PM_DOSWIN_ACK 1
#define HM_PM_FILEREQ   10
#define HM_PM_TOTALFILES 12
#define HM_PM_PATHREQ   13
#define HM_PM_PATHREP   14
#define HM_PM_FLASHOK   15
#define HM_PM_FLASH_NAMQ 20
#define HM_PM_FLASH_NAMP 21
#define HM_PM_FLASH_BREAK 22
#define HM_PM_HOSTCON   30
#define HM_PM_BLANKSCR  40
#define HM_PM_UNBLANKSCR 41
#define HM_PM_LOCKKBMO  42
#define HM_PM_UNLOCKKBMO 43
#define HM_PM_BLANKSCR_ACK   46
#define HM_PM_UNBLANKSCR_ACK  47
#define HM_PM_LOCKKBMO_ACK   48
#define HM_PM_UNLOCKKBMO_ACK  49
#define HM_PM_ERRORIN   50
#define HM_PM_ERRORREQ  51
#define HM_PM_OSK_DEFINE     60
#define HM_PM_OSK_DEFINE_ACK  61
#define HM_PM_OSK_CLOSE      62
#define HM_PM_OSK_CLOSE_ACK   63
#define HM_PM_OSK_CLOSE_UNI   64
#define HM_PM_OSK_CLOSE_UNI_ACK  65

#define HM_PASSWORD_LEN 20+1

#define HM_PM_LEN_ONE  84
#define HM_PM_LEN  159
#define HM_BC_LEN  35

#define HM_PM_FLASH_UNIT   5

#define HMUI_UNLOAD_HCS    0x01
#define HMUI_DISCONNECT    0x10
#define HMUI_WAIT_CALL_ENT 0x20
#define HMUI_GRP_HOST_NAME 0x30
#define HMUI_GET_STATUS    0x40
#define HMUI_PW_PROTECT     0x41
#define HMUI_INST_STATUS   0x42
#define HMUI_GET_ERRORMESS 0x50
#define HMUI_SET_SECU_ID   0x60
#define HMUI_GET_SECU_ID   0x61
#define HMUI_GET_SESSION   0x70

#define HM_EXIST_SI      0xf9e7
#define HM_EXIST_DI      0x3c5d
#define HM_EXIST_CX       0x3131

#define HM_GET_CUR_SS   30

#define HM_HMWIN_OSK           0x00A1
#define HM_HMWIN_OSKOCC_UNI_ACK  0x00A2

#define STK_SZ 5120

#define GetStack(p)  ((void far*)(*((long
*)&(p->saved_sp))))

#define _FP_SEG(fp) (*((unsigned __far *)&(fp)+1))

#define _FP_OFF(fp) (*((unsigned __far *)&(fp)))

#define HM_CONNECT     3
#define HM_DISCONNECT   0
#define HM_WAITING      1

#define HM_PHN_REC_LEN   297
#define HM_PHN_NAME_OFF  2
#define HM_PHN_NAME_LEN  10
#define HM_PHN_PW_OFF    92
#define HM_PHN_PW_END    113

#define DWORD long
#define WORD  unsigned short
#if defined( LOWORD )
 #undef LOWORD
#endif
#define LOWORD(l)         ((WORD)(DWORD)(l))

#if defined( HIWORD )
 #undef HIWORD
#endif

#define HIWORD(l)         ((WORD)((((DWORD)(l))
>> 16) &
0xFFFF))

#define HM_VHMCD_ID    0x33DB

#define HM_VHMCD_GV    0
#define HM_VHMCD_MSG   1

#define HM_WIN_DONE_PW   0xe0
#define HM_WIN_GET_STA   0x00e1
#define HM_WIN_GET_HOST  0x00e2
#define HM_OSKOCC_DEFINE_ACK_TO_HM
0x00E3
#define HM_OSKOCC_CLOSE_ACK_TO_HM
0x00E4
#define HM_OSKOCC_CLOSE_UNI_TO_HM
0x00E5
#define HM_VXD_GET_PROC  0xf0

#define HM_TEMP_FILE_NAME_LEN 5
#define HM_SARA_FLASH_BUFF  64
#define HM_FLASH_BUFF     1024
#define HM_DEFAULT_ICON   0x0010
#define HM_CONN_ICON      0x0020
#define HM_DISCONN_ICON   0x0030
#define HM_FLASH_ICON     0x0040
#define HM_FLASH_ICON_END 0x0041
#define HM_WAIT_ICON      0x0050
#define HM_HOST_CNT_ICON  0x0060

#define HM_SWITCH_OFF     0x0100

#define HM_ERROR_LOG_FILE "ERROR.LOG"
#define HM_PHONEBOOK_FILE "SESSION.PHN"
#define HM_SIG_STRING     "host_manager"
#define HM_HOSTCS_SIG     "CO/S-HOST"
#define HM_HOSTDAT_HMAPI  "HMAPI"
#define HM_HOSTDAT_CONFIG "configuration"
#define HM_HOSTDAT_GRP    "GROUPNAME"
#define HM_HOSTDAT_HOST   "HOSTNAME"
#define HM_HOSTDAT_VER    "VERSION"
#define HM_HOSTDAT_SERIAL "SERIALNUMBER"
#define HM_HOSTDAT_LEFT   "["
#define HM_HOSTDAT_RIGHT  "]"
#define HM_SESSION_CFG_FN "SESSION.CFG"

#define HM_HCS_API      0x65
#define HM_HCS_SCRON     0xDE00
#define HM_HCS_SCROFF    0xDE01
#define HM_HCS_KBON      0xDE02
#define HM_HCS_KBOFF     0xDE03
#define HM_HCS_SENDPRI  0xDD00
#define HM_HCS_SYSPTR    0xDF00
#define HM_HCS_BROAD     0xE000
#define HM_HCS_UNLOAD    0xE300
#define HM_HCS_DISC      0xE200
#define HM_HCS_WAIT      0xE100
#define HM_HCS_SESSION  0xE400

#define HM_VER_STR      "Version 1.1"

#define ZR          0
#define HM_FILE_NOT_FOUND  2

#define HM_FLASH_READ_HDAT -10
#define HM_FLASH_POS_HDAT    -11
#define HM_FLASH_NOT_SOURCE  -21
#define HM_FLASH_OPEN_SOURCE  -22
#define HM_FLASH_CLOSE_SOURCE -23
#define HM_FLASH_READ_SOURCE  -24
#define HM_FLASH_POS_SOURCE   -25
#define HM_FLASH_CREATE_TEMP  -30
#define HM_FLASH_WRITE_TEMP   -31
#define HM_FLASH_CLOSE_TEMP   -32
#define HM_FLASH_NO_FILES     -40
```

```
#define HM_FLASH_NO_CHECKSUM -50
#define HM_FLASH_BAD_CHECKSUM -51

#define HM_STUFF_ENTER      0x000D

#define HM_DOS_BUSY_TRY_TICKS   4

#define HM_INT_2F_START       0x1605
#define HM_INT_2F_TERMI       0x1606
#define HM_INT2F_ENTRY_API      0x1684

#define HM_DOS_WIN_TRIES       5*9+2
#define HM_UNI_CLOSE_TRIES      5*9+2
#define HM_TICKS_PER_TRY       9
#define HM_TICKS_PER_SECOND     18
#define HM_TICKS_TWO_SECOND     36
#define HM_WIN_STATUS_CHG_TRY   3

typedef struct sTrapRec69t
{
  struct trap_rec sTrapRec69;
  char a[5];
  char b[35];
} ;

Copr. 1995 Zenith Data Systems Corp.


#define MOVE_DATA 1
#define MOVE_CODE 2
#define MOVE_BOTH 3

extern   int lim_error;
extern   int _prog_handle,
int  move_to_lim(int MinPages,int MaxPages,int
Method),
void _m2l_no_wait(void);
void _adjust_tmr(void).
extern   word _lim_top.

typedef   struct lim_ctl {
    int sys_handle:
    int page_cnt;
    int tot_pages:
    char active[2],
    word reserved1,
    word hi_code,
    word reserved2;
    word hi_data;
} LIM_CTL;

extern _lim_ctl();
#define   TSR_LIM_CTL()  *(word
far*)MK_FP(parent_code,(word)_lim_ctl)

int  lim_present(void);
int  lim_status(void);
word lim_window(void);
int  lim_nfree(void),
int  lim_alloc(int NoPages),
void lim_dealloc(int Handle):
void lim_map(int Handle,int Page,int Position);
int  lim_version(void):
void lim_save_map(int Handle);
void lim_restore_map(int Handle);
int  lim_tot_pages(void)
int  lim_handles(void);
int  lim_h_pages(int Handle):
int  lim_h_counts(int *ResultOfs,word ResultSeg);
void lim_get_map(void *Ofs,word Seg)
void lim_set_map(void *Ofs,word Seg);
void lim_swap_map(void *NewOfs,word
NewSeg,void *OldOfs.word
OldSeg),
int  lim_map_size(void);

word ffread(int Handle,void far *Buf,word Cnt);
word ffwrite(int Handle,void far *Buf,word Cnt);
char far *fmem_find(int PatLen,void far *Pat,int
ArrLen,void far
*Arr);
word fstr_len(void far *Str);
word fstr_cp(void far *Src,void far *Dest);
word fstr_pos(char c,void far *s);
word fmem_cmp(void far *s1,void far *s2,word cnt);
char far *fmem_swap(void far *s1,void far *s2,word
cnt);
void get_fblk(int x_size, int y_size, word far *buf);
void put_fblk(int x_size, int y_size, word far *buf);
void swap_fblk(int x_size, int y_size, word far *buf);



typedef struct pctl_rec {
    char *Buf:
    word BufSize,
    word BufHigh.
    word BufCnt;
    char Flags.
    char ExCode,
    char FullWr,FullSta;
} PCTL_REC:

#define PF_ON    1
#define PF_PRINT  2
#define PF_DIRTY  0x40
#define PF_OVF   0x80

#define PXC_RDY       0x80
#define PXC_PAPER  0x20
#define PXC_SEL       0x10
#define PXC_ERR    0x08
#define PXC_TMO       0x01

install_ptrap(fp service,word stack_size,byte
lock_mask,PCTL_REC
*p);
extern PCTL_REC *_pctl;
extern word _printer_mask;
Copr. 1995 Zenith Data Systems Corp.


#define   CLASS_MAGIC     0x4B4E
#define   MENU_MAGIC      0x554D

#define   ERR_SUCCESS     0
#define   ERR_INTERNAL    -1

#define   OSK_NOTCLOSING   0
#define   OSK_UNICLOSING   1
#define   OSK_MOVEALLOWED  0
#define   OSK_NOMOVEALLOWED 1



typedef struct
{
 HANDLE   hcNext,
 WORD     wSig;
 ATOM     atomCls;
 HANDLE   hDCE,
 WORD     cClsWnds:
 WNDCLASS wc;
 WORD     eExtra[1];
} CLASS, NEAR * HCLASS;


typedef struct
{
 HWND     hwndNext;
 HWND     hwndChild;
 HCLASS   hClass,
 HANDLE   hProp;
 HWND     hwndLastActive;
 HANDLE   hScroll:
 HANDLE   hmemTaskQ;
 HRGN     hrgnUpdate;
 HANDLE   hDCE;
 HMENU    hmenuSystem;
 HWND     hwndOwner;
 RECT     rectWindow;
 RECT     rectClient;
 HPALETTE hPalette;
 WORD     wFlags.
 DWORD    rgfExStyle.
 DWORD    rgfStyle;
 WORD     wID_Menu;
 HANDLE   hText;
 HWND     hwndParent,
 HANDLE   hInstance;
 FARPROC  lpfnWndProc;
} WND_3_0 .



typedef struct
{
 HWND     hwndNext;
 HWND     hwndChild;
 HWND     hwndParent;
 HWND     hwndOwner;
 RECT     rectWindow;
 RECT     rectClient;
 HANDLE   hmemTaskQ;
 HRGN     hrgnUpdate;
 HCLASS   hClass;
 HANDLE   hInstance;
 FARPROC  lpfnWndProc;
 DWORD    dwFlags;
 DWORD    rgfStyle:
 DWORD    rgfExStyle;
 WORD     wID_Menu;
 HWND     hText;
 HANDLE   hScroll;
 HANDLE   hProp;
 HWND     hwndLastActive;
 HMENU    hmenuSystem;
} WND_3_1  ;


typedef struct
{
 WORD    wFlags:
 WORD    hIDorPopup;
 RECT    rectCapture;
 WORD    xTab;
 HANDLE  hCheckedBmp:
 HANDLE  hUncheckedBmp;
 HANDLE  hStrOrBmp;
 WORD    xULStart:
 WORD    cxULLen;
 WORD    cbItemLen:
} MENUITEM, FAR *LPMENUITEM;

typedef struct
{
 WORD  wFlags;
 WORD  iCurrSel;
 WORD  iCurrPopup:
 WORD  cbMenu;
 WORD  cxWidth,
 WORD  cyHeight,
 WORD  cItems,
 HWND  hwndOwner:
 MENUITEM *aItems;
} MENU_3_0  ,

typedef struct
{
 HMENU   hmenuNext;
 WORD    wFlags;
 WORD    wMagic;
 HANDLE  hTaskQ;
 WORD    cxWidth;
 WORD    cyHeight;
 WORD    cItems:
 HWND    hwndOwner;
 HANDLE  hItems;
 WORD    w12;
} MENU_3_1  :

typedef void FAR *LPMENU;

typedef struct
{
 ATOM    atomID:
 HANDLE  hData;
 WORD    wFlags.
} PROPERTY;
typedef struct
{
 WORD cProps,
} PROPLIST;



typedef struct
{
 HANDLE  hdceNext:
 HWND    hwnd,
 HDC     hDC;
 BYTE    byFlags:
 BYTE    byInUse;
 BYTE    byDirty:
 BYTE    by0A;
 WORD    xOrigin,
 WORD    yOrigin.
 HWND    hwndTop;
 HRGN    hVisRgn;
} DCE, *HDCE,

typedef struct tagCALLWNDPROCPARMS
{
 LONG lParam;
 WORD wParam;
 WORD message;
 HWND hwnd;
} CALLWNDPROCPARMS, FAR
*LPCALLWNDPROCPARMS;

typedef enum tagHMMCODES
{
 HMM_OSKOCCDEFINECOMPLETE = WM_USER
+ 0x5000,
 HMM_OSKOCCCLOSECOMPLETE,
 HMM_OSKOCCUNICLOSECOMPLETE,
} HMMCODES;

int  CALLBACK              LibMain( HINSTANCE
hInstance,
WORD wDataSeg, WORD cbHeapSize,
                              LPSTR
lpszCmdLine):
int  CALLBACK  __export __loadds WEP( int
nExitType ):
long WINAPI   __export __loadds OccWndProc(
HWND hWnd, UINT
message, WPARAM wParam, LPARAM lParam );

HINSTANCE GetLibInst( void );
BYTE      IsMoveActive( void ),
BOOL      InitLibrary( HINSTANCE hInstance );
HWND       GetNoPaintWindow( void );
int       MoveOcclusion( LPRECT lprcCheckPos,
LPRECT lprcNewDimen
);
int       CreateOcclusion( LPRECT lprcCheckPos,
LPRECT
lprcNewDimen );
int       UNICloseOcclusion( void );
int       CheckWindowPos( LPRECT lprcPopupPos );
int       CheckOSKWindowPos( LPRECT
lprcNewNoPaintPos );

LPRECT GetMenuPos( HMENU hPopupMenu );
int   LocateMenuHeap( void );
BOOL  ContainsLocalHeap( WORD wSeg );
BOOL  IsMenuHeap( WORD wSel );
int   FindAddress( WORD wSel, HANDLE hHandle,
WORD FAR *pOfs,
WORD FAR *pSize );

BOOL IsMsgHookInstalled( void );
int  InstallMsgHook( void ):
int  UninstallMsgHook( void );
LRESULT CALLBACK __export __loadds
OSKGetMsgProc( int iCode,
WPARAM wParam, LPARAM lParam );

int WINAPI __export __loadds DefineOcclusion( int
xPos, int yPos,
int xWidth, int yHeight );
int WINAPI __export __loadds CloseOcclusion( void
);
int WINAPI __export __loadds RegisterOSKOcc(
HWND hWndHM );


Copr. 1995 Zenith Data Systems Corp.
#ifndef __RPARM_H__

   #define __RPARM_H__

#define MAXLEN_ENTRY_NAME         10
#define MAXLEN_DIALOUT_LOGINID     10
#define MAXLEN_DIALOUT_PASSWORD    20
#define MAXLEN_TELEPHONE_NUMBER    35
#define MAXLEN_DIALIN_LOGINID      10
#define MAXLEN_DIALIN_PASSWORD     20
#define MAXLEN_REMOTE_DESCRIPTION  27
#define MAXLEN_DIRECTORY          55
#define MAXLEN_SERVICE            22
#define MAXLEN_NETBIOS_IP_ADDRESS  20
#define MAXLEN_TCP_IP_ADDRESS      12
#define MAXLEN_NETBIOS_CALL_NAME   16
#define MAXLEN_RPARM_SPARE         18

#define OPTIONS_DIALBACK          (1<<0)
#define OPTIONS_FILEACCESS_ALL     (0x00)
#define OPTIONS_FILEACCESS_SENDONLY
(0x01)
#define OPTIONS_FILEACCESS_RCVONLY
(0x10)
#define OPTIONS_FILEACCESS_NONE    (0x11)
#define OPTIONS_PHONEBOOK_ENCRYPT
(1<<3)

#define PORT_COM0              0
#define PORT_COM1              1
#define PORT_COM2              2
#define PORT_SPECIAL            3

#define BAUDRATE_300            0
#define BAUDRATE_1200           1
#define BAUDRATE_2400           2
#define BAUDRATE_4800           3
#define BAUDRATE_7200           4
#define BAUDRATE_9600           5
#define BAUDRATE_14400          6
#define BAUDRATE_19200          7
#define BAUDRATE_38400          8
#define BAUDRATE_57600          9
#define BAUDRATE_115200          10

#define TERMTYPE_REMOTE          0
#define TERMTYPE_TTY           1
#define TERMTYPE_VT100          2
#define TERMTYPE_VT102          3

#define DIAL_TONE          0
#define DIAL_PULSE          1

#define PROTOCOL_SPX          0
#define PROTOCOL_ASYNCH         7

#define INT14_COACS            0
```

```
#define INT14_EBIOS 1
#define INT14_CROSS 2
#define INT14_MID 3
#define INT14_BANYAN 4
#define INT14_CONTECH 5
#define INT14_PROTO 6

#define NETBIOS_ADAPTER_1 0
#define NETBIOS_ADAPTER_2 1

struct rparm
{
  char rprecno,
  char rpoption;

  char rpid[MAXLEN_ENTRY_NAME + 1];

  char rpdoid[MAXLEN_DIALOUT_LOGINID + 1];

  char rpdopw[MAXLEN_DIALOUT_PASSWORD +
1);

  char rptelno[MAXLEN_TELEPHONE_NUMBER +
1];

  char rpdiid[MAXLEN_DIALIN_LOGINID + 1];

  char rpdipw[MAXLEN_DIALIN_PASSWORD + 1];

  char rpdesc[MAXLEN_REMOTE_DESCRIPTION +
1];

  char rppnum:

  char rpptyp:

  char rpbrate;

  char rptermtyp;

  char rpdtyp;

  char rpprotocol:

  char rpdirac[MAXLEN_DIRECTORY + 1];

  char rpserv[MAXLEN_SERVICE + 1];

  char rpinternet[MAXLEN_NETBIOS_IP_ADDRESS
+ 1].

  char rptype:

  char rptcpnet[MAXLEN_TCP_IP_ADDRESS + 1];

  char
rpnetcname[MAXLEN_NETBIOS_CALL_NAME + 1];

  char rpnetadapt;

  char rpspare[MAXLEN_RPARM_SPARE];
};

typedef struct rparm RPARM;

#endif
Copr. 1995 Zenith Data Systems Corp.

#define MAXLEN_DEFAULT_PATH 20
#define MAXLEN_FASTACCESS_REMOTEID 10
#define MAXLEN_DIRECTORY 55
#define MAXLEN_CALLID 10
#define MAXLEN_NETBIOS_NAME 16
#define MAXLEN_SPARE 21

#define MISC_USE_SOUND (1<<0)
#define MISC_CON_DRIVER (1<<1)
#define MISC_CLOCK_DISPLAY (1<<2)
#define MISC_SCREEN_SIZE (1<<3)
#define MISC_FAST_GRAPHICS (1<<4)
#define MISC_FULL_SPEED (1<<5)
#define MISC_SCREEN_BLANK_KB_DISABLED
(1<<6)
#define MISC_FILE_OVERWRITE_CHECK_OFF
(1<<7)

#define GPLANE_NONE 0
#define GPLANE_1 1
#define GPLANE_2 2
#define GPLANE_3 3
#define GPLANE_4 4

#define CTRL_ALT_RSHIFT 0
#define CTRL_ALT 1
#define CTRL_LSHIFT 2
#define CTRL_RSHIFT 3
#define CTRL_ALT_LSHIFT 4
#define ALT_LSHIFT 5
#define ALT_RSHIFT 6
#define LSHIFT_RSHIFT 7

#define DEFAULT_DRIVE_A 0
#define DEFAULT_DRIVE_B 1
#define DEFAULT_DRIVE_C 2

#define REBOOTONHANGUP_NEVER 0
#define REBOOTONHANGUP_ALWAYS 1
#define REBOOTONHANGUP_NORMAL 2
#define REBOOTONHANGUP_ABNORMAL 3

#define OPTIONS_COMPRESS_FILE_ON_XFER
(1<<0)
#define OPTIONS_CONSOLE_DRIVER
(1<<1)
#define OPTIONS_AUTO_DETERMINE_ANSI
(1<<2)
#define OPTIONS_REMOTE_MOUSE_SUPPORT
(1<<3)
#define OPTIONS_COM_PORT_MONITOR
(1<<4)

struct shad_cfg
{
    char dwdi;

    char dtype:

    char dscan:

    char brdr;
    char bgrd;
    char fgrd,
    char uifbgrd:
    char uiffgrd:
    char appm;
    char gplane:

    char adito;
    char keyc;

    char drvt;

    char pdir[MAXLEN_DEFAULT_PATH + 1];

    char facc[MAXLEN_FASTACCESS_REMOTEID
+ 1];

    char sound:

    char pswd;

    char reboot;

    char notes;

    char advkb;
    char dirac[MAXLEN_DIRECTORY + 1];

    char vmode;

    char scid[MAXLEN_CALLID + 1];

    char ringct;

    char inacttov

    char opflag;

    char sc_rate.

    int uport;
    char uirq;
    char swinec;

    char netname[MAXLEN_NETBIOS_NAME + 1];

    char spare[MAXLEN_SPARE];

};
Copr 1995 Zenith Data Systems Corp.

#define VOID void
#define APIFUNCRET VOID

#define FAR _far
#define NEAR _near
#define PASCAL _pascal
#define CDECL _cdecl

typedef int BOOL·

#if defined( TRUE )
 #undef TRUE
#endif

#if defined( FALSE )
 #undef FALSE
#endif

#if defined( FON )
 #undef ON
#endif

#if defined( FOFF )
 #undef OFF
#endif

#define TRUE 1
#define FALSE 0
#define FON 1
#define FOFF 0

typedef unsigned char BYTE;

#if defined( WORD )
 #undef WORD
#endif

#if defined( DWORD )
 #undef DWORD
#endif
typedef unsigned long DWORD;

typedef unsigned short WORD;
typedef unsigned int UINT:
typedef signed long LONG;
typedef void * PVOID;
typedef void FAR* LPVOID;

#define LOBYTE(w) ((BYTE)(w))
#define HIBYTE(w) ((BYTE)(((UINT)(w) >> 8)
& 0xFF))

#if defined( LOWORD )
 #undef LOWORD
#endif
#define LOWORD(l)
((WORD)(DWORD)((LPVOID)l))

#if defined( HIWORD )
 #undef HIWORD
#endif

#define HIWORD(l)
((WORD)((((DWORD)((LPVOID)l)) >> 16)
& 0xFFFF))

#define MAKELONG(low, high)
((LONG)(((WORD)(low)) |
(((DWORD)((WORD)(high))) << 16)))
#define MAKEWORD(low, high) ((WORD)low |
((WORD)high << 8))

#if defined( OFF )
 #undef OFF
#endif

#define OFF(fp) (LOWORD( ( DWORD )(
BYTE FAR * )fp ))
#define SEG(fp) (HIWORD( ( DWORD )(
BYTE FAR * )fp ))

#ifndef NOMINMAX
#ifndef max
#define max(a,b) (((a) > (b)) ? (a) : (b))
#endif
#ifndef min
#define min(a,b) (((a) < (b)) ? (a) : (b))
#endif
#endif

typedef UINT WPARAM;
typedef LONG LPARAM;
typedef LONG LRESULT;

#define MAKELPARAM(low, high)
((LPARAM)MAKELONG(low, high))
#define MAKELRESULT(low, high)
((LRESULT)MAKELONG(low, high))

#ifndef NULL
#define NULL 0
#endif

typedef char NEAR* PSTR;
typedef char NEAR* NPSTR;

typedef char FAR* LPSTR;
typedef const char FAR* LPCSTR;

typedef BYTE NEAR* PBYTE;
```

```
typedef BYTE FAR*        LPBYTE;

typedef int NEAR*        PINT;
typedef int FAR*         LPINT;

typedef WORD NEAR*       PWORD;
typedef WORD FAR*        LPWORD;

typedef long NEAR*       PLONG;
typedef long FAR*        LPLONG;

typedef DWORD NEAR*      PDWORD;
typedef DWORD FAR*       LPDWORD;

#define MAKELP(sel, off)   ((void
FAR*)MAKELONG((off), (sel)))


#define STRFIELDOFFSET( struct, field )
(((NPSTR)(struct.field))-((NPSTR)&(struct)))
#define WORDFIELDOFFSET( struct, field )
(((NPSTR)&(struct.field))-((NPSTR)&struct))


#define AX( value ) _asm mov ax, value
#define BX( value ) _asm mov bx, value
#define CX( value ) _asm mov cx, value
#define DX( value ) _asm mov dx, value
#define ES( value ) _asm mov es, value
#define DS( value ) _asm mov ds. value
#define SI( value ) _asm mov si, value
#define DI( value ) _asm mov di. value

#define PSP_PARENT_PSP( psp ) *( int far * )( ( (
long )psp << 16
) + 0x16 )
#define PSP_TERMINATE( psp ) *( long far * )( ( (
long )psp << 16
) + 0x0A )

#if defined( PROD )
#define DEBUG_BREAK _asm nop
#define TRACE( s )  _asm nop
#else
#define DEBUG_BREAK _asm int 3
#define TRACE( s ) Trace( s )
#endif

typedef void ( FAR * FARPROC )();
typedef void ( FAR * FARCALLENTRY )();
typedef void ( * NEARPROC )();
typedef APIFUNCRET ( * APIFUNCPTR )( struct
REGW * );
typedef void ( * DOSBUSYCB )( void );
typedef void ( * VIDBUSYCB )( void );
typedef void ( * MODALMSGBOXCB )( int );
typedef int ( FAR * SUICB )( void );
typedef int ( FAR * PRXCB )( void );

#define SIG_SMSIGNATURE    "saratoga manager,
copyright zds"
#define SIG_RLNOEMSIGNATURE "Proxim OEM
Interface Enabler"
#define SIG_POSOFFSET      10
#define SIG_NEGOFFSET      10

#define SUI_MAXLENUSERID     10
#define SUI_MAXLENPASSWORD   20
#define SUI_MAXLENSECURITYID 20
#define SUI_MAXLENSECURITYSUI 20
#define SUI_MAXLENLBENTRY    80
#define SUI_MAXLENACTIVEUPD  80
#define SUI_MAXNUMSCANCODES  32

#define RLN_MAXLENNODEADDRESS 20

#define PRX_EVENTNUM  5
#define PRX_POLLFREQ  5

#define PRX_MAXLENROMVERSION  0x07
#define PRX_MAXLENMASTERNAME  11
#define PRX_MAXLENNODEADDRESS 6

#define PRX_CBSUSPEND     0x0000
#define PRX_CBRESUME      0x0001
#define PRX_CBPRXVARIABLES 0x0002
#define PRX_CBSETSECUREID  0x0003

#define PRX_NUMOFAVAILFRAMES 4
#define PRX_NOFRAMETYPE      0
#define PRX_FRAME8022       ( SL_FT_E802_2 )
#define PRX_FRAME8023       ( SL_FT_E802_3 )
#define PRX_FRAMEEII        ( SL_FT_EII )
#define PRX_FRAMESNAP       ( SL_FT_ESNAP )
#define PRX_FRAMEBASE       (
PRX_FRAME8022 )

#define PRX_NOLINKQUALITY  -1
#define PRX_DISCONNECTED   0x0000
#define PRX_LOWQUALITY   0x0001
#define PRX_HIGHQUALITY  0x0002

#define PRX_DOMAIN0      0
#define PRX_DOMAIN1      1
#define PRX_DOMAIN7      7

#define PRX_MAXDOMAINID  15
#define PRX_MINDOMAINID  0

#define SCS_MAXLENMSGBUFF    159
#define SCS_MAXLENNODEADD    21
#define SCS_MAXLENHOSTDATA   35
#define SCS_MAXLENPHONEBOOK  11
#define SCS_MAXLENGROUPNAME  8
#define SCS_MAXLENHOSTNAME   8
#define SCS_MAXLENHOSTVERSION 2
#define SCS_MAXLENSERIALNUM  10
#define SCS_MAXLENRESERVED   1
#define SCS_MAXLENFILENAME   128

#define SCS_OFFGROUPKEY     (
SCS_MAXLENNODEADD )
#define SCS_OFFHOSTKEY      (
SCS_MAXLENNODEADD +
SCS_MAXLENGROUPNAME + 1 )
#define SCS_OFFSERIALNUM    (
SCS_MAXLENNODEADD +
SCS_MAXLENGROUPNAME + 1 +
SCS_MAXLENHOSTNAME + 1 + 2 * sizeof(
BYTE ) )

typedef struct tagSCANCODE
{
  WORD wScanCode,
} SCANCODE;

typedef struct tagUICONFIGDATA
{
  WORD wBuffLen;
  BYTE nMajorVersionNum;
  BYTE nMinorVersionNum;
  unsigned int bAutoShutoff      : 1;
  unsigned int bConnectType      : 2;
  unsigned int bLockKbdMouse     : 1;
  unsigned int bDimScreen        : 1,
  unsigned int bLastConnPassword : 1;
  unsigned int bReserved         : 10;
  BYTE nContrastIdx;
  BYTE nBrightnessIdx;
  BYTE nSleepTimeIdx;
  BYTE nDomainID;
  WORD wXUpperPenCalib;
  WORD wYUpperPenCalib;
  WORD wXLowerPenCalib;
  WORD wYLowerPenCalib;
  WORD wUILanguage;
  WORD wLastVersion;
  BYTE nLastOSKScreen;
  BYTE nLastOSKDlgScreen;
  BYTE nLastSetupDlgScreen;
  int xPosLastOSKScreen;
  int yPosLastOSKScreen;
  char szLastHostName[ SCS_MAXLENHOSTNAME
+ 1 ];
  char szSecurityID[ SUI_MAXLENSECURITYID + 1
];
  char szLastNodeAddress[
RLN_MAXLENNODEADDRESS + 1 ];
  BYTE nFrameType;
  SCANCODE aUDHotIcon1[
SUI_MAXNUMSCANCODES + 1 ];
  SCANCODE aUDHotIcon2[
SUI_MAXNUMSCANCODES + 1 ];
} UICONFIGDATA;

#define PND_OFFCALIB ( sizeof( WORD ) + sizeof(
BYTE ) * 2 +
sizeof( unsigned int ) + sizeof( BYTE ) * 4 );


typedef enum tagTHREADTYPEID
{
  SMD_NOTHREAD,
  SMD_ALLTHREADTYPES,
  SMD_POLLED,
  SMD_ONETIME,
  SMD_MANYTIMES,
  SMD_ONDEMAND,
} THREADTYPEID;

typedef enum tagSUIACTIONCODE
{
  SUI_NOACTION,
  SUI_NOSCREEN,
  SUI_LASTOSKSCREEN,
  SUI_LASTSETUPDLGSCREEN,
  SUI_LASTCONNECTION,
  SUI_SPECIFIEDSCREEN,
  SUI_DOPENCALIBRATION.
  SUI_BADVIDEOMSG,
} SUIACTIONCODE;

typedef enum tagPREPSUISTATES
{
  SUI_NOPREPSTATE,
  SUI_SETINITHOSTOCC,
  SUI_CHECKMONITOROFF,
  SUI_DOMEMREALLOC,
  SUI_DOMEMDEALLOC,
  SUI_CHECKMEMDEALLOC,
  SUI_CHECKMEMREALLOC,
  SUI_CHECKFULLREPAINT,
  SUI_PREPSUCCESS,
  SUI_PREPERROR,
} PREPSUISTATES;

typedef enum tagUNLOADSUISTATES
{
  SUI_NOUNLOADSUISTATE,
  SUI_GETACTIVEUPDATE,
  SUI_DIMSCREEN,
  SUI_LOCKKBDMOUSE,
  SUI_UNLOADSUISUCCESS,
} UNLOADSUISTATES;

typedef enum tagCLEANUPSUISTATES
{
  SUI_NOCLEANUPSTATE,
  SUI_CHECKMEMCLEANUP,
  SUI_CHECKMONITORON,
  SUI_CHECKFULLPAINTCLEANUP,
  SUI_FULLSCREENREPAINT,
  SUI_CLEANUPSUCCESS,
  SUI_CLEANUPERROR,
} CLEANUPSUISTATES,

typedef enum tagCALIBPENSTATES
{
  SUI_INITIALCALIBSTATE,
  SUI_CHECKCALIB,
  SUI_CALIBSUCCESS,
  SUI_CALIBERROR,
} CALIBPENSTATES;

typedef enum tagFLASHUPDATESTATES
{
  FLU_NOFLUSTATE,
  FLU_SAFETYCHECK,
  FLU_INITMEM,
  FLU_ALLOCDOSMEM,
  FLU_SENDREQFLASHUPD,
  FLU_WAITFORTMPFLASHFILES,
  FLU_UPDATETMPFILEPERCENT,
  FLU_WAITFORNUMFILES,
  FLU_SENDREQPATH,
  FLU_WAITFORPATHFLASHFILE,
  FLU_RECEIVEHOSTFILE,
  FLU_FLASHIT,
  FLU_FLASHUPDATECOMPLETE,
  FLU_CLEAREEROM,
  FLU_REBOOT,
  FLU_BEGINERRORSTATES,
  FLU_RELEASEMEM,
  FLU_NOFLASHFILES,
  FLU_READHOSTDAT,
  FLU_MISSINGFILE,
  FLU_OUTOFDISKSPACE,
  FLU_FILECORRUPTED,
  FLU_NOCHECKSUM,
  FLU_HOSTUNKNOWNERR,
  FLU_NOACKTEMPFILESERROR,
  FLU_NOACKNUMFILESERROR,
  FLU_NOACKPATHERROR,
  FLU_NOACKRECEIVEFILEERROR,
  FLU_NOACKRECEIVEFATALERROR,
  FLU_FLASHFATALERROR,
  FLU_SENDPRIMSGERROR,
  FLU_EEROMNOCLRERROR,
  FLU_MEMERROR,
  FLU_GETBATTERYINFOERROR,
  FLU_BATNOTATTACHEDERROR,
  FLU_BATCAPTOOLOWERROR,
  FLU_NOTONACERROR,
  FLU_NOCONNECTERROR,
  FLU_LINKTOOLOWERROR,
  FLU_1MEGSYSTEMERROR,
  FLU_2MEGSYSTEMERROR,
} FLASHUPDATESTATES;

typedef enum tagPROCMSGBOXSTATES
{
  SUI_NOPROCMSGBOXSTATE,
  SUI_HIDEMSGBOX,
  SUI_SHOWMSGBOXSTATE.
};

typedef enum tagSMISCANCODES
{
  SMI_SF1   = 0x003B,
  SMI_SF2,
  SMI_SF3,
  SMI_SF4,
  SMI_SF5,
  SMI_SF6,
  SMI_SF7,
  SMI_SF8,
  SMI_SF9,
  SMI_SF10,
  SMI_SALTQ = 0x0810,
} SMISCANCODES;


typedef struct tagAPIFUNC
{
  WORD        wFuncCode;
  APIFUNCPTR  fpAPIFunc;
} APIFUNC;

typedef struct tagEVENT
{
  NEARPROC    fpThread;
  APIFUNC     *aAPIFuncTable;
  THREADTYPEID ThreadTypeId;
  LONG        lTimeLimit,
  LONG        lTimeCurrent,
  int         iInitRetryLimit;
  int         iRetryLimit;
  BYTE        nReenterCount;
  unsigned int bReentrant : 1;
  unsigned int bReserved  : 15;
} EVENT;

typedef struct tagPENCALIB
{
  WORD wXUpperPenCalib;
  WORD wYUpperPenCalib;
  WORD wXLowerPenCalib;
  WORD wYLowerPenCalib;
  WORD wHITopMargin,
  WORD wHIRightMargin;
  WORD wHIVertSpace;
  WORD wHIXWidth;
  WORD wHIYHeight;
} PENCALIB;

typedef struct trap_rec TRAPREC;

typedef struct tagZDSTRAPREC
{
  TRAPREC tr;

  char sAfterFill[ SIG_POSOFFSET - 5 ];

  char szSMAfterSignature[ sizeof(
SIG_SMSIGNATURE ) + 1 ];
} ZDSTRAPREC;

typedef struct tagPROXIMTRAPREC
{
  char sFill;
  char szSMBeforeSignature[ sizeof(
SIG_RLNOEMSIGNATURE ) - 8 ];

  TRAPREC tr;

} PROXIMTRAPREC.

typedef struct tagPROXIMVARIABLES
{
  LPSTR lpszSynchronizeFlag;
  LPSTR lpszRomVersion;
  LPSTR lpszLinkQuality;
} PROXIMVARIABLES;

typedef struct tagPROXIMNETCONFIGDATA
{
  BYTE nIRQ;
  BYTE nDomainID;
  BYTE nChannel;
  BYTE nSubChannel;
  BYTE nNodeType;
  WORD wPortAdd;
  WORD wInactivityTime;
  char szMasterName[
PRX_MAXLENMASTERNAME + 1 ];
  char sNodeAddress[
PRX_MAXLENNODEADDRESS ];
  BYTE nSocket;
  BYTE fInit365;
  WORD wMemAddress;
  BYTE nSniffTime;
} PROXIMNETCONFIGDATA;

typedef struct tagPROXIMVERSIONINFO
{
```

```
 WORD wMajorVersion;
 WORD wMinorVersion.
 LPSTR lpszModuleName.
} PROXIMVERSIONINFO.

typedef struct tagCALLREC
{
 char cFarCallOpCode;
 char aCallBack[ sizeof( FARPROC ) ];
 char cFarRetOpCode;

 char sAfterFill[ SIG_POSOFFSET - ( sizeof(
FARPROC ) + 2 ) ];
 char szSMAfterSignature[ sizeof(
SIG_SMSIGNATURE ) + 1 ];
} CALLREC;

typedef struct tagEXECPARMS
{
 WORD wSegEnv,
 WORD wOffCmdLineTail·
 WORD wSegCmdLineTail,
 WORD wOffFCB1;
 WORD wSegFCB1;
 WORD wOffFCB2;
 WORD wSegFCB2;
} EXECPARMS.

typedef struct tagBUFFHEADER
{
 int  iStructLen;
 int  iBuffLen
 LPVOID Buff;
} BUFFHEADER·

typedef struct tagPRIVATEMSGBUFF
{
 int iMsgID
 int iBuffLen;
 char sMsgBuff[ SCS_MAXLENMSGBUFF ];
} PRIVATEMSGBUFF,

typedef struct tagCURRHOSTNAME
{
 LPSTR lpszNodeAddress·
 LPSTR lpszGroupName;
 LPSTR lpszHostName:
 UINT iHostVersion.
 LPSTR lpsSerial;
 LPSTR lpsReserved;
} CURRHOSTNAME:

typedef struct tagHOSTDATABUFF
{
 char szGroupName[ SCS_MAXLENGROUPNAME
+ 1 ];
 char szHostName[ SCS_MAXLENHOSTNAME + 1
];
 BYTE nMinorVersion,
 BYTE nMajorVersion·
 char sHostSerial[ SCS_MAXLENSERIALNUM ];

 unsigned char bPasswordProtect : 1;
 unsigned char bNotInUseYet : 7;
 char sReserved[ SCS_MAXLENRESERVED ]:
 char nHostStatus;
} HOSTDATABUFF:

typedef struct tagHOSTLISTBUFF
{
 char szNodeAddress[ SCS_MAXLENNODEADD ];
 HOSTDATABUFF HostDataBuff;
} HOSTLISTBUFF:

typedef struct tagHOSTLISTENTRIES
{
 int iNumEntries;
 HOSTLISTBUFF *aHostListBuff;
} HOSTLISTENTRIES;


typedef struct tagHOSTLISTBOXENTRY
{
 HOSTLISTBUFF HostListBuff;
 char nAttribute;
} HOSTLISTBOXENTRY;

typedef struct tagHOSTLISTBOXENTRIES
{
 int iNumEntries,
 HOSTLISTBOXENTRY aHostListBoxEntries[];
} HOSTLISTBOXENTRIES.

typedef struct tagLISTBOXENTRY
{
 char far *lpszEntry;
 char nAttribute,
} LISTBOXENTRY;

#pragma pack(1)
typedef struct tagMSGBOXBUFF
{
 char far *lpszText;
 char nAlignment;
} MSGBOXBUFF:
#pragma pack()

typedef struct tagSYSTEMSTATUSBUFF
{
 BYTE nCurrentVidMode;
 char szLastConnect[ SCS_MAXLENPHONEBOOK
];
 BYTE nCallProgress;
 BYTE nProtocolId,
 BYTE fAbortRequestConnect;
} SYSTEMSTATUSBUFF;

typedef struct tagOCCLUDETEXT
{
 int yULRow;
 int xULCol;
 int yLRRow;
 int xLRCol;
} OCCLUDETEXT:

typedef struct tagOCCLUDEDOSGRAPHICS
{
 int xULDos;
 int yULDos,
 int xLRDos;
 int yLRDos,
} OCCLUDEDOSGRAPHICS,

typedef struct tagOCCLUDERWIN
{
 int xULWin;
 int yULWin;
 int xLRWin,
 int yLRWin,
} OCCLUDERWIN;

typedef union tagOCCLUDEUNION
{
 OCCLUDETEXT occText;
 OCCLUDEDOSGRAPHICS occDosGraph;
 OCCLUDERWIN occRWin,
} OCCLUDEUNION;

#pragma pack(1)
typedef struct tagMCB
{
 unsigned char cType;
 WORD        wOwner;
 WORD        wSize;
 unsigned char aUnused[3];
 unsigned char aDOS4[8].
} MCB,
#pragma pack()

#define SHC_SPKRPOLLFREQ       0x0005

#define SHC_NVRAMSEG          0xF000
#define SHC_NVRAMOFF          0x0000
#define SHC_MAXLENNVRAM        0x1E0
#define SHC_SEGEQUIPTABLE      0x0040
#define SHC_OFFSCREENROWS       0x0084
#define SHC_OFFCHARSCANLINES   0x0085
#define SHC_ADDSCREENROWS       0x00000484
#define SHC_ADDCHARSCANLINES    0x00000485

#define SHC_MAXLENHEAP         20000
#define SHC_MAXLENKBBUFF        16

#define SHC_VIDSTATEFUNC       0x1C

#define SHC_VIDEOHARDWARE       0x01
#define SHC_VIDEODATAAREA      0x02
#define SHC_COLORPALREGS       0x04

#define SHC_SIZEOFBUFF        0x00
#define SHC_SAVEVIDEO         0x01
#define SHC_RESTOREVIDEO       0x02

#define SHC_VIDSTATEBLOCKSIZE  0x40

#define SHC_XVGARES           640
#define SHC_YVGARES           480

#define SHC_DEFCONTRASTIDX     11
#define SHC_DEFBRIGHTNESSIDX   23

#define SHC_HIMEMSEG          0xC000

#define SMD_SCHEDULERS         0x01
#define SMD_HOTKEYS           0x02
#define SMD_GENERALTRAPS        0x04
#define SMD_COMMSVCS          0x08
#define SMD_INTSSVCS          0x10
#define SMD_MOUSEKWATCH         0x20
#define SMD_FARCALLS          0x40
#define SMD_SYSMASK           0x80

#define SMD_FULLREENTER    SMD_INTSSVCS
#define SMD_NOREENTRANCE   (
SMD_SCHEDULERS | SMD_HOTKEYS |
SMD_GENERALTRAPS | \
                   SMD_COMMSVCS |
SMD_INTSSVCS |
SMD_MOUSEKWATCH | \
                   SMD_FARCALLS )

#define SMD_REENTERSCHED   (
SMD_HOTKEYS | SMD_FARCALLS |
SMD_GENERALTRAPS | \
                   SMD_COMMSVCS |
SMD_INTSSVCS |
SMD_MOUSEKWATCH )

#define SMD_MAXRECOUNTSCHED 1
#define SMD_MAXTHREADS     17
#define SMD_REUSETHREADS   12

#define SMD_DISPATFREQ     ( DWORD )3

#define SMD_IRET          0
#define SMD_OLDINT         1
#define SMD_EITHER         2

#define SMD_EVENTSTACKLIMIT 10

#define SMD_DOSINT         0x21
#define SMD_DOSEXEC        0x4B00
#define SMD_DOSALLOCMEM     0x4800
#define SMD_DOSFREEMEM      0x4900
#define SMD_GETLISTOFLISTS  0x5200

#define SMD_GETSETALLOCSTRAT 0x5800
#define SMD_GETALLOCSTRAT   0x0000
#define SMD_SETALLOCSTRAT   0x0001
#define SMD_ALLOCFIRSTFIT   0x0000
#define SMD_ALLOCBESTFIT    0x0001
#define SMD_ALLOCLASTFIT    0x0002

#define SMD_CALLOPCODE     ( BYTE )0x9A
#define SMD_RETOPCODE      ( BYTE )0xCB

#define SMD_THREADACTIVE   0xFFFF

#define SMD_NOACTIVETHREAD -1

#define PCB_BEGINCRITICAL  disable_ints();
#define PCB_ENDCRITICAL    enable_ints();

#define SMI_GETMASK        0x8000

#define SMI_SUIINTNUM      0x0068
#define SMI_SUIPOLLFREQ     0
#define SMI_SUIEVENTNUM     0

#define SMI_SUINOTLOADED    0
#define SMI_SUILOADING      1
#define SMI_SUIUNLOADING     2
#define SMI_SUILOADED       3
#define SMI_SUIDEACTIVATING  4
#define SMI_SUIINACTIVE      5

#define SMI_SUIMAXMSGBOXLINES 6

#define SMI_SETCONTRAST      0x000A
#define SMI_GETCONTRAST      0x800A
#define SMI_SETBRIGHTNESS     0x000B
#define SMI_GETBRIGHTNESS     0x800B
#define SMI_SETAUTOSHUTOFF    0x000F
#define SMI_GETAUTOSHUTOFF    0x800F
#define SMI_SETSLEEPTIME     0x0010
#define SMI_GETSLEEPTIME     0x8010
#define SMI_REBOOTHOST       0x0011
#define SMI_ACTIVEUPDATE     0x0012
#define SMI_DOUPDATE        0x0013


#define SMI_UPDATEHOSTLIST   0x0020

#define SMI_GETHOSTLISTSTAT  0x0021
#define SMI_AVAILABLE       0x0000
#define SMI_INPROGRESS      0x0001
#define SMI_BLANK          0x0002

#define SMI_CALIBUPLEFT      0x000C
#define SMI_CALIBLOWRIGHT    0x800C
#define SMI_CALIBCANCEL      0x000E
#define SMI_CALIBPOLLFREQ    0x0001


#define SMI_GETCONNECTSTAT   0x0022
#define SMI_SCSDISCONNECTED  0x00
#define SMI_SCSWAITINGFORCONNECT 0x01
#define SMI_SCSDIALING      0x02
#define SMI_SCSCONNECTED     0x03
#define SMI_SCSLOGGINGIN     0x04
#define SMI_SCSNETWARESPX    0x00
#define SMI_SCSASYNC        0x07
#define SMI_CONNECTED       0x00
#define SMI_DIALING        0x01
#define SMI_WAITINGFORCONNECT 0x02
#define SMI_LOGGINGIN       0x03
#define SMI_DISCONNECTED     0x04
#define SMI_INVALIDHOST      0x05
#define SMI_INVALIDPASSWORD   0x06
#define SMI_CONNECTTIMEOUT    0x07
#define SMI_BUSY          0x08
#define SMI_NOCARRIER       0x09
#define SMI_NODIALTONE       0x0A
#define SMI_WAITINGFORREDIAL  0x08
#define SMI_NETWARESPX       0x00
#define SMI_MODEM         0x01
#define SMI_SERIAL         0x02

#define SMI_REQUESTCONNECT   0x0023


#define SMI_REQUESTDISCO     0x8023
#define SMI_ABORTREQCONNECT   0x0024
#define SMI_GETPASSWORDSTAT   0x0025
#define SMI_LBSETMODEMDESC    0x0026
#define SMI_LBGETMODEMDESC    0x8026
#define SMI_LBSETPHONELIST    0x0027
#define SMI_LBGETPHONELIST    0x8027
#define SMI_LBSETMODEMMANU    0x0028
#define SMI_LBGETMODEMMANU    0x8028
#define SMI_LBSETMODEMBAUD    0x0029
#define SMI_LBGETMODEMBAUD    0x8029
#define SMI_LBSETNETGROUP     0x002A
#define SMI_LBGETNETGROUP     0x802A
#define SMI_LBSETNETHOST     0x002B
#define SMI_LBGETNETHOST     0x802B

#define SMI_SETCONNECTTYPE    0x002C
#define SMI_GETCONNECTTYPE    0x802C
#define SMI_NETWORKCONNECT    0x0000
#define SMI_MODEMCONNECT     0x0001
#define SMI_SERIALCONNECT     0x0002

#define SMI_SETUSERID       0x002D
#define SMI_GETUSERID       0x802D
#define SMI_SETPASSWORD      0x002E
#define SMI_GETPASSWORD      0x802E
#define SMI_SETMODEMTONE     0x002F
#define SMI_GETMODEMTONE     0x802F
#define SMI_SETMODEMPREFIX    0x0030
#define SMI_GETMODEMPREFIX    0x8030
#define SMI_SETMODEMSUFFIX    0x0031
#define SMI_GETMODEMSUFFIX    0x8031
#define SMI_SETMODEMRINGS     0x0032
#define SMI_GETMODEMRINGS     0x8032
#define SMI_SETMODEMRETRY     0x0033
#define SMI_GETMODEMRETRY     0x8033
#define SMI_SETMODEMDELAY     0x0034
#define SMI_GETMODEMDELAY     0x8034
#define SMI_SETMODEMINITSTR   0x0035
#define SMI_GETMODEMINITSTR   0x8035
#define SMI_SETMODEMAUTOSTR   0x0036
#define SMI_GETMODEMAUTOSTR   0x8036
#define SMI_SETMODEMDISCOSTR  0x0037
#define SMI_GETMODEMDISCOSTR  0x8037
#define SMI_SETCONNECTRSPSTR  0x0038
#define SMI_GETCONNECTRSPSTR  0x8038
#define SMI_GETMODEMDEFAULTS  0x0039
#define SMI_LBGETNETFRAMETYPE 0x803A
#define SMI_LBSETNETFRAMETYPE 0x003A

#define SMI_UPDATEDIMLOC     0x0052
#define SMI_REQUESTUNLOAD    0x0053
#define SMI_UNLOADDENIED     0x0001
#define SMI_UNLOADACCEPTED    0x0000

#define SMI_SETMSGBOXRETCODE  0x0055
#define SMI_SETUILANGUAGE     0x0057
#define SMI_GETUILANGUAGE     0x8057
#define SMI_UIUSENGLISH      0x00

#define SMI_SETVIDEOBLOCK     0x0058
#define SMI_CLEARVIDEOBLOCK   0x8058

#define SMI_NOTIFYSCRCODE     0x005A

#define SMI_SETACTIVESTAT     0x0060
#define SMI_SETKEYSTROKE      0x0061

#define SMI_GETKEYBOARDSTAT   0x0062
#define SMI_KBDNOTPRESENT     0x00
#define SMI_KBDPRESENT       0x01

#define SMI_GETABOUTDIALOG    0x0063
#define SMI_GETNEXTCREDITS    0x0064
#define SMI_SETUDHOTICON      0x0065
```

```
#define SMI_GETUDHOTICON     0x8065
#define SMI_SETSECURITYID    0x0066
#define SMI_GETSECURITYID    0x8066
#define SMI_SETDOMAINID      0x0067
#define SMI_GETDOMAINID      0x8067
#define SMI_SETLOCKKBDMOUSE  0x0068
#define SMI_GETLOCKKBDMOUSE  0x8068
#define SMI_DISABLEDLOCKKBDMOUSE 0x0000
#define SMI_ENABLEDLOCKKBDMOUSE  0x0001

#define SMI_SETDIMSCREEN     0x006A
#define SMI_GETDIMSCREEN     0x806A
#define SMI_DISABLEDDIMSCREEN 0x0000
#define SMI_ENABLEDDIMSCREEN  0x0001

#define SMI_SCSINTNUM        0x0069
#define SMI_SCSPOLLFREQ      0
#define SMI_SCSEVENTNUM      1

#define SMI_SCSLOADING       0x0100
#define SMI_SCSINACTIVE      0x0000
#define SMI_SCSACTIVE        0x0001

#define SMI_SCSNOWAITFORDOS  FALSE
#define SMI_SCSWAITFORDOS    TRUE

#define SMI_SCSABORTCONN     { 0x1b. 0x1b.
0x1b }

#define SMI_SLLOADSUI        0x0500
#define SMI_SLPOLLFREQ       2

#define SMI_SLENABLEKBD      0x0501
#define SMI_SLGETFRAMETYPE   0x0502
#define SMI_SLDEFINEOLDVIDVECTOR 0x0503
#define SMI_SLGETMLIDSTATUS  0x0504

#define SMI_EVENTLOOPBASE    0x4000
#define SMI_UNLOADOSK        (
SMI_EVENTLOOPBASE + 1 )
#define SMI_CHANGETOBADVIDEO (
SMI_EVENTLOOPBASE + 2 )
#define SMI_CHANGETOGOODVIDEO (
SMI_EVENTLOOPBASE + 3 )

#define SMI_PRIMSGBASE       0x5000
#define SMI_REQFLASHUPD      (
SMI_PRIMSGBASE + HM_PM_FILEREQ )
#define SMI_ACKFLASHBREAK    (
SMI_PRIMSGBASE +
HM_PM_FLASH_BREAK )
#define SMI_ACKTOTALFILES    (
SMI_PRIMSGBASE + HM_PM_TOTALFILES
)
#define SMI_REQPATHFROMIDX   (
SMI_PRIMSGBASE + HM_PM_PATHREQ )
#define SMI_ACKPATHASSTRING  (
SMI_PRIMSGBASE + HM_PM_PATHREP )
#define SMI_REQACTIVEUPDATE  (
SMI_PRIMSGBASE + HM_PM_FLASH_NAMQ
)
#define SMI_ACKACTIVEUPDATE  (
SMI_PRIMSGBASE + HM_PM_FLASH_NAMP
)
#define SMI_REQFLASHDONE     (
SMI_PRIMSGBASE + HM_PM_FLASHOK )
#define SMI_REQNOTIFYDOSWIN  (
SMI_PRIMSGBASE + HM_PM_DOSWIN )
#define SMI_REQOCCDEFINE     (
SMI_PRIMSGBASE + HM_PM_OSK_DEFINE
)
#define SMI_ACKOCCDEFINE     (
SMI_PRIMSGBASE +
HM_PM_OSK_DEFINE_ACK )
#define SMI_REQOCCCLOSE      (
SMI_PRIMSGBASE + HM_PM_OSK_CLOSE
)
#define SMI_ACKOCCCLOSE      (
SMI_PRIMSGBASE +
HM_PM_OSK_CLOSE_ACK )
#define SMI_REQUNIOCCCLOSE   (
SMI_PRIMSGBASE +
HM_PM_OSK_CLOSE_UNI )
#define SMI_ACKUNIOCCCLOSE   (
SMI_PRIMSGBASE +
HM_PM_OSK_CLOSE_UNI_ACK )

#define SMI_BEGRLNINTNUM     0x0080
#define SMI_ENDRLNINTNUM     0x0090
#define SMI_RLNPOLLFREQ      0
#define SMI_RLNEVENTNUM      3

#define SMI_PNDINTNUM        0x006A
#define SMI_PNDPOLLFREQ      0
#define SMI_PNDEVENTNUM      2

#define SMI_PNDLOADING       0x0001

#define SMI_PRXINTNUM        0x0080

#define SMI_PRXEVENTNUM      9
#define SMI_PRXPOLLFREQ      0

#define SMI_PRXPOWERMANCB    0x0000
#define SMI_PRXUNLOADING     0x0001
#define SMI_PRXNETCONFIG     0x0002
#define SMI_PRXXCHGREVINFO   0x0003

#define SUI_INTNUM           0x0065
#define SUI_POLLFREQ         0
#define SUI_EVENTNUM         4
#define SUI_CLEANUPEVENTNUM  10
#define SUI_PRIMSGPOLLFREQ   5
#define SUI_MSGBOXPOLLFREQ   2
#define SUI_PROCMSGBOXPOLLFREQ 1

#define SUI_MSGBOXCONNECTTIMEOUT 20
#define SUI_LOGINTIMEOUT     120

#define SUI_CALIBPOINTDONE   0x000D
#define SUI_XCALIBPOINT      4
#define SUI_YCALIBPOINT      4

#define SUI_UPDATEFLASHPRCNT 0x0014
#d: ne SUI_DISPLAYDIALOG     0x0051

#define SUI_CLOSEDIALOG      0x0053
#define SUI_NOUNLOADSUI      0
#define SUI_UNLOADSUI        1

#define SUI_SHOWMSGBOX       0x0055

#define SUI_NOSLEEPSLIDERIDX 8

#define SUI_UPDATECONNECTSTATUS 0x003B

#define SUI_HIDEMSGBOX       0x0056
#define SUI_LEFTJUSTIFIED    0
#define SUI_CENTERJUSTIFIED  1
#define SUI_RIGHTJUSTIFIED   2
#define SUI_NOBUTTONS        0x0000
#define SUI_OK               0x0001
#define SUI_CANCEL           0x0002
#define SUI_ABORT            0x0004
#define SUI_RETRY            0x0008
#define SUI_IGNORE           0x0010
#define SUI_YES              0x0020
#define SUI_NO               0x0040

#define SUI_SHOWHIDEBUSYCURSOR 0x0059
#define SUI_BUSYCURSORON     0
#define SUI_BUSYCURSOROFF    1

#define SUI_MOVEOSK          0x005B

#define SUI_GETSUIVERSION    0x0069

#define SUI_PARTIALDIALOGSET 0x0001
#define SUI_FULLDIALOGSET    0x0000

#define SUI_OSKASSETUPDIALOGMASK 0x8000
#define SUI_OSKUNICLOSEMASK  0x4000
#define SUI_OSKVIDCHANGEMASK 0x2000
#d...ne SUI_OSKINWINGRAPHICSMASK 0x1000

#define SUI_NOSCREEN         0x0000

#define SUI_SMALLALPHA       0x0001
#define SUI_YULSMALLALPHA    0x0040
#define SUI_XULSMALLALPHA    0x0088
#define SUI_YLRSMALLALPHA    0x00E3
#define SUI_XLRSMALLALPHA    0x01F7

#define SUI_SMALLNUMERIC     0x0002
#define SUI_YULSMALLNUMERIC  0x0040
#define SUI_XULSMALLNUMERIC  0x0100
#define SUI_YLRSMALLNUMERIC  0x00E3
#define SUI_XLRSMALLNUMERIC  0x017F

#define SUI_SMALLFULL        0x0003
#define SUI_YULSMALLFULL     0x0040
#define SUI_XULSMALLFULL     0x0050
#define SUI_YLRSMALLFULL     0x00E3
#define SUI_XLRSMALLFULL     0x022F

#define SUI_BIGALPHA         0x0005
#define SUI_YULBIGALPHA      0x0040
#define SUI_XULBIGALPHA      0x0048
#define SUI_YLRBIGALPHA      0x013E
#define SUI_XLRBIGALPHA      0x0237

#define SUI_BIGNUMERIC       0x0006
#define SUI_YULBIGNUMERIC    0x0040
#define SUI_XULBIGNUMERIC    0x00E8
#define SUI_YLRBIGNUMERIC    0x013E
#define SUI_XLRBIGNUMERIC    0x018F

#define SUI_BIGFULL          0x0007
#define SUI_YULBIGFULL       0x0040

#define SUI_XULBIGFULL       0x0000
#define SUI_YLRBIGFULL       0x013E
#define SUI_XLRBIGFULL       0x027F

#define SUI_WINDOWSOSK       0x01
#define SUI_DOSOSK           0x02
#define SUI_SETUPDLG         0x03

#define SUI_PENCALIBRATION   0x0008

#define SUI_LOGIN            0x0009

#define SUI_HOSTSELECTION    0x0008
#define SUI_HOTKEYS          0x0010
#define SUI_MAINTANENCE      0x0018
#define SUI_POWER            0x0020
#define SUI_MODEM            0x0028
#define SUI_SCREEN           0x0030

#define SUI_SETUPDLGMASK     0x00F8
#define SUI_OSKMASK          0x0007

#define SUI_UDHOTICON1       0x0001
#define SUI_UDHOTICON2       0x0002
#define SUI_UDHOTICON1DEF    { 0x0011,
0x0091, 0x0017, 0x0097,
0x0031. 0x00B1, \
                    0x001C, 0x009C }
#define SUI_MAXLENDEFHOTICON 0x0010

#define IsOSK( code )        ( LOBYTE( code ) <=
SUI_BIGFULL
&& \
                    LOBYTE( code ) >
SUI_NOSCREEN
)
#define IsOSKAsSetupDlg( code ) ( ( code &
SUI_OSKASSETUPDIALOGMASK ) && IsOSK(
code ) )
#define IsOSKUniClose( code )  ( ( code &
SUI_OSKUNICLOSEMASK )
&& IsOSK( code ) )
#define IsOSKVidChange( code )  ( ( code &
SUI_OSKVIDCHANGEMASK
) && IsOSK( code ) )
#define IsOSKWinGraphics( code ) ( ( code &
SUI_OSKINWINGRAPHICSMASK ) && IsOSK(
code ) )
#define IsSetupDlg( code )     ( LOBYTE( code ) >
SUI_BIGFULL )
#define IsNoScreen( code )     ( LOBYTE( code )
== SUI_NOSCREEN
)

#define IsOSKVideoSupported( code ) ( code ==
SUI_TEXTVIDMODE )

#define SUI_LOADSUIINTNUM    0
#define SUI_LOADSUIPOLLFREQ  1L
#define SUI_LOADSUIMAXRETRY  10
#define SUI_CLEANUPMAXRETRY  1000
#define SUI_LOADSUI
#define SUI_CANCELCONNPOLLFREQ 6
#define SUI_CANCELCONNMAXRETRY 25
#define SUI_UNLOADSUIPOLLFREQ 1L

#define SUI_EXECNAME         "SARUI.EXE"

#define SUI_INITIALVIDMODE   0x12
#define SUI_TEXTVIDMODE      0x03
#define SUI_CLEARBIT         0x80

#define SUI_OSKNOTVISIBLE    0x00
#define SUI_OSKVISIBLE       0x01

#define SUI_LBENTRYENABLED   1
#define SUI_LBENTRYDISABLED  0

#define SUI_LBCURRENTRY      -1

typedef enum tagOCCTYPE
{
 SUI_NOOCCTYPE,
 SUI_OCCDOSTEXT,
 SUI_OCCDOSGRAPHICS,
 SUI_OCCRWIN,
} OCCTYPE;

#define SCS_INTNUM           0x0066
#define SCS_ACCEPTED         1
#define SCS_REJECTED         0
#define SCS_DISCOEVENTNUM    7
#define SCS_DISCOPOLLFREQ    3
#define SCS_LOADSCSPOLLFREQ  1
#define SCS_PRIMSGEVENTNUM   8
#define SCS_PRIMSGPOLLFREQ   1
#define SCS_FILEMEMPOLLFREQ  1
#define SCS_VIDBLOCKPOLLFREQ 1
#define SCS_VIDBLOCKMAXRETRY 32

#define SCS_HOSTCTRLPOLLFREQ 2
#define SCS_HOSTCTRLMAXRETRY 10
#define SCS_WAITSUIPOLLFREQ  1
#define SCS_WAITACKPOLLFREQ  1
#define SCS_WAITACKMAXRETRY  20
#define SCS_DOHOSTOCCPOLLFREQ 1
#define SCS_DOHOSTOCCMAXRETRY 3
#define SCS_SENDPMPOLLFREQ   2
#define SCS_SENDPMMAXRETRY   3

#define SCS_REQUESTHOSTLIST  0x3900
#define SCS_HOSTLISTNUMOFFSET 2

#define SCS_CANCELREQHOSTLIST 0x3A00

#define SCS_SMAKECON         0x0C01

#define SCS_DISCODISABLECON  0x0800

typedef enum tagCONNERROR
{
 SCS_NOCONNERROR,
 SCS_ERRSMAKECON,
 SCS_ERRMONTITOR,
 SCS_ERRFULLSCRPAINT,
 SCS_ERRTIMEOUT,
 SCS_ERRUSERABORT.
 SCS_ERRPASSWORD,
 SCS_ERRLOGINID,
 SCS_ERRUNSUPVIDMODE,
 SCS_ERRUNKNOWN,
} CONNERROR;

typedef enum tagSCOSCONNERROR
{
 SCS_NOLOGINERROR = 0,
 SCS_PASSWORDREJECTED = 15,
 SCS_LOGINIDREJECTED,
 SCS_LOGINUSERREJECTED,
 SCS_REMOTEDISCONNECTED,
 SCS_RESPONSETIMEOUT,
 SCS_UNSUPPORTEDVIDMODE = 47,
 SCS_OUTSIDERANGE = 255,
} SCOSCONNERROR;

#define SCS_SCSREMOTECTRL    0
#define SCS_SCSTTY           1
#define SCS_SCSVT100         2
#define SCS_SCSVT102         3
#define SCS_SPX              0
#define SCS_ASYNCH           7

#define SCS_STRDEFUSERID     "DEFAULT___"

#define SCS_FREEMEM          0x4200

#define SCS_FREEOSKMEM       0x4300

#define SCS_SETBUSY          0x4400
#define SCS_SETIDLE          0x4500

#define SCS_FULLREPAINT      0x4600

#define SCS_SETSCROLLING     0x4700
#define SCS_DISABLESCROLL    0x00
#define SCS_ENABLESCROLL     0x01

#define SCS_OCCLUDE2         0x4C00

#define SCS_DLGFREEMEMPERCENT 100
#define SCS_OSKFREEMEMPERCENT 25

#define SCS_WIDTHOFTEXTCHAR  8
#define SCS_HEIGHTOFTEXTCHAR 16
#define SCS_OSKTEXTCHARHEIGHT 8
#define SCS_OSKTEXTCHARWIDTH 8

#define SCS_SCOSVIDEO        0x3D00
#define SCS_SCOSVIDBLOCK     1
#define SCS_SCOSVIDUNBLOCK   0

#define SCS_SETUPSYSSTATBUFF 0x3E00

#define SCS_REBOOTHOST       0x4100

#define SCS_MONITOROFF       0x1E00
#define SCS_MONITORON        0x2000
#define SCS_LOCALKBDOFF      0x0001
#define SCS_LOCALKBDON       0x0000

#define SCS_SENDKBDSCANCODE  0x2b00

#define SCS_XFERFILE         0x3f00
#define SCS_TOHOST           0x0000
#define SCS_TOSARATOGA       0x0001
```

```
#define SCS_REBOOTHOST       0x4100

#define SCS_LOCKHOST        0x0200
#define SCS_UNLOCKKBDMOUSE   0x0000
#define SCS_LOCKKBDMOUSE     0x0001
#define SCS_UNBLANKDISPLAY   0x0002
#define SCS_BLANKDISPLAY     0x0003

#define SCS_SENDPRIMSG       0x3800

#define SCS_ERRNOLOCATION    0xFF00

#define SCS_REPAINTREQUIRED   0x0001
#define SCS_NOREPAINTREQUIRED 0x0000

#define SCS_NOUPDATEICON     0
#define SCS_UPDATEICON       1
#define SCS_NOCONNECTREQUESTED FALSE
#define SCS_CONNECTREQUESTED   TRUE

#define SCS_RETAINERROR      FALSE
#define SCS_CLEARERROR       TRUE

#define SCS_HOSTNOSTATUS     0
#define SCS_HOSTAVAILABLE    'a'
#define SCS_HOSTCONNECTED    'c'
#define SCS_HOSTUNAVAILABLE  'n'

#define FLU_POLLFREQ         1
#define FLU_PRIMSGPOLLFREQ   5
#define FLU_MAXRETRY         80
#define FLU_MAXACTUPDREQ     (
FLU_MAXRETRY - 5 )
#define FLU_MODACTUPDREQ     5
#define FLU_MODPCNTTMPFILE   8
#define FLU_MAXPCNTTMPFILE   (
FLU_MAXRETRY / 2 )
#define FLU_MAXUPDREQ        (
FLU_MAXRETRY / 2 )
#define FLU_MODPATHREQ       8

#define FLU_MAXPATHREQ       (
FLU_MAXRETRY / 2 )
#define FLU_MAXRECVFILEREQ   (
FLU_MAXRETRY - 3 )
#define FLU_MAXFLASHIT       ( FLU_MAXRETRY
- 5 )
#define FLU_MAXCLEAREEROM    (
FLU_MAXRETRY - 3 )
#define FLU_MAXDOSBUSY       (
FLU_MAXRETRY - 5 )
#define FLU_TIMEOUTPRIMSG    2

#define FLU_SIZEFLASHSECTOR  0x10000L

#define FLU_FLASHFILEID      'T'

#define FLU_NUMBERUNKNOWN    -1
#define FLU_ERRHOSTBASE      (
HM_FLASH_READ_HDAT )
#define FLU_ERRREADHOSTDAT   (
HM_FLASH_READ_HDAT )
#define FLU_ERRMISSINGFILE   (
HM_FLASH_NOT_SOURCE )
#define FLU_ERRNOFLASHFILES  (
HM_FLASH_NO_FILES )
#define FLU_ERROUTOFDISKSPACE (
HM_FLASH_CREATE_TEMP )
#define FLU_ERRFILECORRUPTED (
HM_FLASH_BAD_CHECKSUM )
#define FLU_ERRNOCHECKSUM    ('
HM_FLASH_NO_CHECKSUM )

#define FLU_2MEGTHREASHHOLD  16
#define FLU_1MEGEXTENDEDRAM  1000

#define PND_INTNUM           0x0087
#define PND_POLLFREQ         2
#define PND_EVENTNUM         6

#define PND_SLEEPPOLLFREQ    8
#define PND_GETDATA          0x0010
#define PND_PENUP            0x03
#define PND_PENDOWN          0x01
#define PND_PENDOWNMOVE      0x03
#define PND_NOICON           -1
#define PND_ICONSLEEP        0x0000
#define PND_ICONSETUP        0x0001
#define PND_ICONOSK          0x0002
#define PND_ICONPALLETTE     0x0003
#define PND_ICONSPEAKER      0x0004
#define PND_ICONLRMOUSE      0x0005
#define PND_ICONHOSTCTRLMODE 0x0006
#define PND_UDEF1            0x0007
#define PND_UDEF2            0x0008

#define PND_SETDEVICEMODE    0x0011
#define PND_MOUSEMODE        0
#define PND_PENMODE          1

#define PND_SETVIDEOMODE     0x0012

#define PND_SETUPDLGMODE     0x0013
#define PND_SETUPDLGOFF      0
#define PND_SETUPDLGON       1

#define PND_SETMOUSEBUTTON   0x0016
#define PND_LEFTMOUSE        0x0000
#define PND_RIGHTMOUSE       0x0001

#define PND_OSKDIMEN         0x0018

#define PND_HOSTMODE         0x0019
#define PND_DOSAPP           0x0000
#define PND_MSWINDOWS3X      0x0001
#define PND_MSWFW            0x0002
#define PND_MSPENWINDOWS     0x0003
#define PND_MSWINDOWS95      0x0004

#define PND_SETEVENTHANDLER  0x0020

#define PND_SETCALIBMODE     0x0030
#define PND_CALIBUL          0x00
#define PND_CALIBLR          0x01

#define PND_GETCALIBSTAT     0x0031
#define PND_CALIBULSTAT      0x0001
#define PND_CALIBLRSTAT      0x0002
#define PND_CALIBVALID       0x0004
#define PND_CALIBDONEINVALID 1
#define PND_CALIBDONEVALID   0
#define PND_CALIBNOTDONE     -1

#define PND_ENABLENEWCALIB   0x0032

#define PND_HOTICONCONFIG    0x0041
#define PND_MAXXDIGITIZER    3500
#define PND_MAXYDIGITIZER    3500
#define PND_NUMHOTICONS      8
#define PND_TOPMARGIN        50
#define PND_RIGHTMARGIN      4
#define PND_VERTSPACING      75
#define PND_HEIGHT           200
#define PND_WIDTH            400


#define PND_XUPPERPENCALIB   0x0252
#define PND_YUPPERPENCALIB   0x037F
#define PND_XLOWERPENCALIB   0x0C36
#define PND_YLOWERPENCALIB   0x0D7D


#define SMU_ERRORFREQ        1000
#define SMU_ERRORDUR         64
#define SMU_QSCAN            0x10
#define SMU_ALTQSCAN         ( SMU_QSCAN +
M_LA )

#define DBT_INTNUM           0
#define DBT_POLLFREQ         1
#define DBT_MAXRETRY         10

#define INI_INTNUM           0
#define INI_POLLFREQ         0

#define HLD_POLLFREQ         15
#define HLD_MAXRETRIES       5

#define HLD_MAXNUMHOSTENTRIES 100
#define HLD_MAXLENHOSTENTRY  (
SCS_MAXLENNODEADD +
SCS_MAXLENHOSTDATA )

#define HLD_VALIDSERIALS     0
#define HLD_DUPLICATESERIALS 1
#define HLD_INVALIDSERIALS   2

#define HLD_NOHOSTAVAIL      -1
#define HLD_NOTINGROUP       -1
#define HLD_NOHOSTSELECTED   0

#define PMS_WINDOWSLOADED    0x0001

#define SBS_INTNUM           0x0015
#define SBS_SLINTNUM         0x006B
#define SBS_PENNOTIFYPOLLFREQ 2
#define SBS_SARATOGAFUNC     0xE000
#define SBS_MEMORYTOEEPROM   0x0003
#define SBS_EEPROMTOMEMORY   0x0004
#define SBS_ADJUSTBRIGHTNESS 0x0006
#define SBS_ADJUSTCONTRAST   0x0007
#define SBS_SUSPENDFLAGPTR   0x0010
#define SBS_ENADISSPEAKER    0x000A
#define SBS_ENADISRIGHTMOUSE 0x000B

#define SBS_GETBATTERYINFO   0x0005
#define SBS_GETBATTERYINFOERROR 0L
#define SBS_IBPSTATEMASK     0x00800000

#define SBS_ACDCSTATEMASK
0x00400000
#define SBS_SLOWCHARGEMASK
0x00200000
#define SBS_FASTCHARGEMASK
0x00100000
#define SBS_BATTERYATTACHEDMASK
0x000000FF
#define SBS_BATTERYCAPACITYMASK
0x0000FF00

#define SBS_VIDMODEMASK      0x80

#define SBS_BATTERYATTACHED  1L
#define SBS_BATTERYFLASHMINCAP 40

#define SBS_NOINT15BATTERYINFO (
SBS_ACDCSTATEMASK | 0x00000001 |
0x00006400 )

#define SBS_GETSYSRESUMEBIT  0x001E
#define SBS_CLEARSYSRESUMEBIT 0x001F
#define SBS_NORMALBOOT       0x0000
#define SBS_RESUMING         0x0001

#define SBS_GOTOSLEEP        0x0012
#define SBS_GOTOSUSPEND      0x000E
#define SBS_GOTOSUSPENDSAVE  0x000F

#define SBS_WAITINGICON      0x000C
#define SBS_WAITINGICONOFF   0
#define SBS_WAITINGICONON    1

#define SBS_ENABLEKBD        0x0015

#define SBS_TOWERWAVESICON   0x000D
#define SBS_TOWEROFF         0x0000
#define SBS_TOWERON          0x0001
#define SBS_TOWERLOWBLINK    0x0003
#define SBS_TOWERMEDBLINK    0x0005
#define SBS_TOWERHIGHBLINK   0x0007
#define SBS_WAVESOFF         0x0000
#define SBS_WAVESON          0x0001
#define SBS_WAVESLOWBLINK    0x0003
#define SBS_WAVESMEDBLINK    0x0005
#define SBS_WAVESHIGHBLINK   0x0007

#define SBS_VIDINTNUM        0x0010
#define SBS_VIDEO            0x1200
#define SBS_VIDEOPALLETTE    0x0098

#define SBS_ENABLEDISABLEWRITE 0x0009
#define SBS_ENABLEWRITE      0x0001
#define SBS_DISABLEWRITE     0x0000

#define SBS_SARATOGAFLASH    0xE100
#define SBS_FLASHNOTEXT      0x0000
#define SBS_FLASHWITHTEXT    0x0001
#define SBS_FLASHAVAILABLE   0x0002
#define SBS_FLASHAVAILRETCODE 0x00E1

#define SBS_1MEGBASESECTOR   0x70
#define SBS_2MEGBASESECTOR   0x60

#define SBS_FLASHSUCCESS     0x00
#define SBS_FLASHACNOTATTACHED 0x01
#define SBS_FLASHERASEERROR  0x02
#define SBS_FLASHPROGERROR   0x03

#define SBS_SETPOWERENABLE   0x0017
#define SBS_POWERMANDISABLED 0
#define SBS_POWERMANENABLED  1
#define SBS_POWERMANONDCONLY 2

#define SBS_SETDOZETIMEOUT   0x0019
#define SBS_DOZEDISABLED     0
#define SBS_DOZE1SECONDS     1
#define SBS_DOZE4SECONDS     2
#define SBS_DOZE8SECONDS     3
#define SBS_DOZE16SECONDS    4

#define SBS_SETSLEEPTIMEOUT  0x001b
#define SBS_SLEEPDISABLED    0
#define SBS_SLEEPIN1MIN      1
#define SBS_SLEEPIN2MIN      2
#define SBS_SLEEPIN4MIN      3
#define SBS_SLEEPIN6MIN      4
#define SBS_SLEEPIN8MIN      5
#define SBS_SLEEPIN12MIN     6
#define SBS_SLEEPIN16MIN     7

#define SBS_SETSUSPENDTIMEOUT 0x001d
#define SBS_SUSPENDDISABLED  0
#define SBS_SUSPENDIN5MIN    1
#define SBS_SUSPENDIN10MIN   2
#define SBS_SUSPENDIN15MIN   3
#define SBS_SUSPENDIN20MIN   4
#define SBS_SUSPENDIN30MIN   5
#define SBS_SUSPENDIN40MIN   6

#define SBS_SUSPENDIN60MIN   7

#define SBS_LENMOUSECFGDATA  8
#define SBS_OFFMOUSECFGDATA  0
#define SBS_OFFUICFGDATA     0

#define SBS_DEFVIDPALLETTE   0x00
#define SBS_INVVIDPALLETTE   0x03
#define SBS_MAXNUMVIDPAL     0x05

#define SBS_GETBIOSVERSION   0x0080

#define SBS_SIZEOFEXTENDEDMEM  0x8800

#define SBS_SETVIDEOMODEFUNCS  0x00
#define SBS_LOWTEXTVIDMODE   0x00
#define SBS_HIGHTEXTVIDMODE  0x03

#define SBS_MISCELLANEOUSFUNCS 0x12
#define SBS_SETSCANLINESTEXTMODE 0x30
#define SBS_200SCANLINES     0
#define SBS_350SCANLINES     1
#define SBS_400SCANLINES     2

#define SBS_CHARACTERGENFUNCS  0x11
#define SBS_8X14FONTAFTERMODE  0x11
#define SBS_8X8FONTAFTERMODE   0x12
#define SBS_8X16FONTAFTERMODE  0x14

#define SBS_CMOSREADHIGHBYTE   0x31
#define SBS_CMOSREADLOWBYTE    0x30
#define SBS_CMOSPORT           0x0070
#define SBS_CMOSEXTENDEDMEM    0x0071

#define SBS_TELETYPE         0x0E
#define SBS_RELOCATEDSCRADD  0xFE

#define SBS_DRIVERSLOADING   1
#define SBS_SUILOADING       2

#define CRU_RETURNWITHIRET   0
#define CRU_REFLECTINT       2

#define CRU_ONBUSYIRET       0
#define CRU_ONBUSYOLDINT     1
#define CRU_ONBUSYEITHER     2

#define CRU_COLDBOOT         1
#define CRU_WARMBOOT         0

#define FNA_NOTFOUND         -1

#define SRT_MAXLENSWAPBUFF 35

#define PMI_REQSCSBLANKSCR   (
HM_PM_BLANKSCR )
#define PMI_REQSCSUNBLANKSCR (
HM_PM_UNBLANKSCR )
#define PMI_REQSCSLOCKKBMO   (
HM_PM_LOCKKBMO )
#define PMI_REQSCSUNLOCKKBMO (
HM_PM_UNLOCKKBMO )

#define PMI_REQFLASHUPD      (
HM_PM_FILEREQ )
#define PMI_ACKTOTALFILES    (
HM_PM_TOTALFILES )
#define PMI_REQPATHFROMIDX   (
HM_PM_PATHREQ )
#define PMI_ACKPATHASSTRING  (
HM_PM_PATHREP )
#define PMI_REQFLASHDONE     (
HM_PM_FLASHOK )
#define PMI_REQACTIVEUPGRADE (
HM_PM_FLASH_NAMQ )
#define PMI_ACKACTIVEUPGRADE (
HM_PM_FLASH_NAMP )

#define PMI_REQHOSTCONTROL   (
HM_PM_HOSTCON )

#define PMI_ACKNOTIFYDOSWIN  (
HM_PM_DOSWIN_ACK )

#define PMI_REQOCCDEFINE     (
HM_PM_OSK_DEFINE )
#define PMI_ACKOCCDEFINE     (
HM_PM_OSK_DEFINE_ACK )
#define PMI_REQOCCCLOSE      (
HM_PM_OSK_CLOSE )
#define PMI_ACKOCCCLOSE      (
HM_PM_OSK_CLOSE_ACK )
#define PMI_REQUNIOCCCLOSE   (
HM_PM_OSK_CLOSE_UNI )
#define PMI_ACKUNIOCCCLOSE   (
HM_PM_OSK_CLOSE_UNI_ACK )

#define PMI_NOACK            0
#define PMI_ACKEDTRUE        1
```

```
#define PMI_ACKEDFALSE      -1

#define SID_INTNUM          3
#define SID_FUNCNUM         0x0800
#define SID_OUTSTRING       0x0010
#define SID_SISIG       0x4647
#define SID_DISIG       0x4A4D

#define STR_SEPARATOR       '|'
#define STR_SMVERSIONNAME       "1.00"
#define STR_SMVERSIONNUM        "1.00"
#define STR_SMABOUTBOX      "|Copyright (c)
1994-1995 Zenith
Data|Systems Corporation||System Software Version
%s|BIOS Version
%x.%x|"
#define STR_SMMODULENAME        "Saratoga
Man"
#define STR_FLUNOFLASHFILES     "The Flash
Upgrade is not
available on|the CruisePAD Host.|"
#define STR_FLUREADHOSTDAT      "A file called
HOST.DAT is
unreadable on|the CruisePAD Host.|"
#define STR_FLUMISSINGFLASH     "The Flash
Upgrade is missing a
file on|the CruisePAD Host.|"
#define STR_FLUOUTOFDISKSPACE  "The
CruisePAD Host is out of disk
space.|"
#define STR_FLUFILECORRUPTED    "One or more
of the upgrade files
on the|CruisePAD Host have been corrupted.|"
#define STR_FLUNOCHECKSUM       "The
\"checksum\" for one or more
of the|upgrade files on the CruisePAD Host
is|missing.|"
#define STR_FLUHOSTNOACK        "The
CruisePAD Host does not
acknowledge|the upgrade request.|"
#define STR_FLUSENDPRIMSG       "An error
occured when
communicating|with the CruisePAD Host.|"
#define STR_FLUNOAC         "The CruisePAD is
not plugged
in.|"
#define STR_FLUFLASHERASE       "An error
occured when attempting
to|erase the Flash ROMS.|Contact Customer
Support.|"
#define STR_FLUFLASHPROG        "An error
occured when attempting
to|program the Flash ROMS.|Contact Customer
Support.|"
#define STR_FLUEEROMNOCLR       "An error
occured when clearing
the|CruisePAD EEROM.|"
#define STR_FLURAMALLOCATION    "An error
occured when attempting
to|allocate RAM.|"
#define STR_FLUFLASHUNKNOWN     "An
unspecified error has occured
when|updating the Flash ROMS.|"
#define STR_FLUUNKNOWNERROR     "An
unspecified error occured.|"
#define STR_FLUUNKNOWNHOSTERR  "An
unspecified error occured on
the|CruisePAD Host.|"
#define STR_FLUNOACKTMPERROR    "An error
occured when
processing|the CruisePAD upgrade files on
the|Host.|"
#define STR_FLUNOACKNUMFILEERR "An error
occured while
waiting|for the Host to report the number of|upgrade
files.|"
#define STR_FLUNOACKPATHERROR  "An error
occured while
waiting|for the Host to report the path name|of an
upgrade
file.|"
#define STR_FLUNOACKRECVFILEERR "An error
occured when
transferring|files from the CruisePAD Host.|"
#define STR_FLUNOACKRECVFATAL  "The
upgrade has failed.  You
may|attempt the upgrade again, but do not|turn off
CruisePAD
until it is|successful.|"
#define STR_FLU1MEGSYSERROR     "This
CruisePAD is a 1 MB
system|and will not support a 2 MB upgrade.|"
#define STR_FLU2MEGSYSERROR     "This
CruisePAD is a 2 MB
system|and will not support a 1 MB upgrade.|"
#define STR_FLUGETBATINFOERROR "An error
occured when
attempting|to determine the status of the
CruisePAD|battery.|"
#define STR_FLUNOBATERROR       "A battery
must be inserted in
CruisePAD.|"
#define STR_FLUBATTOOLOWERROR  "The
battery must be at least
2/5|charged.|"
#define STR_FLUUNKNOWNBATERROR "An error
occured when
determining|the status of the CruisePAD|battery.|"
#define STR_FLUNOCONNECTERROR  "The
CruisePAD is not connected to
a|CruisePAD Host.|"
#define STR_FLULINKTOOLOWERROR "The
connection to the CruisePAD
Host is|too weak.|"
#define STR_FLUNOTINDOSAPP      "The
CruisePAD Host is not at
the|DOS prompt.|"
#define STR_HLDDUPSERIALNUMS    "Duplicate
CruisePAD Host serial
numbers|were detected.  Please verify that
all|installations are
valid.|"
#define STR_HLDINVSERIALNUMS    "Invalid
CruisePAD Host serial
numbers|were detected.  Please verify that
all|installations are
valid.|"
#define STR_SUIFRAMETYPE        "The new Frame
Type will not take
effect|until CruisePAD is restarted (double|tap of the
Sleep Hot
Icon).|"
#define STR_SUISECURITYID       "The Security ID
may not be
changed|until after CruisePAD is disconnected.|"
#define STR_SUIDOMAINID         "The new Domain
ID will not take
effect|until CruisePAD is restarted (double|tap of the
Sleep Hot
Icon).|"
#define STR_SUIESTABLISHCONN    "Attempting to
establish the
requested|connection...||Press the CANCEL button
to abort.|"
#define STR_SUIRESUMINGCONN     "Attempting
to resume the last
active|connection...||Press the CANCEL button to
abort.|"
#define STR_SUIRESUMINGCONN2    "Attempting
to resume the last
active|connection...|"
#define STR_SUILOADERROR1       "\nError: An
error occurred when
attempting to load the CruisePAD User Interface.\n"

#define STR_SUILOADERROR2       "\nError: The
SUI may only be
loaded from within the Saratoga Loader.\n"
#define STR_SUICONNECTFAILED    "The
attempted connection
failed.|"
#define STR_SUICONNECTTIMEOUT  "The
CruisePAD Host is not
responding to|the connection request.|"
#define STR_SUICANCELINPROG     "The
attempted connection is
being|canceled.||Please wait...|"
#define STR_SUIPASSWORDREJECTED "The
password entered is
invalid.|"
#define STR_SUILOGINIDREJECTED  "The login
ID is invalid.|"
#define STR_SUIUNSUPVIDMODE     "The
CruisePAD Host is in an
unsupported|video mode.|"
#define STR_SUIHOSTVERTOOLOW    "The
version number of the
CruisePAD Host|software is too low. Please
install|an update disk
for version|%s|or higher.|"
#define STR_SUICONNECTERRUNKNOWN "An
error occurred when
attempting|to connect to the CruisePAD Host.|"
#define STR_SUINOHOSTSELECTED   "No
CruisePAD Host was selected.
Please|select a Host from the Host|list box and try
again.|"
#define STR_SUIBADVIDEOMSG      "The
CruisePAD Host has switched
to a|video mode which is not supported by
the|CruisePAD.|"

#define STR_STRMAXLENERR        192

#define GEN_SMMAJORVERSIONNUM   1
#define GEN_SMMINORVERSIONNUM   0x00
#define GEN_HMEXPMAJORVERSIONNUM 1
#define GEN_HMEXPMINORVERSIONNUM 0x00
#define GEN_CARRYFLAG           0x100
#define GEN_MAXLENTEMPSTR       128

int     InitDispatcher( void );
int     ShutDownDispatcher( void );
void    InstallRecs( void );
int     AddThread( int iIdx, NEARPROC fpThread,
APIFUNC
aAPIFuncTable[],
            THREADTYPEID ThreadTypeId,
BOOL fReentrant,
LONG lTimeLimit,
            int iRetryLimit );
int     DelThread( int iIdx );
BYTE    IsThreadActive( int iIdx );
void    ResetTime( int iIdx );
int     SetRetryLimit( int iIdx, int iNewRetryLimit );
BYTE    GetRetryLimit( int iIdx );
BYTE    GetInitRetryLimit( int iIdx );
int     ResetRetryLimit( int iIdx );
int     SetTimeLimit( int iIdx, LONG lNewTimeLimit
);
THREADTYPEID GetThreadType( int iIdx );
NEARPROC  GetThreadAddress( int iIdx );
void    PushEventNum( int iEventId ),
int     PopEventNum( void );
int     GetTempEventNum( void );

void    Dispatch( THREADTYPEID, int iThreadIdx
);
WORD    TrapService( struct trap_rec
*CurrTrapRec );
void    FCallService( WORD wAX );
void    KbdService( WORD wHotKey );
void    ClockTick( void );
void    DecClockReCount( void );
WORD    GetLastKey( void );

void    SetDispatchActive( BOOL
bNewDispatchActive );
BOOL    GetDispatchActive( void );

void    CrankGear( BYTE *, char * );


APIFUNC *  GetPNDFuncTable( void );
BYTE    GetCurrHostMode( void );
void    CheckPenDriver( void );
void    SetPNDActiveStatus( BOOL fPenDriverStat
);
BOOL    GetPNDActiveStatus( void );
int     GetHotIcon( void );
APIFUNCRET PenDriverLoading( struct REGW
*CallerRegs );
void    InitPND( void );
void    InitPNDTrapRec( void );
TRAPREC *  GetPNDTrapRec( void );
int     GetHotIcon( void );
int     SetDeviceMode( int iPenMode );
int     NotifyVideoMode( int iVideoMode );
int     SetSetupDlgMode( int iDlgMode );
int     SetOSKMode( OCCLUDEUNION *OccArea,
OCCTYPE OccType );
int     SetPenButtonMode( BYTE
nNewPenButtonMode );
int     SetMouseButtonMode( void );
int     SetHostMode( int iHostMode );
int     SetCalibMode( int iCalibMode, int xCalibPnt,
Int
yCalibPnt );
Int     GetCalibState( int iCalibMode, int
*xUpperCol, int
*yUpperRow,
            int *xLowerCol, int *yLowerRow
);
int     EnableNewCalib( BOOL fEnableNewCalib );
int     ActivateSleepMode( void );
void    WaitForSleep( void );

APIFUNC *  GetSCSFuncTable( void );
void    CheckScosDriver( void );
void    SetSCSActiveStatus( BOOL
fNewSCSActive );
BOOL    GetSCSActiveStatus( void );

void    SetSCOSNotified( BYTE
fNewSCOSNotified );
BOOL    GetUpdatingConnectStatus( void );

void    SetUpdatingConnectStatus( BOOL
fNewStatus );

void    SetConnectRequested( BOOL
fNewConnectRequested, BYTE
nUpdateIcon );
BOOL    GetConnectRequested( void );
NPSTR   GetPrivateMsgBuff( int *iBuffLen );
char    GetConnectErrCode( void );
int     GetSCOSErrNo( BYTE fClearError );
void    SetFullRepaint( int iNewFullRepaintDone );
void    InitSCSTrapRec( void );
TRAPREC *  GetSCSTrapRec( void );
void    InitSCSCallRec( void );
void FAR  SCSEventLoopService( void );
void FAR  SCSRecvMsgService( void );
APIFUNCRET SCSLoading( struct REGW
*CallerRegs );
APIFUNCRET AckFlashBreak( struct REGW
*CallerRegs );
APIFUNCRET AckTotalFlashFiles( struct REGW
*CallerRegs );
APIFUNCRET AckPathFlashFile( struct REGW
*CallerRegs );
APIFUNCRET AckActiveUpdate( struct REGW
*CallerRegs );
APIFUNCRET AckOccDefine( struct REGW
*CallerRegs );
APIFUNCRET AckOccClose( struct REGW
*CallerRegs );
APIFUNCRET UnloadOSK( struct REGW
*CallerRegs );
APIFUNCRET ChangeToBadVideo( struct REGW
*CallerRegs );
APIFUNCRET NotifyDosWin( struct REGW
*CallerRegs );
APIFUNCRET NotifyUniOccClose( struct REGW
*CallerRegs );

int     PrepPrivateMessage( struct REGW
*CallerRegs );
void    SetupSCOS( void );
int     SetupSCOSErrNo( int FAR *iMemLocation );
int     BlockSCOSVideo( BYTE fVideoStatus );
void    WaitVidUnblock( void ),
int     DoHostControlMode( BOOL
fHostControlStatus );
void    WaitForHostControl( void );
int     MakeTheConnection( BOOL
fNewMonStatus, BOOL
fNewLocalKbdStatus );
int     ResumeTheConnection( void );
void    DoVersionMsgBox( void );
void    CBExecConnect( void );
void    WaitForCancelConnect( void );
void    CBLoginButtonPressed( int iButtonCode );
void    CBMsgBoxButtonPressed( int iButtonCode
);
void    DoNextScreen( void );
void    DoExecConnect( void );
void    WaitForSUIUnload( void );
int     SetMonitor( BOOL fNewMonStatus, BOOL
fNewLocalKbdStatus );
void    CBExecMonitor( void );
int     CheckMonitor( void );
int     SetSCSMemory( int iNewFreeMemPercent,
int iNewOSKType,
BYTE nDosBusy );
void    CBExecSCSMemory( void );
BOOL    CheckSCSMemory( void );
void    WaitForStatusChange( void );
int     RequestFullRepaint( BYTE
fRepaintRequired, WORD
wScreenCode );
void    CBFullRepaint( void );
int     CheckFullRepaint( void );
int     DiscoDisableConnection( void );
void    WaitForDisco( void );
int     SendPrivateMessage( int iMsgId, int
iBuffLen, char
*sMsgBuff );
void    WaitForSendPM( void );
int     GetSCSCallProgress( void );
int     GetSCSProtocolId( void );
int     GetSCSVideoMode( void );
void    SetSCSAbortFlag( BYTE
fNewAbortRequest );
Int     ReceiveHostFile( char *szHostFileName,
LPSTR
sFileBuff, LONG lFileSize );
int     SendUDHotIcon( int iHotIconID );
int     GetNumScanCodes( SCANCODE FAR
*pScanCodes );
int     SendScanCode( BYTE nScanCode );
int     SendLockKbdMouse( BOOL bLocked );
int     SendDimScreen( BOOL bDimmed );
int     RequestAbortConnect( void );
CONNERROR  TranslateConnectError( void );

int     SetSCSSaraStatus( int iNewStatus );
int     SetSCSFullRepaint( void );
int     SetSCSScrolling( BYTE nScrollStatus );
int     SetSCSOcclude( OCCLUDEUNION *occ, int
iOccType );
int     DefineSCSOcclude( OCCLUDEUNION *occ,
int iOccType,
BYTE fRepaint );
```

```
void      SetSCOSNotified( BYTE
fNewSCOSNotified );
void      SetOccDefineAcked( char
nOccDefineStatus );
char      GetOccDefineAcked( void );
void      SetOccCloseAcked( char nOccCloseStatus
);
char      GetOccCloseAcked( void );
void      SetOSKVisible( char nNewOSKStatus );
int       CreateOccludedArea( void *OccMap, int
iCurrVidMode,
int iFreeMem );
int       SetWinHostOcclude( OCCLUDERWIN
*OccRWIN );
void      WaitForDefineOcc( void );
int       CloseHostOcclude( void );
void      WaitForCloseOcc( void );
int       SetInitHostOcclude( int iScrCode );
int       SetDOSGraphHostOcclude(
OCCLUDEDOSGRAPHICS
*OccDosGraphics );
void      DoDOSGraphHostOcclude( void );
int       SetDOSTextHostOcclude( OCCLUDETEXT
*OccDosText );
int       SetSCSHostOcclude( OCCLUDEUNION
*occ, int iNewOccType,
BYTE fNewRepaintRequired );
void      DoSCSHostOcclude( void );


LONG      GetOldVidVector( void );
APIFUNCRET  SLGetFrameType( struct REGW
*CallerRegs );
APIFUNCRET  SLGetMLIDStatus( struct REGW
*CallerRegs );
APIFUNCRET  SLDefineOldVidVector( struct
REGW *CallerRegs );
APIFUNCRET  SLEnableKbd( struct REGW
*CallerRegs );
APIFUNCRET  SLLoadSUI( struct REGW
*CallerRegs );
void      CBExecLoadSUI( void );

void      GetForegroundRegs( struct REGW
*InRegs );
void      SetForegroundRegs( struct REGW
*OutRegs );
void      Trace( char *szOutStr );
void      CallAPIFunction( APIFUNC
aAPIFuncTable[] );
APIFUNCPTR  GetAPIFunction( APIFUNC
aAPIFuncTable[], struct REGW
*pCallerRegs );
int       ErrorBeep( void );
void      DoSpkrRestore( void );
int       SMDosBusy( DOSBUSYCB fnCallBack );
void      SMCheckDosBusy( void );
int       SMVideoBusy( VIDBUSYCB fnCallBack );
void      SMCheckVideoBusy( void );
int       GetVideoMode( BOOL fSaveState )
void      SetReentrancy( BOOL fEnable );
int       RestoreVideoMode( void );
WORD      SetVideoMode( BYTE
nRequestedMode );
int       VideoState( char *sVidBuff, char
nDataType  char
nOperation );
int       JimExec( char szProgName[], char
szCmdLinParm[] ):
WORD      GetFreeMCB( WORD wNumPara ),
int       SetFreeMCB( WORD wSegment ),
int       StuffKeyStr( char * );
BOOL      IsGetFunction( struct REGW
*CallerRegs );
char      *ParseForFileName( char *szPathName );
BOOL      IsNodeAddressBlank( char
*sNodeAddress );
int       DoModalMsgBox( MODALMSGBOXCB
fnCallBack, int
iMsgBoxTimeOut );
void      WaitForOK( void );
int       AbsToZero( int iValue );
int       SetMemStrategy( int iStatCode );

void SetPenSpkFreq( void );

APIFUNC *   GetSUIFuncTable( void );
CALLREC FAR *GetSUICallRec( void );
TRAPREC     *GetSUIMouseTrapRec( void );
int       GetCurrActionCode( void );
WORD      GetCurrScrCode( void );
void      SetCurrScrCode( WORD
wNewScreenCode );
char      GetSUIStatus( void );
void      InitSUICallRec( void )
void      RestoreOldSUIIntVec( void );
BOOL      GetSUIReady( void );

APIFUNCRET  SetActiveStatus( struct REGW
*CallerRegs );
APIFUNCRET  RequestUnload( struct REGW
*CallerRegs );
APIFUNCRET  RequestConnDisco( struct REGW
*CallerRegs );
void      DoNoHostSelMsgBox( void );
APIFUNCRET  GetConnectStatus( struct REGW
*CallerRegs ),
APIFUNCRET  BlockUnblockVideo( struct REGW
*CallerRegs );

BOOL      GetVideoBlocked( void );
int       LoadSUI( SUIACTIONCODE
NewActionCode, WORD
wNewScreenCode );
void      WaitForSUIAutoLoad( void );
void      WaitForPrepSUI( void ),
vo n      CBExecSUI( void );
voic      CBExecLoadScreen( void );
void      DoLoadScreen( void );
int       UnloadSUI( BYTE nNewResidentStatus );
void      WaitForUnloadSUI( void ):
void      CBExecUnloadSUI( void );
void      WaitForSUILoad( void );
void      SUITerminateAddress( void );
void      CleanupUnloadSUI( void ):
void      WaitForCleanupSUI( void ):

void      SetDomainWarning( BYTE
fNewDomainWarning );
void      SetSecurityWarning( BYTE
fNewSecurityWarning );
void      SetMsgBoxReturnCode( BYTE
nNewReturnCode );
BYTE      GetMsgBoxReturnCode( void ):

APIFUNCRET  SetSUIMBRetCode( struct REGW
*CallerRegs );
APIFUNCRET  SetKeyStroke( struct REGW
*CallerRegs );
APIFUNCRET  GetSetUDHoticon( struct REGW
*CallerRegs );
APIFUNCRET  GetSetSecurityID( struct REGW
*CallerRegs );
APIFUNCRET  GetSetDomainID( struct REGW
*CallerRegs );
APIFUNCRET  GetSetLockKbdMouse( struct
REGW *CallerRegs ):
APIFUNCRET  GetSetDimScreen( struct REGW
*CallerRegs );
APIFUNCRET  GetSetConnectType( struct REGW
*CallerRegs );
APIFUNCRET  GetKeyBoardStatus( struct REGW
*CallerRegs );
APIFUNCRET  GetAboutDialog( struct REGW
*CallerRegs );
AF'~ JNCRET  GetSetUDHotIcon( struct REGW
*CalierRegs );
APIFUNCRET  GetSetUILanguage( struct REGW
*CallerRegs );
APIFUNCRET  RebootHost( struct REGW
*CallerRegs ):
APIFUNCRET  GetPasswordStatus( struct REGW
*CallerRegs );
APIFUNCRET  GetSetUserId( struct REGW
*CallerRegs );
APIFUNCRET  GetSetPassword( struct REGW
*CallerRegs ):
APIFUNCRET  UpdateHostList( struct REGW
*CallerRegs );
APIFUNCRET  GetHostListStatus( struct REGW
*CallerRegs );
APIFUNCRET  LBGetSetNetGroup( struct REGW
*CallerRegs );
APIFUNCRET  LBGetSetNetHost( struct REGW
*CallerRegs );
APIFUNCRET  UpdateDimenLoc( struct REGW
*CallerRegs );
APIFUNCRET  GetSetContrast( struct REGW
*CallerRegs );
APIFUNCRET  GetSetBrightness( struct REGW
*CallerRegs );
APIFUNCRET  GetSetAutoShutOff( struct REGW
*CallerRegs );
APIFUNCRET  GetSetSleepTime( struct REGW
*CallerRegs );

int       EnableBusyCursor( int iStatus );
int       DoMessageBox( NPSTR szMsgText, int
iScrCode, char
nAlignment,
                int iButtons,
MODALMSGBOXCB
fnCallBack, int iMsgBoxTimeOut );
voic      ProcessMessageBox( NPSTR
szN :wMsgText, int iScrCode,
char nNewAlignment,
                     int iNewButtons )

int       OpenMessageBox( NPSTR szMsgText, int
iScrNumber,
char nAlignment, int iButtons );
int       FillMsgBoxBuff( MSGBOXBUFF
MsgBoxBuff[], char
*szMsgText, char nAlignment );
int       HideMessageBox( void );
int       UpdateSUIConnectStatus( void );

APIFUNCRET LBGetSetNetFrameType( struct
REGW *CallerRegs );
APIFUNCRET NotifyScreenCode( struct REGW
*CallerRegs );

APIFUNCRET  CalibratePen( struct REGW
*CallerRegs );
APIFUNCRET  CalibrateCancel( struct REGW
*CallerRegs );
void      WaitForPenCalib( void );

APIFUNC    *GetPRXFuncTable( void );
BOOL      GetPRXActiveStatus( void );
void      InitPRXTrapRec( void );
TRAPREC    *GetPRXTrapRec( void );
void      CheckSystem( void );

APIFUNCRET  RegisterPowerManCB( struct
REGW *CallerRegs );
void      WaitForPRXSetup( void );
APIFUNCRET  ProximDriverUnload( struct REGW
*CallerRegs );
APIFUNCRET  NetConfigData( struct REGW
*CallerRegs );
APIFUNCRET  XchgRevInfo( struct REGW
*CallerRegs );

int       NotifySuspend( void );
int       NotifyResume( void );
int       SetSecurityID( char *szNewSecurityID );
BOOL      IsSynchronized( void );
LPSTR     GetRomVersion( void );
int       GetLinkQuality( void );

void      SetCurrHostName( char
*szNewCurrHostName );
char *    GetCurrHostName( void );
char      GetRequestHostList( void );
void      SetRequestHostList( int );
int       GetLBCurrHost( void );
void      SetLBCurrHost( int iNewLBCurrHost );
int       GetLBCurrGroup( void );
void      SetLBCurrGroup( int iNewLBCurrGroup );
char *    GetLBGroup( int iGroupNum ).
char *    GetLBHost( int iHostNum );
int       GetLBHostStatus( int iHostNum );
int       SetLBHostStatus( int iHostNum, BYTE
nNewHostStatus
);
char *    GetCurrNodeAddress( void );
WORD      GetCurrHostVersionNum( void );
BOOL      IsPWRequired( void );
int       GetNumHostEntries( void );
int       GetNumGroupEntries( void );
int       GetGroupIdx( int iGroup ).
int       GetGroupNum( int iHostIdx );
int       GetHostIdx( int iHostNum );
int       SortGroupHost( void );
int       SortSerialNums( void );
int       ValidateSerialNums( void ).
int       RequestHostList( void ),
void      DoSendHLReq( void );
void      WaitForHLD( void );
int       SendRequestHostList( void );
int       CancelRequestHostList( void );
int       SaveNewHosts( void );
int       FindNodeAddress( HOSTLISTENTRIES
*pHostListEntries,
char *szKeyNodeAddress );
LONG      FindFirstAvailHost(
HOSTLISTENTRIES
*pHostListEntries );
int       AllocHLMem( HOSTLISTENTRIES
*HostListEntries, int
iNumEntries );
int       GetStatusHLInMem( void );
void      SetStatusHLInMem( int
iNewHostListStatus );
void      FreeHLMem( HOSTLISTENTRIES * );
void      FreeAllHLMem( void );
BOOL      IsZeroString( char szString[] );

char      GetEEPROMInited( void );
void      InitUIConfigData( void );
void      InitEEPROM( void );
void      InitSUI( void ),
void      InitSaratoga( BYTE nInitType );
int       GetEEMouseConfig( void );
int       SetEEMouseConfig( PENCALIB *pc ):
int       SetEEUIData( void );

int       GetEEUIData( UICONFIGDATA
*CurrUIConfigData );
int       ClearEEPROM( void );

int       SetContrast( BYTE nContrastIdx );
int       SetBrightness( BYTE nBrightnessIdx );
int       SetDozeTimeout( BYTE nDozeIdx );
int       SetPowerEnable( BYTE nPowerManIdx );
int       SetSleepTimeout( BYTE nSleepIdx );
int       SetSuspendTimeout( BYTE nSuspendIdx
);
void      Set2MegFlash( BOOL fNew2MegFlash );
BOOL      IsFlashSupported( void );
int       FlashSector( LPSTR sFlashImageBuff, int
iCurrFlashFile );
int       EnableFlashWrite( BOOL fEnable );
int       RotatePallette( void );
int       ToggleSpeaker( void );
BYTE      GetRightMouseStatus( void );
int       EnableRightMouseButton( BYTE
nNewRightMouseButton );
int       SetTowerIcon( BYTE nTowerStatus, BYTE
nWavesStatus
);
int       DoSleep( void );
int       DoSuspend( BOOL fSaveEEROMData );
int       SetSuspendFlagPointer( void );
void      SetSuspendFlag( BOOL fStatus );
BOOL      GetSuspendFlag( void );
int       GetSystemResumeBit( void );
int       ClearSystemResumeBit( void );
int       SetWaitingIcon( BYTE nWaitingIconStatus,
BYTE
fBusyCursor );
int       EnableKbdAfterBoot( void );
LONG      GetBatteryInfo( void );
WORD      GetSizeOfExtendedMem( void );
int       GetBIOSVersion( void );

void FAR    SUICallService( void );
int       GetPendingEvent( void );

APIFUNCRET  DoUpdate( struct REGW
*CallerRegs );
APIFUNCRET  RequestActiveUpdate( struct REGW
*CallerRegs );

void      WaitForActiveUpdate( void );
void      GetFlashImageBuff( void );
void      WaitForFlashUpdate( void );
void      WaitForFlashError( void );
void      ReleaseFlashMem( void );
int       UpdateTmpFilePercentage( int
iNewTmpFilePercent );
int       UpdateFlashPercentage( int iFlashFileNum
);
int       GetActiveUpdate( void );
void      WaitForActiveUpdate( void ),
int       SetPathFlashFile( LPSTR
szNewPathFlashFile );
int       SetTotalFlashFiles( int
iNewTotalFlashFiles );
int       SetNameActiveUpdate( LPSTR
szNewActiveUpdate );
char      *GetNameActiveUpdate( void );
int       SetTmpFilePercent( int iNewPercent );
int       GetTmpFilePercent( void );
int       GetTotalFlashFiles( void );
char      *GetPathFlashFile( void );
FLASHUPDATESTATES CheckFlashPowerState(
void ).

void   InitVIDTrapRec( void );
TRAPREC *GetVIDTrapRec( void );
char    GetYCharRes( void );
char    GetXCharRes( void );
int    GetYScreenRes( int iVideoMode );
int    GetXScreenRes( int iVideoMode );
int    GetCurrVidMode( void );
BOOL    VIDTrapService( void );
void    AfterModePenNotify( void );
void    WaitForPenNotify( void );

int SortList( int wTotalEntries, int wEntrySize, int
wPrimeOffset,
         int wSecondOffset,  char *cpEntryBuff );
int SwapEntries( char *cpEntry1, char *cpEntry2, int
wEntrySize
);
long GetEntryOffset( int wTotalEntries, int
wEntrySize, int
wKeyOffset,
              int wKeyNumber, char *cpEntryBuff
);

int PatchMCB( void );
int SetMemStrategy( int iStatCode );

int _and_isr_flg( char mask );
```

```
extern THREADTYPEID ActiveThreadType;
extern char szSMSignature[];
extern char szSMVersionName[];
extern char szSMVersionNum[];
extern char szSMModuleName[];
extern char szSUIExecName[];
extern char nRLNIntNum;
extern char szTempStr[];
extern char szTempMsgStr[];
extern char szNullStr[];
extern char szPassword[ SUI_MAXLENPASSWORD
+ 1 ];
extern char szSCSAbortConn[];
extern UICONFIGDATA UIConfigData;
extern WORD aHotKeys[];
extern WORD RDATA;
extern MREG MEventOutArgs;
extern FARCALLENTRY lpfnFarCallEntry;
extern SUICB lpfnSUICallBack;
extern LISTBOXENTRY ListBoxEntry;
extern MSGBOXBUFF MsgBoxBuff[];
extern BUFFHEADER BuffHead;
extern WORD wScreenCode;
extern WORD wOldScreenCode;

#define ERR_SUCCESS         0
#define ERR_NOTSUPPORTED    -1
#define ERR_INTERNAL        -2
#define ERR_INVALIDPARM     -3
#define ERR_OUTOFMEM        -4
#define ERR_VERSIONMISMATCH -5
#define ERR_UPGRADENOTAVAIL -6
#define ERR_SCSBUSY         -7
#define ERR_SCSOCCFAILED    -8
#define ERR_SCSSCROLLING    -9
#define ERR_SCSIDLE         -10
#define ERR_SCSFULLREPAINT  -11
#define ERR_INPROGRESS      -15000

#define ERR_PNDINTERNAL     -2


typedef enum
{
  TIMEOUT_ERROR,
  TIMEOUT_AVAILABLE,
  TIMEOUT_NOTAVAILABLE,
  TIMEOUT_RUNNING,
  TIMEOUT_FIRED

} TIMEOUT;

typedef enum
{
  TF_SET,
  TF_RESET,
  TF_CHECK

} TIMEOUT_FLAG;

TIMEOUT TimerManager (TIMEOUT_FLAG
fTimeout, int iThreadIdx, long
ticks),
Copr 1995 Zenith Data Systems Corp.
typedef struct mem_rec {
     word block_type:
     word owner;
     word size
     word hdr_seg;
} MEM_REC:
extern char _dos_version[];
word   get_master_env(void):
void   keep_env(void):
word   get_command_psp(void);
int    get_app_name(word AppPSP,void
*AppFname);
extern char far *_cur_app_name;
word   get_dos_mem(word MinSize,MEM_REC
*State):
void   ret_dos_mem(MEM_REC *State);
extern word mouse_size,
word   max_app_mem(void);
dword  calc_app_mem(void);
word   get_app_mem(void *MouseBuf,int
Handle,word LimSeg,word
Min,word Max);
extern word app_MCB,_spw_switch;
extern byte _load_imask[];
void   far *get_app_ptr(void);
void   ret_app_mem(void *MouseBuf,int Handle,fp
ErrorFunct);
int    get_lim_mem(int Handle,int Page,int Cnt,word
Loc,word
LimSeg);
extern word lim_MCB;
int    ret_lim_mem(word Ctl);

int    spawn(void *Program,void *CmdLn,word
Env,word FreeMCB):
int    spawn_nr(void *Program,void *CmdLn);
word   shrink_mem(word NewStackSize);

int    spawn_in(void *Program,word Env,int
BufHandle);
void   prep_shared_mem(word SharedSize);
extern void *shared_mem;
void   far *get_shared_mem(void);
word   split_mcb(word OrigMCB,word NoPara);
void   far *fil_wrd(void far *Mem,word Filler,word
Cnt);

int    make_dos_idle(void *DosStateBuf);
void   undo_dos_idle(void *DosStateBuf),
extern word _dos_idle_len;
void   _no_dos_rdy(void);

word   save_gs(word Handle,word LimSeg,word
Mode,dword Fpos,void
far *TmpBuf);
word   restore_gs(word Handle,word LimSeg,word
Mode,dword
Fpos,void far *TmpBuf);
void   saved_gs_on(void);
extern word _min_vram,_max_vram,_min_graphics;
int    is_graphics(void);
extern word _MinVram,_MaxVram,_MinGraphics;
void   init_video(fp SetRetrace);
vo c   toggle_hkeys(void);
voi.'  get_rgb_colors(void *RGB_buf,int StartReg,int
RegCnt);
void   set_rgb_colors(void *RGB_buf,int StartReg,int
RegCnt);
char   *save_com(word BasePort,void *Buf6);
char   *restore_com(word BasePort,void *Buf6),

typedef struct Mreg { word ax,bx,cx,dx,es,di,si; }
MREG;
word   mouse(MREG *InArgs,MREG *OutArgs);
void   get_mouse(void *StateBuffer);
void   set_mouse(void *StateBuffer);
   install_mouse(fp Service,word StkSize.byte
LockMask);
word   mouse_event(word Trigger);

int    is_netware(void);
char   netw_swap_eoj(char NewEOJ);
int    get_npf_server(void);
void   set_npf_server(int Server);
Copr. 1995 Zenith Data Systems Corp.


#define MAX_CHANNELS 16



typedef struct chain {
  char *ch_buf;
  word ch_size;
  word ch_crit;
} CHAIN;

typedef struct buf_ctl {
  char *Buf;
  char *Top;
  char *Put;
  char *Get;
  wo:1 Size;
  word Cnt;
  word CritCnt:
  CHAIN *Chain;
} BUF_CTL;

typedef struct ser_ctl {
  int SerPort2;
  char IRQ;
  char SerChanNum;
  char XmtCtl,FlowCtl;
  char ErrCtl;
  char RingCtl,
  char SerIntMask;
  char ServReq;
  int UserField;
  fp RingService;
  fp XmtService;
  fp RcvService;
  fp ErrService;
  fp BsyEntry[4];
  int LibWork[4];
  int StatusWord;
  BUF_CTL rcv;
  BUF_CTL xmt;
} SER_CTL;



typedef struct ser_pctl {
  int SerPort2,
  char *BufPtr;
  word ReqCnt;
  word PoolCnt;
  word StartTicks;
  int  ErrorSta;
  char XmtCtl;
  char PollCtl;
} SER_PCTL;



#define BD_50    0x900
#define BD_75    0x600
#define BD_110   0x417
#define BD_134   0x359
#define BD_150   0x300
#define BD_300   0x180
#define BD_600   0xc0
#define BD_1200      0x60
#define BD_1800      0x40
#define BD_2000      0x3a
#define BD_2400      0x30
#define BD_3600      0x20
#define BD_4800      0x18
#define BD_7200      0x10
#define BD_9600      0xc
#define BD_19200 0x6
#define BD_38400 0x3
#define BD_56K   0x2
#define BD_115K  0x1


#define DF_PAR_N  0
#define DF_PAR_O  0x8
#define DF_PAR_E  0x18
#define DF_PAR_M  0x28
#define DF_PAR_S  0x38

#define DF_STOP1  0
#define DF_STOP2  4

#define DF_D5  0
#define DF_D6  1
#define DF_D7  2
#define DF_D8  3

#define DF_8N1 (DF_D8+DF_PAR_N+DF_STOP1)



#define IFC_DTR         1
#define IFC_RTS         2
#define IFC_DTR_DROPPED 4
#define IFC_XOFF    8
#define IFC_XOFF_SENT    0x10

#define OFC_WATCH_XOFF   0x20
#define OFC_GOT_XOFF     0x40
#define OFC_LOCK    0x80



#define SR_RCV_HI  0x01
#define SR_RCV_OVF 0x02
#define SR_XMT_LO  0x04
#define SR_XMT_EMP 0x08
#define SR_RING    0x10
#define SR_ERR     0x20



#define SIM_RCV       1
#define SIM_XMT       2
#define SIM_ERR    4
#define SIM_RING   8



#define IND_RING   0
#define IND_XMT        1
#define IND_RCV        2
#define IND_ERR        3



#define MC_LOOP    0x10
#define MC_GP2  0x08
#define MC_GP1  0x04
#define MC_RTS 0x02
#define MC_DTR 0x01



#define STA_TXE        0x4000
#define STA_TBE        0x2000
#define STA_BREAK   0x1000
#define STA_FRAM_ERR    0x0800
#define STA_PAR_ERR 0x0400
#define STA_OVR_ERR 0x0200
#define STA_RxRDY   0x0100

#define STA_DCD        0x80
#define STA_RING    0x40
#define STA_DSR        0x20
#define STA_CTS        0x10
#define STA_D_DCD   0x08
#define STA_D_RING  0x04
#define STA_D_DSR   0x02
#define STA_D_CTS   0x01

#define STA_RCV_ERR 0x1E00



#define NUL   0
#define SOH   1
#define STX   2
#define ETX   3
#define EOT   4
#define ENQ   5
#define ACK   6
#define BEL   7
#define BS    8
#define HT    9
#define LF    0xA
#define VT    0xB
#define FF    0xC
#define CR    0xD
#define SO    0xE
#define SI   0xF
#define DLE   0x10
#define DC1   0x11
#define DC2   0x12
#define DC3   0x13
#define DC4   0x14
#define NAK   0x15
#define SYN   0x16
#define ETB   0x17
#define CAN   0x18
#define EM    0x19
#define SUB   0x1A
#define ESC   0x1B
#define FS    0x1C
#define GS    0x1D
#define RS    0x1E
#define US    0x1F
#define SP    0x20
#define DEL   0x7F
#define CTLQ  0x11
#define CTLS  0x13
#define XON   0x11
#define XOFF  0x13



extern SER_CTL *sctl;
extern int _sleep_frame;



install_ser(word stk_sz,byte mask,SER_CTL *sc);
install_2ser(word stk_sz,byte mask,SER_CTL *sc);
install_ser1si(word stk_sz,byte mask,SER_CTL
*sc,int NoChan);
install_ser2si(word stk_sz,byte mask,SER_CTL
*sc,int No1,int
No2);
install_mser(word stk_sz,byte mask,SER_CTL *sc,int
NoChan,int
IdPort);
install_mbser(word stk_sz,byte mask,SER_CTL
*sc,int NoChan,int
IdPort);

void uninstall_ser(void);
void break_on(void);
void break_off(void);
void set_baud(word BaudDivisor, byte DataFormat);
void set_dtr_rts(char ModemControl);
char get_dtr_rts(void);
void prog_8250(void *CommandList);
char fifo_ctl(char FifoCmd);
int  ser_sta(void);
int  ser_in(void);
int  ser_out(char c);
int  ser_inwt(word WaitTicks);
int  ser_outwt(char c, word WaitTicks);
int  ser_rcv_fast(SER_PCTL *CurrentPctl);
int  ser_xmt_fast(SER_PCTL *CurrentPctl);
void set_ibuf(void *InBuf,word BufSize,word CritCnt);
void set_ichain(CHAIN *InChain);
char *feed_ichain(void *InBlock,word InCnt);
int  wrap_ichain(CHAIN *InChain,void *OvfStart);
void set_obuf(void *OutBuf,word BufSize,word
CritCnt);
```

```
void set_ochain(CHAIN *OutChain);
void enable_rcvx(void);
int  send_xon(void),
void enable_rcv(void).
void disable_rcv(void)
void enable_xmtx(void);
void enable_xmt(void);
void disable_xmt(void),
void ser_ints_on(void);
void ser_ints_off(void);
int  flush_uart(void);
void restart_xmt(void);
void restart_ints(void);
int  ser_get(void);
int  ser_get_last(void);
int  ser_put(char c);
char *ser_puts(void *s);
int  ser_rcv_blk(word ByteCnt,word WaitTicks);
int  ser_xmt_blk(word ByteCnt,word WaitTicks);
int  bit_get(void *BitMap,int BitNum);
void bit_set(void *BitMap,int BitNum);
int  bit_tog(void *BitMap,int BitNum).
dword    set_quick_tmr(void);
void rst_quick_tmr(dword OldIntVect);
void upd_quick_tmr(void).
dword    set_quick_kbd(void);
void rst_quick_kbd(dword OldIntVect),
void tk_int_off(char IntMask);
void tk_int_on(void):
void set_irc_lev(char TopLevel);
word xm_cksum(void *Buf,word ByteCnt),
word xm_crc(void *Buf,word ByteCnt);
void sleep(void);
void awake(void);
int  sleeping(void).
#define   reset_sleep() _sleep_frame=0;


char pak_scr_buf(word *ScrBuf,int WordCnt);
void unpak_scr_buf(word *ScrBuf,int WordCnt,char
VidAtr);
int  remove_blanks(void *Str);
char *str_n(void *StrList,int N_th);
char *str2heap(void *Str);
char *mem2heap(void *Str,int Cnt);
void _even_heap(void);

extern    _dummy_ret():



void set_scr_len(int NoLines);
void reset_ansi(void);
void save_ansi(dword *AnsiState);
void restore_ansi(dword *AnsiState):
void ansi_chr(char c);
int  in_ansi_cmd(void);

extern  fp ansi_xtra.
extern    int ansi_no_args
extern  char ansi_args[];



void reset_vt100(void);
void save_vt100(dword *VT100State);
void restore_vt100(dword *VT100State);
void vt100_chr(char c);
int  in_vt100_cmd(void);

extern  fp vt100_xtra;
extern    int vt100_no_args;
extern  char vt100_args[];
Copr 1995 Zenith Data Systems Corp.

PD_PSEO_FREQUENCY     EQU  0200h
PD_TIMER2_16BIT_MODE  EQU  0B6h
PD_SPK_DELAY          EQU  4

PD_CURSOR_TOTAL_LEN  EQU  3
PD_CURSOR_TOTAL_HGT  EQU  16
PD_CUR_IMAGE_SAVE_BUFF EQU 09F00h
PD_CUR_IMAGE_PROC_BUFF EQU 09F30h

PD_REDUCE_MAX      EQU   2

PD_OSKUICALI_PT_BD_X  EQU 10
PD_OSKUICALI_PT_BD_Y  EQU 10

PD_TOP_MARGIN       EQU   0
PD_RIGHT_MARGIN     EQU   24
PD_ICON_LENGTH      EQU   1000
PD_ICON_SPACE       EQU   0
PD_HOT_ICON_NUMBER  EQU   9

PD_DELAY_PITCH    EQU   1
```

```
PD_TIME_TICK_SEG EQU  0040h
PD_TIME_TICK_OFF EQU  006Ch
PD_TIME_TICK_BD  EQU  18

PD_PIXEL_BD      EQU  10

PD_SM_INIT   EQU  0001h
PD_SM_NOTIFY EQU  0002h

PD_CALI_OFF_MIN EQU 180

PD_SM_SIG_OFF  EQU   10
PD_SM_INT      EQU   006Ah

PD_IRQ_5      EQU   5
PD_23579      EQU   23579

PD_OXD        EQU   4000
PD_OYD        EQU   4000
PD_CXD        EQU   1000
PD_CYD        EQU   1000

PD_10000      EQU   10000

PD_NO_HOT_ICON  EQU    -1

PD_01_PAGE_SIZE EQU    11
PD_23_PAGE_SIZE EQU    12
PD_80        EQU   80
PD_40        EQU   40
PD_01_LENGTH   EQU   80
PD_23_LENGTH   EQU   160
PD_12H_LENGTH  EQU   80
PD_01_SHIFT    EQU   4
PD_23_SHIFT    EQU   3
PD_0123_SHIFT  EQU   3

PD_B800H      EQU   0B800h
PD BC00H      EQU   0B800h
PL / 000H     EQU   0A000h
PD_45_PAGE1   EQU   0B800h
PD_45_PAGE2   EQU   0BA00h
PD_8K        EQU   0200h
PD_16K        EQU   0400h
PD_32K        EQU   0800h

PD_SENSE_X    EQU   50
PD_SENSE_X    EQU   50
PD_THRESHOLD   EQU   64

PD_8       EQU   8
PD_640       EQU   640
PD_639       EQU   639
PD_624       EQU   624
PD_200       EQU   200
PD_199       EQU   199
PD_350       EQU   350
PD_349       EQU   349
PD_480       EQU   480
PD_479       EQU   479
PD_464       EQU   464
PD_460       EQU   460
PD_320       EQU   320
PD_319       EQU   319
PD_304       EQU   304

PD_ON        EQU   1
PD_OFF       EQU   0
PD_YES       EQU   1
PD_NO        EQU   0
PD_RIGHT     EQU   1
PD_LEFT      EQU   0
PD_DOWN      EQU   1
PD_UP        EQU   0
PD_ZERO      EQU   0
PD_ONE       EQU   1
PD_TWO       EQU   2
PD NONE      EQU   -1

PD_HOT_SPOT_X  EQU    1
PD_HOT_SPOT_Y  EQU    0

PD_PS2       EQU   4

PD_SEQUE_ADDR_REG EQU  03C4h
PD_SEQUE_DATA_REG EQU  03C5h
PD_GRAPH_ADDR_REG EQU  03CEh
PD_GRAPH_DATA_REG EQU  03CFh

PD_TXT_SCR_MASK EQU    077FFh
PD_TXT_CUR_MASK EQU    07700h

PD_HALF640    EQU   320
PD_HALF480    EQU   240
PD_HALF200    EQU   100
PD_HALF350    EQU   175

PD_FUNC50MK    EQU    0FC2Ch
```

```
PD_MOUSE_TYPE  EQU    0400h
PD_MOUSE_VER   EQU    0820h


PD_VERSION          EQU   '1.0'
PD_VER_MAJOR         EQU   '0'
PD_VER_MINOR        EQU   '1'
PD_ALREADY_IN       EQU   0
PD_REMOVE_MESSAGE      EQU   1
PD_NOT_IN_MEM        EQU   2
PD_REMOVE_ERROR        EQU   3
PD_CMD_LINE_ERR       EQU   4
PD_LOAD_OK       EQU  5
PD_SM_NOT            EQU   6

sIntVectorReplace struc
 iIntNum      db     ?
 iOldISRoffset  dw     ?
 iOldISRseg    dw     ?
 iNewISRoffset  dw     ?
sIntVectorReplace ends

mIntVectorReplace MACRO imIntNum, fpmOldISR,
fpmNewISR
     db     &imIntNum
 fpmOldISR  dd     0
     dw     &fpmNewISR
ENDM

sPanelConfig struc
 xUL         dw  ?
 yUL         dw  ?
 xLR         dw  ?
 yLR         dw  ?
 nTopMargin   dw  ?
 nRightMargin  dw  ?
 nVertSpace    dw  ?
 nHiLength    dw  ?
 nHIWidth     dw  ?
sPanelConfig ends

SetEGAWriteReadMode  macro
 mov  dx, PD_GRAPH_ADDR_REG
 mov  al, 5
 out  dx, al
 inc  dx
 mov  al, ah
 out  dx, al
 endm

SetEGABitMask  macro
 mov  dx, PD_GRAPH_ADDR_REG
 mov  al, 8
 out  dx, al
 inc  dx
 mov  al, ah
 out  dx, al
 endm

SetEGAColorMask  macro
 mov  dx, PD_SEQUE_ADDR_REG
 mov  al, 2
 out  dx, al
 inc  dx
 mov  al, 0fh
 out  dx, al
 endm

SaveEGARegister  macro
 mov  dx, PD_GRAPH_ADDR_REG
 in  al, dx
 mov  cs:[bx+2], al
 mov  al, 5
 out  dx, al
 inc  dx
 in  al, dx
 mov  cs:[bx], al
 dec  dx
 mov  al, 8
 out  dx, al
 inc  dx
 in  al, dx
 mov  cs:[bx+1], al
 mov  dx, PD_SEQUE_ADDR_REG
 in  al, dx
 mov  cs:[bx+4], al
 mov  al, 2
 out  dx, al
 Inc  dx
 in  al, dx
 mov  cs:[bx+3], al
 endm

RestoreEGARegister  macro
 mov  dx, PD_GRAPH_ADDR_REG
 mov  al, 5
 out  dx, al
 inc  dx
 mov  al, cs:[bx]
```

```
 out  dx, al
 dec  dx
 mov  al, 8
 out  dx, al
 inc  dx
 mov  al, cs:[bx+1]
 out  dx, al
 dec  dx
 mov  al, cs:[bx+2]
 out  dx, al
 mov  dx, PD_SEQUE_ADDR_REG
 mov  al, 2
 out  dx, al
 inc  dx
 mov  al, cs:[bx+3]
 out  dx, al
 dec  dx
 mov  al, cs:[bx+4]
 out  dx, al
 endm

SaveEntryRegisters  macro
 push  ax
 push  bx
 push  cx
 push  dx
 push  di
 push  si
 endm

RestoreEntryRegisters  macro
 pop si
 pop di
 pop dx
 pop cx
 pop bx
 pop ax
 endm



Copr. 1995 Zenith Data Systems Corp.
 page ,80
 title PENDRV.ASM - Pen Driver of Saratoga
 .286


.model small

include pd.inc
.stack
.code

ORG 100h

startaddr      label  byte
imTxtScrMask    dw      077FFh
imTxtCurMask    dw      07700h
iHardstart     dw     6
iHardEnd        dw     7

iVertScrPixels  dw     200
iVertcharPixels dw     8

iVideoMode      dw     0
iLanguage       dw     0

iCrtPage       dw     0
ifCursorFlag    dw     -1

iHotspotX       dw     1
iHotspotY       dw     0

iHoriMin       dw     0
iHoriMax        dw     639
iVertMin       dw     0
iVertMax        dw     199

iMulX         dw     2133
iMulY         dw     588

iXpos         dw     0
iYpos         dw     0
iLastX        dw     0
iLastY        dw     0

iLastTickCount  dw     -1000

iLeftTouchCount    dw  0
iRightTouchCount   dw  0
iLeftUnTouchCount  dw  0
iRightUnTouchCount dw  0
ifHookcs          dw  0
ifHookSUI          dw  0
ifCallMask     dw     0
fpMouseEventHandler dd  0
fpSaraMouseHandler  dd  0

iXposF5L       dw     0
```

```
iYposF5L       dw    0
iXposF6L       dw    0
iYposF6L       dw    0
iXposF5R       dw    0
iYposF5R       dw    0
iXposF6R       dw    0
iYposF6R       dw    0
iXMickey11     dw    0
iYMickey11     dw    0
iRatioHM       dw    0
iRatioVM       dw    0
iFirstF11      dw    1
iSensitivityX  dw    50
iSensitivityY  dw    50
iThreshold     dw    64

imScr12Mask    dw    08fffh
    dw    08fffh
    dw    087ffh
    dw    083ffh
    dw    081ffh
    dw    080ffh
    dw    0807fh
    dw    0803fh
    dw    0801fh
    dw    0800fh
    dw    080ffh
    dw    0887fh
    dw    0987fh
    dw    0fc3fh
    dw    0fc3fh
    dw    0fe3fh
imCur12Mask    dw    00000h
    dw    02000h
    dw    03000h
    dw    03800h
    dw    03c00h
    dw    03e00h
    dw    03f00h
    dw    03f80h
    dw    03fc0h
    dw    03e00h
    dw    03600h
    dw    02300h
    dw    00300h
    dw    00180h
    dw    00180h
    dw    00000h

PD_STATE_siZE EQU ($-startaddr)

ifDropMode     dw    0


bLeftBit12h    db    0ffh
    db    07fh
    db    03fh
    db    01fh
    db    00fh
    db    007h
    db    003h
    db    001h

bRightBit12h   db    0ffh
    db    0feh
    db    0fch
    db    0f8h
    db    0f0h
    db    0e0h
    db    0c0h
    db    080h

imGSMaskDefa   dw    09fffh
    dw    08fffh
    dw    087ffh
    dw    083ffh
    dw    081ffh
    dw    080ffh
    dw    0807fh
    dw    0803fh
    dw    0801fh
    dw    0800fh
    dw    080ffh
    dw    0887fh
    dw    0987fh
    dw    0fc3fh
    dw    0fc3fh
    dw    0fe3fh
imGCMaskDefa   dw    00000h
    dw    02000h
    dw    03000h
    dw    03800h
    dw    03c00h
    dw    03e00h
    dw    03f00h
    dw    03f80h
    dw    03fc0h
    dw    03e00h
    dw    03600h
```

```
    dw    02300h
    dw    00300h
    dw    00180h
    dw    00180h
    dw    00000h


imScr45Mask    dw    0ffffh
    dw    0cfffh
    dw    003ffh
    dw    003ffh
    dw    000ffh
    dw    000ffh
    dw    0003fh
    dw    0003fh
    dw    0000fh
    dw    0003fh
    dw    0003fh
    dw    0c03fh
    dw    0fc0fh
    dw    0fc0fh
    dw    0ff3fh
    dw    0ffffh

imCur45Mask    dw    00000h
    dw    00000h
    dw    03000h
    dw    03000h
    dw    03c00h
    dw    03c00h
    dw    03f00h
    dw    03f00h
    dw    03fc0h
    dw    03f00h
    dw    03300h
    dw    00300h
    dw    000c0h
    dw    000c0h
    dw    00000h
    dw    00000h

ifWindows      dw    0

imTempMask     dw    0
ifEvenOddRow   dw    0
iColNum        dw    0
iBit0Off456    dw    0
iBit1Off456    dw    0
iEvenOff456    dw    0
iOddOff456     dw    0

iMouseVideoList dw   0
ifLeftRight    dw    0

ifMousePenMode dw    0

ifOSKUICali    dw    0

ifUIActive     dw    0

ifOSKActive    dw    0
ifOSKMode      dw    0
iOSKULX        dw    0
iOSKULY        dw    0
iOSKLRX        dw    0
iOSKLRY        dw    0

iHotIconWidth  dw    300
iHotIconLength dw    1000
iHotTopMargin  dw    0
iHotRightMargin dw   20
iHotIconspace  dw    0
iHotRedusimul  dw    0
iHotIconID     dw    -1
iHIidsave      dw    -1

iButtonDown        dw 1
iButtonUpTrigger   dw 4
iButtonDownTrigger dw 2
iButtonMoveTrigger dw 1

iReduceFactor  dw    0

ifMouEmuBusy   dw    0

bport61h       db    0
bfspeaker      dw    0
bfspeakerCount dw    0

bspensignature db    '<SaraPen>'
PD_SIG_LEN equ $ - bspensignature

wTSRorigPsp    dw    0

iTouch         dw    0
iLastTouch     dw    0


iXposRaw       dw    0
```

```
iYposRaw       dw    0

iXposRawBak    dw    0
iYposRawBak    dw    0
iTouchBak      dw    0
if_up_or_not   dw    0

iCursorX       dw    0
iCursorY       dw    0
iCursorCover   dw    0
iCurResOffset  dw    0
iBitPosCur     dw    0
iCountBitCur   dw    0
bBitMask12h    db  4 dup (?)
iCurSav12hCount dw   0
bCurSave12h    db 192 dup (?)
iColumnCount12h dw   0
iRowCount12h   dw    0
ICursorBytes   dw    0
iRealCurHeight dw    0
iRealCurWidth  dw    0

lInputFlag     db    0
align2         db    0

bByte1         db    0
bByte2         db    0
bByte3         db    0
bByte4         db    0

ifCallMaskUI   dw    0

ifCalibrate    dw    -1
ifCaliStatus   dw    0
iCaliOffULX    dw    0
iCaliOffULY    dw    0
iCaliOffLRX    dw    0
iCaliOffLRY    dw    0

iMinX          dw    200
iMinY          dw    200
iMaxX          dw    3300
iMaxY          dw    3600
iMinXTmp       dw    0
iMinYTmp       dw    0
iMaxXTmp       dw    4095
iMaxYTmp       dw    4095

iGraResX       dw    0
iGraResY       dw    0
iGraCurdiffX   dw    0
iGraCurdiffY   dw    0
iGralenX       dw    0
iPagesize      dw    0
iSavePageOff   dw    0

iComPort       dw    768
iIRQNumber     db    5


bSaveVGABMR    db    0
bSaveVGAMR     db    0
bSaveVGARMSR   db    0
bSaveVGADRR    db    0
bSaveVGAMMR    db    0

iMinXByte12h dw 0
iMaxXByte12h dw 79

iOffsetIntoANDMask dw 0
iOffsetIntoXORMask dw 0
iCurMaskSkip12h        dw 0

iCurWidth12h dw 0
iCurHeight12h dw 0
iLineSkip12hCur  dw 0
iCurOffset12h dw 0

bCurImageBuffer db 16*3*8*2 dup (?)
bEGARegBuff db 5 dup (?)

align4         db    0

wCmd33Table    label  word
  dw    func330
  dw    func331
  dw    func332
  dw    func333
  dw    func334
  dw    func335
  dw    func336
  dw    func337
  dw    func338
  dw    func339
  dw    func3310
  dw    func3311
  dw    func3312
  dw    end33isr
  dw    end33isr
```

```
  dw    func3315
  dw    func3316
  dw    end33isr
  dw    end33isr
  dw    func3319
  dw    func3320
  dw    func3321
  dw    func3322
  dw    func3323
  dw    func3324
  dw    func3325
  dw    func3326
  dw    func3327
  dw    end33isr
  dw    func3329
  dw    func3330
  dw    func3331
  dw    func3332
  dw    func330
  dw    func3334
  dw    func3335
  dw    func3336
  dw    func3337
  dw    func3338
  dw    func3339
  dw    func3340
  dw    func3341
  dw    func3342
  dw    end33isr
  dw    end33isr
  dw    end33isr
  dw    end33isr
  dw    func3347
  dw    end33isr
  dw    func3349
  dw    func3350
  dw    end33isr
  dw    end33isr

sSMsignature db 'saratoga manager, copyright zds'
        db 0
PD_SM_SIG_LEN equ ($-sSMsignature)

align5         db    0

wTSRreplaceVectorTable label   word
  mIntVectorreplace     33h, fpOldint33h,
fpNewint33h
  mIntVectorreplace     67h, fpOldint67h,
fpNewint67h
  mIntVectorreplace     0Dh, fpOldint0Dh,
fpNewint0Dh
PD_TSR_repLACE_NUM equ ($-
wTSRreplaceVectorTable)/(size
sintVectorreplace)


public fpNewint67h
fpNewint67h proc far

  jmp $+PD_SM_SIG_OFF+33
  db  'Pen Drv '
  db  'saratoga pen driver copyright zds'

  cmp ax,0010h
  jne @F
  mov bx,iHotIconID
  mov iHotIconID,PD_NO_HOT_ICON
  jmp end67isr
@@:
  cmp ax,0011h
  jne @F
  mov ifMousePenMode,bx
  jmp end67isr
@@:
  cmp ax,0012h
  je  iam6712
  jmp after6712
iam6712:
  cmp bx,0012h
  jle over1_endof6712
  jmp endof6712
over1_endof6712:
  cmp bx,0
  jge over2_endof6712
  jmp endof6712
over2_endof6712:
  cmp bx,0006h
  jle okmodein67
  cmp bx,000Dh
  jge over3_endof6712
  jmp  endof6712
over3_endof6712:

okmodein67:

  call _RestoreCursor

  mov iVideoMode,bx
```

```
 mov iCRTPage.PD_ZERO

 cmp iVideoMode,0004h
 jge setvmd4orhigh

 mov iGraResX,PD_639

 cmp si, PD_ZERO
 je  not_chg_scan_lines
 mov iVertScrPixels, di
 and cx, 00ffh
 mov iVertcharPixels, cx

 mov ax, di
 div cl
 cmp al, 25
 jne not_25_line_mode
 mov iVertScrPixels, PD_200
 mov iVertcharPixels, PD_8

not_25_line_mode:

not_chg_scan_lines:
 mov ax, iVertScrPixels
 dec ax
 mov iGraResY, ax

 jmp ends6712
setvmd4orhigh

 mov iGraResX,PD_639
 mov iGraResY,PD_479
 mov iGraCurdiffX,PD_624
 mov iGralenX,PD_80

 cmp bx,000Dh
 jne endd05
 mov iGraResX,PD_319
 mov iGraCurdiffX,PD_304
 mov iGraResY,PD_199
 mov iGralenX,PD_40
 mov iPagesize,PD_8K
 jmp gfs6712
endd05:
 cmp bx.000Eh
 je  ms640200
 cmp bx,0006h
 jg  mschkfh
ms640200.
 mov iGraResY,PD_199
 mov iPagesize,PD_16K
 jmp gfs6712
mschkfh.
 cmp bx.000Fh
 jne @F
 mov iGraResY,PD_349
 mov iPagesize,PD_32K
 jmp gfs6712
@@.
 cmp bx.0010h
 jne gfs6712
 mov iGraResY,PD_349
 mov iPagesize,PD_32K
gfs6712:
 mov ax.iGraResY
 sub ax,16
 mov iGraCurdiffY,ax
ends6712:

 call _SetModeData
 call _ShowCursor

endof6712.
 jmp end67isr

after6712:
 cmp ax,0013h
 jne end6713
 cmp bx, ifUIActive
 je  notdo6712
 mov ifUIActive,bx
 add ifOSKUICali, bx
 cmp bx. PD_ZERO
 jne notdo6712
 dec ifOSKUICali
notdo6712:
 jmp end67isr
end6713:

 cmp ax,0016h
 jne end6716
 cmp ifLeftRight,PD_LEFT
 je  @f
 mov ifLeftRight,PD_LEFT
 mov iButtonDown,1
 mov iButtonDownTrigger,2
 mov iButtonUpTrigger,4
 jmp end67isr
@@
 mov ifLeftRight,PD_RIGHT
 mov iButtonDown,2
 mov iButtonDownTrigger,8
 mov iButtonUpTrigger,16
 jmp end67isr

end6716:
 cmp ax,0018h
 je  itisint6718h
 jmp end6718h
itisint6718h:
 mov ax,si
 add ax,bx
 add ax,cx
 add ax,dx
 cmp ax,PD_ZERO
 jne norosk18
 mov ifOSKActive.PD_ZERO
 jmp end67isr
norosk18:
 mov ifOSKActive,PD_ONE
 mov iOSKULX,bx
 mov iOSKULY,cx
 mov iOSKLRX,dx
 mov dx,si
 mov iOSKLRY,dx
 push ax
 push bx
 push cx
 push dx
 push si
 push di

 mov ax, ifOSKUICali
 mov ifOSKUICali, PD_OFF
 push ax

 mov  ax, PD_479
 sub  ax, dx
 mov  dx, 1
 cmp  ax, cx
 jle  @F
 mov  dx, PD_460
@@:
 mov ax, iButtonMoveTrigger
 mov bx, 0
 mov cx, PD_320
 push cx
 push dx
 sub cx, iXpos
 sub dx, iYpos
 sal dx, 1
 mov si, cx
 mov di, dx
 pop dx
 pop cx
 call _CallHandler
 cli
 pop ax
 mov ifOSKUICali. ax

 pop  di
 pop  si
 pop  dx
 pop  cx
 pop  bx
 pop  ax
 jmp end67isr
end6718h.
 cmp ax,0019h
 jne end6719h
 mov ifWindows,bx
 jmp end67isr
end6719h
 cmp ax,0020h
 jne end6720h

 mov ifHookSUI,PD_ON
 mov ax,es
 cmp dx,PD_ZERO
 jne @F
 cmp ax,PD_ZERO
 jne @F
 mov ifHookSUI,PD_OFF
@@:
 mov ifCallMaskUI,cx
 mov word ptr fpSaraMouseHandler+2,ax
 mov word ptr fpSaraMouseHandler,dx
 jmp end67isr

end6720h:
 cmp ax,0030h
 jne end6730
 cmp bx,PD_ONE
 jg  nook6730
 cmp bx,PD_ZERO
 jl  nook6730
 inc ifOSKUICali
 mov ifCalibrate,bx
 mov ifCaliStatus,PD_ZERO
 cmp bx,PD_ONE
 je  itiscalilr
 call _RestoreCursor
 mov iCaliOffULX,cx
 mov iCaliOffULY,dx
 mov ax, 0
 jmp tojmpend67isr
itiscalilr:
 mov iCaliOffLRX,cx
 mov iCaliOffLRY,dx
 sub cx, iCaliOffULX
 cmp cx, PD_Cali_OFF_MIN
 jl  calioffdiffbad
 sub dx, iCaliOffULY
 cmp dx, PD_Cali_OFF_MIN
 jl  calioffdiffbad
 mov ax, 0
 jmp tojmpend67isr
calioffdiffbad:
 mov ax, 2
 jmp tojmpend67isr
nook6730:
 mov ax, 1
tojmpend67isr:
 jmp end67isr
end6730:

 cmp ax,0031h
 jne end6731
 mov bx,ifCaliStatus
 test bx,0002h
 jz  @F
 mov cx,iMinXTmp
 mov dx,iMinYTmp
 mov ax,iMaxXTmp
 mov si,ax
 mov ax,iMaxYTmp
 mov di,ax
@@:
 jmp end67isr
end6731:
 cmp ax,0032h
 jne end6732
 cmp bx,PD_ONE
 jne @F
 mov bx,iMinXTmp
 mov iMinX,bx
 mov bx,iMaxXTmp
 mov iMaxX,bx
 mov bx,iMinYTmp
 mov iMinY,bx
 mov bx,iMaxYTmp
 mov iMaxY,bx

      mov  iHoticonspace, PD_ICON_spACE
      push ax
      push dx
      mov  ax, bx
      sub  ax, iMinYTmp
      mov  dx, 0
      mov  bx, PD_HOT_ICON_NUMBER
      div  bx
      mov  iHotIconWidth, ax
      pop  dx
      pop  ax

 call _CalcCali
@@:
 jmp end67isr
end6732:


end67isr:
 iret
fpNewint67h    endp

public _CalcCali
_CalcCali proc near
 push ax
 push bx
 push dx

 cmp  iVideoMode,000Eh
 jg   @F
 mov  iMinXTmp,PD_199
 jmp  endsetmcc
@@:
 cmp  iVideoMode,0010h
 jg   @F
 mov  iMinXTmp,PD_349
 jmp  endsetmcc
@@:
 mov  iMinXTmp,PD_479
endsetmcc:
 mov  ax,PD_10000
 mov  bx,PD_639
 mul  bx
 mov  bx,iMaxX
 sub  bx,iMinX
 cmp  bx, dx
 jle  calccalidiv0
 div  bx
 push ax

 mov  ax,PD_10000
 mul  iMinXTmp
 mov  bx,iMaxY
 sub  bx,iMinY
 cmp  bx, dx
 jle  calccalidiv01
 div  bx
 mov  iMulY,ax
 pop  ax
 mov  iMulX,ax
 clc
 jmp  calccalidivok
calccalidiv01:
 pop  ax
calccalidiv0:
 stc
calccalidivok:
 pop  dx
 pop  bx
 pop  ax

 ret
_CalcCali endp

public fpNewint0Dh
fpNewint0Dh proc far
 push ax
 push bx
 push cx
 push dx
 push es
 push ds
 push si
 push di
 push bp

 mov dx, iComPort
 in al,dx

 push ax

 mov dx, 32
 mov al, 32
 out dx, al

 cmp bfspeaker, 0
 je  up_no_spk_toggle

 inc bfspeakerCount
 cmp bfspeakerCount, PD_SPK_DELAY
 jne up_no_spk_toggle

 mov al, bport61h
 out 61h, al
 mov bfspeaker, 0
 mov bfspeakerCount, 0

up_no_spk_toggle:

 pop  ax


 sti

 call _AssembleByte
 jcxz  not_complete_godd_pt
 call _MouseManager
not_complete_godd_pt.


 pop bp
 pop di
 pop si
 pop ds
 pop es
 pop dx
 pop cx
 pop bx
 pop ax

 cli

 iret

fpNewint0Dh        endp

_MouseManager proc near


 cmp ifMouEmuBusy, 1
 je  exitmousemanager

 mov ifMouEmuBusy, 1
```

```
 mov ax, iXposRawBak
 mov iXposRaw, ax
 mov ax, iYposRawBak
 mov iYposRaw, ax
 mov ax, iTouchBak
 mov iTouch, ax

 neg ax
 inc ax
 sub if_up_or_not, ax

 call _MouseEmulator


 cmp if_up_or_not, 1
 jne freemouseemulator
 mov iTouch, 0
 mov if_up_or_not, 0

 sti
 call _MouseEmulator

freemouseemulator:
 mov ifMouEmuBusy, 0

exitmousemanager:
 ret

_MouseManager endp

_AssembleByte proc near

 cmp iInputFlag,1
 je  char_2nd
 cmp iInputFlag,2
 je  char_3rd
 cmp iInputFlag,3
 je  char_4th
 cmp al,80h
 jae over_bad_char
 jmp bad_char
over_bad_char:
 cmp al,0C0h
 jae char_1st

 cmp iTouchBak, 0
 je  not_use_2nd_up

 cmp bfspeaker, 0
 je  up_no_spk_tog
 mov al, bport61h
 out 61h, al
 mov bfspeaker, 0
 mov bfspeakerCount, 0
up_no_spk_tog:

 mov iTouchBak,0
 mov if_up_or_not, 1
 mov iInputFlag,0
 mov cx,PD_ONE
 ret
not_use_2nd_up:
 mov cx, 0
 ret

char_1st:
 mov bByte1,al

 jmp goodnotlast

char_2nd:
 cmp al,128
 jae bad_char

 mov bByte2,al

 jmp goodnotlast

char_3rd:
 cmp al,32
 jae bad_char

 mov bByte3,al

 jmp goodnotlast

char_4th:
 cmp al,128
 jae bad_char

 mov bByte4,al


 mov ah,bByte1
 shr ax,1
 and ax,0F80h
 or  al,bByte2
 mov iXposRawBak,ax
```

```
 mov ah,bByte3
 shr ax,1
 and ax,0F80h
 or  al,bByte4
 mov iYposRawBak,ax
 mov iInputFlag,0
 mov iTouchBak,PD_DOWN



 mov cx,PD_ONE
 ret
goodnotlast:
 inc iInputFlag
 mov cx,PD_ZERO
 ret
bad_char:
 mov iInputFlag,0
 mov cx,PD_ZERO
 ret
_AssembleByte endp

public _spkTone
_spkTone proc near
  cli
  in  al, 61h
  mov bport61h, al
  or  al, 3
  out 61h, al
  mov bfspeaker, 1
  sti
  ret
_spkTone endp

_MouseEmulator proc near

 cmp iTouch,PD_ZERO
 jne over_uppreproc
 jmp uppreproc
over_uppreproc:

 mov ax,iYposRaw
 sub ax,iMinY
 cmp ax,PD_ZERO
 jge @F
 xor ax,ax
@@:
 mul iMuly
 mov bx,PD_10000
 div bx
 cmp ax, iGraResY
 jl  @F
 mov ax, iGraResY
 dec ax
@@:
 mov iYpos,ax

 mov ax,iXposRaw
 sub ax,iMinX
 cmp ax,PD_ZERO
 jge @F
 xor ax,ax
@@:
 mul iMulx
 mov bx,PD_10000
 div bx
 cmp ax, iGraResX
 jl  @F
 mov ax, iGraResX
 dec ax
@@:
 mov iXpos,ax

 cmp ifDropMode,PD_ON
 jne over_prodropmode
 jmp prodropmode
over_prodropmode:


 cmp iLastTouch,PD_DOWN
 jne over_not_h_c_o
 jmp not_h_c_o
over_not_h_c_o:


 cmp ifCalibrate,PD_NONE
 je  notcalibinemu
 mov ifDropMode,PD_ON

 call _spkTone

 ret
notcalibinemu:

 mov ax,iMinX
 cmp ax,iXposRaw
 jle endchkhoticon
```

```
 mov ifDropMode,PD_ON
 sub ax,iXposRaw
 cmp ax,iHotRightMargin
 jl  endnothoticon
 sub ax,iHotRightMargin
 cmp ax,iHotIconLength
 jg  endnothoticon
 mov ax,iYposRaw
 sub ax,iMiny
 sub ax,iHotTopMargin
 cmp ax,0
 jl  endnothoticon
 mov bx,iHotIconWidth
 add bx,iHotIconspace
 xor dx,dx
 div bx
 cmp dx,iHotIconWidth
 jge endnothoticon
 mov iHIldsave,ax
 jmp endyeshoticon
endnothoticon:
 mov iHIldsave,PD_23579
endyeshoticon:
 ret
endchkhoticon:


 call _spkTone

 cmp ifOSKActive,PD_ZERO
 je  endoskchk
 mov ax,iXpos
 cmp ax,iOSKULX
 jl  endoskchk
 cmp ax,iOSKLRX
 jg  endoskchk
 mov ax,iYpos
 cmp ax,iOSKULY
 jl  endoskchk
 cmp ax,iOSKLRY
 jg  endoskchk
 mov ifOSKMode,PD_ON
 inc ifOSKUICali
 jmp afterbchk
endoskchk:

not_h_c_o:

 mov ax,iHoriMax
 cmp ax,iXpos
 jge @F
 mov iXpos,ax
@@:
 mov ax,iHoriMin


 cmp ax,iXpos
 jle @F
 mov iXpos,ax
@@:
 mov ax,iVertMax
 cmp ax,iYpos
 jge @F
 mov iYpos,ax
@@:
 mov ax,iVertMin
 cmp ax,iYpos
 jle @F
 mov iYpos,ax
@@:
afterbchk:

 cmp iLastTouch,PD_ZERO
 je  over_stilldown
 jmp stilldown
over_stilldown:

endchkdck:

 cmp ifLeftRight,PD_LEFT
 jne addright
 inc iLeftTouchCount
 mov ax, iXpos
 mov iXposF5L,ax
 mov ax,iYpos
 mov iYposF5L,ax
 jmp endcountbut
addright:
 inc iRightTouchCount
 mov ax, iXpos
 mov iXposF5R,ax
 mov ax,iYpos
 mov iYposF5R,ax
endcountbut:

 cli
 call _RestoreCursor
 call _ShowCursor
 sti
```

```
 mov ax,iButtonMoveTrigger
 mov bx,0
 mov cx,iXpos
 sub cx,iLastX
 mov dx,iYpos
 sub dx,iLastY
 sal dx,1
 mov si,cx
 mov di,dx
 mov cx,iXpos
 mov dx,iYpos
 call _CallHandler

buttdownmess:
 mov ax,iButtonDownTrigger
 mov bx,iButtonDown
 mov si,0
 mov di,0
 mov cx,iXpos
 mov dx,iYpos
 call _CallHandler

 mov iReduceFactor,PD_ONE
 jmp updateptret

doesdroppt:
 mov iReduceFactor, PD_ZERO
 jmp jumpret

stilldown:

 cmp iReduceFactor, PD_ZERO
 jne doesdroppt
 mov iReduceFactor, PD_ONE

 mov cx,iXpos
 sub cx,iLastX
 mov dx,iYpos
 sub dx,iLastY
 sal dx,1
 mov si,cx
 mov di,dx

 cmp  ifOSKUICali, 0
 je   not_oskuicali_for_move
 cmp  cx, 0
 jge  @F
 neg  cx
@@:
 cmp  cx, PD_OSKUICALI_PT_BD_X
 jg   oskuicali_not_close_downs
 cmp  dx, 0
 jge  @F
 neg  dx
@@:
 cmp  dx, PD_OSKUICALI_PT_BD_Y
 jg  over_after_update_xy
 jmp after_update_xy
over_after_update_xy:

oskuicali_not_close_downs:
 mov dx, di
 mov cx, si

not_oskuicali_for_move:
 cmp dx,PD_ZERO
 jne notsamepos
 jcxz sameposnc
notsamepos:

 mov cx,iXpos
 mov dx,iYpos
 mov ax,iButtonMoveTrigger
 mov bx,iButtonDown
 call _CallHandler

 cli
 call _RestoreCursor
 call _ShowCursor
 sti

sameposnc:
 jmp updateptret


uppreproc:
 mov iReduceFactor,0
 mov ifDropMode,PD_OFF

 cmp iHIldsave,PD_NO_HOT_ICON
 je  endjudgehi
 cmp iHIldsave,PD_23579
 je  @F
 mov ax,iMinX
 cmp ax,iXposRaw
 jl  @F
 mov ax,iHIldsave
 mov iHotIconID,ax
@@:
```

```
 mov iHIldsave,PD_NO_HOT_ICON
 mov iHotRedusimul,PD_ZERO
 mov iLastTouch,PD_ZERO
 ret
endjudgehi:
 cmp ifLeftRight,PD_LEFT
 je addleftun
 inc iRightUnTouchCount
 mov ax,iLastX
 mov iXposF6R,ax
 mov ax,iLastY
 mov iYposF6R,ax
 jmp endaddun
addleftun:
 inc iLeftUnTouchCount
 mov ax,iLastX
 mov iXposF6L,ax
 mov ax,iLastY
 mov iYposF6L,ax
endaddun:
 mov ax,iButtonUpTrigger
 mov bx,0
 mov cx,iXpos
 mov dx,iYpos
 mov si,0
 mov di,0
 call _CallHandler

 cmp ifCalibrate,PD_NONE
 je @F
 call _Calibration
 dec ifOSKUICali
 mov ifCalibrate,PD_NONE
 jmp updateptret
@@:

 cmp ifOSKMode, PD_ON
 jne uposkmodeisoff
 mov ax, iXpos
 cmp ax, iOSKULX
 jl uposkcurhide
 cmp ax, iOSKLRX
 jg uposkcurhide
 mov ax, iYpos
 cmp ax iOSKULY
 jl uposkcurhide
 cmp ax, iOSKLRY
 jle setuposkmodeparm
uposkcurhide
 cli
 Call _RestoreCursor
 sti
setuposkmodeparm:
 mov ifOSKMode,PD_OFF
 dec ifOSKUICali
uposkmodeisoff

updateptret:
 mov ax iXpos
 mov iLastX,ax
 mov ax,iYpos
 mov iLastY,ax
after_update_xy.

j14click:
 mov ax,iTouch
 mov iLastTouch,ax

jumpret:
 ret
prodropmode:
 cmp iHIldsave,PD_NO_HOT_ICON
 je realdrop
 mov ax iMinX
 cmp ax iXposRaw
 jge realdrop

 mov iHIldsave,PD_23579

 inc iHotRedusimul

 cmp iHotRedusimul,4
 jne realdrop
 mov iHotRedusimul,PD_ZERO

 cmp ifWindows,PD_ONE
 jne @F

 mov ax,iButtonMoveTrigger
 mov bx,0
 mov cx,iXpos
 sub cx,iLastX
 mov dx,iYpos
 sub dx,iLastY
 sal dx,1
 mov si,cx
 mov di,dx
 mov cx iXpos
 mov dx iYpos
 call _CallHandler
 jmp updateptret

@@:
 cli
 call _RestoreCursor
 call _ShowCursor
 sti
 jmp updateptret

realdrop:
 ret
_MouseEmulator endp

_Calibration proc near

 cmp ifCalibrate,PD_ZERO
 jne notcaliul
 mov ax,iXposRaw
 mov iMinXTmp,ax
 mov ax,iYposRaw
 mov iMinYTmp,ax
 mov ifCaliStatus,0005h
 jmp retcalib
notcaliul:
 cmp ifCalibrate,PD_ONE
 je over_retcalib
 jmp retcalib
over_retcalib:
 mov ax,iYposRaw
 cmp ax,iMinYTmp
 jge @F
 mov bx,iMinYTmp
 mov iMinYTmp,ax
 xchg ax,bx
@@:
 mov iMaxYTmp,ax
 mov ax,iXposRaw
 cmp ax,iMinXTmp
 jge @F
 mov bx,iMinXTmp
 mov iMinXTmp ax
 xchg ax,bx
@@.
 mov iMaxXTmp,ax

 sub ax,iMinXTmp
 mul iCaliOffULX
 mov bx,iCaliOffLRX
 sub bx,iCaliOffULX
 div bx
 push ax
 mov ax,iMaxYTmp
 sub ax,iMinYTmp
 mul iCaliOffULY
 mov bx,iCaliOffLRY
 sub bx,iCaliOffULY
 div bx
 push ax
 mov ax,iMaxXTmp
 sub ax,iMinXTmp
 mov bx,PD_639
 sub bx,iCaliOffLRX
 mul bx
 mov bx,iCaliOffLRX
 sub bx,iCaliOffULX
 div bx
 push ax
 mov ax,iMaxYTmp
 sub ax,iMinYTmp
 mov bx,PD_479
 sub bx,iCaliOffLRY
 mul bx
 mov bx,iCaliOffLRY
 sub bx,iCaliOffULY
 div bx
 add iMaxYTmp,ax
 pop ax
 add iMaxXTmp,ax
 pop ax
 sub iMinYTmp,ax
 pop ax
 sub iMinXTmp,ax

 mov ax,iMaxXTmp
 sub ax,iMinXTmp
 cmp ax,PD_cxD
 jl notvcali
 mov ax,iMaxYTmp
 sub ax,iMinYTmp
 cmp ax,PD_CYD
 jl notvcali

 mov ax,iMinX
 sub ax,iMinXTmp
 cmp ax,PD_ZERO
 jge @F
 mov ax,iMinXTmp
 sub ax,iMinX
@@:
 cmp ax,PD_OXD
 jg notvcali

 mov ax,iMinY
 sub ax,iMinYTmp
 cmp ax,PD_ZERO
 jge @F
 mov ax,iMinYTmp
 sub ax,iMinY
@@:
 cmp ax,PD_OYD
 jg notvcali

 mov ifCaliStatus,0006h
 jmp endestc
notvcali:
 mov ifCaliStatus,0002h
endestc:
retcalib:
 ret
_Calibration endp

_CallHandler proc near

 push di
 push si
 push bp
 push ds
 push es

 push ax
 mov ax,@data
 mov ds,ax
 pop ax

 cmp ifOSKUICali, PD_ON
 jl msubuoo
 cmp ifHookSUI,PD_OFF
 je endmsubcall

 call dword ptr fpSaraMouseHandler
 sti
 jmp endmsubcall

msubuoo:
 cmp ifHookcs,PD_OFF
 je endmsubcall
 call dword ptr fpMouseEventHandler
endmsubcall:
 pop es
 pop ds
 pop bp
 pop si
 pop di
 ret
_CallHandler endp

public fpNewint33h
fpNewint33h proc far
 push es
 push ds
 push si
 push di

 cmp ax,PD_ZERO
 jge over_end33isr
 jmp end33isr
over_end33isr:
 cmp ax,52
 jle over1_end33isr
 jmp end33isr
over1_end33isr:

 shl ax,PD_ONE
 lea di,wCmd33Table
 add di,ax
 jmp word ptr cs:[di]

func330:
 mov ifHookcs,PD_OFF
 mov ifCallMask,0

     call _RestoreCursor

 mov ifCursorFlag,-1

 mov imTxtScrMask,PD_TXT_SCR_MASK
 mov imTxtCurMask,PD_TXT_CUR_MASK

 mov iHotspotX,PD_HOT_spOT_X
 mov iHotspotY,PD_HOT_spOT_Y

 push cx
 mov cx,32
 xor bx,bx
f330loop:
 mov ax,imGSMaskDefa[bx]
 mov imScr12Mask[bx].ax
 add bx,PD_TWO
 loop f330loop
 pop cx

 push ds
 push cs
 pop ds
 call _build_cursor_image
 pop ds

 mov iRatioHM,8
 mov iRatioVM,16

 mov iXposF5L,PD_ZERO
 mov iYposF5L,PD_ZERO
 mov iXposF6L,PD_ZERO
 mov iYposF6L,PD_ZERO
 mov iXposF5R,PD_ZERO
 mov iYposF5R,PD_ZERO
 mov iXposF6R,PD_ZERO
 mov iYposF6R,PD_ZERO
 mov iLeftTouchCount,PD_ZERO
 mov iRightTouchCount,PD_ZERO
 mov iLeftUnTouchCount,PD_ZERO
 mov iRightUnTouchCount,PD_ZERO

 call _SetModeData

 mov iThreshold,PD_THResHOLD
 cmp si,33
 je @F
 mov iCrtPage,PD_ZERO
@@:
 mov ax,-1
 mov bx,2
 jmp end33isr

func331:
 cmp ifCursorFlag,0
 je n_c_cur
 inc ifCursorFlag
 call _ShowCursor
n_c_cur:
 jmp end33isr

func332:
 call _RestoreCursor
 dec ifCursorFlag
 jmp end33isr

func333:
 mov bx,iTouch
 cmp ifLeftRight,PD_LEFT
 je @F
 shl bx,1
@@:
 mov cx,iXpos
 mov dx,iYpos
 jmp end33isr

func334:
 cmp cx,iHoriMin
 jge @F
 mov cx,iHoriMin
@@:
 cmp cx,iHoriMax
 jle @F
 mov cx,iHoriMax
@@:
 cmp dx,iVertMin
 jge @F
 mov dx,iVertMin
@@.
 cmp dx,iVertMax
 jle @F
 mov dx,iVertMax
@@:
 mov iXpos,cx
 mov iLastX,cx
 mov iYpos,dx
 mov iLastY,dx

 call _RestoreCursor
 call _ShowCursor
 jmp end33isr

func335:
 xor ax,ax
 cmp bx,PD_ZERO
 jne f5right
 mov bx,iLeftTouchCount
 mov iLeftTouchCount,0
 mov cx,iXposF5L
 mov dx,iYposF5L
 cmp ifLeftRight,PD_LEFT
 jne f5right
 mov ax,iTouch
 jmp endf5
f5right:
```

```
 cmp bx,1
 jne f5center
 mov bx,iRightTouchCount
 mov iRightTouchCount,0
 mov cx,iXposF5R
 mov dx,iYposF5R
 cmp ifLeftRight,PD_Right
 jne f5center
 mov ax,iTouch
 sal ax,1
 jmp endf5
f5center:
 xor bx,bx
 xor cx,cx
 xor dx,dx
endf5
 jmp end33isr

func336:
 xor ax,ax
 cmp bx,0
 jne f6right
 mov bx,iLeftUnTouchCount
 mov iLeftUnTouchCount,0
 mov cx,iXposF6L
 mov dx,iYposF6L
 cmp ifLeftRight,PD_LEFT
 jne f6right
 mov ax,iTouch
 jmp endf6
f6right:
 cmp bx,1
 jne f6center
 mov bx,iRightUnTouchCount
 mov iRightUnTouchCount,0
 mov cx,iXposF6R
 mov dx iYposF6R
 cmp ifLeftRight,PD_Right
 jne f6center
 mov ax,iTouch
 sal ax,1
 jmp endf6
f6center:
 xor bx,bx
 xor cx,cx
 xor dx,dx
endf6:
 jmp end33isr

func337:
 mov iHoriMin,cx
 mov iHoriMax,dx
 cmp dx.cx
 jge @F
 mov iHoriMin,dx
 mov iHoriMax,cx
@@:
 shr cx, 1
 shr cx, 1
 shr cx, 1
 mov iMinXByte12h, cx
 shr dx, 1
 shr dx, 1
 shr dx. 1
 mov iMaxXByte12h, dx
 jmp end33isr

func338:
 mov iVertMin,cx
 mov iVertMax,dx
 cmp dx,cx
 jge @F
 mov iVertMin,dx
 mov iVertMax,cx
@@:
 jmp end33isr

func339
 mov iHotspotX,bx
 mov iHotspotY,cx

 mov cx,32
 mov di,dx
 xor bx,bx
f339loop:
 mov ax, word ptr es:[di]
 mov imScr12Mask[bx], ax
 add di,2
 add bx,2
 loop f339loop

 push ds
 push cs
 pop ds
 call _build_cursor_image
 pop ds

 cli
 call _RestoreCursor
 call _ShowCursor
 sti

 jmp end33isr

func3310:
 cmp bx,0
 jne sethwcur
 mov imTxtScrMask,cx
 mov imTxtCurMask,dx
 jmp endfnc10
sethwcur:
 mov iHardstart,cx
 mov iHardEnd,dx
 mov bx,cx
 mov cx,8
 sal bx,cl
 mov cx,bx
 and dx,00ffh
 or cx,dx
 mov ax,0100h
 Int 10h
endfnc10:
 jmp end33isr


func3311:
 cmp iFirstF11,1
 je first11c
 mov cx,iXpos
 sub cx,iXMickey11
 mov dx,iYpos
 sub dx,iYMickey11
 sal dx,1
 jmp endf11p
first11c:
 mov cx,0
 mov dx,0
 mov iFirstF11,0
endf11p:
 mov ax,iXpos
 mov iXMickey11,ax
 mov ax,iYpos
 mov iYMickey11,ax
 jmp end33isr

func3312:
 mov ax,es
 mov ifHookcs,PD_ON
 cmp dx,PD_ZERO
 jne @F
 cmp ax,PD_ZERO
 jne @F
 mov ifHookcs,PD_OFF
@@:
 mov ifCallMask.cx
 mov word ptr fpMouseEventHandler+2,ax
 mov word ptr fpMouseEventHandler,dx
 jmp end33isr

func3315:
 mov iRatioHM,cx
 mov iRatioVM,dx
 jmp end33isr

func3316:
 jmp end33isr

func3319:
 cmp dx,0
 jg @F
 mov dx,PD_THResHOLD
@@:
 mov iThreshold,dx
 jmp end33isr

func3320:
 mov ifHookcs,PD_ON
 mov ax,ifCallMask
 mov ifCallMask,cx
 mov cx,ax
 push bx
 mov bx,es
 cmp dx,PD_ZERO
 jne @F
 cmp bx,PD_ZERO
 jne @F
 mov ifHookcs,PD_OFF
@@:
 mov ax,word ptr fpMouseEventHandler+2
 mov word ptr fpMouseEventHandler+2,bx
 mov es,ax
 pop bx
 mov ax,word ptr fpMouseEventHandler
 mov word ptr fpMouseEventHandler,dx
 mov dx,ax
 jmp end33isr

func3321:
 mov bx,PD_STATE_sIZE
 jmp end33isr

func3322:
 push cx
 pushf
 cld
 mov di,dx
 lea si,startaddr
 mov cx,PD_STATE_sIZE
  rep movsb
 popf
 pop cx
 jmp end33isr

func3323:
 push cx
 lea di,startaddr
 mov cx, PD_STATE_sIZE
 mov si,dx
f23copy:
 mov al,es:[si]
 mov [di],al
 inc di
 inc si
 loop f23copy
 pop cx
 jmp end33isr

func3324:
 inc cx
 jmp end33isr

func3325:
 mov cx,0
 jmp end33isr

func3326:
 mov iSensitivityX,bx
 mov ISensitivityY,cx
 mov iThreshold,dx
 jmp end33isr

func3327:
 mov bx,iSensitivityX
 mov cx,iSensitivityY
 mov dx,iThreshold
 jmp end33isr

func3329:
 mov iCrtPage,bx
 jmp end33isr

func3330:
 mov bx,iCrtPage
 jmp end33isr

func3331:
 mov ax,-1
 jmp end33isr

func3332:
 jmp end33isr

func3334:
 mov iLanguage,bx
 jmp end33isr

func3335:
 mov bx,iLanguage
 jmp end33isr

func3336:
 mov bx,PD_MOUSE_VER
 mov cx,PD_MOUSE_TYPE
 jmp end33isr

func3337:
 mov ax,0100h
 jmp end33isr

func3338:
 mov bx,0
 mov cx,iHoriMax
 mov dx,iVertMax
 jmp end33isr

func3339:
 cmp iVideoMode,3
 jge @F
 cmp ifCursorFlag,PD_ZERO
 jne @F
 mov ax,imTxtScrMask
 mov bx,imTxtCurMask
 jmp gm3339
@@:
 mov ax,iHardstart
 mov bx,iHardEnd
gm3339:
 xor cx,cx
 xor dx,dx
 jmp end33isr

func3340:
 cmp cx,0
 jl endf40
 cmp cx,0012h
 jg endf40
 cmp cx,000dh
 jge goonf40
 cmp cx,0007h
 jge endf40
goonf40:
 mov iVideoMode,cx
 call _SetModeData
 mov cx,0
endf40:
 jmp end33isr

func3341:
 cmp cx,0
 jne @F
 mov cx,1
 jmp endf41list
@@:
 inc iMouseVideoList
 cmp iMouseVideoList,7
 jne @F
 mov iMouseVideoList,13
@@:
 cmp iMouseVideoList,20
 jne @F
 mov iMouseVideoList,0
@@:
 mov cx,iMouseVideoList
endf41list:
 mov bx,0
 mov dx,0
 jmp end33isr

func3342:
 mov ax,ifCursorFlag
 mov bx,iHotspotX
 mov cx,iHotspotY
 mov dx,PD_PS2
 jmp end33isr

func3347:
 mov iCrtPage,0
 mov ax,-1
 mov iHardstart,6
 mov iHardEnd,7
 jmp end33isr

func3349:
 mov ax,iHoriMin
 mov bx,iVertMin
 mov cx,iHoriMax
 mov dx,iVertMax
 jmp end33isr

func3350:
 mov ax,PD_FUNC50MK
 jmp end33isr

end33isr:
 pop di
 pop si
 pop ds
 pop es
 iret

fpNewInt33h  endp

_ShowCursor proc near

 cmp ifCursorFlag,PD_ZERO
 je @F
 ret
@@:
 cmp ifOSKUICali,PD_ON
 jge notshowcalicur
 cmp ifWindows,PD_ZERO
 je doesshowcursor
 ret
notshowcalicur:
 cmp ifCalibrate, PD_NONE
 je doesshowcursor
 ret
doesshowcursor:
 cmp iVideoMode,0012h
 jne showcurnot12h
 sti
 call _PositionCursor
 cli
 call _show_12h_cursor
 ret
```

```
showcurnot12h:
 push ax
 push bx
 push cx
 push dx
 push es
 push si
 push di

 cmp iVideoMode,0003h
 jle over_showgcur
 jmp showgcur
over_showgcur:

 mov ax,PD_B800H
 mov es.ax
 mov ax,iCrtPage

 cmp iVideoMode.1
 jg  showm23

 mov cl,PD_01_PAGE_siZE
 shl ax,cl
 mov bx,ax

 mov ax, iYpos
 mov cx  iVertcharPixels
 div cl
 and ax. 00ffh

 mov cl,PD_01_LENGTH
 mul cl
 add bx,ax
 mov ax,iXpos
 mov cl,PD_01_SHIFT
 shr ax,cl
 shl ax,1
 add ax,bx
 mov si,ax
 mov iCurResOffset,ax
 mov ax.es:[si]
 mov iCursorCover,ax
 and ax,imTxtScrMask
 xor ax,imTxtCurMask
 mov es:[si],ax
 jmp endshowc
showm23:
 mov cl,PD_23_PAGE_siZE
 shl ax,cl
 mov bx.ax

 mov ax, iYpos
 mov cx, iVertcharPixels
 div cl
 and ax, 00ffh

 mov cl,PD_23_LENGTH
 mul cl
 add bx,ax
 mov ax.iXpos
 mov cl,PD_23_SHIFT
 shr ax,cl
 shl ax,1
 add ax.bx
 mov si,ax
 mov iCurResOffset,ax
 mov ax,es:[si]
 mov iCursorCover,ax
 and ax,imTxtScrMask
 xor ax,imTxtCurMask
 mov es:[si],ax
 jmp endshowc
showgcur:

 mov ax iXpos
 sub ax,iHotspotX
 cmp ax,iHoriMin
 jge @F
 mov ax,iHoriMin
@@:
 mov iCursorX,ax

 mov ax,lYpos
 sub ax,iHotspotY
 cmp ax,iVertMin
 jge @F
 mov ax,iVertMin
@@:
 mov iCursorY,ax

 mov ax,PD_A000H
 mov es,ax

 cmp iVideoMode,0011h
 jge begsgc

 cmp iVideoMode,0006h
 jle @F
 mov ax,iCRTPage
 mul iPagesize
 add ax,PD_A000H
 mov es,ax
 mov ax,iSavePageOff
@@:
 cmp iVideoMode,0005h
 jg  @F
 and iCursorX,0fffeh
@@:
 cmp iVideoMode,000Dh
 jne not640320
 mov ax,iXpos
 shr ax,PD_ONE
 sub ax,iHotspotX
 cmp ax,iHoriMin
 jge @F
 mov ax,iHoriMin
@@:
 mov iCursorX,ax
not640320:

begsgc:
 mov ax,iCursorY
 m:! iGralenX
 m.v bx,ax
 mov ax,iCursorX
 mov cl,3
 shr ax,cl
 add ax,bx

 mov si,ax
 mov iCurResOffset,ax
 mov ax,iCursorX
 and ax,0007h
 mov iBitPosCur,ax
 mov bx,8
 sub bx,ax
 mov iCountBitCur,bx

 mov iRealCurWidth,16
 mov ax,iGraCurdiffX
 cmp ax,iCursorX
 jge @F
 mov ax,iGraResX
 sub ax,iCursorX
 mov iRealCurWidth,ax
@@:

 mov iCursorBytes,1
 mov ax,iCountBitCur
 cmp ax,iRealCurWidth
 jge @F
 add ax,8
 inc iCursorBytes
 cmp ax,iRealCurWidth
 jge @F
 inc iCursorBytes
@@:

 mov iRealCurHeight,16
 mov ax,iGraCurdiffY
 cmp ax,iCursorY
 jg. @F
 m.v ax,iGraResY
 sub ax,iCursorY
 mov iRealCurHeight,ax
@@:

 call _SaveVGARegister

 mov di,iBitPosCur
 mov dl,bLeftBit12h[di]

 cmp iCursorBytes,1
 jg  @F
 mov ax,iCountBitCur
 sub ax,iRealCurWidth
 mov di,ax
 mov al,bRightBit12h[di]
 and al,dl
 mov bBitMask12h,al
 jmp endbit12h
@@:
 mov bBitMask12h,dl

 cmp iCursorBytes,2
 jg  @F
 mov ax,iCountBitCur
 add ax,8
 sub ax,iRealCurWidth
 mov di,ax
 mov dl,bRightBit12h[di]
 mov bBitMask12h+1,dl
 jmp endbit12h
@@:
 mov bBitMask12h+1,0ffh

 mov ax,iCountBitCur
 add ax,16
 sub ax,iRealCurWidth
 mov di,ax
 mov dl,bRightBit12h[di]
 mov bBitMask12h+2,dl
endbit12h:


 mov cx,3
 cmp iVideoMode,0012h
 je  curreald
 cmp iVideoMode,0006h
 jg  over_escdto12h
 jmp escdto12h
over_escdto12h:
 cmp iVideoMode,000Fh
 jne @F
 mov cx,2
@@:
 cmp iVideoMode,0011h
 jne curreald
 xor cx,cx
curreald:
 mov di,0
bitplaneloop:
 push cx

 mov ah.cl
 mov al,4
 mov dx,PD_GRAPH_addR_REG
 out dx,ax

 mov ax,0100h
 shl ax,cl
 mov al,2
 mov dx,PD_SEQUE_addR_REG
 out dx,ax

 mov si,iCurResOffset
 push si

 mov cx,iCursorBytes
 mov iColumnCount12h,0
columnloop:
 push cx

 mov al,8
 mov bx,iColumnCount12h
 mov ah,bBitMask12h[bx]
 mov dx,PD_GRAPH_addR_REG
 out dx,ax

 mov cx,iRealCurHeight
 mov iRowCount12h,0
byteloop:
 push cx

 mov dl,es:[si]

 mov bCurSave12h[di],dl
 inc di

 mov bx,iRowCount12h
 mov ax,imScr12Mask[bx]
 cmp iColumnCount12h,0
 jne @F
 mov cx,iBitPosCur
 shr ah,cl
 and dl,ah

 mov ax,imCur12Mask[bx]
 shr ah,cl
 xor ah,dl
 mov es:[si],ah
 jmp end12hdm
@@:
 mov cx,iCountBitCur
 cmp iColumnCount12h,1
 jne @F
 shl ax,cl
 and dl,ah

 mov ax,imCur12Mask[bx]
 shl ax,cl
 xor ah,dl

 mov es:[si],ah
 jmp end12hdm
@@:
 add cl,8
 shl ax,cl
 and dl,ah

 mov ax,imCur12Mask[bx]
 shl ax,cl
 xor ah,dl
 mov es:[si],ah

end12hdm:
 add  si,iGralenX

 inc  iRowCount12h
 inc  iRowCount12h

 pop  cx
 dec  cx
 cmp  cx,0
 jne  byteloop


 inc iColumnCount12h
 add si,iColumnCount12h

 pop  cx
 pop  si
 inc  si
 push si
 dec  cx
 cmp  cx,0
 je   over_columnloop
 jmp  columnloop
over_columnloop:
 pop  si

 pop  cx
 dec  cx
 cmp  iVideoMode,000Fh
 jne  @F
 dec  cx
@@:
 cmp  cx,0
 jl  over_bitplaneloop
 jmp bitplaneloop
over_bitplaneloop:

 call _ResVGARegister
 jmp  endshowc

escdto12h:

 mov ax,iCursorY
 mov bx,ax
 and bx,0001h
 mov ifEvenOddRow,bx
 mov bCurSave12h,bl
 shr ax,1
 mov cx,PD_80
 mul cx
 add ax,2000h
 mov iOddOff456,ax

 mov ax,iCursorY
 inc ax
 shr ax,1
 mov cx,PD_80
 mul cx
 mov iEvenOff456,ax

 mov ax,iCursorX
 mov cl,3
 shr ax,cl
 mov iColNum,ax

 mov iBit1Off456,ax

 mov ax,iColNum
 and ax,0001h
 mov iColNum,ax
 mov bCurSave12h+1,al

 mov ax,PD_B800H
 mov es,ax

 mov di,2
 mov cx,iCursorBytes
 mov iColumnCount12h,0
bitplane6h:
 push cx
 mov ax,iColNum

 cmp iVideoMode,0006h
 jne @F
 mov ax,PD_ZERO
@@:

 mov cl,8
 shl ax,cl
 mov cl,ah
 mov al,4
 mov dx,PD_GRAPH_addR_REG
 out dx,ax

 mov ax,0100h
 shl ax,cl
 mov al,2
 mov dx,PD_SEQUE_addR_REG
 out dx,ax
```

```
 mov al,8
 mov bx,iColumnCount12h
 mov ah,bBitMask12h[bx]
 mov dx,PD_GRAPH_addR_REG
 out dx,ax

 cmp iColNum,PD_ONE
 je @F
 mov ax,iBit1Off456
 mov iColNum,PD_ONE
 jmp in6hbitlp
@@:
 mov ax,iBit1Off456
 mov iColNum,PD_ZERO
in6hbitlp:
 add ax,iColumnCount12h
 mov si,ax

 mov cx,iRealCurHeight
 mov iRowCount12h,0
colloop6h:
 push cx

 push si
 cmp ifEvenOddRow,PD_ONE
 je @F
 add si,iEvenOff456
 mov ifEvenOddRow,PD_ONE
 jmp in6hsgc
@@
 add si,iOddOff456
 mov ifEvenOddRow,PD_ZERO
in6hsgc:

 mov dl,es:[si]

 mov bCurSave12h[di],dl
 inc di

 mov bx,iRowCount12h
 cmp iVideoMode,0006h
 jne gomsk45
 mov ax,imCur12Mask[bx]
 mov imTempMask,ax
 mov ax,imScr12Mask[bx]
 jmp got456msk
gomsk45:
 mov ax,imCur45Mask[bx]
 mov imTempMask,ax
 mov ax,imScr45Mask[bx]
got456msk:
 cmp iColumnCount12h,0
 jne @F
 mov cx,iBitPosCur
 shr ah,cl
 and dl,ah

 mov ax,imTempMask
 shr ah,cl
 xor ah,dl
 mov es:[si],ah
 jmp end06hdm
@@.
 mov cx,iCountBitCur
 cmp iColumnCount12h,1
 jne @F
 shl ax,cl
 and dl,ah

 mov ax,imTempMask
 shl ax,cl
 xor ah,dl

 mov es:[si],ah
 jmp end06hdm
@@
 add cl,8
 shl ax,cl
 and dl,ah

 mov ax,imTempMask
 shl ax,cl
 xor ah,dl
 mov es:[si],ah
end06hdm
 inc iRowCount12h
 inc iRowCount12h

 pop si
 test iRowCount12h,0002h
 jnz @F
 add si,PD_80
@@:
 pop cx
 dec cx
 cmp cx,0
 je over_colloop6h
 jmp colloop6h
over_colloop6h:
 inc iColumnCount12h
 add si,iColumnCount12h
 pop cx
 dec cx
 cmp cx,0
 je over_bitplane6h
 jmp bitplane6h
over_bitplane6h:
 call _ResVGARegister
 jmp endshowc
endshowc:
 pop di
 pop si
 pop es
 pop dx
 pop cx
 pop bx
 pop ax
 ret
_ShowCursor endp

_RestoreCursor proc near
 cmp ifCursorFlag,PD_ZERO
 je @F
 ret
@@:
 cmp ifOSKUICall,PD_ON
 jge restoskui
 cmp ifWindows,PD_ZERO
 je @F
 ret
@@
restoskui:
 cmp iVideoMode,0012h
 jne restorecurnot12h
 call _restore_12h_cursor
 ret

restorecurnot12h:
 push ax
 push bx
 push cx
 push dx
 push es
 push si


 cmp iVideoMode.3
 jg resgcur
 mov ax,PD_B800H
 mov es,ax
 mov bx,iCurResOffset
 mov ax,iCursorCover
 mov es:[bx],ax
 jmp endrcur
resgcur:
 mov ax,PD_A000H
 mov es,ax

 call _SaveVGARegister

 cmp iVideoMode,000Dh
 jl rgcnotdto12h

 mov ax,0ff08h
 mov dx,PD_GRAPH_addR_REG
 out dx,ax


 mov cx,4
 xor bx,bx

 cmp iVideoMode,0012h
 je grealres

 cmp iVideoMode,0011h
 jne @F
 mov cx,1
 jmp grealres
@@:
 mov ax,iSavePageOff
 cmp iVideoMode,000Fh
 jne grealres
 mov cx,3
grealres:

bitplcurloop:
 push cx

 dec cx
 mov ax,0100h
 shl ax,cl
 mov al,2
 mov dx,PD_SEQUE_addR_REG
 out dx,ax

 mov si,iCurResOffset
 push si
 mov cx,iCursorBytes
colresloop:
 push cx

 mov cx,iRealCurHeight
byteresloop:

 mov al,bCurSave12h[bx]
 inc bx
 mov es:[si],al

 add si,iGraLenX

 loop byteresloop


 pop cx
 pop si
 inc si
 push si
 loop colresloop
 pop si

 pop cx
 cmp iVideoMode,000Fh
 jne @f
 dec cx
@@
 loop bitplcurloop
 call _ResVGARegister
 jmp endrcur

rgcnotdto12h.

 mov ax,PD_B800H
 mov es,ax

 mov ax,0ff08h
 mov dx,PD_GRAPH_addR_REG
 out dx,ax

 xor ax,ax
 mov al,bCurSave12h
 mov ifEvenOddRow,ax
 mov al,bCurSave12h+1
 mov iColNum,ax
 mov bx,2
 mov cx,iCursorBytes
 mov iColumnCount12h,0
bitresto6h:
 push cx
 mov cx,iColNum
 cmp iVideoMode,0006h
 jne @F
 mov cx,PD_ZERO
@@

 mov ax,0100h
 shl ax,cl
 mov al,2
 mov dx,PD_SEQUE_addR_REG
 out dx,ax

 cmp iColNum,PD_ONE
 je @F
 mov ax,iBit1Off456
 mov iColNum,PD_ONE
 jmp in6hresbitlp
@@:
 mov ax,iBit1Off456
 mov iColNum,PD_ZERO
in6hresbitlp:
 add ax,iColumnCount12h
 mov si,ax

 mov cx,iRealCurHeight
 mov iRowCount12h,0
collpre6h:
 push cx

 push si
 cmp ifEvenOddRow,PD_ONE
 je @F
 add si,iEvenOff456
 mov ifEvenOddRow,PD_ONE
 jmp in6hsgcres
@@:
 add si,iOddOff456
 mov ifEvenOddRow,PD_ZERO
in6hsgcres:
 mov al,bCurSave12h[bx]
 inc bx
 mov es:[si],al

 inc iRowCount12h
 inc iRowCount12h

 pop si
 test iRowCount12h,0002h
 jnz @F
 add si,PD_80
@@:
 pop cx
 dec cx
 cmp cx,0
 jne collpre6h


 inc iColumnCount12h
 add si,iColumnCount12h

 pop cx
 dec cx
 cmp cx,0
 je over_bitresto6h
 jmp bitresto6h
over_bitresto6h:
 call _ResVGARegister
 jmp endrcur

endrcur:
 pop si
 pop es
 pop dx
 pop cx
 pop bx
 pop ax
 ret
_RestoreCursor endp

_SaveVGARegister PROC NEAR
 mov dx,PD_GRAPH_addR_REG
 mov al,5
 out dx,al
 inc dx
 in al,dx
 mov bSaveVGAMR,al
 and al,11110100b
 out dx,al

 mov dx,PD_GRAPH_addR_REG
 mov al,3
 out dx,al
 inc dx
 in al,dx
 mov bSaveVGADRR,al
 xor al,al
 out dx,al

 mov al,4
 mov dx,PD_GRAPH_addR_REG
 out dx,al
 inc dx
 in al,dx
 mov bSaveVGARMSR,al

 mov al,2
 mov dx,PD_SEQUE_addR_REG
 out dx,al
 inc dx
 in al,dx
 mov bSaveVGAMMR,al

 mov al,8
 mov dx,PD_GRAPH_addR_REG
 out dx,al
 inc dx
 in al,dx
 mov bSaveVGABMR,al

 ret
_SaveVGARegister endp

_ResVGARegister PROC NEAR
 mov dx,PD_GRAPH_addR_REG
 mov al,5
 mov ah,bSaveVGAMR
 out dx,ax

 mov dx,PD_GRAPH_addR_REG
 mov al,3
 mov ah,bSaveVGADRR
 out dx,ax

 mov al,4
 mov dx,PD_GRAPH_addR_REG
 mov ah,bSaveVGARMSR
 out dx,ax

 mov al,2
 mov dx,PD_SEQUE_addR_REG
 mov ah,bSaveVGAMMR
 out dx,ax

 mov al,8
 mov dx,PD_GRAPH_addR_REG
 mov ah,bSaveVGABMR
 out dx,ax
```

```
 ret
_ResVGARegister endp

_show_12h_cursor proc near
 SaveEntryRegisters
 push bp
 push es
 push ds
 mov bx, offset bEGARegBuff
 SaveEGARegister

 mov ah, 1
 SetEGAWriteReadMode
 SetEGAColorMask

 mov di, PD_CUR_IMAGE_SAVE_BUFF
 mov bx, PD_CUR_IMAGE_PROC_BUFF
 mov si, [iCurOffset12h]
 mov dx, [iLineSkip12hCur]

 mov ax, PD_A000H
 mov es, ax
 mov ah, byte ptr [iCurHeight12h]
 mov cx, [iCurWidth12h]
 push es
 pop ds

 mov bp, cx
backup_image_12h:
 mov cx bp
backup_image_12h_line:
 movsb
 mov [bx], al
 inc bx
 loop backup_image_12h_line
 add si, dx
 dec ah
 jnz backup_image_12h

 pop ds
 mov ah, 0
 SetEGAWriteReadMode
 mov si, [iOffsetIntoANDMask]
 mov bx, [iOffsetIntoXORMask]
 mov di, PD_CUR_IMAGE_PROC_BUFF
 mov bp, [iCurHeight12h]

Cursor12hLines:
 push cs
 pop ds
 mov cx, [iCurWidth12h]
Cursor12hOneLine:
 mov ah, byte ptr es:[di]
 lodsb
 mov ah, al
 not ah
 SetEGABitMask
 mov byte ptr es:[di], 0
 SetEGAColorMask
 mov al, byte ptr cs:[bx]
 inc bx
 stosb
 SetEGAColorMask
 loop Cursor12hOneLine

 add si, [iCurMaskSkip12h]
 add bx, [iCurMaskSkip12h]
 dec bp
 jnz Cursor12hLines

 push ds
 mov ah, 1
 SetEGAWriteReadMode
 mov ah, 0ffh
 SetEGABitMask
 mov si, PD_CUR_IMAGE_PROC_BUFF
 mov di, [iCurOffset12h]
 mov dx, [iCurHeight12h]
 mov bx, [iLineSkip12hCur]
 mov cx, [iCurWidth12h]
 mov ax, es
 mov ds, ax
 mov ax cx
Cursor12hWrite:
 mov cx ax
 rep movsb
 add di, bx
 dec dx
 jnz Cursor12hWrite

 pop ds
 pop es

 mov bx, offset bEGARegBuff
 RestoreEGARegister
 pop bp
 RestoreEntryRegisters
 ret
_show_12h_cursor endp

_restore_12h_cursor proc near
 SaveEntryRegisters
 mov bx, offset bEGARegBuff
 SaveEGARegister
 mov ah, 1
 SetEGAWriteReadMode
 SetEGAColorMask
 mov si, PD_CUR_IMAGE_SAVE_BUFF
 mov di, [iCurOffset12h]
 mov dx, [iCurHeight12h]
 mov bx, [iLineSkip12hCur]
 mov cx, [iCurWidth12h]

 push ds
 push es
 mov ax, PD_A000H
 mov ds, ax
 mov es, ax
 mov ax, cx

restore_12h_loop1:
 mov cx, ax
 rep movsb
 add di, bx
 dec dx
 jnz restore_12h_loop1

 pop es
 pop ds
 mov bx, offset bEGARegBuff
 RestoreEGARegister
 RestoreEntryRegisters
 ret
_restore_12h_cursor endp

_PositionCursor proc near
 push bp
 mov bp, sp
 SaveEntryRegisters

 mov ax,iXpos
 sub ax,iHotspotX
 mov bx, ax
 mov dx, ax
 and dx, 7
 push dx

 sar ax, 1
 sar ax, 1
 sar ax, 1

 mov cx, ax
 dec cx
 add cx, PD_CURSOR_TOTAL_LEN

 cmp ax, [iMinXByte12h]
 jl clipxleft12h

 cmp cx, [iMaxXByte12h]
 jg clipxright12h

 push ax
 mov [iCurWidth12h], PD_CURSOR_TOTAL_LEN
 xor ax, ax
 push ax
 jmp clipx12hover

clipxleft12h:
 push [iMinXByte12h]
 mov dx, [iMinXByte12h]
 sub dx, ax
 mov cx, PD_CURSOR_TOTAL_LEN
 sub cx, dx
 mov [iCurWidth12h], cx
 push dx
 jmp clipx12hover

clipxright12h:
 sub cx, [iMaxXByte12h]
 push ax
 mov dx, PD_CURSOR_TOTAL_LEN
 sub dx, cx
 mov [iCurWidth12h], dx
 xor ax, ax
 push ax
clipx12hover:

 mov ax,iYpos
 sub ax,iHotspotY

 mov bx, ax
 add bx, PD_CURSOR_TOTAL_HGT
 dec bx

 cmp ax, [iVertMin]
 jl clipytop12h

 mov cx, [iVertMax]
 cmp bx, cx
 jg clipybottom12h

 push ax
 mov [iCurHeight12h], PD_CURSOR_TOTAL_HGT
 xor ax, ax
 push ax
 jmp clipy12hover

clipytop12h:
 push [iVertMin]
 mov dx, [iVertMin]
 sub dx, ax
 mov cx, PD_CURSOR_TOTAL_HGT
 sub cx, dx
 mov [iCurHeight12h], cx
 push dx
 jmp clipy12hover

clipybottom12h:
 push ax
 sub bx, cx
 mov dx, PD_CURSOR_TOTAL_HGT
 sub dx, bx
 mov [iCurHeight12h], dx
 xor ax, ax
 push ax
clipy12hover:

 mov bp, sp
 mov ax, [bp+2]
 mov cx, PD_80
 mul cx
 add ax, [bp+6]
 mov [iCurOffset12h], ax

 mov ax, PD_80
 sub ax, [iCurWidth12h]
 mov [iLineSkip12hCur], ax

 mov ax, PD_CURSOR_TOTAL_LEN
 sub ax, [iCurWidth12h]
 mov [iCurMaskSkip12h], ax

 lea bx, bCurImageBuffer
 mov cx, PD_CURSOR_TOTAL_LEN *
PD_CURSOR_TOTAL_HGT * 2
 mov ax, [bp+8]
 mul cx
 add bx, ax
 add bx, [bp+4]

 mov ax, [bp+0]
 mov cx, PD_CURSOR_TOTAL_LEN
 mul cx
 add bx, ax
 mov [iOffsetIntoANDMask], bx

 add bx, PD_CURSOR_TOTAL_LEN *
PD_CURSOR_TOTAL_HGT
 mov [iOffsetIntoXORMask], bx

 add sp, 10
 RestoreEntryRegisters
 pop bp
 ret
_PositionCursor endp

_SetModeData proc near
 mov iHoriMin,0
 mov iVertMin,0
 mov iXpos,PD_HalF640
 mov iLastX,PD_HalF640
 mov iHoriMax,PD_639

 mov iMinXByte12h, 0
 mov iMaxXByte12h, 79

 cmp iVideoMode,14
 jg v14_or_higher
 cmp iVideoMode, 3
 jg not_tv_0123
 mov ax, iVertScrPixels
 dec ax
 mov iVertMax, ax
 mov iMulY, ax
 shr ax, 1
 mov iYpos, ax
 mov iLastY, ax
 jmp m_v_mode

not_tv_0123:
 mov iVertMax,PD_199
 mov iMulY,PD_199
 mov iYpos,PD_HalF200
 mov iLastY,PD_HalF200
 jmp m_v_mode

v14_or_higher:
 cmp iVideoMode,16
 jg @F
 mov iVertMax,PD_349
 mov iMulY,PD_349
 mov iYpos,PD_HalF350
 mov iLastY,PD_HalF350
 jmp m_v_mode
@@:
 mov iVertMax,PD_479
 mov iMulY,PD_479
 mov iYpos,PD_HalF480
 mov iLastY,PD_HalF480
m_v_mode:
 push ax
 push bx
 push dx
 mov ax,PD_10000
 mul iMulY
 mov bx,iMaxY
 sub bx,iMinY
 cmp bx, PD_ZERO
 je setmodedata0
 div bx
 mov iMulY,ax

 mov ax,PD_10000
 mov bx,PD_639
 mul bx
 mov bx,iMaxX
 sub bx,iMinX
 cmp bx, PD_ZERO
 je setmodedata0
 div bx
 mov iMulX,ax
 clc
 jmp setmodedataok
setmodedata0:
 stc
setmodedataok:
 pop dx
 pop bx
 pop ax
 ret
_SetModeData endp

_build_cursor_image proc far
 push bp
 mov bp, sp
 SaveEntryRegisters
 push ds
 push es

 push ds
 pop es
 lea dx, imScr12Mask

 mov cx, 16
 lea di, bCurImageBuffer
 mov si, dx
 mov bl, 0ffh
build_cur_swap_scr:
 lodsw
 xchg al, ah
 stosw
 mov al, bl
 stosb
 loop build_cur_swap_scr
 mov cx, 16
build_cur_swap_mask:
 lodsw
 xchg al, ah
 stosw
 mov al, 0
 stosb
 loop build_cur_swap_mask

 mov ax, es
 mov ds, ax
 lea si, bCurImageBuffer
 mov cx, 16*2*7
build_cur_image:
 mov dx, 3
 mov bx, di
 clc
build_cur_image_x:
 lodsb
 ror al, 1
 stosb
 dec dx
 jnz build_cur_image_x
 jnc build_cur_image_xend
 or byte ptr es:[bx], 10000000b
build_cur_image_xend:
 loop build_cur_image

 pop es
 pop ds
 RestoreEntryRegisters
 pop bp
 ret
```

```
_build_cursor_image  endp

InstallTSR SEGMENT public 'CODE'
    assume cs:InstallTSR, ds:@code

public MainInstall
MainInstall proc far
  mov ax,@code
  mov ds,ax
  mov wTSRorigPsp,es

  cld
  call checkCommandLine
  jc  ins_remove
  call Existcheck
  jc  ins_error

  call InterfacesM
  jc   sm_not
  call InstallISR

  mov al,PD_LOAD_OK
  call PrintInstallMsg

  call _build_cursor_image

  call _SetPenspkFreq

  mov dx,InstallTSR
  sub dx,wTSRorigPsp
  add dx,2
  mov ax,3100h
  int 21h
ins_remove.
  or  al,al
  jge pm_err
  call RemoveDriver
  jmp pm_err
sm_not:
  mov al,PD_SM_not
  jmp pm_err
ins_error
  mov al,PD_alREADY_IN
pm_err.
  call PrintInstallMsg
  inc al
  mov ah,4ch
  int 21h
MainInstall endp

checkCommandLine proc near
    push ds
    push es
    push es
    pop ds
    mov ax,@data
    mov es,ax

    mov si,0080h
    lodsb
    cbw
    xchg cx,ax
    jcxz clnopara
clsearch.
    lodsb
    cmp al,' '
    jb  clnopara
    je  clsearch
    cmp al,'-'
    jne notvalicl

    lodsb
    or  al ' '
    cmp al,'u'
    je  deinstall
notvalicl:
    mov al,PD_CMD_LINE_ERR
    jmp clerror
deinstall:
    mov al,-1
clerror:
    stc
    jmp clreturn
clnopara
    clc
clreturn:
    pop  es
    pop  ds
    ret
checkCommandLine endp

Existcheck proc near
  push bx
  push cx
  push dx
  push di
  push si
  push ds
  push es
  mov ax,@code
  mov ds,ax
  mov dx,0080h
  mov bx,ds
ai_0:
  mov si,offset bspensignature
  inc byte ptr [si]
  mov ax,[si]
ai_1:
  mov es,dx
  cmp ax,es:[si]
  je  ai_3
ai_2:
  inc dx
  cmp dx,bx
  jb  ai_1
  c'
  jn ; ai_ret

ai_3:
  mov cx,PD_SIG_LEN
  mov di,si
  push si
  repe cmpsb
  pop  si
  je   ai_4
  jcxz ai_4
  jmp  ai_2
ai_4:
  mov  ax,es
  stc
ai_ret.
  pop es
  pop ds
  pop si
  pop di
  pop dx
  pop cx
  pop bx
  ret
Existcheck endp

InterfacesM proc near
  push bx
  push cx
  push dx
  push di
  push si
  push ds
  push es

  mov ax,356ah
  int 21h
  add bx,PD_SM_siG_OFF
  mov si,offset sSMsignature
  m v di,bx
  cl.
  mov cx,PD_SM_siG_LEN
  repe cmpsb
  jnz  smsigret
  mov ax,PD_SM_INIT
  int 6ah
  mov es,dx
  mov ax,word ptr es:[si]
  mov iMinX,ax
  mov ax,word ptr es:[si+2]
  mov iMinY,ax
  mov ax,word ptr es:[si+4]
  mov iMaxX,ax
  mov ax,word ptr es:[si+6]
  mov iMaxY,ax
  mov ax,word ptr es:[si+8]
  mov ax,word ptr es:[si+10]
 mov ax,word ptr es:[si+12]
  mov ax,word ptr es:[si+14]
  mov ax,word ptr es:[si+16]

      mov  ax, iMaxY
      sub  ax, iMinY
      mov  dx, 0
      mov  bx, PD_HOT_ICON_NUMBER
      div  bx
      mov  iHotIconWidth, ax

  mov  ax,PD_10000
  mov  bx,PD_639
  mul  bx
  mov  bx,iMaxX
  sub  bx,iMinX
  cmp  bx, PD_ZERO
  je   smsigret
  div  bx
  mov  iMulX,ax

  m   ax,PD_10000
  m   bx,PD_199
  mul  bx
  mov  bx,iMaxY
  sub  bx,iMinY
  cmp  bx, PD_ZERO
  je   smsigret
  div  bx
  mov  iMulY,ax
  clc
  jmp smifaceret
smsigret:
  stc
smifaceret:
  pop es
  pop ds
  pop si
  pop di
  pop dx
  pop cx
  pop bx
  ret
InterfacesM endp

public InstallISR
InstallISR   proc    near
  push es
  mov si,offset wTSRreplaceVectorTable
  mov cx,PD_TSR_repLACE_NUM
initsetvec:
  mov al,[si].iIntNum
  mov ah,35h
  int 21h
  mov [si].iOldISRoffset,bx
  mov [si].iOldISRseg,es

  mov dx,[si].iNewISRoffset
  mov ah,25h
  int 21h

  add si,size sintVectorreplace
  loop initsetvec
  pop  es

  mov dx,0021h
  jmp short $+2
  jmp short $+2
  jmp short $+2
  in  al,dx
  and al,0DFh
  mov dx,0021h
  jmp short $+2
  jmp short $+2
  jmp short $+2
  out dx,al


  ret
InstallISR endp

RemoveDriver proc near
  call Existcheck
  jnc  notinsrem

  mov es,ax

  mov ax,PD_SM_notIFY
  int 6ah

  call DeinstallISR

  push es
  mov ax,es:wTSRorigPsp
  mov es,ax
  mov es,es:[2ch]
  mov ah,49h
  int 21h
  pop es

  mov ax,es:wTSRorigPsp
  push es
  mov es,ax
  mov ah,49h
  int 21h
  pop es
  jc  removebad
  mov al,PD_REmovE_MesSAGE
  jmp removeret

removebad:
  mov al,PD_REmovE_ERRor
  jmp removeret

notinsrem:
  mov al,PD_not_IN_MEM
removeret:
  ret
RemoveDriver endp

public _SetPenspkFreq
_SetPenspkFreq proc near
   mov  al, PD_TIMER2_16BIT_MODE
   cli
   out 43h, al
   jmp short $+2
   mov ax, PD_PSEO_FREQUENCY
   out 42h. al
   jmp short $+2
   mov al, ah
   out 42h, al
   sti
   ret
_SetPenspkFreq endp

public DeinstallISR
DeinstallISR proc near
  push cx
  push dx
  push di
  push si
  push ds

  mov dx,0021h
  jmp short $+2
  jmp short $+2
  jmp short $+2
  in  al,dx
  or  al,20h
  mov dx,0021h
  out dx,al

  mov cx,PD_TSR_repLACE_NUM
  mov si,offset wTSRreplaceVectorTable
dinsloop:
  mov al,es:[si].iIntNum
  lds dx,dword ptr es:[si].iOldISRoffset
  mov ah,25h
  int 21h
  add si,size sintVectorreplace
  loop dinsloop

  pop ds
  pop si
  pop di
  pop dx
  pop cx
  ret
DeinstallISR endp

PrintInstallMsg proc near
  push ax
  push ds

  push cs
  pop ds

  push ax

  mov cx,cs:install_msg_title[2]
  mov dx,cs:install_msg_title[0]
  sub cx,dx
  mov bx,1
  mov ah,40h
  int 21h

  pop ax
  xor bx,bx
  mov bl,al
  shl bx,1
  mov cx,cs:install_msg_index[bx+2]
  mov dx,cs:install_msg_index[bx]
  sub cx,dx
  mov bx,1
  mov ah,40h
  int 21h
  pop ds
  pop ax
  ret
PrintInstallMsg endp

install_msg_title label word
dw msgtitle
dw msgtitleend

msgtitle  db 0Dh,0ah,'Saratoga Pen Driver Version '
     db PD_VERsiON
     db 0Dh,0ah
     db 'Copyright (C) 1995 Zenith Data Systems
Corp. All rights
reserved.',0Dh,0ah
     db 0Dh,0ah
msgtitleend label byte


install_msg_index label word
dw msg0, msg1, msg2, msg3
dw msg4, msg5, msg6
dw msgend

msg0  db 'Saratoga Pen Driver was already
loaded.',0Dh,0ah
msg1  db 'Saratoga Pen Driver was removed from
memory.',0Dh,0ah
```

```
msg2  db 'Saratoga Pen Driver is not in memory
now.',0Dh,0ah
msg3  db 'Error for attempting remove.',0Dh,0ah
msg4  db 'Unknown command line option.',0Dh,0ah

msg5  db 'Saratoga Pen Driver was successfully
loaded.',0Dh,0ah
msg6  db 'Saratoga Pen Driver was not loaded.
Saratoga Manager
was not detected.',0Dh,0ah
msgend label byte

InstallTSR ends
    end MainInstall
```

```
Copr. 1995 Zenith Data Systems Corp.

#include "pcx.h"
#include <stdio.h>
#include <stdlib.h>
#include <conio.h>
#include <io.h>
#include <string.h>
#include <dos.h>
#include <malloc.h>
#include <time.h>

#if defined( _MSC_VER )
#pragma warning( disable : 4704 )
#endif

void sleep( clock_t wait );
void stretch_text( char fEnable );

#define VIDEO 0x10
#ifdef __cplusplus
  extern "C" {
#endif
void Decode16(void);
void Decode256(void);
void DecodeSVGA256(void);
#ifdef __cplusplus
}
#endif


#ifdef __cplusplus
  extern "C" {
#endif
int Margin;
int far *Scratch;
unsigned int BytesPerLine.
unsigned int VideoSeg, VideoOffs;
unsigned int DataLength;
unsigned int ColumnCount,
unsigned int Plane;
unsigned char RepeatCount;
int ScreenWidth;
int LineEnd;
#ifdef __cplusplus
}
#endif

int file_error;
unsigned int WindowEnd, WindowStep, WindowPos;
int BytesPerScanLine;
int StartCol, XMax;
int far *LineBuf;
unsigned int LineBufSeg, LineBufOffs, LineBufIndex,
char WriteWindow;
unsigned int buffer_size;
const num_modes = 11;
union REGS inregs, outregs;
struct SREGS segregs;
FILE *pcx_file;
pathstr pcx_filename;
char *error_str;
int pic_width;
int our_modes[num_modes] = {0x0D, 0x0E, 0x10,
0x12, 0x13, 0x100,
0x101,
                    0x102, 0x103, 0x105, 0x107};



rgb_struct rgb_pal[15];
pcx_header_struct pcx_header;
VESA_info_struct VESA_info;
mode_info_struct mode_info;

typedef rgb_struct cregisters[256];
cregisters rgb256;



void video_off(int vid_status)
{
inregs.h.ah = 0x12;
inregs.h.bl = 0x36;
inregs.h.al = vid_status;
int86(VIDEO, &inregs, &outregs);
}

int detect_VESA(VESA_info_struct *VESA_rec)
{
  inregs.x.ax = 0x4F00;
  segregs.es = FP_SEG(VESA_rec);
  inregs.x.di = FP_OFF(VESA_rec);
  int86x(VIDEO, &inregs, &outregs, &segregs);
  if (outregs.h.ah) return 0;
  return(!strncmp( ( const char far *
)VESA_rec->signature,
"VESA", 4));
}


int detect_VGA(void)
{
inregs.h.ah = 0x1A;
inregs.h.al = 0;
int86(VIDEO, &inregs, &outregs);
return(outregs.h.al != 0x1A);
}


int hardware_supports(unsigned int mode)
{
  unsigned int far *modeptr;

  if (mode >= 0x100) {
    if (detect_VESA(&VESA_info)) {
      modeptr = VESA_info.mode_list_ptr;
      do {
    if (*modeptr++ == mode) return 1;
      } while (*modeptr != 0xFFFF);
    }
    return 0;
  }
  return 1;
}

int we_support(unsigned int mode)
{
  int x;
  int in_there = 0.

  for (x = 0; x < num_modes; x++) {
    if (mode == ( unsigned int )our_modes[x])
in_there = 1; }
  return in_there;
}

int fits(pcx_header_struct header)
{
  return((header.xmax < header.hres) &&
(header.ymax <
header.vres));
}

void try_it(unsigned int mode, unsigned int *m)
{
  if ((hardware_supports(mode)) &&
(we_support(mode)))
    *m = mode;
  return;
}

unsigned int best_mode(pcx_header_struct header)

{
  unsigned int m;

  if (header.num_planes == 1) {
    m = 0x13;
    if ((header.hres > 320) || (!fits(header)))
try_it(0x101,
&m);
    if ((header.hres > 640) || (!fits(header)))
try_it(0x103,
&m);
    if ((header.hres > 800) || (!fits(header)))
try_it(0x105,
&m);
    if ((header.hres > 1024) || (!fits(header)))
try_it(0x107,
&m);
  } else if (header.num_planes == 4) {
    m = (header.hres <= 320) ? 0x0D : 0x0E;
    if ((header.vres > 200) || (!fits(header)))
try_'t 0x10, &m);
    if ((header.vres > 350) || (!fits(header)))
try_it(0x12, &m);
    if ((header.vres > 480) || (!fits(header)))
try_it(0x102,
&m);
  } else {
    file_error = 5;
    m = 0xFFFF,
  }
  return m;
  }

void get_mode_info(unsigned int mode,
mode_info_struct *m)
{
  inregs.x.ax = 0x4F01;
  inregs.x.cx = mode;
  segregs.es = FP_SEG(m);
  inregs.x.di = FP_OFF(m);
  int86x(VIDEO. &inregs, &outregs, &segregs);
  switch(mode) {
    case 0x100: m->yres = 400; break;
    case 0x101: m->yres = 480; break;
    case 0x102: m->yres = 600; break;
    case 0x103: m->yres = 600; break;
    case 0x105: m->yres = 768; break;
    case 0x107: m->yres = 1024;
    }
  return;
}

int get_mode(void)
{
  int curr_mode;

  if (detect_VESA(&VESA_info)) {
    inregs.x.ax = 0x4F03;
    int86(VIDEO, &inregs, &outregs);
    curr_mode = outregs.x.bx;
    curr_mode &= 0x3FFF;
    if (hardware_supports(curr_mode) && (curr_mode
>= 0x100))
      return curr_mode;
  }
    inregs.h.ah = 0x0F;
    int86(VIDEO, &inregs, &outregs);
    return outregs.h.al;
}

void set_mode(int mode, int options)
{
  if (mode >= 0x100) {
    if (options & save_mem) mode |= 0x8000;
    inregs.x.ax = 0x4F02;
    inregs.x.bx = mode;
  } else {
    if (options & save_mem) mode |= 0x80;
    inregs.x.ax = mode;
    inregs.h.ah = 0;
  }
    int86(VIDEO, &inregs, &outregs);
  return;
}

void put_window(int step, char window)
{
  inregs.x.ax = 0x4f05;
  inregs.h.bh = 0;
  inregs.h.bl = window;
  inregs.x.dx = step;
  int86(VIDEO, &inregs, &outregs);
}


void set_color_registers(cregisters rgb)
{

  inregs.h.ah = 0x10;
  inregs.h.al = 0x12;
  segregs.es = FP_SEG(rgb);
  inregs.x.dx = FP_OFF(rgb);
  inregs.x.bx = 0;

  inregs.x.cx = 0x40;

  int86x(VIDEO, &inregs, &outregs, &segregs);
  return;
}

void set_palette(unsigned char *palette)
{

  inregs.h.ah = 0x10;
  inregs.h.al = 0x02;



  segregs.es = FP_SEG(palette);
  inregs.x.dx = FP_OFF(palette);
  int86x(VIDEO, &inregs, &outregs, &segregs);
  return;
}

long get_256_palette(FILE *the_file, cregisters
rgb256)


{
  unsigned char palette_flag;
  long palette_start;
  int x;

  palette_start = filelength(fileno(the_file)) - 769;
  fseek(the_file, palette_start, SEEK_SET);
  palette_flag = getc(the_file);
  if ((palette_flag != 12) || (pcx_header.version < 5)
    || (fread(rgb256, 3, 256, the_file) < 256)) {
    file_error = 2;
    return 0.
  }
  for (x = 0; x < 256; x++) {
    rgb256[x].r >>= 2;
    rgb256[x].g >>= 2;
    rgb256[x].b >>= 2;
  }
  return palette_start;
}



FILE *open_file(pathstr pic_file_name, char
*file_mode,
        pcx_header_struct *header)
{
  FILE *f;

  f = fopen(pic_file_name, file_mode);
  if (f != NULL) fread(header, 1, 128, f);
  return f;
}

char *report_error(int error)
{
  switch(error) {
    case 1: return "Could not open file.\n";
    case 2: return "No palette information in file.\n";
    case 3: return "Picture is too wide for requested
video
mode.\n";
    case 4: return "Number of colors in file does not
match
selected mode.\n";
    case 5: return "Unsupported picture format.\n";
    default: return "Undefined error.\n";
    }
}

void get_margin(int screenwd, int *margin, int
*line_end,
              pcx_header_struct header)
{

  *line_end = header.bytes_per_line;
  *margin = screenwd - *line_end;
  if (*margin < 0) file_error = 3;
  return;
}

unsigned int set_buffer_size(void)
{
  unsigned int buf;
  void far *bufptr;

  buf = 64512;
  if ((bufptr = malloc(buf)) == NULL)
  {
    cmd_error( "\nERROR: Insufficient memory to
display the
requested image.\n" );
    exit(1);
  }
  else
    free(bufptr);

  return buf;
}

long get_first_pix(pcx_header_struct header, int
optns,
                int screenwid, int screenht)


{

  long first_pix = 0;
  int picwid, picht;

  picwid = header.xmax - header.xmin + 1;
  if (header.bits_per_plane == 1) picwid /= 8;
  picht = header.ymax - header.ymin;
  if (picht < screenht) {
    if (!(optns & vcenter))
      first_pix += (long)header.ymin * screenwid;
    else first_pix += (long)(screenht-1-picht) / 2 *
screenwid;
  };
  if (picwid < screenwid) {
    if (!(optns & hcenter)) first_pix += header.xmin;
    else first_pix += (screenwid - picwid) / 2;
  };
return first_pix;
}
```

```
int read_16(FILE *pic_file, unsigned int mode,
unsigned int
options)
{
  TRACE( "NOTICE: Entered read_16\r" );

  typedef unsigned char palette_bytes[3];

  char nOldSequencer;
  unsigned char entry, gun, pcx_code;
  unsigned char pal_regs[17];
  unsigned int screen_height;

  if (pcx_header.num_planes != 4) return 4;
  if (mode >= 0x100) {
    get_mode_info(mode, &mode_info);
    ScreenWidth = mode_info.bytes_per_line;
    screen_height = mode_info.yres;
  } else
  switch(mode) {
    case 0x0D: ScreenWidth = 40; screen_height =
200; break;
    case 0x0E: ScreenWidth = 80; screen_height =
200; break;
    case 0x10: ScreenWidth = 80; screen_height =
350; break;
    case 0x12: ScreenWidth = 80; screen_height =
480; break;
  }
  get_margin(ScreenWidth, &Margin, &LineEnd,
pcx_header);
  if (file_error) return file_error;
  VideoOffs = (unsigned int)
get_first_pix(pcx_header, options,
ScreenWidth, screen_height);
  VideoSeg = 0xA000;

  stretch_text( 0 );

  outp(0x3C4, 2);
  Plane = 1;
  outp(0x3C5, Plane);



  for (entry = 0; entry < 16; entry++) {
    for (gun = 0; gun < 3; gun++) {
      pcx_code = ((unsigned char
*)(&pcx_header.palette[entry]))[gun];
      switch (gun) {
    case 0: rgb_pal[entry].r = pcx_code >> 2; break;
    case 1: rgb_pal[entry].g = pcx_code >> 2; break;
    case 2: rgb_pal[entry].b = pcx_code >> 2;
      }
    }
    pal_regs[entry] = entry;
  }
  pal_regs[16] = 0;

  TRACE( "NOTICE: Changing RGB values in color
registers \r" );

  nOldSequencer = inp(0x3C4);
  set_color_registers((rgb_struct *)rgb_pal);
  outp(0x3C4, nOldSequencer);

  nOldSequencer = inp(0x3C4);
  set_palette(pal_regs);
  outp(0x3C4, nOldSequencer);


  BytesPerLine = pcx_header.bytes_per_line;
  RepeatCount = 0;
  ColumnCount = 0;
  buffer_size = set_buffer_size();
  Scratch = (int far*)malloc(buffer_size);
  fseek(pic_file, 128, SEEK_SET);

  do {
    DataLength = fread(Scratch, 1, buffer_size,
pic_file);
    Decode16();
  } while (!feof(pic_file));
  free(Scratch);

  outp(0x3C5, 0xF);

  stretch_text( 1 );

  return 0;
}


int read_256(FILE *pic_file, unsigned int mode,
unsigned int
options)
```

```
{
  long palette_start, total_read;

  if (pcx_header.num_planes != 1) return 4;
  palette_start = get_256_palette(pic_file, rgb256);
  if (!palette_start) return 2;
  ScreenWidth = 320;
  get_margin(ScreenWidth, &Margin, &LineEnd,
pcx_header);
  if (file_error) return file_error;
  fseek(pic_file, 128, SEEK_SET);
  total_read = 128;
  RepeatCount = 0;
  set_color_registers(rgb256);
  VideoOffs = (unsigned int
)get_first_pix(pcx_header, options,
ScreenWidth, 200);
  VideoSeg = 0xA000;
  buffer_size = set_buffer_size();
  Scratch = (int far*)malloc(buffer_size);
  do {
    DataLength = fread(Scratch, 1, buffer_size,
pic_file);
    total_read += DataLength;
    if (total_read > palette_start)
      DataLength -= (unsigned int)(total_read -
palette_start);
    Decode256();
  } while ((!feof(pic_file)) && (total_read <
palette_start));
  free(Scratch);
  if (mode);
  return 0;
}


#ifdef registered_version
  #include "svga256.h"
#else

int read_SVGA256(FILE *pic_file, unsigned int
mode, unsigned int
options)
{
  set_mode(3, no_options);
  printf("Support for this video mode is not
available.\n" );
  return 0;
}
#endif


int read_it(pathstr pic_file_name, int mode, int
options)
{
  FILE *pcx_file;

  file_error = 0;
  pcx_file = open_file(pic_file_name, "rb",
&pcx_header);
  if (pcx_file == NULL) return 1;
  if ((pcx_header.bits_per_plane < 8) &&
(pcx_header.num_planes
== 1)) {
    fclose(pcx_file);
    return 5;
  }
  if (mode == auto_set) mode =
best_mode(pcx_header);
  set_mode(mode, options);
  switch(mode) {
    case 0x0D:
    case 0x0E:
    case 0x10:
    case 0x12:
    case 0x102: file_error = read_16(pcx_file, mode,
options);
      break;
    case 0x13: file_error = read_256(pcx_file, mode,
options);
      break;
    case 0x100:
    case 0x101:
    case 0x103:
    case 0x105:
    case 0x107: file_error = read_SVGA256(pcx_file,
mode,
options);
      break;
  }
  if (options & blackout) video_off(0);
  fclose(pcx_file);
  return file_error;
}


void sleep( clock_t wait )
```

```
{
  clock_t goal;
  goal = wait + clock();
  while( goal > clock() );
}

void stretch_text(char fEnable)
{
  inregs.x.ax = 0xa007;

  if ( fEnable )
    inregs.x.bx = 0x0100;
  else
    inregs.x.bx = 0x0000;

  int86(VIDEO, &inregs, &outregs);
}

#if defined( _DEBUG )
void Trace( char *szOutStr )
{
  inregs.x.ax = SID_FUNCNUM | SID_OUTSTRING;
  inregs.x.si = SID_SISIG;
  inregs.x.di = SID_DISIG;
  segregs.ds = SEG( szOutStr );
  inregs.x.dx = OFF( szOutStr );

  int86x( SID_INTNUM, &inregs, &outregs, &segregs
);
}
#endif

#if defined( _MSC_VER )
#pragma warning( default : 4704 )
#endif
Copr. 1995 Zenith Data Systems Corp.


#include "pcx.h"
#include <dos.h>
#include <errno.h>
#include <conio.h>
#include <stdio.h>
#include <string.h>
#include <stdlib.h>

void cmd_error(char *msg) {
  puts(msg);
  exit(1);
}

void main(int argc, char *argv[])
{
  int pcx_mode = auto_set;
  int start_mode = get_mode();
  int err = 0;
  int n = 0;
  char file_name[80];
  char drive[_MAX_DRIVE];
  char dir[_MAX_DIR];
  char file[_MAX_FNAME];
  char ext[_MAX_EXT];
  VESA_info_struct VESA_inf;


  if (!detect_VGA) cmd_error("VGA card required.");

  if (argc > 1) {
    strcpy(file_name, argv[1]);
    _splitpath(file_name, drive, dir, file, ext);
    if (*ext == NULL) {
      strcpy(ext, ".PCX");
      _makepath(file_name, drive, dir, file, ext);
    }
    if (argc > 2) {
      sscanf(argv[2], "%i", &n) ;
      if (n) pcx_mode = n;
    }
    if ((!we_support(pcx_mode)) && (pcx_mode !=
auto_set))
      cmd_error("The requested video mode is not
supported by
this program.");
    if (pcx_mode >= 0x100) {
      if (!detect_VESA(&VESA_inf))
    cmd_error("VESA BIOS extensions not found.
Your video card
may require\n"
        "a program (typically called VESA.COM) to be
loaded so
that\n"
        "Super-VGA images can be displayed without a
special
driver.");
      if (!hardware_supports(pcx_mode))
    cmd_error("Your card or VESA BIOS does not
support the
requested"
              " video mode.");
```

```
    }
    err = read_it(file_name, pcx_mode, hcenter |
vcenter |
blackout);
    if(err) printf(report_error(err));
  }
  else
    cmd_error("Usage:\nsv filename[.pcx] [mode]");
  return;
}

Copr. 1995 Zenith Data Systems Corp.


IFDEF PASCAL
.MODEL TPASCAL
ELSE
.MODEL LARGE, C
ENDIF

.DATA
      extrn DataLength: word
      extrn Scratch: dword
      extrn Plane: word
      extrn VideoOffs: word
      extrn VideoSeg: word
      extrn Margin: word
      extrn ScreenWidth: word
      extrn LineEnd: word
      extrn RepeatCount: byte
      extrn ColumnCount: word
    extrn BytesPerLine: word
.CODE
    PUBLIC  Decode16
    PUBLIC  Decode256
      LOCALS


Decode16 PROC


push   si
push   di
push   bp


@@startproc:
mov    bp, Plane
mov    di, VideoOffs
mov    ah, byte ptr BytesPerLine
mov    dx, ColumnCount
mov    bx, DataLength
xor    cx, cx
mov    cl, RepeatCount
les    si, Scratch
mov    es, VideoSeg
add    bx, si
cld
cmp    cl, 0
jne    @@multi_data
jmp short @@getbyte


@@writebyte:
stosb
inc    dl
cmp    dl, ah
je     @@doneline
loop   @@writebyte
jmp short @@getbyte
@@doneline:
shl    bp, 1
cmp    bp, 8
jle    @@setindex
mov    bp, 1
add    di, Margin
mov    dx, ScreenWidth
add    LineEnd, dx
jmp short @@setplane
@@setindex:
sub    di, dx
@@setplane:
push   ax
cli
mov    ax, bp
mov    dx, 3C5h
out    dx, al
sti
pop    ax
xor    dx, dx
loop   @@writebyte


@@getbyte:
cmp    si, bx
je     @@exit
```

```
push   ds
push   si
lds    si, Scratch
pop    si
lodsb
pop    ds
cmp    al, 192
jb     @@one_data
xor    al. 192
mov    cl, al
cmp    si, bx
je     @@exit
@@multi_data:
push   ds
push   si
lds    si. Scratch
pop    si
lodsb
pop    ds
jmp    @@writebyte
@@one_data:
mov    cl, 1
jmp    @@writebyte


@@exit:
mov    Plane. bp
mov    RepeatCount, cl
mov    ColumnCount, dx
mov    VideoOffs, di
pop    bp
pop    di
pop    si
ret

Decode16 ENDP


Decode256 PROC



push   si
push   di
push   bp

les    si, Scratch
mov    bx, DataLength
add    bx, si
mov    es, VideoSeg
mov    di, VideoOffs
xor    cx, cx
mov    cl, RepeatCount
cld
cmp    cl, 0
jne    @@multi_data


@@getbyte:
cmp    di, LineEnd
jb     @@NoLineEnd
add    di, Margin
mov    dx, ScreenWidth
add    LineEnd, dx
@@NoLineEnd:
cmp    si, bx
je     @@exit
push   ds
push   si
lds    si, Scratch
pop    si
lodsb
pop    ds
cmp    al, 192
jb     @@one_data
xor    al, 192
mov    cl, al
cmp    si, bx
je     @@exit
@@multi_data:
push   ds
push   si
lds    si, Scratch
pop    si
lodsb
pop    ds
rep    stosb
jmp    @@getbyte
@@one_data:
stosb
jmp    @@getbyte

@@exit:
mov    VideoOffs. di
mov    RepeatCount, cl
pop    bp
pop    di
pop    si
ret
```

```
Decode256 ENDP

END

Copr. 1995 Zenith Data Systems Corp.
#include <stdio.h>



typedef int        BOOL;

#if defined( TRUE )
 #undef TRUE
#endif

#if defined( FALSE )
 #undef FALSE
#endif

#if defined( FON )
 #undef ON
#endif

#if defined( FOFF )
 #undef OFF
#endif

#if defined( FAR )
 #undef FAR
#endif

#define TRUE      1
#define FALSE     0
#define FON       1
#define FOFF      0

typedef unsigned char      BYTE;

#define FAR        far

#if defined( WORD )
 #undef WORD
#endif

#if defined( DWORD )
 #undef DWORD
#endif
typedef unsigned long      DWORD;

typedef unsigned short     WORD;
typedef unsigned int       UINT;
typedef signed long        LONG;
typedef void *             PVOID;
typedef void FAR *         LPVOID;

#define LOBYTE(w)          ((BYTE)(w))
#define HIBYTE(w)          ((BYTE)(((UINT)(w) >> 8)
& 0xFF))

#if defined( LOWORD )
 #undef LOWORD
#endif
#define LOWORD(l)
((WORD)(DWORD)((LPVOID)l))

#if defined( HIWORD )
 #undef HIWORD
#endif

#define HIWORD(l)
((WORD)((((DWORD)((LPVOID)l)) >> 16)
& 0xFFFF))

#define MAKELONG(low, high)
((LONG)(((WORD)(low)) |
(((DWORD)((WORD)(high))) << 16)))
#define MAKEWORD(low, high) ((WORD)low |
((WORD)high << 8))

#if defined( OFF )
 #undef OFF
#endif

#define OFF(fp)          (LOWORD( ( DWORD )(
BYTE FAR * )fp ))
#define SEG(fp)          (HIWORD( ( DWORD )(
BYTE FAR * )fp ))

typedef char pathstr[80];

struct rgb_struct {
  unsigned char r, g, b;
};


struct pcx_header_struct {
  unsigned char signature, version, code,
bits_per_plane;
  int xmin, ymin, xmax, ymax;
  int hres, vres;
  rgb_struct palette[16];
  unsigned char reserved, num_planes;
  int bytes_per_line;
  unsigned char other_stuff[60];
};
struct VESA_info_struct {
  unsigned char signature[4];
  int  version;
  int far *oem_ptr;
  unsigned char capabilities[4];
  unsigned int far *mode_list_ptr;
  unsigned char reserved[256];

};

struct mode_info_struct {
  int  attributes;
  unsigned char windowA_atts, windowB_atts;
  unsigned int granule_kb, window_size;
  unsigned int windowA_start, windowB_start;
  int  far *function_ptr;
  unsigned int bytes_per_line;
  unsigned int xres, yres;
  unsigned char other_stuff[234];
};


int read_it(pathstr pic_file_name. int mode, int
options);
FILE *open_file(pathstr pic_file_name, char
*file_mode,
        pcx_header_struct *header);
int get_mode(void);
void set_mode(int mode, int options);
char *report_error(int error);
int we_support(unsigned int mode);
int hardware_supports(unsigned int mode);
int detect_VESA(VESA_info_struct *VESA_rec);
int detect_VGA(void);
void cmd_error(char *msg);


#define no_options 0
#define save_mem   1
#define hcenter    2
#define vcenter    4
#define blackout   8

#define auto_set   0

#define SID_INTNUM          3
#define SID_FUNCNUM         0x0900
#define SID_OUTSTRING       0x0010
#define SID_SISIG           0x4647
#define SID_DISIG           0x4A4D

#if defined( _DEBUG )
void Trace( char *szOutStr );
#endif

#if !defined( _DEBUG )
#define DEBUG_BREAK _asm nop
#define TRACE( s )  _asm nop
#else
#define DEBUG_BREAK _asm int 3
#define TRACE( s ) Trace( s )
#endif
```

We claim:

1. A computer system which includes one or more flash memory devices, comprising:

means for enabling said computer system to communicate with a remote computer system by way of a radio link;

means for checking the quality of said radio link; and means for enabling said flash memory devices to be updated based on the quality of said radio link.

2. The computer system of claim 1, further comprising:

means for polling said remote computer system to check whether flash update data is available.

3. The computer system of claim 1, further comprising:

means for selecting said remote computer system.

4. The computer system of claim 1, further comprising:

a power management subsystem; and means for disabling said power management subsystem prior to updating said flash memory devices.

5. The computer system of claim 1, further comprising:

a graphical user interface (GUI) permitting a user to selective update said flash memory devices.

6. A computer including one or more flash memory devices, comprising:

a transceiver for communicating with a host computer via a wireless communications link;

a first software routine enabling said computer to determine the quality of said wireless communications link;

a second software routine enabling said computer to download at least one flash update file from said host computer by way of said wireless link based on the quality of said wireless link;

a first memory for storing said at least one update file; and a third software routine for transferring said at least one update file from said first memory to said flash memory devices.

7. The computer of claim 6, wherein said third software routine is included in BIOS.

8. The computer of claim 6, further comprising:

means for selecting said host computer from a plurality of host computers that includes said host computer.

9. The computer of claim 8, wherein said selecting means includes:

a graphical user interface (GUI) permitting a user to select said host computer.

10. The computer of claim 6, wherein the first memory includes at least on DRAM.

11. The computer of claim 6, further comprising:

means for reserving a sector of said first memory; and means for storing said at least one update file in said sector.

12. A method of updating one or more flash memory devices using a wireless link, comprising the following steps:

transmitting data over said wireless link from a first computer to a second computer including said flash memory devices;

disabling a power management subsystem of said second computer prior to transmitting said data; and updating said flash memory devices based on said transmitted data.

13. The method of claim 12, further comprising the following steps:

checking the quality of said wireless link; and enabling said flash memory devices to be updated based on the quality of said wireless link.

14. The method of claim 12, further comprising the following step:

disabling at least one interrupt within said second computer prior to updating said flash memory devices.

15. The method of claim 12, further comprising the following steps:

erasing said flash memory devices;

determining whether an error occurred while erasing said flash memory devices; and aborting update of said flash memory devices based on the occurrence of said error.

16. The method of claim 12, further comprising the following step:

rebooting said second computer subsequent to updating said flash memory devices.

17. The method of claim 12, further comprising the following step:

determining whether said second computer is receiving alternating current (AC) power.

18. The method of claim 12, further comprising the following step:

reserving at least one sector of non-flash memory for temporarily storing said transmitted data.

* * * * *